US012774974B2

(12) United States Patent
Cook et al.

(10) Patent No.: US 12,774,974 B2
(45) **Date of Patent: *Oct. 27, 2026**

(54) METHOD TO LEARN PRECISE SENSING FINGERPRINTS BASED ON MACHINE LEARNING INTEGRATION

(71) Applicant: Lyten, Inc., San Jose, CA (US)

(72) Inventors: Daniel Cook, Woodside, CA (US); Michael Stowell, Sunnyvale, CA (US); Karel Vanheusden, Woodside, CA (US); George Clayton Gibbs, Santa Clara, CA (US); Jacques Nicole, Palo Alto, CA (US); Carlos Montalvo, Cambria, CA (US); Kyle Matthys, Los Altos Hills, CA (US); Bruce Lanning, Littleton, CO (US); Sung Lim, Mountain View, CA (US); John Chmiola, San Francisco, CA (US)

(73) Assignee: Lyten, Inc., San Jose, CA (US)

( * ) Notice: Subject to any disclaimer, the term of this patent is extended or adjusted under 35 U.S.C. 154(b) by 171 days.

This patent is subject to a terminal disclaimer.

(21) Appl. No.: 18/440,719

(22) Filed: Feb. 13, 2024

(65) Prior Publication Data

US 2024/0275608 A1 Aug. 15, 2024

Related U.S. Application Data

(60) Provisional application No. 63/622,464, filed on Jan. 18, 2024, provisional application No. 63/532,859, (Continued)

(51) Int. Cl.

*H04L 9/40* (2022.01)
*G01N 27/02* (2006.01)
(Continued)

(52) U.S. Cl.

CPC .......... *G01N 27/02* (2013.01); *G01N 27/221* (2013.01); *G01N 27/4145* (2013.01); (Continued)

(58) Field of Classification Search

CPC .. G01N 27/02; G01N 27/221; G01N 27/4145; G01N 27/72; G01N 2027/222; (Continued)

(56) References Cited

U.S. PATENT DOCUMENTS

| | | | |
|---|---|---|---|
| 6,097,669 | A | 8/2000 | Jordan et al. |
| 6,286,656 | B1 | 9/2001 | Huang et al. |

(Continued)

FOREIGN PATENT DOCUMENTS

| | | | |
|---|---|---|---|
| CN | 104677879 | B | 6/2017 |
| EP | 1289809 | B1 | 5/2007 |

(Continued)

OTHER PUBLICATIONS

Anzelmo et al., U.S. Appl. No. 18/889,176, filed Sep. 18, 2024.

(Continued)

*Primary Examiner* — Ghodrat Jamshidi
(74) *Attorney, Agent, or Firm* — Zilka-Kotab, P.C.

(57) ABSTRACT

Methods and system to learn precise sensing fingerprints based on machine learning integration are disclosed herein. In use, the system receives at least one first parameter associated with at least one sensor and associates the first parameter with a pre-identified first digital signature in a signature database. A machine learning system is trained based on the first parameter and the pre-identified digital signature. The system then receives at least one second parameter from the at least one sensor and determines that the second parameter is independent of a digital signature in the signature database. Using the machine learning system, (Continued)

a second digital signature for the second parameter is identified and saved in the signature database.

20 Claims, 281 Drawing Sheets

Related U.S. Application Data filed on Aug. 15, 2023, provisional application No. 63/531,657, filed on Aug. 9, 2023, provisional application No. 63/525,346, filed on Jul. 6, 2023, provisional application No. 63/445,948, filed on Feb. 15, 2023.

(51) Int. Cl.

| | |
|---|---|
| ***G01N 27/22*** | (2006.01) |
| ***G01N 27/414*** | (2006.01) |
| ***G01N 27/447*** | (2006.01) |
| ***G01N 27/72*** | (2006.01) |
| ***G02F 1/167*** | (2019.01) |
| ***G06Q 30/018*** | (2023.01) |
| ***G06Q 50/06*** | (2012.01) |
| ***H04L 9/32*** | (2006.01) |

(52) U.S. Cl.

CPC ........... *G01N 27/447* (2013.01); *G01N 27/72* (2013.01); *G02F 1/167* (2013.01); *G06Q 30/018* (2013.01); *G06Q 50/06* (2013.01); *H04L 9/3247* (2013.01); *H04L 63/1416* (2013.01); *G01N 2027/222* (2013.01)

(58) Field of Classification Search

CPC .... G01N 27/447; G02F 1/167; G06Q 30/018; G06Q 50/06; H04L 9/3247; H04L 63/1416

See application file for complete search history.

(56) References Cited

U.S. PATENT DOCUMENTS

| | | | |
|---|---|---|---|
| 6,359,444 | B1 | 3/2002 | Grimes |
| 6,525,105 | B1 | 2/2003 | Udagawa et al. |
| 6,885,291 | B1 | 4/2005 | Pollack et al. |
| 6,997,039 | B2 | 2/2006 | Rao et al. |
| 7,581,439 | B2 | 9/2009 | Rensel et al. |
| 8,364,419 | B2 | 1/2013 | Potyrailo et al. |
| 8,448,496 | B2 | 5/2013 | Huang et al. |
| 8,567,232 | B2 | 10/2013 | Ackley et al. |
| 8,736,425 | B2 | 5/2014 | Potyrailo |
| 9,038,443 | B1 | 5/2015 | Pace et al. |
| 9,172,147 | B1 | 10/2015 | Manry, Jr. |
| 9,208,362 | B1 | 12/2015 | Fink et al. |
| 9,395,343 | B2 | 7/2016 | Schmid et al. |
| 9,403,279 | B2 | 8/2016 | Smith et al. |
| 9,705,469 | B2 | 7/2017 | Rinaldi et al. |
| 9,749,792 | B2 * | 8/2017 | Klicpera ................. F16K 31/02 |
| 9,944,131 | B2 | 4/2018 | Wei et al. |
| 10,278,287 | B2 | 4/2019 | Wilson et al. |
| 10,492,683 | B2 | 12/2019 | Yalçinkaya et al. |
| 10,502,705 | B2 | 12/2019 | Stowell et al. |
| 10,802,018 | B2 | 10/2020 | Cubukcu et al. |
| 10,876,210 | B1 * | 12/2020 | Claussen .................... B41J 2/01 |
| 11,014,413 | B2 | 5/2021 | Räisänen et al. |
| 11,137,368 | B2 | 10/2021 | Stowell et al. |
| 11,555,748 | B2 | 1/2023 | Stowell et al. |
| 11,555,761 | B1 | 1/2023 | Stowell |
| 11,585,731 | B2 | 2/2023 | Stowell et al. |
| 11,892,372 | B2 | 2/2024 | Stowell et al. |
| 12,317,466 | B2 | 5/2025 | Anzelmo et al. |
| 12,379,339 | B2 | 8/2025 | Cook et al. |
| 12,449,387 | B2 | 10/2025 | Cook et al. |
| 2003/0080919 | A1 | 5/2003 | Forster et al. |
| 2003/0201044 | A1 | 10/2003 | Schick |
| 2004/0113846 | A1 | 6/2004 | Achim |
| 2004/0144635 | A1 * | 7/2004 | Fitzgerald .............. H01H 3/142 200/512 |
| 2007/0068493 | A1 | 3/2007 | Pavlovsky |
| 2007/0090926 | A1 | 4/2007 | Potyrailo et al. |
| 2007/0175555 | A1 | 8/2007 | Myatt |
| 2007/0295069 | A1 | 12/2007 | Mancosu et al. |
| 2008/0135614 | A1 | 6/2008 | Werner et al. |
| 2009/0145233 | A1 | 6/2009 | Eklund et al. |
| 2009/0171975 | A1 | 7/2009 | McConnell et al. |
| 2009/0234587 | A1 | 9/2009 | Hsiung et al. |
| 2009/0307037 | A1 | 12/2009 | King |
| 2009/0327188 | A1 | 12/2009 | Ryhanen et al. |
| 2010/0036693 | A1 | 2/2010 | Probst |
| 2010/0070423 | A1 | 3/2010 | McConnell et al. |
| 2011/0040498 | A1 | 2/2011 | Huang et al. |
| 2012/0235690 | A1 | 9/2012 | Potyrailo et al. |
| 2013/0150516 | A1 | 6/2013 | Lettow |
| 2013/0214875 | A1 | 8/2013 | Duncan et al. |
| 2013/0285681 | A1 | 10/2013 | Wilson et al. |
| 2014/0002111 | A1 | 1/2014 | Potyrailo et al. |
| 2014/0085126 | A1 | 3/2014 | Rofougaran et al. |
| 2014/0134092 | A1 | 5/2014 | Shankman |
| 2014/0266850 | A1 | 9/2014 | Suorsa |
| 2014/0305191 | A1 | 10/2014 | Schmid et al. |
| 2014/0350883 | A1 | 11/2014 | Carter et al. |
| 2014/0354112 | A1 | 12/2014 | Rocha |
| 2015/0083196 | A1 | 3/2015 | Gray et al. |
| 2015/0118492 | A1 | 4/2015 | Sitharaman et al. |
| 2015/0123678 | A1 | 5/2015 | Neikirk et al. |
| 2015/0323482 | A1 | 11/2015 | Shimoyama et al. |
| 2016/0033442 | A1 | 2/2016 | Sun et al. |
| 2016/0034909 | A1 | 2/2016 | Zhu et al. |
| 2016/0050456 | A1 * | 2/2016 | Arini ................ H04N 21/44204 725/10 |
| 2016/0065169 | A1 | 3/2016 | Rinaldi et al. |
| 2016/0091544 | A1 | 3/2016 | Daneshmand et al. |
| 2016/0124521 | A1 * | 5/2016 | Hayner ................... G06F 3/038 709/203 |
| 2016/0169824 | A1 | 6/2016 | Shin et al. |
| 2016/0282312 | A1 | 9/2016 | Cable et al. |
| 2017/0096036 | A1 | 4/2017 | Guinart et al. |
| 2017/0108469 | A1 * | 4/2017 | Timmons ............. G01N 17/006 |
| 2017/0294698 | A1 | 10/2017 | Cho et al. |
| 2017/0294699 | A1 | 10/2017 | Cho et al. |
| 2017/0330004 | A1 | 11/2017 | Gibson |
| 2018/0042479 | A1 | 2/2018 | Yalçinkaya et al. |
| 2018/0265666 | A1 | 9/2018 | Anzelmo et al. |
| 2018/0334902 | A1 | 11/2018 | Olsen et al. |
| 2018/0346684 | A1 | 12/2018 | Polyzos et al. |
| 2019/0204265 | A1 | 7/2019 | Stowell et al. |
| 2019/0260120 | A1 | 8/2019 | Khushrushahi et al. |
| 2019/0264004 | A1 | 8/2019 | Stowell et al. |
| 2019/0277702 | A1 | 9/2019 | Aleman et al. |
| 2019/0277761 | A1 | 9/2019 | Falk et al. |
| 2019/0324433 | A1 | 10/2019 | Cella et al. |
| 2019/0379639 | A1 | 12/2019 | Corning |
| 2020/0066845 | A1 * | 2/2020 | Glacer ................. H10D 62/882 |
| 2020/0242858 | A1 | 7/2020 | Meroux et al. |
| 2020/0278304 | A1 | 9/2020 | Udpa et al. |
| 2020/0292488 | A1 | 9/2020 | Lim et al. |
| 2021/0091603 | A1 * | 3/2021 | Alpert .................. H04B 10/807 |
| 2021/0112781 | A1 | 4/2021 | Crouthamel et al. |
| 2021/0118081 | A1 | 4/2021 | Jha et al. |
| 2021/0142012 | A1 | 5/2021 | Stowell et al. |
| 2021/0155378 | A1 | 5/2021 | Johnson et al. |
| 2021/0199065 | A1 | 7/2021 | Rodrigues et al. |
| 2021/0232935 | A1 | 7/2021 | Meinrenken et al. |
| 2021/0293521 | A1 | 9/2021 | Stowell et al. |
| 2021/0293630 | A1 | 9/2021 | Stowell et al. |
| 2021/0311101 | A1 * | 10/2021 | Katti ......................... G01J 1/44 |
| 2021/0348909 | A1 | 11/2021 | Stowell et al. |
| 2021/0396709 | A1 | 12/2021 | Lim et al. |
| 2022/0108327 | A1 | 4/2022 | Schoeneboom et al. |
| 2022/0146415 | A1 | 5/2022 | Putkaradze et al. |
| 2022/0270123 | A1 | 8/2022 | Shaikh et al. |
| 2022/0276625 | A1 | 9/2022 | Metzger |
| 2022/0330860 | A1 * | 10/2022 | Nawana ........... A61B 5/150236 |

(56) References Cited

U.S. PATENT DOCUMENTS

| | | | | |
|---|---|---|---|---|
| 2022/0369957 | A1* | 11/2022 | Nawana | A61B 5/1411 |
| 2022/0401883 | A1 | 12/2022 | Le Henaff et al. | |
| 2023/0017082 | A1 | 1/2023 | Stowell et al. | |
| 2023/0018475 | A1 | 1/2023 | Stowell | |
| 2023/0019088 | A1 | 1/2023 | Montalvo et al. | |
| 2023/0021276 | A1 | 1/2023 | Stowell et al. | |
| 2023/0035506 | A1 | 2/2023 | Rogojina et al. | |
| 2023/0083633 | A1 | 3/2023 | Desai et al. | |
| 2023/0096239 | A1 | 3/2023 | Cole | |
| 2023/0211076 | A1 | 7/2023 | Weber et al. | |
| 2023/0296479 | A1 | 9/2023 | Stowell et al. | |
| 2023/0384264 | A1 | 11/2023 | Jardine et al. | |
| 2023/0384265 | A1 | 11/2023 | Jardine et al. | |
| 2023/0417685 | A1 | 12/2023 | Jardine et al. | |
| 2024/0003779 | A1 | 1/2024 | Stowell et al. | |
| 2024/0272103 | A1 | 8/2024 | Cook et al. | |
| 2024/0273648 | A1 | 8/2024 | Cook et al. | |
| 2024/0280526 | A1 | 8/2024 | Cook et al. | |
| 2024/0288381 | A1 | 8/2024 | Stowell et al. | |
| 2025/0016970 | A1 | 1/2025 | Anzelmo et al. | |
| 2025/0076233 | A1 | 3/2025 | Cook et al. | |
| 2025/0327764 | A1 | 10/2025 | Cook et al. | |

FOREIGN PATENT DOCUMENTS

| | | | | |
|---|---|---|---|---|
| JP | 5822282 | B2 | 11/2015 | |
| KR | 100721261 | B1 | 5/2007 | |
| TW | 201312104 | A | 3/2013 | |
| TW | I826739 | * | 12/2023 | |
| WO | 199325400 | A1 | 12/1993 | |
| WO | 2009024673 | A1 | 2/2009 | |
| WO | 2013027029 | A1 | 2/2013 | |
| WO | 2013192335 | A1 | 12/2013 | |
| WO | 2014169195 | A1 | 10/2014 | |
| WO | 2015083073 | A1 | 6/2015 | |
| WO | WO-2015157381 | A1 * | 10/2015 | G01N 29/4436 |
| WO | 2016068810 | A1 | 5/2016 | |
| WO | WO-2016126989 | A1 * | 8/2016 | A61B 5/053 |
| WO | WO-2019027975 | A1 * | 2/2019 | G01N 33/487 |
| WO | 2019067488 | A1 | 4/2019 | |
| WO | 2019136181 | A1 | 7/2019 | |
| WO | 2020198451 | A1 | 10/2020 | |
| WO | 2021096890 | A1 | 5/2021 | |
| WO | 2023003893 | A1 | 1/2023 | |
| WO | 2024173534 | A1 | 8/2024 | |

OTHER PUBLICATIONS

Cook et al., U.S. Appl. No. 18/952,878, filed Nov. 19, 2024.
Corrected Notice of Allowance from U.S. Appl. No. 18/440,806, dated Nov. 15, 2024.
Corrected Notice of Allowance from U.S. Appl. No. 18/440,806, dated Dec. 4, 2024.
Non-Final Office Action from U.S. Appl. No. 18/889,176, dated Dec. 4, 2024.
International Search Report and Written Opinion from PCT Application No. PCT/US 24/15862, dated Jul. 18, 2024.
Notice of Allowance from U.S. Appl. No. 18/440,806, dated Nov. 5, 2024.
Anzelmo et al., U.S. Appl. No. 19/083,318, filed Mar. 18, 2025.
Notice of Allowance from U.S. Appl. No. 18/889,176, dated Apr. 2, 2025.
Notice of Allowance from U.S. Appl. No. 18/440,806, dated Apr. 9, 2025.
Corrected Notice of Allowance from U.S. Appl. No. 18/889,176, dated Apr. 15, 2025.
Corrected Notice of Allowance from U.S. Appl. No. 18/889,176, dated May 5, 2025.
Corrected Notice of Allowance from U.S. Appl. No. 18/440,806, dated Apr. 28, 2025.
Corrected Notice of Allowance from U.S. Appl. No. 18/440,806, dated May 19, 2025.
Notice of Allowance from U.S. Appl. No. 18/952,878, dated May 22, 2025
Non-Final Office Action from U.S. Appl. No. 18/440,806, dated Jul. 15, 2024.
Corrected Notice of Allowance from U.S. Appl. No. 18/952,878, dated Jun. 20, 2025.
Corrected Notice of Allowance from U.S. Appl. No. 18/952,878, dated Jul. 8, 2025.
Cook et al., U.S. Appl. No. 19/249,916, filed Jun. 25, 2025.
Stowell et al., U.S. Appl. No. 17/940,227, filed Sep. 8, 2022.
Stowell, M., U.S. Appl. No. 17/940,240, filed Sep. 8, 2022.
Montalvo et al., U.S. Appl. No. 17/940,246, filed Sep. 8, 2022.
Stowell et al., U.S. Appl. No. 17/940,256, filed Sep. 8, 2022.
International Search Report and Written Opinion from PCT Application No. PCT/US2019/012224, dated Apr. 26, 2019.
International Search Report and Written Opinion from PCT Application No. PCT/US2021/042735, dated Nov. 3, 2021.
Na et al., "Graphene-Based Wireless Environmental Gas Sensor on PET Substrate," IEEE Sensor Journal, 2015, pp. 1-7.
Potyrailo et al., "A Passive Radio-Frequency Identification {RFID) Gas Sensor With Self-Correction Against Fluctuations of Ambient Temperature," Sens Actuators B Chem., vol. 185, Aug. 1, 2013, 16 pages.
Potyrailo et al., "Multivariable MHz and GHz Wireless Chem/Bio Sensors for Environmental, Industrial, and Security Applications," The 14th International Meeting on Chemical Sensors (IMCS), vol. 40, May 2012, pp. 399-402.
Potyrailo et al., "Wireless sensors and sensor networks for homeland security applications, " Trends in Analytical Chemistry, vol. 40, Nov. 1, 2012, pp. 1-25.
Zhu et al., "Optoelectromechanical Multimodal Biosensor with Graphene Active Region," Nano Letters, vol. 14, 2014, pp. 5641-5649.
Non-Final Office Action from U.S. Appl. No. 17/940,227, dated Nov. 14, 2022.
Notice of Allowance from U.S. Appl. No. 17/940,240, dated Nov. 16, 2022.
Stowell et al., U.S. Appl. No. 17/340,678, filed Jun. 7, 2021.
Stowell et al., U.S. Appl. No. 17/340,514, filed Jun. 7, 2021.
Notice of Allowance from U.S. Appl. No. 17/340,514, dated Oct. 5, 2022.
Corrected Notice of Allowance from U.S. Appl. No. 17/340,514, dated Oct. 27, 2022.
Stowell et al., U.S. Appl. No. 17/340,493, filed Jun. 7, 2021.
Non-Final Office Action from U.S. Appl. No. 17/340,493, dated Jul. 21, 2022.
Notice of Allowance from U.S. Appl. No. 17/340,493, dated Oct. 13, 2022.
Notice of Allowance from U.S. Appl. No. 17/940,227, dated Dec. 8, 2022.
Stowell et al., U.S. Appl. No. 18/080,606, filed Dec. 13, 2022.
Corrected Notice of Allowance from U.S. Appl. No. 17/940,240, dated Dec. 2, 2022.
Corrected Notice of Allowance from U.S. Appl. No. 17/940,227, dated Jan. 5, 2022.
International Search Report and Written Opinion from PCT Application No. PCT/US 22/43125, dated Dec. 15, 2022.
Non-Final Office Action from U.S. Appl. No. 18/080,606, dated Jul. 20, 2023.
Reddy et al., "Split ring resonator and its evolved structures over the past decade," IEEE International Conference on Emerging Trends in Computing, Communication, and Nanotechnology (ICECCN), 2013, pp. 625-629.
Jardine et al., U.S. Appl. No. 18/230,072, filed Aug. 3, 2023.
Jardine et al., U.S. Appl. No. 18/230,080, filed Aug. 3, 2023.
Jardine et al., U.S. Appl. No. 18/230,083, filed Aug. 3, 2023.
Non-Final Office Action from U.S. Appl. No. 18/080,606, dated Aug. 24, 2023.
Stowell et al., U.S. Appl. No. 18/369,418, filed Sep. 18, 2023.
Notice of Allowance from U.S. Appl. No. 18/080,606, dated Sep. 29, 2023.
Non-Final Office Action from U.S. Appl. No. 18/369,418, dated Oct. 31, 2023.

(56) References Cited

OTHER PUBLICATIONS

Corrected Notice of Allowance from U.S. Appl. No. 18/080,606, dated Dec. 6, 2023.
Notice of Allowance from U.S. Appl. No. 18/369,418, dated Dec. 5, 2023.
Corrected Notice of Allowance from U.S. Appl. No. 18/369,418, dated Dec. 26, 2023.
International Search Report and Written Opinion from PCT Application No. PCT/US23/33178, dated Dec. 20, 2023.
Corrected Notice of Allowance from U.S. Appl. No. 18/369,418, dated Jan. 17, 2024.
Cook et al., U.S. Appl. No. 18/440,806, filed Feb. 13, 2024.
Cook et al., U.S. Appl. No. 18/440,719, filed Feb. 13, 2024.
Cook et al., U.S. Appl. No. 18/440,741, filed Feb. 13, 2024.
Stowell et al., U.S. Appl. No. 18/440,753, filed Feb. 13, 2024.
Cook et al., U.S. Appl. No. 18/440,769, filed Feb. 13, 2024.
Non-Final Office Action from U.S. Appl. No. 18/952,878, dated Jan. 16, 2025.
Non-Final Office Action from U.S. Appl. No. 18/440,806, dated Feb. 27, 2025.
Non-Final Office Action from U.S. Appl. No. 18/889,176, dated Mar. 18, 2025.
Materialdistrict, "Metamaterial Mechanisms Made From A Single Piece of Plastic," MaterialDistrict, Oct. 18, 2016, 3 pages.
Non-Final Office Action from U.S. Appl. No. 18/440,753, dated Apr. 29, 2026.
Restriction Requirement from U.S. Appl. No. 18/440,769, dated Nov. 12, 2025.
Cook et al., U.S. Appl. No. 19/384,938, filed Nov. 10, 2025.
International Search Report and Written Opinion from PCT Application No. PCT/US2025/054875, dated Jan. 29, 2026, 19 pages.
Non-Final Office Action from U.S. Appl. No. 18/440,769, dated Feb. 26, 2026.
Non-Final Office Action from U.S. Appl. No. 19/384,938, dated Jun. 26, 2026.

* cited by examiner

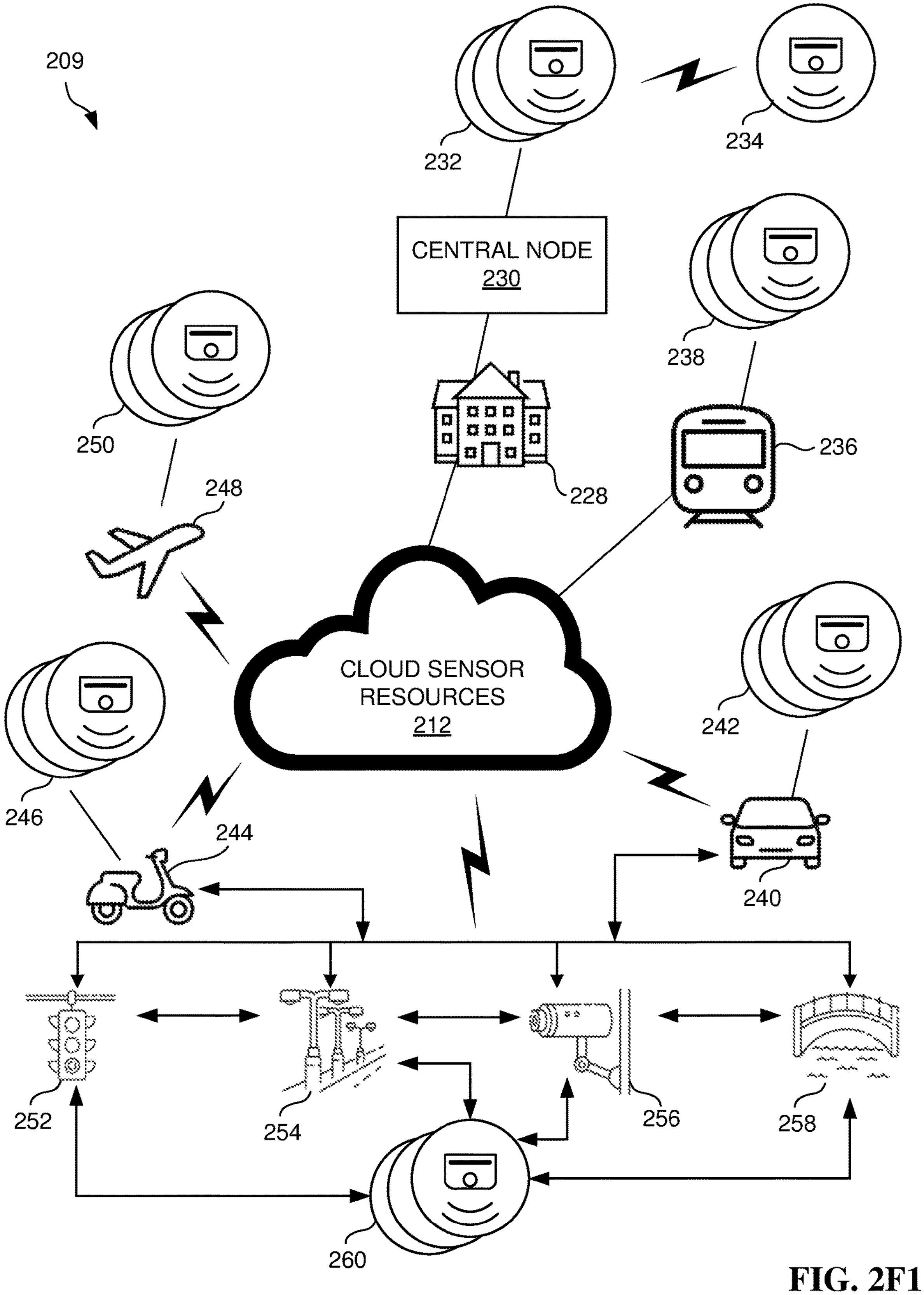
FIG. 2F1

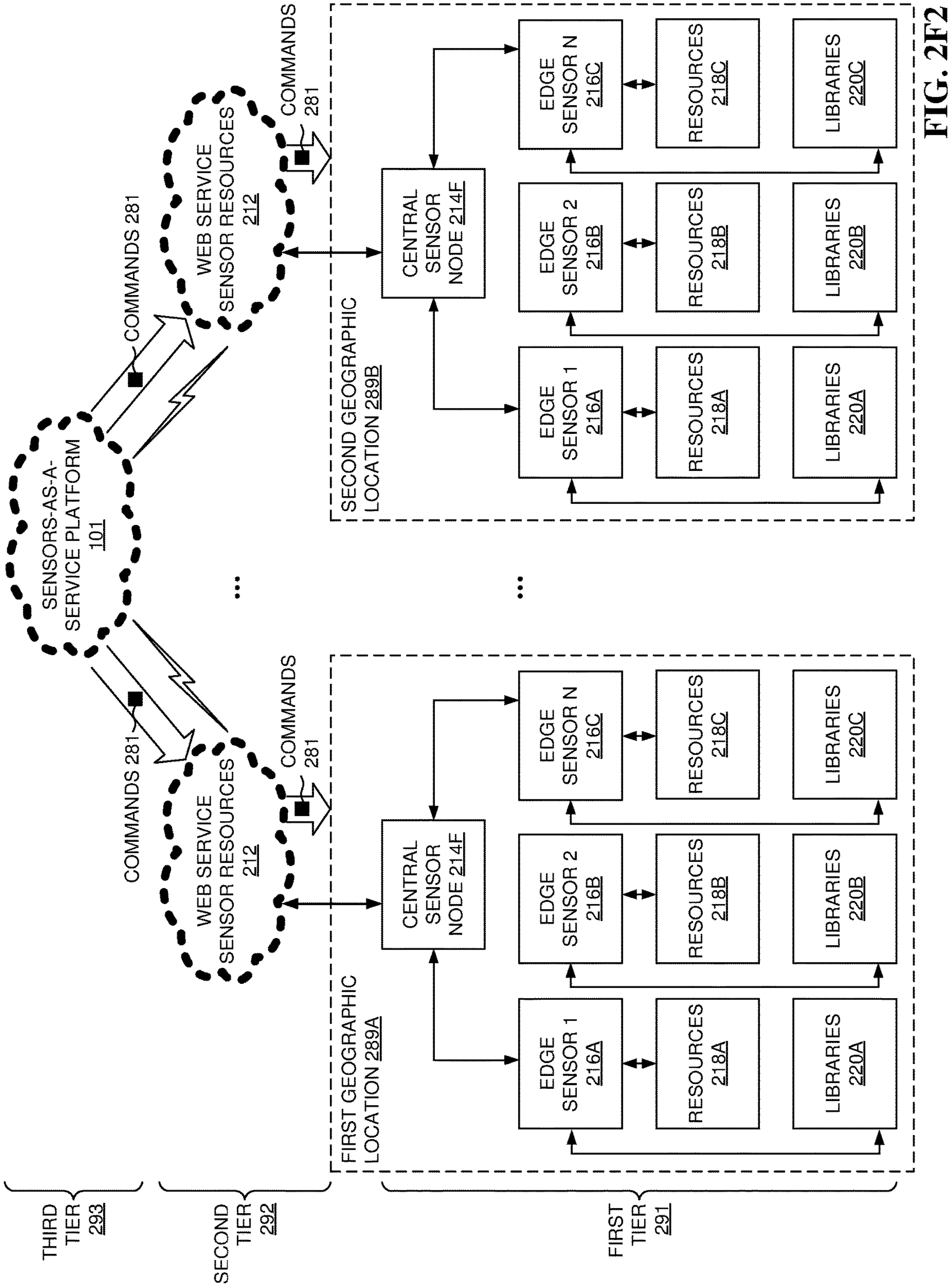
FIG. 2F2

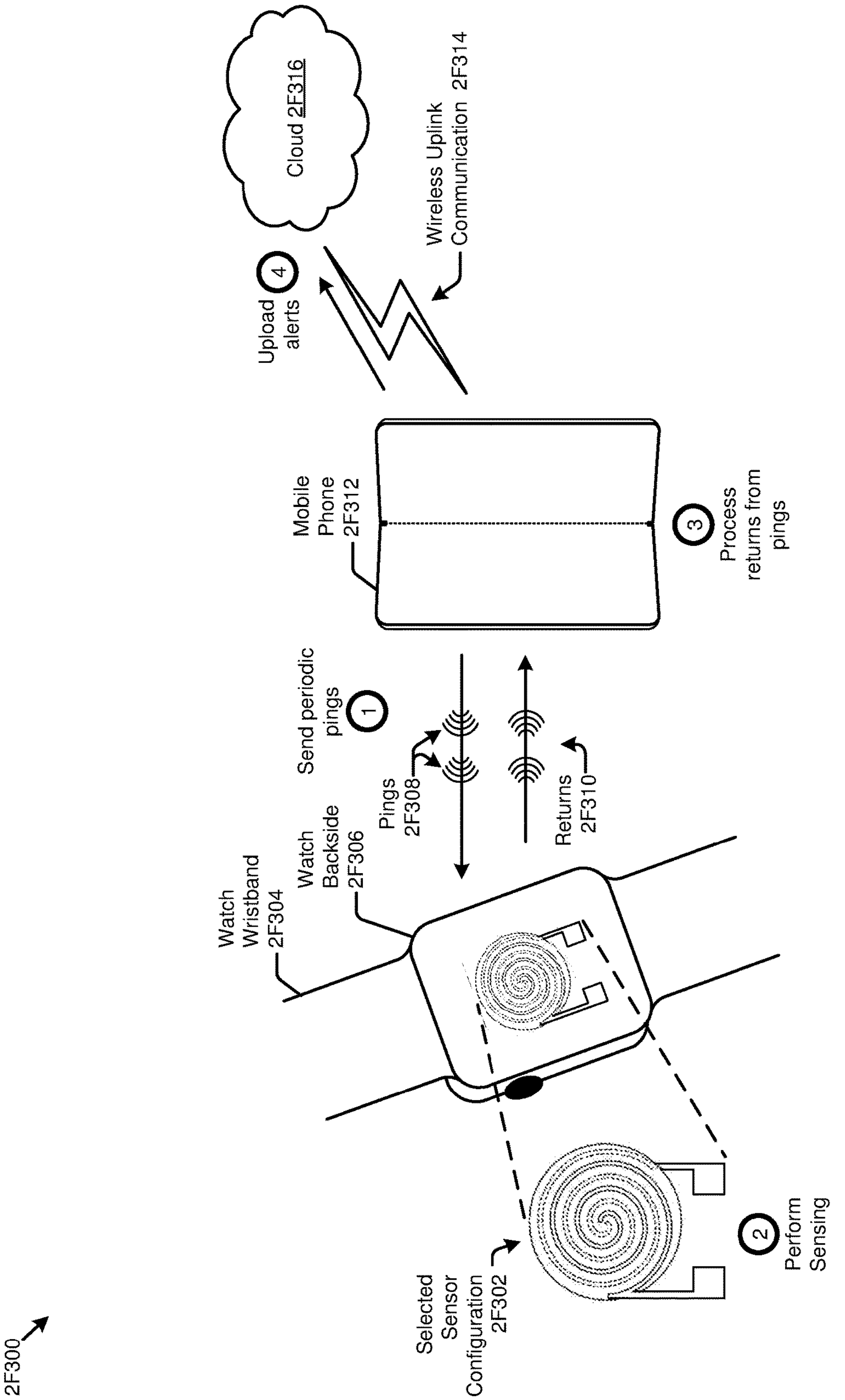
FIG. 2F3

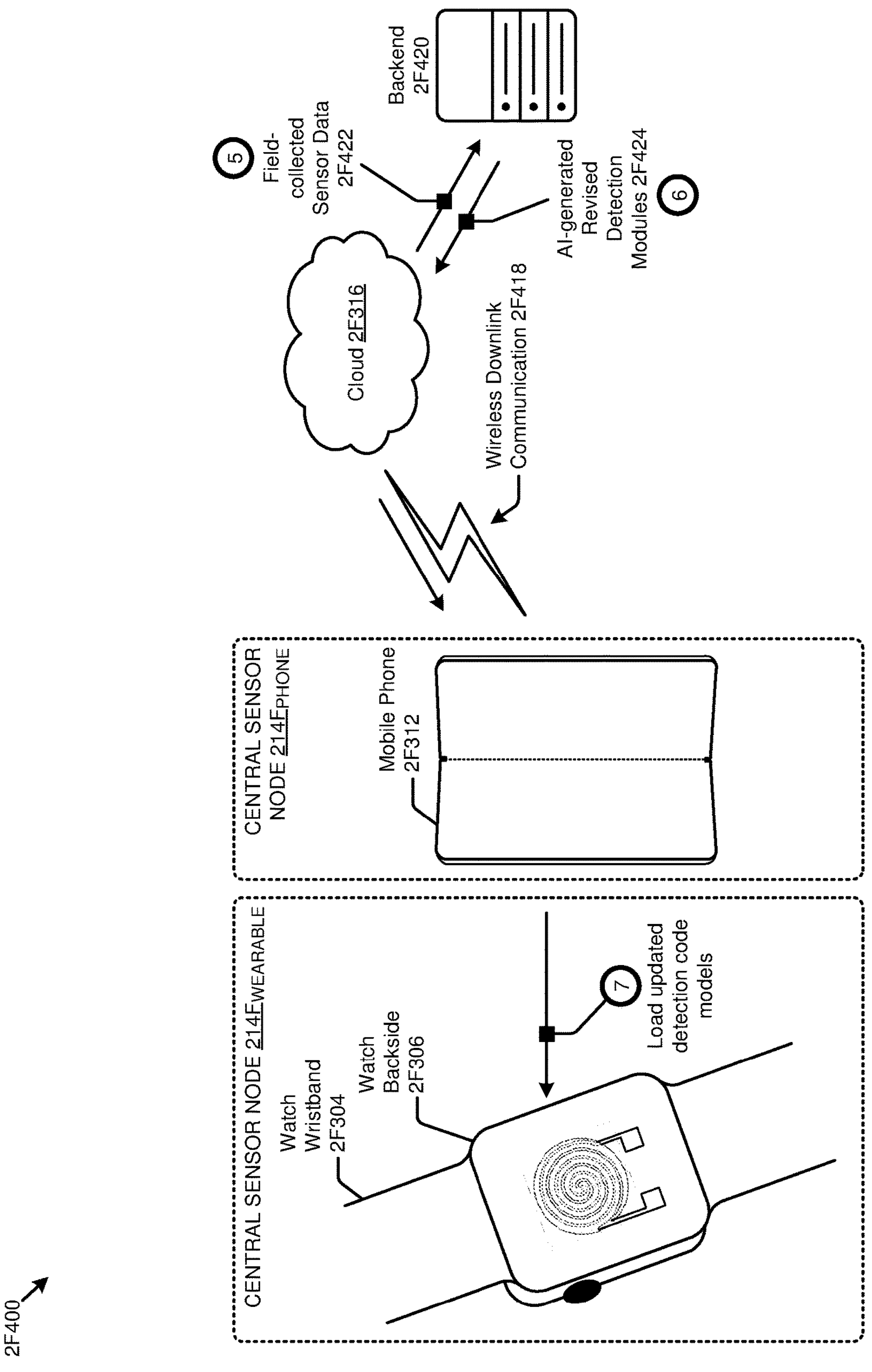
FIG. 2F4

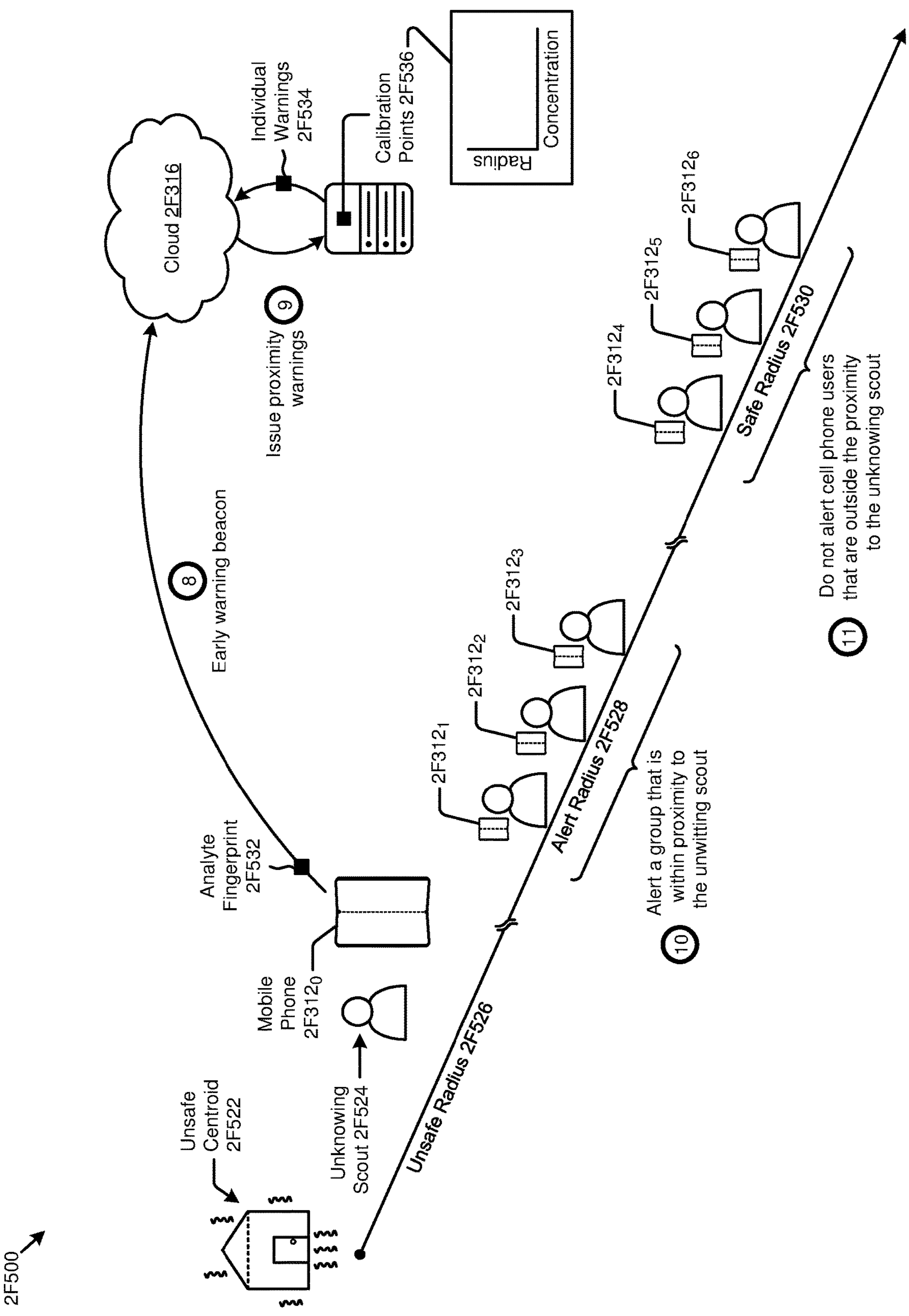
FIG. 2F5

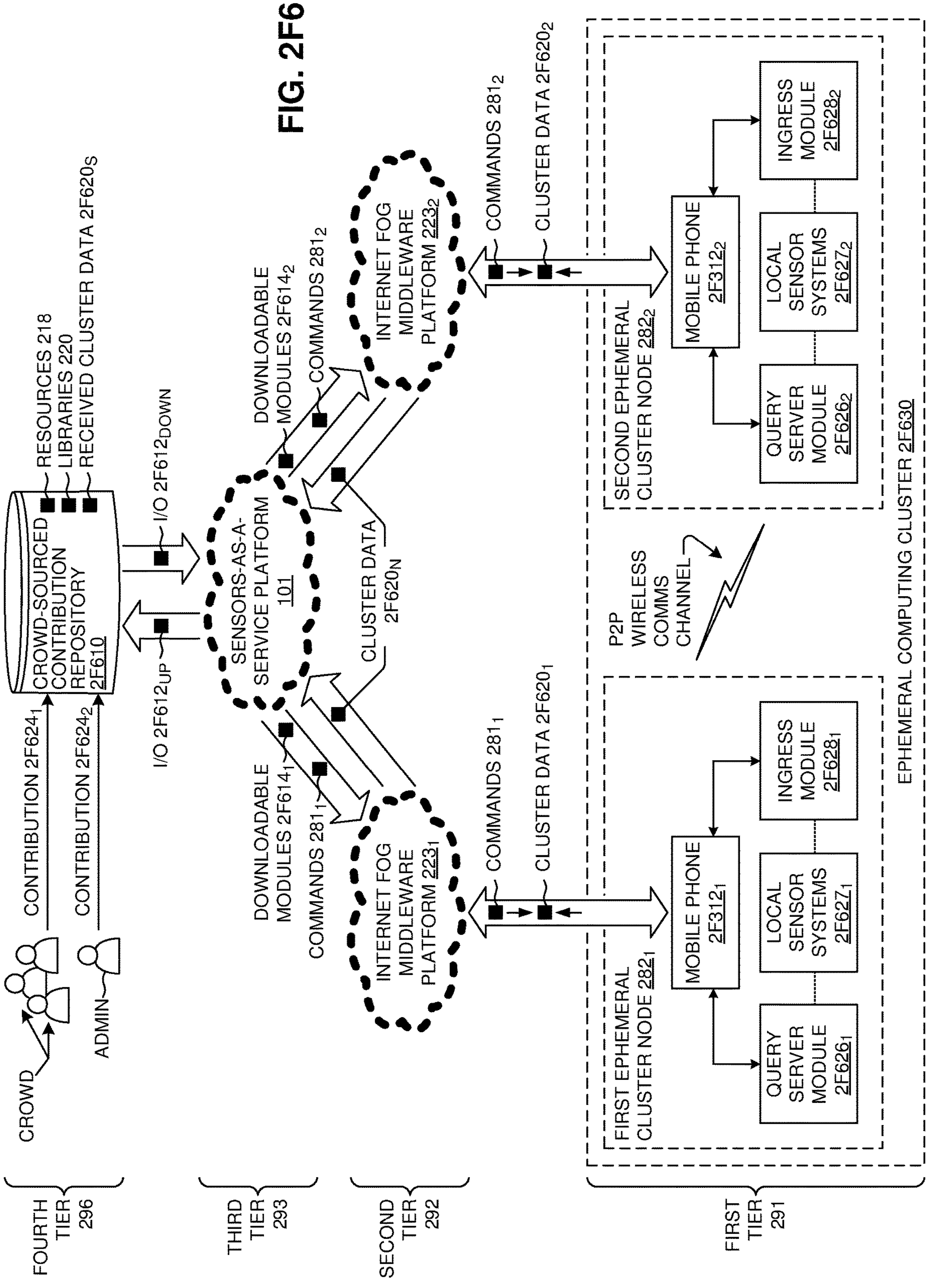
FIG. 2F6

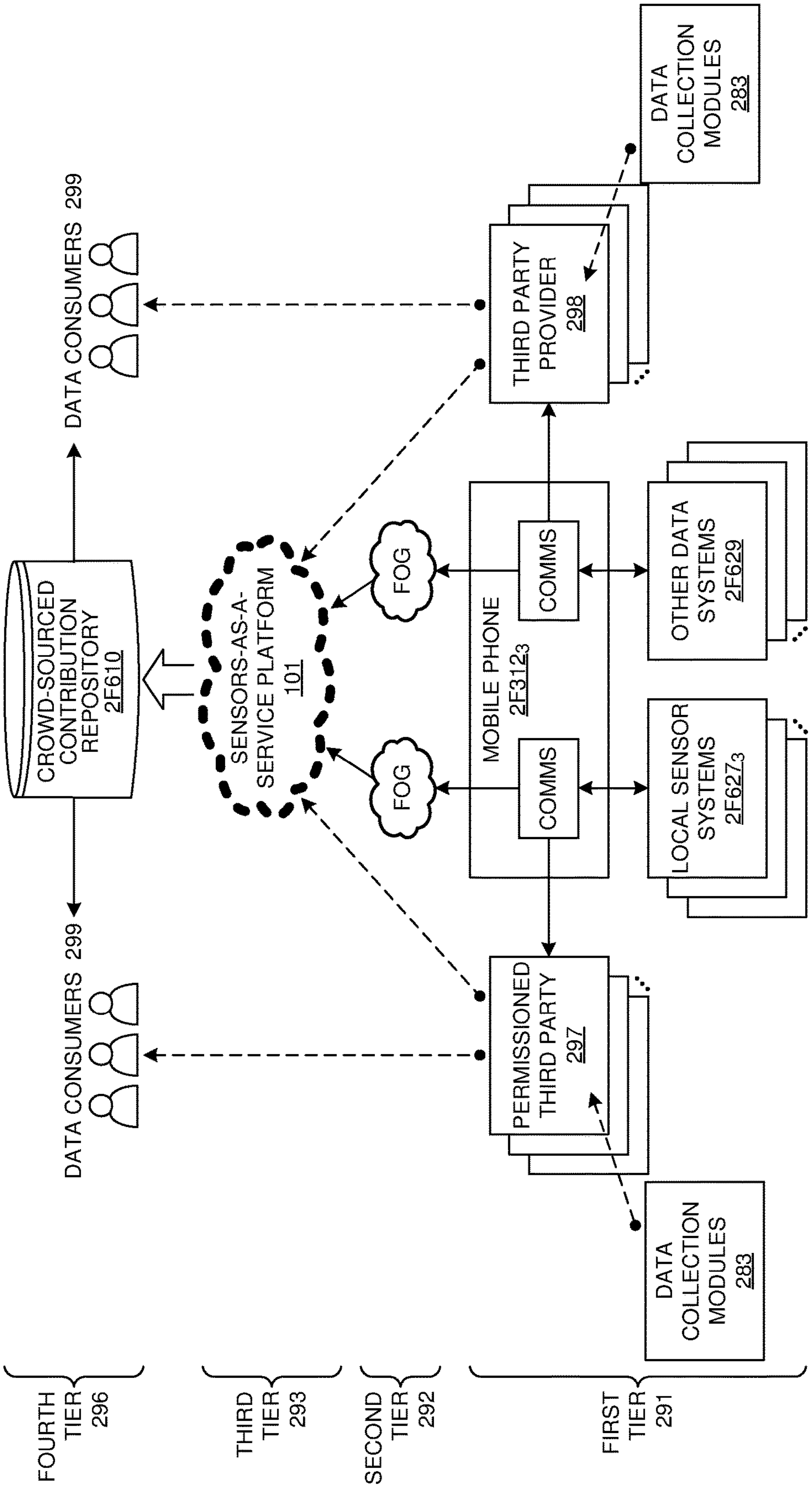
FIG. 2F7

511

515

523

525

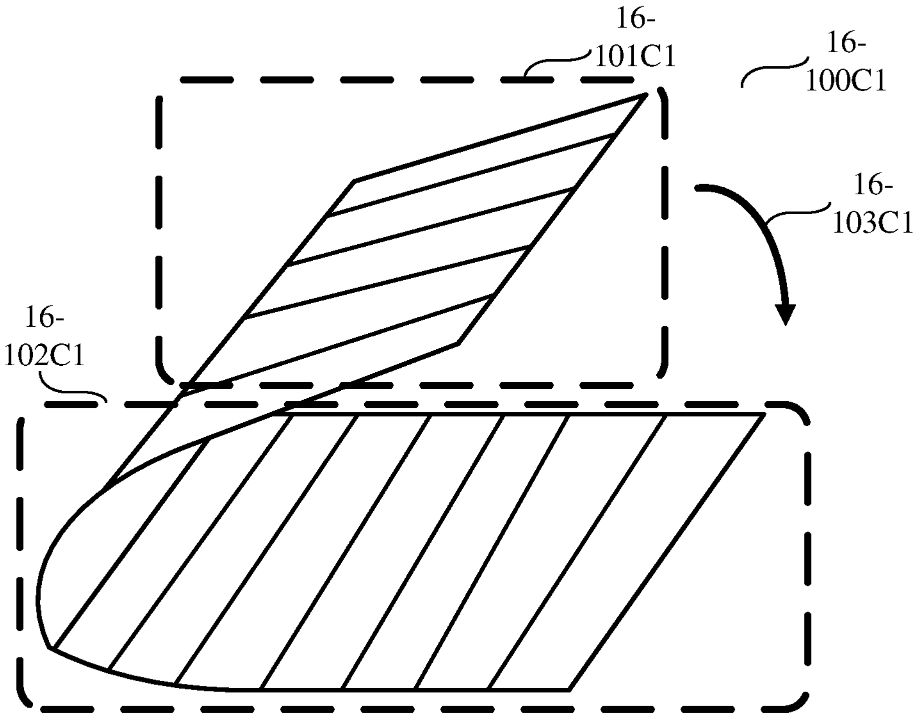
*FIG. 16-1C1*
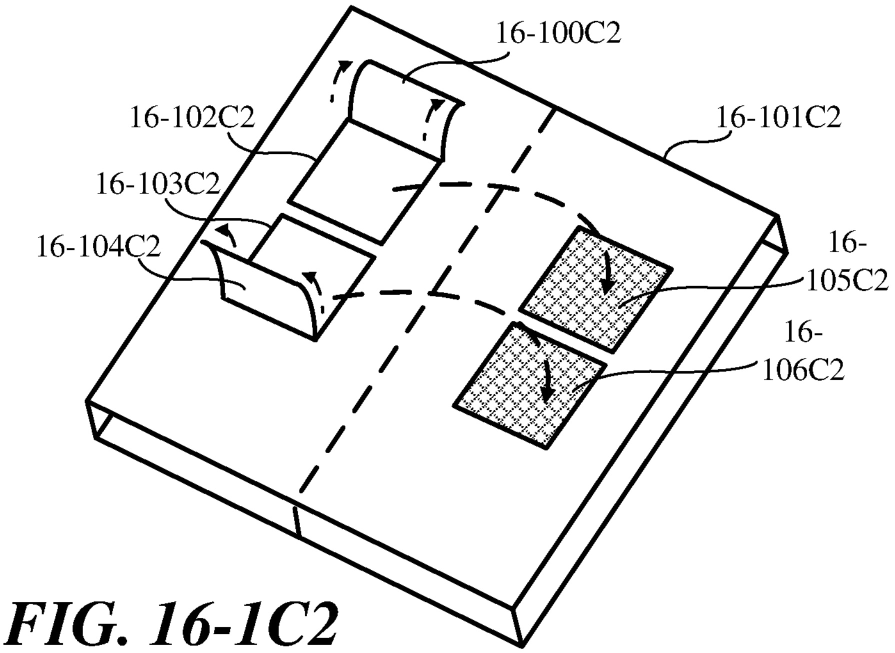
*FIG. 16-1C2*

3D Printed Battery Features 16-100D1

Stable, biodegradable components in benign, non-activated, isolated state (long storage life) prior to activation

- Dry carbon electrode with embedded conducting salt (ionic liquid)
- Active metal anode (Mg, Zn, Al, etc.) with textured surface; "interlocking" or matched (Velcro like) surface with cathode (Air and/or graphite- based), Ag/Cu chloride, MnO2, or carbon/MnO2 supercapacitor); Mg alloy serves as the anode because of its benign biological function and high theoretical capacity.
- Active cell voltage (1.5 to 3 volts)

Peel back, protective adhesive film with dual function:

- Protection of un-activated layers
- Sealing (protection) of cell and integrated electronics after activation
- Activation/release of electrolyte (ionic conductor)

Electrolyte (semi-solid and/or gel) type compound

- embedded in graphite (aqueous, low electrochemical window; 1.3 V), organic, or dry ionic liquid (4-6 V window)
- activated with hygroscopic additive or IL bound to polymer (polypyrrole) in carbon air cathode

Compatible with high volume, roll-to-roll (R2R) manufacturing (gravure/ screen print)

Process of activating battery can also provide opportunity for analyzing undesirable substance that may have been transferred to contact sensor

*FIG. 16-1D1*

3D Printed Battery Features 16-100D2

- Unique method of activation (permitting for dormant, long-term storage)
- Stable, biodegradable composite-based construction in non-activated isolated state
- Dry carbon electrode with an absorbent separator having an embedded electrically conductive salt (such as ionic liquid)
- Active metal-based anode (Mg, Zn, Al, etc.), having a textured surface area capable of interlocking with carbon-based scaffolded cathode
- Active cell voltage capabilities of ~ 3.0 V

*FIG. 16-1D2*

3D Printed Battery Features 16-100D3

Electrode fabrication (print with binder)

- Chitosan separator for aqueous (embedded chlorine nitrate is biodegradable) and ionic liquids
- Carboxymethyl cellulose (CMC) for organic electrolyte
- Current collector: metal laminated plastic with thin graphite layer to reduce contact resistance to electrode materials

Unique carbon features

- Hydrophobic/philic areas to inhibit and promote wetting and infiltration spatially across surface
- Hygroscopic: adsorption of water to activate battery
- Nanoscopic active materials, such as MnO2 or hydrogen (for cathode), can be incorporated directly onto/into the surface of nanostructured carbons.
- In such a configuration, the nanostructured carbon substrate serves a high-surface-area, 3-D current collector for a MnO2 coating (as an example), and defines the internal pore structure of the electrode, which facilitates the infiltration and rapid transport of electrolyte to a nanoscopic MnO2 phase
- Adhesion between carbon textured films to create plane fastener-like devices

*FIG. 16-1D3*

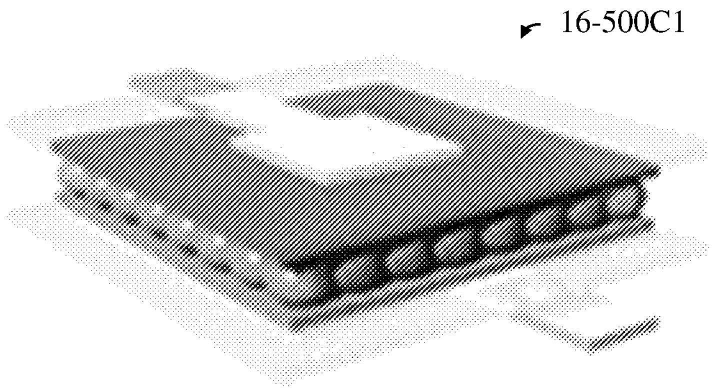
FIG. 16-5C1
Activation <u>16-500C2</u>
- Peel and stick
- Pressure (deformation of the battery stack)
  - Use of deformable *'electrolyte-containing' spheres to serve as separator and electrolyte* (rapidly diffuses into hydrophilic carbon electrode structure upon activation)
FIG. 16-5C2
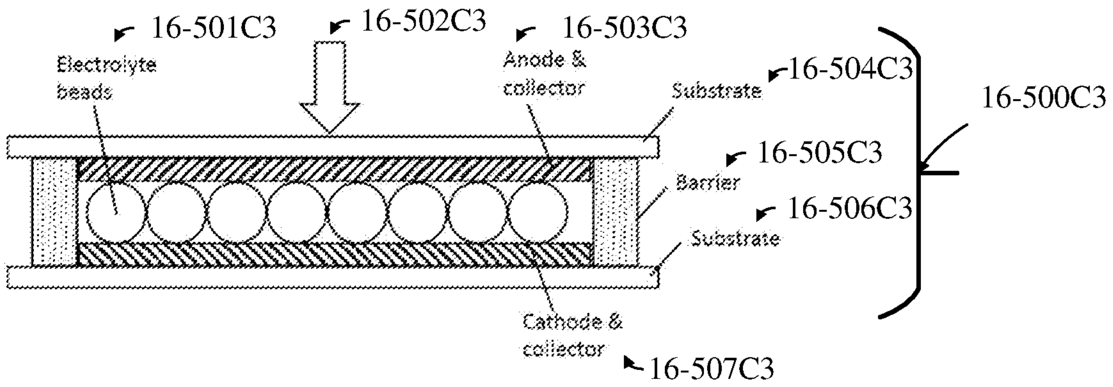
FIG. 16-5C3

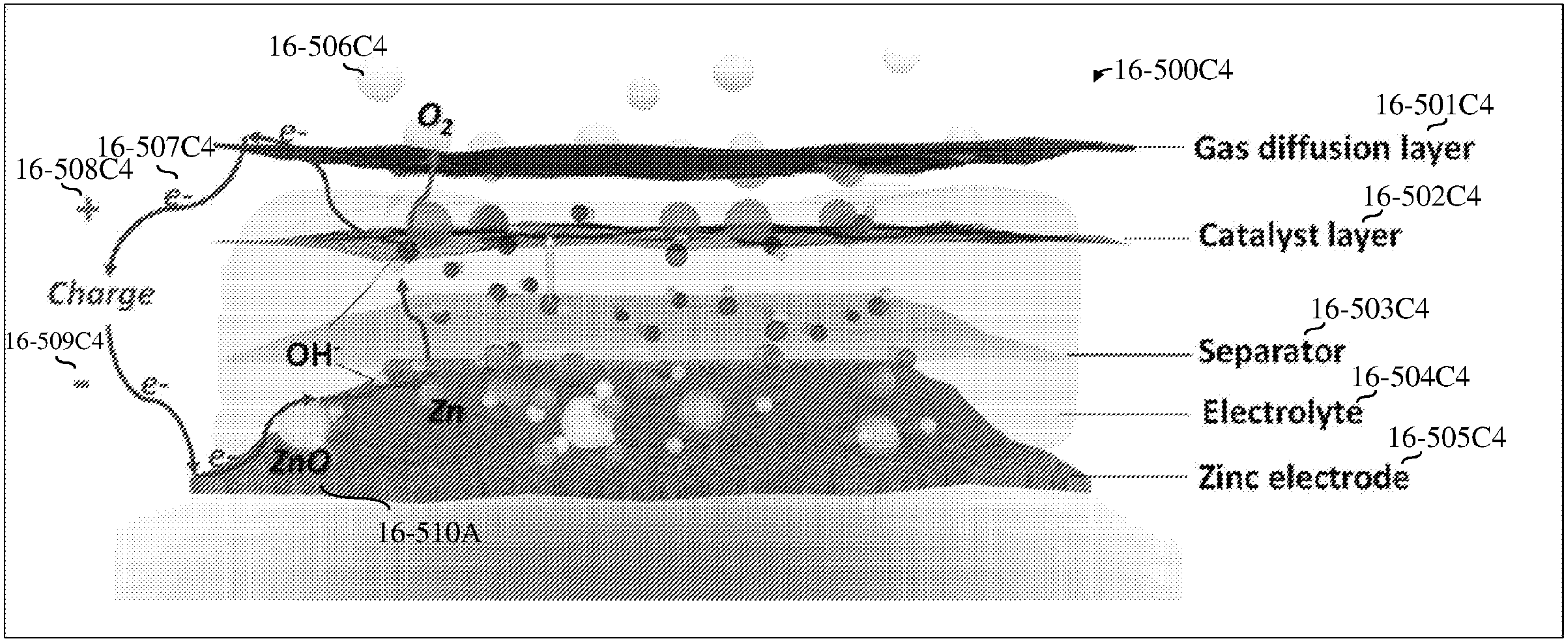
*FIG. 16-5C4*
16-500C5
16-501C5
Air (cathode) electrode reaction: $O_2 + 2H_2O^+ \rightarrow$ 4e- $4OH^-$ , $E = 0.40$V vs SHE
16-502C5
Metal (anode) electrode reaction: $Mg + 2OH^- \rightarrow MgO + H_2O + 2e^-$ , $E = -1.26$ V vs SHE
*(SHE = Standard Hydrogen Electrode)*
*FIG. 16-5C5*

3D Printed Battery Properties 16-800B

- Creation of hydrophilic and/or hydrophobic layers or patterns to promote activation
- Adhesive electrodes that are conductive, created from active materials

3D Printed Battery Advantages 16-801B

- Configurable to yield fewer layers to 3D print
- Thin film absorbent separator
- Electrodes are spreadable to cover and gaps in foldable battery structures
- Electrodes may be fabricated under substantially dry condition independent of traditional "wet" battery chemistries
- Electrodes may be carbon-based and/or include zinc, ammonium chloride and/or zinc chloride

*FIG. 16-8B*

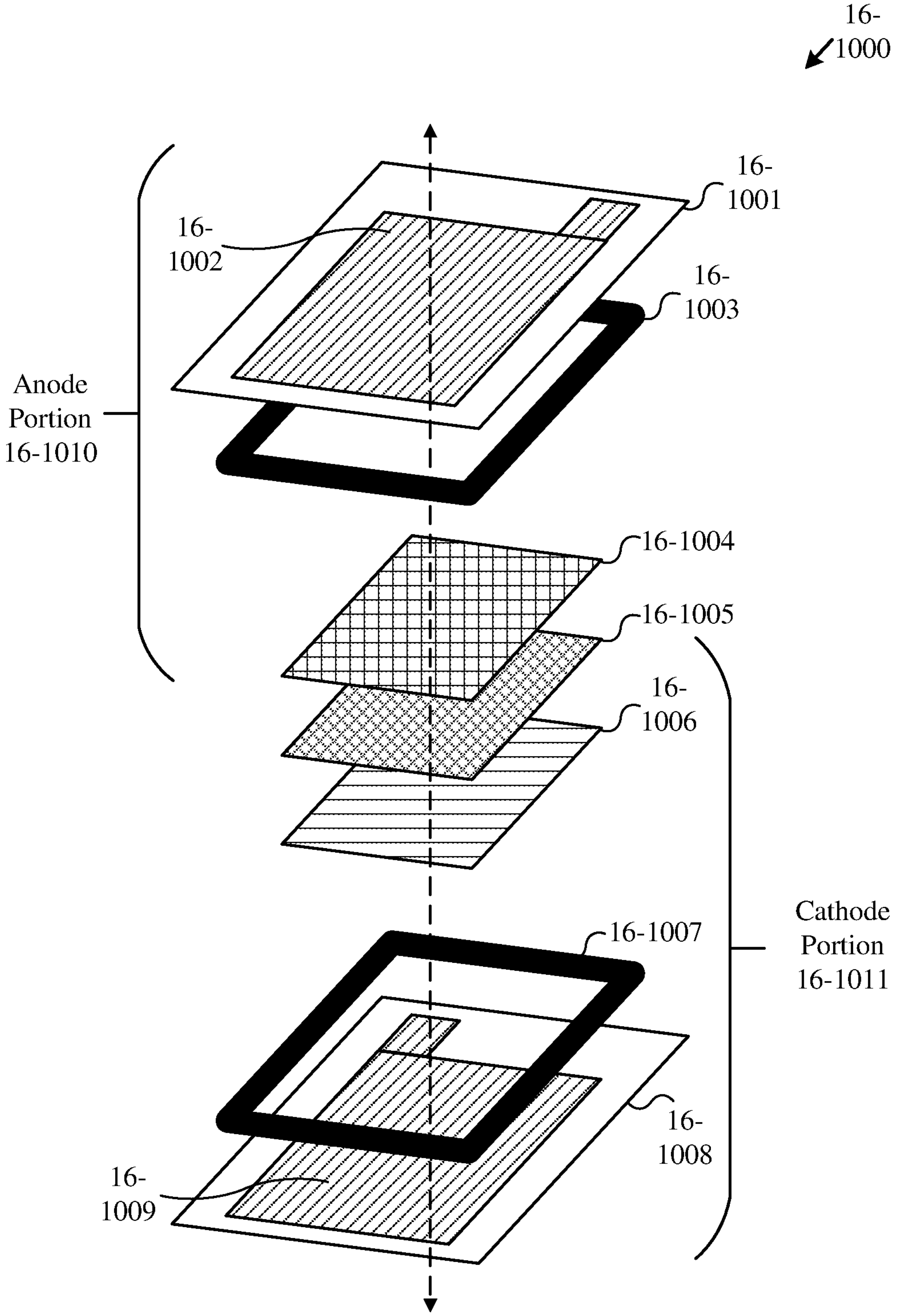
FIG.
16-10

16-1300

Plasma-Particle Slurry Cast Si Functionalized Si Anode

- *In-situ* functionalized Si anode half cell (2032)
- Fabricate/Test Si anode in Full Cell configuration (Si/LCO pouch)
- Gated energy density/lifetime performance metric (>1000 mAh/g anode @500 cycles)

Plasma-Particle Slurry Cast Functionalized S Cathode in SiSB full cell

- *In-situ* functionalized, lithiated S Cathode half cell (2032)
- Fabricate/Test S cathode in Full cell configuration (Si/S pouch)
- Gated energy density/lifetime performance metric (>500 mAh/g cathode @500 cycles)
- Conditioning/assembly protocol

Limited Production of Particle SiSB

- Productization design/process optimization/application review for scale-up
- System level development (serial/parallel module design, integration, and testing)
- Gated energy density/lifetime performance metric (>350 Wh/kg @ 500 cycles)
- Fabricate/test/optimize limited number of SiSB cells in 18650 cell configuration
- Environmental Test/Validation: Temperature, Shock, Vibration, Humidity

Monolithically integrated, functionalized 'graphene' electrodes

- Establish microwave reactor material-process-property correlations on web coater
- Deposition conditions for conductive 'seed' layer (i.e., current collector)
- Deposition conditions for integrated current collector/electrode film/foil
- Fabricate/Test functionalized 'graphene' Si anode in half cell and full Si/LCO cell configurations
- Fabricate/Test functionalized 'graphene' S cathode in half cell and full Si/lithiated S cell configurations

*FIG. 16-13*

16-1400

*Integrated SENsor Tag (INSENT)*

- Functional Breadboard with IS Sensor
- Miniaturized Phase I Breadboard w/Telemetry
- Disposable Tag/Label System
- Fully Integrated Smart Package

*FIG. 16-14*

16-1500

Batteries and Sensors

- Additional level of information in package tracking and screening; especially at edges
- Edges of the distribution/shipping network represent higher levels of ‘touch points” and correspondingly higher costs of ownership
- Reliable, lower cost, autonomous (self-powered, wireless), multi-functional (reconfigurable) Internet-of-Things (IoT) label/tag system for the edges of the distribution system/network
    - Universal, safe, reliable power source across entire network
    - Software definable sensors with low false positives for monitoring controlled (regulated) and uncontrolled (“bad”) shipments

*FIG. 16-15*

16-1600

*Universal Power Unit*

Energy construct (meta-particle/monolith) across multiple configurations, from:

- Single use, throw away Iot labels (printed),
- Self-contained, portable electronics; *i.e,* TRON/ULD (pouch)
- Transport vehicles; i.e., tugs, delivery vans and trucks
- Aircraft

Safe, reliable, universal energy solution that can be platform/application agnostic

- Drop Box
- Office/Shipping centers
- Delivery Trucks

*FIG. 16-16*

16-1700

Secondary (Rechargeable) Solution

A fully *stable*, reversible, 'solid state' ion shuttle process across battery electrodes - *stability* equates to *lifetime,* *and* *safety*

Unique Meta-Material: Si-S-C chemistry with lithium ion conduction

- High theoretical material capacities four to five times beyond current state-of-art, lithium oxide chemistries; High rate capability (for charge/ discharge)
- No 'elemental' lithium; overcomes weight limitations with respect to Li power supplies in commercial shipments (ground and airborne)
- Stable, 'solid state' interfaces; not self-limited to < 800 cycles as in current SOA Li-ion

Low Unit Cost

- Electrodes (with meta-particles) producible using conventional slurry cast process
- Electrodes monolithically integrated with current collector for reductions in manufacturing cost

Performance: Low cost of ownership

- Scalable, low manufacturing unit cost
- Reliable, long life for low touch of components in the field
- Stability, capacity, and rechargeability of construct in direct alignment with low power management architecture to enable broad utilization in airborne applications

*FIG. 16-17*

16-1800

*Ideal Goal:* *Integrated SENsor Tag (INSENT)*

Comprehensive screening protocol at "touch points" at the edges of the shipping network:

- For both regulated substances that are controlled and handled with specific protocols to "bad" substances that are a threat and difficult to control

Low cost (cost of ownership) sensor for detecting vapors from deleterious substances

- Specific selectivity, sensitivity, false positive, and sampling rate/reset requirements
- Low profile form factor compatible with wireless package platform
- Readily and easily integrated into package
- Selective gas detection in the presence of high levels of interference

*FIG. 16-18*

16-1900A 16-1900B 16-2000A 16-2000B 16-2200

| Family | Name |
|---|---|
| Metallocenes | Ferrocene |
| | Cobaltacene |
| | Ferrocenium |
| | Cp*2Fe(II) |
| Chelatases | Iron porphine |
| | Vitamin B12 |
| Coordination compounds | Ru(Bipy)3 |
| | dicyanobis(ethylenediamine)cadmium(II) |
| Organics | NADH |
| | Tetracyanoquinodimethane |
| | Tetramethyl-p-phenyldiamine |
| | Cyanocobalamin |
| | Tetrathiafulvalene |
| Polymers | TEMPO |
| | PTMA |
| | PVFCN |

*FIG. 16-22*

| D:G | 2D:G | La (nm) | Lc, A | # of layers | La, A |
|---|---|---|---|---|---|
| 0.25 ± 0.03 | 0.9 ± 0.05 | 51.52 ± 12.48 | 40.75 | 11.76 | 155.06 |

17-900

17-1200

17-1300

17-1400A 17-1600E 17-1602E

Determine one or more of a presence, an absence, or concentration of the target analyte based on changes in the electric current.

*Figure 17-16E*

17-1600F 17-1602F

Detect a change in the electric current at a particular bias voltage applied by the immersed gate electrode.

*Figure 17-16F*

17-1600G 17-1602G

Define a region of operation for the biosensor based on the target analyte.

*Figure 17-16G*

17-1600H 17-1602H

Detect the presence of the target analyte in a liquid environment having an ionic salt concentration exceeding 100 millimolar (mM).

*Figure 17-16H*

17-1600I 17-1602I

Block fluid communication between the external environment and each of a source region and a drain region of the BioFET.

*Figure 17-16I*

17-1700G 17-1702G

Deposit thermal oxide onto the p-type silicon wafer.

*Figure 17-17G*

17-1700H 17-1702H

Coat the p-type silicon wafer with the carbonaceous dispersion.

*Figure 17-17H*

17-1700I 17-1702I

Apply a piranha solution including a 3:1 mixture of sulfuric acid ($H_2SO_4$) and hydrogen peroxide ($H_2O_2$) to remove any organic residue on exposed surfaces of one or more of the carbonaceous dispersion or the p-type silicon wafer.

*Figure 17-17I*

17-1700U 17-1702U

Stack biomolecules on exposed surfaces of the 3D graphene.

*Figure 17-17U*

17-1700V 17-1702V

Yield carboxylic acids on exposed surfaces of the carbonaceous dispersion.

17-1704V

React carboxylic acids with amines from bioreceptors in the carbonaceous dispersion using EDC (1-ethyl-3-(3-dimethylaminopropyl)carbodiimide hydrochloride) and sulfo-NHS (*N*-hydroxysulfosuccinimide).

*Figure 17-17V*

*Not Drawn to Scale 18-300

18-301

18-1400

Key Features 18-1500B

- Top electrode (18-850) formed by optically-transparent conductors (conductive but no Ag)
- Patterned micro-cups/microcapsules/recessed regions (18-935)
- Solvent-resistant layers (first electrode layer 18-820, second electrode layer 18-850)
- All transparent components made with carbon-containing materials (such as the carbon matrix 18-830)

*FIG. 18-15B*

19-1000A

| Sensor | Carbon Recipe | TATP (10ppm) | DNT (200ppb) | $H_2S$ (10 ppm) | Toluene (188 ppm) | Ammonia (62 ppm) | Ethanol (775 ppm) | Acetone (1000 ppm) | DMF (10 ppm) | Ethyl Acetate (400 ppm) |
|---|---|---|---|---|---|---|---|---|---|---|
| 1 | Cobalt Oxide ($Co_2O3$) decorated CNO | 9.262 | -1.196 | -2.290 | -1.573 | -4.200 | -1.193 | -0.73535 | -0.734 | -0.915 |
| 2 | Thermogravi-metric Jet-Milled (TG-JM) | 1.810 | -2.471 | 0.711 | -0.757 | -1.912 | -0.639 | -0.4782 | -3.445 | -3.386 |
| 3 | Silver (Ag) decorated DXR | -6.105 | -4.0791 | -1.007 | -6.459 | -16.398 | -5.380 | -5.97174 | -6.327 | -1.464 |
| 4 | Undecorated Carbon Nano-Onions (CNOs) | 0.0183 | -3.478 | -6.740 | 0.093 | -0.264 | -2.666 | -0.59074 | -0.741 | -0.375 |
| 5 | Iron Oxide ($Fe_2O3$) decorated DXR | 0.685 | 0.953 | 0.388 | 1.261 | 0.523 | -0.008 | 0.095819 | 0.090 | -0.283 |
| 6 | Platinum (Pt) decorated DXR | -0.334 | 0.272 | 0.952 | 0.198 | -1.123 | -1.050 | -0.72308 | -0.198 | -0.156 |
| 7 | Palladium (Pd) Decorated Anvel (A25) | -0.589 | -0.193 | 1.736 | -0.297 | -0.980 | -0.469 | -0.49391 | -0.437 | -0.369 |
| 8 | Amine Functionalized TG-JM | -0.109 | -0.076 | 2.091 | -1.093 | -0.295 | -0.690 | -0.91877 | -0.454 | -0.646 |

*Figure 19-10A*

19-1000B

| Sensor No. | Corresponding Carbon Recipe |
|---|---|
| 1 | Carbon #29 |
| 2 | TG JM (thermal graphene jet milled; thermal reactor carbon unfunctionalized) |
| 3 | Carbon #19 |
| 4 | CNO (carbon nanoonion; thermal reactor carbon unfunctionalized) |
| 5 | Carbon #16 |
| 6 | Carbon #1 (may alternatively be Pt-anvel) |
| 7 | Carbon #6 |
| 8 | 1,3-diaminonaphthalene complexed to TG-JM (this is an organically modified carbon). |

*Figure 19-10B*

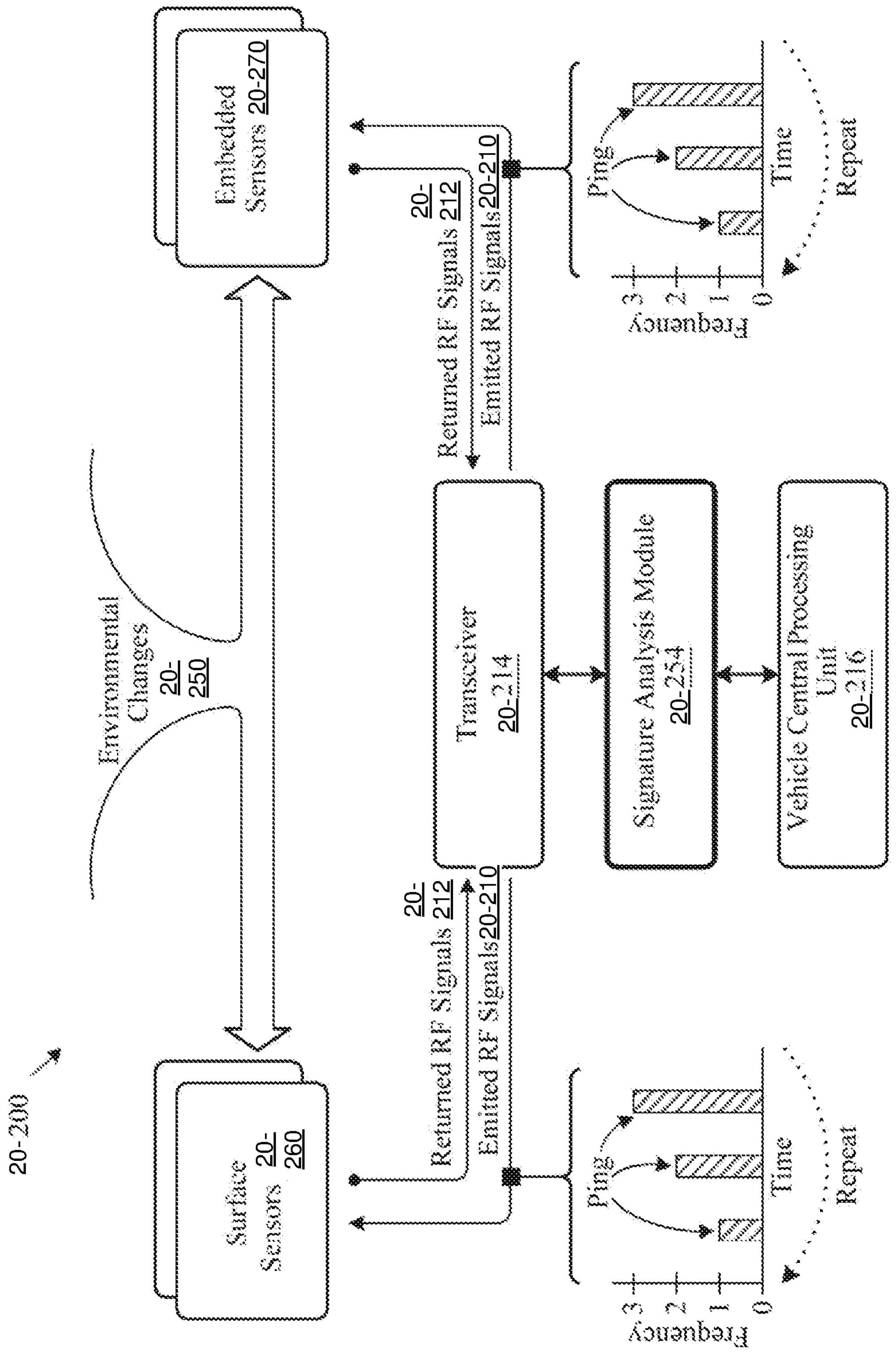
*Figure* 20-2

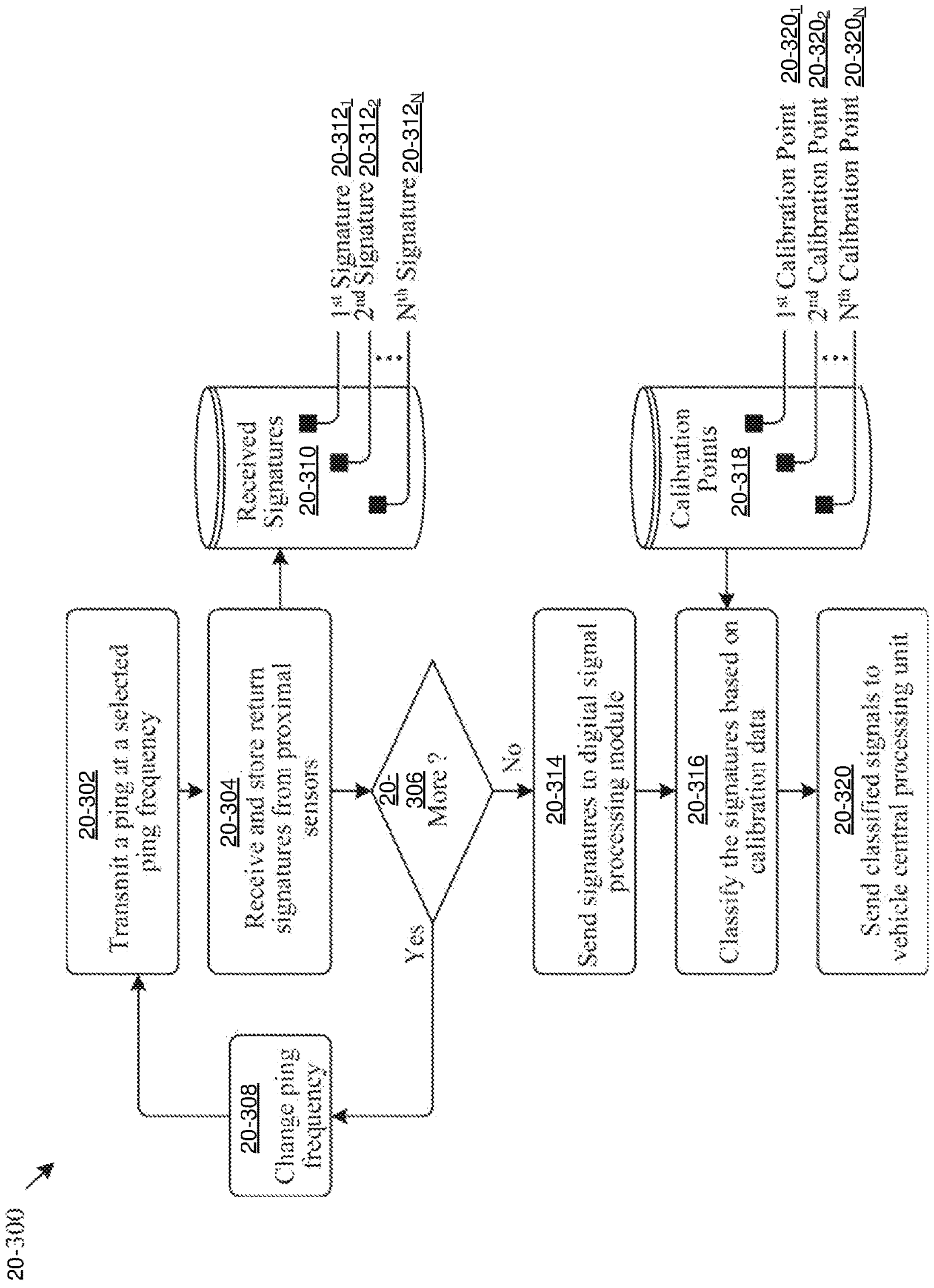
*Figure* 20-3

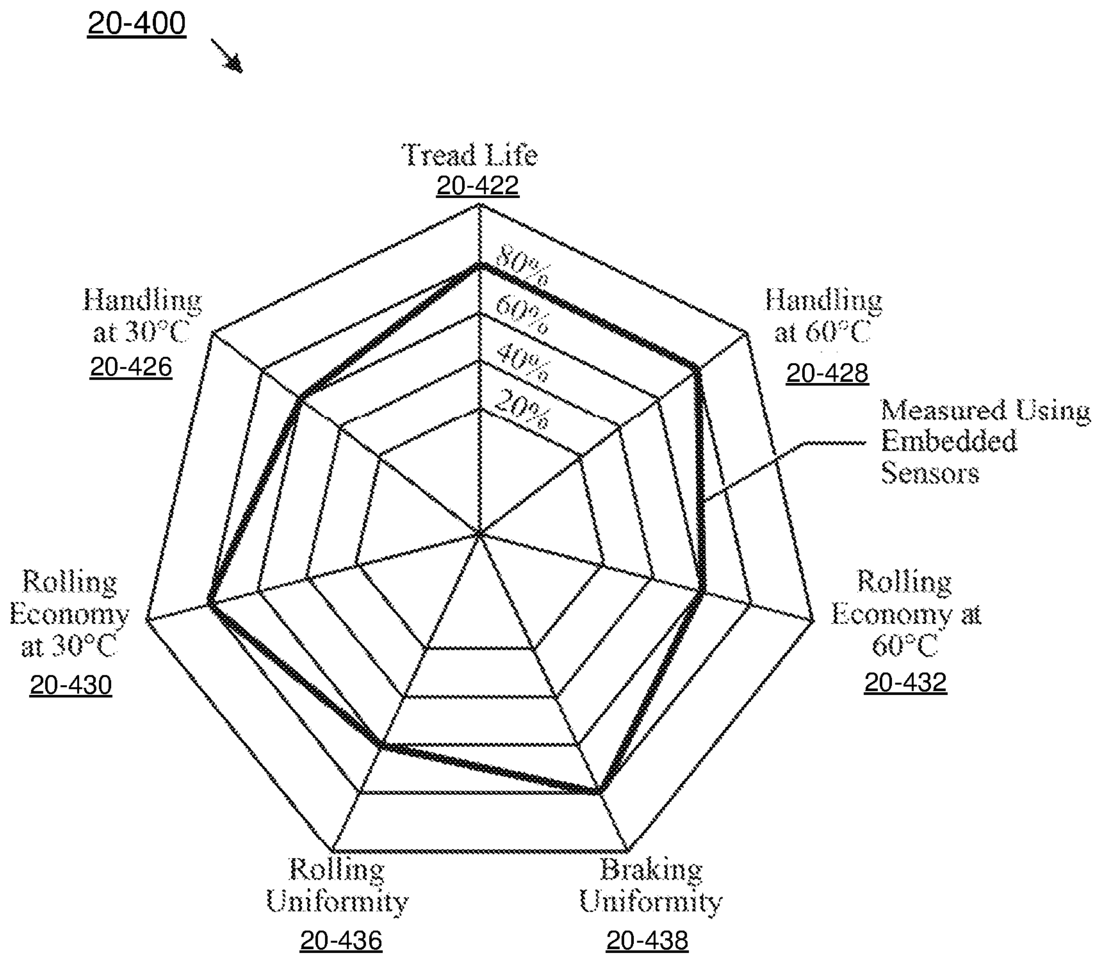
*Figure* 20-4

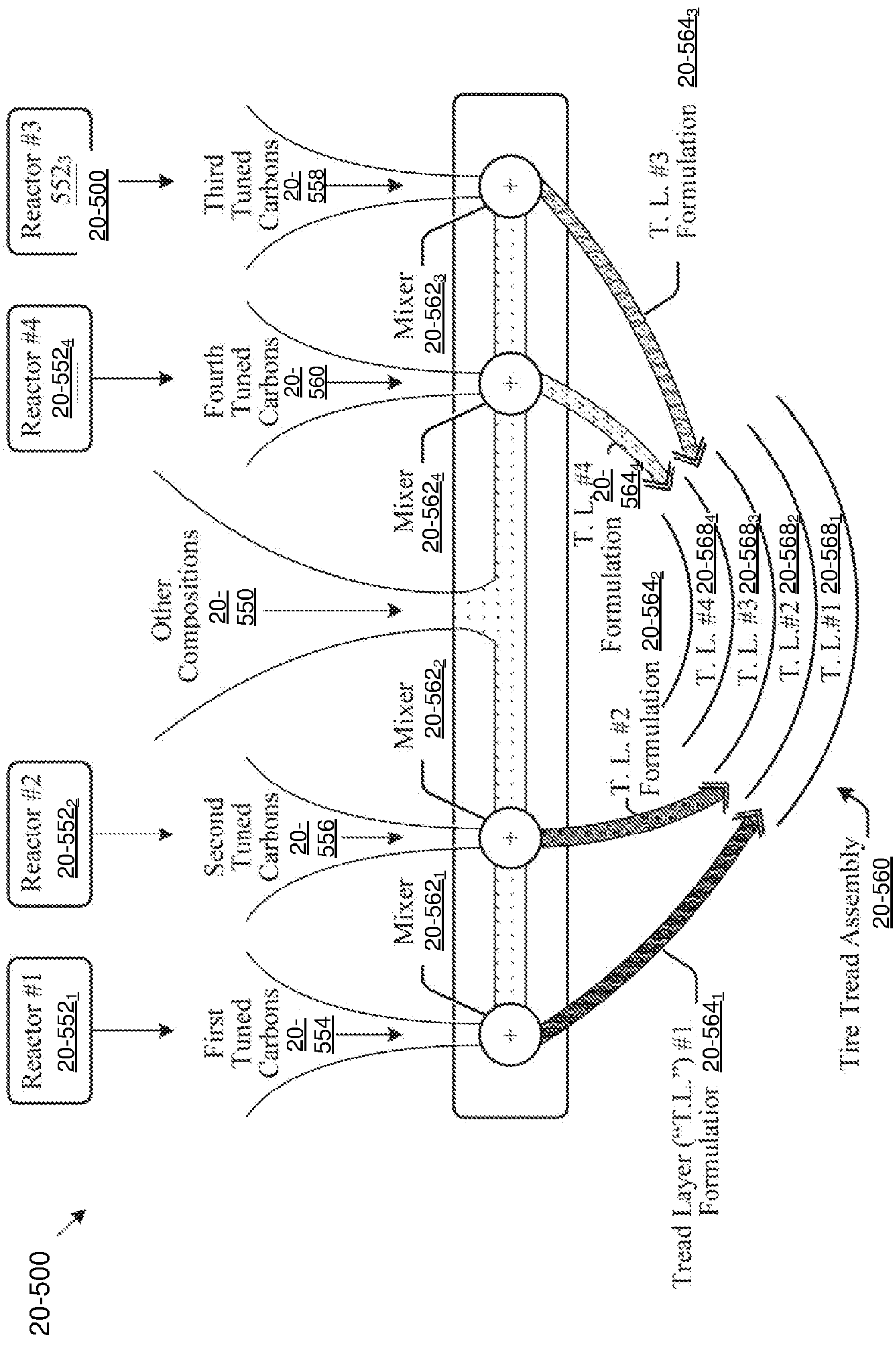
*Figure* 20-5

20-800
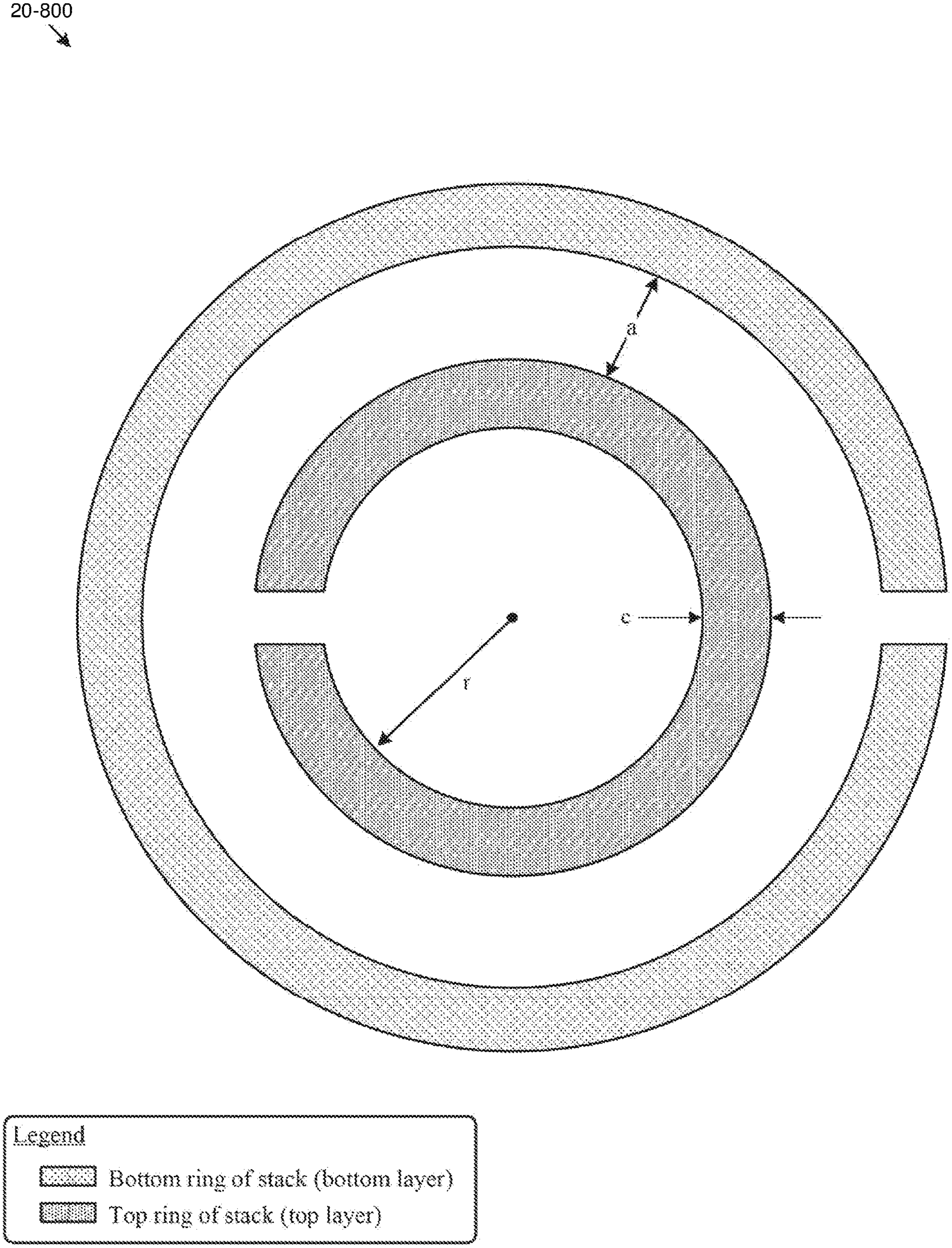
*Figure* 20-8

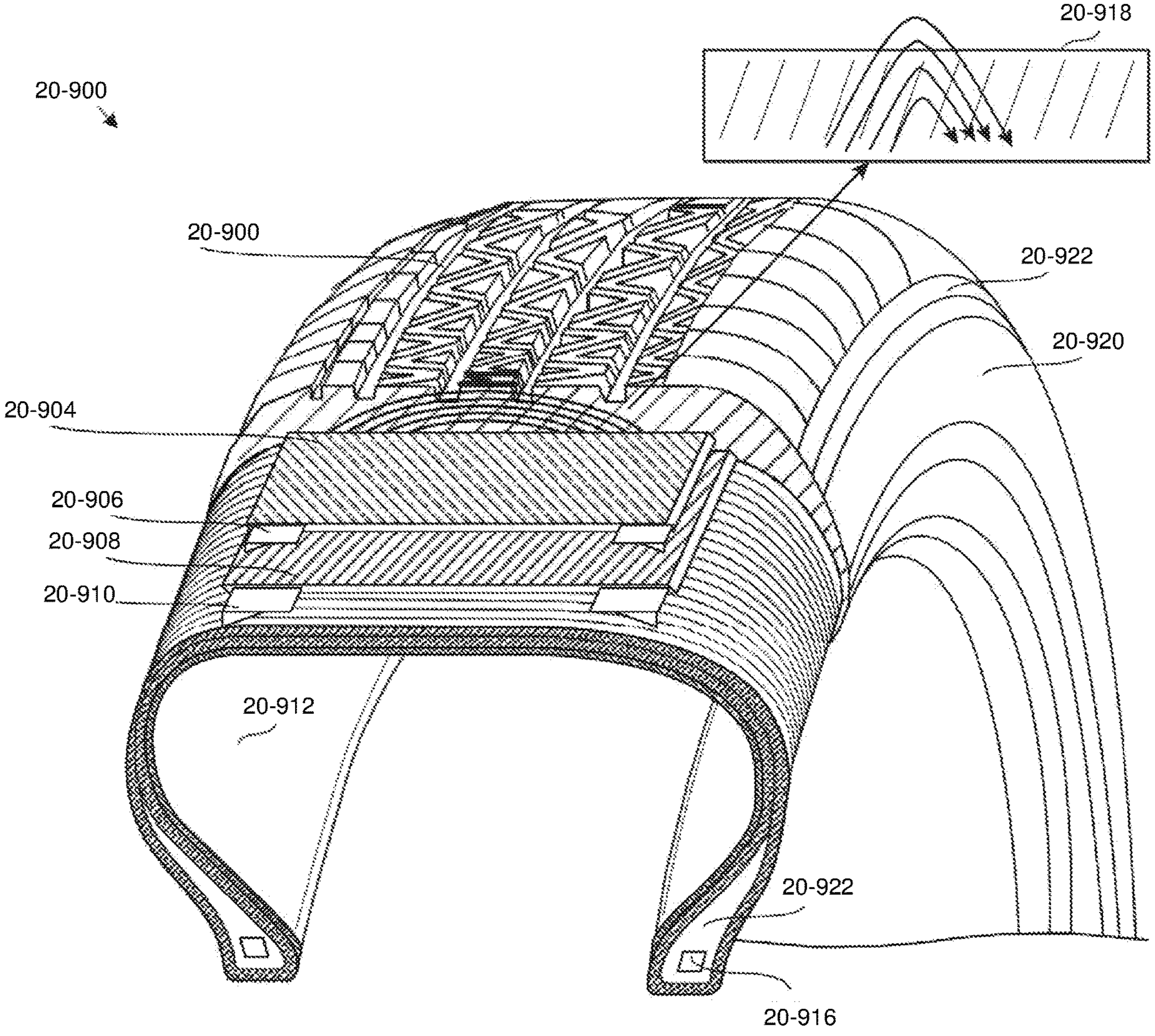
*Figure* 20-9

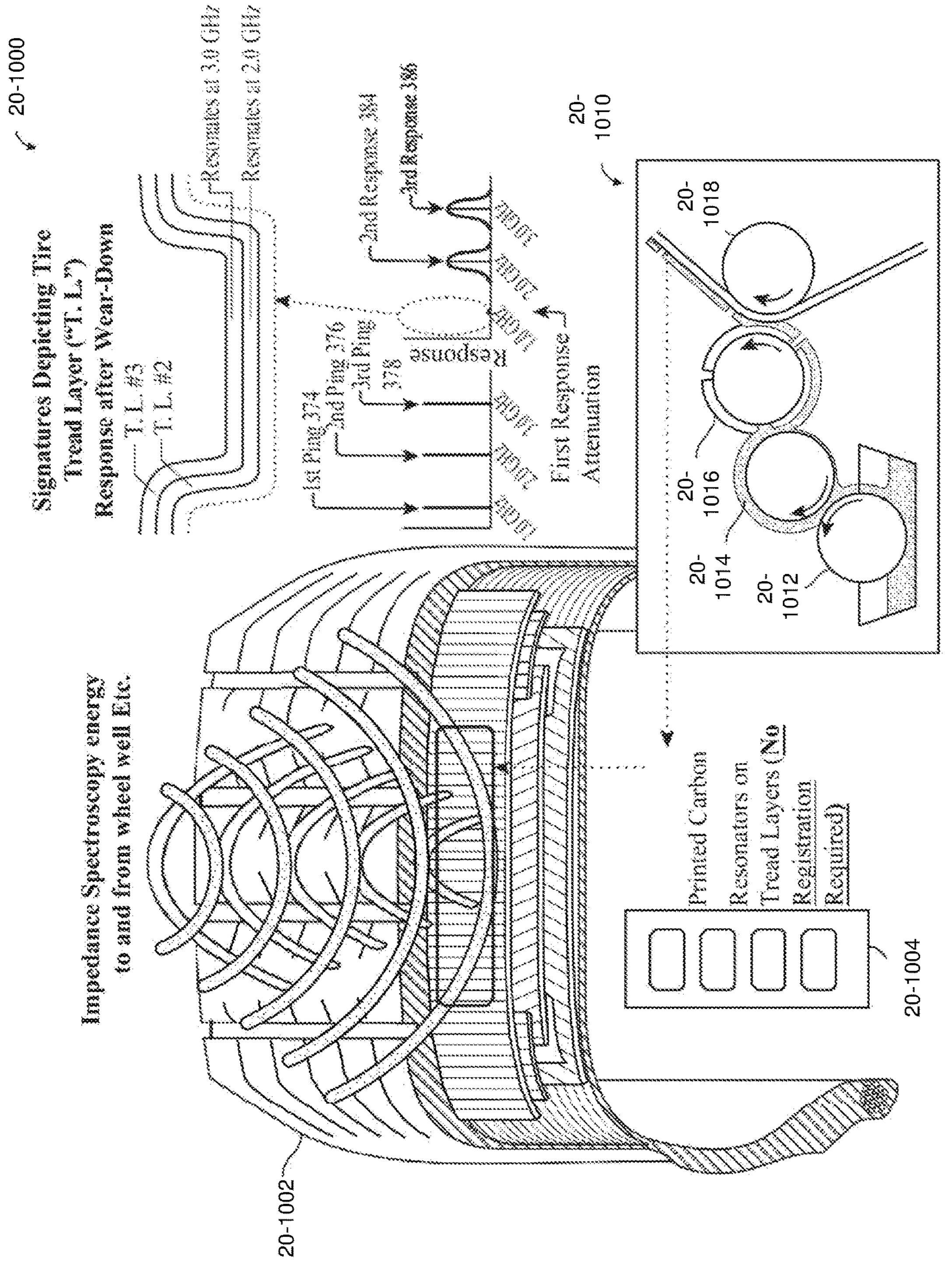
*Figure* 20-10

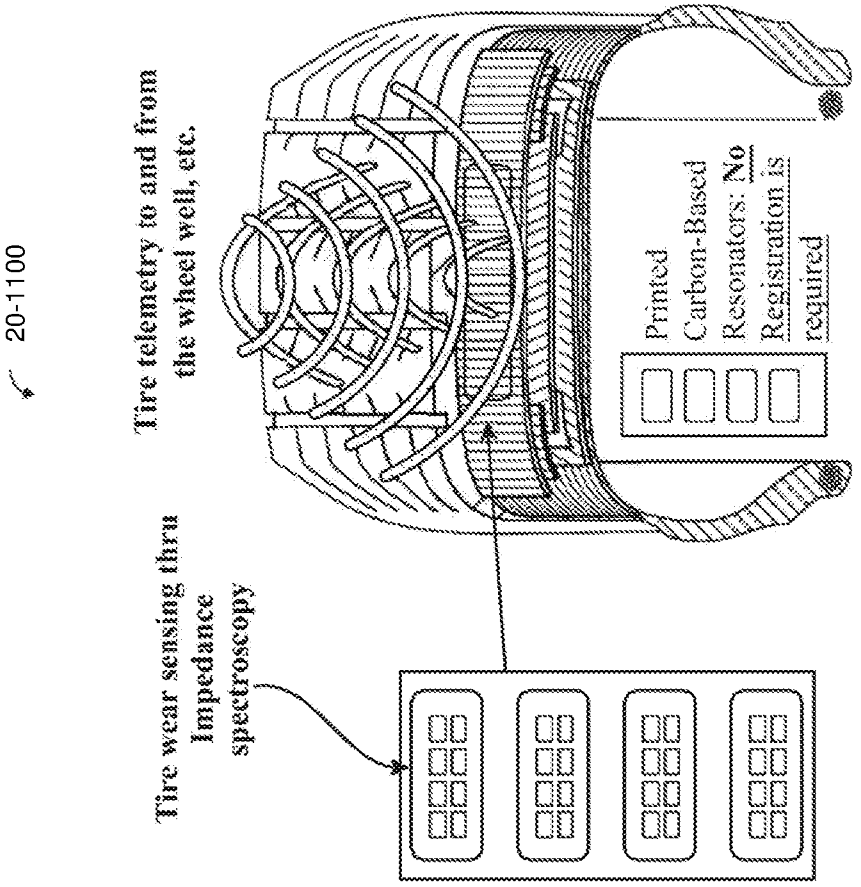
*Figure* 20-11

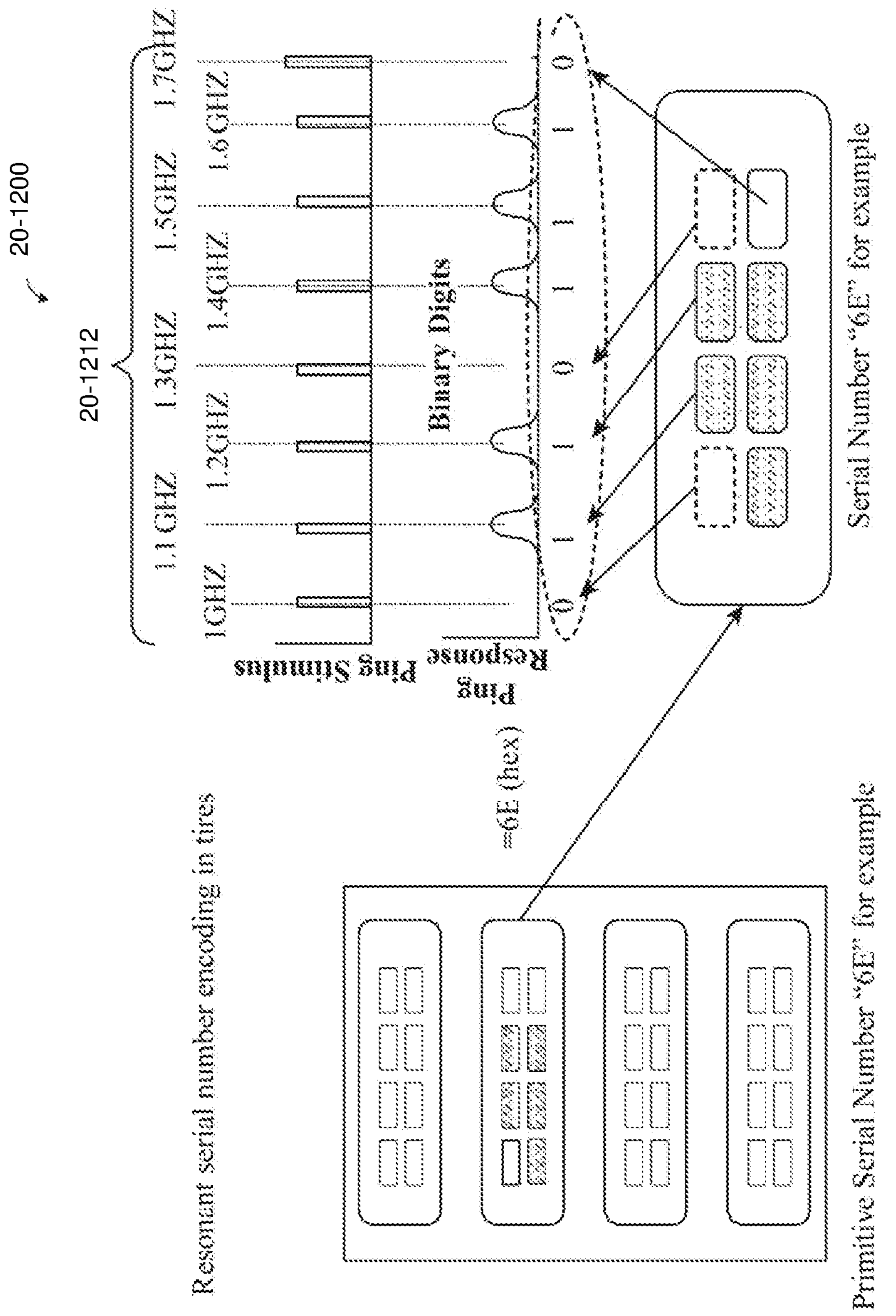
*Figure* 20-12

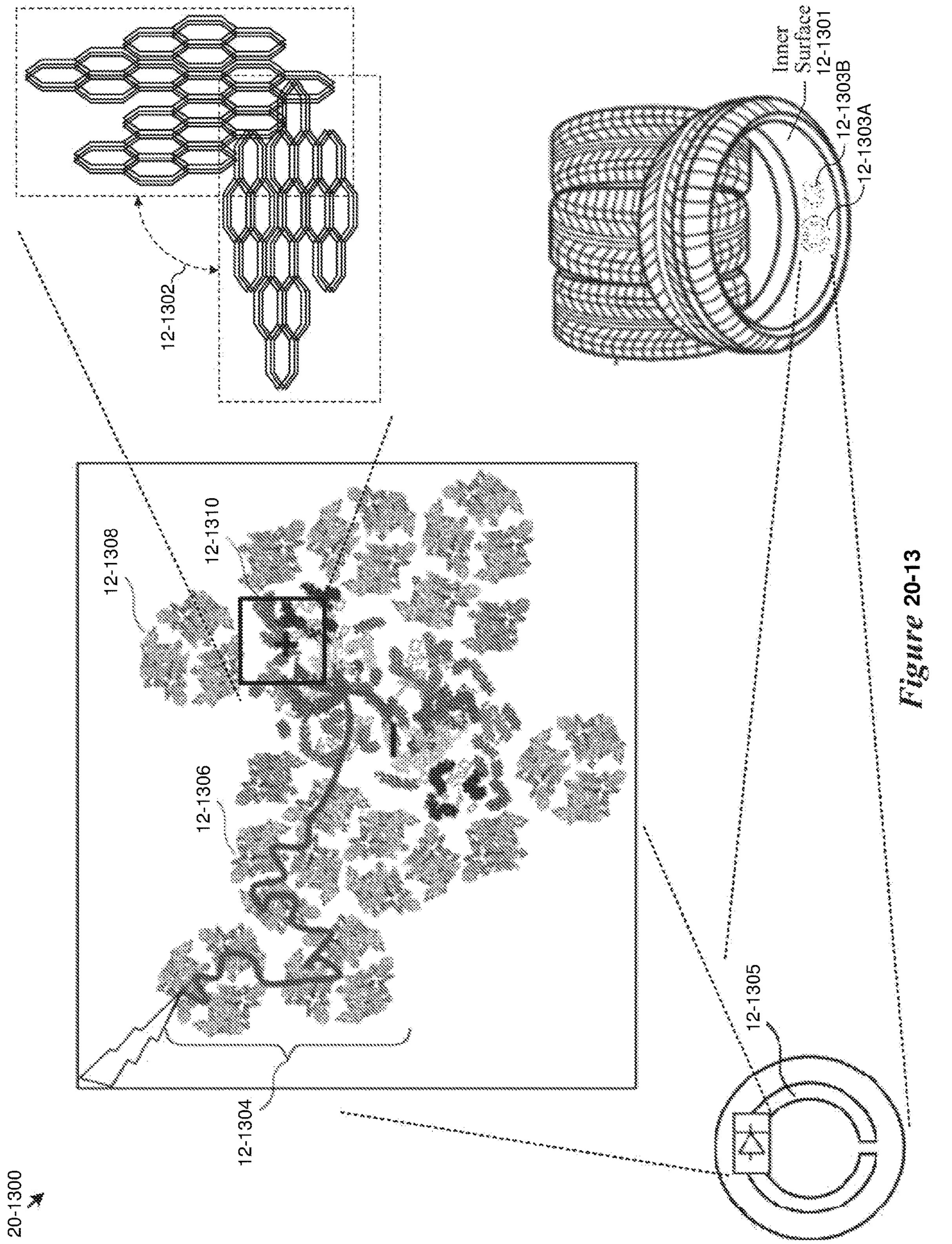
*Figure* 20-13

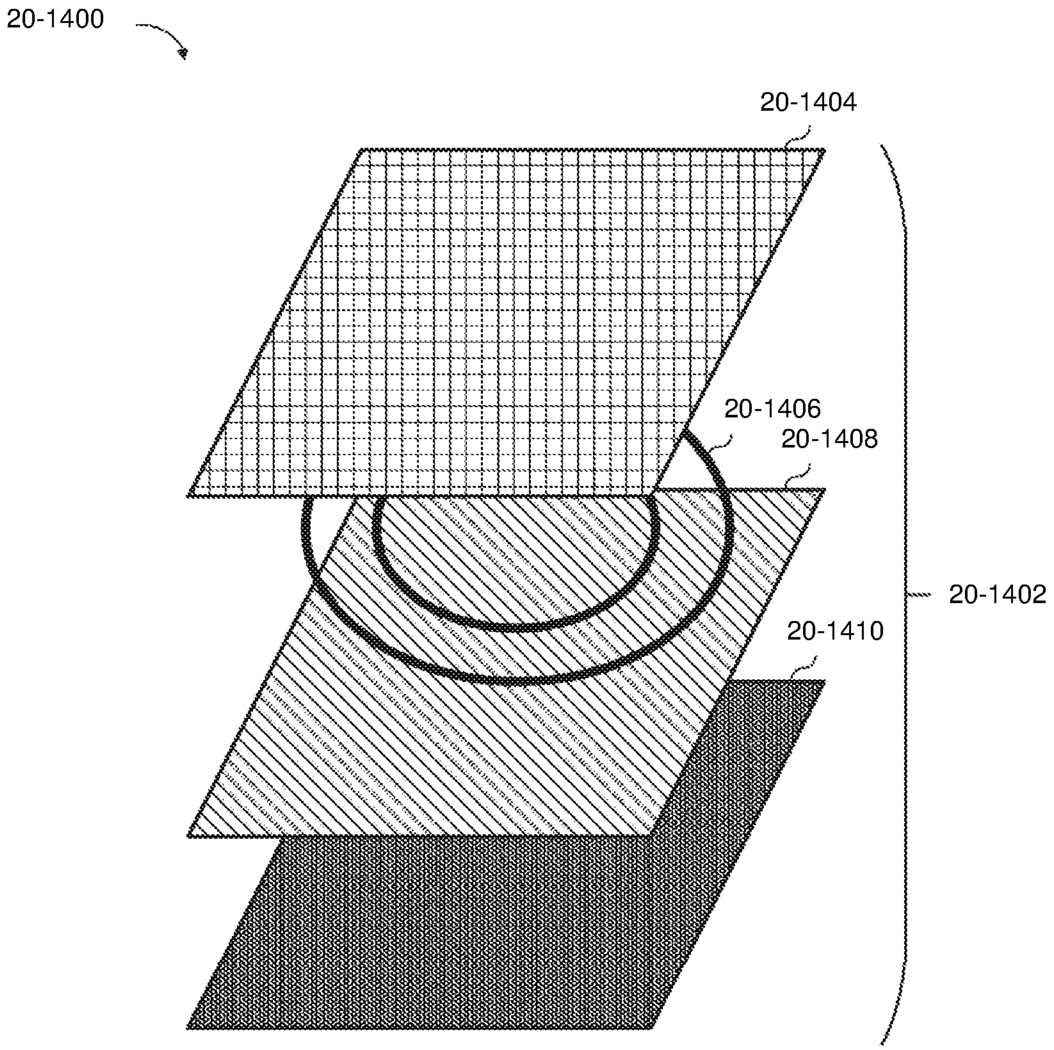
*Figure* 20-14

20-1500
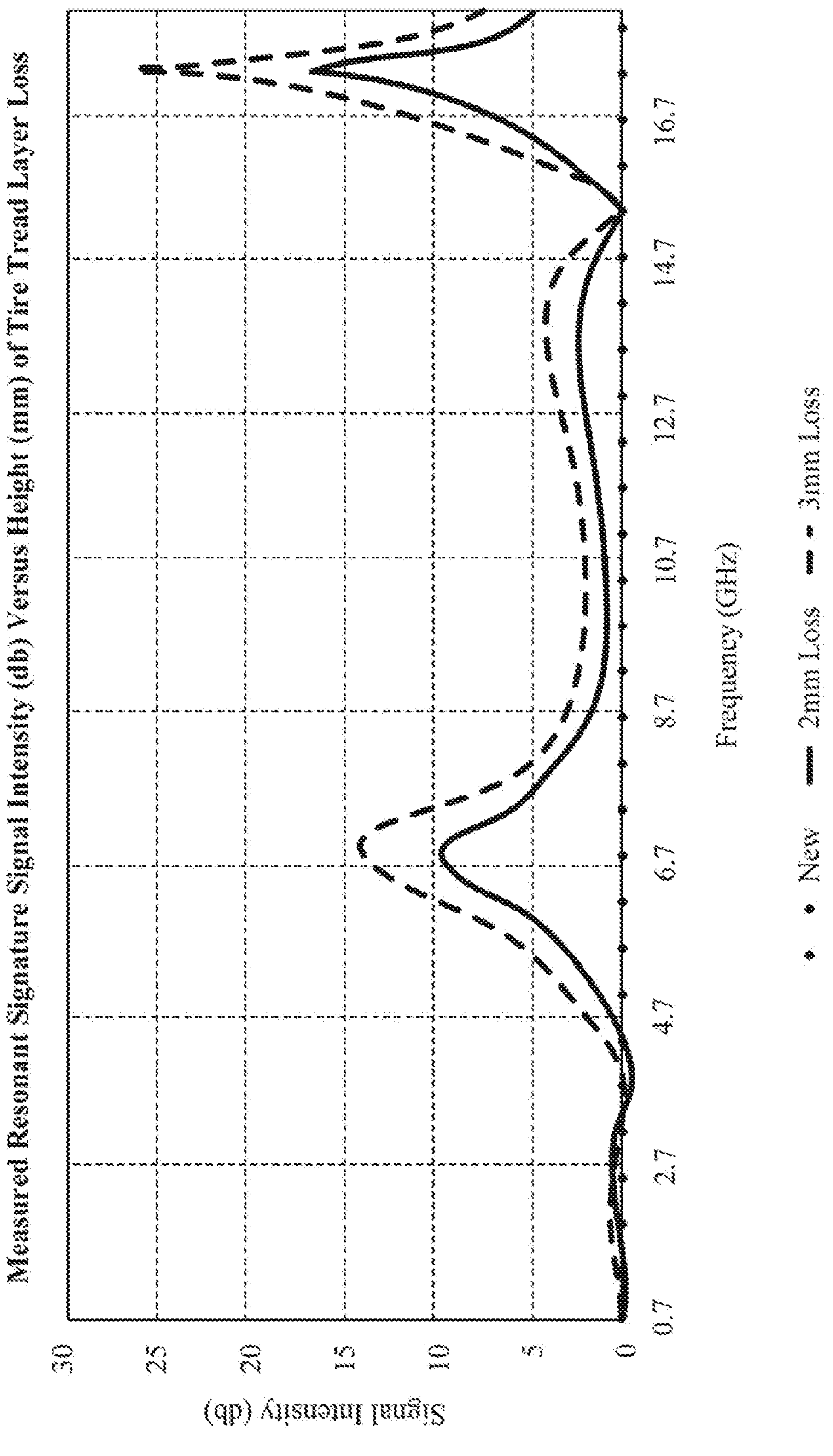
*Figure* 20-15

20-1600
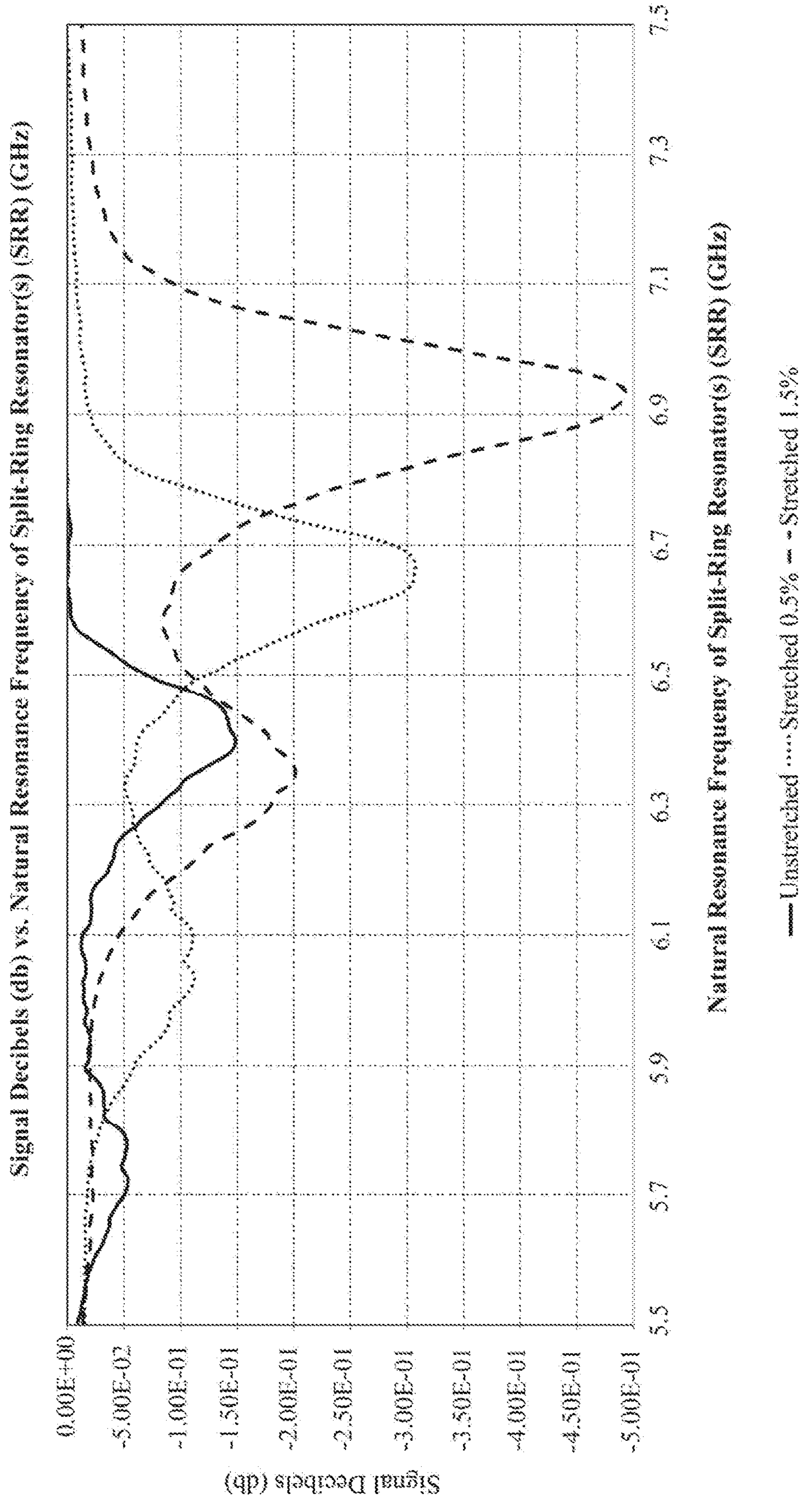
***Figure* 20-16**

20-1700
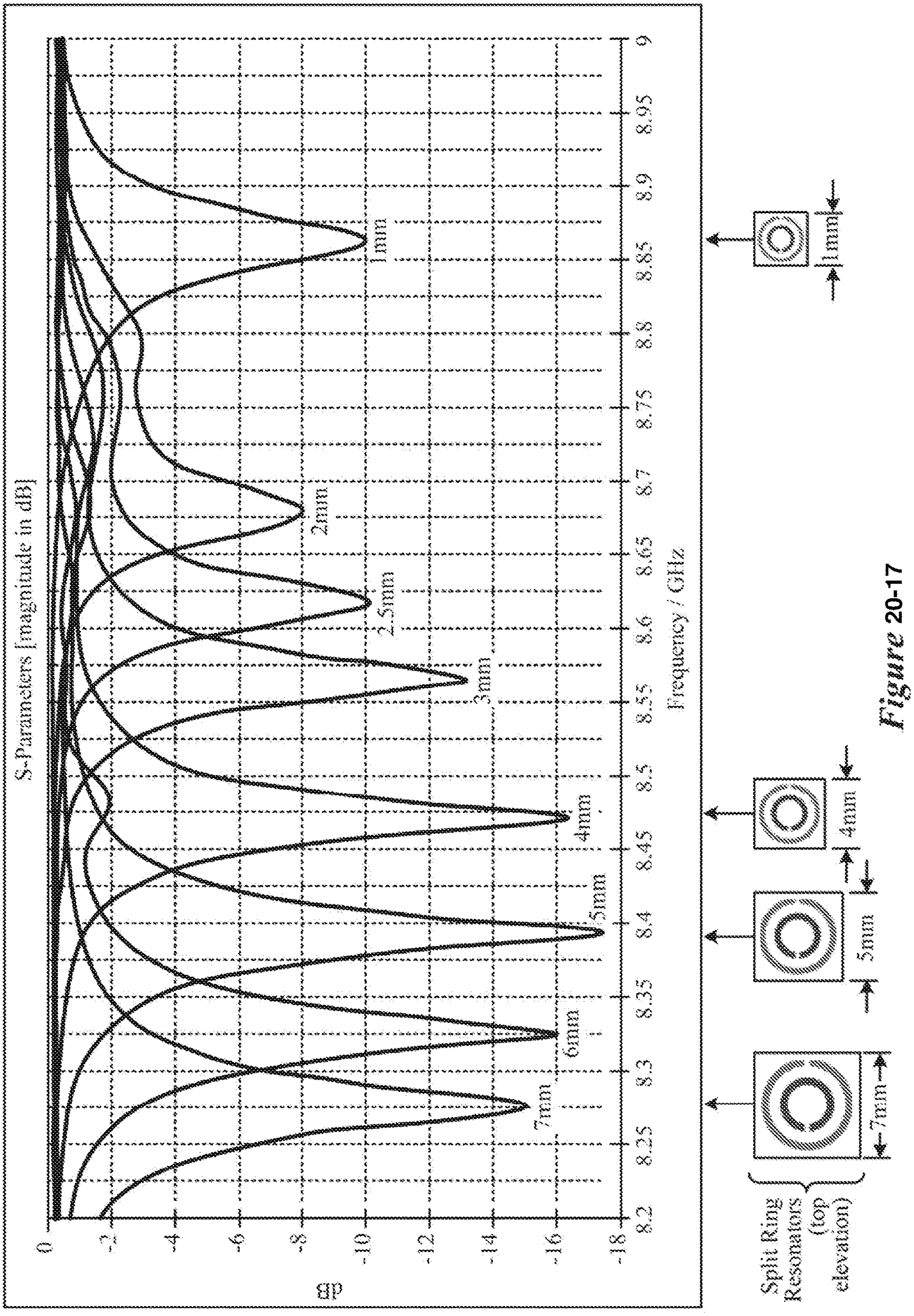
*Figure* 20-17

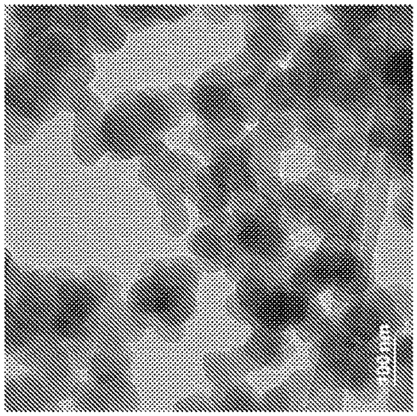
*Figure* 20-18A
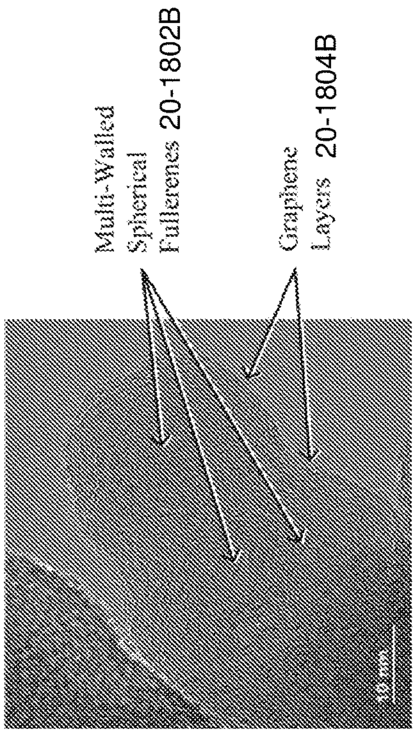
*Figure* 20-18B
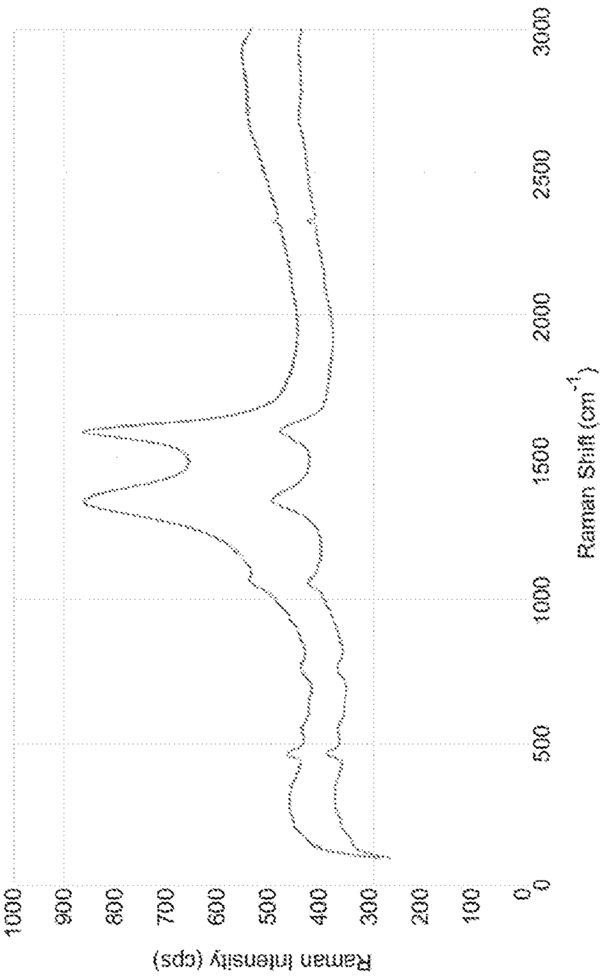
*Figure* 20-18C

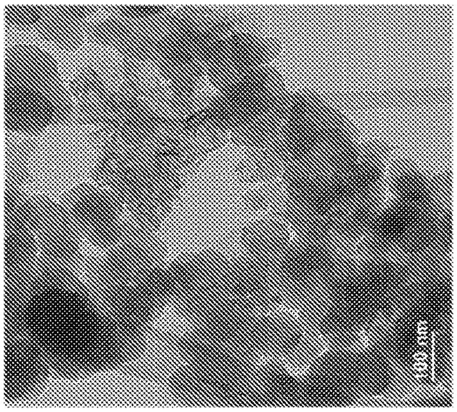
*Figure* 20-18D
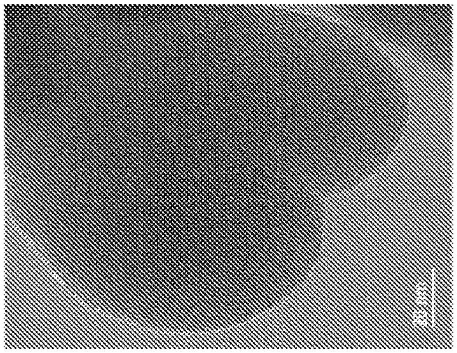
*Figure* 20-18E
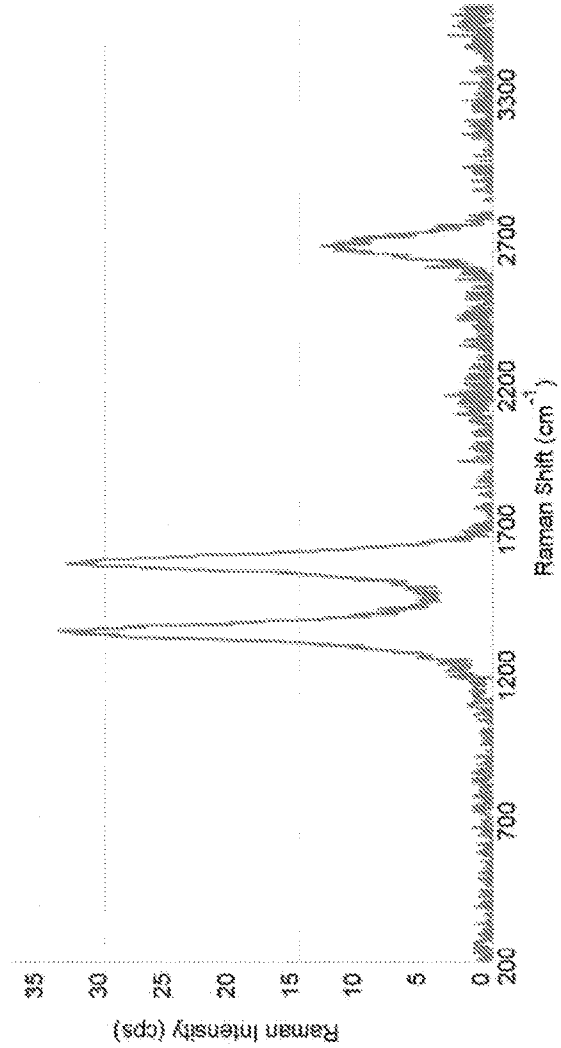
*Figure* 20-18F

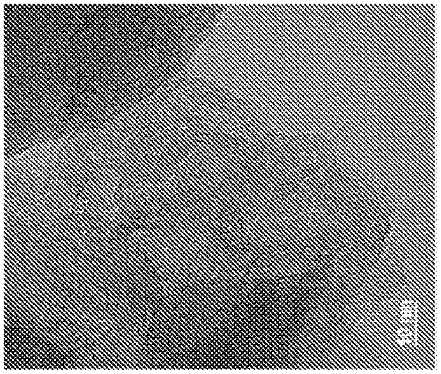
*Figure* 20-18K
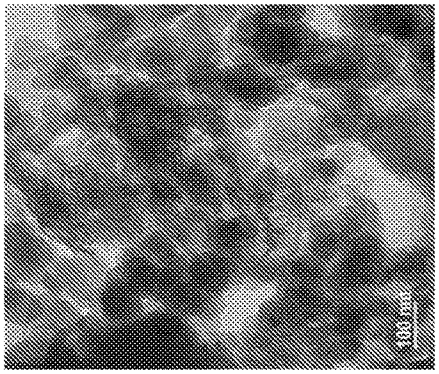
*Figure* 20-18L
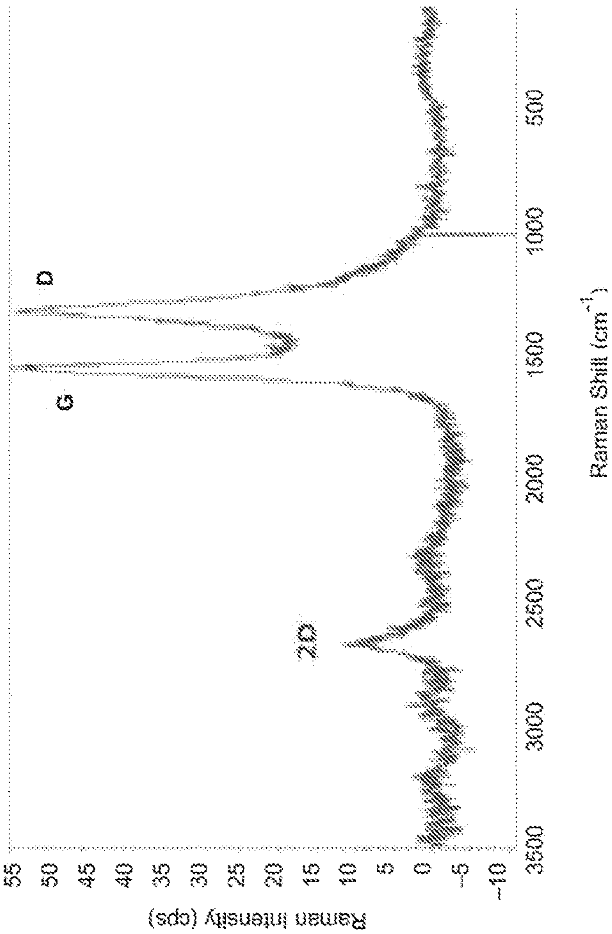
*Figure* 20-18M

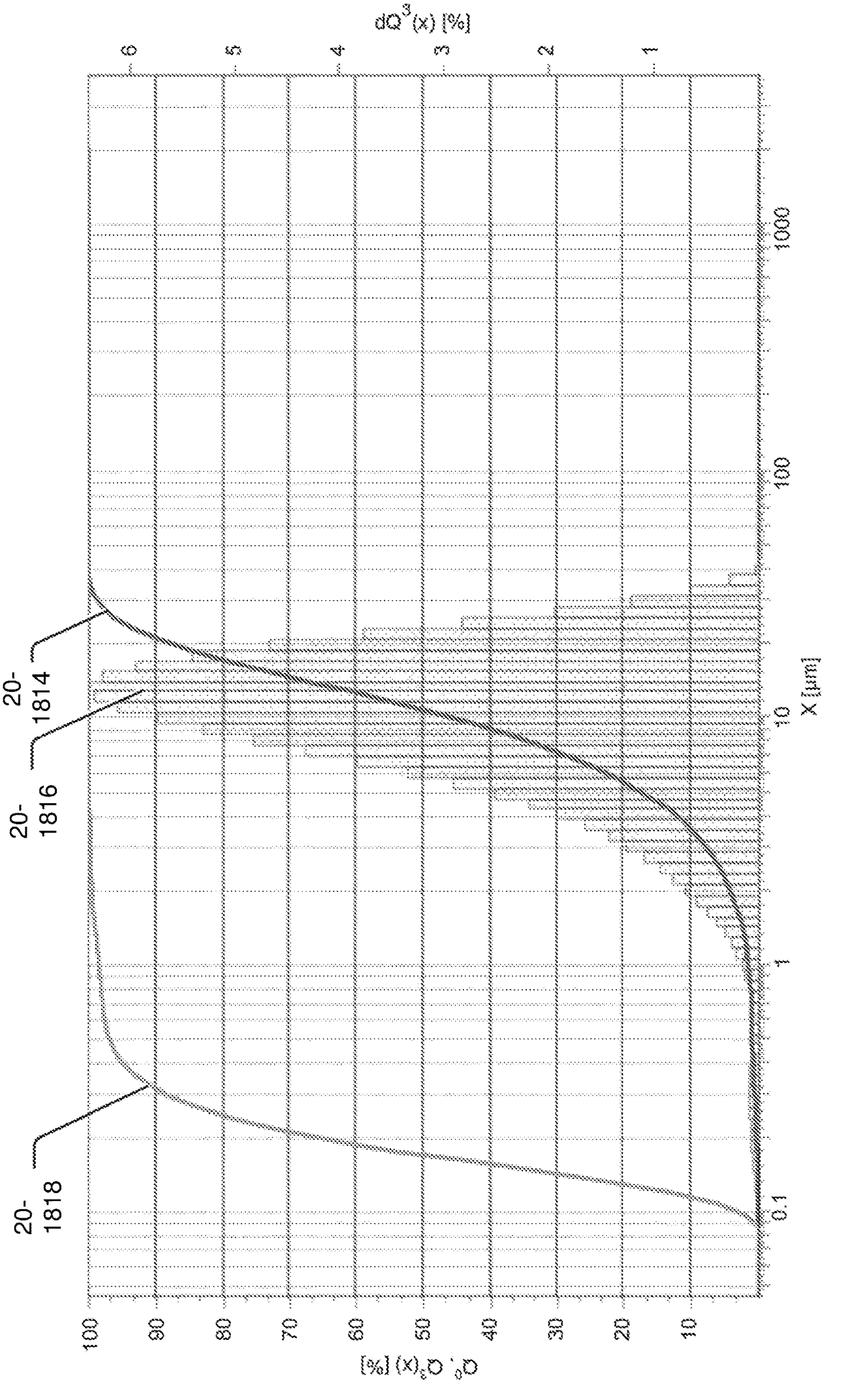
*Figure* 20-18Q

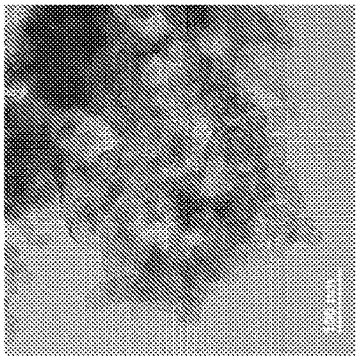
*Figure* 20-18R
*Figure* 20-18S
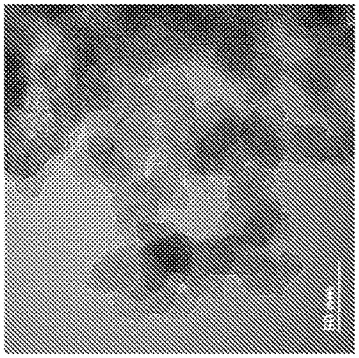
*Figure* 20-18T
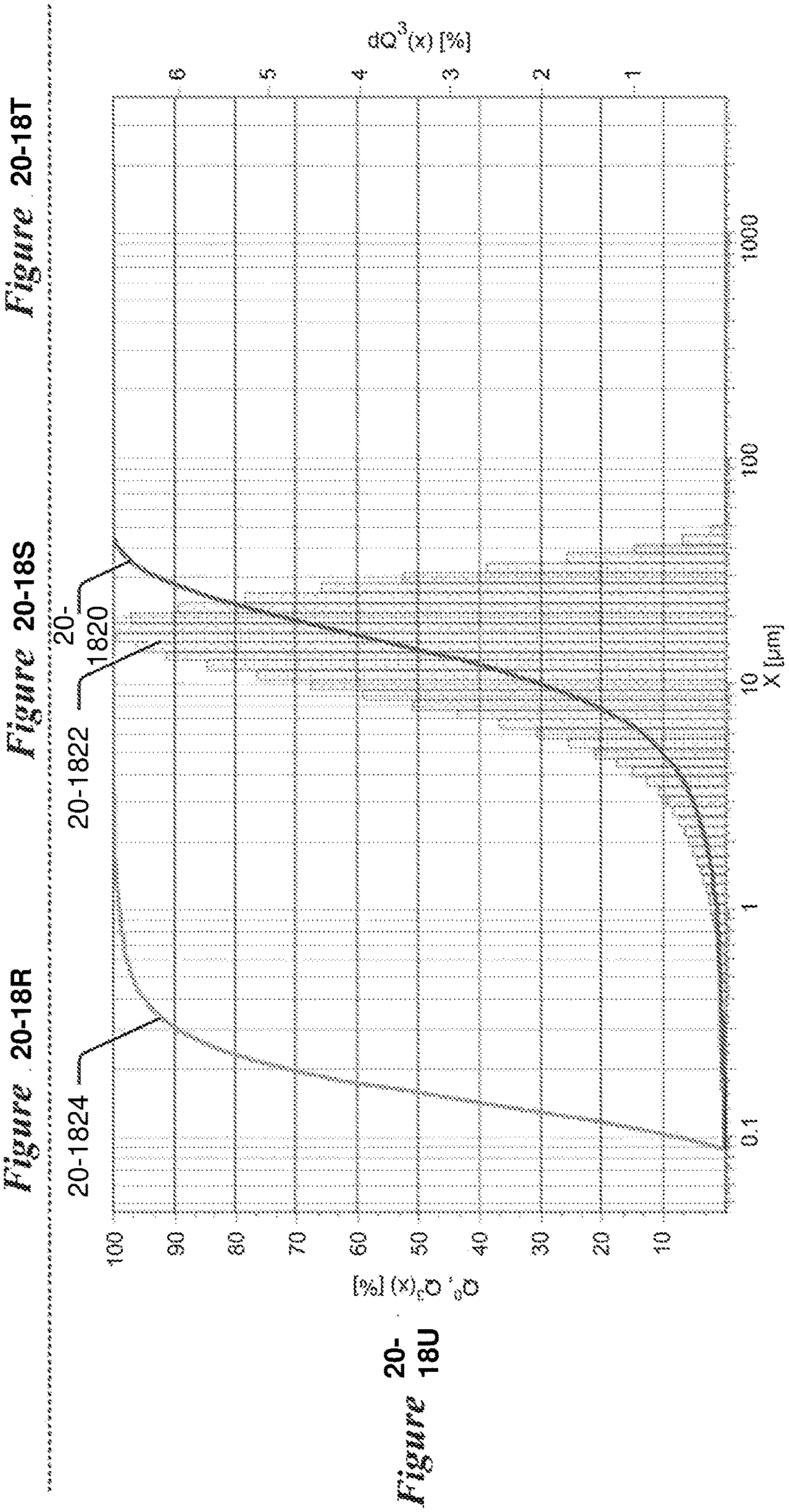
*Figure* 20-18U

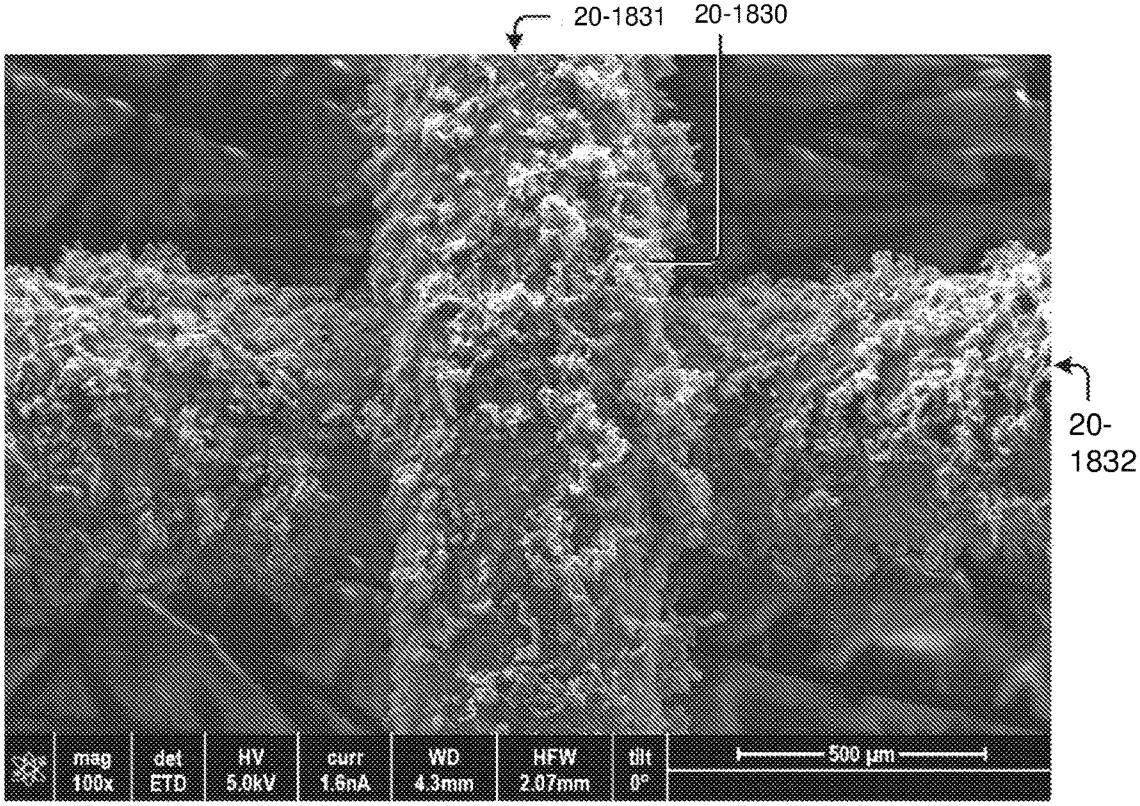
*Figure* 20-18V
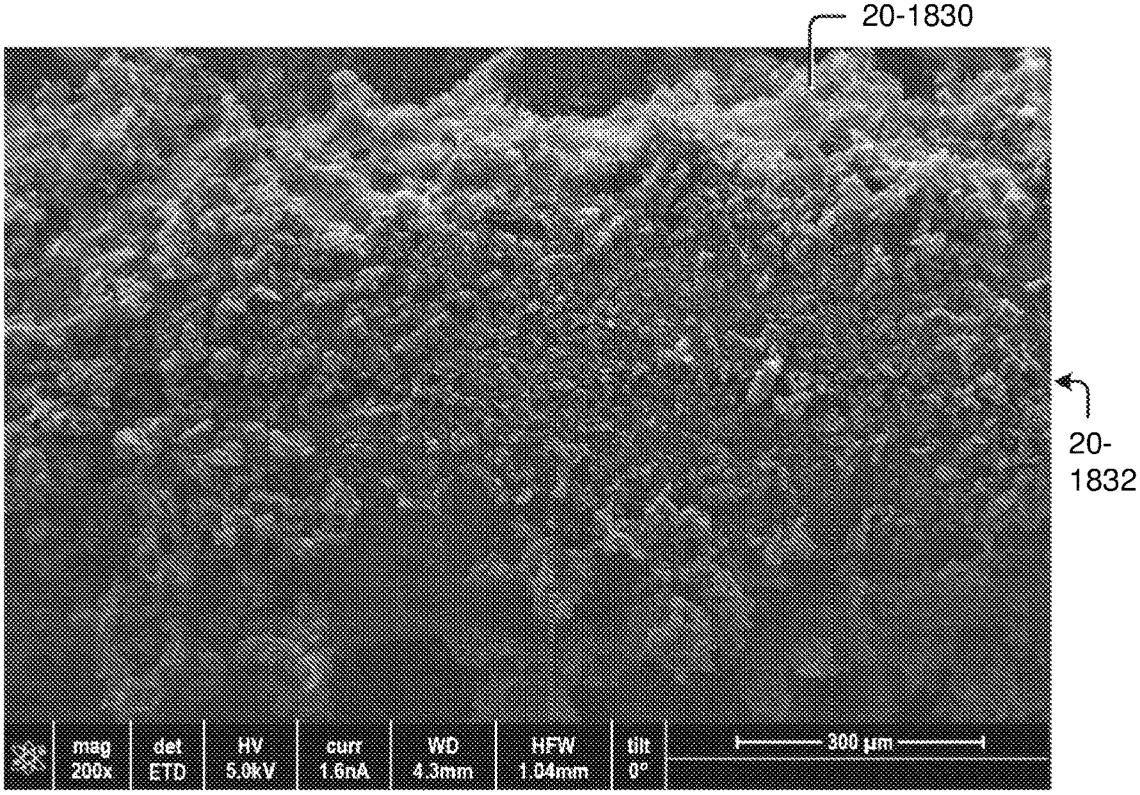
*Figure* 20-18W

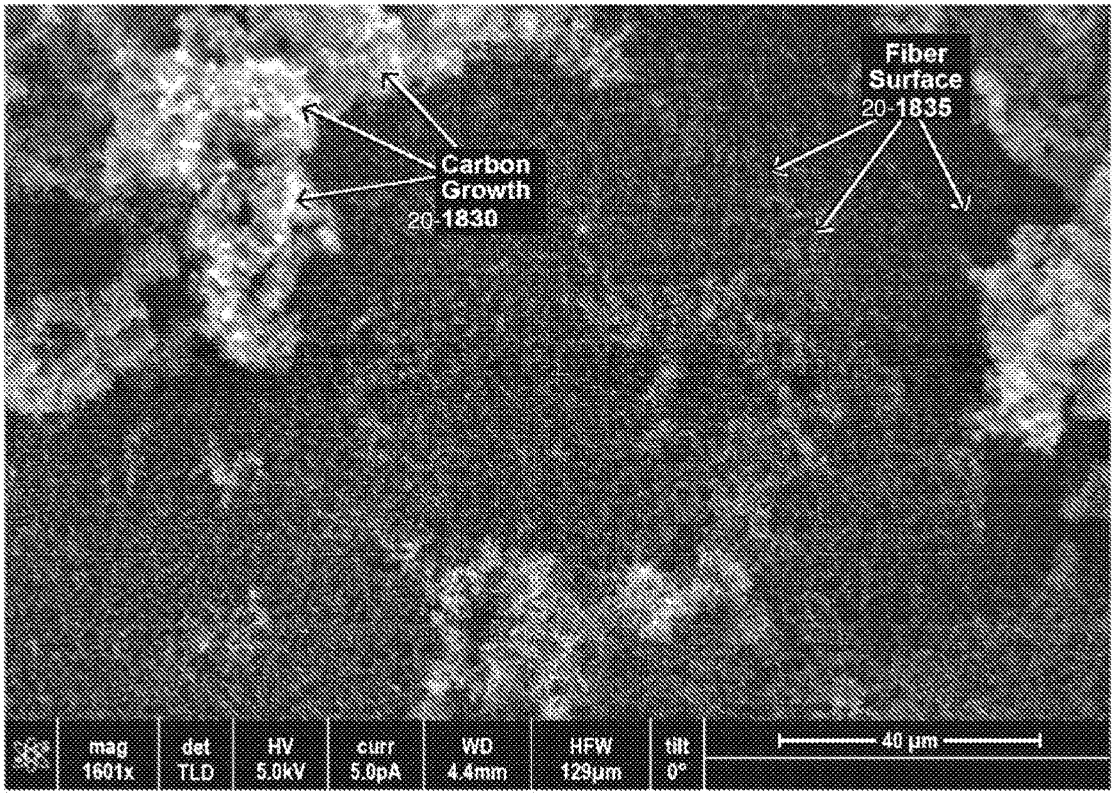
*Figure* 20-18X
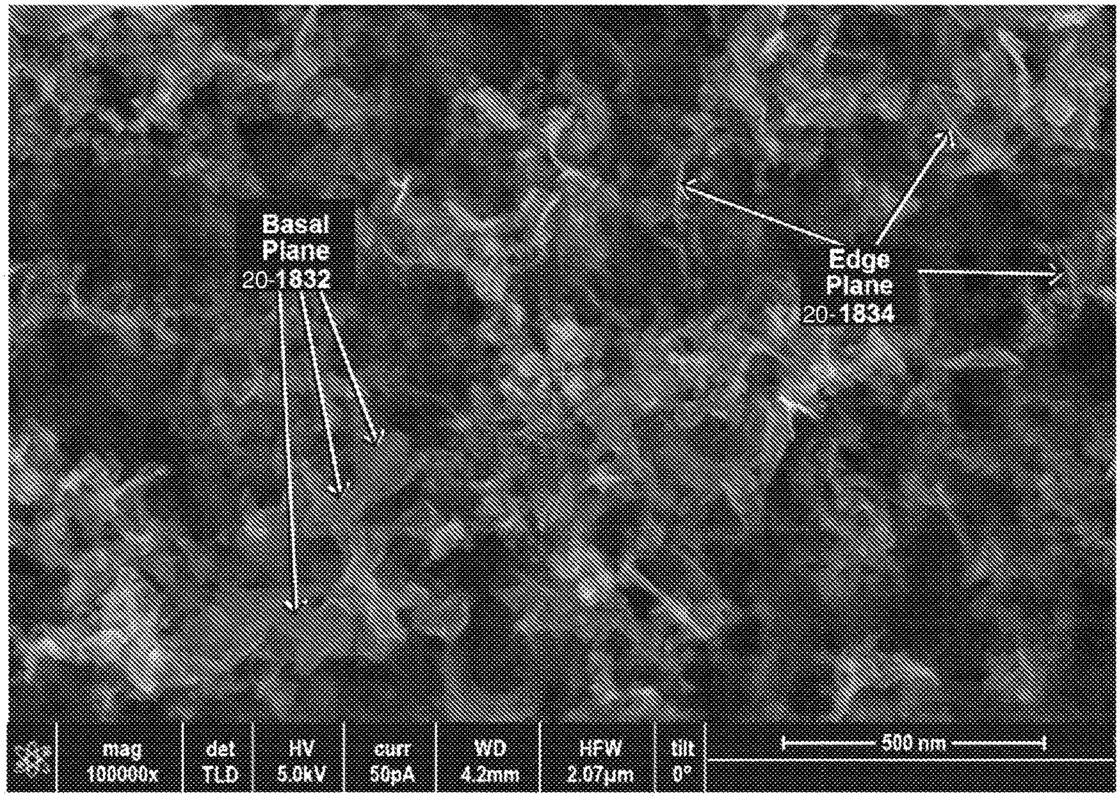
*Figure* 20-18Y

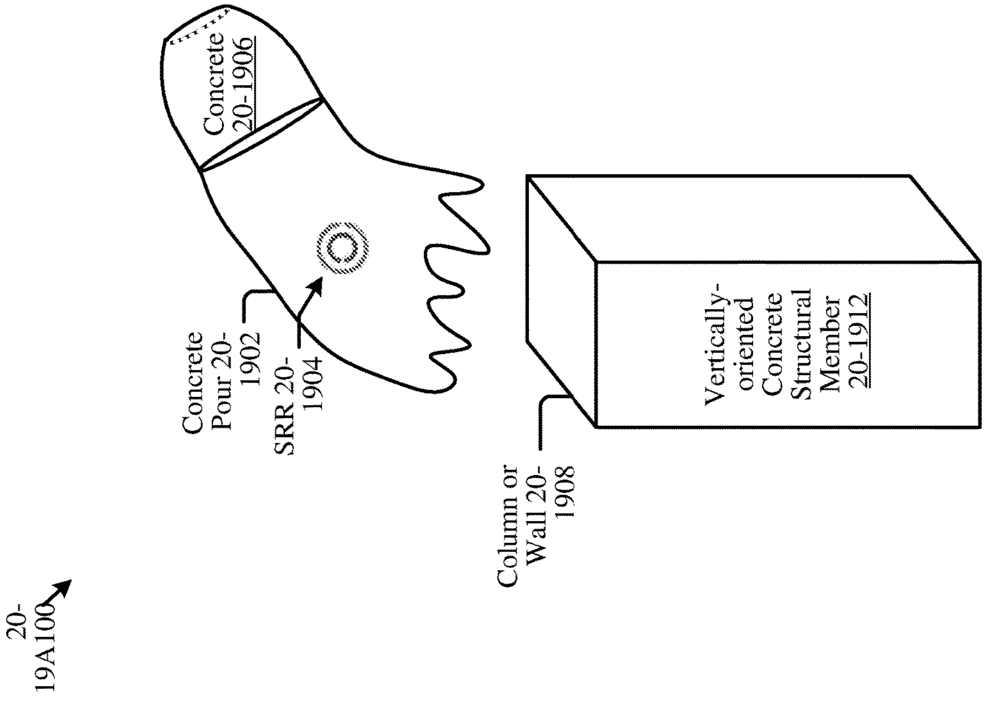
Figure 20-19A1
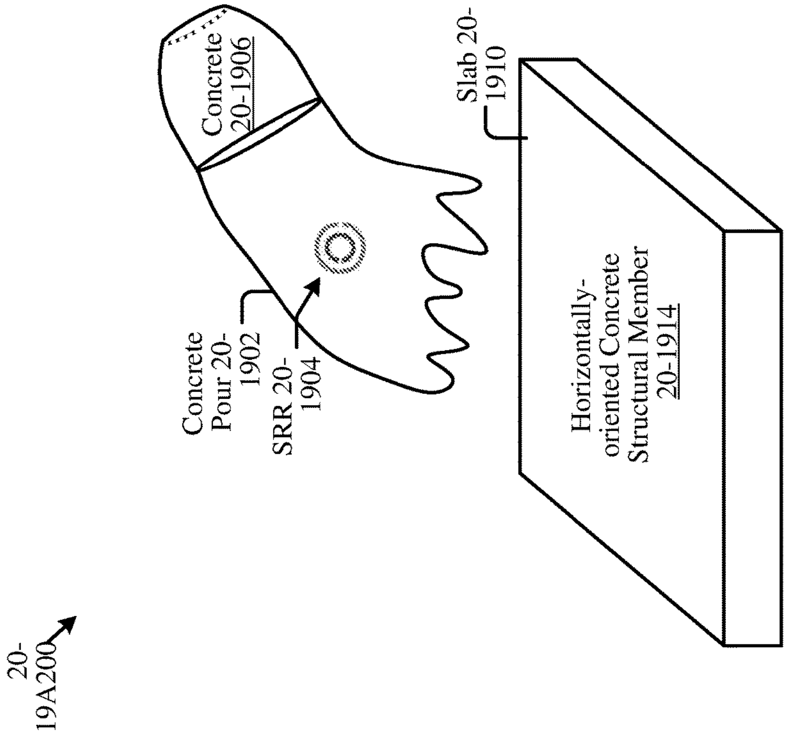
Figure 20-19A2

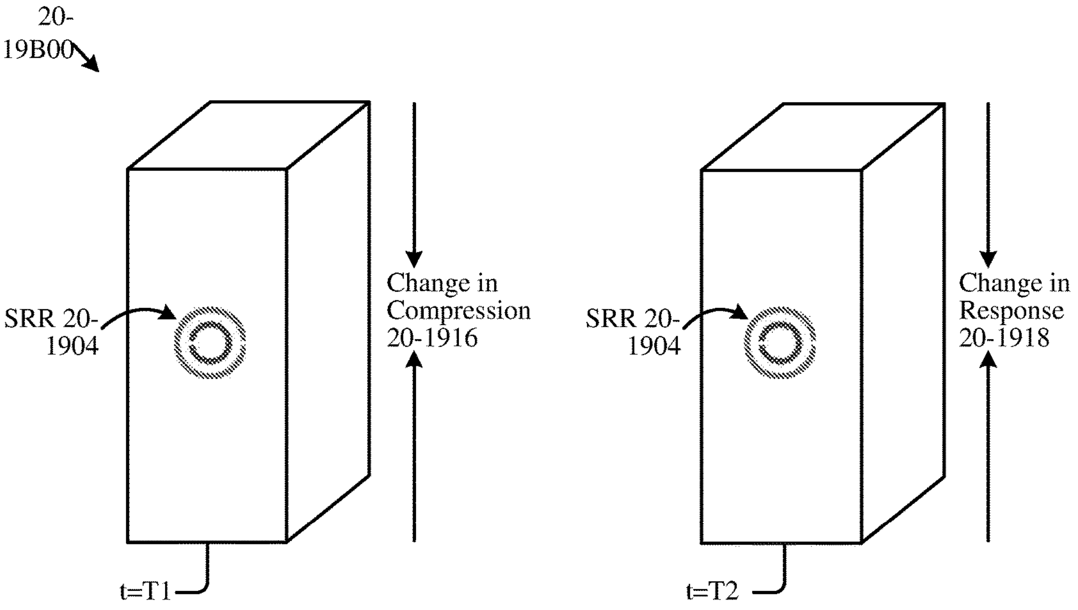
| Change in Response = f(change in compression) | Eq. 6 |
|---|---|
Figure 20-19B1
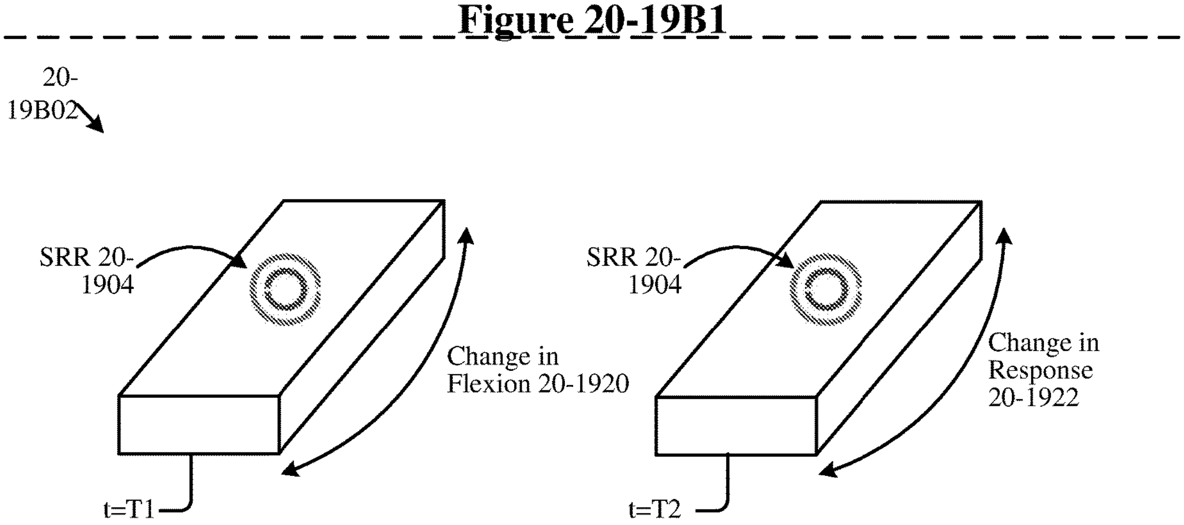
| Change in Response = f(change in flexion) | Eq. 7 |
|---|---|
Figure 20-19B2

| | |
|---|---|
| Size = f(size of member) | Eq. 8 |

| | |
|---|---|
| Orientation = f(flexure vectors, compression vectors, expansion vectors) | Eq. 9 |

| | |
|---|---|
| Location = f(flexure points, compression maxima, expansion maxima) | Eq. 10 |

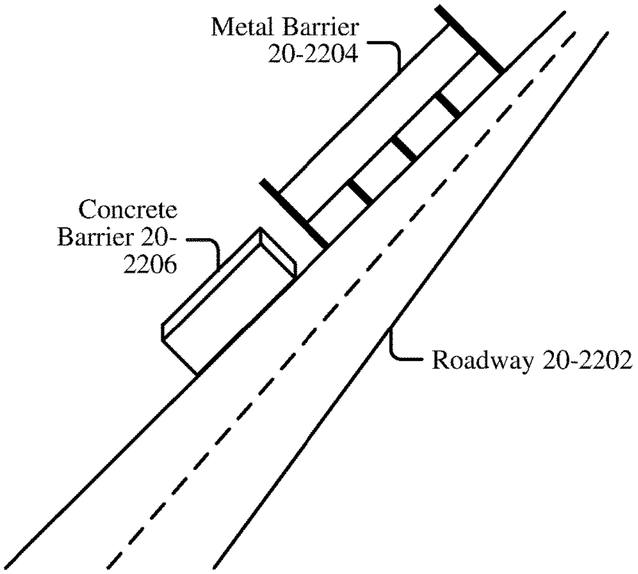
Figure 20-22A1
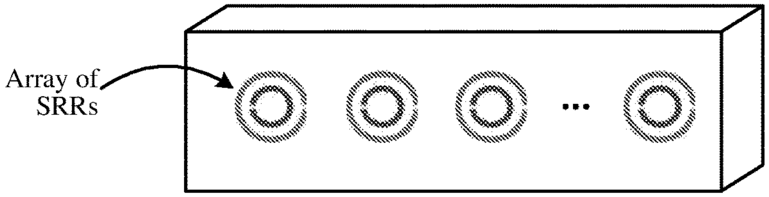
Figure 20-22A2
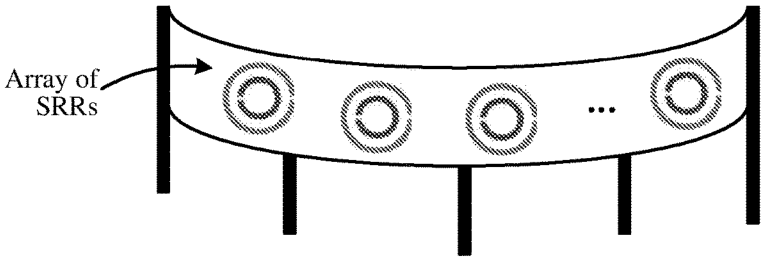
Figure 20-22A3

20-22B00

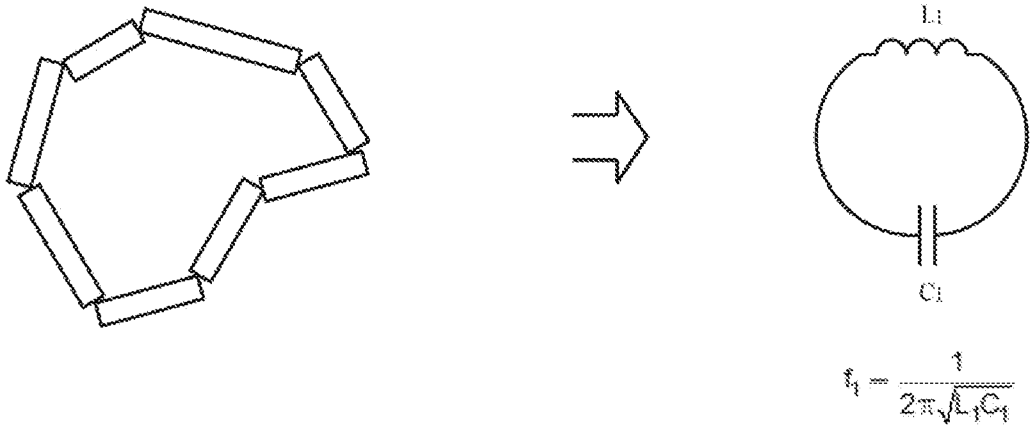
Figure 20-24B1
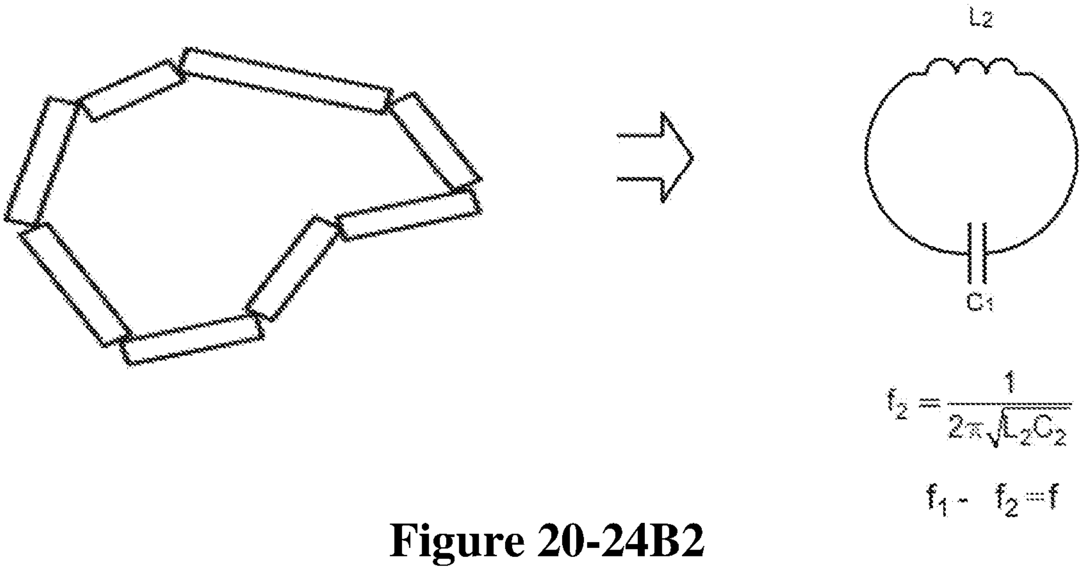
Figure 20-24B2

20-24B300
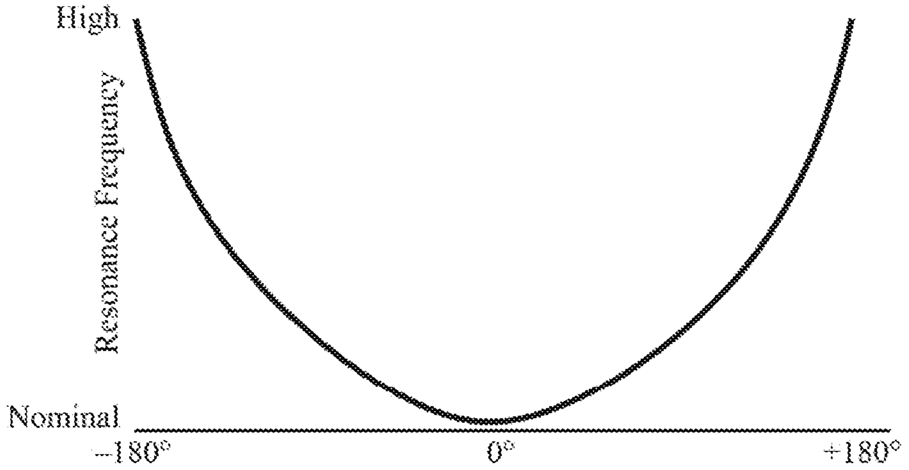
Figure 20-24B3
20-24B400
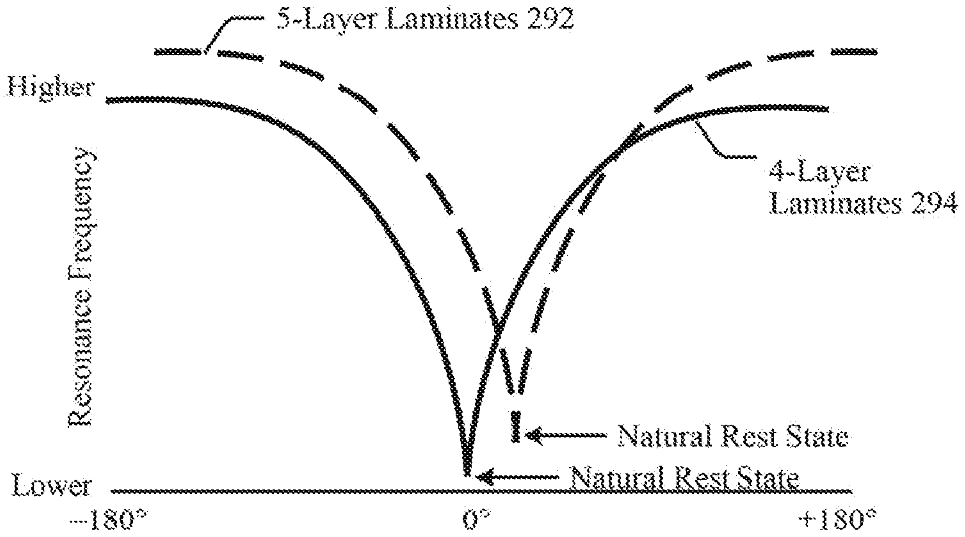
Figure 20-24B4

20-3000

20-3100

20-4200

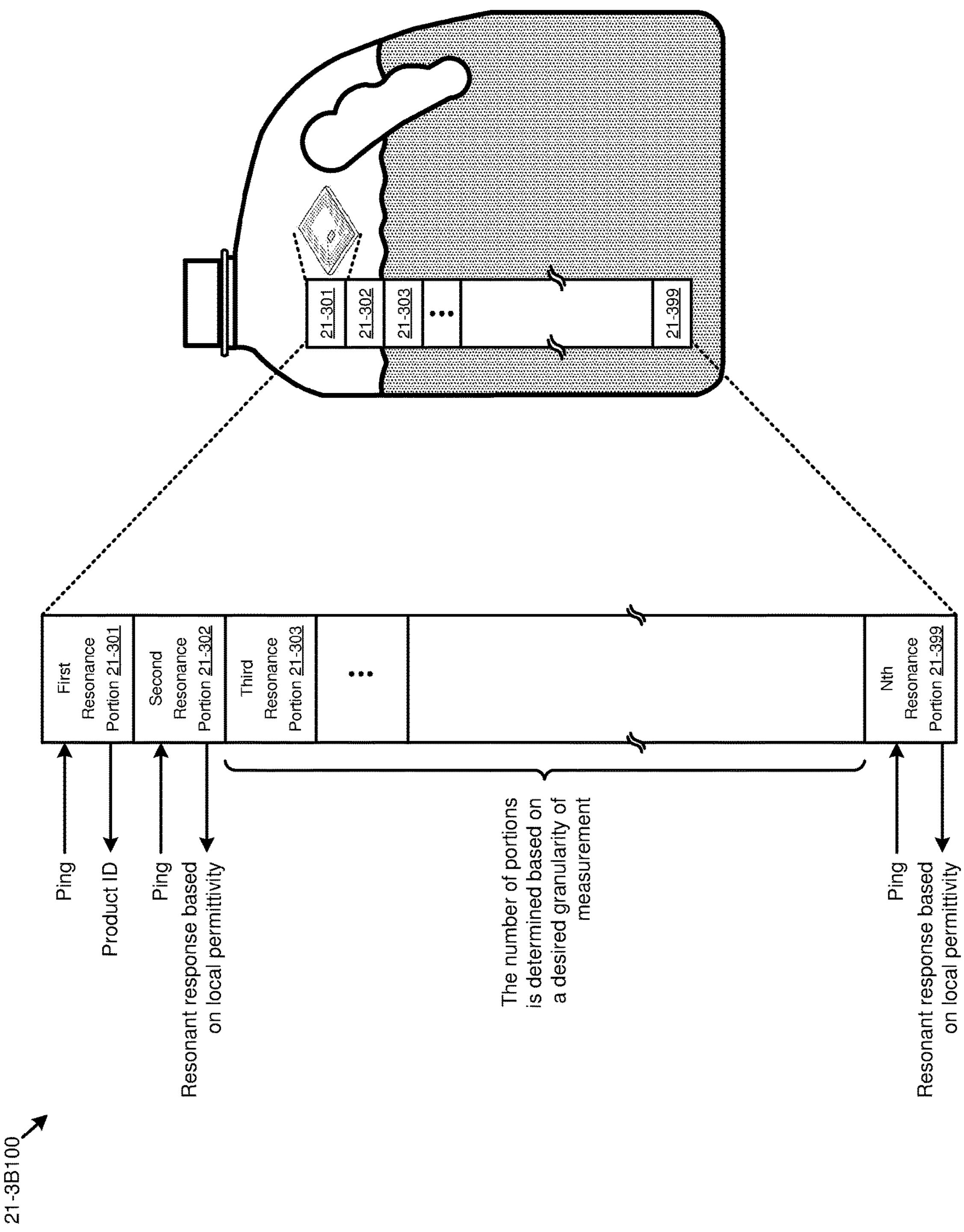
FIG. 21-3B1

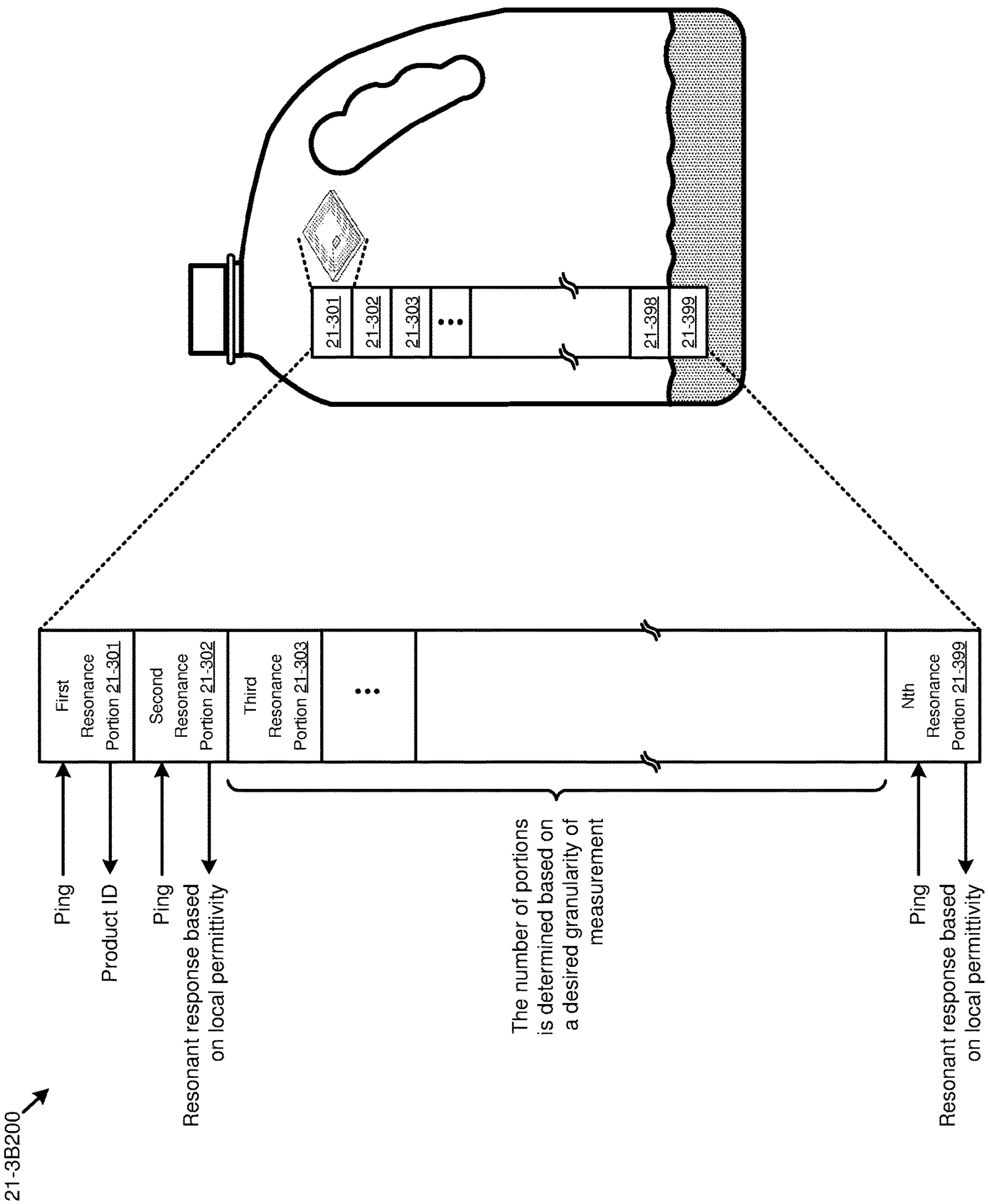
FIG. 21-3B2

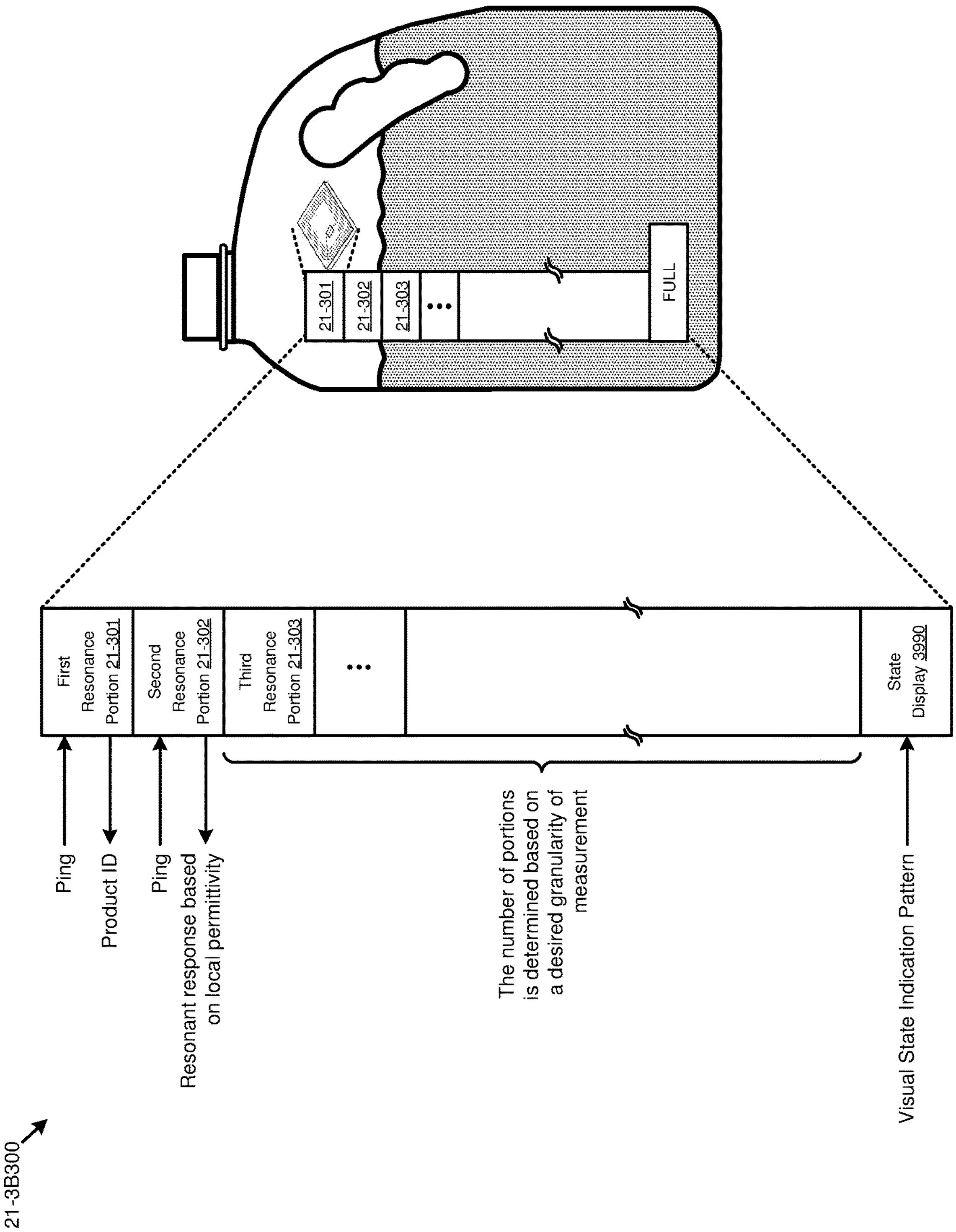
FIG. 21-3B3

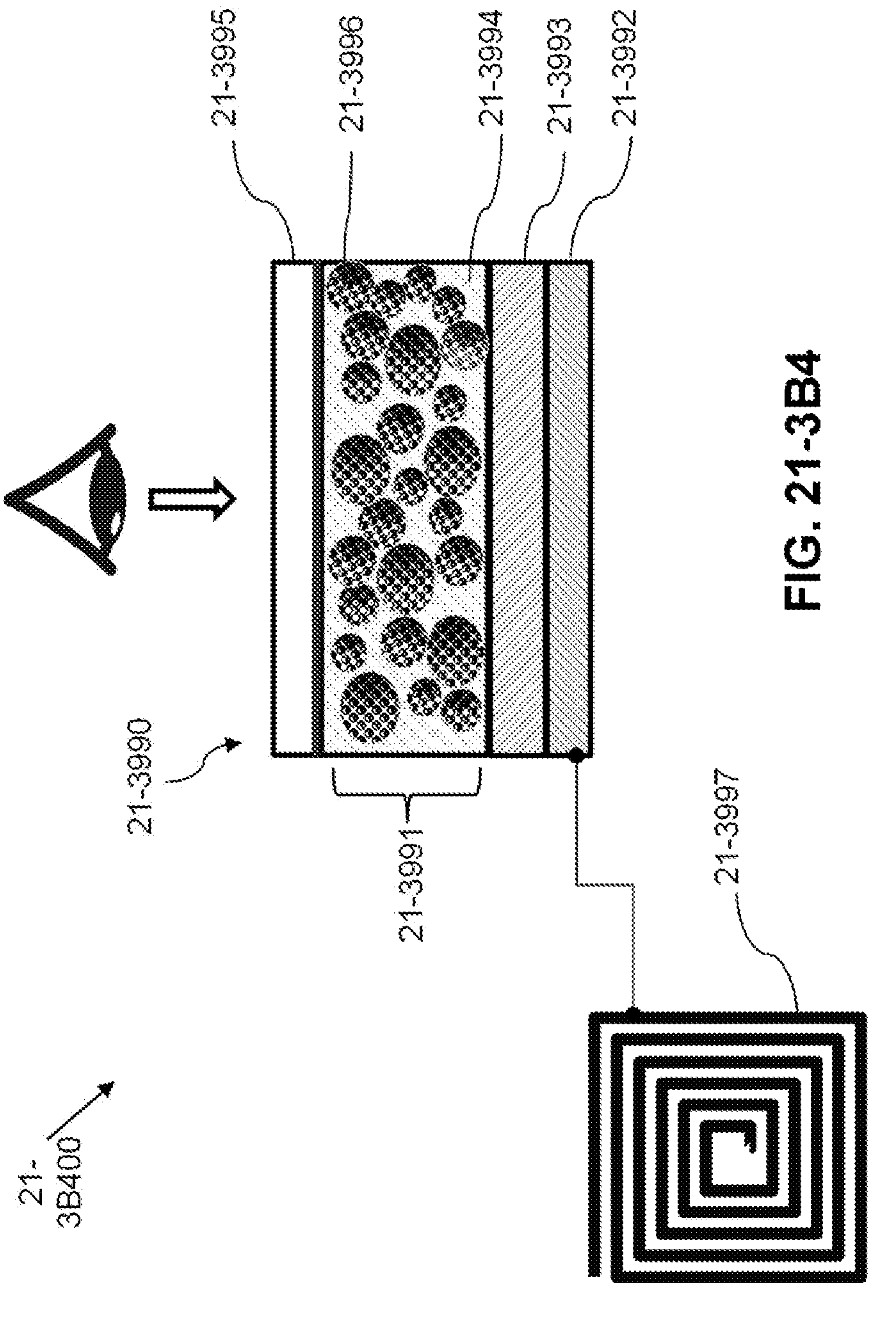
FIG. 21-3B4

21-3C00

21-4A100
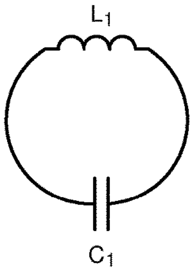
$$f_1 = \frac{1}{2p\sqrt{L_1C_1}}$$
FIG. 21-4A1
21-4A200
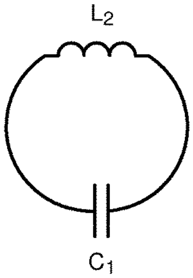
$$f_2 = \frac{1}{2p\sqrt{L_2C_2}}$$
$$f_1 - f_2 = f_D$$
FIG. 21-4A2

METHOD TO LEARN PRECISE SENSING FINGERPRINTS BASED ON MACHINE LEARNING INTEGRATION

CROSS-REFERENCE TO RELATED APPLICATIONS

This Patent application claims the benefit of priority to: U.S. Provisional Patent Application No. 63/525,346 (LYT1P0062++/LYTEP229P2), entitled "SYSTEM, METHOD, AND COMPUTER PRODUCT FOR DIGITAL SIGNATURE-BASED SENSORS" filed Jul. 6, 2023; U.S. Provisional Patent Application No. 63/532,859 (LYT1P071+/LYTEP229P4), entitled "SYSTEM AND METHOD OF SPATIAL SENSING WITHIN A CONTAINER" filed Aug. 15, 2023: U.S. Provisional Patent Application No. 63/445,948 (LYT1P046+/LYTEP126B1UIC1B1), entitled "SENSORS INCORPORATED INTO SEMI-RIGID STRUCTURAL MEMBERS TO DETECT PHYSICAL CHARACTERISTIC CHANGES" filed Feb. 15, 2023: U.S. Provisional Patent Application No. 63/531,657 (LYT1P070+/LYTEP229P3), entitled "SCOPE SENSORS IN THE INTERNET FOG" filed Aug. 9, 2023: U.S. Provisional Patent Application No. 63/622,464 (LYT1P087+/LYTEP229P5), entitled "SYSTEM AND METHOD FOR TRACKING INDIRECT GREENHOUSE GAS EMISSIONS THROUGHOUT A PRODUCT'S LIFECYCLE" filed Jan. 18, 2024, all of which are assigned to the assignee hereof: the disclosures of all prior Applications are considered part of and are incorporated by reference in this Patent Application.

Further, this Patent Application is related to: U.S. Pat. No. 11,555,799 (LYTEP072), entitled "MULTI-PART NON-TOXIC PRINTED BATTERIES" granted Jan. 17, 2023; U.S. patent application Ser. No. 17/382,638 (LYTEP162B1), entitled "BIOFUNCTIONALIZED THREE-DIMENSIONAL (3D) GRAPHENE-BASED FIELD-EFFECT TRANSISTOR (FET) SENSOR" filed Jul. 22, 2021; PCT Patent Publication No. WO2020263505 (LYTEP080WO), entitled "ELECTROPHORETIC DISPLAY" filed Jun. 1, 2020; U.S. patent application Ser. No. 17/182,006 (LYTEP112U1), entitled "ANALYTE SENSING DEVICE" filed Feb. 22, 2021; U.S. Pat. No. 11,585,731 (LYT1P0001/LYTEP126B1U1), entitled "SENSORS INCORPORATED INTO SEMI-RIGID STRUCTURAL MEMBERS TO DETECT PHYSICAL CHARACTERISTIC CHANGES" filed Sep. 8, 2022; U.S. patent application Ser. No. 18/369,418 (LYT1P018/LYTEP197U1), entitled "RESONANT SENSORS FOR ENVIRONMENTAL HEALTH RISK DETECTION" filed Sep. 18, 2023; U.S. Pat. No. 12,449,387 (LYT1P062/LYTEP229U1), entitled "RECONFIGURING A SECOND TYPE OF SENSOR BASED ON SENSING DATA OF A FIRST TYPE OF SENSOR" filed Feb. 13, 2024; U.S. patent application Ser. No. 18/440,741 (LYT1P084/LYTEP229U3), entitled "METHOD OF FIELD RECALIBRATION OF MULTIVARIATE ANALYTE SENSORS BASED ON LEARNED PRECISE SENSING FINGERPRINTS" filed Feb. 13, 2024; U.S. patent application Ser. No. 18/440,753 (LYT1P085/LYTEP229U4), entitled "MEASURING MULTI-POINT SPATIAL PATH TRAVERSAL OF SENSOR-INCLUSIVE PACKAGES" filed Feb. 13, 2024; U.S. patent application Ser. No. 18/440,769 (LYT1P086/LYTEP229U5), entitled "SYSTEM AND METHOD FOR TRACKING INDIRECT GREENHOUSE GAS EMISSIONS THROUGHOUT A PRODUCT'S LIFECYCLE" filed Feb. 13, 2024, all of which are assigned to the assignee hereof; the disclosures of all prior Applications are considered part of and are incorporated by reference in this Patent Application.

FIELD OF THE INVENTION

The present invention relates to sensors, and more particularly to deploying sensors into a multi-tiered sensing network.

BACKGROUND

Currently, sensors are often configured to operate in a predetermined configuration. For example, a smoke alarm sensor may be configured to optically (via photoelectric) or physically (via ionization) detect the presence of smoke. In like manner, a gas detector may be configured to detect a concentration of one or more specific gases. However, such conventional sensors (and sensor delivery systems) are limited in that they often cannot be reconfigured after deployment, cannot be updated to allow for more precise detection, or cannot be deployed in a more complex array (or in a multi-sensor configuration) for enhanced detection. Further, sensors are often constrained by limitations in what they can detect. For example, a smoke detector may detect the presence of smoke, but may not be able to provide a spatial mapping of the origin of the smoke.

Additionally, sensors currently face several limitations that impact their performance, including faulty data, environmental conditions (such as temperature and humidity), cross-contamination from other signals (which may cause responses to multiple stimuli), limited measurement ranges or response times, high power consumption, and high cost. Sensor complexities, data security, and privacy risks add further layers of challenge.

As such, there is thus a need for addressing these and/or other issues associated with the prior art.

SUMMARY

In some aspects, the techniques described herein relate to a system, including: a non-transitory memory storing instructions; and one or more processors in communication with the non-transitory memory, wherein the one or more processors execute the instructions to cause the system to: receive first sensor data at a sensors as a service platform, wherein the first sensor data corresponds with a first level of capabilities for a first sensor; responsive to an analysis of the first sensor data, select, at the sensors as a service platform, a sensor upgrade for the first sensor; provision, at the sensors as a service platform, enhanced sensor capabilities for the sensor upgrade for the first sensor based on the selection; send, from the sensors as a service platform to the first sensor, a sensor update with the enhanced sensor capabilities; and receive, at the sensors as a service platform, second sensor data from the first sensor wherein the second sensor data corresponds with a second level of capabilities for the first sensor.

In some aspects, the techniques described herein relate to a system, wherein the second level of capabilities corresponds to at least one of, a greater degree of sensitivity of the first sensor as compared to the first level of capabilities, or a second level of capabilities pertaining to a second sensor, or wherein the second level of capabilities corresponds to an analyte fingerprint that is different than an analyte fingerprint of the first level of capabilities.

In some aspects, the techniques described herein relate to a system, wherein the one or more processors execute the instructions to cause the system to receive array sensor data from an array of sensors.

In some aspects, the techniques described herein relate to a system, wherein the array sensor data is received collectively at the sensors as a service platform by at least one sensor of the sensor array.

In some aspects, the techniques described herein relate to a system, wherein the one or more processors execute the instructions to cause the system to manage the array of sensors, wherein the manage includes increasing or decreasing sensor capabilities for each sensor of the array of sensors.

In some aspects, the techniques described herein relate to a system, wherein the first sensor data is received at the sensors as a service platform from the first sensor.

In some aspects, the techniques described herein relate to a system, wherein the first sensor data is received at the sensors as a service platform from a central sensor node associated with the first sensor.

In some aspects, the techniques described herein relate to a system, wherein the first sensor data is received at the sensors as a service platform from another sensor associated with the first sensor.

In some aspects, the techniques described herein relate to a system, wherein the another sensor and the first sensor are configured in a mesh network configuration.

In some aspects, the techniques described herein relate to a system, wherein the first sensor is an edge device.

In some aspects, the techniques described herein relate to a system, wherein the first sensor data is processed by the first sensor prior to being received by the sensors as a service platform.

In some aspects, the techniques described herein relate to a system, wherein the sensor update affects the first sensor as well as at least one other sensor.

In some aspects, the techniques described herein relate to a system, wherein the at least one other sensor is in a same sensor asset class as the first sensor.

In some aspects, the techniques described herein relate to a system, wherein the first sensor is formed from a three-dimensional (3D) monolithic carbonaceous growth.

In some aspects, the techniques described herein relate to a system, wherein a resonant frequency of the 3D monolithic carbonaceous growth is based at least in part on either or both of a permittivity and a permeability of a material associated with the first sensor.

In some aspects, the techniques described herein relate to a system, wherein the first sensor is a split-ring resonator (SRR) on or embedded in a material, wherein the SRR includes a resonance portion, wherein the resonance portion is configured to resonate at a first frequency in response to an electromagnetic ping when a state of the material exceeds a threshold, and is configured to resonate at a second frequency in response to the electromagnetic ping when the state of the material is beneath the threshold.

In some aspects, the techniques described herein relate to a system, wherein the first sensor is integrated within a label configured to be removably printed onto a surface of a package or container, and the label includes one or more carbon-based inks.

In some aspects, the techniques described herein relate to a system, wherein the first sensor is carbon-based and is functionalized with a material configured to react with each analyte of a first group of analytes.

In some aspects, the techniques described herein relate to a system, wherein the first sensor includes a three-dimensional (3D) graphene layer, wherein the 3D graphene layer is biofunctionalized with a molecular recognition element configured to alter one or more electrical properties of the 3D graphene layer in response to exposure of the molecular recognition element to an analyte.

In some aspects, the techniques described herein relate to a system, wherein the molecular recognition element is a biological material configured to selectively bind with the analyte.

In some aspects, the techniques described herein relate to a system, wherein the first sensor is a three-dimensional (3D) carbon-based structure configured to guide a migration of electrically charged electrophoretic ink particles dispersed throughout the 3D carbon-based structure, the electrically charged electrophoretic ink particles responsive to application of a voltage to the 3D carbon-based structure.

In some aspects, the techniques described herein relate to a system, including: a non-transitory memory storing instructions; and one or more processors in communication with the non-transitory memory, wherein the one or more processors execute the instructions to cause the system to: receive at least one first parameter associated with at least one sensor; associate the at least one first parameter with a pre-identified first digital signature in a signature database; train a machine learning system based on the at least one first parameter and the pre-identified digital signature; receive at least one second parameter from the at least one sensor; determine that the at least one second parameter is independent of a digital signature in the signature database; identify, using the machine learning system, a second digital signature for the at least one second parameter; and save, using the machine learning system, the second digital signature in the signature database.

In some aspects, the techniques described herein relate to a system, wherein the training of the machine learning system is unsupervised.

In some aspects, the techniques described herein relate to a system, wherein the one or more processors execute the instructions to cause the system to operate in a reactive stance in response to detection of a new digital signature.

In some aspects, the techniques described herein relate to a system, wherein the one or more processors execute the instructions to cause the system to operate in a proactive stance such that the machine learning generates new digital signatures not found in the signature database.

In some aspects, the techniques described herein relate to a system, wherein the one or more processors execute the instructions to cause the system to determine an accuracy score of the second digital signature, wherein the accuracy includes a confidence based on comparing the second digital signature to known signatures in the signature database.

In some aspects, the techniques described herein relate to a system, wherein each signature in the signature database includes specific patterns or characteristics of sensor data.

In some aspects, the techniques described herein relate to a system, wherein a signature in the signature database is flagged as a threat.

In some aspects, the techniques described herein relate to a system, wherein the at least one sensor includes an array of sensors.

In some aspects, the techniques described herein relate to a system, wherein the receipt of the at least one first parameter is received from the at least one sensor.

In some aspects, the techniques described herein relate to a system, wherein the receipt of the at least one first parameter is received from another sensor or control node associated with the at least one sensor.

In some aspects, the techniques described herein relate to a system, wherein the machine learning system is part of a sensor as a service platform.

In some aspects, the techniques described herein relate to a system, wherein the machine learning system operates in the cloud and is physically separate from the at least one sensor.

In some aspects, the techniques described herein relate to a system, wherein the machine learning system is configured to further monitor the at least one sensor, including reporting of anomalies based on sensor data from the at least one sensor, or facilitate issue resolution for the at least one sensor.

In some aspects, the techniques described herein relate to a system, wherein the at least one sensor is formed from a three-dimensional (3D) monolithic carbonaceous growth.

In some aspects, the techniques described herein relate to a system, wherein a resonant frequency of the 3D monolithic carbonaceous growth is based at least in part on either or both of a permittivity and a permeability of a material associated with the at least one sensor.

In some aspects, the techniques described herein relate to a system, wherein the at least one sensor is a split-ring resonator (SRR) on or embedded in a material, wherein the SRR includes a resonance portion, wherein the resonance portion is configured to resonate at a first frequency in response to an electromagnetic ping when a state of the material exceeds a threshold, and is configured to resonate at a second frequency in response to the electromagnetic ping when the state of the material is beneath the threshold.

In some aspects, the techniques described herein relate to a system, wherein the at least one sensor is integrated within a label configured to be removably printed onto a surface of a package or container, and the label includes one or more carbon-based inks.

In some aspects, the techniques described herein relate to a system, wherein the at least one sensor is carbon-based and is functionalized with a material configured to react with each analyte of a first group of analytes.

In some aspects, the techniques described herein relate to a system, wherein the at least one sensor includes a three-dimensional (3D) graphene layer, wherein the 3D graphene layer is biofunctionalized with a molecular recognition element configured to alter one or more electrical properties of the 3D graphene layer in response to exposure of the molecular recognition element to an analyte.

In some aspects, the techniques described herein relate to a system, wherein the molecular recognition element is a biological material configured to selectively bind with the analyte.

In some aspects, the techniques described herein relate to a system, wherein the at least one sensor is a three-dimensional (3D) carbon-based structure configured to guide a migration of electrically charged electrophoretic ink particles dispersed throughout the 3D carbon-based structure, the electrically charged electrophoretic ink particles responsive to application of a voltage to the 3D carbon-based structure.

In some aspects, the techniques described herein relate to a method, including: calibrating a sensor to detect one or more substances; receiving at least one multivariate response from the sensor; constructing a digital fingerprint based on the at least one multivariate response; and identifying a presence of any of the one or more substances based on the digital fingerprint.

In some aspects, the techniques described herein relate to a method, wherein the one or more substances is gaseous or vaporous.

In some aspects, the techniques described herein relate to a method, wherein the method further includes receiving a second multivariate response from the sensor.

In some aspects, the techniques described herein relate to a method, wherein receiving the at least one multivariate response includes receiving data from multiple variables simultaneously.

In some aspects, the techniques described herein relate to a method, wherein each of the multiple variables is associated with a particular characteristic including at least one: temperature, pressure, humidity, light intensity, motion, proximity, sound level, chemical composition, force, strain, heart rate, fingerprint, vibration, voltage, current, dielectric constant, permittivity, magnetic field, radiation, weight or mass, pH, conductivity, rate of change of position, rate of change of motion, dielectric loss, impedance, loss tangent, or magnetic susceptibility.

In some aspects, the techniques described herein relate to a method, wherein the digital fingerprint includes a discrete wavelength or combinations of wavelengths based on the at least one multivariate response.

In some aspects, the techniques described herein relate to a method, wherein the digital fingerprint includes a distinctive pattern or array of characteristics.

In some aspects, the techniques described herein relate to a method, where the sensor is an analyte sensor.

In some aspects, the techniques described herein relate to a method, wherein the one or more substances includes one or more analytes.

In some aspects, the techniques described herein relate to a method, where the sensor is a biosensor sensor.

In some aspects, the techniques described herein relate to a method, wherein digital fingerprint includes a dielectric constant outputted from the biosensor sensor.

In some aspects, the techniques described herein relate to a method, where the at least one multivariate response includes a multi-dimensional response.

In some aspects, the techniques described herein relate to a method, where the multi-dimensional response includes a first response represented by a first signal and a second response represented by a second signal.

In some aspects, the techniques described herein relate to a method, where the multi-dimensional response includes a combination of responses including a first response associated with a first analyte and a second response associated with a second analyte.

In some aspects, the techniques described herein relate to a method, wherein the sensor is formed from a three-dimensional (3D) monolithic carbonaceous growth.

In some aspects, the techniques described herein relate to a method, wherein a resonant frequency of the 3D monolithic carbonaceous growth is based at least in part on either or both of a permittivity and a permeability of a material associated with the sensor.

In some aspects, the techniques described herein relate to a method, wherein the sensor is a split-ring resonator (SRR) on or embedded in a material, wherein the SRR includes a resonance portion, wherein the resonance portion is configured to resonate at a first frequency in response to an electromagnetic ping when a state of the material exceeds a threshold, and is configured to resonate at a second frequency in response to the electromagnetic ping when the state of the material is beneath the threshold.

In some aspects, the techniques described herein relate to a method, wherein the sensor is integrated within a label configured to be removably printed onto a surface of a package or container, and the label includes one or more carbon-based inks.

In some aspects, the techniques described herein relate to a method, wherein the sensor is carbon-based and is functionalized with a material configured to react with each analyte of a first group of analytes.

In some aspects, the techniques described herein relate to a method, wherein the sensor includes a three-dimensional (3D) graphene layer, wherein the 3D graphene layer is biofunctionalized with a molecular recognition element configured to alter one or more electrical properties of the 3D graphene layer in response to exposure of the molecular recognition element to an analyte.

In some aspects, the techniques described herein relate to a method, wherein the molecular recognition element is a biological material configured to selectively bind with the analyte.

In some aspects, the techniques described herein relate to a method, wherein the sensor is a three-dimensional (3D) carbon-based structure configured to guide a migration of electrically charged electrophoretic ink particles dispersed throughout the 3D carbon-based structure, the electrically charged electrophoretic ink particles responsive to application of a voltage to the 3D carbon-based structure.

In some aspects, the techniques described herein relate to a method, including: emitting radiant energy from a leaky antenna installed within a confined space; detecting, using the leaky antenna, a first package within the confined space at a first position and a first time associated with a resonant sensor of the first package; detecting, using the leaky antenna, the first package within the confined space at a second position and a second time associated with the resonant sensor of the first package; measuring a volumetric fill of the first package within the confined space using the resonant sensor; accumulating the volumetric fill with measurements from other packages; and based on the accumulation, determining an overall fill factor of the confined space.

In some aspects, the techniques described herein relate to a method, wherein the first position and the first time represent a first time domain spatial mapping.

In some aspects, the techniques described herein relate to a method, wherein the second position and the second time represent a second time domain spatial mapping.

In some aspects, the techniques described herein relate to a method, further including tracking the first package as it moves from the first position to the second position.

In some aspects, the techniques described herein relate to a method, wherein the resonant sensor is located on a label of the first package.

In some aspects, the techniques described herein relate to a method, wherein the resonant sensor including package data including package size and package weight.

In some aspects, the techniques described herein relate to a method, further including tracking all packages, including the first package, within the confined space.

In some aspects, the techniques described herein relate to a method, wherein the tracking including filtering out non-moving objects of the confined space.

In some aspects, the techniques described herein relate to a method, further including, detecting, using the leaky antenna, that the first package has been removed from the confined space.

In some aspects, the techniques described herein relate to a method, further including updating the accumulation of the fill factor of the confined space based on the first package having been removed from the confined space.

In some aspects, the techniques described herein relate to a method, wherein the confined space includes one or more of an underground tunnel, mines, building, airplane, or shipping container.

In some aspects, the techniques described herein relate to a method, wherein the resonant sensor is configured to absorb radio frequency energy from the leaky antenna.

In some aspects, the techniques described herein relate to a method, wherein the absorption is detected by the leaky antenna.

In some aspects, the techniques described herein relate to a method, wherein the detecting the first package within the confined space at the first position and the first time occurs via a daughter-wavelet transform analysis.

In some aspects, the techniques described herein relate to a method, wherein the detecting the first package within the confined space at the second position and the second time occurs via a daughter-wavelet transform analysis.

In some aspects, the techniques described herein relate to a method, wherein the resonant sensor is formed from a three-dimensional (3D) monolithic carbonaceous growth.

In some aspects, the techniques described herein relate to a method, wherein a resonant frequency of the 3D monolithic carbonaceous growth is based at least in part on either or both of a permittivity and a permeability of a material associated with the resonant sensor.

In some aspects, the techniques described herein relate to a method, wherein the sensor is a split-ring resonator (SRR) on or embedded in a material, wherein the SRR includes a resonance portion, wherein the resonance portion is configured to resonate at a first frequency in response to an electromagnetic ping when a state of the material exceeds a threshold, and is configured to resonate at a second frequency in response to the electromagnetic ping when the state of the material is beneath the threshold.

In some aspects, the techniques described herein relate to a method, wherein the resonant sensor is integrated within a label configured to be removably printed onto a surface of a package or container, and the label includes one or more carbon-based inks.

In some aspects, the techniques described herein relate to a method, wherein the sensor is a three-dimensional (3D) carbon-based structure configured to guide a migration of electrically charged electrophoretic ink particles dispersed throughout the 3D carbon-based structure, the electrically charged electrophoretic ink particles responsive to application of a voltage to the 3D carbon-based structure.

In some aspects, the techniques described herein relate to a computer program product including computer executable instructions stored on a non-transitory computer readable medium that when executed by a processor instruct the processor to: receive greenhouse gas emissions data from sensors associated with respective particular units of a particular product; process the greenhouse gas emissions data over all of the respective particular units; allocate at least a portion of the greenhouse gas emissions data to the particular product; aggregate the at least a portion of the greenhouse gas emissions data to previously measured greenhouse gas emissions data of the particular units of the product; and calculate a lifetime measurement of greenhouse gas emissions data for the particular units of the particular product based on the aggregation.

The foregoing combination of elements advances over legacy techniques, at least in that practice of the foregoing computer executable instructions relies on, at least in part, the recited sensors and/or interrogators that operate in a domain beyond human cognition. Moreover, whereas legacy attempts at calculating measurements of greenhouse gasses have relied solely on numeric estimates and/or mathematical calculations, the disclosed embodiments (e.g., the foregoing computer program product) operate by transforming transitory signals derived from sensors (e.g., sensors associated with particular units of particular products) into non-transitory representations, which non-transitory representations are in turn able to be used in a computer instruction (e.g., as an operand value, or as a computer address pointer that resolves one or more levels of indirection to a value). As referred to herein, a computer program product may include multiple sets of computer executable instructions, all of which are stored in/on a non-transitory computer readable medium and may involve many processors, individual ones of which processors are able to execute the multiple sets of computer executable instructions either serially or at least partially interleaved, or in parallel. For example, the execution of the foregoing computer executable instructions might rely on all, or some of, or all of, an edge device, a fog device, a middleware platform, a computing cluster or node thereof, a wireless handheld server, a transceiver, etc.

In some aspects, the techniques described herein relate to a computer program product, wherein the greenhouse gas emissions data include scope 3 emissions.

In some aspects, the techniques described herein relate to a computer program product, wherein the greenhouse gas emissions data are based on two or more of: raw materials emissions, manufacturing emissions, distributing emissions, using emissions disposing, or recycling emissions.

In some aspects, the techniques described herein relate to a computer program product, wherein the greenhouse gas emissions data is based on emissions from using the particular product.

In some aspects, the techniques described herein relate to a computer program product, wherein the greenhouse gas emissions data is based on chain supply emissions relating to the particular product.

In some aspects, the techniques described herein relate to a computer program product, wherein the greenhouse gas emissions data is based on direct emissions associated with the particular product.

In some aspects, the techniques described herein relate to a computer program product, wherein the greenhouse gas emissions data is based on indirect emissions associated with the particular product.

In some aspects, the techniques described herein relate to a computer program product, further including computer executable instructions that instruct the processor to calculate a net greenhouse gas emission output by comparing the lifetime measurement of greenhouse gas emissions data to a predetermined allowance.

In some aspects, the techniques described herein relate to a computer program product, further including computer executable instructions that instruct the processor to, when the net greenhouse gas emission output results in a positive net, initiate a sell transaction to sell carbon credits to a carbon credit sensing network based on the positive net.

In some aspects, the techniques described herein relate to a computer program product, further including computer executable instructions that instruct the processor to, when the net greenhouse gas emission output results in a negative net, initiate a buy transaction to purchase carbon credits from a carbon credit sensing network to offset the negative net.

In some aspects, the techniques described herein relate to a computer program product, wherein the sensors are formed from a three-dimensional (3D) monolithic carbonaceous growth.

In some aspects, the techniques described herein relate to a computer program product, wherein a resonant frequency of the 3D monolithic carbonaceous growth is based at least in part on either or both of a permittivity and a permeability of a material associated with the sensors.

In some aspects, the techniques described herein relate to a computer program product, wherein the sensors is a split-ring resonator (SRR) on or embedded in a material, wherein the SRR includes a resonance portion, wherein the resonance portion is configured to resonate at a first frequency in response to an electromagnetic ping when a state of the material exceeds a threshold, and is configured to resonate at a second frequency in response to the electromagnetic ping when the state of the material is beneath the threshold.

In some aspects, the techniques described herein relate to a computer program product, wherein the sensors is integrated within a label configured to be removably printed onto a surface of a package or container, and the label includes one or more carbon-based inks.

In some aspects, the techniques described herein relate to a computer program product, wherein the sensors is carbon-based and is functionalized with a material configured to react with each analyte of a first group of analytes.

In some aspects, the techniques described herein relate to a computer program product, wherein the sensors include a three-dimensional (3D) graphene layer, wherein the 3D graphene layer is biofunctionalized with a molecular recognition element configured to alter one or more electrical properties of the 3D graphene layer in response to exposure of the molecular recognition element to an analyte.

In some aspects, the techniques described herein relate to a computer program product, wherein the molecular recognition element is a biological material configured to selectively bind with the analyte.

In some aspects, the techniques described herein relate to a computer program product, wherein the sensors are a three-dimensional (3D) carbon-based structure configured to guide a migration of electrically charged electrophoretic ink particles dispersed throughout the 3D carbon-based structure, the electrically charged electrophoretic ink particles responsive to application of a voltage to the 3D carbon-based structure.

In some aspects, the techniques described herein relate to a method, including: receiving greenhouse gas emissions data from sensors; process the greenhouse gas emissions data to determine total greenhouse gas emissions output; calculate a net greenhouse gas emissions output by comparing the total greenhouse gas emissions output to a predetermined allowance; when the net greenhouse gas emissions output results in a positive net, initiate a sell transaction to sell carbon credits to a carbon credit sensing network based on the positive net; and when the net greenhouse gas emissions output results in a negative net, initiate a buy transaction to purchase carbon credits from the carbon credit sensing network to offset the negative net.

In some aspects, the techniques described herein relate to a computer program product including computer executable instructions stored on a non-transitory computer readable medium that when executed by a processor instruct the processor to: download an application configured to track a lifetime measurement of greenhouse gas emissions data; receive a first input, using the application, wherein the first input includes a selection of a first product; receive, at the application, greenhouse gas emissions data relating to the first product, wherein the greenhouse gas emissions data is sensed using sensors; and display a net greenhouse gas emission output for the first product based on the greenhouse gas emissions data.

In some aspects, the techniques described herein relate to a computer program product including computer executable instructions stored on a non-transitory computer readable medium that when executed by a processor instruct the processor to: receive a first input, using a mobile device, wherein the first input includes a selection of a first product; receive, from a sensor server to the mobile device, greenhouse gas emissions data relating to the first product, wherein the greenhouse gas emissions data is sensed using sensors; and display, using the mobile device, a net greenhouse gas emissions output for the first product based on the greenhouse gas emissions data.

BRIEF DESCRIPTION OF THE DRAWINGS

FIG. 2F1 illustrates a sensor and device platform, in accordance with one embodiment.

FIG. 2F2 illustrates delivery of commands from a sensors-as-a-service platform to sensor nodes deployed as edge devices, in accordance with one embodiment.

FIG. 2F3 illustrates a system configured to continually interrogate a wearable sensor, in accordance with one embodiment.

FIG. 2F4 illustrates a system for updating sensor data collection and analysis capabilities, in accordance with one embodiment.

FIG. 2F5 illustrates an edge device application within a sensors-as-a-service ecosystem, in accordance with one embodiment.

FIG. 2F6 illustrates how Internet fog middleware platforms communicate with a sensors-as-a-service platform, in accordance with one embodiment.

FIG. 2F7 illustrates how local sensor systems communicate with a sensors-as-a-service platform as well as other third parties, in accordance with one embodiment.

FIG. 3 illustrates a digital signature based on multivariate responses, in accordance with one embodiment.

FIG. 6 illustrates a system for sensor learning, in accordance with one embodiment.

FIG. 7 illustrates a training system for sensor learning, in accordance with one embodiment.

FIGS. 16-1A-16-1B show an exploded view of layers of a printed battery, such layers including elements of a cathode and anode portion, respectively.

FIGS. 16-1C1-16-1C2 show folding techniques related to activating aspects of the printed battery shown in FIGS. 16-3A-16-3B.

FIGS. 16-1D1-16-1D3 discuss example printed battery features.

FIG. 16-1E shows a flowchart related to a method for activating an example printed battery.

FIG. 16-2 shows an example schematic for a traditional Li-ion battery incorporating the presently disclosed 3D self-assembled binder-less mesoporous carbon-based particles.

FIGS. 16-3A-16-3F show illustrative schematic representations, at various magnification levels, and/or micrographs of a 3D self-assembled binder-less 3D mesoporous carbon-based particle having tunable electrical pathways and ionic conduits throughout the thickness thereof.

FIGS. 16-3G1 and 16-3G2 show a micrograph of an example enlarged section of the 3D self-assembled binder-less mesoporous carbon-based particle shown in FIGS. 16-3A-16-1J.

FIG. 16-3H shows an illustrative schematic representation of a multi-layered carbon-based scaffolded structure, each layer comprising various concentrations of the 3D mesoporous carbon-based particles shown in FIGS. 16-3A-16-3F, deposited on an electrically conductive substrate.

FIG. 16-4A shows an illustrative schematic representation of a multi-layered carbon-based scaffolded structure, each layer comprising various concentrations of the 3D mesoporous carbon-based particles shown in FIGS. 16-3A-16-3J, deposited on an electrically conductive substrate, the multi-layered carbon-based scaffolded structure having lithium metal infused into nanoscale gaps therein.

FIG. 16-4B shows an illustrative schematic representation of a series of plasma spray torches oriented in a substantially continuous sequence above a roll-to-roll (R2R) processing apparatus, where the plasma spray torches are configured to grow the 3D mesoporous carbon-based particles in an incremental layer-by-layer manner.

FIGS. 16-5A-16-5B show various photographs and/or micrographs related of example variants of the 3D mesoporous carbon-based particles shown in FIGS. 16-3A-16-3J.

FIGS. 16-5C1-16-5C3 show examples related to a printed battery featuring pressure-based electrolyte release capabilities.

FIGS. 16-5C4-16-5C5 shows an example of metal-air battery chemistry including an air (cathode) electrode reaction and a metal (anode) electrode reaction.

FIG. 16-6A-16-6C shows views of a printed battery that can be activated at a point-of-use.

FIGS. 16-7A-16-8A show self-aligning geometry that self-aligns even in presence of lateral misregistration.

FIG. 16-8B shows an example listing of printed battery properties and advantages.

FIG. 16-9 illustrates a configuration of an anode and cathode interdigitated therewith, both the anode and cathode being disposed on a component layer, which is disposed on a substrate layer.

FIG. 16-10 an exploded view of layers of an example printed battery, such layers including elements of a cathode and anode portion, respectively.

FIG. 16-11 an exploded view of layers of an example printed battery, such layers including elements of a cathode and anode portion, respectively.

FIGS. 16-12A-16-12B show an example where printed batteries are activated by an external source.

FIGS. 16-12C-16-18 show information, targets, properties and related materials for printed batteries according to a variety of examples of the presently disclosed implementations.

FIGS. 16-19A and 16-19B show scanning electron microscope (SEM) images from particulate carbon containing graphene, in accordance with some embodiments.

FIGS. 16-20A and 16-20B show transmission electron microscope (TEM) images from particulate carbon containing graphene, in accordance with some embodiments.

FIG. 16-21 is a plan view schematic of an electrochemical gas sensor, in accordance with some embodiments.

FIG. 16-22 is a table that lists examples of possible redox mediators that may be used, in accordance with some embodiments.

FIG. 16-23 shows an example of an electrochemical sensor where a first electrode and a second electrode are configured as interdigitated fingers, in accordance with some embodiments.

FIG. 16-24 shows an example of a chemical sensor in which high frequency spectroscopy is used as the detection method, in accordance with some embodiments.

FIG. 16-25A shows a non-limiting example of a resonant gas sensor inside view and plan view, in accordance with some embodiments.

FIG. 16-25B shows an example of a response from a resonant gas sensor in the presence of an analyte of interest, in accordance with some embodiments.

FIGS. 16-25C and 16-25D show non-limiting examples of resonant gas sensors inside view and plan view, in accordance with some embodiments.

FIG. 16-25E shows a non-limiting example of a resonant gas sensor with a sensing material containing particulate carbon, in accordance with some embodiments.

FIG. 16-25F shows a non-limiting example of a resonant gas sensor inside view and plan view, in accordance with some embodiments.

FIGS. 16-26A-16-26C show a time evolution of example spectra produced when an analyte is detected by a resonant gas sensor, in accordance with some embodiments.

FIG. 16-27 shows a non-limiting example of a chemiluminescent gas sensor, in accordance with some embodiments.

FIG. 16-28 shows a non-limiting example of a sensor system in which multiple individual chemical sensors are used for detecting an analyte, in accordance with some embodiments.

FIG. 17-1 shows a diagram depicting an example biosensor field-effect transistor (BioFET), according to some implementations.

FIG. 17-2 shows a top-down view of an array including multiple BioFETs of FIG. 17-1, according to some implementations.

FIG. 17-3 shows a diagram depicting a process for manufacturing a BioFET, according to some implementations.

FIGS. 17-4A and 17-4B show scanning electron microscope (SEM) images of an example 3D graphene, according to some implementations.

FIGS. 17-5A and 17-5B show transmission electron microscope (TEM) images of an example 3D graphene, according to some implementations.

FIGS. 17-6A and 17-6B show TEM images of an example 3D graphene, according to other implementations.

FIGS. 17-7 shows TEM images of an example 3D graphene, according to some other implementations.

FIG. 17-8 shows a Raman spectra of an example 3D graphene, according to some implementations.

FIG. 17-9 shows an x-ray diffraction (XRD) analysis result for the example 3D graphene of FIG. 17-8, according to some implementations.

FIG. 17-10 shows a graph showing particle size distribution for the example 3D graphene of FIG. 17-8, according to some implementations.

FIG. 17-11 shows a graph depicting a shift in Dirac voltage detected by the BioFET of FIG. 17-1, according to some implementations.

FIG. 17-12 shows a graph depicting an example real-time response of the BioFET of FIG. 17-1, according to some other implementations.

FIG. 17-13 shows a graph depicting an example real-time response of the BioFET of FIG. 17-1, according to some other implementations.

FIG. 17-14A shows a graph depicting transfer curves of a two-dimensional graphene-based BioFET, according to some implementations.

FIG. 17-14B shows a graph depicting transfer curves of the BioFET of FIG. 17-1, according to other implementations.

FIG. 17-15 shows a graph depicting a shift in Dirac voltage detected by the BioFET of FIG. 17-1, according to other implementations.

FIGS. 17-16A-17-16M show flowcharts depicting example operations for using the BioFET of FIG. 17-1 or the array of FIG. 17-2, according to some implementations.

FIGS. 17-17A-17-17V show flowcharts depicting example operations for manufacturing the BioFET of FIG. 17-1, according to some implementations.

FIG. 18-1A shows a side cut-away schematic view 18-110A of an example conventional EPD device 18-100A, in accordance with some implementations.

FIG. 18-1B shows a conventional microencapsulated electrophoretic display, in accordance with some implementations.

FIG. 18-1C shows a conventional PMEPD 18-100C using Microcup technology, in accordance with some implementations.

FIG. 18-1D shows a cross-sectional schematic diagram of an EPD device that includes a structure that is carbon-based, in accordance with some implementations.

FIG. 18-1E shows an example EPD device that include carbon-inclusive structures, in accordance with some implementations.

FIG. 18-2 shows a schematic diagram illustrating a structure for an electrophoretic display (such as that shown in FIG. 18-1), in accordance with some implementations.

FIGS. 18-3A-18-3B show scanning electron micrograph images of a structure (such as that shown in FIG. 18-2), in accordance with some implementations.

FIGS. 18-4A-18-4B are schematic diagrams representing methods for making a structure (such as that shown in FIG. 18-2) for the electrophoretic visual display (such as that shown in FIG. 18-1), in accordance with some implementations.

FIG. 18-5 shows a cross-sectional view of an example electrophoretic visual display, in accordance with some implementations.

FIG. 18-6 shows a cross-sectional view of an example electrophoretic visual display, in accordance with some implementations.

FIG. 18-7A shows a schematic diagram representing a method of producing a carbon ink for an electrophoretic visual display, in accordance with some implementations.

FIG. 18-7B shows a schematic diagram representing another method of producing a carbon ink for an electrophoretic visual display, in accordance with some implementations.

FIG. 18-8 shows a cross-sectional schematic of an example display configuration for an electrophoretic visual display, in accordance with some implementations.

FIG. 18-9 shows a cross-sectional schematic of an example display configuration for an electrophoretic visual display, in accordance with some implementations.

FIG. 18-10 shows a cross-sectional schematic of an example display configuration for an electrophoretic visual display, in accordance with some implementations.

FIG. 18-11 shows a cross-sectional schematic of an example display configuration for an electrophoretic visual display, in accordance with some implementations.

FIG. 18-12 shows an image of an example electrophoretic display cell, in accordance with some implementations.

FIG. 18-13 shows an image of an example electrophoretic display cell, in accordance with some implementations.

FIG. 18-14 shows an image of an example electrophoretic display cell, in accordance with some implementations.

FIG. 18-15A shows a cut-away schematic diagram of a multi-layered example electrophoretic display, in accordance with some implementations.

Figure 15A:
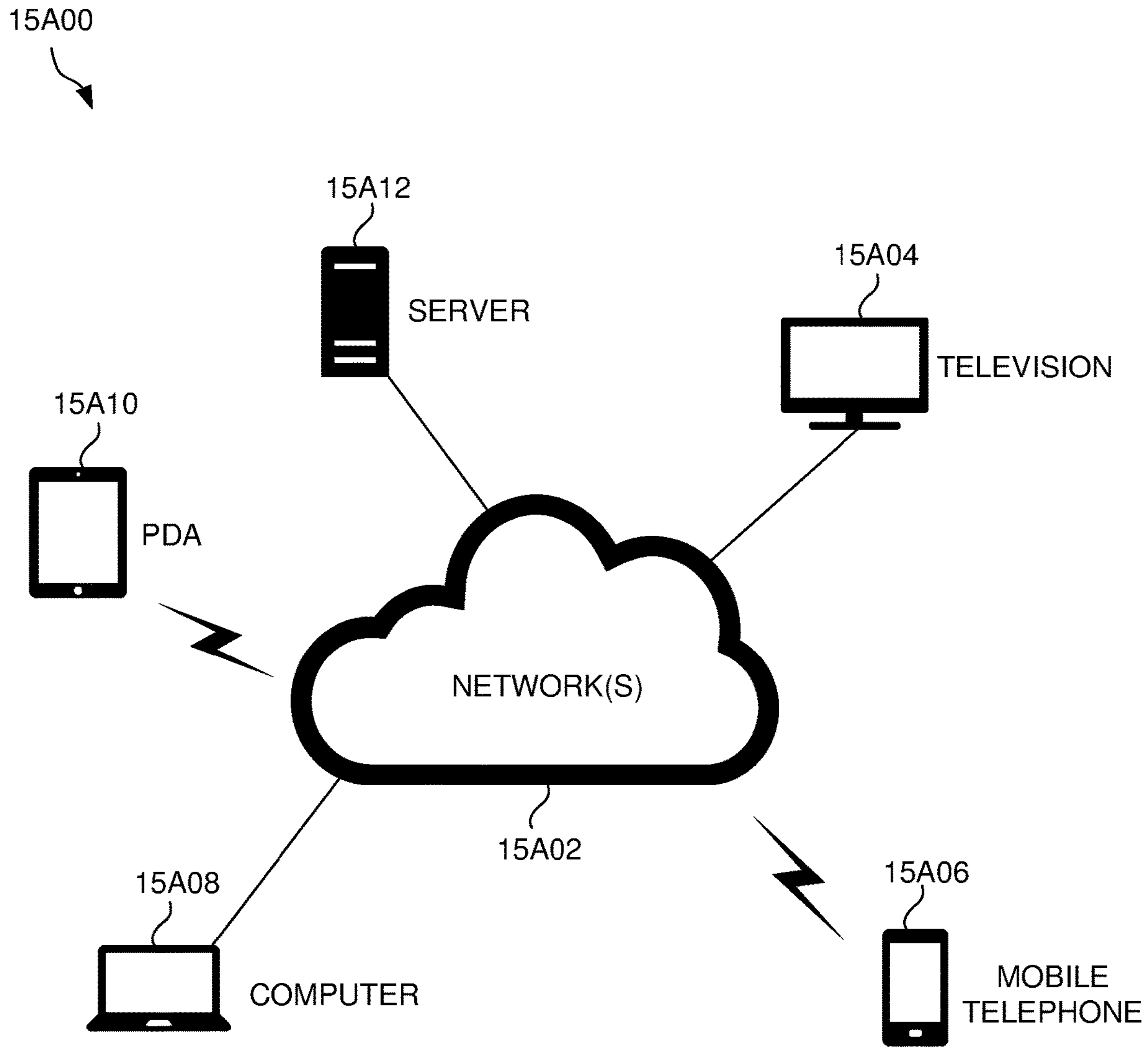
FIG. 15A illustrates a network architecture, in accordance with one possible embodiment.
Figure 15B:
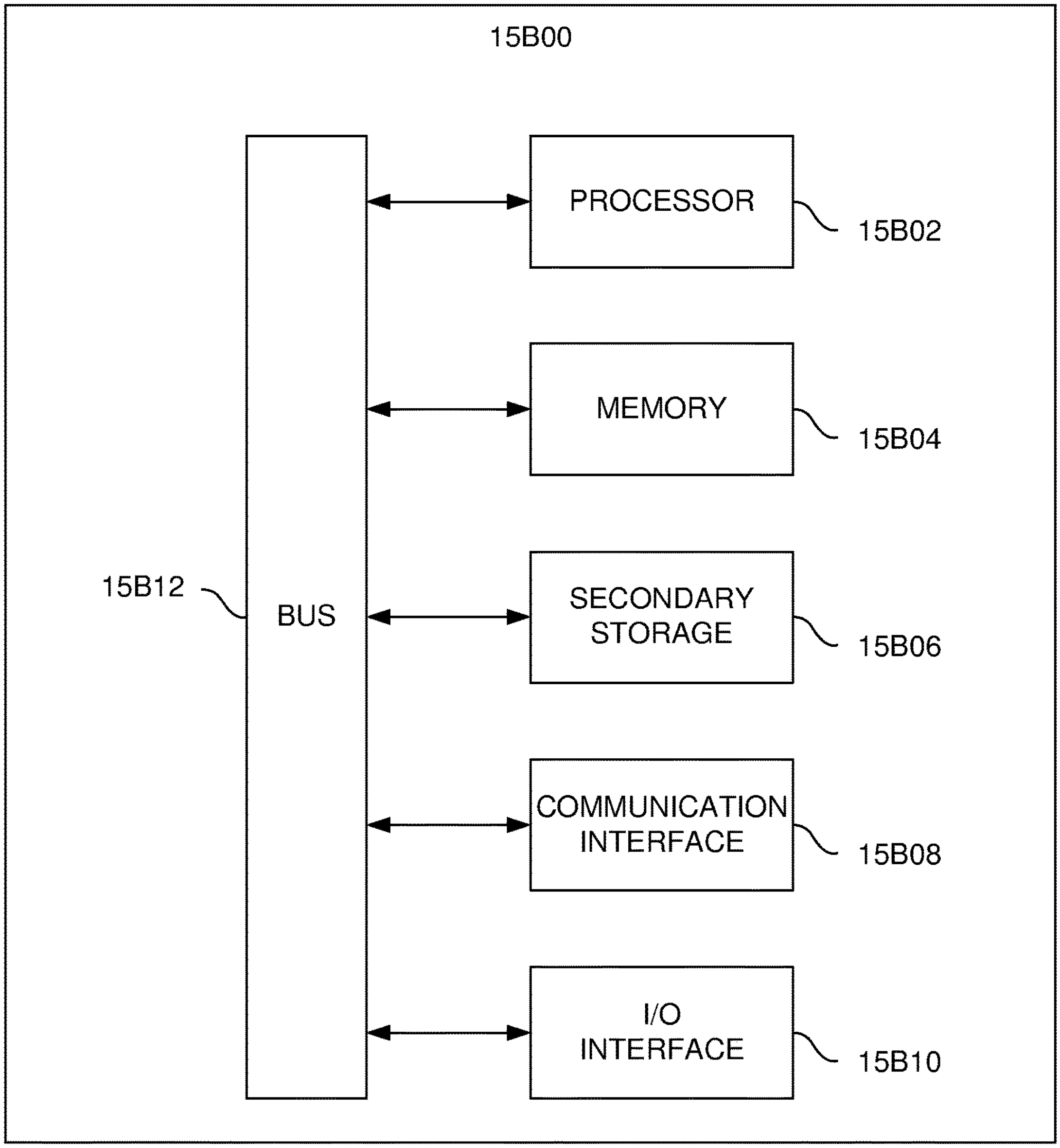
FIG. 15B illustrates an exemplary system, in accordance with one embodiment.
Figures 1A, 1B, 16:
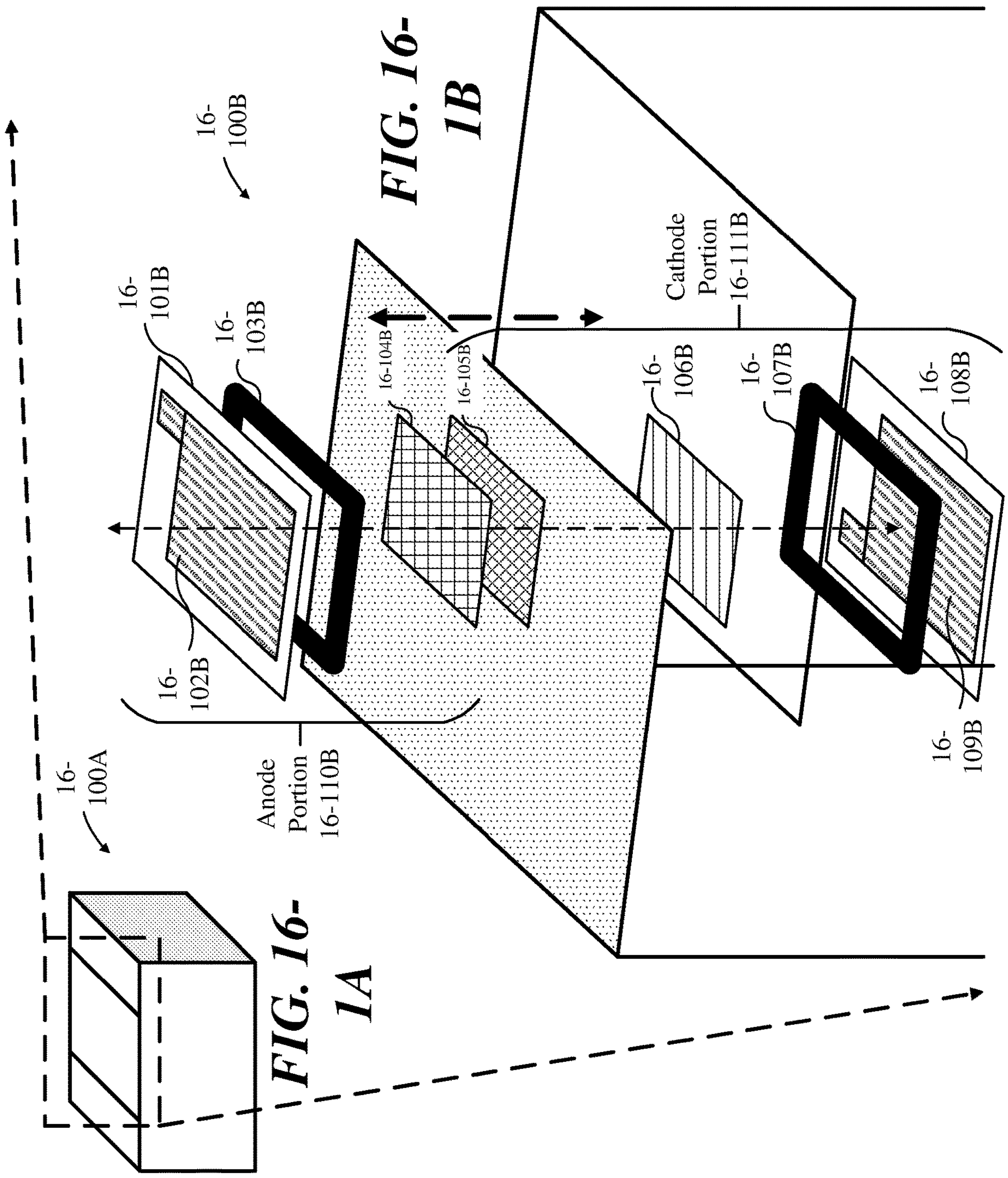
Figures 1E, 16:
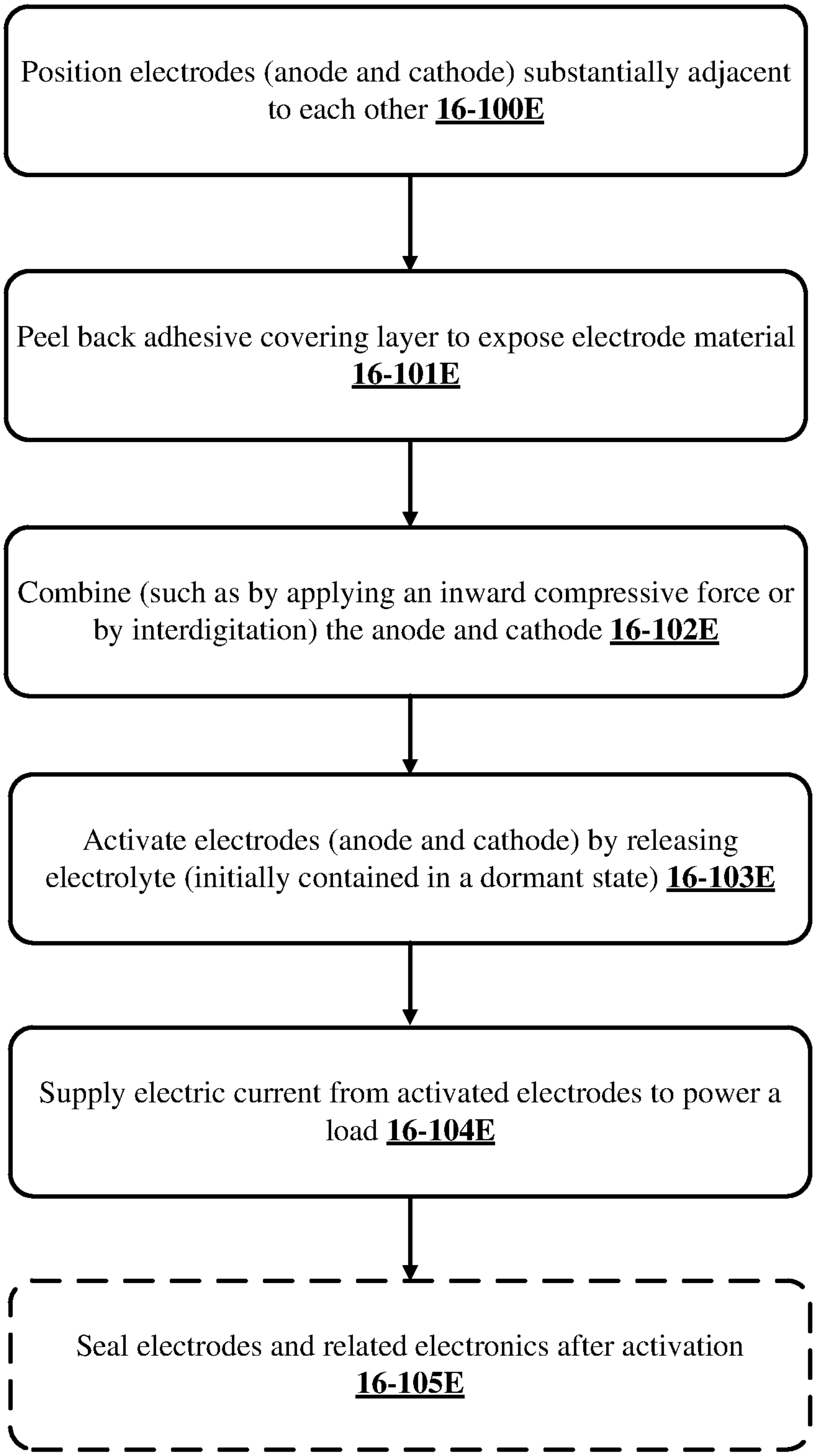
Figures 2, 16:
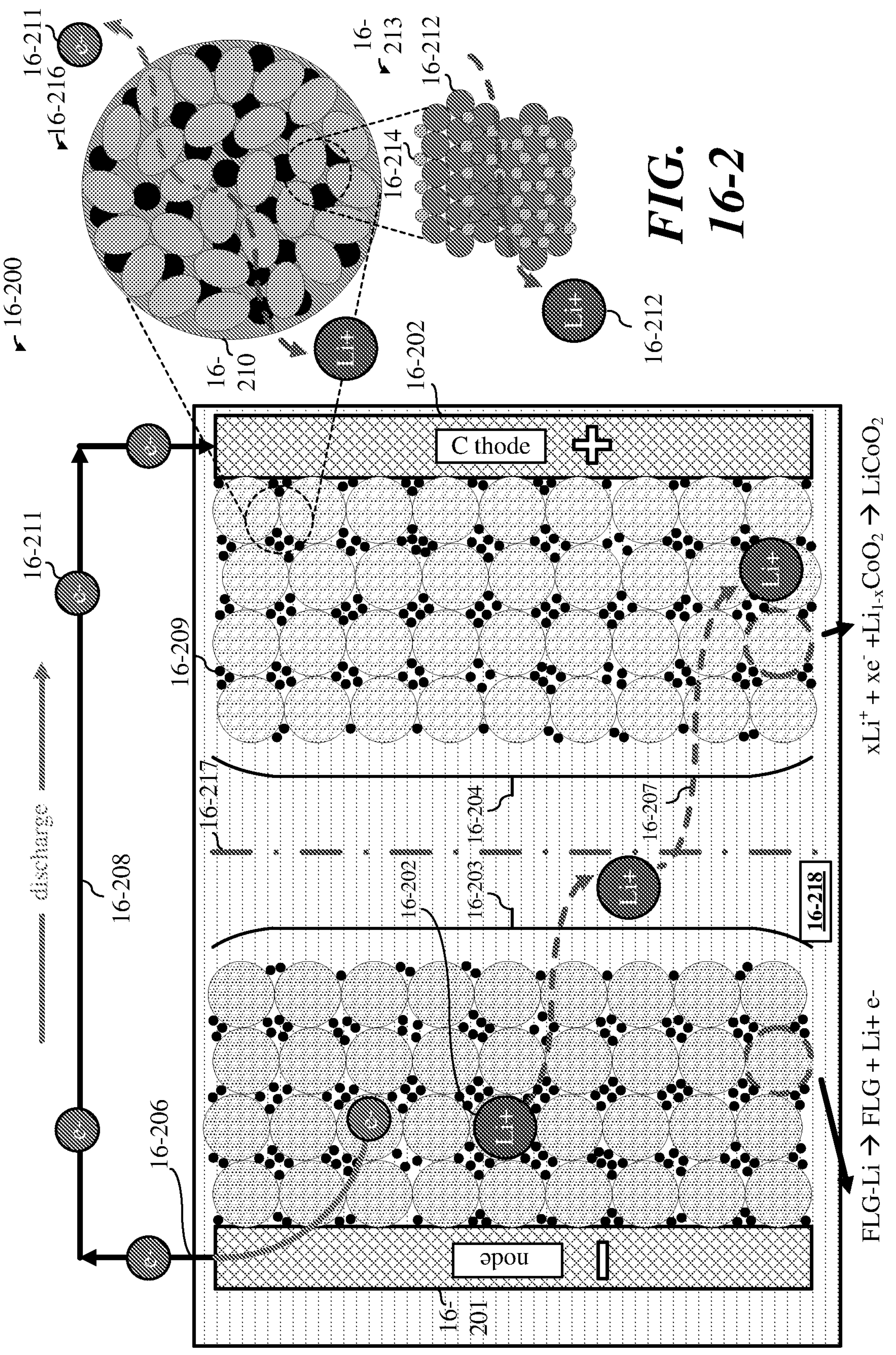
Figures 3D, 16:
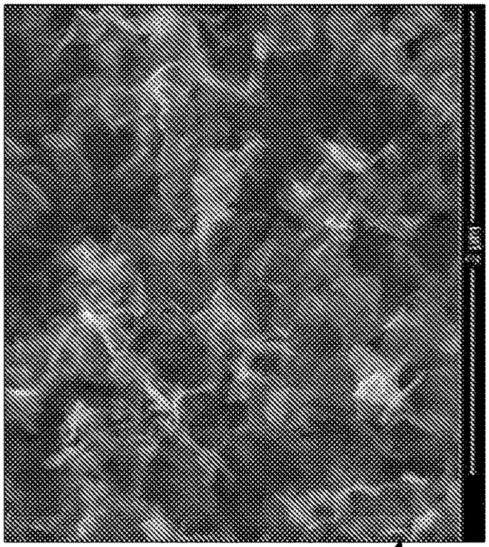
Figures 3B, 16:
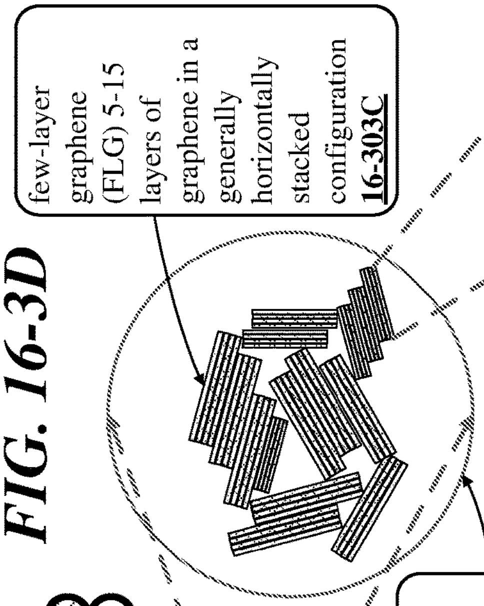
Figures 3C, 16:
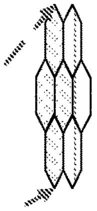
Figures 3A, 16:
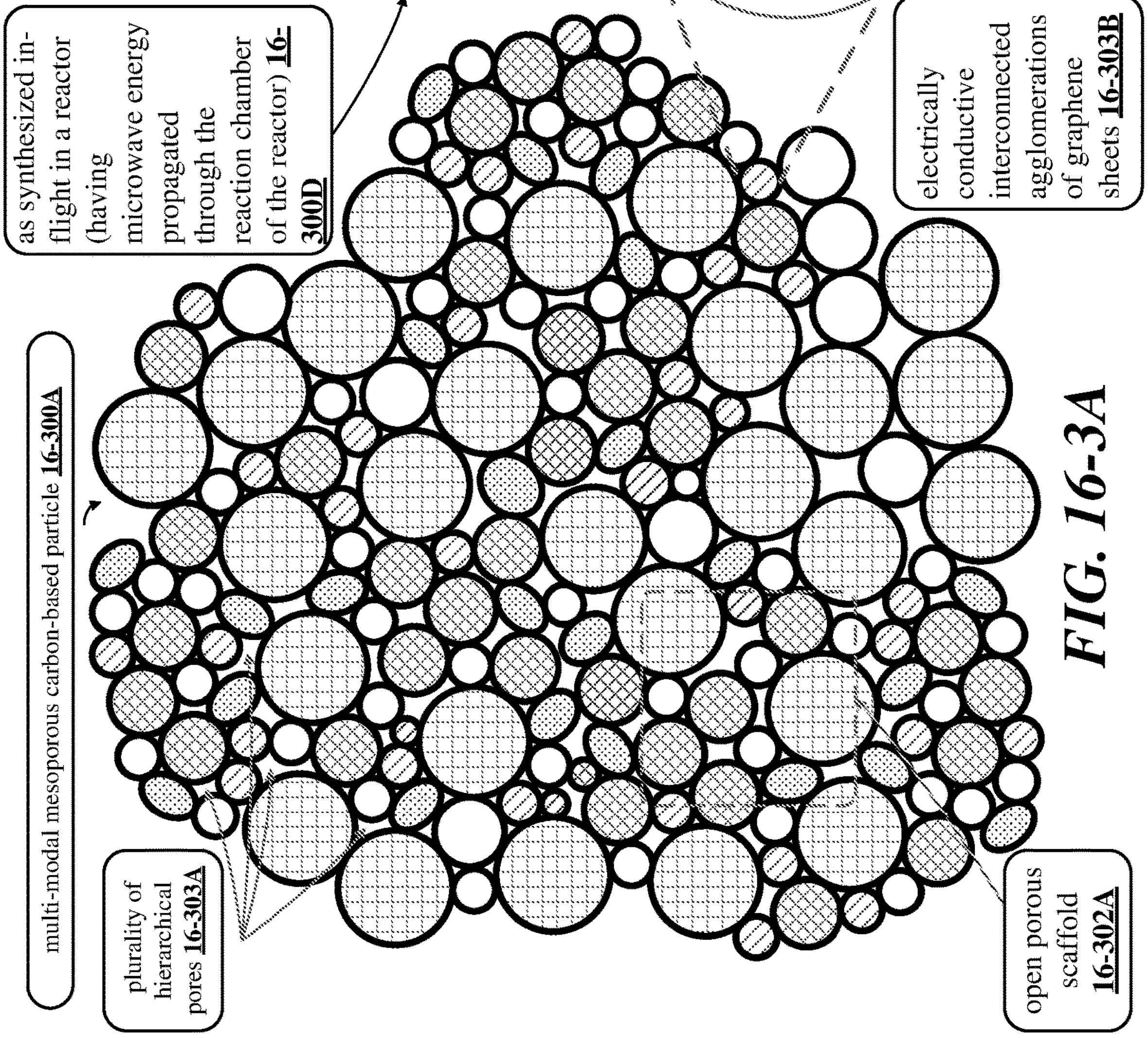
Figures 3E, 3F, 16:
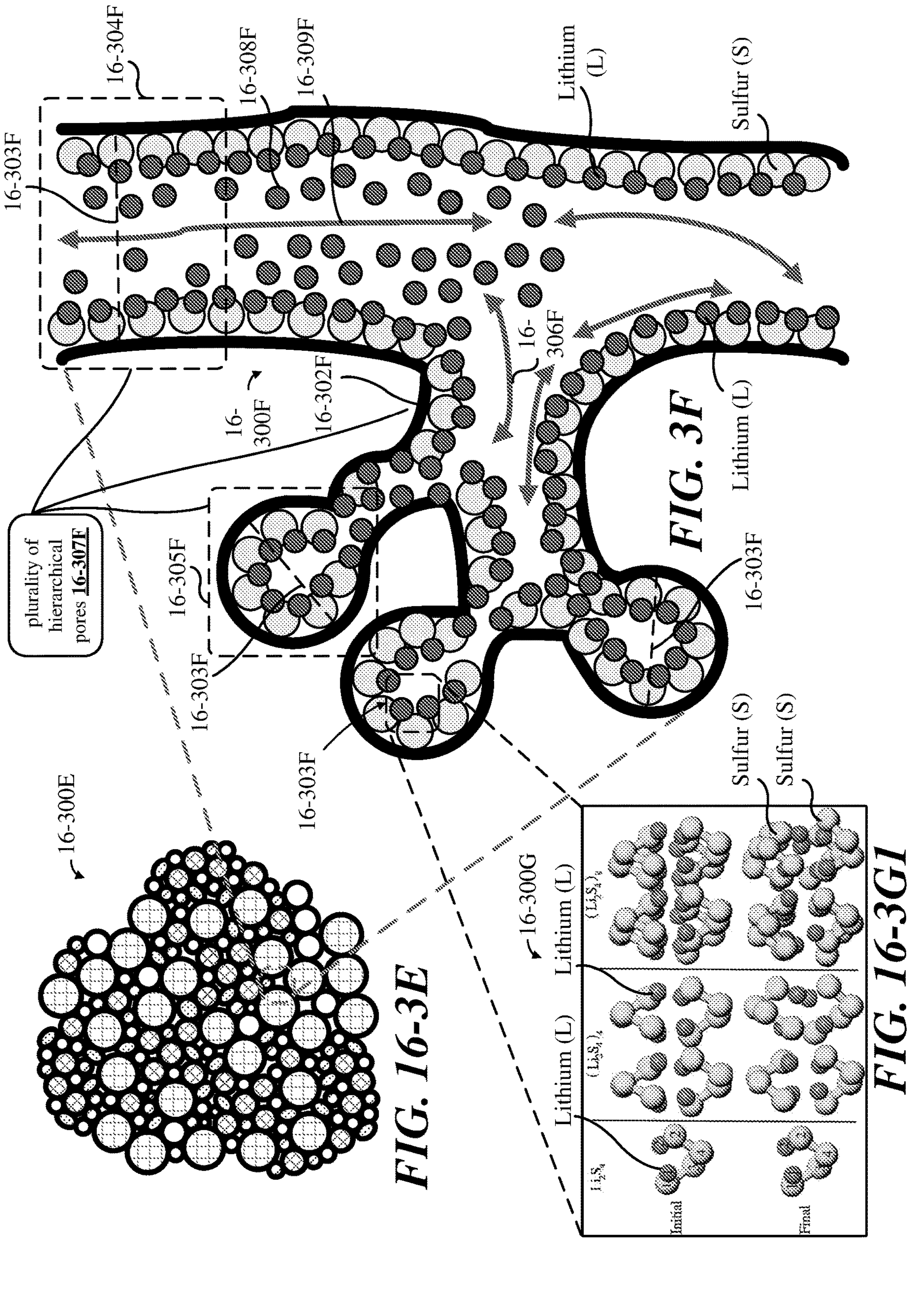
Figure 16:
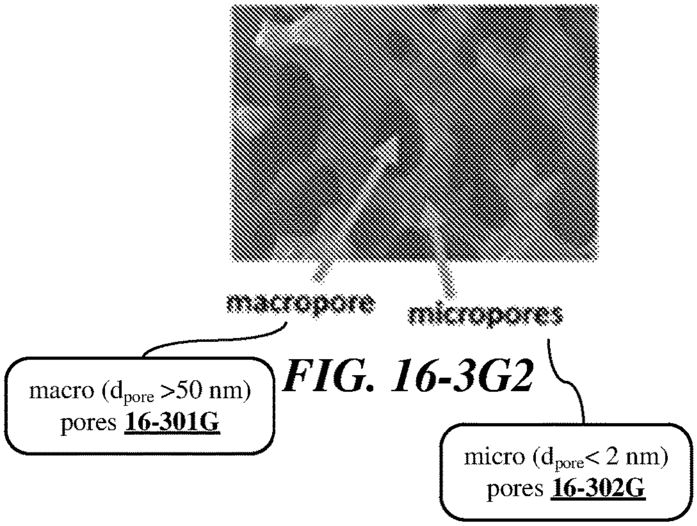
Figure 3H:
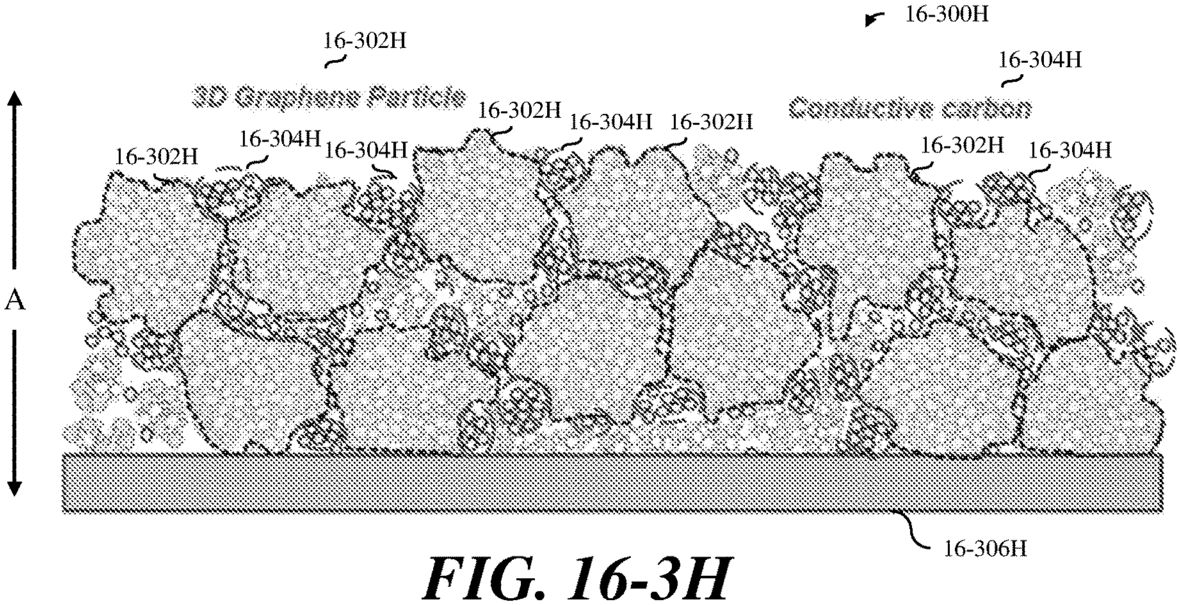
Figures 4A, 16:
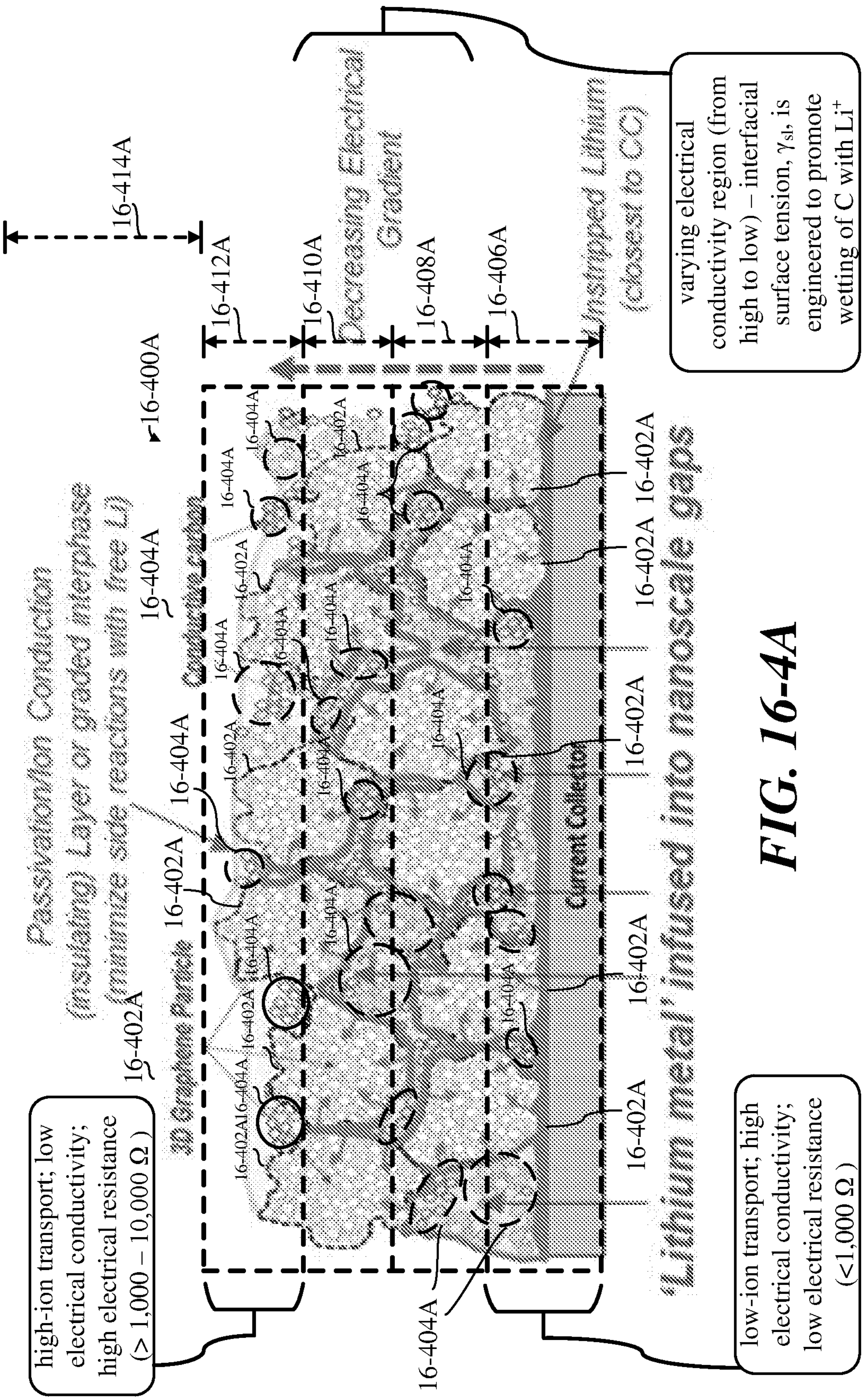
Figures 4B, 16:
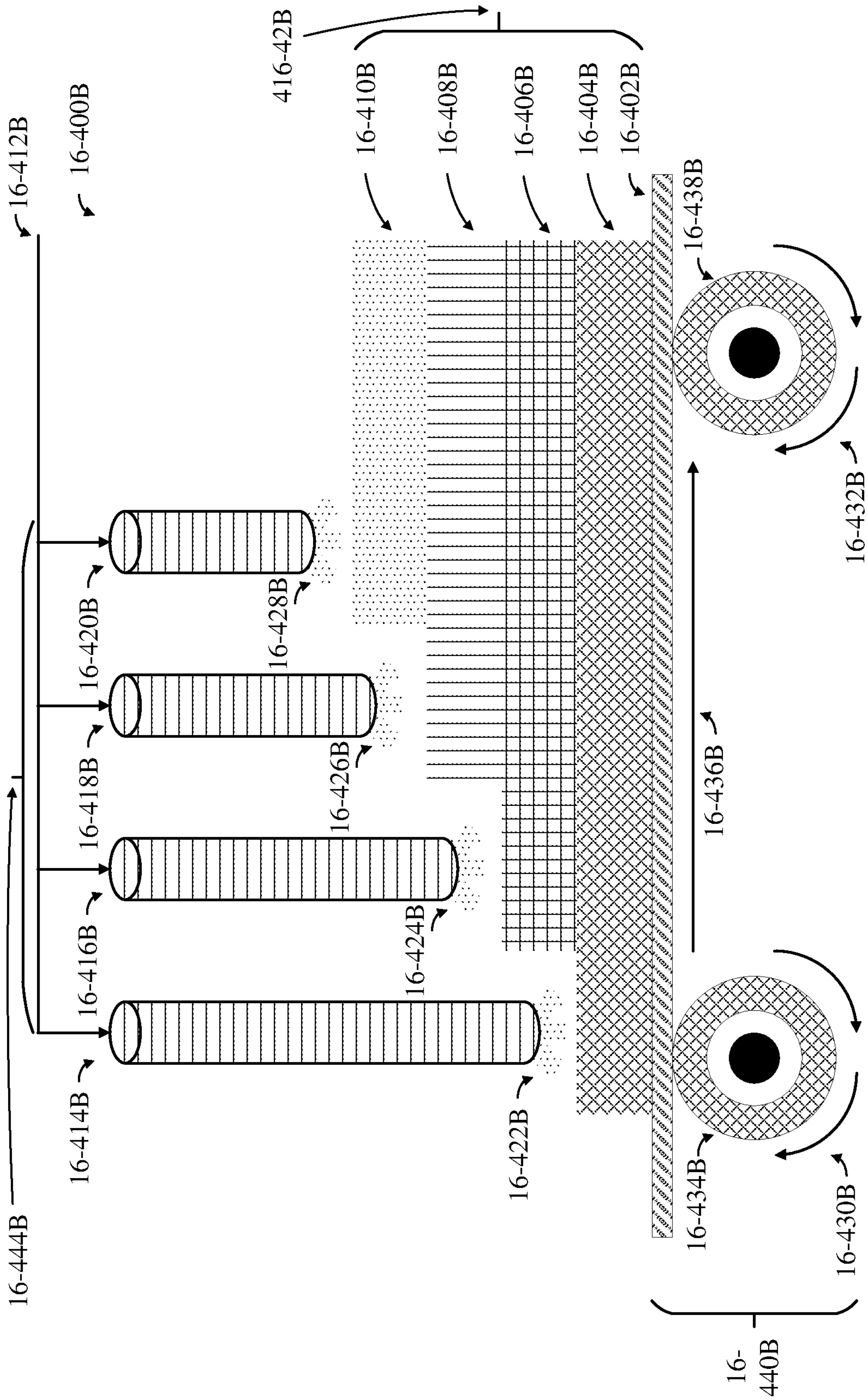
Figures 5A, 16:
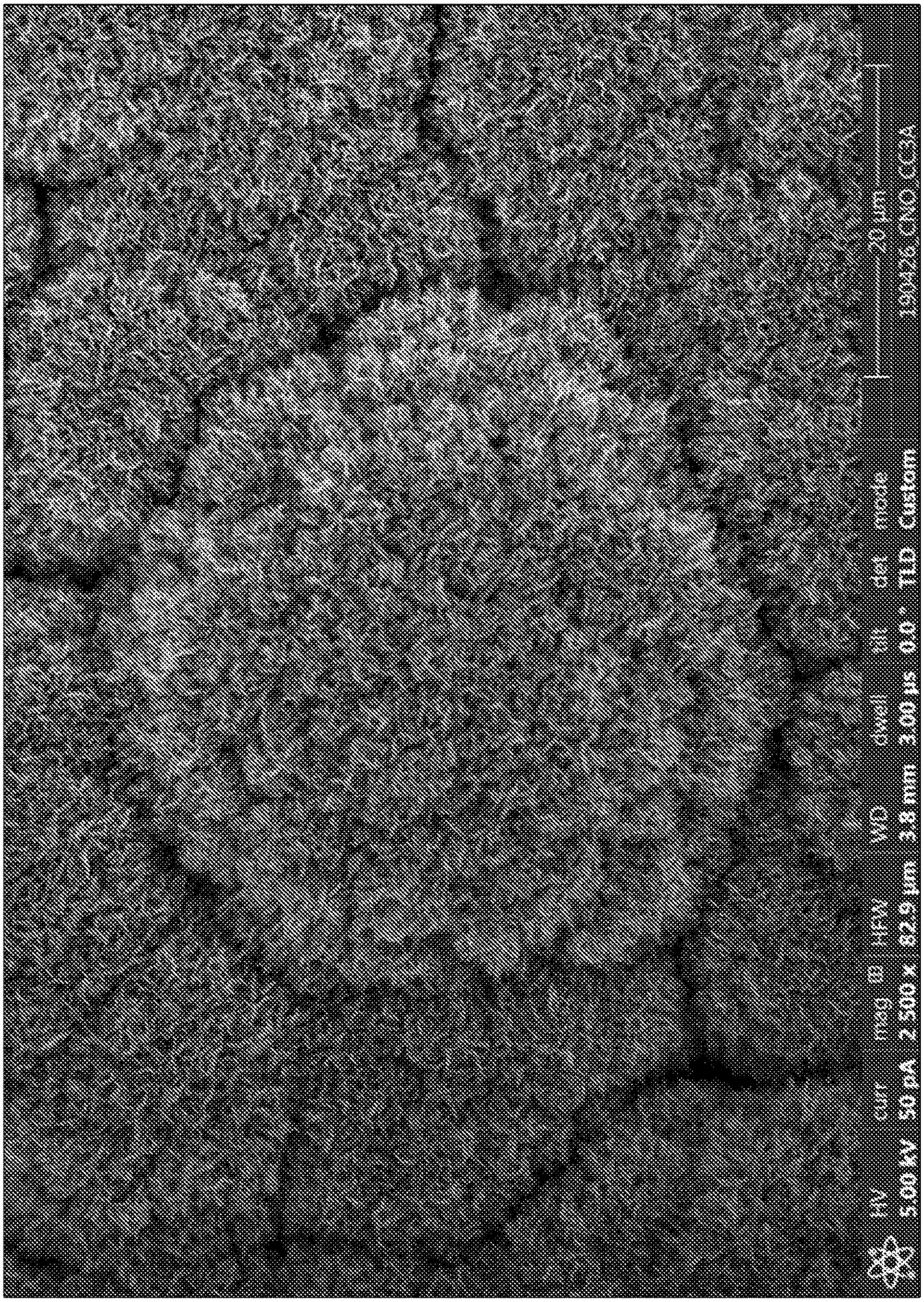
Figures 5B, 16:
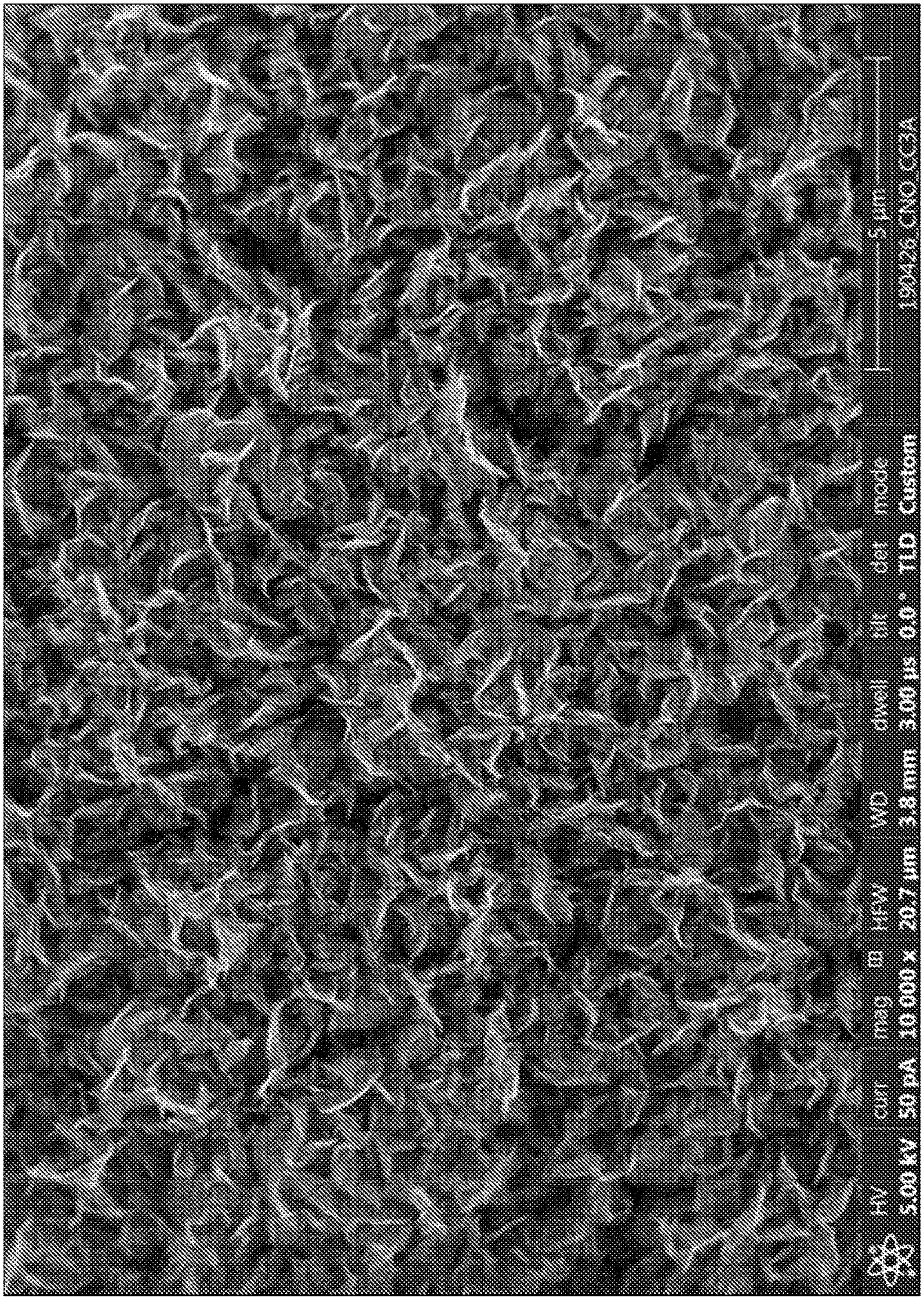
Figures 6A, 16:
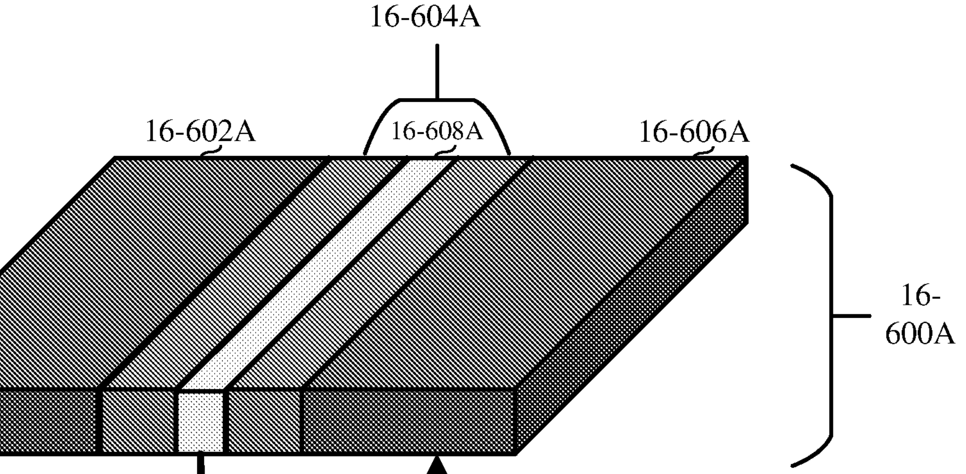
Figures 6B, 16:
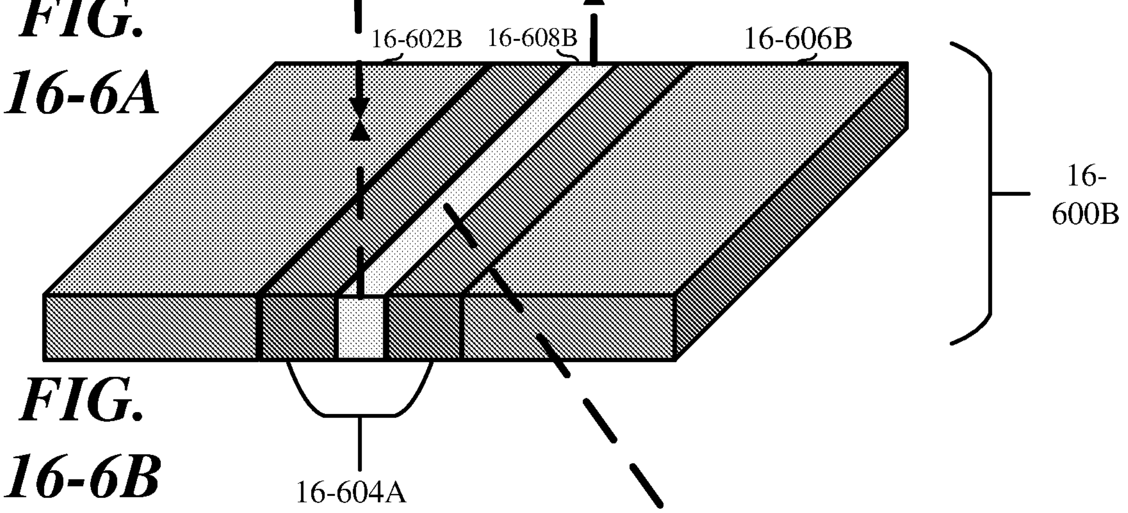
Figures 6C, 16:
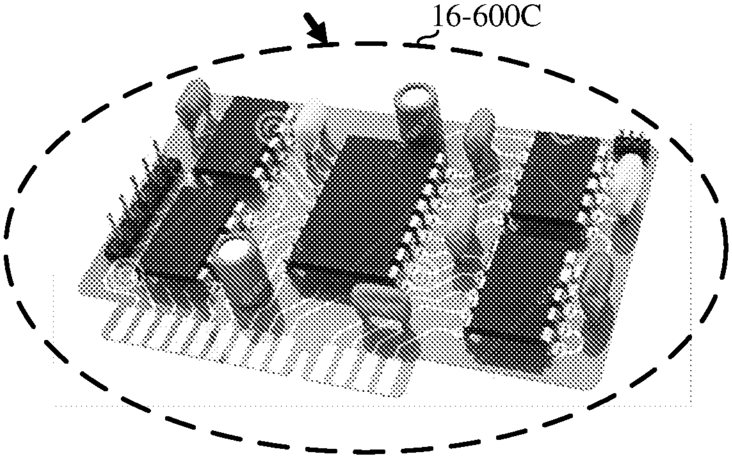
Figures 7A, 16:
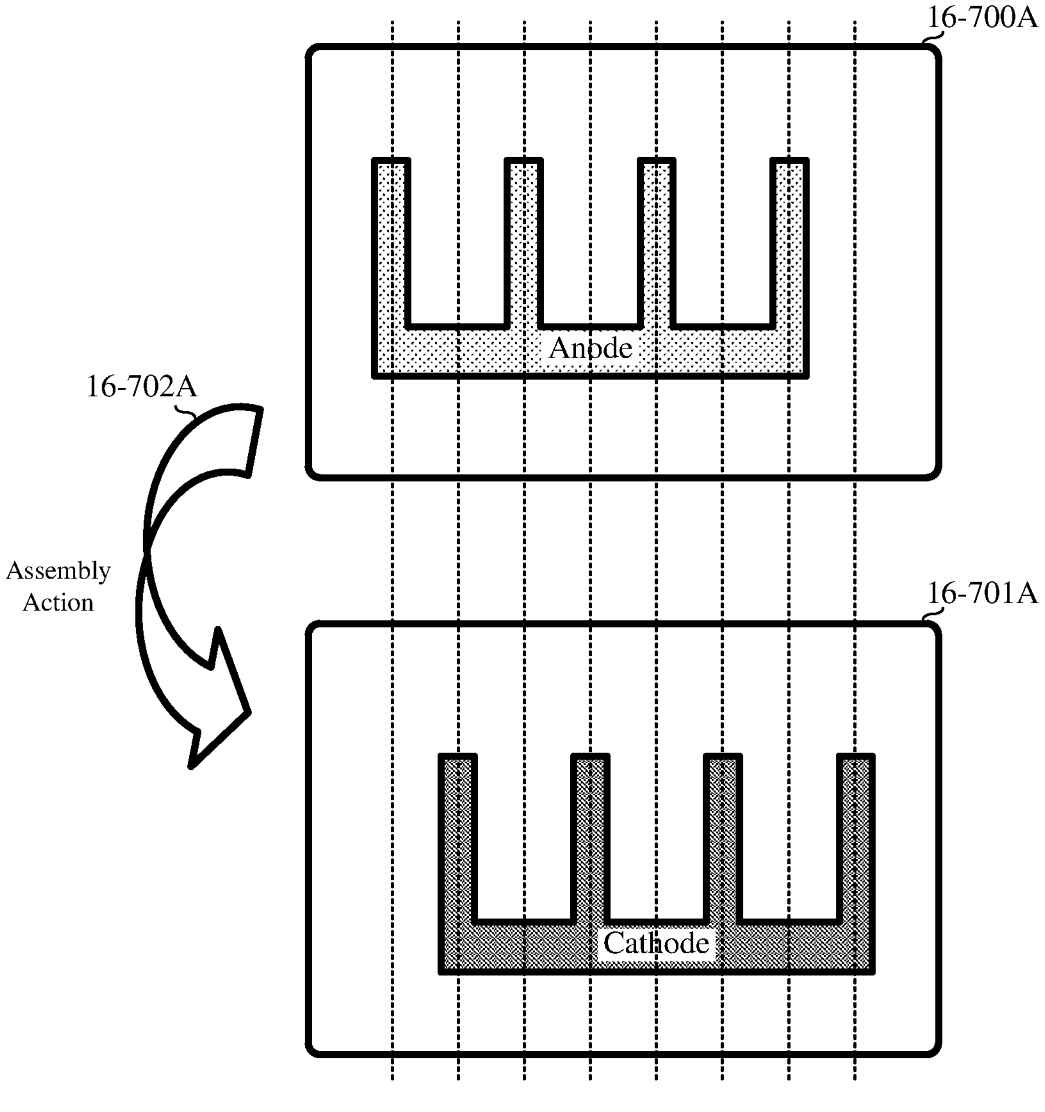
Figures 8A, 16:
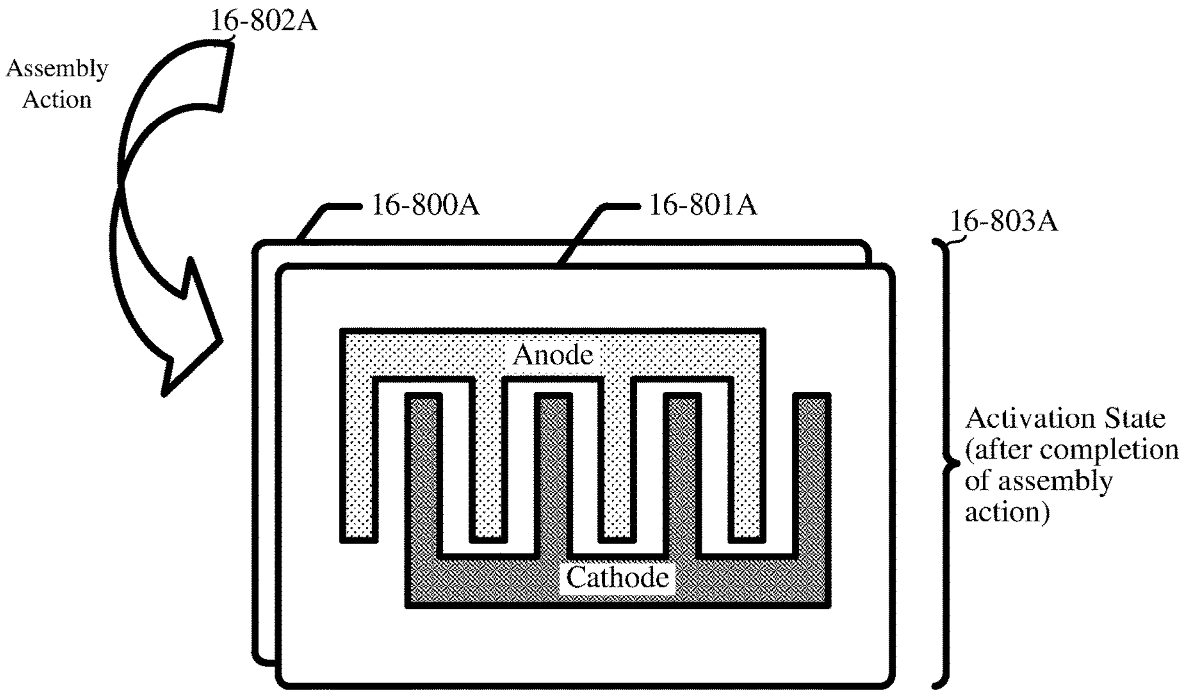
Figures 9, 16:
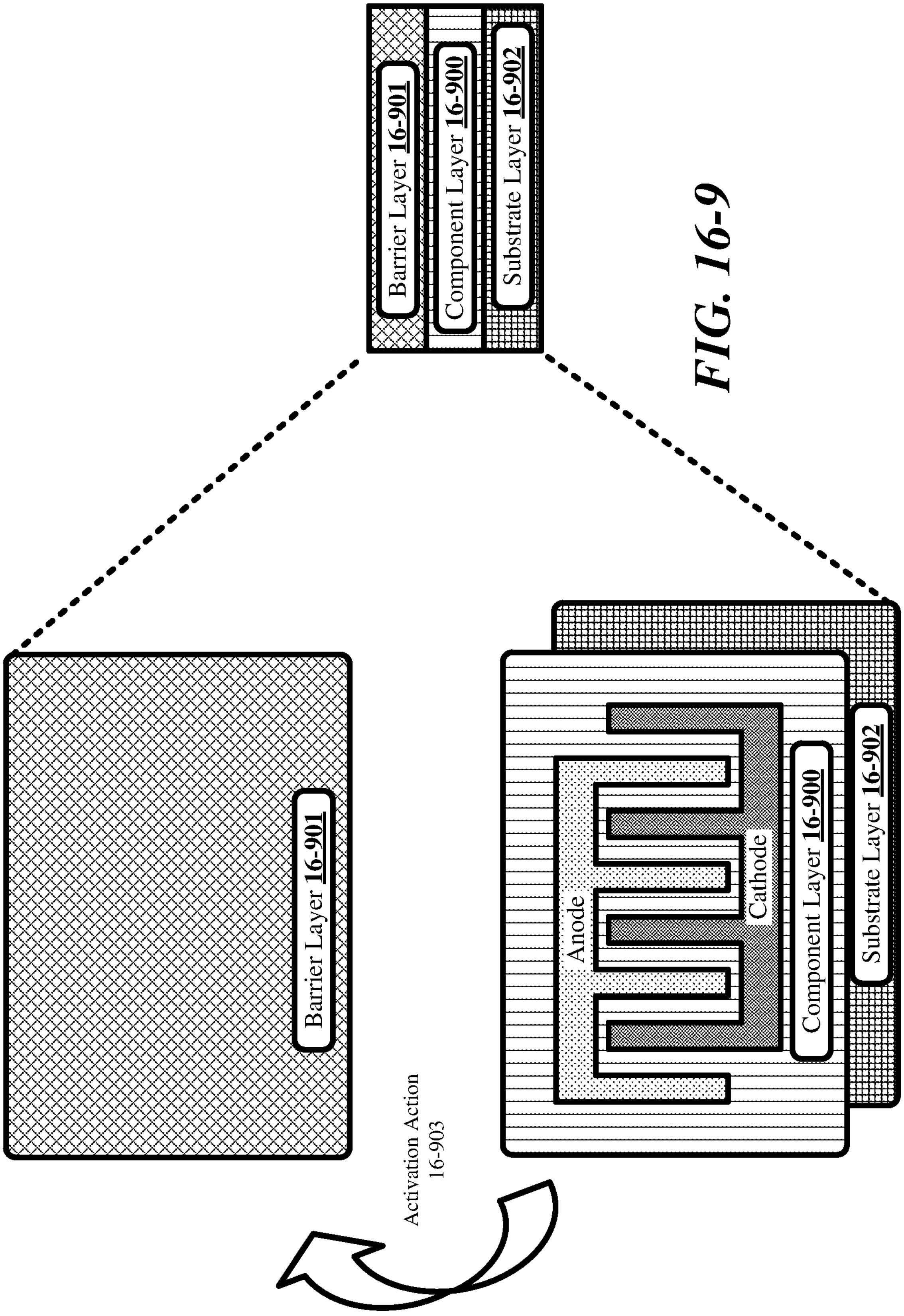
Figures 11, 16:
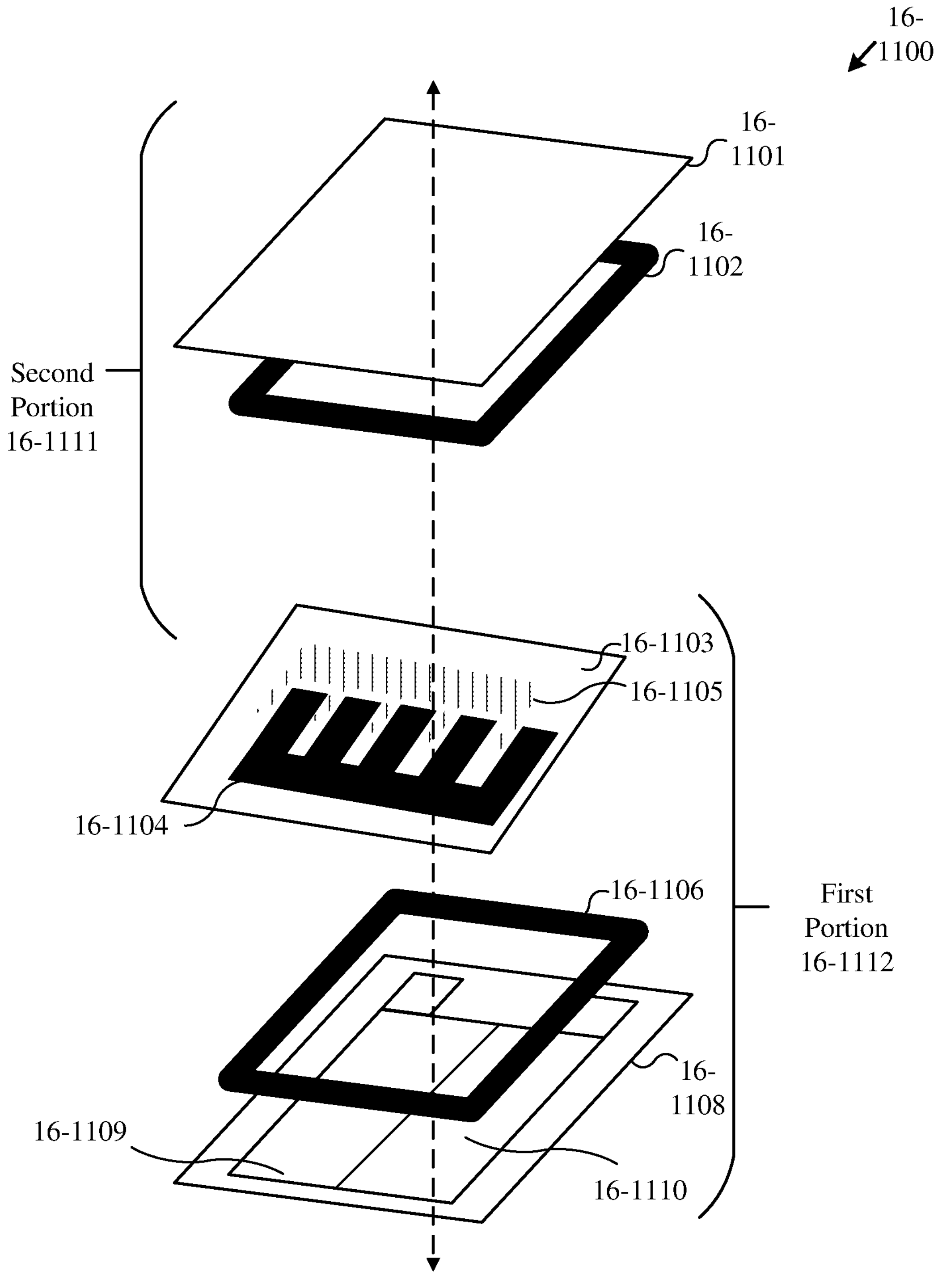
Figures 12A, 16:
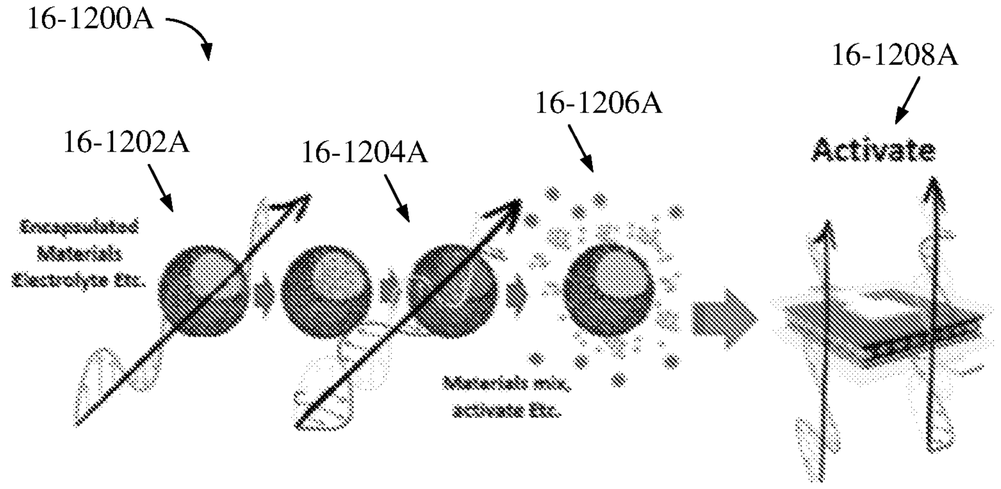
Figures 12B, 16:
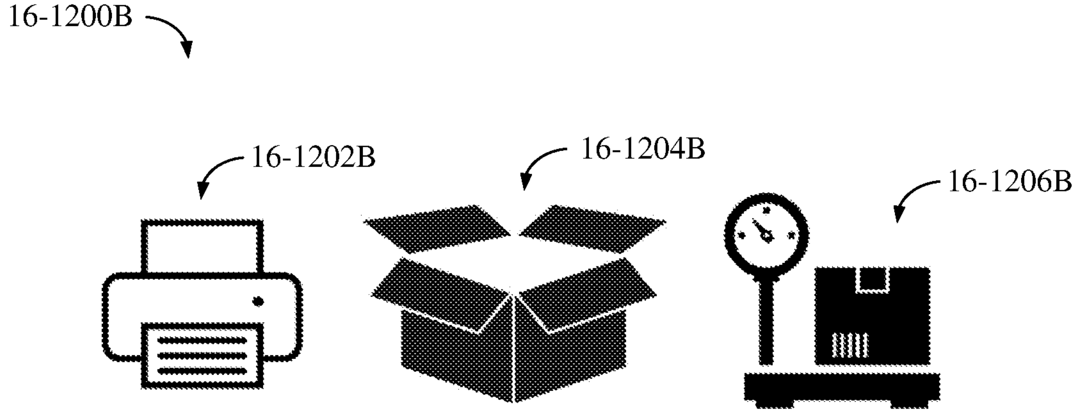
Figures 12C, 16:
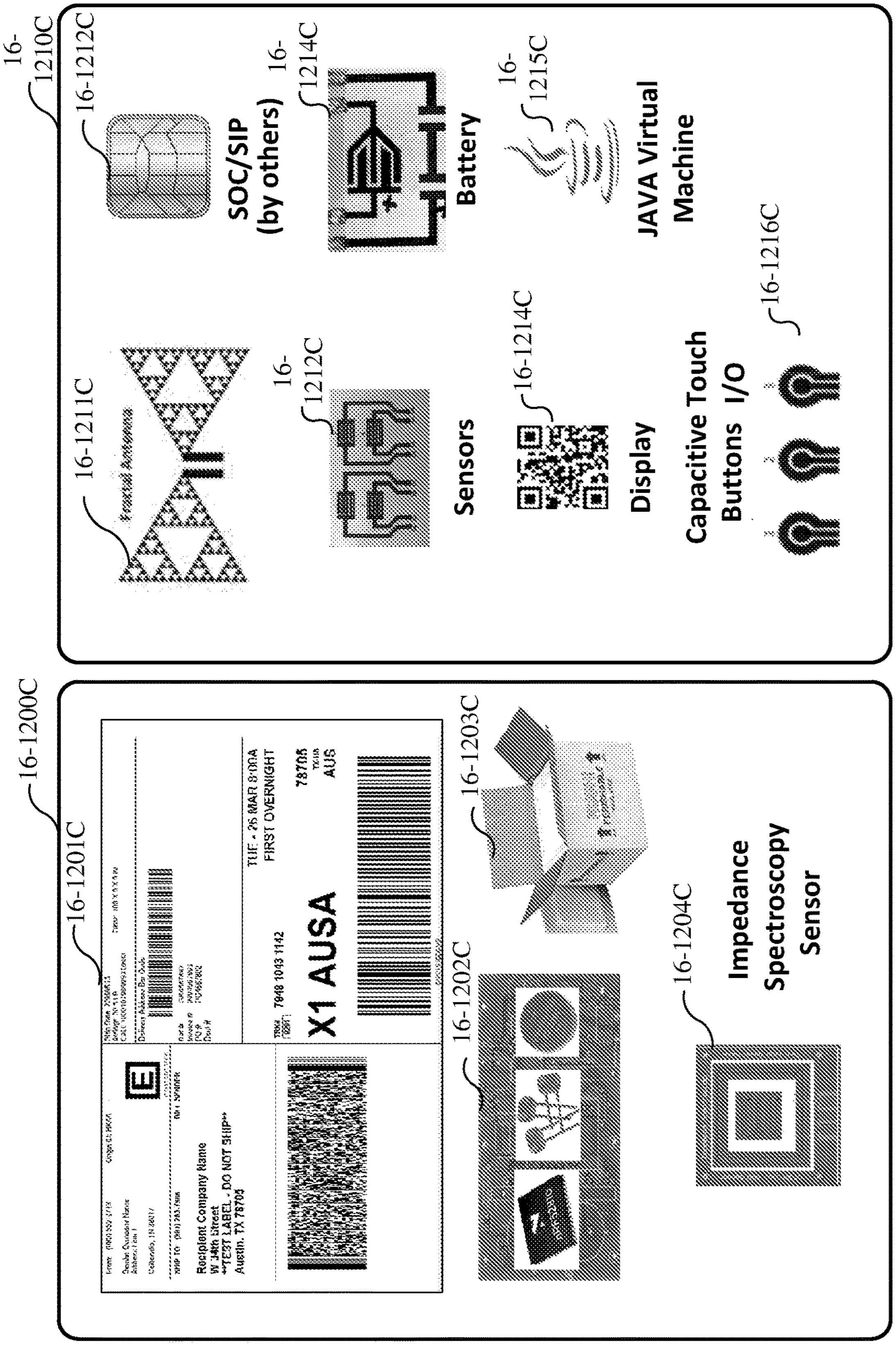
Figures 16, 17, 18, 19, 19A:
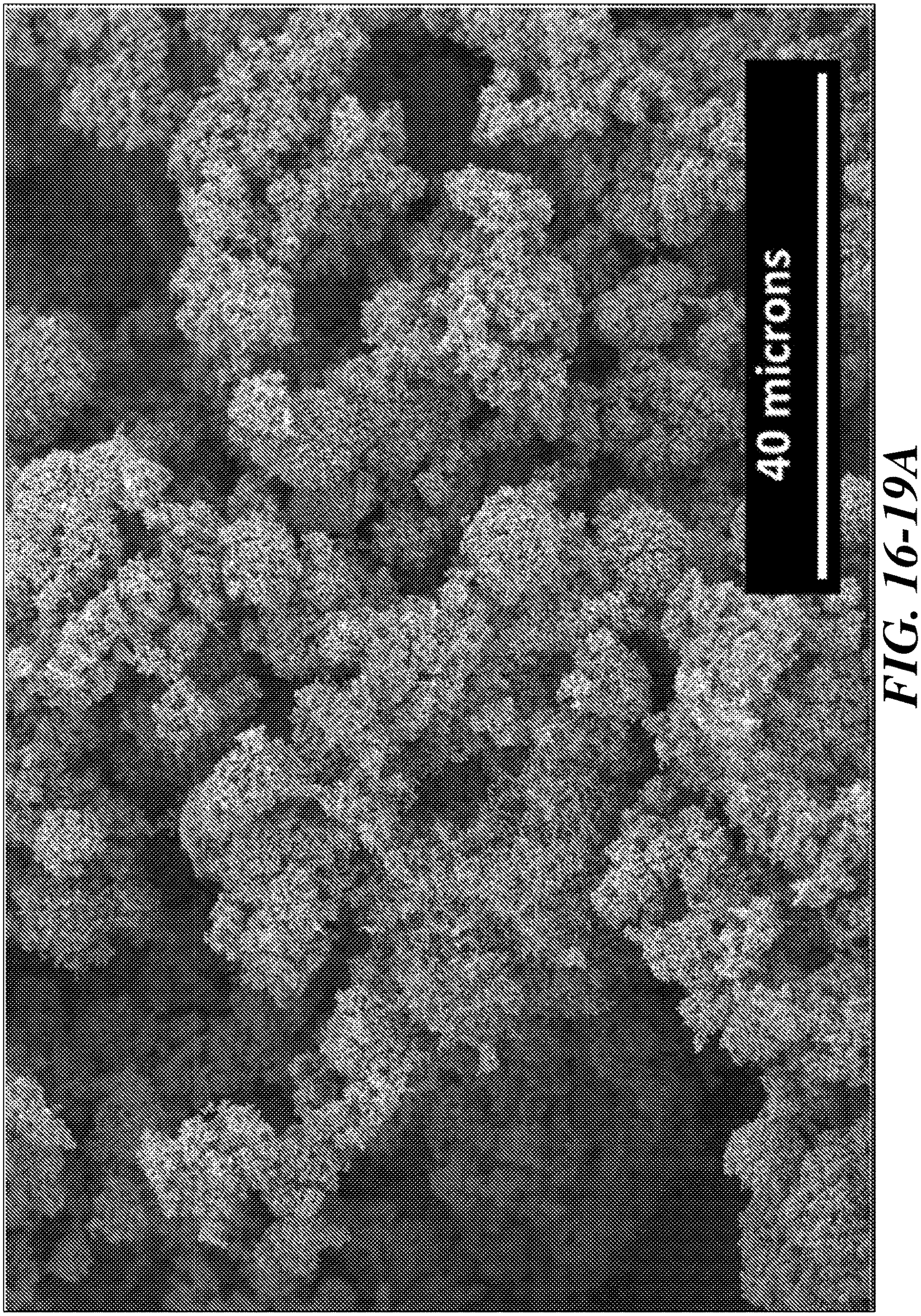

FIG. 18-15B shows a listing of features associated with a multi-layered electrophoretic display, in accordance with some implementations.

Figures 1, 17:
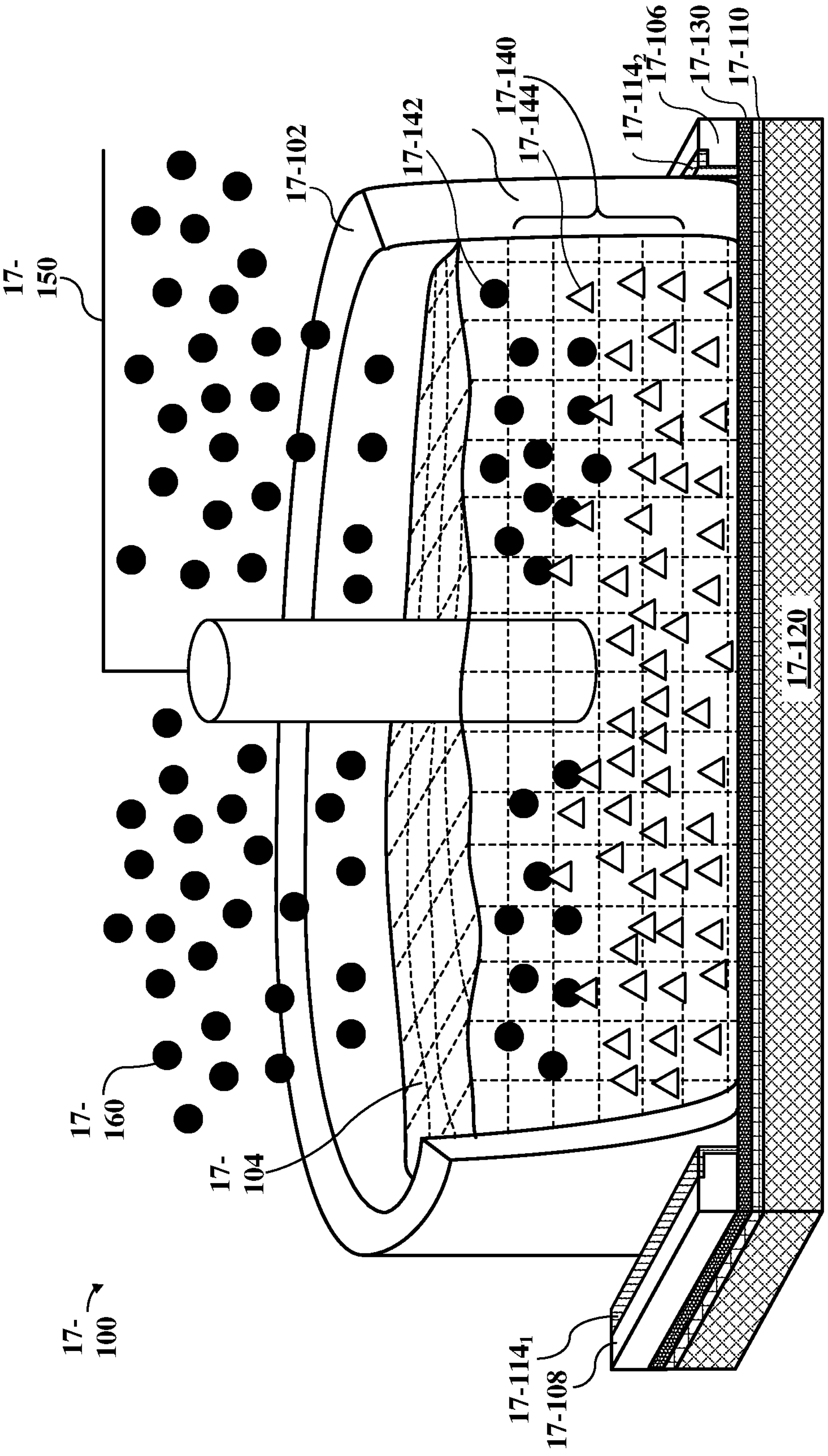
Figures 2, 17:
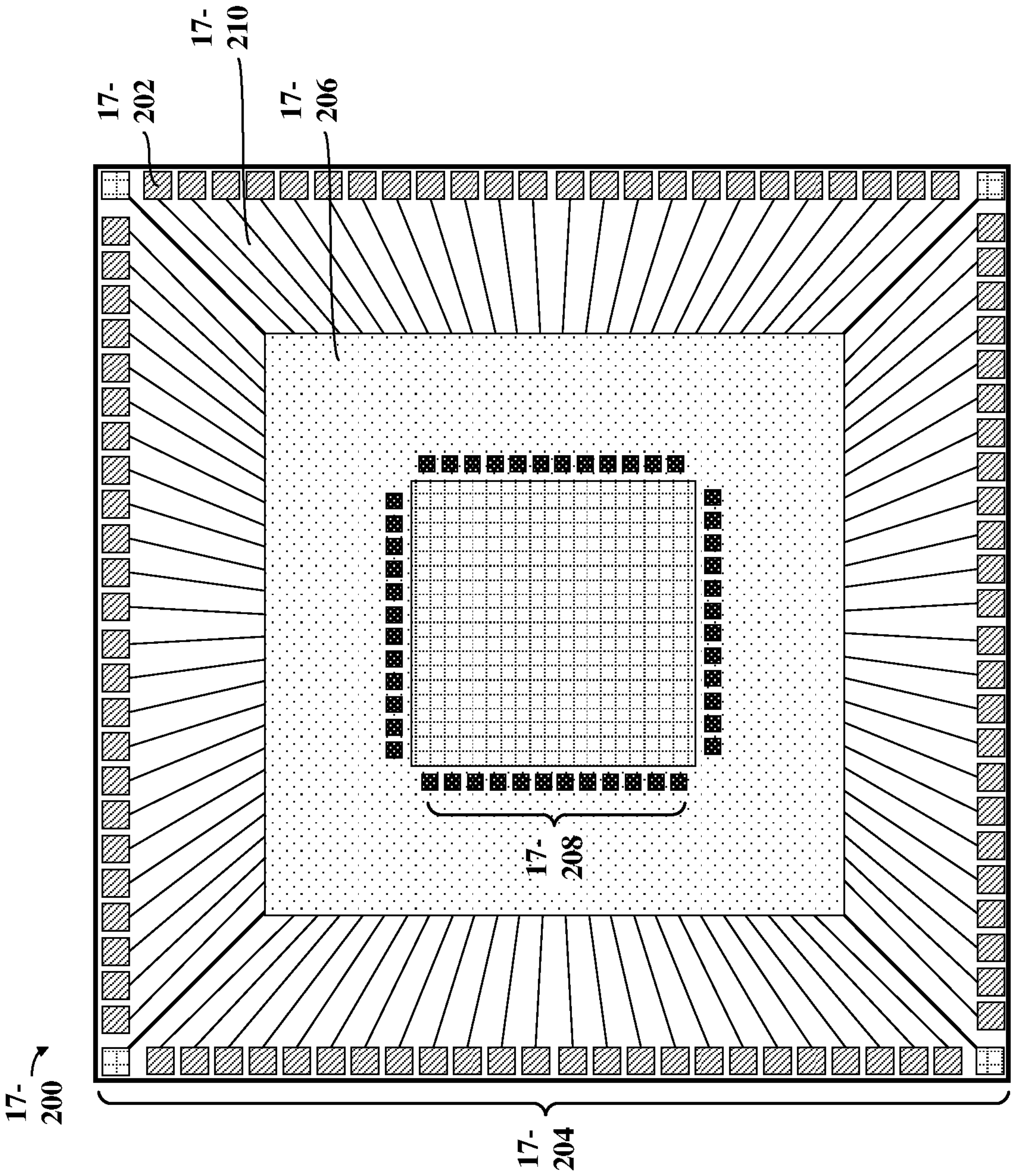
Figures 3, 17:
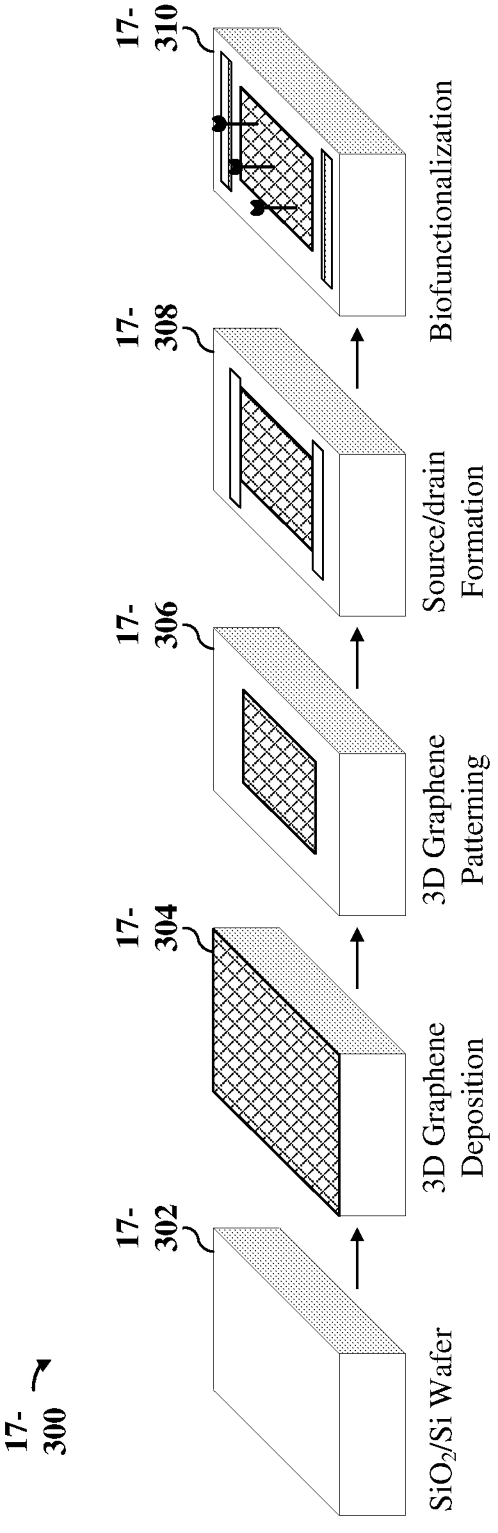
Figures 4A, 17:
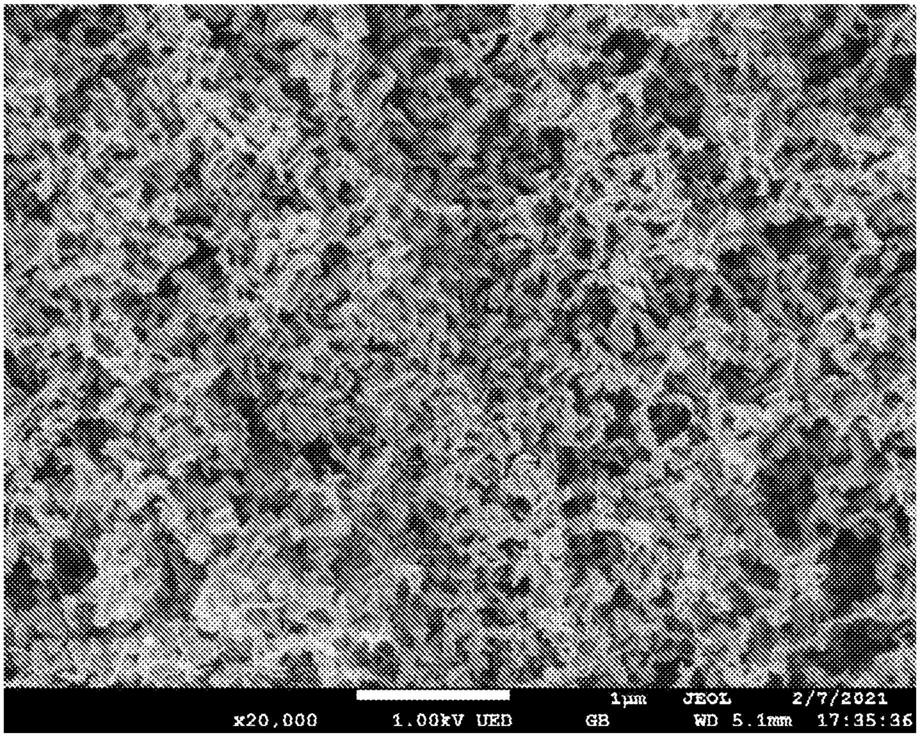
Figures 4B, 17:
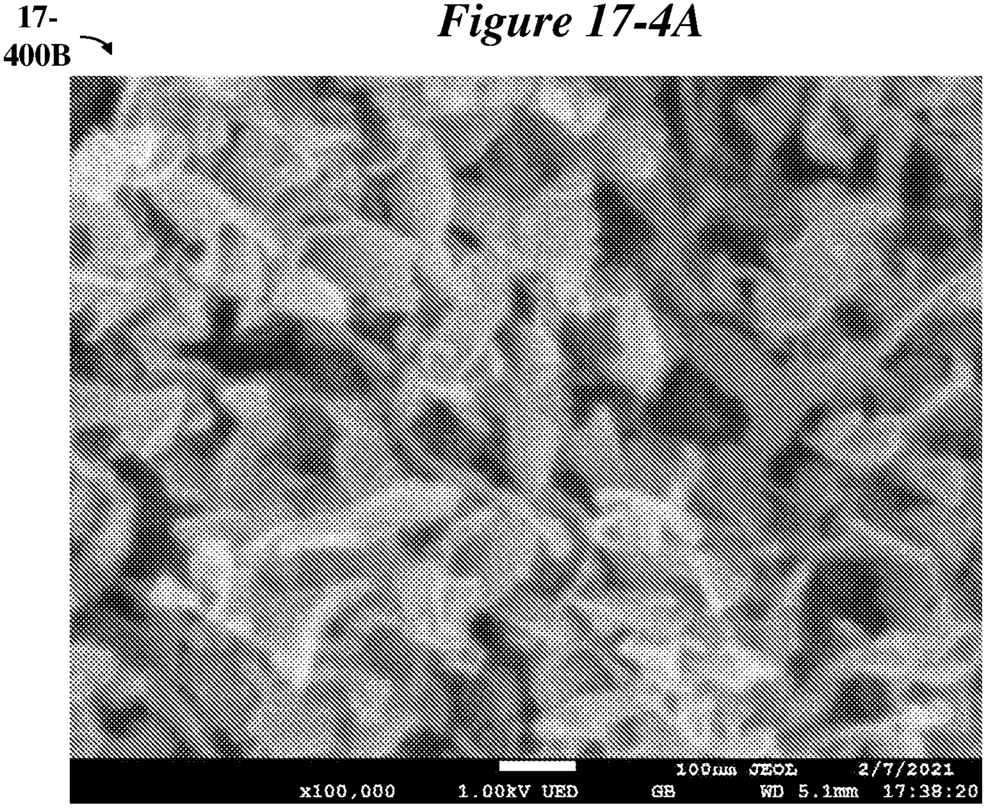
Figures 5A, 17:
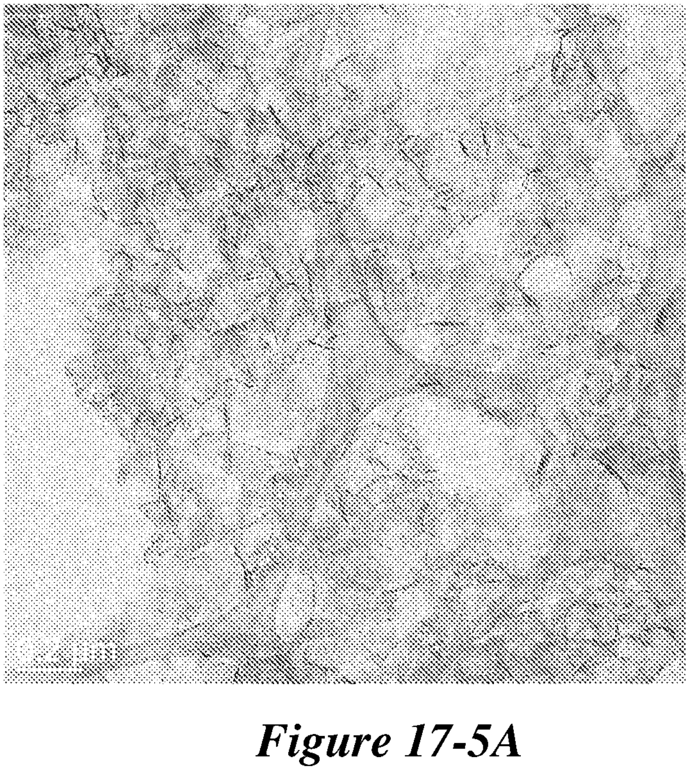
Figures 5B, 17:
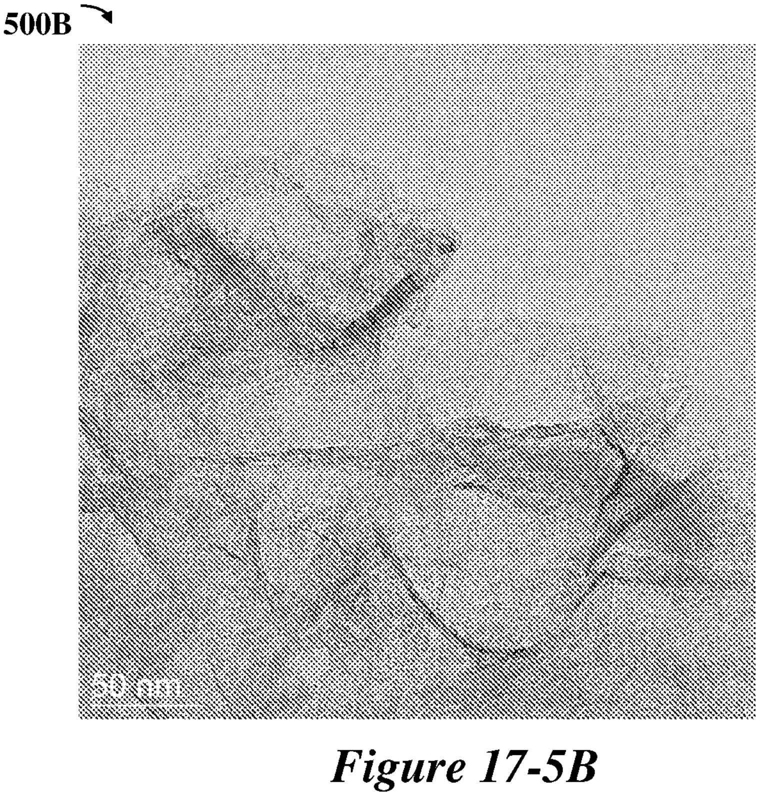
Figures 6A, 17:
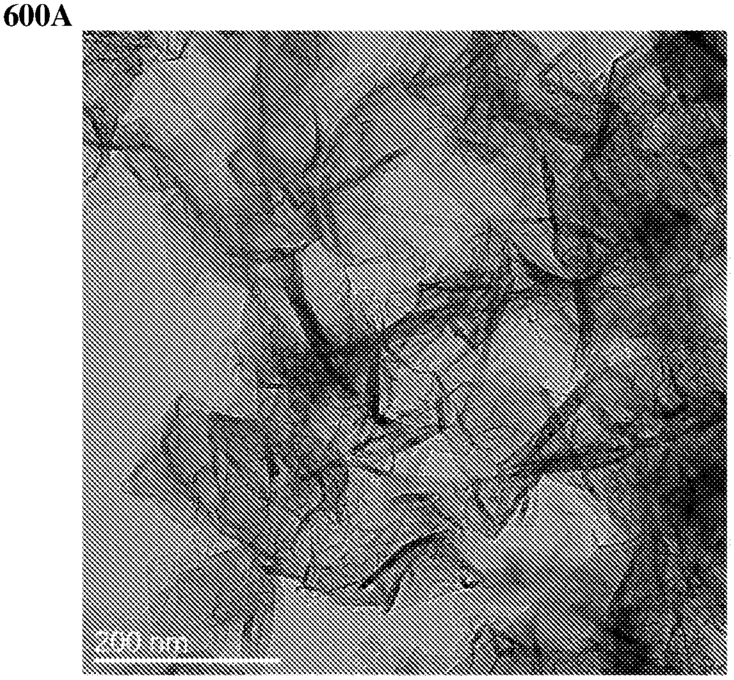
Figures 6B, 17:
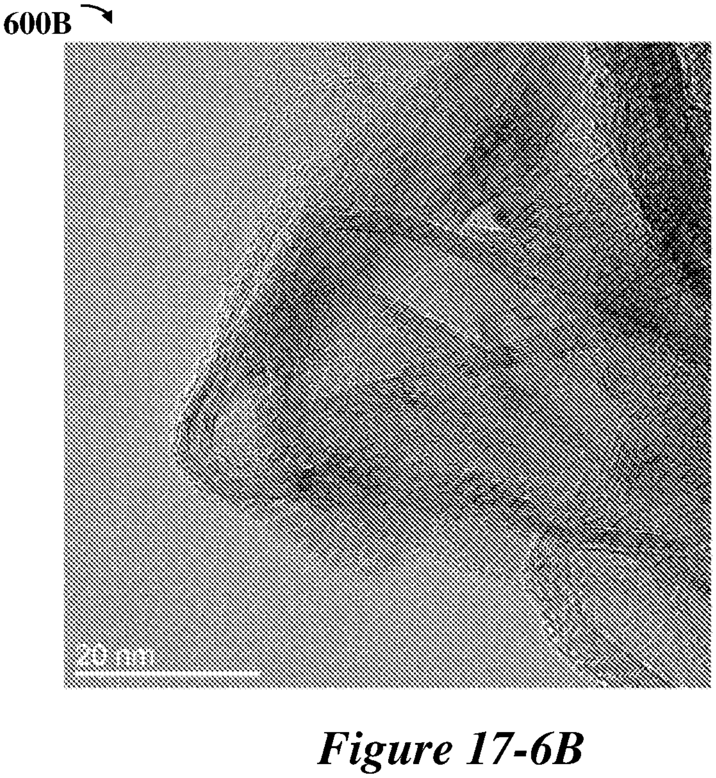
Figures 7, 17:
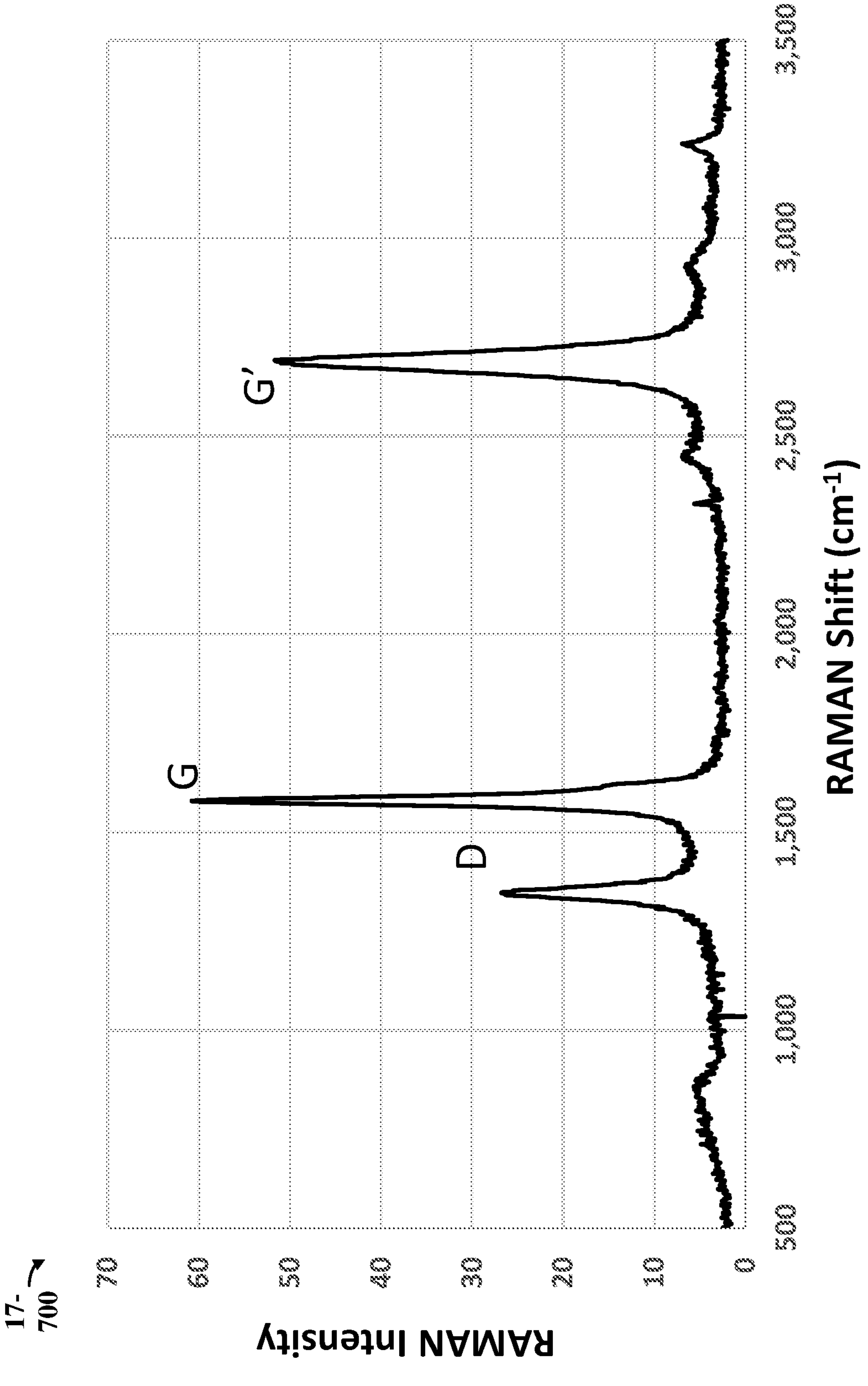
Figures 8, 17:
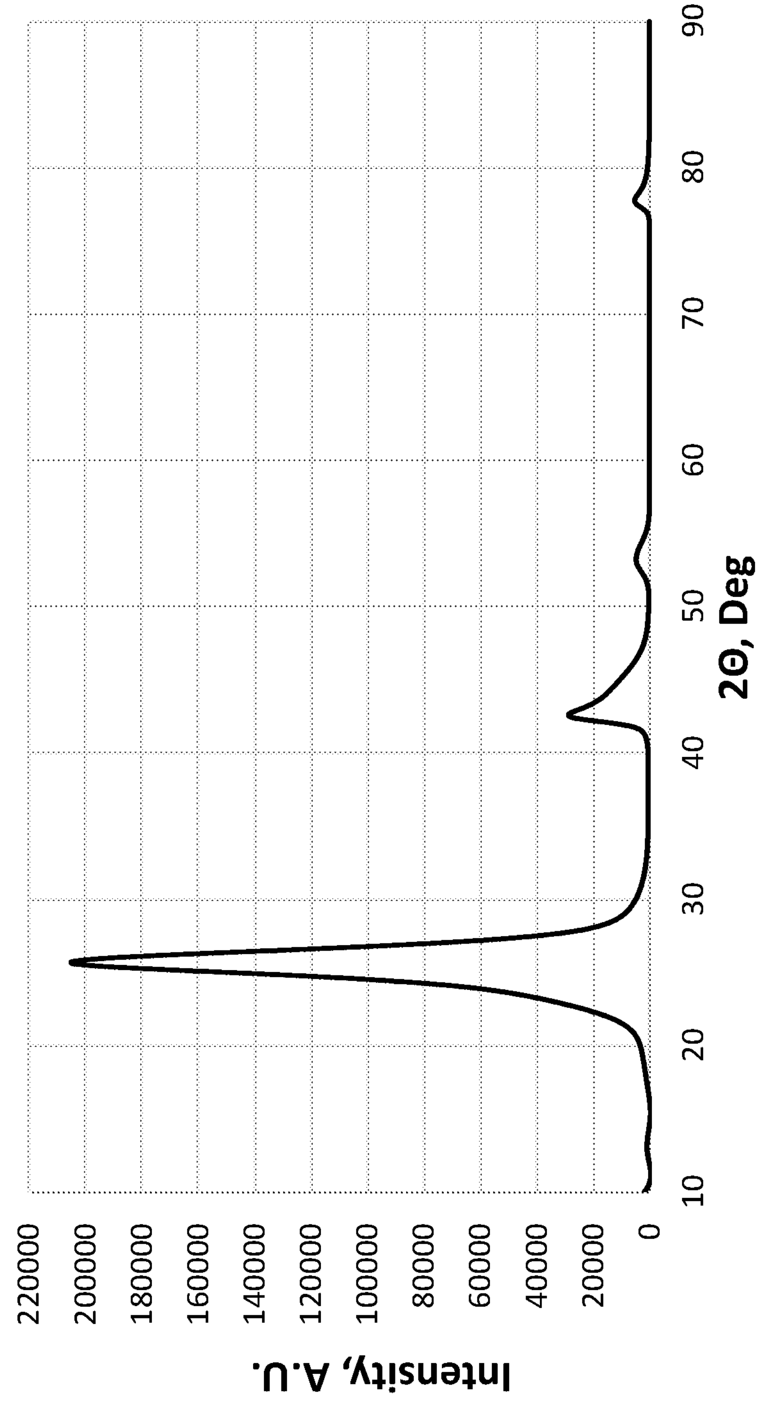
Figures 9, 17:
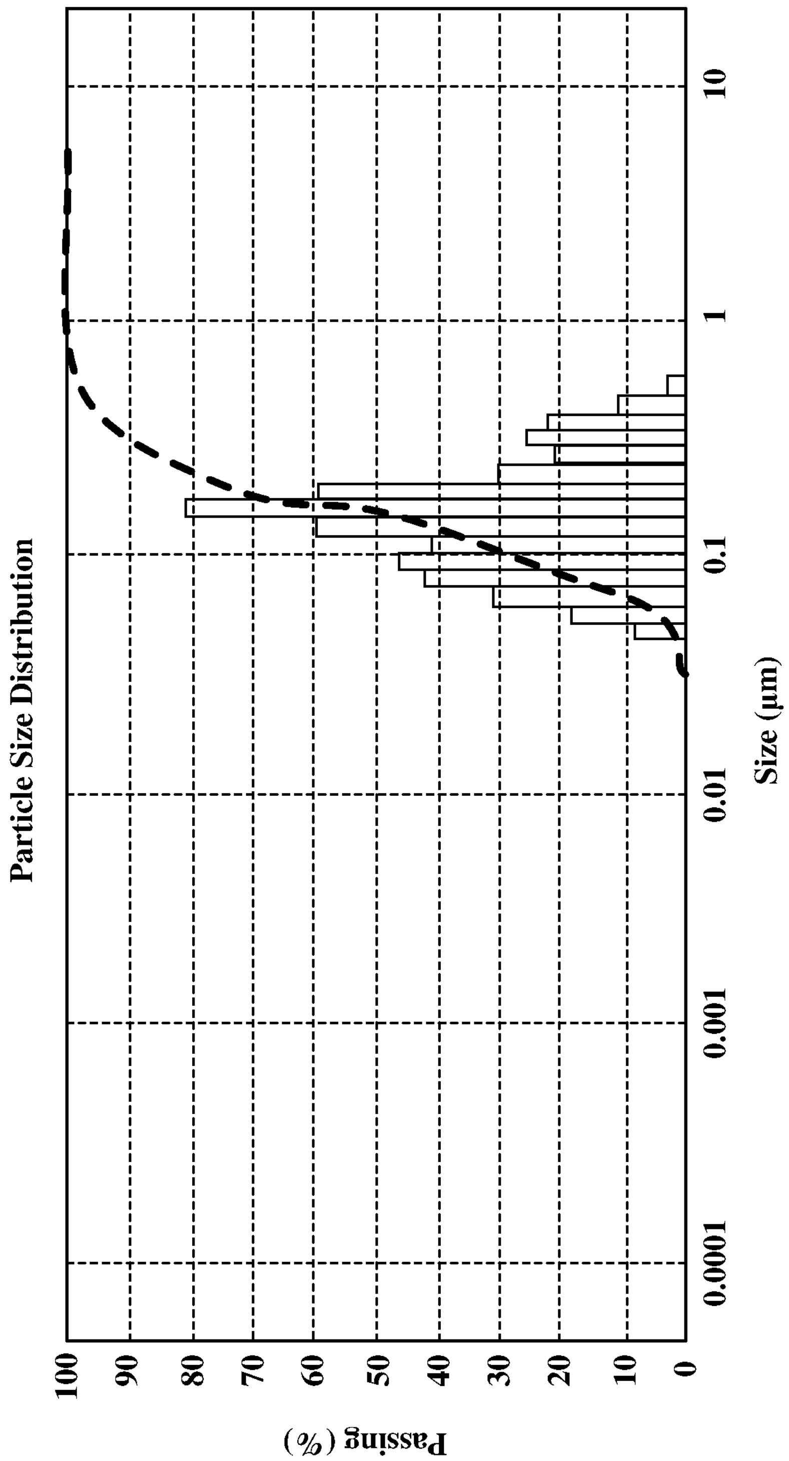
Figures 10, 17:
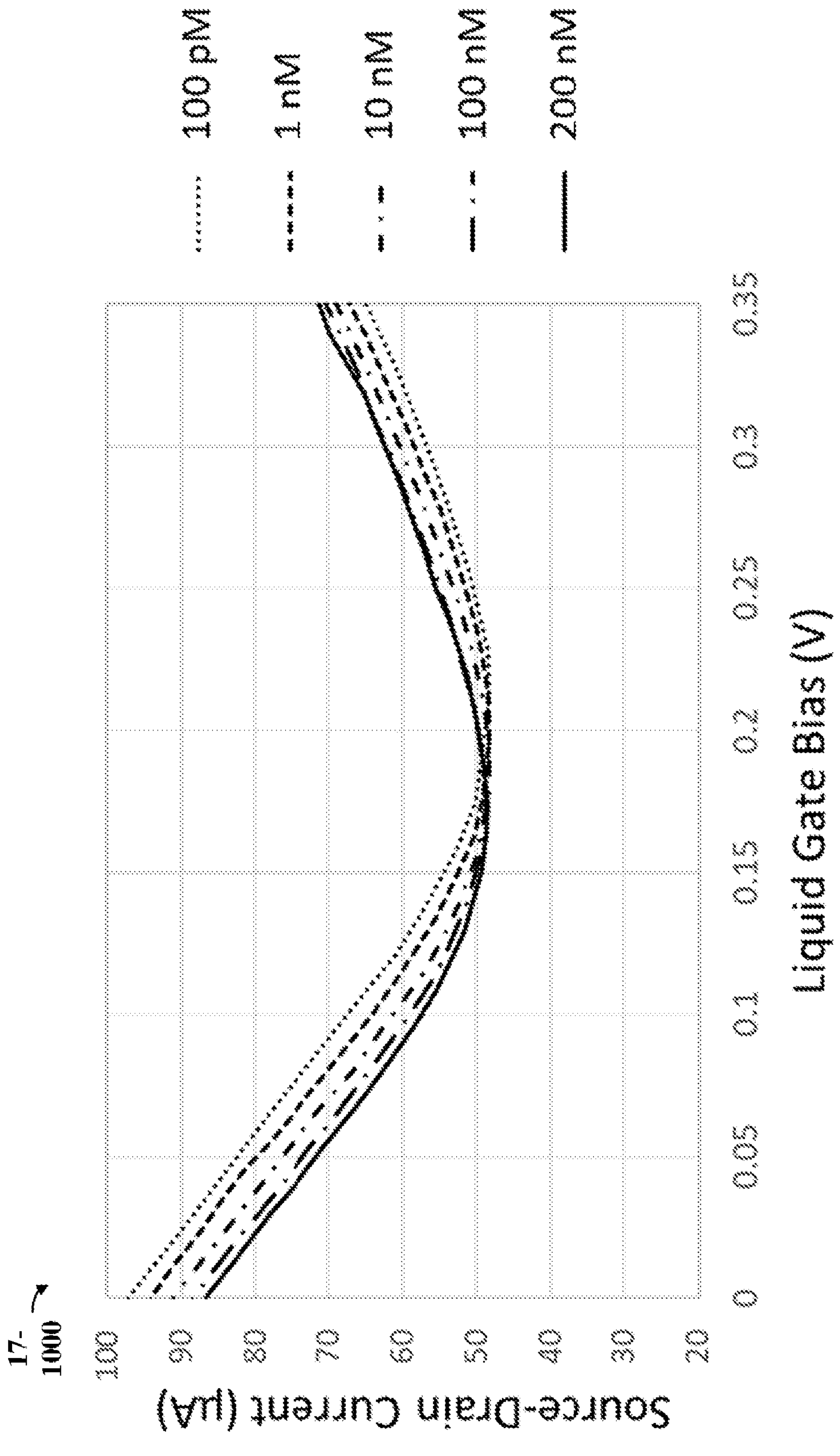
Figures 11, 17:
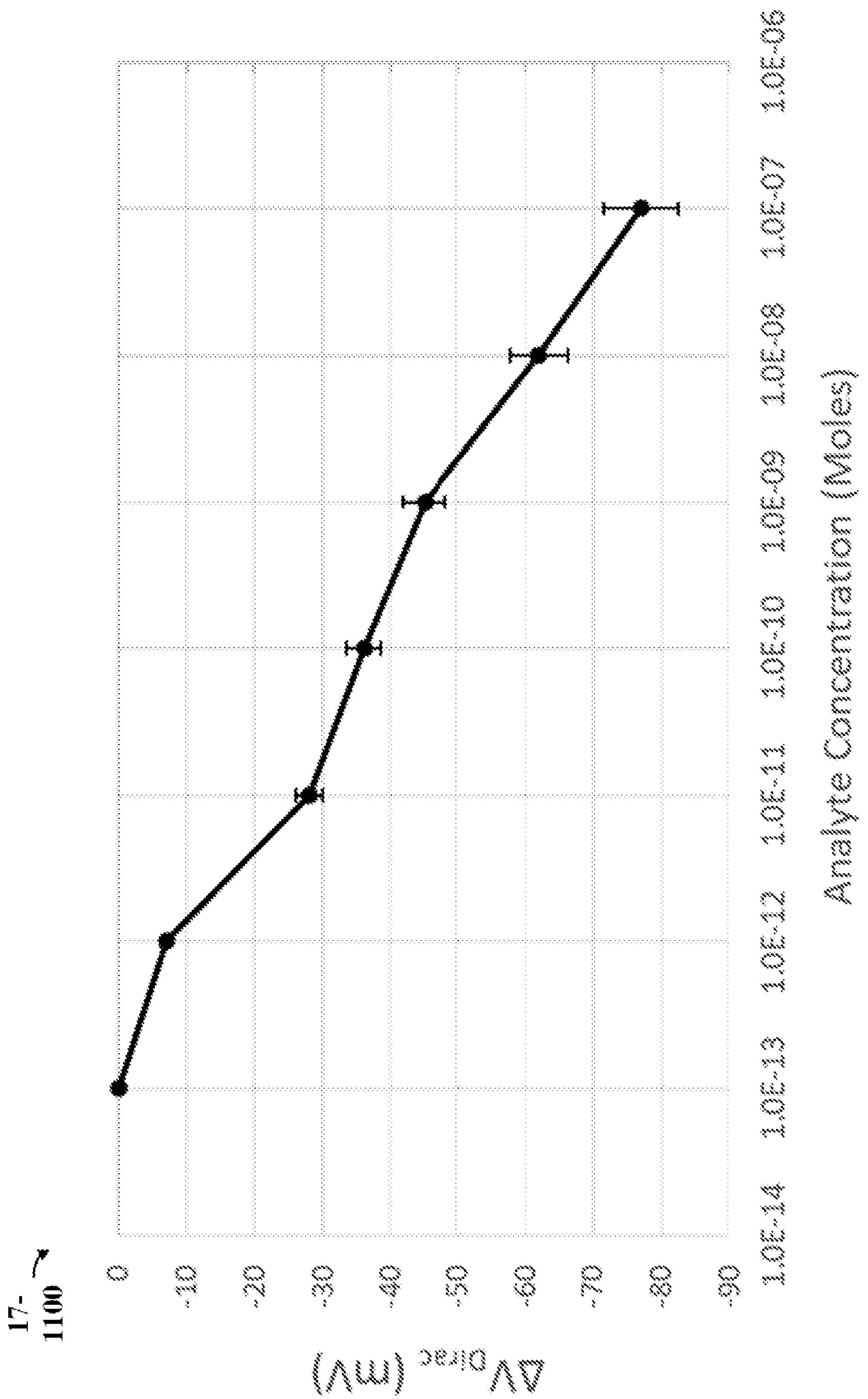
Figures 12, 17:
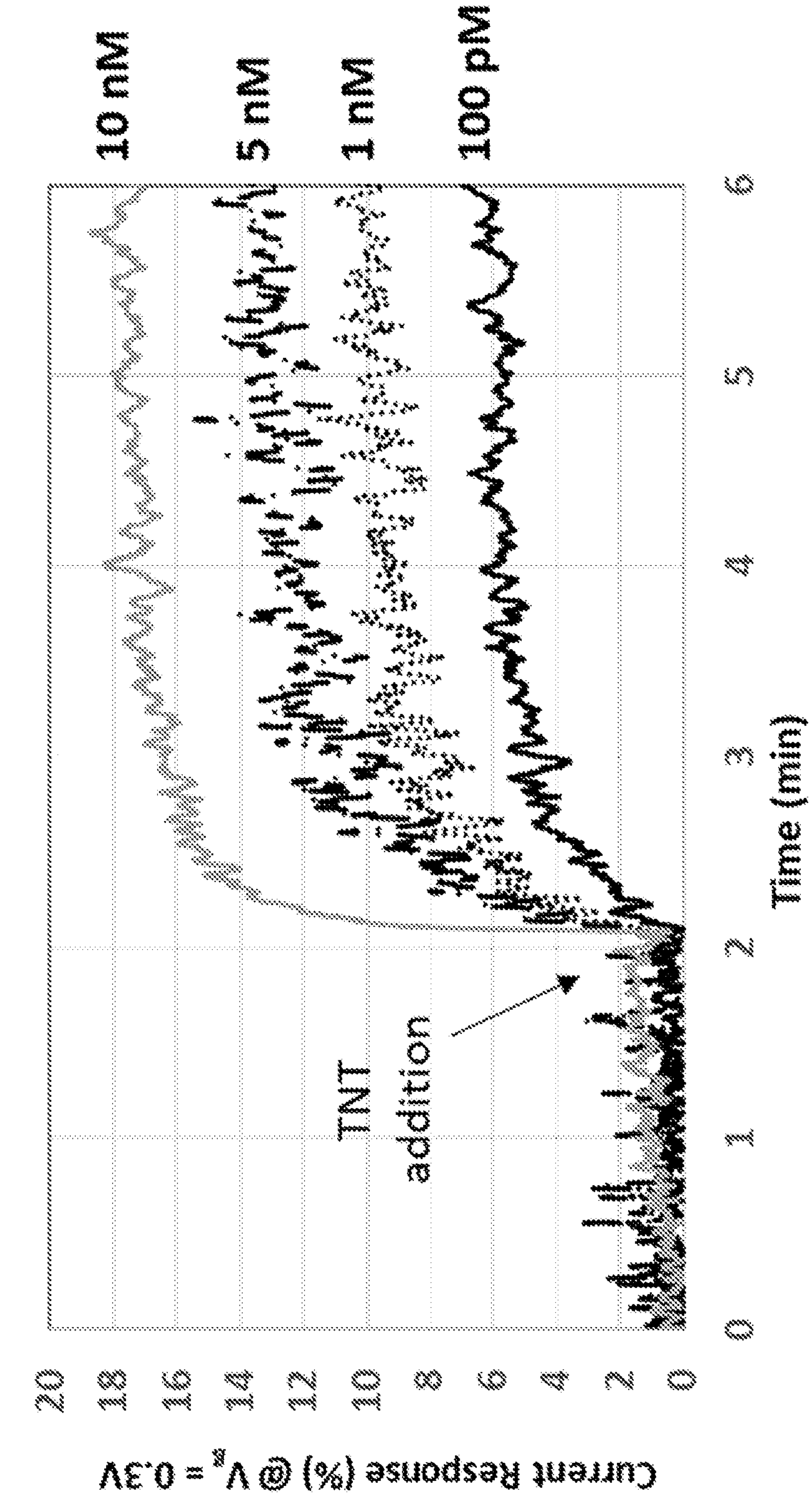
Figures 13, 17:
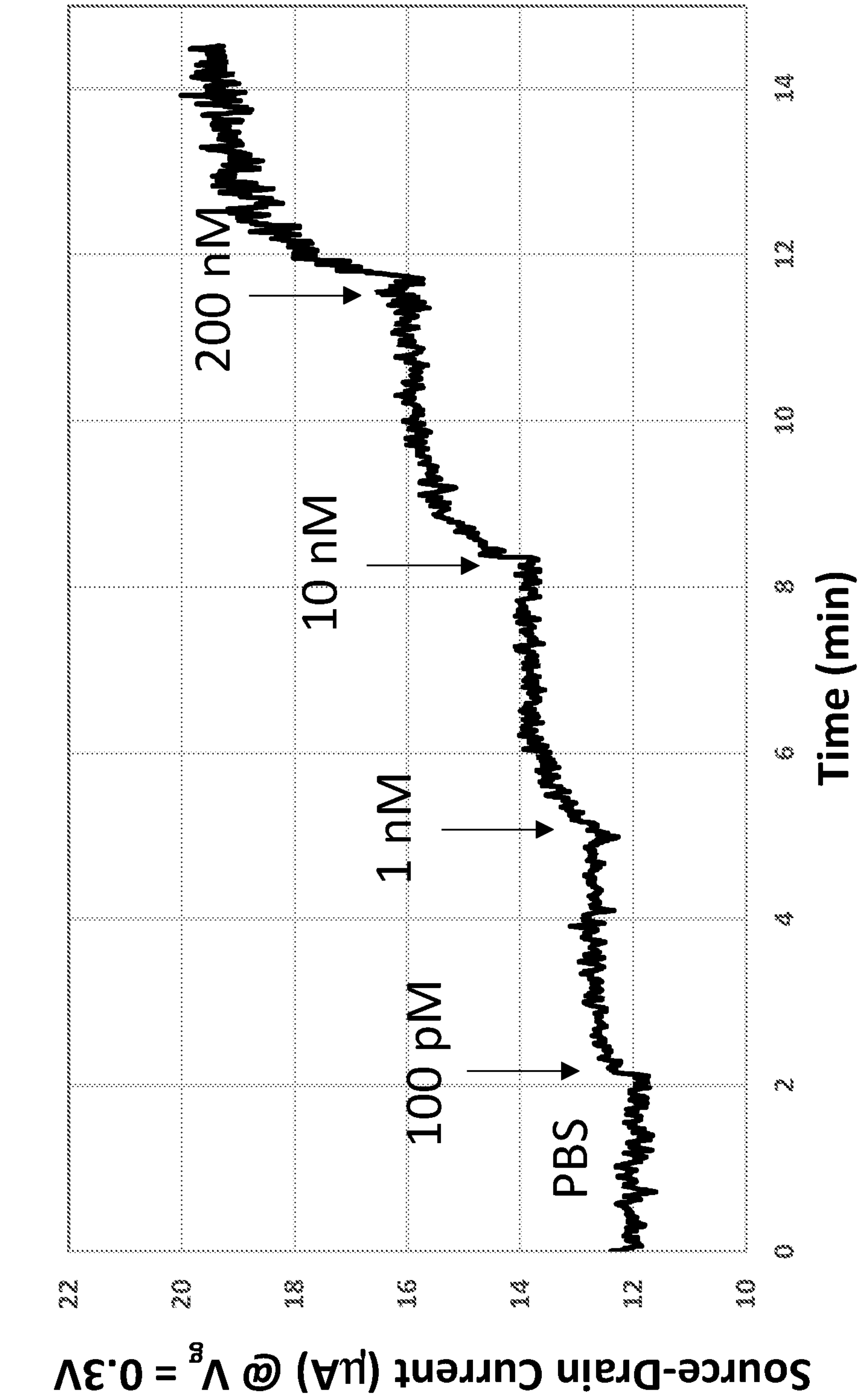
Figures 14A, 17:
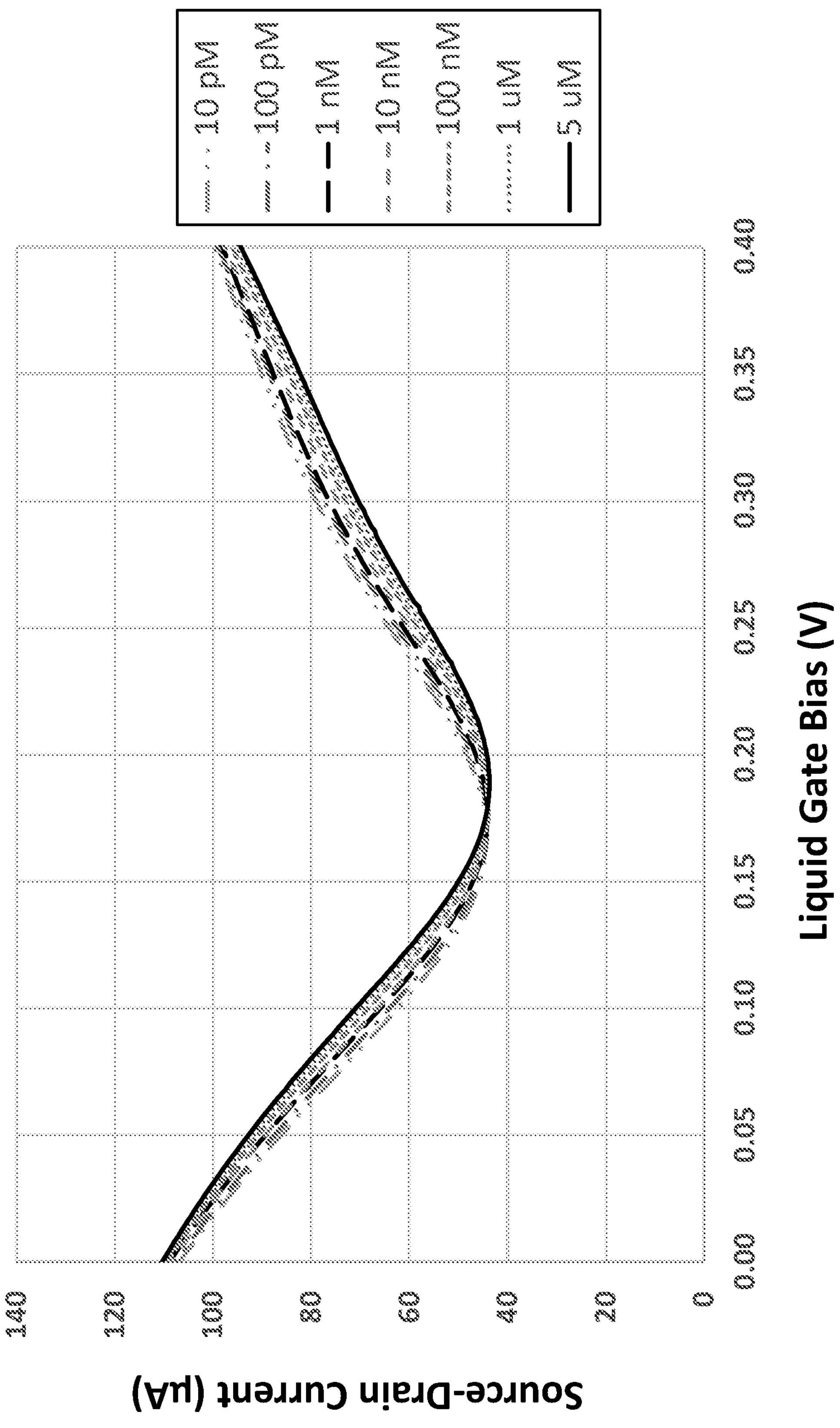
Figures 14B, 17:
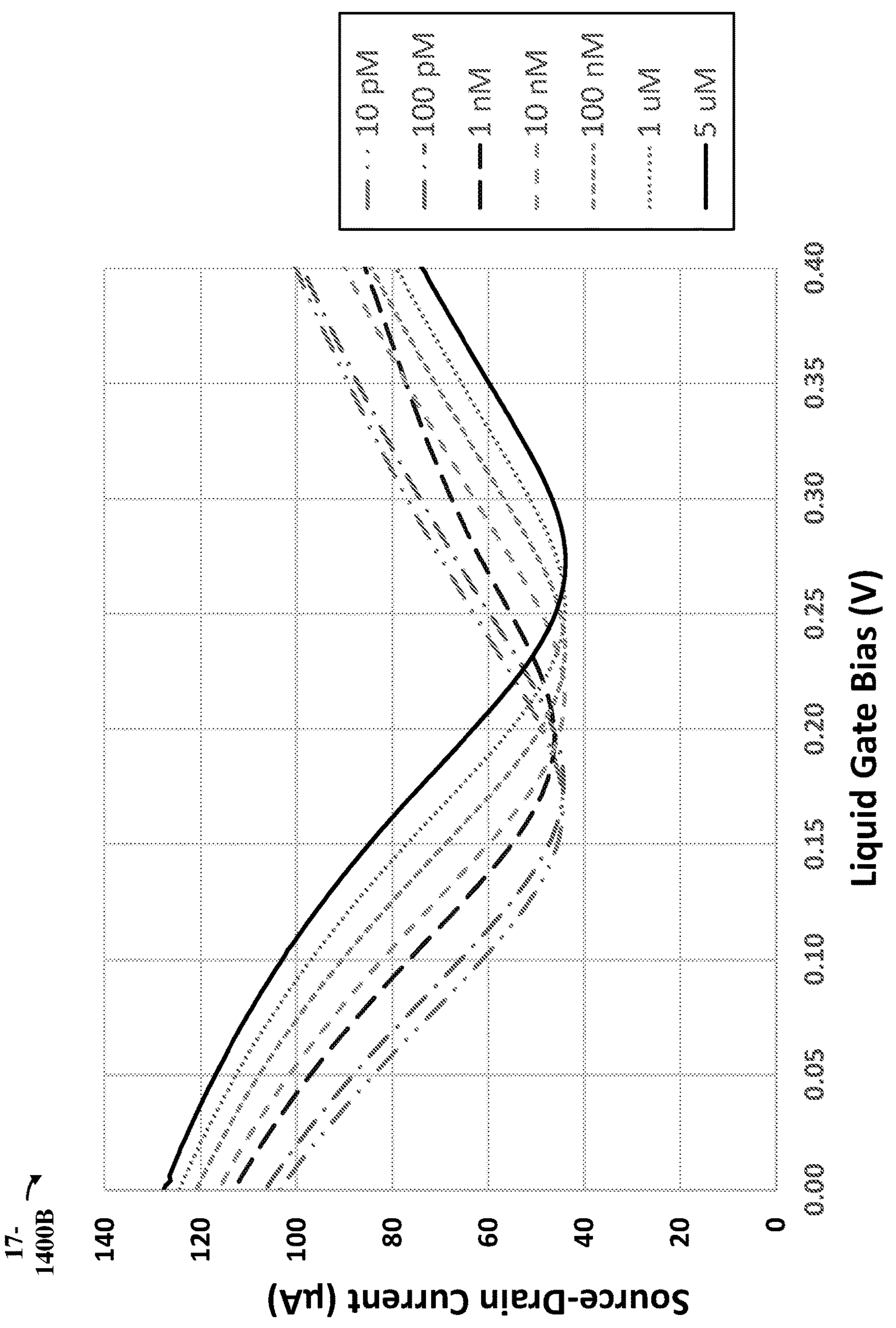
Figures 15, 17:
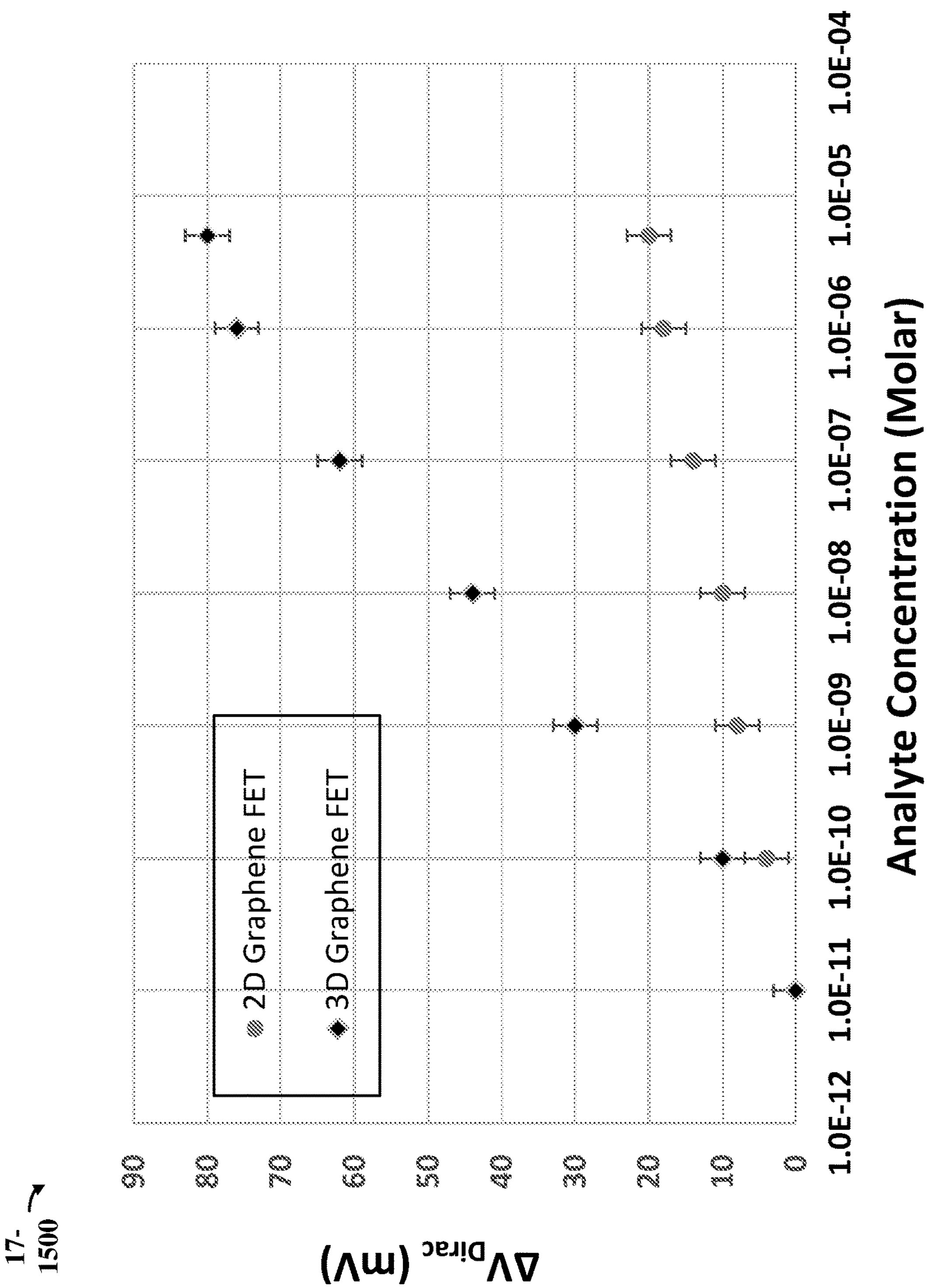
Figures 16A, 17:
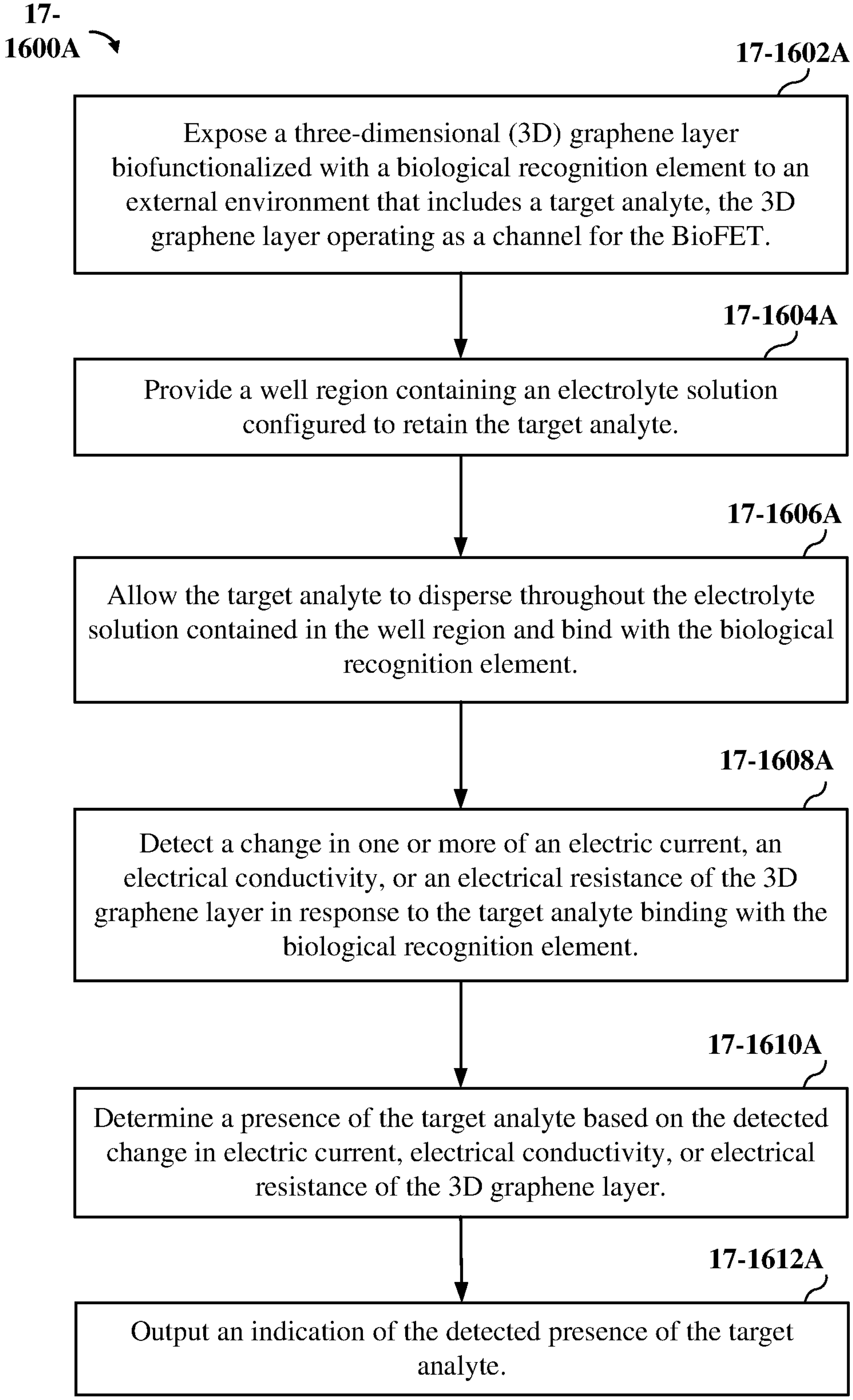

FIG. 18-16A shows an example implementation of a multi-layered electrophoretic display, in accordance with some implementations.

Figures 16B, 17:
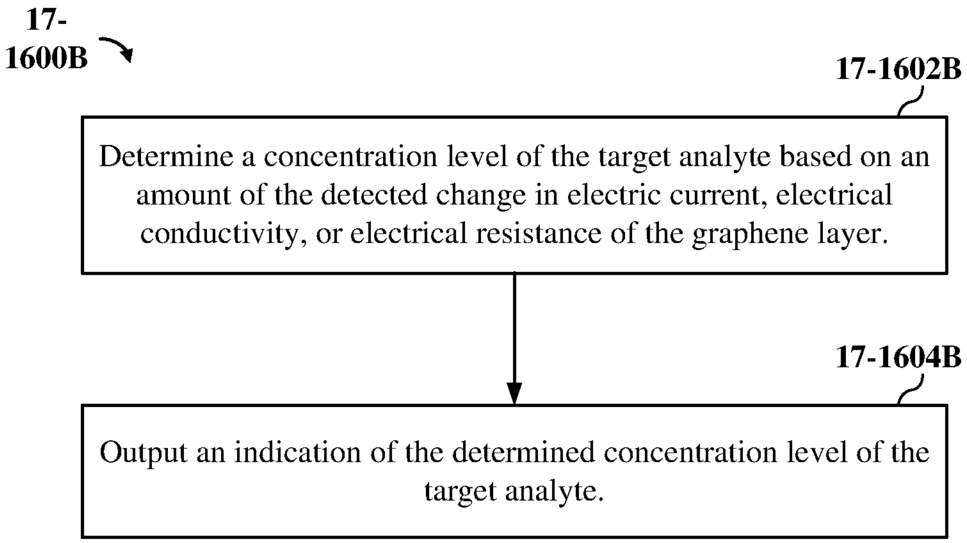

FIG. 18-16B shows an example implementation where two multi-layered substrates comprise different sets of components, in accordance with some implementations.

FIG. 19-1 shows an example sensing device configured to detect analytes, according to some implementations.

FIG. 19-2 is an illustration depicting the sensing device of FIG. 19-1 coupled to a receptor, according to some implementations.

Figure 3:
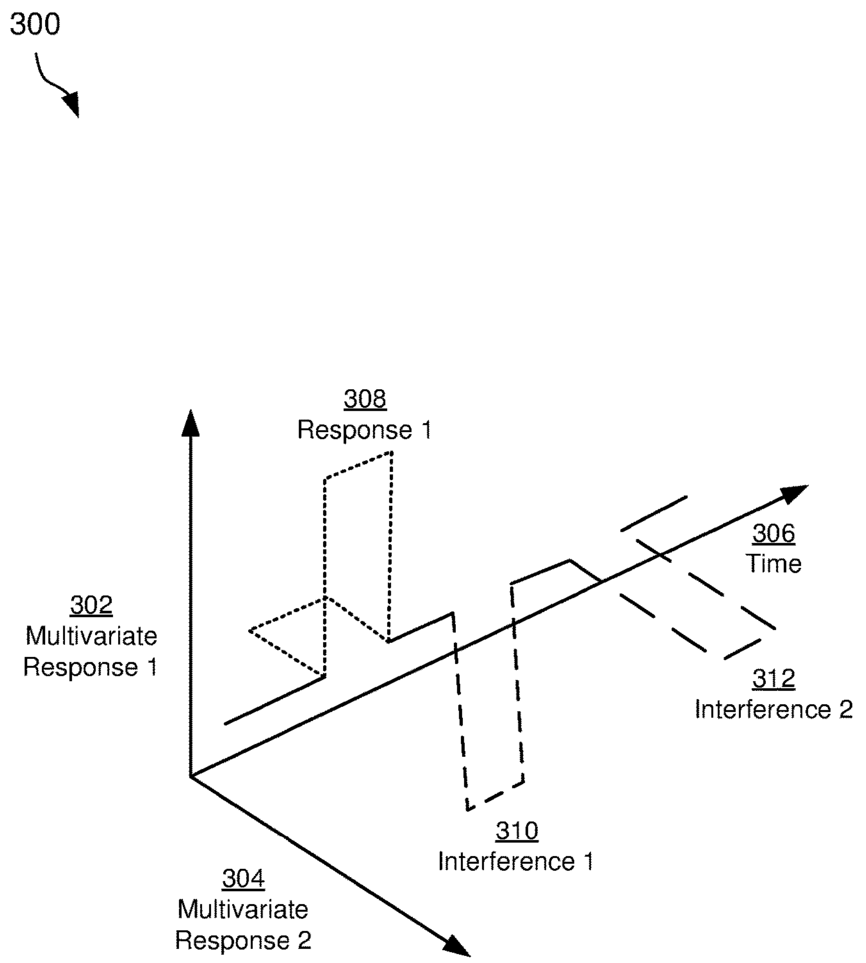

FIG. 19-3 is an illustration depicting the sensing device of FIG. 19-1 configured to detect analytes in a battery pack, according to some implementations.

Figures 1, 19:
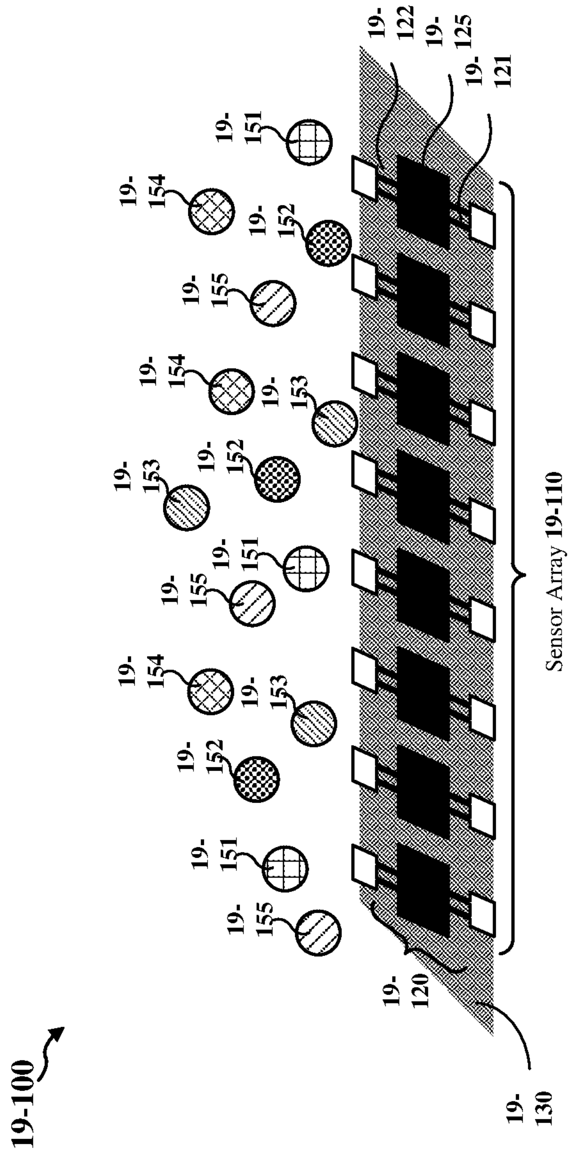
Figures 2, 19:
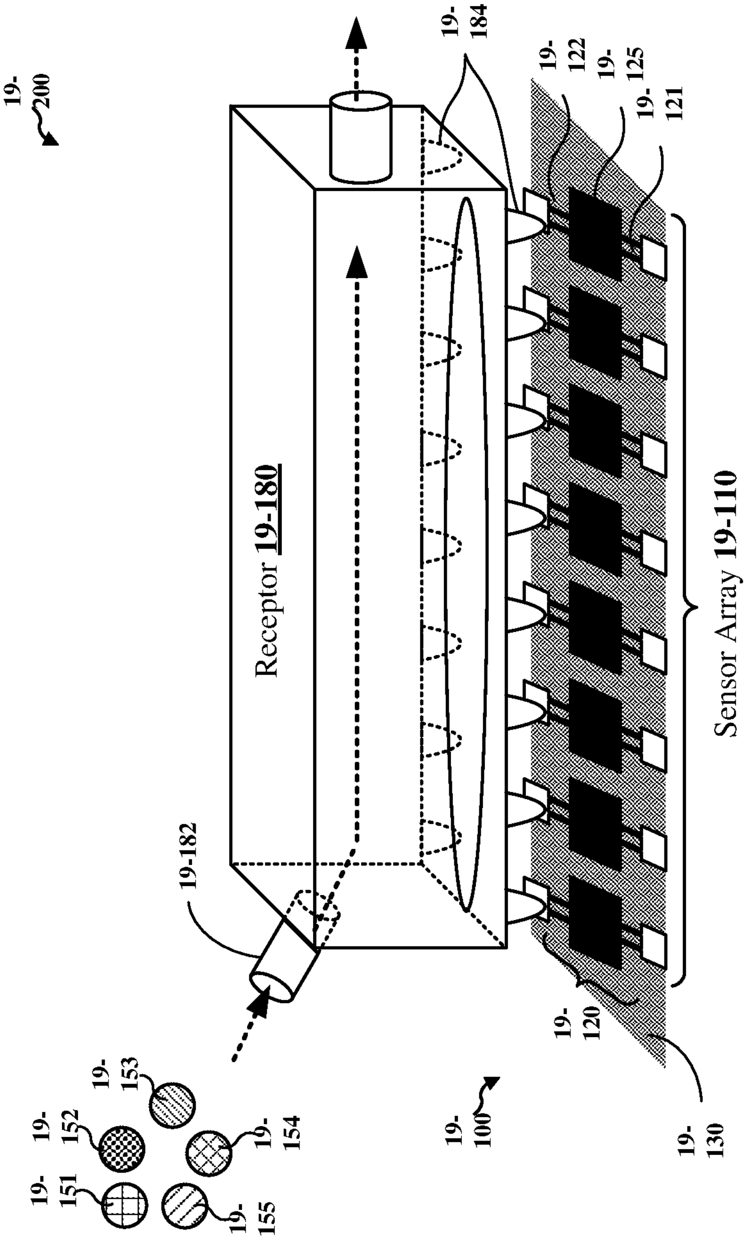
Figures 3, 19:
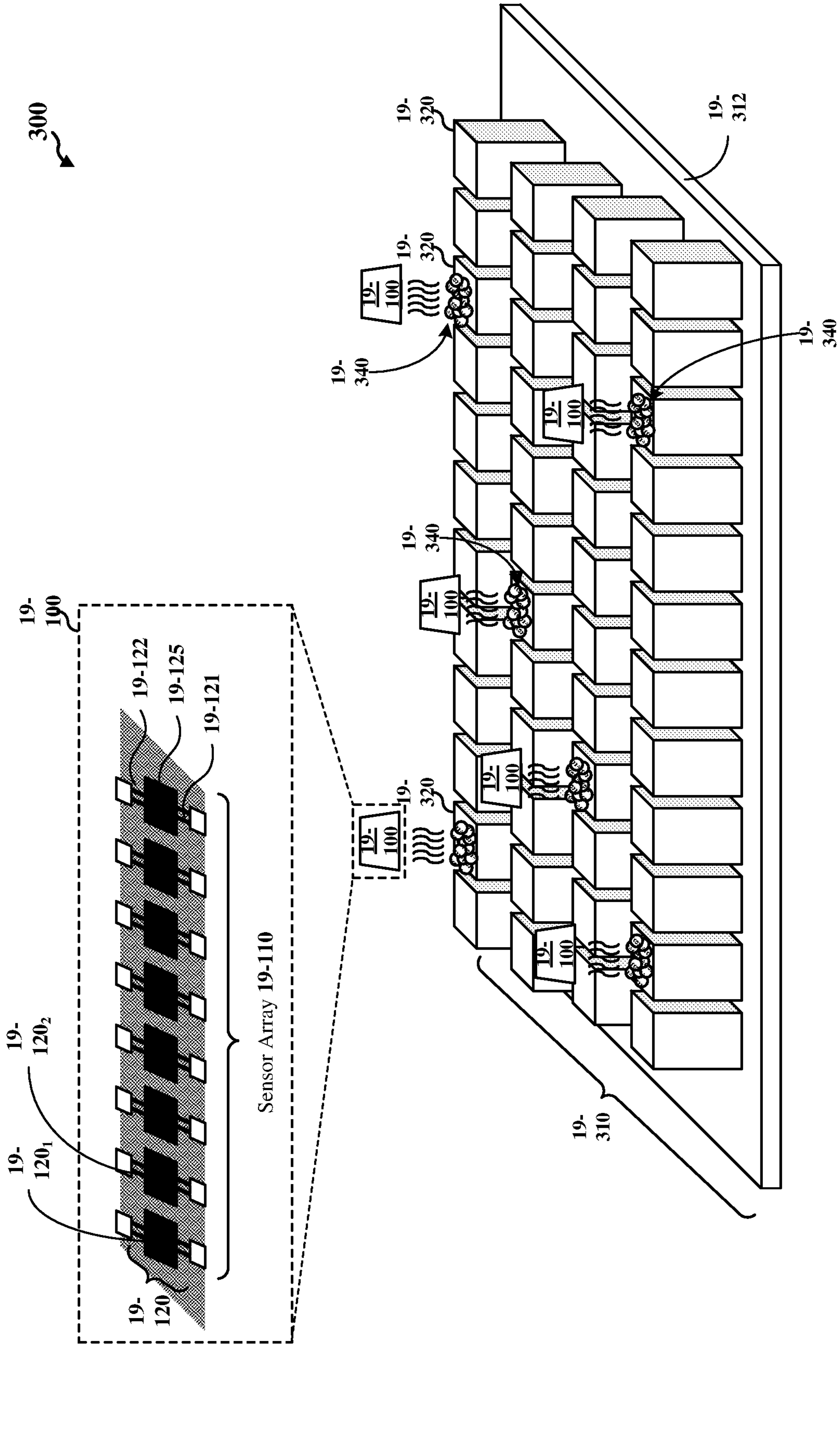
Figures 4, 19:
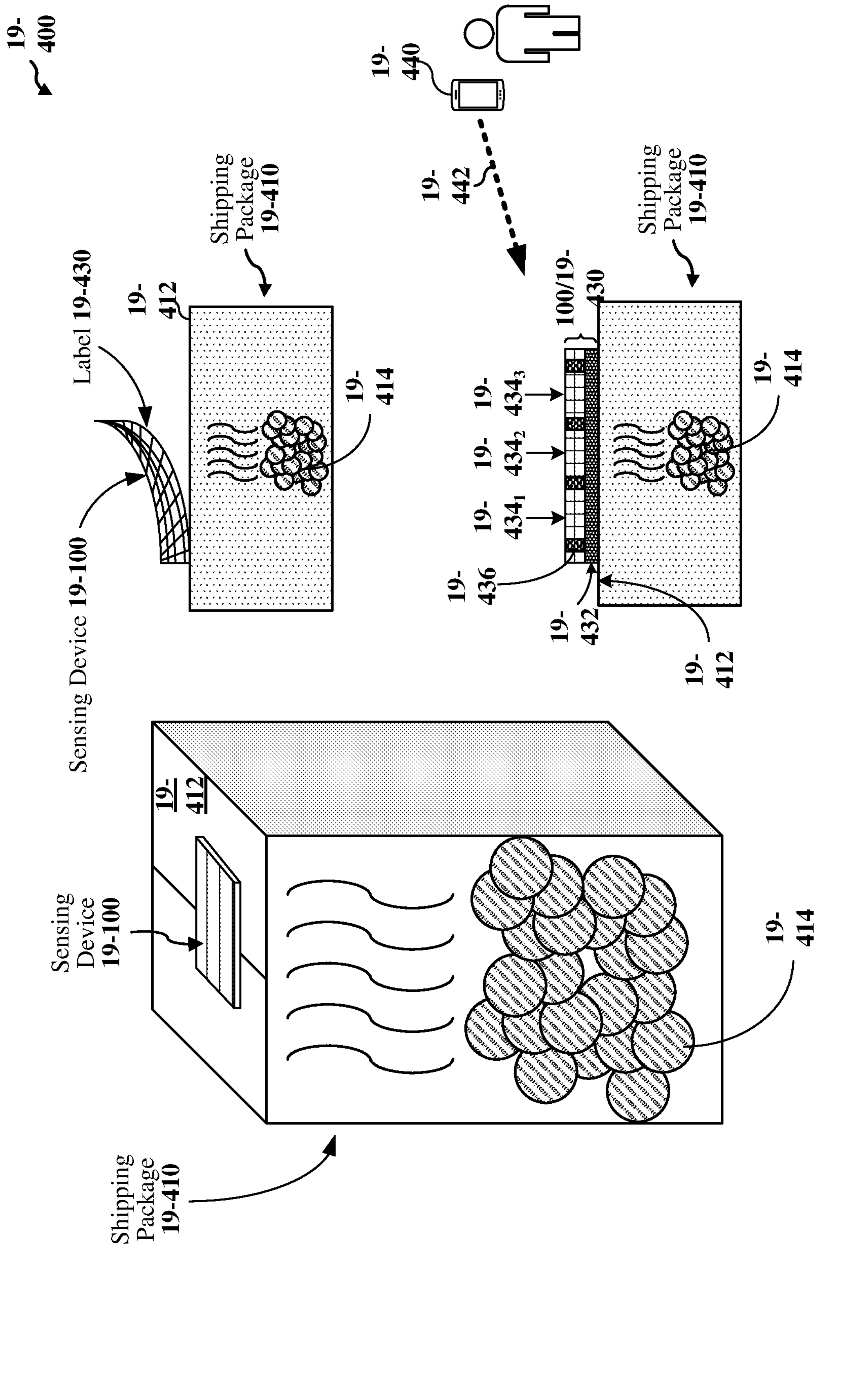
Figures 5, 19:
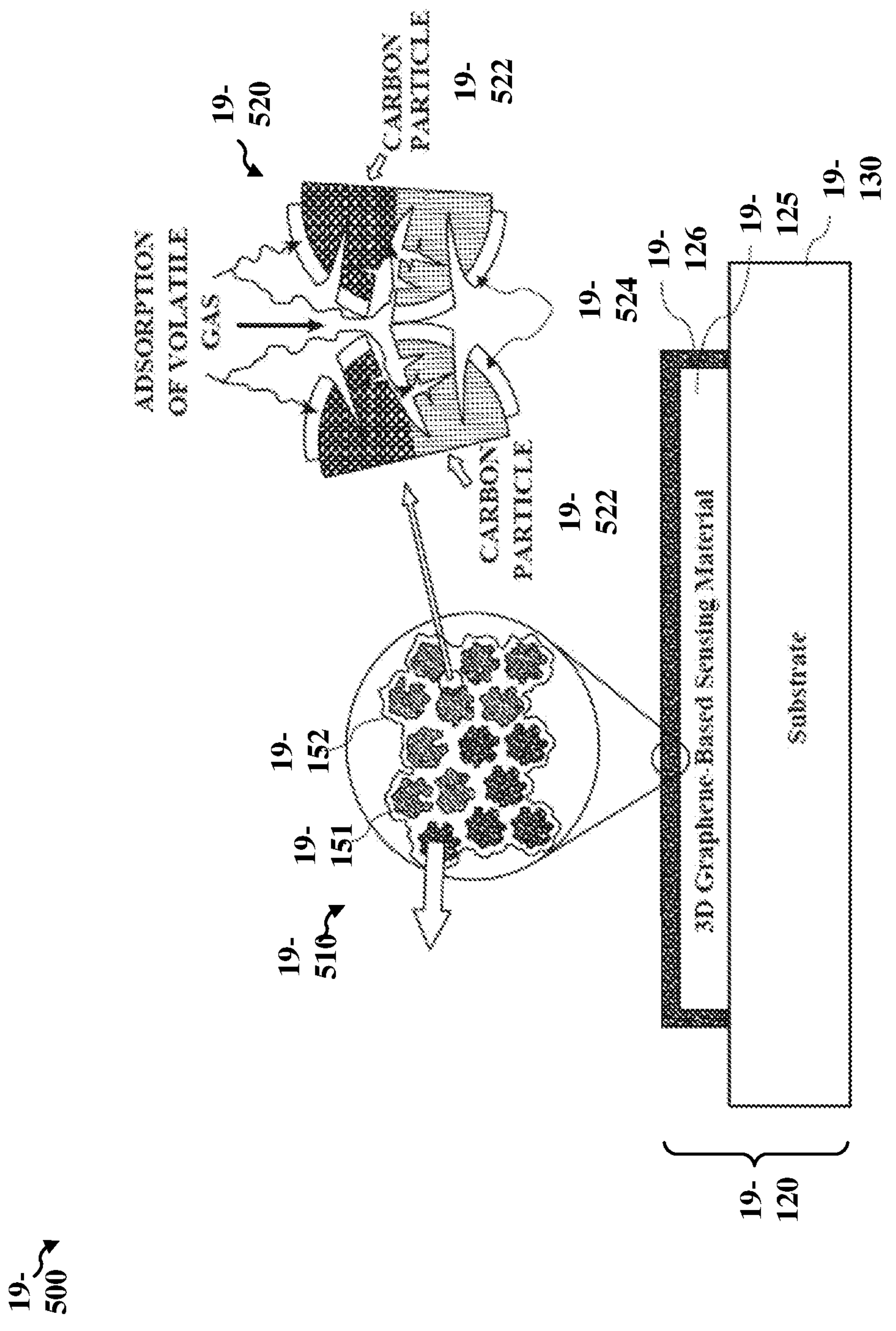
Figures 6, 19:
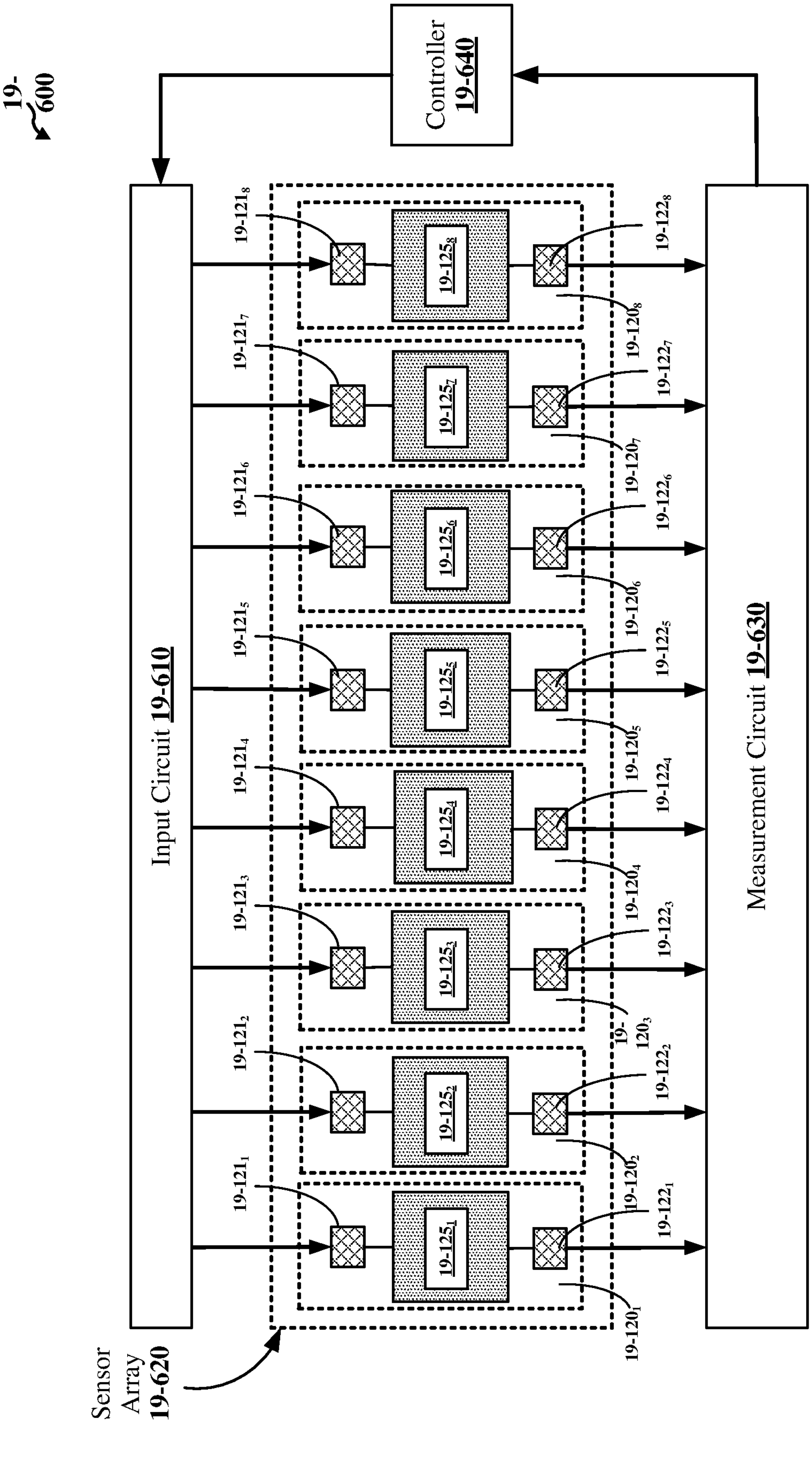
Figures 7A, 19:
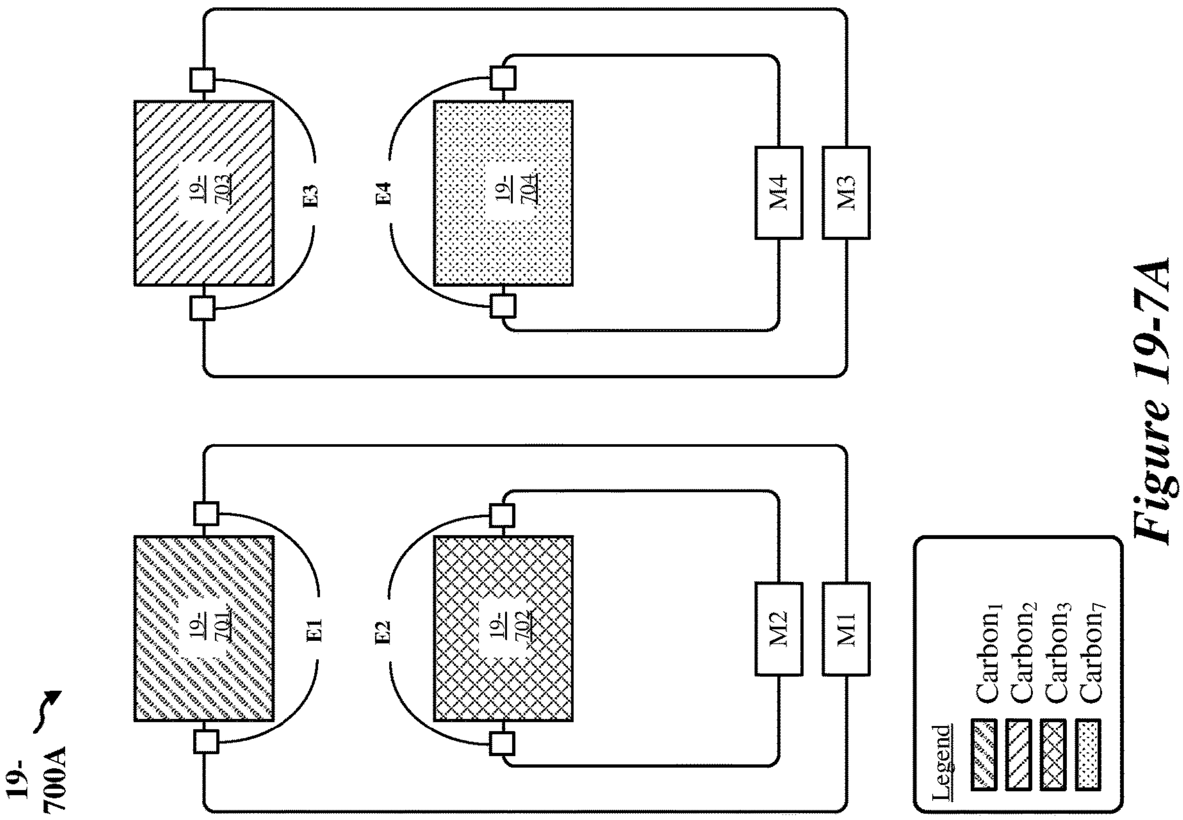
Figures 7B, 19:
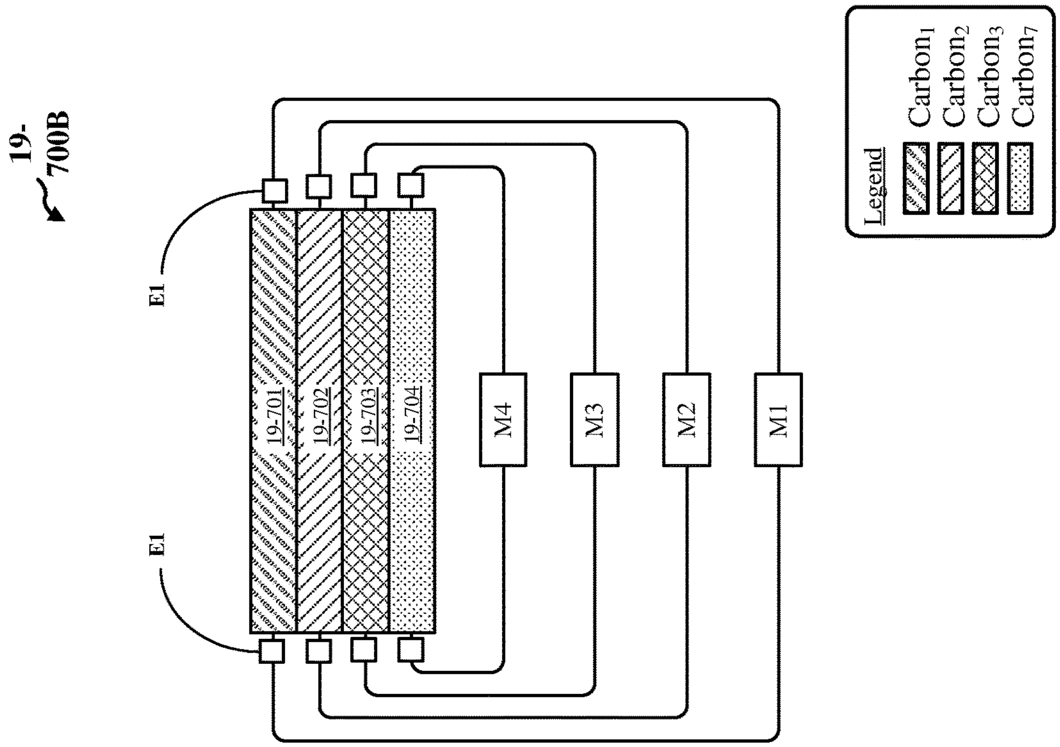

FIG. 19-4 is an illustration depicting the sensing device of FIG. 19-1 configured to detect analytes in a battery pack, according to some implementations.

Figures 1A, 18:
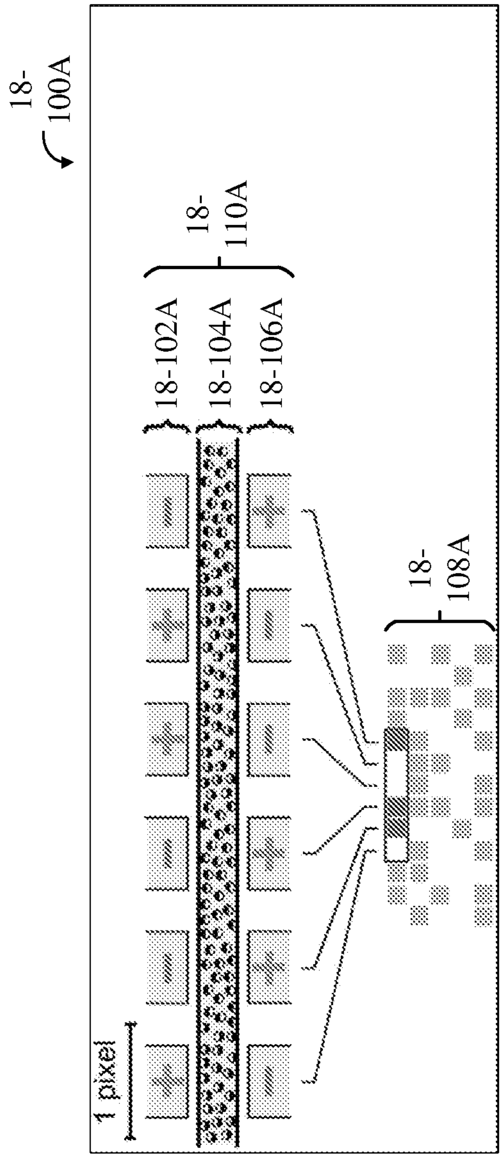
Figures 1B, 18:
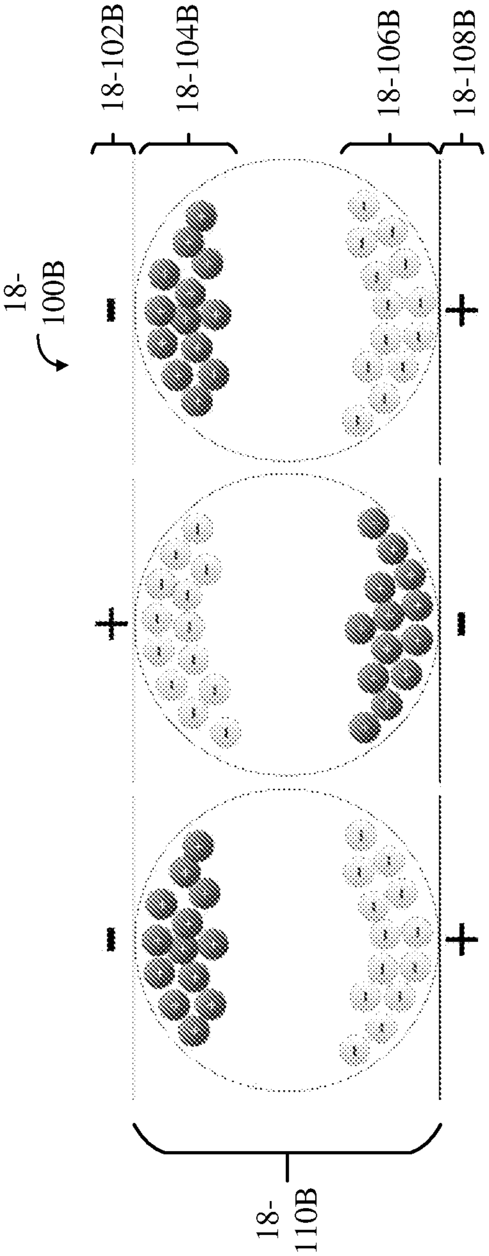
Figures 1C, 18:
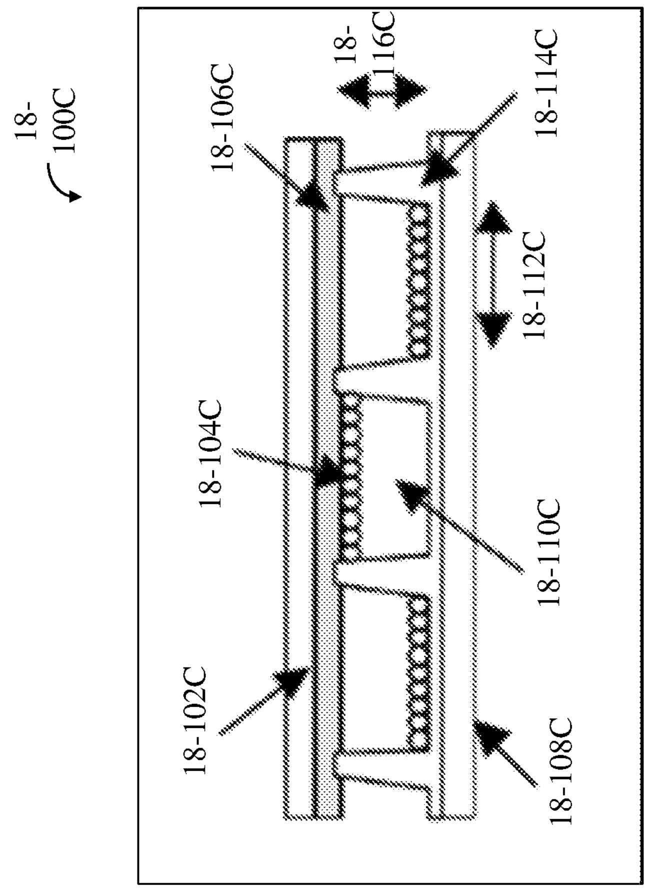
Figures 1D, 18:
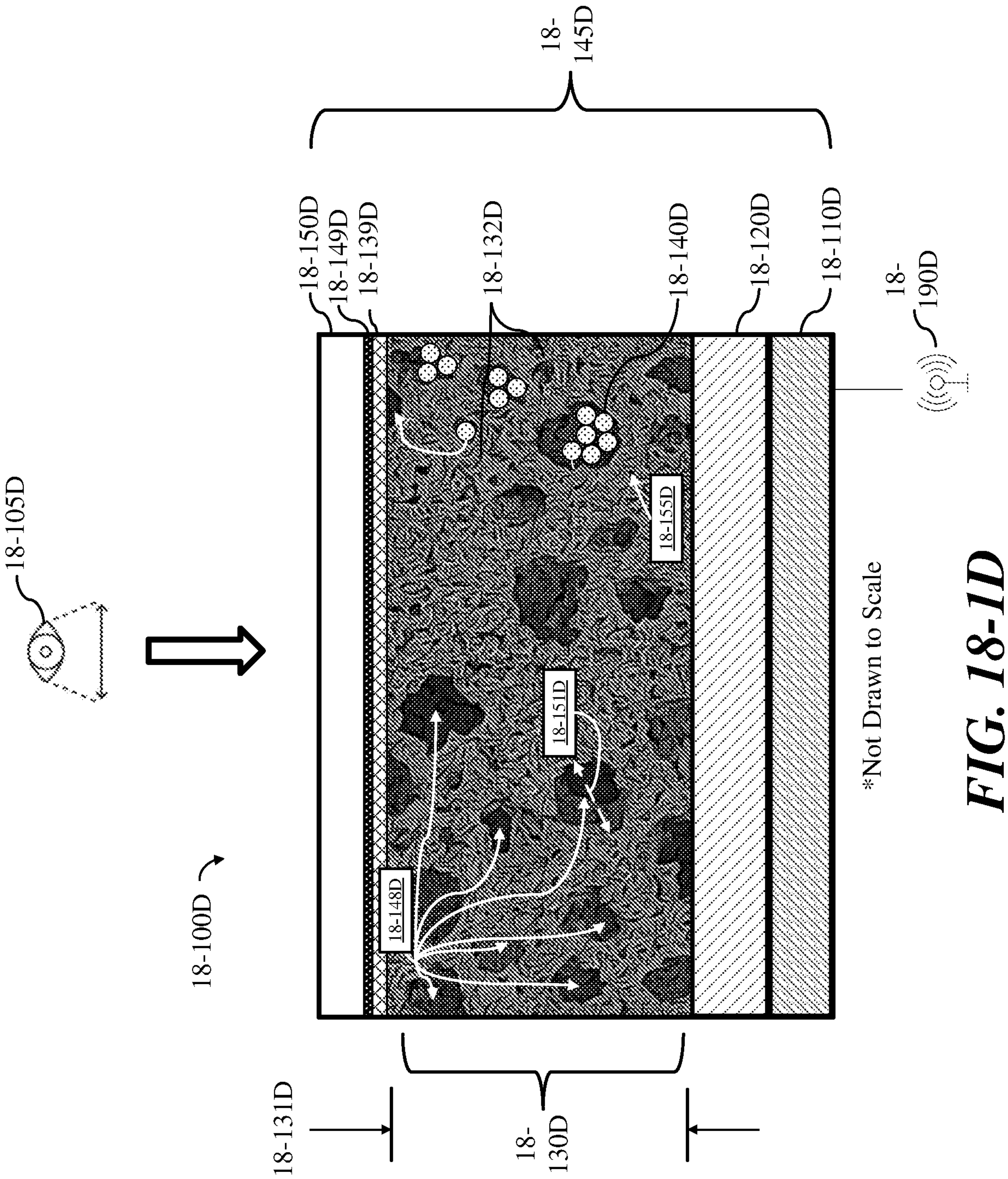
Figures 1E, 18:
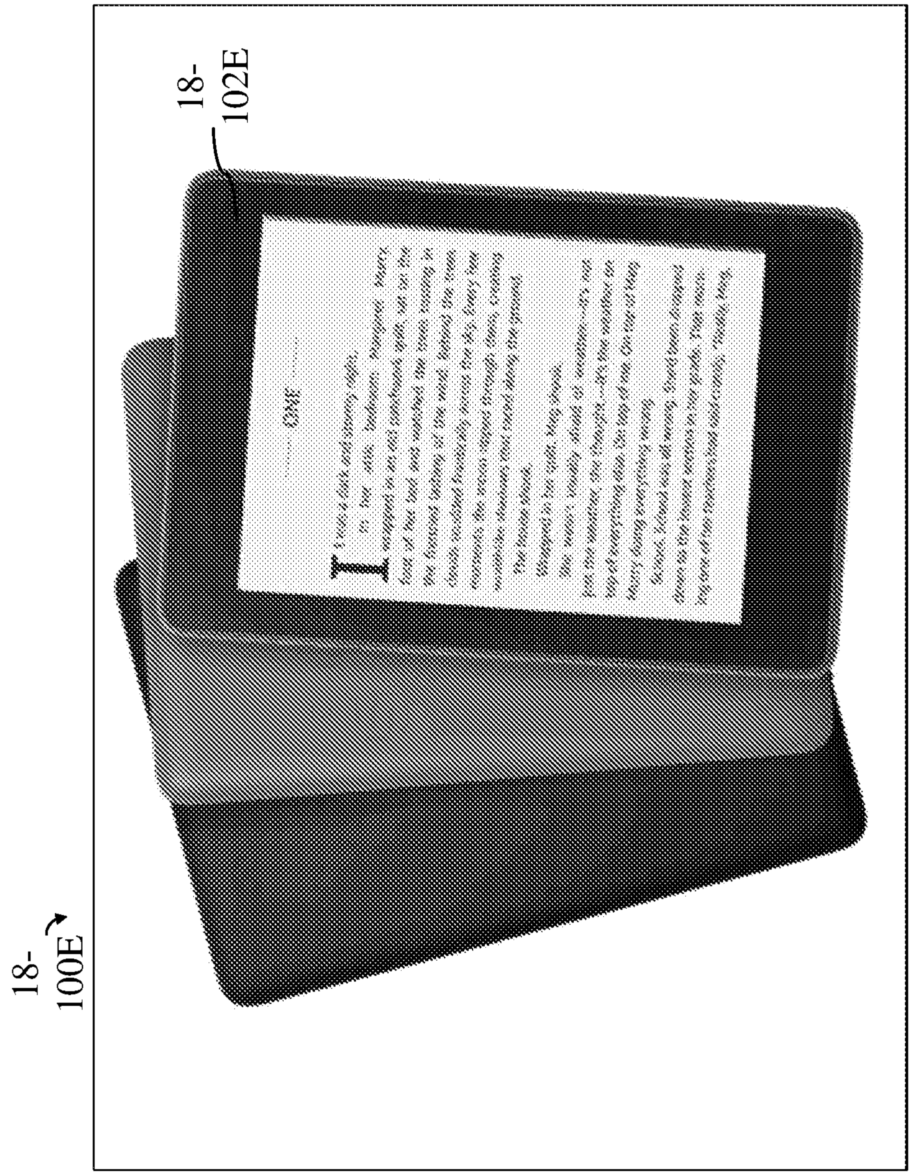
Figures 2, 18:
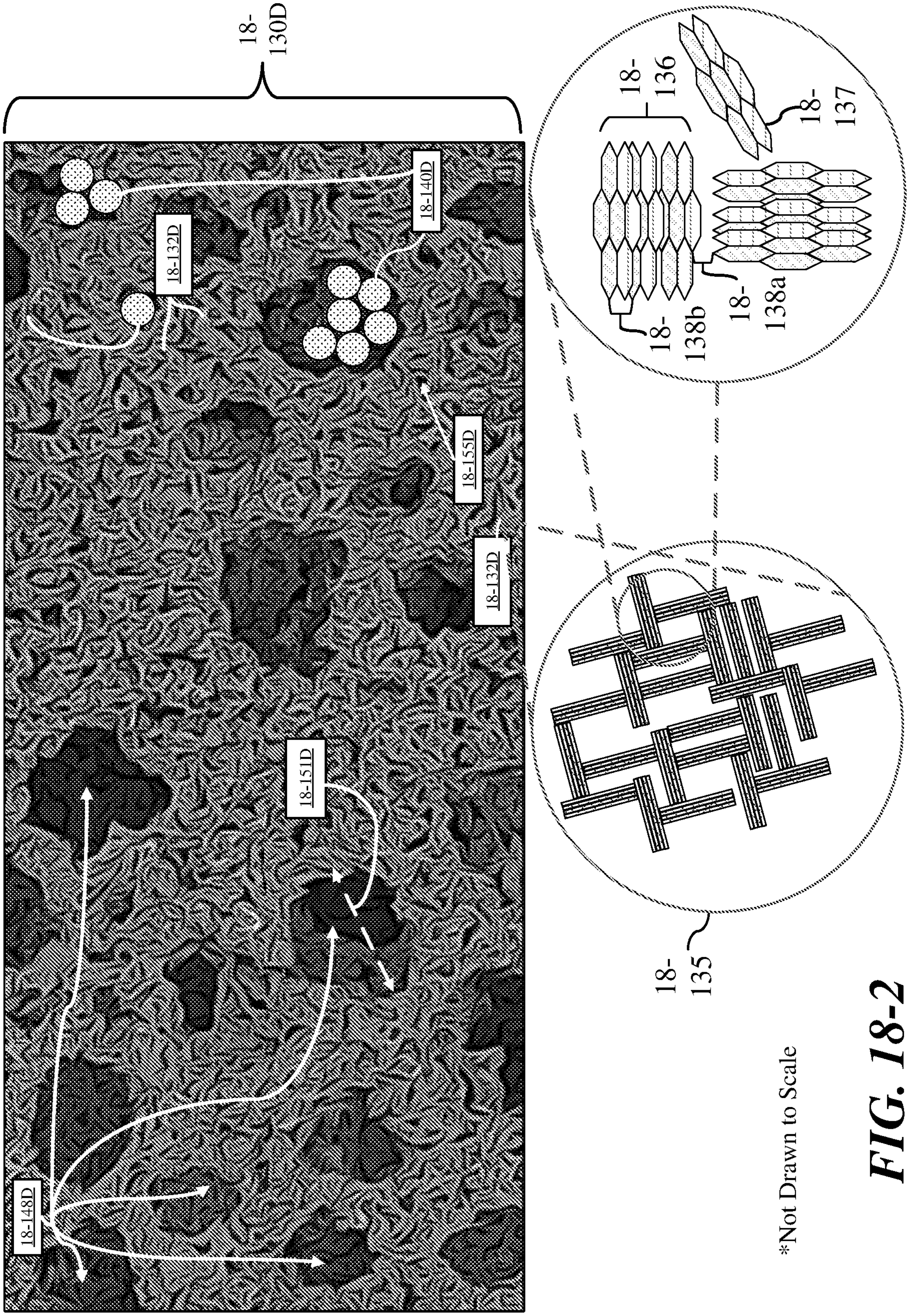
Figures 3A, 18:
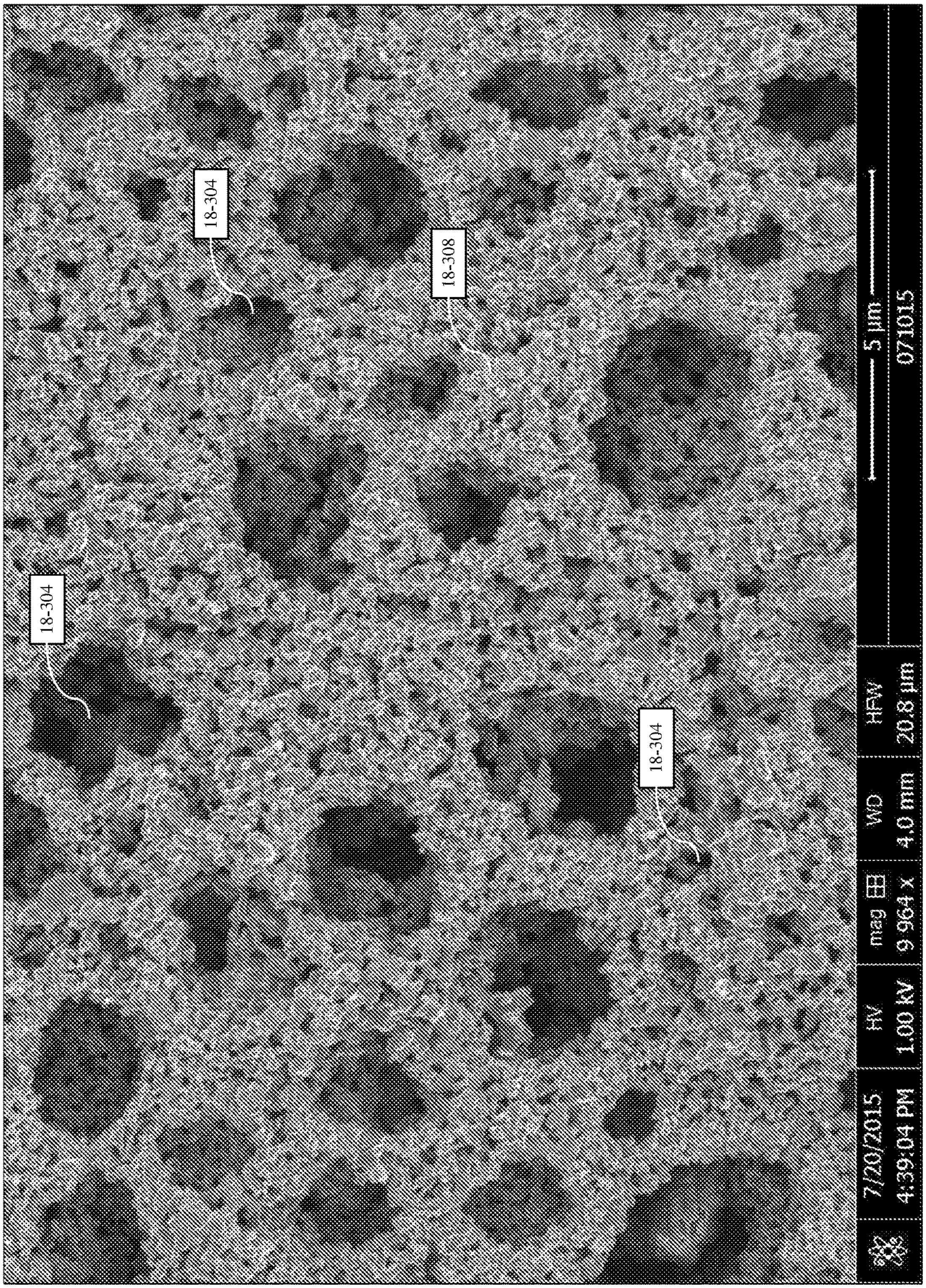
Figures 3B, 18:
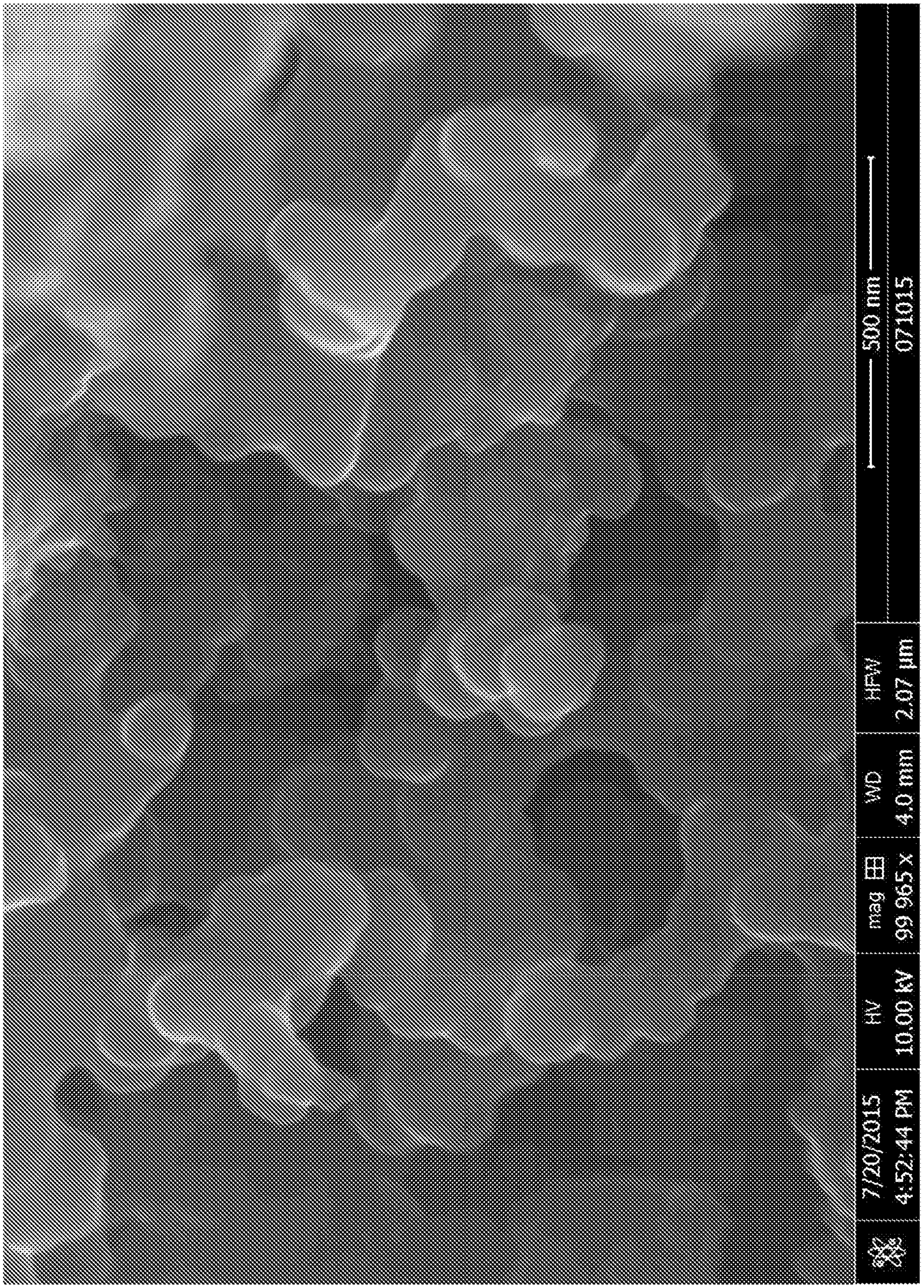
Figures 4A, 18:
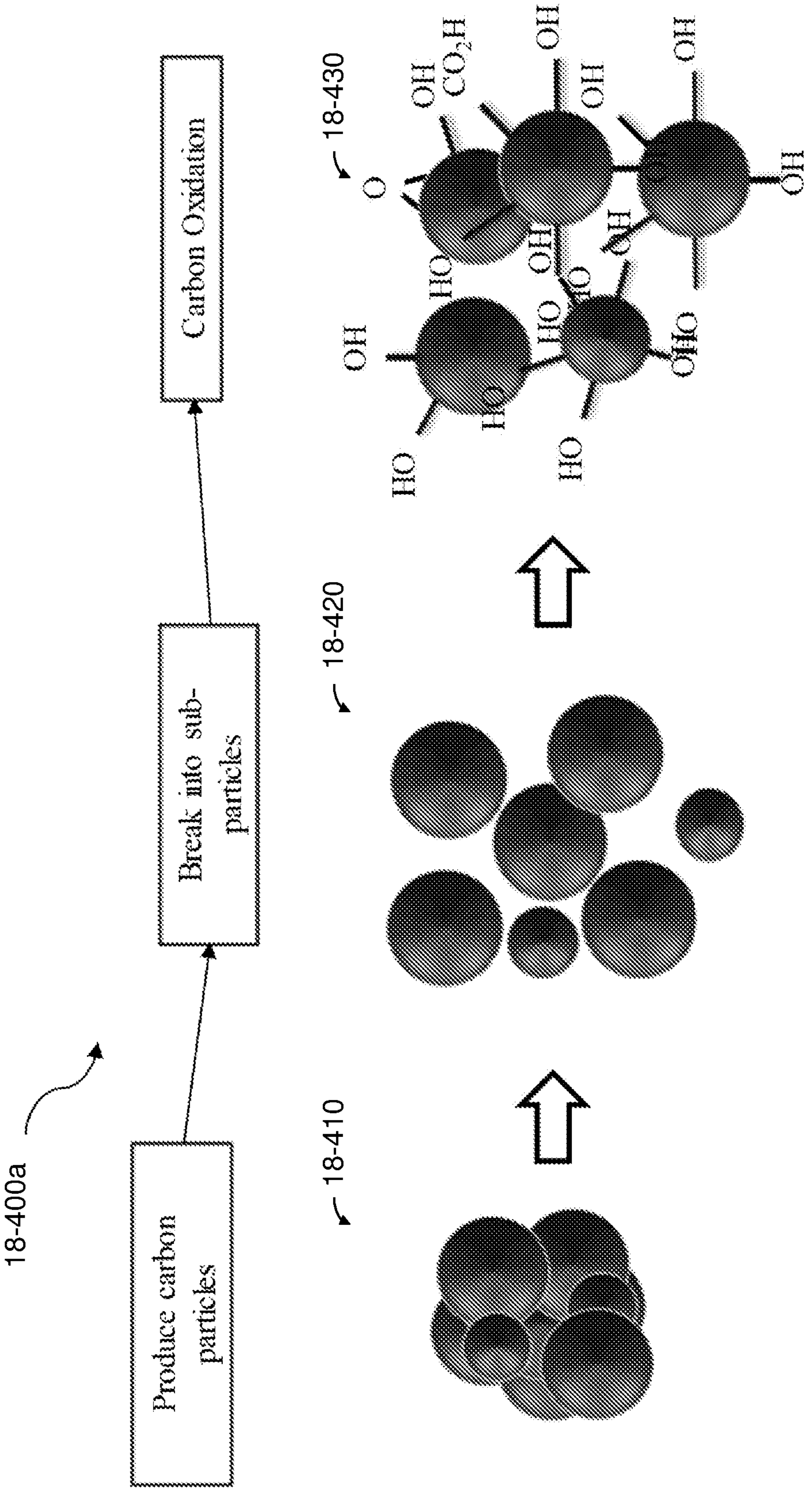
Figures 4B, 18:
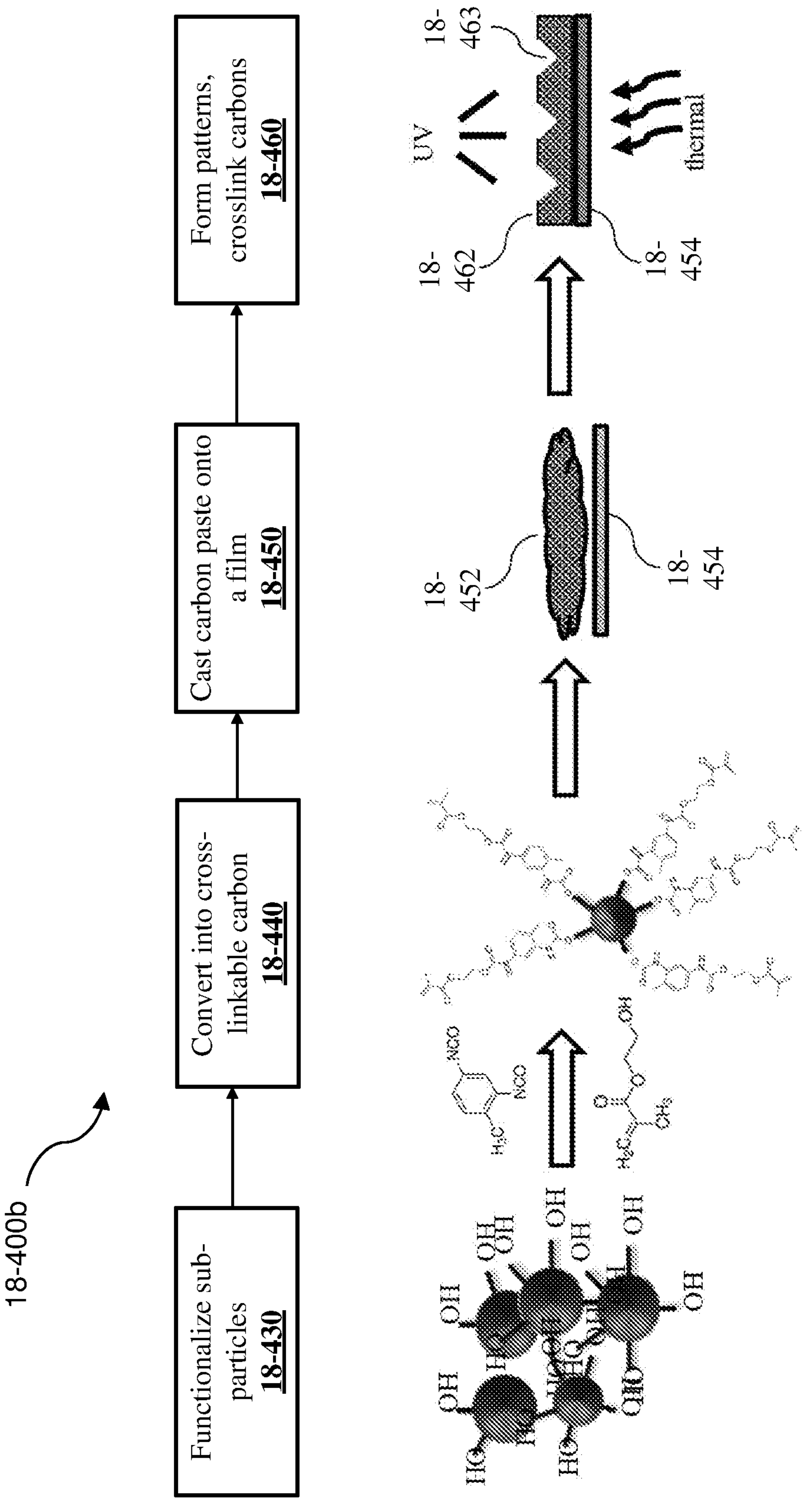
Figures 5, 18:
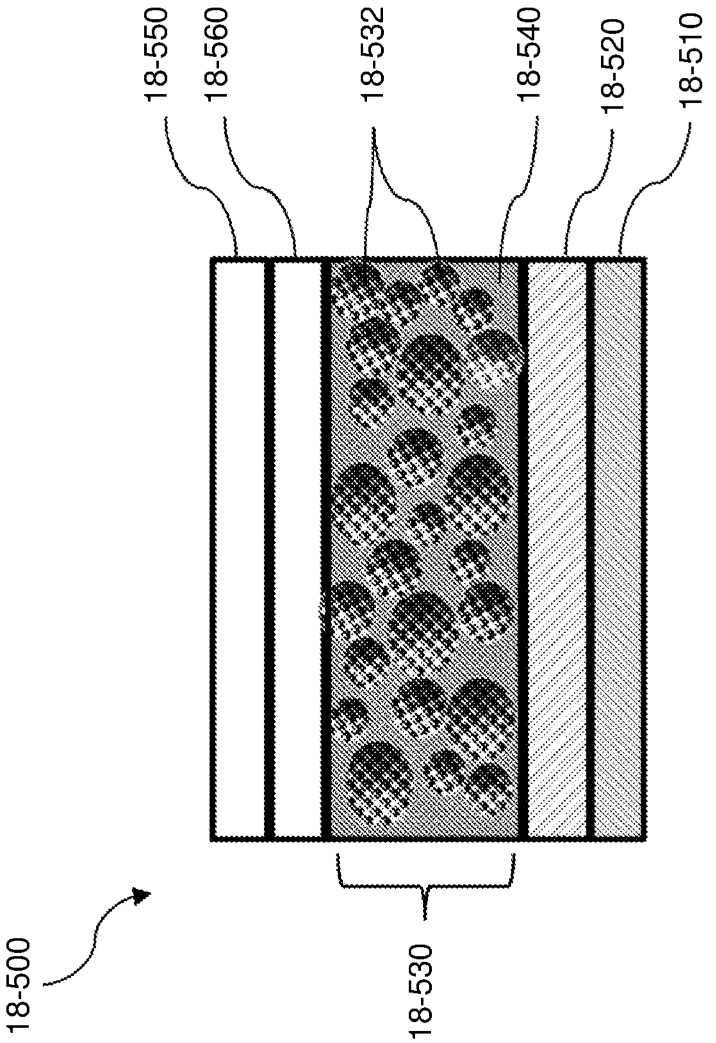
Figures 6, 18:
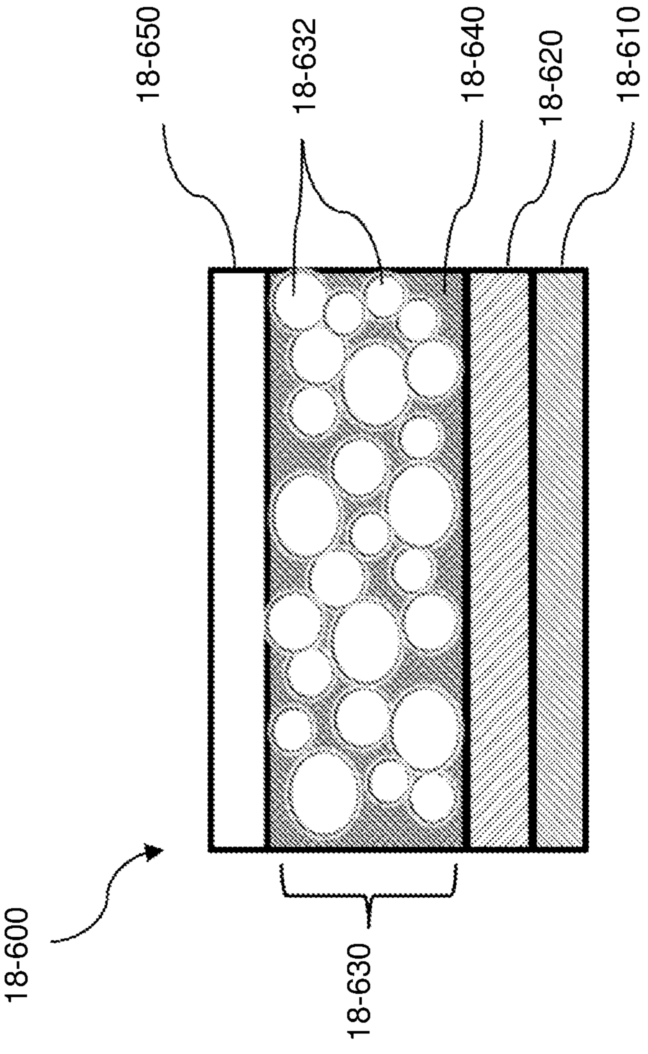
Figures 7A, 18:
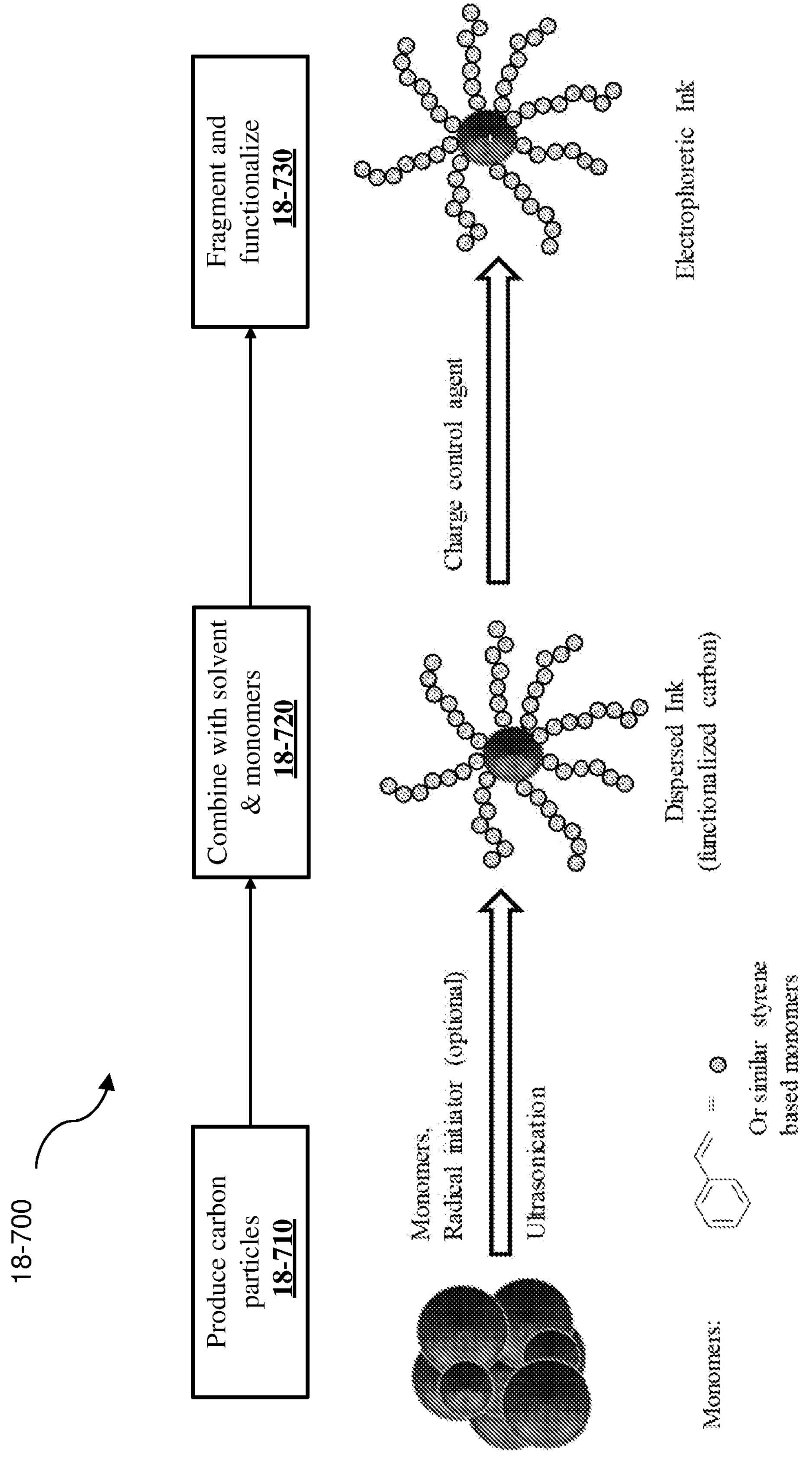

FIG. 19-5 is an illustration depicting reactions between one or more analytes and the sensing device of FIG. 19-1, according to some implementations.

Figure 6:
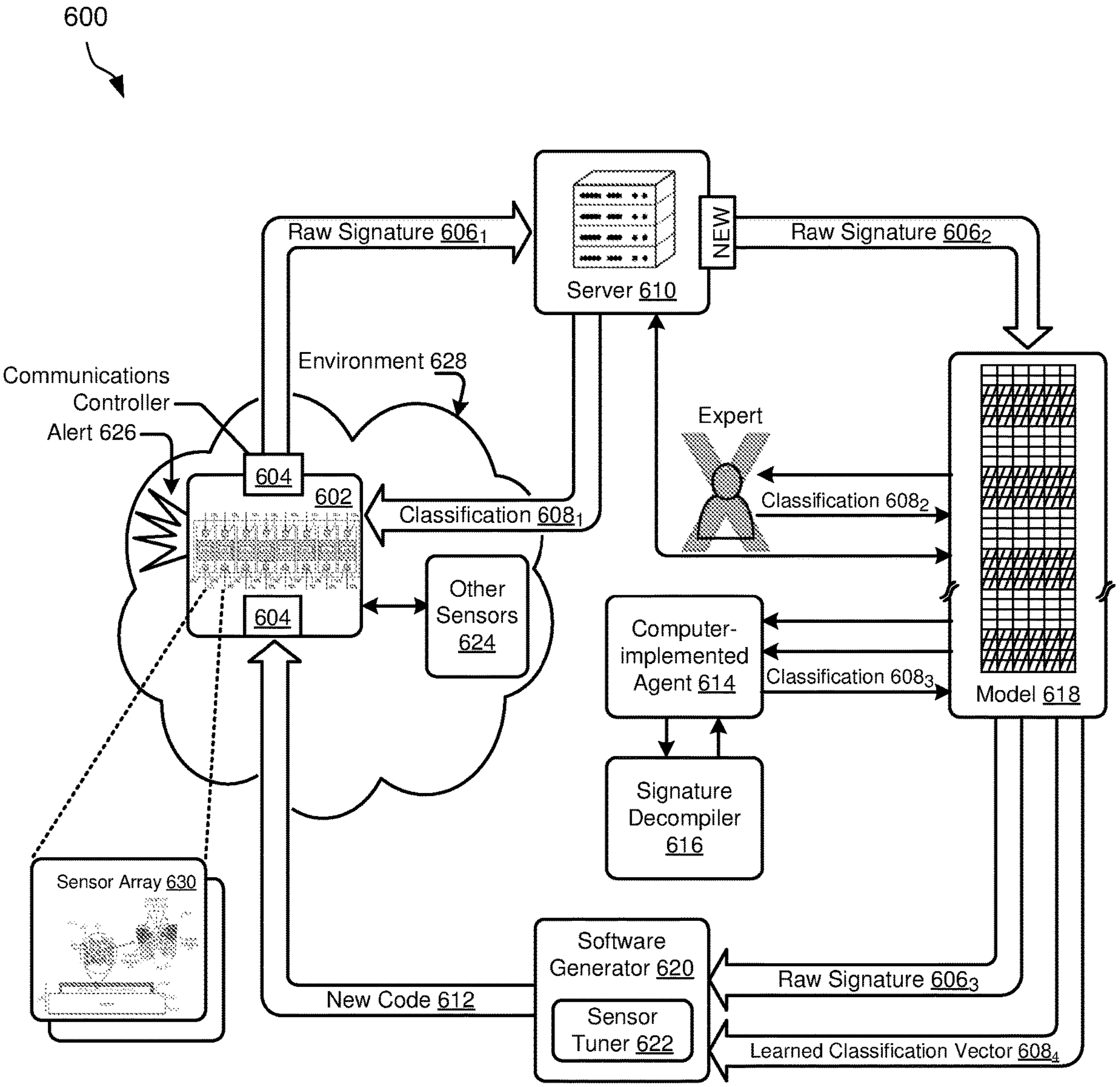

FIG. 19-6 is a block diagram of an analyte detection system that includes the sensing device of FIG. 19-1, according to some implementations.

Figures 7C, 19:
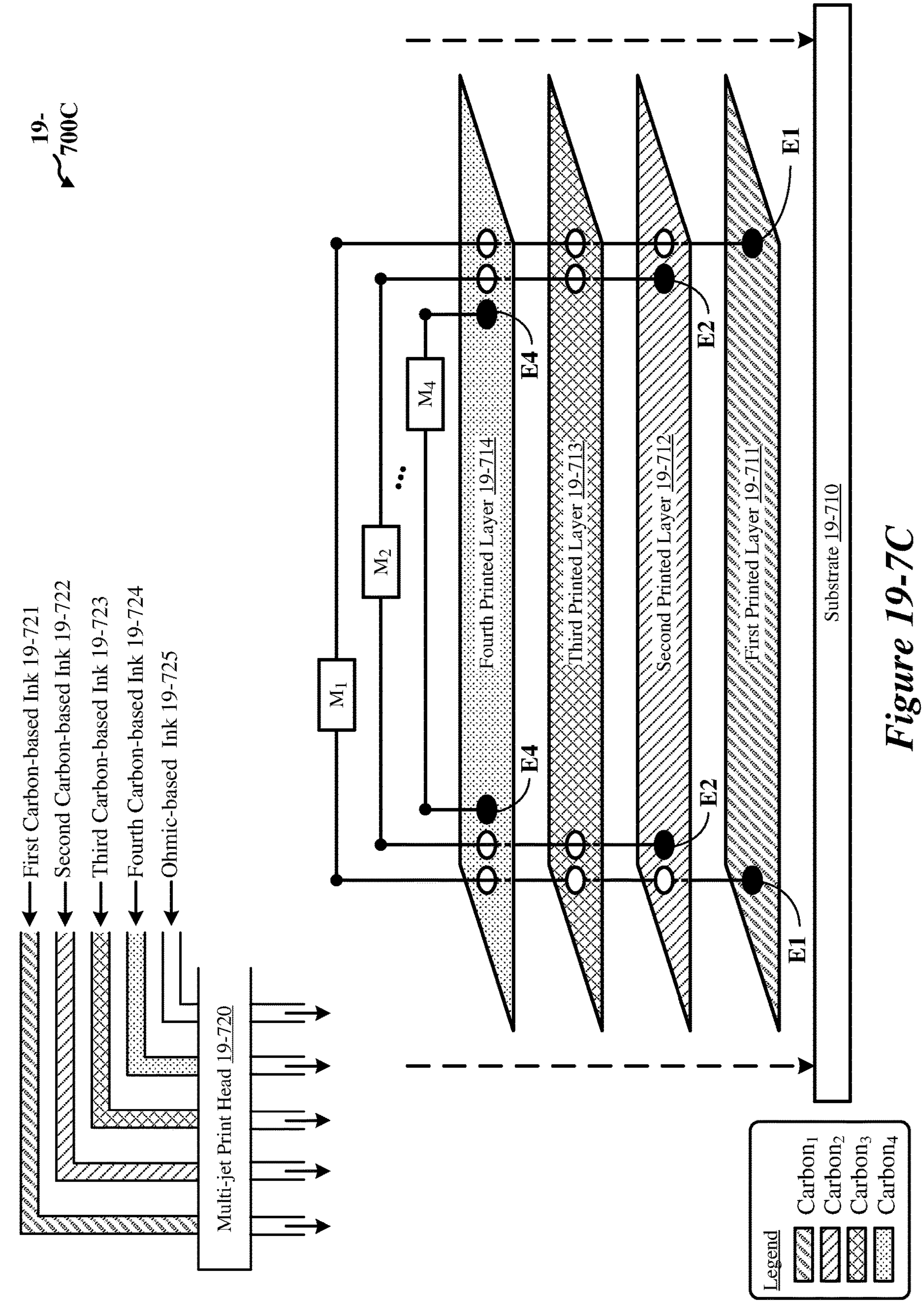
Figures 7D, 19:
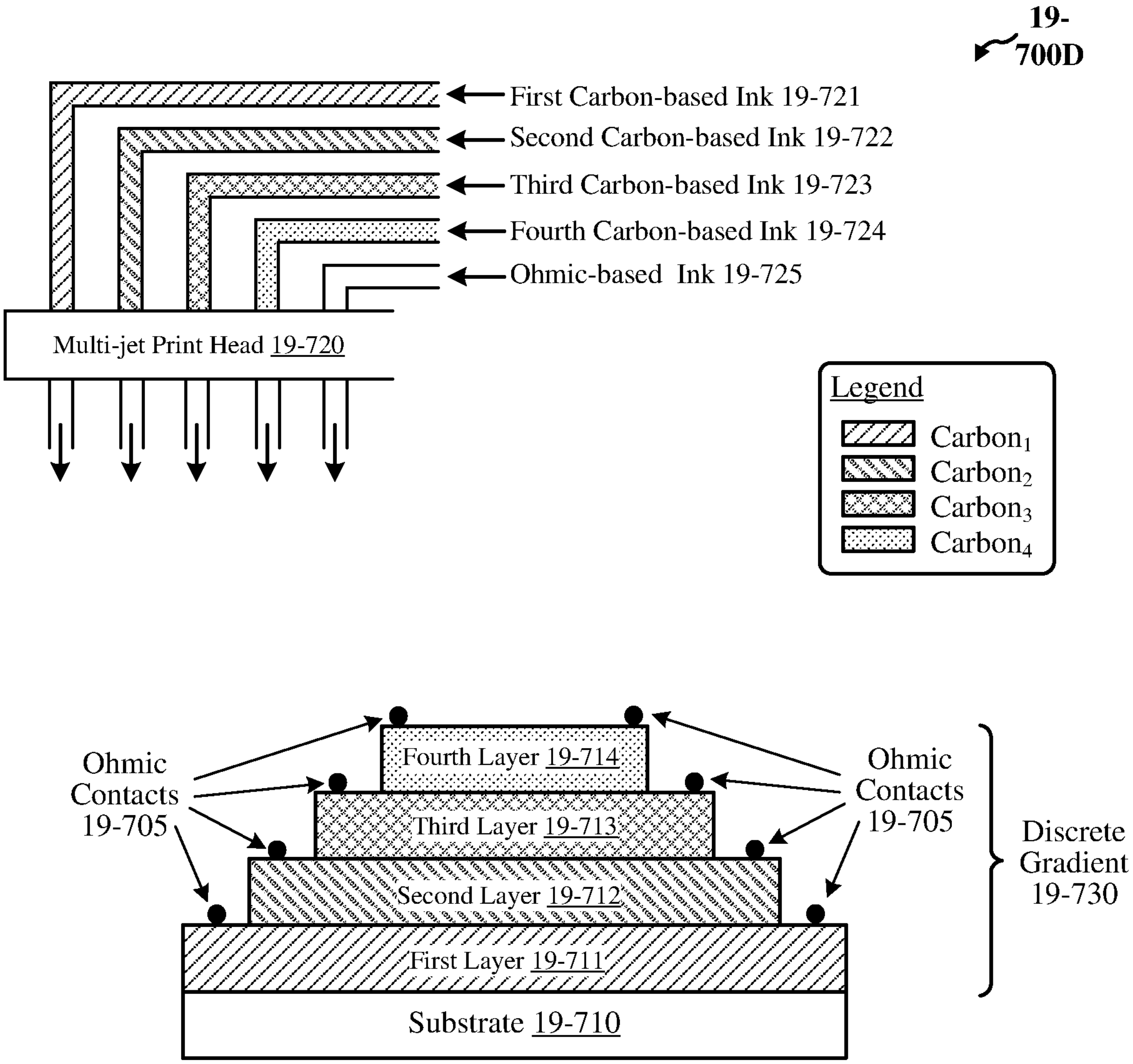
Figures 7E, 19:
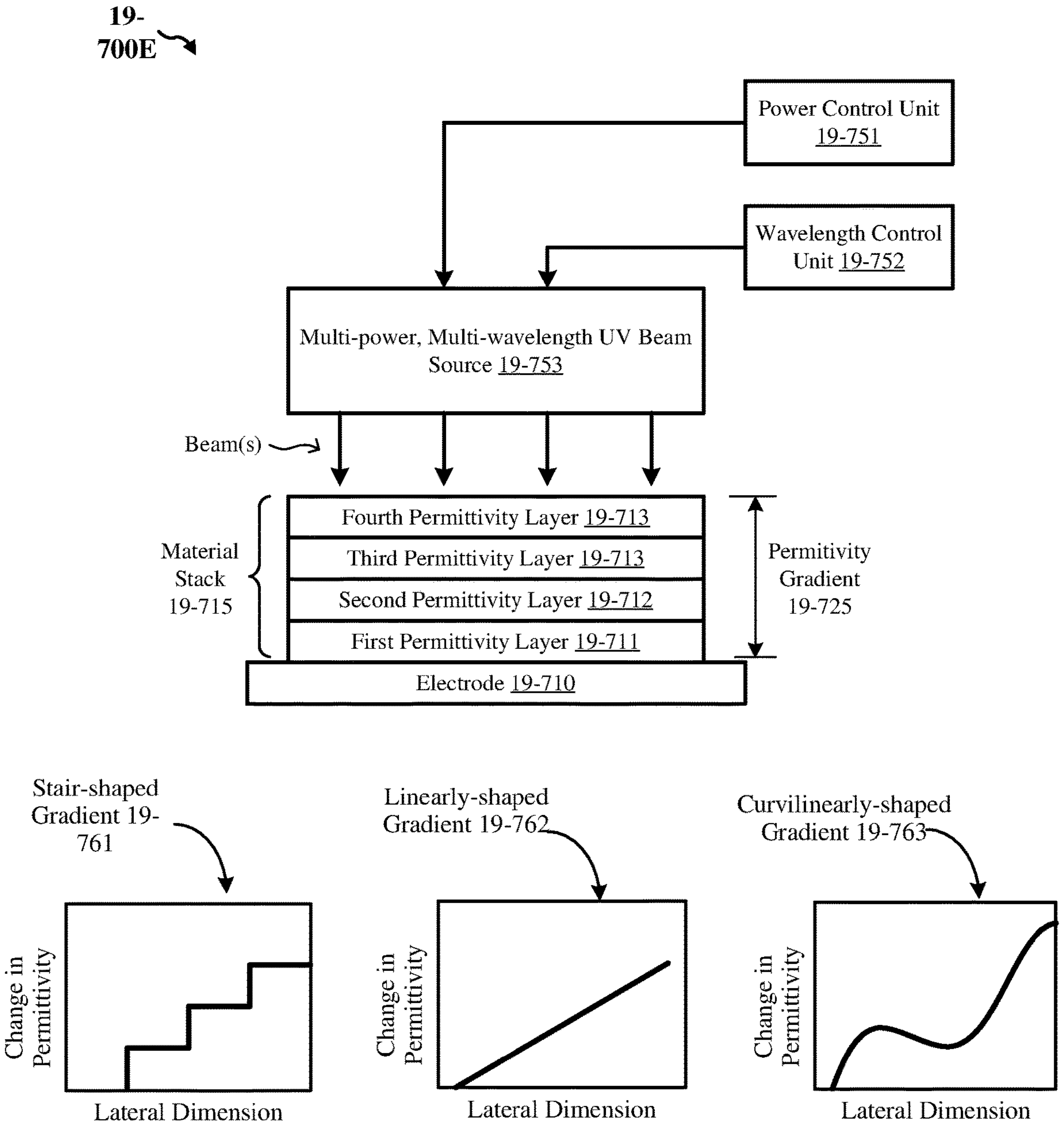
Figures 8, 19:
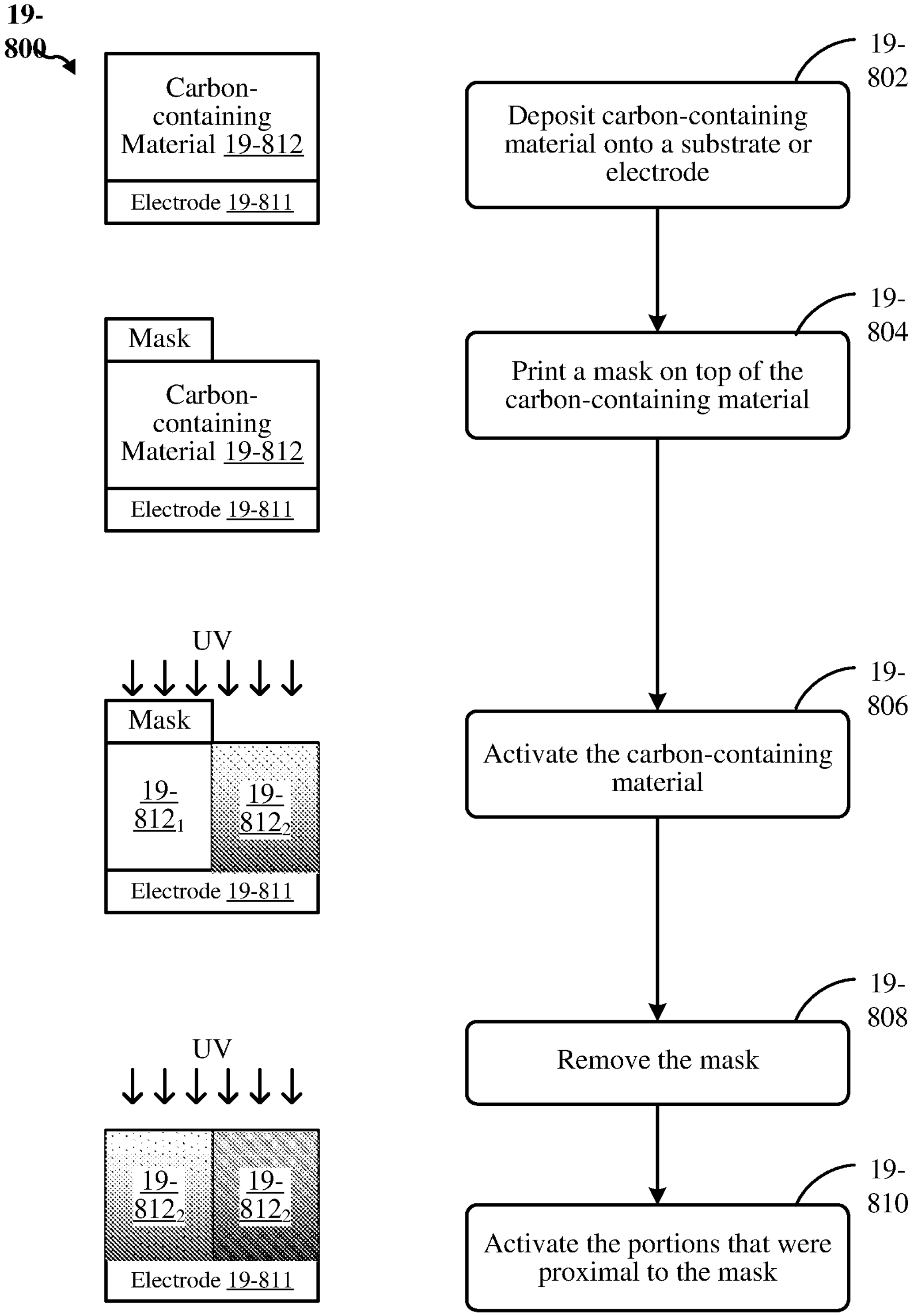
Figures 9, 19:
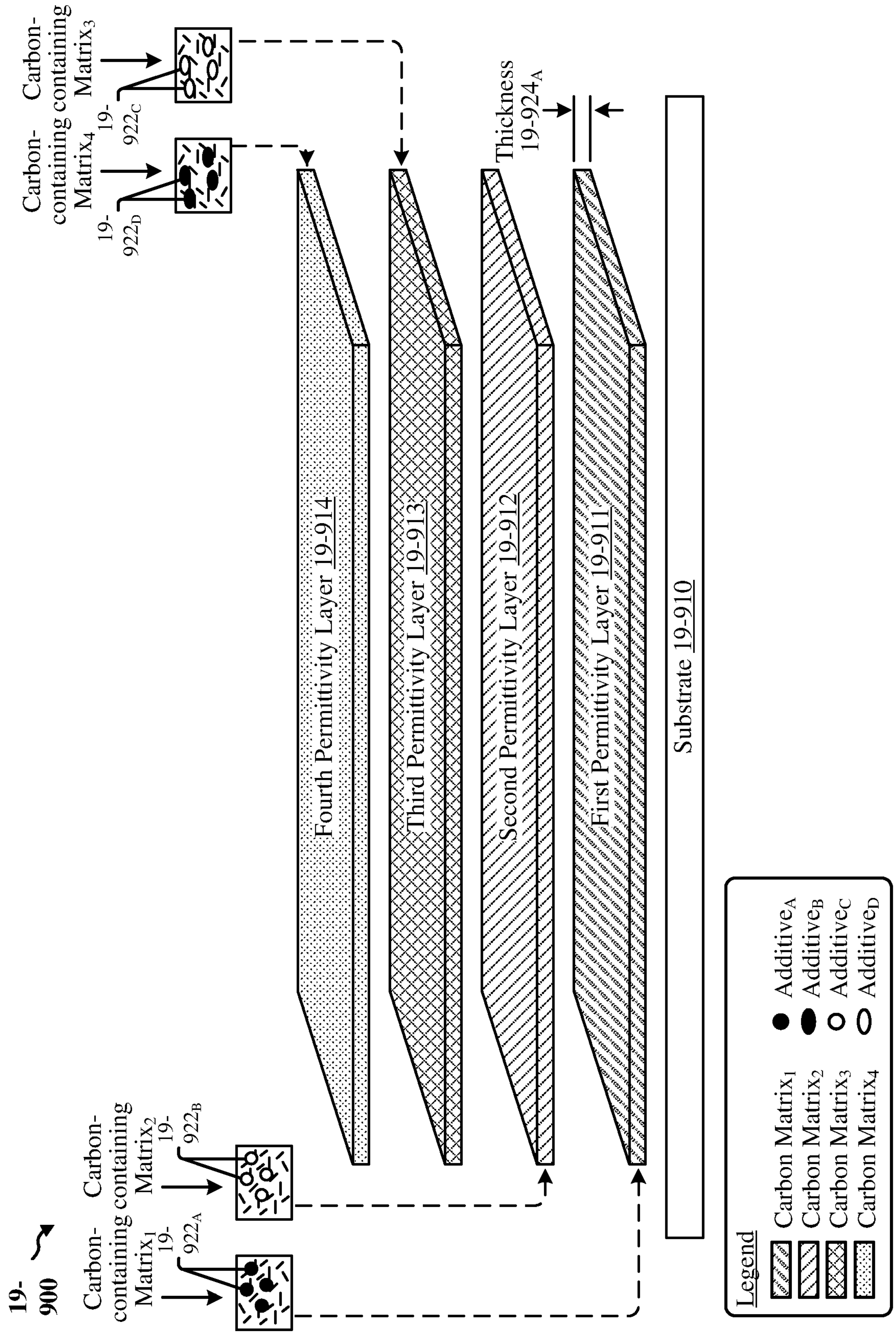

FIGS. 19-7A-19-7E show sensor arrays configured to detect analytes, according to various implementations.

Figure 8:
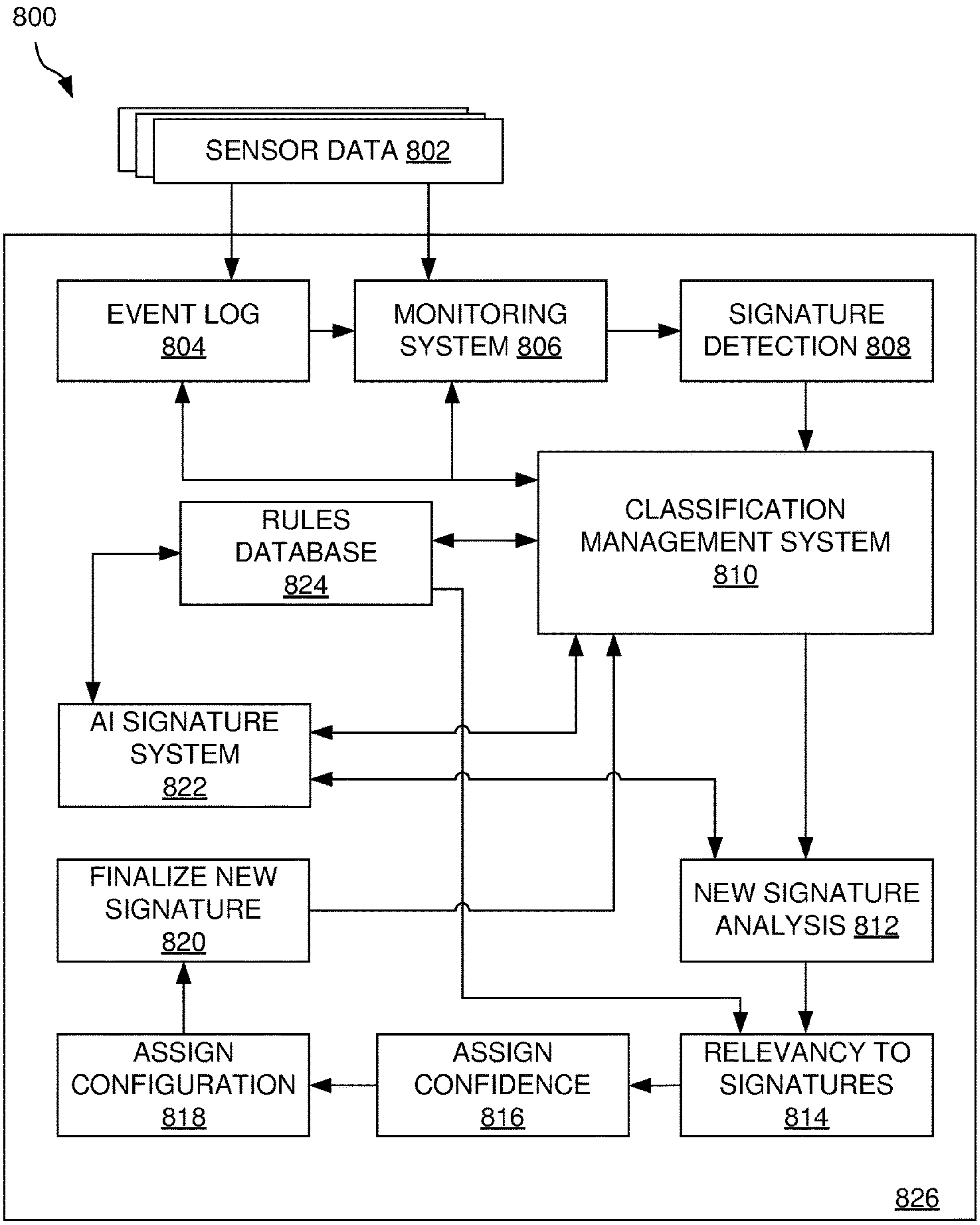
FIG. 8 illustrates a flow for training a sensor machine learning system, in accordance with one embodiment.

FIG. 19-8 shows a flow chart depicting an example operation for fabricating at least some of the sensing devices disclosed herein, according to some implementations.

Figure 9:
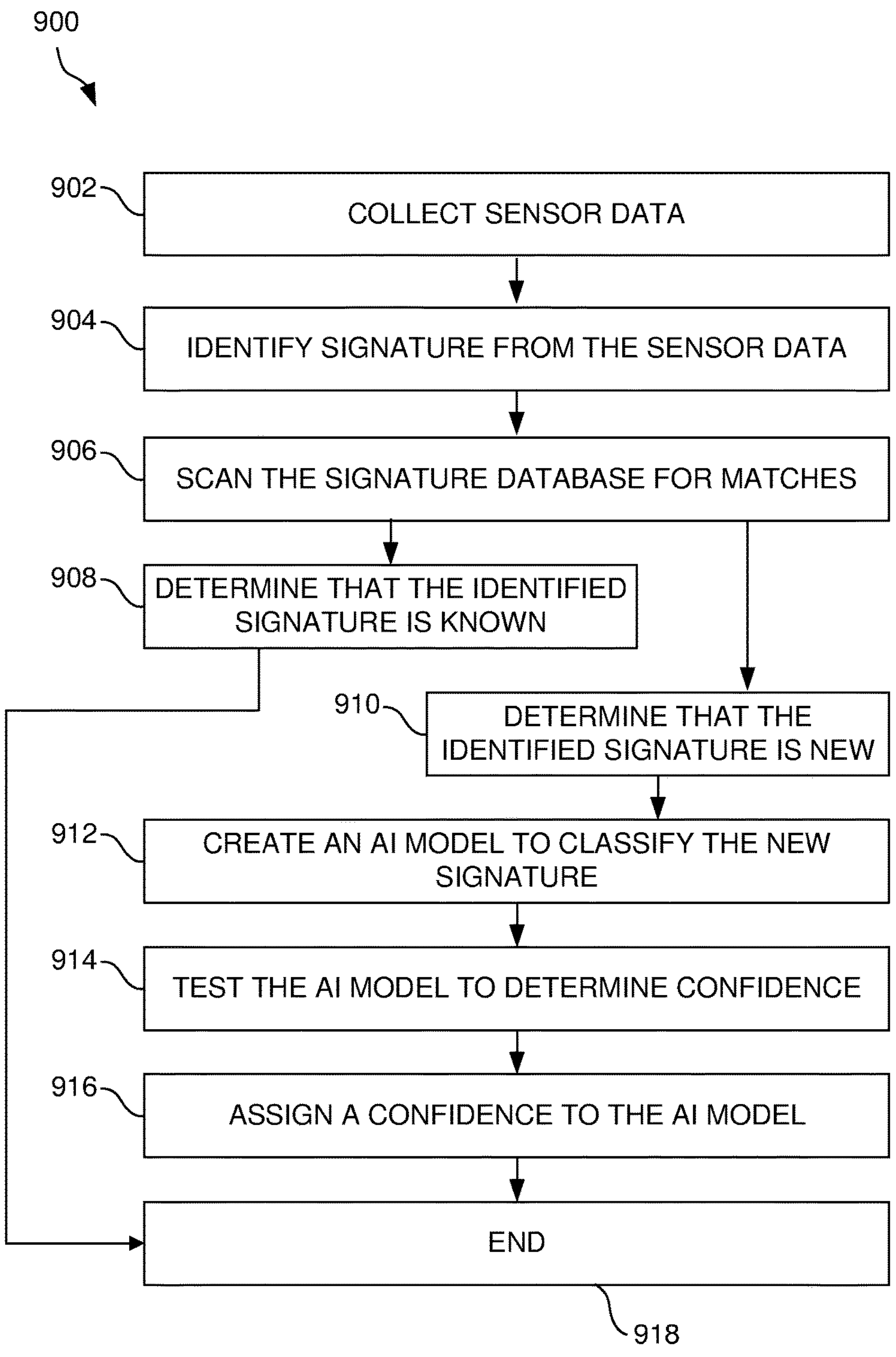
FIG. 9 illustrates a method for testing AI models based on digital signatures, in accordance with one embodiment.

FIG. 19-9 shows another sensor array, according to some implementations.

Figures 1, 21:
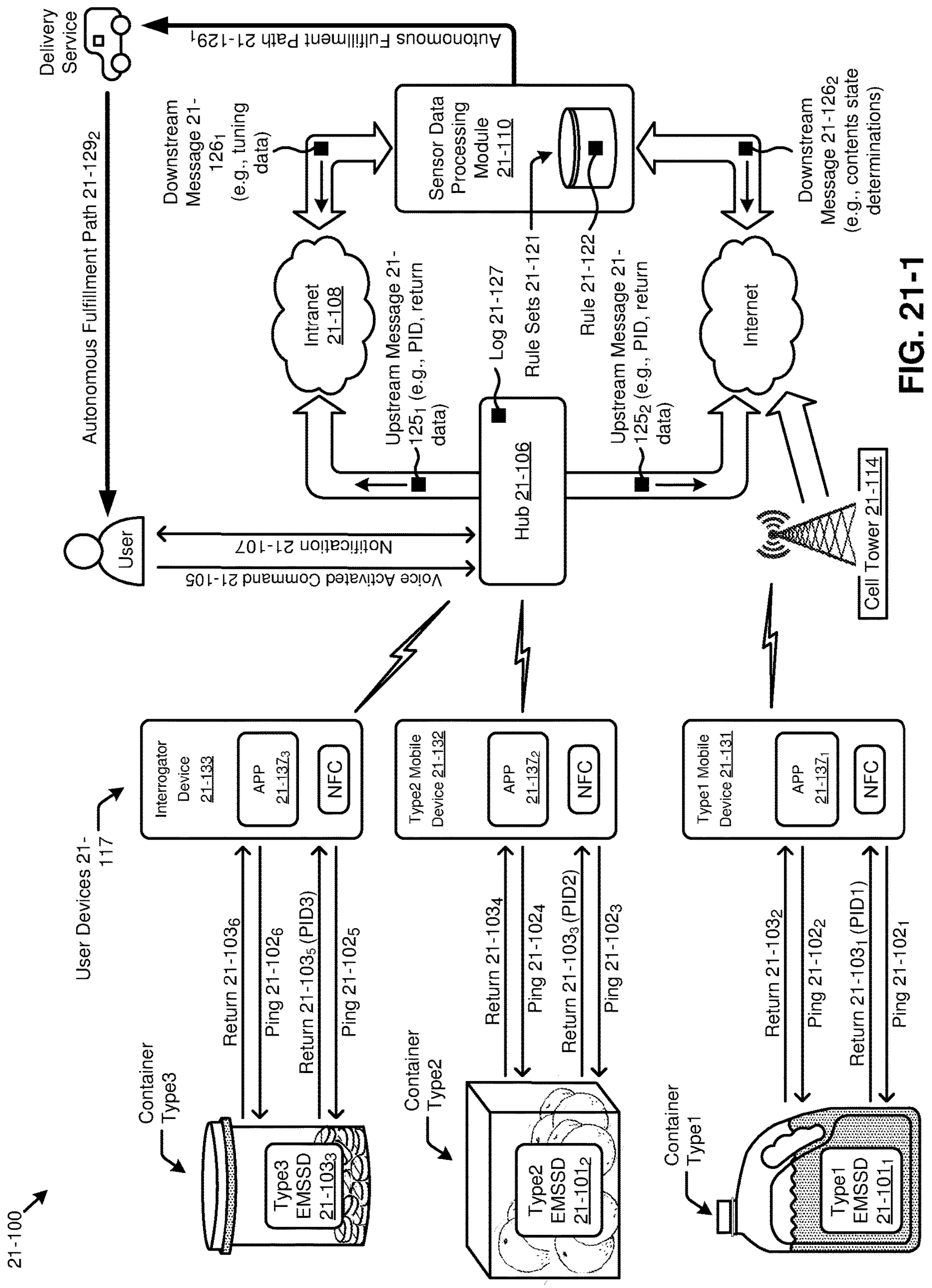
Figures 2, 21:
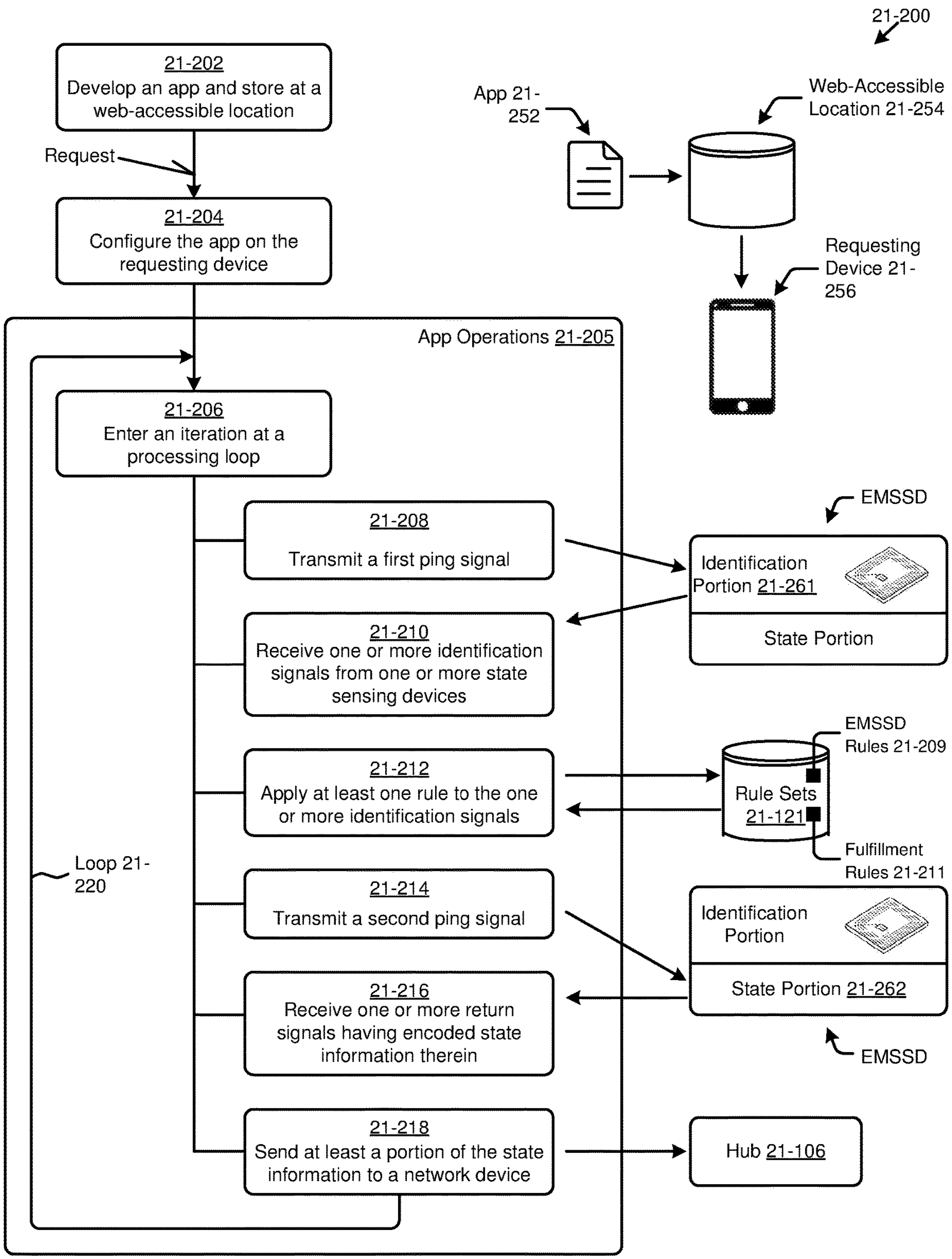
Figures 3A, 21:
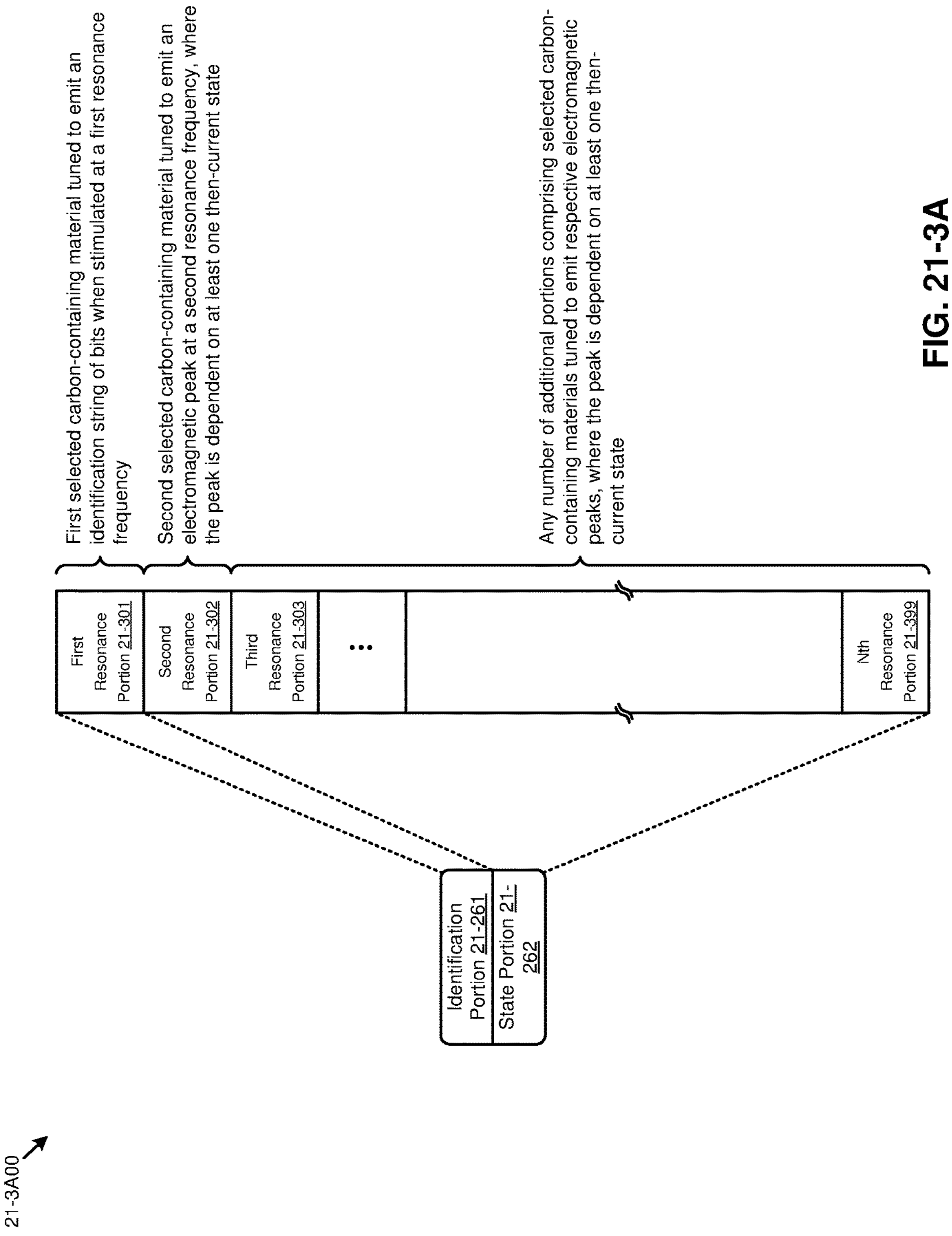
Figures 3C, 21:
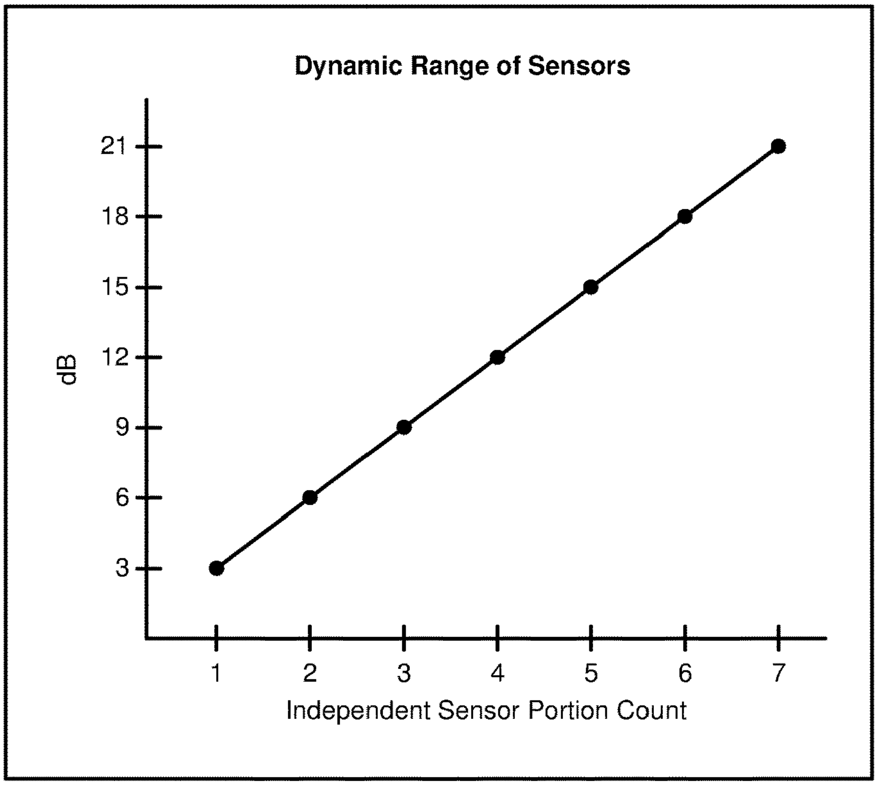
Figures 4B, 21:
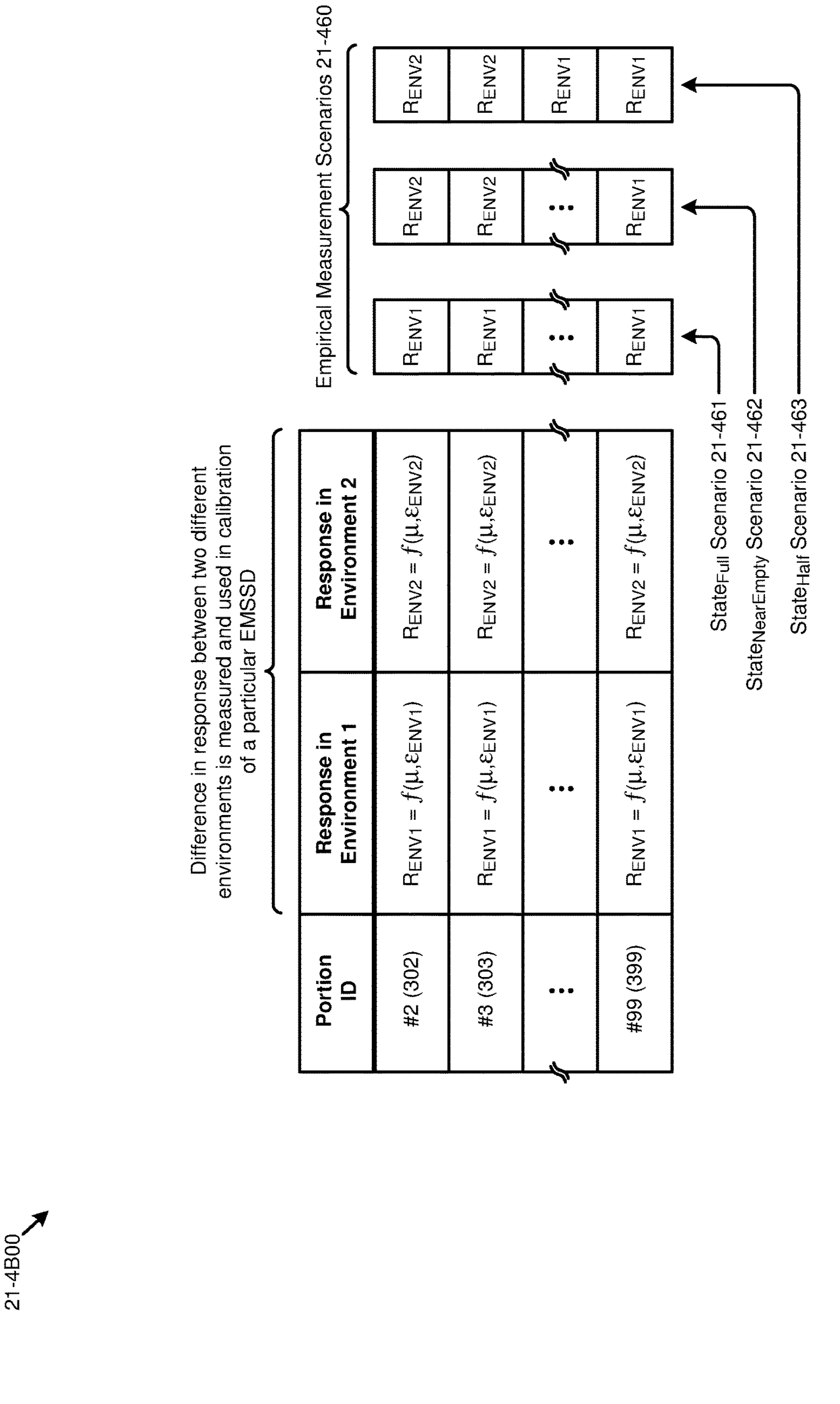
Figures 5A, 21:
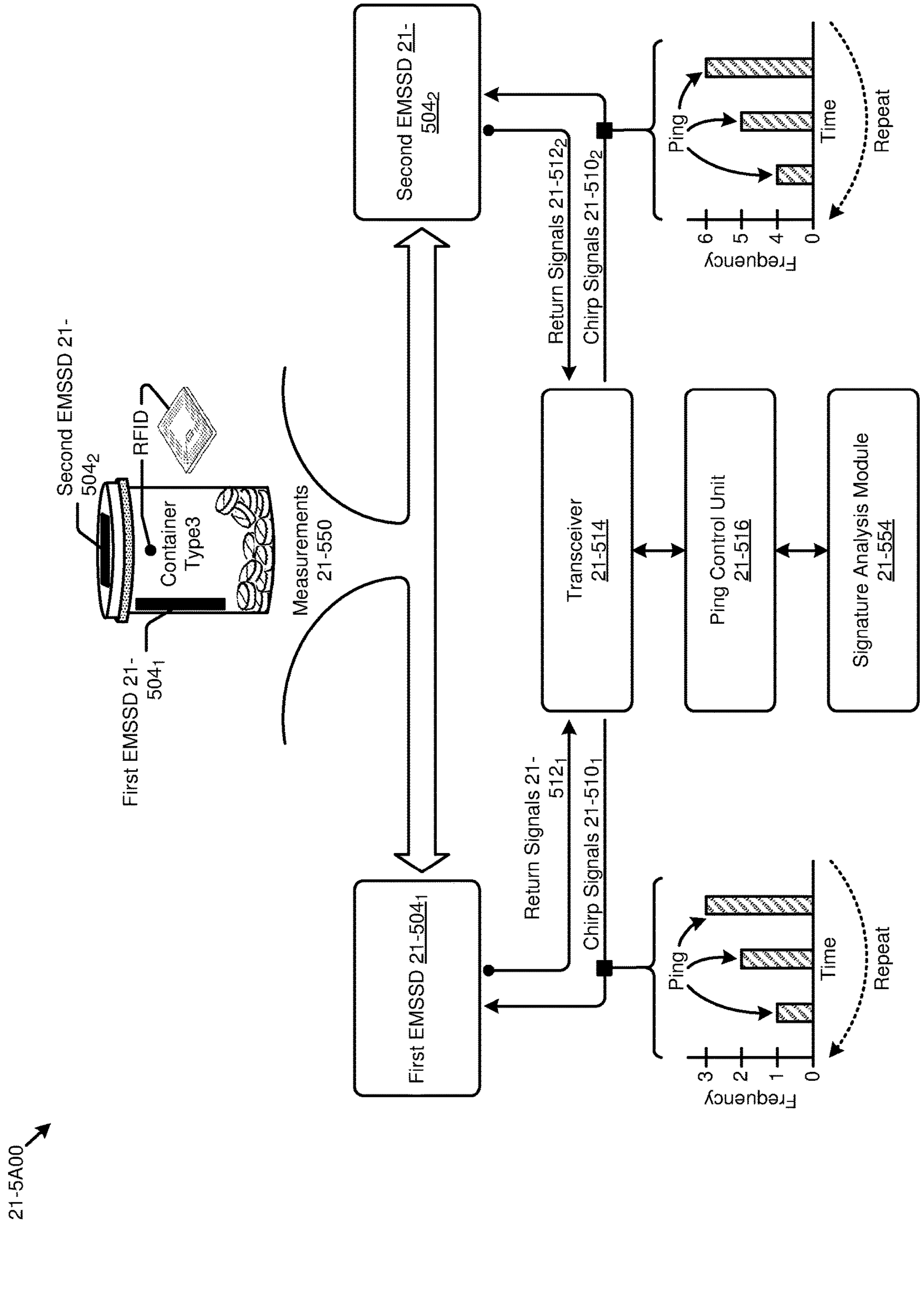
Figures 5B, 21:
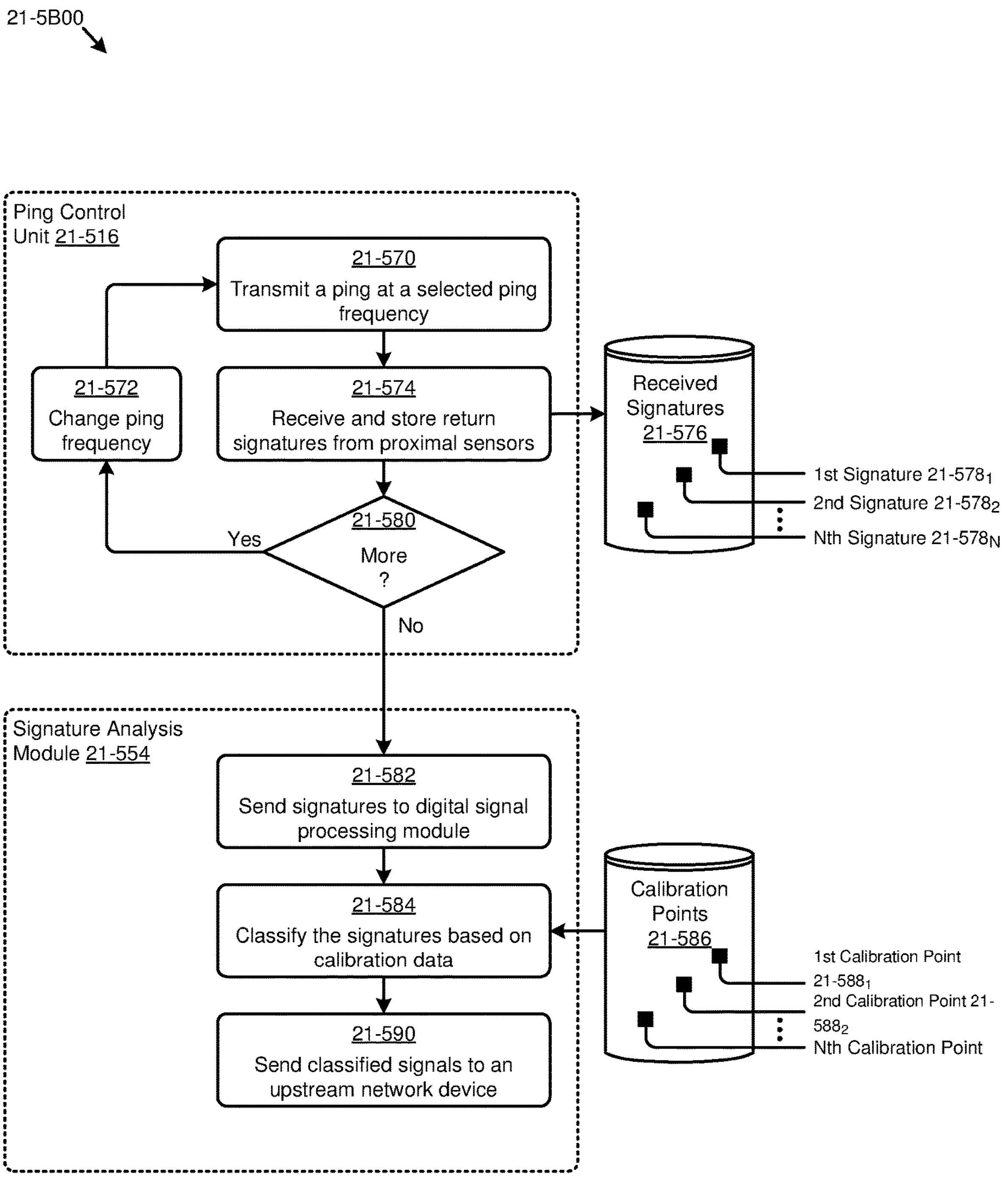
Figures 6, 21:
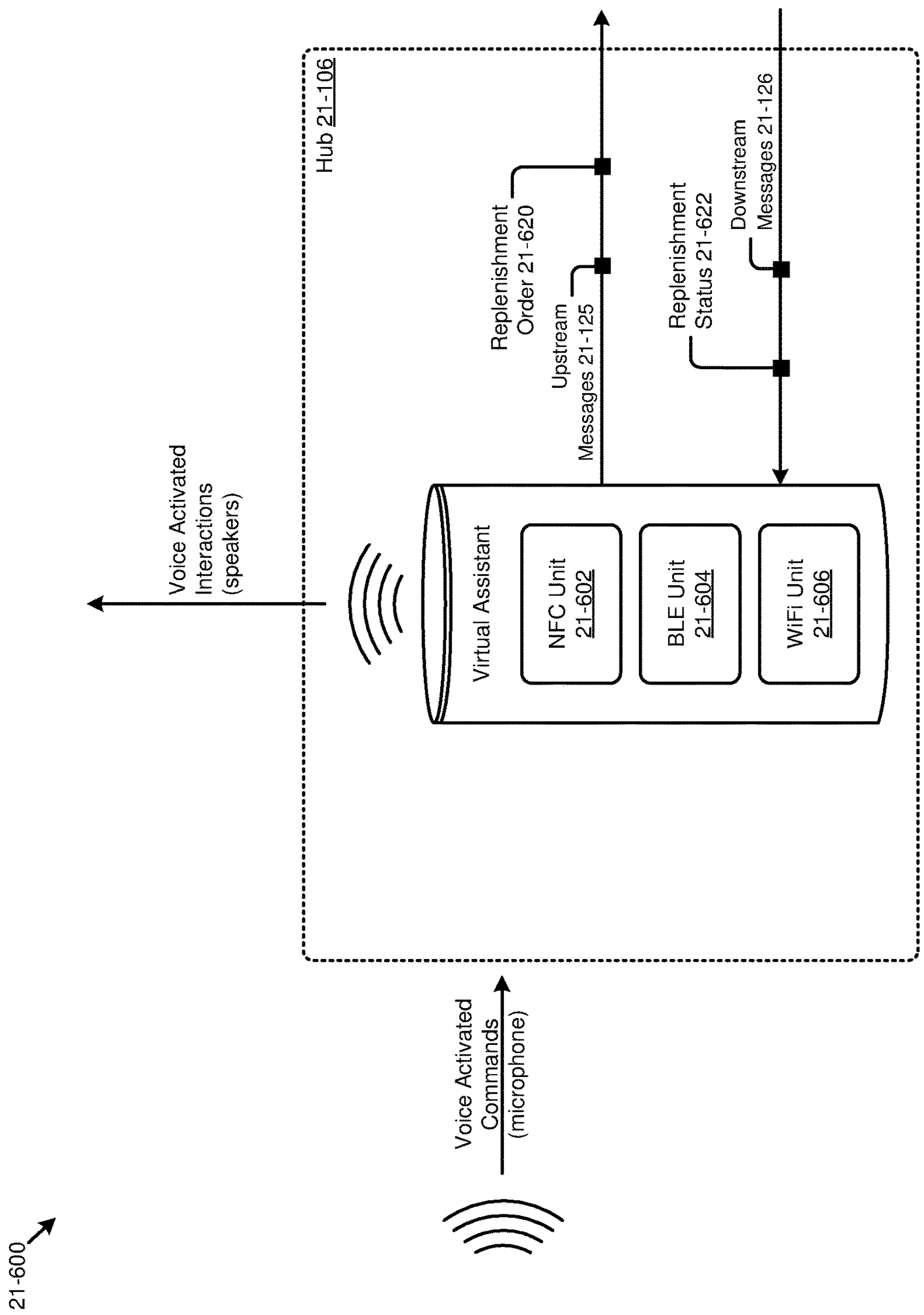
Figures 7A, 21:
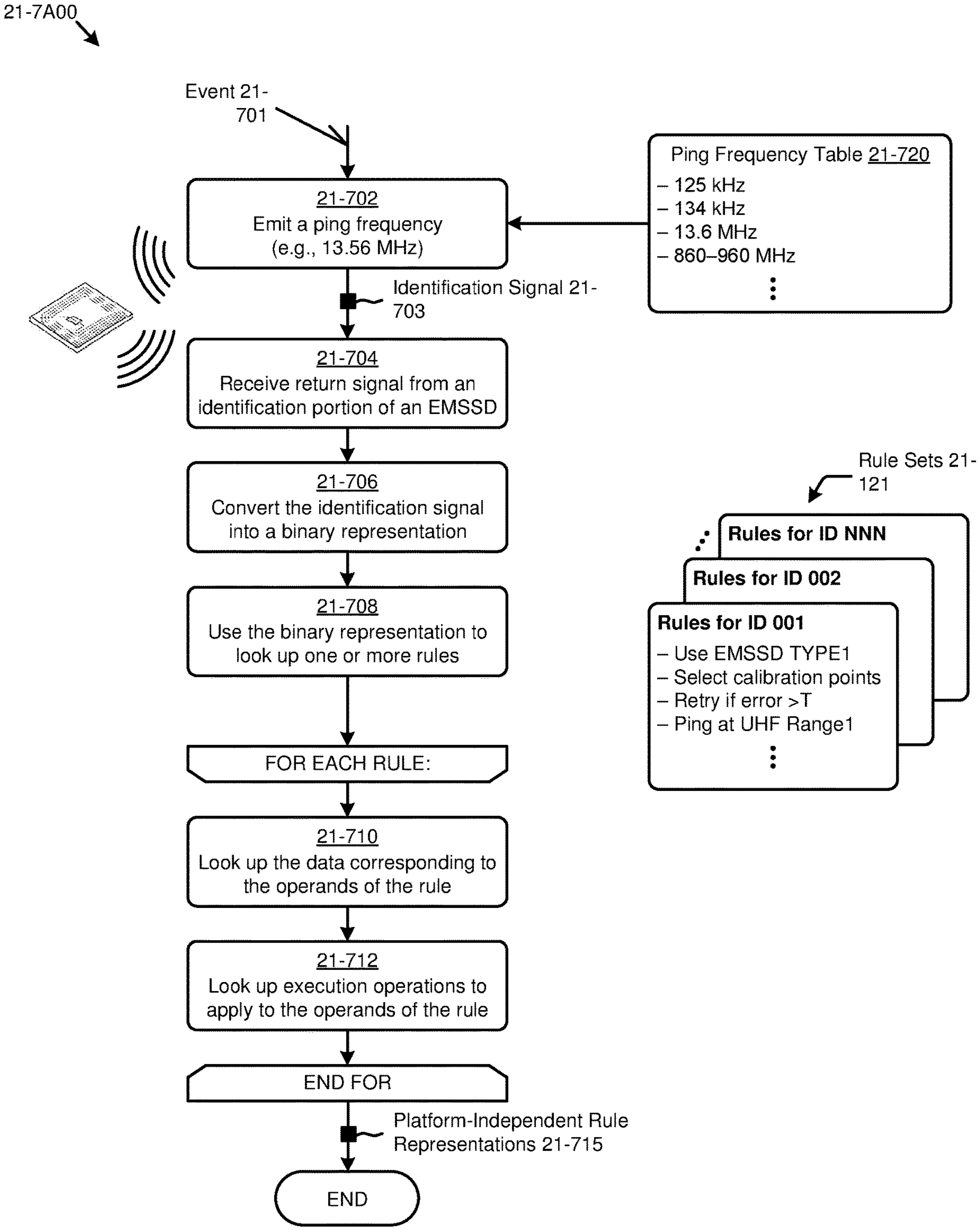
Figures 7B, 21:
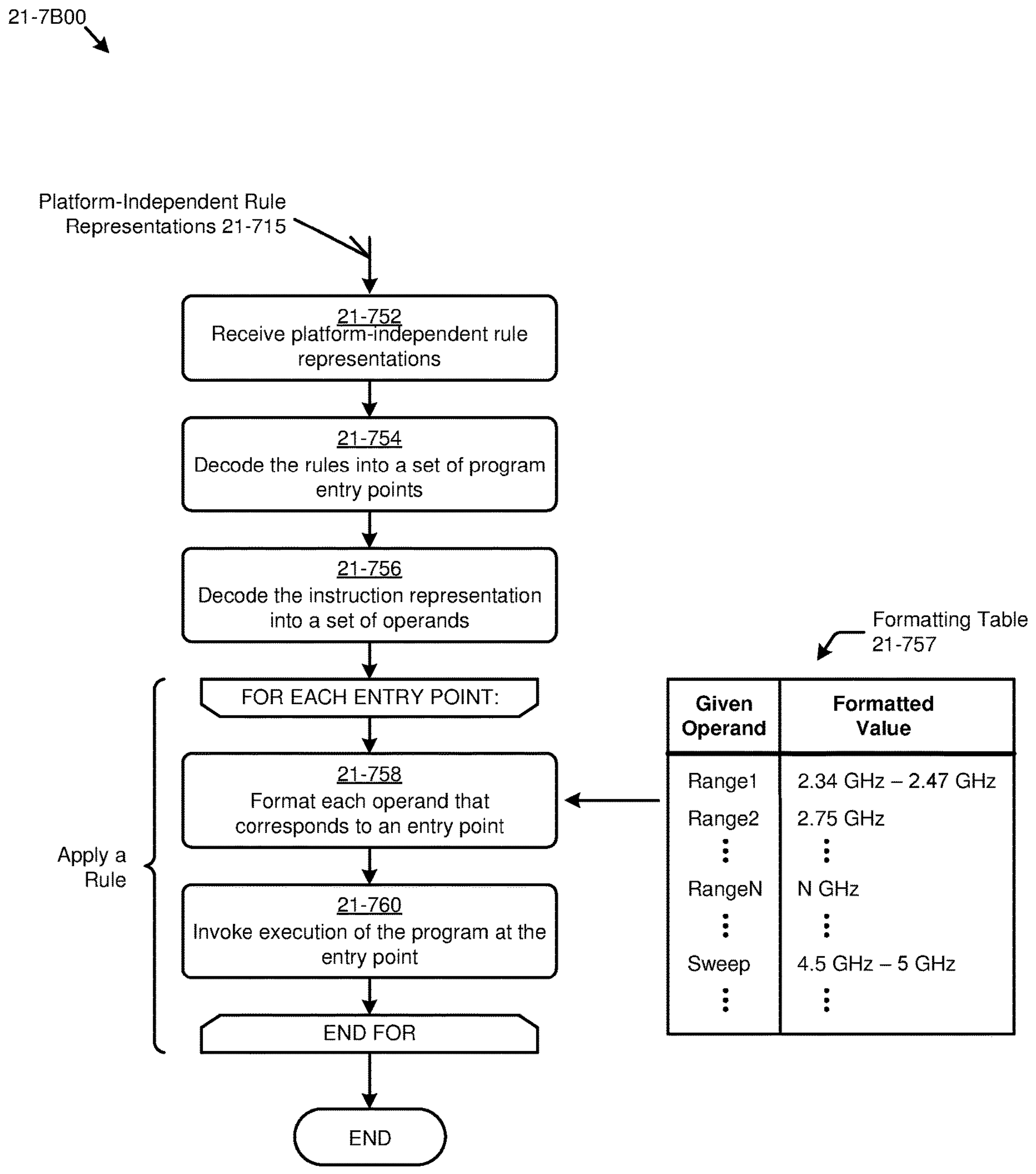
Figures 8, 21:
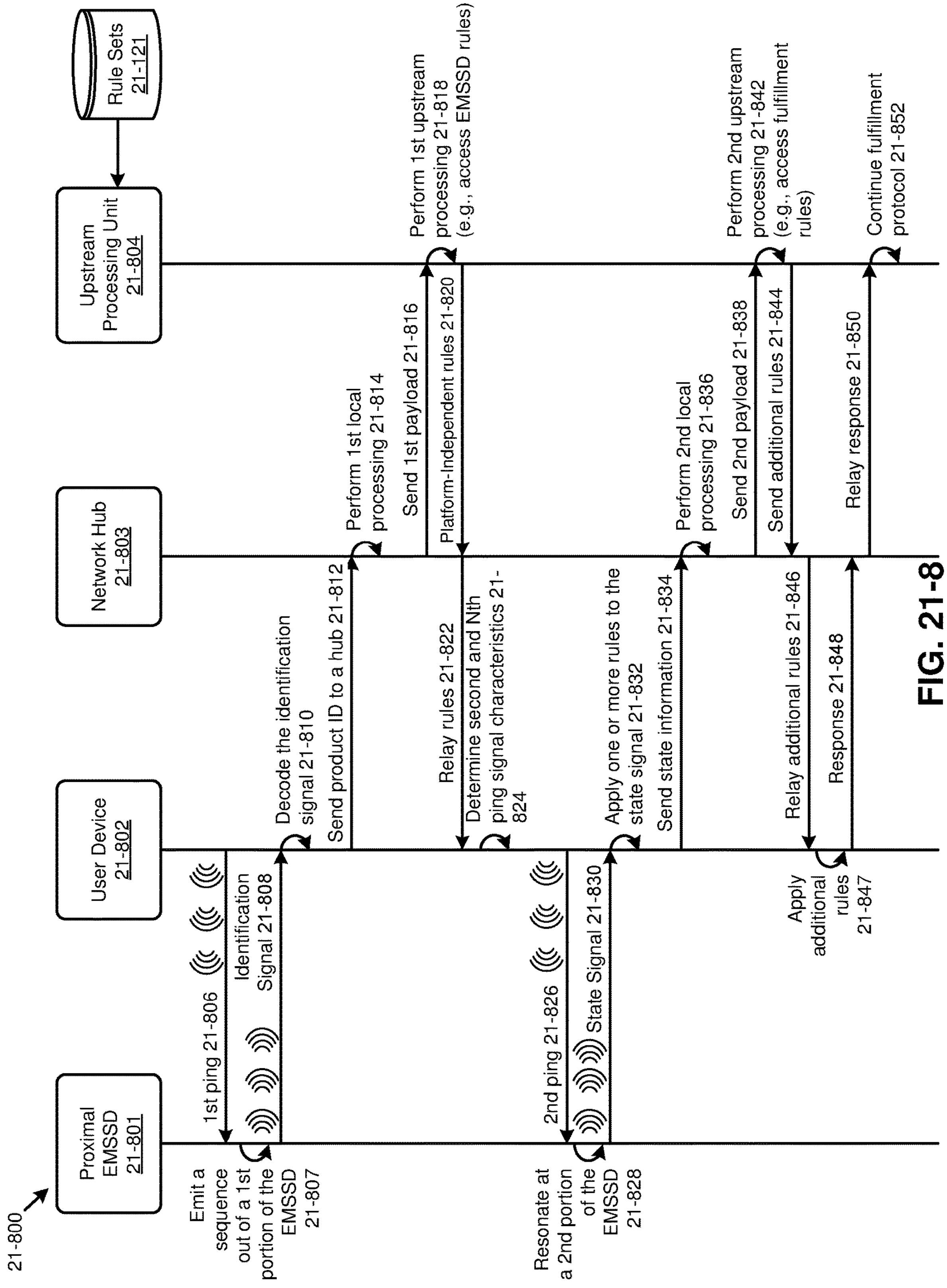
Figures 9, 21:
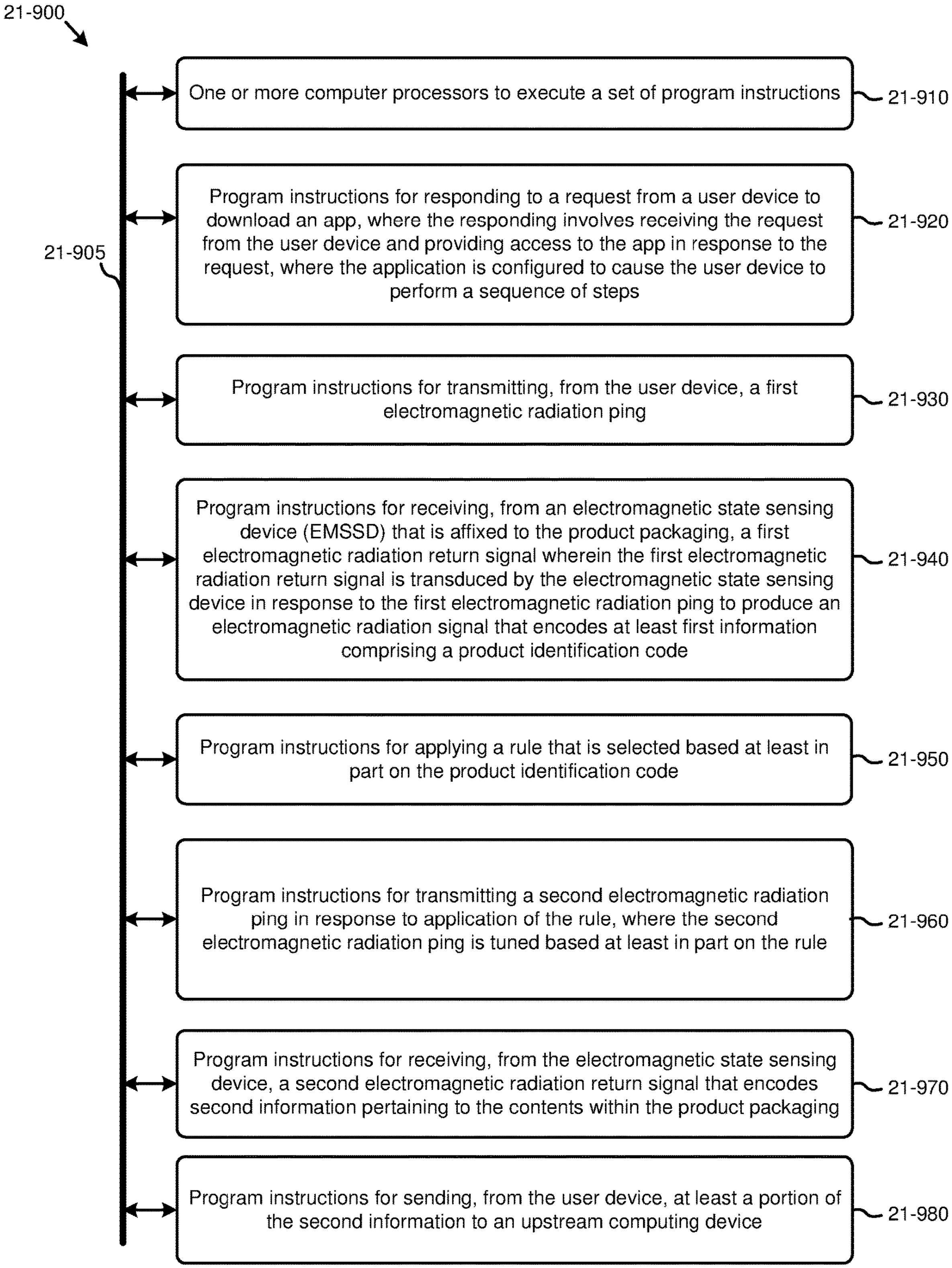
Figures 10A, 21:
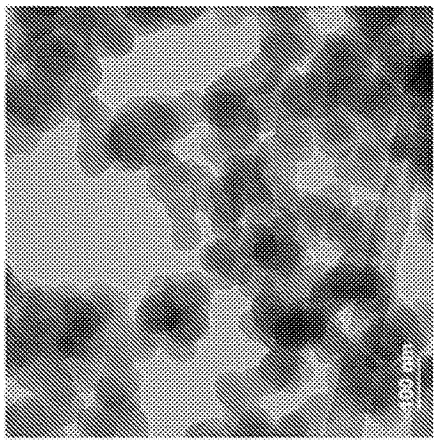

FIG. 19-10A shows an example sensor configuration, according to some implementations.

Figures 10B, 21:
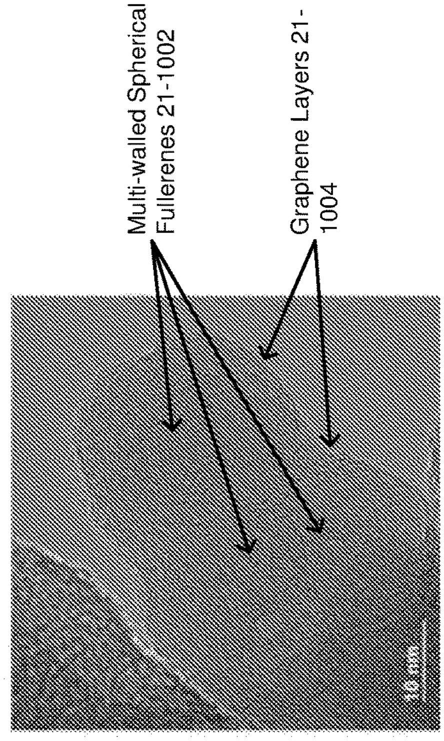

FIG. 19-10B shows an example sensor configuration, according to other implementations.

Figures 11A, 19:
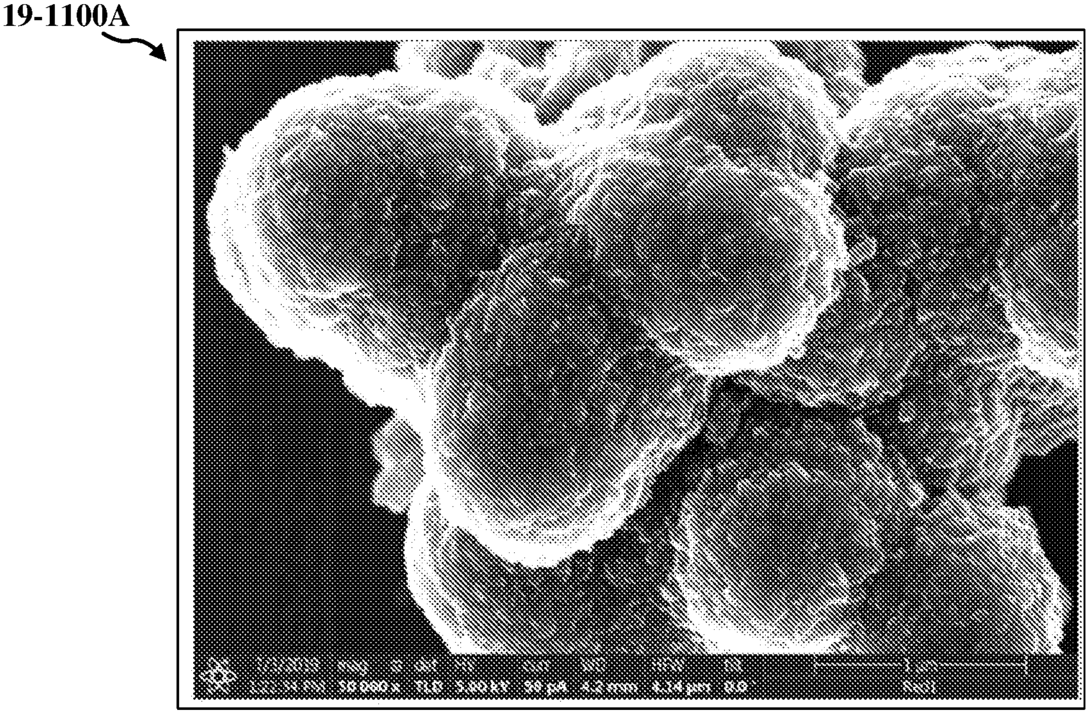
Figures 11B, 19:
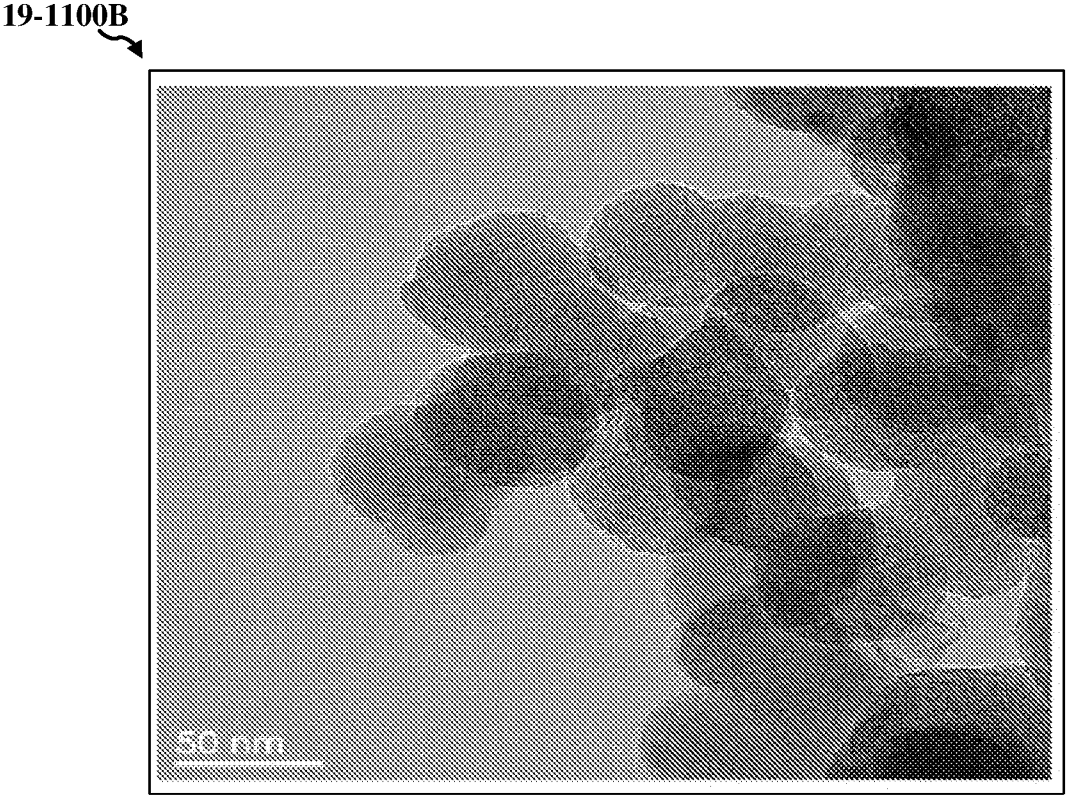
Figures 11C, 19:
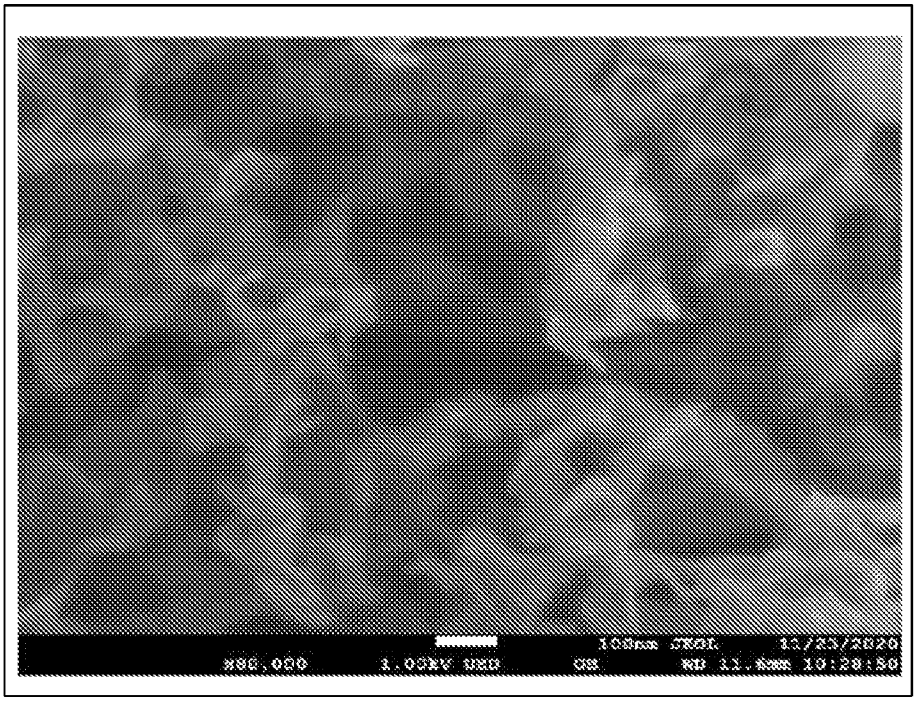
Figures 11D, 19:
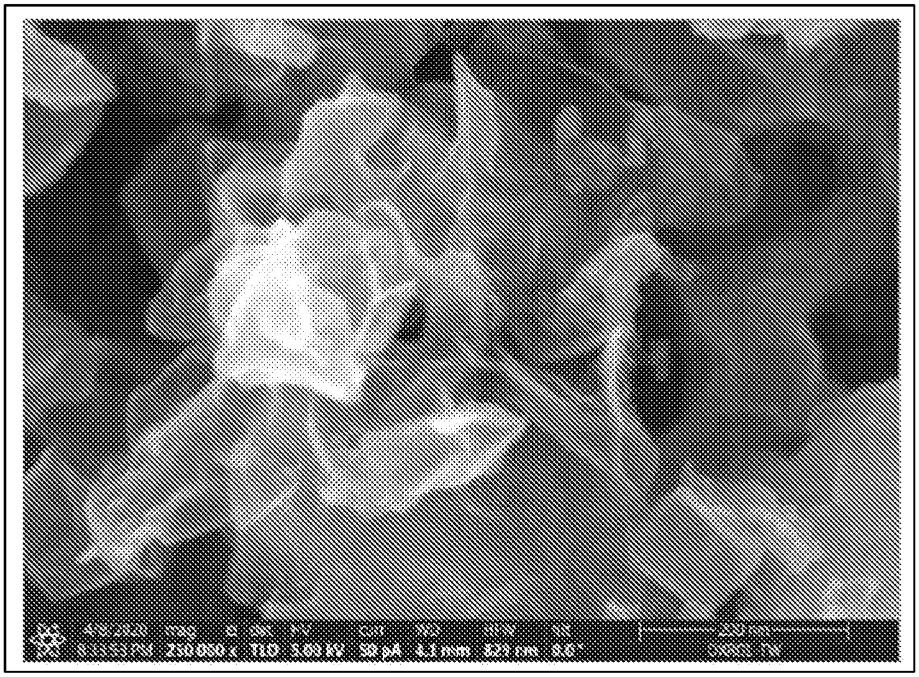
Figures 11E, 19:
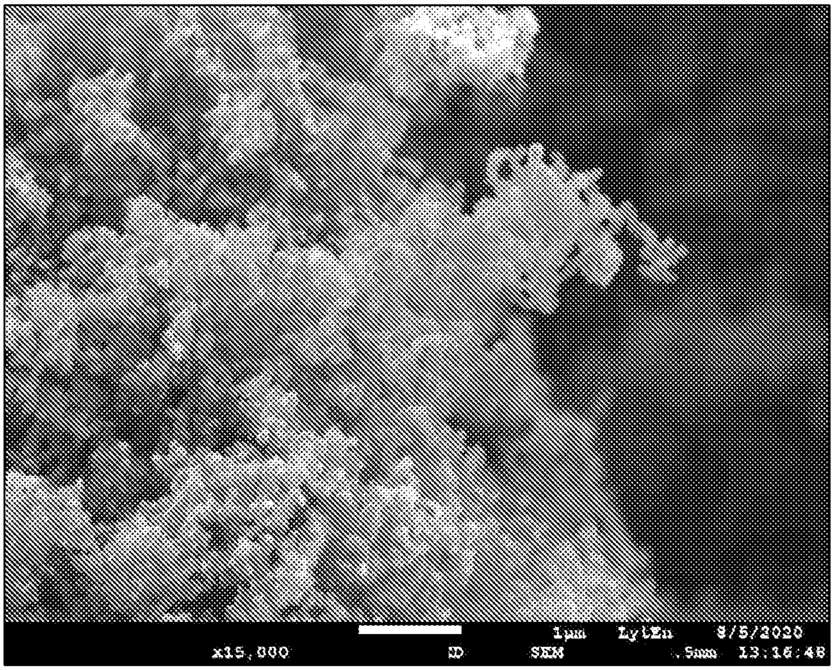
Figures 11F, 19:
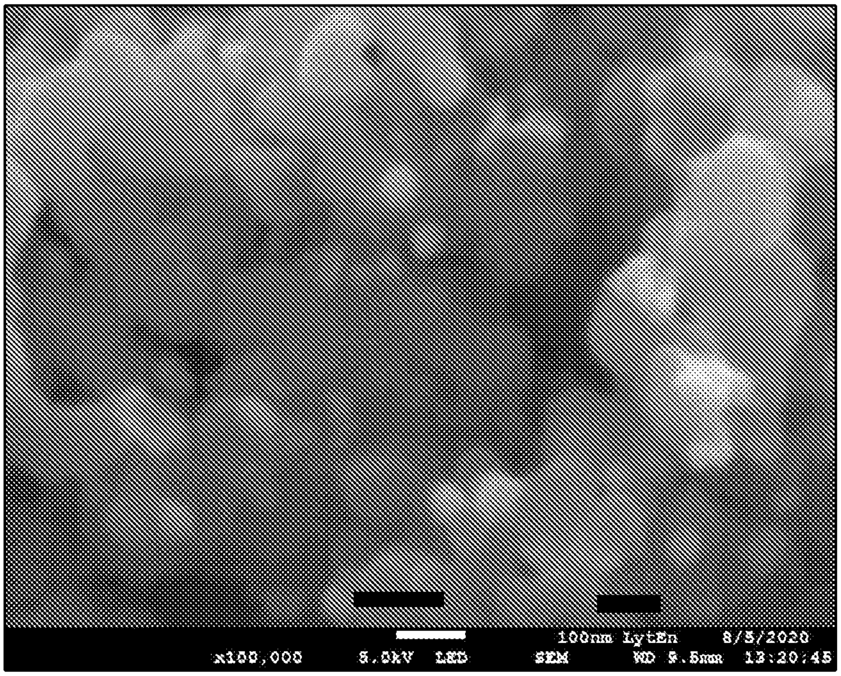
Figures 11G, 19:
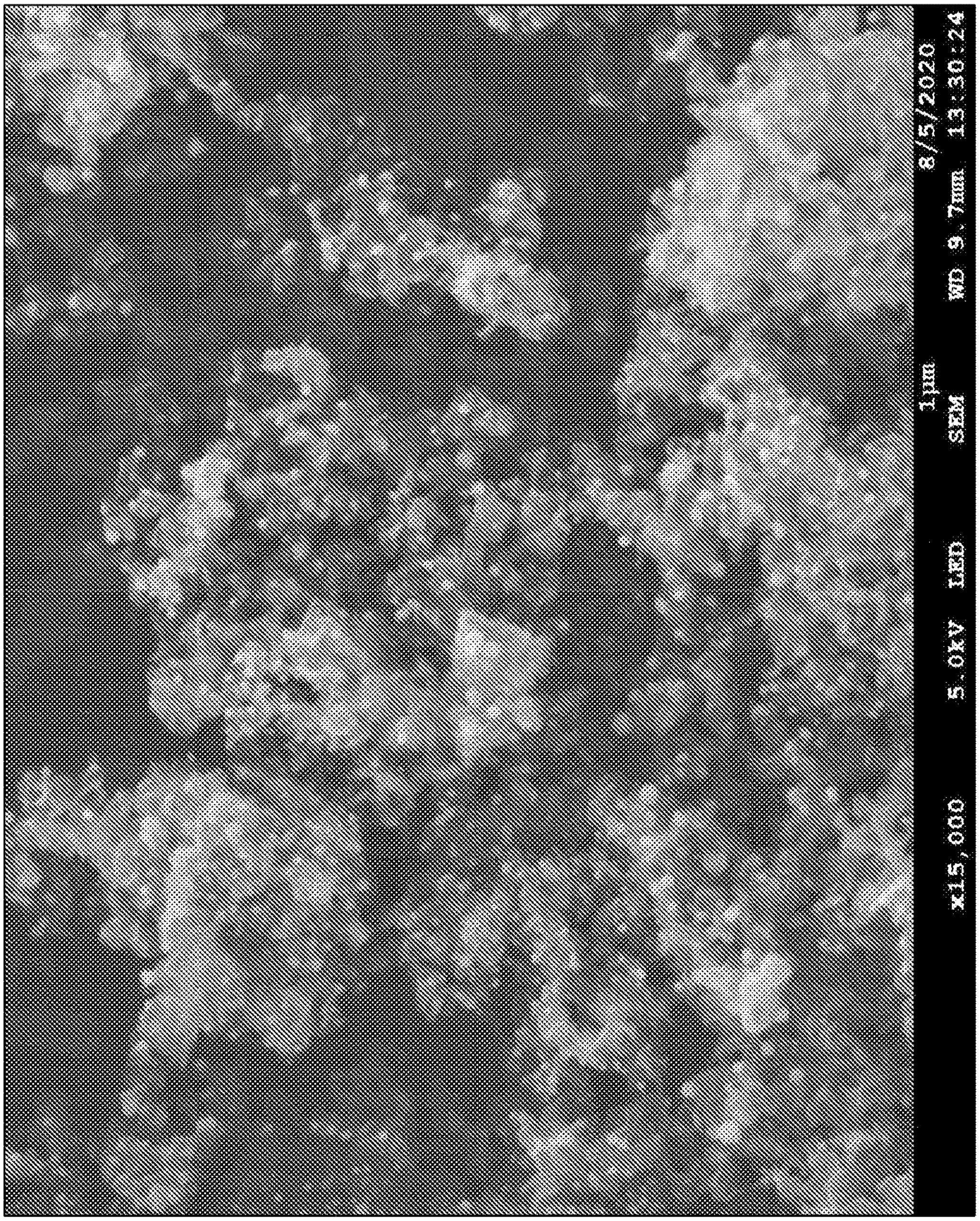
Figures 12A, 19:
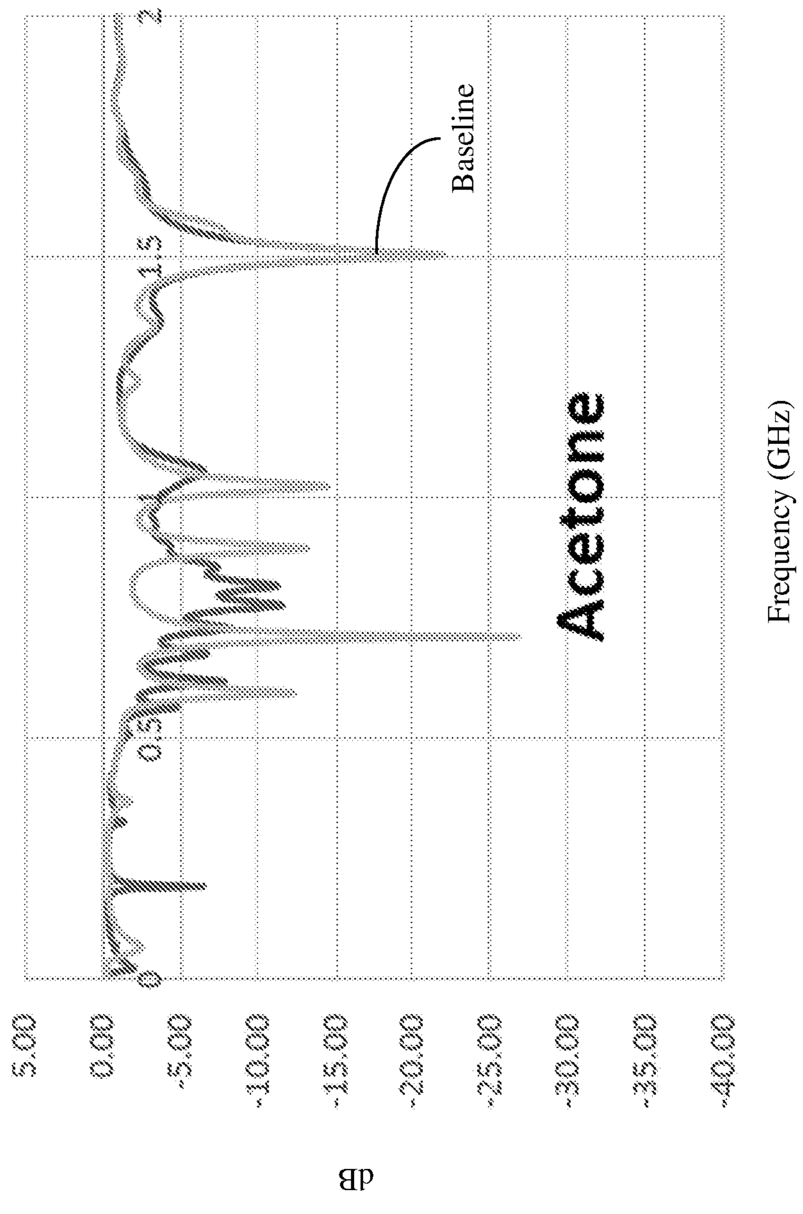
Figures 12B, 19:
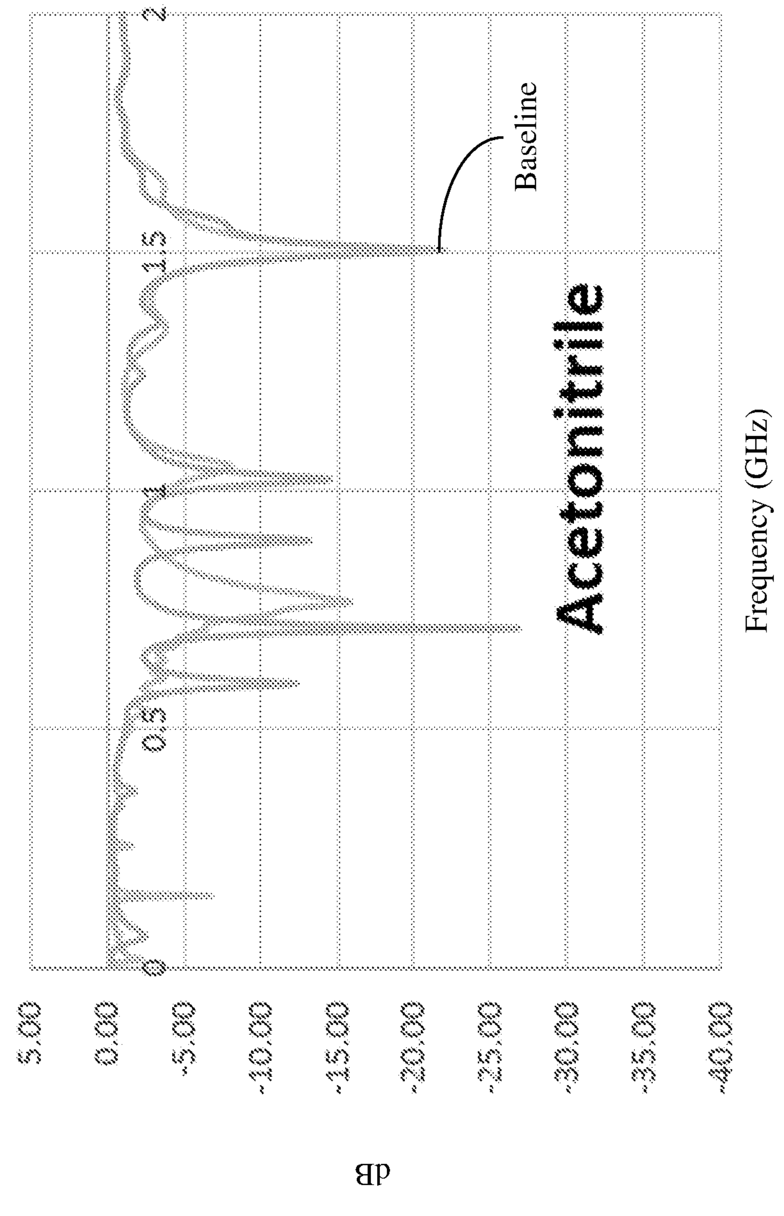
Figures 12C, 19:
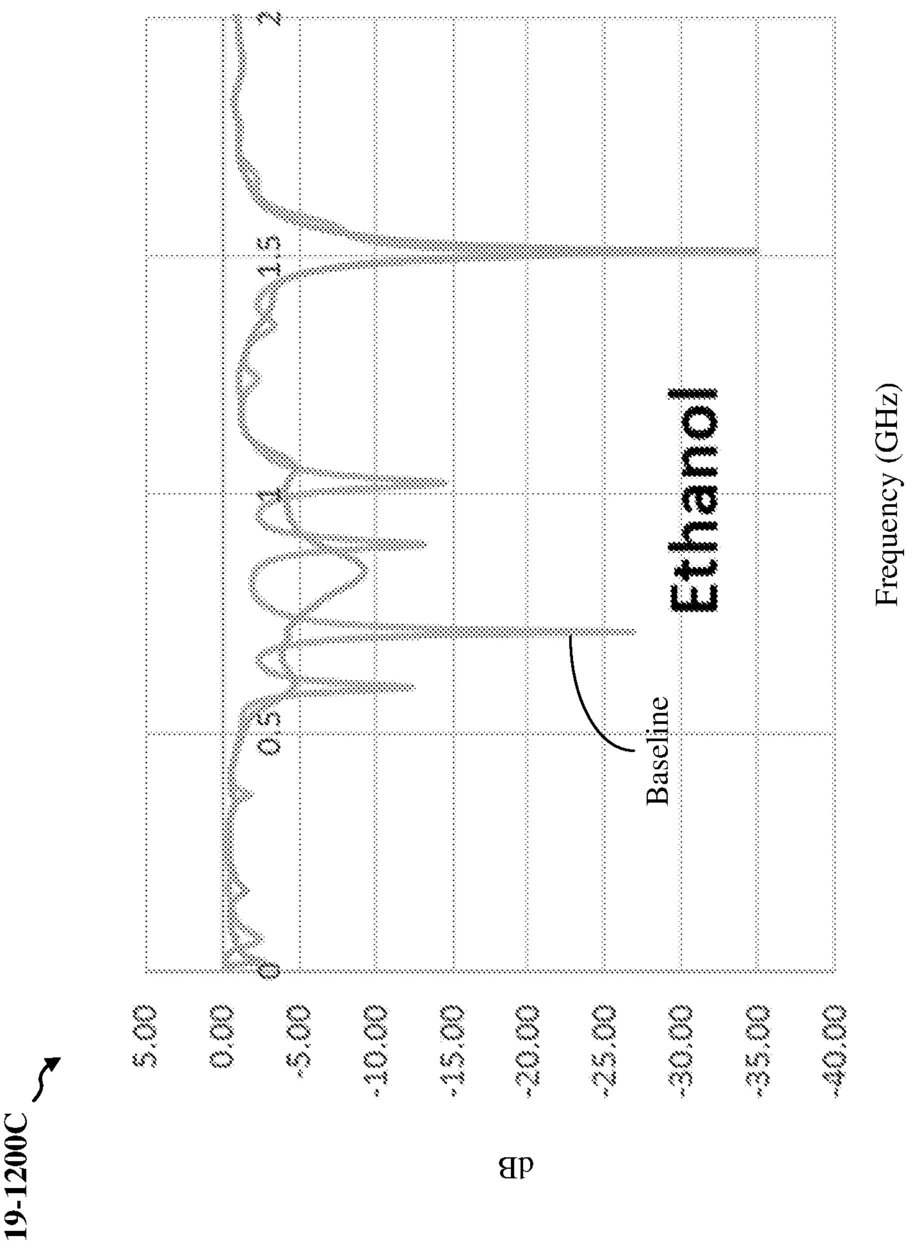
Figures 12D, 19:
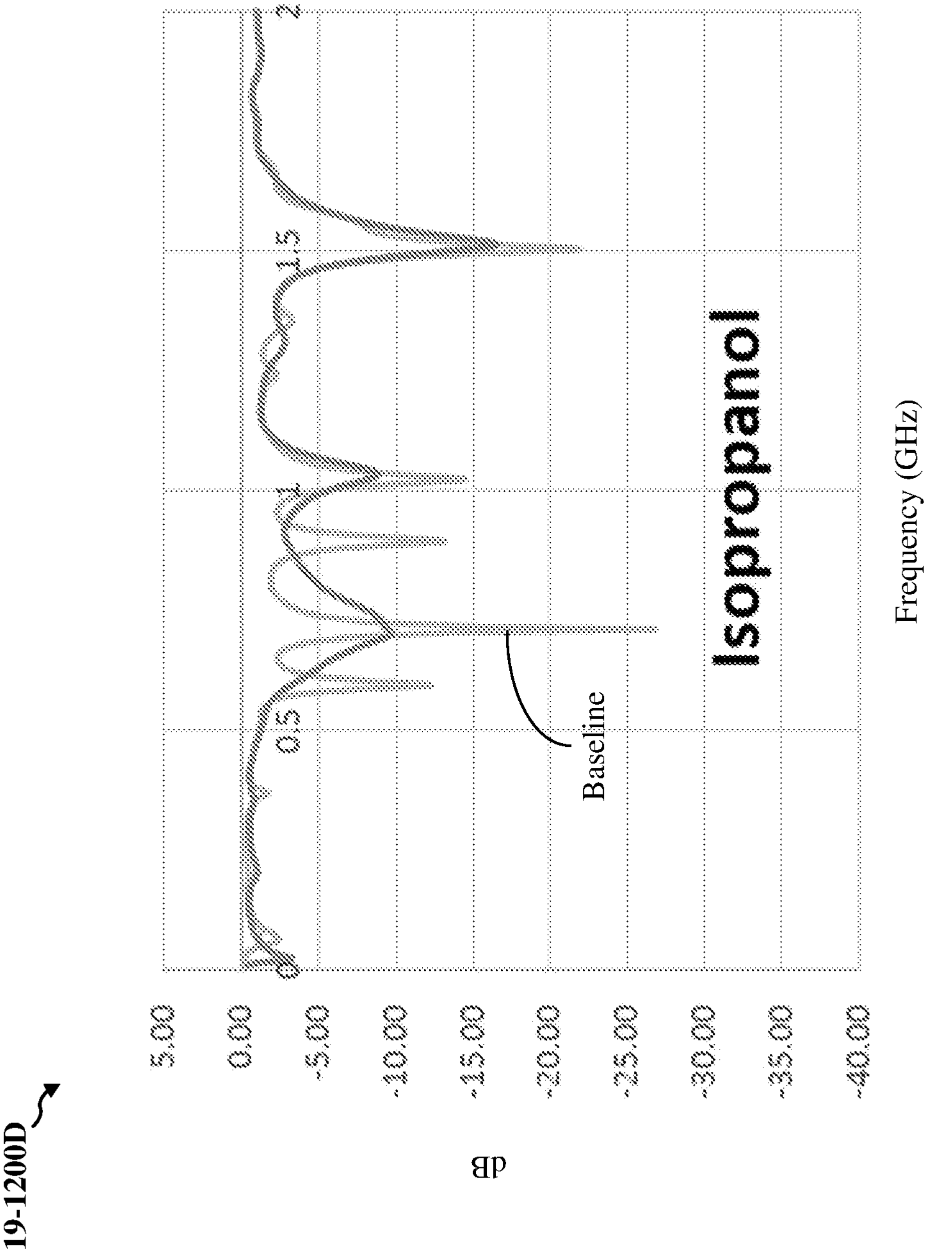
Figures 12E, 19:
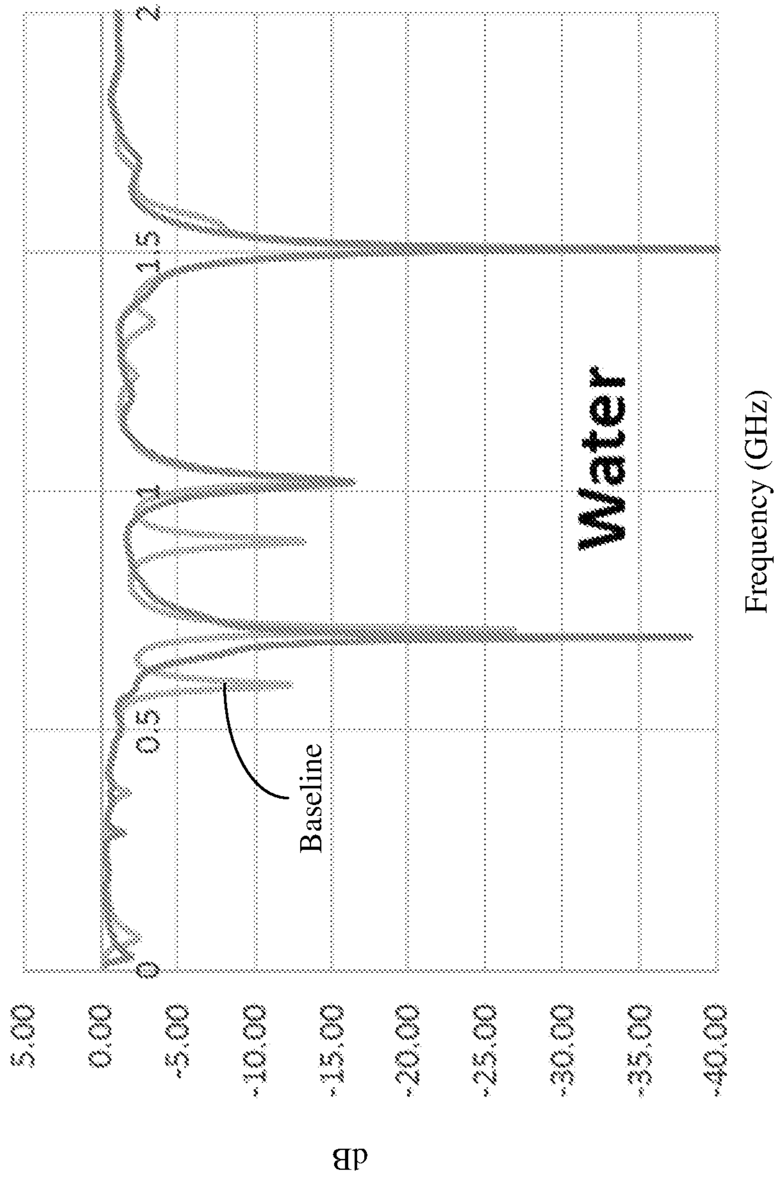
Figures 12F, 19:
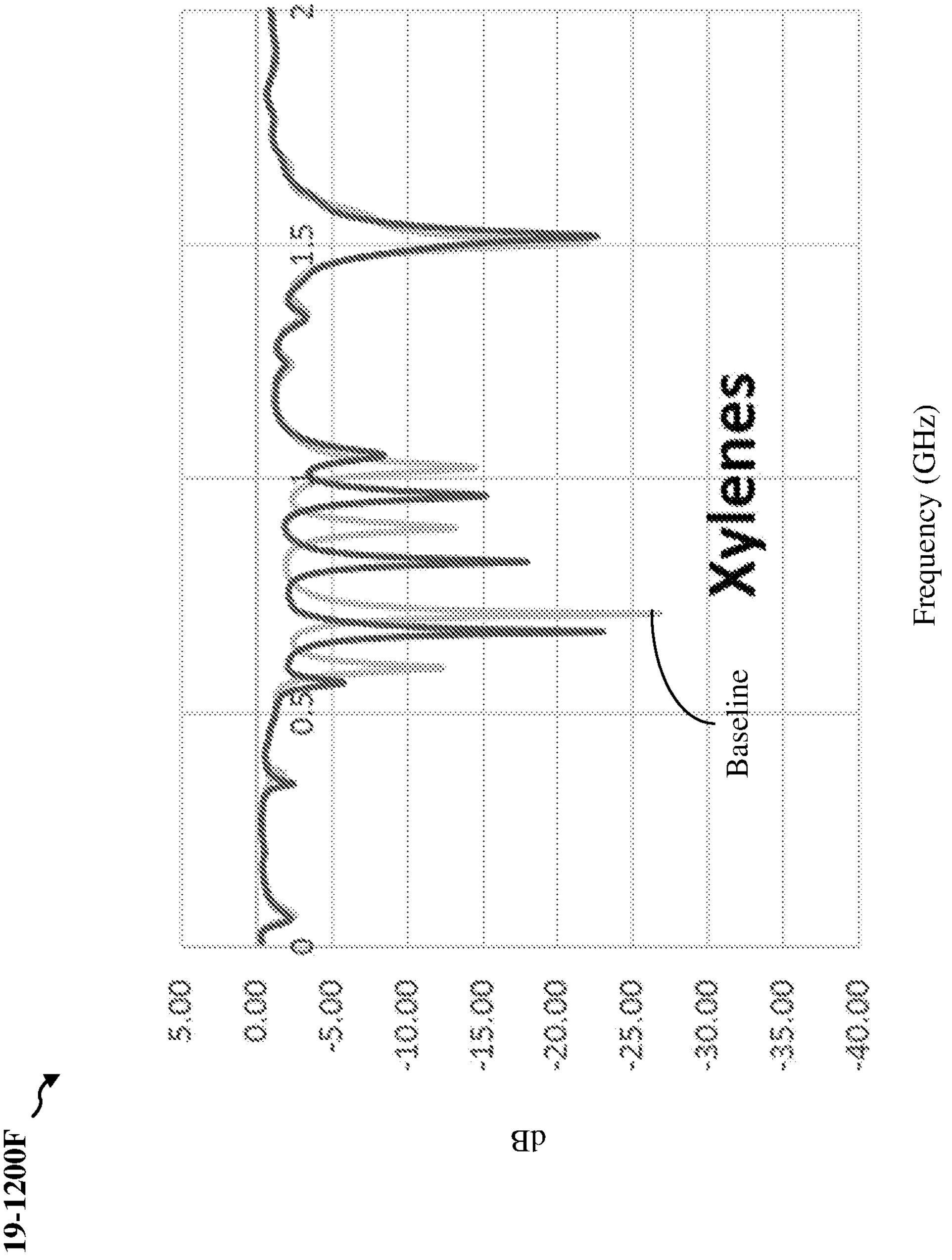

FIGS. 19-11A-19-11G show illustrations of various structured carbon materials that can be used in the sensing devices disclosed herein, according to some implementations.

Figure 12A:
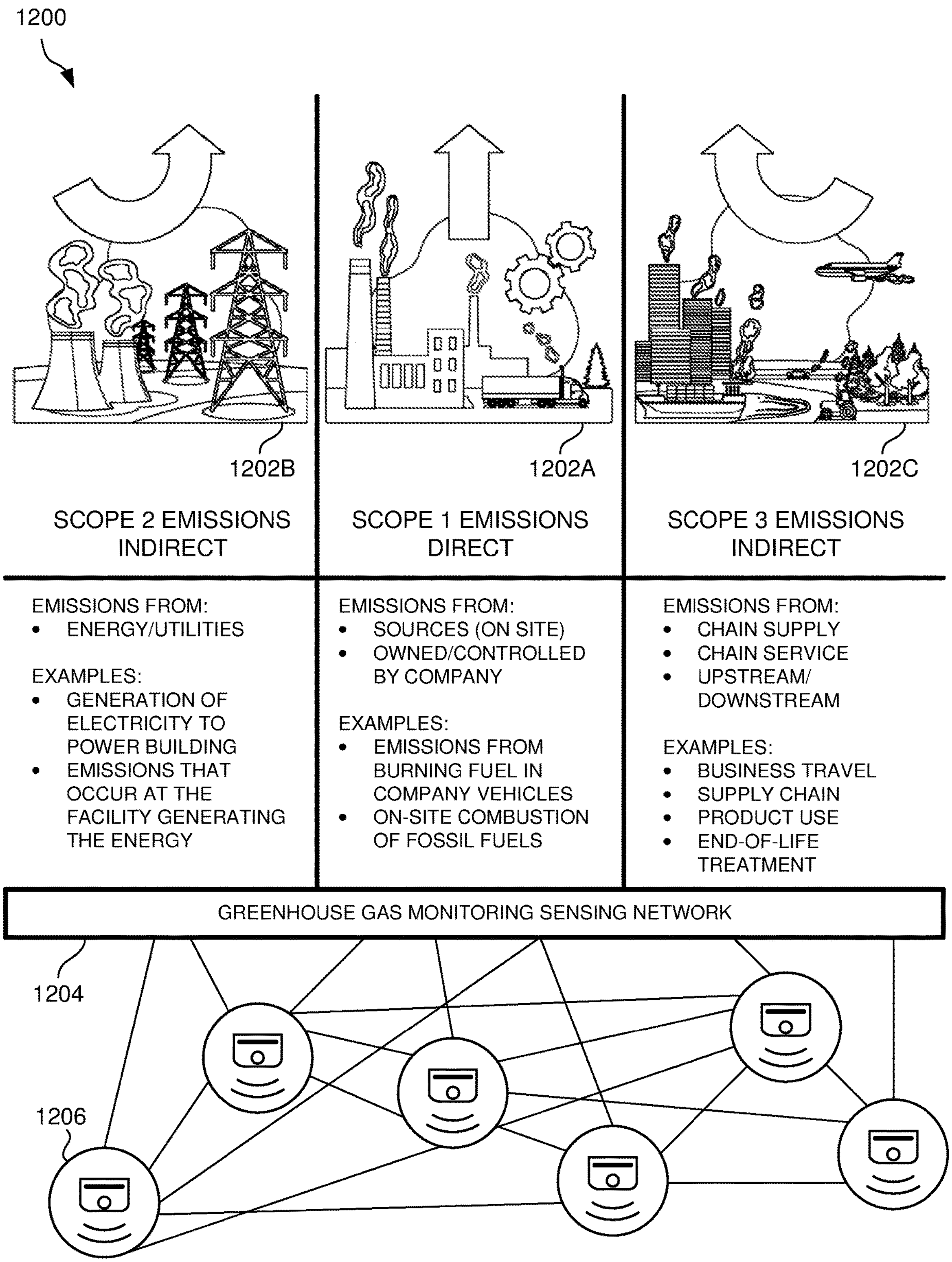
FIG. 12A illustrates a greenhouse gas monitoring sensing network, in accordance with one embodiment.
Figure 12B:
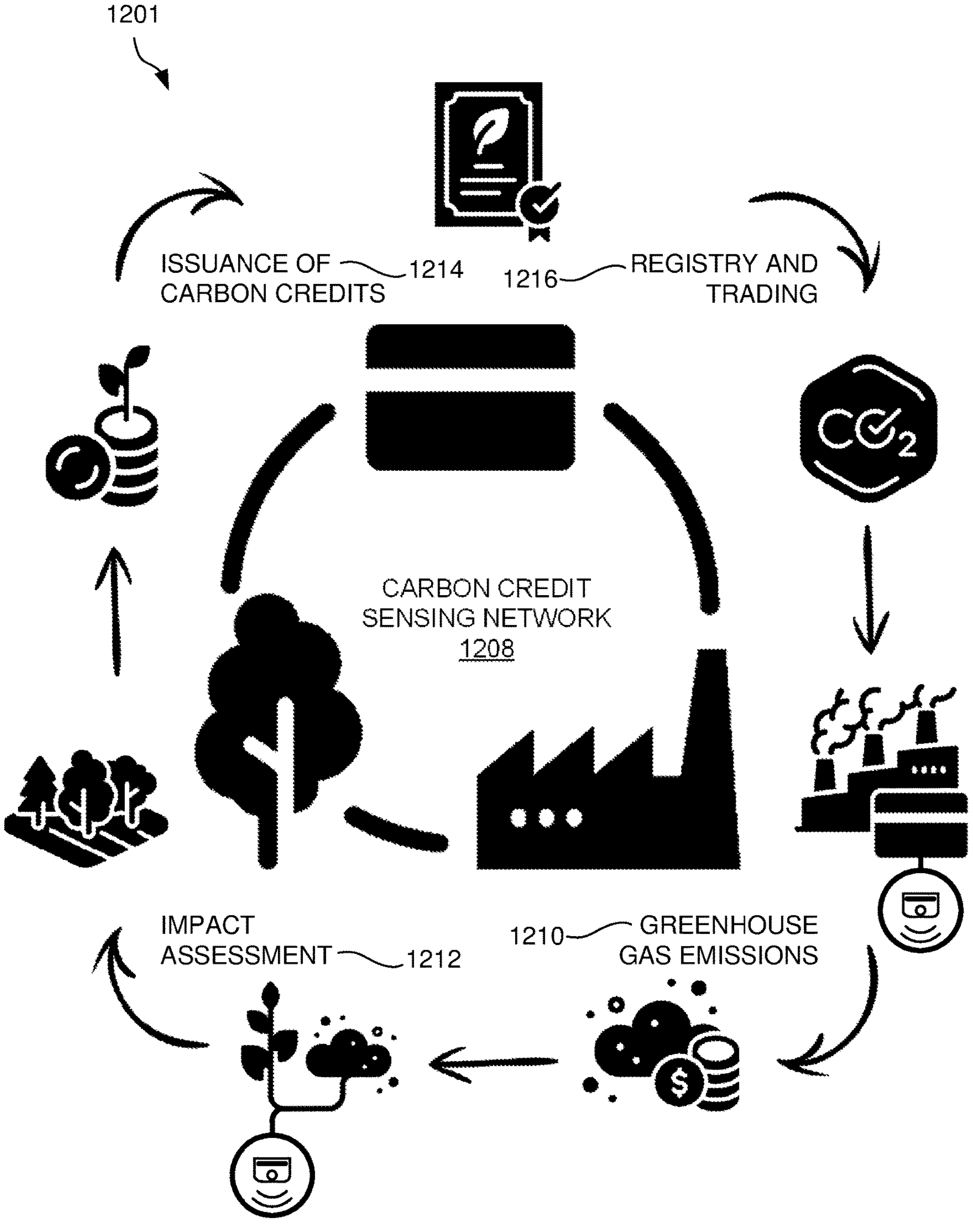
FIG. 12B illustrates a greenhouse gas monitoring sensing network, in accordance with one embodiment.
Figure 12C:
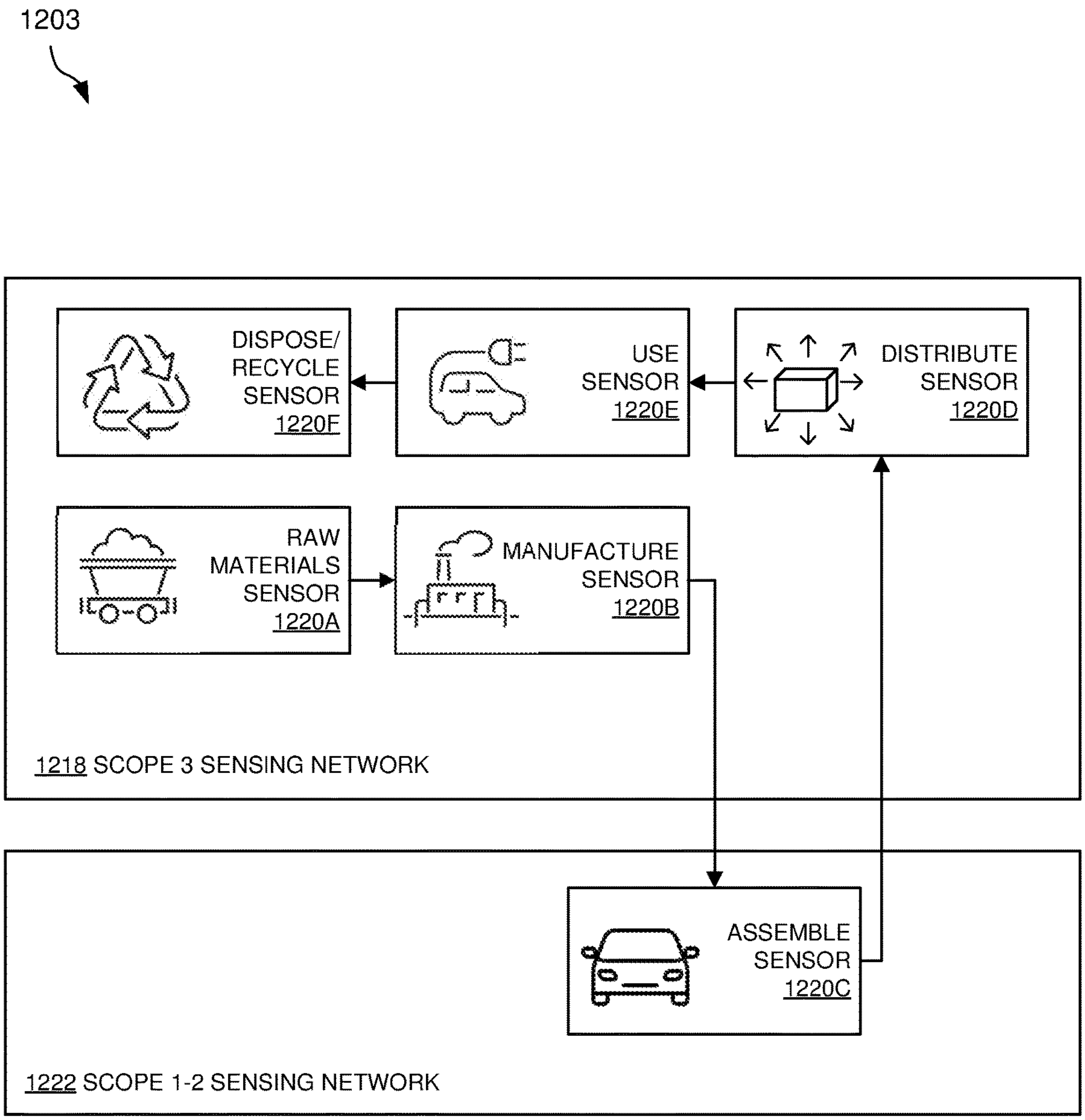
FIG. 12C illustrates an emissions detection network, in accordance with one embodiment.
Figure 12D:
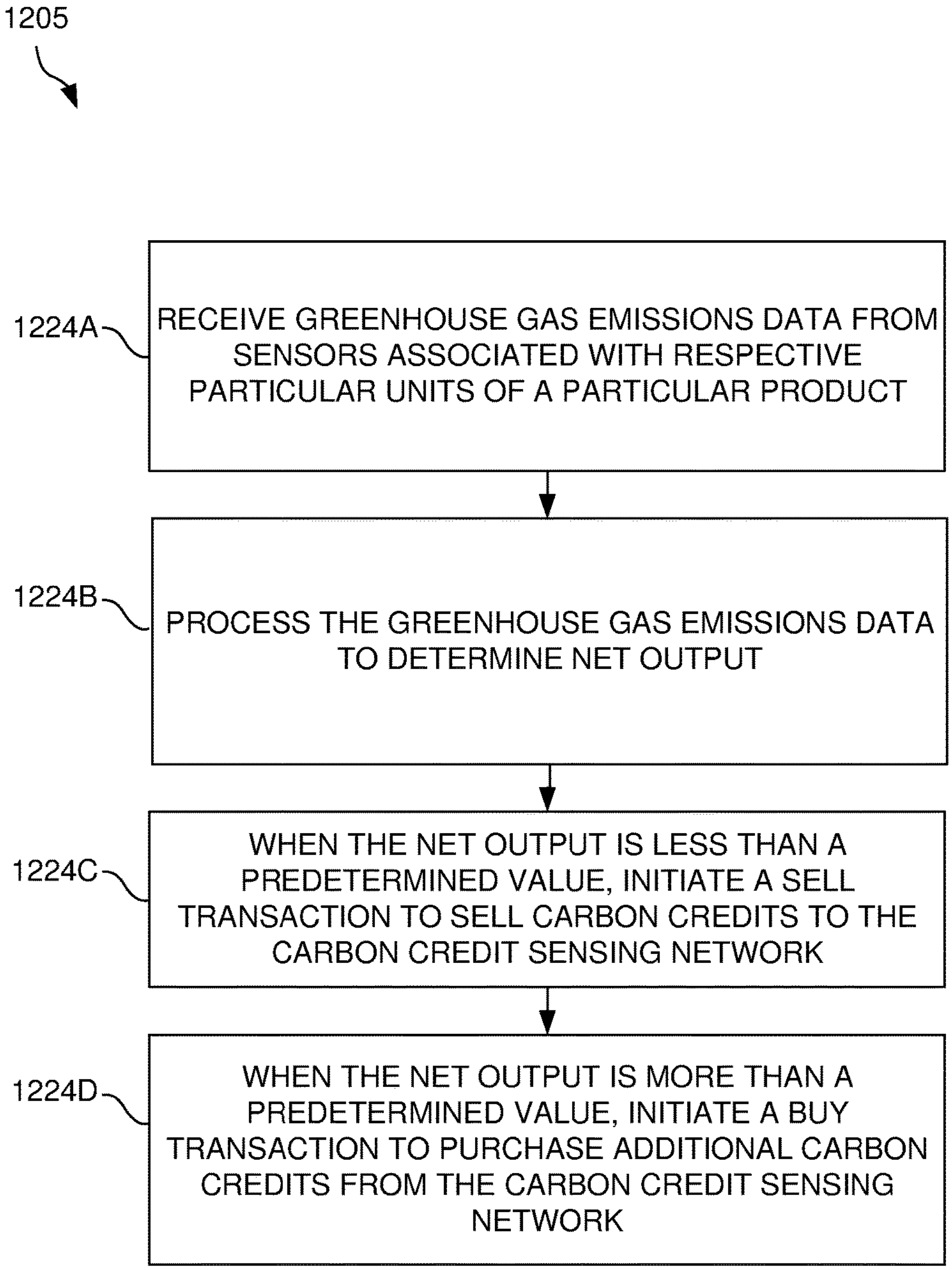
FIG. 12D illustrates a method for buying or selling carbon credits, in accordance with one embodiment.
Figure 12E:
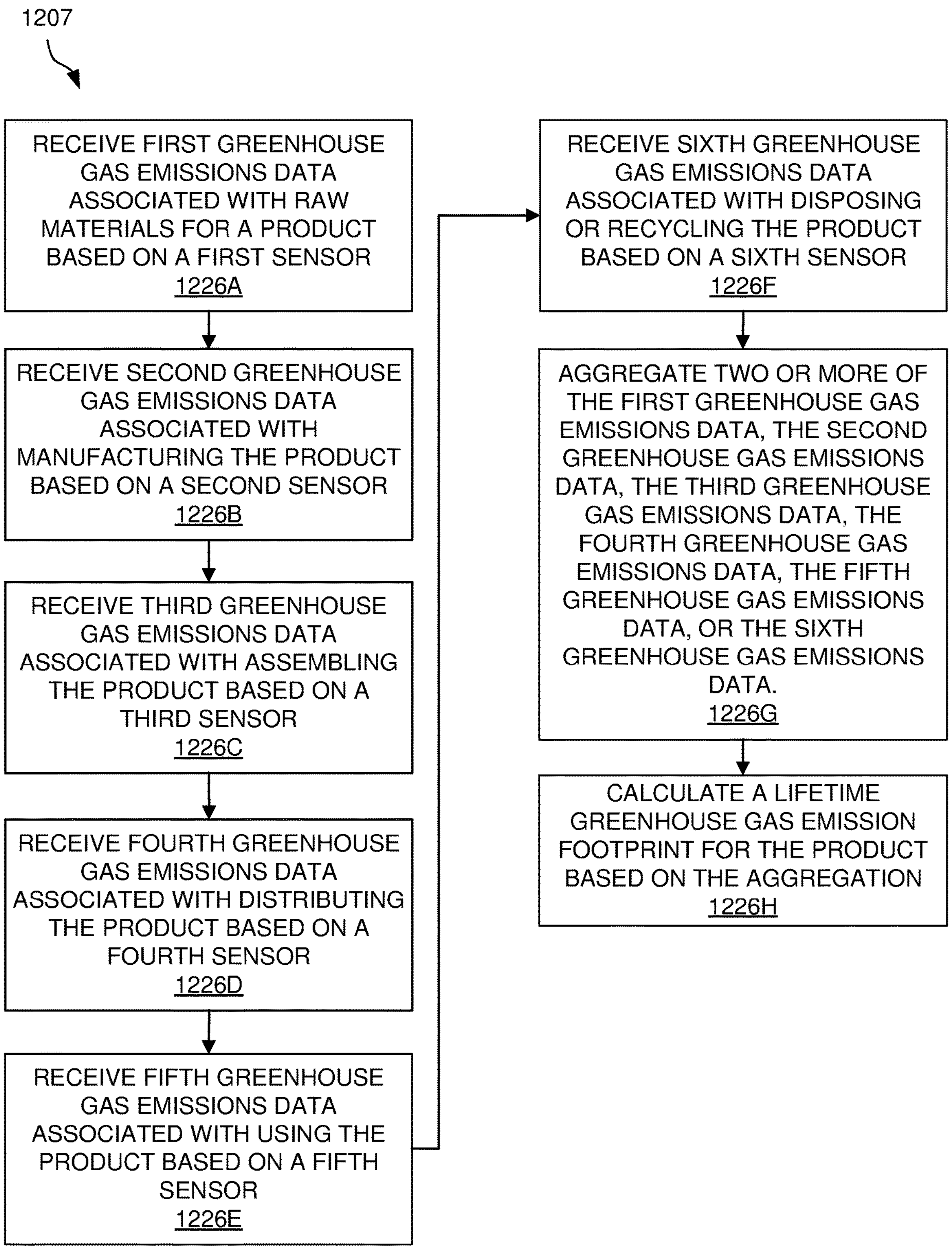
FIG. 12E illustrates a method for calculating a lifetime greenhouse gas emission footprint, in accordance with one embodiment.
Figure 12F:
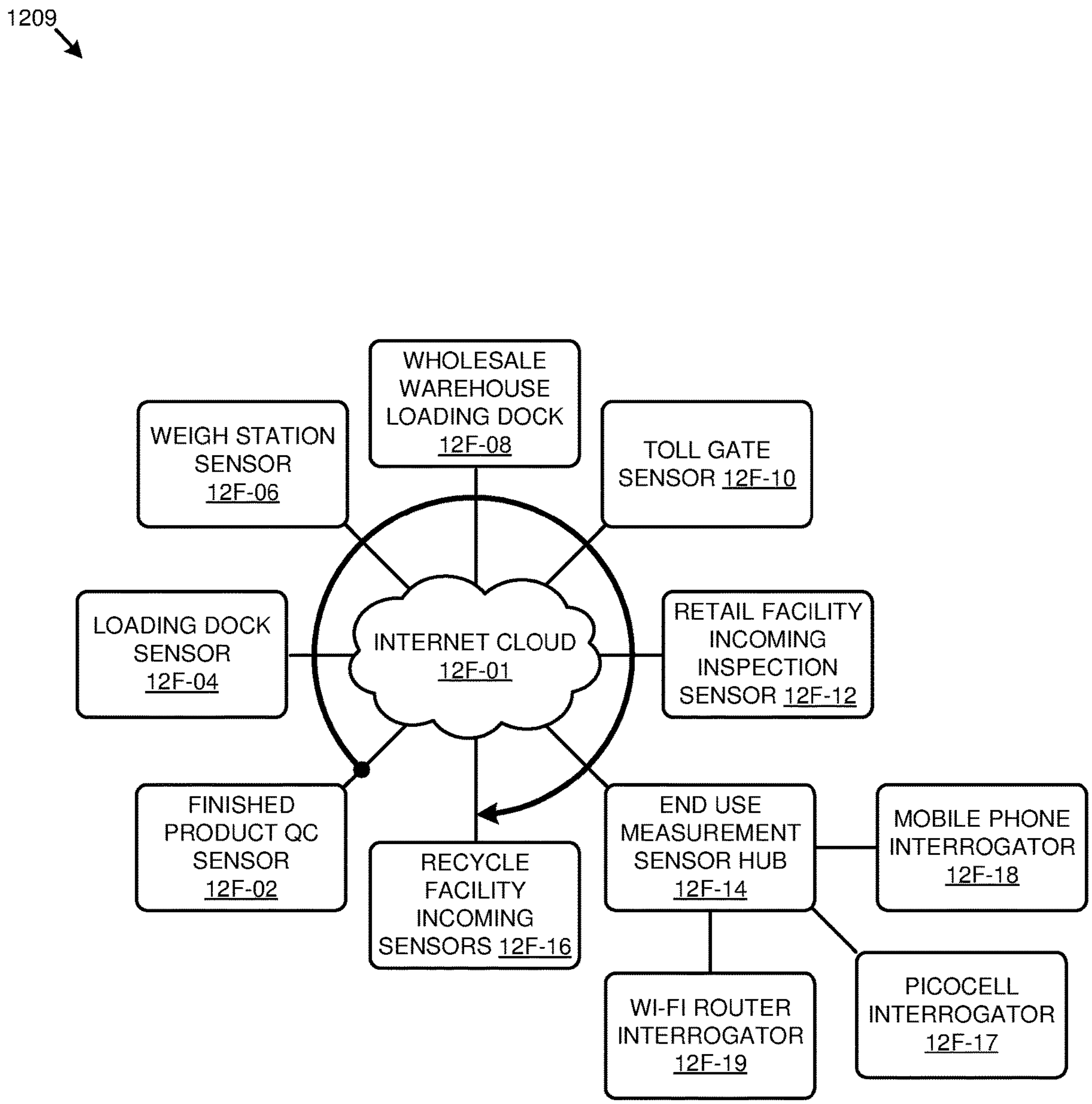
FIG. 12F illustrates an interrogator network, constituent components of which are employed for calculating a lifetime greenhouse gas emission footprint, in accordance with one embodiment.

FIGS. 19-12A-19-12F show example frequency responses of resonance impedance sensors to various analytes, according to some implementations.

Figures 13A, 19:
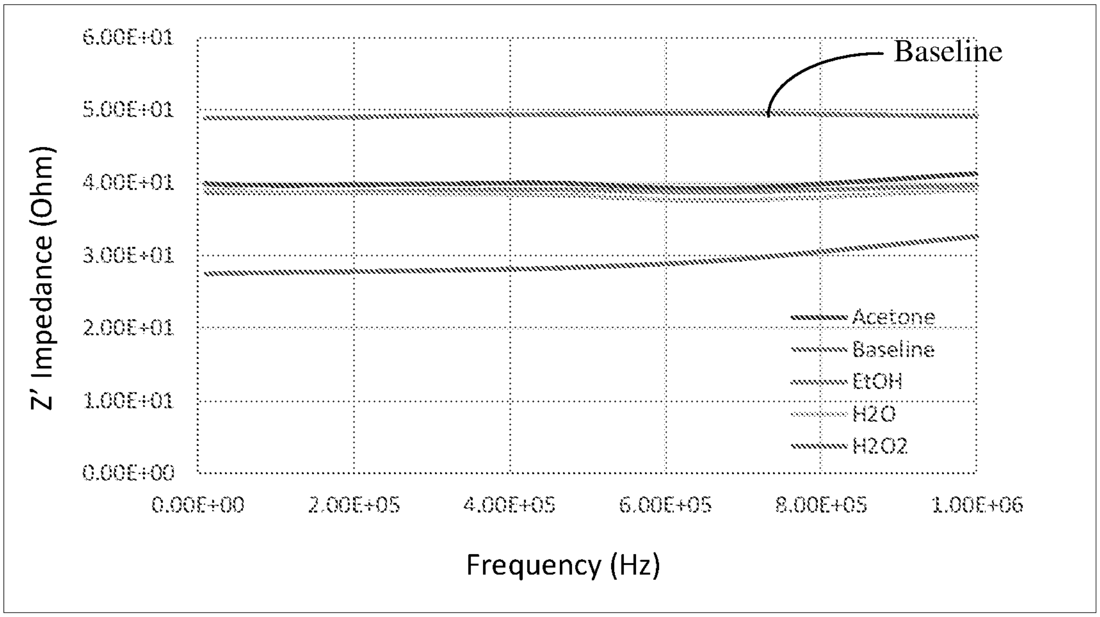

FIG. 19-13A shows the real (Z') impedance component of an example frequency response of electrochemical impedance sensors, according to some implementations.

Figures 13B, 19:
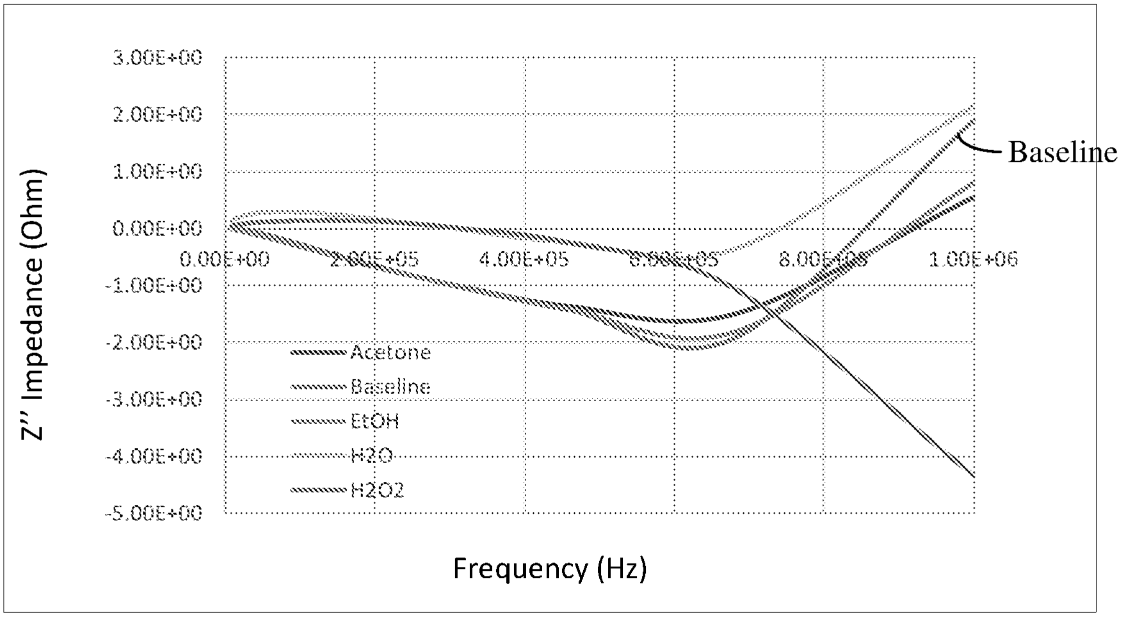
Figures 14A, 19:
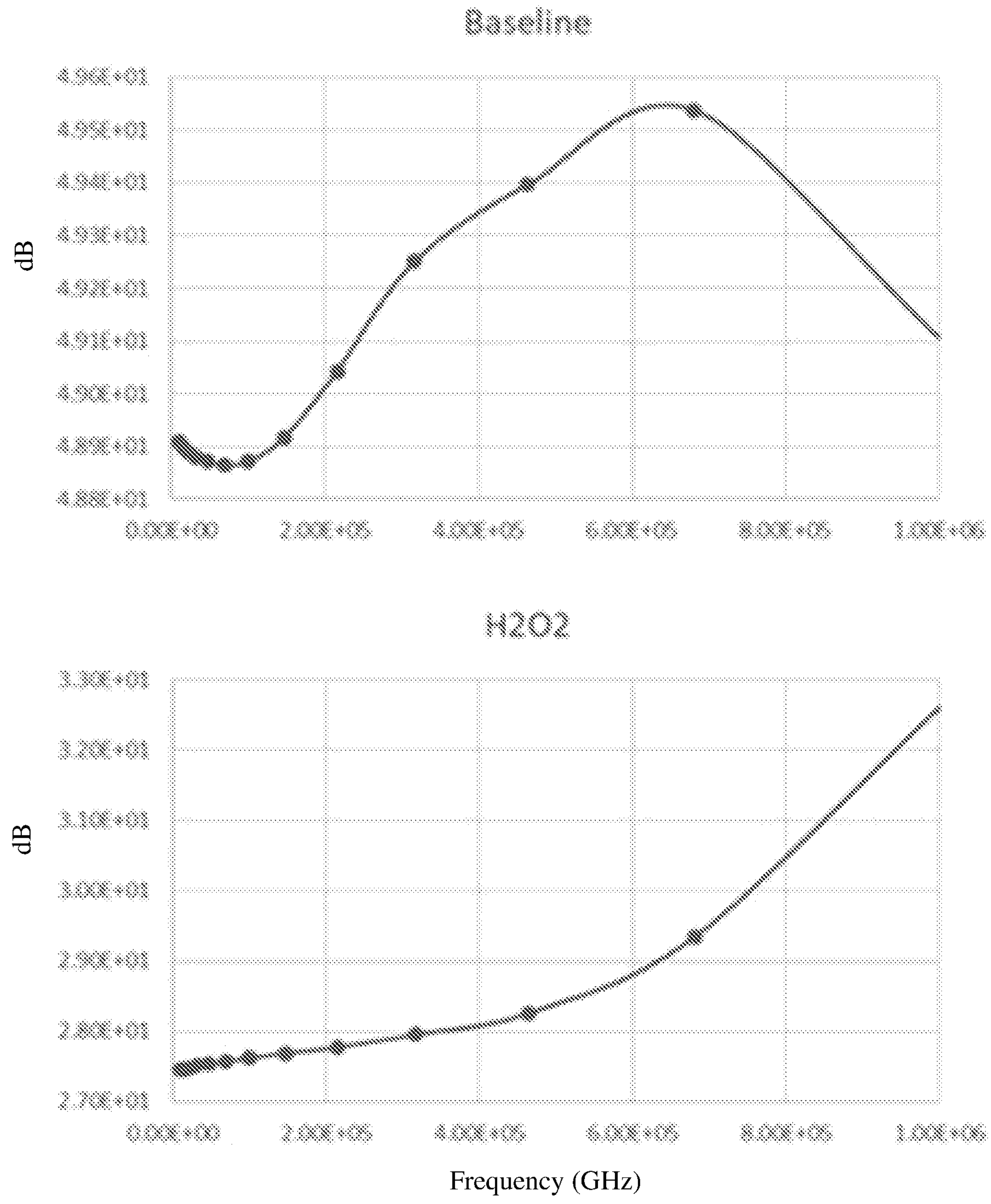
Figures 14B, 19:
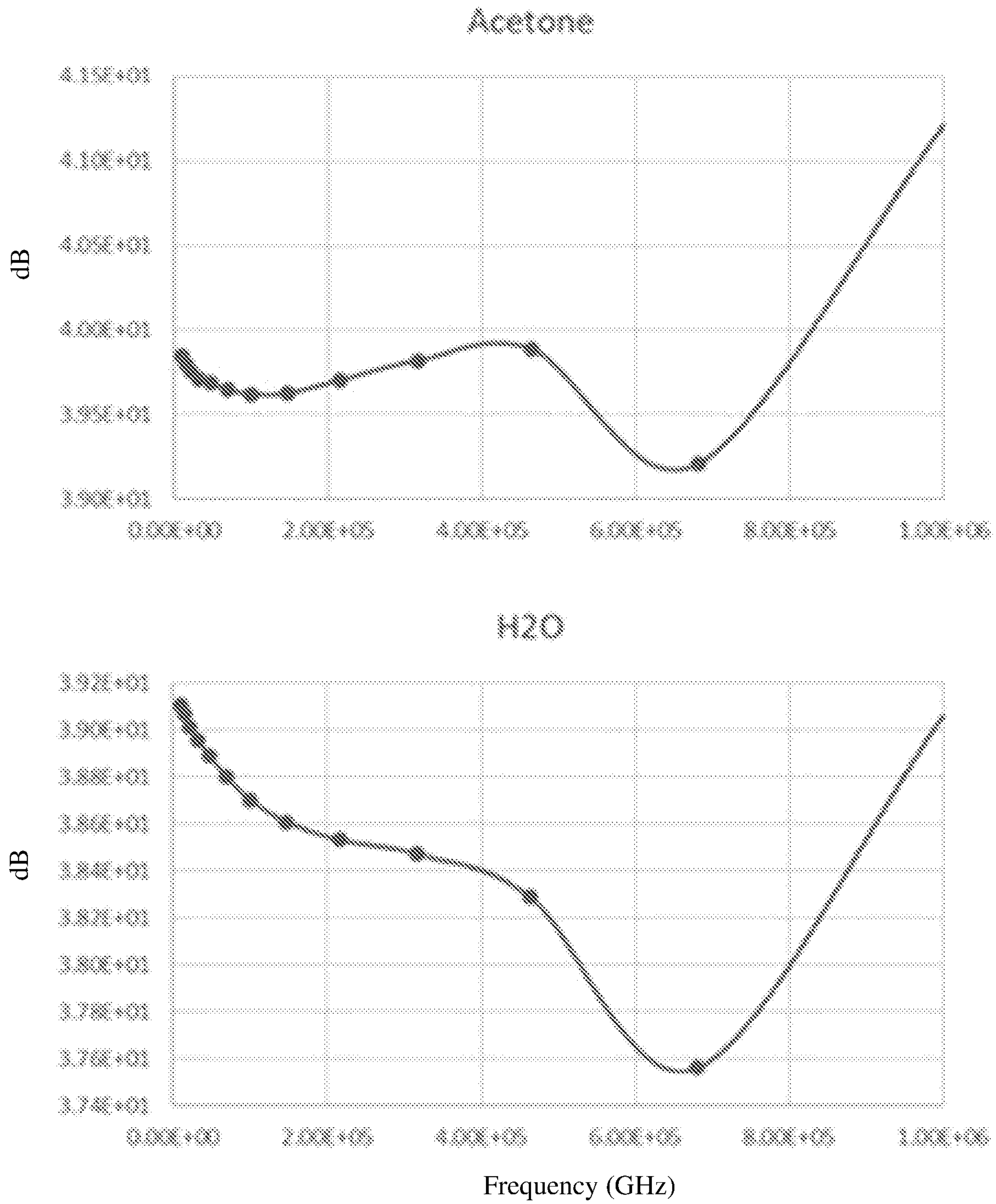

FIG. 19-13B shows the imaginary (Z") impedance component of an example frequency response of electrochemical impedance sensors, according to some implementations.

FIG. 19-14A shows an example baseline frequency response and an example frequency response to hydrogen peroxide, according to some implementations.

FIG. 19-14B shows example frequency responses to acetone and water, according to some implementations.

Figures 14C, 19:
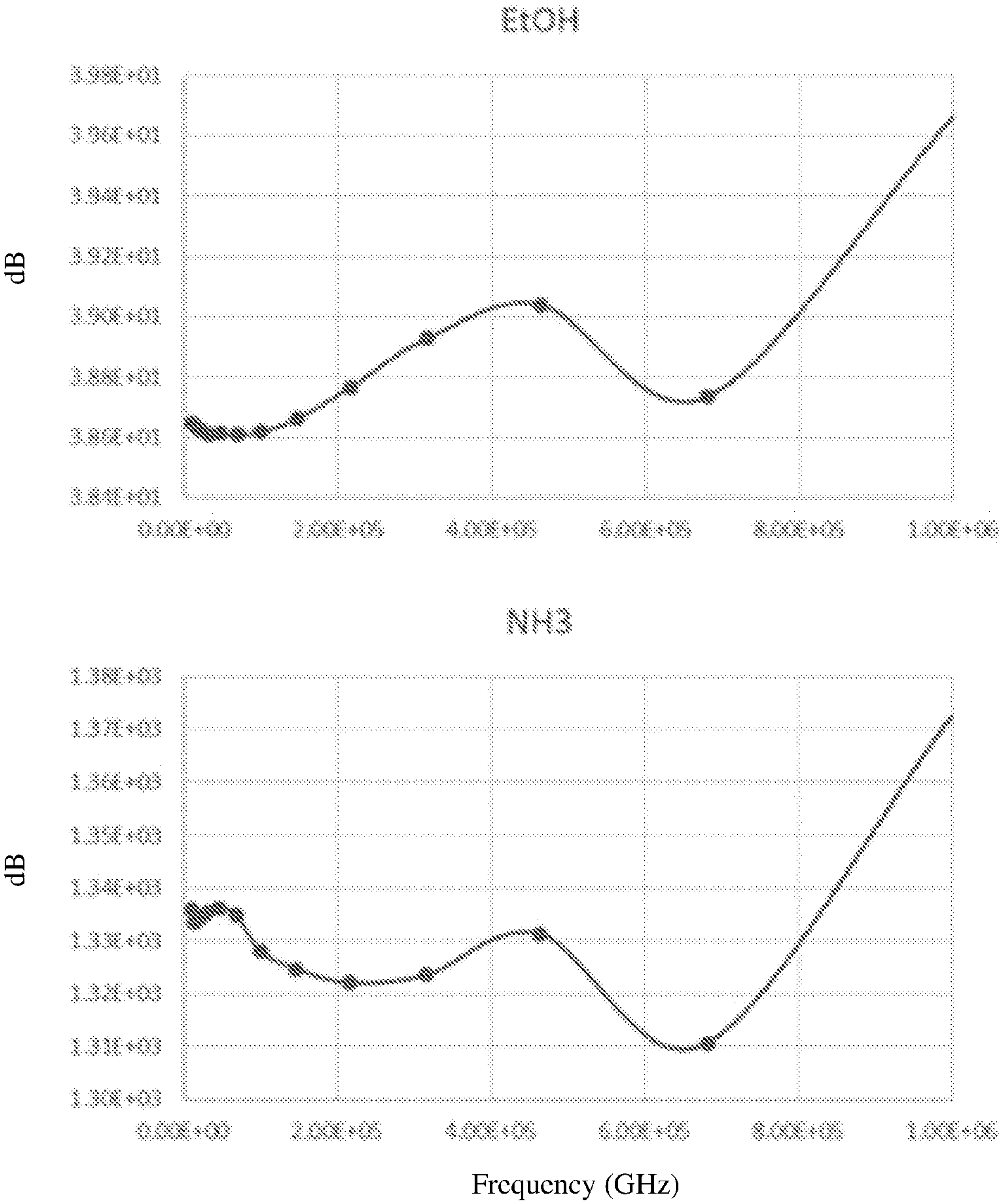

FIG. 19-14C shows example frequency responses to ethanol and ammonia, according to some implementations.

Figures 16, 17, 18, 19, 19B:
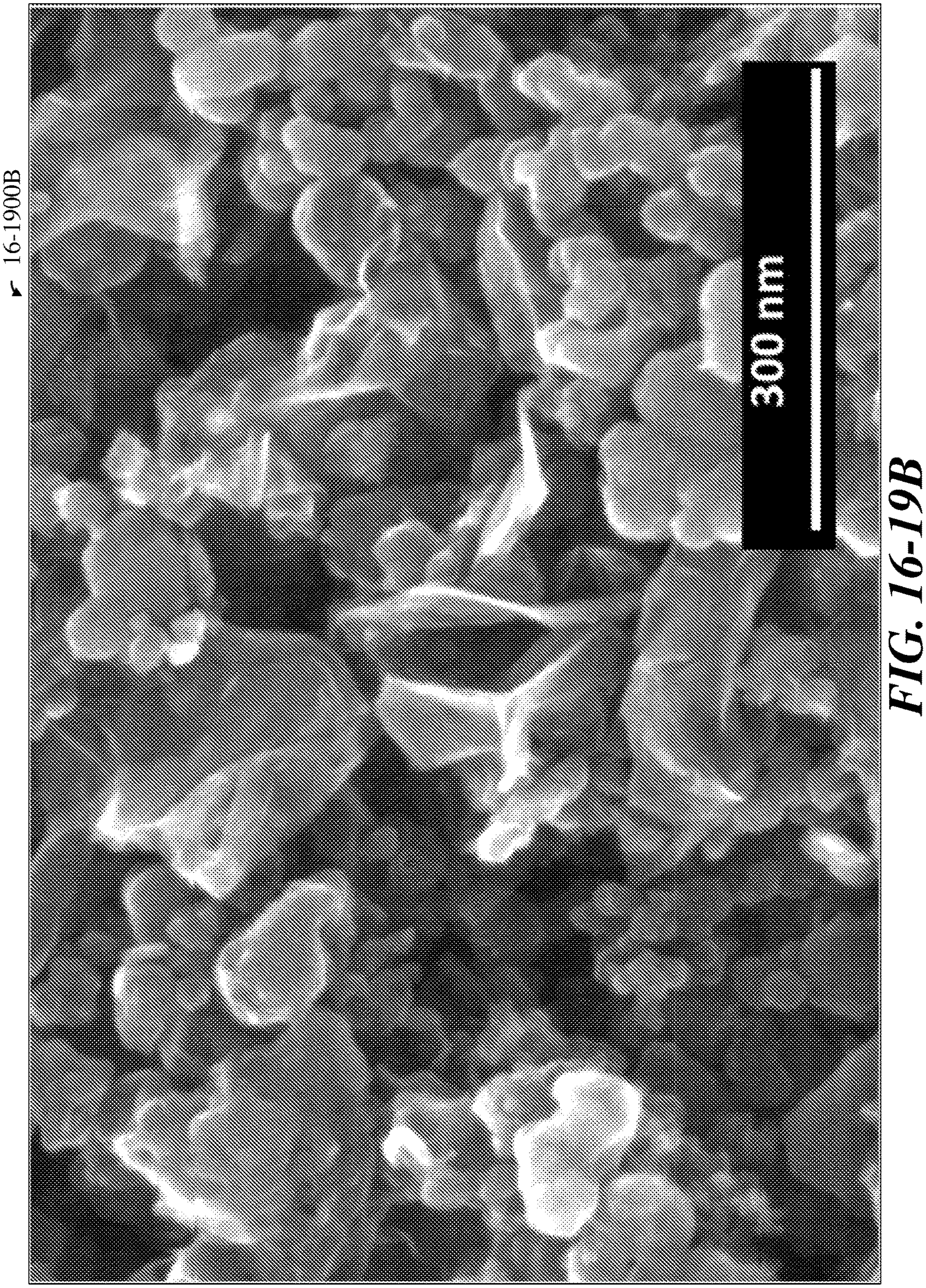
Figures 16, 17, 18, 19, 20, 20A:
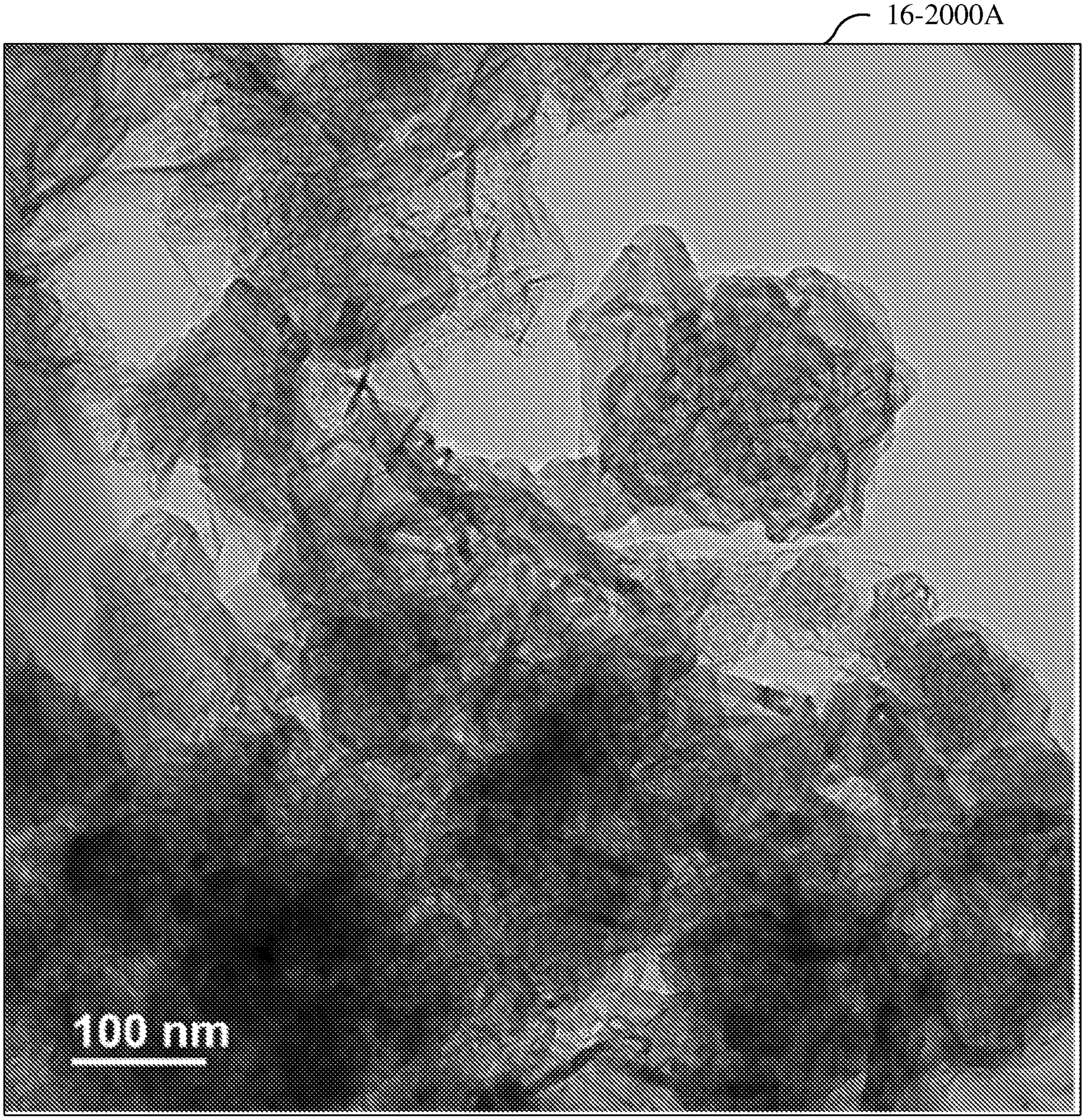
Figures 16, 17, 18, 19, 20, 20B:
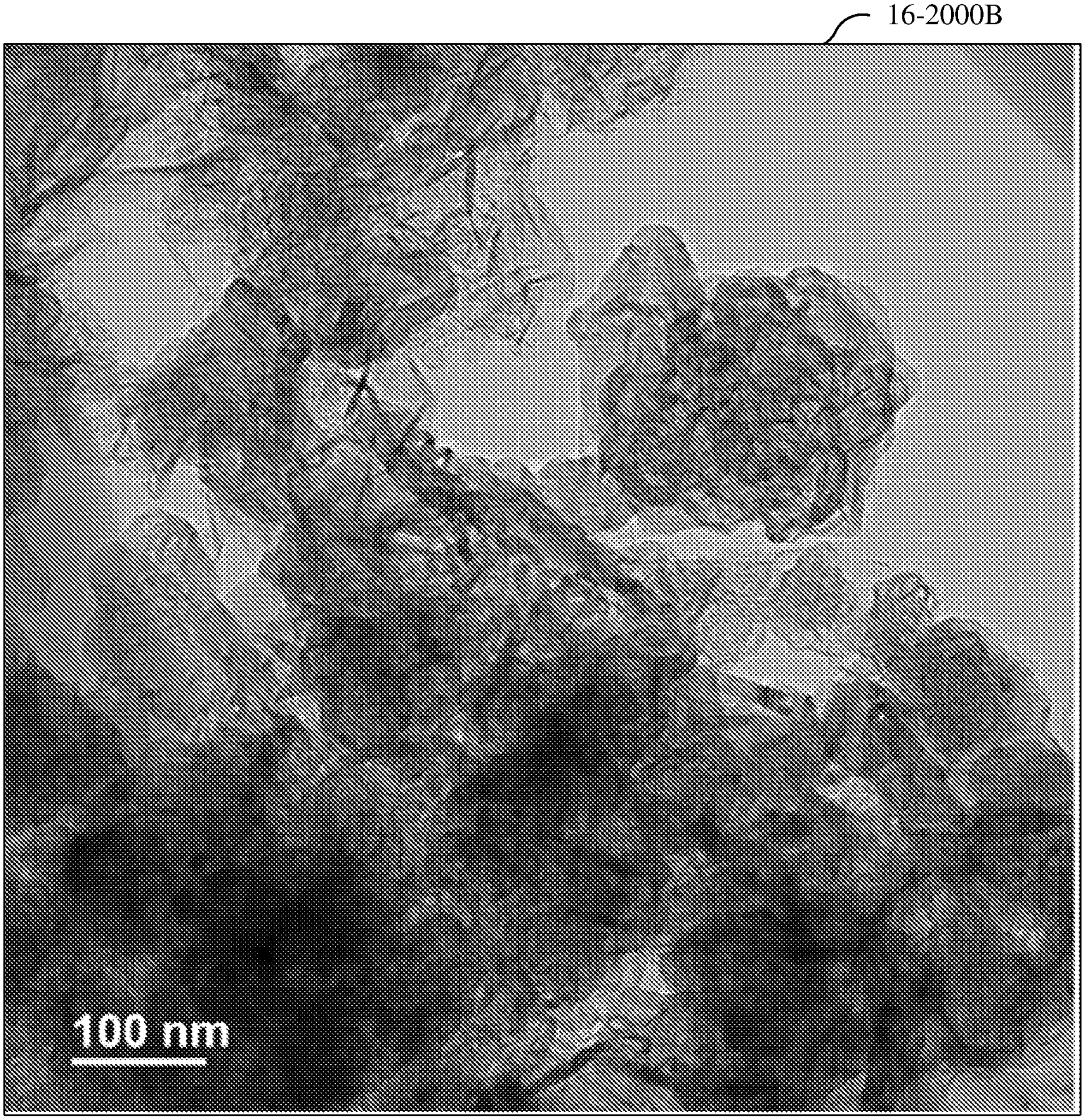

FIG. 20-1 presents an in-situ vehicle control system including various sensors formed of carbon-containing composites tuned to demonstrate desirable radio frequency (RF) signal resonance and response upon being pinged, in accordance with one embodiment.

FIG. 20-2 depicts a signal processing system that analyzes emitted and/or returned RF signals that are frequency-shifted and/or attenuated by sensors formed of carbon-containing tuned RF resonance materials, in accordance with one embodiment.

FIG. 20-3 illustrates a signature classification system, in accordance with one embodiment.

FIG. 20-4 depicts a series of tire condition parameters that are sensed from changes in RF resonance of various layers of carbon-containing tuned RF resonance materials, in accordance with one embodiment.

FIG. 20-5 depicts a schematic diagram of an apparatus used for tuning multiple plies of a tire by selecting carbon-containing tuned RF resonance materials from separate and independent reactors for incorporation into the body of a single tire assembly, in accordance with one embodiment.

Figure 7:
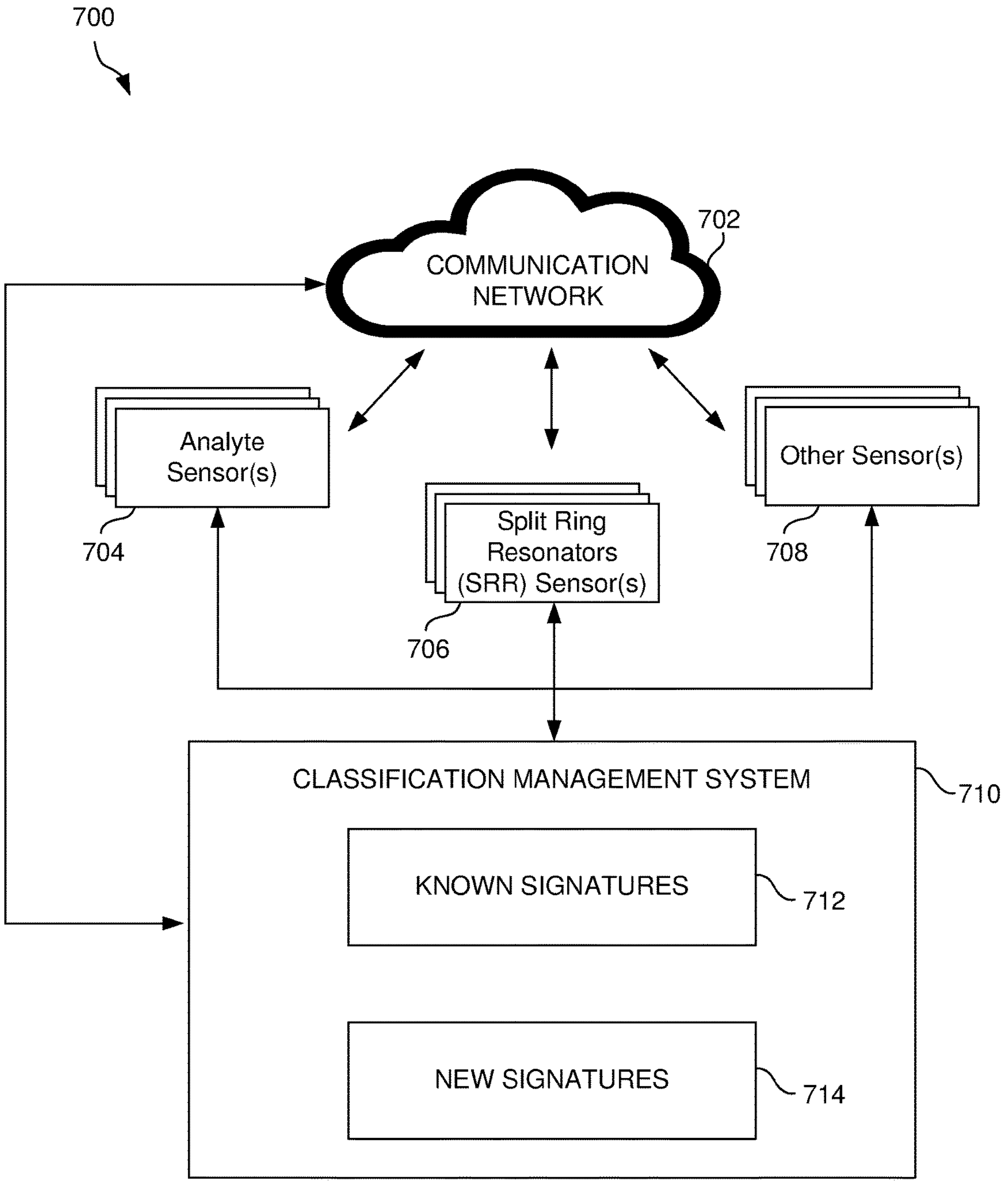

FIGS. 20-6 and 20-7 depict sets of example condition signatures that may be emitted from new tires formed of layers of carbon-containing tuned RF resonance materials, in accordance with one embodiment.

FIG. 20-8 depicts a top-down schematic view of an example split-ring resonator (split ring resonator) configuration including two concentric split ring resonators, in accordance with one embodiment.

FIG. 20-9 depicts a schematic diagram showing a complete tire diagnostics system and apparatus for tire wear sensing through impedance-based spectroscopy, in accordance with one embodiment.

Figure 10:
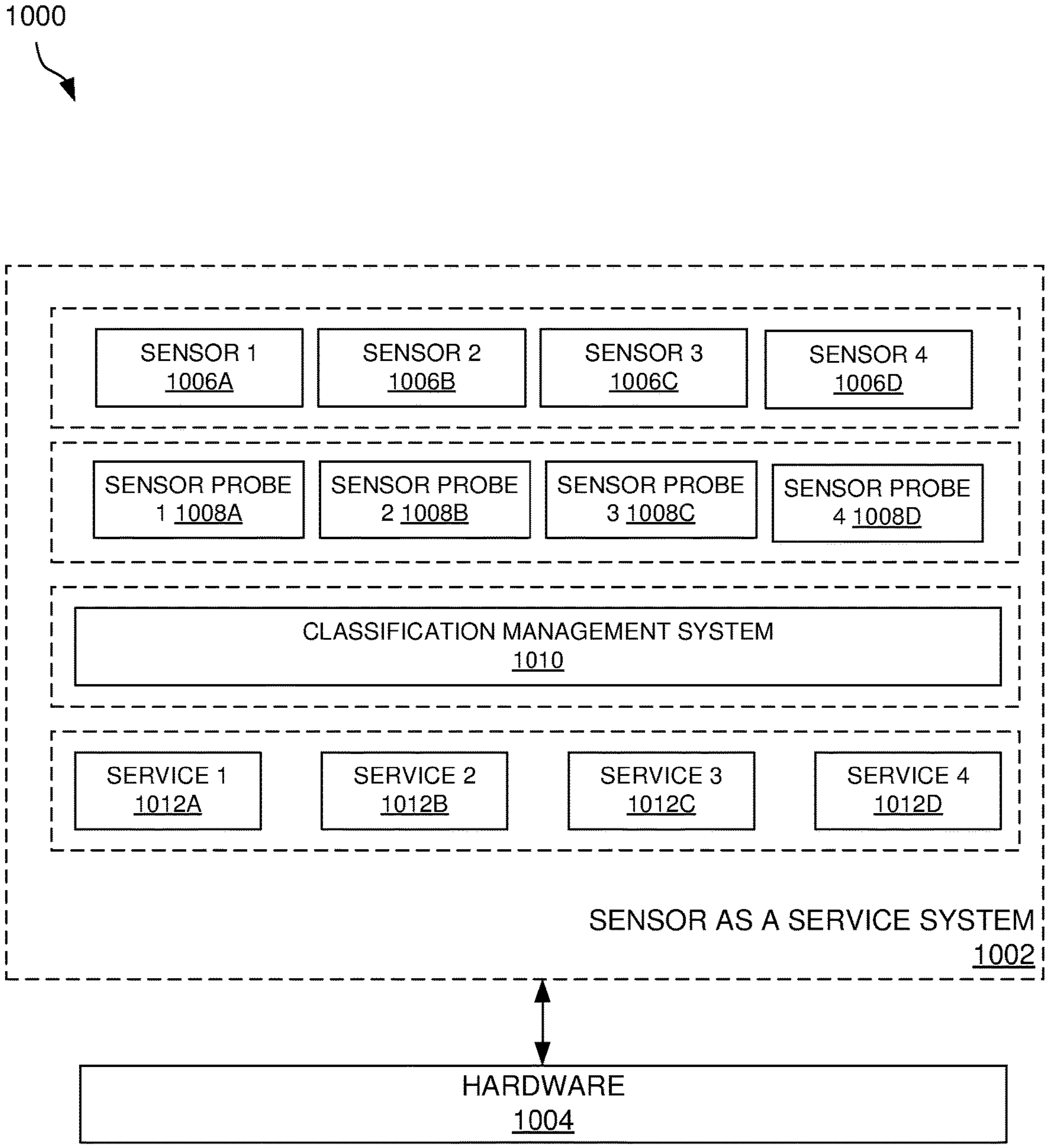
FIG. 10 illustrates an architecture for sensors-as-a-service, in accordance with one embodiment.
Figure 11:
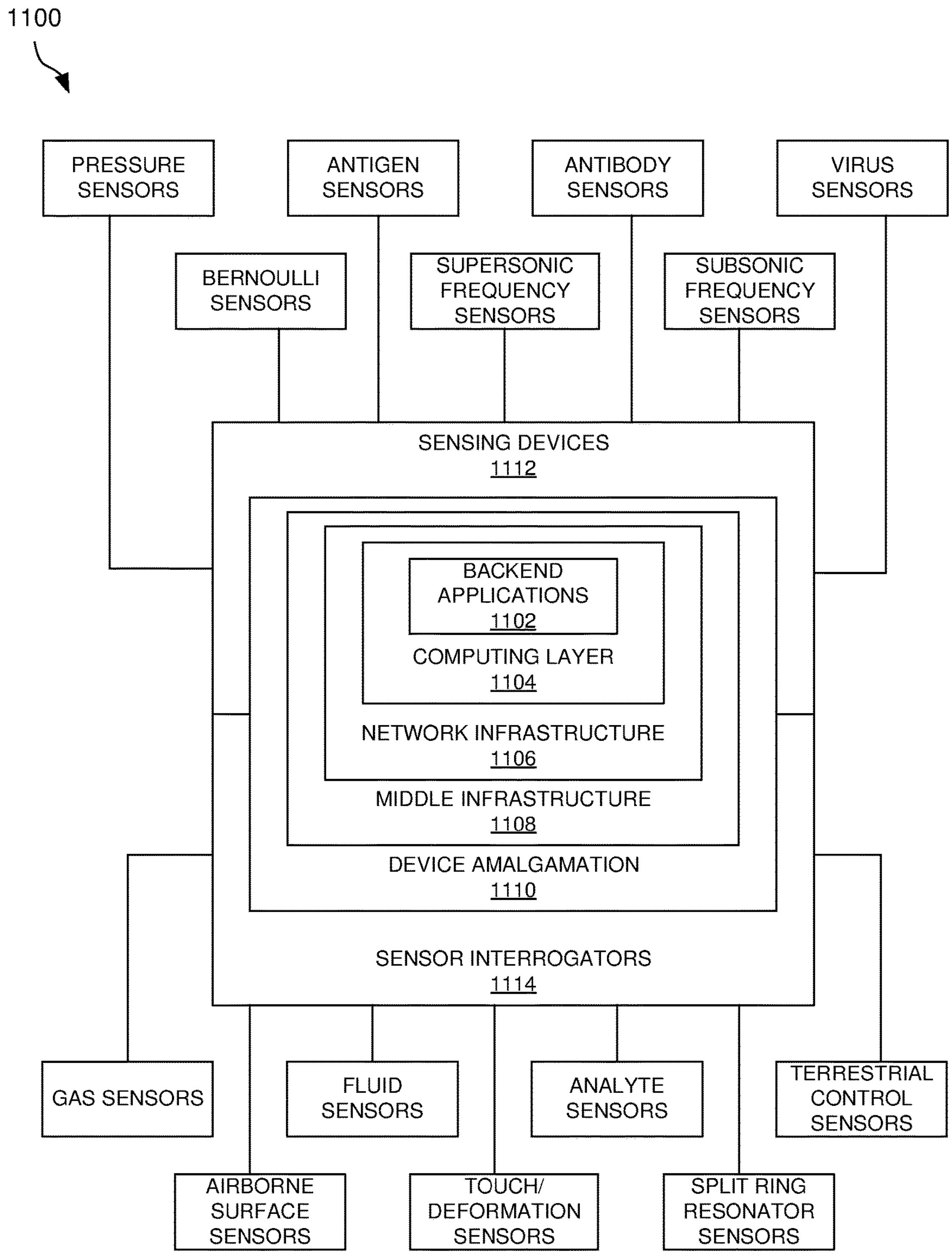
FIG. 11 illustrates an ecosystem for sensors, in accordance with one embodiment.

FIGS. 20-10 and 20-11 depict schematic diagrams relating to tire information transferred via telemetry into a navigation system, as well as equipment for manufacturing printed carbon-based materials, in accordance with one embodiment.

FIG. 20-12 depicts a schematic diagram for resonant serial number-based digital encoding of vehicle tires through tire tread layer and/or tire body ply-print encoding, in accordance with one embodiment.

Figure 13:
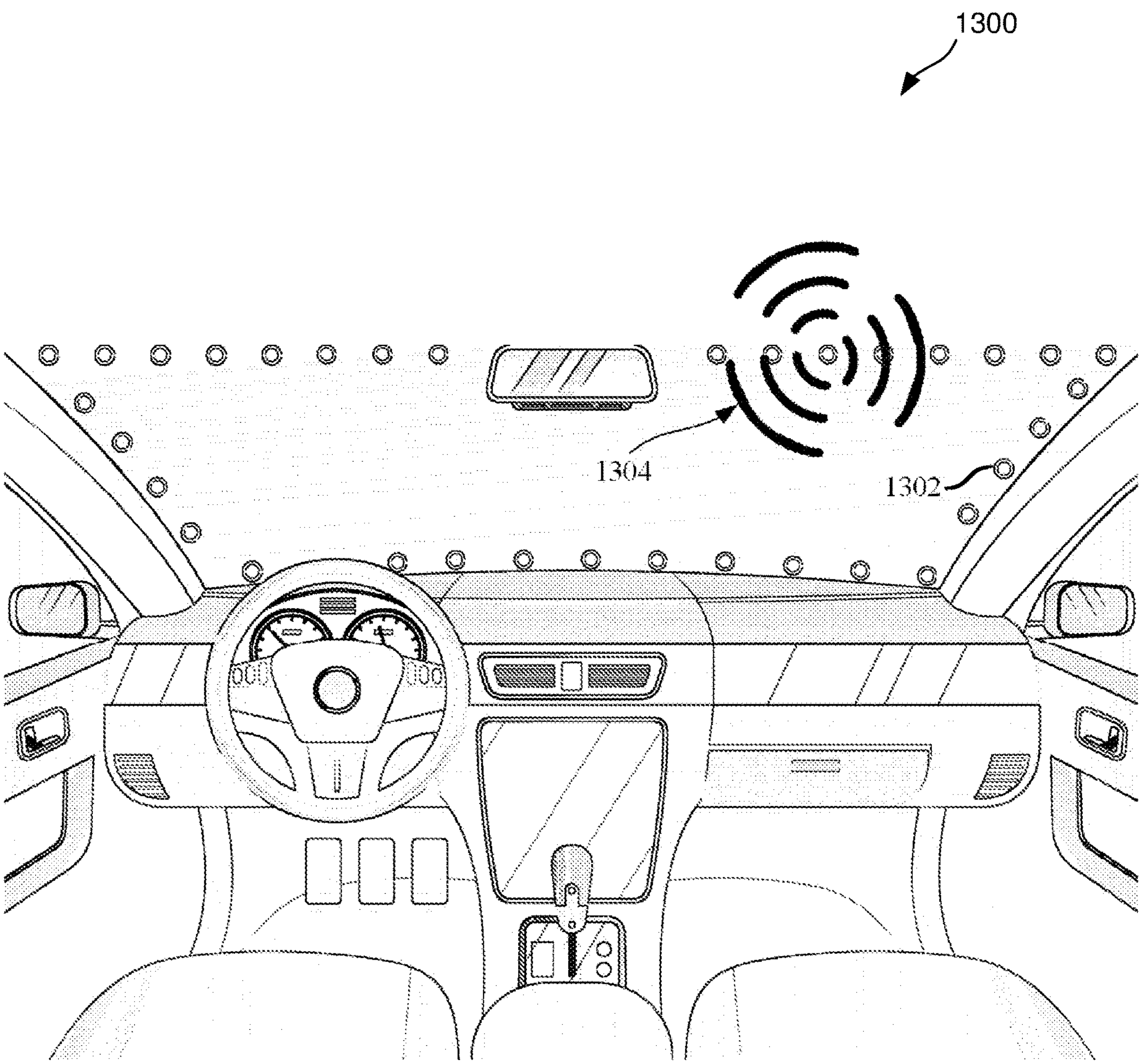
FIG. 13 shows a water droplet sensing vehicle application, in accordance with one embodiment.

FIG. 20-13 illustrates resonance mechanisms that contribute to the ensemble phenomenon arising from different proximally-present resonator types, in accordance with one embodiment.

Figure 14:
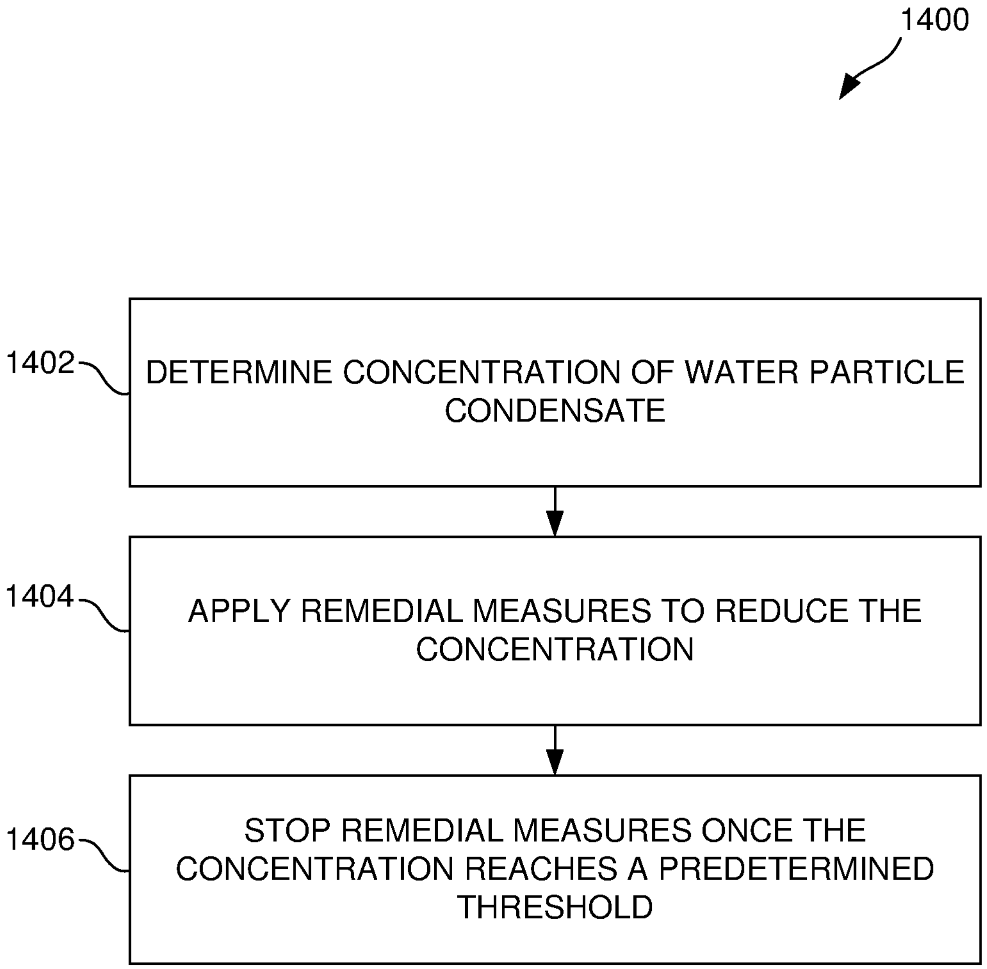
FIG. 14 shows a method for remedying sensed water droplets, in accordance with one embodiment.

FIG. 20-14 is an example temperature sensor including one or more of the presently disclosed split ring resonators, in accordance with one embodiment.

FIG. 20-15 is a graph of measured resonant signature signal intensity (in decibels, dB) relative to height (in millimeters, mm) of tire tread layer loss, in accordance with one embodiment.

FIG. 20-16 is a graph of measured resonant signature signal intensity (in decibels, dB) relative to the natural resonance frequency of split ring resonators showing resonance response shift proportionate to tire ply deformation, in accordance with one embodiment.

FIG. 20-17 is a graph of signal intensity relative to chirp signal frequency for split ring resonators that may resonate corresponding to an encoded serial number, in accordance with one embodiment.

FIG. 20-18A through FIG. 20-18Y depict carbonaceous materials used as a formative material to produce any of the presently disclosed resonators (e.g., split ring resonators), in accordance with one embodiment.

FIGS. 20-19A1 and 20-19A2 provide a depiction of a split ring resonator, or plurality of split ring resonators, being placed in concrete before the concrete is to be poured into a given structural form, in accordance with one embodiment.

FIGS. 20-19B1 and 19B2 show a depiction of columns containing the split ring resonator, or plurality of split ring resonators, and an equation for measuring the change within the structural members, in accordance with one embodiment.

FIG. 20-20 illustrates the utilization of split ring resonators externally on structural members varying in shapes that already in use. FIG. 20-20 also displays examples of possible factors and equations that may be vital in determining the size, orientation, location, and application of the split ring resonator or split ring resonators on the structural member, in accordance with one embodiment.

Figures 16, 17, 18, 19, 20, 21:
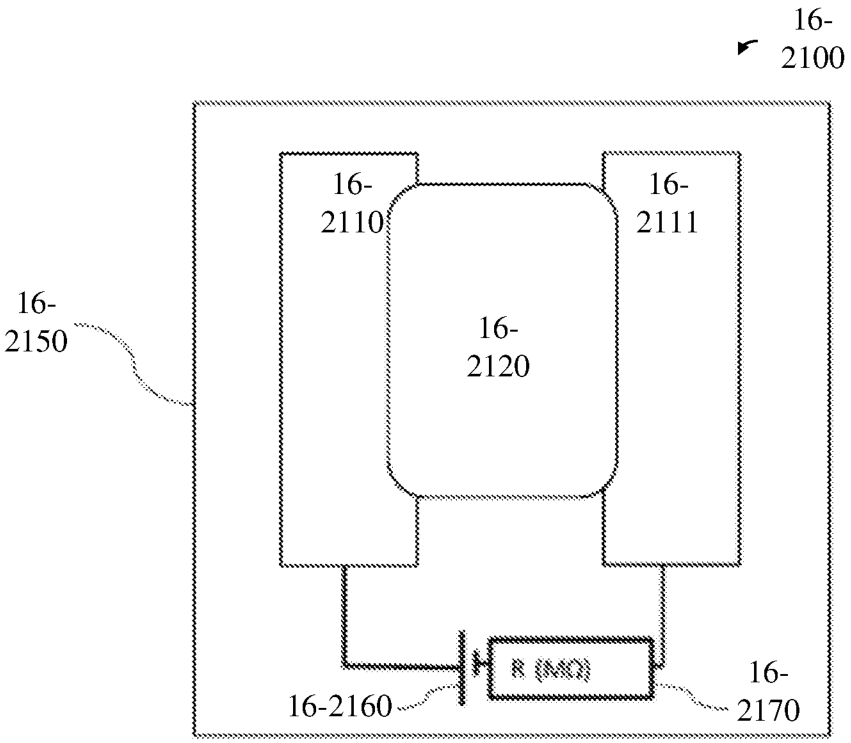

FIG. 20-21 is a flow chart representing the process in which the split ring resonator is implemented in the given applications, in accordance with one embodiment.

FIG. 20-22A1-20-22A3 are being presented to illustrate use of split ring resonators or a plurality of split ring resonators within roadside barriers, in accordance with one embodiment.

FIG. 20-22B depicts a roadside barrier used in a racetrack showing structural components that constitute the roadside barrier in which a split ring resonator or split ring resonators can be placed, in accordance with one embodiment.

FIG. 20-23 shows a depiction of split ring resonators disposed on the surface of a concrete structure after the concrete has been poured into a given structural form, in accordance with one embodiment.

FIG. 20-24A depicts a sensing laminate including alternating layers of carbon-containing resin and carbon fiber in contact with one-another, in accordance with one embodiment.

FIGS. 20-24B1 and 20-24B2 depict a frequency-shifting phenomenon as demonstrated by a sensing laminate including carbon-containing tuned RF resonance materials, in accordance with one embodiment.

FIG. 20-24B3 is a graph depicting idealized changes in RF resonance as a function of deflection, in accordance with one embodiment.

FIG. 20-24B4 is a graph depicting changes in RF resonance for 4-layer and 5-layer laminates, in accordance with one embodiment.

FIG. 20-24C depicts surface sensor deployments in areas of a vehicle, in accordance with one embodiment.

FIG. 20-25A provides a depiction of interaction between a vehicle and split ring resonators disposed in roadway asphalt and/or on the surface of a road, in accordance with one embodiment.

FIG. 20-25B provides a depiction of how split ring resonators disposed within or on a tire can be used to measure tire stiction, in accordance with one embodiment.

FIG. 20-26 depicts placement of split ring resonators disposed in roadway asphalt and/or on the surface of a road, in accordance with one embodiment.

FIG. 20-27 is a flow chart representing the process to determine tire stiction, in accordance with one embodiment.

FIG. 20-28 shows a correlation between measured frequencies and tread thickness, in accordance with one embodiment.

FIG. 20-29 shows a section of a vehicle surface where an array of individually configured split ring resonators are disposed, in accordance with one embodiment.

FIG. 20-30 depicts a configuration of the split ring resonators in a frequency bin, in accordance with one embodiment.

FIG. 20-31 shows a chart of detection of time-based variation of deflection, as indicated by time-based variation of the resonant frequency, in accordance with one embodiment.

FIG. 20-32 depicts a signature classification system that processes signals received from sensors formed of carbon-containing tuned resonance materials, in accordance with one embodiment.

FIG. 20-33 shows a depiction of split ring resonators disposed in and/or on a drone, and/or a drone platform, in accordance with one embodiment.

FIG. 20-34 shows a depiction of split ring resonators disposed in and/or on an aerial vehicle, in accordance with one embodiment.

FIG. 20-35 shows a depiction of split ring resonators disposed in and/or on an aerial vehicle, as well as landing location sensors, in accordance with one embodiment.

FIGS. 20-36A and 20-36B show two depictions of split ring resonators disposed in and/or on aircraft, in accordance with one embodiment.

FIG. 20-37A shows a depiction of split ring resonators disposed in and/or on a rocket, in accordance with one embodiment.

FIG. 20-37B shows a depiction of split ring resonators disposed in and/or on a rocket, and/or a landing platform, as well as landing location sensors, in accordance with one embodiment.

FIG. 20-38A is a flow chart relating to reporting feedback from split ring resonators, in accordance with one embodiment.

FIG. 20-38B is a flow chart relating to landing an aerial vehicle and/or drone using split ring resonators, in accordance with one embodiment.

FIG. 20-39 shows a depiction of meta-materials in a dielectric matrix, and circuitry relating thereto, in accordance with one embodiment.

FIG. 20-40 shows a depiction of a split ring resonator embedded within an open or closed cell material, in accordance with one embodiment.

FIG. 20-41 shows a depiction of pressure sensors using open or closed cell material, in accordance with one embodiment.

FIG. 20-42 shows a depiction of wind pressure sensing data using open or closed cell material, in accordance with one embodiment.

FIG. 20-43 shows a depiction of a path and circuitry relating to frequency selective conductivity, in accordance with one embodiment.

FIG. 20-44 shows a depiction of many industries in which the use of split ring resonators may be applicable, in accordance with one embodiment.

FIG. 20-45 shows a depiction of one or more split ring resonators embedded in an adhesive sticker, in accordance with one embodiment.

FIG. 20-46 shows a depiction of one or more split ring resonators embedded in an adhesive sticker, in accordance with one embodiment.

FIG. 20-47 shows a depiction of one or more split ring resonators embedded in an adhesive sticker with protective film, in accordance with one embodiment.

FIG. 20-48 shows a depiction of one or more split ring resonators embedded in an adhesive sticker roll, in accordance with one embodiment.

FIG. 20-49 shows a depiction of one or more split ring resonators embedded in an adhesive sticker for automobile use, in accordance with one embodiment.

FIG. 20-50 shows a depiction of one or more split ring resonators embedded in an adhesive sticker for robot use, in accordance with one embodiment.

FIG. 20-51 shows a depiction of one or more split ring resonators embedded in an adhesive sticker for assembly-line use, in accordance with one embodiment.

FIG. 20-52 shows a depiction of one or more split ring resonators embedded in an adhesive sticker for an object in motion use with sensing componentry, in accordance with one embodiment.

FIG. 20-53 shows a deployable sensor including one or more split ring resonators, in accordance with one embodiment.

FIG. 20-54 shows a deployable sensor including one or more split ring resonators, in accordance with one embodiment.

FIG. 20-55 shows a deployable sensor including one or more split ring resonators on a deployable vehicle, in accordance with one embodiment.

FIG. 20-56 shows a depiction of deployable sensors including one or more split ring resonators on remotely controlled vehicles.

FIG. 21-1 depicts an environment in which electromagnetic state sensing devices can be deployed, according to an embodiment.

FIG. 21-2 presents a flow chart depicting a processing flow by which electromagnetic state sensing devices can be deployed, according to an embodiment.

FIG. 21-3A is a schematic of an electromagnetic state sensing device, according to an embodiment.

FIG. 21-3B1 illustrates a deployment scenario in which a first state of liquid contents is measured, according to an embodiment.

FIG. 21-3B2 illustrates a deployment scenario in which a second state of liquid contents is measured, according to an embodiment.

FIG. 21-3B3 illustrates a deployment scenario in which a state of liquid contents is measured and displayed, according to an embodiment.

FIG. 21-3B4 illustrates a cross-sectional view of a printed display for indicating the state of contents of a product, according to an embodiment.

FIG. 21-3C is a selection chart for determining a dynamic range of an electromagnetic state sensing device, according to an embodiment.

FIG. 21-4A1 and FIG. 21-4A2 are equivalent circuit models of an electromagnetic state sensing device in a first environment and a second environment, respectively, according to an embodiment.

Figure 4A:
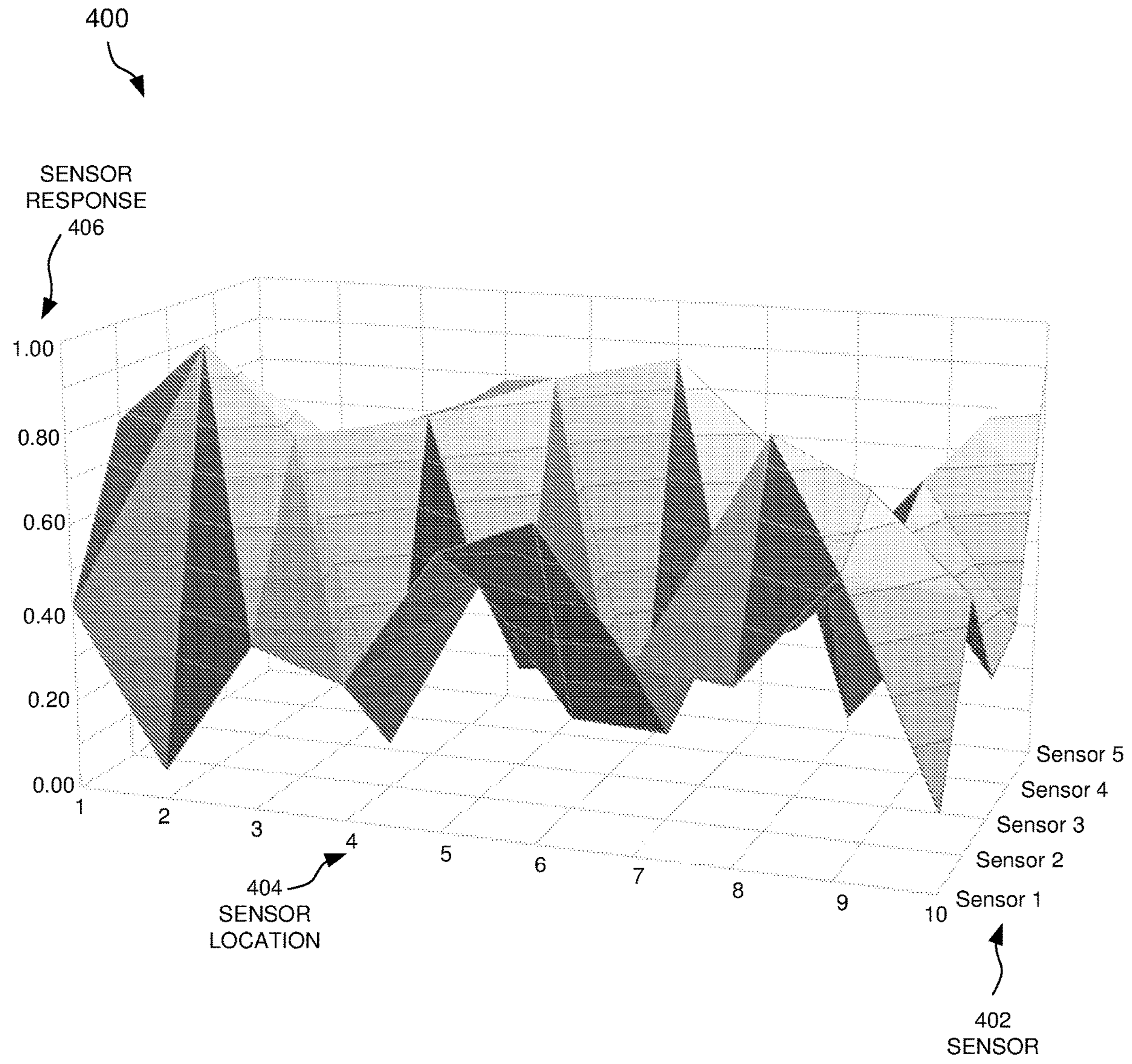
FIG. 4A illustrates a spatial mapping based on digital signatures, in accordance with one embodiment.
Figure 4B:
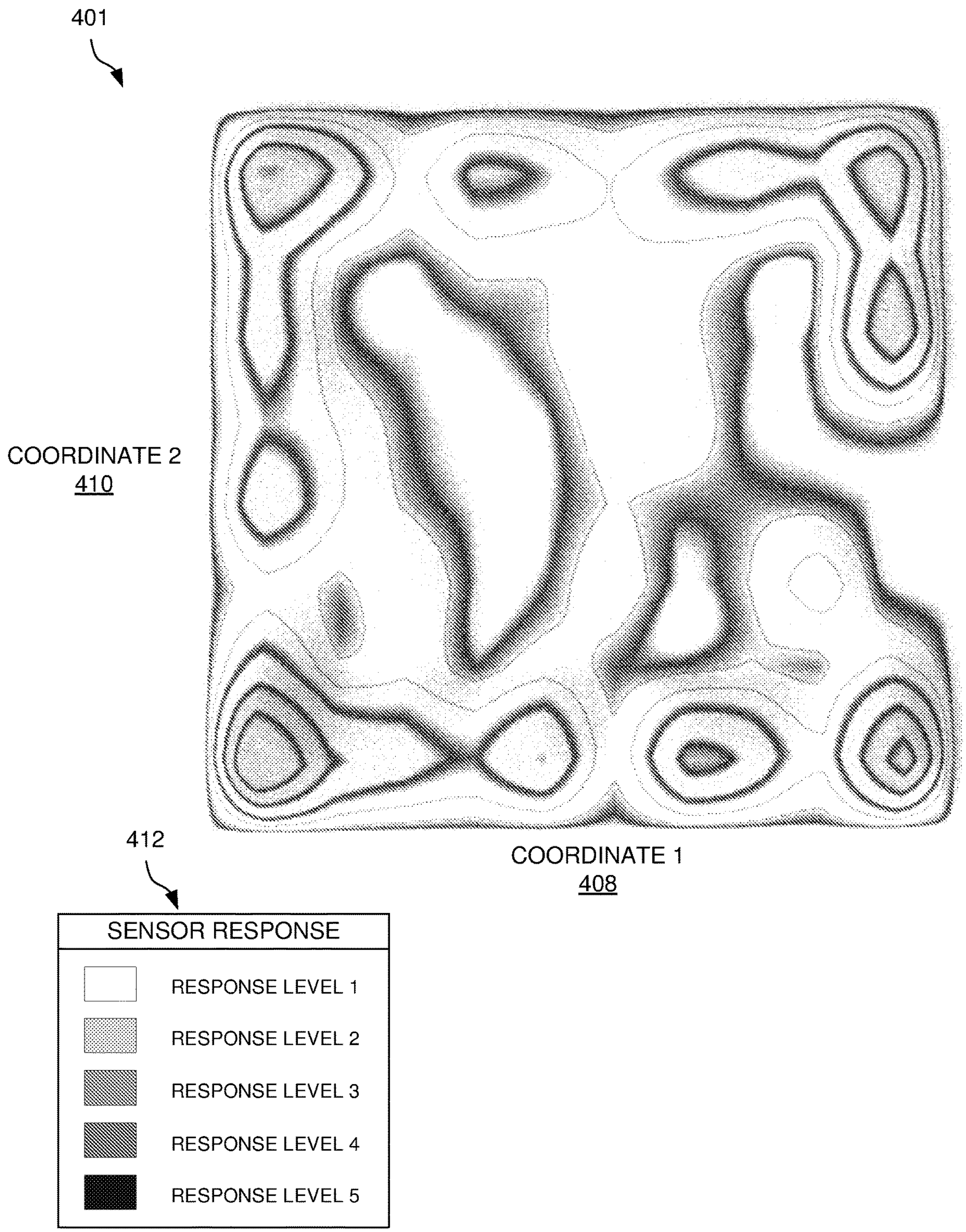
FIG. 4B illustrates a heat map for digital signatures, in accordance with one embodiment.

FIG. 21-4B depicts an empirical data capture technique as used for calibrating electromagnetic state sensing devices in different environments, according to an embodiment.

Figure 5A:
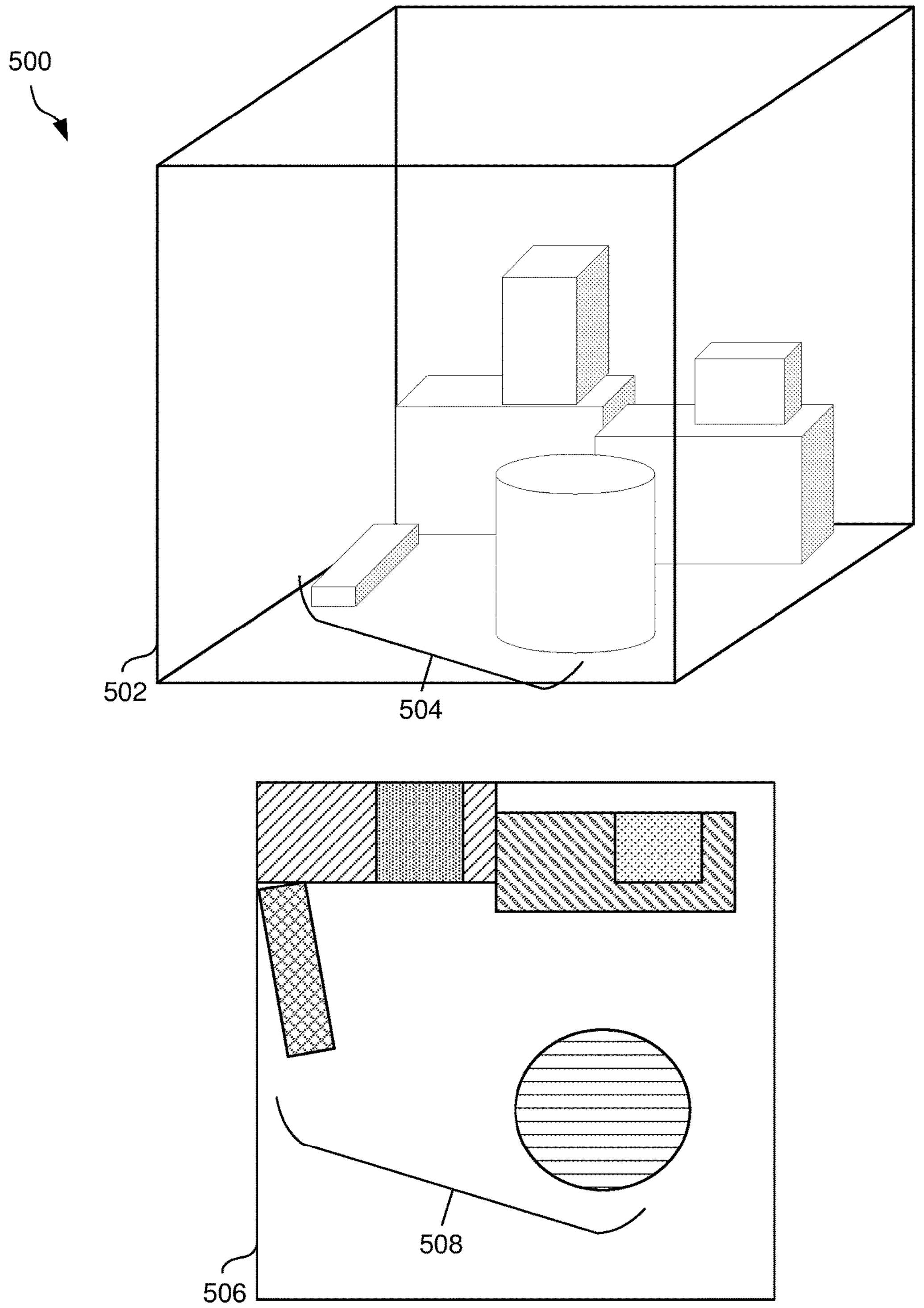
FIG. 5A illustrates a spatial mapping based on sensor detection, in accordance with one embodiment.

FIG. 21-5A depicts a signature capture technique as used for electromagnetic state sensing, according to an embodiment.

Figure 5B:
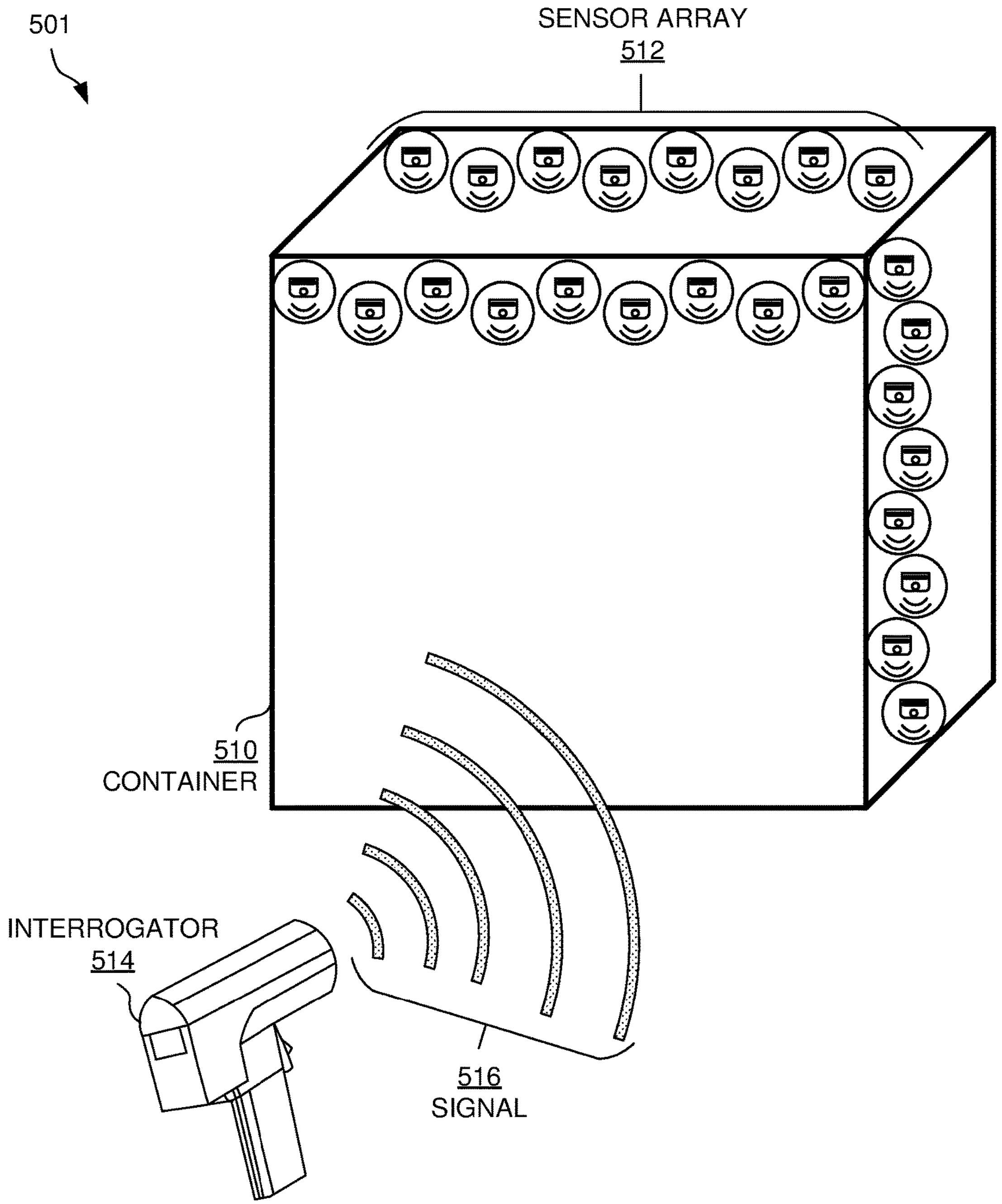
FIG. 5B illustrates an interrogation of a sensor array, in accordance with one embodiment.

FIG. 21-5B depicts a signature analysis technique as used for electromagnetic state sensing, according to an embodiment.

FIG. 21-6 depicts a virtual assistant as used as a hub in a replenishment system, according to an embodiment.

FIG. 21-7A presents a rule codification technique as used in a replenishment system based on electromagnetic state sensing devices, according to an embodiment.

Figures 7B, 18:
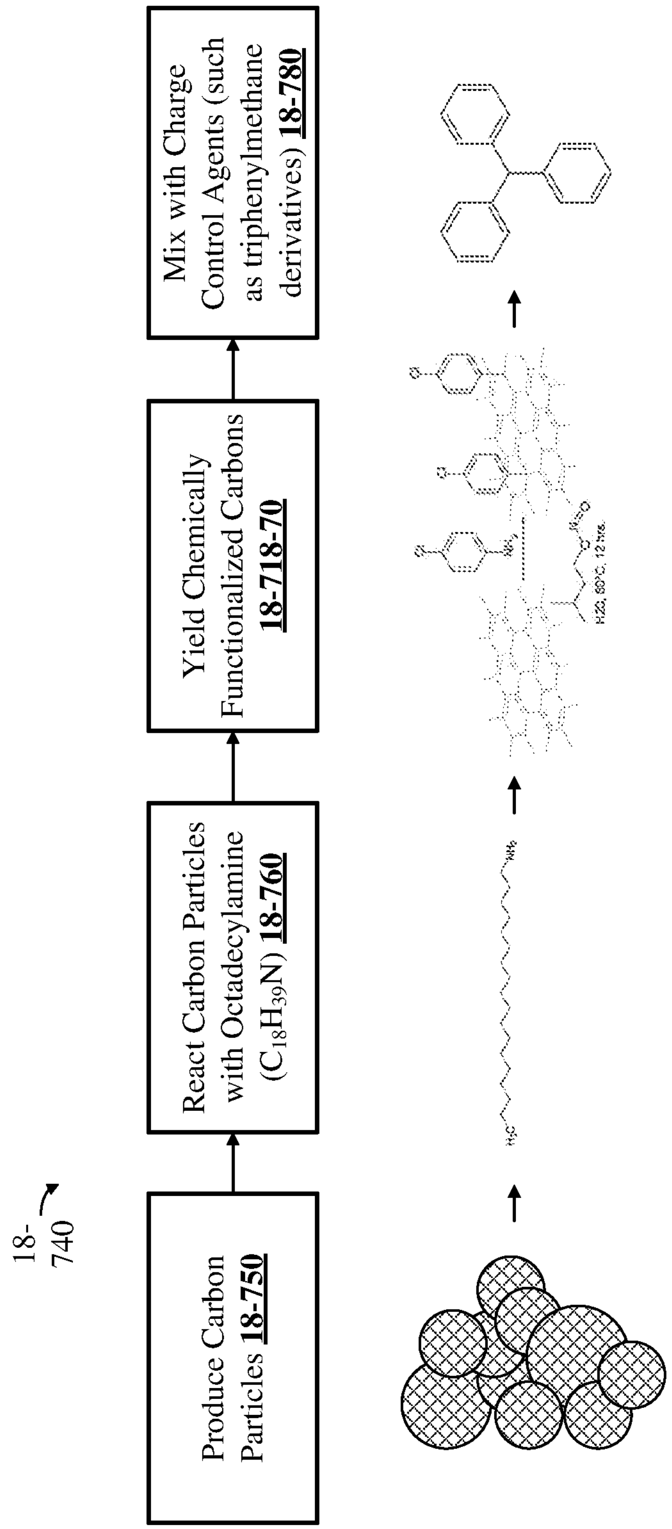
Figures 8, 18:
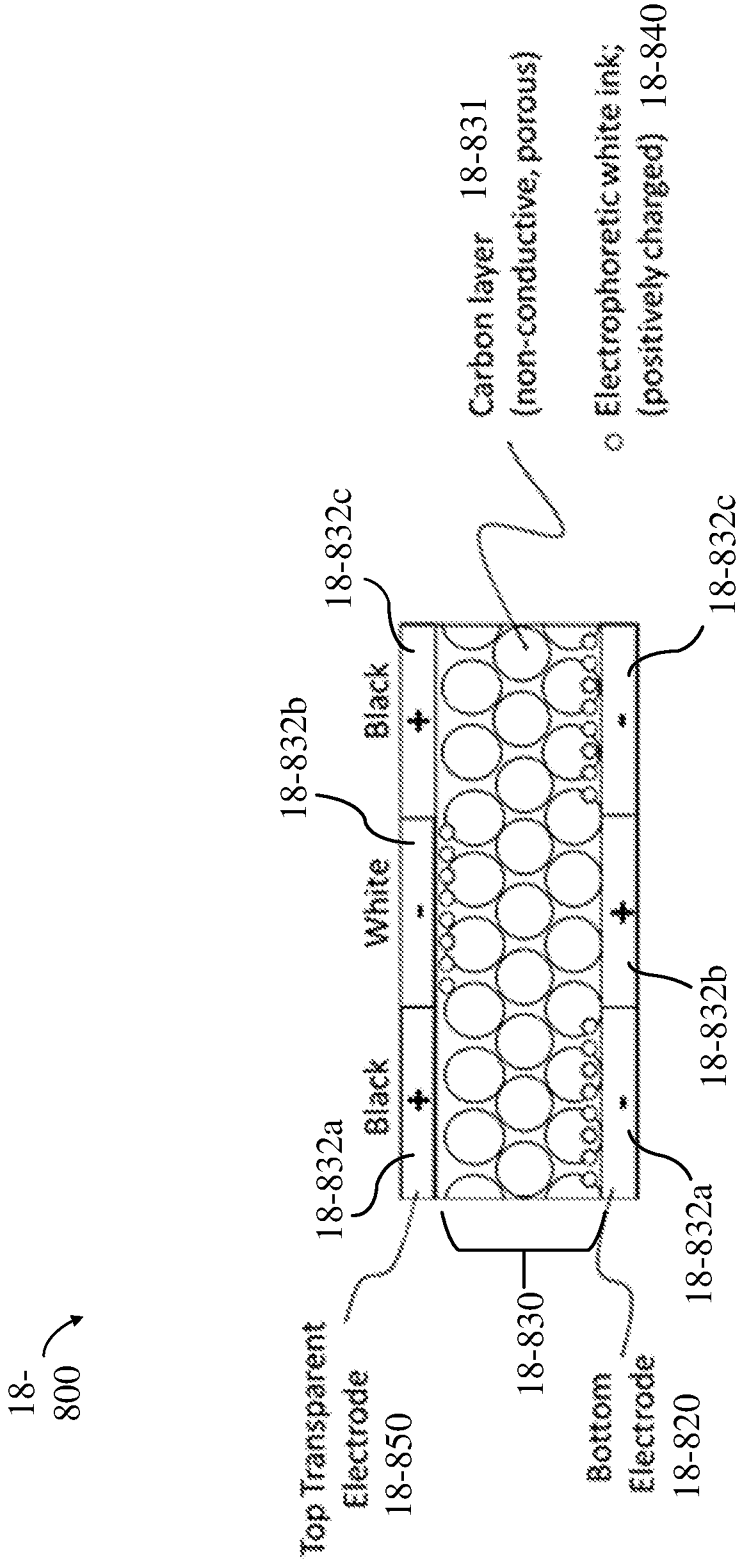
Figures 9, 18:
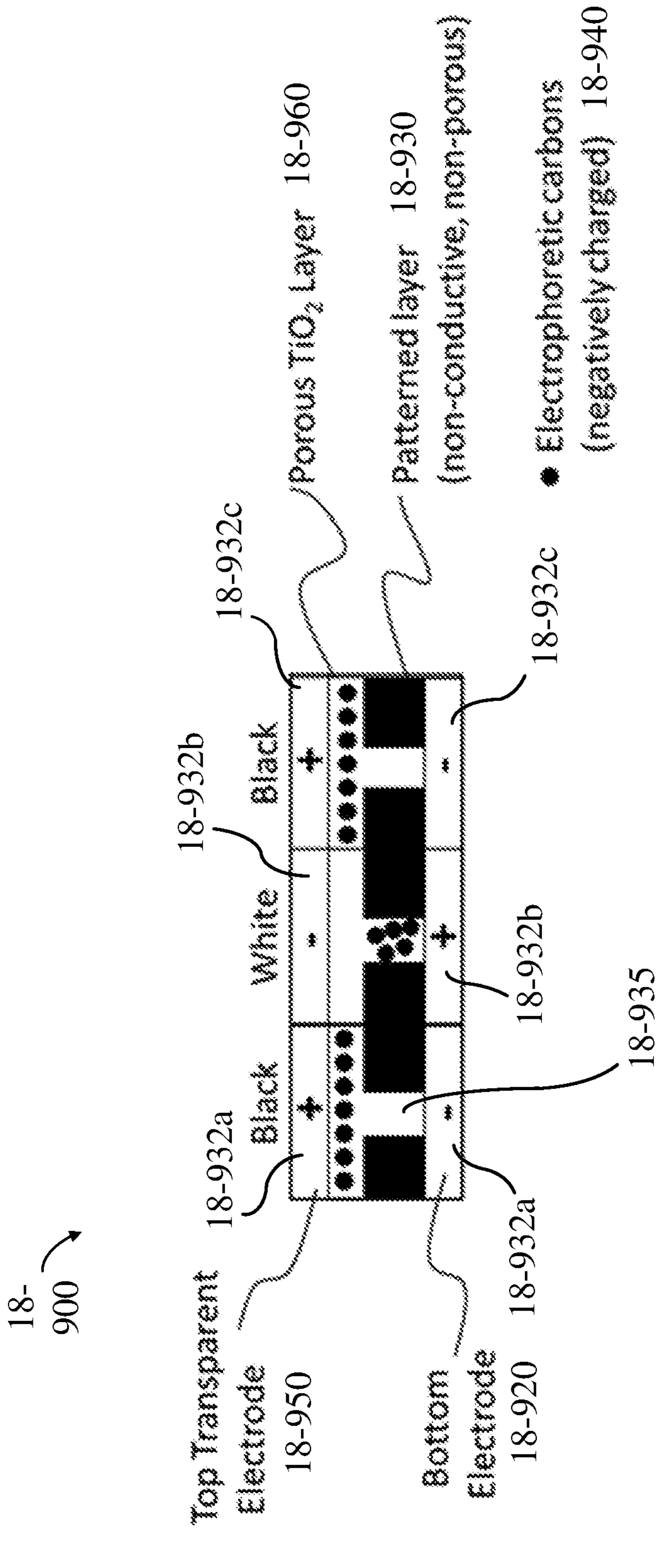
Figures 10, 18:
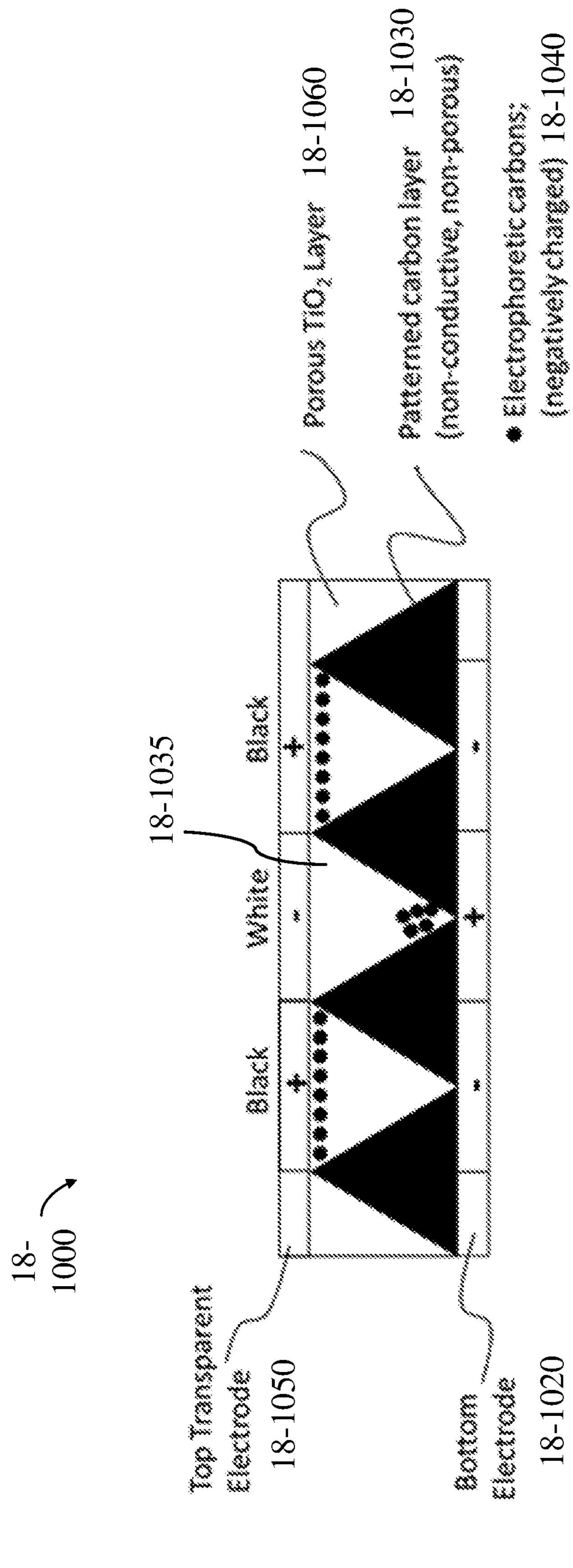
Figures 11, 18:
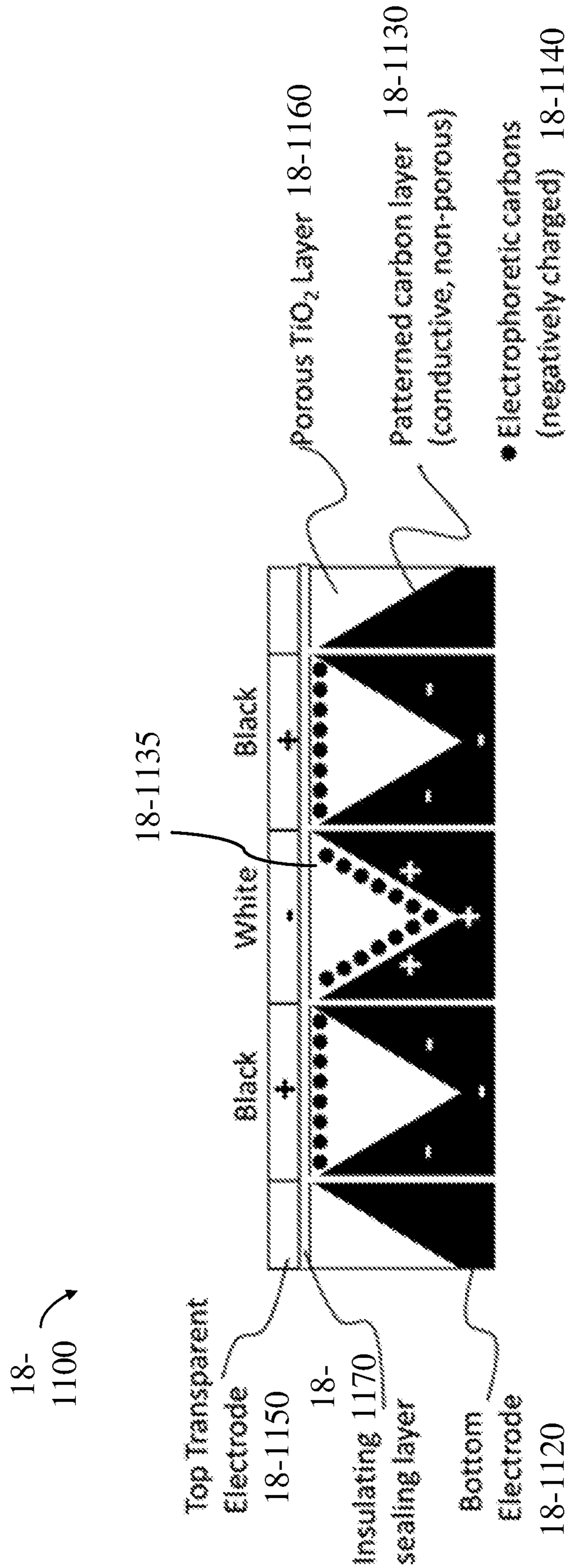
Figures 12, 18:
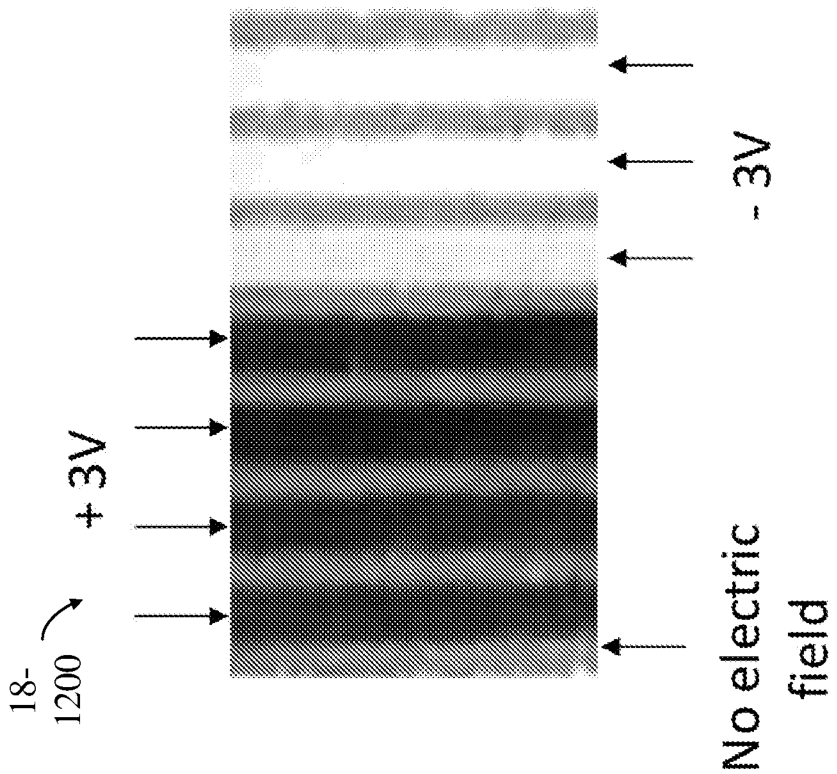
Figures 13, 18:
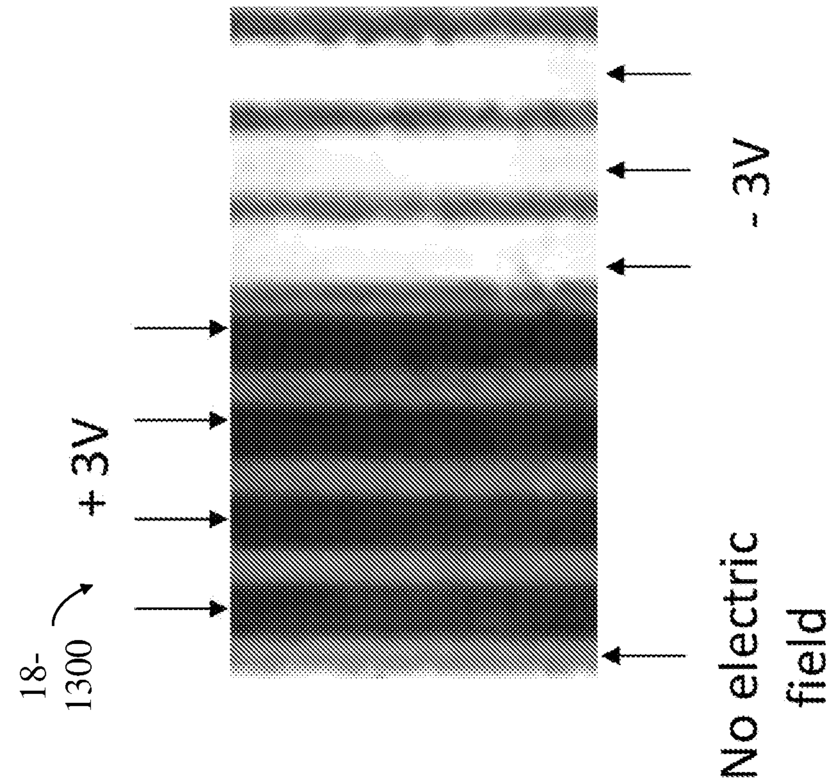
Figures 14, 18:
Figures 15A, 18:
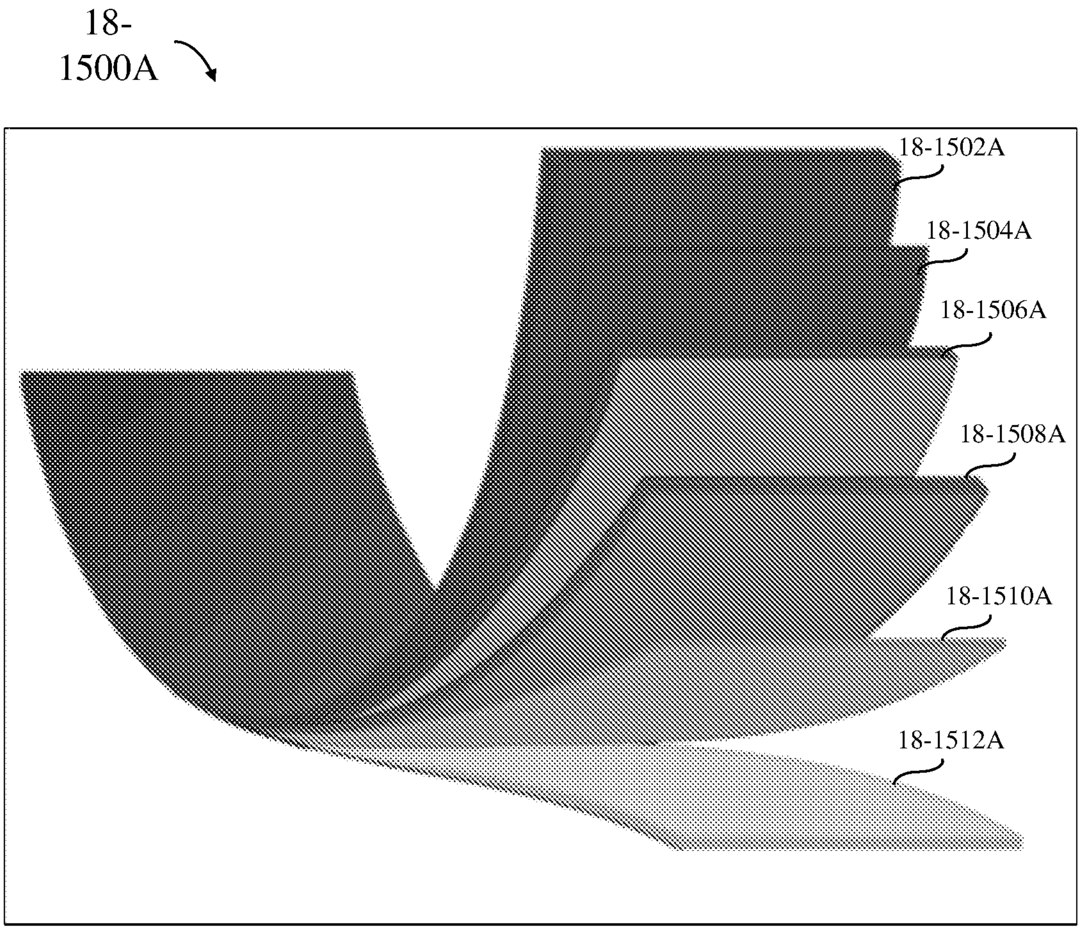
Figures 16A, 18:
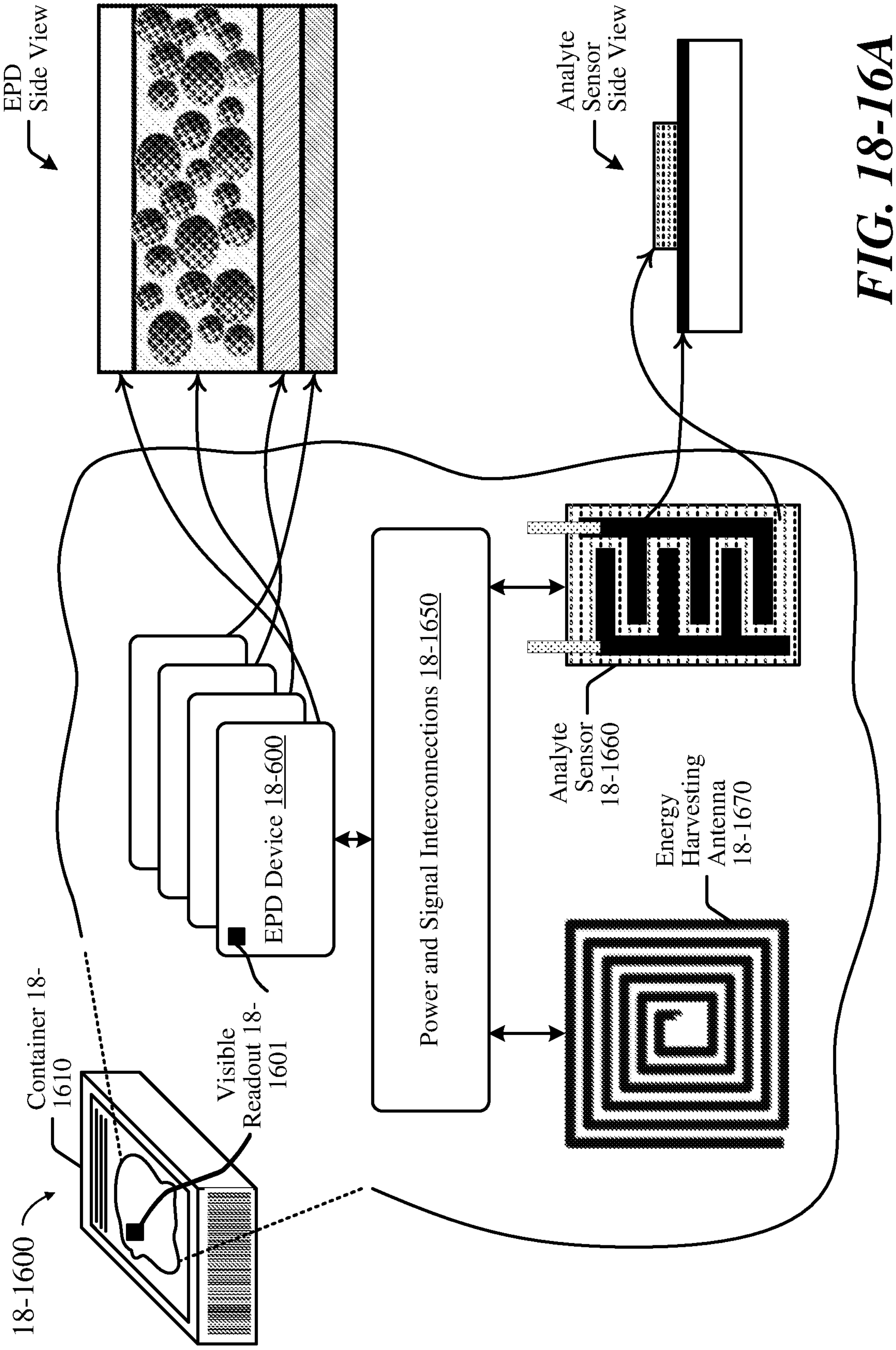
Figures 16B, 18:
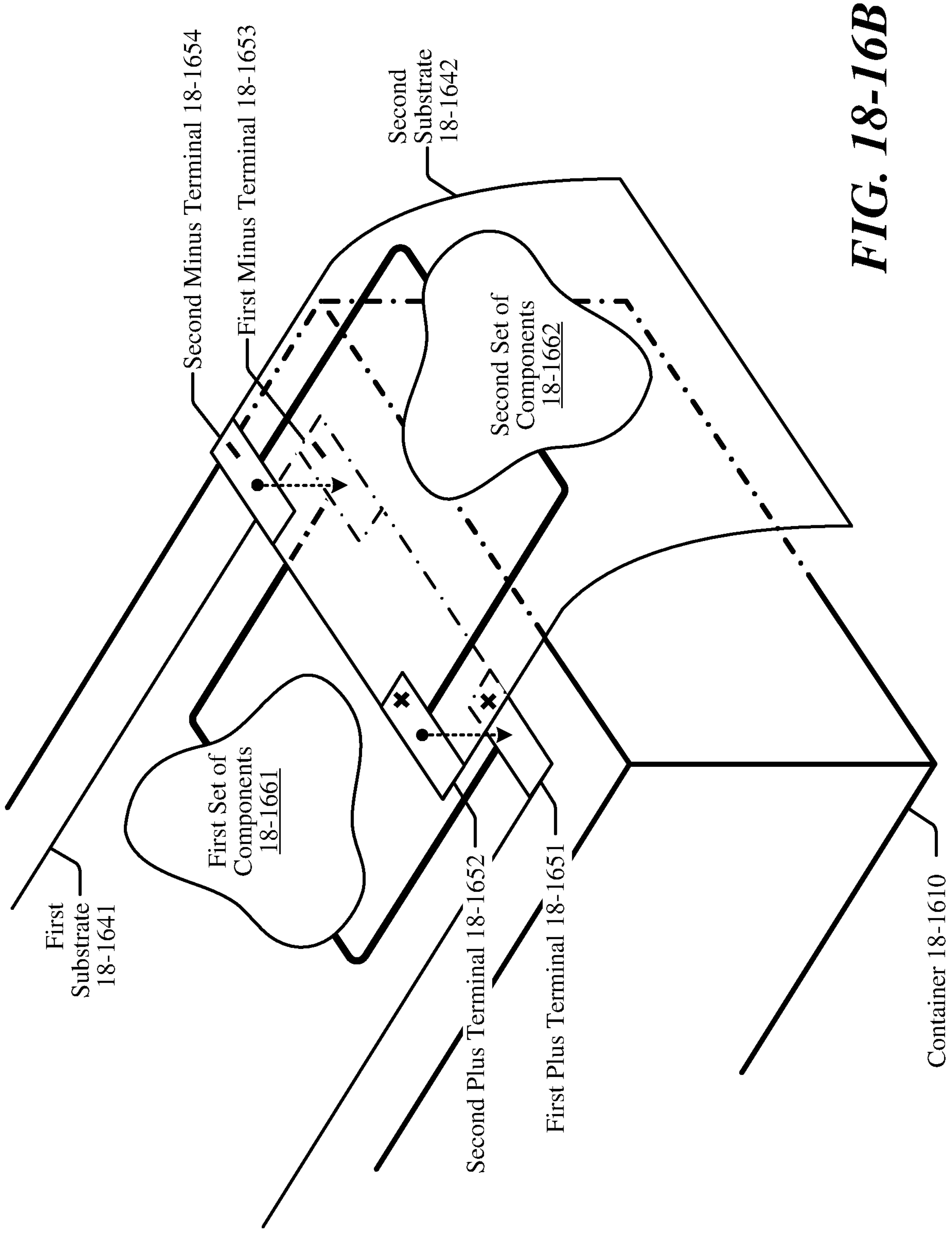

FIG. 21-7B presents a rule execution technique as used in a replenishment system based on electromagnetic state sensing devices, according to an embodiment.

FIG. 21-8 depicts an example protocol as used in a replenishment system based on electromagnetic state sensing devices, according to an embodiment.

FIG. 21-9 depicts system components as arrangements of computing modules that are interconnected so as to implement certain of the herein-disclosed embodiments.

Figures 10C, 21:
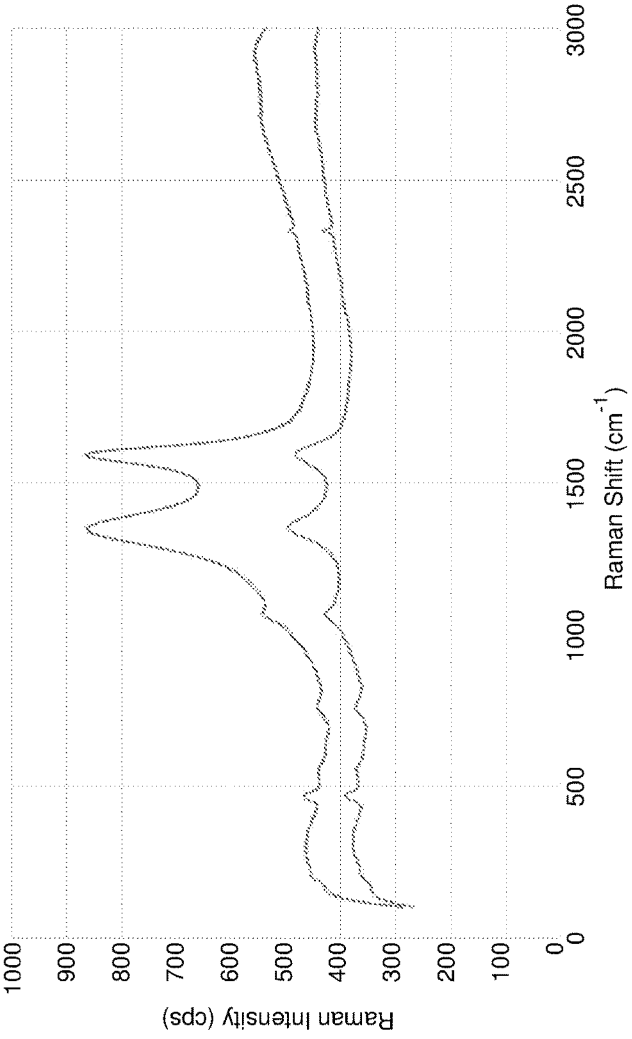
Figures 10D, 21:
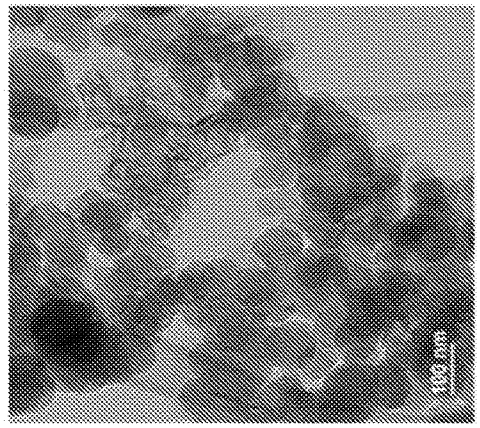
Figures 10E, 21:
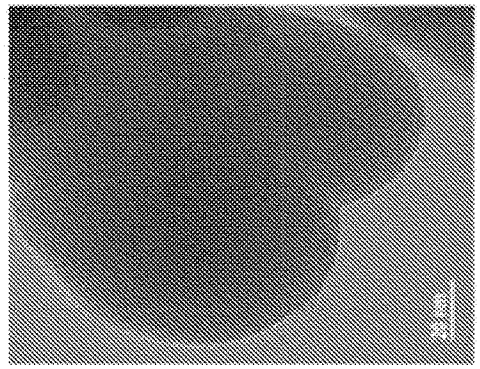
Figures 10F, 21:
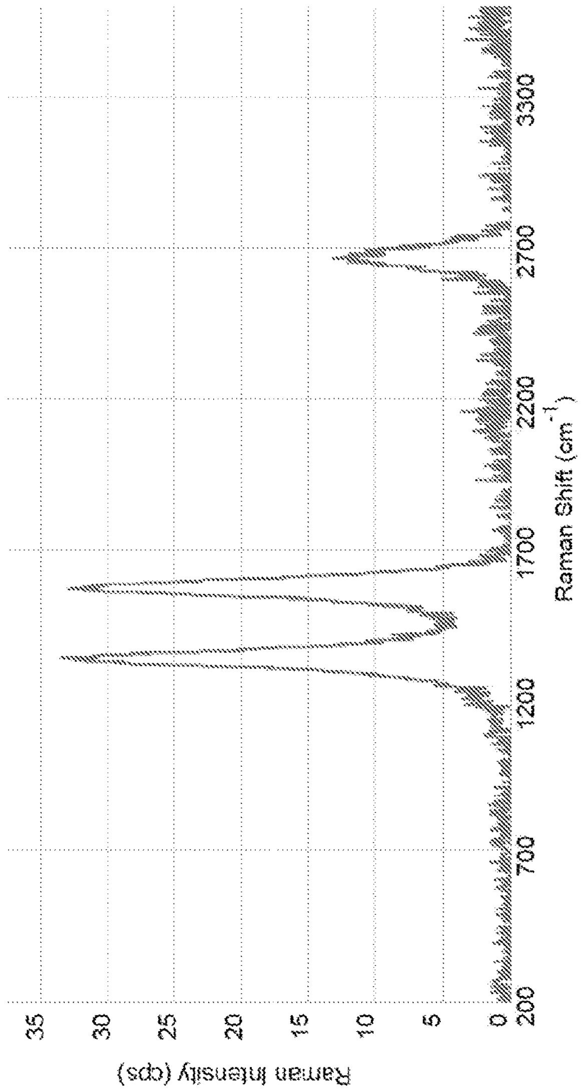
Figures 10G, 21:
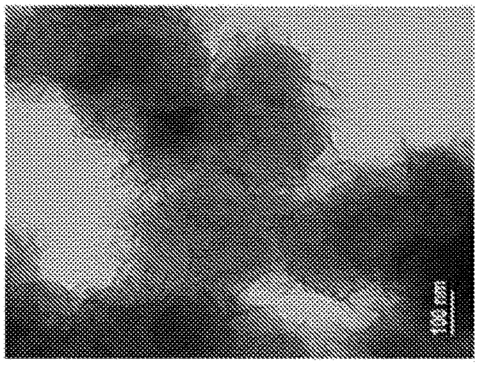
Figures 10H, 21:
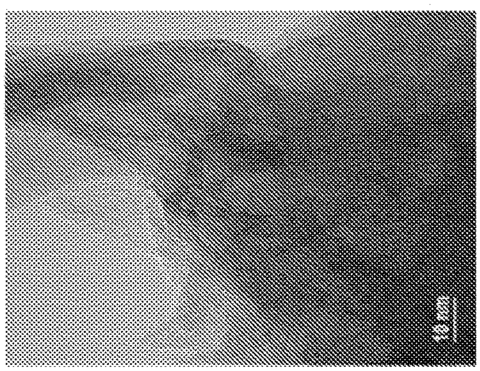
Figures 10I, 21:
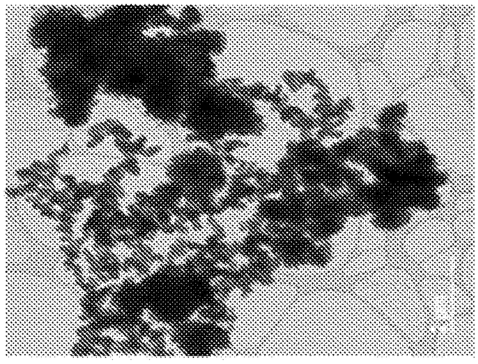
Figures 10J, 21:
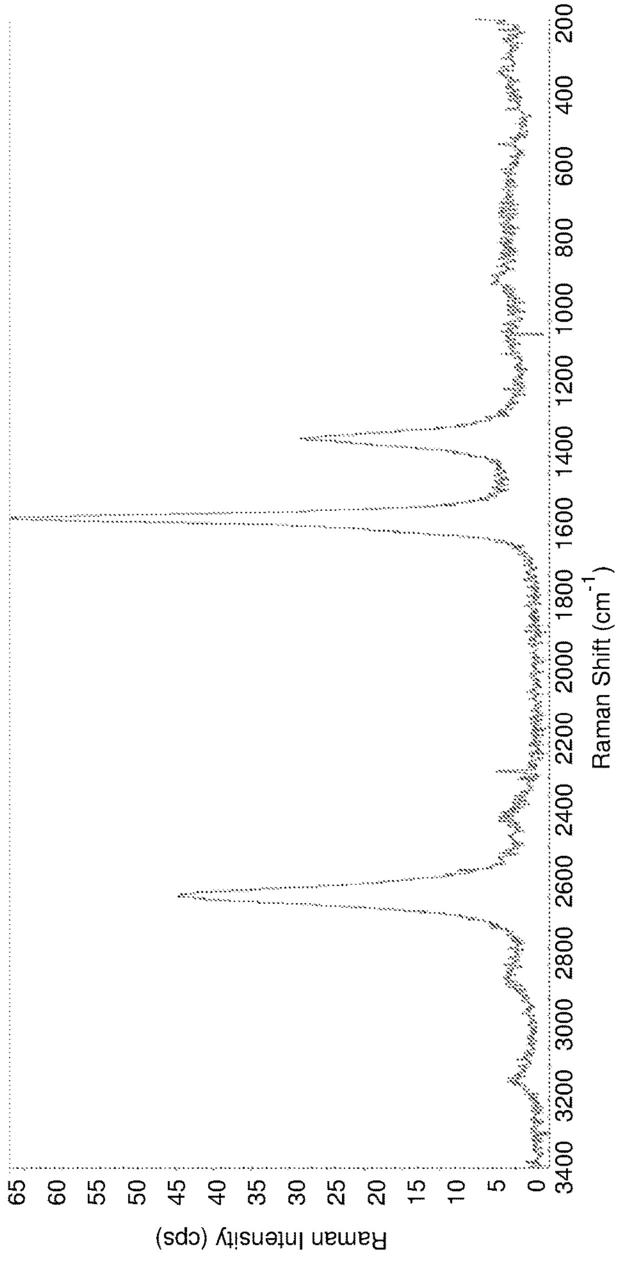
Figures 10K, 21:
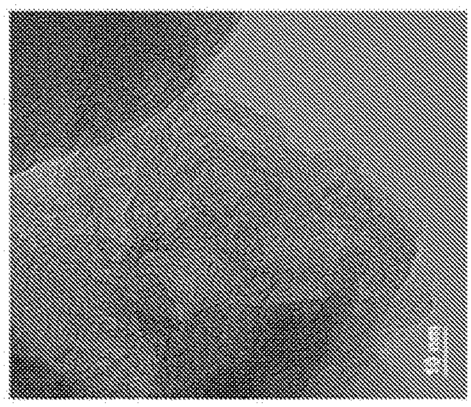
Figures 10L, 21:
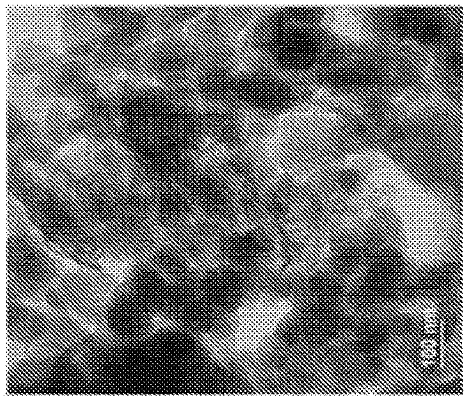
Figures 10M, 21:
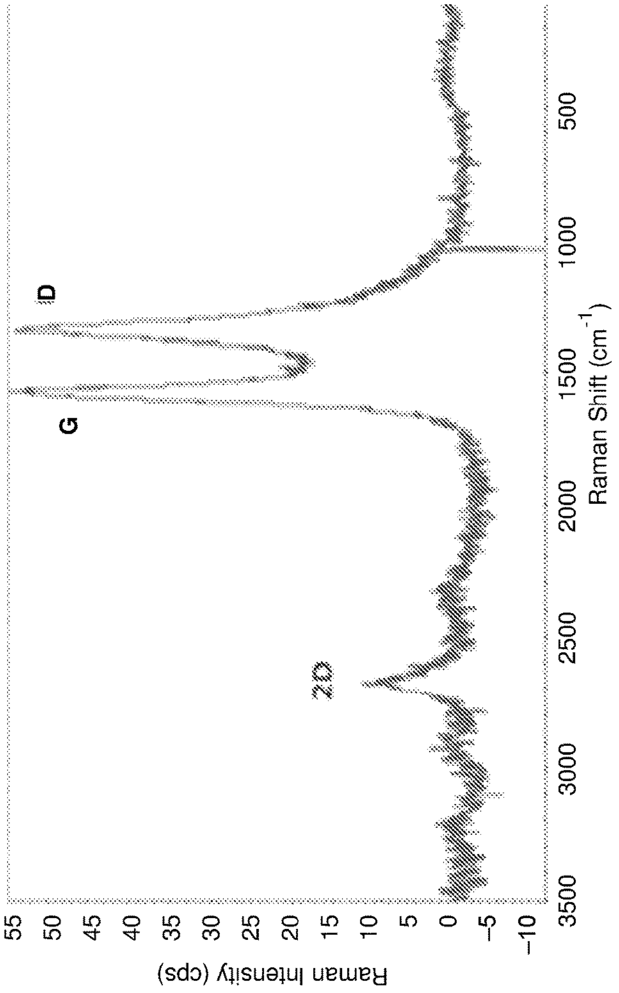
Figures 10N, 21:
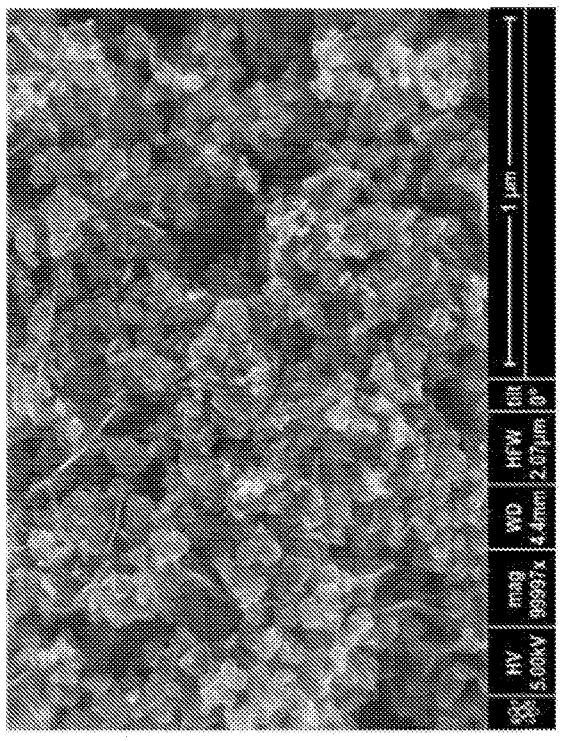
Figures 10O, 21:
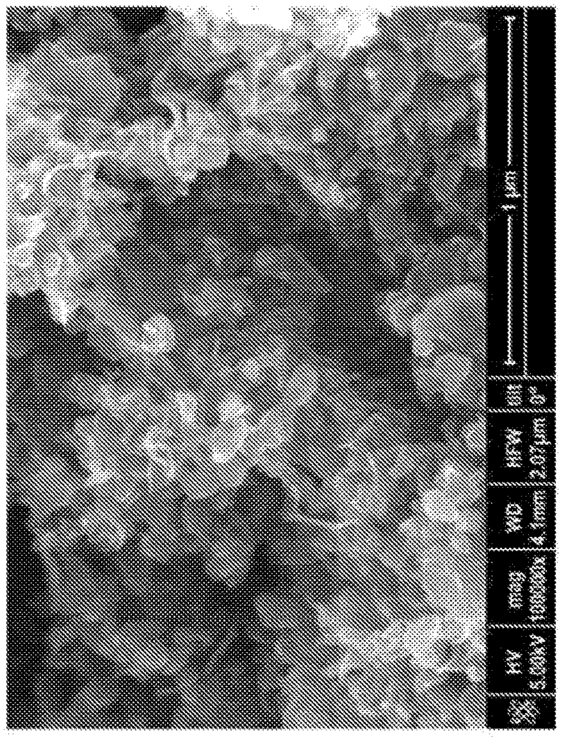
Figures 10P, 21:
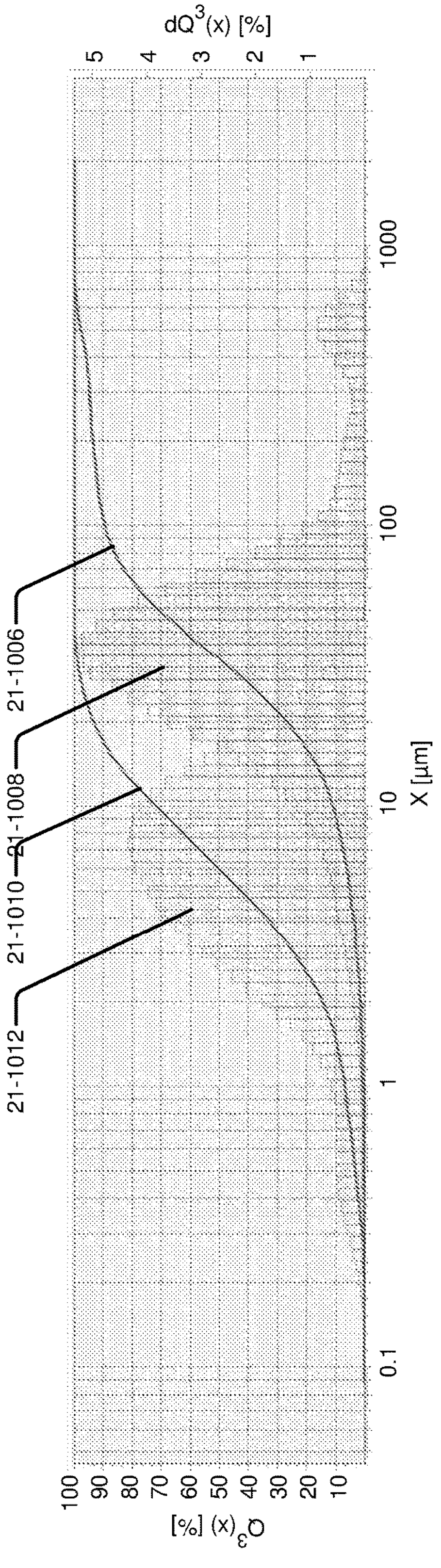
Figures 10Q, 21:
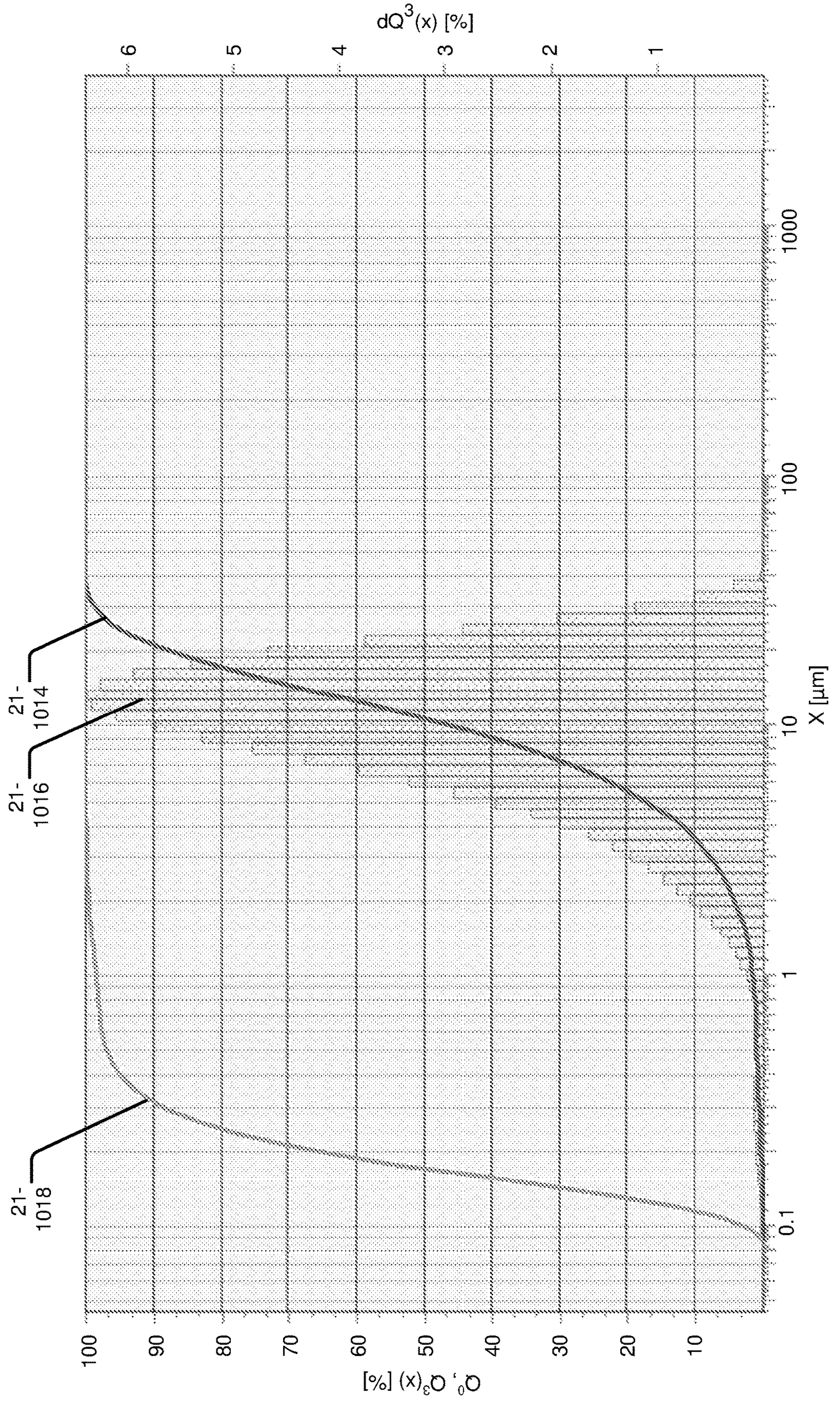
Figures 10R, 21:
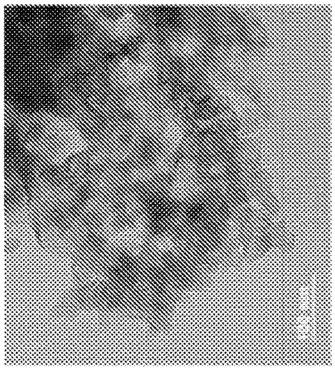
Figures 10S, 21:
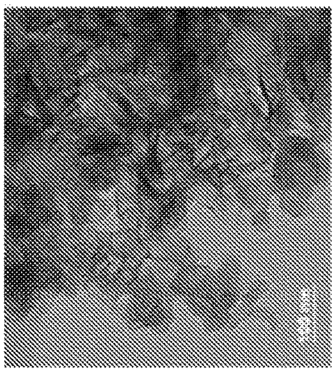
Figures 10T, 21:
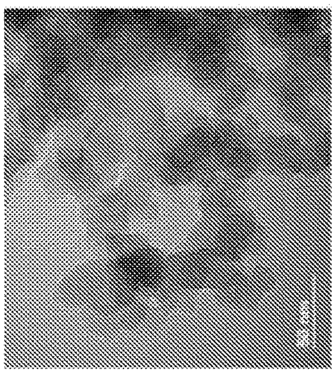
Figures 10U, 21:
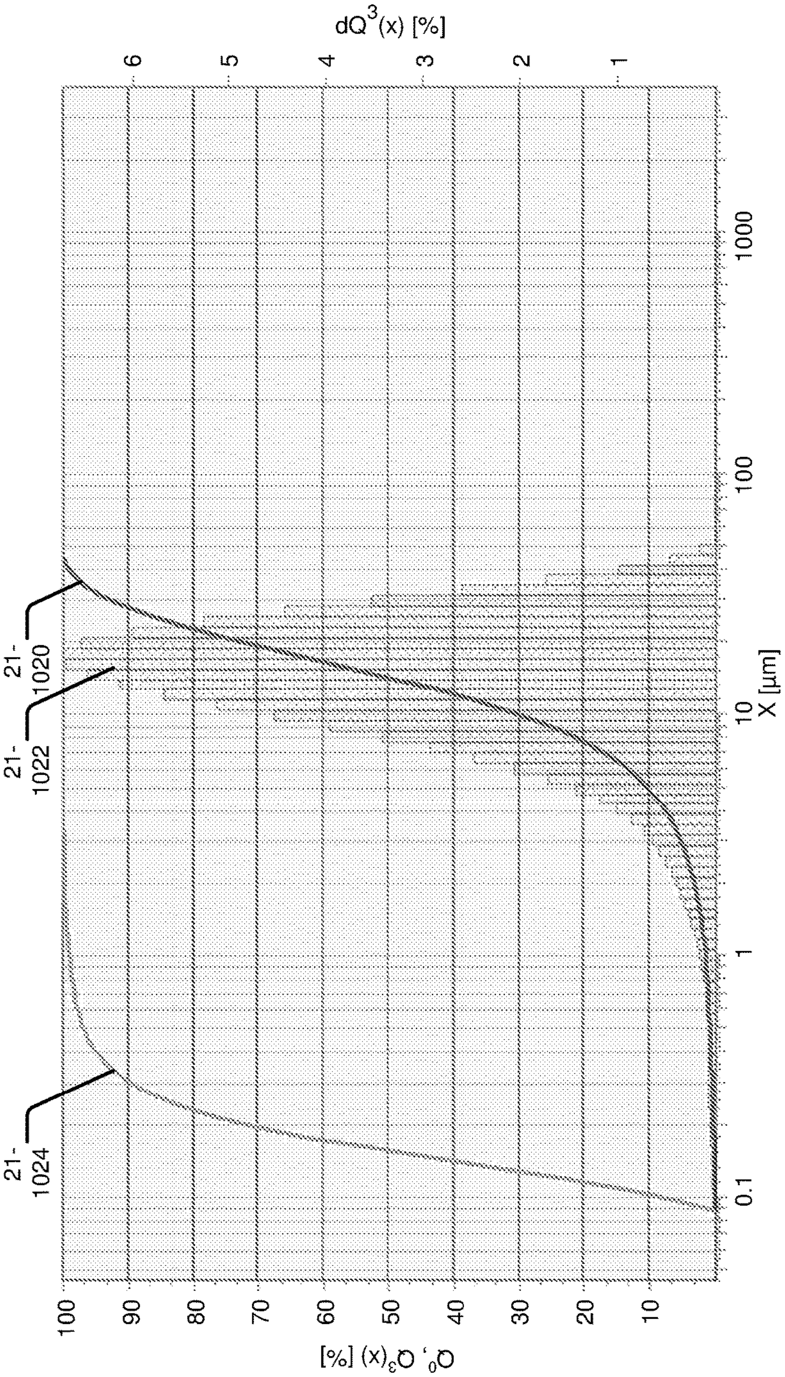
Figures 10V, 21:
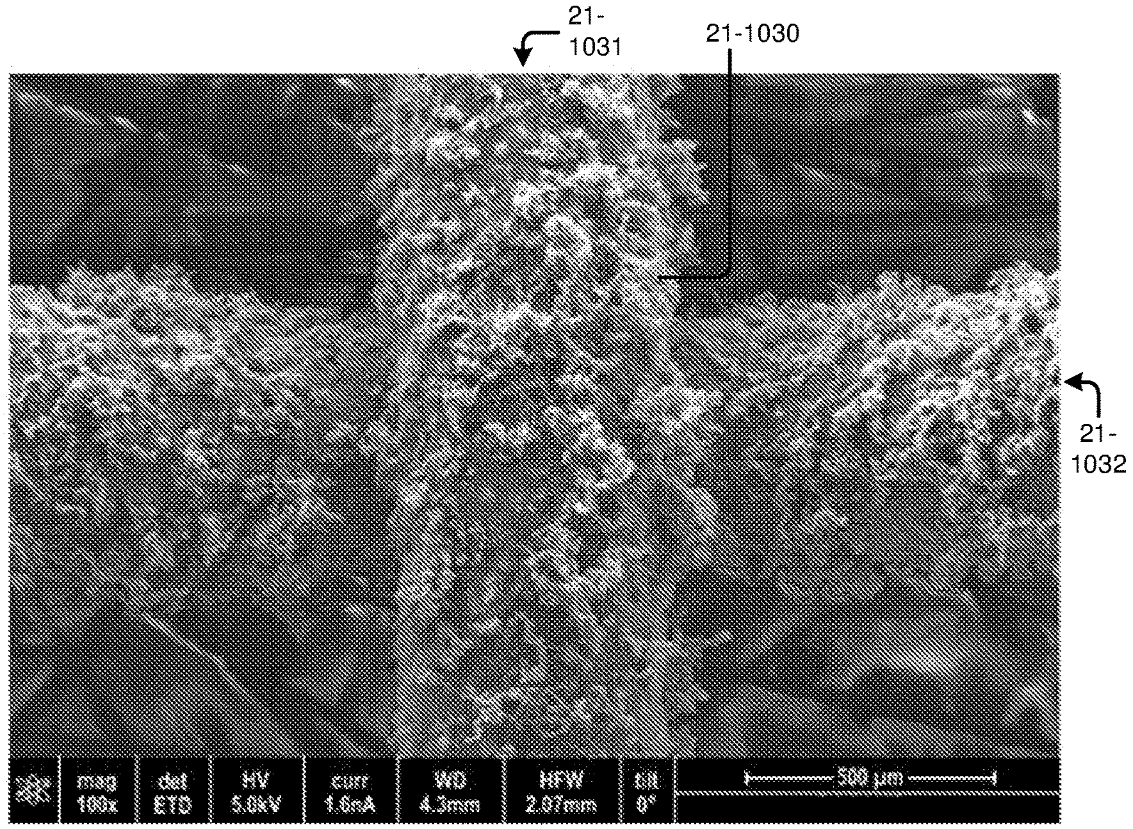
Figures 10W, 21:
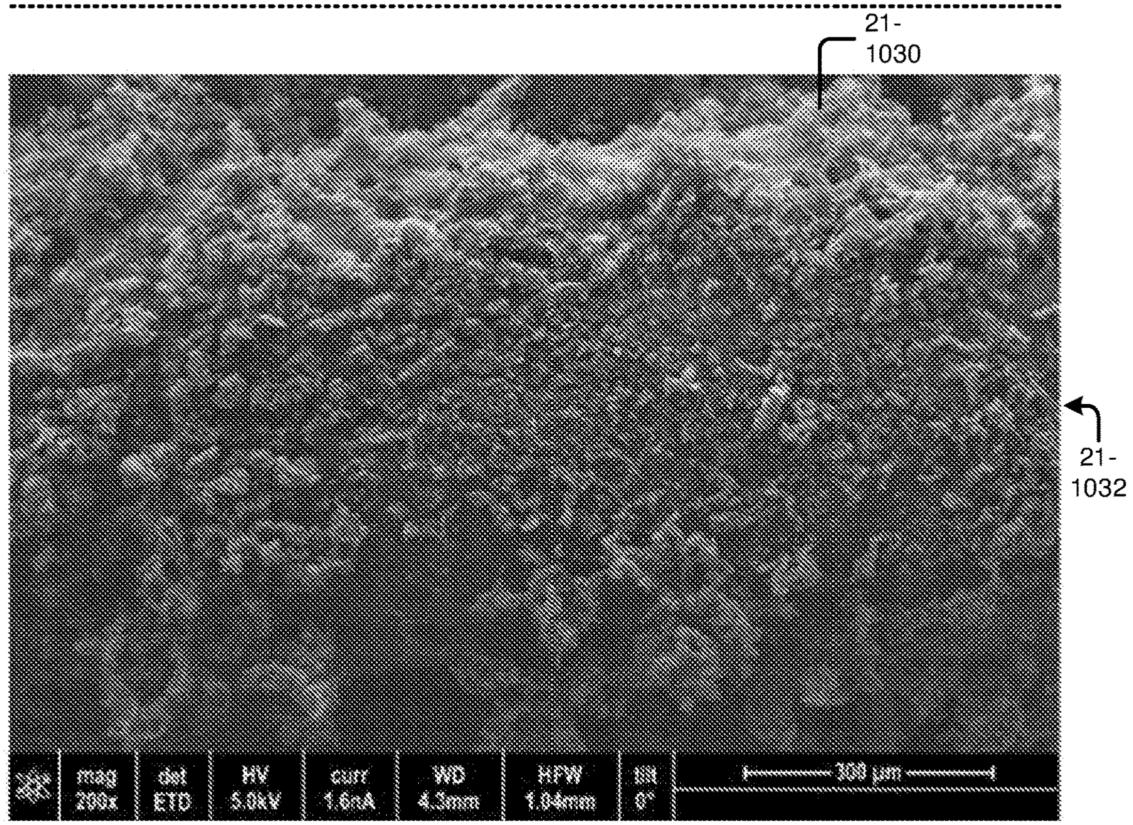
Figures 10X, 21:
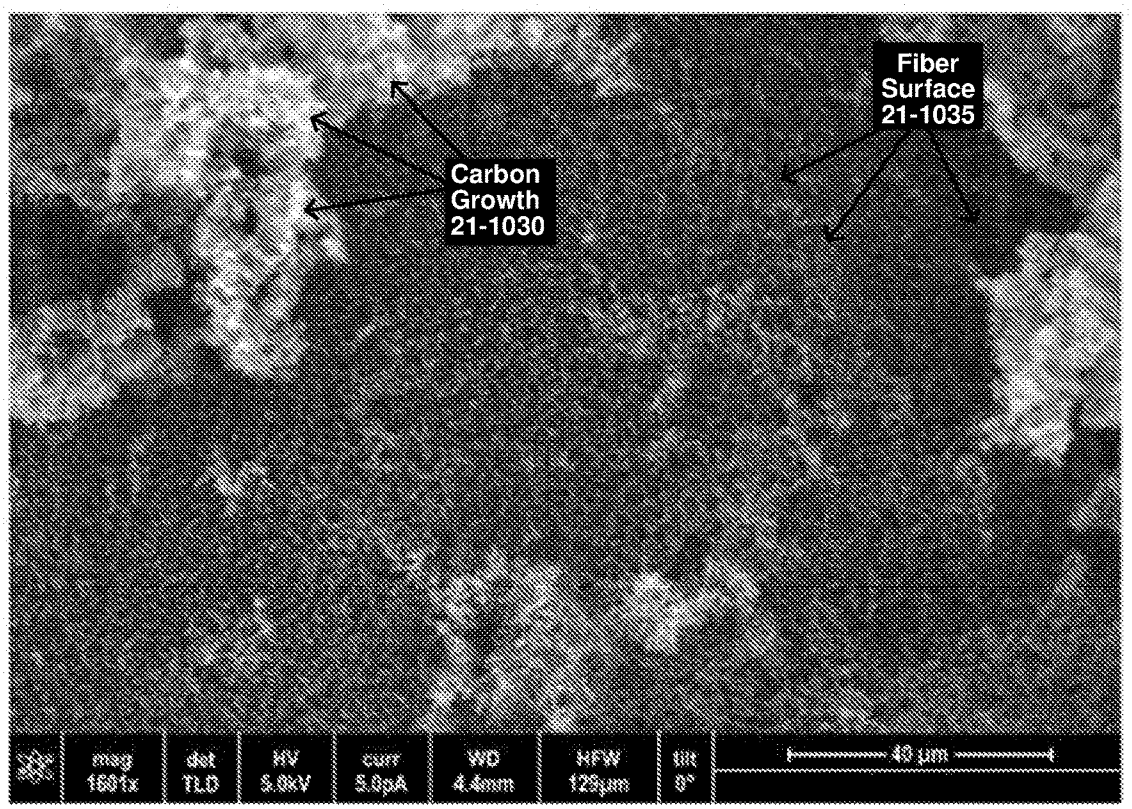
Figures 10Y, 21:
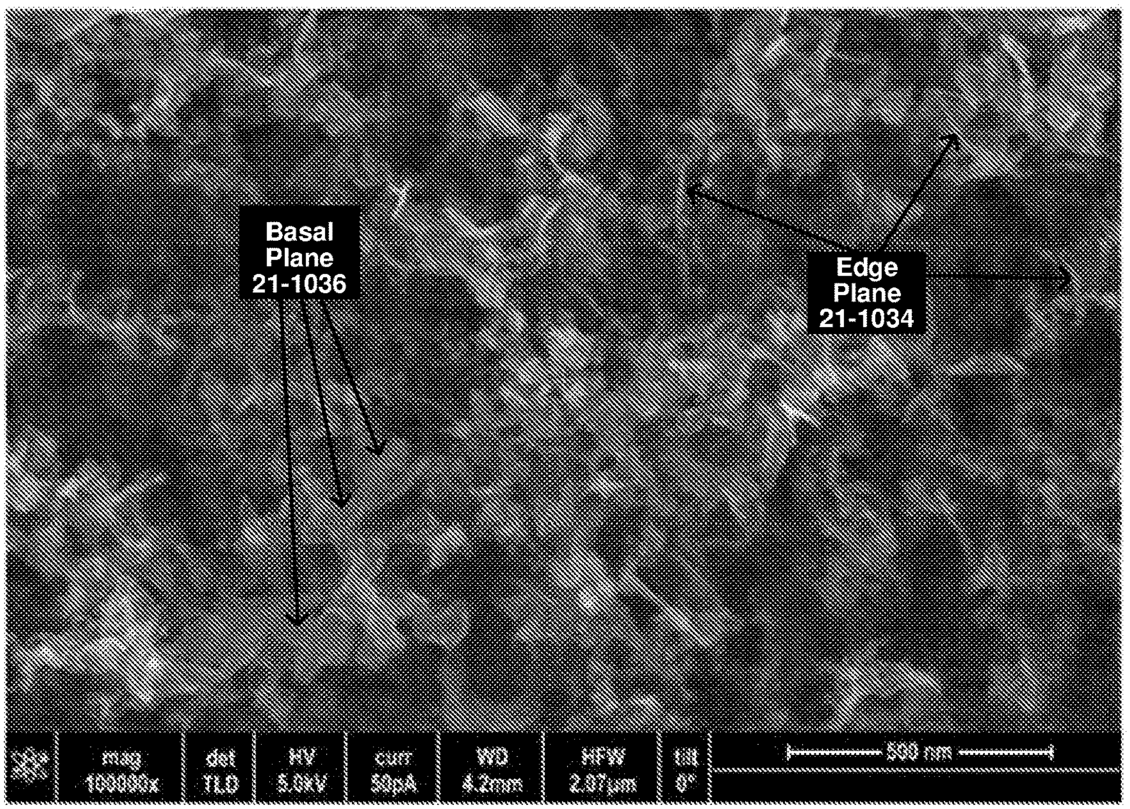
Figures 1, 22:
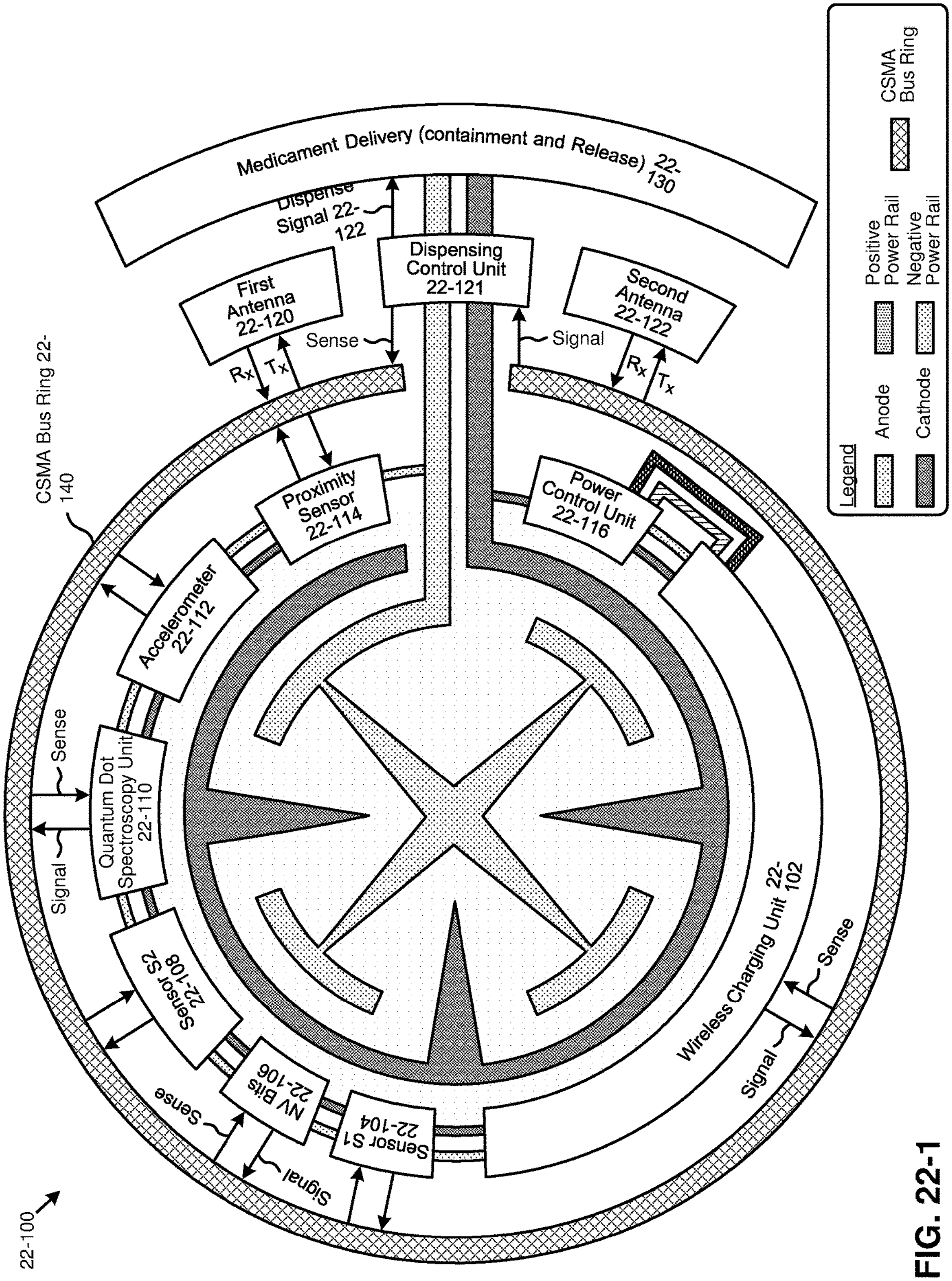
Figures 2, 22:
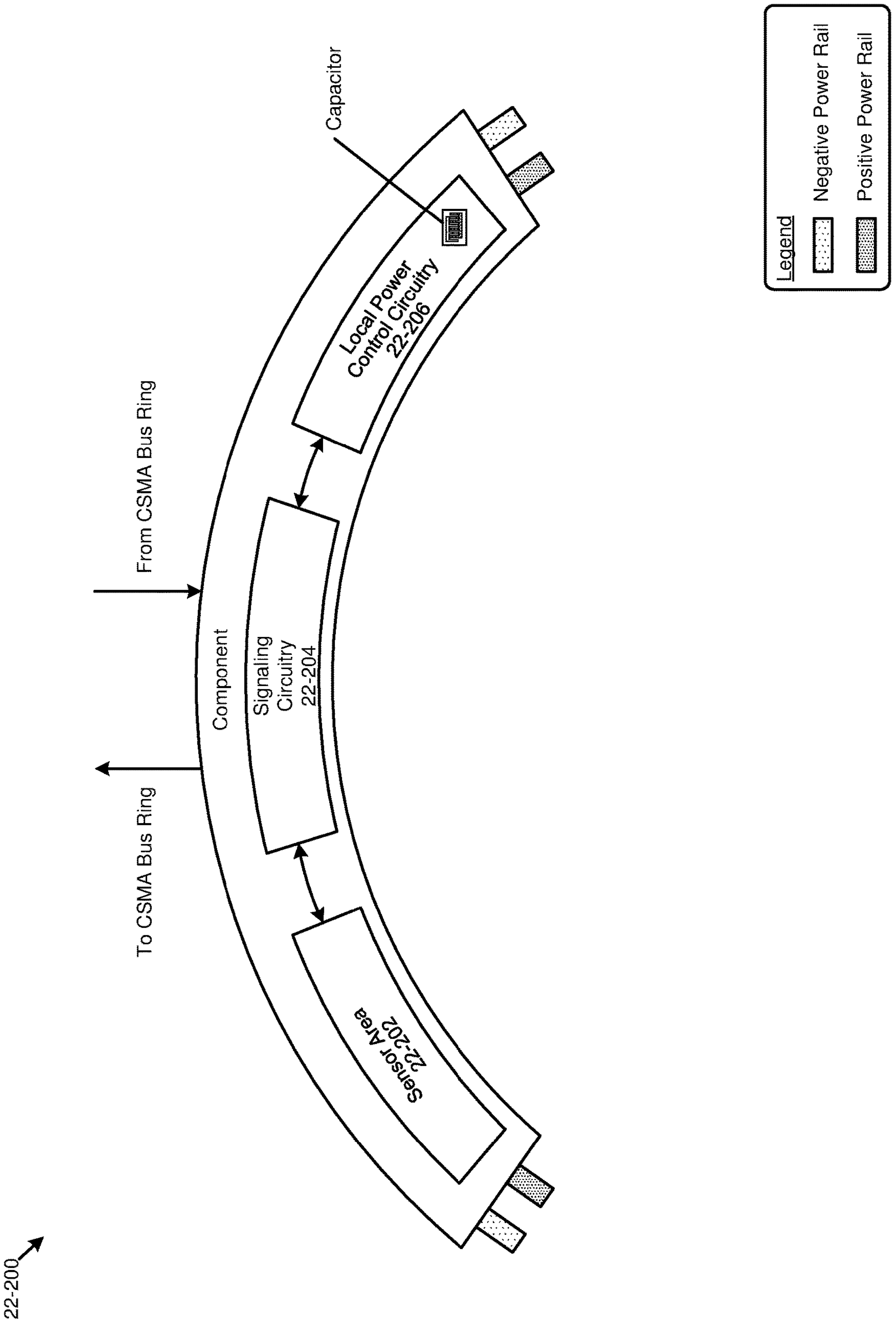

FIG. 21-10A through FIG. 21-10Y depict structured carbons, various carbon nanoparticles, various carbon-based aggregates, and various three-dimensional carbon-containing assemblies that are grown over other materials, according to some embodiments.

Figures 16, 17, 18, 19, 20, 21, 22, 23:
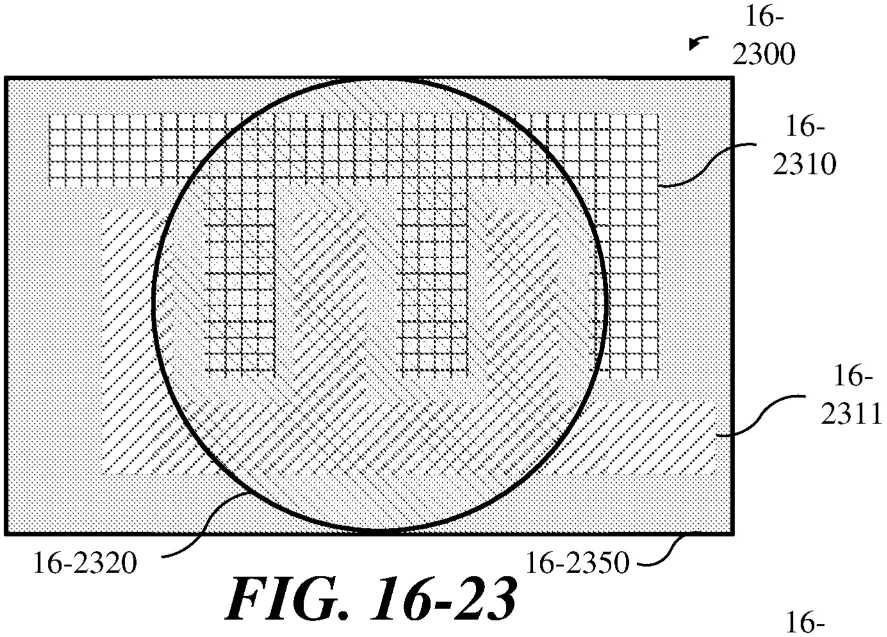

FIG. 22-1 depicts a medical device that uses the heretofore-described printed batteries, in accordance with an embodiment.

FIG. 22-2 depicts one example of a component that is in communication with a CSMA bus ring, in accordance with an embodiment.

DETAILED DESCRIPTION

The current landscape of sensor technology faces several challenges that impede their capability to be easily updated or connected. One significant issue revolves around the lack of standardized protocols for sensor communication, resulting in difficulties integrating sensors with various platforms and systems. Additionally, sensor and sensing systems cannot be modified after deployment, as a sensor is often configured for a specific, static, intended purpose, and the deployment includes fulfillment of that very specific purpose. Connectivity limitations, particularly in older devices and industrial settings, pose barriers to seamless updates. Security concerns also play a pivotal role, with many sensors lacking robust security features, hindering the implementation of remote updates to avoid compromising system security. Additionally, obsolete hardware and the absence of standardized data formats contribute to difficulties in keeping sensor systems up-to-date. Power constraints, especially in remote or battery-powered devices, and regulatory hurdles in sensitive sectors further complicate the ability to update sensors effectively. While efforts are underway to address these challenges through the development of industry standards and improved security practices, the adoption and resolution of these issues vary across different industries and applications.

Unconventionally, and what is presented herein, is the ability to reconfigure sensors after deployment, manage sensors remotely, and create a platform for sensor interconnectivity. Such a configuration would allow for sensors to adopt (or be adapted to) to multiple configurations. Much as a software system can be updated for new applicability and service, the sensors, using the architecture described, can be updated to provide additional, and/or enhanced capabilities.

Additionally, sensing systems disclosed herein may allow for more flexible arrangement, deployment, and architecture. For example, sensors disclosed herein may include sensors deployed as edge devices, sensors integrated with a machine learning system (and/or have parts of an AI processing integrated for use within the sensor) to allow for more customized identification of gases, and semi-state fluids, sensors deployed in vertical and horizontal market distribution channels to track greenhouse gas emissions, sensors capable of identifying digital fingerprints for more accuracy sensing, etc. In short, combining the world of carbon-containing sensors with an architecture to modify, manage, and control such sensors opens an entire new world and wave of sensor connectivity (including sensors deployed for volumetric or spatial parameter sensing capabilities, etc.) and/or data necessary to determine conditions for commercial platforms including the purchase or sale of goods or services, the establishing of sensed boundary conditions, including conditions pertaining to analyte presence (e.g., noxious gasses), and analyte concentration measurements for the purpose of, but not limited to measuring of gases or substances for calculating scope 3 emissions of greenhouse gases in connection with carbon emission compliance and/or for credit issuance.

Within this context of using sensors, an architecture is provided herein to allow for use of sensors-as-a-service. Further, an array of sensors may be combined in a network configuration (such as a mesh configuration, and/or any type of network configuration) whereby updates and responses may be passed from one sensor to the next, which data may be configured for search. It is to be appreciated that sensors, as disclosed herein, may include but not be limited to resonant gas/vapor sensors, analyte sensors, bio-sensors, split ring resonator sensors (SRRs), carbon-based sensors (such as 3D graphene-containing sensors), a combination of one or more types of sensors, etc.

Further, the present disclosure provides solutions that can operate in real, near real time, or asynchronously, using smart edge hubs (such as cellular smart phones configured with various wireless protocols 4G, 5G, other; or local wireless protocols such as wi-fi, Bluetooth, BLE, and/or others), which in part may be physically or virtually partitioned (such as by a virtual machine) to act simultaneously (or in conjunction with other functions resident on hub device) as nodes associated with a computing infrastructure. Such a configuration may allow for function with local applications relevant to deploy existing or downloadable to new application content. For example, the new application content may include AI function, local processing function, searchable content, telephony function, and/or revenue services function. Further, the new application content may relate its subscribers to any number of applications sold as a service in connection with the sensors or other ultra edge devices providing asynchronous, near real time, or real time data. Additionally, the subscriber may be a fee-based agent or a non-fee based authorized agent of the infrastructure or service providers to accurately acquire such data (such as originating from the one or more sensors).

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments-they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

DESCRIPTIONS OF EXEMPLARY EMBODIMENTS

Figure 1A:
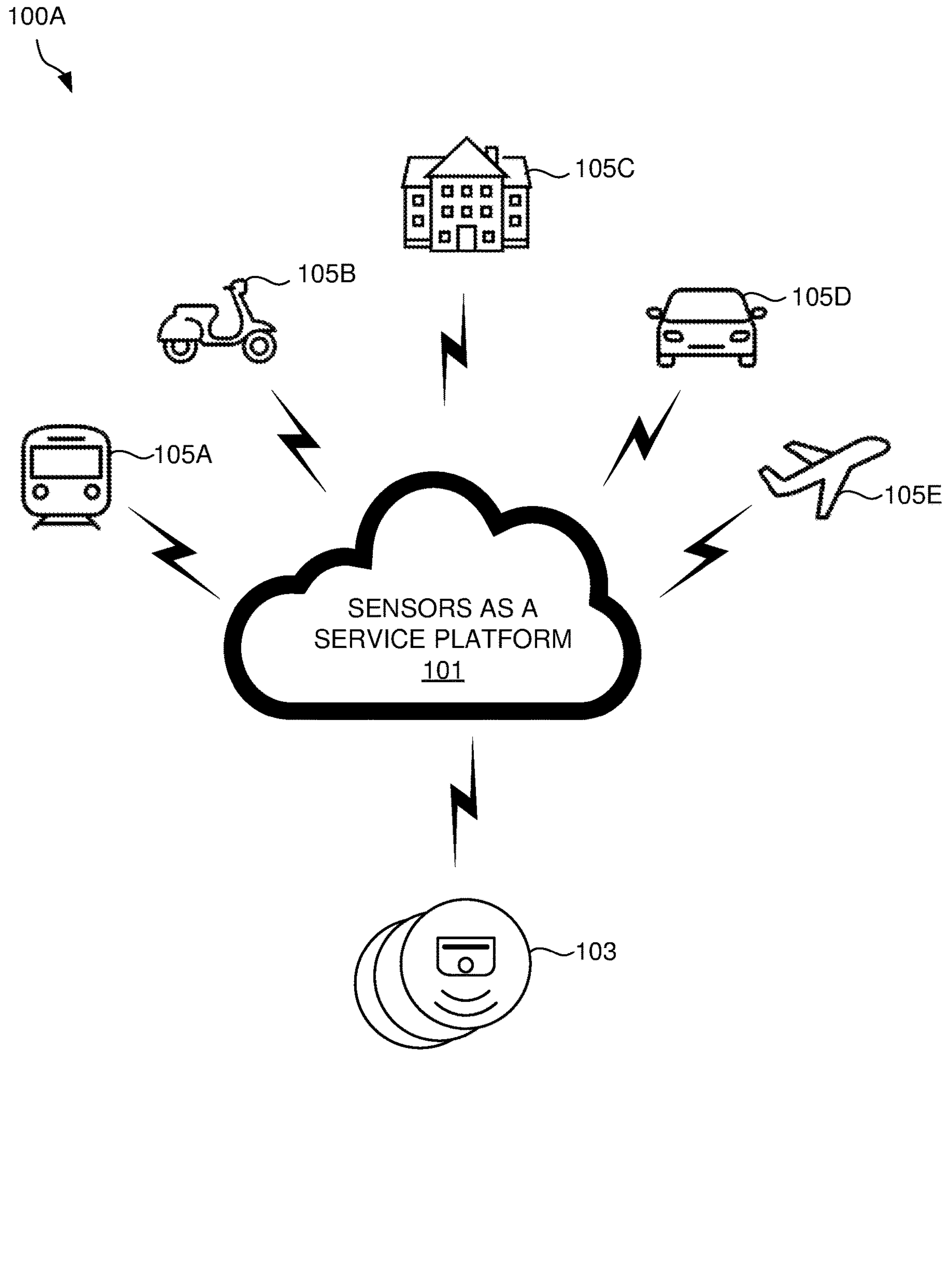
FIG. 1A illustrates a sensors-as-a-service platform, in accordance with one embodiment.

FIG. 1A illustrates a sensors-as-a-service platform 100A, in accordance with one embodiment. As an option, the platform 100A may be implemented in the context of any one or more of the embodiments set forth in any previous and/or subsequent figure(s) and/or description thereof. Of course, however, the platform 100A may be implemented in the context of any desired environment. Further, the aforementioned definitions may equally apply to the description below.

As shown, the platform 100A includes a sensors-as-a-service platform 101, sensors 103, and/or various items 105, including a train 105A, a motorcycle 105B, a structure 105C, a car 105D, and/or a plane 105E. Within the context of the present description, the sensors as a sensors as a sensors-as-a-service platform 101 includes a cloud-based solution that provides access to the sensors 103. Such sensors 103 can be found at various locations of the items 105. Additionally, the sensors 103 may include any device that can detect and/or measure physical properties (e.g., temperature, humidity, pressure, light, motion, etc.), chemical properties (chemical composition, chemical stability, radioactivity, pH level, gas concentration, etc.), environmental conditions (UV radiation, light intensity, wind speed, etc.), motion (e.g., acceleration, velocity, etc.), biometric conditions (heart rate, blood pressure, oxygen levels, etc.), etc. It is to be appreciated that sensors can come in many forms. Within the context of the present description, sensors may include analyte sensors (i.e., sensors configured to sense analytes), split ring resonator sensors (i.e., metamaterial structure configured to sense changes in the surrounding electromagnetic field, etc.), biometric sensors (sensors configured to detect biological characteristics, etc.), and/or any other type of sensor which may sense, in some manner, properties, conditions, or changes of a surrounding environment and/or object. Further, the sensors may include edge and/or ultra edge devices (although edge and/or ultra edges devices are not limited in functions to sensors). Additionally, the split ring resonator may include any material and/or device configured to resonate. For example, the split ring resonator may have a natural resonance frequency which may shift in response to a change in property of the sensor and/or the material with which the sensor is found. Further, the split ring resonators may include a metamaterial configured to resonate electromagnetic responses at specific preconfigured frequencies.

Further, such sensors are detailed hereinbelow, and may be used in any manner within the environment of a sensors-as-a-service platform 100A. For example, the sensors 103 may be found at or in a first location. For example, the train 105A, the motorcycle 105B, the car 105D, and/or the plane 105E may each have sensors on the vehicle which may be used to detect environmental conditions outside of the vehicle (e.g., air speed, humidity, point of friction, water droplet accumulation, approaching object, etc.). Additionally, such vehicles may also have sensors on the vehicle which may be used to detect environmental conditions inside of the vehicle (e.g., occupancy capacity, alertness of driver, lowering blood sugar or pulse rate, presence of illegal drugs, etc.). As such, the sensors 103 may be used to detect any condition inside or outside of a vehicle. Further, the sensors 103 may be affixed to the structure 105C and may be used to detect conditions inside or outside of the structure 105C as well.

The sensors as a sensors-as-a-service platform 101 may be used in various configurations to remotely deploy, manage, and access data from sensors without the need for extensive infrastructure for the sensors. For example, a user may purchase a first sensor of the sensors 103 to detect carbon monoxide within their home. After a time, the user may decide to update the first sensor (via a software update) to allow it to detect other gases (such as radon, natural gas, etc.). As such, the first sensor may be unlocked for additional features and detectability capabilities which are unlocked and/or controlled via the sensors-as-a-service platform 101. Further, such capabilities may be accomplished through a daughter card (and/or another type of SIM-like card, etc.) upgrade/channel expansion.

In various embodiments, the sensors-as-a-service platform 101 may include a cloud-based infrastructure. Such an infrastructure may be hosted in the cloud (may extend to multi-cloud/multi-service configurations), allowing users to access sensor data from anywhere with an Internet connection. Further, such an infrastructure may allow for management of any number of sensors (e.g., an array of sensors, fleet management, etc.), upgrade of features (e.g., software updates, capability unlocked updates, etc.), etc.

In various embodiments, the sensors-as-a-service platform 101 may allow for subscription services. For example, various tiers may be connected to usage of the sensors, and each tier may correspond with a predetermined amount of data, or services, or capabilities associated with the sensors. Further, subscriptions of the sensors may be based on a data usage, data amount allocation (in terms of data size), time period, volume of bits/bytes, quality of service, etc. With respect to management of a fleet of rental vehicles, a first tier may include sensors configured to detect red flags of usage, such as detection of smoking in a non-smoking vehicle, driving while intoxicated, and the detected red flag may simply be reported in a binary sense (yes or no regarding whether a red flag was detected, etc.). A second tier may provide more granular data including data of the concentration of analytes that were detected, and at what position within the vehicle they were detected. A third tier may provide even more granular data including a time domain view of the detected analyte, a 3D mapping of the analyte, a redundancy confidence score, etc. In this manner, each tier may be associated with enhanced data and/or capabilities and/or reports. In one embodiment, results also may be locally displayed (such as via electrophoretic display).

A subscription services model may allow users to subscribe to a service (associated with the sensors 103) and pay based on usage, specific features, data reported, etc. Further, using the sensors-as-a-service platform 101, users can deploy, configure, and manage sensors remotely. In various embodiments, the sensors 103 may be connected to the sensors-as-a-service platform 101 at the location where the sensors 103 are installed. Thus, a sensor located within the tire of a car (used to detect tire usage) may be connected to a network associated with the vehicle (and/or a user of a vehicle) which in turn may provide access for the sensors to be connected to the sensors-as-a-service platform 101. In various embodiments, therefore, the sensors 103 may be connected to the sensors-as-a-service platform 101 in real time in a synchronous manner. However, it is envisioned that, in other embodiments, the sensors 103 may be connected to the sensors-as-a-service platform 101 in an asynchronous manner where updates and a connection back to the sensors-as-a-service platform 101 may occur in time intervals (where intervals exist between connection without access to the sensors-as-a-service platform 101). Optionally, the subscription service model may also embody the sale or barter of permissioned information derived from the search of such node or edge device domains for the purpose of targeted advertising, follow on sale of alternative product, replenishment, compliance, other high value function(s), etc. For example, a user may grant permission (such as via an EULA agreement of a software application) to use the sensors, and in response to such granted permission, information derived from the sensors may be provided back to the user, a sensors-as-a-service operator (architecture and/or vehicle and/or device that includes the sensors), as well as to a permissioned third party (for purposes of advertisements, personalization, etc.). In this manner, permissioned information derived from the sensors may be bartered to other non-user entities.

It is to also be appreciated that the sensors 103 may be connected to each other (such as in a mesh configuration, wherein the mesh configuration may also be terrestrially based or extraterrestrial). In this manner, the motorcycle 105B may be located in the structure 105C, and the sensors 103 of the motorcycle 105B may connect directly to the sensors-as-a-service platform 101 (via a Wi-Fi, Bluetooth, BLE, LORA Wan, and/or other low power signal protocol signal associated with the various items 105), may connect to one or more other sensors 103 of the structure 105C, and/or may connect to one or more other sensors 103 located outside of the structure (e.g., a passing car, a light pole, a smart meter, a drone, etc.).

In various embodiments, the sensors-as-a-service platform 101 may include tools for analyzing and visualizing sensor data (i.e., data analytics), helping users make sense of the information collected by the sensors. For example, a sensor may be located within a child's helmet. Data analytics may be gathered from the helmet such that the user may be able to determine and visualize the severity of a force a child endured in a bike accident. As discussed herein, data analytics may also be a function of a subscription service, where greater data analytics may be a function of the price paid to obtain such data.

Further, the sensors-as-a-service platform 101 may allow for greater use of the sensors 103. For example, a user may determine that a sensor has "grown old" and is no longer as effective as the latest and greatest sensor. In such a situation, the user may decide to throw out the old sensor and purchase a new sensor. In many instances, however, a software update to the old sensor may allow it to function as accurate and good as an up-to-date sensor. Thus, having the sensors-as-a-service platform 101 may allow for greater and longer use of sensors that would otherwise have been discarded.

The sensors-as-a-service platform 101 may include APIs (Application Programming Interfaces) for integrating sensor data with other applications, services, or business processes. For example, the sensors may be integrated with a security system such that the sensors 103 may be configured for a common communication protocol, predesignated API endpoints, authentication and authorization requirements, etc.

As such, APIs may be provided based on a context of use (e.g., security API, vehicle type API, clean room detection API, hospital API, etc.).

As can now be seen, any one or more of the constituent wireless nodes of an instance of the foregoing ephemeral computing cluster can be configured as a wireless handheld server, either by itself, or in combination with other constituent wireless nodes. More specifically, in some cases a spontaneously-formed ephemeral cluster can formed of a single wireless handheld edge device (e.g., into a single node cluster), which in turn can be configured to act as a wireless handheld server (e.g., a wireless query server, a wireless data server, a wireless sensor update server, etc.). Further, in some cases a spontaneously-formed ephemeral cluster can formed of a plurality of wireless handheld edge devices, any or all of which handheld edge devices can in turn be configured to cooperate as a wireless handheld server (e.g., a multi-node wireless query server, a multi-node wireless data server, a multi-node wireless sensor update server, etc.). In some embodiments, a wireless cluster, whether configured to operate in a single node cluster topology or whether configured to operate in a multi-node cluster topology can be spontaneously formed by virtue of execution of one or more virtual machines that are hosted on respective wireless nodes. As can be appreciated, the use of virtual machines and/or the use of executable containers (ECs), relieves the deployer of having to tailor downloadable modules to comport with any particular operating system. As such, a swarm of downloads to a plurality of wireless handheld edge devices can be constituted using multiple copies of a single downloadable module. Upon execution of the download by one or more of the wireless handheld edge devices, and upon carrying out a spontaneous cluster formation protocol, a wireless ephemeral computing cluster can be formed.

In various embodiments, a system may be configured to function as a wireless handheld server. For example, the system may include at least one edge device configured as a server node in an ephemeral cluster. As an additional example, the system may include more than one edge device, where each edge device instance is configured to cooperate with other edge devices to implement functions of a wireless server as situated in an ephemeral cluster. Additionally, the system may include network connectivity for connecting the at least one edge device to a network. In one embodiment, the network connectivity may allow for connection to a sensors-as-a-service platform. Thus, the system may include at least one edge device configured as an ephemeral cluster, and a sensors-as-a-service platform in communication with the ephemeral cluster. In other embodiments, the edge device may include one or more virtual machines, and the one or more virtual machines may be included in the ephemeral cluster. Additionally, the computing elements (devices, virtual machines, etc.) included in the ephemeral cluster may share a common storage facility and/or may organize physically separate memory instances (e.g., the memory footprints of physically separate edge devices) into a contiguous address space that is shared by and between the computing elements. The formation of the foregoing contiguous address space can be formed from any combination of physical address spaces, or virtual address spaces. As merely one example, a VM and/or its virtual storage facilities can be configured to occupy an arbitrary range of contiguous addresses, and several VMs can be arranged (e.g., with or without memory address translations) into a contiguous address space. As such, any node of the ephemeral cluster can be situated in a temporarily dedicated address space and any node can carry out a protocol to access the temporarily dedicated address space of any other node. In one embodiment, the foregoing protocol can be carried out using any sort of network connectivity that, for example, may include wireless communication, such as but not limited to Wi-Fi, Bluetooth, or other relevant protocols for seamless communication between nodes of the ephemeral cluster and/or for single hop or multi-hop communication between the ephemeral cluster and/or the sensors-as-a-service platform.

Still yet, the wireless handheld server may be composed of any number of edge devices. The edge devices may include sensors, cameras, IoT devices, etc., or the edge devices may themselves be instances of sensors, cameras, IoT devices, etc. Additionally, the wireless handheld server may be configured for real-time or near-real-time data processing (such as among the edge devices comprising the ephemeral cluster) which may be configured for low latency.

It is to be appreciated that the term wireless handheld server may include other alternative arrangements of functionality, devices, architectures, within the context that the wireless handheld server includes at least one edge device and a sensors-as-a-service platform. For example, the wireless handheld server may include at least one edge device and at least one network resource (e.g. such as services, application, modem, router, etc. accessed by other devices within the ephemeral cluster), where the at least one network resource connects the wireless handheld server to the sensors-as-a-service platform. Thus, the sensors-as-a-service platform may be integrated within the wireless handheld server system, as detailed herein, and/or may be configured such that the wireless handheld server system can be connected to the sensors-as-a-service platform.

It is to be appreciated that the edge devices may further include 3D printed graphene electronics, devices, components, and/or subsystems, consistent with the disclosure herein.

It is to be appreciated that the foregoing devices (and/or respective VMs, and/or corresponding cluster nodes) may be temporarily or permanently deployed to extend the range of effectivity of the mesh of edge devices (e.g., smart edge devices, wearable edge devices, other sensor-enabled edge devices, etc.). For example, certain types of devices such as those deployed within an Internet fog environment, may not be conducive to a long term deployment due to, for example the lack of a reliable power source, changing environmental conditions and/or changing communication coverage. Therefore, in such a configuration, such devices (and/or VM nodes) may cache data, in part or in whole, in order to provide, in one embodiment, consistency of service. Further details regarding formation and maintenance of spontaneously-formed ephemeral clusters and/or spontaneously-formed mesh network configurations are shown and described elsewhere herein.

In various embodiments, the sensors 103 may be integrated with an artificial intelligence and/or machine learning system which may be used to improve signatures, detecting signatures, etc. Further, the sensors 103 may be used as an edge device (such as a wall sensor) and/or integrated into an Internet-of-things device application. As such, the end location of where or how the sensors 103 may be used may differ and be without limit.

In one embodiment, more than one sensor may be configured in a network associated with the sensors-as-a-service platform 101. For example, two sensors may be configured in a mesh network configuration (or any decentralized architecture). In such an embodiment, each of the sensors 103 may serve as both a transmitter and a receiver, allowing data to be relayed between sensors to reach its destination (e.g., a sensor hub). In this configuration, the greater the number of sensors, the greater the accuracy of sensing the environment (including spatially sensing inside a known volume). Additionally, certain mesh network configurations facilitate greater redundancy/fault tolerance (i.e., network traffic could be rerouted through alternative paths), self-healing capabilities (i.e., a sensor can be removed from or added to a network), scalability (i.e., new sensors can be added), extended coverage (i.e., additional sensors can span a wider area), increased throughput (i.e., multiple paths can be simultaneously pursued), flexibility (i.e., wireless local networks, sensor network, Internet-of-things application), etc.

In terms of deployment and/or transmission of data from the sensors 103, in one embodiment, an interrogation response type scenario may include sending data packets from one sensor to another either as a repeater or repeater/secondary translator integrating new information. Additionally, a mesh response type scenario may include passing updates from one sensor to another. In this manner, updates to sensors may be propagated individually or as a collection.

In another embodiment, the sensors may rely upon the sensors-as-a-service platform 101 as a backend system to perform data center operations and/or communications. For example, an edge or IoT device may include a framework (e.g., GPU, communication system) which may be used and/or relied upon by the sensors 103 in order for enhanced or greater functionality. In this manner, the sensors 103 may function as an "add-on" or plugin to existing hardware. In one embodiment, the addition of the sensors 103 to the existing hardware may enable smart functionality of the existing hardware (e.g., increased sensing ability, increased detection, etc.).

As such, the sensors-as-a-service platform 101 may be particularly useful for businesses and organizations that require access to the sensors 103 and data associated with the sensors 103 without the burden of managing the underlying hardware and infrastructure. Such a platform may promote flexibility, cost-effectiveness, and accessibility, making it easier for users and organizations to leverage sensor data for various applications (such as environmental monitoring, industrial automation, smart cities, etc.). In one embodiment, the sensors-as-a-service platform 101 may be architected to allow for devices to function as virtual machines (VMs). In this manner, the collection of devices may function as a cluster of devices (cluster nodes) that can be orchestrated, flexibly configured, deployed, and/or managed by the sensors-as-a-service platform 101. Strictly as one example, a particular collection of devices that function as a cluster, may be configured based on capacity requirements and/or environmental limitations placed concomitant with the services load for a given use scenario, and/or environmental conditions. In configurations where a computing entity (e.g., a cluster of independent nodes) is formed using virtual machines, the virtual machines can be felicitously moved from one host device to another host device. As such, adding a node to a cluster (e.g., when a new cell phone is in proximity) or deleting a node from a cluster (e.g., when a cell phone host of a cluster VM moves out of proximity), can happen within a second or a fraction of a second. There can be other reasons why a cell phone host of a cluster VM is to be added or deleted. Certain embodiments of the aforementioned computing cluster are not only spontaneously formed and ephemeral in terms of longevity, but certain embodiments are also elastic in terms of node constituency. For example, the size of a computing cluster formed of a plurality of cell phone hosts of cluster VMs can be expanded at will, possibly due to an increase in service loads, or possibly due to the need for a particular configuration of a subject cell phone and it's complement of sensors. Similarly, the size of a computing cluster formed of a plurality of cell phone hosts of cluster VMs can be contracted at will, possibly due to diminution of service loads, or possibly due to intended release of a particularly configured subject cell phone.

As can now be seen, any one or more of the constituent wireless nodes of an instance of the foregoing ephemeral computing cluster can be configured as a wireless handheld server, either by itself, or in combination with other constituent wireless nodes. More specifically, in some cases a spontaneously-formed ephemeral cluster can formed of a single wireless handheld edge device (e.g., into a single node cluster), which in turn can be configured to act as a wireless handheld server (e.g., a wireless query server, a wireless data server, a wireless sensor update server, etc.). In embodiments where the single wireless handheld edge device forms a single node cluster (i.e., without adding a further wireless handheld edge device into the single node cluster), the single wireless handheld edge device can nevertheless satisfy known in the art cluster architectures, at least in the sense that the single wireless handheld edge device can host two or more virtual machines that work together so that they can be viewed as a single system. To illustrate, a single wireless handheld edge device can host a first virtual machine that is configured to perform the function of a wireless query server, a second virtual machine configured to perform the function of a wireless data server, and a third virtual machine configured to perform the function of a wireless sensor update server, etc. Further, at least to the extent that any or all of the foregoing virtual machines can access the same repositories of data (e.g., device-resident storage), the virtual machines can cooperate in terms of data production and data consumption. Further, in some cases a spontaneously-formed ephemeral cluster can formed of a plurality of wireless handheld edge devices, any or all of which handheld edge devices can in turn be configured to cooperate as a wireless handheld server (e.g., a multi-node wireless query server, a multi-node wireless data server, a multi-node wireless sensor update server, etc.). In some embodiments, a wireless cluster, whether configured to operate in a single node cluster topology or whether configured to operate in a multi-node cluster topology can be spontaneously formed by virtue of execution of one or more virtual machines that are hosted on respective wireless nodes. As can be appreciated, the use of virtual machines and/or the use of executable containers (ECs), relieves the deployer of having to tailor downloadable modules to comport with any particular operating system. As such, a swarm of downloads to a plurality of wireless handheld edge devices can be constituted using multiple copies of a single downloadable module. Upon execution of the download by one or more of the wireless handheld edge devices, and upon carrying out a spontaneous cluster formation protocol, a wireless ephemeral computing cluster can be formed.

As one example, a router may be in communication with an electric grid. However, a common issue may include receiving real-time updates on the performance and state of the router. A sensor may be affixed to the router to provide greater data intelligence (ambient conditions, router performance, dust levels, air flow rate, moisture levels, electric static charge, etc.). In this manner, the sensors 103 can provide enhanced intelligence on not just the state of the device (such as the temperature it is operating at) but provide intelligence on the cause of the device state.

In one embodiment, the sensors 103 may be printed onto a surface. For example, 3D graphene electronics as a sensor may be placed and/or printed onto a surface. Such a sensor may then allow for intelligence of the surface onto which it was placed. In this manner, the sensor may provide intelligence on the state and cause of the state of the material to which it is affixed and/or printed. As one example, a label may be affixed to a package (such as a destination routing label), but in addition to providing a destination address, the label may also be used to sense a state of the container (whether the box has been punctured, etc.), a state of the objects within the container, whether the container has been roughly handled (especially when it is labeled as "Fragile"), etc.

With respect to printed surface sensors, it is to be appreciated that, as discussed hereinbelow, libraries relating to digital signatures, classifier buckets, etc. may be provided to the sensor. Additionally, the libraries may be updated, as needed, at a later time. Such updating may be in response to interaction with an machine learning system, a neural network, etc. In various embodiments, the sensors-as-a-service platform 101 may be connected to and/or may include AI components. As such, printed sensor electronics may allow for smart intelligence for nearly any surface, material, or item.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 1B:
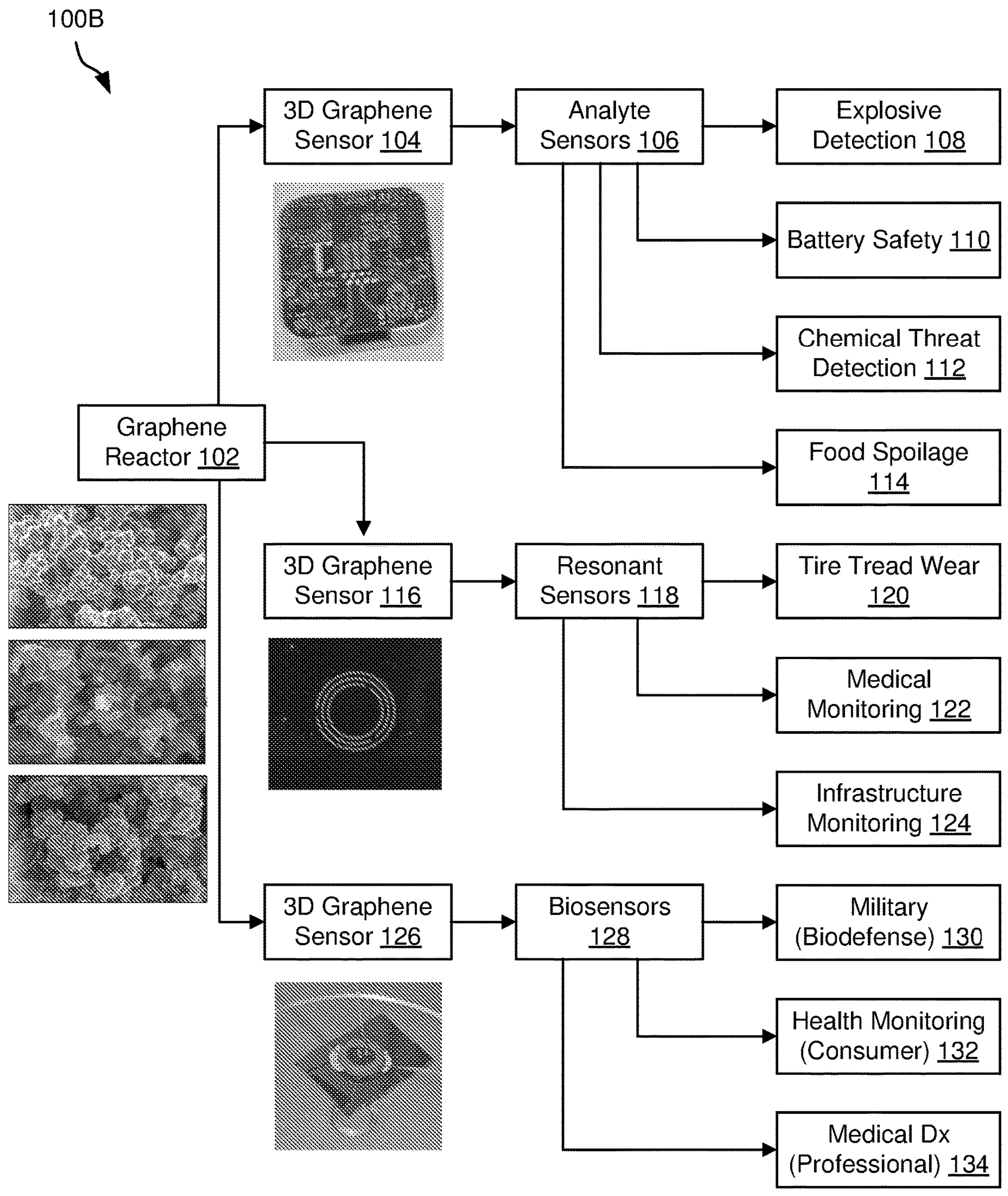
FIG. 1B illustrates a sensor platform, in accordance with one embodiment.

FIG. 1B illustrates a sensor platform 100B, in accordance with one embodiment. As an option, the platform 100B may be implemented in the context of any one or more of the embodiments set forth in any previous and/or subsequent figure(s) and/or description thereof. Of course, however, the platform 100B may be implemented in the context of any desired environment. Further, the aforementioned definitions may equally apply to the description below.

As shown, the platform 100B may include an output of graphene from a graphene reactor 102, which may be used in a variety of sensor types, including a 3D graphene sensor 104 used for analyte sensors 106, a 3D graphene sensor 116 used for resonant sensors 118, and/or a 3D graphene sensor 126 used for biosensors 128. As discussed hereinabove, the types of sensors may include any type of sensor. In one embodiment, graphene from the graphene reactor 102 may be used in any sensor type to potentially enhance and/or increase the capability of the sensor.

With respect to the analyte sensors 106, the 3D graphene sensor 104 may be used, but not limited, for mobile or stationary explosive detection 108, battery safety 110, chemical threat detection 112, volatile organic compounds (VOC's), methane, food spoilage 114, and/or as a device for the detection of a human medical condition. It is to be appreciated that the analyte sensors 106 may be used to detect any vapor. Further, the sensors, as described hereinbelow, may be used in connection with support for Scope 3 emissions including, but not limited to, monitoring of greenhouse gasses (such as including methane) for the purpose of measuring discrete existence and concentration of methane or other criteria pollutions (i.e. other measurable gasses) as it may relate to trading (buying/selling) of greenhouse gas credits (e.g. carbon credits).

With respect to the resonant sensors 118, the 3D graphene sensor 116 may be used, but not limited, for tire tread wear 120, medical monitoring 112, infrastructure monitoring 124, and/or position/velocity/acceleration monitoring of a selected object. It is to be appreciated that the resonant sensors 118 may be used to change in permittivity of nearly any material or surrounding.

With respect the biosensors 128, the 3D graphene sensor 126 may be used, but not limited solely, for military 130 (biodefense), health monitoring 132 (consumer use), and/or medical diagnosis 134 (professional use), including detection of sparse agents present such as those requiring up to femtomolar sensitivity (indicative of certain cancers in humans or animals). It is to be appreciated that the biosensors 128 may include any type of biological molecule (or living cells) which may be used to detect and/or measure the presence of specific substrates.

It is to be recognized that the examples given with respect to the analyte sensors 106, the resonant sensors 118, and/or the biosensors 128 are intended merely as possible examples. As disclosed herein, the use and context of each of these sensors extends far beyond the examples provided. As such, the examples provided are not intended to be limiting in any manner to the use of the sensors, or the types of sensors used in relation to the sensors-as-a-service platform 101.

Sensing technologies are currently in use for detecting analytes of various classes. In both public sector and private sector settings, an "electronic nose" is used to offer personnel a way of knowing something about the environment. For example, an electronic nose can be used to detect the presence of explosive materials (e.g., TNT, TATP, etc.) or other materials that have the potential to be toxic. Given that such an electronic nose is oftentimes hundreds or thousands or millions of times more sensitive that other detection means, deployment of an electronic nose that is integrated with a warning system gives personnel a chance to remediate the situation (e.g., by confiscating the material, by calling in the bomb squad, by evacuating the premises, etc.).

Such electronic noses work by taking a plurality of readings, grouping such readings according to some protocol to form a detection signature, and then classifying the detection signature as being indicative of one or more analytes in the environment. In some cases, an electronic node can register readings even in the presence of minute quantities (e.g., parts per million), and as such the dynamic range of electronic nose sensors is huge.

In recent times, electronic nose sensors have been deployed in coordinated arrays of individual electronic noses, where each individual electronic nose of such a coordinated array is configured to respond to a particular analyte or range of analytes. The technique of combining readings from multiple individual electronic noses into a signature facilitates use of predictive modeling to perform classification of signature data.

Such predictive models need to be trained so as to be able to classify a particular signature as corresponding to detection of a particular analyte. One means of training a predictive model involves supervised training whereby an expert is engaged to classify certain signatures or groups or ranges of signatures as corresponding to a particular analyte or genus of analytes.

As the number of elements in the array increases (e.g., as the costs of deploying the technologies comes down), and as the dynamic range and/or sensitivity of each individual element increases (e.g., as electronic nose technology advances), and as the demand for better and better classification increases (e.g., due to demands arising from experiences taken from the aforementioned public sector and private sector settings), the need for more training also increases.

Consider that an array of 10 sensors, each with a dynamic range of 10 bits, would produce a signature comprising 100 bits. Thus, there are $2^{100}$ ($=1.2\times10^{30}$) possible individually discernable signatures arising from such an array.

Unfortunately, it is humanly impossible for an expert (or any number of experts) to classify $2^{100}$ possible individually discernable signatures. Therefore what is needed is a technological approach to be able to automatically classify very large numbers of analyte signatures, rather than by relying on human experts.

Figure 2A:
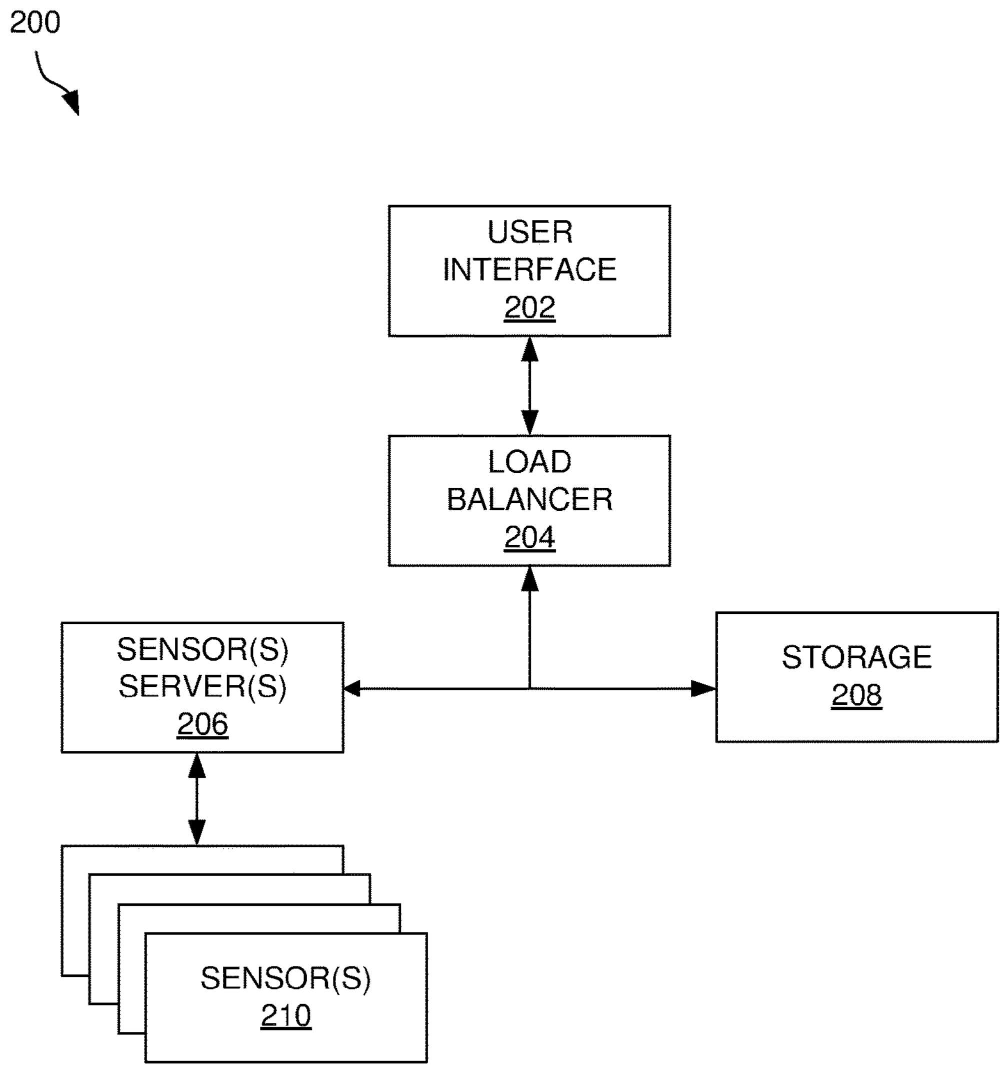
FIG. 2A illustrates an architecture for sensors-as-a-service, in accordance with one embodiment.

FIG. 2A illustrates an architecture 200 for sensors-as-a-service, in accordance with one embodiment. As an option, the architecture 200 may be implemented in the context of any one or more of the embodiments set forth in any previous and/or subsequent figure(s) and/or description thereof. Of course, however, the architecture 200 may be implemented in the context of any desired environment. Further, the aforementioned definitions may equally apply to the description below.

In one embodiment, the architecture 200 may provide further details on the sensors-as-a-service platform 101 and the sensors 103 discussed hereinabove. Within that context, the sensor(s) 210 may interact with a sensor(s) server(s) 206, which may be contact with a storage 208 (i.e., data repository). Further, a load balancer 204 may be contact with the sensor(s) server(s) 206 and the storage 208 and provide capabilities for a user interface 202.

In various embodiments, the load balancer 204 may be used to distribute incoming network traffic such as from the user interface 202. For example, the load balancer 204 may be used to distribute incoming network traffic across multiple servers (such as the sensor(s) server(s) 206) to ensure no single server becomes overwhelmed with too much load, to optimize resource utilization, and/or improve the overall performance, reliability, and availability of a web application (such as for the user interface 202).

In various embodiments, the user interface 202 may be used for making requests for resources (e.g., data analytics associated with the sensor(s) 210), upgrade requests (e.g., for the sensor(s) 210, etc.), action requests (e.g., management of the sensor(s) 210, etc.), etc. The load balancer 204 may assist with providing scalability. For example, the load balancer 204 may be used to add on additional servers of the server(s) 206 to handle requests and load.

Additionally, although not shown, the load balancer 204 may additionally function to handle requests and data incoming from the sensor(s) 210. For example, a request from the user interface 202 may include updating an array of the sensor(s) 210. Such a request may occur via multiple user, each handling a large array of sensors. The load balancer 204 may handle the requests from the user interface 202 and allocate the requests across the server(s) 206 to optimize performance and high availability.

In another embodiment, an environment disaster may cause a flood data from the sensor(s) 210 to be sent to the server(s) 206. A load balancer (either the load balancer 204 or a second load balancer) may be used to handle the incoming data from the sensor(s) 210.

Figure 2B:
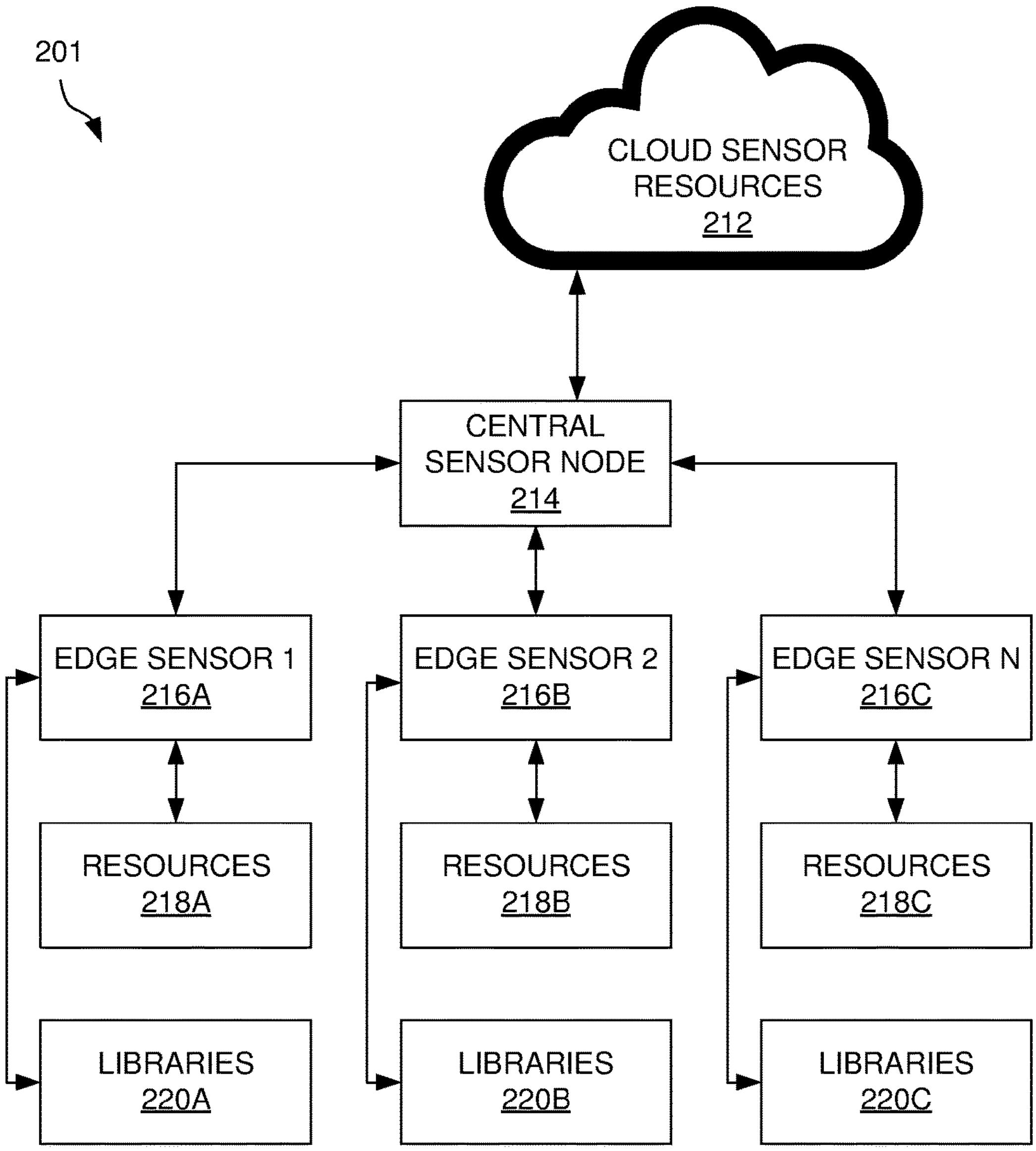
FIG. 2B illustrates an architecture for sensors as edge devices, in accordance with one embodiment.

FIG. 2B illustrates an architecture 201 for sensors as edge devices, in accordance with one embodiment. As an option, the architecture 201 may be implemented in the context of any one or more of the embodiments set forth in any previous and/or subsequent figure(s) and/or description thereof. Of course, however, the architecture 201 may be implemented in the context of any desired environment. Further, the aforementioned definitions may equally apply to the description below.

In one embodiment, the architecture 201 may provide further details on the sensors-as-a-service platform 101 and the sensors 103 discussed hereinabove.

As shown, a central sensor node 214 may be connected to one or more edge sensors (shown as an edge sensor 1 216A, an edge sensor 2 216B, and an edge sensor N 216C). Each of the edge sensors may be associated with its own resources (shown as resources 218A, resources 218B, and resources 218C) and libraries (shown as libraries 220A, libraries 220B, and libraries 220C). Further, the central sensor node 214 may be connected to cloud sensor resources 212.

With respect to the edge sensors 216A, 216B, and 216C, resources may be provided in the form of physical capabilities and/or configuration of the sensor. For example, the edge sensor may include an analyte sensor which may have an array of analyte sensors, where each analyte sensor may be configured for a particular analyte. In another embodiment, the edge sensor may include a biosensor which may have an array of biosensors, where each biosensor may be configured for a particular molecular, strain, contaminant, pathogen, biological target, enzyme, etc. In another embodiment, the edge sensor may include a resonator sensor which may have an array of resonant sensors, where each resonant sensor may be configured for a particular resonant frequency and/or sensitivity.

In the architecture 201, the central sensor node 214 may be connected to each of the edge sensors 216A, 216B, and 216C. In such a configuration, the central sensor node 214 may serve as a hub between the cloud sensor resources 212 and each of the edge sensors 216A, 216B, and 216C, including providing updates and upgrades to each of the edge sensors 216A, 216B, and 216C, as well as serving as a central collection point for receiving data from each of the edge sensors 216A, 216B, and 216C which may then be passed on to the cloud sensor resources 212.

In one embodiment, the central sensor node 214 may be selected based on geographic proximity to other edge sensors. For example, a first central sensor node may be located on a vehicle and may be configured to be in communication with all edge sensors located throughout the vehicle. In another embodiment, a first central sensor node may be located at a first location of a structure, and a second central sensor node may be located at a second location of the structure, and each of the first central sensor node and the second central sensor node may each be separately in communication with edge sensors located within a predetermined proximity. In another embodiment, the complexity of the architecture may require having a hierarchy of sensor nodes, where a first level of central sensor nodes may be in direct contact with the edge sensors, a second level of central sensor nodes may be in direct contact with the first level of central sensor nodes, etc.

In various embodiments, the architecture 201 may be configured as a mesh configuration, where multiple edges sensor nodes may communicate with a central sensor node, forming a mesh topology. Each of the edge sensors may wirelessly transmit collected data to the central sensor node. This mesh architecture may allow sensor nodes not only to communicate directly with the central sensor node but also to relay data through intermediate nodes (such as the other edge sensors), creating multiple communication paths. For example, a first edge sensor may communicate data to a second edge sensor, which in turn, may communicate such data to the central sensor node.

The central sensor node may serve as the network hub, responsible for coordinating communication, collecting data, and managing the overall network for the edge sensors. Data processing, analysis, and decision-making may be centralized at this central sensor node hub, allowing for a comprehensive understanding of the monitored environment of edge sensors. The two-way communication between the central sensor node and individual sensor edge nodes may facilitate remote configuration, firmware updates, and real-time adjustments. As such, the architecture 201 may be scalable and allow for a redundant configuration (which may in turn make it well-suited for applications such as environmental monitoring, industrial automation, smart agriculture, etc.).

Additionally, it is to be noted that the architecture 201 configuration may include low-power operation of edge sensor nodes, which in turn may maximize their (and the network's) lifespan, crucial in scenarios where energy efficiency is paramount.

Further, although the central sensor node 214 may function as a hub for communication and data (between the edge sensors 216A, 216B, and 216C and the cloud sensor resources 212), it is to be appreciated that the request for upgrades or software updates to the edge sensors 216A, 216B, and 216C may originate from the cloud sensor resources 212 (consistent with the discussion hereinabove with respect to the user interface 202). As such, instructions to update may originate from the cloud sensor resources 212 and may be implemented by the central sensor node 214 to each of the edge sensors 216A, 216B, and 216C.

Figure 2C:
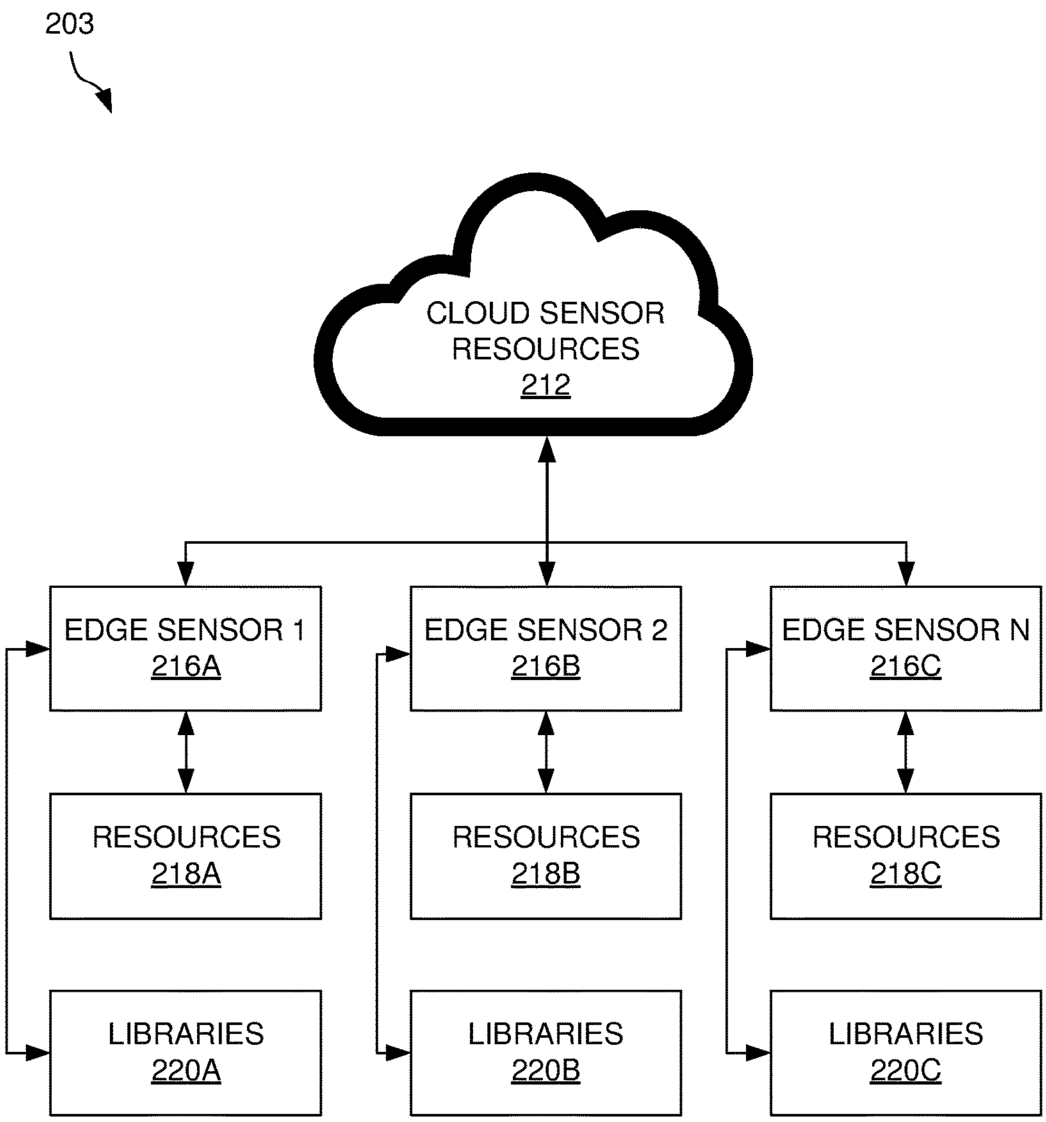
FIG. 2C illustrates an architecture for sensors as edge devices, in accordance with one embodiment.

FIG. 2C illustrates an architecture 203 for sensors as edge devices, in accordance with one embodiment. As an option, the architecture 203 may be implemented in the context of any one or more of the embodiments set forth in any previous and/or subsequent figure(s) and/or description thereof. Of course, however, the architecture 203 may be implemented in the context of any desired environment. Further, the aforementioned definitions may equally apply to the description below.

As shown, the architecture 203 may include the cloud sensor resources 212 in communication with the edge sensors 216A, 216B, and 216C. Similar to the architecture 201 the architecture 203 may include resources 218A, 218B, and 218C, and libraries 220A, 220B, and 220C in direct contact with each of the edge sensors 216A, 216B, and 216C.

In comparing the architecture 203 to the architecture 201, it is to be appreciated that the architecture 203 includes a decentralized topology. In this configuration, the edge sensors 216A, 216B, and 216C may each be direct contact with the cloud sensor resources 212. In another embodiment, the edge sensors 216A, 216B, and 216C may be interconnected such that each edge sensor 216A, 216B, and 216C may function as both a sender and receiver (in sending and/or receiving data, software updates, etc.). In this manner, each of the edge sensors 216A, 216B, and 216C may be connected to each other to create a cohesive connection.

Further, in the mesh network configuration without a central node of architecture 203, each of the edge sensor nodes may communicate with each other edge sensor nodes directly. As such, the architecture 203 may be a decentralized architecture which may eliminate the dependence on a central hub. In this mesh topology, every edge sensor node may be interconnected, creating a network where information, data, software updates, etc. can be transmitted from one edge sensor node to another, forming multiple communication paths. Each edge sensor node may have the ability to relay data, enhancing the network's robustness and fault tolerance. Further, this distributed approach may promote flexibility and scalability, as nodes can be added or removed without affecting the overall network structure of the architecture 203. As such, the architecture 203 may be applied to scenarios where decentralization, resilience, and self-healing capabilities are critical (such as, but not limited to, in wireless sensor networks, home automation systems, peer-to-peer communication networks, defensive, security system, etc.). This architecture allows for efficient communication, adaptability, and improved reliability across a variety of applications.

Consistent with the architecture 201, the architecture 203 may allow for updates to and configuration of each of the edge sensor nodes 216A, 216B, and 216C as needed via the cloud sensor resources 212.

Figure 2D:
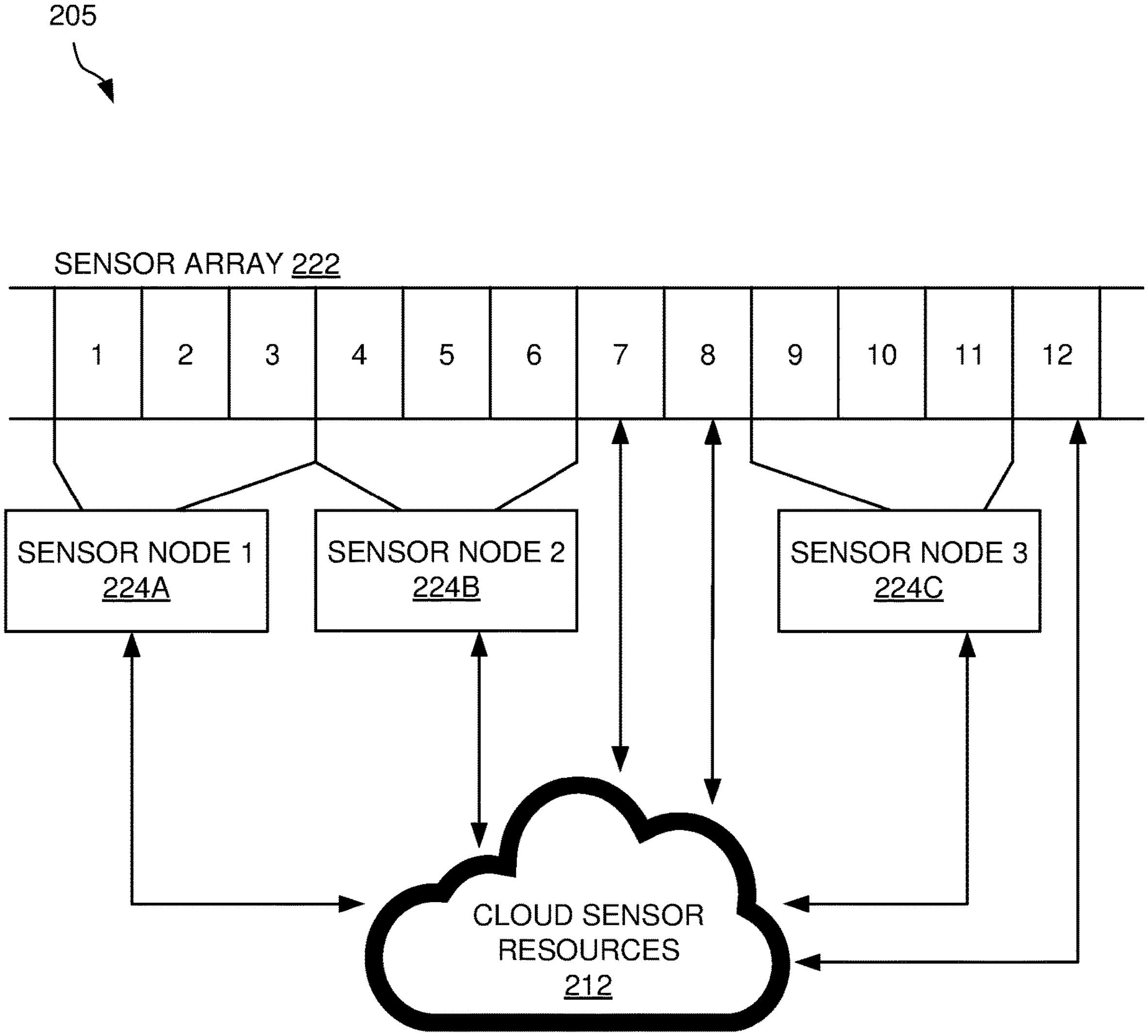
FIG. 2D illustrates an architecture for an array of sensors, in accordance with one embodiment.

FIG. 2D illustrates an architecture 205 for an array of sensors, in accordance with one embodiment. As an option, the architecture 205 may be implemented in the context of any one or more of the embodiments set forth in any previous and/or subsequent figure(s) and/or description thereof. Of course, however, the architecture 205 may be implemented in the context of any desired environment. Further, the aforementioned definitions may equally apply to the description below.

As shown, the architecture 205 includes a possible configuration where a sensor array 222 includes many sensors (shown in the architecture 205 as twelve possible sensors). Within the context of the present description, a sensor array may refer to any collection of multiple sensors. In one embodiment, the array may include discrete and independent sensors arranged in a group. In another embodiment, the array may include a single sensor that includes multiple sensors within the individual sensor. For example, an analyte sensor array may include multiple analyte sensors configured on a single sensor board. As such, the sensor array 222 may include a collection of independent sensors, where each sensor in turn may comprise multiple sensors (depending on how each individual sensor is configured).

Some of the sensors may be connected to a sensor node (which may function in a manner similar to the central sensor node 214 and are shown as sensor node 1 224A connected to sensors 1-3, sensor node 2 224B connected to sensors 4-6, and sensor node 3 224C connected to sensors 9-11). Each of the sensor nodes 224A, 224B, and 224C may be connected to cloud sensor resources 212. Additionally, some of the sensors may be connected directly to the cloud sensor resources 212 without being connected to a sensor node (shown as sensors 7, 8, and 12 connected directly to the cloud sensor resources 212).

It is to be appreciated that the architecture 205 is just one exemplary arrangement and that any configuration of the sensors (between the edge sensors and the cloud sensor resources 212) may be arranged as desired.

Figure 2E:
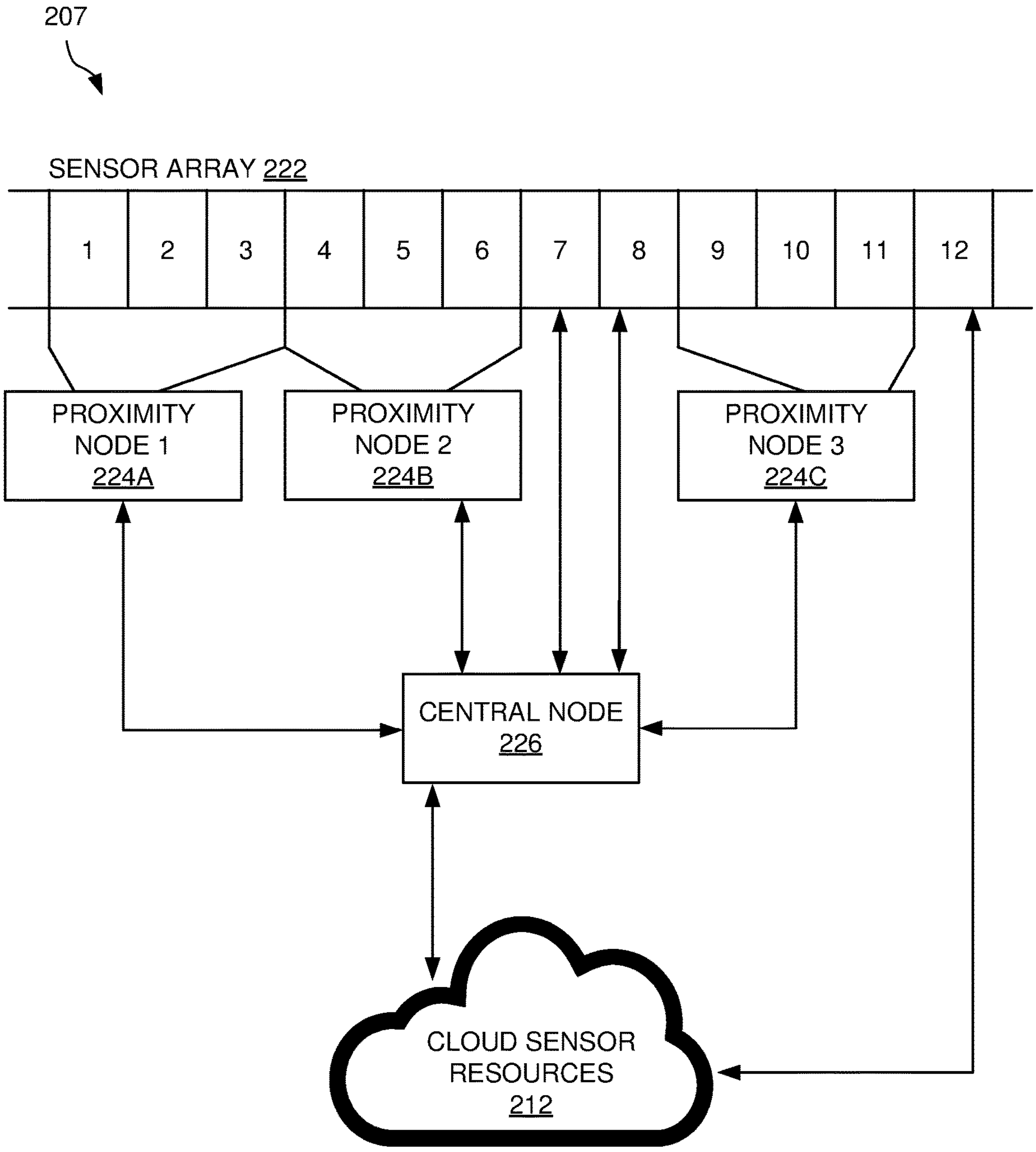
FIG. 2E illustrates an architecture for an array of sensors, in accordance with one embodiment.

FIG. 2E illustrates an architecture 207 for an array of sensors, in accordance with one embodiment. As an option, the architecture 207 may be implemented in the context of any one or more of the embodiments set forth in any previous and/or subsequent figure(s) and/or description thereof. Of course, however, the architecture 207 may be implemented in the context of any desired environment. Further, the aforementioned definitions may equally apply to the description below.

As shown, the architecture 207 includes a possible configuration where a sensor array 222 includes many sensors (shown in the architecture 207 as twelve possible sensors). Some of the sensors may be connected to a sensor node (shown as sensor node 1 224A connected to sensors 1-3, sensor node 2 224B connected to sensors 4-6, and sensor node 3 224C connected to sensors 9-11). Each of the sensor nodes 224A, 224B, and 224C may be connected to a central node 226. Additionally, some of the sensors may be connected directly to the central node 226 without being connected to a sensor node (shown as sensors 7 and 8 connected directly to the central node 226). Further, the central node 226 may be connected to the cloud sensor resources 212, and a sensor (shown as sensor 12) may be also connected directly to the cloud sensor resources 212.

It is to be appreciated that the architecture 207 is just one exemplary arrangement and that any configuration of the sensors (between the edge sensors and the cloud sensor resources 212) may be arranged as desired.

Further, it is to be appreciated that the proximity nodes 224A, 225B, and 224C may function as sensors themselves. The architecture 207 is to be interpreted as one example of possible arrangements, but it is envisioned that the arrangements of sensor nodes, proximity nodes, central nodes, and cloud sensor resources may be connected as needed depending on the needs of the sensors and availability of network connectivity.

FIG. 2F1 illustrates a sensor and device platform 209, in accordance with one embodiment. As an option, the sensor and device platform 209 may be implemented in the context of any one or more of the embodiments set forth in any previous and/or subsequent figure(s) and/or description thereof. Of course, however, the sensor and device platform 209 may be implemented in the context of any desired environment. Further, the aforementioned definitions may equally apply to the description below.

As shown, the device platform 209 show the cloud sensor resources 212 connected to a variety of items and sensors. For example, the cloud sensor resources 212 may be connected wirelessly to a motorcycle 244, plane 248, and/or vehicle 240. Additionally, the cloud sensor resources 212 may be connected via a wired connection to a structure 228 and/or a train 236. Further, the cloud sensor resources 212 may be connected (shown as wireless but can be any type of wired or wireless connection) to infrastructure resources, including a signal 252, light pole 254, camera 256, and/or bridge 258.

It is to be appreciated that any item may be connected to the cloud sensor resources 212. For example, even everyday household objects (including Internet of things, IoT, devices) may be embedded with sensors or connected to sensors such that they can collect, transmit, and receive data. Such IoT devices may be interconnected and may allow for real-time automation and control of devices.

Sensors may be connected to each of the items previously described (which are connected to the cloud sensor resources 212). For example, the motorcycle 244 may be connected to sensors 246, the plane 248 may be connected to sensors 250, the train 236 may be connected to sensors 238, the vehicle may be connected to sensors 242, etc. The structure 228 may be connected, in one embodiment, to a central node 230 which may manage sensors 232. Additionally, the sensors 232 may likewise, in turn, be connected to at least another sensor 234. Further, each of the infrastructure resources (including the signal 252, light pole 254, camera 256, and/or bridge 258) may be connected to the sensors 260, and in like manner, the infrastructure resources connected to the sensors 260 may in turn be connected to other items, such as the motorcycle 244, the vehicle 240, and/or the cloud sensor resources 212 directly.

Taking a step back, the sensor and device platform 209 emphasizes the interconnectivity of devices, items, sensors, and locations. For example, in one embodiment, the vehicle 240 with its own set of sensors 242 may communicate with the sensors 260 located on the bridge 258. The sensors 260 located on the bridge may detect a micro crack developing within the concrete (via, e.g., split ring resonator sensors embedded within the cured concrete), and the data associated with the micro crack may be relayed to the cloud sensor resources 212 and/or the vehicle 240. In this manner, the cloud sensor resources 212 may be apprised of a change of conditions of the concrete associated with the bridge 258. Further, the vehicle 240 may assist with communicating such information to the cloud sensor resources 212. Still yet, based on the detected crack, the signal 252 may be updated to divert traffic away from the bridge 258 so that it can be more fully assessed. As such, data originating from a first source may be transmitted to a variety of other sources, which in turn, may assist in communicating the data to the cloud sensor resources 212 and/or taking necessary action to rectify any situation noted. It is to be appreciated that such an example is merely one example, and that privacy, security, and management of data will be preserved through the channel of communication. Again, the sensor and device platform 209 is intended, again, to show the interconnectivity of items, and how data originating from any of the sensors may be connected to a device and/or item.

The foregoing architecture supports many uses cases as well as provision of many services. In particular, and as previously mentioned, the sensors-as-a-service platform 101 facilitates provision of many types of subscription services. Some types of subscription services are configured such that a subscriber can be a consumer of data originating or derived from sensors in the Internet fog, or equivalent. Additionally or alternatively, a particularly-configured series of components within the sensors-as-a-service platform 101 facilitates crowd-sourced data acquisition such that a willing participant can facilitate collection of data originating or derived from sensors in the Internet edge (e.g., through use of their consumer electronic devices). For example, various tiers may be cooperatively interconnected, and each tier may correspond with a predetermined amount of data, or services, or capabilities associated with sensors and/or other components of that tier. With respect to early warning of certain conditions (e.g., presence of toxic materials, etc.), a first tier 291 (e.g., at the edge, in the fog, etc.) may include sensors configured to detect analytes associated with explosives, and/or to detect specific pathogens, toxins, volatiles, etc.). A second tier 292 may provide additional and/or more granular data, possibly including a map of concentration levels with respect to location, meso-trends over time, etc. A third tier 293 may provide still further data, possibly including macro-trends, mega trends and, in some cases, the third tier may synthesize commands to be carried out by lower tier. Strictly as one example, a higher tier might command a lower tier to collect data from a different location. Within the context of the present description, the term Internet fog includes an architecture comprising an Internet backbone where edge devices carry out computation (at least a portion thereof), storage, and/or communication locally. In this manner, Internet fog may be similar to fog computing (and/or other computing systems and/or architectures routed on the Internet).

FIG. 2F2 illustrates delivery of commands from a sensors-as-a-service platform to sensor nodes deployed as edge devices, in accordance with one embodiment. As an option, FIG. 2F2 may be implemented in the context of any one or more of the embodiments set forth in any previous and/or subsequent figure(s) and/or description thereof. Of course, however, the FIG. 2F2 may be implemented in the context of any desired environment. Further, the aforementioned definitions may equally apply to the description below.

In the architecture 201, in addition to having each of the central sensor nodes being connected to its respective edge sensors 216A, 216B, and 216C, each central sensor node 214F is further connected to a consumer electronics platform (e.g., a laptop computer, a pad or tablet, a phone, a wearable electronic device, etc.). Such a consumer electronics platform can serve as a hub between the amalgam of the edge sensors and the sensors-as-a-service cloud. Such a hub, possibly in cooperation with components of the sensors-as-a-service platform 101 and/or possibly in cooperation with a geographically convenient Internet-connected components. In various embodiments, the foregoing geographically convenient Internet-connected components facilitate communications between any number of central sensor nodes. In the specific embodiment of FIG. 2F2, communications between central sensor nodes is shown as traversing between multiple web service sensor resources 212, however in many settings, the forgoing consumer electronics platforms are capable of inter-component communication without the need for uplink communications from a consumer electronics platform to a web service sensor resource (web service sensor resources 212). In the particular architecture of FIG. 2F2, the web service sensor resources 212 can implement middleware. As is known in the art, middleware facilitates broad and rapid deployment by overcoming problems introduced by heterogeneous componentry (e.g., different operating systems, different hardware interfacing requirements, heterogeneous network protocols and equipment, etc.). As depicted, the middleware facilitates communications between components of the ecosystem. Further, and as depicted, the middleware facilitates communications between individual application components (e.g., edge sensors, libraries, sensors-as-a-service platform resources, etc.). As such, even when peer-to-peer communications are not possible (e.g., due to lack of proximity), it may still be possible to communicate by and between individual application components. In addition to facilitating communications between individual application components, middleware can facilitate communications by and between individual application components and third tier components, such as any components of the shown sensors-as-a-service platform 101. Strictly as examples, communications by and between individual first tier components and third tier components (possibly but not necessarily traversing through the second tier 292) provides a conduit for providing updates and upgrades to any one or more of the edge sensors, libraries, etc. As shown, the third tier components are sufficiently configured so as to be able to facilitate communications to and from geographically distant locations (e.g., a first geographic location 2911 and an arbitrarily distant second geographic location 2912).

In various embodiments, commands 281 may be sent from the sensors-as-a service platform 101 to the web service sensor resources 212, which in turn the commands 281 may be provided to a central sensor node 214F at a first geographic location 289A and/or a second geographic location 289B. It is to be appreciated that the commands 281 may be sent from the web service sensor resources 212 directly to an edge sensor (such as any or all of the edge sensor 1 216A, the edge sensor 2 216B, the edge sensor N 216C). Further, the edge sensors may be clustered and/or arranged in any manner (based on similarity of function, geography, user, etc.) to allow for both individual (per sensor) or collective (multiple sensors) configuration. In various embodiments, the commands 281 may be used in conjunction (and/or between) a user of a device, the sensors, and/or the operator of the sensors-as-a-service platform 101.

For example, for purposes of providing an explicit example, sensors associated directly with a user and/or devices associated with the user may be configured such that the user provides a permission for the sensors to provide data back to the user, as well as to a third-party provider (e.g. advertisement, personalization, tailoring of experience, if-this-then-that triggers, etc.). In various embodiments, the data provided by the sensor may include any (or all of) sensor data (such as data originating by the sensing elements of the sensor), peripheral sensor data (such as data originating from use of the sensor, such as location, velocity, acceleration, etc.), etc. In this manner, the user may benefit not only from the data provided by the sensor, but a third-party provider may provide a personalized and/or tailored experience back to the user based on such data. As such, commands to and/from the user and the third-party may relate to sensor data. In various embodiments, a sensor may be triggered in response to a medical condition, an alarm (e.g. fire, intrusion, illegal entry), spoiled food, produce shipper, produce customer, etc. Further, the sensor may be associated, at least in part with a smartphone and/or smartwatch. In this manner, the sensor, by itself, or in combination with another device (smartphone, smartwatch, etc.) may function as an edge computing device (and/or a fog computing node). In contrast, conventional systems generally would trigger such conditions provided hereinabove by use of a predetermined date (e.g. best by date, etc.) and/or by physical inspection (e.g. visual, smell, etc.).

In another explicit example, a user may seek to use a device (not previously owned by the user) which has sensors associated the device. For example, a user may use a ridesharing platform to request a ride. The vehicle may include sensors within the vehicle to detect one or more aspects of the user (e.g. intoxication level, analyte detection, gaze detection, occupancy, etc.). The user may accept to a terms and conditions of the vehicle, and in response, the vehicle (with sensors embedded in the vehicle) may be authorized to provide data back to the user (state of the vehicle, state of the user occupant, etc.) as well as to a third party (to tailor and personalize the experience). In this manner, the sensors may be associated with a device (the vehicle), the user may give permission for the sensors to function while the user is an occupant of the vehicle, and a third party may use the data from the vehicle in some manner to tailor and/or personalize the experience back to the user. As such, commands to and/from the device, the user, and the third-party may relate to sensor data.

In a further explicit example, a user may seek to purchase a network router. The network router may include sensors for enhanced functionality. The network router may be owned by a first entity, and the sensors may be owned by a second entity. When the user purchases the network router, the user may give permission (in order to operate the router) for sensor data to be provided back to the user and/or to a third party. Additionally, security permissions may be granted such that functionality of the sensors may be enabled, such that the second entity (associated with the sensors) may provide an API (and/or software update) to the first entity (associated with the network router), and the first entity may enable functionality on the network router accordingly consistent with the permissions given. As such, commands to and/from the device, the user, and the third-party may relate to sensor data. Further, with respect to this particular example, a user may be able to determine (via visual analysis of surroundings) what sensor networks are available (in the surrounding vicinity) and then to also select one or more of the sensor network (by which the user can then take advantage of such sensor capability). Such selection of the sensor network may be on a transient basis, a bit basis (amount of data), a time basis (amount of time), etc. In this manner, sensors-as-a-service may be selected and used by individuals.

In the explicit examples just provided, it is to be understood that commands (as shown, for example, in FIG. 2F6) may flow to and from any of the entities (or tiers as shown in FIG. 2F6). Further, a barter system may exist based on the sensor data, such that functionality of the sensor may be contingent on permissions provided, settings set by the user, manufacturer constraints, API compatibility, etc. The barter system may allow multiple entities (such as a user, a device manufacturer, a sensor operator, etc.) to interact and/or engage with the sensor data as needed such that: 1) functionality of the sensor; and/or 2) ancillary benefits (enhanced personalized, tailoring of experience, etc.) may be maximized based on the barter system.

Further, as an example, the edge sensor may include a wearable device. The edge wearable sensors may be configured as a cluster (such as by leveraging a decentralized network architecture that allows these devices to communicate and collaborate seamlessly) and/or may be configured individually. Additionally, each wearable sensor may be equipped with edge computing capabilities (such as the resources 218A, 218B, and/or 218C), enabling it to process and analyze data locally. As such, these wearable edge sensors can share information with one another, and in one embodiment, may form a network where the processing load may be distributed across a cluster of the wearable edge devices. This distributed approach may improve the speed of data analysis (which may be distributed across multiple sensors within a cluster) and may also reduce the need for centralized processing. It is to be appreciated that edge wearable sensors may be applied to a variety of industries, including, but not limited to healthcare monitoring, personal use, sports analytics, and/or industrial use cases. Further, such an architecture may be applied to a variety of other scenarios where edge sensors can function individually or collectively to collect and process data.

In one embodiment, the edge sensors may be configured to work with other non-edge sensor devices and/or legacy devices. For example, in one particular embodiment, a cell phone may not be equipped for a particular type of sensing (such as sensor carbon monoxide CO levels). A wearable edge sensor (a CO bracelet) may be paired with the cell phone, such that the cell phone's sensing capabilities may be increased through paired sensors. In one embodiment, the paired sensor may rely, in part or whole, on capabilities of the cell phone (e.g. LTE connection, network connectivity, processor, etc.). In other embodiments, the paired sensor may operate independent of the cell phone, but may still provide data to the cell phone, in addition to communicating, for example, with a central node 214F, a web service sensor resources 212, and/or the sensors-as-a-service platform 101.

The foregoing architecture supports virtually any deployment, including deployment of the sensors-as-a-service capability into an environment where computing capabilities abound (e.g., where cell phones are ubiquitously in operation). In fact, there is an abundance of consumer electronics platforms in use, many of which are already configured such that the consumer electronics platform can execute applications (or portions thereof) that can be downloaded over the Internet. This sets up the environment where sensor data from literally billions of field-deployed sensors can be directed upwards to a sensors-as-a-service platform. One possible deployment is shown and described as pertains to FIG. 2F3.

FIG. 2F3 illustrates a system configured to continually interrogate a wearable sensor. As an option, FIG. 2F3 may be implemented in the context of any one or more of the embodiments set forth in any previous and/or subsequent figure(s) and/or description thereof. Of course, however, the FIG. 2F3 may be implemented in the context of any desired environment. Further, the aforementioned definitions may equally apply to the description below.

The herein-disclosed sensors-as-a-service ecosystem supports virtually any deployment and any application, including deployment of the sensors-as-a-service capability into environments where cell phones are in operation. FIG. 2F3 depicts such a deployment. Specifically, and as shown, a cell phone (e.g., mobile phone 2F312 as well as in other embodiments including mobile phone device 15A06) is wirelessly interconnected to a computing agent (e.g., cloud 2F316). The cell phone may be configured to be able to both (1) emit electromagnetic signals (e.g., pings 2F308) and (2) receive electromagnetic signals (e.g., returns 2F310). This sets up one possible scenario where the cell phone can capture information about its surroundings by analyzing the received electromagnetic signals with respect to the emitted electromagnetic signals. In the example shown, the emitted electromagnetic signals are particularly configured to cause a subject sensor (e.g., selected sensor configuration 2F302) to return information (e.g., sensor data) that derives from operation of the sensor. In this example, the subject sensor is situated in or on or proximal to a wearable device (e.g., a watch or other wearable having a wristband 2F304). Many use cases arise from this configuration. One such use case involves performing some processing of electromagnetic signals (e.g., returns 2F310) on the cell phone, determining if the cloud should be alerted to the findings of the processing, and then doing so via a wireless transmission (e.g., wireless uplink communication 2F314).

To further explain, shown operation 1 emits periodic pings. Operation 2 is performed, either continually and/or asynchronously with respect to the pings, and/or in response to emitted pings. The cell phone processes the return from the pings, and based on the results of said processing (e.g., operation 3), the cell phone will determine whether or not to upload information to the cloud (operation 4).

This example shows merely a single cell phone and a single wearable device and a single sensor, however the deployment of FIG. 2F3 can be extended to include a plurality of cell phones, a plurality of wearables, and a plurality of sensors.

Further, it is to be appreciated that the latency between the periodic ping of operation 1, the sensing of operation 2, and processing returns from the pings operation 3 may be dependent on the sensitivity of the sensor configuration 2F302. For example, a first sensor may require a set time period (e.g. 0.5, 1,2 seconds in order to accurately sense). In such an example, the returns from the ping per operation 3 may include a single response (based on a single sensed condition). In another embodiment, another sensor may be capable of sensing a condition near instantaneously (such as when the time delay is negligible for the intended purpose of the sensor). For example, a high speed temperature sensor may provide a reading within a millisecond or even a microsecond. In such an embodiment, a single reading may be provided as a return from the ping per operation 3, or the returns from the ping per operation 3 may include some type of an aggregate (e.g. average, mean, etc.) of multiple readings. In another specific example, the wearable device including the sensor may receive an update (e.g. enhanced capability update, software update, etc.). The phone may ping the wearable device to determine if the update is operating correctly, and the sensor may provide near-instantaneous aggregated results (to determine accuracy and consistency of results) back to the phone to verify that the update has been correctly installed on the wearable and that the sensor is operating correctly.

As is known in the art, combining data from multiple sensors leads to greater reliability of the sensor data, at least in that having multiple sensors in the same or similar environment that all report the same senor data leads to a statistical certainty in whatever findings emerge from analysis of sensor data from the plurality of sensors. Moreover, when there are multiple sensors in the same or similar environment that all report their data more or less continually, a very detailed and accurate contour of the environment can be mapped. In some cases, multiple different types of sensors can be deployed, and sensor data from one sensor type can be combined with data from another sensor type. For example, consider the case where humidity measurements are taken from a plurality of locations. And further consider that temperature measurements are taken from the same or a different plurality of locations. The sensor data from the two different types of sensors can be combined to form (for example) a dew point alert. In some scenarios, sensor data from multiple different sensors, and/or multiple different types of sensors, can be combined (e.g., in a machine learning model) in a manner such that the sensors themselves and/or the processing on the cell phone can be improved. One such scenario is shown and described as pertains to FIG. 2F4.

FIG. 2F4 illustrates a system for updating sensor data collection and analysis capabilities. As an option, FIG. 2F4 may be implemented in the context of any one or more of the embodiments set forth in any previous and/or subsequent figure(s) and/or description thereof. Of course, however, the FIG. 2F4 may be implemented in the context of any desired environment. Further, the aforementioned definitions may equally apply to the description below.

As shown, the wearable device serves as a central sensor node $\mathbf{214}_{WEARABLE}$. Additionally (or alternatively as the case may be) the mobile phone serves as a central sensor node $\mathbf{214}_{PHONE}$. As such, any sensor information deriving from whatever types of sensors can be amalgamated by operation of any central sensor node $\mathbf{214}_{WEARABLE}$. Similarly, any sensor information deriving from whatever types of processing on the cell phone can be amalgamated by central sensor node $\mathbf{214}_{PHONE}$. In some situations, a plurality of sensors can self-assemble into a spontaneously-formed ephemeral mesh network, and any individual sensor or its respective host can self-negotiate among other individual sensors or their respective hosts, one of which individual sensor or its respective host can be designated as a central node.

In the context of a mesh network, the semantic of a central node means that it may be able to communicate to both (1) proximal sensors, and (2) a cell phone node. With this semantic, there can be multiple central nodes in a given spontaneously-formed ephemeral mesh network. In various situations, a mesh configuration can be formed spontaneously. In some mesh topologies, multiple nodes of the mesh may be interconnected in the mesh, yet without a separate central sensor node. In topologies that do not have a separate central sensor node, any one of the nodes of the mesh can serve all or portions of the functions of a central sensor node. To do so, the nodes of the spontaneously-formed mesh may negotiate among themselves to determine respective roles and/or respective functional responsibilities until at least one of the nodes of the spontaneously-formed mesh agrees to initially take on the central sensor node role. This mesh architecture may allow sensor nodes not only to communicate directly with a mesh node serving as a central sensor node but also to communicate through intermediate mesh nodes (such as the other edge sensors of the spontaneously-formed mesh), thus creating multiple communication paths. Mesh nodes can be spontaneously added, and mesh nodes can be spontaneously removed from the mesh. Moreover, at least inasmuch as individual nodes of the mesh can be configured to perform certain functions even after the mesh has been spontaneously formed, and at least inasmuch as individual nodes of the mesh can be reconfigured based on information derived from one or more instances of sensors-as-a-service platforms. In the sense that a spontaneously-formed ephemeral mesh network can be configured on the fly and reconfigured on the fly (e.g., dynamically reconfigured based at least in part on peer node functions and/or dynamically reconfigured based on information derived from one or more instances of Internet fog middleware platforms), such a spontaneously-formed ephemeral mesh network may be called a “smart fog fabric”.

Further, the smart fog fabric (comprising sensors configured in a spontaneously-formed ephemeral mesh network) may be quickly deployed. For example, the smart fog fabric may provide an adaptable communication infrastructure for disaster response efforts, large-scale events, or scenarios where traditional communication infrastructure may be unavailable or unreliable. Additionally, in the embodiment where the smart fog fabric is deployed for a specific need or circumstance, once the temporary need is fulfilled, the smart fog fabric can dissolve, and the sensor nodes return to their standalone or connected state.

As a specific example, a group of individuals may attend a large outdoor event (such as a music festival or a protest). In this setting, participants may have smartphones, wearables, sensors, and/or other wireless devices. These devices may form a spontaneously generated ephemeral mesh network. As people move within the event space, their devices can establish direct connections with nearby devices, creating a mesh of interconnected nodes. Each device in the network may act as both a user’s device and a potential relay point for data to hop across the mesh. Messages and data (including sensor data) can be passed from one device to another, and the network may adapt as people move around or join/leave the area. As such, the smart fog fabric may be used to facilitate communication, information sharing, relaying of sensor information, and/or coordination among participants without relying on a centralized infrastructure. Once the event concludes or the need for the network diminishes, the connections between devices gradually dissolve, and the network may disband. The smart fog fabric therefore may adapt to the devices, users, location, functionalities involved and allow for enhanced connectivity (compared to typical traditional network architecture systems).

As such, in one embodiment, as devices interact with the sensors, software configuration may also be downloaded allowing the device to interact with other devices in a peer-to-peer configuration (including probing other devices, creating ad-hoc network configuration, etc.). In one embodiment, such downloading of software and/or information may be in connection to a user granting privileges or permission for such use of the device in connection with the sensor and/or other devices. Further, as explained hereinbelow, the devices may be configured to operate as virtual machines such that capabilities and/or resources may be clustered as needed, while maintaining privacy and data security of each individual device. Additionally or alternatively, the devices may execute virtual machines such that capabilities and/or resources may be clustered as needed, while maintaining privacy and data security of each individual device. Further, in various embodiments, the smart fog fabric may be used to create an instant, transient service instance (e.g., pertaining to particular sensor usage, or pertaining to a particular analytical capability, etc.). Additionally, the smart fog fabric may be configured to be searchable (for devices, capabilities, functions, etc.).

Again referring to scenarios where sensor data from multiple different sensors, and/or multiple different types of sensors are combined (e.g., in a machine learning model) in a manner such that the sensors themselves and/or the processing on the cell phone can be improved, it should be noted that multiple bits of sensor data can be combined on the cell phone. It is also possible that multiple bits of sensor data can be combined in cloud 2F316. Results of combining and analyzing multiple bits of sensor data (e.g., from different sensors) can sometimes be used to improve the performance of a sensor. To explain, some sensors are passive in the sense that they are not powered by a dedicated power source (e.g., to power a microcontroller or similar logic). However some sensors are active in the sense that they can compute autonomously. In this latter case, the sensors themselves can receive executable code (and data) that improves that sensor's detection capabilities. Processing in constituent computing resources of the cloud (e.g., backend 2F420) can be carried out such that, based at least in part on analysis of field-collected sensor data 2F422, wireless downlink communication 2F418 can be delivered to one or more cell phones and/or to one or more wearables, and/or to one or more sensors. This then establishes four tiers of processing where sensing data can be collected and/or analyzed: (1) at/by a sensor, (2) at/by a wearable, (3) at/by a cell phone, and (4) at/by backend processing. Of course, it is to be appreciated that any number of sensors, wearables, and/or devices may be combined in any manner.

The operations of FIG. 2F3 can precipitate the operations of FIG. 2F4. More particularly, it can happen that the uploaded information of operation 4 is, or can be, combined, to represent field-collected sensor data 2F422 (operation 5). Such field-collected sensor data can be processed in backend 2F420 so as to generate AI-generated revised detection modules 2F424 (operation 6). Those modules in turn can be emitted by the cloud in the form of wireless downlink communication 2F418, which can be received, directly or indirectly, by central sensor node $\mathbf{214}_{PHONE}$ and/or by a central sensor node $\mathbf{214}_{WEARABLE}$, and/or by an autonomous sensor (operation 7). The foregoing operations 1 through 7 can be modified so as to implement an early warning application within the sensors-as-a-service ecosystem. Such an early warning application within the sensors-as-a-service ecosystem is shown and described as pertains to FIG. 2F5.

FIG. 2F5 illustrates an edge device application within a sensors-as-a-service ecosystem. As an option, FIG. 2F25 may be implemented in the context of any one or more of the embodiments set forth in any previous and/or subsequent figure(s) and/or description thereof. Of course, however, the FIG. 2F5 may be implemented in the context of any desired environment. Further, the aforementioned definitions may equally apply to the description below.

In this example use case, analyte sensors and analyte concentration data are processed by edge devices. If there is reason for alarm, then an alert is emitted by one or more of the edge devices (operation 8) where the alert includes an analyte fingerprint 2F532, possibly with one or more classifications of and/or other information pertaining to the analyte. Operations within cloud 2F316 serve to assess the danger and, in turn, operations within the cloud will generate individual warnings 2F534 and issue corresponding alerts (operation 9), which individual warnings 2F534 are sent to a selected set of edge devices (e.g., mobile phone $\mathbf{2F312}_1$, mobile phone $\mathbf{2F312}_2$, mobile phone $\mathbf{2F312}_3$) as early warnings (operation 10). This is of particular value at least in that, as shown, a single unknowing scout 2F524, or more particularly, any number of sensors associated with the unknowing scout, may classify the analyte as worthy of raising an early warning beacon. This in turn results in a warning that is sent for the benefit of all cell phones (and their respective users) that are within an alert radius 2F528, the warning being not to proceed into an area corresponding to the unsafe radius 2F526. There may be further edge devices and/or cell phones (e.g., mobile phone $\mathbf{2F312}_4$, mobile phone $\mathbf{2F312}_5$, mobile phone $\mathbf{2F312}_6$) that are away from the unsafe centroid 2F522. When these edge devices and/or cell phones can be deemed to be at or farther away from the unsafe centroid (e.g., at or beyond the safe radius 2F530), then those edge devices and/or cell phones need not be alerted (operation 11). The determination of safe or unsafe may involve comparing the analyte fingerprint 2F532 and accompanying concentration data to one or more calibration points 2F536. The calibration may include one or more thresholds that correspond to a safe distance.

The foregoing example is presented here merely for illustration and other simpler and/or more complex applications within a sensors-as-a-service ecosystem can be conceived. Considering that the data from each individual sensor has value, it follows that a deployer (e.g., a cell phone deployer) can motivate a cell phone user to subscribe to the deployer's sensors-as-a-service subscription plan. Additionally or alternatively, the cell phone deployer can send commands (e.g., a variation of commands 281 of FIG. 2F2) to the edge devices to cause them to carry out activities that are described in or referenced in the commands. Additionally, this sensors-as-a-service ecosystem may allow a variety of schemes and/or scenarios, including but not limited to, one where a user may earn a monthly subscription service credit (and/or otherwise accrue all or a portion of a subscription credit) by acting as deployer of a provider's plan. As an option, the user and the provider may engage in revenue sharing. In such a case, the provider offers remuneration to the user in exchange for the user's willingness and/or actions to carry out activities that are described in the provider's plan and/or referenced in commands 218.

Additionally, as described herein, the commands may correspond with instruction(s) sent from the cloud sensor resources 212, the sensor update server 274, and/or the sensors-as-a-service platform 280 described herein.

It is to be appreciated that the commands may be sent by a variety of sources (e.g. cell phone deployer, cell phone network provider, etc.). Further, the process of sending commands to edge devices may originate from any source and/or involve any network architecture, such as a cellular network infrastructure, internet of things networks (LP-WANs), industrial control systems (SCADA), smart grids (control and/or monitoring of smart edge devices), smart cities infrastructure (commands sent between a central management system and smart edge devices), satellite networks, mesh networks, vehicular networks, etc.

In one embodiment, any of these sources and/or network architectures may allow a remote source to efficiently control and optimize the performance of deployed devices (including sensors), ensuring seamless updates, configurations, and overall network management.

Further, the commands as disclosed herein may relate to multiple entities, users, and/or devices, including users/owners of portable/mobile devices, entities that operate a services-as-a-service platform, entities that are associated with the services-as-a-service platform (advertisers, collaborators, API developers, etc.), etc. In this manner, commands may be used to control and/or manage an aspect of a sensors on the sensors-as-a-service platform 101, and may additionally be used to control the relationship of a device that accesses such sensors and how that relationship relates to other devices, operators, and entities. More specifically, commands once acted upon by the recipient (e.g. user, device, etc.) may cause collection of data (e.g. by the sensors-as-a-service platform) in accordance with the commands.

FIG. 2F6 illustrates how Internet fog middleware platforms communicate with a sensors-as-a-service platform. As an option, FIG. 2F6 may be implemented in the context of any one or more of the embodiments set forth in any previous and/or subsequent figure(s) and/or description thereof. Of course, however, the FIG. 2F6 may be implemented in the context of any desired environment. Further, the aforementioned definitions may equally apply to the description below.

The first tier 291 is composed of any number of mobile phones. The second tier 292 is composed of any number of Internet fog middleware platforms, and the third tier 293 is composed of at least one sensors-as-a-service platform component. As depicted, a fourth tier 296 is composed of any number of producers (e.g., the shown "ADMIN" user and "CROWD" users) who produce contributions (e.g., contribution 2F624, contribution 2F6242) such as library components (e.g., libraries 220), data, and other resources (e.g., resources 218). Strictly as examples, such resources might be "apps" (e.g., that can execute on an Internet fog middleware platform or on a mobile phone), or such resources might be virtual machine code (e.g., that can execute on an Internet fog middleware platform or on a mobile phone), or such resources might be executable containers (e.g., that can execute on an Internet fog middleware platform or on a mobile phone). As can now be understood, sensors-as-a-service platform 101 can perform both as a participant in the ecosystem as well as an overseer over the constituents of the Internet fog (e.g., Internet fog middleware platform $\mathbf{223}_1$, Internet fog middleware platform $\mathbf{223}_2$). The Internet fog platforms can be implemented using any computing capability, however in exemplary embodiments, the Internet fog middleware platforms are pre-existing networking equipment (e.g., routers, gateways, bridges, switches, combinations thereof, etc.), which pre-existing networking equipment can be configured to accept downloaded bits in the form of code and data. It is to be appreciated that any network configuration and/or architecture may be implemented consistent with the FIG. 2F6. For example, the Internet fog middleware platforms may include various types of decentralized and distributed resources that collectively contribute to edge computing, such as computing nodes, storage devices, and networking components (which may be strategically positioned closer to the edge of the network). Further, the Internet fog middleware platforms may leverage local servers, edge devices, and cloud resources to process and store data near the source, reducing latency and improving overall system efficiency. Additionally, communication resources such as picocells, femtocells, and hotspots may extend network coverage and connectivity to localized areas. Moreover, data from picocells, femtocells, and/or hotspots may be more granular than data collected from other sources. Sensors and actuators embedded in IoT devices may further enhance the Internet fog middleware platform infrastructure by facilitating real-time data collection and control at the network's edge. This amalgamation of computing, storage, communication, and IoT resources forms a dynamic and responsive Internet fog middleware platform layer, optimizing the performance of applications and services, such as by providing low latency and high responsiveness.

In the particular example of FIG. 2F6, the pre-existing networking equipment is configured to accept downloaded bits in the form of downloadable modules (e.g., virtual machines, virtual machine metadata, executable containers, etc.). As such, the sensors-as-a-service platform 101 can configure any number of Internet fog middleware platforms that can be configured at will merely by providing one or more downloadable modules (e.g., downloadable modules 2F6141, downloadable modules 2F6142), and/or commands (e.g., commands 2811, commands 2812). Moreover, the sensors-as-a-service platform 101 can reconfigure any number of Internet fog middleware platforms, merely by providing updated (or different) downloadable modules to the constituents of the second tier 292. In some situations, the middleware serves to federate constituent devices of the third tier 293 such that a particular instance of a downloadable module can be re-coded by the middleware in order to make the downloadable module compatible with the particular hardware and/or software configurations of the constituent devices of the third tier 293.

It is to be appreciated that, at a minimum, two virtualization technologies facilitate ease of deployment of executable code is the virtual machine (VM) and the executable container (EC). An EC has the characteristic of needing merely compatible hardware (e.g., corresponding to the executable code). A VM has the characteristic of executing under a platform-specific hypervisor. As such, so long as a particular platform is able to host an original or ported version of a hypervisor, the VM can run on that platform, nearly irrespective of the hardware and/or software configuration of the particular platform. These characteristics make it practical for a computing entity such as the sensors-as-a-service platform to configure a computing entity amalgamation (e.g., ephemeral computing cluster 2F630) that is composed of any number of mobile devices (e.g., mobile phones and/or laptops, sensors, and/or wearable devices). In some cases two or more mobile devices (e.g., mobile phone 2F$\mathbf{312}_1$, mobile phone 2F$\mathbf{312}_2$) comprise a computing cluster (e.g., ephemeral computing cluster 2F630) wherein the particular two or more mobile devices communicate with each other over a peer-to-peer wireless communications channel.

Now, consider the shown ephemeral computing cluster 2F630. Observe that the ephemeral computing cluster is composed of two nodes (first ephemeral cluster node $\mathbf{282}_1$ and second ephemeral cluster node $\mathbf{282}_2$). Now further observe that a first VM (or a first alternative VM) can be hosted in the mobile phone that forms at least a portion of the first ephemeral cluster node $282_1$, and that a second VM (or a second alternative VM) can be hosted in the mobile phone that forms at least a portion of the second ephemeral cluster node $282_2$. It now emerges that an ephemeral computing cluster of any arbitrary node size (e.g., involving any number of mobile phone nodes and/or any number of Internet fog middleware platforms) can be spontaneously formed by executing a downloadable module onto an arbitrary number of nodes.

It is to be appreciated that use of any number of VMs may be configured to ensure data security and privacy. For example, a multi-tenant VM environment may include multiple independent users, entities, devices, etc. A virtualization platform may allow for creation of multiple VMs, where each VM may act as a separate, self-contained instance. In this manner, each user, entity, device, etc. may include its own set of VMs, operating systems, applications, and data, which in turn may be isolated from another user, entity, device, etc. As a specific example, a first user may have sensor data relating specifically to the first user, and a first VM may be associated with the first user. A second user may have sensor data relating specifically to the second user, and a second VM may be associated with the second user. The first VM and the second VM may be combined to form an ephemeral cluster node, while maintaining the privacy and data security of each of the individual VMs. Of course, it is to be appreciated that other arrangements may be envisioned (such as where the same entity is associated with the first device and any number of other devices, or hundreds of devices where each device is associated with a separate user/entity, etc.). As such, a multi-tenant system using the multiple VMs are envisioned to be compatible with FIG. 2F6.

Any of the foregoing arbitrary number of nodes of FIG. 2F6 can be interconnected—to carry out inter-node cluster communications—over a peer-to-peer wireless communication channel (e.g., the shown P2P wireless communication channel). Specifically, any arbitrary number of mobile phones can be interconnected—to carry out inter-node cluster communications—by relying on one or more middleware agents (e.g., the shown Internet fog middleware platform $223_1$, the shown Internet fog middleware platform $223_2$, etc.). The foregoing inter-node cluster communications may include commands (e.g., add to cluster, delete from cluster, etc.) as well as data (e.g., cluster data 2F$620_1$, cluster data 2F$620_2$, cluster data 2F$620_N$).

Those of skill in the art will recognize that the downloadable module(s) to be executed on the arbitrary number of mobile phones that form the cluster might include a code in the form of executable containers (e.g., Docker containers) as well as a cluster management code (e.g., Kubernetes code). Such codes can be configured to facilitate cooperation between nodes. In fact, certain executable code can be configured to facilitate specific types of cooperation between nodes so as to implement a multi-node application. Strictly as one example, a multi-node application might involve exchanging sensor data between cluster nodes so as to produce a correspondence (e.g., a map) between a particular mobile phone's characteristics (e.g., location) and corresponding sensor data taken while involving that characteristic. In some embodiments, a map of analyte concentrations over an area can be formed based on a plurality of pairs of concentrations and respective locations.

In some situations, field-collected sensor data can be processed in the ephemeral computing cluster nodes themselves and/or by an Internet fog middleware component, and/or by an instance of the sensors-as-a-service platform computing agents. In some situations it may be convenient for an instance of the sensors-as-a-service platform computing agents to carry on I/O (e.g., uplink packets of I/O 2F$612_{UP}$, downlink packets of I/O 2F$612_{DOWN}$) with the crowd-sourced contribution repository 2F610. In some cases such I/O includes cluster data from the ephemeral computing cluster, which can be stored in the crowd-sourced contribution repository as received cluster data 2F$620_s$.

Received cluster data might be downloaded from the crowd-sourced contribution repository at a later time. As merely one example, if the received cluster data 2F$620_s$ includes a map that correlated between a particular mobile phone's location and gathered sensor data, then it might be that an application running on the sensors-as-a-service platform computing resources and/or running on the Internet fog middleware platform resources and/or running on an instance of one or more ephemeral computing clusters might avail of the received cluster data 2F$620_s$ in order to generate individual warnings and issue corresponding alerts that are sent to a selected set of mobile phones.

Although the foregoing discussion pertaining to the example ephemeral computing cluster mentions implementation of ephemeral cluster nodes using mobile phones, additional ephemeral cluster nodes can be implemented using a laptop (which is generally mobile) and/or using a wearable, any other mobile device (e.g. tablet, vehicle, etc.), and/or any combination therefrom. Further, when an ephemeral computing cluster is composed of heterogeneous nodes (e.g., some nodes being a mobile phone, some nodes being a laptop, some nodes being a wearable, etc.) it can happen that computing code running on the sensors-as-a-service platform and/or running on the Internet fog middleware platform can download specific modules to specific nodes, where the determination of what particular module to download to what particular heterogeneous node can be made based at least in part on the capability (e.g., computing capability, sensing capability) of a particular target heterogeneous node.

In some embodiments, the sensors-as-a-service platform running on an Internet fog middleware platform views the crowd-sourced contribution repository as a data mart into which any sensor data or cluster data can be stored. In some embodiments, one or both of the sensors-as-a-service platform and/or the Internet fog middleware platform can cause an ephemeral cluster data node to perform a particular query over its sensor data. Such a query might specify a particular time period, and/or might specify a range of values, and/or it might specify a particular desired format for the query results. Furthermore, all or part of the query processing, including formatting, can be carried out within a query server (e.g., query server module 2F$626_1$, query server module 2F$626_2$). In some embodiments, one or more query server modules are connected, directly or indirectly, to a corresponding set of local sensor systems (e.g., local sensor systems 2F$627_1$, local sensor systems 2F$627_1$). Such local sensor systems may comprise active sensor systems (e.g., active sensor systems having sensors that are powered by a local power source) or passive sensor systems (e.g., passive sensor systems that include passive sensors such as high frequency resonant sensor structures, medium frequency split ring resonators, etc.). In these and other cases, the query server module is configured to accommodate any of (1) requests for sensor data (e.g., queries), (2) requests to take sensor readings, either pertaining to a particular moment in time, or pertaining to a type of reading, and (3) maintaining a cache of queries, query results, and/or sensor readings. As such, the spontaneously-formed mesh can be configured to be searchable, with search scope reaching down to a particular node or down to a particular group of nodes, or with search scope encompassing multiple computing entities that are distributed across multiple tiers (e.g., first tier 291, second tier 292, third tier 293, fourth tier 296, etc.).

In various embodiment, it may be advantageous for the crowd-sourced contribution repository to contain as much sensory information as possible. Accordingly, any ephemeral cluster node can be configured to collect sensor data from its location and then upload such data to the crowd-sourced contribution repository. As shown, ingress modules (e.g., ingress module 2F628$_1$, ingress module 2F628$_2$) serve to cause the ephemeral cluster node to initiate the first hop by packaging locally-collected sensor data for transmission to the sensors-as-a-service platform. In some cases, locally-collected sensor data is processed (e.g., classified) using the computing resources of the ephemeral cluster node. In other cases, locally-collected sensor data is processed (e.g., classified) using the computing resources of an Internet fog middleware platform. In still other cases, locally-collected sensor data is processed (e.g., classified) using the computing resources of the sensors-as-a-service platform. In still other cases, an ephemeral cluster node performs a first processing (e.g., classification), and an Internet fog middleware platform performs a second processing (e.g., further classification), and a sensors-as-a service platform performs a third processing (e.g., still further classification).

It is to be appreciated that the processing (such as by the first tier 291, the second tier 292, the third tier 293, and/or the fourth tier 296) may be dependent, in one embodiment, on the type of mobile device used. For example, as described hereinabove, the first ephemeral cluster node 282$_1$ may include the mobile phone 2F312$_1$. However, the device may include any portable device capable of being mobile or moved. For example, in one embodiment, the devices may include a foldable display which are designed to provide users with larger screen real estate when unfolded, offering a tablet-like experience. Foldable laptops may be similarly designed to create a compact device that unfolds into a full-sized display. It is to be appreciated, therefore, that any type of portable device may be used, including, but not limited to, smartphones, tablets, laptops, 2-in-1 convertibles, ultrabooks, e-book readers, fitness trackers, smartwatches, wireless earbuds, etc.

Further, in one embodiment, the processing (such as by the first tier 291, the second tier 292, the third tier 293, and/or the fourth tier 296) illustrates that multiple entities may desire to have access to the sensor data. For example, a sensor operator may receive the sensor data from the sensor. As discussed herein, the sensor data may include data originating from sensing elements (e.g. analyte detection, split ring resonator, etc.) as well as data peripherally associated with the sensor (e.g. location, position, velocity, acceleration, etc.). The sensor operator may barter either or both of such data to other third parties as needed. As an example, the sensor data may include detected concentrations of carbon monoxide within a tunnel full of cars. Such sensor data may include a location of the detected concentration. This sensor data may be provided to a map provider to alert drivers of detected traffic. Additionally, the sensor data including the levels of detected concentrations of carbon monoxide may be provided to a government agency and/or a private party that has oversight of the tunnel (to enable them to increase the fan speed to clear out the detected concentration of carbon monoxide). Further, the sensor data may be provided to an entity associated with a smartwatch such that users in the area (such as those running and/or walking) may receive an alert to avoid the tunnel due to the detected concentration levels of carbon monoxide. In this manner, a barter system of sensor data may be used between the sensor operator and multiple entities to tailor an experience for many individuals that may be impacted by the detected concentration levels of carbon monoxide.

FIG. 2F7 illustrates how local sensor systems communicate with a sensors-as-a-service platform as well as how local sensor systems communicate with other third parties. As an option, FIG. 2F7 may be implemented in the context of any one or more of the embodiments set forth in any previous and/or subsequent figure(s) and/or description thereof. Of course, however, the FIG. 2F7 may be implemented in the context of any desired environment. Further, the aforementioned definitions may equally apply to the description below.

In the present architectural configuration, the first tier 291 includes mobile phone 2F312$_3$, which is interfaced to one or more local sensor systems 2F627$_3$ as well as to one or more other data generating systems 2F629. Any data collected by the one or more local sensor systems can be provisioned to a permissioned third party 297. Separately, possibly using alternate and/or customized communication systems (as shown), data from the other data generating systems can be provisioned to a third party provider 298. Data collection modules 283 (e.g., software or hardware, or a mix of hardware and software) that are owned/operated/maintained by either the permissioned third party 297 and/or that are owned/operated/maintained by the third party provider 298 can be deployed at any level, and into any applicable host device. As depicted in FIG. 2F7, data collection modules 283 that correspond to the permissioned third party 297 and/or to the third party provider 298 can be deployed in the first tier 291. This corresponds to the situation where the data collection modules 283 are deployed on devices that are proximal to one or more mobile phones (e.g., other mobile phones, hotspot devices, field-deployable sensor interrogators, etc.). Additionally or alternatively, data collection modules 283 that correspond to the permissioned third party 297 and/or to the third party provider 298 can be deployed in the second tier 292 (e.g., as data collection modules embodied in an Internet fog device), and/or data collection modules that correspond to the permissioned third party 297 and/or to the third party provider 298 can be deployed in the third tier 293 (e.g., as data collection modules embodied in operational components of a sensors-as-a-platform).

Irrespective of the particular deployment of data collection modules (e.g., irrespective of which tier of deployment, or which type of device is used in the deployment, etc.), a permissioned third party 297 and/or a third party provider 298 can provide information to the sensors-as-a-service platform 101. Additionally or alternatively, a permissioned third party 297 and/or a third party provider 298 can provide information directly to data consumers 299. In some cases (e.g., as shown and discussed as pertains to FIG. 2F6), the sensors-as-a-service platform 101 stores data within crowd-sourced contributor repository 2F610, and such data within the crowd-sourced contributor repository 2F610 can be made available to said data consumers (including the data consumers 299).

The shown arrangement of the tiers (e.g., first tier 291, second tier 292, third tier 293 or fourth tier 296) is merely for purposes of illustration. In some cases, data from any tier can be communicated to any other tier. For example, one or more of the local sensor systems 2F627$_3$ can be communicated directly (e.g., without necessarily having to traverse through any other particular tier) to any recipient (e.g., to any data consumer).

The foregoing architecture may be suited to facilitate processing of sensor data by one or more downstream systems before such data is delivered to data consumers. In some cases, and at least inasmuch as mobile phone 2F312$_3$ is able to interface to both the local sensor systems 2F627$_3$ as well as other data generating systems, it can happen that sensor data is intermixed with non-sensor data. For example, sensor data such as a measured concentration level of a particular analyte can be combined with non-sensor data such as a device information (e.g., device type="Pro Max phone", operating system="version 17.1.12", a device serial number, an international mobile equipment identifier, a user identification code, etc.). As another example, sensor data such as a measured concentration level of a particular analyte can be combined with non-sensor data such as interest tracking information (e.g., browser version, beacon identifier, Internet search history, click history, purchase history, IP addresses used during browsing, etc.). In some cases, sensor data is combined with non-sensor data (e.g., by a permissioned third party) even before the non-sensor data is communicated to any third party provider. For example, and referring to sensor data collected from an electromagnetic state sensing device (EMSSD), the sensed data (e.g., the state or quantity of a product in a container) can be combined with a user's then-current search history and then transmitted to a permissioned third party-even before any other entity (i.e., any other entity other than a permissioned third party) receives the data combination. This sets up the scenario where fine-grained replenishment of a product can be carried out. This scenario advances fulfillment technologies, at least in the sense that a product can be replenished based on an actually-measured usage pattern, rather than on an estimated time-based usage pattern.

In various embodiments, therefore data may be received at a sensors-as-a-service platform. Such data may be analyzed to determine source of the data (e.g. sensor data, sensor peripheral data, non-sensor data, etc.), intended destination, potentially relevant entities, etc. Responsive to such determination, the data may be segmented and/or otherwise separated. Further, a subset (and/or multiple subsets) of the data may be sent to one or more relevant entities. In one embodiment, the subset of data may be configured to relate specifically to a particular entity. In this manner, a first subset of data may be partitioned so as to comport with interfacing requirements of a service that provides customization and/or personalization back to the user (e.g. location data, map information, ad placement, ad selection, configuration of smartphone and/or smartwatch, etc.). A second subset of data may be partitioned so as to comport with interfacing requirements of a second service that provides fulfillment back to the user (e.g. a trigger-based-action that automatically orders more milk when it is sensed your milk is getting low, a trigger-based-action that a toothbrush has exceeded its effective period of use, etc.). In this manner, subsets of data may be allocated to a particular entity for use in replenishment/fulfillment, automatic upsizing or downsizing, recommending alternatives, etc. Further, the data (and/or a subset of data) may be bartered to other third parties (which may be competing for screen time with the user, personalization of the device, etc.).

Some embodiments of any one or more of a sensors-as-a-service platform, and/or any one or more Internet fog middleware platforms, and/or any one or more edge devices (e.g., a cell phone and/or; a mobile device 2F312, 2F312$_{1-4}$, and/or 15A06; a wearable edge device including one or more sensors, a watch, a health fitness tracker, smart glasses, wearable cameras, smart clothing, etc.) may be configured, singly or in combination, to facilitate privacy-preserving operations. Strictly as one example, any one or more of the computing entities of the sensors-as-a-service ecosystem can be configured to carry out one or more steps that lead to data being shared under a privacy scheme. Such a privacy scheme can be implemented in correspondence to a particular degree of privacy. In some cases, the technology known as "differential privacy" can be implemented in whole or in part by any one or more of the computing entities of the sensors-as-a-service ecosystem. Still more particularly, any one or more computing constituents (e.g., in hardware or in software or both) of either a permissioned third party 297 and/or of a third party provider 298 can implement all or portions of a differential privacy scheme.

The foregoing discloses multiple systems that include multiple computing entities, any individual one of the one or more computing entities can be configured as a wireless handheld server. Individual ones of the multiple computing entities, including a plurality of wireless devices can each initiate a protocol so as to spontaneously assemble nodes to form an ephemeral computing cluster, where each wireless device serves as a node of the spontaneously-formed ephemeral computing cluster. In various ephemeral cluster topologies, each individual node can (1) spontaneously configure itself as a wireless handheld server node, and (2) access any/all other wireless handheld server nodes. As such, any data present on any one of the nodes of an ephemeral computing cluster can be combined with any data present on any other one of the nodes of the ephemeral computing cluster. A wireless handheld server can receive commands in a sensors-as-a-service setting, and thereafter either choose to carry out actions pertaining to the received command or choose to decline to carry out such actions. In some situations, when declining to carry out a command, a particular node might autonomously nominate a proximally-located node (e.g., a different wireless handheld server of the ephemeral computing cluster). Any wireless handheld server can combine sensor data with non-sensor data in a manner that suits a particular data consumer (e.g., using a particular encryption technique, or using some particular differential privacy technique, or using some data format, or using some particular protocol, etc.).

As detailed herein, any type of cell phone and/or any type of mobile device may function as a wireless handheld server. Further, the cell phone and/or mobile device may function as a wireless handheld virtual machine (or host of virtual machines), a wireless handheld router, a wireless handheld hub, a wireless handheld repeater, and/or a wireless handheld networking router, either by itself or in combination with another device (including sensor devices).

It is to be appreciated that the specific terms, such as cell phone and/or mobile device, may refer to the same device, and the use of such terms within the present description may be interchangeable. Further, other terms, such as wearable edge device, may include any device capable of being worn and which has local processing capabilities. As such, a wearable edge device may include a sensor(s), watch, health fitness tracker, smart glasses, wearable cameras, smart clothing, etc. Further, an edge device may include any device which has local processing capabilities. A wireless handheld server may include at least one edge device and a network connection. Given the breadth of the disclosure contained herein, it is to be appreciated that other synonymous words (to those just briefly mentioned) may be included within such definitions, as appropriately applied. In this manner, if the term shares a similar meaning (and/or is used to convey a same or similar concept), it is to be appreciated that the definitions contained herein may apply to such similar term. As such, notwithstanding the differences of embodiments and contexts disclosed herein, terms which are used to express identical or near identical meanings (depending on the context of use) may be construed in a manner synonymous to the terms explicitly defined herein.

As can be seen from the foregoing, a sensors-as-a-service platform can amalgamate (1) data from any number of spontaneously-formed mesh networks (2) data deriving from the crowd-sourced contribution repository, and (3) data deriving from Internet fog middleware platforms. This data-rich and dynamically-changing environment facilitates myriad applications, some of which extract data or combinations of data (e.g., value) from the foregoing spontaneously-formed mesh networks, the crowd-sourced contribution repository, and the Internet fog middleware platforms. In this sense, the ecosystem as a whole is sometimes called a "multi-services ecosystem" or a "multi-services platform".

Figure 2G:
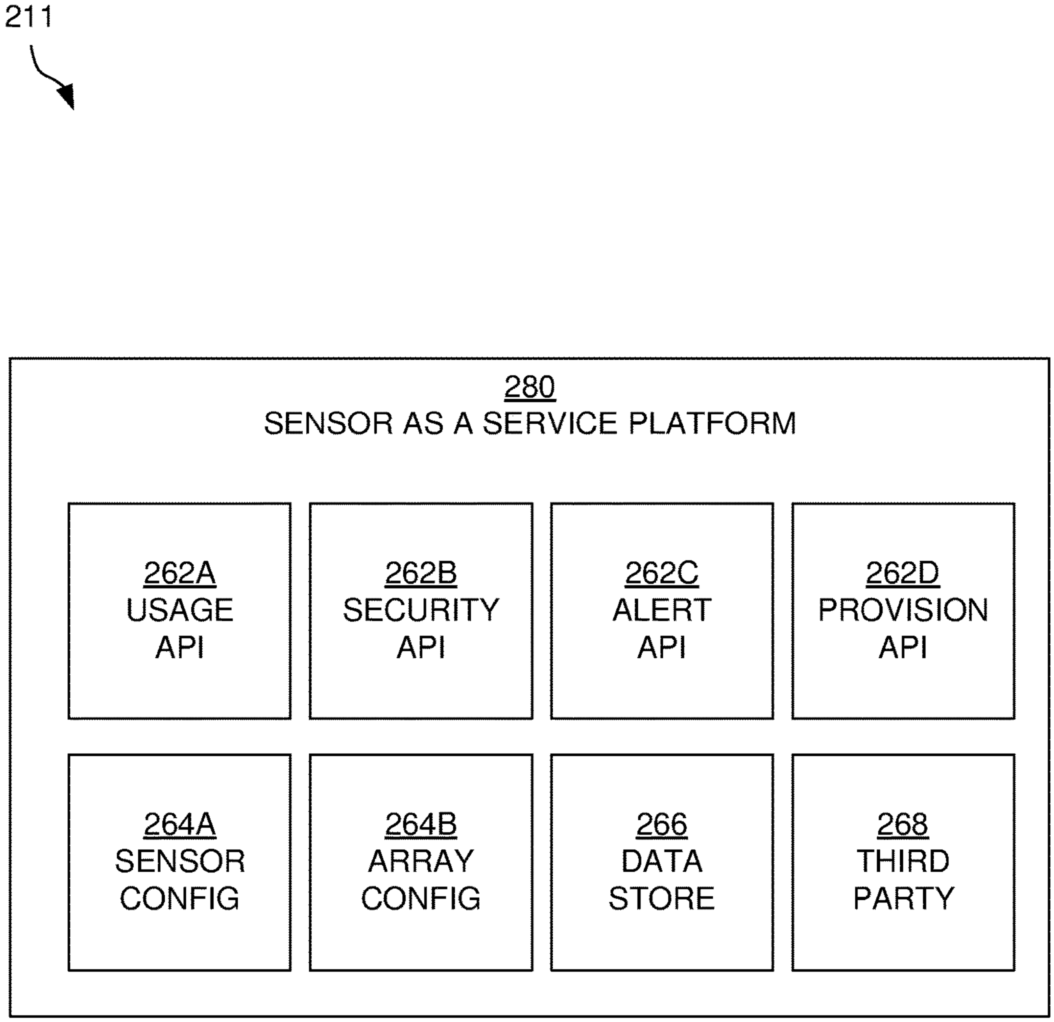
FIG. 2G illustrates a sensor as a service platform architecture, in accordance with one embodiment.

FIG. 2G illustrates a sensor as a service platform architecture 211, in accordance with one embodiment. As an option, the sensor as a service platform architecture 211 may be implemented in the context of any one or more of the embodiments set forth in any previous and/or subsequent figure(s) and/or description thereof. Of course, however, the sensor as a service platform architecture 211 may be implemented in the context of any desired environment. Further, the aforementioned definitions may equally apply to the description below.

As shown, the sensor as a service platform architecture 211 may include a variety of sub components of a sensor as a service platform 280, including usage API 262A, security API 262B, alert API 262C, and provision API 262D. Additionally the service platform 280 may include sensor configuration 264A, array configuration 264B, a data store 266, and third party resources 268.

With respect to the APIs 262A, 262B, 262C, and/or 262D, they may allow for the sensor as a service platform 280 to interoperate with a variety of services and components between various software applications and services. Additionally, each of the APIs 262A, 262B, 262C, and/or 262D may function as modular components (operating independent of the other APIs).

The usage API 262A may include a usage tracking or analytics API and may include an interface that allows developers to access and retrieve information about the usage patterns and metrics related to sensors associated with the sensor as a service platform 280. Additionally, the usage API 262A may allow for developers to integrate the sensor data into the developer's applications or systems for analysis, reporting, or to make informed decisions about the optimization and improvement of the sensors. Further, the usage API 262A may expose endpoints or methods to retrieve data such as the number of active sensors, the frequency of specific actions with sensors, sensor engagement metrics, and other sensor performance indicators.

The security API 262B may include protocols, tools, and definitions that enable developers to integrate security functionalities into their software applications or systems related to sensors associated with the sensor as a service platform 280. The security API 262B may be designed to provide standardized methods for implementing security measures, authentication, encryption, access controls, and other security-related features. Additionally, the security API 262B may include functionalities such as authentication and authorization mechanisms, encryption and decryption processes, secure communication protocols (e.g., TLS/SSL), intrusion detection and prevention, and tools for handling secure storage of sensitive information. It is to be appreciated that data originating from sensors associated with the service platform architecture 211 may be inherently private in nature (particularly with respect to data originating from biosensors, etc.). As such, the security API 262B ensures proper handling of sensitive data.

The alert API 262C may include a set of protocols and tools that allows developers to integrate notification functionalities into their applications or systems related to sensors associated with the sensor as a service platform 280. For example, alerts or notifications may inform users about events, updates, or important information related to a sensor. For example, a sensor may detect a change in environment and communicate such data to the user via the alert API 262C. In another embodiment, the service platform architecture 211 may determine that the sensor may be eligible for a software upgrade to unlock more features of the sensor, and may alert the user via the alert API 262C to inform them of how to upgrade their sensor. As such, this alert API 262C may include management of notifications, including specifying the type of notification (e.g., push notifications, in-app notifications, or email notifications), setting delivery preferences, managing user preferences for receiving notifications, managing "if then then that" action queues based on data obtained from the sensor, etc.

The provision API 262D may include protocols, tools, and methods that enable developers to automate the provisioning process of resources or services within an application or system related to sensors associated with the sensor as a service platform 280. The provision API 262D may include configuration, deployment, and management of resources such as servers, databases, user accounts, or any other components necessary for the operation of a software application. The provision API 262D provides a programmatic interface to create, modify, or delete these resources, streamlining the setup and maintenance procedures. Further, the provision API 262D may work in conjunction with the load balancer 204 to ensure proper management of platform resources. In one embodiment, the provision API 262D may provision resources, including creating virtual machines, setting up network configurations, allocating storage space, configuring software settings, etc. Additionally, the provision API 262D may be used to scale infrastructure (where resource can be dynamically allocated and de-allocated based on demand).

The sensor configuration 264A may assist with managing the setup, calibration, and customization of sensors deployed in the sensor as a service platform 280. The sensor configuration 264A may be use to ensure the proper functioning and optimal performance of sensors. Additionally, in one embodiment, users or system administrators may use the sensor configuration 264A to define various parameters and settings associated with the sensors. Further, the sensor configuration 264A may be used to calibrate (and/or fine-tune sensors), activate/deactivate, support sensor fusion (where multiple sensors may be integrated into a single device), define event triggering (based on defined conditions or events), log/record sensor data, etc. Further, the sensors-as-a-service platform 280 may include a diagnostics API (not shown) which may be used to check all edge sensor devices to ensure accurate functioning of such devices.

The array configuration 264B may function in a manner similar to the sensor configuration 264A but with respect to multiple sensors arranged as a sensor array (i.e., more than one sensor configured as a group). A sensor array may include a grouping based on proximity, classification (such as similar use or context), and/or any other defined metric for grouping sensors together.

The data store 266 may be used to collect, store, and manage data generated by sensors within the sensor as a service platform 280. The data store 266 may be optimized to handle large volumes of sensor data, offering mechanisms for rapid data ingestion, retrieval, and analysis. Additionally, it may provide a structured environment where sensor readings, measurements, and metadata can be organized and stored for historical analysis, real-time monitoring, or future reference.

In various embodiments, the data store 266 may allow for time-series data modeling (such as chronological representation of sensor readings). Additionally, it may incorporate features such as indexing, compression, and aggregation to optimize storage efficiency and enable quick query responses. In one embodiment, the data store 266 may be integrated with analytics tools or visualization platforms to derive insights from the sensor-generated information.

The third party resources 268 may provide external tools, services, or components that enhance the capabilities and functionalities of sensors within the sensor as a service platform 280. For example, the third party resources 268 may include specialized sensor modules, data analytics services, cloud-based storage solutions, communication protocols which can used by external third parties to complement the base APIs and components of the sensor as a service platform 280

Figure 2H:
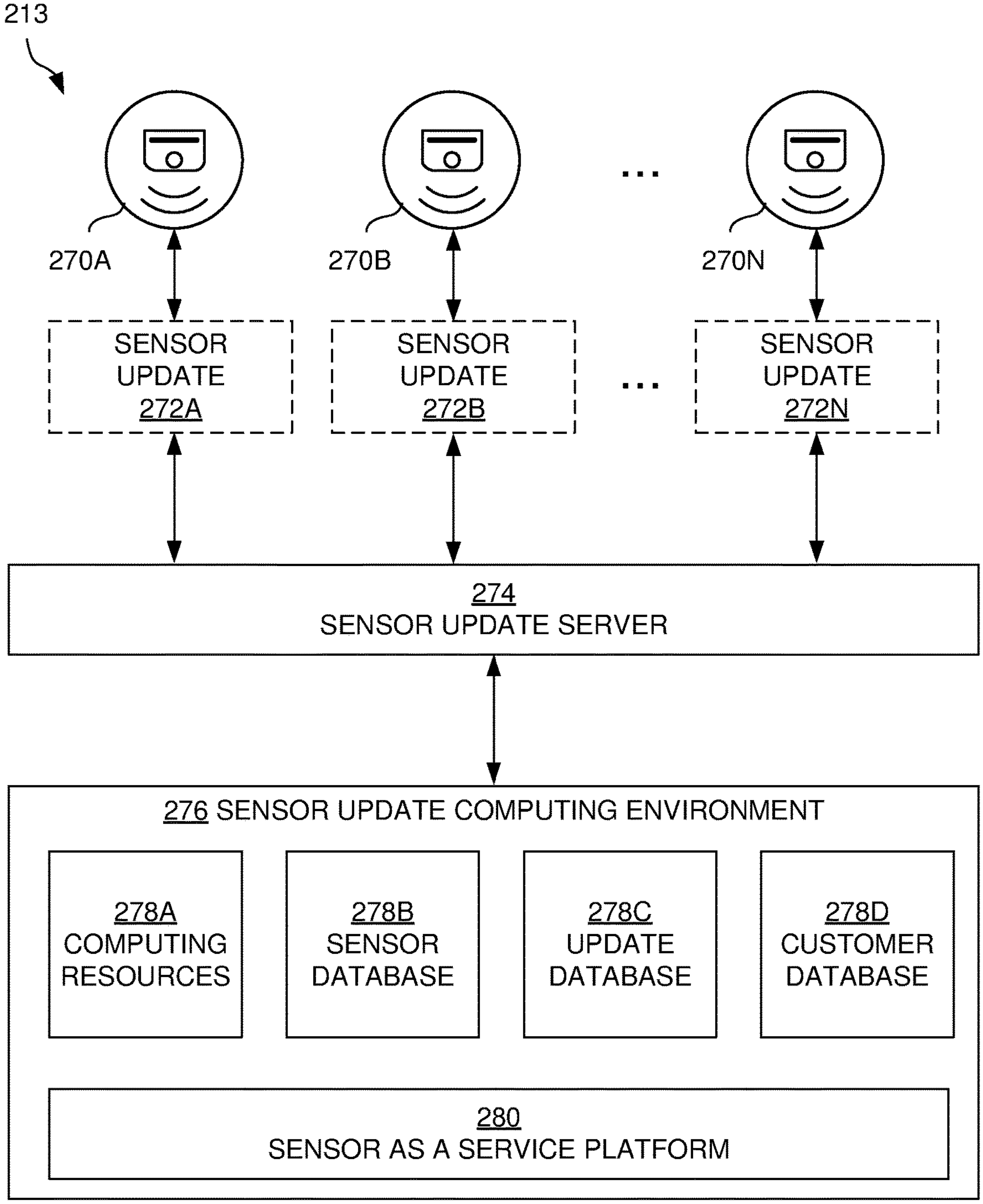
FIG. 2H illustrates a platform architecture for sensor updates, in accordance with one embodiment.
Figure 2I:
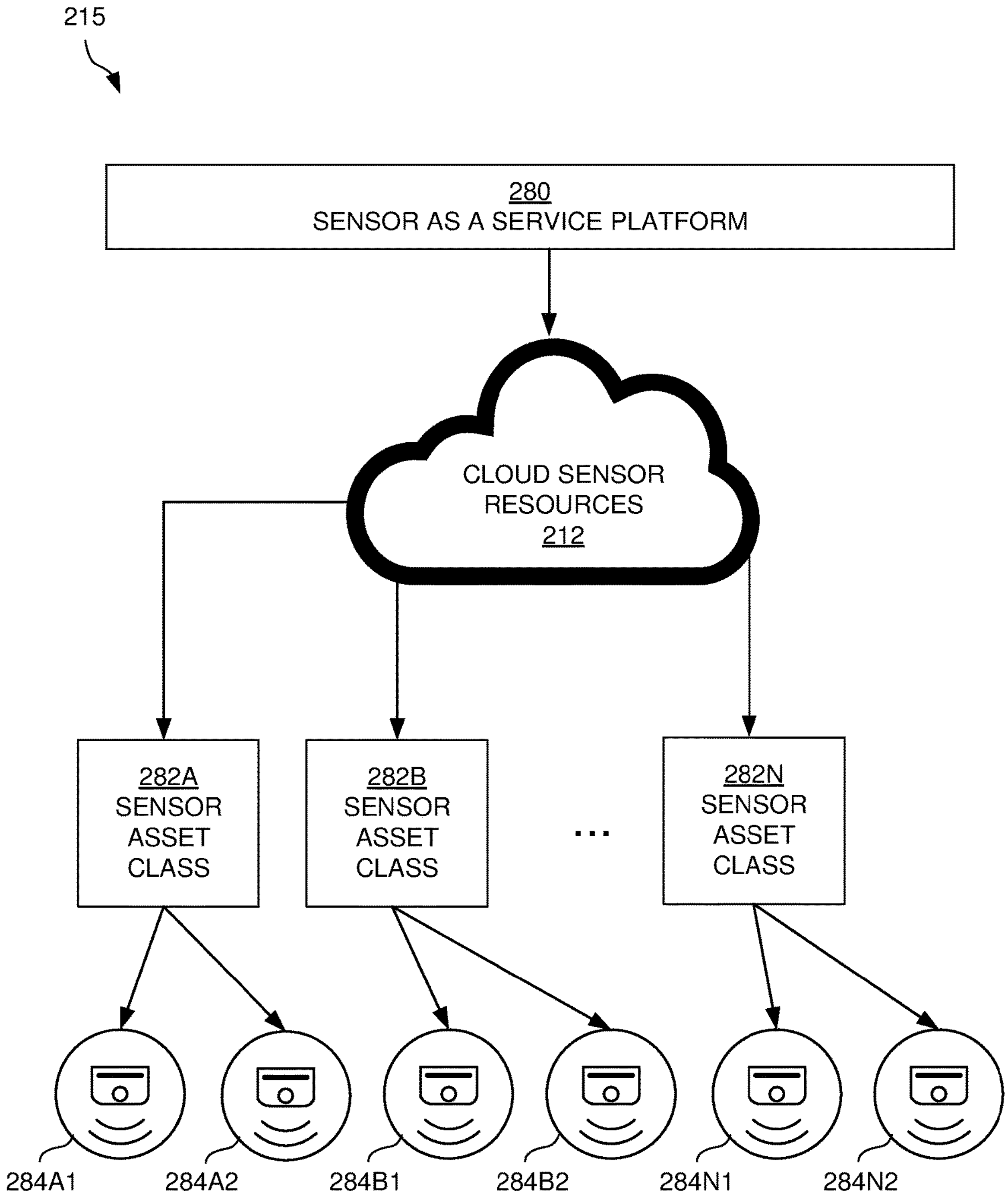
FIG. 2I illustrates a sensor class architecture, in accordance with one embodiment.

FIG. 2H illustrates a platform architecture 213 for sensor updates, in accordance with one embodiment. As an option, the architecture 213 may be implemented in the context of any one or more of the embodiments set forth in any previous and/or subsequent figure(s) and/or description thereof. Of course, however, the architecture 213 may be implemented in the context of any desired environment. Further, the aforementioned definitions may equally apply to the description below.

As shown, the architecture 213 may include a process for updating sensors. For example, the sensor update computing environment 276 may communicate with a sensor update server 274, which in turn may propagate the sensor update (shown as sensor update 272A, sensor update 272B, and sensor update 272N) to the sensor (shown as sensor 270A, sensor 270B, and sensor 270N). Additionally, the sensor update computing environment 276 may include subcomponents including computing resources 278A, sensor database 278B, update database 278C, customer database 278D, and/or the sensor as a service platform 280.

It is to be appreciated that as previously discussed, the sensor as a service platform 280 may include components to assist with managing the state and upgrades of sensors (such as the sensor configuration 264A, etc.). As such, the architecture 213 is shown specifically with respect to updating components and implementation when updates are needed to the sensors 270A, 270B, and/or 270N.

In various embodiments, the computing resources 278A may include management and allocation of computational resources, including overseeing the provisioning and optimization of processing power, memory, and other computing assets to support the sensor update computing environment 276. For example, the computing resources 278A may include features for dynamic scaling, load balancing, and resource monitoring to ensure optimal performance under varying workloads.

The sensor database 278B may include a structured repository where sensors and associated data may be stored. For example, the sensor database 278B may include a cataloging of sensors. In one embodiment, the sensor database 278B may be provisioned on a per-client basis such data within the sensor database 278B may be specific and associated only with an individual client. Additionally, the sensor database 278B may be used to manage data originating from a sensor. For example, a sensor may provide sensor data (e.g., change in environment, change in permittivity, change in sensitivity, any sensor data, etc.) which may be collected by the sensor database 278B as well.

The update database 278C may manage the process of tracking, updating and modifying software versions associated with each of the sensors 270A, 270B, 270N. The update database 278C may track the current version of software associated with each of the sensors 270A, 270B, 270N, as well as permission associated with the current version of software. For example, in one embodiment, a version of software may include both basic access and tiered premium levels of access. As such, the software version sent to a sensor may include a package of both software updates and permissions associated with the software. In another embodiment, a version of software may inherently correspond with a permission level. For example, a software version 1.0 may have a subversion 1.0.1 or 1.0.2 where each subversion is directly associated with a permission level. In other words, the subversion may have data relating only to an associated permission level, and another subversion may have data relating on to a separate associated permission level. In this manner, the separate versions may be specifically associated with a level of permission or features for the sensor and an associated subscription (for features).

The customer database 278D may assist with managing customer-related information efficiently, including storing and organizing customer data, providing support functionalities like customer registration, profile management, and the ability to retrieve and update customer information. Additionally, the customer database 278D may be used to track a subscription for a user. In one embodiment, the customer database 278D may be used to associate a sensor, an array of sensors, or classes of sensors with a user account. Additionally, for any associated sensor (whether individual, array, or class), the customer database 278D may be used to track subscriptions, levels of permissions, elevated functionality requests for each of the sensors. Of course, it is to be appreciated that management of the sensors may occur at a more global sensor level, where multiple sensors can be partitioned and managed (in terms of permissions and/or subscriptions). In one embodiment, the management of sensors may occur automatically based on preset preferred settings based on user input.

The sensor update server 274 may be used to facilitate management, distribution, and deployment of updates, patches, or firmware upgrades to connected sensors 270A, 270B, 270N. The sensor update server 274 may be used to disseminate updates and/or configurations for the sensors 270A, 270B, 270N. Additionally, the sensor update server 274 may incorporate features including version control, rollback mechanisms, and update scheduling to maintain the integrity and performance of the sensor network.

In one embodiment, the sensor update 272A may be the same as another sensor update (such as the sensor update 272B). In another embodiment, the sensor update 272A may be different from another sensor update (such as the sensor update 272B). In any case, the sensor update 272A, 272B, and 272N may be specific to the sensor to which it is associated (sensor 270A, 270B, 270N).

FIG. 21 illustrates a sensor class architecture 215, in accordance with one embodiment. As an option, the architecture 215 may be implemented in the context of any one or more of the embodiments set forth in any previous and/or subsequent figure(s) and/or description thereof. Of course, however, the architecture 215 may be implemented in the context of any desired environment. Further, the aforementioned definitions may equally apply to the description below.

As shown, the sensor as a service platform 280 may be connected to the cloud sensor resources 212. In one embodiment, the cloud sensor resources 212 may be used to manage and partition sensors. For example, the sensors (shown as sensors 284A1, 284A2, 284B1, 284B2, 284N1, and 284N2) may be grouped based on a class (shown as sensor asset class 282A, sensor asset class 282B, and sensor asset class 282N). Within the context of the present description, a sensor asset class may include a grouping of sensors based on properties (such as attributes, etc.) and behaviors (such as permission levels, etc.). For example, the sensor asset class may include a set of common characteristics and functionalities of a grouping of sensors. Sensor properties may include attributes such as sensor type, measurement units, precision, calibration settings, etc, and behaviors might include actions like granted permission levels, reading data, calibrating, configuring the sensor, etc. In this manner, a single update may be configured for a sensor asset class such that management of multiple sensors can occur more efficiently (manage a class of sensors rather than each sensor individually).

Figure 2J:
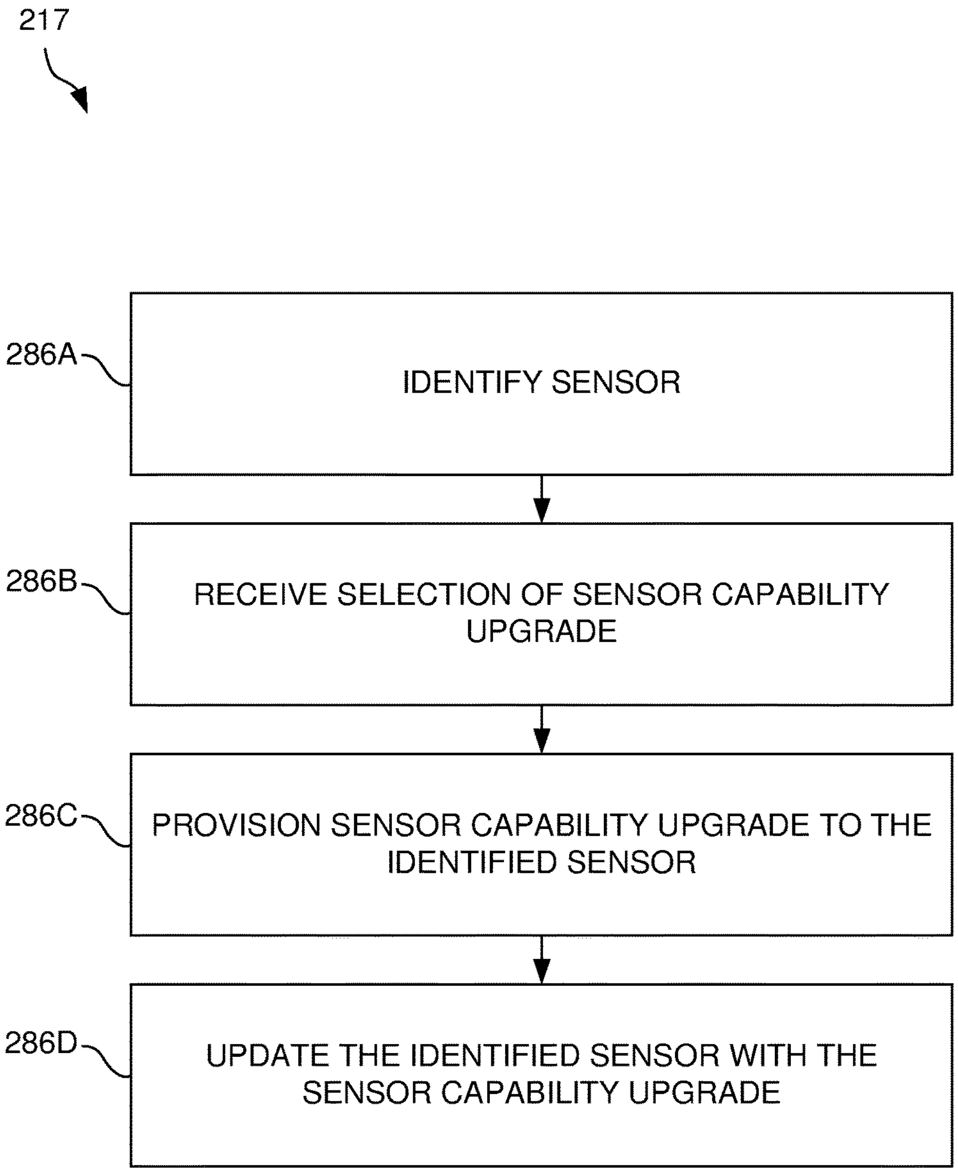
FIG. 2J illustrates a method for upgrading a sensor capability, in accordance with one embodiment.

FIG. 2J illustrates a method 217 for upgrading a sensor capability, in accordance with one embodiment. As an option, the method 217 may be implemented in the context of any one or more of the embodiments set forth in any previous and/or subsequent figure(s) and/or description thereof. Of course, however, the method 217 may be implemented in the context of any desired environment. Further, the aforementioned definitions may equally apply to the description below.

As shown, a sensor is identified. See operation 286A. A selection is received of sensor capability upgrade. See operation 286B. For example, a first sensor may have greater capability and functionality beyond a base configuration of features. Such a first sensor may be upgrade with a capability upgrade such that additional capabilities and functionalities may be unlocked.

Additionally, a sensor capability upgrade is provisioned to the identified server. See operation 286C. As discussed herein, such sensor capability upgrade may occur via the sensor update server 274. Further, the identified sensor is updated with the sensor capability upgrade. See operation 286D.

In this manner, a sensor (or grouping of sensors) may be updated and additional features may be provided as a result of the update. It is to be appreciated that updating software on a sensor may including modifying, enhancing, and/or replacing embedded software on a sensor. Additionally, within the context of the present description, a capability upgrade may include unlocking or providing any enhanced capability not present or accessible in a prior version.

In one embodiment, the method 217 includes upgrading a sensor for enhanced sensor capability. Additionally, it is recognized that an opposite method may be provided where a sensor is downgraded for more restrictive sensor capability. For example, a sensor may have an associated subscription with a capped data limit. Once the data limit is surpassed, the sensor may be automatically downgraded to a lower functionality until a subscription type or permission level is updated. Thus, the sensor capability may be directly associated with a subscription or service model such that the sensor capability is contingent upon a subscription which includes the identified sensor.

Figure 2K:
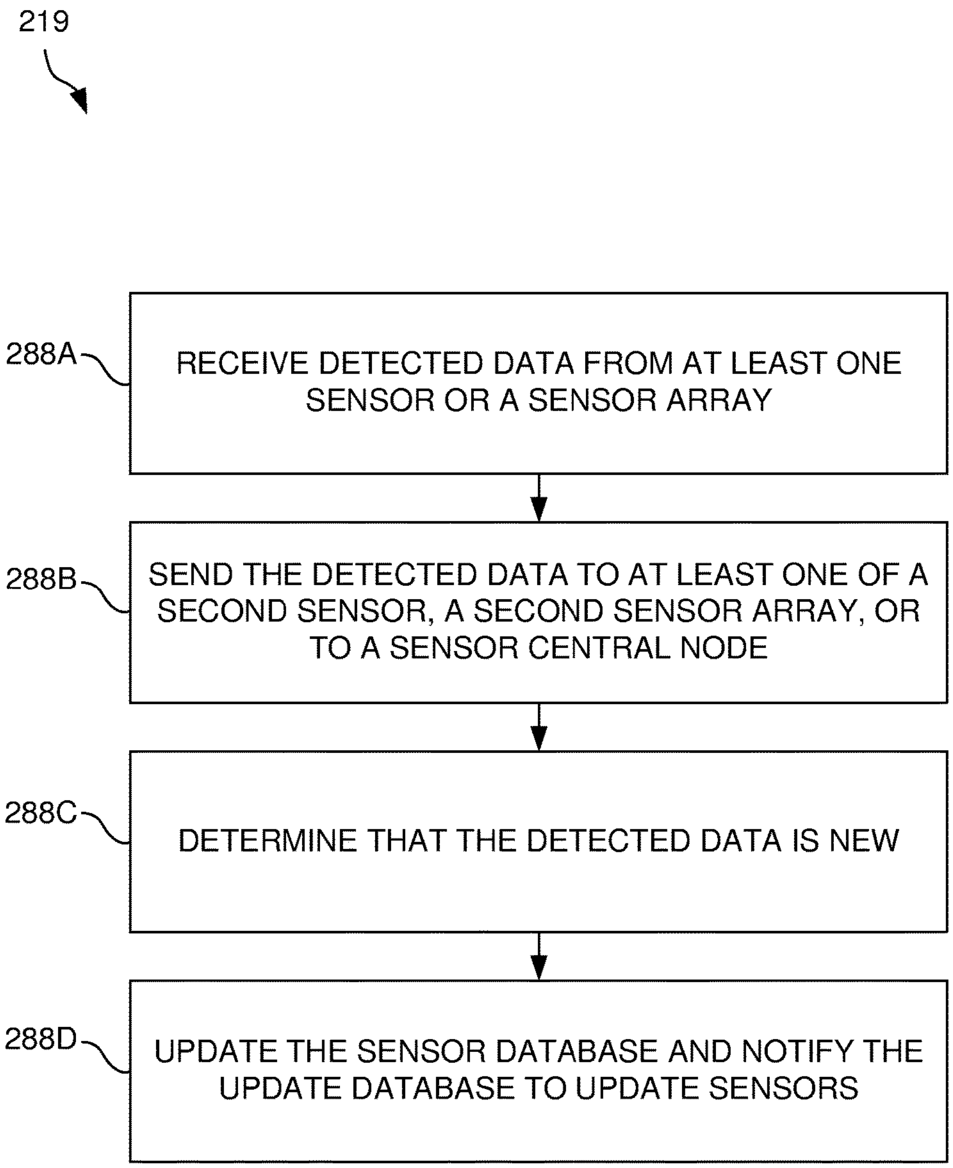
FIG. 2K illustrates a method for sensor updating a sensor database, in accordance with one embodiment.

FIG. 2K illustrates a method 219 for sensor updating a sensor database, in accordance with one embodiment. As an option, the method 219 may be implemented in the context of any one or more of the embodiments set forth in any previous and/or subsequent figure(s) and/or description thereof. Of course, however, the method 219 may be implemented in the context of any desired environment. Further, the aforementioned definitions may equally apply to the description below.

As shown, detected data is received from at least one sensor or a sensor array. See operation 288A. For example, data may be retrieved in a manner consistent with the description herein relating to the cloud sensor resources 212 and/or sensor as a service platform 280. The detected data is sent to at least one of second sensor, a second sensor array, or to a sensor central node. See operation 288B. As an example, the sending of data may occur in a manner consistent with, at a minimum, any of the architecture 201, the architecture 203, the architecture 205, the architecture 207, and/or the sensor and device platform 209.

Further, it is determined that the detected data is new. See operation 288C. For example, the detected data may include a new more granular identification of an analyte, a new signature mapping identified (for sensed environment conditions, etc.), etc.

Additionally, the sensor database is updated and the update database is notified to update sensors. See operation 288D. For example, the method for updating the sensors may occur in a manner consistent with the architecture 213.

Taking a step back, a sensor may be used to not only detect a condition (e.g., a temperature surpasses a predetermined threshold, etc.) but to also identify an item associated with the condition. For example, a sensor may detect the presence of a vapor (such as methane), and then identify particular isotopes or concentrations within the methane. Such a composition (on an isotope-specific level) may provide additional information about the origin and source of the detected methane. Thus, rather than merely providing a binary result (yes or no to methane detection), the sensor could potentially identify a signature of isotopes associated with the detected methane.

In another embodiment, a sensor may be used to detect stability of a concrete structure. The condition may be a binary result (yes or no to concrete integrity), but a signature associated with the sensed data may provide greater insight into parameters for the detected condition. For example, being able to identify the stability of concrete may be useful, but having a sensed signature may provide greater insight on the detected conditions contributing to the current state of stability of the concrete. In one embodiment, concrete may be determined to be unstable, and the sensor may detect a signature of conditions associated with crumbling fissures within the concrete, or a pressure exerted below the concrete that is causing it to flex, or a specific chemicals that have leeched into the concrete has caused in turn chemical reactions within the concrete, or a change in pH of the concrete may be due to carbonation within the concrete, etc.

As such, the method 219 relates to the additional information that may be gleaned from a sensor. Such information may be provided to a sensor database, which in turn, may be used to update signatures at other sensors as well. In this manner, data obtained and analyzed from one sensor may be used to increase the intelligence with other sensors as well (and vice versa).

The method 219 may be further enhanced by combining it with artificial intelligence (AI) and/or machine learning capabilities. For example, per operation 288C, if the detected data is new, an AI system and/or machine learning system may be used to determine and compute what the detected data relates to (a new signature profile, etc.).

Figure 2L:
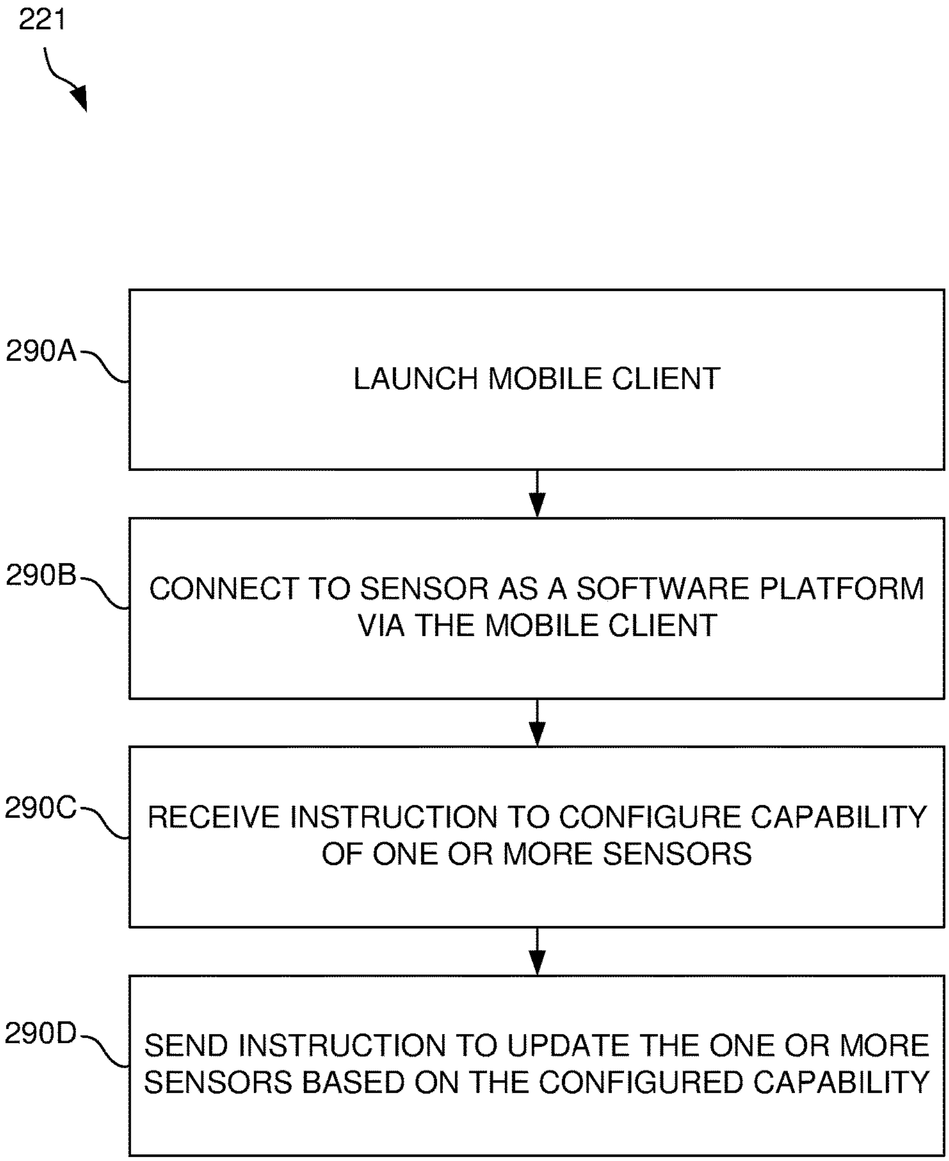
FIG. 2L illustrates a method for updating sensors, in accordance with one embodiment.

FIG. 2L illustrates a method 221 for updating sensors, in accordance with one embodiment. As an option, the method 221 may be implemented in the context of any one or more of the embodiments set forth in any previous and/or subsequent figure(s) and/or description thereof. Of course, however, the method 221 may be implemented in the context of any desired environment. Further, the aforementioned definitions may equally apply to the description below.

As shown, a mobile client is launched. See operation 290A. A sensor as a software platform is connected to via the mobile client. See operation 290B. It is to be appreciated that the sensor as a software platform may correspond with sensor as a service platform 280 discussed herein, and which may be accessed via the user interface 202.

Instruction is received to configure capability of one or more sensors. See operation 290C. Additionally, instructions are sent to update the one or more sensors based on the configured capability. In particular, the architecture 213 and architecture 215 may be especially pertinent in relating to updating and configuring sensors.

FIG. 3 illustrates a digital signature 300 based on multivariate responses, in accordance with one embodiment. As an option, the digital signature 300 may be implemented in the context of any one or more of the embodiments set forth in any previous and/or subsequent figure(s) and/or description thereof. Of course, however, the digital signature 300 may be implemented in the context of any desired environment. Further, the aforementioned definitions may equally apply to the description below.

As shown, the digital signature 300 may be defined by three axes: a multivariate response 1 302, a multivariate response 2 304, and time 306. Within the context of the present description, a multivariate response includes two or more response variables. Each response variable may represent, for example, a different aspect or dimension. In one embodiment, each of the multivariate response 1 302 and the multivariate response 2 304 may include measuring and/or providing data on multiple variables simultaneously.

By way of a contrasting example, a univariate sensor may be limited to a single variable (such as a single temperature, pressure, analyte). Based on such, in conventional univariate sensors, the sensing element may be calibrated to detect the single variable. However, in the case of detection of gases, having only a single variable for detection may lead to false positives or false negatives, due to the fact that sensors to measure vapor can exhibit cross-sensitivity, which may be problematic in distinguishing between different gases.

As such, a multivariate response may reduce false positives by measuring multiple variables simultaneously. Additionally, the inclusion of additional variables allows for greater data and data points, which enables a more comprehensive and data-rich analysis of conditions associated with sensed conditions. Further, the combination of multiple variables allows for a higher dimension analysis (based on the greater amount of data).

As shown, the multivariate response 1 302 and the multivariate response 2 304 may be plotted with respect to the time 306. Based on such plot, a response 1 308 may be shown, as well as interference 1 310 and interference 2 312. It is to be appreciated that any number of responses or interferences may be shown. Within the context of the present description, an interference (such as the interference 1 310 and/or the interference 2 312) may include an impact of one variable on the measurement of another variable. In various embodiments, an interference may be a positive interference (where one variable increases another variable), a negative interference (where one variable decreases another variable), a synergistic interference (where the combined effect of two or more variables is greater than the sum of their individual effects), antagonistic interference (where the combined effect of two or more variables is less than the sum of their individual effects), etc.

In various embodiments, multivariate responses may allow for a more precise digital signature. For example, multivariate responses may include >1 dimensional sensor arrays providing a more granular chemical fingerprinting of a gas or vaporous compound. Additionally, the combination of multiple variables offers a higher information content (multi-dimensions), enabling more comprehensive analysis.

In one embodiment, the digital signature may be akin to a digital form of smell (based on analyte detection, biosensing, tactile sensing, resonant sensors, EMSSDs, etc.). For example, sensor signatures may be akin to a digital scent. Within the context of the present description, a digital scent may include a distinctive pattern, product, characteristic, or set therefore, represented in digital form. In one example, a digital scent may include a digital representation of a smell, odor, color, pattern, combination of variables, etc. In one embodiment, a digital scent may include a discrete wavelength (or combination of wavelengths).

In function, a digital scent may be actuated, in one embodiment, through metal metamaterial, or a 3D graphene function structure. In another embodiment, an analyte sensor may be configured for a specific gaseous compound such that the sensor physically responds (and in turn can generate an electrical response signal). Further, a biosensor may detect a dielectric constant associated with one or more compounds in the vicinity of the biosensor. In various embodiments, the digital scent may be detected using a sensor associated with a mobile handheld device (e.g. smartphone, tablet, etc.), a wearable device (e.g. smartwatch, etc.), etc.

In one embodiment, the digital scent may be presented by a multi dimension (such as including two or more dimensions) of different types of responses. For example, a first response (such as the response 1 308) may be represented by a first signal (wavelength, dielectric charge, etc.), a second response may be represented by a second signal (wavelength, dielectric charge, etc.), and so forth. Each of the responses and/or interferences may represent a separate dimension such that a combination of the dimensions may provide a complete digital scent. In another embodiment, a first response may represent a first analyte, a second response may represent a second analyte, and so forth, such that a specific combination of analyte responses produces a detected digital scent. In this manner, a digital scent may include multivariate sensing values.

It is to be appreciated that having a precise signature identification improves the intelligence of a sensor. For example, a digital signature based on multivariate responses may allow for more precise identification of known compounds, analytes, vapors, conditions, etc. As such, in one embodiment, a digital signature based on multivariate responses may allow for sensors with greater accuracy, greater efficiency (less processing power to identify), etc.

FIG. 4A illustrates a spatial mapping 400 based on digital signatures, in accordance with one embodiment. As an option, the spatial mapping 400 may be implemented in the context of any one or more of the embodiments set forth in any previous and/or subsequent figure(s) and/or description thereof. Of course, however, the spatial mapping 400 may be implemented in the context of any desired environment. Further, the aforementioned definitions may equally apply to the description below.

As shown, the spatial mapping provides an indication of sensor 402, sensor location 404, and sensor response 406. This spatial mapping may be akin to a 3D surface plot in that it may be used to visualize how a dependent variable (such as sensor response 406) may change in relation to two independent variables (such as the sensor 402 and the sensor location 404).

In one embodiment, the sensor response 406 may be configured for a range of concentrations associated with an analyte, and the spatial mapping 400 may provide a mapping of such concentrations. In another embodiment, the sensor response 406 may reflect a predetermined composition based on a digital signature, and the spatial mapping 400 may provide a mapping of such predetermined compositions.

FIG. 4B illustrates a heat map 401 for digital signatures, in accordance with one embodiment. As an option, the heat map 401 may be implemented in the context of any one or more of the embodiments set forth in any previous and/or subsequent figure(s) and/or description thereof. Of course, however, the heat map 401 may be implemented in the context of any desired environment. Further, the aforementioned definitions may equally apply to the description below.

As shown, the heat map 401 may display a two-axis configuration of coordinate 1 408 and coordinate 2 410. Additionally, an intensity of color of the heat map 401 may correspond with a sensor response 412, where each intensity of color may correspond with a response level associated with a sensor.

In one embodiment, the heat map 401 may be used to visualize concentration of gases, location of void space, location of a leak, visualize integrity of a structure, propagation of a sneeze, visualize toxicity levels, etc. Additionally, in one embodiment, the heat map 401 may be used to visualize a concentration of gases within a known volume. Such visualization may allow for mapping a spatially sensed surroundings. Further, by mapping the spatial surroundings, a time dimension may be applied such that a rate, expansion, and/or rate of change may be computed and visualized (where each heat map represents a state at an identified point of time). Thus, in one particular embodiment, rates of change may be computed to calculate when a concentration will reach an intended zone and/or destination (e.g., the other side of the room, a safe house, etc.).

Figure 4C:
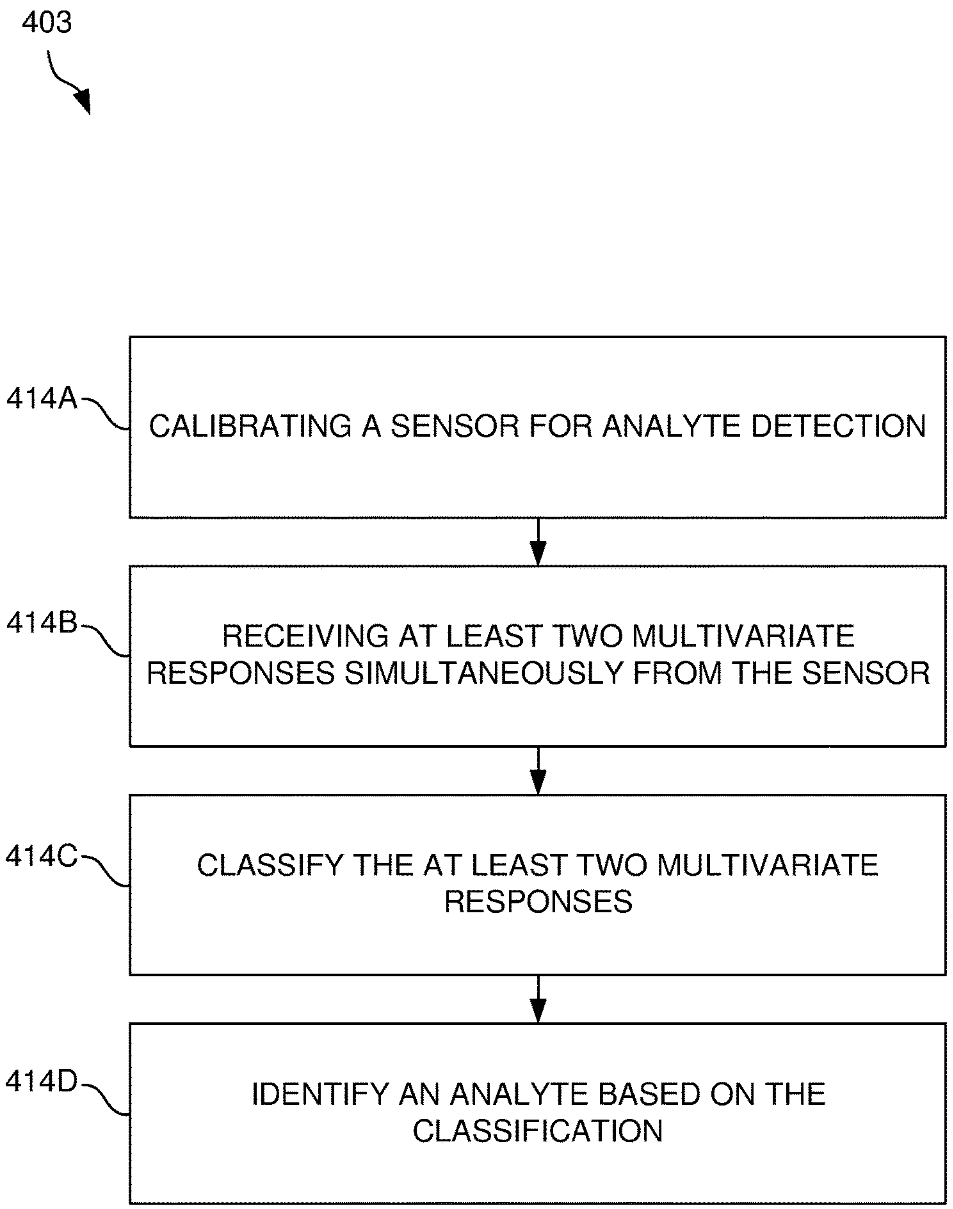
FIG. 4C illustrates a method for identifying an analyte based on a multivariate responses, in accordance with one embodiment.

FIG. 4C illustrates a method 403 for identifying an analyte based on a multivariate responses, in accordance with one embodiment. As an option, the method 403 may be implemented in the context of any one or more of the embodiments set forth in any previous and/or subsequent figure(s) and/or description thereof. Of course, however, the method 403 may be implemented in the context of any desired environment. Further, the aforementioned definitions may equally apply to the description below.

As shown, the method 403 includes calibrating a sensor for analyte detection. See operation 414A. Calibrating a sensor may include providing an analyte sensor that is configured for a specific analyte, and which is desired to produce a measurable response for the specific analyte. Additionally, at least two multivariate responses are received simultaneously from the sensor. See operation 414B. The at least two multivariate responses may be consistent as described with respect to the digital signature 300.

The at least two multivariate responses are classified. See operation 414C. The classification may include assigning detected responses to predefined categories or classes based on the multivariate data collected by the sensors. For example, the classification may include gathering multivariate data, comparing the multivariate data to a database of known digital signatures, etc. Further an analyte is identified based on the classification. See operation 414D. For example, in one embodiment, based on the analysis of the classification, a known match between the multivariate data and a digital signature may be made. In another embodiment, based on the classification, an unknown match may be determined, and a new identification of the analyte may be made. In one embodiment, the classification may be facilitated by use of a machine learning system (to more accurately identify the digital signature, to more quickly identify the digital signature, etc.).

Figure 4D:
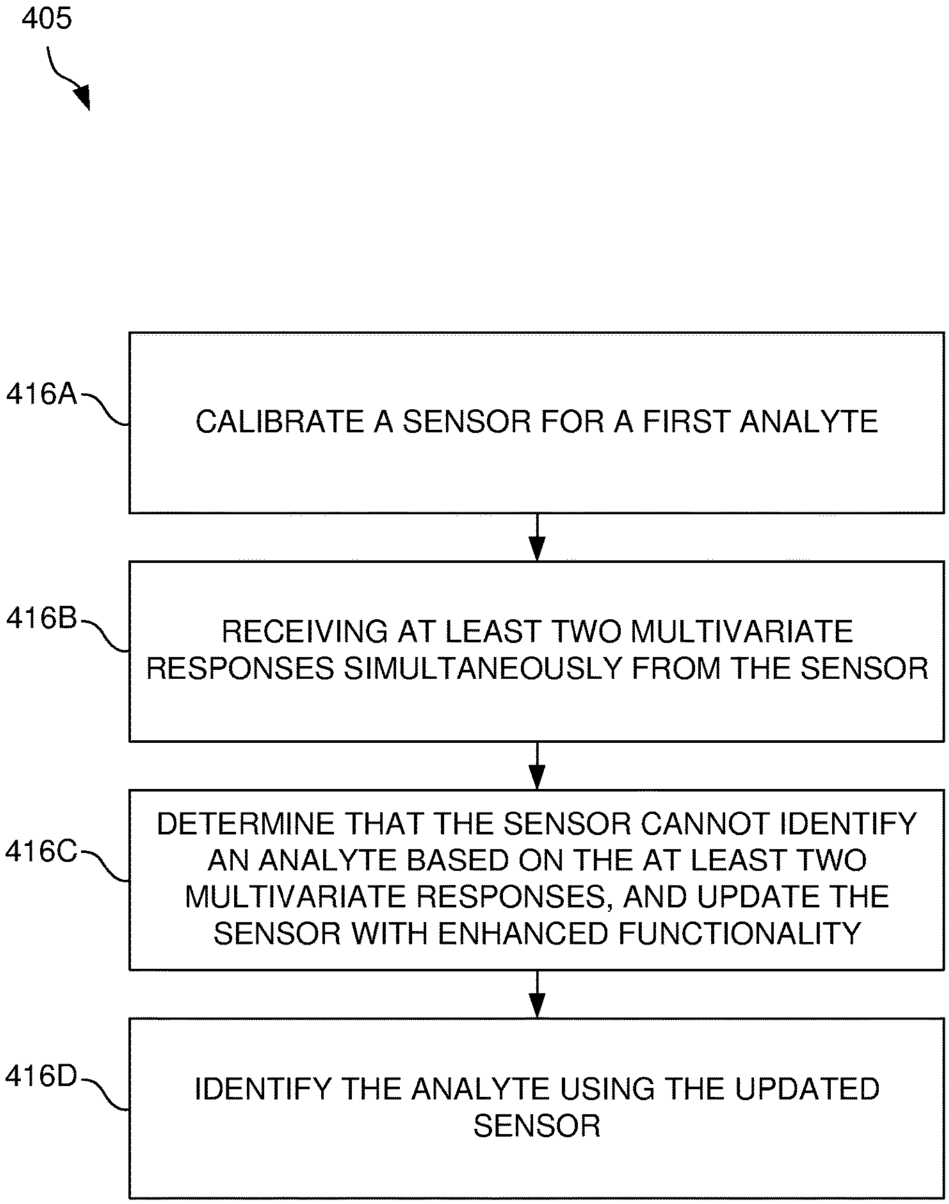
FIG. 4D illustrates a method for identifying an analyte based on enhanced functionality, in accordance with one embodiment.

FIG. 4D illustrates a method 405 for identifying an analyte based on enhanced functionality, in accordance with one embodiment. As an option, the method 405 may be implemented in the context of any one or more of the embodiments set forth in any previous and/or subsequent figure(s) and/or description thereof. Of course, however, the method 405 may be implemented in the context of any desired environment. Further, the aforementioned definitions may equally apply to the description below.

As shown, the method 405 includes calibrating a sensor for a first analyte. See operation 416A. Calibrating the sensor for a first analyte may include tuning the sensor to respond to a specific analyte. The at least two multivariate responses are received simultaneously from the sensor. See operation 416B.

Additionally, it is determined that the sensor cannot identify an analyte based on the at least two multivariate responses, and the sensor is updated with enhanced functionality. See operation 416C. For example, the sensor may have a first dataset for identifying analytes. As discussed, however, in relation to operation 288D, if a new detected data is made, such new detected data may be provided to the other sensors. In a similar manner, at operation 416C, if an identification cannot be made, it may be due to 1) a prior identification of the digital signature has not been made (in which case operations 414C and 414D may be utilized for identifying the new digital signature); and 2) restrictions on the sensor. With respect to restrictions on the sensor, operation 416C may allow for enhanced functionality such that the sensor may have increased permissions to analyze the analyte. Such enhanced functionality may occur in a manner consistent with the sensor update computing environment 276 discussed herein.

The analyte is identified using the updated sensor. See operation 416D. For example, based on enhanced functionality, the sensor may have greater data to identifying the analyte, and/or may have greater capabilities (such as by unlocking more granular capabilities on the sensor).

Figure 4E:
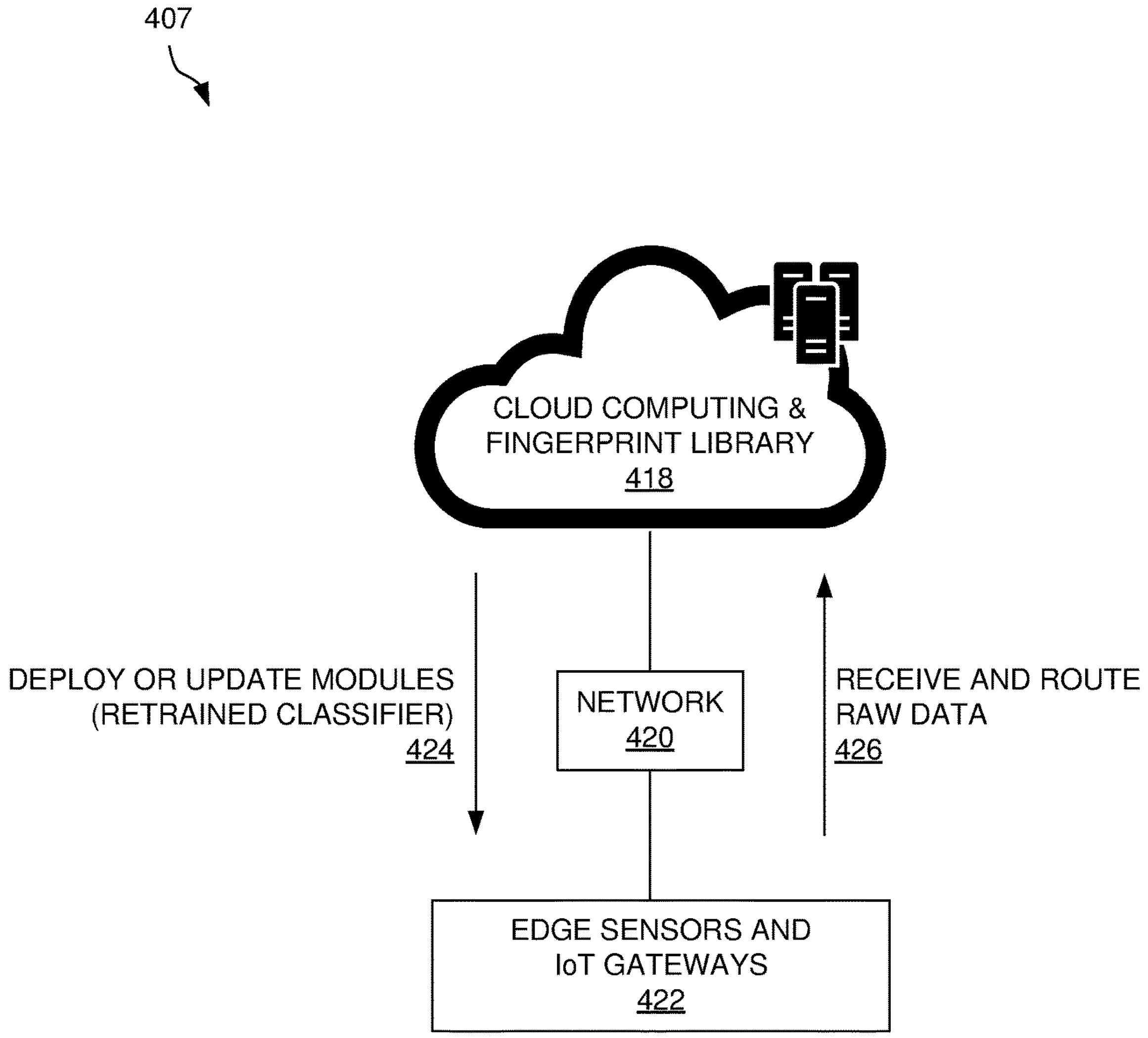
FIG. 4E illustrates a flow for cloud computing and fingerprinting digital signatures, in accordance with one embodiment.

FIG. 4E illustrates a flow 407 for cloud computing and fingerprinting digital signatures, in accordance with one embodiment. As an option, the flow 407 may be implemented in the context of any one or more of the embodiments set forth in any previous and/or subsequent figure(s) and/or description thereof. Of course, however, the flow 407 may be implemented in the context of any desired environment. Further, the aforementioned definitions may equally apply to the description below.

As shown, the flow 407 may include a cloud computing and fingerprint library 418 which may be in communication via a network 420 with edge sensors and IoT gateways 422. In one embodiment, the edge sensors and IoT gateways 422 may include sensors, devices with sensors, sensor central nodes, etc.

The flow 407 may include both sending and receiving data. For example, sensor data from the sensors may be communicated via the edge sensors and IoT gateways 422 to the cloud computing and fingerprint library 418 via action 426 of receiving and routing raw data. The action 426 may include providing any data, updates, or information originating from the sensors. Conversely, action 424 may including deploying or updating modules (retraining classifiers) sent from the cloud computing and fingerprint library 418 and delivered to the edge sensors and IoT gateways 422. Deploying or updating modules may include updating digital signatures based on multivariate responses. Further, the deploying or updating modules may be based on information obtained from a first sensor where such information relates to a new identification of a digital signature and the new identification is logged into the sensor database for updating to all other sensors.

In one embodiment, the edge sensors and IoT gateways 422 may function as a gateway where data from the sensors is not passed on to the cloud computing and fingerprint library 418 until predetermined thresholds are satisfied. For example, in one embodiment, the cloud computing and fingerprint library 418 may not be updated via the action 426 until the data from the sensors received at the edge sensors and IoT gateways 422 is sufficiently new to warrant updating the cloud computing and fingerprint library 418. Sufficiently new may be based on a confidence interval of material that is new and/or not before analyzed. Such confidence interval may be preconfigured by the user.

In one embodiment, the cloud computing and fingerprint library 418 may include additional resources (greater processing power systems, etc.) to process the data from the sensors. However, the connection via the network 420 between the cloud computing and fingerprint library 418 and the edge sensors and IoT gateways 422 may be unreliable, so updates via action 426 to the cloud computing and fingerprint library 418 may occur sporadically and/or asynchronously. Additionally, in some instances, the edge sensors and IoT gateways 422 may not send the data via the action 426 until it surpasses a preconfigured threshold of data (in terms of size). In another embodiment, the update via the action 426 may occur at preconfigured intervals (such as the same time each day).

In one embodiment, the flow 407 may include cloud computing via the cloud computing and fingerprint library 418 which can leverage big data analytics where the sensor classifier may be trained (or retrained). Additionally, the cloud computing and fingerprint library 418 may be equipped to store comprehensive digital fingerprints (digital signatures, chemical signatures, etc.). Additionally, the flow 407 may include a sensor platform capable of measuring a broad spectrum of chemical interactions. These sensors may generate high dimensional data, facilitating creation of a digital signature (i.e., chemical fingerprint) for various applications. Further, the flow 407 may allow for software update for improved performance and expanded functionalities.

In one embodiment, the retrained classifier of the action 424 may include a refined or retrained digital signature. For example, a first digital signature may be refined and broken up into multiple sub digital signatures (which may be more granular in their identification). The modules may relate to the digital signatures or classifiers. As such, the action 424 may include providing an update to and/or replacing the digital signatures.

Figure 4F:
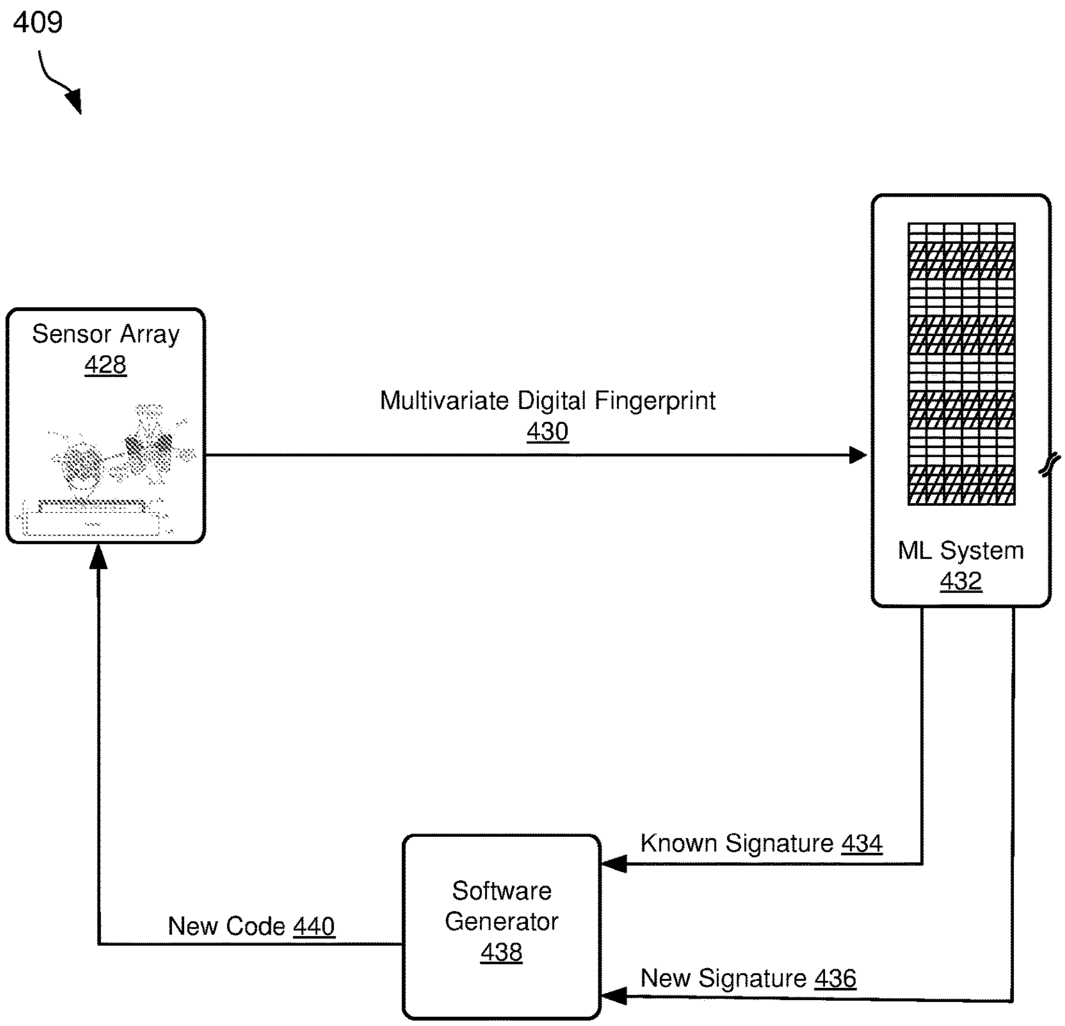
FIG. 4F illustrates system for processing multivariate digital fingerprints, in accordance with one embodiment.

FIG. 4F illustrates system 409 for processing multivariate digital fingerprints, in accordance with one embodiment. As an option, the system 409 may be implemented in the context of any one or more of the embodiments set forth in any previous and/or subsequent figure(s) and/or description thereof. Of course, however, the system 409 may be implemented in the context of any desired environment. Further, the aforementioned definitions may equally apply to the description below.

As shown, an array of sensors 428 may constitute a deployed detection system. The sensor array 428 may detect a multivariate digital fingerprint 430 and pass the multivariate digital fingerprint 430 on to a machine learning system 432 for processing.

It is to be appreciated that the machine learning system 432 may include and/or be associated with a fingerprint database for storing and retrieving of digital fingerprint signatures. Additionally, as disclosed further with respect to FIG. 6, the machine learning system 432 may operate in both a reactive (such as identifying signatures based on the fingerprint database) and proactive stance (such as generating new signatures to add to the fingerprint database).

The machine learning system 432 may output known signature 434 or a new signature 436 based on whether a match to a known digital fingerprint was found.

A software generator 438 may receive the known signature 434 and/or the new signature 436, and may generate new software code (i.e., new code 440) and provide the new code back to the sensor array 428. In one embodiment, the software generator 438 may send the new code 440 to a deployed detection system associated with the sensory array 428, where the deployed detection system in turn may use the provided new software code 612 to tune one or more sensors of the sensor array 428.

In this manner, the multivariate digital fingerprint 430 may be analyzed to determine whether it matches a known digital fingerprint. It should be additionally noted that in the event that the new signature 436 is detected by the machine learning system 432, the machine learning system may configure and/or analyze the new signature (e.g., determine relevancy of the new signature to known signatures, break out the fingerprint based on each of the responses of the multivariate responses, etc.).

FIG. 5A illustrates a spatial mapping 500 based on sensor detection, in accordance with one embodiment. As an option, the spatial mapping 500 may be implemented in the context of any one or more of the embodiments set forth in any previous and/or subsequent figure(s) and/or description thereof. Of course, however, the spatial mapping 500 may be implemented in the context of any desired environment. Further, the aforementioned definitions may equally apply to the description below.

As shown, the spatial mapping 500 shows a side perspective of a container 502 and objects 504 within the container 502. Additionally, the spatial mapping 500 shows a top-down perspective of a container 506 and objects 508 within the container 506.

Conventionally, current methods cannot easily detect empty space within a shipping container. For example, the space around the objects 504 within the container 502 may not be seen from the first perspective, but may more easily be seen via a second perspective such as the space around the objects 508 in the container 506.

Current methods to detect empty space in shipping containers often leverage advanced sensing technologies and computer vision techniques. For example, one common approach may involve the use of depth sensors, LiDAR (Light Detection and Ranging), or 3D cameras to capture the spatial information within the container. These sensors may generate a three-dimensional point cloud, allowing for precise measurement of the container's internal volume and identification of empty spaces. However, such systems are very complex and expensive, and also rely on complex vision algorithms (using high processing computing system) to determine empty space.

In contrast to current methods, sensors disclosed herein (such as resonant sensors) may be used to detect empty space, determine spatial constraints, determine void space, determine fill capacity, etc. Additionally, such sensors may allow for an inexpensive (particularly compared to conventional and current systems) solution to spatially map an environment.

In various embodiments, sensors (such as resonant sensors) may be used to determine the amount of air within a container (e.g., shipping container, storage box, etc.). For example, a sensor may sense a dielectric constant of a surrounding environment (e.g., gases present, prevalence of such gasses as an indicator of packing density, etc.). Additionally, the capacitance created by the presence of the materials may directly relate to the dielectric constant, which may be detected via a resonant sensor.

In one example, an array of analyte sensors may detect the presence of a preconfigured component, which, based on a concentration mapping of the specific compound at each location of the sensor, may, in turn, allow a spatial mapping of the surroundings around the sensors. In another embodiment, specifically for purposes of determining spatial characteristics (e.g., characteristics of the void space within a container such as a metal shipping container) multiple split ring resonators may be disposed on the inner surfaces (e.g., on walls, floor, ceiling). In some cases, multiple split ring resonators may be sized and arranged (e.g., substantially concentrically) in a manner whereby the sensing proximity is a function of the size of a respective SRR.

As such, an array of sensors (particularly resonant sensors but not limited solely thereto) may be used to spatially map a surrounding environment. In another example, with respect to split ring resonator sensors, a signal may be used to determine spatial constraints (based on the dielectric constant and/or permittivity of the material associated with the split ring resonator). For example, a split ring resonator sensor may be used to determine how much air surrounds a particular split ring resonator sensor. If additional split ring resonator sensors are added (in an array configuration and/or arrangement), the additional data may allow for a mapping of the air found within a constrained container. For example, a heat map of empty space may be created in a manner similar to the spatial mapping 400 and/or the heat map 401. It is to be appreciated that the foregoing example was discussed within the context of split ring resonators. However, such an example may apply equally as well to analyte and other sensors, namely that an array or more than one sensor, in combination, may allow for a mapping of space around each sensor.

As an analogy, the network communication industry relies on triangulation to pinpoint a location. In a similar manner, the greater the number of sensors, the greater the ability to more acutely sense spatially inside a known volume as more data may allow for a greater ability to pinpoint each point within a confined space of a container.

Additionally, the sensors may be used to detect spatial considerations in a variety of settings. For example, packing and/or shipping a box may be more effective if less empty space was shipped such as within an individual box container, within a larger container containing box containers, and/or other types of individual containers. Empty seats on a train (or empty parking spots in a structure) may more accurately be determined. Further, it is to be appreciated that the volume may be fixed or variable control. For example, a fixed volume may include a house with walls, or a box with sides. A variable control volume may include something that is dynamic in size (is not constrained by surrounding walls), including a weather balloon, inflatable tents/shelters, etc. which may dynamically change in size. Further, when applied to an object, the sensors may be used to detect position, velocity or acceleration of the object.

It is noted that using the methods disclosed herein, any volume where empty space needs to be analyzed (including especially those that are in hard to gain access areas or which may contain hazardous materials) can be done so remotely, quickly, and reliably.

FIG. 5B illustrates an interrogation 501 of a sensor array, in accordance with one embodiment. As an option, the interrogation 501 may be implemented in the context of any one or more of the embodiments set forth in any previous and/or subsequent figure(s) and/or description thereof. Of course, however, the interrogation 501 may be implemented in the context of any desired environment. Further, the aforementioned definitions may equally apply to the description below.

As shown, an interrogator 514 may interrogate a container 510 via a signal 516. Within the container is a sensor array 512. In various embodiments, the sensor array 512 may include resonant sensors embedded into the walls of the container 510. The interrogator 514 may be used to measure a response of the resonant sensors of the sensor array 512. It is to be appreciated that the methods of interrogating a sensor array 512 may apply to pre-built containers, or may apply equally to a sensor array installed onto an existing surface (surface wall of a metro cabin, etc.).

Figure 5C:
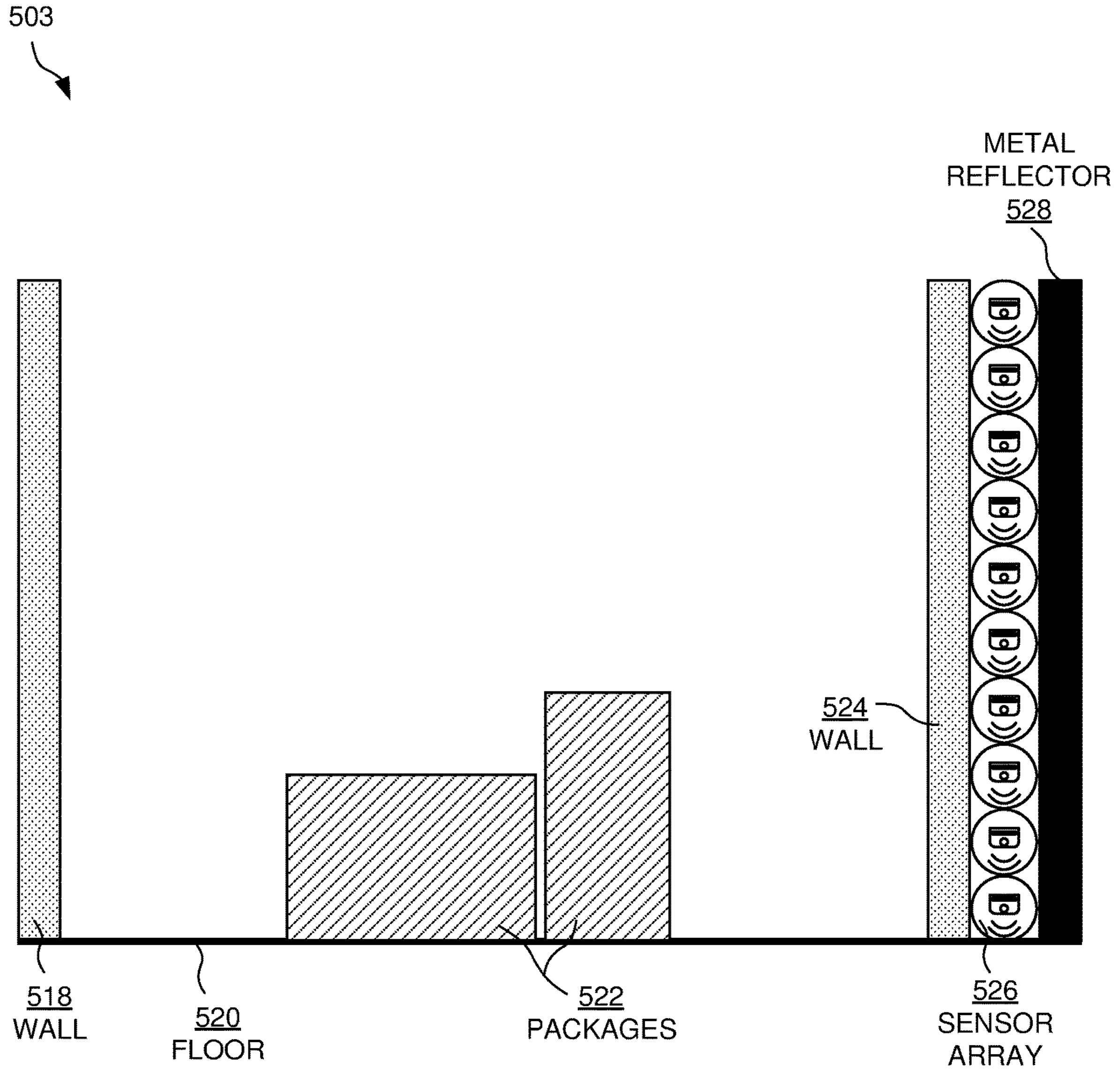
FIG. 5C illustrates an architecture for spatial mapping based on sensor detection, in accordance with one embodiment.

FIG. 5C illustrates an architecture 503 for spatial mapping based on sensor detection, in accordance with one embodiment. As an option, the architecture 503 may be implemented in the context of any one or more of the embodiments set forth in any previous and/or subsequent figure(s) and/or description thereof. Of course, however, the architecture 503 may be implemented in the context of any desired environment. Further, the aforementioned definitions may equally apply to the description below.

As shown, the architecture 503 shows one exemplary arrangement for being able to spatially map within a container. The architecture 503 is shown within a shipping container, but may apply equally to any container with two parallel walls. Within the container may include a first wall 518, a second wall 524, a floor 520, packages 522 between the first wall 518 and the second wall 524. Additionally, a sensor array 526 may be located on the outer wall of the second wall 524. In one embodiment, the sensor array may be embedded within the second wall 524. Further, a metal reflector 528 may be located on outer wall of the second wall 524 (if the sensor array 526 is embedded within the second wall 524), or on the outer side of the sensor array 524 (if the sensor array 526 is not embedded within the second wall 524).

In various embodiments, the floor 520 may include aluminum (or another conducting agent) for grounding. Such a grounding connection may, in one embodiment, extend from the first wall 518 to the second wall 524 to dissipate any energy that may be stored in the dielectric substrate. The first wall 518 and/or the second wall 524 may be constructed of a polymer (such as polycarbonate) or a material that may allow passage of the signal 516. Additionally, the metal reflector 528, in some embodiments, may be optional, but may also assist with enhancing the sensing power of the sensor array 526.

Figure 5D:
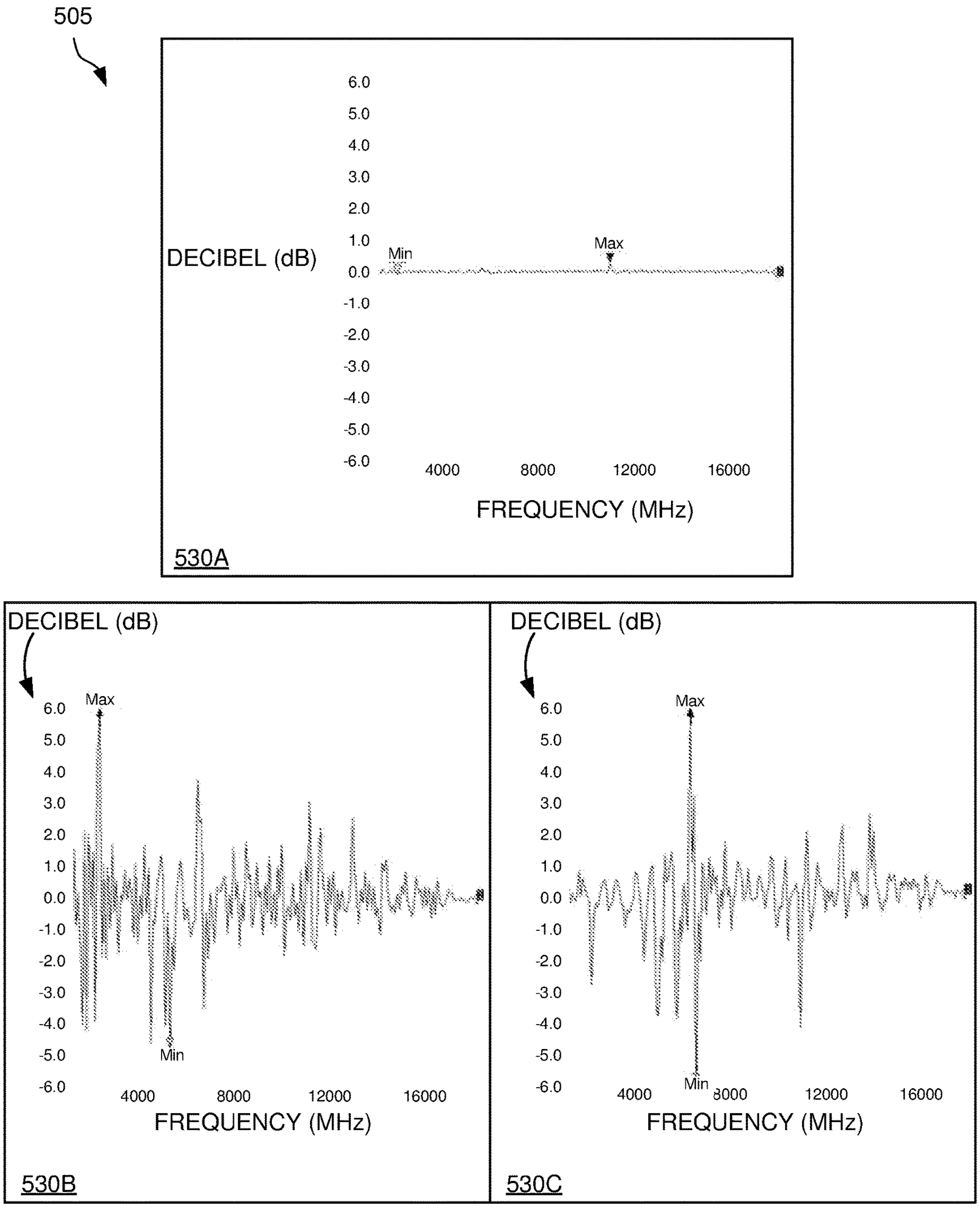
FIG. 5D illustrates graphs of detected spatial mappings, in accordance with one embodiment.

FIG. 5D illustrates graphs 505 of detected spatial mappings, in accordance with one embodiment. As an option, the graphs 505 may be implemented in the context of any one or more of the embodiments set forth in any previous and/or subsequent figure(s) and/or description thereof. Of course, however, the graphs 505 may be implemented in the context of any desired environment. Further, the aforementioned definitions may equally apply to the description below.

The graphs 505 include actual data obtained from a setup based on the configuration of the architecture 503. As shown, plot 530A shows a measurement baselining a basic setup, simulating a perfectly empty container. The response shown is the difference between current data and memory data. Averaging is enabled to reduce noise.

Additionally, plot 530B shows a measurement with two empty boxes bounded by the first wall 518 and the second wall 524 and the sensor array 526. The peaks of the response, as shown in the plot 530B, indicate that the boxes are detected.

Further, plot 530C shows a measurement with a box full of tire rubber. It is to be noted that the filled box of plot 530C shows a different response compared to the response from empty boxes of the plot 530B.

Based on the data provided for the graphs 505, resonant sensors can be used to spatially detect objects, and even determine whether the objects (boxes) are filled with air or with actual objects.

Figure 5E:
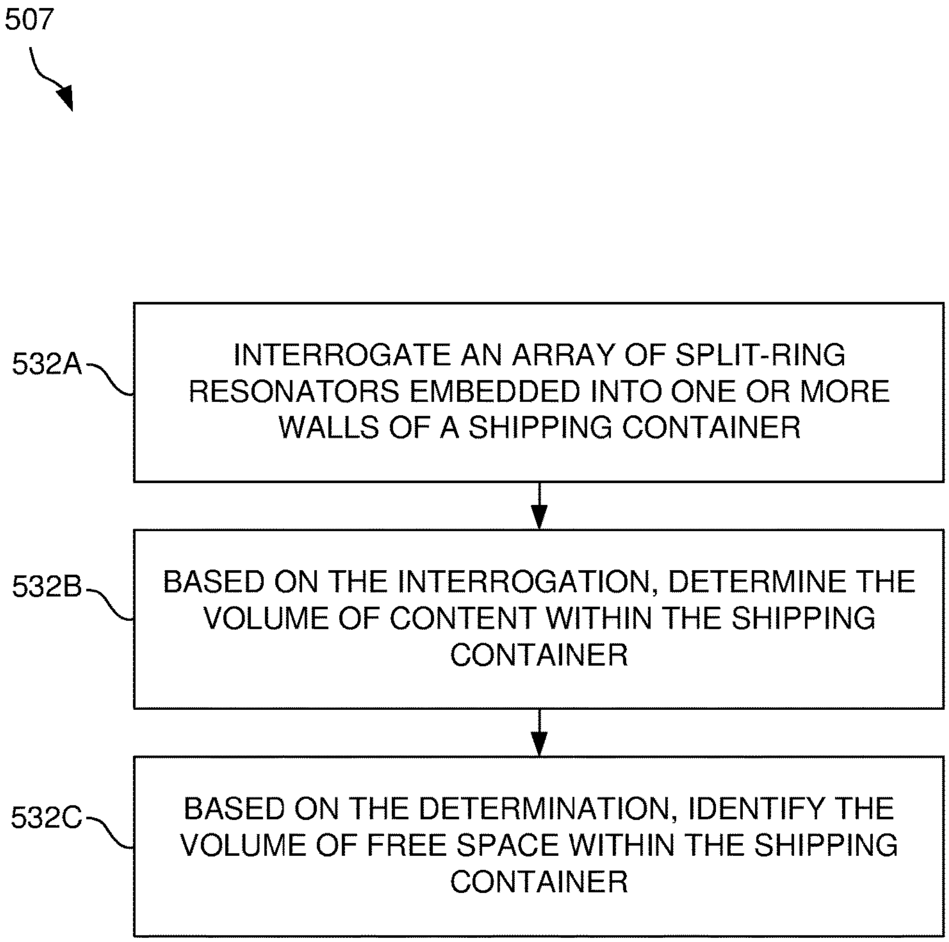
FIG. 5E illustrates a method for identifying a volume of free space, in accordance with one embodiment.

FIG. 5E illustrates a method 507 for identifying a volume of free space, in accordance with one embodiment. As an option, the method 507 may be implemented in the context of any one or more of the embodiments set forth in any previous and/or subsequent figure(s) and/or description thereof. Of course, however, the method 507 may be implemented in the context of any desired environment. Further, the aforementioned definitions may equally apply to the description below.

As shown, the method 507 includes interrogating an array of split-ring resonators embedded into one or more walls of a shipping container. See operation 532A. Based on the interrogation, the volume of content within the shipping container is determined. See operation 532B. Such a determination may occur consistent with the architecture 503 and as evidenced by the graphs 505.

Further, based on the determination, the volume of free space within the shipping container is determined. See operation 532C. In various embodiments, the total volume of the shipping container may be precomputed (based on standard sizes of shipping containers), and the computation of free space may be based simply on the amount of filled volume. In other embodiments, the split-ring resonators may be used to determine the bounds of the shipping container (and thereby calculate the total volume space) by which the computation of free space may then be computed.

In one embodiment, a sensor (or array of sensors) may be used to combine both spatial sensing and digital scent. For example, a digital scent may be used to identify a specific compound, and spatial sensing may be used to map a concentration of the identified compound, including its current state and its rate/path of change. As such, multivariate sensing may be used to determine and sense a variety of conditions and parameters, including temperature, pressure, humidity, light, proximity, velocity, change in orientation, magnetic fields, concentration of gases, sound, pH, motion, etc. Additionally, multivariate sensing may sense more than one condition and/or parameter. In this manner, spatial sensing may allow for determining a change of materials within a volume profile. In this manner, the sensors may be configured to compute the volume of the container (and thereby compute empty space) as well as determine a state of the contents of the volume. In one embodiment, the shipping container may include a sensor array of resonant sensors used to spatially map the volume, and the shipping container may also include a sensor array of analyte sensors to detect specific compounds. Further, the sensor array may be mounted on a handheld computer/service device.

Further, in various embodiment, the architecture for sensors may be used within the context of spatially sensing a container. For example, the architecture may be used to manage and operate sensors. Further, digital signatures may be measured and obtained within the shipping container. For example, piezo electric materials, laser doppler, optical mechanisms, velocimetry, etc., may be used in combination with sensors to provide a more full data response. The sensors may detect audio frequencies, which in turn, may be interrogated by a radio frequency (such as by a laser doppler) to pick up the audio frequencies detected by the sensors. In such a scenario, it is envisioned that the material of the sensor may be configured to selectively restrict or remove frequencies (screeching at a high frequency, etc.). Additionally, a machine learning system may be used to selectively filter to desired frequencies. As such, the teachings of spatial sensing, digital scent identifying, and management of sensors may be combined in any manner, as disclosed herein.

In various configurations, the sensors may be configured as a wall sensor, may include an interrogation system (to interrogate the sensors), may include a calibration system, may allow for classification (based on that which is being sensed), may be integrated with an application (for configuration, management, etc.), may be in contact with a backend system (e.g., for greater processing capability, etc.) or server system, etc. Additionally, the sensors may be used in a hierarchy (such as a decision matrix) for determining what to do in response to sensing. Additionally, rule-based intelligence (and integration with a machine learning system) may be used to make decisions and/or to determine possible outcomes and solutions. For example, if empty space is detected within a shipping container, a central node (managing shipping containers) may be alerted of additional space available in a shipping container that can be filled. Additionally, if a dangerous compound or chemical is detected in the course of packing, a central node (managing shipping containers) may be alerted to the detected chemical so that steps to remedy the situation may be taken.

It is to be appreciated that the sensors in any container may be configured to communication in a variety of formats and protocols, including but not limited to WiLAN, Wi-Fi, Bluetooth, Zigbee, NFC, Z-Wave, etc. Additionally, communication with the sensors may occur in batch (asynchronous), or continuous (synchronous) mode.

Figure 5F:
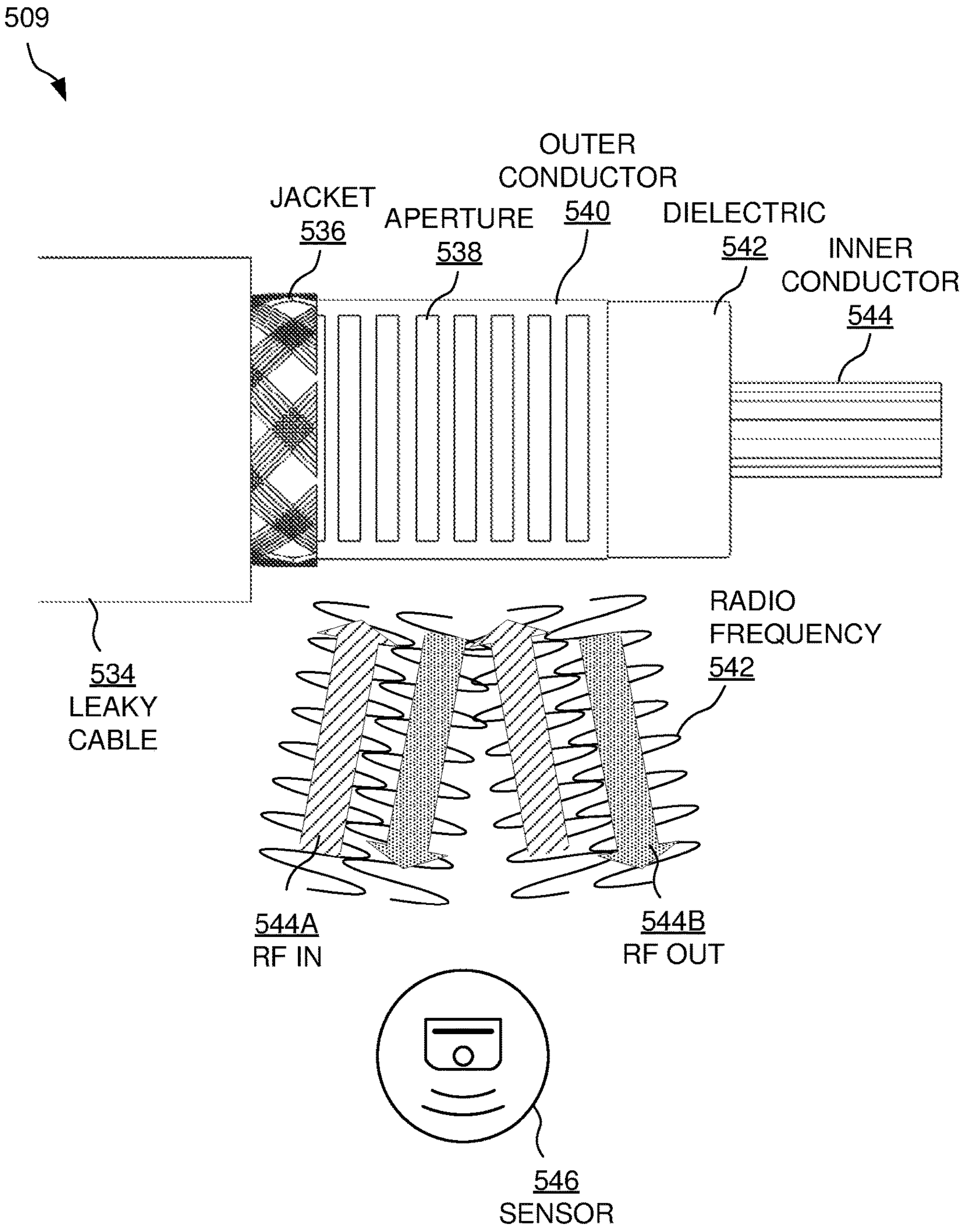
FIG. 5F illustrates a leaky cable configuration with a sensor, in accordance with one embodiment.

FIG. 5F illustrates a leaky cable configuration 509 with a sensor, in accordance with one embodiment. As an option, the configuration 509 may be implemented in the context of any one or more of the embodiments set forth in any previous and/or subsequent figure(s) and/or description thereof. Of course, however, the configuration 509 may be implemented in the context of any desired environment. Further, the aforementioned definitions may equally apply to the description below.

As shown, a leaky cable 534 includes (described from an outer to interior construction) a jacket 536, an outer conductor 540 with apertures 538, a dielectric 542, and an inner conductor 544. In various embodiments, the leaky cable 534 may be configured with intentional leakage of radio frequency 542 along its length. Unlike conventional antennas that may emit radio frequency signals primarily in the direction perpendicular to the antenna, the leaky cable 534 may be constructed to allow controlled emitted radiation along its length.

The leaky cable 534 could be used in a variety of applications, including underground tunnels, mines, large buildings, airplanes, shipping containers, etc. where traditional antennas may face challenges in providing reliable radio communication coverage. In various embodiments, the leaky cable 534 may distribute signals more evenly throughout a confined spaces. Further, the intentional leakage of radio frequency 542 may be achieved through the design of the aperture 538 in the structure of the outer conductor 540.

As discussed, the radio frequency 542 may leak out via radio frequency out 544B, and based on such radio frequency 542 may cause a response in a sensor 546 where such response may be transmitted via the radio frequency in 544A.

Use of the leaky cable 534 may allow for spatial placement sensing of resonant sensors. It is to be understood that spatial placement sensing may apply to any confined structure (such as a vehicle, shipping container, standing structure) through telemetry. For example, remote measurement and transmission of data from sensors may be conveyed to a monitoring or control node. In various embodiments, the spatial placement sensing may include sensors that capture data from objects in real time as they are moved through a confined space. Further, the spatial placement sensing may be used to determine position, velocity, and/or acceleration of such objects.

It is to be understood that a leaky cable 534 may be used for distributed energy delivery (such as for communications, Internet signal propagation, Wi-Fi, train position detection, remote-control communication, etc.). In various embodiments, the leaky cable 534 may operate by emitting radiant energy (the radio frequency 542) via the apertures 538. The resonant sensor 546 may absorb the energy of the radio frequency 542 at a specific predetermined frequency determined by the sensor's properties (including its permittivity), and the absorption may be detected by the leaky cable 534 back through the apertures 538. Changes in real-time conditions may correspond with frequency shifts in the reflected signal by the resonant sensor 546, which may be indicative of varying levels of absorption.

With respect to FIGS. 5A-5E, one focus of the use of resonant sensors was that the change in permittivity may correspond with frequency shifts in the response. With respect to the configuration 509, one focus of the use of resonant sensors may include directing detecting spatial placement of objects within a confined container (rather than measuring indirectly the spatial placement via a change in permittivity).

In one embodiment, advanced transformations (such as daughter-wavelet transform analysis) may be used to handle data from resonant sensors and measurements of distance and movement. In this manner, advanced transformations may be used for complementary concurrent frequency/time-domain methods, allowing for, in one embodiment, package location and package volumetric fill factor.

It is to be appreciated that traditional use of transformation (Fourier transform) can be applied to frequency spectrum analysis. It traditionally has not been used in the time domain. A wavelet transform, however, may be used for time-domain measurements in combination with resonant sensing and/or position telemetry.

Figure 5G:
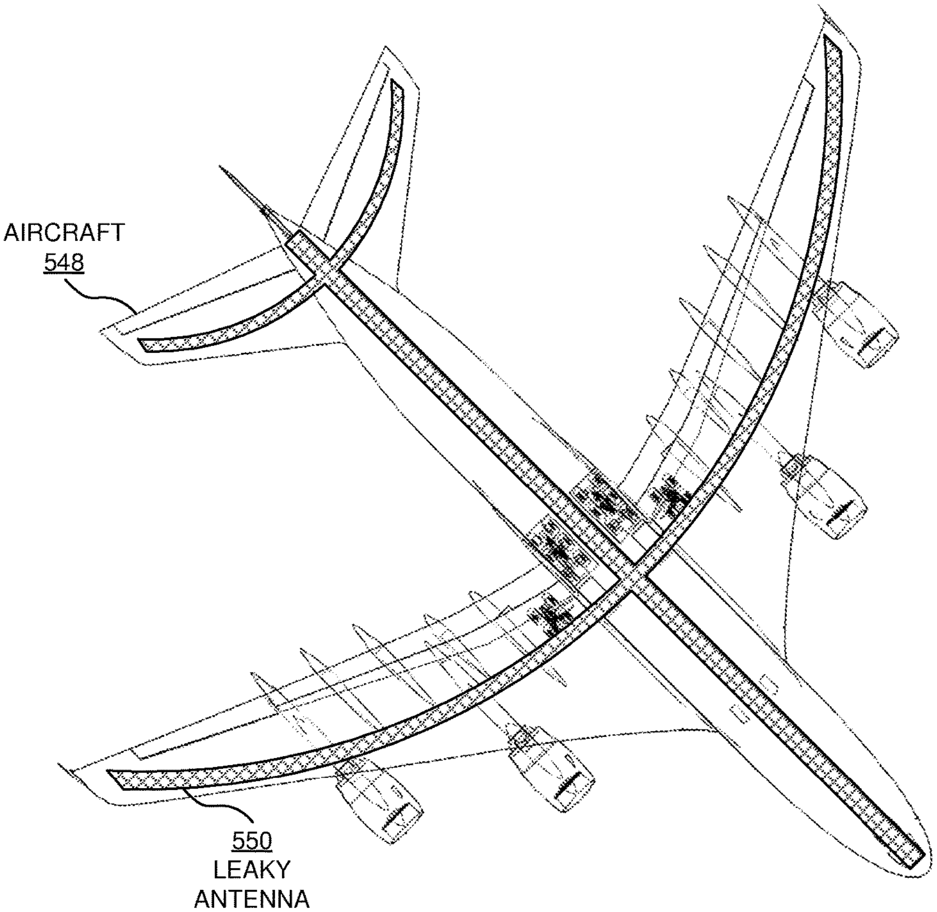
FIG. 5G shows a leaky antenna interrogation system, in accordance with one embodiment.

FIG. 5G shows a leaky antenna interrogation system 511, in accordance with one embodiment. As an option, the leaky antenna interrogation system 511 may be implemented in the context of any one or more of the embodiments set forth in any previous and/or subsequent figure(s) and/or description thereof. Of course, however, the leaky antenna interrogation system 511 may be implemented in the context of any desired environment. Further, the aforementioned definitions may equally apply to the description below.

As shown, the aircraft 548 may include a leaky antenna 550 integrated within the structure of the aircraft 548 itself. The leaky antenna 550 may be used in a variety of communication systems (particularly in underground or confined environments). As such, although the leaky antenna 550 is shown specifically within the context of the aircraft 548, it is to be appreciated that it may be used in a variety of contexts (e.g., within buildings, tunnels, homes, tractor trailers, trains, mines, subways, underground, bridges, long corridors, warehouses, etc.). In one embodiment, the leaky antenna 550 may be configured to provide radio frequency (RF) signal coverage in areas where traditional antennas may not be effective due to physical obstructions, such as walls or tunnels.

Additionally, in one embodiment, the leaky antenna 550 may be configured to allow a radio frequency (RF) signal to "leak" out of the cable, which in turn, may provide coverage along the entire length of the cable. As such, signal propagation may be increased along a surface (or within a confined space) by using the leaky antenna 550.

Figure 5H:
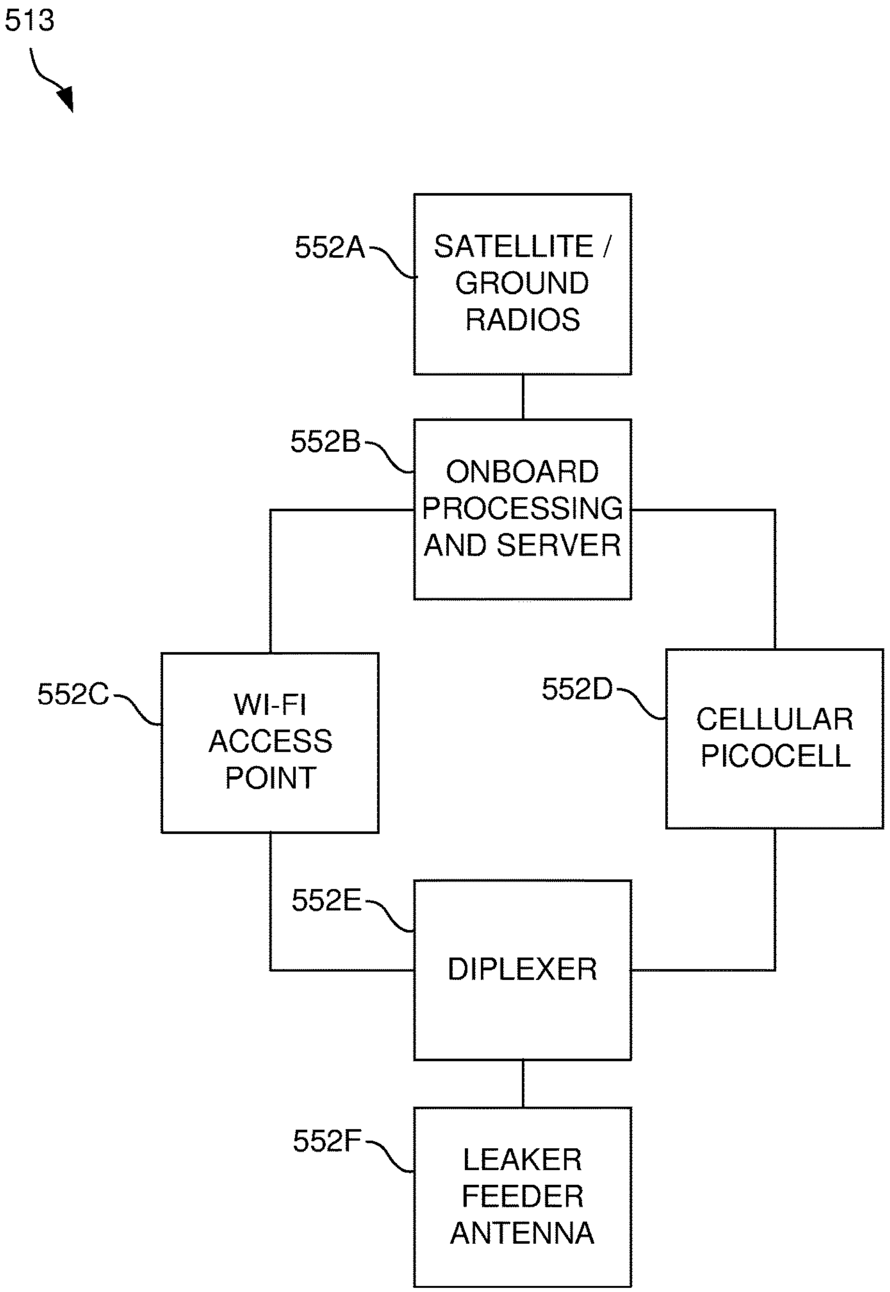
FIG. 5H shows an architecture for leaky feeder antenna, in accordance with one embodiment.

Further, the leaky antenna 550 may operate in the context of, for example, FIG. 5G and/or FIG. 5H (among others). For example, the leaky antenna 550 may be used to interrogate split ring resonators (SRRs). Further, the interrogation may include determining the presence of water droplet formation, determining the volumetric fill of a container, etc.

In one particular example, a surface of the aircraft 548 may begin to accumulate ice particles. SRRs embedded throughout the surface (or near the surface) of the aircraft may detect the presence of water droplets. An interrogation signal sent via the leaky antenna 550 may allow for interrogation of all SRRs within the aircraft 548. In this manner, the SRRs may allow for a sensed real-time, real-state mapping of water droplets across the entire aircraft 548.

It is to be appreciated that the application to water droplets is but one example. In a similar manner, the SRRs may be configured in a variety of other settings with similar detection resulting. For example, SRRs may be embedded within brake pads such that when brake pads are worn down, the dielectric constant (and/or permittivity) may alter, which in turn, may be communicated via an interrogation system. As such, the SRRs may be configured for a variety of applications based on the desired aspect that is to be sensed and/or monitored.

FIG. 5H shows an architecture 513 for leaky feeder antenna, in accordance with one embodiment. As an option, the architecture 513 may be implemented in the context of any one or more of the embodiments set forth in any previous and/or subsequent figure(s) and/or description thereof. Of course, however, the architecture 513 may be implemented in the context of any desired environment. Further, the aforementioned definitions may equally apply to the description below.

As shown, the architecture 513 shows one possible arrangement within the context of an aircraft communication's system. Such a system may include radios 552A (such a satellite and/or ground systems, etc.) which may be in communication with an onboard processing and server 552B. The onboard processing and server may be in communication with a Wi-Fi access point 552C and/or a cellular picocell 552D, each of which, in turn, may be in communication with a diplexer 552E. The diplexer 552E may be in communication with the leaky feeder antenna 552F. Thus, the leaky feeder antenna 552F may be integrated into the communications system of an aircraft. Additionally, the leaky feeder antenna 552F may include a system and/or assembly associated with the leaky feeder antenna 552F.

Additionally, as discussed herein, the architecture 513 may be used in combination with SRRs to detect water droplet accumulation. For example, the leaky feeder antenna 552F may be used to interrogate the SRRs to determine a state of water droplet accumulation on a wing of an aircraft. In response to the detection, the leaky feeder antenna 552F may communicate such information directly to a control module of the aircraft for appropriate remedial action.

Figure 5I:
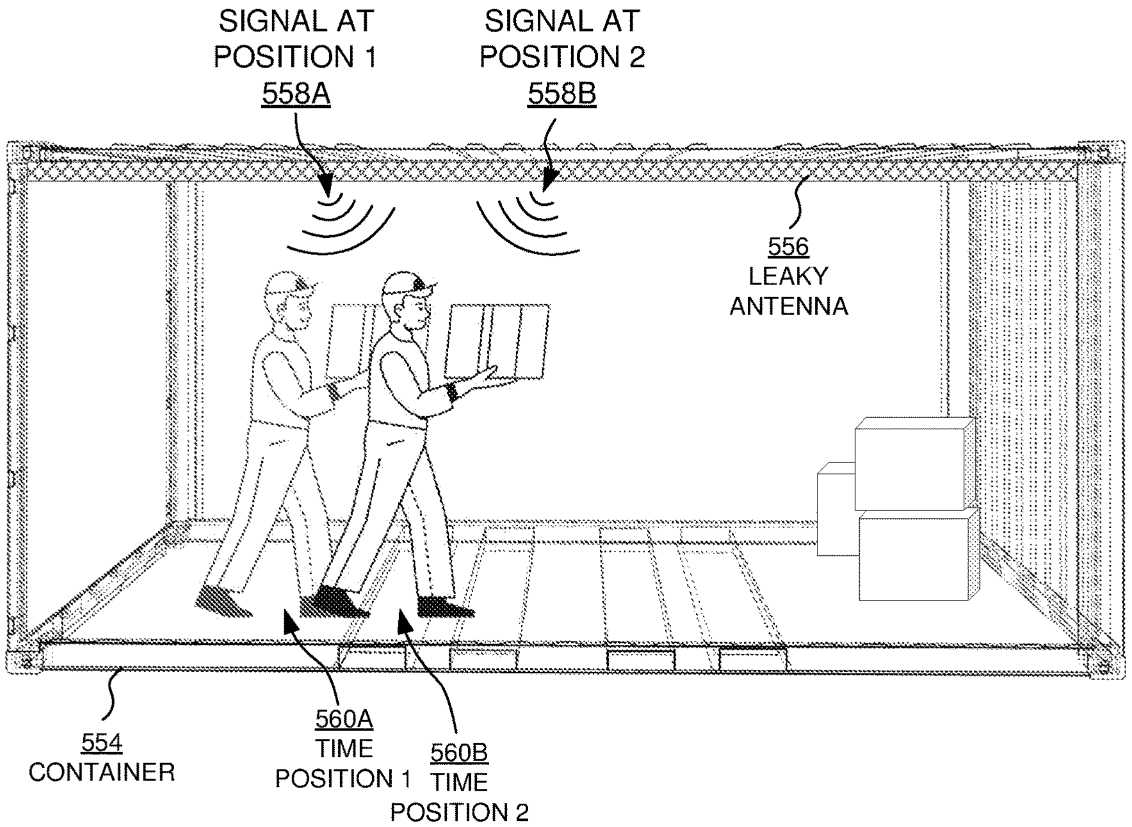
FIG. 5I illustrates a time domain spatial mapping based on sensor detection, in accordance with one embodiment.

FIG. 5I illustrates a time domain spatial mapping 515 based on sensor detection, in accordance with one embodiment. As an option, the mapping 515 may be implemented in the context of any one or more of the embodiments set forth in any previous and/or subsequent figure(s) and/or description thereof. Of course, however, the mapping 515 may be implemented in the context of any desired environment. Further, the aforementioned definitions may equally apply to the description below.

As shown, the container 554 includes a leaky antenna 556 (consistent with the configuration 509). Within the container 554 is a signal at position 1 558A which may correspond with a time position 1 560A. Additionally, a signal at position 2 558B may correspond with a time position 2 560B.

In operation, a package may be carried into the container 554. The package may be equipped with a label equipped with sensor. For example, the label may have a resonant sensor containing information about the package's general size and weight, which may be determined during processing at a shipping facility. The leaky antenna 556 may be placed in the center of the interior roof of the container 554, leveraging complementary frequency/time domain technology. It is to be appreciated that the leaky antenna 556 may be located at any location within the container 554.

As the package enters the container 554, the package may be continuously tracked with respect to its movement and placement. For example, at a first time position (corresponding with time position 1 560A), the leaky antenna 556 may interrogate the label on the package such that the signal at position 1 558A tracks a first location for the package. The tracking includes monitoring of size and weight of the package (which information, again, would be found on a label of the package which can be interrogated). At a second time position (corresponding with time position 2 560B), the leaky antenna 556 may interrogate the label on the package such that the signal at position 2 558B tracks a second location for the package. As the package is carried farther into the container 554, the leaky antenna may continually monitor the location of the package. Once a package comes to a stop, its assumed location is determined (e.g., based on the last location of the recorded position).

In various embodiments, the label printed with a resonant sensor consistent with FIGS. 16-10 and 16-11, as well as FIG. 18-16B. Further, the identification of a package may be identified in a manner similar to the impedance spectroscopy described with respect to FIG. 20-11.

It is to be appreciated that, in order to filter out static of surrounding objects, materials, etc., the transform (consistent with the description associated with the configuration 509) may focus specifically on the time domain of objects moving with respect to time. In this manner, the static of objects and/or materials not moving may be filtered out.

In one embodiment, a fill capacity of the container 554 may be based on the continually calculation of packages entering the container 554. Additionally, an indication of fill capacity may be based on predefined thresholds, and once such thresholds are surpassed, a notification may be sent to preconfigured destination (e.g., central sensor node, mobile phone, display screen, etc.).

In one embodiment, a package may be removed from the container 554. In a similar manner to tracking a package as it enters the container 554, if a package is picked up and moved, it will be tracked. If the package is removed from the container, the fill capacity of the container will be updated to indicate the increase in available fill space.

It is to be appreciated that multiple packages each with an individual resonator sensor label may be placed within the container 554, and multiple packages may be tracked simultaneously while they are moved into the container 554. Further, the operator filling the container 554 may be associated with a resonant sensor (such as printed on an identification badge) such that the operator placing each package within the container 554 may also be recorded.

As such, application of the mapping 515 may allow for more optimal loading of a container, leading to enhanced cargo management practices. Further, it may allow for a comprehensive spatial volumetric loading profile within the container 554.

Figure 5J:
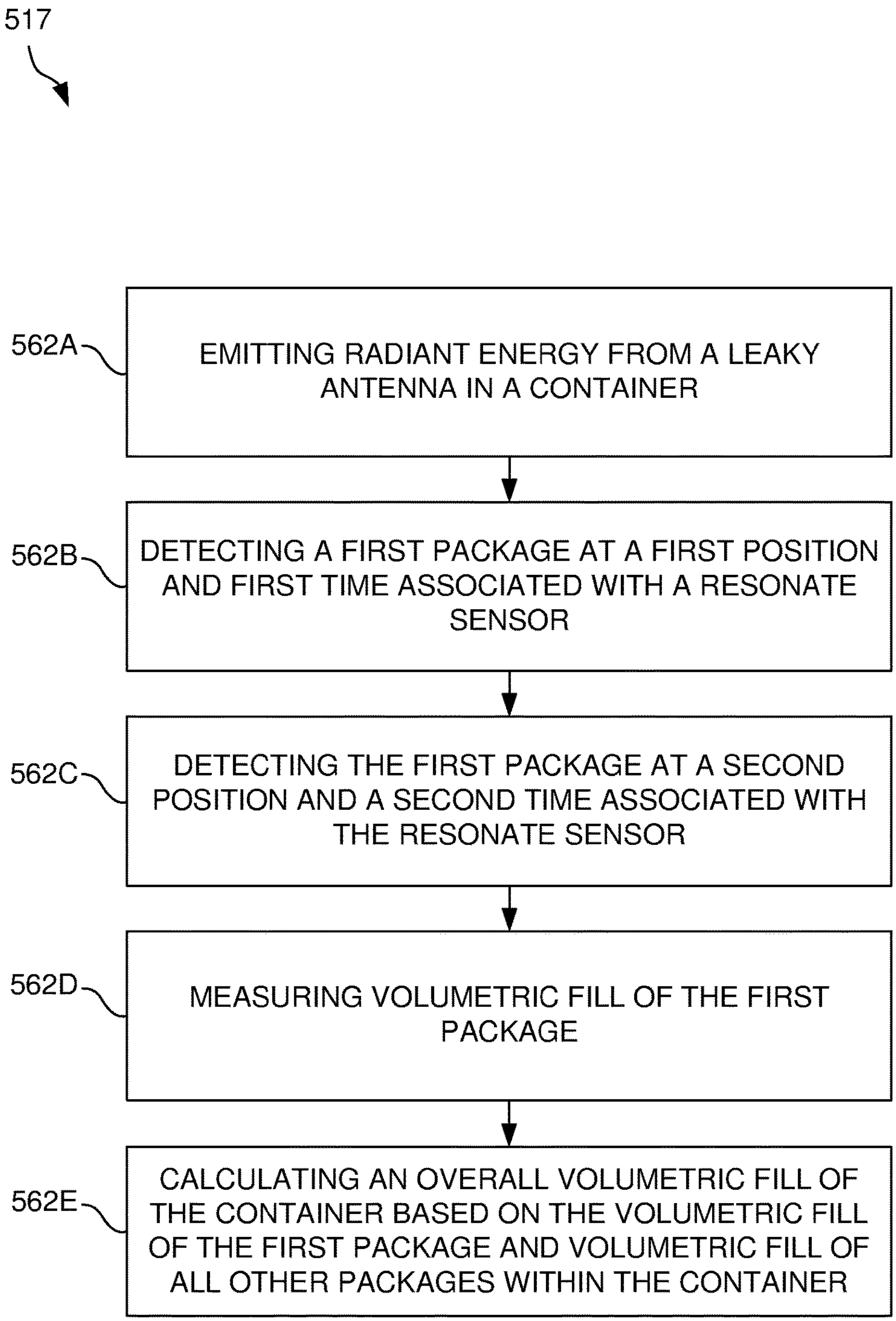
FIG. 5J illustrates a method for calculating volumetric fill of a container, in accordance with one embodiment.

FIG. 5J illustrates a method 517 for calculating volumetric fill of a container, in accordance with one embodiment. As an option, the method 517 may be implemented in the context of any one or more of the embodiments set forth in any previous and/or subsequent figure(s) and/or description thereof. Of course, however, the method 517 may be implemented in the context of any desired environment. Further, the aforementioned definitions may equally apply to the description below.

As shown, radiant energy is emitted from a leaky antenna in a container. See operation 562A. As discussed elsewhere, the radiant energy may include radio frequency. A first package is detected at a first position and a first time associated with a resonant sensor. See operation 562B. Additionally, the first package is detected at a second position and a second time associated with the resonate sensor. See operation 562C. Additionally, a volumetric fill is measured of the first package. See operation 562D. In this manner, as a package enters a container, it can be identified in terms of volumetric size and position.

Further, an overall volumetric fill of the container is calculated based on the volumetric fill of the first package and a volumetric fill of all other packages within the container. See operation 562E. The total volumetric fill may be a dynamic calculation based on packages entering, being repositioned, and even being removed from the container. Additionally, in some embodiments, the method 517 may be used in combination with autonomous systems to automatically allocate distribution of packages to be filled within a container.

For example, in one embodiment, a fulfillment center may package items together into one box to be shipped. The box, however, may not be considered "ready for shipping" until its total volumetric fill exceeds a predetermined threshold. Additionally, in another embodiment, a shipping cargo ship may employ a cost-based approach to shipping containers based on various metrics including total weight of the shipping container, a total volumetric fill of the container, a risk factor based on inclusion of any dangerous objects or substances within the container, etc. All of such information may be automatically detected and/or calculated as each package is brought into each individual shipping container.

Figure 5K:
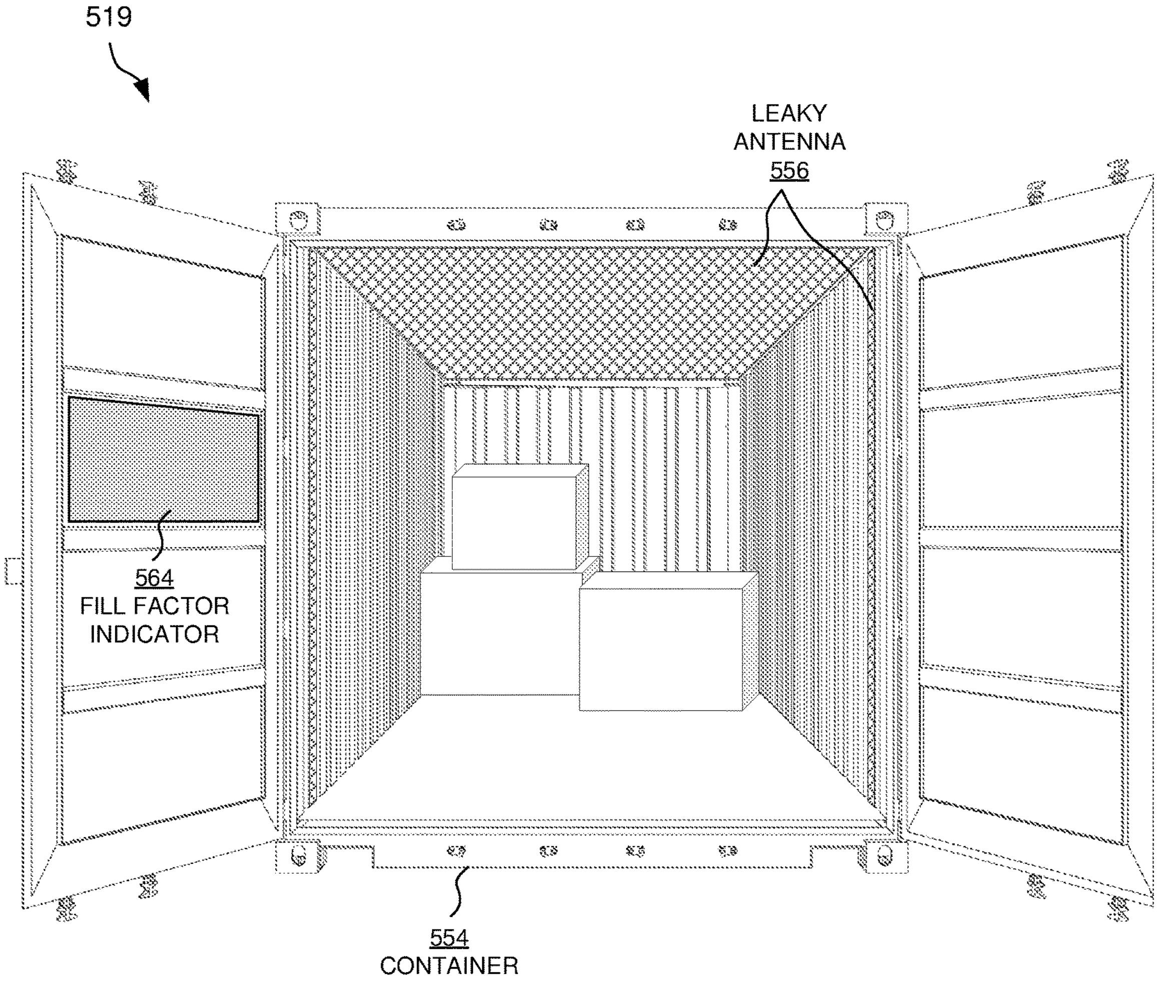
FIG. 5K illustrates a fill factor indicator based on sensor detection, in accordance with one embodiment.
Figure 5K:
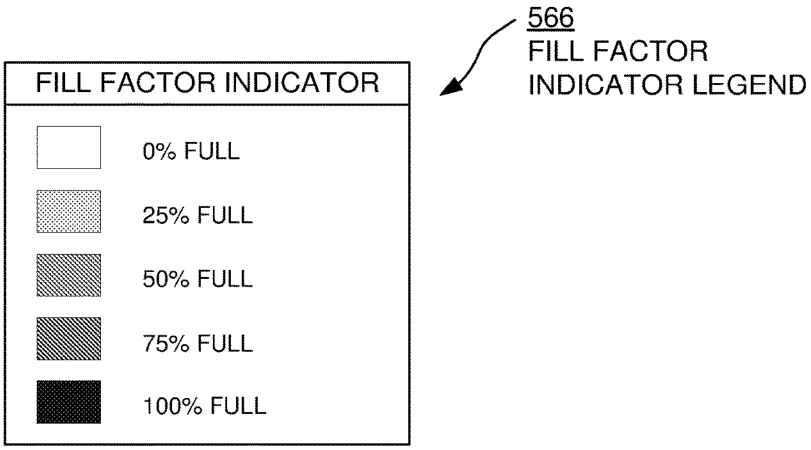

FIG. 5K illustrates a fill factor indicator 519 based on sensor detection, in accordance with one embodiment. As an option, the indicator 519 may be implemented in the context of any one or more of the embodiments set forth in any previous and/or subsequent figure(s) and/or description thereof. Of course, however, the indicator 519 may be implemented in the context of any desired environment. Further, the aforementioned definitions may equally apply to the description below.

As shown, the container 554 may include a leaky antenna 556. Packages may be filled within the container 554, and as packages are brought into the container 554, a total volumetric fill may be computed for the container which may then be represented via the fill factor indicator 564. In one embodiment, the fill factor indicator 564 may be a static color corresponding with a fill factor indicator legend 566.

In various embodiments, the fill factor indicator 564 may be displayed on the container 554. In other embodiments, the fill factor indicator 564 may be sent to a central node for management and display, to a mobile device (where alerts can be triggered when predetermined thresholds are satisfied), to a display external to the container 554, to an asset tracking management system, etc.

Figure 5L:
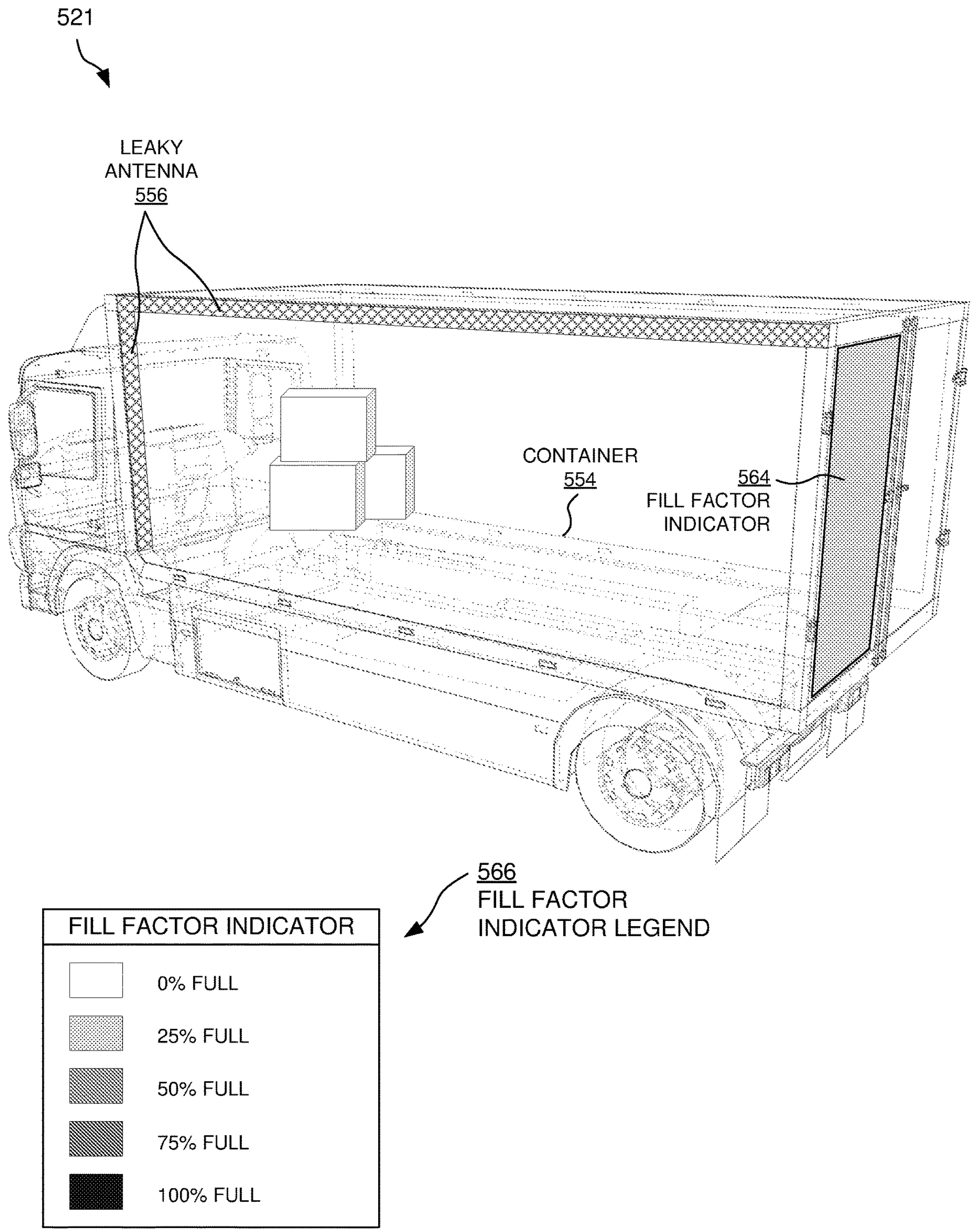
FIG. 5L illustrates a fill factor indicator based on sensor detection, in accordance with one embodiment.

FIG. 5L illustrates a fill factor indicator 521 based on sensor detection, in accordance with one embodiment. As an option, the indicator 521 may be implemented in the context of any one or more of the embodiments set forth in any previous and/or subsequent figure(s) and/or description thereof. Of course, however, the indicator 521 may be implemented in the context of any desired environment. Further, the aforementioned definitions may equally apply to the description below.

As shown, the container 554 may be associated with a finite space of a truck. The truck may be equipped with a leaky antenna 556. In one embodiment, the fill factor indicator 564 may be displayed external of the truck. It is to be appreciated that after the container 554 is filled, the fill factor indicator 564 may be toggled on and/or off. For example, for security reasons, the fill factor indicator 564 may be disabled while the truck is en route (such as when it is 98% full of goods). In contrast, when the truck is empty, the fill factor indicator 564 may display that the truck is 0% which may be used to discourage break-ins.

It is to be appreciated that the indicator 521 may operate in a manner similar to, at a minimum, indicator 519.

Figure 5M:
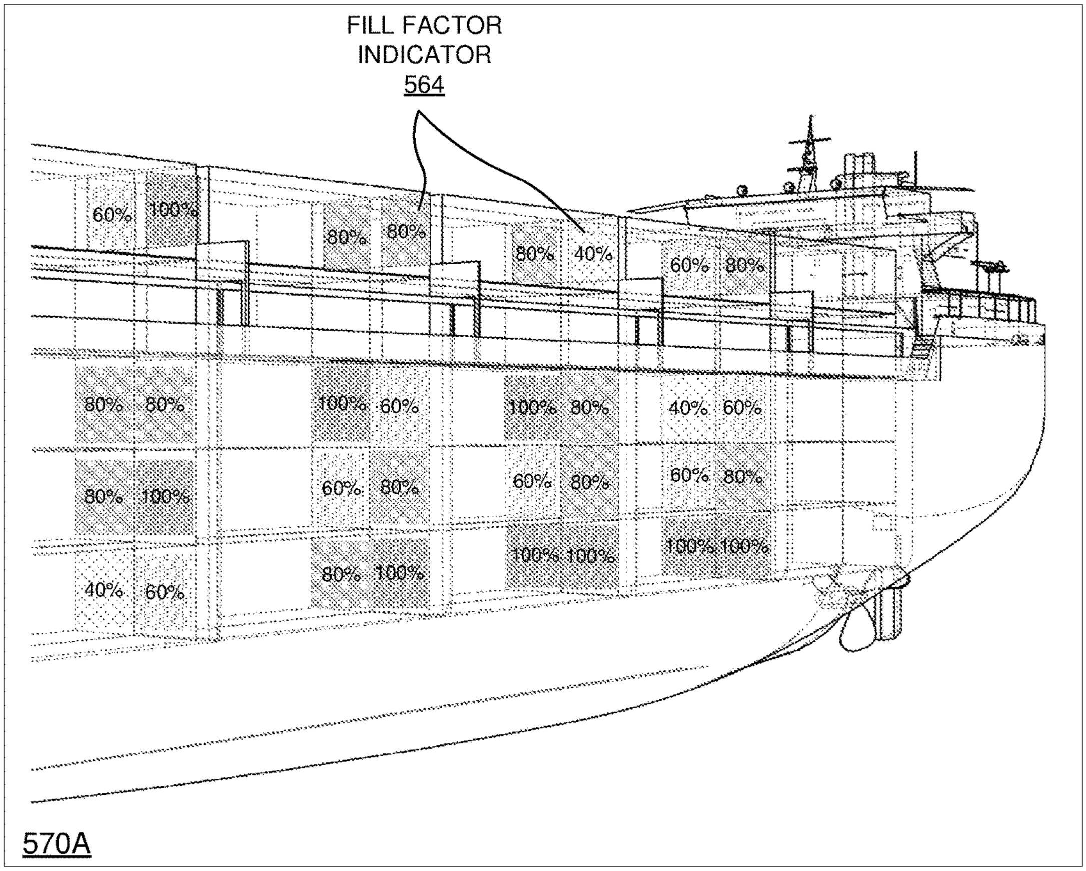
FIG. 5M illustrates a fill factor map indicator based on sensor detection, in accordance with one embodiment.
Figure 5M:
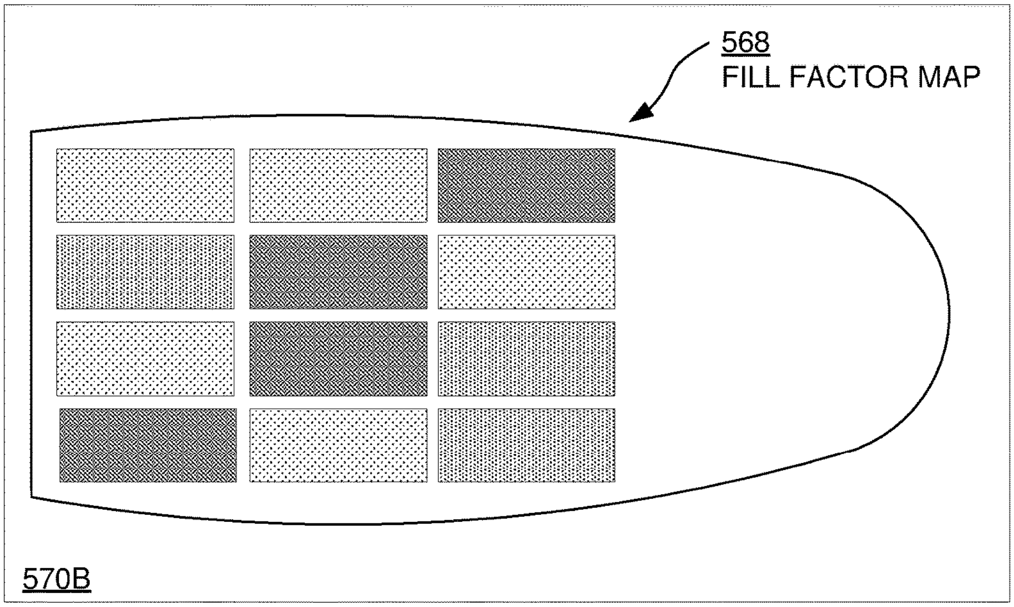

FIG. 5M illustrates a fill factor map indicator 523 based on sensor detection, in accordance with one embodiment. As an option, the indicator 523 may be implemented in the context of any one or more of the embodiments set forth in any previous and/or subsequent figure(s) and/or description thereof. Of course, however, the indicator 523 may be implemented in the context of any desired environment. Further, the aforementioned definitions may equally apply to the description below.

As shown, item 570A shows a side perspective of a cargo ship filled with shipping containers, where each shipping container is associated with a fill factor indicator 564. It is to be appreciated that each shipping container may or may not display physically the fill factor indicator 564. Regardless, data on each shipping container may be retrieved such that total volumetric fill for each shipping container may be determined. This is shown in item 570B where each level of the cargo ship may display a fill factor map 568 corresponding with the fill factor indicator 564 of each shipping container. In this manner, as each level of the cargo ship is scanned, corresponding fill factor indicators 564 for each shipping container may be displayed. It is to be appreciated that in addition to knowing total volumetric fill for each shipping container, data for each shipping container may include total weight, contents of each shipping container, etc.

Such data may be useful to more effectively position (for equal weighting) shipping containers, to calculate greenhouse gas emissions for each aspect associated with a package, to track more effectively each package of each shipping container, and/or to determine more effective transportation solutions to maximize volumetric space of each shipping container. For example, if it was known that a shipping container on a cargo ship was less than half filled, a tariff may be imposed for wasted space.

Figure 5N:
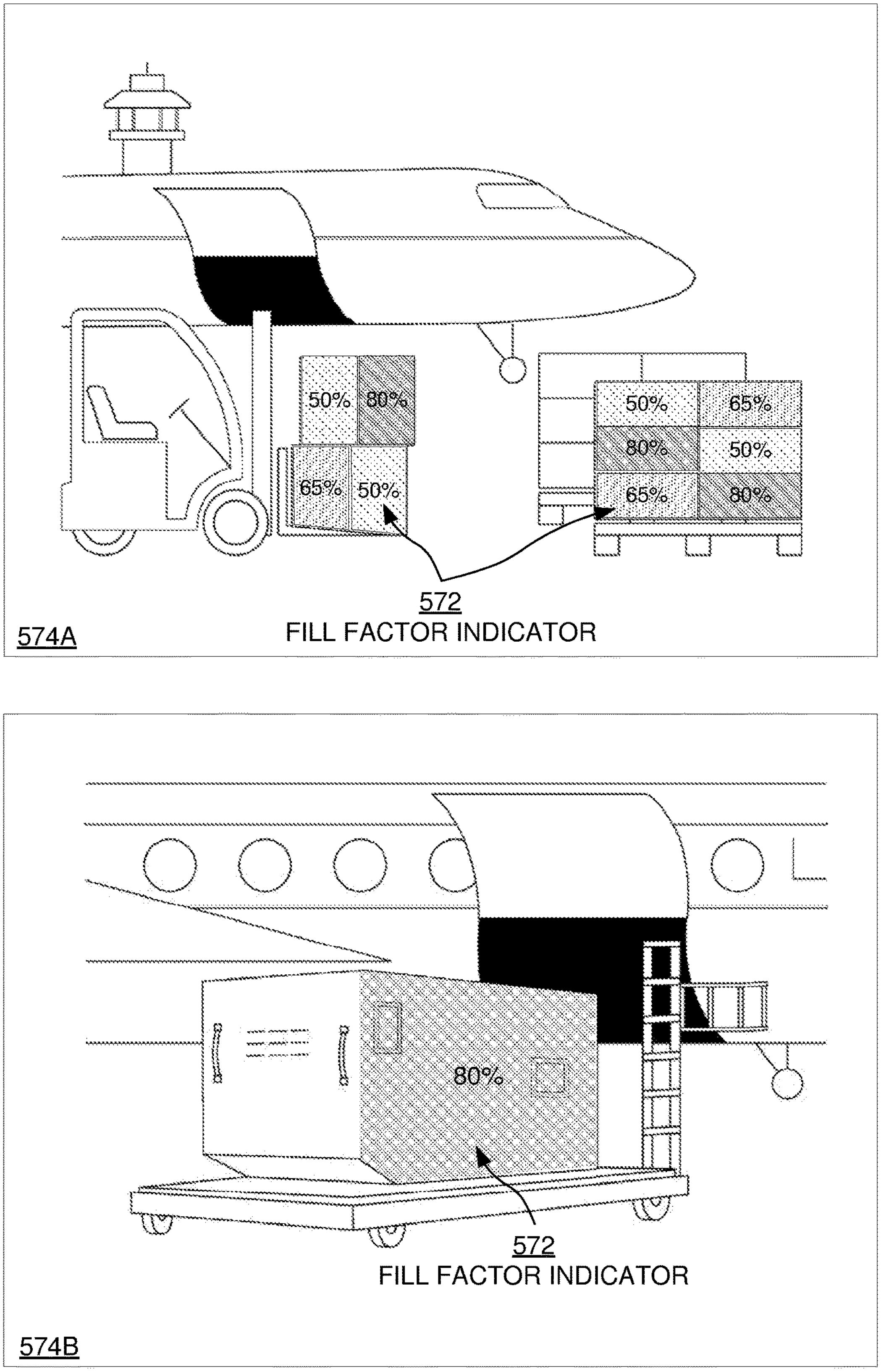
FIG. 5N illustrates a various fill factor indicator configurations based on sensor detection, in accordance with one embodiment.

FIG. 5N illustrates a various fill factor indicator configurations 525 based on sensor detection, in accordance with one embodiment. As an option, the configurations 525 may be implemented in the context of any one or more of the embodiments set forth in any previous and/or subsequent figure(s) and/or description thereof. Of course, however, the configurations 525 may be implemented in the context of any desired environment. Further, the aforementioned definitions may equally apply to the description below.

As shown, the configurations 525 include an item 574A showing loading of a plane with packages. Each package may be associated with a fill factor indicator 572. As discussed herein, the fill factor indicator 572 may be displayed physically externally on the package, or may be determined electronically with being physically displayed.

The item 574A shows the fill factor indicator 572 on individual packages. In contrast, the item 574B shows a fill factor indicator 572 on a cargo container for air transport. The fill factor indicator 572 of the item 574B may be displayed externally (or on an external device) such that an operator that is filling up the cargo container may know when the cargo container is sufficiently filled. In another embodiment, an airlines may have employee based metrics that correspond with fill factor statistics generated by each employee that loads containers. In this manner, the fill factor indicator 572 may be used as an indication of whether there is additional space which may be filled within a container, and/or as a metric associated with an employee's productivity and effectiveness at filling a container.

Additionally, as discussed herein, data corresponding with each package may include data relating to a package size, origination, destination, contents, risk (such as flammability limits, hazardous class labels, toxicity, corrosiveness, etc.), etc. As such, in filling cargo containers, a container may be filled with similar risk materials (such as of a certain hazardous class).

Figure 5O:
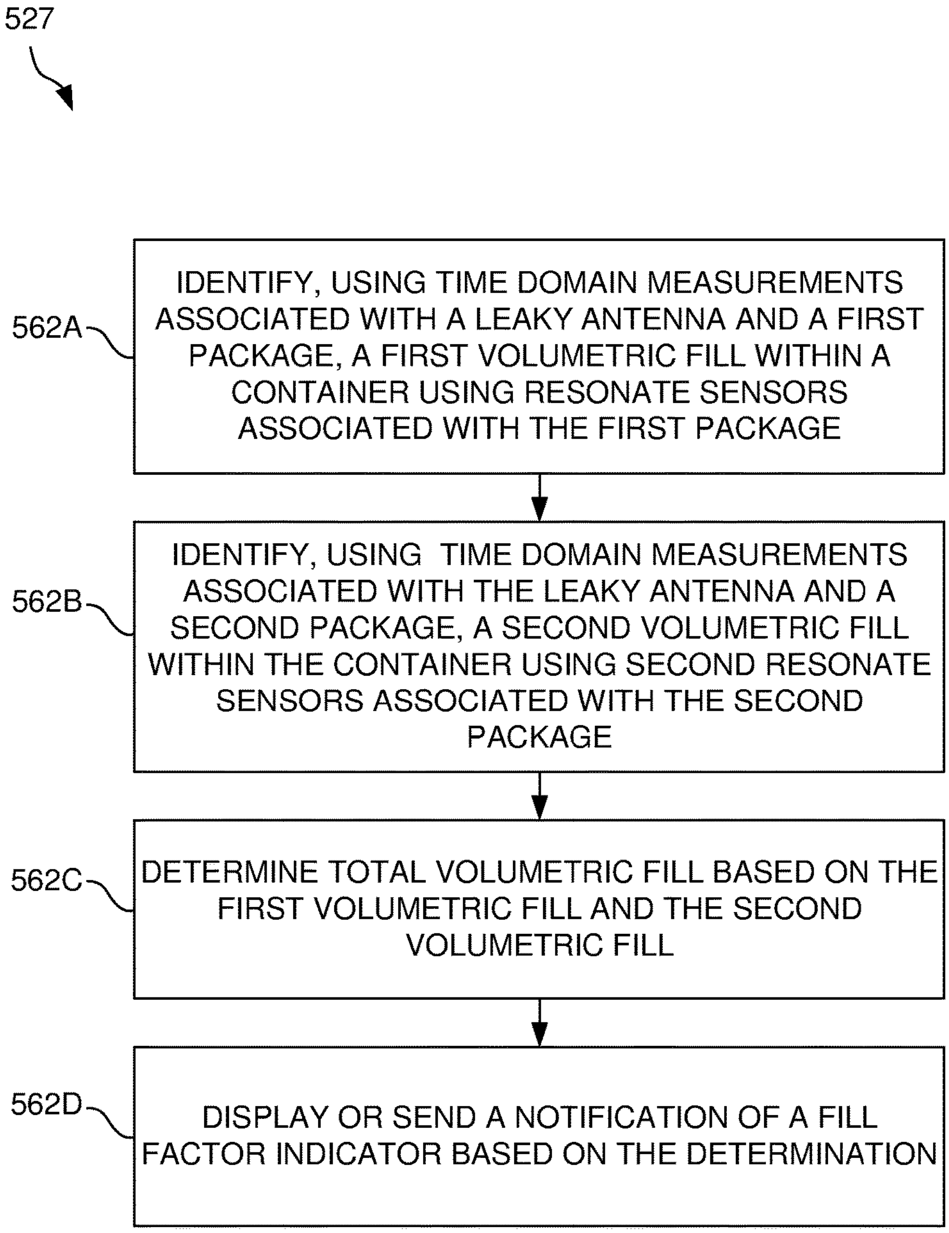
FIG. 5O illustrates a method for providing a notification based on a fill factor indicator, in accordance with one embodiment.

FIG. 5O illustrates a method 527 for providing a notification based on a fill factor indicator, in accordance with one embodiment. As an option, the method 527 may be implemented in the context of any one or more of the embodiments set forth in any previous and/or subsequent figure(s) and/or description thereof. Of course, however, the method 527 may be implemented in the context of any desired environment. Further, the aforementioned definitions may equally apply to the description below.

As shown, using time domain measurements associated with a leaky antenna and a first package, a first volumetric fill is identified within a container using resonate sensors associated with the first package. See operation 562A. Additionally, using time domain measurements associated with the leaky antenna and a second package, a second volumetric fill is identified within the container using the second resonate sensors associated with the second package. See operation 562B. A total volumetric fill is determined based on the first volumetric fill and the second volumetric fill. See operation 562C. Further, a notification of a fill factor indicator is displayed or sent based on the determination. See operation 562D.

It is to be appreciated that the method 527 is focused substantially on volumetric fill of a container and a corresponding fill factor indicator. However the method 527 may be applied to a variety of other situations. For example, the method 527 may be applied to logistics in to assist with reducing transportation costs, minimize the number of containers needed, etc. The method 527 may be applied to food and beverage manufacturers and distributors to ensure that products are efficiently packed and transported. The method 527 may be applied to waste management to optimize collecting of containers once they are filled. For example, efficient container fill may reduce the frequency of waste collection and transportation. As such, the methods 527 may be applied to a variety of industries, may assist with reducing greenhouse gas emission footprints, and increase operational efficiency.

FIG. 6 illustrates a system 600 for sensor learning, in accordance with one embodiment. As an option, the system 600 may be implemented in the context of any one or more of the embodiments set forth in any previous and/or subsequent figure(s) and/or description thereof. Of course, however, the system 600 may be implemented in the context of any desired environment. Further, the aforementioned definitions may equally apply to the description below.

In various embodiments, the system 600 may be used for high fidelity, edge-based sensor systems. For example, sensors may relay information directly to an edge-connected device (or may even function as an edge device), which in turn, may operate in conjunction with passive sensors (such as high frequency resonant sensor structures, medium frequency split ring resonators, etc.). Such high fidelity sensing may allow for greater intelligence in edge-located devices, as well as any material, layer, surface, compound, etc.

As an analogy, weather forecasting historically was deployed at a regional level (e.g., airports) where data was gathered and forecasting was conducted. It was determined, historically, that forecasting could be improved by having greater data (and pulling additional sensing information). In much the same way, the present application allows for widespread deployment of high fidelity sensors (in nearly every market, infrastructure, material, etc.). The present system 600 can be built, in one embodiment, upon known infrastructures (e.g., routers, hot spots, etc.).

With respect to integration with artificial intelligence (AI) and/or machine learning systems, the sensors may be used in a variety of configurations. In one embodiment, the AI systems may include a machine learning system which may be used to give greater intelligence to the sensor. For example, a first sensor may detect a digital signature of an unknown compound, and the machine learning system may be used to determine the compound which, after discovery, may update all other sensors so that identification can occur locally. Additionally, the sensors may have preconfigured classifier buckets within the sensor such that when a compound is sensed, it is statistically allocated to a specific bucket (or combination thereof). It is to be appreciated that the greater the number of classifier buckets, the more precise determination may be made by the sensor. In this manner, the AI may assist with providing a set of buckets for the intended use of the sensor. For example, a sensor used in a chemical lab may have a chemical set of classifier buckets (based on hazards within the environment), whereas a sensor used in a house may have a home set of classifier buckets (based on common hazards within a house). In this manner, a preconfigured set of classifier buckets may be associated with a sensor for more precise identification of compounds within a set environment.

Of course, the classifier buckets may be updated and/or reconfigured as needed to provide the sensor with greater precision and/or applicability. For example, a sensor with a first set of classifier buckets may be made available to a customer at a first price point, which if upgraded, would allow for more precise identification (based on a greater number of classifier buckets, etc.).

In the event that new digital signatures are detected by a sensor, such information may be sent back to a higher powered computing device (such as a machine learning system) to determine what classifier bucket the digital signature should be placed (if any).

In some embodiments, an array of sensors may be configured to provide enhanced detection. For example, each sensor may include some overlapping classifier buckets, and each may include additional classifier buckets. In this manner, if one sensor fails to identify a new digital signature, another sensor in the array may still be able to determine what compound it relates to. In one embodiment, the array of sensors may include a central sensor node, which may be used to receive information from the array of sensors, and control processing and sending of information between each of the sensors. The central sensor node may be used, for example, in response to detecting a new digital signature, to contact each of the sensors for greater detection capability. In the event that the central sensor node is unable to determine the digital signature, the central sensor node may then pass that information on to a higher powered computer device (such as a machine learning system) for identification.

As such, in various embodiments, in response to detecting a new digital signature, one or more sensors may assist with triaging the new digital signature, including, but not limited to, contacting local sensor devices, contacting a central node, collecting additional information, communicating with a server, etc.

It is to be appreciated that sensors configured as an edge device may be configured for rudimentary processing. However, as discussed herein, the sensor edge device may be configured as an array such that the array collectively has greater intelligence than a single sensor.

In various configurations, a classification management system may be used to assign confidence. Such confidence (associated with identifying the digital signature) may be dependent on the device. For example, a sensor device may have a lower confidence level (due to fewer number of classifier buckets), whereas a higher processing device may have a higher confidence level.

In one embodiment, the machine learning system may be used to analyze known digital signatures and then create new additional signatures. In this manner, the machine learning system may be proactive in identifying new signatures (before they have in fact been detected). As such, the machine learning system may be used to provide anticipatory digital signature functions. After making new associations, the machine learning system may update relevant sensors with the updated digital signatures (and/or classifier buckets). Of course, as discussed herein, the machine learning system may function in a reactive manner (namely in response to a sensor identifying a new digital signature).

As discussed, the sensors (and associated classifications via the classifier buckets) may be environment specific. For example, a class of sensors may be specific to the oil industry, a class of sensors may be specific to the medical field, etc. Additionally, the classifier buckets may each be associated with a preconfigured library of digital signatures, where each digital signature relates to a specific compound or multiple compounds.

Information from sensors (especially resonant gas/vapor sensors) can be provided to an artificial intelligence (AI) and/or machine learning backend computing system such that the AI back end computing system learns on an ongoing basis by unsupervised or semi-supervised training. As an example, and relying in part on a machine learning classification system, when a new sensor signal (or combination of multiple sets of contemporaneously gathered sensor signals) is received at the AI back end, the new input signal information may be examined to see if it is "new". If so, the next step is to associate a learned output signal with the new signals. This association between input signals and one or more output signals can be done (1) in accordance with any known-in-the-art supervised learning techniques (e.g., via interaction with an 'expert'), or (2) based on correlation of the new signals with previously seen (and trained) signals, and/or (3) using some combination of #1 and #2.

As such, the utility (e.g., scope, sensitivity, etc.) of the sensors can be constantly improved. Moreover, in some cases, the learnings can be backfed to the in situ sensing subsystem which in turn may result in greater utility in the form of a "smarter" system. In some cases the in situ sensing subsystem offers faster responses (e.g., early warning in advance of remediation).

As an illustrative example, at a first moment in time, information corresponding to a pair of sensors is trained to be predictive of the presence of methane gas. At a later moment in time, additional sensor signals (i.e., that is deemed to be different from previously classified sensor signals) are associated with the presence of methane gas in combination with the presence of oxygen. As an example of the foregoing greater utility, a new alert (e.g., DANGER WARNING—LEAK) might be emitted by the in situ sensing subsystem.

An example environment for implementing the foregoing is shown and described as pertains to FIG. 6. In one embodiment, the system 600 may depict a system for continuous computer-aided training of a machine learning analyte classifier.

As shown, an array of sensors 630 may constitute a deployed detection system. The deployed detection system may be configured with communications controller 604 that is capable of carrying out a communication protocol between the deployed detection system that is situated in environment 628 and any other computer and/or system/environment. In the system 600, the deployed detection system situated in environment 628 may communicate with server 610. The server 610 may in turn be interfaced using any known means with a machine learning model 618.

When a raw signature $606_1$ is received at server 610, the server 610 may access the machine learning model 618 and return a classification $608_1$ to the deployed detection system. If the classification $608_1$ matches one of the analytes of interest, the deployed detection system issues an alert 626.

In some cases, when a raw signature $606_1$ is received at server 610, the server might recognize the raw signature as being "new" (i.e., hitherto unclassified). In some cases, the server knows previously seen classifications, and thereby determines that the raw signature is new. In other cases, the server accesses the machine learning model 618 to verify that the raw signature is new or to determine that the confidence interval of the predicted classification is too wide (e.g., beyond a threshold). In this latter case, the new raw signature $606_2$ is provided to onward processing that is carried out so as to develop (e.g., via unsupervised training or via supervised training) new output vectors based on the given raw signature.

As pertains to unsupervised training, rather than relying on an expert to provide a classification, instead, a computer-implemented agent 614 is consulted. Multiple signatures for which the machine learning model has been previously trained (e.g., trained to have a corresponding output vector of classifications) are provided to the agent 614. The agent 614 in turn may avail of a signature decompiler 616, which signature decompiler is able to break up a raw signature into individual components, any of which may have a corresponding classification $680_3$.

In one embodiment, it is to be appreciated that an expert may be consulted within the confines of a supervised training, which may result in a corresponding classification $608_2$.

The computer-implemented agent 614, possibly after availing of the function of the signature decompiler 616, then enters a new output vector of classifications (i.e., a learned classification vector $608_4$) corresponding to the new signature. Each constituent of a given classification vector may have an association with a probability and/or each constituent of a given classification vector may have an association with a confidence interval.

A software generator 620 receives the foregoing learned classification vector $608_4$ together with its corresponding raw signature vector $606_3$. The software generator 620 includes, or is integrated with, a sensor tuner 622. The software generator 620 generates new software code (i.e., new code 612) and provides the new code to the deployed detection system of the environment 628. The deployed detection system in turn uses the provided new software code 612 to tune one or more sensors of the other sensors 624.

Thereafter, the deployed detection system can respond to detected analytes (e.g., analytes corresponding to the new output vector of classifications). In this manner, the deployed detection system can respond more readily to detection events. For example, the deployed detection system can more readily issue alerts.

It is to be appreciated that the server 610 and machine learning model 618 may be in communication beyond a reactive stance. For example, a repository of classifications at the server 610 may be the basis for training the machine learning model 618 and for the machine learning model 618 to proactively come up with new classifications hitherto not known. Once new classifications are identified, they may be then be subsequently analyzed as a new raw signature $606_2$ consistent with the description herein. In this manner, the system 600 may be used proactively to build a more robust system of classifications. As has been discussed, the greater the depth of classifications, the greater the intelligence of the sensors (including the sensor array 630). Thus, the system 600 may be used precisely for increasing the accuracy of identification of new classifications, seeking out and finding new classifications, and building a database of classification to increase the intelligence of the sensors.

FIG. 7 illustrates a training system 700 for sensor learning, in accordance with one embodiment. As an option, the system 700 may be implemented in the context of any one or more of the embodiments set forth in any previous and/or subsequent figure(s) and/or description thereof. Of course, however, the system 700 may be implemented in the context of any desired environment. Further, the aforementioned definitions may equally apply to the description below.

As shown, the training system 700 includes a classification management system 710 with subcomponents known signatures 712 and new signatures 714. Additionally, the classification management system 710 interfaces with a communication network 702, and sensor entities including analyte sensor(s) 704, split ring resonator (SRR) sensor(s) 706, and/or other sensors 708. It is to be appreciated that any sensor type may interface with the classification management system 710, including biosensors, temperature sensors (such as thermocouples and thermistors), pressure sensors (such as barometers), light sensors (such as photodiodes and phototransistors), proximity sensors (such as infrared and ultrasonic sensors), motion sensors (such as accelerometers and gyroscopes), force sensors (such as strain gauges), gas sensors, humidity sensors, biometric sensors, sound sensors, image sensors, position sensors, occupancy sensors, water quality sensors, velocity sensors, magnetic sensors, radiation sensors, inertial measurement units (IMUs), etc.

The training system 700 may include a flow of data from the sensors (including the analyte sensor(s) 704, the split ring resonator (SRR) sensor(s) 706, and/or the other sensors 708) to the classification management system 710. For example, as sensor data is received, it may be determined whether the data corresponds with the known signatures 712 or if it corresponds with new signatures 714. A signature, within the context of the present description, may relate to the digital signature 300 as disclosed herein, including multivariate responses. Further, within the context of the system 600, a signature may utilize one or more aspects of an AI model in characterizing and analyzing the signature.

For example, in one embodiment, the training system 700 may utilize a machine learning system which may create AI models. When training the machine learning system, new AI models may be created which may include AI generated digital signatures. The AI models may then be tested to determine the accuracy of the AI generated digital signatures. In this manner, the output of the machine learning system (the AI models) can be looped back into the machine learning system in a perpetual type method, such that new digital signatures may be identified and assigned a confidence, which in turn, may then be compared and analyzed with respect to other known digital signatures (and classifier buckets).

The communication network 702 may be utilized to enable a cloud-based solution for the sensors (including the analyte sensor(s) 704, the split ring resonator (SRR) sensor(s) 706, and/or the other sensors 708) and the classification management system 710. As has been discussed herein, the sensors (including the analyte sensor(s) 704, the split ring resonator (SRR) sensor(s) 706, and/or the other sensors 708) may connect to the communication network 702 directly, via a central node (not show in FIG. 7), via a mesh-network configuration (where every sensor may be interconnected), via a star network configuration (where every sensor is connected to a central hub), a tree/hierarchal network (where sensors are arranged in a tree-like manner), a hybrid network (including a combination of two or more network types), and/or any other network type configuration.

FIG. 8 illustrates a flow 800 for training a sensor machine learning system, in accordance with one embodiment. As an option, the flow 800 may be implemented in the context of any one or more of the embodiments set forth in any previous and/or subsequent figure(s) and/or description thereof. Of course, however, the flow 800 may be implemented in the context of any desired environment. Further, the aforementioned definitions may equally apply to the description below.

As shown, the flow 800 includes many elements for training a sensor machine learning system. It is to be appreciated that the flow 800 is one exemplary solution for training a machine learning system based on sensor data. It is envisioned that the flow 800 may be modified as needed to more accurately/efficiently train a machine learning system based on the particular context (e.g., biological, medical, mechanical, etc.) of the sensor data.

The flow 800 displays a machine learning system 826 in communication with sensor data 802. The sensor data 802 may be sent to an event log 804 and the monitoring system 806. The event log 804 may function as a chronological record detailing the sequence of activities and occurrences as it relates to the sensor data 802. Further, the event log 804 may record events relating to the machine learning system 826, as reported by a classification management system 810. The event log 804 may capture vital information, including sensor status, sensor errors, sensor states, system events, errors, user interactions, and/or significant changes.

The monitoring system 806 may be responsible for real-time tracking, analysis, and reporting of the sensors and particularly the sensor data 802. The monitoring system may continuously observe key metrics, including computational resource utilization, response times, and model accuracy for the classification management system 810, and resource utilization, response times, needed action for the sensor data 802. The monitoring system 806 may be used to enable early detection of anomalies, facilitate proactive issue resolution, and ensure optimal functioning by alerting, for example, an administrator of the machine learning system 826 to potential problems or deviations from expected behavior.

Data received at the monitoring system 806 may then be passed on to signature detection 808. The signature detection 808 may include identifying specific patterns, characteristics, or signatures within the sensor data 802 that indicate the presence of predefined features, events, or signatures. By leveraging predefined signatures or models developed through machine learning, the machine learning system 826 can swiftly identify signatures associated with the sensor data 802. Additionally, the signature detection 808 may flag potential threats (signatures associated with a known risk, etc.), enabling rapid response and mitigation.

The sensor data is then passed from the signature detection 808 to the classification management system 810. In various embodiments, the classification management system 810 may include the infrastructure designed to organize, categorize, and manage the sensor data 802 or objects based on predefined classes or categories. The classification management system 810 may employ machine learning algorithms to automatically classify input sensor data 802 into distinct groups, enabling the classification management system 810 to discern patterns, make predictions, or facilitate efficient information retrieval. The classification management system 810 may train AI models on labeled datasets (based on the sensor data 802) to learn the characteristics of each class. Once trained, the classification management system 810 can autonomously classify new, unseen data, streamlining decision-making processes. As such, the classification management system 810 may be in communication with an AI signature system 822 to create training models to analyze, interpret, and develop new signatures. It is to be appreciated that the AI signature system 822 may include a machine learning system.

The classification management system 810 may be in communication with new signature analysis 812 when it is determined by the classification management system 810 that a new signature is received from the sensor data 802. The new signature analysis 812 then communicates the data to relevancy to signatures 814 which is then assigned a confidence 816. It is noted that the new signature 812 may be in direct contact with the AI signature system 822 to analyze the data associated with the new signature. Additionally, the relevancy to signatures 814 may be in communication with a rules database 824. The rules database 824 may have rules for classes of compounds, an indexing key for signature family characteristics, etc. Additionally, the rules database 824 is in communication with the classification management system 810 for purposes of analyzing the sensor data 802 when it is received (and for determining if the signature is new).

In various embodiments, the rules database 824 may include a structured repository that houses a set of predefined rules or logical statements. Such rules may include decision-making criteria, conditions, and actions to guide the behavior of the machine learning system 826. Additionally, the rules database 824 may serve as a knowledge base that the AI algorithms (of the AI signature system 822) can reference during processing. The rules may cover a range of scenarios, allowing the machine learning system 826 to make informed decisions, automate tasks, and/or provide recommendations based on specific conditions or input parameters.

Based on the assigned confidence 816, a configuration is assigned 818 which may include a predetermined set of parameters, settings, or specifications assigned to the new signature. These configurations may be defined based on specific requirements, constraints, and objectives of the machine learning system 826. The new signature is finalized 820 based on the assigned configuration 818, and the finalized new signature is then sent back to the classification management system 810, which in turn, may update the rules database 824 based on the finalized new signature. Further, the AI signature system 822 may be in contact with the rules database 824 such that, as the AI signature system 822 finds new relevant signatures or classes, it may update the rules database 824. Further, the rules database 824 may be used as training data for the AI signature system 822 to generate additional signatures.

As indicated hereinabove, the machine learning system 826 may be adapted for a variety of configurations and applications. For example, in various embodiments, the machine learning system 826 may use a variety of sensor data sets to train the AI signature system 822, the new signature analysis 812 may occur before the classification management system 810, the AI signature system 822 may replace the classification management system 810, etc. As such, the flow 800 may be modified as needed to accommodate the sensor data and the needs of the user.

FIG. 9 illustrates a method 900 for testing AI models based on digital signatures, in accordance with one embodiment. As an option, the method 900 may be implemented in the context of any one or more of the embodiments set forth in any previous and/or subsequent figure(s) and/or description thereof. Of course, however, the method 900 may be implemented in the context of any desired environment. Further, the aforementioned definitions may equally apply to the description below.

As shown, sensor data is collected. See operation 902. Next, a signature is identified (operation 904) by scanning the signature database for matches (operation 906). If it is determined that the identified signature is new (operation 910), then an AI model is created to classify the new signature (operation 912. Next, the AI model is tested to determine its confidence (operation 914), and a confidence is assigned to the AI model (operation 916). Once a confidence is assigned to the AI model (operation 916), or if it is determined that the identified signature is known (operation 908), the method 900 ends (operation 918).

It is to be appreciated that the method 900 may operate in the context of the flow 800 as herein discussed. Further, the AI models discussed within the context of the method 900 may additionally be construed as models used within a machine learning system architecture.

FIG. 10 illustrates an architecture 1000 for sensors-as-a-service, in accordance with one embodiment. As an option, the architecture 1000 may be implemented in the context of any one or more of the embodiments set forth in any previous and/or subsequent figure(s) and/or description thereof. Of course, however, the architecture 1000 may be implemented in the context of any desired environment. Further, the aforementioned definitions may equally apply to the description below.

As shown, the architecture 1000 includes a sensor as a service system 1002 which is in communication with hardware 1004. The sensor as a service system 1002 includes many subcomponents, including service nodes (shown as service 1 1012A, service 2 1012B, service 3 1012C, and service 4 1012D0, a classification management system 1010 (which may be analogous to the classification management system 810), sensor probes (shown as sensor probe 1 1008A, sensor probe 2 1008B, sensor probe 3 1008C, and sensor probe 4 1008D), and sensors (shown as sensor 1 1006A, sensor 2 1006B, sensor 3 1006C, and sensor 4 1006D). The architecture 1000 may assist in integrating AI integrated elements, cloud service resources, sensor management, etc.

For example, as discussed hereinabove the classification management system 1010 may be used to manage the sensors and collect information on the environment surrounding the sensors (such as temperature, pressure, chemical composition, etc.). The sensor probes may transmit environment data to the sensor as a service system 1002 (or to subcomponent associated therewith). Further, the sensor probes may be used to assess the health of the sensors, including conducting routine checks, ensuring that sensor data is within preconfigured thresholds (where outliers may be indicative of an error or issue), etc.

Further, in various embodiments, the hardware 1004 may include any resource needed for cloud-based services such as the sensor as a service system 1002. For example, the hardware 1004 may include virtualized servers, distributed and scalable storage systems for data management, high-performance networking hardware for reliable communication, data centers designed for redundancy and security, and accelerated computing components like GPUs and FPGAs for tasks such as machine learning. Further, the hardware 1004 may include security hardware, monitoring tools, and specialized devices for edge computing contribute to the overall architecture.

FIG. 11 illustrates an ecosystem 1100 for sensors, in accordance with one embodiment. As an option, the ecosystem 1100 may be implemented in the context of any one or more of the embodiments set forth in any previous and/or subsequent figure(s) and/or description thereof. Of course, however, the ecosystem 1100 may be implemented in the context of any desired environment. Further, the aforementioned definitions may equally apply to the description below.

As shown, the ecosystem 1100 includes a layering of systems and infrastructure in relation to the sensor as a service platform discussed herein. For example, the backend application 1102 may serve as the foundational and server-side components that facilitate the functionality, data processing, and business logic of the entire sensor as a service platform system. These backend applications 1102 may run on remote servers within the cloud infrastructure and handle tasks such as data storage, retrieval, and manipulation, user authentication, data security, and business process execution. Additionally, the backend applications 1102 may interact with frontend components, enabling seamless communication between the user interface and the server. Further, the backend applications 1102 may be scaled to dynamically handle increasing workloads.

At the next level of the ecosystem 1100 is computing layer 1104. The computing layer 1104 may be responsible for executing and processing applications and services (such as from the backend applications 1102) in a distributed and scalable manner. In various embodiments, the computing layer 1103 may include virtual machines (VMs), containers, or serverless computing resources, and may be configured for the dynamic allocation of computational resources based on demand. In one embodiment, users can deploy and run their applications on these computational resources (at the computing layer 1104) without the need for physical infrastructure management. As such, the computing layer 1104 abstracts the underlying hardware, providing flexibility and scalability, as resources can be easily scaled up or down to handle varying workloads.

At the next level of the ecosystem 11000 is network infrastructure 1106. The network infrastructure 1106 encompasses the underlying framework of interconnected components that enable communication and data transfer between various elements of the sensor as a service platform system. For example, the network infrastructure 1106 may include networks, routers, switches, and other networking devices that facilitate the seamless flow of data within the cloud environment. Further, the network infrastructure may support the connectivity between users, applications, and the distributed computing resources hosted in the cloud.

At the next level of the ecosystem 1100 is middle infrastructure 1108. The middle infrastructure 1108 may function as an intermediary layer that facilitates communication and integration between the frontend and backend components. In one embodiment, the middle infrastructure 1108 may include middleware (including message brokers, integration platforms, etc.), APIs (Application Programming Interfaces), and other services to streamline the interaction between applications, databases, and various computing resources.

At the next level of the ecosystem 1100 is device amalgamation 1110. The device amalgamation 1110 may refer to the integration and coordination of diverse devices and endpoints that access cloud services of the sensor as a service platform. The device amalgamation 1110 may include unifying the functionality and user experience across various device (such as smartphones, tablets, laptops, and/or IoT devices), by leveraging cloud resources. Through the device amalgamation 1110, users can seamlessly transition between different devices while accessing the same set of applications, services, and data stored in the cloud.

At the outer level of the ecosystem 1100 includes sensing devices 1112 and sensor interrogators 1114. In one embodiment, the sensing devices 1112 may include devices equipped with sensors designed to measure specific physical or environmental parameters (e.g., temperature sensors, humidity sensors, motion sensors, etc.). In one embodiment, the sensing devices 1112 may capture data from the surrounding environment. For example, the sensing devices 1112 may include pressure sensors, Bernoulli sensors, antigen sensors, supersonic frequency sensors, antibody sensors, subsonic frequency sensors, and/or virus sensors.

Additionally, in one embodiment, the sensor interrogators 1114 may include sensors responsible for collecting data, processing it, and transmitting it to a central system or the cloud. For example, the sensor interrogators 1114 may include gas sensors, airborne surface sensors, fluid sensors, touch/deformation sensors, analyte sensors, split-ring resonator sensors, and/or terrestrial control sensors.

It is to be appreciated that the sensing devices 1112 and the sensor interrogators 1114 may include sensors beyond that which is physically shown or described herein.

FIG. 12A illustrates a greenhouse gas monitoring sensing network 1200, in accordance with one embodiment. As an option, the network 1200 may be implemented in the context of any one or more of the embodiments set forth in any previous and/or subsequent figure(s) and/or description thereof. Of course, however, the network 1200 may be implemented in the context of any desired environment. Further, the aforementioned definitions may equally apply to the description below.

It is acknowledged that greenhouse gas emissions have emerged as a pressing global concern, primarily due to their profound impact on climate change and the environment. Greenhouse gas emissions, largely in the form of carbon dioxide ($CO_2$) and other greenhouse gases, may trap heat in the Earth's atmosphere, contributing to the warming of the planet. This warming, in turn, leads to a spectrum of environmental issues, including rising sea levels, extreme weather events, disruptions to ecosystems, and shifts in weather patterns.

The urgent need to reduce greenhouse gas emission footprint arises from the recognition that human activities, such as burning fossil fuels for energy, industrial processes, deforestation, and transportation, significantly contribute to the surge in greenhouse gas emissions. These emissions accelerate climate change, posing substantial threats to biodiversity, human health, and the overall stability of ecosystems.

As such, reducing greenhouse gas emission footprint has become a critical goal for individuals, businesses, and nations alike. It involves adopting sustainable practices, transitioning to renewable energy sources, enhancing energy efficiency, and promoting eco-friendly technologies. Governments, organizations, and individuals worldwide are increasingly acknowledging the imperative to mitigate greenhouse gas emissions to safeguard the planet's future and foster a more sustainable and resilient global environment. Addressing the issues associated with greenhouse gas emissions is not just an environmental necessity but a collective responsibility toward creating a healthier, more balanced world for current and future generations.

With this context in place, the network 1200 considers in particular emissions (including scope 1 emissions 1202A, scope 2 emissions 1202B, and scope 3 emissions 1202C). Such emissions may be monitored by a greenhouse gas monitoring sensing network 1204 via sensors 1206. Scope emissions, often referred to in the context of greenhouse gas emissions, are a crucial aspect of environmental considerations and sustainability efforts.

In the context of the present description, scope 1 emissions 1202A include direct emissions from sources that are owned or controlled by the organization, such as on-site fuel combustion, process emissions, and fugitive emissions. For example, scope 1 emissions 1202A may include emissions from on site sources and/or emissions owned or controlled by a company, such as emissions from burning fuel in company vehicles or on-site combustion of fossil fuels.

Additionally, scope 2 emissions 1202B include indirect emissions associated with the generation of purchased energy, including electricity, heating, and cooling. While the organization does not directly control these sources, the emissions are a consequence of its activities. For example, scope 2 emissions 1202B may include emissions from energy or utilities, such as generation of electricity to power a building, and/or emissions that occur at a facility generating the energy.

Further, scope 3 emissions 1202C include all other indirect emissions that occur in the organization's value chain, including emissions from the production and transportation of purchased goods and services, employee commuting, and business travel. For example, scope 3 emissions 1202C may include emissions from chain supply, chain service, and/or upstream/downstream activities, such as business travel, supply chain, product use, and/or end-of-life treatment.

In tracking the scope emissions (scope 1 emissions 1202A, scope 2 emissions 1202B, and/or scope 3 emissions 1202C), many problems commonly arise. For example, tracking scope 1 emissions may be challenging due to potential data incompleteness and the need for accurate measurement tools, including obtaining precise data on onsite combustion and process-related emissions. Similarly, for scope 2 emissions, variations in grid emissions, diversity in reporting methods, integrating emissions data from diverse sources, evolving regulatory standards pose additional complexities.

With respect to scope 3 emissions, the complexity of tracking the emissions is increasingly more difficult. For example, the complexity of data collection is from a vast and interconnected supply chain, and obtaining accurate information from suppliers and partners can be challenging due to the variability in reporting standards and data availability. Another issue may arise from the reliance on estimation methods, such as emission factors and life cycle assessments, which may introduce uncertainties in the calculated emissions. Additionally, the lack of standardized methodologies for certain Scope 3 categories may hinder consistency across industries. Data quality and completeness issues, combined with the dynamic nature of supply chains, further complicate the tracking process.

The issues noted in tracking emissions may be improved, and in some cases fully resolved, by integration of the greenhouse gas monitoring sensing network 1204 comprising the sensors 1206. For example, if a company wanted to know the amount of emissions from burning fuel in a company vehicle, a carbon-containing sensor may be used to track such emissions. If a company wanted to know the amount of emissions in relation to consumption of electricity, a carbon-containing sensor may be used to track such emissions. If a company wanted to track emissions in upstream or downstream services, a carbon-containing sensor at each service point may be used to track such emissions.

In short, the greenhouse gas monitoring sensing network 1204 provides, amongst many things, the ability to interface with a network of sensors 1206 which can be used to track greenhouse gas emissions at any stage in the lifecycle of a product. In this manner, one sensor may be used to track any portion of a particular scope emission, and the greenhouse gas monitoring sensing network 1204 may tally an aggregate amount of total emissions for a product and/or service (from start to end cycle).

As such, the greenhouse gas monitoring sensing network 1204 allows for a comprehensive understanding of the environmental impact associated with a product or process, which may involve assessing emissions throughout the entire life cycle, from raw material extraction and manufacturing to distribution, use, and disposal. The greenhouse gas monitoring sensing network 1204 may enable organizations to identify environmental hotspots, make informed decisions about product design and material selection, and meet the growing demand for transparency from consumers and stakeholders. Additionally, the greenhouse gas monitoring sensing network 1204 may allow for regulatory compliance, risk management, and brand reputation enhancement. By analyzing the entire value chain via the greenhouse gas monitoring sensing network 1204, businesses can proactively manage environmental risks, optimize resource use, and contribute to global sustainability goals, aligning with the preferences of eco-conscious consumers and addressing the evolving landscape of environmental regulations.

FIG. 12B illustrates a greenhouse gas monitoring sensing network 1201, in accordance with one embodiment. As an option, the network 1201 may be implemented in the context of any one or more of the embodiments set forth in any previous and/or subsequent figure(s) and/or description thereof. Of course, however, the network 1201 may be implemented in the context of any desired environment. Further, the aforementioned definitions may equally apply to the description below.

As shown, the network 1201 provides a cycle view of carbon consumption, tracking, and credits. In the center of the cycle is a carbon credit sensing network 1208. The cycle includes tracking greenhouse gas emissions 1210, conducting an impact assessment 1212, issuance of carbon credits 1214 if applicable, and registry and trading of carbon credits 1216.

The carbon credit sensing network 1208 may facilitate the buying and selling of carbon credits or offsets, allowing businesses and individuals to track, trade, and invest in emissions reduction initiatives. In the carbon credit sensing network 1208, entities that have successfully reduced their greenhouse gas emissions below a baseline can generate carbon credits (via issuance of carbon credits 1214), which may represent the equivalent amount of emissions they have offset. These credits can then be traded on the marketplace (via registry and trading 1216), providing an economic incentive for emission reduction efforts. Buyers, on the other hand, purchase these credits (again via registry and trading 1216) as a way to compensate for their own emissions, effectively supporting and investing in sustainable practices. The carbon credit sensing network 1208 plays a pivotal role in fostering a carbon-neutral economy by creating a mechanism for the exchange of environmental assets and encouraging widespread participation in emissions reduction initiatives.

A primary premise of the carbon credit sensing network 1208, however, is that greenhouse gas emissions can be effectively detected (via greenhouse gas emissions 1210) and tracked (via impact assessment 1212). As such, carbon-containing sensors are an important facet of the carbon credit sensing network 1208, as they allow for accurate detection of greenhouse gas emissions at any stage of the life cycle of the service or product. As disclosed throughout the present disclosure, carbon-containing sensors can be used to detect a near-endless number of compounds and conditions. Such detectability can apply to any stage of the carbon life cycle process, and can provide the intricate and accurate reporting mechanism carbon credit marketplace systems need in order to successfully assess and track greenhouse gas emissions.

FIG. 12C illustrates an emissions detection network 1203, in accordance with one embodiment. As an option, the network 1203 may be implemented in the context of any one or more of the embodiments set forth in any previous and/or subsequent figure(s) and/or description thereof. Of course, however, the network 1203 may be implemented in the context of any desired environment. Further, the aforementioned definitions may equally apply to the description below.

The network 1203 shows a scope 1-2 sensing network 1222, and a scope 3 sensing network 1218. In one embodiment, the network 1203 illustrates one example of how carbon-containing sensors can track emissions throughout a life cycle of a product.

In one embodiment, the product may include initially a raw materials sensor 1220A which may assess the emissions impact in a raw materials stage. Next, a manufacture sensor 1220B may assess the emissions impact while a product is being manufactured. It is recognized that both the raw materials sensor 1220A and the manufacture sensor 1220B are scope 3 emissions. Next, an assemble sensor 1220C may be used to assess the emissions while the product is assembled. The assemble sensor 1220C would relate to a non scope 3 emission (such as scope 1 or scope 2). Next, a distribution sensor 1220D may assess the emissions impact while a product is being distributed. Next, a use sensor 1220E may assess the emissions impact while the product is in use. Lastly, the dispose/recycle sensor 1220F may assess the emissions impact in relation to the end-of-cycle steps including disposing and recycling of the product. It is noted that the distribute sensor 1220D, the use sensor 1220E, and the dispose/recycle sensor 1220F may be construed as scope 3 emissions.

As illustrated in the network 1203, carbon-containing sensors can be applied to all stages of a product life. And each carbon-containing sensor may be used to track greenhouse gas emissions for that particular stage. In this manner, an entire life cycle emissions amount may be tracked, gathered, and aggregated.

The network 1203 may work in tandem with the network 1201 and/or the greenhouse gas monitoring sensing network 1204 previously discussed in particular.

FIG. 12D illustrates a method 1205 for buying or selling carbon credits, in accordance with one embodiment. As an option, the method 1205 may be implemented in the context of any one or more of the embodiments set forth in any previous and/or subsequent figure(s) and/or description thereof. Of course, however, the method 1205 may be implemented in the context of any desired environment. Further, the aforementioned definitions may equally apply to the description below.

As shown, greenhouse gas emissions data is received from sensors associated with respective particular units of a particular product. See operation 1224A. Within the context of the present description, particular units may refer to a component or part, and/or a combination of components or parts, of a product. As discussed herein, greenhouse gas emissions data may be obtained via carbon-containing sensors. Next, the greenhouse gas emissions data is processed to determine net output. See operation 1224B. For example, the processing may occur in a manner previously discussed with respect to the carbon credit sensing network 1208. Next, when the net output is less than a predetermined value, a sell transaction is initiated to sell carbon credits to the carbon credit sensing network. See operation 1224C. In one embodiment, when a carbon deficit is determined (such as when the net output is less than a predetermined limit), the company may decide to retain the deficit for other products/services/productions it may be involved in. In other embodiments, the company may seek to profit from the carbon deficit and sell such deficit, in terms of carbon credits, to other companies for purchase.

Next, when the net output is more than a predetermined value, a buy transaction is initiated to purchase additional carbon credits from the carbon credit sensing network. See operation 1224D. Again, the carbon credit sensing network 1208 may be used for purposes of purchasing carbon credits to offset an over-limit output amount.

In this manner, the method 1205 may be used to assess greenhouse gas emissions data and to initiate transactions for the buying and/or selling of carbon credits.

FIG. 12E illustrates a method 1207 for calculating a lifetime greenhouse gas emission footprint, in accordance with one embodiment. As an option, the method 1207 may be implemented in the context of any one or more of the embodiments set forth in any previous and/or subsequent figure(s) and/or description thereof. Of course, however, the method 1207 may be implemented in the context of any desired environment. Further, the aforementioned definitions may equally apply to the description below.

With respect to the method 1207, it is to be appreciated that it coincides in particular with the network 1203 discussed before, in that greenhouse gas emissions may be tracked at each stage of a lifecycle for a given product or service.

At step 1226A, first greenhouse gas emissions data is received associated with raw materials for a product based on a first sensor. At step 1226B, second greenhouse gas emissions data is received associated with manufacturing the product based on a second sensor. At step 1226C, third greenhouse gas emissions data is received associated with assembling the product based on a third sensor. At step 1226D, fourth greenhouse gas emissions data is received associated with distributing the product based on a fourth sensor. At step 1226E, fifth greenhouse gas emissions data is received associated with using the product based on a fifth sensor. At step 1226F, sixth greenhouse gas emissions data associated with disposing or recycling the product based on a sixth sensor.

With respect to steps 1226A-1226F, it is to be appreciated that such steps relate, in particular, to tracking greenhouse gas emissions at each stage of a product life. At step 1226G, two or more of the first greenhouse gas emissions data, the second greenhouse gas emissions data, the third greenhouse gas emissions data, the fourth greenhouse gas emissions data, the fifth greenhouse gas emissions data, or the sixth greenhouse gas emissions data are aggregated. It is to be appreciated that any or all of the emissions data (steps 1226A-1226F) may be aggregated. Additionally, it is also recognized that the more emissions data that is gathered, the more complete and accurate representation of the total greenhouse gas lifecycle emissions will be provided.

At step 1226H, a lifetime greenhouse gas emission footprint is calculated for the product based on the aggregation. It is to be appreciated that the steps 1226A-1226F may be expanded to include more granular representations throughout a product's life. Additionally, the lifetime greenhouse gas emission footprint may also be constrained by regulatory requirements and policies. For example, a policy may require the lifetime greenhouse gas emission footprint to include all emissions from the manufacturing stage through use stage. Another policy may require the lifetime greenhouse gas emission footprint to include only and all scope 3 emissions. As such, the lifetime greenhouse gas emission footprint may be calculated based on requirements and constraints.

FIG. 12F illustrates an interrogator network 1209, constituent components of which are employed for calculating a lifetime greenhouse gas emission footprint, in accordance with one embodiment. As an option, the interrogator network 1209 may be implemented in the context of any one or more of the embodiments set forth in any previous and/or subsequent figure(s) and/or description thereof. Of course, however, the interrogator network 1209 may be implemented in the context of any desired environment. Further, the aforementioned definitions may equally apply to the description below.

As shown, an interrogator network is constituted by a variety of independent interrogation devices (shown as various devices including finished product QC sensor 12F-02, loading dock sensor 12F-04, weigh station sensor 12F-06, wholesale warehouse loading dock 12F-08, toll gate sensor 12F-10, retail facility incoming inspection sensor 12F-12, end use measurement sensor hub 12F-13, recycle facility incoming sensors 12F-16, mobile phone interrogator 12F-18, picocell interrogator 12F-17, Wi-Fi router interrogator 12F-19) at the edge of the mesh. For clarity, only some interconnections between a particular interrogator and a different interrogator are shown however, in some embodiments, each particular interrogator is interconnected to every other different interrogator. Any known technique can be used to interconnect one interrogator to another interrogator. For example, and as shown, a packet-switched network (e.g., the shown Internet cloud 12F-01) can be used to logically interconnect each particular interrogator is interconnected to every other different interrogator.

For purposes of clarity, the independent interrogation devices may include a variety of devices that may function based on a variety of purposes or context. For example, network broadcasting devices (such as but not limited to mobile phone interrogator 12F-18, picocell interrogator 12F-17, Wi-Fi router interrogator 12F-19) may detect a signal arising from a sensor, where the signal may include greenhouse gas emissions data. Further, each of the other sensors provided (such as but not limited to finished product QC sensor 12F-02, loading dock sensor 12F-04, weigh station sensor 12F-06, wholesale warehouse loading dock 12F-08, toll gate sensor 12F-10, retail facility incoming inspection sensor 12F-12, end use measurement sensor hub 12F-13, recycle facility incoming sensors 12F-16) may further function as independent devices capable of capturing, measuring, and/or transmitting greenhouse gas emissions data. Further, such sensor devices may either be interconnected (e.g., mesh network), attached to a network device (e.g., Wi-Fi, Picocell, Femtocell, etc.), and/or directly connected to the Internet Cloud 12F-01.

It is to be appreciated that as sensors measure and collect greenhouse gas emissions data, duplicative data may be received (such as by but not limited to the greenhouse gas monitoring sensing network 1204). In such a context, the receiving node of the greenhouse gas emissions data may process and filter (such as data that is redundant and/or duplicative) such that unique instances sensed greenhouse gas emission data remains and is used for tracking a particular unit of a particular product and/or service.

As can be seen, the interrogator network includes many different types of interrogators that are deployed in various locations that can at least be predicted to be visited by a product (e.g., at a point of sale device such as a checkout item reader), or by a vehicle that is transporting the product. An estimate of scope 3 emission can be estimated as the product enters into or exits out of the proximity zone of a particular sensor. As one example, consider a building supply items such as a granite countertop. The manufacture of such a granite countertop might cause GHG emissions (i.e., scope 2 emissions) to create the raw materials used for the granite countertop, and the manufacture of such a granite countertop might cause GHG emissions (i.e., scope 1 emissions) to mill, polish and otherwise create the finished product of the granite countertop. The granite countertop is then shipped, for example to a wholesaler or to a retailer (or in some cases directly to the end user. In any of the foregoing shipping scenarios, movement of the granite countertop can be tracked.

On the basis of the path traversal (e.g., actual miles transported) and/or on the basis of the mere distance between some point A to and some point B, it is known at least that the granite countertop had been moved, thus incurring some portion of the product's scope 3 emissions. An estimate of the scope 3 emissions can be made based on the path and/or endpoints, and in combination with the mass of the product. For example, if the product was moved from sea level elevation to 5280 feet elevation, then it can be known that at least the amount of change in potential energy (e.g., from 0 feet to 5280 feet) was used in that movement. A known most-efficient conveyance energy can be used as an estimate. If more is known about the path (i.e., not only the coordinates of the endpoints but also path to get from the foregoing point A to the foregoing point B) then a further term in the estimate can be calculated. Traversal, specifically change in location of the product can be tracked throughout a lifecycle, up to and including provision of the product to a recycling facility. In some cases the recycling facility is itself able to track data pertaining to scope 3 emissions involved in the recycling processes, and such tracking data can be communicated to computing and storage elements in the Internet cloud.

It should be noted that there can be as many traversal scenarios as there are products. In fact there can be as many traversal scenarios as there are individual instances of said products. This is because each end consumer may have its own usage model. As shown, the interrogator network 1209 includes a panoply of interrogator devices (e.g., Wi-Fi router, picocell interrogator, mobile phone, etc.) that are situated in and around where the product delivers most of its end-user utility. In some cases, it can be known whether the end user is actively using the product or not. For example, if the end product is a "4 slice toaster", an interrogator can find out whether the toaster is in operation or not, and for how long, and then an estimate of corresponding greenhouse gas emissions can be made.

As such, interrogation devices play a pivotal role in modern greenhouse gas emission monitoring systems, facilitating the seamless extraction and analysis of critical data from various sensors. In the context of tracking greenhouse gas emissions, these interrogators may serve as the linchpin in collecting real-time information from sensors deployed across diverse locations. By using such interrogators, accurate and efficient greenhouse gas emission data can be collected, enabling a comprehensive understanding of environmental condition, emissions data, and lifetime greenhouse gas calculation.

Strictly to illustrate an example at a much larger scale than the foregoing toaster example, consider the case of a construction project involving a very large and heavy component (e.g., a girder or other component for a bridge). In this large scale example, scope 2 and scope 1 emissions are expended in the manufacturer of the component (e.g., a 10 ton component made of steel). Then, the component is fitted with an identification sensor that can emit a unique identification code, and then loaded onto a large tractor-trailer rig to be transported from say, Poughkeepsie to Denver. During the overland transportation of the component, there are many locations (e.g., weigh stations, rest stops, etc.), at which locations the presence of the component is noted by an interrogating the identification sensor to extract the unique identification code. A scope 3 estimate, possibly calculated as a minimum scope 3 GHG emissions can be calculated knowing the amount of fuel needed by the large tractor-trailer rig in order to transport the component the full overland distance and also to climb to the 5200 foot elevation of the Denver destination. As can be seen, the more interrogation points, the more accurate the estimate will be (e.g., by using path-dependent calculations).

The foregoing figures were specifically shown within the context of, amongst many things, a sensors-as-a-service ecosystem, a sensor learning environment with AI integration, a method of field recalibration of multivariate analyte sensors based on learned precise sensing fingerprints, measuring multi-point spatial-path traversal sensor-inclusive packages, and/or tracking greenhouse gas emissions throughout a product's lifecycle. Common to much of the above provided disclosure is the use of a carbon-containing sensor configured for the specific adaptation described.

Further details on carbon-containing sensors (including carbon-containing sensors as configured for an analyte sensor, biosensor, resonant sensor) are provided hereinbelow. Further, different contexts for the carbon-containing sensors, including as applied to printed sensors, water droplet sensing, display layers, is also provided hereinbelow to provide a full context of how carbon-containing sensors may be applied to a variety of scenarios.

FIG. 13 shows a water droplet sensing vehicle application 1300, in accordance with one embodiment. As an option, the water droplet sensing vehicle application 1300 may be implemented in the context of any one or more of the embodiments set forth in any previous and/or subsequent figure(s) and/or description thereof. Of course, however, the water droplet sensing vehicle application 1300 may be implemented in the context of any desired environment. Further, the aforementioned definitions may equally apply to the description below.

As shown, the water droplet sensing vehicle application 1300 is shown within the context of a vehicle, with split ring resonators (SRRs) 1302 shown around the periphery of the windshield, and an interrogation signal 1304 on a SRR. It is to be appreciated that the SRRs 1302 may be located anywhere around the windshield of the vehicle, although as shown for exemplary purposes, they may be located along the edge of the windshield (so as not to disturb the optics of the glass). The interrogation signal 1304 may be sent from any location within the vehicle (e.g., along the dashboard, within the structure of the vehicle, etc.).

Further, the SRRs 1302 may be further positioned on a housing for optical instruments (e.g., camera, LiDAR, nonlinear photodiode, etc.) and/or other sensing instruments (e.g., radar, ultrasonic sensors, etc.) of a vehicle. In one embodiment, the vehicle may include an autonomous vehicle, wherein the device may measure vibration or other related diagnostic condition to monitor the operating integrity of the vehicle (and/or safe vehicle transit of occupants or cargo) in conjunction with the visual guidance sensing capability of the vehicle.

It is to also be appreciated that the SRRs 1302 may be located at any location where sensing water may be needed. For example, SRRs 1302 may be located on or near light sources, a window, a screen, etc. Further, the SRRs 1302 may be located at any location where sensing a fluid may be needed. For example, SRRs 1302 may be located within a gas canister/tank, hydraulic fluid reservoir, transmission fluid reservoir, engine oil reservoir, engine coolant reservoir, brake fluid reservoir, differential fluid reservoir, steering fluid reservoir, hydraulic clutch fluid, window washing fluid reservoir, and/or any other fluid source. The SRRs 1302, in one embodiment, may be configured for the fluid to be sensed.

In various embodiments, the interrogation signal 1304 may be used to determine a concentration of water at each of the SRRs 1302. For example, a concentration of water may be correlated with a permittivity (or dielectric constant) such that a higher concentration of water results in a first permittivity and a lower concentration of water results in a second permittivity. Thus, the SRRs 1302 can be interrogated via the interrogation signal 1304 to determine a water concentration. In like manner, the SRRs 1302 may be tuned to other fluids such that a change of permittivity may be measured (and correlated with a concentration of the fluid).

As such, in various embodiments, the SRRs 1302 may determine the presence of water droplets based on the state, or change of, dielectric constant and/or permittivity of the material to which the SRRs are affixed.

In one embodiment, the interrogation signal 1304 may be associated with or connected to the vehicle's electronics (e.g., ECU, etc.). For example, the interrogation signal 1304 may be associated and/or compliant with auto electronics protocols (e.g., Autosar, etc.).

In any manner, the SRRs 1302 may be used to detect water droplets, such as water concentration, on a surface (such as a windshield). The interrogation signal 1304 may be used to interrogate the SRRs 1302 to determine whether water droplets have accumulated or formed on the surface.

In one embodiment, in response to detecting water droplets, the vehicle may take an action to remedy the situation, such as activating a defrosting function to reduce the amount of water droplets on the surface. In another embodiment, an array of SRRs may be used to generate a collective interrogation response, such that multiple signals from the array of SRRs may provide a water droplet mapping (of water droplet concentrations) across the entire (or a substantial portion of the) surface. In this manner, the array of SRRs may be used to create a mapping of water droplet concentration. In one embodiment, selective remedial action, such as applying a defrosting function to only a portion of the windshield, may be based on such mapping.

FIG. 14 shows a method 1400 for remedying sensed water droplets, in accordance with one embodiment. As an option, the method 1400 may be implemented in the context of any one or more of the embodiments set forth in any previous and/or subsequent figure(s) and/or description thereof. Of course, however, the method 1400 may be implemented in the context of any desired environment. Further, the aforementioned definitions may equally apply to the description below.

As shown, the method 1400 begins with determining concentration of water particle condensate. See step 1402. In one embodiment, the determination of step 1402 may include a determination whether the concentration exceeds a maximum preconfigured threshold. Additionally, such maximum preconfigured threshold may take into consideration one or more sensor readings, such as readings from multiple SRRs, a barometer sensor, a location sensor (e.g., for determining whether the vehicle is near water, etc.), etc. Input from these sensors may be used for prescribing a recommended course of action to remedy the detected water particle condensate.

Additionally, per step 404, one or more remedial measures may be applied to reduce the concentration of the water particle condensate. For example, a defrosting action, an electric heat plate (embedded within or near the windshield), etc. may be activated to reduce the concentration of the water particle condensate. In various embodiments, one or more remedial modules may receive the input from the sensors, determine appropriate remedial action, implement such remedial action, and determine when to stop the remedial measure(s).

Further, per step 406, the remedial measures may be stopped once the concentration of the water particle condensates reaches a predetermined threshold. For example, in response to activating a defrosting action, the circulating air may reduce the water particle condensate on the surface of the windshield. In one embodiment, the defrosting action may be stopped once the concentration falls below a predetermined threshold. In another embodiment, the remedial action may be deactivated after a set time period expires from reaching the predetermined threshold. For example, the SRRs being interrogated may indicate that the water particle condensate may be below the preconfigured threshold. However, the SRRs being interrogated may be located only along the periphery of the surface (thereby leaving the middle of the windshield still fogged up). Thus, the remedial action may continue on for a predetermined amount of time until it is expected that the water particle condensate has been removed from a location other than where the SRRs are located.

In another embodiment, the SRRs may be configured such that they do not distort the optics of the windshield (e.g., using nanoparticle sensors, using fiber optics configuration, etc.), such that the SRRs may be integrated throughout the entire surface for more accurate interrogation and feedback.

In this manner, the surface may sense when water droplets accumulate, and remedial actions may be applied to offset the water droplets.

FIG. 15A illustrates a network architecture 15A00, in accordance with one possible embodiment. As shown, at least one network 15A02 is provided. In the context of the present network architecture 15A00, the network 15A02 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 15A02 may be provided.

Coupled to the network 15A02 is a plurality of devices. For example, a server computer 15A12 and an end user computer 15A08 may be coupled to the network 15A02 for communication purposes. Such end user computer 15A08 may include a desktop computer, lap-top computer, and/or any other type of logic. Still yet, various other devices may be coupled to the network 15A02 including a personal digital assistant (PDA) device 15A10, a mobile phone device 15A06 (or mobile phone device 2F312 shown hereinabove), a television 15A04, etc.

FIG. 15B illustrates an exemplary system 15B00, in accordance with one embodiment. As an option, the system 15B00 may be implemented in the context of any of the devices of the network architecture 15A00 of FIG. 15A. Of course, the system 15B00 may be implemented in any desired environment.

As shown, a system 15B00 is provided including at least one central processor 15B02 which is connected to a communication bus 15B12. The system 15B00 also includes main memory 15B04 [e.g., random access memory (RAM), etc.]. The system 15B00 also includes a graphics processor 15B08 and a display 15B10.

The system 15B00 may also include a secondary storage 15B06. The secondary storage 15B06 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 15B04, the secondary storage 15B06, and/or any other memory, for that matter. Such computer programs, when executed, enable the system 15B00 to perform various functions (as set forth above, for example). Memory 15B04, storage 15B06 and/or any other storage are possible examples of non-transitory computer-readable media. It is noted that the techniques described herein, in an aspect, are embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media are included which may store data that is accessible by a computer, such as magnetic cassettes, flash memory cards, digital video disks, Bernoulli cartridges, random access memory (RAM), read-only memory (ROM), and the like.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

Although some examples and aspects are described herein, many variations and permutations of these examples fall within the scope of the disclosure. Although some benefits and advantages of the preferred aspects are mentioned, the scope of the disclosure is not intended to be limited to benefits, uses, or objectives. Rather, aspects of the disclosure are intended to be broadly applicable to a point-of-use battery system that transitions to an activated state from a dormant state based on a folding or peel-back action, the point-of-use battery system incorporating a 3D self-assembled multi-modal mesoporous carbon-based particle composed of electrically conductive three-dimensional (3D) aggregates of graphene sheets, some of which are illustrated in the figures and in the following description of the preferred aspects. The detailed description and drawings are merely illustrative of the disclosure rather than limiting, the scope of the disclosure being defined by the appended claims and equivalents thereof.

Li-Ion Batteries

A Li-ion battery is a type of secondary (rechargeable) battery. Li-ion battery technology has become very important in recent years as these batteries show great promise as power sources that can lead to an electric vehicle (EV) revolution (referring to widespread implementation of EVs across numerous applications). The development of new materials (for Li-ion batteries) is the focus of research in the field of materials science, as Li-ion batteries can be considered to be the most impressive success story of modern electrochemistry. Li-ion batteries power most modern portable devices and seem to have overcome psychological barriers of the consuming public against the use of such high energy density devices on a larger scale for more demanding applications, such as EV.

Regarding operation, in Li-ion batteries, Li-ions (Li+) migrate from the negative electrode through an electrolyte to the positive electrode during discharge and return when charging. Li-ion batteries traditionally use an intercalated Li compound as a formative material at the positive electrode and graphite at the negative electrode. The batteries have a high energy density, no "memory-effect" (describing the situation in which nickel-cadmium batteries gradually lose their maximum energy capacity if they are repeatedly recharged after being only partially discharged) and low self-discharge. However, unlike conventional battery chemistries, Li-ion batteries can (due to the highly reactive nature of elemental and ionic Li) present a safety hazard. Under certain conditions, since Li-ion batteries can contain a flammable electrolyte, if they are punctured, hit, otherwise damaged or even incorrectly (excessively) charged, Li batteries can deteriorate unexpectedly, including through explosions and fires. Nevertheless, the high energy density of Li-ion batteries permits for longer usable lifespans of several hours between charging cycles, and longer cycle life, referring to the electric current delivery or output performance of a given Li-ion battery over multiple repeat charge-discharge (partial or total charge depletion) cycles.

Li metal, due to its high theoretical specific capacity of 3,860 mAh/g, low density (0.59 g cm-3) and low negative electrochemical potential (−3.040 V compared to a standard hydrogen electrode), appears as an ideal material for the negative electrode of secondary Li-ion batteries. However, unavoidable and uncontrollable dendrite growth, referring the growth of a branching tree-like structure within the battery itself, caused by Li precipitates can cause serious safety concerns related to short-circuits, and limited Coulombic efficiency, referring to the charge efficiency by which electrons are transferred in batteries, during deposition and stripping operations inherent in Li-ion batteries. Such challenges have previously impeded Li-ion battery applications.

However, concerns related to safety of earlier-developed Li secondary batteries led to the creation and refinement of newer generation Li-ion secondary batteries. Such Li-ion batteries typically feature carbonaceous materials used as an anode, such carbonaceous anode materials including: (1) graphite: (2) amorphous carbon; and, (3) graphitized carbon. The first type of the three carbonaceous materials presented above includes naturally occurring graphite and synthetic graphite (or artificial graphite, such as Highly Oriented Pyrolytic Graphite, HOPG). Either form of graphite can be intercalated with Li. The resulting Graphite Intercalation Compound (GIC) may be expressed as $Li_xC_6$, where X is typically less than 1. To limit (minimize) the loss in energy density due to the replacement of Li metal with the GIC, X in $Li_xC_6$ must be maximized and the irreversible capacity loss ($Q_{ir}$), in the first charge of the battery must be minimized.

The maximum amount of Li that can be reversibly intercalated into the interstices between graphene planes of a perfect graphite crystal is generally believed to occur in a graphite intercalation compound represented by $Li_xC_6$ (x=1), corresponding to a theoretical 372 mAh/g. However, such a limited specific capacity (of the discussed theoretical 372 mAh/g) cannot satisfy the demanding requirements of the higher energy-density power needs of modern electronics and EVs.

Carbon-based anodes, such as (1) graphite intercalated with Li as discussed above, can demonstrate extended cycle lifespans due to the presence of a surface-electrolyte interface layer (SEI), which results from the reaction between Li and surrounding electrolyte (or between Li and the anode surface/edge atoms or functional groups) during the initial several charge-discharge cycles. Li-ions consumed in this reaction (referring to the formation of the SEI) may be derived from some of the Li-ions originally intended for the charge transfer purpose (referring to the dissociation of elemental Li when intercalated with carbon in a carbon-based structure, such as the anode, during Li-ion movement in electrolyte across a porous separator to the cathode as related to electron release and flow to power a load during Li-ion battery discharge cycles. As the SEI is formed, the Li-ions become part of the inert SEI layer and become "irreversible", in that they can no longer be an active element (or ion) used for charge transfer. As a result, it is desirable to minimize the amount of Li used for the formation of an effective SEI layer. In addition to SEI formation, $Q_{ir}$, has been attributed to graphite exfoliation caused by electrolyte/solvent co-intercalation and other side reactions.

Referring anode carbonaceous material introduced earlier, (2) amorphous carbon, contains no (or very little) micro- or nano-crystallites. Amorphous carbon includes both so-called "soft carbon" and "hard carbon". Soft carbon refers to a carbon material that can be graphitized at a temperature of about 2,500° C. or higher. In contrast, hard carbon refers to a carbon material that cannot be graphitized at a temperature higher than 2,500° C.

However, in practice and industry, the so-called "amorphous carbons" commonly used as anode active materials may not be purely amorphous, but rather contain some minute amount of micro- or nano-crystallites, each crystallite being defined as a small number of graphene sheets (oriented as basal planes) that are stacked and bonded together by weak van der Waals forces. The number of graphene sheets can vary between one and several hundreds, giving rise to a c-directional dimension (thickness Le) of typically 0.34 nm to 100 nm. The length or width ($L_a$) of these crystallites is typically between tens of nanometers to microns.

Among this class of carbon materials, soft and hard carbons can be produced by low-temperature pyrolysis (550-1,000° C.) and exhibit a reversible specific capacity of 400-800 mAh/g in the 0-2.5 V range. A so-called "house-of-cards" carbonaceous material has been produced with enhanced specific capacities approaching 700 mAh/g.

Research groups have obtained enhanced specific capacities of up to 700 mAh/g by milling graphite, coke, or carbon fibers and have elucidated the origin of the additional specific capacity with the assumption that in disordered carbon containing some dispersed graphene sheets (referred to as "house-of-cards" materials), Li-ions are adsorbed on two sides of a single graphene sheet. It has been also proposed that Li readily bonds to a proton-passivated carbon, resulting in a series of edge-oriented Li–C—H bonds. This provides an additional source of $Li+$ in some disordered carbons. Other research suggested the formation of Li metal monolayers on the outer graphene sheets of graphite nanocrystallites. The discussed amorphous carbons were prepared by pyrolyzing epoxy resins and may be more correctly referred to as polymeric carbons. Polymeric carbon-based anode materials have also been studied.

Chemistry, performance, cost and safety characteristics may vary across Li-ion battery variants. Handheld electronics may use Li polymer batteries (with a polymer gel as electrolyte) with Li cobalt oxide ($LiCoO_2$) as cathode material, which offers high energy density but may present safety risks, especially when damaged. Li iron phosphate ($LiFePO_4$). Li-ion manganese oxide battery ($LiMn_2O_4$, $LizMnO_3$, or LMO), and Li nickel manganese cobalt oxide ($LiNiMnCoO_2$ or NMC) may offer lower energy density, but provide longer useful lives and less likelihood of fire or explosion. Such batteries are widely used for electric tools, medical equipment, and other roles. NMC in particular is often considered for automotive applications.

Electrical Conductance of Carbon-Based Materials

Advances in high conductance carbon materials such as carbon nanotubes (CNT), graphene, amorphous carbon, and/or crystalline graphite in electronics allows for the printing of these materials onto many types of surfaces without necessarily using printed circuit boards, and/or without the use of materials or compounds that have been identified as being toxic to humans. Usage of high conductance carbon as a feedstock material and/or other material during any one or more of the additive manufacturing processes described above may facilitate the fabrication of batteries (including Li-ion batteries) with micro-lattice structures suitable for enhanced functionality, electric power storage and delivery, and optimal efficiency. Moreover, although many of the devices described may serve as power sources (batteries, capacitors), those of skill in the art will appreciate that such 3D printing technologies may be reconfigured using high conductance carbon materials such as carbon nanotubes (CNT), graphene, amorphous carbon, or crystalline graphite can to form other electronic devices.

Printing technologies using high conductance carbon materials such as carbon nanotubes (CNT), graphene, amorphous carbon, or crystalline graphite may be implemented and/or otherwise incorporated in the fabrication of the following devices: antennas (tuned antennas), sensors (bio sensors), energy harvesters (photocells), and other electronic devices.

Graphene

Graphene is an allotrope of carbon in the form of a single layer of atoms in a two-dimensional hexagonal lattice in which one atom forms each vertex. It is the basic structural element of other allotropes, including graphite, charcoal, carbon nanotubes and fullerenes. It can also be considered as an indefinitely large aromatic molecule, the ultimate case of the family of flat polycyclic aromatic hydrocarbons.

Graphene has a special set of properties which set it apart from other elements. In proportion to its thickness, it is about 100 times stronger than the strongest steel. Yet its density is dramatically lower than any other steel, with a surfacic (surface-related) mass of 0.763 mg per square meter. It conducts heat and electricity very efficiently and is nearly transparent. Graphene also shows a large and nonlinear diamagnetism, even greater than graphite and can be levitated by Nd—Fe—B magnets. Researchers have identified the bipolar transistor effect, ballistic transport of charges and large quantum oscillations in the material. Its end-use application areas are widespread, finding unique implementations in advanced materials and composites, as well as being used as a formative material to construct ornate scaffolds usable in Li-ion battery electrodes to enhance ion transport and electric current conduction to yield specific capacity and power delivery figures not otherwise attainable by conventional battery technologies.

Chemical Functionalization of Graphene

Functionalization, as generally understood and as referred to herein, implies the process of adding new functions, features, capabilities, or properties to a material or substance by altering the surface chemistry of the material. Functionalization is a fundamental technique used throughout chemistry, materials science, biological engineering, textile engineering, and nanotechnology and may be performed by attaching molecules or nanoparticles to the surface of a material, with a chemical bond or through adsorption, the adhesion of atoms, ions or molecules from a gas, liquid or dissolved solid to a surface to create a film of the adsorbate on the surface of the adsorbent without forming a covalent or ionic bond thereto.

Functionalization and dispersion of graphene sheets may be of critical importance to their respective end-use applications. Chemical functionalization of graphene enables the material to be processed by solvent-assisted techniques, such as layer-by-layer assembly, spin-coating, and filtration and also prevents the agglomeration of single layer graphene (SLG) during reduction and maintains the inherent properties of graphene.

Currently, the functionalization of graphene may be performed by covalent and noncovalent modification techniques. In both instances, surface modification of graphene oxide followed by reduction has been carried out to obtain functionalized graphene. It has been found that both the covalent and noncovalent modification techniques are very effective in the preparation of processable graphene.

However, electrical conductivity of functionalized graphene has been observed to decrease significantly compared to pure graphene. Moreover, the surface area of the functionalized graphene prepared by covalent and non-covalent techniques decreases significantly due to the destructive chemical oxidation of flake graphite followed by sonication, functionalization and chemical reduction. To overcome these problems, studies have been reported on the preparation of functionalized graphene directly from graphite (one-step process). In all these cases, surface modification of graphene can prevent agglomeration and facilitates the formation of stable dispersions. Surface modified graphene can be used for the fabrication of polymer nanocomposites, Li-ion battery electrodes, super-capacitor devices, drug delivery system, solar cells, memory devices, transistor device, biosensor, etc.

Graphite

Graphite, as commonly understood and as referred to herein, implies a crystalline form of elemental carbon with atoms arranged in a hexagonal structure. Graphite occurs naturally in this form and is the most stable form of carbon under standard (atmospheric) conditions. Otherwise, under high pressures and temperatures, graphite converts to diamond. Graphite is used in pencils and lubricants. Its high conductivity makes it useful in electronic products such as electrodes, batteries, and solar panels.

Roll-to-Roll (R2R) Processing

R2R processing refers to the process of creating electronic devices on a roll of flexible plastic or metal foil. R2R processing may also refer to any process of applying coatings, printing, or performing other processes starting with a roll of a flexible material and re-reeling after the process to create an output roll. These processes, and others such as sheeting, may be grouped together under the general term "converting". When the rolls of material have been coated, laminated or printed they can be subsequently cut and/or slit to their finished size on a slitter rewinder.

R2R processing of large-area electronic devices may reduce manufacturing cost. Other applications could arise which take advantage of the flexible nature of the substrates, such as electronics embedded into clothing, 3D-printed Li-ion batteries, large-area flexible displays, and roll-up portable displays.

3D Printing-Generally 3D printing or Additive Manufacturing has found applications in various manufacturing, medical, industry and sociocultural sectors, which in turn have generated enough interest to further facilitate research and development. Also, 3D printing has been used in humanitarian applications to produce a range of medical items, including prosthetics, spares and repairs.

Earlier additive manufacturing applications concentrated on the toolroom end of the manufacturing spectrum, where, rapid prototyping was one of the earliest additive variants, and its mission was to reduce the lead time and cost of developing prototypes of new parts and devices, which was earlier only done with subtractive toolroom methods such as CNC milling, turning, and precision grinding. More recently, additive manufacturing has entered production to a much greater extent.

Additive manufacturing techniques are adaptable and may be configured for a nearly innumerable amount of end-use applications, including, by way of example (but not limitation thereto) food, e.g., by squeezing out food, layer by layer, into three-dimensional objects. A large variety of foods may be appropriate candidates, such as chocolate and candy, and flat foods such as crackers, pasta, and pizza. Moreover, sources indicate that NASA is looking into the technology in order to create 3D printed food to limit food waste and to make food that are designed to fit an astronaut's dietary needs.

Moreover, 3D printing has also entered clothing, with fashion designers experimenting with 3D-printed shoes and dresses. In commercial production Nike® is using 3D printing to prototype and manufacture the 2012 Vapor Laser Talon football shoe for players of American football, and New Balance is 3D manufacturing custom-fit shoes for athletes. 3D printing has even progressed to a level where companies are printing consumer-grade eyewear with on-demand custom fit and styling (although they cannot print the lenses). On-demand customization of glasses is possible with rapid prototyping.

3D Printing—Advanced Batteries

Applications of 3D printing related manufacturing techniques also extend to the manufacture of porous electrodes for lithium-ion batteries, which were restricted earlier due to limitations in the design of 3D printed electrodes to just a few possible architectures. Until recently, the internal geometry that produced the best porous electrodes through additive manufacturing required an interdigitated configuration where metal prongs are interlocked, e.g., like the fingers or "digits" of two clasped hands, with the lithium shuttling between the two sides.

Lithium-ion battery capacity may be significantly improved upon, at a microscale level, if such batteries are produced with electrodes that have pores and channels. And, although previously often used, an interdigitated geometry allows for lithium to transport through the battery efficiently during charging and discharging, but may not always be optimal depending on intended end-uses, etc.

Accordingly, researchers have developed a new methods of 3D printing battery electrodes that creates 3D microlattice structures with controlled porosity, where 3D printing of such microlattice structures has shown substantial improvement in the capacity and charge-discharge rates for lithium-ion batteries.

For lithium-ion batteries, electrodes with porous architectures can lead to higher charge capacities since such architectures or configurations allow lithium to penetrate through the electrode volume leading to very high electrode utilization, and thus higher energy storage capacity. Compared to conventional batteries, where 30-50% of the total electrode volume is unutilized, battery electrodes manufactured by 3D printing create a microlattice electrode architecture that allows for the efficient transport of lithium through the entire electrode, which also increases battery charging rates.

Developments in additive manufacturing methods likewise translate into corresponding advances in capabilities regarding the printing of complex geometries for 3D battery architectures, as well as important steps toward geometrically optimizing 3D configurations for electrochemical energy storage, access, and delivery to devices.

Specific 3D-printed microlattice structures used as electrodes in lithium-ion batteries have been shown to improve battery performance in several ways, including (but not limited to): a fourfold increase in specific capacity and a twofold increase in areal capacity when compared to a solid block electrode, e.g., as may be related to surface area to volume ratios of such 3D printed microlattice structures. Further, 3D printed electrodes have been shown to retain their complex 3D lattice structures after many, e.g., forty, electrochemical cycles thus demonstrating their mechanical robustness and ongoing reliability. Thus, such 3D printed batteries with specific microstructures can have relatively high electrical charge storage capacity for the same weight or alternately, for the same capacity, a greatly reduced weight, e.g., by offering optimal surface area to volume ratios and configurations, which may be an important attribute for certain applications requiring enumerated parameters, such as (but not limited to): transportation and medical device applications, including implantable devices beneath the skin.

Until recently, 3D printed battery efforts were largely limited to extrusion-based printing, e.g., referring to a process used to create objects of a fixed cross-sectional profile where material is pushed through a die of the desired cross-section. In applications to print complex microlattice structures, a wire of material may be extruded from a nozzle to create continuous structures. Also, interdigitated structures are possible using this method as is the 3D printing of battery electrodes by rapidly assembling individual droplets one-by-one into 3D structures such that resulting structures have complex geometries that would be otherwise impossible to fabricate using typical or traditional extrusion methods.

Moreover, since droplets of material used for 3D printing are separated from each other, the creation of complex geometries is possible, as opposed to traditional extrusion printing, which requires a single stream of material.

The ability to create sophisticated and intricate 3D structures by 3D printing may be of particular importance in the fields of consumer electronics, the medical devices industry, as well as aerospace applications. Related research may also integrate well with biomedical electronic devices, where miniaturized batteries are often required. Non-biological electronic micro-devices may also benefit from developments in 3D printing of battery microstructures. On a larger (physical) scale, electronic devices, small drones, and aerospace applications themselves may also benefit from and use 3D printing technology as well, due to the low weight and high capacity of the batteries printed using this method.

Oxidation-Reduction (Redox) Reactions

Redox are a type of chemical reaction in which the oxidation states of atoms are changed. Redox reactions are characterized by the transfer of electrons between chemical species, most often with one species (the reducing agent) undergoing oxidation (losing electrons) while another species (the oxidizing agent) undergoes reduction (gains electrons). The chemical species from which the electron is stripped is said to have been oxidized, while the chemical species to which the electron is added is said to have been reduced.

Intercalation

As commonly understood and as referred to herein, in chemistry, intercalation is the reversible inclusion or insertion of a molecule (or ion) into materials with layered structures. Examples are found in graphite, graphene, and transition metal dichalcogenides.

Li Intercalation into Bi- or Multi-layer Graphene

Electrical storage capacity of graphene and the Li-storage process in graphite currently present challenges requiring further development in the field of Li-ion batteries. Efforts have therefore been undertaken to further develop three-dimensional bi-layer graphene foam with few defects and a predominant Bernal stacking configuration, a type of bilayer graphene where half of the atoms lie directly over the center of a hexagon in the lower graphene sheet, and half of the atoms lie over an atom, and to investigate its Li-storage capacity, process, kinetics, and resistances. Li atoms may be stored only in the graphene interlayer. Further, various physiochemical characterizations of the staged Li bilayer graphene products further reveal the regular Li-intercalation phenomena and illustrate this Li storage pattern of two-dimensions.

Electrochemical Capacitors (ECs)

Electrochemical capacitors (ECs), also referred to as "ultracapacitors" and/or "supercapacitors", are considered for uses in hybrid or full EVs. ECs can supplement (or in certain uses replace) traditional batteries, including high-performance Li-ion batteries, used in an EVs to provide short bursts of power (forward propulsion) often needed for rapid acceleration. Traditional batteries may still be used provide uniform power for cruising at normal highway speeds, but supercapacitors (with their ability to release energy much more quickly than batteries) may activate and supplement battery-provided power at times when the car needs to accelerate, such as for merging, passing, emergency manoeuvres, and hill climbing.

ECs must also store sufficient energy to provide an acceptable driving range, such as from 220-325 miles or more. And, to be cost- and weight-effective compared to additional battery capacity, ECs must combine adequate specific energy and specific power with long cycle life, and meet cost targets as well. Specifically, ECs for application in EVs must store about 400 Wh of energy, be able to deliver about 40 kW of power for about 10 seconds, and provide high cycle-life (>100,000 cycles).

The high volumetric capacitance density of an EC (10 to 100 times greater than conventional capacitors) derives from using porous electrodes, which may incorporate, feature, and/or be constructed from scaffolded graphene-based materials, to create a large effective "plate area" and from storing energy in the diffuse double layer. This double layer, created naturally at a solid-electrolyte interface when voltage is imposed, has a thickness of only about 1-2 nm, therefore forming an extremely small effective "plate separation." In some ECs, stored energy is further augmented by pseudo-capacitance effects, occurring again at the solid-electrolyte interface due to electrochemical phenomena such as the redox charge transfer. The double layer capacitor is based on a high surface area electrode material, such as activated carbon, immersed in an electrolyte. A polarized double layer is formed at electrode-electrolyte interfaces providing high capacitance.

Advances in modern carbon-based materials (graphene) have enhanced applications using such materials, such as in secondary batteries. Electrochemical Li intercalation or de-intercalation properties of carbon and carbon-based materials depend significantly on their respective morphology, crystallinity, orientation of crystallites, and defects as well. Further, the electric storage capacity of a Li-ion battery can be enhanced by the selection and integration of desirable nano-structured carbon materials such as carbon in certain allotropes such as graphite and graphene, or nano-sized graphite, nanofibers, isolated single walled carbon nanotubes, nano-balls, and nano-sized amorphous carbon, having small carbon nanostructures in which no dimension is greater than about 2 μm.

For example, known methods for fabricating carbon and Li-ion electrodes for rechargeable Li cells include steps for forming a carbon electrode composed of graphitic carbon particles adhered by an ethylene propylene diene monomer binder used to achieve a carbon electrode capable of subsequent intercalation by Li-ions. The carbon electrode is reacted with Li-ions to incorporate Li-ions into graphitic carbon particles of the electrode. An electrical current is repeatedly applied to the carbon electrode to initially cause a surface reaction between the Li-ions and to the carbon and subsequently cause intercalation of the Li-ions into crystalline layers of the graphitic carbon particles. With repeated application of the electrical current, intercalation is achieved to near a theoretical maximum.

Other exfoliated graphite-based hybrid material compositions relate to: (a) micron- or nanometer-scaled particles or coating which are capable of absorbing and desorbing alkali or alkaline metal ions (particularly, Li-ions); and, (b) exfoliated graphite flakes that are substantially interconnected to form a porous, conductive graphite network comprising pores. The particles or coating resides in a pore of the network or is attached to a flake of the network. The exfoliated graphite amount is in the range of 5% to 90% by weight and the number of particles or amount of coating is in the range of 95% to 10% by weight.

Also, high capacity silicon-based anode active materials have been shown to be effective in combination with high capacity Li rich cathode active materials. Supplemental Li is shown to improve the cycling performance and reduce irreversible capacity loss for some silicon based active materials. Silicon based active materials can be formed in composites with electrically conductive coatings, such as pyrolytic carbon coatings or metal coatings, and composites can also be formed with other electrically conductive carbon components, such as carbon nano fibers and carbon nanoparticles.

And, known rechargeable batteries of an alkali metal having an organic electrolyte experiences little capacity loss upon intercalation of the carbonaceous electrode with the alkali metal. The carbonaceous electrode may include a multi-phase composition including both highly graphitized and less graphitized phases or may include a single phase, highly graphitized composition subjected to intercalation of Li at above about 50° C. Incorporation of an electrically conductive filamentary material such as carbon black intimately interspersed with the carbonaceous composition minimizes capacity loss upon re-peated cycling.

Otherwise, a known Li based negative electrode material is characterized by comprising 1 $m^2/g$ or more of carbonaceous negative electrode active material specific surface area, a styrene-butadiene rubber binder, and a fiber diameter formed to 1,000 nanometers of carbon fiber. Such negative electrode materials are used for Li batteries, which have desirable characteristics, such as a low electrode resistance, high strength of the electrode, an electrolytic solution having excellent permeability, high energy density and a high rate charge/discharge. The negative electrode material contains 0.05 to 20 mass % of carbon fibers and a styrene at 0.1 to 6.0% by mass. Butadiene rubber forms the binder and may further contain 0.3 to 3% by mass thickener, such as carboxymethyl methylcellulose.

Still further, existing technologies relate to a battery that has an anode active material that has been: (1) pre-lithiated; and, (2) pre-pulverized. This anode may be prepared with a method that comprises: (a) providing an anode active material; (b) intercalating or absorbing a desired amount of Li into the anode active material to produce a pre-lithiated anode active material; (c) comminuting, referring to the reduction of solid materials from one average particle size to a smaller average particle size, by crushing, grinding, cutting, vibrating, or other processes, the pre-lithiated anode active material into fine particles with an average size less than 10 μm (preferably <1 μm and most preferably <200 nm); and, (d) combining multiple fine particles of the pre-lithiated anode active material with a conductive additive and/or a binder material to form the anode. The pre-lithiated particles are protected by a Li ion-conducting matrix or coating material. The matrix material is reinforced with nano graphene platelets.

Graphitic nanofibers have also been disclosed and include tubular fullerenes (commonly called "buckytubes"), nano tubes and fibrils, which are functionalized by chemical substitution, are used as electrodes in electrochemical capacitors. The graphitic nanofiber-based electrode increases the performance of the electrochemical capacitors. Preferred nanofibers have a surface area greater than about 200 $m^2$/gm and are substantially free of micropores.

And, known high surface area carbon nanofibers have an outer surface on which a porous high surface area layer is formed. Methods of making the high surface area carbon nanofiber include pyrolizing a polymeric coating substance provided on the outer surface of the carbon nanofiber at a temperature below the temperature at which the polymeric coating substance melts. The polymeric coating substance used as the high surface area around the carbon nanofiber may include phenolics such as formaldehyde, polyacrylonitrile, styrene, divinyl benzene, cellulosic polymers and cyclotrimerized diethynyl benzene. The high surface area polymer which covers the carbon nanofiber may be functionalized with one or more functional groups.

System Structure

Point-of-Use Battery System

FIGS. 16-1A-16-1B show an exploded view of layers of a printed battery, such layers including elements of a cathode and anode portion, respectively. Such a stacked (such as "sandwiched") architecture of a battery 16-100B (shown implemented in package 16-300A) as shown here includes elements of a cathode portion and an anode portion. The cathode portion may include an electrolyte layer 16-140B and a cathode 16-106B in a vertically stacked and adjacent configuration shown adhered to substrate 16-108B by seal 16-107B. Likewise, similar to cathode portion 16-111B, anode portion 16-110B may also include substrate 16-101B adhered to anode 16-104B via seal 16-303B.

Each the anode and cathode portions may include collectors 16-102B, 16-109B that are 3D printed substrates 16-101B, 16-108B, respectively. In the implementation shown in FIGS. 16-1A-16-1B, electrolyte layer 105B is shown as being included on the cathode portion, although in other embodiments the electrolyte may be incorporated within the cathode 16-106B. Each electrode, such as anode 16-104B and cathode 16-106B, is shown in FIGS. 16-1A-16-1B as being a layer positioned between current collectors 16-102B, 16-109B, respectively and the electrolyte layer 16-105B. Seals 16-303B, 16-107B can define perimeters (to be described in further detail below) that constrain spreading of electrolyte 16-105B and/or electrode materials when the battery is activated. Printed substrate surrounding battery 16-100B may serve as seals 16-303B, 16-107B, while in other embodiments seals 16-303B, 16-107B may be formed from another substance deposited onto the substrate.

FIGS. 16-1C1-16-1C2 show folding techniques related to activating aspects of the printed battery shown in FIGS. 16-3A-16-3B.

FIGS. 16-1D1-16-1D3 discuss example printed battery features.

FIG. 16-1E shows a flowchart related to a method for activating an example printed battery.

FIG. 16-2 shows an example schematic for a traditional Li-ion battery incorporating the presently disclosed 3D self-assembled binder-less mesoporous carbon-based particles. An example Li-ion secondary electrochemical cell (battery) system 16-200 is shown in FIG. 16-2, having an anode 16-203 and cathode 16-202 separated by separator 16-217, all at least partially contained and/or exposed to (Li) ion-conducting electrolyte solution 16-238 (containing dissociated lithium ion conducting salt 16-202) as shown. The separator, a porous membrane to electrically isolate the two electrodes from each other, is also in the position showed. Single lithium ions migrate through pathway 16-207 back and forth between the electrodes of the lithium ion-battery during charging and discharging and are intercalated into the active materials.

During discharging, when lithium is deintercalated from the negative electrode (anode 16-203 and/or hierarchical mesoporous carbon-based anode 16-203, where copper functions as the current collector), electrons 16-206 are released, for example. The active materials of the positive electrode (cathode 16-202 and/or hierarchical mesoporous carbon-based cathode 16-204 cathode 16-204) are, for example, mixed oxides. Those of the negative electrode mainly are graphite and amorphous carbon compounds. The positive electrode (cathode 16-202 and/or hierarchical mesoporous carbon-based cathode 16-204 cathode 16-204) contains active materials such as mixed oxides. The active materials of the negative electrode (anode 16-203 and/or hierarchical mesoporous carbon-based anode 16-203) mainly are graphite and amorphous carbon compounds. These are the materials into which the lithium is intercalated.

Notably, lithium ion conducting salt 16-202 (also referring to Li ions generally) can intercalate into any one or more of the unique carbon-based structures (referring the mesoporous carbon-based particle 16-300A, 16-300E, carbon-scaffold 16-300H, and lithiated carbon-scaffold 16-400A and/or the like employed as an anode 16-203, replacing traditional anode 16-203, and/or a cathode 16-204, replacing traditional cathode 16-202) all of which are proprietary to LytEn, Inc., of Sunnyvale, CA, to achieve surprising and wholly unexpected specific capacity retention capability far in excess of the 372 mAh/g values commonly cited in traditional Li-ion battery related technologies, inclusive of performance at a level 3× or greater (referring to specific capacity retention capabilities exceeding 3,300 mAh/g or more), all made possible through the unique, multi-modal, hierarchical pores 16-303A and/or 16-307F defined by open porous scaffold 16-302A of mesoporous carbon-based particle 16-300A and/or 16-300E. Li ions form complexes and/or compounds with S, for example, and are temporarily retained during charge-discharge cycles at levels not otherwise achievable through conventional unorganized carbon structures requiring adhesive definition and combination via a binder, which can (as discussed earlier) also inhibit overall battery performance and longevity.

Lithium ions migrate from the negative electrode (anode 16-203 and/or hierarchical mesoporous carbon-based anode 16-203, any one or more of which further include and/or are defined by mesoporous carbon based particles 16-300A and/or 16-300E with minute carbon particles 16-209 interspersed therein) through the electrolyte 16-238 and the separator 16-217 to the positive electrode (cathode 16-202 and/or hierarchical mesoporous carbon-based cathode 16-204 cathode 16-204, any one or more of which further include and/or are defined by mesoporous carbon based particles 16-300A and/or 16-300E with minute carbon particles 16-209 interspersed therein) ([using] aluminum as a current collector). Here, lithium metal 16-234 micro-confined (as shown in enlarged areas 16-236 and 16-233) within hierarchical mesoporous carbon-based anode 16-203 (and in between graphene sheets 16-232 associated therewith as shown in area 16-233) may dissociate pursuant to the following equation (16-3):

$$\text{FLG-Li} \rightarrow \text{FLG} + \text{Li} + e^-$$

Eq. (16-3) shows electrons 16-233 discharging 16-208 to power an external load and lithium ions 16-232 migrating to cathode 16-202 and/or hierarchical mesoporous carbon-based cathode 16-204 cathode 16-204 to return to a thermodynamically-favored position within a cobalt oxide-based lattice pursuant to the following equation (16-2):

$$xLi^{+}+xe^{-}+Li_{3-x}CoO_2 \rightarrow LiCoO_2. \quad (2)$$

During charging, this process is reversed, where lithium ions 16-202 migrate from the positive electrode through the electrolyte and the separator to the negative electrode.

Disclosed carbon-based structures (referring to the surprising favorable specific capacity values made possible by the unique multi-modal hierarchical structures of mesoporous carbon-based particle 16-300A, 16-300E and/or derivatives thereof, including carbon scaffold 16-300H and lithiated carbon scaffold 16-400A) build upon traditional advantages offered by lithium ion technology. Compared to sodium or potassium ions, the small lithium ion exhibits a significantly quicker kinetics in the different oxidic cathode materials. Another difference: as opposed to other alkaline metals, lithium ions can intercalate and deintercalate reversibly in graphite and silicon. Furthermore, a lithiated graphite electrode enables very high cell voltages. Disclosed carbon-based structures uniquely and unexpectedly enhance the ease through which lithium ions can intercalate and deintercalate reversibly between graphene sheets, due to the unique lay-out of few-layer graphene (FLG) (2-32 layers of graphene in a generally horizontally stacked configuration) 16-303C as employed in mesoporous carbon-based particle 16-300A and/or the like, and are suitable for application in traditional cylindrical (hardcase), pouch cell (softpack), and prismatic (hardcase) applications.

3D Self-Assembled Binder-Less Multi-Modal Mesoporous Carbon-Based Particle—In Detail FIGS. 16-3A-16-3F show illustrative schematic representations, at various magnification levels, and/or micrographs of a 3D self-assembled binder-less 3D mesoporous carbon-based particle having tunable electrical pathways and ionic conduits throughout the thickness thereof.

FIG. 16-3A shows a three-dimensional (3D) self-assembled binder-less multi-modal mesoporous carbon-based particle 16-300A having controllable electrical and ionic conducting gradients distributed throughout, within which various aspects of the subject matter disclosed herein may be implemented. A mesoporous material, as generally understood and as referred to herein, implies a material containing pores with diameters between 2 and 50 nm, according to IUPAC nomenclature. For the purposes of comparison, IUPAC defines microporous material as a material having pores smaller than 2 nm in diameter and macroporous material as a material having pores larger than 50 nm in diameter.

Mesoporous materials may include various types of silica and alumina that have similarly sized mesopores. Mesoporous oxides of niobium, tantalum, titanium, zirconium, cerium and tin have been researched and reported. Of all the variants of mesoporous materials, mesoporous carbon has achieved particular prominence, having direct applications in energy storage devices. Mesoporous carbon is defined as having porosity within the mesopore range, and this significantly increases the specific surface area. Another common mesoporous material is "activated carbon", referring to a form of carbon processed to have small, low-volume pores that increase the surface area. Activated carbon, in a mesoporous context, is typically composed of a carbon framework with both mesoporosity and microporosity (depending on the conditions under which it was synthesized). According to IUPAC, a mesoporous material can be disordered or ordered in a mesostructure. In crystalline inorganic materials, mesoporous structure noticeably limits the number of lattice units, and this significantly changes the solid-state chemistry. For example, the battery performance of mesoporous electroactive materials is significantly different from that of their bulk structure.

Mesoporous carbon-based particle 16-300A is nucleated and grown in an atmospheric plasma-based vapor flow stream of reagent gaseous species, which may include methane ($CH_4$), to form an initial carbon-containing and/or carbon-based particle. That initial particle may be expanded upon either: "in-flight", describing the systematic coalescence (to nucleate from an initially formed seed particle) of additional carbon-based material derived from incoming carbon-containing gas mid-air within a microwave-plasma reaction chamber (as shown by micrograph 16-300D in FIG. 16-1D); or, grown (and/or deposited) directly onto a supporting or sacrificial substrate, such as a current collector, within a thermal reactor.

In chemistry-related context, "coalescence" implies a process in which two phase domains of the same composition come together and form a larger phase domain. Alternatively put, the process by which two or more separate masses of miscible substances seem to "pull" each other together should they make the slightest contact. Mesoporous carbon-based particle 16-300A, may be alternatively referred to as just "particle", and/or by any other similar term. The term "mesoporous", as both generally understood and as used herein, may be defined as a material containing pores with diameters between 2 and 50 nm, according to International Union of Pure and Applied Chemistry ("IUPAC") nomenclature.

Referring to synthesis and/or growth of mesoporous carbon-based particle 16-300A within a reaction chamber in and/or otherwise associated with a microwave-based reactor, such as a reactor disclosed by Stowell, et al., "Microwave Chemical Processing Reactor", U.S. Pat. No. 9,767,992. (Sep. 19, 2017), incorporated by reference herein in its entirety, or thermal reactor, referring generally to a chemical reactor defined by an enclosed volume in which a temperature-dependent chemical reactor occurs.

Mesoporous carbon-based particle 16-300A (also mesoporous carbon-based particle 16-300E as shown in FIG. 16-1E) is synthesized with a three-dimensional (3D) hierarchical structure comprising short range, local nano-structuring in combination with long range approximate fractal feature structuring, which in this context refers to the formation of successive layers involving the 90-degree rotation of each successive layer relative to the one beneath it, and so on and so forth, allowing for the creation of vertical (or substantially vertical) layers and/or intermediate ("inter") layers.

The plurality of hierarchical (and/or contiguous) pores 16-307F (as shown in FIG. 16-1F) at least in part further define open porous scaffold 16-302A with one or more Li-ion diffusion pathways 16-309F (as shown in FIG. 16-1F) having:

- microporous frameworks defined by a dimension 16-101F of >50 nm that provide tunable Li-ion conduits;
- mesoporous channels defined by a dimension 16-101F of about 20 nm to about 50 nm (generally defined under IUPAC nomenclature and referred to as "mesopores" or "mesoporous") that act as Li ion-highways for rapid Li-ion transport therein; and microporous textures defined by a dimension 103F of <4 nm for charge accommodation and/or active material confinement.

Li-ion diffusion pathways 16-309F and/or hierarchical porous network 16-100F more generally may act as or otherwise provide active Li intercalating structures, which may provide a source for specific capacity of an anode or cathode Li-ion battery electrode at between about 744 mAh/g to about 1,116 mAh/g. Li may infiltrate open porous scaffold to at least partially chemically react with exposed carbon therein. Mesoporous carbon-based particle 16-300A may be synthesized at least in part by a vapor flow stream of gaseous reagents including any one or more of a saturated or unsaturated hydrocarbon, such as methane ($CH_4$), flowed onto a substrate in a reactor, such as a microwave-based reactor and/or a thermal reactor.

One or more physical, electrical, chemical and/or material properties of the mesoporous carbon-based particle 16-300A may be defined during its synthesis. Also, dopants (referring to traces of impurity element that is introduced into a chemical material to alter its original electrical or optical properties, such as Si, SiO, $SiO_2$, Ti, TiO, Sn, Zn, and/or the like) may be dynamically incorporated during synthesis of mesoporous carbon-based particle 16-300A to at least in part affect material properties including: electrical conductivity, wettability, and/or ion conduction or transport through hierarchical porous network 16-100F. Microporous textures having dimension 16-103F and/or hierarchical porous network 16-100F more generally may be synthesized, prepared or otherwise created to also (or otherwise) include smaller pores for chemical micro-confinement, the smaller pores being defined as ranging from 1 to 3 nm. Also, each graphene sheet (as shown in FIG. 16-1C) may range from 50 to 200 nm in diameter ($L_a$).

Hierarchical porous network 16-100F, may be a further magnified and/or detailed variant of open porous scaffold 16-302A, may provide one or more active Li intercalating structures, to be further described in structure and/or functionality in connection with FIGS. 16-6-16-19C, which show various topic diagrams, flowcharts, schematics, photographs and/or micrographs related to lithium, lithium ion, sulfide, and/or lithium, sulfur and/or other element derived chemical substances and/or compounds infiltrated and/or infused into the multi-layered carbon-based scaffolded structure shown in FIG. 16-4B. Open porous scaffold 16-302A may be created independent of a binder, such as a traditional, nonconductive polymer binder typically used in conjunction with and a conductive additive onto a metal foil current collector in battery end-use applications. Traditional configurations involving usage of a binder can lead to electronic/current conduction-related or ionic constrictions and poor contacts due to randomly distributed conductive phases. Moreover, when high-capacity electrode materials are employed, relatively high physical stress generated during electrochemical reactions can disrupt mechanical integrity of traditional binder systems, therefore, in turn, reducing cycle life of batteries.

A vapor flow stream used to synthesize mesoporous carbon-based particle 16-300A may be at least flowed in part into a vicinity of a plasma, such as that generated and/or flowed into a reactor and/or chemical reaction vessel. Such a plasma reactor may be configured to propagate microwave energy toward the vapor flow stream to at least in part assist with synthesis of mesoporous carbon-based particle 16-300A, may involve carbon-particle based and/or derived nucleation and growth from constituent carbon-based gaseous species, such as methane ($CH_4$), where such nucleation and growth may substantially occur from an initially formed seed particle within a reactor. More particularly, such a reactor accommodates control of gas-solid reactions under non-equilibrium conditions, where the gas-solid reactions may be controlled at least in part by any one or more of:

- ionization potentials and/or thermal energy associated with constituent carbon-based gaseous species introduced to the reactor for synthesis of the mesoporous carbon-based particle; and/or
- kinetic momentum associated with the gas-solid reactions.

The vapor flow stream may be flowed into a reactor and/or reaction chamber for the synthesis of mesoporous carbon-based particle 16-300A at substantially atmospheric pressure. And, change in wettability of mesoporous carbon-based particle 16-300A (and/or any constituent members such as open porous scaffold 16-302A) at least in part may involve adjustment of polarity of a carbon matrix associated with mesoporous carbon-based particle 16-300A.

Those skilled in the art will appreciate that the representations provided in FIGS. 16-3A-16-1D, 16-1E and 16-1F, are provided as examples. Sample representations are shown of mesoporous carbon-based particle 16-300A, including:

- when synthesized in a microwave-based reactor in micrograph 16-300D in FIG. 16-1D;

Mesoporous Carbon-Based Particle-Procedures for Synthesis Microwave Reactor

- when synthesized in the form of multi-shell fullerene (CNO) shown in micrograph 16-100H in FIG. 16-1H;
- when used to decorate graphite to form graphene-decorated graphite shown in micrograph 16-1001 in FIG. 16-1I; and,
- when synthesized in-flight in a microwave reactor as shown by micrograph 16-100J in FIG. 16-1J.

As introduced above, a vapor flow stream including carbon-containing constituent species, such as methane ($CH_4$) may be flowed into one of two general reactor types:

- a thermal reactor; or,
- a microwave-based (and/or "microwave") reactor. Suitable types of microwave reactors are disclosed by Stowell, et al., "Microwave Chemical Processing Reactor", U.S. Pat. No. 9,767,992 (Sep. 19, 2017), incorporated herein by reference in its entirety.

An example microwave processing reactor used to synthesize mesoporous carbon-based particle 16-300A may include microwave-generating energy source and a field-enhancing waveguide. The field-enhancing waveguide has a field-enhancing zone between a first cross-sectional area and a second cross-sectional area of the waveguide, and also has a plasma zone and a reaction zone. The second cross-sectional area is smaller than the first cross-sectional area, is farther away from the microwave energy source than the first cross-sectional area and extends along a reaction length of the field-enhancing waveguide. The supply gas inlet is upstream of the reaction zone. In the reaction zone, a majority of the supply gas flow is parallel to the direction of the microwave energy propagation. The supply gas is used to generate a plasma in the plasma zone to convert a process input material into separated components in the reaction zone at a pressure of at least 0.1 atmosphere, with a preference for 1 atmosphere where the surprising favorable physical properties of mesoporous carbon-based particle 16-300A, as discussed above, were discovered.

Propagation of microwave energy toward the carbon-containing or carbon-based vapor flow stream at least in part assists with synthesis of mesoporous carbon-based particle 16-300A and facilitates carbon-particle nucleation and growth within a reactor.

The term “in-flight” implies a novel method of chemical synthesis based on contacting particulate material derived from inflowing carbon-containing gaseous species, such as those containing methane ($CH_4$), to “crack” such gaseous species. “Cracking”, as generally understood and as referred to herein, implies the technical process of methane pyrolysis to yield elemental carbon (such as high-quality carbon black) and hydrogen gas, “without the problematic contamination by carbon monoxide, and . . . with virtually no carbon dioxide emissions.” A basic endothermic reaction that may occur within a microwave reactor is shown as equation (16-1) below:

$$CH_4 + 74.85\,KJ/mol \rightarrow C + 2H_2 \qquad (16\text{-}1)$$

Carbon derived from the above-described “cracking” process and/or a similar or a dissimilar process may fuse together while being dispersed in a gaseous phase, referred to as “in-flight”, to create carbon-based particles, structures, (substantially) 2D graphene sheets, 3D agglomerations, and/or pathways defined therein, including:

a plurality of interconnected 3D agglomerations 16-101B of multiple layers of graphene sheets 16-101C (also, each sheet of graphene is schematically depicted in FIG. 16-1C) that are sintered together to form an open porous scaffold 16-302A that facilitates electrical conduction along and across contact points of the graphene sheets 16-101C (which, as shown in FIG. 16-1B, may include and/or refer to 5 to 15 layers of graphene are oriented in a stacked configuration to have a vertical height referred to as a stack height ($L_c$)); and, a plurality of hierarchical pores 16-307F (as shown in FIG. 16-1F, and including pores 16-304F, 16-305F, and/or pathways 16-306F and/or 16-309F, any one or more which may be of a different dimension than the others) interspersed with the plurality of interconnected 3D agglomerations 16-101B of multiple layers of graphene sheets 16-101C, that may comprise one or more of single layer graphene (SLG), few layer graphene (FLG) defined as ranging from 5 to 15 layers of graphene, or many layer graphene (MLG), throughout the multi-modal mesoporous carbon-based particle 16-300A and/or 16-300E to define a hierarchical porous network 16-100F that facilitates rapid Li-ion (Li+) 16-108F diffusion therein by orienting and/or manipulating, such as by shortening, Li-ion diffusion pathways 16-306F and/or 16-309F.

As introduced earlier, interconnected 3D agglomerations of multiple layers of graphene sheets 16-101B sinter (or otherwise adjoin) together to serve as a type of intrinsic, self-supporting, “binder” or joining material allowing for the elimination of a separate traditional binder material. Sintering, or “frittage”, as commonly understood and as referred to herein, implies the process of compacting and forming a solid mass of material by heat or pressure without melting it to the point of liquefaction. Sintering happens naturally in mineral deposits or as a manufacturing process used with metals, ceramics, plastics, and other materials. The atoms in the materials diffuse across the boundaries of the particles, fusing the particles together and creating one solid piece. Since sintering temperature does not have to reach the melting point of the material, sintering is often chosen as the shaping process for materials with extremely high melting points such as tungsten (W) and molybdenum (Mo). The study of sintering in metallurgy powder-related processes is known as powder metallurgy. An example of sintering can be observed when ice cubes in a glass of water adhere to each other, which is driven by the temperature difference between the water and the ice. Examples of pressure-driven sintering are the compacting of snowfall to a glacier, or the forming of a hard snowball by pressing loose snow together.

Few layer graphene (FLG), defined herein as ranging from 5 to 15 layers or sheets of graphene, are sintered, substantially as so-described above, at an angle that is not flat relative to other FLG sheets to nucleate and/or grow at an angle and therefore “self-assemble” over time. Moreover, process conditions may be tuned to achieve synthesis, nucleation, and/or growth of 3D multi-modal mesoporous carbon-based particles on a component and/or a wall surface within a reaction chamber, or entirely in-flight (upon contact with other carbon-based materials).

Electrical conductivity of deposited carbon and/or carbon-based materials may be tuned by adding metal additions into the carbon phase in the first part of the deposition phase or to vary the ratios of the various particles discussed. Other parameters and/or additions may be adjusted, as a part of an energetic deposition process, such that the degree of energy of deposited carbon and/or carbon-based particles will either: (1) bind together; or, (2) not bind together.

By nucleating and/or growing the multi-modal mesoporous carbon-based particle in an atmospheric plasma-based vapor flow stream either in-flight or directly onto a supporting or sacrificial substrate, a number of the steps and components found in both traditional batteries and traditional battery-making processes may be eliminated. Also, a considerable amount of tailoring and tunability can be enabled or otherwise added into the discussed carbons and/or carbon-based materials.

For instance, a traditional battery may use a starting stock of active materials, graphite, etc., which may be obtained as off-the-shelf materials to be mixed into a slurry. In contrast, the 3D self-assembled binder-less multi-modal mesoporous carbon-based particle 16-300A disclosed herein may enable, as a part of the carbon or carbon-based material synthesis and/or deposition process, tailoring and/or tuning the properties of materials, in real-time, as they are being synthesized in-flight and/or deposited onto a substrate. This capability presents a surprising, unexpected and substantial favorable departure from that currently available regarding creation of carbon-based scaffolded electrode materials in the secondary battery field.

Reactor and/or reactor design of that disclosed by Stowell, et al., “Microwave Chemical Processing Reactor”, U.S. Pat. No. 9,767,992 (Sep. 19, 2017) may be adjusted, configured and/or tailored to control wanted or unwanted nucleation sites on internal surfaces of reaction chambers exposed to carbon-based gaseous feedstock species (such as methane ($CH_4$)). In-flight particles qualities may be influenced by their solubility in the gaseous species in which they are flowed in such that once a certain energy level is achieved, it is not inconceivable for carbon to “crack off” (as so described by “cracking”) and form its own solid in a microwave reactor.

Adjusting for Unwanted Carbon Accumulation on Reaction Chamber Walls

Moreover, tuning of disclosed reactors and related systems may be performed to both proactively and reactively address issues associated with carbon-based microwave reactor clogging. For instance, open surfaces, feed holes, hoses, piping and/or the like may accumulate unwanted carbon-based particulate matter as a by-product of synthetic procedures performed to create mesoporous carbon-based particle 16-300A. A central issue observed in a microwave reactor may include this tendency to experience clogging in and/or along orifices, the reason being related to walls and other surfaces exposed to in-flowing gaseous carbon-containing species having carbon solubility as well. Therefore, is it possible to unwantedly grow on the walls of a reaction chamber and/or on the exit tube. Over time, those growths will extend out and ultimately impinge flow and can shut down chemical reactions occurring within the reactor and/or reaction chamber. Such a phenomena may be akin to tube (exhaust) wall build-up of burnt oil in a high-performance or racing internal combustion engine, where, instead of burning (combusting) fossil-fuel based gasoline, methane is used to result in the unwanted deposit of carbon on reaction chamber wells since metal inside the reaction chamber itself has a carbon solubility level.

Although methane is primarily used to create mesoporous carbon-based particle 16-300A, in theory any carbon-containing and/or hydrocarbon gas, like $C_2$ or acetylene or any one or more of: $C_2H_2$, $CH_4$, butane, natural gas, biogas (derived from decomposition of biological matter) will function to provide a carbon-containing source.

The described uncontrolled and unwanted carbon growth within exposed surfaces of a microwave reactor may be compared to that occurring within an internal combustion engine exhaust manifold (rather than within a cylinder bore) of the engine, especially where the plume of plasma (and/or hot, excited gas about to enter into the plasma phase) is at the onset of the manifold, and burnt gas and carbon-based fragments are traveling down and plugging-up flow through the manifold, cross-pipes, and catalytic converter, and exit-pipes. Process conditions may therefore be proactively tuned to adjust and therefore accommodate for potential carbon-build-up as so-described in the microwave reactor, which (as disclosed and referred to) relies on the presence of a plasma for hydrocarbon gas cracking. To maintain this plasma, a certain set of conditions must be maintained, otherwise back-pressure accumulation can potentially destroy the plasma prior to its creation and subsequent ignition, etc.

Thermal Reactor

In the alternative (or in certain cases, in addition or combination with) synthesis of mesoporous carbon-based particle 16-300A in a microwave-based and/or microwave reactor as substantially described above, specifically structured and/or scaffolded carbons and/or carbon-based structures can be created by "cracking" hydrocarbons purely by heat application in a reactor featuring application of thermal radiation (heat), referred to herein as a "thermal reactor". Example configurations may include exposure of incoming carbon-based gaseous species (such as any one or more of the aforementioned hydrocarbons) to a heating element (similar to a wire in a lightbulb).

The heating element heats up the inside of a reaction chamber where incoming carbon-containing gas is ionized. The carbon-containing gas is not burnt, due to the absence of sufficient oxygen to sustain combustion, but is rather ionized from contact with incoming thermal radiation (heat) and/or other forms of thermal energy to cause nucleation of constituent members of mesoporous carbon-based particle 16-300A, and ultimately synthesize, via nucleation, mesoporous carbon-based particle 16-300A in its entirety. In thermal reactors, some, or most, of the observed nucleation of carbon-based particles can occur on walls or on the heating element itself. Nevertheless, particles can still nucleate which are small enough to be cracked by the speed of flowing gas, such particles are captured to assist in the creation of mesoporous carbon-based particle 16-300A.

Cracked carbons can be used to create CNO as shown, for example, by 16-100H in FIG. 16-1H, and/or fullerenes, and smaller fractions of carbons with fullerene internal crystallography.

In comparing synthesis of mesoporous carbon-based particle 16-300A via the two discussed pieces of equipment, microwave and thermal reactors, the following distinctions have been observed:

- microwave reactors can provide tuning capabilities suitable to provide a broader range of allotropes of carbon; whereas,
- thermal reactors tend to allow for the fine-tuning of process parameters, such as heat flow, temperature, and/or the like, to achieve the needs of specific end-use application targets of mesoporous carbon-based particle 16-300A.

For instance, thermal reactors are currently being used to build Li S electrochemical cell electrodes, such as anodes and cathodes. Typical treatment process temperatures range in the thousands of Kelvin, with optimal, surprising, and otherwise unexpected favorable performance properties, such as referring to mesoporous carbon-based particle 16-300A and/or carbon-based aggregates associated therewith, when compressed, have an electrical conductivity greater than 500 S/m, or greater than 5000 S/m, or from 500 S/m to 20,000 S/m. Optimal performance has been observed at between 2,000-4,000 K.

Mesoporous Carbon-Based Particle-Physical Properties & Implementation in Batteries Any one or more of the carbon-based structures, intermediaries, or features associated with mesoporous carbon-based particle 16-300A may be incorporated at least in part into a secondary battery electrode, such as that of a lithium ion battery, as substantially set forth by Lanning, et al., "Lithium Ion Battery and Battery Materials", U.S. Pat. Pub. No. 2019/0173125, (published on Jun. 6, 2019), incorporated by reference herein in its entirety.

Particulate carbon contained in and/or otherwise associated with mesoporous carbon-based particle 16-300A may be implemented in a Li-ion battery cathode as a structural and/or electrically conductive material and have at least a substantially a mesoporous structure as shown by hierarchical porous network 16-100F with a wide distribution of pore sizes (also referred to as a multi-modal pore size distribution). For example, mesoporous particulate carbon can contain multi-modal distribution of pores in addition or in the alternative to plurality of hierarchical pores 16-307F (as shown in FIG. 16-1F) that at least in part further define open porous scaffold 16-302A with one or more Li-ion diffusion pathways 16-309F. Such pores may have sizes from 0.1 nm to 10 nm, from 10 nm to 100 nm, from 100 nm to 1 micron, and/or larger than 1 micron. Pore structures can contain pores with a bi-modal distribution of sizes, including smaller pores (with sizes from 1 nm to 4 nm) and larger pores (with sizes from 30 to 50 nm). Such a bimodal distribution of pore sizes in mesoporous carbon-based particle 16-300A can be beneficial in sulfur-containing cathodes in lithium ion batteries, as the smaller pores (1 to 4 nm in size) can confine the sulfur (and in some cases control of saturation and crystallinity of sulfur and/or of generated sulfur compounds) in the cathode, and the larger pores (30 to 50 nm in size, or pores greater than twice the size of solvated lithium ions) can enable and/or facilitate rapid diffusion (or, mass transfer) of solvated Li ions in the cathode.

As introduced earlier, the lithium-sulfur battery (Li—S battery) is a type of rechargeable battery, notable for its high specific energy. A lithium/sulfur (Li/S) battery (such as that represented by sulfur (S) infiltrated into hierarchical pores 16-307F of mesoporous particle 16-300E (such as where S infiltrates open porous scaffold 16-302A to deposit on internal surfaces of mesoporous carbon-based particle 16-300A, 16-300E and/or within pores 16-307F), as shown in FIGS. 16-1F and 16-1E respectively, and by schematic 16-300G shown in FIG. 16-1G, showing intermediate steps associated with the reduction of sulfur to the sulfide ion ($S^{2-}$)). Incorporation of S into Li-ion batteries may result in a 3-5 fold higher theoretical energy density than state-of-art Li-ion batteries without S, and research has been ongoing for more than three decades. However, the commercialization of Li/S battery still, in some respects, cannot be fully realized due to many problematic issues, including short cycle life, low cycling efficiency, poor safety and a high self-discharge rate. All these issues are related to the dissolution of lithium polysulfide (PS), the series of sulfur reduction intermediates, in liquid electrolyte and to resulting parasitic reactions with the lithium anode and electrolyte components. On the other hand, the dissolution of PS is essential for the performance of a Li/S cell. Without dissolution of PS, the Li/S cell cannot operate progressively due to the non-conductive nature of elemental sulfur and its reduction products.

Mesoporous Carbon-Based Particle-Formed to Address Polysulfide (PS)-Related Challenges Seeking to address at least some of the challenges associated with such polysulfide (PS) systems, mesoporous carbon-based particle 16-300A and cathodic active material form a meta-particle framework, where cathodic electroactive materials (such as elemental sulfur that may form PS compounds 16-300G as shown in FIG. 16-1G) are arranged within mesoporous carbon pores/channels, such as within any one or more of hierarchical pores 16-307F (as shown in FIG. 16-1F, including pores 16-304F, 16-305F, and/or pathways 16-306F and/or 16-309F). S can be, for example, substantially incorporated within pores 16-307F at a loading level that represents 35-100% of the total weight/volume of active material in mesoporous carbon-based particle 16-300A and/or 16-300E overall.

This type of organized particle framework can provide a low resistance electrical contact between the insulating cathodic electroactive materials (such as elemental sulfur) and the current collector while providing relatively high exposed surface area structures that are beneficial to overall specific capacity (and that may be at least assist lithium ion micro-confinement as enhanced by the formation of Li S compounds temporarily retained in hierarchical pores 16-307F, and the controlled release and migration of Li ions as related to electric current conduction) in a battery electrode and/or system. Implementations of mesoporous carbon-based particle 16-300A can also benefit cathode stability by trapping at least some portion of any created polysulfides by using tailored structures, such as that shown by hierarchical pores 16-307F, to actively prevent them from unwantedly migrating through electrolyte to the anode resulting in unwanted parasitic chemical reactions associated with battery self-discharge.

Unwanted Migration of Polysulfides During Li S Battery System Usage-Generally

With reference to polysulfide shuttle mechanisms observed in Li S battery electrodes and/or systems, polysulfides dissolve very well in electrolytes. This causes another lithium-sulfur cell characteristic, the so-called shuttle mechanism. The polysulfides $Sn_2$—that form and dissolve at the cathode, diffuse to the lithium anode and are reduced to $Li_2S_2$ and $Li_2S$. (The polysulfide species $S_n2$—that form at the cathode during discharging dissolve in the electrolyte there. A concentration gradient versus the anode develops, which causes the polysulfides to diffuse toward the anode. Step by step, the polysulfides are distributed in the electrolyte.) Subsequent high-order polysulfide species react with these compounds and form low-order polysulfides $S_{(n-x)}$. This means that the desired chemical reaction of sulfur at the cathode partly also takes place at the anode in an uncontrolled fashion (chemical or electrochemical reactions are conceivable), which negatively influences cell characteristics.

If low-order polysulfide species form near the anode, they diffuse to the cathode. When the cell is discharged, these diffused species are further reduced to $Li_2S_2$ or $Li_2S$. Simply put, the cathode reaction partly takes place at the anode during the discharging process or, rather, the cell self-discharges. Both are undesirable effects decreasing [specific] capacity. In contrast to that, the diffusion to the cathode during the charging process is followed by a re-oxidation of the polysulfide species from low order to high order. These polysulfides then diffuse to the anode again. This cycle is generally known as the shuttle mechanism. If the shuttle mechanism is very pronounced, it is possible that a cell can accept an unlimited charge, it is 'chemically short-circuited'.

In general, the shuttle mechanism causes a parasitic sulfur active matter loss. This is due to the uncontrolled separation of $Li_2S_2$ and $Li_2S$ outside of the cathode area and it eventually causes a considerable decrease in cell cycling capability and service life. Further aging mechanisms can be an inhomogeneous separation of $Li_2S_2$ and $Li_2S$ on the cathode or a mechanical cathode structure breakup due to volume changes during cell reaction.

Hierarchical Pores of Mesoporous Carbon-Based Particle to Prevent Lithium Shuttle To address the unwanted phenomenon of PS shuttling as so described above, any one or more of the plurality of hierarchical pores 16-307F of mesoporous carbon-based particle 16-300A in a cathode can provide a suitable region, formed with an appropriate dimension, to drive the creation of lower order polysulfides (such as S and $Li_2S$) and therefore prevent the formation of the higher order soluble polysulfides ($Li_xS_y$ with y greater than 3) that facilitate lithium shuttle (i.e., loss) to the anode. As described herein, the structure of the particulate carbon and the cathode mixture of materials can be tuned during particulate carbon formation (within a microwave plasma or thermal reactor). In addition, cathodic electroactive materials (elemental sulfur) solubility and crystallinity in relation to lithium phase formation, can be confined/trapped within the micro/meso porous framework.

The present lithium ion batteries can incorporate particulate carbon as presented by mesoporous carbon-based particle 16-300A and/or any derivatives thereof into the cathode, anode, and/or one or both substrates with improved properties compared to conventional carbon materials. For example, the particulate carbon can have high compositional purity, high electrical conductivity, and a high surface area compared to conventional carbon materials. In some embodiments, the particulate carbon also has a structure that is beneficial for battery properties, such as small pore sizes and/or a mesoporous structure. In some cases, a mesoporous structure can be characterized by a structure with a wide distribution of pore sizes (with a multimodal distribution of pore sizes). For example, a multimodal distribution of pore sizes can be indicative of structures with high surface areas and a large quantity of small pores that are efficiently connected to the substrate and/or current collector via material in the structure with larger feature sizes (i.e., that provide more conductive pathways through the structure). Some non-limiting examples of such structures are fractal structures, dendritic structures, branching structures, and aggregate structures with different sized interconnected channels (composed of pores and/or particles that are roughly cylindrical and/or spherical).

In some embodiments, the substrate, cathode, and/or anode contains one or more particulate carbon materials. In some embodiments, the particulate carbon materials used in the lithium ion batteries described herein are described in U.S. Pat. No. 9,997,334, entitled “Seedless Particles with Carbon Allotropes,” which is assigned to the same assignee as the present application, and is incorporated herein by reference as if fully set forth herein for all purposes. In some embodiments, the particulate carbon materials contain graphene-based carbon materials that comprise a plurality of carbon aggregates, each carbon aggregate having a plurality of carbon nanoparticles, each carbon nanoparticle including graphene, optionally including multi-walled spherical fullerenes, and optionally with no seed particles (i.e., with no nucleation particle). In some cases, the particulate carbon materials are also produced without using a catalyst. The graphene in the graphene-based carbon material has up to 15 layers. A ratio (i.e., percentage) of carbon to other elements, except hydrogen, in the carbon aggregates is greater than 99%. A median size of the carbon aggregates is from 1 micron to 50 microns, or from 0.1 microns to 50 microns. A surface area of the carbon aggregates is at least 10 $m^2/g$, or is at least 50 $m^2/g$, or is from 10 $m^2/g$ to 300 $m^2/g$ or is from 50 $m^2/g$ to 300 $m^2/g$, when measured using a Brunauer-Emmett-Teller (BET) method with nitrogen as the adsorbate. The carbon aggregates, when compressed, have an electrical conductivity greater than 500 S/m, or greater than 5000 S/m, or from 500 S/m to 20,000 S/m.

Mesoporous Carbon-Based Particle-Departure from Conventional Technology to Yield Surprising Favorable Results Conventional composite-type Li-ion or Li S battery electrodes (shown in FIG. 16-2B) may be fabricated from a slurry cast mixture of active materials (shown as in FIG. 16-2A), including: conductive additives (such as fine carbon black and graphite for usage in a battery cathode at a specific aspect ratio), and polymer-based binders that are optimized to create a unique self-assembled morphology defined by an interconnected percolated conductive network. While, in conventional preparations or applications, additives and binders can be optimized to improve electrical conductivity there-through (by, for example, offering lower interfacial impedance) and therefore correspondingly yield improvements in power performance (delivery), they represent a parasitic mass that also necessarily reduces specific (also referred to as gravimetric) energy and density, an unwanted end result for today’s demanding high-performance battery applications.

To minimize losses due to parasite mass (such as that caused by increased active and/or inactive ratio), and concurrently enable faster access of electrolyte to the complete surface of an electrode, orienting, re-orienting, and/or otherwise organizing or repositioning ion diffusion pathways 16-309F to effectively shorten Li-ion diffusion path lengths for charge transfer, hierarchical pores 16-303A and/or open porous scaffold 16-302A may be created from reduced-size carbon particles and/or active materials (down to nanometer scales), since the external specific surface area (SSA, defined as the total surface area of a material per unit of mass, (with units of $m^2/kg$ or $m^2/g$) or solid or bulk volume (units of $m^2/m^3$ or $m^{-1}$); it is a physical value that can be used to determine the type and properties of a material (soil or snow)) of a sphere increases with decreasing diameter. However, as the particle size is decreased down into the nanometer size range there are associated attractive van der Waal forces that can impede dispersion, facilitate agglomeration, and thereby increase cell impedance and reduce power performance.

Another approach to shortening ion diffusional pathways, referring to ion diffusion pathways 16-309F shown in FIG. 16-1F, is to uniquely engineer the internal porosity of the constitutive carbon-based particles, such as those created by the electrically conductive interconnected agglomerations of graphene sheets 16-101B to create open porous scaffold 16-302A and/or define hierarchal pores 16-303A and/or 16-307F. As per commonly used definitions, and as referred to herein, a “surface curvature” is referred to as a “pore” if its cavity is deeper than it is wide. As a result, this definition necessarily excludes many nanostructured carbon materials where just the external surface area is modified, or in close packed particles where voids (intra-particular) are created between adjacent particles (as in the case of a conventional slurry cast electrode).

With respect to the engineering (referring to the synthesis, creation, formation, and/or growth of mesoporous carbon-based particle 16-300A either in-flight in a microwave-based reactor or via layer-by-layer deposition in a thermal reactor as substantially described earlier), reactor process parameters may be adjusted to tune the size, geometry, and distribution of hierarchical pores 16-303A and/or 16-307F within mesoporous carbon-based particle 16-300A. Hierarchical pores 16-303A and/or 16-307F within mesoporous carbon-based particle 16-300A may be tailored to achieve performance figures particularly well-suited for implementation in high-performance fast-current delivery devices, such as supercapacitors.

As generally described earlier, a supercapacitor (SC), also called an ultracapacitor, is a high-capacity capacitor with a capacitance value much higher than other capacitors, but with lower voltage limits, that bridges the gap between electrolytic capacitors and rechargeable batteries. It typically stores 10 to 100 times more energy per unit volume or mass than electrolytic capacitors, can accept and deliver charge much, much faster than batteries, and tolerates many more charge and discharge cycles than rechargeable batteries.

In many of the available off-the-shelf commercial carbons used in early supercapacitor development efforts, there were “worm”-like narrow pores which became a bottleneck or liability when operating at high current densities and fast charge and discharge rates, as electrons may encounter difficulty in flow through, in or around such structures or pathways. Even though pore dimensions were fairly uniform but still adjustable to accommodate a wide range of length scales, real-life achievable performance was still self-limited (as based on the structural challenges inherent to the “worm”-like narrow pores).

Compared to conventional porous materials with uniform pore dimensions that are tuned to a wide range of length scales, the presently disclosed 3D hierarchical porous materials (such as that shown by hierarchical pores 16-303A and/or 16-307F within mesoporous carbon-based particle 16-300A) may be synthesized to have well-defined pore dimensions (such as hierarchical pores 16-307F including pores 16-304F, 16-305F, and/or pathways 16-306F and/or 16-309F) and topologies overcome the shortcomings of conventional ‘mono-sized’ porous carbon particles by creating, multi-modal (such as bi-modal) pores and/or channels having the following dimensions and/or widths:

meso (2 nm<$d_{pore}$<50 nm) pores;

macro ($d_{pore}$>50 nm) pores 16-303A (as shown in micrograph 16-300A of FIG. 16-3A) to minimize diffusive resistance to mass transport; and, micro ($d_{pore}$<2 nm) pores 16-302A to increase surface area for active site dispersion and/or ion storage (capacitance relating to density and number of ions that can be stored within a given pore size, such as that shown by pore 16-305F having dimension 16-103F in FIG. 16-1F).

Although no simple linear correlation has been experimentally established between: (1) surface area; and, (2) capacitance, mesoporous carbon-based particle 16-300A offers surprising favorable results in providing optimal micropore size distributions and/or configurations (such as when integrated into a Li-ion or Li S battery electrode to achieve certain specific capacity and power values or ranges) that are different for each intended end-use application (such as an electrolyte system) and corresponding voltage window. To optimize capacitance performance, mesoporous carbon-based particle 16-300A may be synthesized with very narrow "pore size distributions" (PSD); and, as desired or required voltages are increased, larger pores are preferred. Regardless, current state-of-the-art supercapacitors have provided a pathway to engineering the presently disclosed 3D hierarchical structured materials for particular end-use applications.

In contrast to supercapacitors, where capacitance and power performance is primarily governed by, for example:

surface area of the pore wall;

size of pore; and interconnectivity of the pore channels (which affect electric double layer performance)

Li-ion storage batteries undergo faradaic reduction/oxidation reactions within the active material and thereby may require not only all of the Li-ion transport features of a supercapacitor (such as efficiently oriented and/or shortened Li ionic diffusion pathways). Regardless, in any application (including a supercapacitor as well as a traditional Li-ion or Li S secondary battery) a 3D nanocarbon-based framework/architecture (such as that defined open porous scaffold 16-302A) can provide continuous electrical conducting pathways (such as across and along electrically conductive interconnected agglomerations of graphene sheets 16-101B) alongside, for example, highly-loaded active material having high areal and volumetric specific capacity.

Mesoporous Carbon-Based Particle-Used as a Formative Material for a Cathode

To address prevailing issues with relatively low electrical and ionic conductivities, volume expansion and polysulfide (PS) dissolution (referring to the PS "shuttle" effect, discussed earlier, leading to lithium loss and capacity fade) in current sulfur cathode electrode designs, mesoporous carbon-based particle 16-300A has hierarchical pores 16-303A and/or 16-307F formed therein to define open porous scaffold 16-302A, which includes pores 16-305F with microporous textures 16-103F having a dimension (such as 1-4 nm cavities) suitable to at least temporarily micro-confine elemental sulfur and/or Li S related compounds. Open porous scaffold 16-302A, at the same time as confining sulfur as so described, also provides a host scaffold-type structure to manage sulfur expansion to ensure surprising, unexpected, and highly desirable electron transport across the sulfur-carbon interface (such as at contact and/or interfacial regions of sulfur and carbon within pores 16-305F) by, for example, tailored in-situ nitrogen doping of the carbon within the reactor. Confining sulfur within a nanometer scale cavity (such as pores 16-305F with microporous textures 16-103F) favorably alters both:

the equilibrium saturation (solubility product); and, crystalline behavior of sulfur, such that sulfur remains confined (as may be necessary for desirable electrical conduction upon dissociation of Li S compounds, etc.) within microporous textures having dimension 16-103F, with no external driving force required to migrate to the anode electrode.

As a result, unique dimension 16-103F (including diameter, height and/or width of about 1-4 nm in cavity form as described above) provided by pores 16-305F results in no need for separators that attempt to impede polysulfide diffusion while, at the same time, negatively impacting cell impedance (referring to the effective resistance of an electric circuit or component to alternating current, arising from the combined effects of ohmic resistance and reactance) and polarization. By using carbon with optimum (relative to elemental sulfur, lithium and/or Li S micro-confinement) and non-optimum multi-modal, referring to hierarchical pores 16-307F including pores 16-304F, 16-102F, and/or 16-103F, or (alternatively) bi-modal pore distributions, mesoporous carbon-based particle 16-300A demonstrates, unexpectedly and favorably, operation of the principle of micro-confinement in properly optimized (relative to final end-use application specific demands) structures.

Along with creating delicately engineered ornate, hierarchical multi-modal carbon-based particles, such as mesoporous carbon-based particle 16-300A and organized scaffolds generated therefrom, mesoporous carbon-based particle 16-300A further uniquely provides the ability to effectively load or infuse carbon scaffold 16-300H shown in FIG. 16-3B (that may be created in-reactor by either: layer-by-layer deposition of multiple mesoporous carbon-based particles 16-300A by a slurry-case method; or, by a continuous sequence of a group of plasma spray-torches, as shown by plasma spray-torch system 16-400B in FIG. 16-4B), with sulfur, such as elemental sulfur.

For lithium-sulfur battery performance to practically exceed conventional lithium ion batteries, industry-scalable techniques must achieve high sulfur loading (such as >70% sulfur per unit volume) relative to all additives and components of a given cathode template, while maintaining the native specific capacity of the sulfur active material. Attempts to incorporate sulfur into a cathode host, such as by any one or more of (performed independently or in any combination): electrolysis, wet chemical, simple mixing, ball milling, spray coating, and catholytes, have either not fully incorporated the sulfur as desirable, or are otherwise not economically scalable or manufacturable. Unlike melt infiltration where small pores are thermodynamically inaccessible, presently disclosed synthetic approaches use an isothermal vapor technique, introduced and reacted at substantially atmospheric pressure, where the high surface free energy of nanoscale pores or surfaces drives the spontaneous nucleation of sulfur containing liquids until a conformal coating of sulfur and/or lithium-containing condensate is reached on inner-facing surfaces of hierarchical pores 16-303A and/or 16-307F. In essence, unique vapor infusion process unexpectedly (and favorably) completely infuses sulfur into fine pores (such as any one or more of hierarchical pores 16-303A and/or 16-307F and/or pores 16-304F, 16-305F and/or pathways 16-306F and/or 16-309F) at the core of mesoporous carbon-based particle 16-300A, and therefore not just at its surface.

Mesoporous Carbon-Based Particle to Create an Electrically Conductive Scaffold

Mesoporous carbon-based particle 16-300A, may be fabricated any number of ways using both known and novel techniques disclosed herein, including:

- slurry-casting, referring to conventional metalworking, manufacturing and/or fabrication techniques in which a liquid material is usually poured into a mold, which contains a hollow cavity of the desired shape, and then allowed to solidify; or
- plasma spray-torch system 16-400B (shown in FIG. 16-4B), which may be used to perform layer-by-layer deposition to grow mesoporous carbon-based particle 16-300A incrementally.

Either (1) or (2) as described above, or any other known or novel fabrication techniques, may be used to create carbon scaffold 16-300H in a "graded" manner, referring to under specifically controlled conditions resulting in corresponding control of:

- electrical gradients (referring to interconnected 3D agglomerations of multiple layers of graphene sheets 16-101B that are sintered together, as discussed earlier, to form open porous scaffold 16-302A that facilitates electrical conduction along and across contact points of graphene sheets 16-101B); and,
- ionic conductive gradients (referring Li-ion transport through hierarchical pores 16-303A and/or 16-307F, which are defined by electrically conductive interconnected agglomerations of graphene sheets 16-101B, and cause rapid lithium (Li) ion diffusion effectively shortening Li-ion diffusion pathways 16-309F) throughout thickness of carbon scaffold 16-300H, in the vertical height direction A as shown in FIG. 16-3B, of mesoporous carbon-based particle 16-100.

Reference is made herein to various forms of carbon and/or graphene synthesized in-flight within a reactor (or reaction chamber) substantially as described earlier to create electrically conductive interconnected agglomerations of graphene sheets 16-101B, which may vary in shape, size, position, orientation, and/or structure. Such variances are influenced in differences in crystallinity and the particular type of carbon allotrope(s) used for creation of electrically conductive interconnected agglomerations of graphene sheets 16-101B. "Crystallinity", as generally understood and as referred to herein, implies the degree of structural order in a solid. In a crystal, atoms or molecules are arranged in a regular, periodic manner. The degree of crystallinity therefore has a significant influence on hardness, density, transparency and diffusion.

Mesoporous carbon-based particle 16-100 can be produced in the form of an organized scaffold, such as a carbon-based scaffold, out of a reactor (including thermal or microwave-based reactor) or be created (at least partially) during post-processing activities taking place outside of primary synthesis within a reactor.

Plasma processing and/or plasma-based processing, may be conducted within a reactor as disclosed by Stowell, et al., "Microwave Chemical Processing Reactor", U.S. Pat. No. 9,767,992, (Sep. 19, 2017), where supply gas is used to generate a plasma in the plasma zone to convert a process input material (such as methane and/or other suitable hydrocarbons in a gaseous phase) into separated components in a reaction zone (such as a reaction chamber) to facilitate in-flight synthesis of carbon-based materials, including mesoporous carbon-based particle 16-300A grown to create carbon scaffold 16-300H at approximately 1 atmosphere.

Alternative to synthesis by or within a microwave reactor as described above, thermal energy may be directed toward or near carbon-containing feedstock materials supplied in a gaseous phase onto sacrificial substrate 16-306B to sequentially deposit multiple layers of mesoporous carbon-based particles 16-300A by, for example, plasma spray-torch system 16-400B shown in FIG. 16-4B. Such particles may be either fused together in-flight (in a microwave reactor) or deposited (in a thermal reactor) in a controlled manner to achieve varying concentration levels of carbon-based particles 16-300A to therefore, in turn, achieve "graded" electrical conductivity proportionate to concentration levels of mesoporous carbon-based particles 16-300A. Such procedures may be used to formulate porous carbon-based electrode structure (such as carbon scaffold 16-300H) that has a high degree of tunability (regarding electrical conductivity and ionic transport) while also eliminating many production steps and otherwise retaining a conventional outward appearance.

An objective of producing mesoporous carbon-based particle 16-300A out of, for example, a microwave reactor, includes producing open porous scaffold 16-302A with an open cellular structure such that a liquid-phase electrolyte can easily infiltrate into the pores of mesoporous carbon-based particle 16-300A via (at least) open porous scaffold 16-302A. As generally understood and as referred to herein, a "porous medium" or a "porous material" refers to a material containing pores, also referred to herein as "voids". Skeletal portions of open porous scaffold 16-302A may be referred to as a "matrix" or a "frame", and pores (such as hierarchical pores 16-303A and/or 16-307F) can be infiltrated with a fluid (liquid or gas), whereas, skeletal material is usually formed as a solid material.

Porosity of the Mesoporous Carbon-Based Particle—in Detail

A porous medium, such as mesoporous carbon-based particle 16-300A, can be characterized by its porosity. Other properties of the medium (such as permeability, tensile strength, electrical conductivity, and tortuosity) may be derived from the respective properties of its constituents (of solid matrix and fluid interspersed therein), as well as media porosity and pore structure. Mesoporous carbon-based particle 16-300A can be created out of a reactor (and possibly also subsequently post-processed, to be discussed in detail herein) to achieve desirable porosity levels that are unexpectedly conducive for ion diffusion (such as Li ion), whereas contacting electrically conductive interconnected agglomerations of graphene sheets 16-101B facilitate electron conduction while also allowing for electrons to reunite with positive ions at reaction sites.

Regarding, porosity and tortuosity of open porous scaffold 16-302A of mesoporous carbon-based particle 16-300A, an analogy may be made to marbles in a glass jar. Porosity, in this example, refers to spacing between the marbles that allows liquid-phase electrolyte to penetrate into void spaces between the marbles, similar to hierarchical pores 16-307F that define ion diffusion pathways 16-309F. The marbles themselves may be like Swiss cheese, by allowing electrolyte not only to penetrate in cracks between agglomerations of graphene sheets 16-101B, but also into agglomerations of graphene sheets 16-101B_themselves. In this example as well as others, the relative "shortening" of ion diffusion pathways 16-309F refers to how long it takes Li ions infiltrated therein by, for example, capillary action to contact active material (such as S confined within pores 16-305F). Ion diffusion pathways 16-309F accommodate convenient and rapid infiltration and diffusion of electrolyte, that may contain Li ions, into mesoporous carbon-based particle 16-300A, synthesized further to create carbon scaffold 16-300H with graded electric conductivity.

The "shortening" of ion diffusion pathways 16-309F refers toward the shortening of diffusion lengths through which Li ions move within open porous scaffold 16-302A in carbon scaffold 16-300H and not active material itself (as it is commonly understood that the diffusion length of the active material may be shortened only by making the thickness of the active material lesser or smaller). Ion diffusion pathways 16-309F can act as ion buffer reservoirs by controlling flow and/or transport of ions therein to provide a surprisingly favorable freer flowing structure for ion transport therein, as may be beneficial for ion confinement and transport during electrochemical cell charge-discharge cycles. Transport of Li ions throughout ion diffusion pathways 16-309F in the general directions shown in FIG. 16-3F can take place in a liquid electrolyte initially infused and captured within open porous scaffold 16-302A, where such infusion of electrolyte occurs prior to cyclic carbon scaffold 16-300H usage. Alternatively, examples exist permitting for the initial diffusion and distribution of liquid-phase electrolyte in open porous scaffold 16-302A of mesoporous carbon-based particle 16-300A to fill up and occupy hierarchical pores 16-303A and/or 16-307F prior to usage of carbon scaffold 16-300H, synthesized or otherwise created by layer-on-layer deposition of mesoporous carbon-based particles 16-300A. In alternative or addition to substantially complete filling of open porous scaffold 16-302A with electrolyte as described, vacuum or air may also be used to at least partially fill hierarchical pores 16-303A and/or 16-307F, which may allow or assist with wetting of electrolyte with carbon-containing exposed surfaces within open porous scaffold 16-302A (to be described further herein).

Once an electrode is formed using carbon scaffold 16-300H, through additional exposure and electrochemical reactions, Li ions actually bounce from one location to another by a chain reaction, similar to the striking of "newton" balls, where one hits to result in force transference resulting in the movement of other balls. Similarly, each Li-ion moves a relatively short distance, yet remains able to move great numbers of Li ions in the collective through this type of chain reaction as described. The extent of individual Li-ion movement may be influenced by the quantity of Li ions supplied altogether to carbon scaffold 16-300H via capillary infusion into open porous scaffold 16-302A, as may be the crystallographic arrangement of Li ions and/or particles in, around, or within agglomerations of graphene sheets 16-101B.

Electrochemical Cell Electrode (Anode or Cathode) Created from Carbon Scaffold

Carbon scaffold 16-300H can be functionally integrated in a variety of battery or supercapacitor applications, battery types including Li-ion batteries and Li S batteries, as well as Li air cathodes, upon suitable development. Such an example battery system may include an electrochemical cell configured to supply electric power to a system. The electrochemical cell may have an anode containing an anode active material, a cathode containing a cathode active material, a porous separator disposed between the anode and the cathode, and an electrolyte in ionic contact with the anode active material and the cathode active material.

The anode and cathode may include sacrificial substrate 16-306B (that is electrically conductive), with a first layer deposited there-upon as a first contiguous film having a first concentration of mesoporous carbon-based particles 16-300A and/or 302H, each mesoporous carbon-based particle 16-300A and/or 302H contacting another and being composed of electrically conductive interconnected 3D aggregates of graphene sheets 16-101B. Aggregates of graphene sheets 16-101B are sintered together to form open porous scaffold 16-302A (shown in FIG. 16-3A) that facilitates electrical conduction along and across contact points of the graphene sheets 16-101B. Open porous scaffold 16-302A has a 3D hierarchical structure with mesoscale structuring in combination with micron-scale fractal structuring, any one or more further featuring minute carbon-based particles 16-304H interspersed in and/or between adjacent carbon-based particles 16-300A and/or 302H.

A porous arrangement is formed in open porous scaffold 16-302A. The porous arrangement is conducive to receive electrolyte dispersed therein for ion (such as Li ion) transport through interconnected hierarchical pores 16-303A and/or 16-307F that define one or more channels including:

- microporous frameworks defined by a dimension 16-101F of >50 nm that provide tunable Li-ion conduits;
- mesoporous channels defined by a dimension 16-101F of about 20 nm to about 50 nm (generally defined under IUPAC nomenclature and referred to as "mesopores" or "mesoporous") that act as Li ion-highways for rapid Li-ion transport therein; and
- microporous textures defined by a dimension 16-103F of <4 nm for charge accommodation and/or active material confinement.

The first layer including a first electrical conductivity ranging from 500 S/m to 20,000 S/m. A second layer is deposited on the first layer. The second layer has a second contiguous film with a second concentration of mesoporous carbon-based particles 16-300A in contact with each other to yield a second electrical conductivity ranging from 0 S/m to 500 S/m (lower than the first electrical conductivity).

Carbon scaffold 16-300H may be pre-lithiated and later infused with Li-ion liquid solution via capillary action to create lithiated carbon scaffold 16-400A (to be further explained herein) as shown in FIG. 16-4A. Interim layers 16-406A, 16-408A, 16-410A, and 16-412A (having defined thicknesses in the vertical direction extending from the current collector, which may be a sacrificial and/or electrically conductive substrate, toward electrolyte layer 16-414A) may be synthesized in-flight in a microwave reactor, or deposited layer-by-layer in or out of a thermal reactor. Interim layers 16-406A, 16-408A, 16-410A, and 16-412A have varying electrical conductivity ranging from high (such as at interim layer 16-406A) to low (such as at layer 16-412A) in a direction orthogonal and away from the current collector, which may also be a sacrificial and/or electrically conductive substrate. Varying electrical conductivity may be at least partially proportionate to interfacial surface tension of a Li-ion solution infiltrated into the porous arrangement of the open porous scaffold, where infiltration of the Li-ion solution is done via capillary infusion engineered to promote wetting (to be further explained herein) of surfaces of open porous scaffold 16-302A exposed to Li-ion solution, as well as the prevalence (concentration) of conductive carbon particles 16-404A interspersed within mesoporous carbon-based particles 16-402A (that are equivalent or similar to mesoporous carbon-based particles 16-300A, 16-300E and/or the like).

Li-ion diffusion pathways 16-309F (as shown in FIG. 16-1F) ensure that deposition and stripping operations associated with one or more oxidation-reduction ("redox") reactions occurring within mesoporous carbon-based particles 16-300A and/or 16-302H are uniform. Also, anode active material and/or cathode active material resides in pores of the anode and the cathode, respectively, and may contain single-layer graphene (SLG) and/or few-layer graphene (FLG) including from 1 to 10 graphene planes, respectively, the graphene planes being positioned in a substantially aligned orientation along a vertical axis. Anode active material or cathode active material may have a specific surface area from approximately 500 $m^2/g$ to 2,675 $m^2/g$ when measured in a dried state, and may contain a graphene material comprising any one or more of pre-lithiated graphene sheets, pristine graphene, graphene oxide, reduced graphene oxide, graphene fluoride, graphene chloride, graphene bromide, graphene iodide, hydrogenated graphene, nitrogenated graphene, boron-doped graphene, nitrogen doped graphene, chemically functionalized graphene, physically or chemically activated or etched versions thereof, conductive polymer coated or grafted versions thereof, and/or combinations thereof.

In any one or more of the discussed examples in relation to lithiated carbon scaffold 16-400A, electrically conductive interconnected agglomerations of graphene sheets 16-101B are sintered together to form open porous scaffold independent of a binder, however alternative examples do exist where a binder is used. Configurations with or without a binder may each involve open porous scaffold 16-302A acting or serving as an active lithium intercalating structure with a specific capacity of approximately 744-1,116 mAh/g, or more. Also, examples include the preparation of electrically conductive interconnected agglomerations of graphene sheets 16-101B using chemically functionalized graphene, involving the surface functionalization thereof, comprising imparting to open porous scaffold 16-302A a functional group selected from quinone, hydroquinone, quaternized aromatic amines, mercaptan, disulfide, sulfonate (—$SO_3$), transition metal oxide, transition metal sulfide, other like compounds or a combination thereof.

The current collector shown in FIG. 16-4A, is, for example, at least partially foam-based or foam-derived and is can be selected from any one or more of metal foam, metal web, metal screen, perforated metal, sheet-based 3D structure, metal fiber mat, metal nanowire mat, conductive polymer nanofiber mat, conductive polymer foam, conductive polymer-coated fiber foam, carbon foam, graphite foam, carbon aerogel, carbon xerogel, graphene foam, graphene oxide foam, reduced graphene oxide foam, carbon fiber foam, graphite fiber foam, exfoliated graphite foam, and combinations thereof.

Anode or cathode electrically conductive or insulative material, referred to herein as "active material" can include any one or more of nanodiscs, nanoplatelets, nano-fullerenes, carbon nano-onions (CNOs), nano-coating, or nanosheets of an inorganic material selected from: (i) bismuth selenide or bismuth telluride, (ii) transition metal dichalcogenide or trichalcogenide, (iii) sulfide, selenide, or telluride of a transition metal; (iv) boron nitride, or (v) a combination thereof. The nanodiscs, nanoplatelets, nano-coating, or nano sheets can have a thickness less than 100 nm. In similar or dissimilar examples, the nanoplatelets can have a thickness less than 10 nm and/or a length, width, or diameter less than 5 μm.

Processes for Producing an Electrochemical Cell Electrode (Anode or Cathode) Created from Carbon Scaffold—Generally Example processes for producing a three-dimensional (3D) mesoporous electrode, such as that created from lithiated carbon scaffold 16-400A, can include depositing (such as from one or more plasma-based thermal reactors or torches, in which thermal energy is propagated through a plasma and/or feedstock material supplied in a gaseous state) mesoporous carbon-based particles 16-300A or 16-400A to form a first contiguous film layer (such as layer 16-406A shown in FIG. 16-4A) on a substrate, where the first contiguous film layer is characterized by a first electrical conductivity. Each of the mesoporous carbon-based particles comprises electrically conductive three-dimensional (3D) aggregates or agglomerations of graphene sheets 16-101B. The aggregates are sintered together to form open porous scaffold 16-302A that facilitates electrical conduction along and across contact points of the graphene sheets. A porous arrangement formed in open porous scaffold 16-302A, where the porous arrangement is conducive to receive electrolyte dispersed therein for Li-ion transport through interconnected pores (such as hierarchical pores 16-303A and/or 16-307F) that define one or more Li-ion diffusion pathways 16-309F. The first contiguous film layer has an average thickness no greater than approximately 100-200 μm. In an example, a binder material is combined with graphene sheets 16-101B to retain graphene sheets 16-101B in a desired position to impart structure to open porous scaffold 16-302A. The binder may be or comprise a thermosetting resin or a polymerizable monomer, wherein curing the resin or polymerizing the polymerizable monomer forms a solid resin or polymer with assistance of heat, radiation, an initiator, a catalyst, or a combination thereof. The binder may be initially a polymer, coal tar pitch, petroleum pitch, mesa-phase pitch, or organic precursor material and is later thermally converted into a carbon material.

Additional quantities of mesoporous carbon-based particles 16-303A and/or 16-400A are deposited on the first contiguous film layer to form a second contiguous film layer there-upon, the second contiguous film layer having a second electrical conductivity lower than the first electrical conductivity, and being positioned closer to electrolyte 16-414A and away from the current collector (which may be a sacrificial substrate).

Li-ion solution can be infiltrated into (such as by capillary infusion action) open porous scaffold 16-302A react with exposed carbon on surfaces thereof to facilitate Li-ion dissociation and electric current supply, where the exposed carbon on the open porous scaffold including a surface area greater than approximately 100 $m^2$/gm.

Processes for Producing an Electrochemical Cell Electrode (Anode or Cathode) Created from the Carbon Scaffold—In Detail Mesoporous carbon-based particles 16-300A and/or lithiated carbon scaffold 16-400A can be synthesized "in-flight" in a microwave reactor, or deposited in a bottom-up manner, referring to a layer-by-layer deposition or "growth" within a thermal reactor, and may then be cast, via a liquid slurry to be subsequently dried to form a carbon-based electrode that may be suitable for implementation or incorporation within a Li-ion battery. Such a slurry may, in some examples, comprise chemical binders and conducting graphite, along with the electrochemically active innate carbon.

The term "hierarchical", as generally understood in an engineering context and as used herein, refers to an arrangement of items in which the items are represented as being above, below, or at the same level as one another. Here, mesoporous carbon-based particle 16-300A and/or lithiated carbon scaffold 16-400A may be grown by layer-by-layer deposition in a thermal reactor to create one or more "grades" (as indicated by layers 16-406A to 16-412A of mesoporous conductive particles 16-300A, 16-302H and/or 16-402A), referring to that created by specific control of electrical (referring to contact points of electrically conductive interconnected agglomerations of graphene sheets 16-101B) and ionic (referring to Li-ion diffusion pathways 16-309F) conducting gradients throughout the thickness of lithiated carbon scaffold 16-400A. Tuning of each individually deposited layer 16-406A through 16-412A results in relatively higher electrical conductivity at the current collector interface, and progressive lower electrical conductivity moving outwardly therefrom.

Electrically conductive interconnected agglomerations of graphene sheets 16-101B within mesoporous carbon-based particle 16-300A serve as both electrical conductors, by conducting electric current through contact points and/or regions, and as "active" Li intercalating structures, and therefore may be configured to provide a source for the specific capacity of the anode electrode at 744-1,116 mAh/g, i.e., 2-3 times that otherwise available from conventional graphite anodes at 372 mAh/g. As a result, interconnected 3D bundles of graphene sheets 16-102 within mesoporous carbon-based particle 16-100 may be considered as 'nanoscale' electrodes that concurrently enable a relatively high-volume fraction of electrolytically active material along with efficient, 3D interpenetrating, ion and electron pathways.

This unique 3D structure of mesoporous carbon-based particle 16-100 enables both storage of electric charge at its exposed surfaces (via capacitive charge storage) for desirable high-power delivery, relative to conventional applications, and also provides faradaic redox ions within the bulk thereof for desirable high electric energy storage. "Redox", as generally understood and as referred to herein, refers to "reduction-oxidation" reactions in which the oxidation states of atoms are changed involving the transfer of electrons between chemical species, most often with one species undergoing oxidation while another species undergoes reduction.

"Faradaic", as generally understood and as referred to herein, refers to a heterogeneous charge-transfer reaction occurring at the surface of an electrode, prepared with and/or otherwise incorporating mesoporous carbon-based particle 16-300A. For instance, pseudocapacitors store electrical energy faradaically by electron charge transfer between electrode and electrolyte. This is accomplished through electrosorption, reduction-oxidation reactions (redox reactions), and intercalation processes, termed pseudocapacitance.

Roll-to-Roll Processing for Producing an Electrochemical Cell Electrode (Anode or Cathode) Created from the Carbon Scaffold Regarding manufacturing, lithiated carbon scaffold 16-400A can be manufactured (to fabricate and/or build electrochemical cell electrodes, such as cathodes and/or anodes) in large-scale quantities by sequential, layer-by-layer (such as layers 16-406A through 16-412A shown in FIG. 16-4A) deposition of concentrations of mesoporous carbon-based particle 16-300A and/or 16-300E onto a moving substrate (such as a current collector) through a roll-to-roll ("R2R") production approach. By consolidating 3D carbon scaffold structures directly out microwave reactors (analogous to exiting plasma spray processes), electrode films can be continuously produced without the need for toxic solvents and binders that are otherwise used in slurry cast processes for battery electrodes. Therefore, battery electrodes employing lithiated carbon scaffold 16-400A may be more readily produced with controlled electrical, ionic, and chemical concentration gradients due to the "layer-by-layer", sequential particle deposition capabilities of a plasma-spray type processes; and, specific elements (such as dopants) can also be introduced at different stages within the plasma deposition process.

Also, due to the pores 16-303A and/or 16-307F interspersed throughout mesoporous carbon-based particle 16-100, lithiated carbon scaffold 16-400A may be manufactured in a manner such that it is gravimetrically, referring to a set of methods used in analytical chemistry for the quantitative determination of an analyte based on its mass, superior to known devices. That is, mesoporous carbon-based particle 16-300A, with pores and/or voids defined throughout 3D bundles of graphene sheets 16-102 and/or conductive carbon particles 16-104, may be lighter than comparable battery electrodes without a mesoporous structure including various pores and/or voids, etc.

Mesoporous carbon-based particle 16-100 may feature a ratio of active material to inactive material that is superior relative to conventional technologies, in that greater quantities of active material are available and prepared for electricity conduction there-through relative to inactive and/or structural reinforcement material. Such structural reinforcement material, although involved in defining a general structure of mesoporous carbon-based particle 16-300A, may not be involved or as involved in electrically conductive interconnected agglomerations of graphene sheets 16-101B. Accordingly, due to its high active material to inactive material ratio, mesoporous carbon-based particle 16-300A may demonstrate superior electrical conductivity properties relative to conventional batteries, as well as being significantly lighter than such conventional batteries given that carbon may be used to replace traditionally used heavier metals. Therefore, mesoporous carbon-based particle 16-300A may be particular well-suited for demanding end-use application areas that also may benefit from its relatively light weight, automobiles, light trucks, etc.

Mesoporous carbon-based particle 16-300A may be created to rely electrically conductive interconnected agglomerations of graphene sheets 16-101B to obtain a percolation threshold, referring to a mathematical concept in percolation theory that describes the formation of long-range connectivity in random systems. Below the threshold a giant connected component does not exist, while above it, there exists a giant component of the order of system size. Accordingly, 3D bundles of graphene electrically conductive interconnected agglomerations of graphene sheets 16-101B may conduct electricity from the current collector, as shown in FIG. 16-4A, toward electrolyte 16-414A.

Roll-to-Roll ("R2R") Plasma Spray Torch Deposition System

As a variation from the existing atmospheric MW plasma reactor with particle-based output, integrated, contiguous 3D hierarchical carbon scaffold films (composed of multiple mesoporous carbon-based particles 16-300A and/or the like agglomerated together and/or contacting to form contiguous layers, films, and/or sheets) can be constructed utilizing a spray torch configuration, such as that shown by roll-to-roll ("R2R") system 16-400B. Plasma torches (generally) permit for materials to be initially formulated, similar to waveguided reactor, then accelerated into an impact zone on a substrate surface (moving or stationary) wherein each zone can provide for unique control of dissimilar (mixed phase or composite) material synthesis, formulation (consolidation), and integration (densification).

The plasma torch in combination with a continuous, moving substrate enable a unique additive type process control (i.e., both within the hot plasma and beyond the plasma afterglow region up to the impact zone of the substrate) of properties, such as defect density, residual stress, through thickness chemical and thermal gradients, phase transformations, and anisotropy. For the case of battery electrode fabrication, not only can the atmospheric MW plasma torch create formulated and integrated continuous 3D hierarchical mesoporous graphene films without the need for toxic solvents such as NMP and or use of binders and conductive carbons (at the very least reduction) in accordance with the slurry casting process, but the plasma torch can be used to create integrated electrode/current collector film structures for enhanced performance at a reduced cost.

FIG. 16-4B shows in detail roll-to-roll ("R2R") system 16-400B employing an example arrangement of a group 16-444B of plasma spray torches 16-422B through 16-428B (such as 16-422B, 16-424B, 16-426B, and/or 16-428B) configured to perform layer-by-layer deposition to fabricate, otherwise referred to as "growing", carbon-based scaffold 16-300H, shown in FIG. 16-3B, and/or variants thereof, incrementally. Group 16-444B of plasma spray torches 16-414B through 16-420B are oriented in a continuous sequence above the R2R processing apparatus 16-440B, which, may include wheels and/or rollers 16-434B and 16-439B configured to rotate in the same direction, 16-430B and 16-432B, respectively, to result in translated forward motion 16-436B of sacrificial layer 16-402B upon which layers 16-442B of carbon scaffold 16-436B may be deposited in a layer-by-layer manner to achieve a "graded" electrical conduction gradient proportionate to the concentration level of mesoporous carbon-based particles 16-300A contained per unit volume area in each progressive deposited layer (such as interim layers 16-406A-16-412A).

Such deposition may involve the positioning of Group 16-444B of plasma spray torches 16-414B through 16-420B as shown in FIG. 16-4B, with an initial, in direction of forward motion 16-436B, spray torch 16-414B extending the furthest in a downward direction, toward sacrificial layer 16-404B from feedstock supply line 16-412B, positioned to spray 16-422B carbon-based material to deposit initial layer 16-404B (also may be shown as interim layer 16-406A in FIG. 16-4A, and so on and so forth) of carbon scaffold 16-300H on sacrificial layer 16-402B. Initial layer 16-404B may be deposited to achieve the highest conductivity values, with each of the subsequent layers 16-406B through 16-410B featuring a proportionately less-dense dispersion of mesoporous carbon-based particle 16-300A composing carbon-based scaffold 16-300H to achieve a 'graded' electric gradient for layers 16-442B.

That is, plasma spray torches 16-414B through 16-420B may be oriented to have incrementally decreasing (or otherwise varying) heights as shown in FIG. 16-4B, such that each spray torch from Group 16-444B may be tuned to spray, from spray 16-422B to 16-428B, respectively, sprays of carbon-based feedstock material supplied by feedstock supply line 16-412B. Accordingly, battery electrodes can be more readily produced with controlled electrical, ionic, and chemical concentration gradients due to the "layer-by-layer", sequential deposition described herein with connection to plasma spray-torch system 16-400B, which presents desirable features of plasma spray type processes; and, specific elements or additional ingredients can also be introduced at different stages within the plasma-based spray deposition process described by plasma spray-torch system 16-400B. Such control may, extend to tunability of plasma spray-torch system 16-400B to achieve target electric field and/or electromagnetic field properties of any one or more of layers 16-442B.

Group 16-444B of plasma spray torches 16-414B through 16-420B may employ plasma-based thermally enhanced carbon spraying techniques to provide carbon coating processes in which melted (or heated) materials are sprayed onto a surface. The "feedstock" (coating precursor) is heated by electrical (plasma or arc) or chemical means (combustion flame).

Thermal spraying by plasma spray torches 16-414B through 16-420B can provide thick coatings (approx. thickness range is 20 μm or more to several mm, depending on the process and feedstock), over a large area at high deposition rate as compared to other coating processes such as electroplating, physical and chemical vapor deposition. Coating materials available for thermal spraying include metals, alloys, ceramics, plastics and composites. They are fed in powder or wire form, heated to a molten or semi-molten state and accelerated towards substrates in the form of μm-sized particles. Combustion or electrical arc discharge is usually used as the source of energy for thermal spraying. Resulting coatings are made by the accumulation of numerous sprayed particles. The surface may not heat up significantly, allowing the coating of flammable substances.

Coating quality is usually assessed by measuring its porosity, oxide content, macro and micro-hardness, bond strength and surface roughness. Generally, the coating quality increases with increasing particle velocities.

Carbon Scaffold Implemented in a Li S Secondary Battery

Group 16-444B of plasma spray torches 16-414B through 16-420B may be configured or tuned to spray carbon-based material in a controlled manner to achieve specific desired hierarchical and organized structures, such as open porous scaffold 16-302A of mesoporous carbon-based particle 16-300A and/or 16-300E with hierarchical pores 16-307F suitable to be used for Li-ion infiltration via capillary action therein dependent on percentage porosity of mesoporous carbon-based particle 16-300A and/or 16-300E. Total quantities of S able to be infused into hierarchical pores 16-307F and/or deposited on exposed surface regions of mesoporous carbon-based particle 16-300A and/or 16-300E (and other such similar structures) may depend on the percentage porosity thereof as well, where 3D fractal-shaped structures providing larger pores, such as pores 16-305F, each having dimension 16-103F can efficiently accommodate and micro-confine S for desired time-frames during electrochemical cell operation. Examples exist permitting for the combination of S to prevent any resultant polysulfides (PS) migrating out of pores 16-305F purely by designing and growing structural S, with confinement of S being targeted at a defined percentage, such as: 0-5%, 0-10%, 0-30%, 0-40%, 0-50%, 0-60%, 0-70%, 0-80%, 0-90%, and/or 0-100%, any one or more of such ranges successfully showing of retardation of polysulfide migration out of the electrode structure.

Carbon Scaffold Implemented in a Li Air Secondary Battery

Existent Li air cathodes may last only 3-10 cycles, and thus have not yet been universally understood to provide very promising or reliable technologies. In such cathodes, air itself acts as the cathode, therefore the reliable and robust supply of air flowing through the cathode, such as through pores, orifices, or other openings, effectively currently precludes realistic applications in consumer grade portable electronic devices such as smartphones.

Devices can be made with some sort of air pump mechanism, but air purification remains an issue, given that any amount of impurity prevalent in the air can and will react with available Li in parasitic side-reactions ultimately degrading specific capacity of the overall electrochemical cell. Moreover, air only provides only about 20.9% $O_2$, and thus is not as efficient as other alternative current advanced battery technologies.

Nevertheless, even in view of the above-mentioned challenges, examples provided above relating to mesoporous carbon-based particle 16-300A, 16-300E and/or any variants thereof implemented in carbon scaffold 16-300H and/or lithiated carbon scaffold 16-400A can be configured to function in a 3D-printed battery. Notably, measures can be taken to guard against, such as by tuning to achieve desirable structural reinforcement in certain targeted areas of open porous scaffold 16-302A, to prevent against unwanted and/or sudden collapse of porous structures, such as to create ‘clogging’ of passageways defined therein. In example, carbon scaffold 16-300H can be decorated with a myriad of metal oxides to achieve such reinforcement, which may also control or otherwise positive contribute to mechanical tunnelling of the structure itself once lithium reacts with air to spontaneously form a solid from that state, etc. Traditional circumstances (such as absent special preparations undertaken regarding implementation of the disclosed mesoporous carbon-based particle 16-300A and/or the like with Li air cathodes) can otherwise involve Li ions reacting with carbon provided in a gaseous state, such that the Li-ion and the carbon-containing gas react to form a solid that expands. And, depending on where this expansion occurs, can mechanically degrade the overall carbon-based mesoporous scaffold structure, such as of carbon scaffold 16-300H.

Pre-Lithiation of 3D Mesoporous Carbon-Based Particle as a “Host”

To enable alternative non-lithium or lithiated carbon-based scaffolded cathodes, such as those confining sulfur, oxygen, and vanadium oxide, over current lithium oxide compound cathodes, as well as to accommodate first charge lithium loss (resulting reduced coulombic efficiency) in current lithium-ion cells, a scalable pre-lithiation method for carbon-based structured intended for implementation in electrochemical cell electrodes may be required. As a result, various experimental attempts have been conducted with mesoporous carbon-based particle 16-300A, 16-300E and/or any derivative structures based therefrom, including carbon scaffold 16-300H such as ball milling, post thermal annealing, and electrochemical reduction from an additional electrode. Such efforts have been used to “pre-lithiate”, referring to chemically preparing a carbon-based structure to physically and/or chemically react with and/or confine lithium, but have met with uniformity, lithium reactivity, costs, and scalability challenges.

Nevertheless, by fine-tuning reactor process parameters, 3D mesoporous carbon-based particle 16-300A, 16-300E, and/or carbon scaffold 16-300H may be synthesized and/or fabricated by layer-by-layer deposition process, as substantially discussed earlier, to serve as a carbon-based ‘host’ structure with engineered surface chemistry (such as including nitrogen and oxygen doping) to facilitate rapid decomposition (involving disproportionation of oxides).

Upon thermal (referred to herein as “spark”) activation, Li metal can be spontaneously (such as without a pressure gradient) and non-reactively infiltrated (driven by capillary forces) to create a controlled, pre-lithiated carbon structure (or particle building blocks). Subsequently, such “pre-lithiated” particle building blocks can be synthesized into an integrated composite film with graded electrical conductivity from:

- a high conductivity at a back plane in contact with the current collector (such as shown by interim layer 16-406A, to
- an insulated ion conducting layer at the electrolyte/electrode plane.

Surface chemistry, as may be related to non-reactive infiltration of Li metal can be tuned by optimizing oxide thermal reduction degree (exotherm) by using thermogravimetric analysis (TGA) or differential scanning calorimetry DSC analytical techniques.

To address scalability concerns as may be related to transitioning from a low-volume laboratory testing and sample production environment, to a high-volume large-scale plant capable of fulfilling multiple customer orders simultaneously, the above described “pre-lithiation” process is readily adaptable to a continuous roll-to-roll (R2R) format, analogous to other liquid melt wetting processes such as brazing.

Thin film lithium clad foil (tantalum or copper), can be loaded onto a heated calendaring roll, to be brought into contact with 3D mesoporous carbon-based particle 16-300A and/or the like pre-form (or carbon film, in the case of the spray torch process) in a controlled thermal, dry environment. Thermal residence (soak) time, gradient, and applied pressure can adjusted and controlled to facilitate both: (1) “spark” activation; and, (2) infiltration process steps.

“Spark” Lithiation of the Carbon Scaffold

Historically, prior to the development of Li metal infusion methods into carbon-based structures and/or agglomerate particles, efforts were undertaken to assess the following two scenarios:

- growing microwave graphene sheets that have extended de-spacing that would allow intercalation to occur in-between individual graphene sheets at a much more efficient or a faster rate than what would occur in typical, commercially-available, graphene sheets; and, growing FLG in such a way to successfully and repeatably achieve such higher de-spacing; and
- using a wet liquid Li metal front that propagates into hierarchical pores 16-303A and/or 16-307F defined by open porous scaffold 16-302A of 3D mesoporous carbon-based particle 16-300A and/or 16-300E. Attraction from Li metal to exposed carbon-based surfaces wet the same in an efficient way relative to otherwise performing functionalization on exposed carbon-based surfaces.

Presently disclosed examples relating to thermal reactors further provide for capabilities for post processing to create highly organized and structured carbons that have that particular functioning relating to the infiltration of metal and/or other species, such as infiltration of aluminum into a silicon carbide-sintered material, and hammering the surface of the particles to promote infiltration of a molten (Li) metal front without additional pressure from outside sources. Such efforts permit for continuous wetting instead of using pressure to push metal into open porous scaffold 16-302A of 3D mesoporous carbon-based particle 16-300A and/or 16-300E.

FIG. 16-4A shows a schematic representation of agglomerations or aggregations of 3D mesoporous carbon-based particles 16-402A, akin to 3D mesoporous carbon-based particles 16-300A and/or 16-300E, synthesized or deposited at varying concentration levels in layers 16-406A to 16-412A, from most concentrated to least concentrated. All layers 16-406A through 16-412A, subsequent to creation, can be infiltrated, via non-reactive capillary infusion methods, with Li metal and/or Li-ion solution in liquid state or phase for intercalation of Li ions in-between individual graphene sheets of electrically conductive interconnected agglomerations of graphene sheets 16-101B of 3D mesoporous carbon-based particle 16-300A, which may be created with a spacing of 1 to 3 Å to accommodate more Li ions between alternating graphene sheets when compared to conventional commercially available graphene sheet stacks.

Voids (referring to vacant regions or spaces) between adjacent and/or contacting mesoporous carbon-based particles 16-300A and/or 16-300E composing any one or more of layers 16-406A-16-412A of lithiated carbon scaffold 16-400A may be encased or at least partially covered by, at a section of lithiated carbon scaffold 16-400A positioned away from the current collector and facing the electrolyte, a passivation layer. Such a passivation layer refers a material becoming "passive," that is, less affected or corroded by the environment of future use. In addition, or in the alternative, an ion conduction (insulating) or graded interphase layer can be deposited on layer 16-412A facing electrolyte 16-414A to minimize side reactions with free and/or unattached (physically and/or chemically) Li in ionic form. Prior to the deposition or placement of any such encasing layer, lithium, in the form of Li ions, may be flowed in liquid state into hierarchical pores 16-303A and/or 16-307F of open porous scaffold 16-302A of any one or more of mesoporous carbon-based particles 16-300A and/or 16-300E composing layers to form electrochemical gradients proportionate to the level of concentration of mesoporous carbon-based particles 16-300A and/or 16-300E composing each layer of layers 16-406A-16-412A, layer 16-406A having the highest concentration of mesoporous carbon-based particles 16-300A and/or 16-300E permitting for relatively high levels of electric current conduction between electrically conductive interconnected agglomerations of graphene sheets 16-101B. Layers 16-408A-16-412A (and additional such layers, if necessary or desirable) each have progressively lower (sparser) concentration levels of mesoporous carbon-based particles 16-300A and/or 16-300E, thus correspondingly having proportionately lower levels of electric conductance capabilities.

Repeated (cyclical) Li-ion electrode usage in secondary batteries can result in problems due to metal formation, such as volume expansion during re-depositing in electroplating operations (referring to a process that uses an electric current to reduce dissolved metal cations so that they form a thin coherent metal coating on an electrode). The term can also be used for electrical oxidation of anions on to a solid substrate, as in the formation of silver chloride on silver wire to make silver/silver-chloride electrodes. Electroplating is often used to change the surface properties of an object (such as abrasion and wear resistance, corrosion protection, lubricity, aesthetic qualities), but may also be used to build up thickness on undersized parts or to form objects by electroforming.

Processes used in electroplating with relation to infiltration of Li-ion solution into lithiated carbon scaffold 16-400A may be referred to as electrodeposition (also known as electrophoretic deposition (EPD)) and is analogous to a concentration cell acting in reverse. Electrophoretic deposition (EPD), is a term for a broad range of industrial processes which includes electrocoating, cathodic electrodeposition, anodic electrodeposition, and electrophoretic coating, or electrophoretic painting. A characteristic feature of this process is that colloidal particles suspended in a liquid medium migrate under the influence of an electric field (electrophoresis) and are deposited onto an electrode. All colloidal particles that can be used to form stable suspensions and that can carry a charge can be used in electrophoretic deposition. This includes materials such as polymers, pigments, dyes, ceramics and metals.

Electroplating, as described above, with Li ions may result in a volume expansion on the order of approximately 400% or more of lithiated carbon scaffold 16-400A. Such an expansion is undesirable from a stability standpoint micro-mechanically and causes degradation with many "dead zones", referring to inactive or non-chemically and/or electrically activated regions, therefore ultimately preventing the derivation of longer lifespans out of so-equipped Li-ion batteries. In any case, it is desirable to have a majority of the Li-ion material plate, meaning reduce onto a smooth and uniform surface to therefore facilitate uniform deposition of Li ions. Removal will also be smooth in a smooth planar interface.

Layers 16-406A-16-412A, experimentally, have been found (in an example) to have interfacial surface tension, $\gamma_{si}$, engineered to promote wetting of exposed carbon-based surfaces with Li ion. In an example, layer 16-406A may be defined as having low-ion transport, high electrical conductivity, low electrical resistance (<1,000Ω; whereas, layer 16-412 (facing electrolyte 16-414A) may be defined as having high-ion transport, low electrical conductivity, and high electrical resistance (>1,000-10,000Ω.

In practice, Li, (when infiltrated into lithiated carbon scaffold 16-400A) may tend to form unwanted dendrites, defined as crystals that develop with a typical multi-branching tree-like form. Dendritic crystal growth may be, in certain circumstances, illustrated (in example) by snowflake formation and frost patterns on a window. Dendritic crystallization forms a natural fractal pattern. Functionally, dendritic crystals can grow into a supercooled pure liquid or form from growth instabilities that occur when the growth rate is limited by the rate of diffusion of solute atoms to the interface. In the latter case, there must be a concentration gradient from the supersaturated value in the solution to the concentration in equilibrium with the crystal at the surface. Any protuberance that develops is accompanied by a steeper concentration gradient at its tip. This increases the diffusion rate to the tip. In opposition to this is the action of the surface tension tending to flatten the protuberance and setting up a flux of solute atoms from the protuberance out to the sides. However, overall, the protuberance becomes amplified. This process occurs again and again until a dendrite is produced.

Such Li-ion dendrites (also in the form of acicular Li-ion dendrites, "acicular" describing a crystal habit composed of slender, needle-like crystal deposits) grow away from surfaces upon which Li ions are infiltrated (such as upon and/or in-between individual graphene sheets 16-101B). In some circumstances, with enough battery charge-discharge cycling, a dendritic protrusion or protuberance will grow across all the way through the cathode and "short" it out, describing when there is a low resistance connection between two conductors that are supplying electrical power to a circuit. This may generate an excess of voltage streaming and cause excessive flow of current in the power source. The electricity will flow through a "short" route and cause a "short" circuit.

Employing any one or more of the advanced capillary Li-ion infusion techniques (to be described in further detail herein) into lithiated carbon scaffold 16-400A addresses many of the described shortcomings, inclusive of traditional Li-ion battery cathode specific capacity. An issue encountered in Li-ion batteries is that the cathode provides only a limited quantity of specific capacity or energy capability; moreover, on the anode side, decreases have also been observed in specific capacity and energy density as well. Thus, even in view of how relatively desirable (in terms of electric energy storage capacity and current delivery) a Li-ion battery may be compared to Li metal hydride or lead-acid, or Ni Cad batteries (providing energy storage density figures a factor of 2-3 greater than any one of those traditional battery chemistries), even greater advancements in electric power storage and delivery are possible, regarding the protection against or prevention of unwanted Li-based dendritic formations, upon the incorporation of carbon-based materials, such as that disclosed by the present examples, and approaches theoretic capacities (not attained in practice), of pure Li metal, which has a specific capacity of around 3,800 mAh/g.

Other approaches have been undertaken including the development of solid-state batteries, describing no liquid phases at all. However, attention has returned to Li metal, due to oxide electrolyte being used to achieve and stabilize contact with Li. And, alternatives to Li metal have also been explored including Si, Sn and various other alloys. However, even upon elimination of Li metal, a Li-ion source may still be required (as originated from an opposing side of the battery device.)

Alternative-to-lithium materials in a Li-ion battery electrode structure may yield the following energy density values: oxides provide 260 mAh/g; and, sulfur provides 650 mAh/g. Due to its relatively high energy density capabilities, it is desirable in battery electrode applications to confine sulfur (S), so it is not solubilized or dissolved into surrounding electrolyte. To that effect, sulfur micro-confinement is needed (as described earlier in relation to pores 16-305F of open porous scaffold 16-302A), describing that a "confined" (or "micro-confined") liquid is a liquid that is subject to geometric constraints on a nanoscopic scale so that most molecules are close enough to an interface to sense some difference from standard bulk conditions. Typical examples are liquids in porous media or liquids in solvation shells.

Confinement (and/or micro-confinement, referring to confinement within microscopic-sized regions) regularly prevents crystallization, which enables liquids to be super-cooled below their homogenous nucleation temperature (even if this is impossible in the bulk state). This holds in particular for water, which is by far the most studied confined liquid.

Thus, in view of the various challenges presented above, and others not discussed here, various improvements to traditional graphite-based anodes may be achieved by instead employing few layer graphene (FLG) materials and/or structures, defined as having less than 15 layers of graphene grown, deposited or otherwise organized in a stacked architecture with Li ions intercalated there-between at defined interval and/or concentration levels. Any one or more of mesoporous carbon-based particle 16-300A, 16-300E and/or the like may be so prepared.

Doing so (going from graphite to FLG) may improve specific capacity from approximately 380 to over a 1,000 mAh/g for Li-intercalated carbon-based structures. Disclosed materials can replace graphite with FLG to permit for a higher active surface area and can increase spacing in-between individual graphene layers for infiltration of up to 2-3 Li ions, as opposed to just 1 Li-ion as commonly may be found elsewhere.

In graphene, hexagonal carbon structures in each graphene sheet may stay positioned on top of each other—this is referred to as an "A-A" packing sequence instead of an "A-B" packing sequence. Particularly, configurations are envisioned for graphene sheets and/or FLG where individual layers of graphene may be stacked directly on top of each other, to obtain incommensurate, disproportionate and/or otherwise irregular, stacking, which in turn permits for the intercalation of addition Li ions in-between each graphene layer of FLG structures.

Under traditional conditions and circumstances, the insertion of Li ions from, the top-down or bottom-up in layered graphene structures may prove exceedingly difficult in practice. Comparably, Li ions more easily insert in-between individual graphene layers (separated by a definable distance). Thus, the key is to manage and tune exactly how much edge area is available. In that regard, any of the carbon-based structured disclosed herein are so tunable. And, carbon in graphene is also conductive-therefore, this feature provides for dual-roles by: (1) providing structural definition to FLG scaffold electrode structures (such as carbon scaffold 16-300H and/or lithiated carbon scaffold 16-400A); (2) and, conductive pathways therein.

Production techniques employed to fabricate any one or more of the carbon-based structures disclosed herein may indicate a desirability of adjustment of individual graphene-layer edge lengths relative to planar surfaces thereof; also, the adjustment of the spacing in between individual graphene stacks may be possible. Graphene, given its two-dimensional structure, necessarily provides significantly more surface area in which Li ions can be inserted. Thus, applying graphene sheets in accordance with various aspects of the subject matter disclosed herein may provide a natural evolution in the direction of enhanced energy storage density.

Individual graphene sheets are held in position as a part of the plasma growth process. Carbon based "gumball-like" structures are self-assembled in-flight (as described earlier) from FLG and/or combinations of to form particles (such as mesoporous carbon-based particle 16-300A and/or the like) somewhat but with a defined long-range order defined generally and herein as where solid is crystalline if it has long-range order-once the positions of an atom and its neighbors are known at one point, the place of each atom is known precisely throughout the crystal, to it-smaller structures agglomerate to form essentially what resembles a gumball.

Size dimensions of such "gumball-like" structures (describing individual mesoporous carbon-based particles 16-300A and/or the like) may be on the order of 100 nm across (at its widest point). Larger agglomerated particles made up from multiple "gumball-like" structures may be an order of magnitude larger, about 20-30 microns in diameter. These "gumball-like" structures (individual mesoporous carbon-based particles 16-300A and/or the like) may comprise of multiple FLG structures (electrically conductive interconnected agglomerations of graphene sheets 16-101B) with Li ions interspersed there-within, at a level of 2-3 Li ions in-between each individual graphene layer (made possible by the tuning of the height or gap length between individual graphene layers) tied into a carbon scaffold gradient by joining the larger 3D graphene-based particles together to form a thin film.

In contrast, traditional battery electrode production methods typically employ known deposition techniques such as chemical vapor deposition (CVD) or other fabrication techniques, nanotubes, etc., to "grow" structures off of a defined fixed substrate or surface. Such known assembly processes and procedures can tend to be very labor intensive, and they may also permit for the growth of structures of limited thickness, 200-300 microns in thickness.

Graphene-on-graphene densification, of multiple FLG, on an original gumball-based carbon scaffold (individual mesoporous carbon-based particles 16-300A, carbon scaffold 16-300H, lithiated carbon scaffold 16-400A, and/or the like) may also result in increased energy density and capacity. Such densification in target regions of the carbon scaffold may also be performed or otherwise accomplished after creation of a larger agglomerated particle comprising multiple mesoporous carbon-based particles 16-300A. Generally, Li ions may be plated onto electrode prior to reduction, therefore Li-ion may transition from an ion to a metal state dependent on battery chemistry. Moreover, in an implementation, similar to electroplating, graphene may be grown in a stacked manner on other materials, such as plastic, and tuned to obtain a desirable bright and/or smooth finish. Such electroplating processes are reversible and may include separate but interrelated plating process and a stripping processes, intended to place the Li ions and/or atoms down (and for the subsequent removal thereof).

In continual cyclical use of secondary Li-ion batteries, involving multiple charge-discharge-recharge cycles, surfaces upon which carbon-based structures are grown and/or built may eventually roughened and therefore susceptible to or accommodative of unwanted dendrite growth. In contrast, techniques employed to produce mesoporous carbon-based particles 16-300A and/or the like, as discussed above, substantially prevent such dendrites from growing, enabled by the usage of Li metal substantially free of impurities along with carbon-based graphene structures to enable high specific capacity values.

Usage of graphene sheets permits for relatively greater exposed surface area available for plating or intercalating operations for the infiltration (referring to non-reactive capillary infusion) of Li ions. Thus, any tendency to go to a certain point anymore is removed; and, fundamentally the way plating and stripping occurs may be changed (due to the graphene having a higher surface-area to volume ratio than other conventional carbon-based materials such as graphite). Li ions may be introduced at least partially relying upon liquid Li; however, given Li's predisposition for chemical reactivity with surrounding and/or ambient elements, water-based moisture and oxygen must be kept away. Similarly, the introduction of impurities results in deleterious effects. Metal-matrix composites have been studied, in relation to the disclosed carbon-based structures, regarding usage of Li metallically bonding or otherwise forming a metal-matrix composite with C, therefore offering additional options regarding the fine-tunability and management of reactivity at exposed surfaces.

Li in contact with C may result in circumstances where the free energy of carbide of Li at contact surfaces must be suppressed and/or controlled to avoid unwanted reactivity related to spontaneous Li infiltration in mesoporous carbon-based particle 16-300A and/or the like. Traditionally, Li, in a liquid phase, typically forms carbonates and other formations due to the chemistry of the electrolyte. However, what is proposed by the present examples relates to the creation of a relatively stable solid electrolyte interface (SEI) prior to the introduction of the liquid electrolyte, this is a central concept supportive of the surprising performance success of the disclosed examples and implementations.

Moreover, multiple methods and/or processes to affect Li-ion interface areas may be available. For instance, preparing the surface of liquid Li by alloying with Si and other elements will reduce the reactivity and promote overall Li-ion wetting of larger agglomerated particles, each comprising multiple "gumball" structures (mesoporous carbon-based particles 16-300A). In an example, approximately less than 1.5% of Li was observed to have preferentially moved to exposed surfaces, exposed to the electrolyte.

FIGS. 16-5A-16-5B show various photographs and/or micrographs related of example variants of the 3D mesoporous carbon-based particles shown in FIGS. 16-3A-16-3J. FIGS. 16-5A-16-5B show various photographs and/or micrographs related of example variants (variant 16-500A and variant 16-500B) of the 3D mesoporous carbon-based particles shown in FIGS. 16-3A-16-3J at various magnification levels illustrating internal porosity and microstructure. As can be seen from variant 16-500A, mesoporous carbon-based particle 16-300A, 16-300E and/or the like self-assembles upon an initial nucleation, such as in-flight in a microwave plasma-based reactor (as discussed earlier) to form ornate scaffolded agglomerations such as carbon scaffold 16-300H suitable for lithiation to become lithiated carbon scaffold 16-400A.

FIGS. 16-5C1-16-5C3 show examples related to a printed battery featuring pressure-based electrolyte release capabilities. The present batteries utilize a metal air battery chemistry, illustrated by FIG. 16-5C1-16-5C3, which includes an air (cathode) electrode reaction and a metal (anode) electrode reaction. The batteries include a dry carbon electrode with embedded conducting salt (i.e., ionic liquid), where the carbon is activated when exposed to moisture in the air. The active metal anode may be made of, for example, Mg, Zn, Al or other metals, and may or may not include a carbon-based material. In one embodiment, Mg alloy is used for the anode because of its benign biological function and high theoretical capacity.

In some embodiments, biocompatible conductive polymers, such as polypyrrole (PPy) could be used in combination with carbons and specific oxygen reduction catalysts to create a composite cathode material that is biocompatible. For the anode, the approach is to use biocompatible/biodegradable materials such as Mg, Zn, Al, and the like and as a separator, cellulose and polymer-based materials would be used. Management of toxicity, biocompatibility and biodegradability can be controlled as independent variables.

The cathode may be made of, for example, graphite, silver chloride, copper chloride, $MnO_2$, or carbon/$MnO_2$ in the case of a supercapacitor. In some embodiments, the carbon electrode may include an electrocatalyst to accelerate the reaction. In such embodiments, the carbon electrode surface can be functionalized to absorb CO2 in the air, in order to prevent the $CO_2$ from blocking the electrode reaction. This is because $CO_2$ in the air could undergo a carbonation reaction with the electrocatalyst (i.e., alkaline electrolyte), thus changing the reaction environment inside the cell, blocking the gas diffusion layer and limiting access of air by the battery.

In some implementations, the battery includes hydrophobic and/or hydrophilic areas to inhibit and promote wetting and infiltration spatially across the surface. For example, carbon-based materials can be tailored to be hygroscopic (i.e., hydrophilic) for use within the electrodes so that when the battery is exposed to air, adsorption of water from the air activates the electrode materials. In another example, carbon-based materials can be tailored to be hydrophobic to form a barrier around the battery so that the electrolyte, when activated by moisture, will stay within the battery area of the substrate. The tailoring of the carbons to be hydrophobic or hydrophilic can be achieved by, for example, altering the surface energies of the carbon. In some embodiments, this tailoring may be achieved in the reactor when the carbon particles are produced, creating a surface layer that is stable in air.

In a specific example of electrode materials, shown in FIGS. 16-1A-16-1B, the anode is a metal-doped carbon such as metal/graphite. The bulk of the anode (i.e., central area) is hydrophilic, such as with a specifically tailored carbon-based material. When the anode is exposed to air, moisture in the air is adsorbed onto the anode thereby activating the anode. The cathode can be an air cathode that operates using functional carbon, particularly its porous and conductive properties. The carbon serves as a gas diffusion layer, controlling diffusion of water and carbon dioxide across the carbon layer. The cathode has an embedded electrolyte and a catalyst that are activated when water is introduced. The electrodes are surrounded by a hydrophobic perimeter, which serves as a dam to prevent the activated materials from spreading to other areas. The perimeter can be made from, for example, carbon that is tailored to be hydrophobic.

In some embodiments, the electrolyte may be an ionic conductor and may be a semi-solid or gel-type compound embedded in a liquid. The liquid may be, for example, aqueous graphite (with electrochemical window; e.g., 1.3 V), an organic liquid, or a dry ionic liquid (4-6 V window). The electrolyte may be activated with a hygroscopic additive or with an ionic liquid bound to a polymer (such as polypyrrole) in the carbon air cathode.

In some embodiments, nanoscopic active materials such as $MnO_2$ or hydrogen (for the cathode), can be incorporated directly onto or into the surface of nanostructured carbons. In such a configuration, the nanostructured carbon substrate serves a high-surface-area, 3-D current collector for a coating (e.g., $MnO_2$) and defines the internal pore structure of the electrode, which facilitates the infiltration and rapid transport of electrolyte to a nanoscopic $MnO_2$ phase.

The battery components are fabricated by printing, which may include a binder. Examples of printing materials include chitosan for aqueous liquids (embedded chlorine nitrate is biodegradable) and ionic liquids. Carboxymethyl cellulose (CMC) is an example an organic electrolyte. An example of a material for the current collectors is a metal laminated plastic with a thin graphite layer to reduce contact resistance to electrode materials.

The printed batteries of the present embodiments are compatible with high-volume, roll-to-roll manufacturing processes such as gravure and screen printing. Thus, the present printed batteries may be economically produced.

Applications

The printed batteries can be used, for example, in short-term (duty cycle), single-use events needing a safe, "throw-away" power requirement. Example applications include using the printed battery as a power source for smart tags, tracking labels for boxes/packaging (e.g., a multi-day international package delivery), electronic accessories to be powered for a limited time (e.g., a display for notebooks), and consumer products on a retailer's shelf (e.g., for inventory control). Additional examples include entertainment applications, such as "smart" concert tickets, greeting cards, and toys. In other examples, the biodegradable (i.e., biocompatible) nature of the batteries enable their use as a power source for medical applications, such as drug delivery. Applications with larger available footprints will typically enable more usable amounts of power to be generated.

Another application of the present printed batteries is that the process of activating battery can also provide an opportunity for analyzing contaminants or hazardous materials that may have been transferred from a user's skin to a sensor connected to the battery.

Yet other myriad applications of the present printed batteries are apparent. For example, the present printed batteries can be used in medical devices. Moreover, applications of the present printed batteries arise when used in subcutaneous medical devices, and since medical devices are often stored for relatively long periods of time before being used in vivo, there are number advantages of using the two-part aspects of the batteries described herein. As strictly one example advantage, the two-part batteries can be stored for long periods of time before being activated (e.g., when being dispensed to a patient). This feature results in medical devices that have reliably long usability. Strictly as one example, so long as the battery materials do not come in contact with moisture or a 'liquid' electrolyte (i.e., so long as the individual battery components are not activated), the individual separate components have an expected "shelf life" (e.g., usable life in un-activated state) of greater than 5 years.

The biodegradability of a component or combination of components depends on the specific chemistries in use. In some cases, the materials and chemistries are preferentially selected to be biocompatible, independent of biodegradability. The bio-compatibility aspects as well as biodegradability aspects of a particular battery option can be engineered in accordance with the specific requirements of a specific end-use or specific application.

FIG. 16-6A-16-6C shows views of a printed battery that can be activated at a point-of-use.

FIGS. 16-7-16-8A show self-aligning geometry that self-aligns even in presence of lateral misregistration.

FIG. 16-8B shows an example listing of printed battery properties and advantages.

FIG. 16-9 illustrates a configuration of an anode and cathode interdigitated therewith, both the anode and cathode being disposed on a component layer, which is disposed on a substrate layer.

FIG. 16-10 an exploded view of layers of an example printed battery, such layers including elements of a cathode and anode portion, respectively.

FIG. 16-11 an exploded view of layers of an example printed battery, such layers including elements of a cathode and anode portion, respectively.

FIGS. 16-12A-16-12B show an example where printed batteries are activated by an external source.

FIGS. 16-12C-16-18 show information, targets, properties and related materials for printed batteries according to a variety of examples of the presently disclosed implementations.

FIGS. 16-19A and 16-19B show SEM images, and FIGS. 16-20A and 16-20B show TEM images, of the carbon aggregates of the particulate carbon of this example showing graphite and graphene allotropes. The layered graphene is clearly shown within the distortion (wrinkles) of the carbon. The 3D structure of the carbon allotropes is also visible. The carbon allotropes in this example have a 3D structure with a hierarchical mesoporous, few layer, graphene structure with a specific edge-to-basal plane ratio. In some embodiments, the edge-to-basal plane ratio for the graphene in the present particulate carbon is about 1:10, or about 1:100, or from 1:10 to 1:100.

The surface area of the aggregates in this example were measured using the nitrogen BET method and the density functional theory (DFT) method. The surface area of the aggregates as determined by the BET method was approximately 85.9 $m^2/g$. The surface area of the aggregates as determined by the DFT method was approximately 93.5 $m^2/g$.

In contrast to conventionally produced carbon materials, the microwave plasma reactor produced carbon particles and aggregates in this example contained graphite and graphene had high purity, high electrical conductivities, and large surface areas. Additionally, these particles had Raman signatures indicating a high degree of order, and contained no seed particles.

In some embodiments, the particulate carbon in the present gas sensors contains doped carbon materials (e.g., carbon doped with H, O, N, S, Li, Cl, F, Si, Se, Sb, Sn, Ga, As, and/or other metals), undoped carbon materials, or combinations thereof. Doped carbon can also include carbon with a matrix allotrope doped with carbon atoms (not in the matrix structure) and/or doped with other types of carbon allotropes. Doped carbon materials can also be doped with functional groups, such as amine (NH3) groups. In some embodiments, doped carbon materials are formed using a dopant material, where the dopant material is introduced within a gas, liquid, or colloidal dispersion and fed into a reactor that is used to produce the doped particulate carbon. For example, dopant materials can be combined with a hydrocarbon precursor material and cracked in a reactor (e.g., a microwave plasma reactor or a thermal reactor) to produce a doped particulate carbon.

In some embodiments, the particulate carbon in the present gas sensors contains nano-mixed particulate carbon. In some embodiments, the surface area, structure, and/or surface activity of the present particulate carbon materials are tuned by nano-mixing the carbon particles within the carbon materials with particles of other materials. In some embodiments, particles of nano-mix additive materials can be beneficially integrated with particles of the graphene-based carbon on a particle level, which shall be referred to as nano-mixing in this disclosure. The average diameter of the particles of the nano-mix additive material and the graphene-based carbon materials in the nano-mixed particulate carbon can be from 1 nm to 1 micron, or from 1 nm to 500 nm, or from 1 nm to 100 nm, or can be as small as 0.1 nm. In some embodiments, the nano-mix additive material and the graphene-based carbon material are chemically bound, or are physically bound, together in the nano-mixed particulate carbon. In some embodiments, the nano-mixing involves introducing nano-mix additives during particulate formation (e.g., during a hydrocarbon cracking process in a microwave plasma reactor or in a thermal reactor) such that the nano-mix additive material is integrated into the graphene-based carbon material as the carbon material is produced, rather than combining a carbon raw material with an additive in a later process as in certain conventional methods. In some embodiments, the nano-mix additive material can be introduced as a gas, liquid, or colloidal dispersion into a reactor that is used to produce the nano-mixed particulate carbon. As an example, silicon can be input into a reactor along with a hydrocarbon process gas (or other carbon-containing process material such as a liquid alcohol) to produce silicon nano-mixed with graphene, graphene-based carbon materials, and/or other carbon allotropes. In other examples, the resulting nano-mixed particulate carbon of the present embodiments can contain particles of O, S, LixSy (where x=0-2 and y=1-8), Si, Li22Si5, Li22-xSi5-y (where x=0-21.9, and y=1-4.9), and $Li_{22}$-xSi5-y-zMz (where x=0-21.9, y=1-4.9, z=1-4.9, and M is S, Se, Sb, Sn, Ga, or As), and/or other metals.

In some embodiments, the particulate carbon to be used in the present gas sensors are produced and collected, and no post-processing is done. In other embodiments, the particulate carbon is produced and collected, and some post-processing is done. Some examples of post-processing include mechanical processing, such as ball milling, grinding, attrition milling, micro-fluidizing, jet milling, and other techniques to reduce the particle size without damaging the carbon allotropes contained within. Some examples of post-processing include exfoliation processes such as shear mixing, chemical etching, oxidizing (e.g., Hummer method), thermal annealing, doping by adding elements during annealing (e.g., O, S, Li, Si, Se, Sb, Sn, Ga, As, and/or other metals), steaming, filtering, and lypolizing, among others. Some examples of post-processing include sintering processes such as SPS (Spark Plasma Sintering, i.e., Direct Current Sintering), Microwave, and UV (Ultra-Violet), which can be conducted at high pressure and temperature in an inert gas. In some embodiments, multiple post-processing methods can be used together or in series. In some embodiments, the post-processing can produce the functionalized carbon nanoparticles or aggregates described herein.

The particulate carbon described herein can be combined with a second phase of material to create composite films. These composite films can be fabricated utilizing different methods to create specific detector responses.

In an example, solid carbon particles (e.g., particle size from 0.3 microns to 40 microns) and polymer beads (e.g., ball mixed for size reduction and improved aggregation) can be mixed in a ratio of 90:10 respectively (or in ratios from 95:10 to 5:95). This mixture can then be cast onto a substrate (e.g., one containing prefabricated electrodes, or an antenna platform), and then treated (e.g., using a low temperature, post treatment in an inert gas oven, a reactive gas oven, or a vacuum oven).

In another example, the mixing of the solid carbon particles and polymer beads described in the example above can be further combined with a solvent to form an ink, which can then be deposited onto a substrate (e.g., cast using doctor blade, or printed). After deposition, the film can then be treated at a low temperature to remove the solvent and consolidate the film.

In another example, particulate carbon can be encapsulated with a polymer to form colloidal core-shell structures that can be printed onto antenna platform using various techniques including inkjet printing, aerosol spray coating, spin coating and roll coating.

In another example, the particulate carbon can be combined with a soluble polymer to form jettable inks for printing. In such applications, conductive binders, such as silver flakes/particles, can also be added to tune the dielectric properties (e.g., at particle-particle contact points).

Electrochemical Sensors

FIG. 16-21 is a plan view schematic of an electrochemical gas sensor 16-2100, in accordance with some embodiments. The gas sensor 16-2100 has a circuit containing a first electrode 16-2110 printed from a conductive ink, a second electrode 16-2111 printed from a conductive ink, a non-volatile electrolyte 16-2120 that electrically couples the first electrode 16-2110 to the second electrode 16-2111, a signal generator 16-2160 (shown as a voltage source), and a measurement (or detection) circuit element 16-2170 (shown as a mega-Ohm resistance measurement in the figure, but could also be a capacitance, impedance or other electrical measurement in other embodiments). The presence of a target chemical produces a detectable signal between the two electrodes 16-2110 and 16-2111. For example, the change in the resistance of the circuit, the capacitance of the circuit, and/or the impedance of the circuit can be used as a detection signal. One of the electrodes 16-2110 or 16-2111 serves as the sensing electrode, and the other is the counter electrode. In some embodiments, one or both of the electrodes 16-2110 and 16-2111 contain particulate carbon (e.g., the particulate carbon described herein), silver particles, metal particles, conductive oxide particles (e.g., indium tin oxide and/or fluorine-doped tin oxide particles), or other conductive particulate materials (including any aspect ratio particulates, such as those shaped as spheroids, rods, and wires). In other embodiments, one or both of the electrodes 16-2110 and 16-2111 contain carbon allotropes such as, but not limited to, graphene, graphenes (graphene-based materials), graphene oxide, reduced graphene oxide, graphite oxide, graphite intercalation compounds, graphite, graphane, carbon nano-onions, diamond, p-type diamond, n-type diamond, glassy carbon, amorphous carbon, activated carbon, carbon black and/or carbon nano-tubes. The carbon materials in the first electrode 16-2110 may be the same as or different from the carbon materials in the second electrode 16-2111. In one embodiment, the first electrode 16-2110 includes a high surface area, highly conductive carbon allotrope combined with a redox mediator such as from the class of metallocenes (e.g., ferrocene), while the second electrode 16-2111 includes a conductive ink with a low surface area carbon allotrope with no redox mediator. In various embodiments, the first electrode 16-2110, second electrode 16-2111, and electrolyte 16-2120 are all printed on a substrate 16-2150, such as by ink-jet printing. In some embodiments, the substrate 16-2150 is a rigid or flexible material, such as paper, such as paper used in a label material. Some other non-limiting examples of substrate materials are polymers (e.g., polyethylene terephthalate, or polypropylene), and cardboard. One benefit of the present gas sensors is that they can be printed on many different substrates, in accordance with some embodiments.

In some embodiments, the electrolyte 16-2120 can be inkjet printed and contain materials such as polymer electrolytes, ceramics, or monomers that solidify into a suitable solid electrolyte. Examples of liquid electrolyte materials include ionic liquids, such as 1-butyl-3-methylimidazolium bis(trifluoromethylsulfonyl)imide, 1-butyl-3-methylimidazolium hexafluorophosphate, 1-butyl-3-methylimidazolium tetrafluoroborate, 1-hexyl-3-methylimidazolium tris(pentafluoroethyl)trifluorophosphate, 1-butyl-1-methylpyrrolidinium bis(trifluoromethylsulfonyl)imide, ethylammonium nitrate, and tetrabutylmethylammonium bis(trifluoromethylsulfonyl)imide. Ionic liquid monomers with acrylate functional groups can be in-situ polymerized to make polymer ionic liquids, such as poly(tetrabutylphosphonium3-sulfopropylacrylate) or poly(tributylhexylphosphonium 3-sulfopropylacrylate). Alternatively, solid polymer electrolytes could be used, which include a copolymer of poly(tetrafluoroethylene) with poly(sulphonylfluoride vinyl ether) (commercial example includes Nafion 117 from DuPont), poly (dimethyldiallyammonium chloride), plasticized poly (vinylchloride) containing tetrabuylammonium hexafluorophosphate, and poly(ethylene oxide) complex with silver trifluoromethane sulfonate. In some embodiments, the electrolyte 16-2120 contains a reactive chemistry additive and serves as a sensing material (e.g., and neither of the electrodes contains a reactive chemistry additive). In such cases, the presence of the target chemical is detected by measuring a change in a signal (e.g., the capacitance of the circuit) in the sensor 16-2100 due to the change in the electrical properties of the electrolyte. Not to be limited by theory, in some cases, charge arising from electron transfer from a reactive chemistry additive (e.g., a redox mediator material) compound to a target molecule (e.g., the compound of interest (i.e., analyte or target chemical), or products arising from the compound of interest) affects the electrical properties of the electrolyte, thereby affecting the signal in the gas sensor 16-2100. The electrolyte 16-2120 can have as a solvent: water, polar organic solvents, ionic liquids, or polymer electrolytes, for instance. In some embodiments, the electrolyte can be printed from a class of polymer electrolytes or ionic liquids. In some cases, the sensing reactions (i.e., the interaction of the sensing material with the analyte) in any of the gas sensors described herein occur at room temperature and ambient pressure, or at elevated temperatures (e.g., from 30° C. to 80° C.). In some cases, photons (e.g., visible light, or UV light) are introduced to the sensing material of any of the gas sensors described herein to increase the rate of the sensing reactions.

In other embodiments, one or both of the first and second electrodes 16-2110 and 16-2111 serves as a sensing material, and includes a redox mediator, where the redox mediator may be in the form of a polymer or a solution. That is, in some embodiments, at least one of the first electrode, the second electrode, or the electrolyte material contains a redox mediator.

The one or both of the first and second electrodes 16-2110 and 16-2111, or the electrolyte 16-2120 can include a redox mediator, which is a compound that donates or receives a proton or an electron from an electrode and performs reduction or oxidation of a substance in bulk solution away from the electrode by transferring this electron or proton to/away from the substance. FIG. 16-22 is a table that lists non-limiting examples of possible redox mediators that may be used in the present embodiments. In some embodiments, the redox mediator is an organometallic material, such as a metallocene (e.g., ferrocene). In various embodiments, the redox mediator is a polymer or a solution in which there is non-covalent tethering of the redox mediator to the carbon one or more of the gas sensor components (e.g., the first or second electrodes 16-2110 and 16-2111, and/or the electrolyte 16-2120), covalent tethering, or the redox mediator is untethered to the carbon. Tethering-whether covalent or non-covalent-causes the redox mediator to be immobilized by binding it to a component of the sensor (e.g., the positive electrode). Covalent tethering of the mediator refers to chemically bonding a material that has redox activity to a carbon (e.g., using organic chains comprised of, for instance, combinations of carbon, oxygen, nitrogen, silicon, sulfur, and/or hydrogen).

FIG. 16-23 shows an example of an electrochemical gas sensor 16-2300 in another embodiment of an electrochemical sensor, where a first electrode 16-2310 and a second electrode 16-2311 are configured as interdigitated fingers to increase the area for electrical interaction between the electrodes, which can be beneficial for example in cases where the electrolyte contains the sensing material (e.g., reactive chemistry additives). Additionally, such an interdigitated electrode geometry can be used to tune the capacitance of the sensor element to allow it to be integrated with other circuit elements more advantageously. In some embodiments, the first and second electrodes 16-2310 and 16-2311 are printed using carbon-based conductive inks (optionally containing one or more redox mediators), as described in relation to the sensor 16-2100 of FIG. 16-21. An electrolyte 16-2320, which can include a redox mediator (as described in relation to FIGS. 16-21 and 16-22), can be printed as a layer over the electrodes 16-2310 and 16-2311. In the illustrated embodiment, the electrolyte 16-2320 is configured as a circular layer (e.g., by applying a droplet of the electrolyte during fabrication of the sensor). However, in other embodiments the electrolyte 16-2320 can be formed (e.g., inkjet printed or cast) in other geometries, such as a rectangular layer, or other patterned shape to impact the electrical properties of the sensor circuit. Some non-limiting examples of materials for the electrolyte are polymers (e.g., poly (ether urethane) (PEUT), polyepichlorohydrin (PECH), polyisobutylene (PIB), and alkyl cellulose), ceramics, or monomers that solidify into a suitable solid electrolyte. The first electrode 16-2310, second electrode 16-2311, and electrolyte 16-2320 can all be printed on a flexible or rigid substrate 16-2350, where the substrate 16-2350 may be, for example, an $SiO_2$-coated paper or polymeric material.

In some embodiments, the electrodes and electrolytes of the present embodiments contain the particulate carbon described herein, and are tuned to sense the target chemical. In some embodiments, tuning the particulate carbon materials includes functionalizing the particulate carbon to be sensitive to certain materials. For example, the particulate carbon can contain one or more reactive chemistry additives which react with a target chemical to be detected. Some non-limiting examples of target chemicals moieties that can be detected by the sensors of the present disclosure include, but are not limited to, acetone, ammonia, carbon monoxide, ethanol, hydrogen peroxide ($H_2O_2$), nitro (NO2) groups, oxygen, and water (i.e., to detect humidity levels). Characteristic interactions between these chemicals and reactive chemistry additives of one or more of the gas sensor components are used to detect the presence of these chemicals. For example, NO2 groups withdraw electrons, NH3 gas is an electron donor, CO2 gas is an electron donor, acetone is a neutral molecule, $H_2O_2$ is an oxidizer, and ethanol is an electron donor. When a gas species interacts with a reactive chemistry additive in the sensing material, these types of interactions change the electrical properties (e.g., the conductivity, or the complex impedance) of the sensing material, which causes a change in the measured response from the gas sensor indicating the presence of the species.

In an example, a sensing material in a gas sensor contains particulate carbon containing p-type doped graphene semiconductors, which have a response towards NO2, CO2, or NH3 gases. NO2 gas or NO2 containing molecules adsorb/desorb on a graphene surface via three possible adsorption configurations: nitro, nitrite and cycloadditions. During these configurations, there is a charge transfer between NO2 molecules and the p-type graphene molecules. The electron withdrawing effect of NO2 increases the hole-density which leads to a decrease in resistance (or a change in the complex impedance spectrum). CO2 and NH3 are donors, so the resistance of the p-type doped graphene semiconductors increases (or the complex impedance spectrum changes) due to a depletion in hole density.

In another example, a sensing material in a gas sensor contains particulate carbon containing n-type graphene composites, which can be used for acetone sensing. In graphene-zinc-ferrite composites, surface oxygen sp hybrid orbitals interact with acetone to form CO2 and H2O, and release free electrons which decreases the resistance (or change the complex impedance) of the sensing material. In a further example, a graphene composite with iron (II) reacts with $H_2O_2$ to produce O2 and Fe (III). Either O2 can be detected, or UV can be used to check the wavelength of the Fe (III) complex.

In some embodiments, the carbon allotropes within the particulate carbon in the present sensors can be tuned to detect the desired chemical by utilizing a certain microstructure, such as the porosity or curvature (e.g., curved graphene) of the carbon. The carbons can contain sp3, sp2 and/or sp hybrid orbitals, or a combination of these. In other embodiments, tuning can be achieved by adding reactive chemistry additives in the form of functional groups to the carbon, such as oxygen, ketones, or carboxyl. The tuning in the various embodiments may be achieved during initial production of the carbon, and/or by post-processing after the carbon has been made. The post-processing, as described herein, can include steps such as changing the surface area of the carbon material (e.g., by ball milling), changing the conductivity, adding functional groups, or a combination of these.

In an experimental run, a sensor similar to that of FIG. 16-23 was used to test for the presence of hydrogen peroxide. The interdigitated fingers in this example contained the particulate carbon described herein. The redox mediator solution was 10 μL of 5 mM bis(pentamethylcyclopentadienyl) iron (II), 100 mM tetraethylammonium tetrafluoroborate, and 25 mM KOH in butylmethylimidazolium tetrafluoroborate. The sensor was activated by applying a voltage of 1.0 V in the absence of peroxide and then allowed to equilibrate for 5 minutes to establish a baseline current. The sensor was then put into an atmosphere containing peroxide (single digit parts per million to parts per billion) for 1.0 hr, after which a 1.0 V voltage was applied, and the current was measured. The results are shown in Table 16-1 below.

TABLE 16-1

Sample experimental results for electrochemical sensor

| No Peroxide (Test Cycle 1) | Peroxide Vapor Present (Test Cycle 2) | | |
|---|---|---|---|
| Current | 2.63 μA | 19.7 μA | 20.5 μA |
| E we | 311 nWh | 1912 nWh | 1973 nWh |

As can be seen from Table 16-1, the baseline currents increased approximately 650%—from 2.63 μA to 19.7 μA—and remained constant (20.5 μA) for the second hold/test cycle. Thus, the electrochemical sensor demonstrated the ability to detect peroxide with high sensitivity using low amounts of electrical power.

High Frequency Sensors

Some electrochemical sensors utilize direct current (DC) electrical signals to detect changes to a sensing material (e.g., changes in charge carrier concentration causing a change in resistance to indicate chemistry, and/or changes in molecular structure causing a change in capacitance to indicate chemistry). While such DC gas sensors are capable of sensing low levels of chemistry, the detection range without costly equipment (e.g., utilizing high power energy sources) to drive chemical reactions makes widespread adoption impractical for most applications. In the present embodiments, alternating current (AC) signals are used to detect characteristic, reversible impedance responses of a sensing material. In some such gas sensors, a multi-frequency AC signal (e.g., RF current with a range of frequencies) is applied to a sensing material within a sensing circuit and the complex impedance of the circuit is detected. The frequencies of the AC signals used in such “high frequency” gas sensors are typically greater than 1 kHz, or are from 1 kHz to 20 GHz, or are from 100 kHz to 20 GHz.

High frequency gas sensors contain AC circuits with a sensing material incorporated. The geometries and materials in the AC circuits can be tuned to be sensitive to certain frequency ranges, and the complex impedance of the AC circuit changes upon interaction with an analyte that changes the complex impedance of the sensing material. In general, the complex impedance of a material within the AC circuit will affect the signals detected from the circuit and can be tuned to tune the response of the circuit. For example, the sensing material can contain a carbon material, the properties of the carbon material can affect the complex impedance, and therefore the complex impedance of a carbon sensing material and a sensing circuit containing that material can be controlled by specifically tuning the properties of the carbon materials (e.g., the structure of the carbon materials, the types of allotropes present, and the concentration of defects in any ordered carbon allotropes present).

In some embodiments, high frequency gas sensors contain a structured material within the sensing material. The complex impedance of a structured material is a result of the inherent materials properties forming the structure as well as the geometry of the structure, such as the pore size, the pore spacing and the macroscopic shape of the material. In the case of composite structured materials, the distribution of the materials with different properties also affects the complex impedance of the material. For example, electrically conductive materials (e.g., the particulate carbons described herein) can be structured into a mesoporous structure and be decorated with other materials such as dielectrics or permeable materials. In some embodiments, the structure, composition, distribution of materials, and/or the concentration of impurities and/or defects are changed to tune the complex impedance of a structured sensing material within a high frequency gas sensor. Such a structured sensing material is beneficial in high frequency resonant gas sensors because they contain a variety of random paths and path lengths available for conduction at many frequencies, which can provide a sensor with a wide bandwidth of possible frequencies with which to detect a target analyte. In some embodiments, the structured materials (e.g., with the particulate carbon described herein) are frequency selective materials, which are used in high frequency circuits within the present gas sensors.

In some embodiments, dielectric polarization modification impedance spectroscopy is utilized, which is a low-cost method for detecting low concentrations of analytes (e.g., volatile gases or vapors) in a gas sensor. In some embodiments, an impedance spectroscopy measurement can be used to detect the modulation of properties of a sensing material containing reactive chemistry additives (e.g., a structured sensing material containing particulate carbon and a redox mediator in the presence or absence of an analyte). For example, selective frequency interrogations of S21 (i.e., the transmission of a high frequency signal through an AC circuit or system) and S11 (i.e., the reflectance of a high frequency signal from an AC circuit or system) can be used to detect a change in the complex impedance of the sensing material and/or circuit (or system) as a whole. The operation of the gas sensor relies on a change in the measured S21 or S11 value upon exposure to an analyte.

The combination of such high frequency gas sensors (e.g., utilizing impedance spectroscopy) and the unique properties of the particulate carbon described herein (e.g., structure, surface area, and conductivity) enables gas sensors that are able to generate the same results as the more costly counterparts (e.g., detecting an analyte with concentrations in the parts per million (ppm) or parts per billion (ppb) ranges) at a greatly reduced price, and an improved ease of adoption and portability. The low power requirement of the present embodiments allows for the system to be powered by battery systems and in some cases using energy harvester systems. Additionally, the imaginary part of the complex impedance of the sensing materials described herein have spectral signatures (e.g., peaks in the spectra) that can discriminate one molecular arrangement from others, enabling the detection of several molecules with one sensor.

FIG. 16-24 shows an example embodiment of a chemical sensor 16-2400 in which high frequency (e.g., impedance) spectroscopy is used as the detection method. Sensor 16-2400 includes a first electrode 16-2410, a second electrode 16-2411, and a dielectric 16-2420 sandwiched between the electrodes 16-2410 and 16-2411, all of which are arranged on substrate 16-2450. In some embodiments, the electrodes 16-2410 and 16-2411 and/or the dielectric 16-2420 are printed from inks on the substrate 16-2450. Substrate 16-2450 may be rigid or flexible, for example, a label. In some cases, a device may be formed on both sides of a substrate. In some embodiments, the electrodes 16-2410 and 16-2411 contain the particulate carbon described herein), silver particles, metal particles, conductive oxide particles (e.g., indium tin oxide and/or fluorine-doped tin oxide particles), or other conductive particulate materials (including any aspect ratio particulates, such as those shaped as spheroids, rods, and wires). In other embodiments, one or both of the electrodes 16-2410 and 16-2411 contain a carbon allotrope such as, but not limited to, graphene, graphene oxide, carbon nano-onions, and/or carbon nanotubes. In some embodiments, one electrode includes a metal while the other electrode does not. One or both electrodes 16-2410 and 16-2411 and/or dielectric 16-2420 can include a reactive chemistry additive (e.g., a redox mediator), as described in reference to the electrochemical sensors above, which is tuned to one or more target analyte (e.g., volatile gas or vapor) species.

In operation, an AC source 16-2430 applies AC signals having a range of frequencies (e.g., greater than 1 kHz, or from 10 kHz to 20 GHz, or from 10 kHz to 1 GHz, or from 500 kHz to 20 GHz, or from 500 MHz to 20 GHz) to the sensor 16-2400, and a detection circuit 16-2460 detects a change in impedance at specified frequencies when the target substance interacts with (e.g., is absorbed into, or adsorbed onto) the sensing material. In some embodiments, the sensor 16-2400 uses an impedance spectroscopy technique, in which specific target analyte chemicals interact with the sensing material (e.g., containing the particulate carbon described herein) causing a change in the complex impedance of the sensing material. The change in the complex impedance can then be measured by the circuitry 16-2460, and the measured change used for detecting the target substance. In some embodiments, the sensing material contains tailored carbon and a reactive chemistry additive with electrons that interact with the target compound and change the resonance frequency.

High Frequency Resonant Sensors

One type of a high frequency gas sensor is a resonant gas sensor. In some embodiments, a resonant gas sensor contains one or more sensing materials, and changes to the resistivity and permittivity of the sensing materials result in changes to the resonant behavior of the sensor. In some embodiments, such a resonant gas sensor can be printed and utilize small electronics (e.g., a small IC chip), such that it can be miniaturized and produced at low cost. Such low-cost miniature resonant gas sensors have a myriad of applications including product labels on food packaging, shipping labels on packages, and portable hazardous/toxic gas sensors. In some embodiments, low cost resonant gas sensors are enabled by the particulate carbon materials described herein, which improve the resonant gas sensor sensitivity allowing for low power signals to produce adequate responses. For example, the high the surface area and mesoporous structure of the particulate carbon allows more analyte vapors to enter into the structure and increases the changes in the sensing material resistivity and permittivity for a given analyte concentration. In some embodiments, the sensing materials or materials making up the other elements (e.g., with the particulate carbon described herein) contain frequency selective materials, which are used to tune the resonant frequencies of the resonant circuits within the present gas sensors.

In some embodiments, the resonant gas sensors contain pickup electrodes to provide AC signal power input to the sensing materials and detect an output from the sensing materials. The geometries of the constituent elements can be tuned in order to produce a resonant structure with certain frequency response in the sensor. In addition, the materials properties (e.g., resistivity and/or complex permittivity) of the sensing material can also be tuned to form a resonator structure or composite with a certain spectral frequency response. Tuning the materials properties and resonant structure geometries can be advantageous to enhance the performance of the gas sensor to be more sensitive in certain frequency ranges.

In some embodiments, a resonant gas sensor system includes a microprocessor, which provides a signal to a transducer (i.e., an antenna) that drives a sensing material in the resonant gas sensor over a specific frequency range. The microprocessor can also detect the response (e.g., the complex impedance spectrum of the sensor). In different cases, the response can be a reflected AC signal (i.e., S11) or a transmitted AC signal (i.e., S21). The sensing material can be integrated into the transducer or be a separate element. Different resonant gas sensor architectures are described below. In some cases, the response is compared to a database (i.e., a library) of resonance spectra for a variety of molecular chemistries related to certain molecules of interest (e.g., those in explosives, or rotting foods). In some embodiments, the functionality of the detector and transducer are integrated into a single, monolithic, patterned film structure, optionally integrated with other electronics such as an integrated microprocessor and/or communication chip (e.g., to communicate a detection event to another device). The microprocessor (and other optional integrated electronics) can be powered using an integrated battery or using energy harvesting structures (e.g., using an antenna that absorbs RF energy or a photocell that absorbs light, coupled to an integrated capacitor to store the harvested energy). In some cases, such an integrated sensor can contain a resonant structure with engineered properties (e.g., conductivity, and geometry) to minimize the antenna absorption loss at high frequency.

In some embodiments, a resonant gas sensor contains a set of electrically conductive elements that form a resonant structure. The resonant structure itself exhibits resonance or resonant behavior, that is, it naturally oscillates at some frequencies, called its resonant frequencies, with greater amplitude than at others. These resonant structures within the sensors are used to select specific frequencies from a signal (e.g., the signal provided by the microprocessor in the resonant gas sensor systems described herein). For example, a resonant gas sensor can contain two conductive electrodes surrounding and/or electrically coupled to a dielectric or an electrically conductive gas sensing material, all of which form a single resonant structure (along with other components of the system, in some cases). In another example, a transducer (i.e., an antenna) can be excited with a signal, and the sensing material can be arranged adjacent to the transducer such that the complex impedance of the sensing material impacts a detected response. In some cases, the electrode(s) and/or the gas sensing material can contain the particulate carbon described herein. In some cases, the electrode(s) and/or the gas sensing material can be printed and/or be deposited from a liquid, gas or ink dispersion.

In some cases, the resonant structures described above can be incorporated into the resonant gas sensor circuit to form an LC tank circuit. For example, a coiled antenna can be used as an inductive element, and a sensing material between two electrodes can be used as a capacitive element, and the inductive and capacitive elements can be connected in parallel or in series to form a tank circuit in a resonant gas sensor. In some embodiments, a single transducer structure (e.g., a coiled antenna) can contain (or be formed from) the sensing material, and also provide the inductive and capacitive elements of the tank circuit. Such multi-functional transducers can be driven by a microprocessor, and upon interaction with an analyte the transducer material properties change, which change the characteristic response of the gas sensor circuit, which in turn can be measured by detection circuitry to detect the presence of an analyte. In other cases, the transducer does not contain sensing materials, and the sensing materials change the properties of one or more elements within the tank circuit (e.g., the capacitance of a capacitive element), which change the characteristic response of the circuit, which in turn can be measured by detection circuitry to detect the presence of an analyte.

When a gas sensitive material interacts with an analyte, the complex electrical materials properties of the permittivity $\varepsilon=\varepsilon'-j\varepsilon''$ (where j is the imaginary unit) and permeability $\mu=\rho'-j\mu''$ change. In a resonant gas sensor, the varying material properties can lead to a change in the wave propagation of a signal (e.g., a multi-frequency signal provided by a microprocessor) through a resonant structure (e.g., an LC tank circuit, an antenna, or a microstrip line). In addition to the materials properties, the wave propagation of a signal in a resonant gas sensor also depends on the geometry of the structures formed by the elements of the sensor. In some cases, the resonant structures in the resonant gas sensor contain one or more waveguides, and the wave propagation of a signal also depends on the design of the waveguide(s). Generally, electromagnetic waves are guided to a desired transmission mode by restricting their expansion in one or two dimensions. One transmission structure for waves with a transversal electromagnetic mode (TEM) is the planar microstrip line, consisting of a strip conductor and a ground plane either separated by a dielectric substrate or separated by a dielectric material on a single side of a substrate. The two-dimensional structure of microstrips make them well suited for miniaturization and integration with other components and, because of the planar structure, they can be fabricated conventionally by thick or thin film technology. In some cases, the circuit elements (e.g., resonant structures) are formed (e.g., by printing) on one side of a substrate to create a resonator (e.g., a microstrip line with co-planar electrodes separated by a dielectric gap), while in other embodiments, the elements are formed (e.g., by printing) on both sides of a substrate to create a resonator (e.g., a patch antenna separated from a ground plane electrode by a dielectric substrate containing a sensing material). The substrate can be many different materials including rigid or flexible materials, those with suitable dielectric properties, a polymer sheet, or paper. In some cases, a base layer can be pre-deposited on the substrate to act as an anchoring layer to absorb part of the deposited (e.g., printed) material and or to create a barrier to prevent absorption of the deposited material into the substrate (e.g., paper).

FIG. 16-25A shows a non-limiting example of a resonant gas sensor 16-2500A inside view and plan view, including a substrate 16-2510A, a transducer 16-2520A, a microprocessor 16-2530A, and a ground electrode 16-2540A, in accordance with some embodiments. A first terminal of the microprocessor 16-2530A is electrically coupled to a first terminal of the transducer 16-2520A, and the ground electrode 16-2540A completes the circuit from a second terminal of the transducer to a second terminal of the microprocessor 16-2530A. In this example, the ground electrode is connected to the second terminal of the transducer 16-2520A and to the second terminal of the microprocessor 16-2530A through vias in the substrate (not shown). The transducer 16-2520A in this example is a spiral with successive loops with different dimensions. The microprocessor 16-2530A provides AC signals at different frequencies to the first terminal of the transducer 16-2520A, and measures the response (either reflected from the transducer 16-2520A or transmitted through the transducer 16-2520A, in different embodiments). In this example, the transducer 16-2520A contains a sensing material (e.g., a redox mediator), which is sensitive to an analyte, such that when the resonant gas sensor 16-2500A is exposed to the analyte, the complex impedance of the transducer 16-2520A changes, and the response detected at the microprocessor 16-2530A changes indicating the detection of the analyte. In other words, the complex permittivity and/or permeability of the sensing material changes upon exposure to an analyte, which changes the resonant frequency of the sensor circuit indicating the detection of the analyte.

FIG. 16-25B shows an example of a response from a resonant gas sensor (e.g., 16-2500A in FIG. 16-25A) in the presence of an analyte of interest. The x-axis in the plot in FIG. 16-25B is frequency (from 1 MHz to 5000 MHz), and the y-axis is the reflected signal from the transducer (e.g., element 16-2520A in FIG. 16-25A) (i.e., S11, which is the signal reflected back from the first terminal of the transducer) in dB. The troughs in the plot in FIG. 16-25B indicate the resonant frequencies of the circuit, where the AC signals are not reflected (e.g., dissipated) in the resonant circuit. These troughs can change depending on the type and concentration of an analyte present, and in some cases can be compared to a library to determine the identity of a detected analyte species. Since the location of the troughs depends on the resonant frequencies of the entire gas sensor circuit, in some embodiments, a library of analyte species and concentrations is created for a specific resonant gas sensor design and materials set.

FIG. 16-25C shows a non-limiting example of a resonant gas sensor 16-2502C inside view and plan view, including a substrate 16-2510C, a transducer 16-2520C, a microprocessor 16-2530C, a ground electrode 16-2540C, and a sensing material 16-2550C, in accordance with some embodiments. The resonant gas sensor 16-2502C is similar to the resonant gas sensor 16-2500C, and further includes a separate sensing material 16-2550C disposed above and in between successive loops of the spiral transducer 16-2520C. In this example, the sensing material is sensitive to an analyte, such that when the resonant gas sensor 16-2502C is exposed to the analyte, the frequency response of the resonant circuit formed by the transducer 16-2520C and sensing material 16-2550C changes, and the response detected at the microprocessor 16-2530C changes indicating the detection of the analyte. The change in frequency response in this example can be caused by a change in the inductance of the transducer 16-2520C and/or a change in the capacitance between successive loops of the transducer 16-2520C, which change the resonant frequencies of a tank circuit formed by the transducer 16-2520C and sensing material 16-2550C. In other words, the complex permittivity and/or permeability of the sensing material changes upon exposure to an analyte, which changes the resonant frequency of the sensor tank circuit indicating the detection of the analyte.

FIG. 16-25D shows a non-limiting example of a resonant gas sensor 16-2504D in side view and plan view, including a substrate 16-2510D, a transducer 16-2520D, a microprocessor 16-2530D, a ground electrode 16-2540D, a second electrical connection 16-2542D, a sensing material 16-2550D, and a capacitive element 16-2560D, in accordance with some embodiments. The resonant gas sensor 16-2504D is similar to the resonant gas sensor 16-2500D, and further includes a capacitive element 16-2560D. The capacitive element 16-2560D in this example is formed from interdigitated electrodes 16-2562D and 16-2564D. In this example, the capacitive element 16-2560D has the sensing material 16-2550D disposed on and between the interdigitated fingers 16-2562D and 16-2564D. In this example, the capacitive element 16-2560D is wired in parallel with the transducer 16-2520D; the ground electrical connection 16-2540D is electrically coupled to electrode 16-2562D of the capacitive element 16-2560D, and the second electrical connection 16-2542D couples the electrode 16-2564D of the capacitive element 16-2560D to the first terminal of the transducer 16-2520D (as described in resonant gas sensor 16-2500A in FIG. 16-25A). Therefore, an LC tank circuit (with the inductive element and capacitive element in parallel) is formed from the transducer 16-2520D and the capacitive element 16-2560D in this example. In this example, the sensing material 16-2550D (e.g., a redox mediator) is sensitive to an analyte, such that when the resonant gas sensor 16-2504D is exposed to the analyte, the capacitance of the capacitive element 16-2560D changes, and the response detected at the microprocessor 16-2530D changes indicating the detection of the analyte. In other words, the complex permittivity and/or permeability of the sensing material changes upon exposure to an analyte, which changes capacitance of the capacitive element 16-2560D and the resonant frequency of the sensor tank circuit indicating the detection of the analyte. One advantage of separate inductive and capacitive elements (e.g., as shown in resonant gas sensor 16-2504D) is that the resonant frequency of the tank circuit can be tuned. One example of this is lowering the resonant frequency to a lower frequency range (e.g., from about 20 GHz to about 1 GHz) to reduce the cost of the electronics required to drive the sensor circuit.

FIG. 16-25E shows a non-limiting example of a resonant gas sensor containing a substrate 16-2510E, a transducer antenna 16-2520E, and a composite detecting film 16-2550E for sorption of an analyte (e.g., volatile organic solvent vapors), in accordance with some embodiments. The composite detecting film 16-2550E contains a structured particulate conducting phase encapsulated with a polymeric binder. Insets 16-2570E and 16-2580E show schematics of the particulate conducting phase 16-2572E encapsulated by the polymer binder 16-2574E. Inset 16-2580E shows a volatile gas (or more generally, an analyte) adsorbed by the polymer binder and/or the interior surfaces of the particulate carbon. In some embodiments, the polymer binder contains one or more reactive chemistry additives, which interact with an analyte and cause the electrical properties of the sensing material 16-2550E to change. In other embodiments, a reactive chemistry additive (e.g., a dissolved salt) can be deposited on and within the pores of the particulate carbon. In some cases, the reactive chemistry additives can be incorporated into the particulate carbon and the polymer binder to further improve the sensitivity of the sensing material. In some cases, the reactive chemistry additive can be added to the particulate carbon and the sensing material can contain the particulate carbon and no polymer binder. Inset 16-2590E shows schematics of graphene sheets 16-2592E and the porous 3-dimensional structure 16-2594E of the particulate carbon in the composite detecting film 16-2550E. Some non-limiting examples of the structured particulate conducting phase can contain 3-dimensionally structured microporous or mesoporous graphene-containing particles, or the particulate carbon described herein. Some non-limiting examples of polymeric binder include PEUT, PECH, PIB, and alkyl cellulose. Such structures are beneficial to detect analyte species and concentration in resonant gas sensors because they produce characteristic, reversible impedance responses that can be measured (or transduced) with a high frequency (resonant) antenna element.

FIG. 16-25F shows a non-limiting example of a resonant gas sensor 16-2506F inside view and plan view, including a substrate 16-2510F, a transducer 16-2522F, a microprocessor 16-2530F, a ground electrode 16-2540F, and a sensing material 16-2550F, in accordance with some embodiments. The resonant gas sensor 16-2506F contains similar elements to those in resonant gas sensor 16-2500F, however, the transducer 16-2522F in this example is a patch antenna in the shape of a circle, which is electrically coupled to a first terminal of the microprocessor, rather than a spiral antenna. The ground plane is formed from ground electrode 16-2540F on the opposite side of substrate 16-2510F, and is coupled to a second terminal of the microprocessor through a via in the substrate (not shown in the figure). The substrate 16-2510F in this example contains the sensing material. In this example, the sensing material 16-2550F (e.g., a redox mediator) is sensitive to an analyte, such that when the resonant gas sensor 16-2506F is exposed to the analyte, the frequency response of the resonant circuit formed form the transducer 16-2522F and the sensing material 16-2550F changes, and the response detected at the microprocessor 16-2530F changes indicating the detection of the analyte. Similar to the examples shown in FIGS. 16-25A, 16-25C and 16-25D, the response can either be reflected from the patch antenna transducer 16-2522F back to the first terminal of the microprocessor, or be transmitted through the patch antenna transducer 16-2522F and be detected at the second terminal of the microprocessor (connected to the ground electrode 16-2540F), in different embodiments.

The resonant gas sensors described in FIGS. 16-25A, 16-25C, 16-25D and 16-25F are non-limiting examples only, and many other variations exist. For example, the electrodes, transducers, capacitive elements and/or substrates can contain sensing material in any of the above examples. In such examples, the sensing material itself can be patterned to affect the resonant frequencies of the gas sensor circuit. Additional elements can also be added, for instance, to provide additional sensing materials that can affect the response from the circuits in the above examples. The electrodes, transducers, capacitive elements and/or substrates in any of the above examples can contain the particulate carbon described herein. The electrodes, transducers, capacitive elements and/or substrates can be formed in many different shapes as well. For example, the transducers can be rectangular spiral antennas (e.g., as shown in FIGS. 16-25A, 16-25C and 16-25D), square spiral antennas, ovular spiral antennas, or other types of spiral antennas. The patch antenna transducers can be circular (e.g., as shown in FIG. 16-25F), rectangular, square, ovular, or other patch-like shapes. Other transducer shapes are also possible, such as patterns that are resonant at particular frequency ranges. In some cases, more than one transducer can be driven by a single microprocessor, and multiple signals from the circuits containing the multiple transducers can also be detected by a single microprocessor. The circuits can also contain waveguides (e.g., microstrip lines) instead of simple electrical connections (e.g., as shown in FIGS. 16-25A, 16-25C, 16-25D and 16-25F) to conduct the AC signals between elements in the gas sensor circuits. The geometry of the waveguides can be designed such that there is low loss of the AC signals between elements in the circuits. The capacitive elements can also be different types than that shown in FIG. 16-25D. For example, a 3-dimensional capacitor can be formed with structured electrodes surrounding a sensing material, to further increase the surface area of the capacitor and further improve the capacitance change upon exposure to an analyte. The circuits also can be electrically coupled by direct connections (e.g., as shown in FIGS. 16-25A, 16-25C, 16-25D and 16-25F), or can be coupled through a dielectric material (since the AC fields can extend outside of a waveguide or other resonant structure.

In some embodiments, the transducers used in the gas sensors described herein are one or more of the antennas or transducers described in U.S. application Ser. No. 15/944,482, entitled "Microwave Chemical Processing," which is assigned to the same assignee as the present application, and is incorporated herein by reference as if fully set forth herein for all purposes.

FIGS. 16-26A-16-26C show a time evolution of example spectra produced when an analyte was detected by a resonant gas sensor similar to that shown in FIG. 16-25D, but the system in this example used a separate virtual network analyzer rather than an integrated microprocessor. The resonant gas sensor in this example contained a substrate that was paper with a silica layer deposited on the surface, and a printed spiral transducer and capacitive element connected in parallel. The capacitive element contained a sensing material with the particulate carbon described herein and a reactive chemistry additive containing PEUT. The analyte in this example is isopropyl alcohol mixed with acetone and water. FIGS. 16-26A, 16-26B and 16-26C show the reflected signal (i.e., S11) from the circuit after about 1-2 seconds, about 15 seconds and about 30 seconds, respectively. In the absence of any analyte the signal is a flat line with no features at 0 dB. FIG. 16-26A shows some evidence that an analyte is present after only about 1-2 seconds. Therefore, the design and materials of the resonant gas sensor in this example enable a fast detection of an analyte. FIG. 16-26C shows multiple peaks representative of the analyte detected, and illustrates the capability of this type of resonant gas sensor to identify a species of analyte (e.g., by comparing a detected spectrum with those in a stored library).

The AC signals used by the resonant gas sensors described above contain a set of frequencies (e.g., in a range from 1 MHz to 20 GHz), and the method by which the signal is applied can vary. For example, a single frequency sweep can be performed continuously, or periodically at various intervals (e.g., once every 1 second, 10 seconds, 1 minute, 10 minutes, or once an hour). In some cases, different sweeps with different resolutions (i.e., frequency spacing between the different frequencies within a range) can be performed at different intervals.

In one non-limiting example, a first course sweep is performed followed by targeted sweeps. Other similar methods for supplying different frequencies to a resonant gas sensor are also possible in different embodiments. In this example, a first fast/coarse sweep of the frequency range is performed by the microprocessor, and a peak is detected. After the first coarse sweep, the microprocessor can drive the resonant sensor to the peak and dither around it to more accurately ascertain the peak frequency and relative intensity values. Ascertained peak values can be compared to a library of possible analytes, and in some cases, if the library indicates a possible match, the microprocessor can be used to sweep to a second peak in the spectrum of a possible analyte to obtain a second indicator as a check to reduce the number of false positives. The peak values (and/or other features of measured spectra) are compared to a library of possible analytes using an integrated microprocessor (e.g., as shown in FIG. 16-25A, 16-25C, 16-25D or 16-25F), or communicating with a remote processor and/or database. Such a method containing a first course scan followed by targeted subsequent dither scans can be beneficial to provide high detection accuracy with lower power requirements than performing a fine scan over a large set of potential analyte resonant frequencies. To further save power, such a method can be performed periodically (e.g., once every 1 second, 10 seconds, 1 minute, 10 minutes, or once an hour). In some embodiments, the system requirements can be relaxed to further save cost and power by targeting a +20% accuracy level for the concentration of a measured analyte. Although such a system may not provide highly accurate concentrations, it can have low power requirements (e.g., less than 1 nW, or less than 1 pW) and have a low production cost (e.g., less than 1 US dollar per unit, or less than 5 US dollars per unit, depending on the complexity of the system and the number of analytes capable of being detected), and therefore still be useful in many applications where indication and detection of an analyte are needed and an accurate concentration measurement is not required (e.g., to detect the presence of an explosive inside of a mailed package, or detecting the occurrence of food spoilage in a packaged food product).

Chemiluminescence Sensors

Other embodiments include chemiluminescent sensors as shown in FIG. 16-27. The sensor 16-2700 includes a chemiluminescent composite material 16-2710 printed on a substrate 16-2750. The material 16-2710 includes a luminescent dye material 16-2715 tethered to a graphene-based material 16-2718, where the dye material is chosen based on being a receptor for a certain target chemical molecule. In some embodiments, the graphene-based material 16-2718 is contained within the particulate carbon described herein. Detection of various functional groups of a target chemical is indicated by a wavelength shift in the absorption spectra of the dye. Due to electron transfer, there is a change in the structure and excitation energy of the dye. In other words, due to the presence of electron donating and withdrawing groups, the electronic state of the dye is changed, causing the change in color and wavelength. Some non-limiting example compounds for luminescent dyes include, for example, Ru(Bpy)3, or analogues of it; or Au, Cu or Ag pyrazolytes. For example, peroxidase or chemical vapors in contact with metallo-organic luminescent material can coordinate, resulting in a wavelength shift which can be visually observed. In some cases, the dye-sensitized graphene sheets, such as graphene oxide, are carboxyl-group functionalized. Due to the high surface area and beneficial structure of the particulate carbon described herein, the composite material provides a structure that results in higher sensitivity than conventional chemiluminescent sensors.

Sensor Systems

FIG. 16-28 shows a non-limiting example embodiment of a sensor system 16-2801 in which multiple individual gas sensors are used for detecting one or more chemical compounds (i.e., various analytes). Sensor system 16-2801 includes a first sensor 16-2800*a* for detecting a first target chemical, and a second sensor 16-2800*b* for detecting a second target chemical. In this embodiment, both first sensor 16-2800*a* and second sensor 16-2800*b* are electrochemical sensors, but other types of sensors, described herein, can also be used. For example, the gas sensors of the sensor system may be electrochemical, high frequency, resonant, chemiluminescent, or a combination of these. In some cases, first sensor 16-2800*a* and second sensor 16-2800*b* are printed on the same substrate 16-2850, such as a label. Each sensor 16-2800*a/b* can include a first electrode 16-2810*a/b*, a second electrode 16-2811*a/b*, and an electrolyte 16-2820*a/b*, where the components include particulate carbon and redox mediators as described in relation to FIG. 16-21. Although two sensors 16-2800*a* and 16-2800*b* are shown in this example, more than two sensors can also be included. In some embodiments, an array of sensors can be used to add functionality, such as the ability to detect multiple gases, subtract a background level of moisture and/or improve the sensitivity to an analyte. Furthermore, other non-printed sensors, such as IR sensors, can be included. As one example, an IR sensor can be included to detect NO2 groups.

An indicator 16-2860 is coupled to sensors 16-2800*a* and 16-2800*b* through electrical circuitry (not shown), where both sensors 16-2800*a* and 16-2800*b* must positively sense detection of their target chemical in order for the indicator 16-2860 to be activated. The combination of all the individual target substances being present indicates that a certain compound is present. Types of indicators 16-2860 that may be used include an optical indicator (e.g., a light emitting diode), an acoustic output, or a visual display such as a text or graphic read-out. In other embodiments, the indicator 16-2860 may be part of the sensor devices, such as if the individual sensors themselves can provide a positive indication of detection through a color change of the sensing material, or other indicator mechanism. The sensor system 16-2801 represents embodiments in which the presence of multiple sensors in one device are utilized to detect a combination of chemicals, in order to characterize an overall compound. The presence of multiple sensors can also help rule out false positives.

In the sensor systems for detecting a chemical compound in some embodiments, the sensor systems include a first sensor configured to detect a first target chemical, a second sensor configured to detect a second target chemical that is different from the first target chemical, and a substrate on which the first sensor and the second sensor are printed. An indicator indicates when both the first sensor positively detects the first target chemical and the second sensor positively detects the second target chemical.

Additionally, other components can be integrated with the gas sensors to add functionality to a gas sensors system. Some non-limiting examples of electro-active labels containing the present gas sensors, that also contain a display-based human/machine interface are devices that can display telemetry, Q-codes or bar codes, and/or icons. Example scenarios include telemetry, where information can be updated, and/or have an image such as a gage; a Q-code (QR code) or bar code, using digital data or number/text formats; and icons for packages where a color or image change is displayed. In these various scenarios, a change in the display, such as in the symbol or color, or a back-and-forth change, can be used to indicate the condition of the product. These display telemetry devices are a new approach to providing information about the contents of a package status, using a microprocessor-based machine and user detection of the conditions within a package. The present devices can also optionally include low power communications components (e.g., to communicate directly with other electronic devices).

In a non-limiting example, a cardboard shipping box was equipped with an electrochemical sensor similar to that shown in FIG. 16-23, a resonant sensor similar to that shown in FIG. 16-25D, integrated microprocessors to drive the sensors and detect signals from the sensors, a display to communicate visual information (e.g., a species of analyte detected) and a wireless communication chip (i.e., a Wi-Fi chip) to communicate information to other devices. The electronics were powered by an integrated battery. The sensing material in the electrochemical sensor and the resonant sensor in this example were both printed, and both contained the particulate carbon described herein. The beneficial properties of the particulate carbon coupled with the sensor designs enabled them to utilize low power (e.g., with currents from 0.1 microamps to 5 microamps) to detect analyte species. This example illustrates that gas sensors utilizing the particulate carbon described herein can be produced using low cost low power driver/detection electronics that can be integrated into a small package. Furthermore, this example showed that such low cost printed gas sensors can also be integrated with other system components such as displays and communication chips.

Printing of Chemical Sensors

In some embodiments, gas sensor components (e.g., electrodes and sensing materials) are printed from carbon-based inks (e.g., containing the particulate carbons describe herein). The electrical components of the present gas sensors can be printed on backing materials such as labels, and integrated with other hardware components on a substrate. More than one sensor can be printed on the same substrate, such as multiple sensors of the same type, or different types of sensors (e.g., electrochemical, high frequency, chemiluminescent). Types of substrates-which also may be referred to as backing materials-include rigid or flexible substrates, card stock, labels, or other types of materials used for printing.

In some embodiments, printed gas sensor components containing the particulate carbon described herein are further processed after printing to increase the conductivity of the printed components. For example, particulate carbon containing electrodes, transducers, and/or capacitive elements of the resonant gas sensors described herein can be further processed after initial printing to increase the conductivity of these printed components. In some embodiments, the transducers described herein require high conductivities (e.g., greater than 3500 S/m, or greater than 5000 S/m, or greater than 10000 S/m, in different embodiments) in order to perform as effective transducers, and in some cases these conductivities cannot be reached using printed particulate carbon without further processing. Some non-limiting examples of processes to improve the conductivity of printed particulate carbon materials are sintering and/or calendaring. For example, sintering can be performed using a plasma, laser or microwave energy. In some cases, the sintering process can locally heat the printed material and not substantially affect the substrate and/or other underlying materials. In other embodiments, calendaring is performed to increase the conductivity of the printed carbon materials. For example, calendaring using a heated roller, or a roller equipped with an energy source (e.g., microwave energy) to sinter and calendar simultaneously can increase the conductivity of the printed particulate carbon.

In other embodiments, high conductivity printed gas sensor components can be formed by printing a mixture of the present particulate carbon with other conductive particles added to increase the conductivity of the printed components. For example, the electrodes, transducers, and/or capacitive elements of the resonant gas sensors described herein can be formed using such mixtures. Some non-limiting examples of conductive particles that can be mixed with the particulate carbon described herein are Ag, Sn and/or Sb particles. Printed components for gas sensors containing the particulate carbon and additional conductive particles can be advantageous in some embodiments because the particulate carbon provides beneficial structure to the printed components (e.g., high surface areas), and the conductive particles improve the conductivity of the printed components.

The devices can be designed to operate in low power ranges, such as 0 to 1 volts, or less than 100 pW, or less than 1 pW. In some cases, the low power consumption is made possible by the high conductivity, the high surface area and mesoporous structure of the carbon-based materials used in printing the components, the small size of the devices, the choice of detection methodologies, and optionally the choice of display technologies. The overall device architecture may also use low power technology for the various system components (e.g., gas sensor and indicator).

In some embodiments, the printed components are made from carbon-based inks and can be electrically coupled to each other and/or to one or more additional hardware components, which can be mounted on the substrate. The hardware components can be, for example, one or more of an output display, microcontroller units (MCU), switches, and capacitors, among others. The hardware components use information stored in, generated by, and/or communicated from the printed components, such as by processing or displaying data from the printed components. The present devices can also optionally include low power printed communications components.

In addition to the particulate carbon described herein, types of carbon materials for the various embodiments of printed components can include, but are not limited to, graphene, graphenes (graphene-based materials), graphene oxide, reduced graphene oxide, graphite oxide, graphite intercalation compounds, graphite, graphane, carbon nano-onions, diamond, p-type diamond, n-type diamond, glassy carbon, amorphous carbon, activated carbon, carbon black and/or carbon nano-tubes, sulfur-based carbons (e.g., sulfur melt diffused carbon), and carbons with metal (e.g., nickel-infused carbon, carbon with silver nanoparticles, graphene with metal). The printed components can be printed by, for example, screen printing or ink-jet printing.

Reference has been made to embodiments of the disclosed invention. Each example has been provided by way of explanation of the present technology, not as a limitation of the present technology. In fact, while the specification has been described in detail with respect to specific embodiments of the invention, it will be appreciated that those skilled in the art, upon attaining an understanding of the foregoing, may readily conceive of alterations to, variations of, and equivalents to these embodiments. For instance, features illustrated or described as part of one embodiment may be used with another embodiment to yield a still further embodiment. Thus, it is intended that the present subject matter covers all such modifications and variations within the scope of the appended claims and their equivalents. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only, and is not intended to limit the invention.

The present application is related to U.S. Patent Application Ser. No. 62/613,716, filed on Jan. 4, 2018 and entitled "Resonant Gas Sensor"; U.S. patent application Ser. No. 16/239,423, filed on Jan. 3, 2019 and entitled "Resonant Gas Sensor"; U.S. patent application Ser. No. 16/706,542, filed on Dec. 6, 2019 and entitled "Resonant Gas Sensor"; U.S. Patent Application Ser. No. 62/790,932, filed on Jan. 10, 2019 and entitled "Systems for Multi-Part Nontoxic Printed Batteries"; U.S. Patent Application Ser. No. 62/894,621 filed on Aug. 30, 2019 and entitled "Systems for Multi-Part Nontoxic Printed Batteries"; U.S. Patent Application Ser. No. 62/926,225, filed on Oct. 25, 2019 and entitled "3D Hierarchical Mesoporous Carbon-Based Particles Integrated into a Continuous Electrode Film Layer"; U.S. Patent Application Ser. No. 62/942,103, filed on Nov. 30, 2019 and entitled "3D Hierarchical Mesoporous Carbon-Based Particles Integrated into a Continuous Electrode Film Layer", all of which are hereby incorporated by reference in their respective entireties for all purposes.

The following description is directed to some example implementations for the purposes of describing innovative aspects of this disclosure. However, a person having ordinary skill in the art will readily recognize that the teachings herein can be applied in a multitude of different ways. Aspects of the subject matter disclosed herein can be implemented in any type of sensor or biosensor and can be used to detect the presence of a variety of different target analytes. As such, the disclosed implementations are not to be limited by the examples provided herein, but rather encompass all implementations contemplated by the attached claims. Additionally, well-known elements of the disclosure will not be described in detail or will be omitted so as not to obscure the relevant details of the disclosure.

As discussed, biological field-effect transistors (BioFETs) are a type of biosensor that includes a transistor for electrically sensing biomolecules or bio-entities. BioFETs detect changes in the surface potential of electrically conductive materials induced when specific target molecules (such as analytes) bind to certain biological recognition elements associated with the BioFET. Different biological recognition elements may exhibit a heightened response to different types of analytes, and therefore can be very selective in which analytes are detected. Conventional BioFETs may employ a two-dimensional (2D) graphene layer that may be functionalized to detect certain analytes. The 2D graphene layer may provide exposed surfaces suitable for providing biological receptors capable of binding with a target analyte, and may therefore form at least a part of the biological recognition element. Specifically, when a target analyte binds with the biological recognition element, chemical reactions between the target analyte and the biological recognition element can cause changes in one or more electrical properties or characteristics of the graphene layer. Changes in one or more electrical properties or characteristics of the graphene layer induced by the binding of the target analyte can cause changes in current flow and/or changes in the voltage differential between the source and drain terminals of the BioFET. The changes in current and/or voltage can be measured and used to indicate the presence (or absence) of analytes in the surrounding environment.

The liquid gate or back-gate voltage (e.g., as controlled by a gate electrode submerged in the electrolyte solution) may electrostatically control a charge carrier concentration in the channel between the source and drain of the transistor. As a result, the BioFET may be uniquely optimized by tuning the gate voltage for a given end-use application (e.g., to detect certain analytes and/or analyte concentration levels).

BioFETs can be integrated into digital microfluidic devices for Lab-on-a-Chip (LOC) applications. For example, a microfluidic device can control sample droplet transport while also enabling detection of bio-molecules, signal processing, and data transmission, using an all-in-one chip. BioFETs also may not require a labeling step and may use a specific molecular configuration (e.g., antibody, ssDNA) on the sensor surface to provide a desired selectivity. Some BioFETs display unique electronic and optical properties. Further, BioFETs may be prepared to be glucose-sensitive based on the modification of exposed surfaces of the conductive materials and/or the gate electrode with, for example, silicon oxide ($SiO_2$) nanoparticles and the enzyme glucose oxidase. These BioFETs may show enhanced analyte sensitivity and an extended lifetime compared to devices without $SiO_2$ nanoparticles.

Conventional BioFETs may not be able to selectively detect the presence or concentration levels of analytes in certain complex mixtures, such as serum or other bodily fluids. This may be due to the prevalence of relatively high levels of salt concentration in these complex mixtures, which can interfere with the analyte detection abilities of BioFETs. For accurate point-of-care (POC) diagnosis, a simple, yet selective detection of biomarkers at clinically relevant salt concentrations is critical to enable earlier diagnosis (e.g., at the site of an incident), which allows clinicians to make prompt triage and treatment decisions. Conventional BioFETs may exhibit adverse ionic screening effects at physiologically relevant conditions (e.g., 100-200 millimolar (mM) ionic concentration levels), which in turn can decrease their ability to accurately detect the presence and concentration levels of analytes.

In addition, the sensitivity of BioFETs to analytes may be limited due to a phenomenon known as Debye shielding in which electric fields are dampened by the presence of mobile charge carriers. Outside of a particular distance, known as the Debye length, the electrical influence of a charged molecule may be screened due to the movement of ions in the electrolyte solution. High concentration levels of salt, typically associated with accidents and emergency wound sites, may exacerbate this screening effect. In some instances, the Debye length may be less than 1 nm in biological solutions, such as serum and plasma. Increasing the Debye length by performing measurements in a low ionic strength solution or designing biosensors to detect only molecules larger than the Debye length may be able to mitigate the Debye shielding. Due to challenges associated with Debye shielding, many existing BioFETs operate only in relatively low ionic strength solutions or require a desalination process to reduce the ionic strength of the electrolyte solution. Mitigation of the ionic screening effect can be important for POC applications where analysis needs to be performed at or near the site of patient care with limited sample preparation (e.g., desalination) capability.

Aspects of the present disclosure recognize that using novel electrically conductive and bio-sensitive materials as a conductive channel in a BioFET may significantly improve performance of the BioFET. For example, one such novel electrically conductive and bio-sensitive material is graphene, which is a single-atom thick, 2D carbon-carbon bonded lattice that has unique mechanical and electrical properties. The relatively high mobility of charge carriers in graphene is useful in a range of electronic applications, including BioFETs. Graphene has been studied as a sensor material for many years, and its inherent, natural two-dimensional (2D) nature ensures that every atom is in contact with the surrounding environment, thereby improving sensitivity when compared to other, less structurally organized sensing materials.

In addition, graphene can be functionalized via a variety of techniques, and the binding of a particular analyte to exposed surfaces of graphene can change the electrical and/or conductivity properties of the graphene, thereby enabling detection of the analyte by measuring changes in the electrical conductivity (or changes in the electrical impedance) of graphene. In this way, BioFETs that use graphene as a sensing material may rely on selective adsorption of analytes that induces changes in the electrical conductance of the graphene. However, 2D graphene based BioFETs present limited sensitivity at high salt concentrations (such as in physiological solutions). Shielding of molecular charge by counter ions in solution may reduce BioFET sensitivity and thereby may limit practical applications of this technology, e.g., medical diagnostic applications.

To address various limitations of 2D graphene based BioFETs, implementations of the subject matter disclosed herein include three-dimensional (3D) graphenated materials such as a convoluted 3D graphene layer derived from a carbon-based ink as sensing materials for BioFETs. The 3D nature of the carbon provides a curvature and/or bending at the molecular scale at angles and/or orientations that can modulate the Debye length, thereby reducing the undesirable screening effect encountered at high salt concentration levels as described earlier. The 3D graphene layer may be deposited on an insulating layer (such as silicon dioxide) of the BioFET. The 3D graphene layer may be positioned within a well region containing an electrolyte solution that may receive an analyte (e.g., 2,4,6-Trinitrotoluene, "TNT"), and thereby potentially contact the analyte. Further, the 3D graphene layer may provide exposed surfaces that can be biofunctionalized with one or more molecular recognition elements that selectively bind with the analyte. The 3D graphene layers disclosed herein may provide an improved exposed surface area per unit volume, which results in improved binding of the molecular recognition elements with the analyte. For these reasons, the BioFETs disclosed herein may overcome challenges associated with detecting minute analyte levels in high salt concentration environments with relatively high selectivity.

FIG. 17-1 shows a diagram depicting an example biosensor field-effect transistor (BioFET) 17-100, according to some implementations. The BioFET may include a body 17-102, a well region 17-140 defined by the body 17-102, an electrolyte solution 17-104 contained in the well region 17-140, a source region 17-106, a drain region 17-108, a back gate 17-120, an insulating layer 17-110, a graphene layer 17-130, molecular recognition elements 17-144, an analyte 17-160, and a gate electrode 17-150. The configuration of the BioFET 17-100 may be changed to include additional, or fewer, components to facilitate sensitive and/or selective detection of the analyte 17-160. In some implementations, the BioFET 17-100 may detect a specific analyte at physiologically relevant conditions without experiencing adverse ionic screening effects other BioFETs. In some aspects, the BioFET 17-100 may detect a 2,4,6-trinitrotoluene "TNT" at 100-200 millimolar (mM) ionic concentration levels without experiencing adverse ionic screening effects other BioFETs. In other aspects, the BioFET 17-100 may detect other types of chemical, biological, or biochemical substances at 100-200 mM ionic concentration levels without experiencing adverse ionic screening effects other BioFETs.

The insulating layer 17-110 may be disposed on the back gate 17-120, which may include a semiconductor and/or a semiconducting material (e.g., silicon or polysilicon), either of which may alter in conductance and/or conductivity based on binding of the molecular recognition elements 17-144 with the analyte 17-160. In some aspects, the insulating layer 17-110 may be an oxide layer that electrically separates the graphene layer 17-130 from the back gate 17-120. In this way, the insulating layer 17-110 may separate the electrolyte solution 17-104 from the back gate 17-120, and thereby separate the analyte 17-160 contained in the well region 17-140 from the back gate 17-120. The source region 17-106 and the drain region 17-108 (e.g., which may be positioned opposite to the source region 17-106 as shown in FIG. 17-1) may be either directly or indirectly disposed on the insulating layer 17-110. The well region 17-140 may be positioned between the source region 17-106 and the drain region 17-108 and on the insulating layer 17-110, and may contain the electrolyte solution 17-104. The electrolyte solution 17-104 may be any suitable electrolyte solution used in BioFETs and/or the like.

In some implementations, the BioFET 17-100 may be fabricated on a substrate such as the back gate 17-120, which may have a thickness between approximately 0.1 mm and 1 mm. The back gate 17-120 may include and/or be composed of silicon, doped silicon, gallium arsenide, or a conducting polymer. The insulating layer 17-110 disposed on the back gate 17-120 may be 10 nm to 1000 nm thick, and may be composed of silicon dioxide ($SiO_2$). In the alternative, the insulating layer 17-110 may be composed of silicon oxide, hafnium oxide, aluminum oxide, titanium dioxide, or an insulating polymer.

In contrast to conventional BioFETs that include a 2D graphene layer, the BioFET 17-100 of FIG. 17-1 includes a 3D graphene layer 17-130 disposed on the insulating layer 17-110. As discussed, the graphene layer 17-130 may be composed of convoluted 3D graphene derived from carbon-based inks. In some aspects, a chemically inert passivation layer 17-114 including a first portion 17-1141 and a second portion 17-1142 may be partially disposed on the graphene layer 17-130, the source region 17-106 and/or the drain region 17-108. The passivation layer 17-114 may operate with the gate electrode 17-150 to control and/or regulate electric current flow through the graphene layer 17-130. The first portion 17-1141 and/or the second portion 17-1142 of the passivation layer 17-114 may regulate and/or prevent exposure of the drain region 17-108 and the source region 17-106, respectively, to an external environment that can include one or more analytes 17-160. A window (not shown in FIG. 17-1 for simplicity) may be positioned between the source region 17-106 and the drain region 17-108. Removal of the window from the BioFET 17-100 may expose the analyte 17-160 to the electrolyte solution 17-104. The analyte 17-160 present in the surrounding environment may diffuse throughout the electrolyte solution 17-104 and bind with the molecular recognition elements 17-144 provided by and/or associated with the graphene layer 17-130.

The source region 17-106 may be at least partially covered by the second portion 17-1142 of the passivation layer 17-114, and the drain region 17-108 may be at least partially covered by the first portion 17-1141 of the passivation layer 17-114, as shown in FIG. 17-1. In this way, the passivation layer 17-114 may isolate the source region 17-106 and/or the drain region 17-108 from the analyte 17-160 contained in the electrolyte solution 17-104. In the alternative, the electrolyte solution 17-104 may be physically isolated from the source region 17-106 and/or the drain region 17-108 using a polymer well region (e.g., the body 17-102 of the BioFET of FIG. 17-1). Further, the gate electrode 17-150 may be positioned in the electrolyte solution 17-104 to regulate the voltage and/or the current of the BioFET 17-100. In some implementations, the 3D graphene layer 17-130 may be covered by a permeable polymer layer (not shown in FIG. 17-1 for simplicity), such polyethylene glycol (PEG), to stabilize bound receptor molecules and prevent non-selective binding of the analyte to the graphene surface.

In one implementation, the 3D graphene layer 17-130 may form an electrically-conductive channel and contact the source region 17-106 and/or the drain region 17-108, as shown in FIG. 17-1. The 3D graphene layer 17-130 may include exposed carbon surfaces that can be biofunctionalized (e.g., modified with a material to have a particular biological function and/or stimulus, whether permanent or temporary, while at the same time being biologically compatible) with the molecular recognition elements 17-144. In several particular examples, the molecular recognition elements 17-144 may include receptors, biological receptors ("bioreceptors,") biological materials, biochemical materials and/or probe molecules, any of which may selectively bind with the analyte 17-160, and thereby correspond with detection of particular variants of the analyte 17-160. In some aspects, the selectively binding may be associated with how a particular ligand may prefer binding with one receptor more than with another receptor. Specifically, binding of the analyte 17-160 to the molecular recognition elements 17-144 and/or convoluted 3D graphene in the graphene layer 17-130 may produce a change in the electric conduction properties of the convoluted 3D graphene. In some aspects, the change in the electric conduction properties may be proportional to and/or based on the molecular mass and/or length of the bioreceptors. In one implementation, bioreceptors may be less than 15 kiloDaltons (kDa) in molecular mass and/or less than 10 nanometers (nm) in length.

In some implementations, biofunctionalization of the bioreceptors (e.g., one type of the molecular recognition elements 17-144) may include reductive covalent functionalization, application and/or usage of non-covalent chemistry using pyrenes, and/or include direct stacking of molecules (e.g., biomolecules) on exposed surfaces of the graphene layer 17-130. The reductive covalent functionalization and/or the usage of the non-covalent chemistry may use pyrenes to yield carboxylic acids on exposed surfaces of the molecular recognition elements 17-144 and/or the graphene layer 17-130. Further, the carboxylic acids may chemically react with amines provided by bioreceptors on exposed surfaces of the molecular recognition elements 17-144 and/or the graphene layer 17-130 by using 1-ethyl-3-(3-dimethylaminopropyl)carbodiimide hydrochloride (EDC) and/or N-hydroxysulfosuccinimide (sulfo-NHS). In some particular examples, the carboxylic acids may include peptide and/or amino acid sequences, such as peptide or amino acid sequences including: "His-Ser-Ser-Tyr-Trp-Tyr-Ala-Phe-Asn-Asn-Lys-Thr-Gly-Gly-Gly-Gly-Trp-Phe-Val-Ile," and "Trp-His-Trp-Gln-Arg-Pro-Leu-Met-Pro-Val-Ser-Ile." In addition, or the alternative, the graphene layer 17-130 may be covalently functionalized with diazonium salts and/or detect mercury (Hg) by including bioreceptor molecules (e.g., as a part of the molecular recognition elements 17-144) functionalized with an amino acid sequence having a formula as follows: "Thr-Thr-Cys-Thr-Thr-Thr-Cys-Thr-Thr-Cys-Cys-Cys-Cys-Thr-Thr-Gly-Thr-Thr-Thr-Gly-Thr-Cys."

In this way, certain bioreceptors may selectively bind with a particular analyte (e.g., TNT), and thereby produce a corresponding change in an electrostatic potential of the insulating layer 17-110 and/or the back gate 17-120. In one implementation, changes in the electrostatic surface potential of the back gate 17-120 may be associated with a change in an electric current measured between the source region 17-106 and the drain region 17-108 at a particular bias and/or gate voltage ($V_{GS}$) applied by the gate electrode 17-150. As a result, changes in the electric current may indicate the presence of the analyte 17-160 in the electrolyte solution 17-104 within the well region 17-140 during operation of the BioFET 17-100. For example, in operation, the gate electrode 17-150 may submerge into the electrolyte solution 17-104 and toggle between activated and deactivated states, for example, such that the gate electrode 17-150 applies the gate voltage to the channel region of the BioFET 17-100 only during activated state. In this way, the gate electrode 17-150 may regulate conductance through the graphene layer 17-130 and/or render the BioFET 17-100 as a transconductance-type device.

In some implementations, a method of performing a sensing measurement with the BioFET 17-100 of FIG. 17-1 may include introducing a liquid sample (e.g., the electrolyte solution 17-104) to the graphene layer 17-130 after biofunctionalization of the graphene layer 17-130 and/or molecular recognition elements 17-144 and prior to hybridization of the biofunctionalized graphene layer 17-130 with the analyte 17-160. The length of time necessary for the hybridization may depend on the individual bimolecular interaction of interest and may be up to 1 hour (hr). During electrical sensing measurements performed by the BioFET 17-100, the source bias may be held at a constant 0.1 V and the gate voltage may be slowly transitioned from −1V to +1V. In some instances, a smaller gate voltage range may be used depending on the individual sensor variability. Electric current may be measured simultaneously to determine minimum current of the graphene layer 17-130, where such a determination is used to determine the Dirac voltage and compared with the pristine sensor to assess analyte concentration levels of the analyte 17-160.

In some implementations, the hybridization of a charged molecule (such as the analyte 17-160) with the graphene layer 17-130 may induce changes in various electrical properties of the graphene layer 17-130. In one or more particular examples, a negatively charged molecule will shift the Dirac voltage in the positive direction, while a positively charged molecule will shift the Dirac voltage in the negative direction. This occurs because the electrical influence of a hybridized molecule such as the analyte 17-160 may induce carrier density changes in the molecular recognition elements 17-144 and/or the graphene layer 17-130. The shift in Dirac voltage is directly proportional to the density of bound analytes, and therefore the concentration of the analyte in the liquid sample. In some aspects, the BioFET 17-100 may also be used for real-time measurements by holding both the source and gate bias constant. The binding of a positively charged analyte 17-160 will cause a decrease in current across the graphene layer 17-130 and/or the molecular recognition elements 17-144 if the gate bias is less than the Dirac voltage, and an increase in current if the gate bias is greater than the Dirac voltage. The opposite will occur for a negatively charged analyte. The shift in current is proportional to the concentration of the analyte in the liquid sample. The time dependent nature of such measurements may enable the quantification of the binding kinetics between the molecular recognition elements 17-144 and the analyte 17-160 of interest in the electrolyte solution 17-104.

FIG. 17-2 shows a top-down view of an array 17-200 including multiple BioFETs 17-202 of FIG. 17-1, according to some implementations. In various implementations, each BioFET 17-202 may be one implementation of the BioFET 17-100 of FIG. 17-1. In some aspects, the array 17-200 may include the BioFETs 17-202 organized into several linear arrangements 17-204 linear arrangements 17-204 that surround a passivation layer 17-206 and use a common gate voltage. Additional electrodes 17-208 may be provided to control electrical contacts and/or current flow associated with the array 17-200. Further, the array 17-200 may be reconfigured to accommodate any variety of sensing conditions and target analyte concentration levels. In one implementation, the BioFETs 17-202 may be electrically connected to a controller (not shown in FIG. 17-2 for simplicity).

The array 17-200 may include a substrate 17-210 similar to the back gate 17-120 of the BioFET 17-100 of FIG. 17-1. The substrate 17-210 may be silicon, and may have a size of approximate one square centimeter (1 $cm^2$). The linear arrangements 17-204 of BioFETs, the additional electrodes 17-208, and/or the passivation layer 17-206 may be deposited and/or otherwise disposed on the substrate 17-210. In one implementation, the additional electrodes 17-208 may be defined on the substrate 17-210 using photolithography. In addition, or the alternative, the additional electrodes 17-208 may include one or more gold (Au) source and/or drain regions coupled with a central platinum (Pt) liquid gate electrode. In one implementation, the array 17-200 may include forty-eight (48) BioFETs 17-202, where each BioFET 17-202 may include channels similar to the graphene layer 17-130 of the BioFET 17-100 of FIG. 17-1. For example, each BioFET 17-202 may include ten (10) channels (not shown in FIG. 17-2 for simplicity), where each channel may be approximately 10 micrometers (μm) in length and/or width. The array 17-200 may expose only the platinum gate electrode and/or the channels of each BioFET 17-202 to an analyte during operation. In some aspects, the array 17-200 may provide a high relatively high detection sensitivity (e.g., 100-200 millimolar (mM) ionic concentration levels) by operating multiple BioFETs 17-202 concurrently.

In addition, or the alternative, the substrate 17-210 may have a thickness in an approximate range from 0.1 to 1 mm. The substrate 17-210 may include silicon, doped silicon, gallium arsenide or a conducting polymer. In one implementation, an insulating layer (such as the insulating layer 17-110 of FIG. 17-1) may be disposed on the substrate 17-210. The insulating layer may be 10 to 1000 nanometers (nm) thick, and may include silicon dioxide, silicon oxide, hafnium oxide, aluminum oxide, titanium dioxide, and/or an insulating polymer. In addition, a total area of 3D graphene may be in an approximate range from may range from 1 to 81 $cm^2$. Further, 3D graphene may be patterned into an array, where various 3D graphene channels (not shown in FIG. 17-2 for simplicity) may vary in length from 10 μm to 1 cm, thereby resulting in a total channel area in an approximate range from 100 $\mu m^2$ to 1 $mm^2$.

Carrier mobility of the 3D graphene may range from 100 to 10,000 $cm^2/Vs$, with a sub-range range between 1,000 and 5,000 $cm^2/Vs$. The array 17-200 may maintain a particular voltage bias at a source region, and thereby accommodate voltage applied to the substrate 17-210 swept over a range. As a result, the array 17-200 may measure current values of multiple 3D graphene materials associated with the BioFETs 17-202, a phenomenon also referred to as "measuring the transfer characteristics" of the array 17-200. In one implementation, at a particular gate voltage, current values measured across various 3D graphene channels may be at a minimum, e.g., also known as a Dirac point. Each of the BioFETs 17-202 may have a corresponding Dirac point, which may be between 0 and 20 V, when measured under dry conditions, with no liquid sample covering the 3D graphene channels. In circumstances where a liquid sample (e.g., similar to the electrolyte solution 17-104 of FIG. 17-1) is present, the platinum liquid gate electrode may be used to apply a gate bias, yielding a Dirac point at one or more corresponding BioFETs 17-202 of between 0 and 1 V.

In some implementations, the array 17-200 may perform sensing measurement operations, which may include introducing liquid samples to various 3D graphene channels of the BioFETs 17-202. Hybridization of molecules with the 3D graphene channels may occur within up to 1 hour after initial exposure to the analyte. During electrical sensing measurements, the source bias may be held at a constant 0.1 V and a gate voltage applied through the platinum liquid gate electrode may be slowly transitioned from −1 to +1V. In some aspects, a smaller gate voltage range may be used depending on sensor variability of the BioFETs 17-202. The electric current conducted through 3D graphene channels may be measured across the BioFET 17-202 devices simultaneously and used to determine the Dirac voltage and compared with a pristine (e.g., unused) version of the array 17-200.

Hybridization of charged molecules with biofunctionalized 3D graphene in various BioFETs may, in some aspects, induce a change in electrical properties of respective 3D graphene channels. For example, negatively charged molecules may shift the Dirac voltage in the positive direction, while positively charged molecules may shift the Dirac voltage in the negative direction. This phenomena may occur as the electrical influence of hybridized molecules induces carrier density changes in respective 3D graphene channels. Shifts in the Dirac voltage may be directly proportional to the density of bound analytes and the concentration of the analyte in a given liquid sample. In one or more particular examples, shifts in the Dirac voltage for a 1 attoMolar (aM) solution of single stranded DNA may be up to 10 mV.

The array 17-200 may also be used for real-time analyte concentration level measurements by holding both source and gate bias constant. In this way, binding of a positively charged analyte may cause a decrease in electric current if a gate bias is less than the Dirac voltage, and an increase in current if the gate bias is greater than the Dirac voltage. In contrast, the opposite phenomena may occur for a negatively charged analyte. Observed shifts in electric current may be proportional to the concentration of the analyte in the liquid sample delivered to the array 17-200. In addition, the time dependent nature of such measurements correspondingly enables quantification and study of binding kinetics between biofunctionalized receptor molecules (e.g., associated with and/or provided by 3D graphene channels of the BioFETs 17-202) and an analyte of interest in the liquid sample.

In some implementations, one reference electrode (e.g., similar or identical to the gate electrode 17-150 of FIG. 17-1) may be used for all BioFETs 17-202 in the array 17-200 of FIG. 17-2. In this case, the BioFETs 17-202 and/or other components associated with the array 17-200 may be electrically connected to an appropriate controller to bias the source and/or drain regions of each BioFET 17-202 disposed on the array 17-200. In some implementations, the total area of the 3D graphene growth may range from 1 to 81 $cm^2$ and be patterned into the array 17-200, which may include dozens of BioFETs 17-202. The distance between the source and drain regions, and thus the 3D graphene channel length, in the array 17-200 may vary from 10 μm to 1 cm, thereby producing a total channel area in an approximate range between 100 $\mu m^2$ to 1 $mm^2$.

FIG. 17-3 shows a diagram depicting an operation 300 for manufacturing a BioFET, according to some implementations. At 17-302, a 3D graphene may be prepared by adding 1.0 milligrams (mg) of a microwave-synthesized graphene in 10 milliliters (mL) of N-Methyl-2-pyrrolidone (NMP). In some implementations, the dispersion may be distributions of monolithic 3D graphene over defined areas, such as used for the graphene layer 17-130 of the BioFET 17-100 of FIG. 17-1. The resulting solution may then be sonicated using, for example, a probe sonicator set at 30% amplitude (Sonics VCX 17-700) for 2 hours. Sonication may result in a relatively uniform dispersion of the 3D graphene, which may have an average particle size diameter per mean volume (MV) of 70 nm (e.g., as measured using a dynamic light scattering method). The resulting 3D graphene dispersion may then be centrifuged at 8000 rpm for 20 mins. Precipitates formed from centrifugation may be discarded, thereby leaving sheets of pristine (e.g., having an impurity content of less than 1 wt. %) 3D graphene in surrounding supernatant.

At 304, fabrication of BioFETs 100 may use p-type silicon wafers, each having a 300 mm thickness and/or <20 Ohm/cm resistance. In some implementations, the silicon wafers may be each cut into a 1 inch (in)×1 in dimension and cleaned using Radio Corporation of America (RCA) cleaning methods prior to completion of a thermal oxidation step. For example, 70 mL of deionized water, 15 mL of 27% ammonium hydroxide and 15 mL of 30% hydrogen peroxide may be added to form a solution and heated to 70° C. Diced silicon wafers may be submerged into the resulting solution for 30 minutes and later washed with an excess quantity of deionized water. In preparation for deposited of the insulating layer 17-110, the cleaned silicon wafer may be placed on a clean alumina device inside an oxidation furnace, where a dry oxidation operation may be performed at 1000° C. by flowing oxygen at 5 sccm.

Completion of the dry oxidation operation may result in deposition and/or formation of approximately 300 nm of thermal oxide (e.g., such as the insulating layer 17-110) on exposed surfaces the silicon wafer. The silicon wafer, having approximately 300 nm of thermal oxide deposited thereon, may now be referred to generically as a "substrate" while progressing through the various remaining operations outlined in blocks 17-302, 17-304, 17-306, 17-308, and 17-310 of the operation 17-300. The 3D graphene dispersion prepared in Step 1 may be then coated (at 17-304) onto the thermal oxide of the substrate by the following example process. Initially, a piranha solution (a 3:1 mixture of $H_2SO_4$ and $H_2O_2$) may be used to remove any organic residue on exposed surfaces of the substrate. The piranha solution may then be rinsed off of the substrate using deionized water, which may be dried by a nitrogen gas flow stream.

Next, the substrate may be submerged in a 2% concentration solution of aminopropyltriethoxysilane (APTES) for three hours. Submergence of the substrate in the 2% APTES solution may result in a deposition of a layer of APTES on the thermal oxide and/or the substrate, which may activate the thermal oxide. Next, the substrate may be washed to remove excess APTES physiosorbed on exposed surfaces of the thermal oxide and/or the substrate. Finally, the 3D graphene dispersion prepared in Step 1 may be spin coated at 3000 rpm for one (1) minute onto exposed surfaces of the thermal oxide activated with APTES. The 3D graphene produced thus far in the operation 17-300 may then be washed with an excess quantity of water and thermally annealed at 150° C. to remove any residual solvent materials, leaving behind a uniform layer of 3D graphene that can be used as the 3D graphene layer 17-130 within the BioFET 17-100 of FIG. 17-1.

At 17-306, the substrate, after being prepared and/or processed at 17-302 and 17-304, may be patterned. In one or more particular examples, the substrate may be patterned as a single BioFET (e.g., the BioFET 17-100 of FIG. 17-1) and/or as an array of multiple BioFETs (e.g., the array 17-200 of FIG. 17-2) using a photomask and/or a marker mask. In this way, the photomask and/or the marker mask may be used for aligning the substrate in further photolithographic processes to, for example, define features on the substrate and create the BioFET.

A positive photoresist may be spun coat over the 3D graphene dispersion coating on the thermal oxide at 4000 rpm for 50 seconds (s), then heated at 100° C. for one minute. The positive photoresist may include, for example, a photomask with the image of a graphene FET channel array with 40 or 48 devices and/or device regions. Each device image outlined by the photomask may have, for example, a channel length and/or width equal to 10 μm, and may be placed over the substrate (e.g., in hard contact with the substrate), prior to flooding the substrate (while covered with the photomask) with ultraviolet (UV) light. The resultant substrate may be then immersed in developer for one minute (min), such that 3D graphene channel regions covered by photoresist remain. The substrate may then be placed in a plasma etcher and exposed to oxygen plasma for one min at 100 W prior to being cleaned with acetone and/or isopropanol. As a result of these processes, 3D graphene dispersion may be removed from the substrate except in areas defined by the photomask, e.g., referred to as the graphene FET "channel areas."

At 17-308, the source and drain regions may be formed or defined using photolithography in a procedure similar to that described with reference to the graphene patterning at 17-306. In some aspects, the source and drain regions may be defined using chromium (Cr) and/or gold (Au) thin films, each with a thickness of approximately 30 nm and 100 nm, respectively. The chromium or gold films may be deposited onto the substrate (e.g., as shown by the source 17-106 and/or the drain 17-108 of FIG. 17-1) in a thermal evaporator at a rate of 0.1 nm/s. Afterwards, lift-off of excess metal may be achieved by immersion of the substrate in acetone for one hour (hr), followed by gentle rinsing with an excess quantity of water.

Procedures used to fabricate the source and drain regions including chromium and/or gold as outlined above may be repeated to fabricate a platinum (Pt) central liquid gate electrode that can be used as the gate electrode 17-150 of the BioFET 17-100 of FIG. 17-1. In this way, a final BioFET array (such as the array 17-200 of FIG. 17-2) may have an overall array size of 1 in ×1 in or 1 centimeter (cm)×1 cm with 48 BioFETs 100. In some implementations, the source and drain regions may be fabricated to be 100 nm thick and at positions 10 mm apart from each other. In some aspects, either a chromium, titanium, or nickel layer (e.g., with approximate thickness of 2-5 nm) may be deposited on the insulating layer 17-110 of FIG. 17-1 to improve adhesion with the gold layer deposited on the chromium layer. The gold layer provides low resistance ohmic contact with carbon materials contained in or associated with the graphene layer 17-130 of FIG. 17-1, while the chromium layer provides the required adhesion to exposed surfaces of the insulating layer 17-110. This combination of the adhesion layer with the gold layer may limit and/or minimize ohmic resistance encountered with the 3D graphene during operation of the BioFET 17-100 while maintaining good adhesion to the insulating layer 17-110. After liftoff of any residual metal-containing contaminants in contact with the source and drain regions, the substrate may be placed in 1-methyl-2-pyrrolidone (NMP) for four hours to remove residual photoresist from exposed 3D graphene surfaces.

At 17-310, 3D graphene materials deposited onto the thermal oxide layer of the substrate may be prepared via biofunctionalization of exposed surfaces of the 3D graphene, which can then bind to analytes selected for detection. For example, bioreceptors may be bound to exposed surfaces of the 3D graphene to facilitate a biological receptor-analyte interaction, resulting in the binding of bioreceptors with analyte, where such binding is associated with a change in electric current in the 3D graphene layer. Various graphene biofunctionalization methods may be used including, for example: (1) reductive covalent functionalization, (2) non-covalent chemistry using pyrenes, or (3) direct stacking of molecules on the graphene surface. Approaches (1) and/or (2) may yield carboxylic acids on exposed surfaces of the 3D graphene.

In some implementations, the carboxylic acids may chemically react with amines provided by the bioreceptors using 1-ethyl-3-(3-dimethylaminopropyl)carbodiimide hydrochloride (EDC) and N-hydroxysulfosuccinimide (sulfo-NHS). Compounds such as EDC and/or sulfo-NHS can be used to activate carboxylic groups for amine attachment to enhance crosslinking chemistry occurring within or between carboxylic groups, bioreceptors, 3D graphene and/or any combinations thereof. For example, several different peptide (e.g., amino acid) sequences may be selected as biological receptors such as the molecular recognition elements 17-144 of FIG. 17-1 based on electronic and fluorescence spectroscopy for use in TNT BioFET sensors. The amino acid sequences (e.g., the two different peptide sequences) may include: Anti-TNT Peptide Sequence (1): His-Ser-Ser-Tyr-Trp-Tyr-Ala-Phe-Asn-Asn-Lys-Thr-Gly-Gly-Gly-Gly-Trp-Phe-Val-Ile, and Anti-TNT Peptide Sequence (2): His-Ser-Ser-Tyr-Trp-Tyr-Ala-Phe-Asn-Asn-Lys-Thr-Gly-Gly-Gly-Gly-Trp-Phe-Val-Ile.

In some implementations, the BioFETs disclosed herein may be covalently biofunctionalized using diazonium salts synthesized from tetrafluoroboric acid. In this case, the substrate may be immersed in a solution of 4-carboxybenzene diazonium tetrafluoroborate at a concentration of 2.5 mg/mL for one hr at 40° C. to create sp3 hybridization sites terminating in carboxylic acid groups. The substrate may be then rinsed in acetone, methanol, and deionized water. Carboxylic acid groups on the 3D graphene of the substrate may be activated by immersion in a solution of 2 mg of 1-ethyl-3-(3-dimethylaminopropyl)carbodiimide (EDC) and 6 mg of N-hydroxysulfosuccinimide (NHS) in 5 mL of 50 mM 2-(N-Morpholino) ethanesulfonic acid for 1 hr, followed by a deionized (DI) water rinse. The BioFETs are then biofunctionalized by pipetting an aqueous solution of peptides at a concentration of 1 μg/mL and rinsing in DI water after 1 hr of pipetting. Residual active NHS groups are quenched with an immersion in 1 M ethanolamine for 15 minutes.

In one alternative, the BioFETs disclosed herein may be non-covalently functionalized using a pyrene derivative. For example, 1-pyrene carboxylic acid in methanol may be applied to exposed surfaces of the 3D graphene layer 17-130 to non-covalently attach molecules with terminating carboxyl groups to the 3D graphene layer 17-130. The EDC-NHS treatment may then be applied in the manner described above to activate these groups for functionalization with the desired receptor molecule (e.g., TNT).

In addition, or as a further alternative, other non-covalent functionalization techniques may be used to passivate the 3D graphene layer or channel 17-130 and add a polyethylene glycol (PEG) layer for stabilization and proper spacing of bioreceptor molecules. The substrate may be then immersed in a solution of 1 mM 1-pyrenebutryic acid and 0.25 mM mPEG-pyrene in ethanol for 1 hr. Afterwards, the substrate may be washed in ethanol and DI water, then the EDC-NHS treatment may be applied in the same manner as described above to active the carboxyl groups.

FIGS. 17-4A and 17-4B show scanning electron microscope (SEM) images 17-400A and 17-400B of an example 3D graphene according to some implementations, FIGS. 17-5A and 17-5B show transmission electron microscope (TEM) images 17-500A and 17-500B of an example 3D graphene according to some implementations, and FIGS. 17-6A and 17-6B show TEM images 17-600A and 17-600B of an example 3D graphene, according to other implementations. In some implementations, the images 17-400A, 17-400B, 17-500A, 17-500B, 17-600A, and 17-600B depict various aspects of convoluted 3D graphene (e.g., also referred to as "3D graphene sensing materials") that may be employed in the graphene layer 17-130 of the BioFET 17-100 of FIG. 17-1 and/or the BioFETs 17-202 of the array 17-200 of FIG. 17-2. In contrast to a 2D graphene material, the 3D graphene sensing materials disclosed herein may be constructed to have a convoluted 3D structure to prevent graphene restacking, avoiding several drawbacks of using 2D graphene as a sensing material. This process also increases the areal density of the materials, yielding higher analyte adsorption sites per unit area, thereby improving chemical sensitivity, as made possible by a corresponding library of carbon allotropes used to customize the sensor arrays disclosed herein to chemically fingerprint leaked analytes for multiple applications.

The structured carbon materials shown in FIGS. 17-4A-17-4B, 17-5A-17-5B, and 17-6A-17-6B may be produced using flow-through type microwave plasma reactors configured to create pristine 3D graphene particles, aggregates, agglomerates and/or the like continuously from a hydrocarbon gas (e.g., methane) at near atmospheric (~1 atm) pressures. Operationally, as the hydrocarbon flows through a relatively hot zone of a plasma reactor, free carbon radicals may be formed that flow further down the length of the reactor into the growth zone where 3D carbon particulates (based on multiple 2D graphenes joined together) are formed and collected as fine powders. The density and composition of the free-radical carbon-inclusive gaseous species may be tuned by gas chemistry and microwave (MW) power levels. By controlling the reactor process parameters, these reactors may produce carbons with a wide, yet tunable, range of morphologies, crystalline order, and sizes (and distributions). For example, possible sizes and distributions may range from flakes (few 100 nm to μm wide and few nm thin) to spherical particles (approximately between 10 nm to 99 nm in diameter) to graphene clusters (approximately between 10 μm to 99 μm in diameter). The 3D nature of the materials prevents agglomeration effectively allowing for the materials to be disseminated as un-agglomerated particles. As a result, highly responsive and selective sensing materials can be produced. Graphene, an atomically thin two dimensional (2D) material, has many advantageous properties for sensing, including outstanding chemical and mechanical strength, high carrier mobility, high electrical conductivity, high surface area, and gate-tunable carrier density.

To improve chemical selectivity, the 3D graphenes disclosed herein may be functionalized with various reactive materials in a manner such that the binding of target molecules and associated carbonaceous materials may be optimized. This functionalization step, along with the ability to measure the complex impedance of the exposed sensor, may be critical for efficient and selective detection of analytes. For example, different metal nanoparticles or metal oxide nanoparticles may be decorated on the surface of 3D graphenes to selectively detect hydrogen peroxide as peroxides are known to react with different metals. Further, nanoparticle decorated graphene structures may act synergistically to offer desirable and advantageous properties for sensing applications.

Aspects of the present disclosure recognize that BioFETs (e.g., the BioFET 17-100 of FIG. 17-1 and/or the array 17-200 of FIG. 17-2) various uses thereof. In some particular examples, such FET devices may include a conductive channel (e.g., the graphene layer 17-130 of the BioFET 17-100 of FIG. 17-1), which may be formed of graphene petal-shaped nanosheets, whereby each petal structure is composed of one or many graphene layers. The 3D graphene materials shown by images 17-400A, 17-400B, 17-500A, 17-500B, 17-600A, and 17-600B may include particulate carbon with improved physical properties (e.g., electrical conductivity) compared to 2D graphene materials.

In some implementations, various surface features (e.g., porosity, surface area per unit volume, etc.) may be of similar dimensions as shown in FIGS. 17-4A-17-4B, 17-5A-17-5B, and 17-6A-17-6B. In this way, particular types of the 3D graphene shown in FIGS. 17-4A-17-4B, 17-5A-17-5B, and 17-6A-17-6B may be selected to produce expected signal responses upon exposure to corresponding analytes. In this way, BioFETs (e.g., the BioFET 17-100 of FIG. 17-1) may be prepared to detect particular intended analytes (e.g., TNT) by unique combinations of 3D graphene, such as any of those shown in FIGS. 17-4A-17-4B, 17-5A-17-5B, and 17-6A-17-6B. In one or more particular examples, surface roughness of the 3D graphene depicted in FIGS. 17-4A-17-4B, 17-5A-17-5B, and 17-6A-17-6B may range from 50 to 200 nm. The surface structure, shape and/or orientation (collectively referred to as "structure") of depicted 3D graphene may, for example, improve transport of analytes to exposed surfaces on the 3D graphene (e.g., such that the 3D graphene may serve as the molecular recognition elements 17-144 of the BioFET 17-100 of FIG. 17-1). In this way, the structure of the depicted 3D graphene may result in faster diffusion-molecular recognition time, and thereby higher sensitivity to particular corresponding analytes.

In addition, some of the depicted 3D graphene may have randomly distributed ridges and valleys that may increase the molecular residence time and, as a result, affect the molecular recognition process. In addition, exposed surfaces of the 3D graphene depicted in FIGS. 17-4A-17-4B, 17-5A-17-5B, and 17-6A-17-6B may provide biofunctionalization sites for receptor molecules (e.g., those discussed in the process 17-300 of FIG. 17-3) may be located between the individual immediately adjacent graphene nanosheets. In this way, electrically charged analyte binding events may occur within the Debye length of immediately adjacent graphene nanosheets, thereby affecting the electrical properties of the 3D graphene channel (e.g., the graphene layer 17-130 of the BioFET 17-100 of FIG. 17-1) to, as a result, enhance biosensor sensitivity even within a high ionic strength liquid environment (e.g., 100-200 millimolar (mM) ionic concentration levels).

The 3D graphene depicted in FIGS. 17-4A-17-4B, 17-5A-17-5B, and 17-6A-17-6B may be used in the various biosensors (e.g., the BioFET 17-100 of FIG. 17-1 and/or the array 17-200 of FIG. 17-2) and produced using microwave plasma reactors and methods, such as any appropriate microwave reactor and/or method described in U.S. Pat. No. 9,812,295, entitled "Microwave Chemical Processing," or in U.S. Pat. No. 9,767,992, entitled "Microwave Chemical Processing Reactor," which are assigned to the assignee of the present application, and are incorporated by reference in this Patent Application in their respective entireties. In addition, the 3D graphene described herein may be produced using thermal cracking apparatuses and methods, such as any appropriate thermal apparatus and/or method described in U.S. Pat. No. 9,862,602, entitled "Cracking of a Process Gas," which is assigned to the same assignee as the present application, and is incorporated by reference in this Patent Application in its respective entireties. In some aspects, the 3D graphene used in the various biosensors disclosed in the present application may include more than one type of carbon allotrope. In one or more particular examples, the 3D graphene may include graphene, spherical fullerenes, carbon nanotubes, amorphous carbon, and/or other carbon allotropes in various forms, quantities, proportions, orientations, placements and so on.

The 3D graphene depicted in FIGS. 17-4A-17-4B, 17-5A-17-5B, and 17-6A-17-6B and used in the graphene layer 17-130 of the BioFET 17-100 of FIG. 17-1 and/or the array 17-200 of FIG. 17-2 are also described in U.S. Pat. No. 9,997,334, entitled "Seedless Particles with Carbon Allotropes," which is assigned to the same assignee as the present application, and is incorporated by reference in this Patent Application in its respective entirety. In some implementations, the 3D graphene may include carbon aggregates, where each carbon aggregate includes carbon nanoparticles. In some aspects, each carbon nanoparticle may include graphene and/or multi-walled spherical fullerenes (MWSFs) and may be synthesized in a reaction chamber or vessel without seed particles (e.g., alternatively referred to as "nucleation particles").

In some implementations, graphene in the 3D graphene may have up to 15 graphene layers. In addition, a ratio, such as percentage, of carbon to other elements, except hydrogen, in the carbon aggregates may be greater than 99%. In some aspects, median sizes of the carbon aggregates may range from 1 mm to 50 mm, or from 50 nm to 50 mm. In some implementations, a surface area of the carbon aggregates may be at least 10 $m^2/g$, or at least 50 $m^2/g$, or from 10 $m^2/g$ to 300 $m^2/g$ or from 200 $m^2/g$ to 1500 $m^2/g$, when measured using a Brunauer-Emmett-Teller (BET) method with nitrogen as the adsorbate. In addition, the 3D graphene when compressed, may have an electrical conductivity greater than 500 S/m, or greater than 5,000 S/m, or from 500 S/m to 12,000 S/m.

The 3D graphene structures disclosed herein may have a relatively high compositional purity (e.g., defined as having <1 wt. % impurities), a relatively high electrical conductivity (e.g., defined as having an electrical conductivity greater than 500 S/m), and a relatively high surface area (e.g., defined as having a surface area greater than 200 $m^2/g$)

compared to 2D graphene materials. The relatively high surface area may provide a correspondingly large concentration of analyte sensing sites (e.g., bonding sites for bioreceptors, such as the molecular recognition element 17-144 of FIG. 17-1, used to detect target species), which improves the lower detection limit of the BioFET 17-100. In some implementations, the molecular recognition element 17-144 associated with the graphene layer 17-130 may include and/or be composed of bioreceptor molecules, such as a single domain antibody, also referred to as a nanobody. In addition, or the alternative, bioreceptor molecules may include or be composed of one or more short-chain peptides, each short-chain peptide having a particular sequence. In this way, certain enumerated target analytes may bind to, for example, the molecular recognition elements 17-144 and/or the graphene layer 17-130, any of which may be composed of the 3D graphene shown in FIGS. 17-4A-17-4B, 17-5A-17-5B, and 17-6A-17-6B. In one or more particular examples, the nature of the binding between the target analytes and the molecular recognition elements 17-144 may depend on biofunctionalization of the molecular recognition elements 17-144 with bioreceptor molecules, which may include but are not limited to proteins, enzymes, antibodies, nucleic acids, or a low molecular weight organic compounds.

In some implementations, the 3D graphene may be dispersed in a solution (e.g., NMP) via an ultrasonication process. Further, 3D graphene may be deposited onto the insulating layer 17-110 of the BioFET 17-100 of FIG. 17-1 by methods including spin-coating, inkjet printing, and/or drop casting. By controlling the density and viscosity of the 3D graphene dispersion, the structural and electrical properties of the multilayer 3D graphene structure may also be controlled. In one implementation, the 3D graphene may be deposited over an area larger than is a necessary for an individual BioFET sensor. In this case, the 3D graphene may then be patterned (e.g., as in block 17-306 of FIG. 17-3) into individual channels (e.g., as shown by the BioFETs 17-202 in the array 17-200 of FIG. 17-2) for FET biosensors via an oxygen plasma etching method. The patterned 3D graphene may be, in some aspects, electrically connected to a source and drain deposited on the same substrate. The source and drain may be fabricated using a metal evaporation method or via the deposition of conductive inks. A reference electrode (e.g., the gate electrode 17-150) may be present on the same substrate as the source and drain regions and the 3D graphene channel, and/or may be directly above the channel in a microfluidic or well region structure. Electrode deposition on the 3D graphene substrate may occur before or after the 3D graphene channel growth or deposition.

The carrier mobility of the 3D graphene shown in FIGS. 17-4A-17-4B, 17-5A-17-5B, and 17-6A-17-6B may range between approximately 100 $cm^2/Vs$ and 10,000 $cm^2/Vs$, with a preferred range between 1000 and 5000 $cm^2/Vs$. If a particular voltage bias at the source region is maintained, the voltage applied to the back gate 17-120 (e.g., shown in FIG. 17-1) may be swept over a range. The current may be measured simultaneously to measure the transfer characteristics of the BioFET. At a particular gate voltage, the current across the graphene layer 17-130 will be at a minimum. This gate voltage is known as the Dirac point. Here, the Dirac point of the BioFET 17-100 may be between approximately 0V and 20 V when measured under dry conditions (e.g., without the electrolyte solution 17-104 contacting the graphene layer 17-130). In operational conditions, the gate electrode 17-150 may be submerged into the electrolyte solution 17-104 containing the analyte 17-160 intended for detection. In this way, the gate electrode 17-150 may be used to apply a gate bias, and the Dirac point may be between 0 and 1 V.

FIG. 17-7 shows a Raman spectra 17-700 of an example 3D graphene, according to some implementations. In some implementations, the Raman spectra 17-700 may be representative of any of the 3D graphene shown in FIGS. 17-4A-17-4B, 17-5A-17-5B, and 17-6A-17-6B.

FIG. 17-8 shows an x-ray diffraction (XRD) analysis result 17-800 for the example 3D graphene of FIG. 17-7, according to some implementations. In some implementations, the graph 17-800 may be representative of any of the 3D graphene shown in FIGS. 17-4A-17-4B, 17-5A-17-5B, and 17-6A-17-6B.

FIG. 17-9 shows a graph 17-900 showing particle size distribution for the example 3D graphene of FIG. 17-7, according to some implementations. In some aspects, the graph 17-900 is indicative of particles having a volume distribution (MV) was 69.6 nm with a mean diameter of the number distribution (MN) of 85.9 nm and mean diameter of area distribution (MA) of 103.9 nm.

FIG. 17-10 shows a graph 17-1000 showing transfer curves for the BioFET 17-100 of FIG. 17-1, according to some implementations. In an experimental run, a sensor configured similar to the BioFET 17-100 of FIG. 17-1 was used to test for the presence of TNT in 100 mM phosphate buffer solution (e.g., 13.7 mM NaCl, 1 mM phosphate, 270 μM KCl; pH 7.4). The 3D graphene used in this example includes the 3D graphene described with reference to FIGS. 17-4A-17-4B, 17-5A-17-5B, and 17-6A-17-6B. The bioreceptor was anti-TNT Peptide Sequence 1. The graph 17-1000 depicts transfer curves at a gate voltage of Vg=0.1 V of the BioFET functionalized with the bioreceptors (e.g., anti-TNT Peptide Sequence 1) to bind with TNT. As solutions with higher concentrations of TNT were introduced to the BioFET, the Dirac voltage of the device corresponding decreased. This relationship may have indicated that the binding of the analyte with the 3D graphene thereby induced a higher electron density within the 3D graphene, either through the intrinsic electron-withdrawing inductive effects of the analyte, or from the charge distribution change in the presented peptide aptamers induced upon analyte binding.

FIG. 17-11 shows a graph 17-1100 depicting a shift in Dirac voltage detected by the BioFET of FIG. 17-1, according to some implementations. Shifts in the Dirac voltage were observed after exposure of example BioFETs (e.g., the BioFET 17-100 and/or the array 17-200) to a series of TNT solutions with analyte concentrations ranging from 100 μM to 100 nM. Error bars indicate standard deviations from measurements with 5 different devices.

FIG. 17-12 shows a graph 17-1200 depicting an example real-time response of the BioFET 17-100 of FIG. 17-1, according to some other implementations. The response was generated for an anti-TNT peptide aptamer-functionalized GFET operated at $V_g$=0.3 V and $V_{ds}$=0.1 V. The FET sensor is exposed to a series of solutions with analyte concentrations ranging from 100 pM to 10 nM, at the time indicated by the black arrow. As the FET is measured with a gate bias higher than the Dirac voltage, the increase in electron density within the 3D graphene channel due to analyte binding causes an increase in the conductance.

FIG. 17-13 shows a graph 17-1300 depicting an example real-time response of the BioFET 17-100 of FIG. 17-1, according to some other implementations. The real-time response was generated for a peptide aptamer-functionalized GFET operated at Vg=0.3 V and Vds=0.1 V. The BioFET 17-100 is exposed to a series of solutions with analyte concentrations ranging from 100 pM to 200 n.M. Every 2-3 mins, the solution exposed to the 3D graphene is changed. As the BioFET 17-100 is measured with a gate bias higher than the Dirac voltage, the increase in electron density within the 3D graphene channel due to analyte binding causes an increase in the current. Thus, the 3D graphene-based BioFET demonstrated the ability to detect TNT with high sensitivity in the presence of high background salt concentration.

The 3D graphene-based BioFET can be functionalized with a variety of peptides to detect different analytes in the environment. Mercury (Hg) has been used in a variety of industrial processes for decades but can be extremely toxic to both human health and the environment. Various analytical devices have been developed to detect $Hg^{2+}$ ions, including peptide-functionalized colorimetric and fluorescence sensors. As in the case for TNT, the same peptides can be used as a bioreceptor molecule for the 3D graphene-based BioFET. The amino acid sequence is: $Hg^{2+}$ Peptide Sequence 1: Thr-Thr-Cys-Thr-Thr-Thr-Cys-Thr-Thr-Cys-Cys-Cys-Cys-Thr-Thr-Gly-Thr-Thr-Thr-Gly-Thr-Cys.

The 3D graphene-based BioFETs disclosed herein can be covalently or non-covalently functionalized with this $Hg^{2+}$ peptide using the same techniques described above. Upon exposure to $Hg^{2+}$ ions, amino protons of the thymine (T) groups in the peptide are displaced, forming a thymine-$Hg^{2+}$ ion-thymine (T-$Hg^{2+}$-T) complex. The peptide folds back in on itself at the Cys-Cys-Cys-Cys sequence, allowing the corresponding thymine groups to bind to $Hg^{2+}$ ions, as well as the corresponding cysteine (Cys) and glycine (Gly) groups. The $Hg^{2+}$ ions immobilized between two thymines are reduced from the graphene surface, which accumulates holes as a majority positive charge carrier In an experimental run, a sensor configured similar to FIG. 17-9 was used to test for the presence of $Hg^{2+}$ ions in 1 M phosphate buffer solution (137 mM NaCl, 10 mM phosphate, 2.7 mM KCl; pH 7.4). The 3D graphene was in this example the particular carbon described herein. A sensor which utilized 2D graphene grown using a chemical vapor deposition (CVD) method and transferred to a Si:$SiO_2$ substrate with patterned electrodes via lamination was configured in the same manner and also tested. The bioreceptor was $Hg^{2+}$ Peptide Sequence 1.

FIG. 17-14A shows a graph 17-1400A depicting transfer curves of a two-dimensional graphene-based BioFET, according to some implementations. The transfer curves were generated for a 2D graphene FET device functionalized with the bioreceptors at different concentrations of $Hg^{2+}$ and operated with a gate voltage (Vg=0.1 V). As solutions with higher concentrations are introduced, the Dirac voltage increased, as the binding of this analyte induces a higher hole density within the channel.

FIG. 17-14B shows a graph 17-1400B depicting transfer curves of the BioFET of FIG. 17-1, according to other implementations. The transfer curves were generated for a 3D graphene-based BioFET functionalized with the same bioreceptor and exposed to the same concentrations of $Hg^{2+}$ ions (e.g., in an aqueous solution) operated at a gate voltage of Vg=0.1 V. The Dirac voltage again increases with analyte concentration, but the shift is much larger due to the increase in Debye length of the 3D graphene-based BioFET. Less of the $Hg^{2+}$ ionic charge is screened due to counterions in the solution, thereby inducing a higher hole density within the 3D graphene channel and causing a correspondingly higher shift in Dirac voltage.

FIG. 17-15 shows a graph 17-1500 depicting a shift in the Dirac voltage detected by the BioFET 17-100 of FIG. 17-1, according to other implementations. Specifically, the graph 17-1500 compares the shift in the Dirac voltage for the 2D graphene FET devices and the 3D graphene-based BioFETs after exposure to a series of $Hg^{2+}$ solutions with concentrations ranging from 10 pM to 5 pM. Error bars indicate standard deviations from measurements with 5 different devices. Note the signal enhancement obtained when using a 3D graphene structure.

FIG. 17-16A shows a flowchart depicting an example operation 17-1600A for detecting analytes, according to some implementations. In various implementations, the operation 17-1600A may be performed by a BioFET such as (but not limited to) the BioFET 17-100 of FIG. 17-1 or the array 17-200 of FIG. 17-2. In other implementations, the operation 17-1600A may be performed by another suitable BioFET. In some implementations, the operation 17-1600A may be used to detect minute levels of a target analyte, for example, as described with reference to one or more of FIGS. 17-1-17-15. In some aspects, the operation 17-1600A begins in block 17-1602A by exposing a three-dimensional (3D) graphene layer biofunctionalized with a biological recognition element to an external environment that includes a target analyte, the 3D graphene layer operating as a channel for the BioFET. The operation 17-1600A continues at block 17-1604A with providing a well region containing an electrolyte solution configured to retain the target analyte. The operation 17-1600A continues at block 17-1606A with allowing the target analyte to disperse throughout the electrolyte solution contained in the well region and bind with the biological recognition element. The operation 17-1600A continues at block 17-1608A with detecting a change in one or more of an electric current, an electrical conductivity, or an electrical resistance of the 3D graphene layer in response to the target analyte binding with the biological recognition element. The operation 17-1600A continues at block 17-1610A with detecting binding of the biological recognition element to the target analyte based on the change. The operation 17-1600A continues at block 17-1612A with outputting an indication of the detected presence of the target analyte.

In various implementations, the target analyte may be 2,4,6-Trinitrotoluene, "TNT" at physiologically relevant conditions (e.g., 100-200 millimolar (mM) ionic concentration levels. In some implementations, the BioFET 17-100 of FIG. 17-1 may be used to detect the analyte by performing the operation 17-1600A of FIG. 17-16A. In addition, or in the alternative, the array 17-200 of FIG. 17-2 may be used to detect the analyte by performing the operation 17-1600A of FIG. 17-16A. In various implementations, the analyte detected by performance of the operation 17-1600A may be or include various molecules.

FIG. 17-16B shows a flowchart depicting an example operation 17-1600B for detecting analytes, according to some implementations. In various implementations, the operation 17-1600B may be performed after determining the change in electric current or conductivity of the graphene layer in block 17-1606A of FIG. 17-16A. For example, the operation 17-1600B begins at block 17-1602B with determining a concentration level of the target analyte based on an amount of the detected change in electric current, electrical conductivity, or electrical resistance of the 3D graphene layer. The operation 17-1600B continues at block 17-1604B with outputting an indication of the determined concentration level of the target analyte.

Figures 16C, 17:
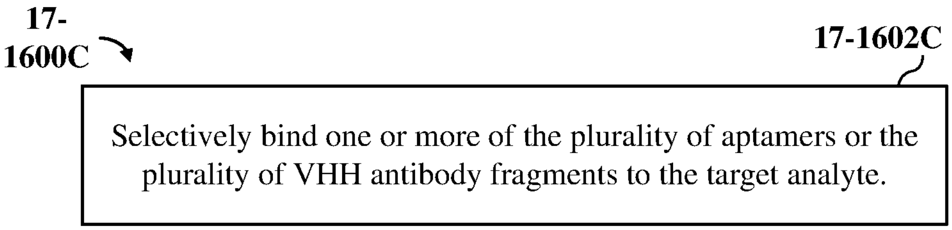

FIG. 17-16C shows a flowchart depicting an example operation 17-1600C for selectively binding a target analyte, according to some implementations. In various implementationstations the operation 17-1600C may be performed after producing a biofunctionalized carbonaceous material in block 17-1604B of FIG. 17-16B. For example, the operation 17-1600C begins at block 17-1602C with selectively binding one or more of the plurality of aptamers or the plurality of VHH antibody fragments to the target analyte.

Figures 16D, 17:
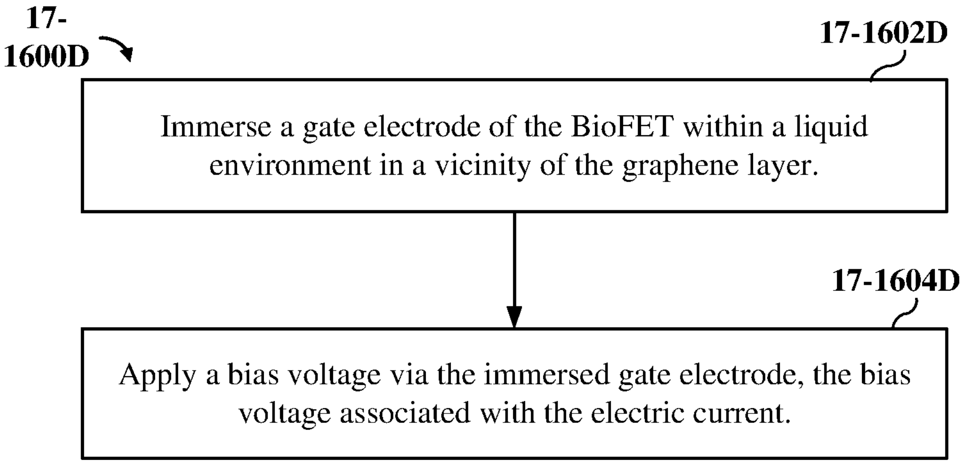

FIG. 17-16D shows a flowchart depicting an example operation 17-1600D for applying a bias voltage to a BioFET, according to some implementations. In various implementations, the operation 17-1600D may be performed before or concurrently with exposing the graphene layer to the external environment in block 17-1602A of FIG. 17-16A. For example, the operation 17-1600D begins at block 17-1602D with immersing a gate electrode of the BioFET within a liquid environment in a vicinity of the graphene layer. The operation 17-1600D continues at block 17-1604D with applying a bias voltage via the immersed gate electrode, the bias voltage associated with the electric current.

FIG. 17-16E shows a flowchart depicting an example operation 17-1600E for determining the target analyte, according to some implementations. In various implementations, the operation 17-1600E may be performed after applying the bias voltage to the BioFET in block 17-1604D of FIG. 17-16D. For example, the operation 17-1600E begins at block 17-1602E with determining one or more of a presence, an absence, or a concentration of the target analyte based on the change in electrical current in block 17-1606A of FIG. 17-16A.

FIG. 17-16F shows a flowchart depicting an example operation 17-1600F for detecting change in electric current within a vicinity of the graphene layer of a BioFET, according to some implementations. In various implementations, the operation 17-1600F may be performed after applying the bias voltage to the BioFET in block 17-1604D of FIG. 17-16D. For example, the operation 17-1600F begins at block 17-1602F with detecting a change in the electric current at a particular bias voltage applied by the immersed gate electrode.

FIG. 17-16G shows a flowchart depicting an example operation 17-1600G for defining a region of operation of a BioFET, according to some implementations. In various implementations, the operation 17-1600G may be performed after applying the bias voltage to the BioFET in block 17-1604D of FIG. 17-16D. For example, the operation 17-1600G begins at block 17-1602G with defining a region of operation for the BioFET based on the target analyte.

FIG. 17-16H shows a flowchart depicting an example operation 17-1600H for detecting a target analyte, according to some implementations. In various implementations, the operation 17-1600H may be performed after or concurrently during outputting the molecule concentration level indication of block 17-1610A of FIG. 17-16A. For example, the operation 17-1600H begins at block 17-1602H with detecting the target analyte in a liquid environment having an ionic salt concentration exceeding 100 millimolar (mM).

FIG. 17-16I shows a flowchart depicting an example operation 17-1600I for blocking fluid communication, according to some implementations. In various implementations, the operation 17-1600I may be performed concurrently during or after applying the bias voltage from the immersed gate electrode in block 17-1604D of FIG. 17-16D. For example, the operation 17-1600I begins at block 17-16021 with blocking fluid communication between the external environment and each of the source and drain regions of the BioFET. In some aspects, the passivation layer may include a first portion 17-114; and a second portion 17-1142 as described with reference to the BioFET 17-100 of FIG. 17-1. In various implementations, blocking fluid communication as performed at block 17-16021 may improve performance of the BioFET 17-100 of FIG. 17-1 and/or the array 17-200 of FIG. 17-2 by preventing unwanted contaminants from entering the graphene layer of the BioFET.

Figures 16J, 17:
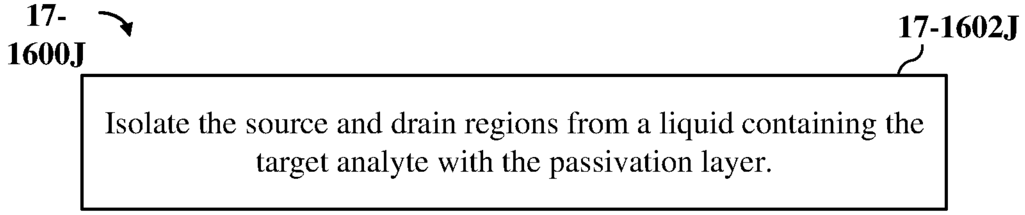

FIG. 17-16J shows a flowchart depicting an example operation 17-1600J for isolating the source and drain regions, according to some implementations. In various implementations, the operation 17-1600J may be performed concurrently with blocking the fluid communication as described with reference to block 17-16021. For example, the operation 17-1600J begins at block 17-1602J with isolating the source and drain regions from a liquid containing the target analyte with the passivation layer. In various implementations, isolation of the source and drain regions may protect the source and drain regions from physical damage or exposure to the electrolyte solution 17-104.

Figures 16K, 17:
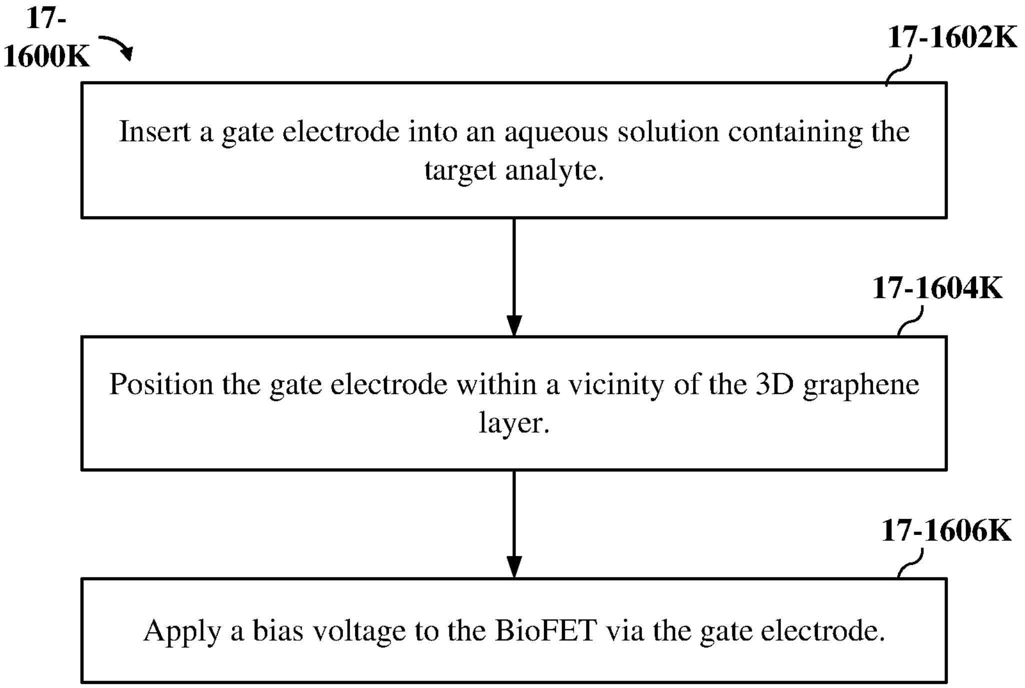

FIG. 17-16K shows a flowchart depicting an example operation 17-1600K for applying a bias voltage to the BioFET via the gate electrode, according to some implementations. In various implementations, the operation 17-1600K may be performed instead of the operation 17-1600D of FIG. 17-16D. For example, the operation 17-1600K begins at block 17-1602K with inserting a gate electrode into an aqueous solution containing the target analyte. The operation 17-1600K continues at block 17-1604K with positioning the gate electrode within a vicinity of the graphene layer of the BioFET. The operation 17-1600K continues at block 17-1606K with applying a bias voltage to the BioFET via the gate electrode, where the bias voltage is associated with the change in electric current of the BioFET resulting from exposure to the analyte.

Figures 16L, 17:
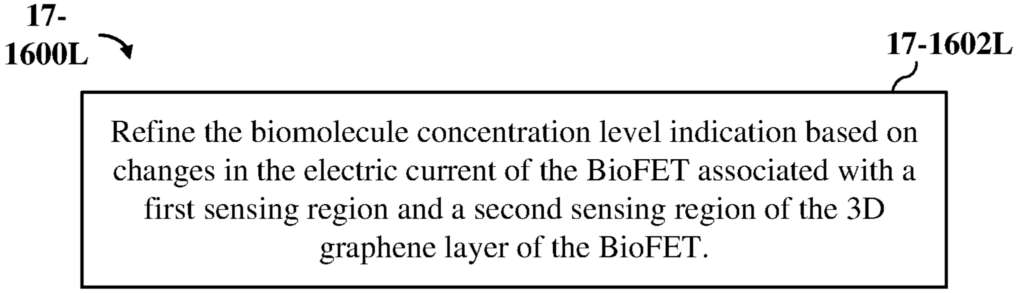

FIG. 17-16L shows a flowchart depicting an example operation 17-1600L for refining the molecule concentration level indication of block 17-1610A of FIG. 17-16A, according to some implementations. In various implementations, the operation 17-1600L may be performed concurrently with or after the block 17-1610A of FIG. 17-16A. For example, the operation 17-1600L begins at block 17-1602L with refining the molecule concentration level indication based on changes of the electric current of the BioFET associated with a first sensing region and a second sensing region of the 3D graphene layer of the BioFET.

Figures 16M, 17:
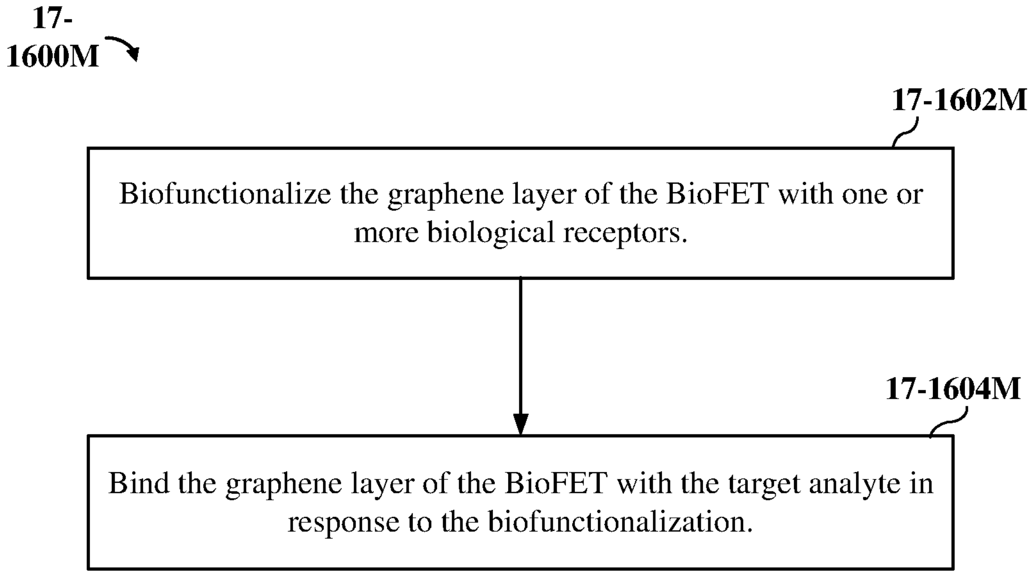

FIG. 17-16M shows a flowchart depicting an example operation 17-1600M for biofunctionalizing the 3D graphene layer of the BioFET, according to some implementations. In various implementations, the operation 17-1600M may be performed before exposing the 3D graphene layer to the external environment including the target analyte in block 17-1602A of FIG. 17-16A. In addition, or the alternative, the operation 17-1600B may replace the biofunctionalization of the exposed surfaces of the 3D graphene layer with biological receptors in block 17-1602B of FIG. 17-16B. For example, the operation 17-1600M begins at block 17-1602M with biofunctionalizing the 3D graphene layer of the BioFET with one or more biological receptors. The operation 17-1600M continues at block 17-1604M with binding the 3D graphene layer of the BioFET with the target analyte in response to the biofunctionalization.

Figures 17, 17A:
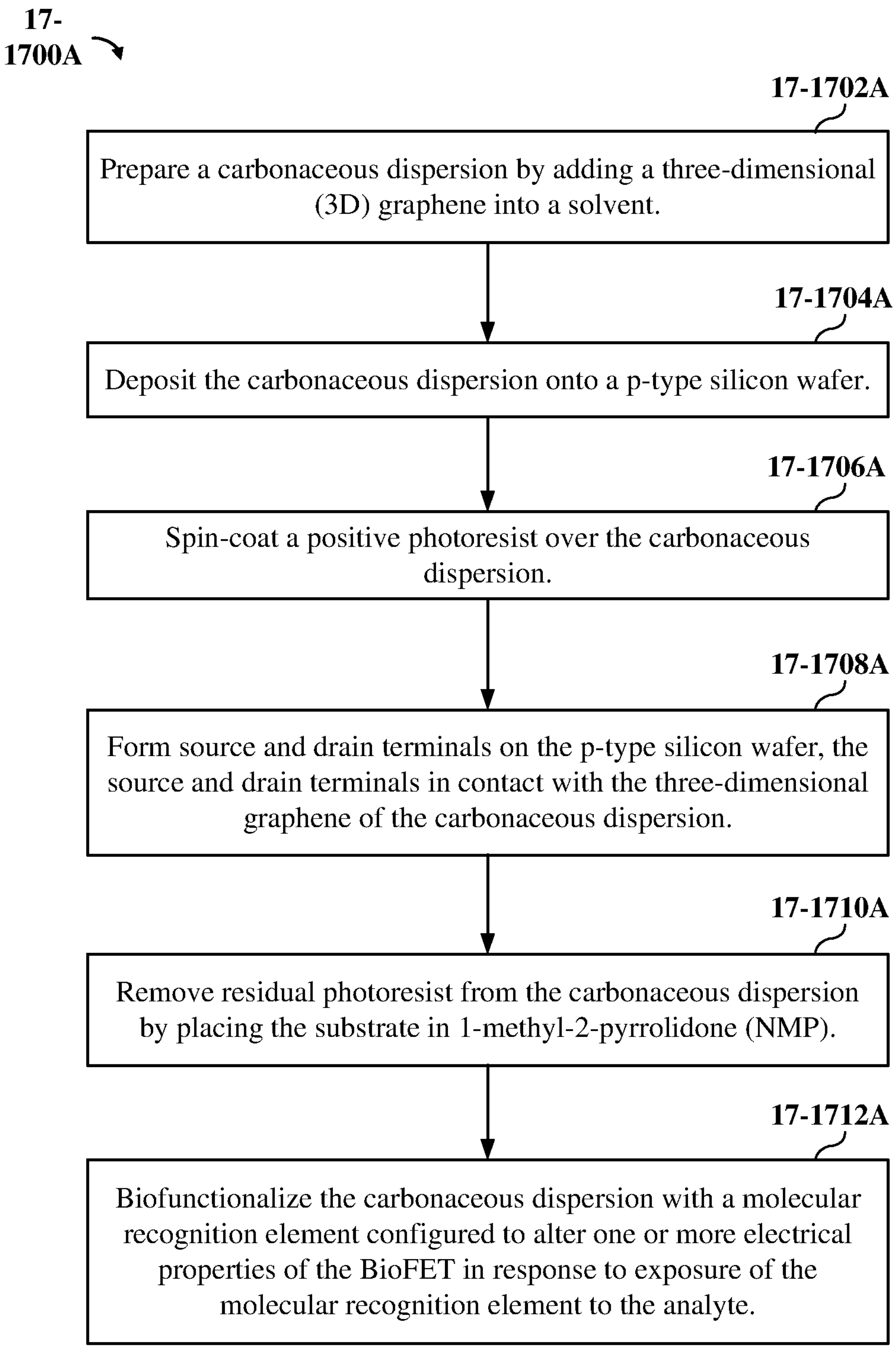

FIG. 17-17A shows a flowchart depicting an example operation 17-1700A for manufacturing a BioFET such as (but not limited to) the BioFET 17-100 of FIG. 17-1 and/or the array 17-200 of FIG. 17-2. In some implementations, the operation 17-1700A may be used manufacture a BioFET that can detect minute levels of a target analyte, for example, as described with reference to one or more of FIGS. 1-15. In some aspects, the operation 17-1700A begins in block 17-1702A with preparing a carbonaceous dispersion by adding a 3D graphene (e.g., similar to the graphene layer 17-130 of FIG. 17-1) into a solvent. The operation 17-1700A continues in block 17-1704A with depositing the carbonaceous dispersion onto a p-type silicon wafer. The operation 17-1700A continues in block 17-1706A with spin-coating a positive photoresist over the carbonaceous dispersion. The operation 17-1700A continues in block 17-1708A with forming source and drain terminals on the p-type silicon wafer, the source and drain terminals in contact with the three-dimensional graphene of the carbonaceous dispersion. The operation 17-1700A continues in block 17-1710A with removing the residual photoresist from the carbonaceous dispersion by placing the substrate in 1-methyl-2-pyrrolidone (NMP). The operation 17-1700A continues in block 17-1712A with biofunctionalizing the carbonaceous dispersion with a molecular recognition element configured to alter one or more electrical properties of the BioFET in response to exposure of the molecular recognition element to the analyte.

Figures 17, 17B:
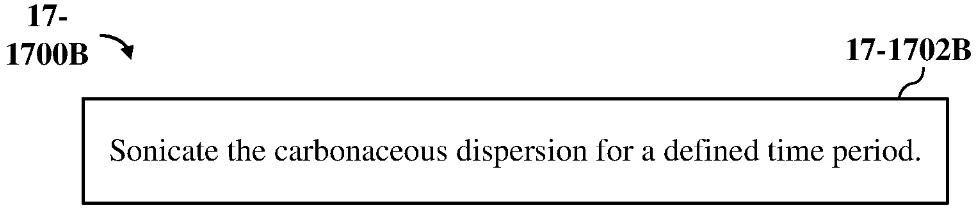

FIG. 17-17B shows a flowchart depicting an example operation 17-1700B for sonicating the carbonaceous dispersion, according to some implementations. In various implementations, the operation 17-1700B may be performed during preparation of the carbonaceous dispersion in block 17-1702A of FIG. 17-1700A. In some aspects, the operation 17-1700B begins in block 17-1702B with sonicating the carbonaceous dispersion for a defined time period (e.g., 30 minutes).

Figures 17, 17C:
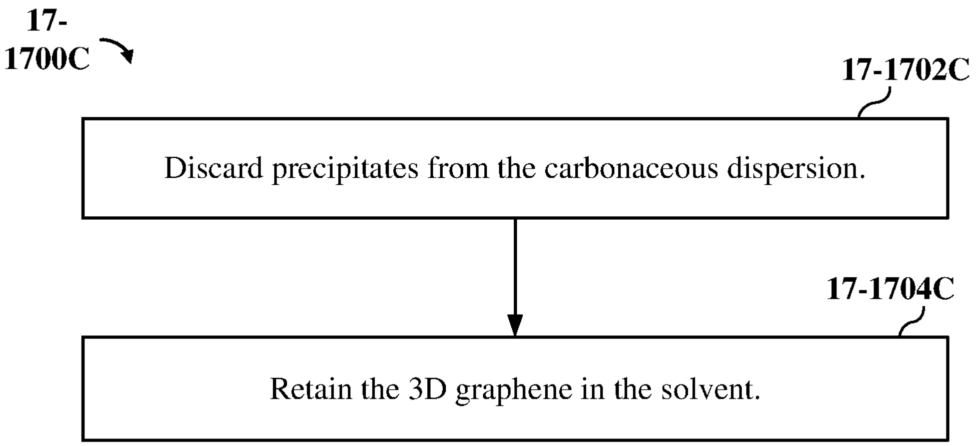

FIG. 17-17C shows a flowchart depicting an example operation 17-1700C for purifying the carbonaceous dispersion that was sonicated in block 17-1702A of FIG. 17-17A, according to some implementations. In various implementations, the operation 17-1700C may be performed after preparing the carbonaceous dispersion by adding the 3D graphene into the solvent described with reference to block 17-1702A of FIG. 17-17A. In some aspects, the operation 17-1700C begins in block 17-1702C with discarding precipitates from the carbonaceous dispersion. The operation 17-1700C continues in block 17-1704C with retaining the 3D graphene in the solvent.

In various implementations, purification of the carbonaceous dispersion may improve the binding ability of the 3D graphene layer with, for example, nanobodies and/or antibodies as associated with the detection of analytes, as discussed above. For example, unwanted aggregates of carbonaceous materials may be separated and/or discarded at block 17-1702, leaving behind only pristine 3D graphene grown as a monolith. In this way, the pristine 3D graphene may provide an improved surface area to volume ratio (as compared to conventional BioFETs) without suffering impediments resulting from impurities residing on exposed carbonaceous surfaces of the pristine 3D graphene. As a result, the pristine 3D graphene disclosed herein may provide more binding sites to bind with nanobodies (as compared to 2D graphene materials).

Figures 17, 17D:
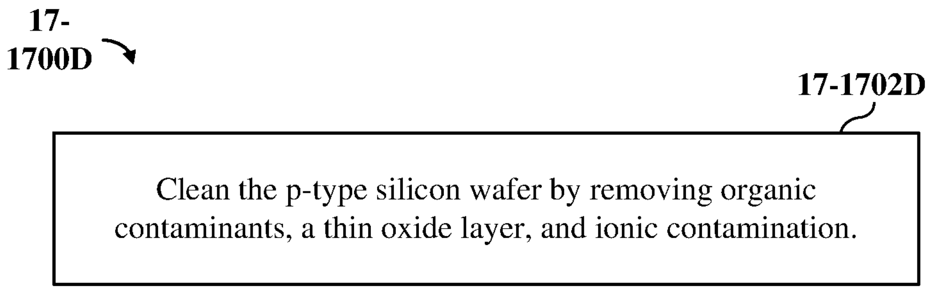

FIG. 17-17D shows a flowchart depicting an example operation 17-1700D for cleaning the silicon wafer, according to some implementations. In some aspects, the operation 17-1700D begins in block 17-1702D with cleaning the p-type silicon wafer by removing organic contaminants, oxide layers, and ionic contamination. In some implementations, the cleaning may include the removal of contamination that can be encountered during semiconductor device manufacturing. The contamination can have a detrimental impact on yield, reliability, and process control. Contamination control, as a result, may consider various aspects of cleaning methods and materials including chemicals, concentrations, chemical reactions, process sequences, and equipment that may be selected to address the needs of particular processes and/or wafers.

Figures 17, 17E:
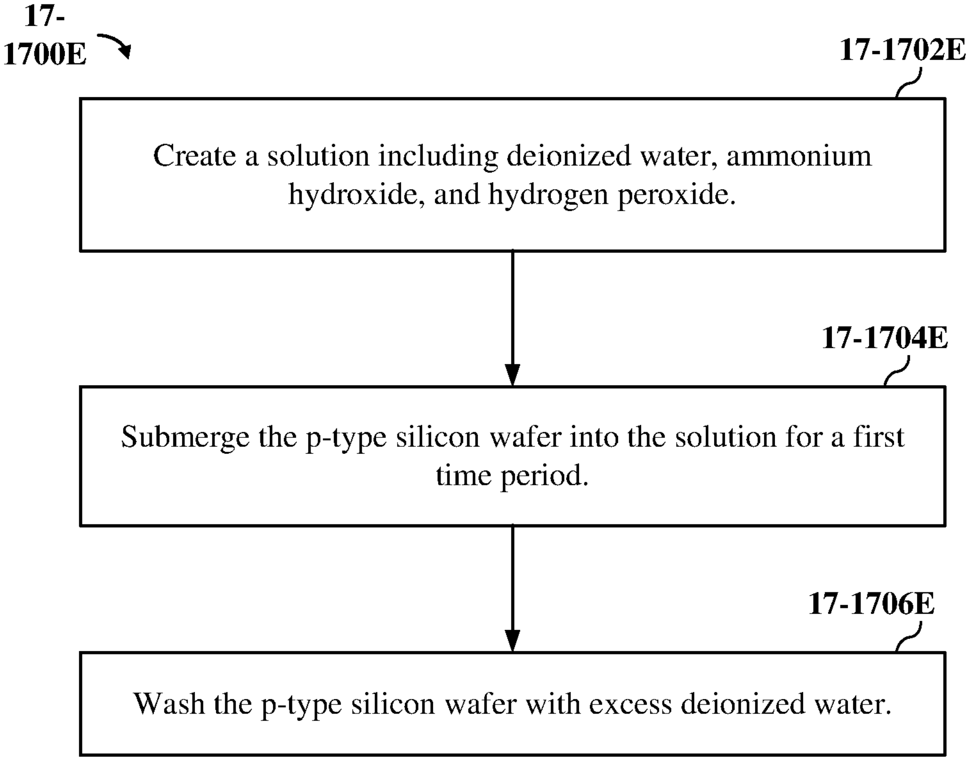

FIG. 17-17E shows a flowchart depicting an example operation 17-1700E for cleaning the p-type silicon wafer, according to some implementations. In various implementations, the operation 17-1700E may replace block 17-1704D of FIG. 17-17D. In some aspects, the operation 17-1700E begins in block 17-1702E with creating a solution including deionized water, ammonium hydroxide, and hydrogen peroxide. The operation 17-1700E continues in block 17-1704E with submerging the p-type silicon wafer into the solution for a first time period. The operation 17-1700E continues in block 17-1706E with washing the p-type silicon wafer with excess deionized water.

Figures 17, 17F:
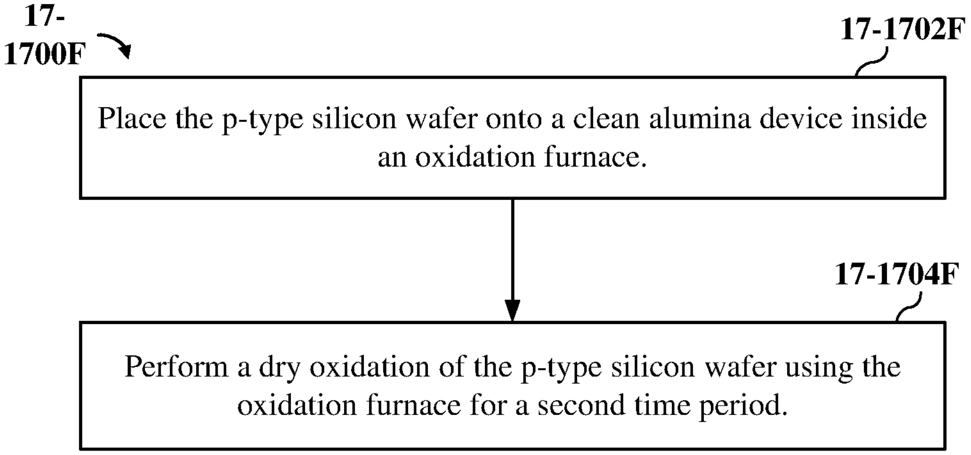

FIG. 17-17F shows a flowchart depicting an example operation 17-1700F for performing a dry oxidation of the p-type silicon wafer, according to some implementations. In various implementations, the operation 17-1700F may be performed after washing the p-type silicon wafer in block 17-1706E of FIG. 17-17E. In some aspects, the operation 17-1700F begins in block 17-1702F with placing the p-type silicon wafer onto a clean alumina device inside an oxidation furnace. The operation 17-1700F continues in block 17-1704F with performing a dry oxidation of the p-type silicon wafer using the oxidation furnace for a second time period.

FIG. 17-17G shows a flowchart depicting an example operation 17-1700G for preparing a thermal oxide, according to some implementations. In some aspects, the thermal oxide may be the insulating layer 17-110 of FIG. 17-1. In various implementations, the operation 17-1700G may be performed after the dry oxidation of the p-type silicon wafer in block 17-1704F of FIG. 17-17F. In some aspects, the operation 17-1700G begins in block 17-1702G with depositing a thermal oxide onto the p-type silicon wafer.

In various implementations, the thermal oxide in block 17-1702G may be prepared via microfabrication on the surface of a wafer. Microfabrication of the thermal oxide may involve forcing oxidizing agents to diffuse into the wafer at high temperature, where such oxidizing agents then chemically react with the wafer (e.g., as predicted by the Deal-Grove model). In some aspects, thermal oxidation of silicon may be performed at a temperature between 800 and 1200° C., resulting in a High Temperature Oxide layer (HTO). Thermal oxidation may use either water vapor (usually UHP steam) or molecular oxygen as the oxidant; it is consequently called either wet or dry oxidation. Thermal oxidations reactions may include one of the following:

$$Si+2H_2O\rightarrow SiO_2+2H_2(g) \quad \text{(Eq. 17-1)}$$

$$Si+O_2\rightarrow SiO_2 \quad \text{(Eq. 17-2)}$$

In some implementations, the oxidizing ambient may also contain several percent of hydrochloric acid (HCl), where the chlorine in the HCl removes metal ions that may occur in the oxide. Thermal oxide incorporates silicon consumed from the substrate (e.g., the back gate 17-120 of the BioFET 17-100 of FIG. 17-1) and oxygen supplied from the ambient. As a result, the thermal oxide grows both down into the wafer and up out of it. For every unit thickness of silicon consumed, approximately 2.17 unit thicknesses of oxide will appear. For example, if a bare silicon surface is oxidized, approximately 46% of the oxide thickness will lie below the original surface, and approximately 54% above it.

FIG. 17-17H shows a flowchart depicting an example operation 17-1700H for coating the p-type silicon wafer, according to some implementations. In various implementations, the operation 17-1700H may replace depositing the carbonaceous dispersion onto the substrate described with reference to block 17-1706A of FIG. 17-17A. In some aspects, the operation 17-1700H begins in block 17-1702H with coating the p-type silicon wafer with the carbonaceous dispersion.

In various implementations, coating materials are sprayed onto a surface. The "feedstock" (e.g., coating precursor) may heated by electrical (e.g., plasma or arc) or chemical means (e.g., a combustion flame). Thermal spraying can provide thick coatings (approx. thickness range is 20 microns to several mm, depending on the process and feedstock), over a large area at high deposition rate as compared to other coating processes such as electroplating, physical, and chemical vapor deposition. Coating materials available for thermal spraying include metals, alloys, ceramics, plastics, and composites. They are fed in powder or wire form, heated to a molten or semi molten state, and accelerated towards substrates in the form of micrometer-size particles. Combustion or electrical arc discharge is usually used as the source of energy for thermal spraying. Resulting coatings are made by the accumulation of numerous sprayed particles. The surface may not heat up significantly, allowing the coating of flammable substances. The coating quality is usually assessed by measuring its porosity, oxide content, macro and micro-hardness, bond strength and surface roughness. Generally, coating quality increases with increasing particle velocities.

FIG. 17-171 shows a flowchart depicting an example operation 17-1700I for applying a piranha solution to the p-type silicon wafer, according to some implementations. In various implementations, the operation 17-1700I may be performed prior to submergence of the p-type silicon wafer into the solution described with reference to block 17-1704E of FIG. 17-17E. In some aspects, the operation 17-17001 begins in block 17-17021 with applying a piranha solution including a 3:1 mixture of sulfuric acid ($H_2SO_4$) and hydrogen peroxide ($H_2O_2$) to remove any organic residue on exposed surfaces of one or more of the carbonaceous dispersion or the p-type silicon wafer. The residual piranha solution may be subsequently removed by submerging the p-type silicon wafer into the solution as described with reference to block 17-1704E of FIG. 17-17E and washing the p-type silicon wafer with excess deionized water as described with reference to block 17-1706E of FIG. 17-17E.

In various implementations, fabrication of silicon wafers (e.g., such as the back gate 17-120 of the BioFET 17-100 of FIG. 17-1) may be carried out with repeated etching and cleaning steps to produce micro-structures that may be necessary for final silicon semiconductor products, such as any of the BioFETs disclosed in the present disclosure. In some aspects, the disclosed piranha solution may be exothermic and prepared by adding hydrogen peroxide to sulfuric acid. The piranha solution then heats up rapidly and may be used at a temperatures of approximately 130° C. Once operating temperature and the desired concentration are reached, wet bench equipment used to provide the piranha solution to the p-type silicon wafer may need to heat the solution to maintain a uniform temperature, thereby maintaining a constant etch rate of the p-type silicon wafer.

Figures 17, 17J:
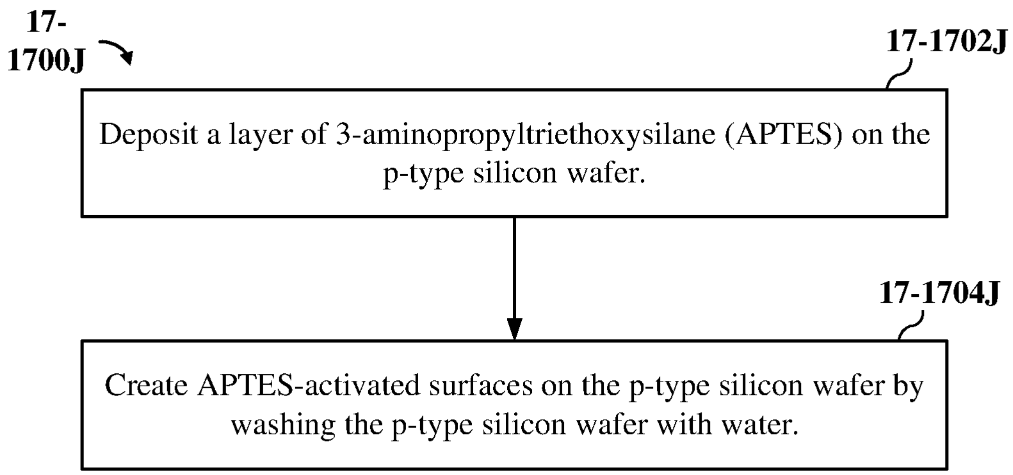

FIG. 17-17J shows a flowchart depicting an example operation 17-1700J for depositing a layer on the p-type silicon wafer, according to some implementations. In various implementations, the operation 17-1700J may be performed after applying the piranha solution to the p-type silicon wafer in block 17-17021 of FIG. 17-171. In some aspects, the operation 17-1700J begins in block 17-1702J with depositing a layer of 3-aminopropyltriethoxysilane (APTES) on the p-type silicon wafer. The operation 17-1700J continues in block 17-1704J with creating APTES-activated surfaces on the p-type silicon wafer by washing the p-type silicon wafer with water to remove excess APTES.

In various implementations, APTES may be used to prepare dye-doped silica nanoparticles with minimal aggregation and minimal nonspecific binding with molecules. In some aspects, a self-assembled monolayer (SAM) of APTES can be used to improve the adhesion of graphene flakes (e.g., of the graphene layer 17-130 of the BioFET 17-100 of FIG. 17-1) and $SiO_2$ (e.g., of the insulating layer 17-110 of the BioFET 17-100 of Figure) to enable better contact with the source and drain regions of the BioFET.

Figures 17, 17K:
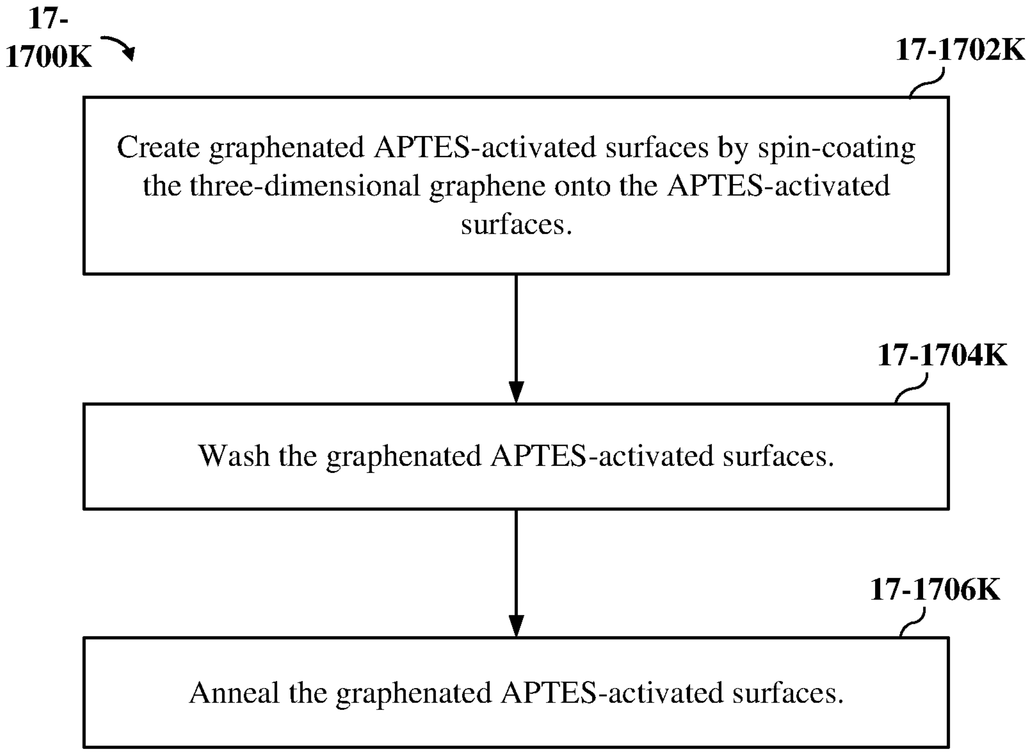

FIG. 17-17K shows a flowchart depicting an example operation 17-1700K for creating APTES-activated surfaces, according to some implementations. In various implementations, the operation 17-1700K may replace depositing the APTES on the p-type silicon wafer as described with reference to block 17-1702J of FIG. 17-17J. In some aspects, the operation 17-1700K begins in block 17-1702K with creating graphenated APTES-activated surfaces by spin-coating the three-dimensional graphene onto the APTES-activated surfaces. The operation 17-1700K continues in block 17-1704K with washing the graphenated APTES-activated surfaces. The operation 17-1700K continues in block 17-1706K with annealing the graphenated APTES-activated surfaces.

Figures 17, 17L:
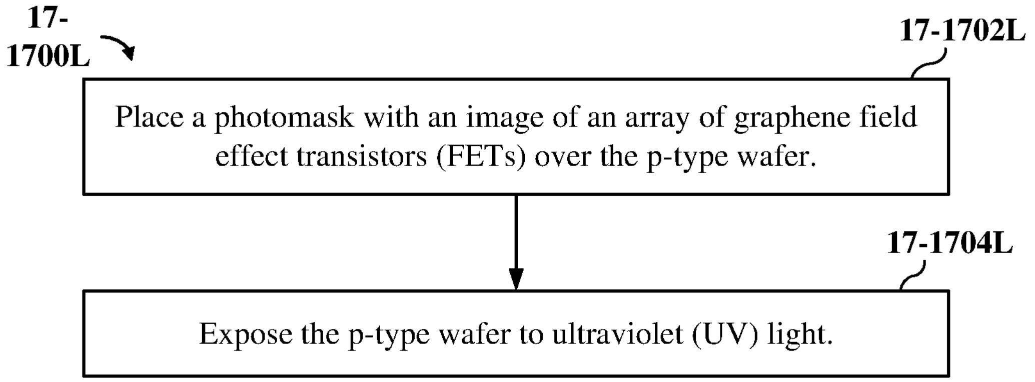

FIG. 17-17L shows a flowchart depicting an example operation 17-1700L for defining features on a BioFET, according to some implementations. In various implementations, the operation 17-1700L may be performed after annealing the graphenated APTES-activated surfaces in block 17-1706K of FIG. 17-17K. In some aspects, the operation 17-1700L begins in block 17-1702L with placing a photomask with an image of an array of graphene field effect transistors (FETs) over the p-type wafer. The operation 17-1700L continues in block 17-1704L with exposing the p-type wafer to ultraviolet (UV) light.

Figures 17, 17M:
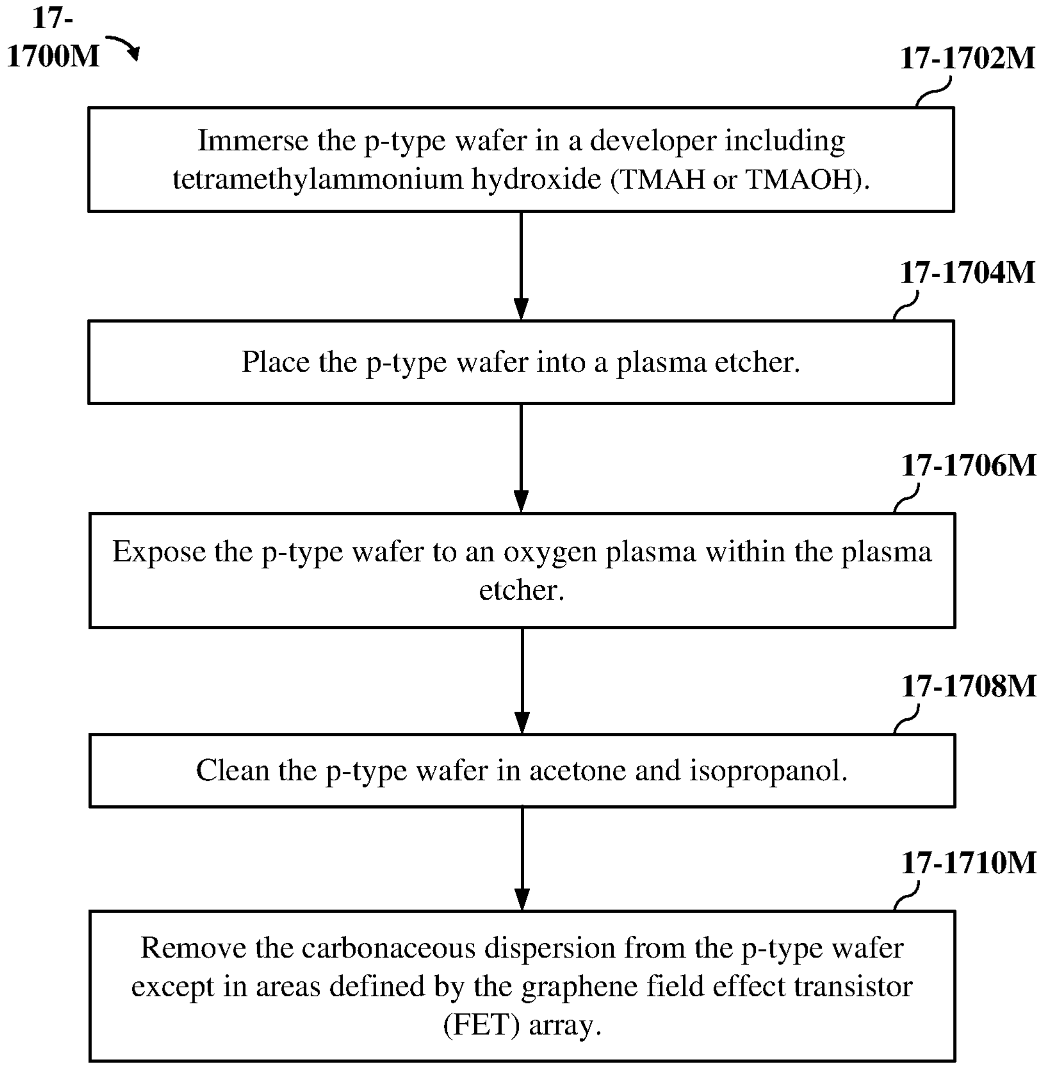

FIG. 17-17M shows a flowchart depicting an example operation 17-1700M for defining features on a BioFET, according to some implementations. In various implementations, the operation 17-1700M may be performed after exposing the substrate to UV light in block 17-1704L of FIG. 17-17L. In some aspects, the operation 17-1700M begins in block 17-1702M with immersing the p-type wafer in a developer including tetramethylammonium hydroxide (TMAH or TMAOH). The operation 17-1700M continues in block 17-1704M with placing the p-type wafer into a plasma etcher. The operation 17-1700M continues in block 17-1706M with exposing the p-type wafer to an oxygen plasma within the plasma etcher. The operation 17-1700M continues in block 17-1708M with cleaning the p-type wafer in acetone and isopropanol. The operation 17-1700M continues in block 17-1710M with removing the carbonaceous dispersion from the p-type wafer except in areas defined by the graphene FET array. In this way, the operation 17-1700M may be used to create uniquely shaped regions of the graphene layer 17-130 of FIG. 17-1 and/or the BioFETs 17-202 of FIG. 17-2.

Figures 17, 17N:
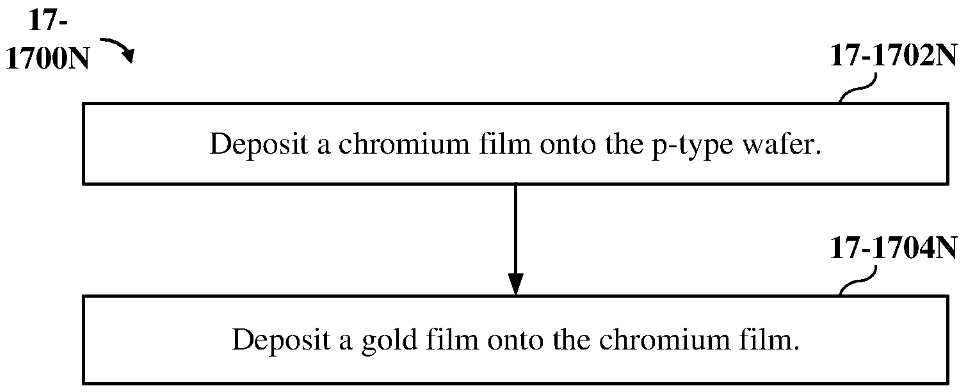
Figures 17, 17O:
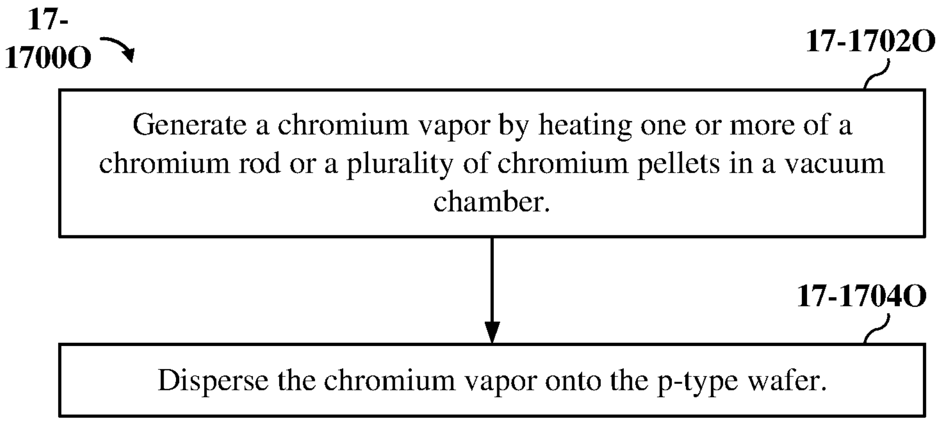

FIG. 17-17N shows a flowchart depicting an example operation 17-1700N for forming source and drain regions of a BioFET, according to some implementations. In some aspects, the source and drain regions may be the source 17-106 and drain 17-108 regions of the BioFET 17-100 of FIG. 17-1. In various implementations, the operation 17-1700N may be performed after forming the source and drain terminals as described with reference to block 17-1708A of FIG. 17-17A. In some aspects, the operation 17-1700N begins in block 17-1702N with depositing a chromium film onto the substrate. The operation 17-1700N continues in block 17-1704N with depositing a gold film onto the chromium film.

FIG. 17-170 shows a flowchart depicting an example operation 17-17000 for generating a chromium vapor, according to some implementations. In various implementations, the operation 17-17000 may be performed before depositing the chromium film as described with reference to block 17-1702N of FIG. 17-17N. In some aspects, the operation 17-17000 begins in block 17-17020 with generating a chromium vapor by heating one or more of a chromium rod or a plurality of chromium pellets in a vacuum chamber. The operation 17-17000 continues in block 17-17040 with dispersing the chromium vapor onto the p-type wafer.

Figures 17, 17P:
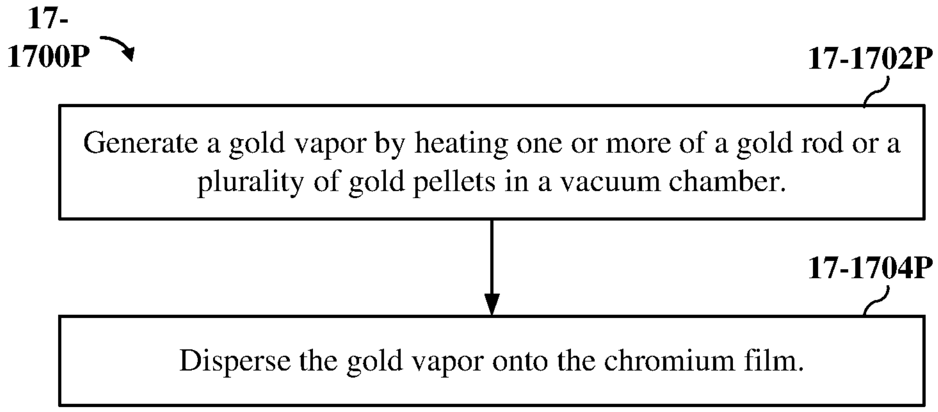

FIG. 17-17P shows a flowchart depicting an example operation 17-1700P for generating a gold vapor used in depositing a gold film onto one or more of the chromium film or the substrate, according to some implementations. In various implementations, the operation 17-1700P may be performed before depositing the gold film onto the chromium film. In some aspects, the operation 17-1700P begins in block 17-1702P with generating a gold vapor by heating one or more of a gold rod or a plurality of gold pellets in a vacuum chamber. The operation 17-1700P continues in block 17-1704P with dispersing the gold vapor onto the chromium film.

Figures 17, 17Q:
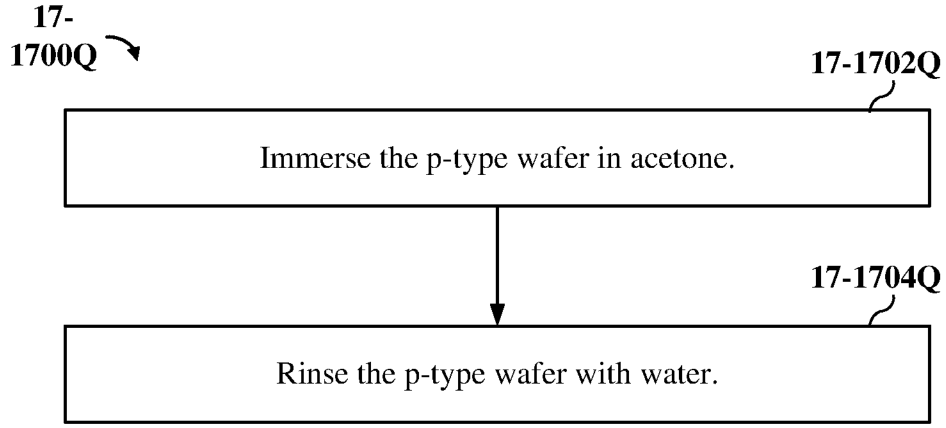

FIG. 17-17Q shows a flowchart depicting an example operation 17-1700Q for immersing the substrate in acetone, according to some implementations. In various implementations, the operation 17-1700Q may be performed after block 17-1704M of FIG. 17-17M. In some aspects, the operation 17-1700Q begins in block 17-1702Q with immersing the p-type wafer in acetone. The operation 17-1700Q continues in block 17-1704Q with rinsing the p-type wafer with water.

Figures 17, 17R:
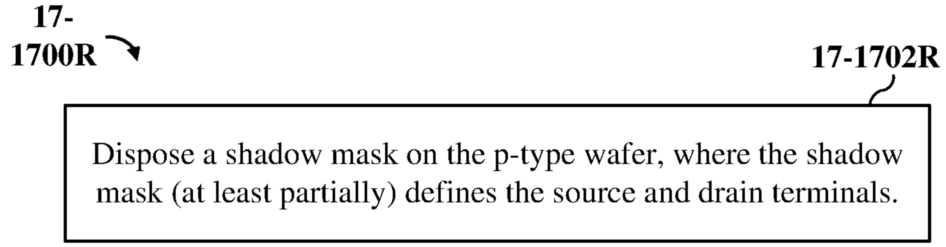

FIG. 17-17R shows a flowchart depicting an example operation 17-1700R for disposing a shadow mask on the substrate, according to some implementations. In various implementations, the operation 17-1700R may be performed after placing the photomask over the substrate as described with reference to block 17-1702L of FIG. 17-17L. In some aspects, the operation 17-1700R begins in block 17-1702R with disposing the shadow mask on the p-type wafer. The shadow mask may (at least partially) define the source region 17-106 and/or the drain region 17-108 of the BioFET 17-100 of FIG. 17-1.

In various implementations, the photomask is an opaque plate with holes or transparencies that allow light to shine through in a defined pattern. Photomasks may be used in photolithography and the production of integrated circuits (ICs or "chips") in particular. Photomasks may be used to produce a pattern on a substrate, such as a slice of silicon, e.g., a wafer in the case of chip manufacturing. In some aspects, several photomasks may be used sequentially, with each photomask reproducing a layer of the completed design. In this way, photomasks collectively may be referred to as "a mask set." In contrast, a shadow mask is a metal plate punched with holes that may separate the colored phosphors in the layer behind the front glass of the screen. Shadow masks are made by photochemical machining, a technique that allows for the drilling of small holes on metal sheets.

Figures 17, 17S:
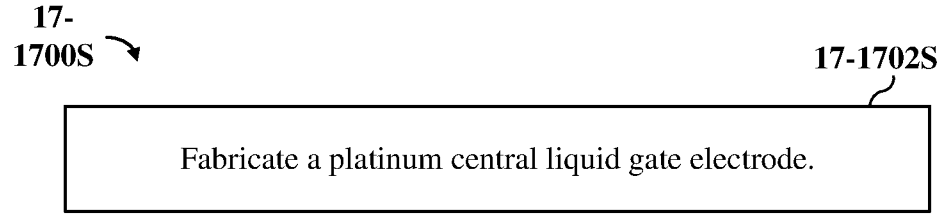

FIG. 17-17S shows a flowchart depicting an example operation 17-1700S for fabricating a gate electrode, according to some implementations. In some aspects, the gate electrode may be the gate electrode 17-150 of FIG. 17-1. In various implementations, the operation 17-1700S may be performed concurrently with the preparation of the carbonaceous dispersion as described with reference to block 17-1702A of FIG. 17-17A. In some aspects, the operation 17-1700S begins in block 17-1702S with fabricating a platinum central liquid gate electrode.

In various implementations, the platinum central liquid gate electrode may be positioned on top of the insulating layer 17-110 of the BioFET 17-100 of FIG. 17-1, and thereafter may be used to control current flow through the graphene layer 17-130 of the BioFET 17-100 of FIG. 17-1. In some aspects, the platinum central liquid gate electrode may be made of doped polycrystalline silicon (e.g., designated as "poly"), which may serve as an electrical conductor and can be patterned into narrow lines. In one implementation, the BioFET 17-100 may have a physical gate length of the gate electrode 17-150 of approximately 50 nanometers (nm).

Figures 17, 17T:
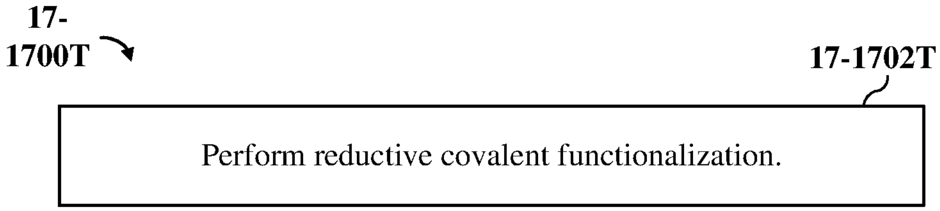

FIG. 17-17T shows a flowchart depicting an example operation 17-1700T for performing functionalization, according to some implementations. In various implementations, the operation 17-1700T may replace or be performed concurrently with biofunctionalizing the carbonaceous dispersion on the p-type silicon wafer as described with reference to block 17-1714A. In some aspects, the operation 17-1700T begins in block 17-1702T with performing reductive covalent functionalization on exposed surfaces of the carbonaceous dispersion.

In various implementations, graphene functionalization may be used to controllably engineer a band gap structure of the BioFET 17-100 of FIG. 17-1, to create novel architectures, and to manipulate the interfacial characteristics of mono-layer graphene and/or multi-layer graphene (such as the graphene layer 17-130 of FIG. 17-1). Covalent functionalization may be performed through several chemical reactions and have been used in solid supports and in homogeneous dispersions (e.g., diazo coupling, iodonium coupling, alkylation, cycloadditions, Diels-Alder reactions, addition of phenyl radicals, hydrogenation, halogenation, and silylation. Among different synthetic approaches, the reduction of graphite using alkaline metals in suitable solvents yielding graphite intercalation compounds (GICs), followed by the quenching of the intermediately generated graphenides with electrophiles, provides an efficient route.

FIG. 17-17U shows a flowchart depicting an example operation 17-1700U for stacking molecules, according to some implementations. In various implementations, the operation 17-1700U may replace or be performed concurrently with biofunctionalizing the carbonaceous dispersion on the p-type silicon wafer as described with reference to block 1714A. In some aspects, the operation 17-1700U begins in block 17-1702U with stacking molecules on exposed surfaces of the 3D graphene layer 17-130 of FIG. 17-1.

FIG. 17-17V shows a flowchart depicting an example operation 17-1700V for yielding carboxylic acids, according to some implementations. In various implementations, the operation 17-1700V may be performed concurrently with biofunctionalizing the carbonaceous dispersion on the p-type silicon wafer as described with reference to block

17-1714A. In some aspects, the operation 17-1700V begins in block 17-1702V with yielding carboxylic acids on exposed surfaces of the carbonaceous dispersion. The operation 17-1700V continues at block 17-1704V with reacting the carboxylic acids with amines from bioreceptors in the carbonaceous dispersion using EDC (1-ethyl-3-(3-dimethylaminopropyl)carbodiimide hydrochloride) and sulfo-NHS (N-hydroxysulfosuccinimide).

This Patent Application is related to U.S. patent application Ser. No. 17/354,175 entitled "BIOFUNCTIONALIZED HIGH-FREQUENCY THREE DIMENSIONAL GRAPHENE FIELD EFFECT TRANSISTOR" filed on Jun. 22, 2021; U.S. Provisional Patent Application No. 63/042,808 entitled "EMBEDDED BIOSENSORS" filed on Jun. 23, 2020, all of which are assigned to the assignee hereof. The disclosures of the prior Applications are considered part of and are incorporated by reference in this Patent Application in their respective entireties.

Various implementations of the subject matter disclosed herein relate generally to systems and methods of manufacturing electrophoretic displays (referred to herein as "EPDs" and colloquially referred to as "electronic paper"). Electronic paper and e-paper, and also occasionally electronic ink, and electrophoretic displays are display devices (or constituent components or display devices) that essentially mimic the appearance of traditional ("ordinary") wet ink on as used on paper. However, unlike conventional backlit flat panel displays (referring to modern flat panel television and computer monitor displays) that emit light, electronic paper displays reflect light emitted onto it, similar to conventional paper. This may make EPDs relatively more natural to the eye and comfortable to read in a well-lit environment (such as outdoors during a sunny day, or in an office conference room), while also providing a wider viewing angle than most conventional or currently available light-emitting displays. Notably, available contrast ratios in EPDs have already reached levels similar to traditional print mediums, including newspaper. As a result, manufacturers now often can benchmark EPD performance based on whether they can be read in direct sunlight without generating images that appear to fade (referring to becoming visually indistinct or indistinguishable due to lack of sufficient contrast between light and dark surfaces in the presence of significant external illumination).

Some EPD technologies can retain static text and images indefinitely without electricity, thus providing a useful low-cost alternative to traditional digital displays for certain non-demanding application areas, such as signage for produce in a grocery store, or for disposable labeling on shipments and packages, etc. Flexible electronic paper can be configured to use plastic substrate materials and plastic electronics to provide structural rigidity in their respective display backplanes, while the lack of illumination can result in limited power consumption translating to low operational costs. Applications of EPDs are numerous and can include electronic shelf labels and digital signage, time tables at airports, bus, regional rail, and subway (train) stations, ride-share service pickup locations, electronic billboards (such as at sports arenas), smartphone displays, and portable electronic readers ("e-readers"), any one or more being able to display digital versions of books and magazines otherwise conventionally available in print medium form, with similar (or better) visual acuity and accuracy. Given that electronic devices and advances in cloud-based computing have dramatically increased the amount of data able to be processed and exchanged on a daily basis across a variety of economic sectors ranging from higher education to corporate finance, the ability to visually render up-to-date information to users has become increasingly important.

Of note, the detailed displaying of textual and graphical information is central to Internet of Things ("IoT") systems (referring to a system of interrelated computing devices, mechanical and digital machines provided with identifiers and the ability to transfer data over a network without requiring human-to-human or human-to-computer interaction), where low cost and power requirements have presented significant challenges regarding their widespread deployment and usage. Modern day display technologies, including organic light emitting diode (OLED) technology, provide brilliant, detailed, and high-resolution displays (complete with the ability to accurately replicate true black color representations), but these rich graphics often demand high operational costs as reflected in ongoing power consumption, and may otherwise not be particularly suitable for integration with self-powering or other alternative energy harvesting solutions. For many IoT applications, including electronic shelf or package labels, providing basic necessary information at low power is more desirable than a rich graphical experience at high power. Although more energy efficient electrophoretic display technologies have reduced ongoing energy requirements, they still often require high voltage and energy to drive the display, thus negating the possibility of using ambient energy collection approaches.

Unique 3D Hierarchical Open Porous Structure

The presently disclosed implementations provide EPD display devices with a carbon-containing layer positioned between oppositely charged electrode layers. The carbon-containing layer acts as a physical barrier for electrophoretic ink that migrates between the electrode layers to guide and control the migration for achieving high image resolution while maintaining low power consumption. The EPD devices present improvements beyond conventional EPD displays by incorporating three-dimensional (3D) carbon-based aggregates formed of graphene nanoplatelets in the carbon containing layer (where graphene nanoplatelets refer to a relatively new class of carbon nanoparticles and/or nanopowder) with multifunctional properties. Graphene nanoplatelets can consist of small stacks (3-5 layers, or up to 15 layers) of substantially vertically aligned graphene sheets having a platelet shape. Such graphene sheets can be nearly identical to those found in the walls of carbon nanotubes but presented in a planar form. Graphene nanoplatelets can replace carbon fiber, carbon nanotubes, nanoclays, or other compounds in many composite applications, including those applicable for the EPD devices presented herein.

The 3D carbon-based aggregates formed of graphene nanoplatelets can be synthesized (or otherwise "self-assembled", "self-nucleated", or created) in a controlled and tunable chemical reaction chamber or reactor upon flowing carbon-containing gaseous species therein, the gaseous species optionally including of one or more inert carrier gases, etc. The 3D carbon-based aggregates are innately self-grown in-flight at defined positions orthogonal (at a right angle) to one-another to define a 3D hierarchical open porous structure (the term "hierarchical" being used here to refer to multiple open pathways of various widths or other dimensions interspersed through or between larger 3D carbon aggregates). The disclosed self-growth or self-assembly process presents a significant procedural, synthetic, and technological departure from known and conventional carbon particle creation processes, such as annealing (referring to a heat treatment that alters the physical and sometimes chemical properties of a material to increase its ductility and reduce its hardness, making it more workable) and sintering (referring to the process of compacting and forming a solid mass of material by heat or pressure without melting it to the point of liquefaction) to present unexpected favorable material and performance properties in the 3D hierarchical open porous structure.

Regarding the specifics of the carbon-containing layer of the presented EPD devices, an organized and tunable porous arrangement is formed in the 3D hierarchical open porous structure that is configured to facilitate the electrophoretic migration of carbon-based electronic inks therein. The porous arrangement can be substantially immobile such that the 3D carbon-based aggregates are cross-linked and can be held in position by a binding material or binder to promote flexibility as may be desirable for formation of the porous arrangement on flexible substrates, such as paper, plastic, or other materials, yet still guide electrophoretic ink migration as desired. The electrophoretic carbon-based ink can be produced by using an ultrasonication method in which carbon materials are simultaneously fragmented and functionalized to make submicron ink particles ranging from approximately 100 nm to 200 nm that disperse effectively in a low dielectric solvent.

The presently disclosed EPD devices, related structures, and electrophoretic carbon-based inks can be 3D printed on flexible and disposable substrates, allowing for the development and economically feasible production of low-cost devices geared for everyday use. The EPD devices have relatively low power consumption requirements compared to traditional EPDs and can thus be run on relatively low amounts of power permitting for devices that can be operated by energy harvesting alone, rather than on (for example) portable battery power as occasionally found in conventional EPD devices. Applications for the disclosed devices are widespread, as discussed earlier, and include (at least), shipping labels for packages or price tags for store items, where the information to be displayed on the EPD can be conveyed wirelessly to the EPD. The low cost of the EPD allows for it to be discarded after the item upon which it is affixed has been delivered or purchased, etc.

Conventional Electrophoretic Display ("EPD") Devices

Dissimilar to conventional backlit flat panel displays that emit light, electronic paper displays, including the presently disclosed EPD devices, reflect light like traditional paper, making them natural for the human eye to observe and read, and can also provide for a wider viewing angle allowing for versatility in applications replacing traditional signage in retail stores, etc. And, many electronic paper technologies can hold (present) static text and images indefinitely without electricity, thus reducing ongoing power consumption requirements for applications in a variety of areas.

A side cut-away schematic view 18-110A of an example conventional EPD device 18-100A is shown in FIG. 18-1A, including an upper (transparent) electrode layer 18-102A, a liquid polymer layer containing electrophoretic ink capsules 18-104A, and a lower electrode layer 18-106A, along with a top-down view 18-108A of the EPD device 18-100A. In conventional practice, titanium dioxide ("titania") particles approximately one micrometer (μm) in diameter are dispersed in a hydrocarbon-based oil. A dark-colored dye can also be added to the oil, along with surfactants (referring to a substance which tends to reduce the surface tension of a liquid in which it is dissolved) and charging agents that cause the titania particles to take on an electric charge. This mixture is placed between two parallel, conductive plates (shown as upper and lower electrode layers 18-102A, and 18-106A, respectively) that are separated by a gap of 10 μm to 100 μm. When a voltage is applied across the two plates, the particles migrate electrophoretically (referring to the motion of dispersed particles relative to a fluid under the influence of a spatially uniform electric field) to the plate that bears the opposite charge from that on the particles. When the particles are located at the front (viewing) side of the display, the EPD 18-100A appears white, because the light is scattered back to the viewer by the titania particles due to their refractive index (a dimensional numerical value that describes how fast light travels through a given material). When the particles are located at the rear side of the display, that portion of the EPD appears dark, because the incident light is absorbed by the colored dye. If the rear electrode is divided into a number of small picture elements (pixels), then an image can be formed by applying an appropriate voltage to each region of the display to create a pattern of reflecting and absorbing regions.

Conventional EPDs can be configured to be controlled by or with metal oxide field effect transistor (MOSFET)-based thin-film transistor (TFT) technology. TFTs can be required to form a high-density image in an EPD. A common application for TFT-based EPDs are e-readers. EPDs are considered prime examples of the electronic paper category, because of their paper-like appearance and low power consumption. Examples of commercial electrophoretic displays include the high-resolution active matrix displays used in the Amazon Kindle, Barnes & Noble Nook, Sony Reader, and Kobo eReader.

A conventional microencapsulated electrophoretic display 18-100B is shown in FIG. 18-1B and includes a top and bottom electrode array, 18-102B and 18-108B, respectively, having an alternating and opposite polarity or charge as shown, along with white-colored negatively charged particles 18-104B and black-colored dye 18-106B (collectively referred to as electronic ink). The EPD holds microcapsules in a layer of liquid polymer, sandwiched between two arrays of electrodes 18-102B and 18-108B, the upper of which is transparent. The two arrays of electrodes 18-102B and 18-108B are aligned to divide the sheet into pixels, and each pixel corresponds to a pair of electrodes situated on either side of the sheet. The sheet is laminated with transparent plastic for protection, resulting in an overall thickness of 80 micrometers, or twice that of ordinary paper. The network of electrode arrays (referring to the two arrays of electrodes 18-102B and 18-108B) connects to display circuitry, which turns the electronic ink "on" and "off" at specific pixels by applying a voltage to specific electrode pairs. A negative charge to the surface electrode repels the white-colored negatively charged particles 18-106B to the bottom of local capsules, forcing the black-colored dye 18-106B to the surface to turn the pixel black. Reversing the voltage has the opposite effect. It attracts the white-colored negatively charged particles 18-106B to the surface, turning the pixel white.

Ultra-Thin, Plastic Passive Matrix EPD Displays (PMEPDs)

A conventional PMEPD 18-100C using Microcup technology is shown in FIG. 18-1C and includes a top patterned conductor film 18-102C, charged particles 18-104C, a sealing or adhesive layer 18-106C, bottom patterned conductor film 18-108C, and a dielectric solvent 18-110C. An example Microcup 18-114C (which may also or alternatively refer to a plurality of Microcups as Microcups 18-114C) can have a cup dimension 18-112C, referring to a width (w) or a length (1), ranging from 60-180 μm, and a Microcup height 18-116C of 15-40 μm. The top patterned conductor film 18-102C and bottom patterned conductor film 18-108C sandwich the one or more Microcups, each of which is filled with the dielectric solvent 18-110C, permitting for guided migration of charged particles 18-104C pursuant to the formation of Microcups 18-114C upon exposure to voltage.

PMEPDs have been prepared by a format flexible, roll-to-roll manufacturing process based on Microcup and sealing technologies. High switching rate Microcup PMEPDs having threshold voltages ranging from 5 to 50V with a sharp electro-optical transition ("gamma") have been demonstrated in conventional products and technologies. A PMEPD using the traditional column and row electrode pattern has often provided a significant technical challenge due to the lack of inherent threshold characteristics to suppress or eliminate undesirable crosstalk or cross-bias among adjacent pixels during matrix driving.

Several attempts have been made to address the threshold issue. For example, an additional conductive layer or grid electrode have been employed to suppress the undesirable particle movement in non-addressing pixels. Such PMEPDs have been developed, but typically require high manufacturing cost due to the requisite multilayer electrode structures (which have a high cost themselves). Alternatively, magnetic particles and a magnetic electrode have been proposed to provide the required threshold, again at the expense of manufacturing cost. An electrophoretic fluid having inherent threshold characteristics has been reported, but with tradeoffs in for examples, response time, operation voltage, brightness, image uniformity, and display longevity.

As shown in FIG. 18-1C, walls or partitions of the Microcups 18-114C provide mechanical support throughout the entire EPD and can provide favorable physico-mechanical properties including scratch, impact, and flexure resistances. They also enable color separation by effectively isolating fluids of different properties such as colors and/or switching rate in each individual cup. With continuous filling and sealing technologies, EPDs may be manufactured roll-to-roll at a high speed at a relatively low cost.

Limitations Found in Conventional Technology

Although often at a lower cost to produce and operate due to their relative simplicity in comparison to other types of modern flat-panel display devices, electronic paper technologies can provide a very low refresh rate (which is undesirable) compared to other display technologies, such as liquid crystal displays (LCDs). This shortcoming prevents producers from implementing sophisticated modern interactive applications (using, for example, fast-moving menus, mouse pointers or scrolling) like those common on standard mobile devices (such as smartphones). An example of this limit during usage is that a document on a conventional EPD device might not be smoothly zoomed without:

extreme blurring during the transition; or, a very slow zoom (both being highly undesirable).

Another limit is that a shadow of an image may be visible after refreshing parts of the screen, leaving an undesirable residue that visually interferes with subsequent imagery displayed on the screen. Such shadows are a severe nuisance and are termed "ghost images" in industry, and the effect is termed "ghosting". This effect is reminiscent of screen burn-in but, unlike screen burn-in, can be resolved after the screen is refreshed several times.

Novel EPD Devices Including a 3D Hierarchical Open Porous Structure Acting as a Stationary Phase Through which Particles can Migrate Seeking to address limitations encountered in conventional EPD device technology, FIG. 18-1D shows a cross-sectional schematic diagram of an EPD device 18-100D that includes a structure 18-130D that is carbon-based, three-dimensional (3D), and includes tuned openings or pathways that are "hierarchical" in nature, such as by being organized by opening or pathway width. Accordingly, the structure 18-130D is generally open and porous. In the configuration shown in FIG. 18-1D, the EPD device 18-100D includes multiple layers 18-145D that are deposited on a substrate 18-110D through any one or more known methods, and by using commercially available tools.

As shown in FIG. 18-1D, the EPD device 18-100D includes a first electrode layer 18-120D disposed on the substrate 18-110D, the structure 18-130D disposed on the first electrode layer 18-120D, and a plurality of charged electrophoretic ink capsules 18-140D electrophoretic ink capsules 18-140D interspersed within and around a porous arrangement 18-148D formed in the structure 18-130D, and a second electrode layer 18-150D disposed thereon. The structure 18-130D can be sealed with an isolating sealing layer 18-139D and laminated to the second electrode 150D using an optically clear (transparent) adhesive material 18-149D. The plurality of charged electrophoretic ink capsules 18-140D electrophoretic ink capsules 18-140D electrophoretically migrates (referring to the motion of dispersed particles relative to a fluid under the influence of a spatially uniform electric field) toward layer 18-150D (relative to the charge of the particles and that of that section of the layer, substantially as introduced earlier for conventional EPD devices in FIGS. 18-1A-18-1C, where charged electrophoretic ink capsules 18-140D (that may be white-colored and negatively charged) would be attracted to a positively charged first electrode 18-102B) through the structure 18-130D to create high-resolution images (such as, patterns, graphics, text) to be viewed from layer 18-150D, as indicated by the icon of an eye 18-105D, and substantially replicate the appearance of traditional ink on paper.

Generally, the structure 18-130D forms a stationary solid phase between the first and second electrode layers, 18-120D and 18-150D, respectively, and can include porous carbon materials that are networked together with each other. Titanium dioxide (interchangeably referred to herein as "titania", "titanium IV oxide", refers to the naturally occurring oxide of titanium with the chemical formula of $TiO_2$)-inclusive electrophoretic ink particles (of a contrasting color to the stationary carbon solid phase) migrate pursuant to the application of a voltage to any one or more of the first and second electrode layers, 18-120D and 18-150D, respectively. In operation, negatively charged mobile titania particles can be attracted towards a positively charged first electrode layer 18-120D to display white coloration or repelled away from a negatively charged first electrode layer 18-120D to result in the display of black (or darker than white) coloration. Any one or more of the mobile titania can be guided or shuffled in and out (non-reactively) by the structure 18-130D (also referred to as a stationary solid phase). Such an approach can be easily distinguished from conventional techniques relying on electrophoretic inks dispersed in a dielectric solvent that trapped or at least substantially confined in either Microcups or microcapsules, with movement limited to the organization and placement of any the Microcups or microcapsules, respectively.

Fabrication of a Carbon-Based 3D Hierarchical Open Porous Structure

Conventional EPD devices can be manufactured by roll-to-roll formal flexible manufacturing processes and can include charged titania and/or ink particles dispersed in a dielectric solvent within Microcups through which charged particles migrate to form and show images. EPD devices can include a hydrocarbon oil positioned between adjacent electrode layers, where charged particles migrate through that oil to form images. EPD devices can further include carbon configurations prepared by annealing or sintering techniques as discussed earlier, both of which are conventional and known techniques and can fail to provide the fidelity required to achieve the structure 18-130D as shown and discussed in FIG. 18-1D.

Unlike the discussed (or other) conventional technologies, the structure 18-130D can be nucleated and grown in an atmospheric plasma-based vapor flow stream of reagent gaseous species, which include methane ($CH_4$), to self-form an initial carbon-containing and/or carbon-based particle (without otherwise requiring dedicated seed particle). That initial particle may be expanded by forming multiple orthogonally interconnected aggregates 18-132D, each aggregate 18-132D being of at least 400 nm in diameter, such as 400 nm to 20 μm, or such as an average diameter of 1 μm to 20 μm, where each aggregate contains multiple graphene nanoplatelets.

The initial particle then expands by being:

synthesized "in-flight", describing the systematic coalescence (referring to nucleation and/or growth from an initial carbon-based homogenous nucleation independent of a seed particle) of additional carbon-based material derived from incoming carbon-containing gas mid-air within a microwave-plasma reaction chamber; and/or, deposited or grown (alternatively referred to as "self-nucleated") directly onto a supporting or sacrificial substrate, such as a current collector, within a thermal reactor; and/or exposed to one or more post-processing operations to achieve particular desirable properties.

Coalescence refers to a process in which two phase domains of the same composition come together and form a larger phase domain. Alternatively put, the process by which two or more separate masses of miscible substances (carbon derivatives formed from the flowed methane gas) appear to "pull" each other together should they make the slightest contact.

Accordingly, the structure 18-130D forms a display architecture where carbon-based materials are uniquely self-nucleated to synthesize or otherwise produce a tunable porous (non-electrically conductive) network positioned between the first and second electrode layers, 18-120D and 18-150D, respectively, that can guide migratory movement of particles therein and therefore produce and reproduce sharp high-quality imagery not otherwise achievable through conventional means.

Returning to synthetic procedures for creating the structure 18-130, as introduced above, the vapor flow stream including carbon-containing constituent species, such as methane ($CH_4$) may be flowed into one of two general reactor types:

a thermal reactor; or, a microwave-based (and/or "microwave") reactor. Suitable types of microwave reactors are disclosed by Stowell, et al., "Microwave Chemical Processing Reactor", U.S. Pat. No. 9,767,992 (Sep. 19, 2017), incorporated herein by reference in its entirety.

The term "in-flight", as used herein, refers to a novel method of chemical synthesis based on contacting particulate material derived from inflowing carbon-containing gaseous species, such as those containing methane ($CH_4$), to "crack" such gaseous species. "Cracking", as generally understood and as referred to herein, implies the technical process of methane pyrolysis to yield elemental carbon (such as high-quality carbon black) and hydrogen gas, without potential problematic contamination by carbon monoxide, and with virtually no carbon dioxide emissions. A representative endothermic hydrocarbon cracking reaction that can occur within the microwave reactor as so described above is shown as equation 18-(1) below:

$$CH_4+74.85\text{KJ/mol}\rightarrow C+2H_2 \quad 18\text{-}(1)$$

Carbon derived from the above-described "cracking" process can fuse (self-bind) together while being dispersed in a gaseous phase, referred to as "in-flight", to create carbon-based particles, structures, (substantially) 2D graphene sheets, and the aggregates 18-132D derived therefrom. The aggregates 18-132D (collectively which define the structure 18-130D) can each individually include (or consist of) multiple layers of graphene nanoplatelets fused together, each layer of graphene nanoplatelets being fused at an angle orthogonal to adjacent graphene nanoplatelets, to serve as a type of intrinsic, self-supporting scaffold that can also be structurally supplemented by traditional chemical (wet), binders or other joining materials allowing for retention of favorable structural characteristics of the structure 18-130D even in circumstances of flexure or other movement of the second electrode layer 18-120D and/or the substrate 18-110D.

Electrical conductivity of deposited carbon and/or carbon-based materials used for creating the structure 18-130D can be tuned (or eliminated) by adding metal additions into the carbon phase in a first part of a deposition phase or to vary the ratios of various carbon particles derived from cracking hydrocarbon gases as discussed. Other parameters and/or additions may be adjusted, as a part of an energetic deposition process, such that the degree of energy of deposited carbon and/or carbon-based particles will either: (1) bind together; or, (2) not bind together. And, by nucleating and/or growing the structure 18-130D in an atmospheric plasma-based vapor flow stream either "in-flight" or directly onto a supporting or sacrificial substrate, a number of the operations and components found in both EPD devices and EPD device-making processes can be reduced or eliminated entirely. Also, tailoring and tunability can be enabled or added into the discussed carbons and/or carbon-based materials.

Dimensions of Pores of the Carbon-Based 3D Hierarchical Open Porous Structure

The carbon structure 18-130D can be synthesized in-flight, as described above, with a 3D hierarchical structure comprising short range, local nano-structuring in combination with long range approximate fractal feature structuring, which in this context refers to the formation of successive layers involving the 90-degree rotation of each successive layer relative to the one beneath it, and so on and so forth, allowing for the creation of vertical (or substantially vertical) layers and/or intermediate ("inter") layers. Such an orientation is referred to herein as "orthogonal layering" or "orthogonal interconnection" to create the structure 18-130D with the porous arrangement 18-148D formed therein. To achieve desired EPD performance qualities, the porous arrangement 18-148D can be tuned to include:

inter-particle pores 18-151D that are void spaces, cavities or openings within and around aggregates 18-132D that extend between mesoporous and macroporous dimensions (defined by the International Union of Pure and Applied Chemistry, IUPAC, as having pore diameters extending from 2 nm and 50 nm and greater than 50 nm, respectively) and are sized from 200 nm to 2 μm, 400 nm to 5 μm, or up to 10 μm, referring to the average distance between sections of the self-assembled aggregates 18-132D forming the structure 18-130D; and intra-particle porosity 18-155D is defined as being between materials within each aggregate 18-132D, such as between layers of graphene, and may have an average pore size of 200 nm to 2 μm.

The structure 18-130D can include aggregates 18-132D interconnected by polymers (such as a cross-linked polymer).

The substrate 18-110D can be a flexible material such as a polymer film or a paper-based material, as well as being relatively low-cost and disposable, being particularly well-suited for single use applications. Example materials suitable for usage to form the substrate 18-110D include any one or more of cardboard, paper, polymer-coated paper, and polymer films, as well as card stock, labels, and boxes. Alternative configurations of the EPD 18-100 are possible enabling extended use periods due to the dormant, non-power consumptive nature of the EPD 18-100D when not activated.

Functionality of the Electrophoretic Display (EPD) Device

Any one or more of first and second electrode layers 18-120D or 18-150D can incorporate an electrical conductor used to make contact with a nonmetallic part of a circuit (such as a semiconductor, an electrolyte, a vacuum or air) and generate an electric field for various components (such as pixels) of the EPD device 18-100D. The first and second electrode layers 18-120D and 18-150D, respectively, can be made from identical, similar, or different materials relative to each other. In some implementations, the first and second electrode layers 18-120D and 18-150D, respectively, can each include a plurality of individual electrodes positioned substantially adjacent to each other, with any one or more of the individual electrodes printed by a conductive ink. Potential formative materials used to fabricate electrode layers 18-120D and 18-150D can include indium tin oxide (ITO). The second electrode layer 18-150D is at least substantially transparent to allow viewing of images created by migration of the plurality of charged electrophoretic ink capsules 18-140D electrophoretic ink capsules 18-140D as guided by the structure 18-130D. The second electrode layer 18-150D can be an ITO-coated film such as polyethylene terephthalate (PET), while the first electrode layer 18-120D can be made from a carbon-inclusive material, such as graphene or metal-functionalized carbon allotropes (including graphene). Carbon particles prevalent in the first electrode layer 18-120D can be interconnected by a binder, such as a polymer, including, cellulose, cellulose acetate butyrate, styrene butadiene, polyurethane, polyether-urethane, or cross-linkable resins.

The structure 18-130D can be initially synthesized without requiring a nucleation (alternatively referred to as a "seed" particle), but later can be exposed to one or more post-processing operations to enable highly sensitive tuning (regarding width, length, or any other dimension) of any one or more porous pathways of the porous arrangement 18-148D, while remaining entirely non-conductive overall. Carbons and carbon-based materials can be post-processed (as further described in at least FIG. 18-4B) to make the porous arrangement 18-148D such that electrophoretic particles can, without impediment, move in and out of the structure 18-130 through porous arrangement 18-148D. The unique morphology of carbons used to produce the structure 18-130 guide migrating particles without creating, facilitating or in any way conducting electricity and/or electric current. In essence, the structure 18-130 is entirely non-conductive since one or more processes employed to form cross-linked carbons (as detailed in FIG. 18-4B of the structure 18-130) yield non-conductive materials.

Accordingly, the pores 18-151D between carbon particles 18-132D can enable the plurality of charged electrophoretic ink capsules 18-140D electrophoretic ink capsules 18-140D to electrophoretically migrate (referring to the motion of dispersed particles relative to a fluid under the influence of a spatially uniform electric field) through the structure 18-130D solely or at least primarily in response to activation and/or deactivation of any one or more of the first and second electrode layers 18-120D and 150D, respectively without experiencing unwanted electrical interference from the structure 18-130D itself. For instance, charged ink capsules of the plurality of charged (generally white or light colored) electrophoretic ink capsules 18-140D electrophoretically can migrate toward second electrode layer 150D by being guided by the structure 18-130D to form a detailed visible image at resolution levels not otherwise possible with conventional technologies lacking the unique particle guiding capabilities of the structure 18-130. In some configurations, most or all of the plurality of charged electrophoretic ink capsules 18-140D electrophoretic ink capsules 18-140D can be lighter-colored to contrast darker colors of the structure 18-130D.

Most or all of the plurality of charged electrophoretic ink capsules 18-140D electrophoretic ink capsules 18-140D can be titanium dioxide (titania) or other white colloidal particles on the order of 100 nm that are dispersed in a low dielectric solvent such as any one or more of isoparaffinic hydrocarbons, such as Isopar-L and Isopar-G, xylene, 1,2-dichlorobenzene, tetralin, diethylbenzene, toluene, decane, dodecane, hexadecane, cyclohexane, 2-phenylhexane, 1-phenylheptane, 1-phenyldecane, tetrachloroethylene. The plurality of charged electrophoretic ink capsules 18-140D electrophoretic ink capsules 18-140D can be configured to include a charge control agent (CCA), such as aerosol sodium di-2-ethylhexylsulfosuccinate (AOT), poly(isobutylene succinimide) (PIBS), or sorbitan oleate (SPAN®) to have a defined polarity so that they move in response to voltage differentials applied to any one or more of the first and second electrode layers 18-120D and 18-150D, respectively.

To better maintain a defined overall structural shape or pattern during circumstances of flexure of the substrate 18-110D, the structure 18-130D can include aggregates 18-132D interconnected with each other by a binder such as a polymer including cellulose, cellulose acetate butyrate, styrene butadiene, polyurethane, polyether-urethane or cross-linkable resins such as, acrylates, epoxies, vinyls that form polymerizable covalent bonds. The binder links the aggregates 18-132D together but does not consume or otherwise fill up the pores 18-151D and/or other voids, spaces, or gaps encountered between the aggregates 18-132D that are interconnected with each other to form the structure 18-130D.

In some implementations, the aggregates 18-132D can include constituent formative elements including carbon allotropes such as graphene, carbon nano-onions (CNOs), carbon nanotubes (CNTs), or any combination thereof, such that, in some implementations, the structure 18-130D can include graphene at defined weight and/or volume percentages, including greater than 50%, greater than 80%, or greater than 90%. A thickness 18-131D of the structure 18-130D can be made thinner than conventional EPD materials due to the conductive nature of the structure 18-130D, which enables electrode connections therein.

Fabricating the structure 18-130D as a thin layer can result in circumstances where less energy is required to move plurality of charged electrophoretic ink capsules 18-140D, therefore making the EPD device 18-100D more conducive to being powered solely by energy harvesting methods such as an energy harvesting antenna 18-190D, or others disclosed by Stowell, et al., in U.S. patent application Ser. No. 16/282,895 entitled "Antenna with Frequency-Selective Elements" filed on Feb. 22, 2019, incorporated herein in its entirety. For example, the thickness 18-131D of the structure 18-130D can be configured to be approximately 10 μm to approximately 40 μm, or approximately 10 μm to approximately 100 μm. The electrical conductivity of the structure 18-130D can be greater than 20,000 S/m, or greater than 5,000 S/m, or greater than 500 S/m, or greater than 50 S/m. Defined in terms of resistance, the sheet resistance of the structure 18-130D may be less than 1 Ohm/sq., or less than 10 Ohm/sq., or less than 100 Ohm/sq., or less than 1,000 Ohm/sq.

FIG. 18-1E shows an example EPD device 18-100E that can include the EPD device 18-100D with the structure 18-130D, both shown and discussed in FIG. 18-1D. The example EPD device 18-100E can generate high-resolution text 18-102E and drawings able to be viewed from wide angle, thereby enhancing the desirability of the EPD device 18-100E.

FIG. 18-2A shows an enlarged view the structure 18-130D (shown in FIG. 18-1D) for the EPD display 18-100D, in accordance with some implementations. As indicated earlier in FIG. 18-1D, the porous arrangement 18-148D can be tuned to include:

- inter-particle pores 18-151D that are void spaces, cavities or openings within and around aggregates 18-132D that are sized from 200 nm to 2 μm, 400 nm to 5 μm, or up to 10 μm, referring to the average distance between sections of the self-assembled aggregates 18-132D forming the structure 18-130D; and
- intra-particle porosity 18-155D is defined as being between materials within each aggregate 18-132D, such as between layers of graphene, and may have an average pore size of 200 nm to 2 μm.

The aggregates 18-132D themselves can be of sized to be at least approximately 400 nm in diameter, such as approximately 400 nm to approximately 20 μm, or such as an average diameter of approximately 1 μm to approximately 20 μm, and be cross-linked together (orthogonally) by a polymer. Detailed view 18-135 shown in FIG. 18-2B depicts an enlarged schematic representation of an example aggregate 18-132D including organized graphene nanoplatelets orthogonally fused together, each nanoplatelet possibly including few layer graphene (FLG) 18-136 and single-layer graphene 18-137. Representative inter-particle porosity 18-138*a*, shown in FIG. 18-2C (a further enlargement of that shown in FIG. 18-2B), is between FLG 18-136 (also, in some implementations, FLG 18-136 can be the aggregates 18-132B), whereas intra-particle porosity 18-138*b* is within any one or more FLG 18-136, such as between individual graphene layers of graphene and be sized at approximately 200 nm to approximately 2 μm.

FIGS. 18-3A and 18-3B are scanning electron microscope (SEM) micrographs of a carbon network 18-300 and a carbon network 18-301 (any one or more of which is representative of the structure 18-130D shown in FIG. 18-1D), respectively, where the carbon networks 18-300 and 18-301 consist of carbon-based materials only (such as the aggregates 18-132D grown "in-flight" in an atmospheric vapor stream of a carbon-containing gaseous species, such as methane, as discussed earlier with relation to FIG. 18-1D), without application or usage of resin to connect the aggregates 18-132D. FIG. 18-3A shows the carbon network 18-300 including various larger inter-particle pores 18-304 (sized from 200 nm to 2 μm, 400 nm to 5 μm, or up to 10 μm) of varying sizes and smaller intra-particle pores 8-308 (having an average pore size of 200 nm to 2 μm) that are shown by the highly textured 3D construction of the carbon network 18-300 shown in FIG. 18-3A. FIG. 18-3B is a higher magnification micrograph of the carbon network 18-300 shown in FIG. 18-3A illustrating porosity of the carbon network 18-301. The carbon networks 18-300 and 18-301 illustrate example carbon-based porous structures without the usage of resin materials to bind carbon materials together. In certain usage or flexure conditions, the carbon networks 18-300 and 18-301 can fracture and disintegrate, thus failing to provide a guide for migrating electrophoretic ink particles to form high-resolution images, thus limiting their ability to be applied electrophoretic displays, such as the EPD device 18-100 shown FIG. 18-1. To address such potential performance issues, resins (referring to a solid or highly viscous substance of plant or synthetic origin that is typically convertible into polymers) can be systematically incorporated into any one or more of the carbon networks 18-300 and 18-301 for strengthening and maintenance of structure purposes, enabling them to be used in EPD devices without encountering breakage or other performance issues.

FIGS. 18-4A and 18-4B show flowcharts with accompanying explanatory schematic diagrams 18-400*a* and 18-400*b* both related to fabricating carbon-based scaffold or structures, such as structure 18-130D shown in 18-1D as well as carbon networks 18-300 and 18-301 shown in FIGS. 18-3A and 18-3B respectively, any one or more suitable for incorporation with electrophoretic displays, such as EPD device 18-100D shown in FIG. 18-1D. The diagram 18-400*b* shown in FIG. 18-4B represents a continuations of the diagram 18-400*a* shown in FIG. 18-4A. In operation 18-410 of FIG. 18-4A, carbon particles, such as the aggregates 18-132D shown in FIG. 18-1D, can be grown "in-flight" in a substantially atmospheric vapor flow stream as described earlier and/or using the microwave plasma reactors and/or methods described in U.S. Pat. No. 9,812,295, entitled "Microwave Chemical Processing," or in U.S. Pat. No. 9,767,992, entitled "Microwave Chemical Processing Reactor," which are incorporated herein by reference in their respective entireties for all purposes. The carbon particles, such as the aggregates 18-132D, can be constructed from several smaller carbon-based constituent elements, such as orthogonally fused FLG and/or SLG, as shown in FIGS. 18-2B and 18-2C. Such aggregates can be further deconstructed or disintegrated into their constituent nanoparticles in operation 18-420 for functionalization of those nanoparticles with nucleophilic functional groups in operation 18-430 to promote bonding of cross-linkable monomers to exposed carbons. Fragmenting and/or functionalizing can be performed in the reactor in which the aggregates are formed, such as during or immediately after their functionalization. Alternatively, or in addition to in situ (within the same reactor) processing as described, fragmentation and/or functionalization can be done in post-processing operations outside of the reactor, after the aggregates 18-132D are grown. Nucleophilic moieties added during functionalization can promote coupling with electrophilic moieties of cross-linkable monomers. Nucleophilic moieties can include, for example, hydroxides and/or amines, where in the example of FIG. 18-4A, exposed carbons can be oxidized to create hydroxylated carbon.

Turning to diagram **18-400*b* shown in FIG. 18-4B, nucleophilic moieties of functionalized carbons of operation 18-430 can be converted to cross-linkable carbons in operation 18-440 by, for instance, functionalizing one or more exposed surfaces of the structure 18-130D shown in FIG. 18-1D with a nucleophilic moiety and adding monomers to exposed and/or active surfaces of carbon nanoparticles. Examples of monomers include portions of oligomers, such as urethanes, polyether, or polyester tethered with acrylates or epoxides. An organic coupler, such as toluene diisocyanate (TDI) or methylene diphenyl diisocyanate (MDI), can also be added in operation 18-440 to further link bonds between carbon nucleophiles and cross-linkable monomers. The operation 18-440** can also include combining carbon nanoparticles with a solvent and a polymer initiator, where the polymer initiator will later be used to promote cross-linking of the carbons. Polymer initiators may include ultraviolet (UV) or photoinitiators such asa-hydroxyketones and mono acyl phosphines. Specific examples include Irgacure 184, Irgacure 819, Irgacure 1300, Darocur 1173, and Darocur TPO. Thermal initiators can also (or in the alternative) be used such as benzoyl peroxide, 2,2'-azobisisobutyronitrile (AIBN), tert-butyl peroxide, 1,1'-azobis(cyclohexanecarbonitrile), cyclohexanone peroxide, tert-butyl peracetate, and 4,4-azobis(4-cyanovaleric acid). Solvents include, for example, isopropanol, ethanol, 2-methoxyethanol, propylene glycol monomethyl ether acetate, methyl ethyl ketone, cyclohexanone, N-methyl-2-pyrrolidone, N,N-dimethylformamide, xylene, toluene, methylene chloride, and/or various mixtures and combinations thereof.

Materials produced by operation 18-440 can be used to create an ultraviolet (UV) and/or thermally curable carbon paste by adding solvents and radical initiators. Operation 18-440 can include washing to remove excess monomers that have not been successfully linked to exposed surfaces of carbon particles such that resulting carbons will have a small number of functional groups on the surfaces of the carbon particles, which can be used for cross-linking. In operation 18-450, carbon paste is casted as a paste layer 18-452 layer 18-452 and dried onto a substrate 18-454 (such as any one or more of polyethylene naphthalate, polyethylene terephthalate, polyimide, polycarbonate, and polymethylmethacrylate films) that provides support for the paste layer 18-452 layer 18-452. Solvent in the paste layer 18-452 layer 18-452 can be at least partially removed after being cast onto the substrate 18-454. In operation 18-460, pixel patterns for the electrophoretic display are formed by debossing (referring to the techniques of embossing and debossing, which imply the processes of creating either raised or recessed relief images, respectively, and designs in paper and other materials) into a surface of the paste layer, such as by forming a plurality of recesses 18-463 into a surface of the paste layer 18-452 layer 18-452. After forming the patterns, the cross-linkable carbons in the layer 18-452 are polymerized into a structure 18-462 (similar to the structure 18-130D shown in FIG. 18-1D) by applying UV energy and/or heat. For example, a metal halide type lamp (such as a UVA light at 320-390 nm, 100 $Mw/cm^2$) can be used to cure the surface of the carbon paste layer within 5 minutes of UV exposure. The resulting layer can be further crosslinked by heating the film at 90° C. for 10 minutes. Other free radical polymerization methods known to those having ordinary skill in the art can also or alternatively be used in crosslinking the carbons. The formed structure 18-462 on the substrate 18-454 may be incorporated into an EPD, such as the EPD device 18-100D of FIG. 18-1D.

Carbon-Inclusive Electrophoretic Ink Capsules (Configured to Migrate Through Carbon Structures)

FIGS. 18-5 and 18-6 show implementations of example EPDs (any one or more of which may be equivalent or similar to EPD 18-100D shown in FIG. 18-1D) which use carbon-inclusive electrophoretic inks (interchangeably referred to as electronic inks), in accordance with some implementations. Conventional electrophoretic inks can contain negatively charged white-colored particles and positively charged black-colored particles and be suspended in a clear fluid. The white and black colored particles (referring to charged electrophoretic ink microspheres or capsules) can be organized as a thin film to be incorporated into various end-use applications, such as EPDs, enabling novel applications in phones, watches, magazines, wearables and e-readers, etc., to form detailed human-readable images, where black-colored electrophoretic ink capsules can include carbon black (referring to a material produced by the incomplete combustion of heavy petroleum products such as FCC tar, coal tar, or ethylene cracking tar).

Uniformity in pigment particle size and zeta potential is desirable in EPD device applications, as differences is charged particles can result in corresponding (and undesirable) differences in migration rates upon exposure to an applied electric field, thus resulting in unwanted variation and lack of predictability in resultant image quality. For instance, smaller size particles tend to migrate at a pace faster than larger particles. The presently disclosed electrophoretic inks include any one or more highly structured carbons, such as graphene, carbon nano-onions (CNOs), carbon nanotubes (CNTs), or any combinations or resultant structures derived so as to enable higher particle uniformity than conventional inks as well as a high phase purity of highly structured carbons, rather than carbon black alone. For example, the presented carbon-inclusive electrophoretic inks may have greater than 90% or greater than 95% or greater than 99% of highly structured carbons. The present carbon inks can be fabricated by simultaneously functionalizing and fragmenting carbon particles, resulting in a more uniform distribution of particle sizes and higher dispersion of carbon particles in the ink. For instance, the carbon inks may be monodispersed having a polydispersity index (PDI) of less than 0.1 or have a narrow particle size distribution of <0.2.

The EPD device 18-500 of FIG. 18-5 is similar to the EPD device 18-100D shown in FIG. 18-1, with a substrate 18-510 corresponding to the same characteristics as described for substrate 18-110D, and so on and so forth. Unlike EPD device 18-100D, device 18-500 utilizes a carbon-based ink 18-540 ink 18-540 interspersed within a structure 18-530, and also includes a contrast layer 18-560 layer 18-560 positioned between the structure 18-530 and second electrode layer 18-550. Since presence of carbon will cause the carbon ink 18-540 ink 18-540 to be dark in color, the contrast layer 18-560 layer 18-560 can be used to provide a contrasting color so that patterns formed by the carbon ink 18-540 ink 18-540 can be seen by a user when the ink 18-540 is near the bottom surface of layer 18-560. For example, contrast layer 18-560 layer 18-560 may be white in color, comprising aluminum dioxide, antimony trioxide, barium sulfate, silicone dioxide, titanium dioxide, zinc sulfide or other white particles, in contrast to a black color of the carbon ink 18-540 ink 18-540.

FIG. 18-6 shows another EPD display device 18-600 device 18-600 that can be used with any one or more of the presently disclosed carbon-inclusive inks. The EPD device 18-600 device 18-600 of FIG. 18-6 can be substantially similar to the EPD device 18-100D shown FIG. 18-1D, with substrate 18-610 corresponding to the same characteristics as described for substrate 18-110D, and so on and so forth. Unlike other EPD implementations, EPD device 18-600 device 18-600 can include a structure 18-630 of a contrasting color (such as white) to a carbon ink 18-640, rather than the structure and ink being of the same color as in other example EPD implementations. Structure 18-630 can be made of polymeric composite materials that include light-colored (such as white) aggregates 18-632, such as aluminum dioxide, antimony trioxide, barium sulfate, silicone dioxide, titanium dioxide, zinc sulfide or other white-colored aggregates. The aggregates 18-632 in the structure 18-630 can be surface functionalized to enable the cross-linking, such as using acrylate functional groups, epoxy groups, or organically modified silica ("ORMOSIL"). The structure 18-630 can be light-reflective, making carbon ink unseen when the ink is dispersed away from a viewing surface of the device 18-600.

FIG. 18-7A illustrates a flowchart 18-700 with accompanying explanatory schematic diagrams for making carbon inks for EPD devices. In operation 18-710 of FIG. 18-7A, carbon particles (similar or equivalent to the aggregates 18-132D shown in FIG. 18-1D) are produced using microwave plasma reactors and/or methods as described in any one or more of the aforementioned U.S. Pat. Nos. 9,812,295 and 9,767,992. The carbon particles can be combined with reactive monomers (such as styrene, 4-vinyl-benzyl chloride, and vinyl-benzyl trimethylammonium chloride) in operation 18-720, where ultrasonic energy is applied to the mixture to simultaneously fragment and functionalize the particles in operation 18-730. The carbon particles are fragmented into nanoparticles, each of which that may have an average size of, for example, less than 200 nm. The sonication in operation 18-730 also produces free radicals, allowing the sub-particles to be functionalized with the reactive monomers. The monomers are polymerized on the surfaces of the carbon particles to make linear polymers acting as dispersing agents. The operation 18-730 may also involve adding a radical initiator, such as AIBN or other thermal initiators. The resulting particles can be dispersed in a low dielectric solvent with a charge control agent (CCA) in operation 18-730, such as AOT, PIBS, or SPAN, to make a carbon-inclusive electrophoretic ink. Fragmenting and functionalizing can be performed together using ultrasonic energy in operation 18-730 to create particles that are relatively uniform size and highly dispersed in the electrophoretic ink. Alternatively, carbon nanomaterials can be oxidized that can be coupled with fatty acids (such as oleic acid, isopalmitic acid, and isostearic acid) or amines (such as octadecylamine, hexadecylamine, and oleylamine) to make a functionalized carbon that can be dispersed in a low dielectric solvent. The CCA is then added to increase the zeta potential of the carbon particles. The resulting electrophoretic ink may have a high a zeta potential value of at least 30 mV in magnitude, such as approximately-30 mV to approximately-60 mV (negative values for carbon ink).

FIG. 18-7B is a schematic diagram representing another method 18-740 of producing a carbon ink for an electrophoretic visual display, in accordance with some implementations. In contrast to that shown and discussed in FIG. 18-7A, carbon particles can be produced in a manner similar to operation 18-710 in operation 18-750 and be reacted with octadecylamine at operation 18-760 to make functionalized carbon in operation 18-770. Also, in some configurations of the presently disclosed examples and/or implementations, black or dark-colored carbon-based electrophoretic inks can be used to migrate within a white (or light-colored) stationary carbon-based porous matrix or structure. Such functionalized carbons can then be mixed with charge control agents in operation 18-780 (such as described in Example 1).

EPD Device Configurations

FIGS. 18-8-18-11 illustrate example configurations for any one or more of the EPD devices disclosed herein using the carbon structures (such as the structure 18-130D shown in FIG. 18-1D) and/or carbon inks in accordance with some implementations. In these figures, only the electrode layers and matrix layer are shown for clarity. Also, the figures are schematics and are not drawn to scale; for example, dimensions of the recesses and layers may be proportioned differently than what is shown.

FIG. 18-8 shows a portion of an EPD 18-800 including a first electrode layer 18-820 ("bottom electrode"), a structure 18-830 (that can be carbon-based or inclusive similar to structure 18-130D shown in FIG. 18-1D) on the first electrode layer 18-820, and a second electrode layer 18-850 electrode layer 18-850 ("top transparent electrode") on the structure 18-830. The structure 18-830 is non-conductive, porous, and made of carbon particles 18-831. Ink 18-840 is depicted as droplets in order to illustrate movement of the ink, but it should be understood that ink 18-840 includes white submicron particles infused into the structure 18-830 that moves between the pores of the structure 18-830 as described above. The ink 18-840 is an electrophoretic white ink and positively charged in this implementation.

The first electrode layer 18-820 and second electrode layer 18-850 electrode layer 18-850 are shown with pixels 18-832*a*, 18-832*b* and 18-832*c*, where in operation, each pixel of first electrode layer 18-820 is oppositely charged from the correspondingly paired pixel in the second electrode layer 18-850 electrode layer 18-850. Because ink 18-840 is positively charged, the ink 18-840 is attracted to negatively charged pixel 18-832*b* of the second electrode layer 18-850 electrode layer 18-850 so that pixel 18-832*b* appears white in the EPD 18-800. Conversely, positively charged pixels 18-832*a* and 18-832*c* of second electrode layer 18-850 electrode layer 18-850 appear black due to the absence if ink 18-840 at second electrode layer 18-850 electrode layer 18-850. The pixels 18-832*a*, 18-832*b*, 18-832*c* of the display may have a rectangular, circular, hexagonal, or other shape in the plane of electrode layer 18-850, where the pixels form a pattern such as an orthogonal or diagonal array.

FIG. 18-9 is a cross-sectional view of an EPD 18-900, illustrating an implementation using a non-conductive, non-porous carbon-based structure 18-930 rather than the structure 18-830 of FIG. 18-8. EPD 18-900 also uses a colored ink 18-940 instead of a white ink 18-840. FIG. 18-9 includes a first electrode layer 18-920 electrode layer 18-920 ("bottom electrode"), the non-porous carbon-based structure 18-930 on the first electrode layer 18-920 electrode layer 18-920, a porous TiO2 layer 18-960 on the non-porous carbon-based structure 18-930, and a second electrode layer 18-950 ("top transparent electrode") on the layer 18-960. The non-porous carbon-based structure 18-930 is patterned, having recessed regions 18-935 formed in the non-porous carbon-based structure 18-930 through which the ink 18-940 can travel. Ink 18-940 is made of electrophoretic carbons that are negatively charged. The ink 18-940 may be black or another color, such as by adding a colored pigment instead of the carbon. The pairs of pixels 18-932*a*, 18-932*b* and 18-932*c* in first electrode layer 18-920 electrode layer 18-920 and second electrode layer 18-950 are similar to the pixels described above for FIG. 18-8.

In FIG. 18-9, the pixel 18-932*b* is depicted as appearing white with no carbon particles (black ink 18-940) in the layer 18-960, and pixels 18-932*a* and 18-932*c* are depicted as appearing with the color of the ink 18-940 (ink 18-940 in porous $TiO_2$ layer 18-960). Together, the pixels 18-932*a*, 18-932*b*, 18-932*c* form an image on the EPD 18-900. FIG. 18-9 shows one implementation of driving the ink, in which the ink 18-940 moves vertically between the electrode layers 18-920 and 18-950 when a voltage is applied between a first electrode in first electrode layer 18-920 electrode layer 18-920 and a second electrode in second electrode layer 18-950 (such as, electrodes in each pixel 18-932*a,b,c*). The electrodes can be individually addressed by addressable arrays in first electrode layer 18-920 electrode layer 18-920 and second electrode layer 18-950, respectively, as shall be understood by those of ordinary skill in the art. In the example of FIG. 18-9, the first electrode in pixel 18-932*a* of first electrode layer 18-920 electrode layer 18-920 has a negative charge and the second electrode in pixel 18-932*a* of second electrode 18-950 has a positive charge. Because the ink 18-940 is negatively charged, the ink 18-940 will move through recess 18-935, toward second electrode layer 18-950 and resting within porous layer 18-960, thus becoming visible in the image produced by the EPD 18-900. When an opposite voltage is applied, as illustrated by the negative charge on pixel 18-932*b* of second electrode layer 18-950 and a positive charge on pixel 18-932*b* of first electrode layer 18-920 electrode layer 18-920, the ink 18-940 will move back toward electrode layer 18-920 and the pixel 18-932*b* will appear as blank.

FIGS. 18-10 and 18-11 show implementations of EPDs 18-1000 and 18-1100 that are similar to EPD 18-900 but with openings (such as, recesses) that are triangular in cross-section. EPD 18-1000 includes a first electrode layer 18-1020, a non-porous carbon-based structure 18-1030 on the first electrode layer 18-1020, a porous TiO2 layer 18-1060 on the non-porous carbon-based structure 18-1030, and a second electrode layer 18-1050 on the porous $TiO_2$ layer 18-1060. The non-porous carbon-based structure 18-1030 is non-conductive and non-porous. Recesses 18-1035 in the non-porous carbon-based structure 18-1030 have a vertex of the triangular shape that is pointed away from the image viewing surface (such as, away from the second electrode layer 18-1050). Ink 18-1040 comprises electrophoretic carbons that are negatively charged. FIG. 18-10 shows a configuration in which ink 18-1040 is shuttled vertically in and out of recesses 18-1035 due to voltage applied to pixels in first electrode layer 18-1020 and second electrode layer 18-1050, as described above.

FIG. 18-11 shows a configuration in which a non-porous structure 18-1130 is a non-porous layer patterned with triangular recesses 18-1135 similar to FIG. 18-10, but the non-porous carbon-based structure 18-1130 is conductive rather than non-conductive as was the non-porous carbon-based structure 18-1030. The bottom electrode 18-1120, top electrode 18-1150 and porous $TiO_2$ layer 18-1160 of FIG. 18-11 are similar to the corresponding layers in FIG. 18-10. An insulating sealing layer 18-1170 layer 18-1170 between porous $TiO_2$ layer 18-1160 and top electrode 18-1150 serves to electrically isolate the non-porous structure 18-1130 from the top electrode 18-1150. An example of a sealing composition for sealing layer 18-1170 includes a thermoplastic precursor dispersion that is immiscible with the electrophoretic ink and has lower specific density than the ink. After the immobile phase has been filled with a mixture of sealing precursor and electrophoretic ink, the precursor phase separates and forms a thin layer on the top of the fluid. This layer can then be polymerized thermally or radiologically to hermetically seal the immobile phase. Because the non-porous structure 18-1130 is conductive, the ink 18-1140 moves toward the entire faces (such as, side walls) of the triangular recesses 18-1135 rather than just toward the downward vertex as in FIG. 18-10. Such an implementation may provide a faster response time in forming an image for the EPD 18-1100 compared to EPD 18-1000 since the ink 18-1140 travels less distance.

FIGS. 12 and 13 show images of an example electrophoretic display cells 18-1200 and 1300, respectively, in accordance with some implementations. Upon application of a voltage differential of approximately +1 V to any one or more of the display cells 18-1200 or 18-1300, a contrasting image was observed (relative to no electric field). Similarly, FIG. 18-14 shows an image of an example electrophoretic display cell 1400 indicating stylized indicia that can be reconfigured pursuant to voltage applications, suitable for e-readers, supermarket displays, etc., in accordance with some implementations.

FIG. 18-15A shows a cut-away schematic diagram of an example EPD 1500A (that may be significantly equivalent in structure and functionality to the EPD 18-130D shown in FIG. 18-1D and/or any one or more of the presently disclosed EPD devices), in accordance with some implementations. The EPD 18-1500A can include one or more layers including a protective layer 18-1502A, a transparent conductive layer 18-1504A, a porous reflective layer 18-1506A, a porous carbon matrix with integrated microcells layer 18-1508A, a sealing layer 18-1510A, and a flexible layer 18-1512A (similar to a substrate upon which any one or more of the other layers may be formed or deposited). The protective layer 18-1502A can be substantially transparent, offering a transparency of greater than 90% in the visible range, and can also be tuned or configured as necessary for particular end-use scenarios, such as for supermarket or grocery applications compared to e-reader applications, etc. The protective layer 18-1502A can be deposited on top of the transparent conductive layer 18-1504A, which can have resistance values of approximately (or in the range of approximately) $R_s$<100 Ω/sq→$R_s$<30 Ω/sq. The transparent conductive layer 18-1504A can be deposited on the porous reflective layer 18-1506A, which is optional in some configurations and can be implemented based on the color of carbon-based ink. The porous reflective layer 18-1506A can be deposited on the porous carbon matrix with integrated microcells layer 18-1508A, which may be substantially equivalent in form and functionality to the structure 18-130D shown in FIG. 18-1D, an include porosity sized at approximately 20 μm, or at other sizes pursuant to, for instance, the size of carbon-inclusive electrophoretic ink particles or capsules used, etc. The porous carbon matrix with integrated microcells layer 18-1508A can be deposited on the sealing layer 18-1510A, which can be configured to include or otherwise be adjoined or held together by a carbon-doped polymer. The sealing layer 18-1510A can be deposited on a flexible layer 18-1512A which can substantially mimic the functionality of any one or more of the presently disclosed substrates to complete the multi-layered example EPD 18-1500A.

FIG. 18-15B shows a listing of features 18-1500B associated with a multi-layered electrophoretic display, in accordance with some implementations. A top electrode (not shown in FIG. 18-15A) to be used with the example EPD 18-1500A can include or be formed by optically transparent conductors that are conductive, but do not contain silver (Ag). The porous carbon matrix with integrated microcell layer 18-1508A can include patterned Microcups, microcapsules, or recessed regions that are configured to enhance electrophoretic ink migration therein, resulting in optimal image formation quality at reduced power consumption levels. A first and second electrode layer (not shown in FIG. 18-15A) can be prepared to be solvent-resistant. All transparent components of the example EPD 18-1500A can be carbon-inclusive, such as including any one or more of the highly structured carbons associated with the presently disclosed implementations.

FIG. 18-16A shows an example implementation of a multi-layered electrophoretic display 18-1600 that is disposed on a container 18-1610. The multi-layered electrophoretic display 18-1600 may be the same as or a variation of the EPD device 18-600 device 18-600 as heretofore described. In this example, the EPD device 18-600 device 18-600 is disposed in proximity to other components that interoperate to form a sensor system with a visible readout 18-1601. In some cases, and as shown, the container (e.g., shipping carton, envelope, etc.) has surfaces upon which one or more sensors and a visible readout device can be printed. In some cases, the one or more sensors and one or more visible readout devices are interconnected so as to form an analyte sensor system that can be printed (e.g., 3D-printed, inkjet-printed, photolithographically-printed, etc.) onto one or more labels, which are turn affixed to containers.

FIG. 18-16A shows an exploded view of a sample configuration of a set of components that interoperate to form an analyte sensor system for detecting fluid (e.g., gaseous or liquid) analytes, and for displaying (e.g., a visible readout 18-1601) an indication of presence, and/or concentration of the analyte. The multi-layered electrophoretic display may be composed of any number and/or juxtaposition of pixels. The analyte sensors of the analyte sensor system may be electrochemical, high frequency, resonant, chemiluminescent, or any combination of these. In some cases, first analyte sensor and second analyte sensor are printed on the same substrate (e.g., label or surface of a container). Each analyte sensor can include a first electrode, a second electrode and an electrolyte, some of which components include particulate carbon and redox mediators. An array of analyte sensors can be used to add functionality, such as the ability to detect multiple gases, and/or to subtract a background level of moisture and/or to improve the sensitivity to any particular analyte. As shown, an EPD device 18-600 device 18-600 is coupled to an analyte sensor 18-1660 through power and signal interconnections 18-1650.

Multiple analyte sensors disposed on one container can be cooperatively utilized so as to detect a combination of chemicals, which in turn leads to a characterization an overall compound. The presence of multiple analyte sensors can be used to rule out false positives. Such multiple analyte sensor systems can include a first sensor configured to detect a first target chemical, and a second sensor configured to detect a second target chemical that is different from the first target chemical. An indicator such as the shown EPD device 18-600 device 18-600 renders a visual indication if and when both the first sensor positively detects the first target chemical and the second sensor positively detects the second target chemical. For example, a first concentric ring might be displayed (e.g., as a visible readout 18-1601) if and when the first sensor positively detects the first target chemical and a second concentric ring might be displayed if and when the second sensor positively detects the second target chemical.

Still further, other components can be integrated with the analyte sensor system to add additional functionality to the analyte sensor system. For example, an energy harvesting antenna 18-1670 can provide the electrical power needed for the sensor and/or for the display. Further details regarding general approaches to making and using an energy harvesting antenna are described in U.S. application Ser. No. 16/282,895 titled "Antenna with Frequency-Selective Elements", filed on Feb. 22, 2019, which is hereby incorporated by reference in its entirety.

As another example for providing electrical power needed for the sensor and/or for the display, an energy storage device (not shown) can be disposed in proximity to the sensor and/or for the display. Further details regarding general approaches to making and using an energy storage device are described in U.S. application Ser. No. 16/740,381 titled "MULTI-PART NONTOXIC PRINTED BATTERIES", filed on Jan. 10, 2020, which is hereby incorporated by reference in its entirety.

Strictly as non-limiting variations of electro-active labels having a display system printed thereon, the electro-active labels can contain EPD devices that are configured to display telemetry, Q-codes or bar codes, and/or icons. Example variations include telemetry where information can be updated, and/or have an image (e.g., a gauge image, a Q-code image, a QR code image, or bar code image, etc.) using digital data and/or any variations of alpha or alphanumeric text formats. In some implementations, a color change or image change is displayed in a sequence. In such implementations, a change in the display, such as a change in a displayed symbol or color or colors of an image, or a time-sequenced back-and-forth change, can be used to indicate any then-current condition such as the condition of the surrounding environment, or change in the display serve to indicate the presence of an analyte, or condition of the contents of the container, etc.

The foregoing devices can also optionally include low power communications components, such as may be configured to communicate with other electronic devices. In some non-limiting examples, a cardboard shipping container is equipped with a first electrochemical sensor similar to analyte sensor 18-1660, and a second electrochemical sensor that is a variant of analyte sensor 18-1660. The energy harvesting and/or energy storage devices drive the sensors and display devices.

The beneficial properties of the particulate carbon coupled with the foregoing sensor designs enables very low power devices, such as devices that operate on currents from 0.1 microamps to 5 microamps, and at voltages around 1 volt. This example illustrates that analyte sensors utilizing the particulate carbon described herein can be produced using low cost low power driver/detection electronics that can be integrated onto the surfaces of even small packages. Furthermore, this example shows that such low cost printed displays can also be integrated with other system components such as analyte sensors, energy harvesters, batteries, and communication chips.

In some cases, and as shown in FIG. 18-16B, two different sets of components may be printed on two different substrates, and then, at point of use, the two different substrates can be combined into a single detection and display system. In this and other detection and display systems, the characteristics of a first set of components 18-1661 might be different from the characteristics of a second set of components 18-1662, and as such, the first set of components 18-1661 might be disposed on a first substrate 18-1641 and the second set of components 18-1662 might be disposed on a second substrate 18-1642. Electrical connectivity (e.g., for power and/or for electrical signaling), can be provided through mated electrically conductive terminals. In the example of FIG. 18-16B, mated positive polarity terminals (e.g., first plus terminal 1651, second plus terminal 18-1652) and mated negative polarity terminals (e.g., first minus terminal 18-1653, second minus terminal 18-1654) provide power. In other implementations, additional mated pairs of terminals can be configured to provide signaling between members of the first set of components 18-1661 and members of the second set of components 18-1662. Moreover, in situations when the characteristics of a first set of components 18-1661 are different from the characteristics of the second set of components 18-1662, the printing techniques might differ as pertaining to forming the first set of components 18-1661 on the first substrate 18-1641 and as pertaining to forming the second set of components 18-1662 on the second substrate 18-1642.

Any of the aforementioned printing techniques can be employed to construct various ones of the devices of the first set of components or the second set of components 18-1662. In some cases, the constituents and/or characteristics of any one or more layers of the components might indicate use of high-energy photolithography. More specifically, in cases where a slurry is needed (e.g., to form an electrolyte), and/or when a 3D structure is deeper in a depth dimension than can be formed using the foregoing 3D printing techniques, and/or when a binder is needed to provide mechanical integrity to a portion of a device, and/or when higher throughput than can be provided using additive 3D printing techniques is needed, then use of subtractive high-energy photolithography might be indicated. In some cases, the first set of components of the first substrate is printed using a first printing technique, whereas the second set of components of the second substrate is printed using a second printing technique.

Strictly as one example and referring again to the second set of components 18-1662 that is disposed on second substrate 18-1642, the second set of components might be formed through use of photolithography using light having a wavelength in the ultraviolet range. More specifically, various techniques for performing vacuum ultraviolet (VUV) lithography can be applied.

In some cases, the pressures involved when performing VUV lithography might be at pressures other than vacuum or near-vacuum. In fact, some printing/depositing techniques are at pressures much higher than atmospheric. Furthermore, to support a wide range of pressures used when performing VUV lithography, the irradiating wavelength is selected to be in a region of low air absorption such that a vacuum environment is not necessary in order to perform high-energy photolithography. This flexibility with respect to wavelengths and pressures in use when performing VUV lithography leads to higher printing throughput.

The selection of light wavelengths (in the range of about 120 nm to about 172 nm, which correspond to photon energies of about 7 eV to about 10.1960 eV), results in desired feature sizes being achieved. In the context of the present disclosure, small feature sizes (e.g., 1 micron, 0.5-micron, 0.25 micron, and smaller) can lead to smaller and smaller display pixels, which in turn leads to displays having higher and higher resolutions.

EXAMPLES

Example 18-1, Electrophoretic Ink 1

Graphene was prepared using any one or more of the aforementioned techniques and/or a method reported in U.S. Pat. No. 9,812,295, entitled "Microwave Chemical Processing," or in U.S. Pat. No. 9,767,992, entitled "Microwave Chemical Processing Reactor." 10 g of graphene was added to 250 mL of 96% sulfuric acid cooled in an ice bath, and the resulting mixture was stirred for at least 90 minutes. 50 g of $KMnO_4$ was slowly added to the reaction mixture to prevent any heating. After stirring for 30 minutes, the reaction mixture was heated to 35 C and stirred for additional 2 hours. 450 mL of $H_2O$ and 50 mL of $H_2O_2$ were added initially, and then additional 700 mL of $H_2O$ was added. The reaction mixture was filtered and wash with 5% HCl and plenty of $H_2O$ until the eluent pH reached 7 to yield graphene oxide.

300 mg of the graphene oxide was dispersed and sonofragmented in 30 mL of $H_2O$ using a probe sonicator set at 30% amplitude (Sonics VCX 750) for 2 hours. Sonication resulted in submicron particles with an average particle size diameter of 149 nm, which was measured using a dynamic light scattering method. Next, 500 mg of octadecylamine (ODA) in 50 mL of ethanol was added and refluxed overnight. Resulting ODA functionalized graphene particles were washed with 50 mL of $H_2O$, followed by 3×50 mL of ethanol. To make an electrophoretic ink, 150 mg of the ODA functionalized graphene was mixed with 150 mg of Span 80 in 3.75 g of 1,2,3,4-tetrahydronaphthalene (tetraline). The mixture was mixed in a sonication bath for 1 hour and then filtered through 0.7 μm glass fiber filter to yield the electrophoretic graphene ink.

Example 18-2, Electrophoretic Ink 2

Example 18-1 was repeated with carbon nano-onions (CNO) instead of graphene to make a CNO based ink.

Example 18-3, Electrophoretic Ink 3

900 mg of graphene was dispersed in 90 mL of $CH_2Cl_2$ and irradiated with a sonication probe at 20 kHz at 0° C. After 2 hours of sonication, the average particle size was 191 nm, which was measured using a dynamic light scattering method. To the fragmented carbon dispersion, 9.0 g of tetrabutylammonium bromide in 15 mL of $H_2O$, 1.2 g of $KMnO_4$ in 15 mL of $H_2O$, and 40 mL of acetic acid were added, and the mixture stirred overnight. Resulting graphene hydroxide was washed with aqueous ethanol (50 wt %, 100 mL) for at least 5 times to remove impurities. 5 g of oleic acid was added to 500 mg of graphene hydroxide in 100 mL of hexane, and the mixture was stirred at 60° C. for 20 hrs. Oleic acid functionalized carbon was obtained by centrifugation, which was washed with 30 mL of hexane at least three times. To make an electrophoretic ink, 100 mg of the oleic acid functionalized graphene was mixed with 100 mg of Span 85 in 2.5 g of dodecane. The mixture was mixed in a sonication bath for 1 hour and then filtered through 0.7 μm glass fiber filter to yield the electrophoretic ink.

Example 18-4, Electrophoretic Ink 4

2 g of graphene, 100 mg of benzoyl peroxide, 350 g of styrene, and 700 mL of toluene were added to a round bottle flask. The reaction mixture was degassed by bubbling argon for 1 hour before irradiating with high intensity ultrasound at 20 kHz for 2 hours at 0° C. The mixture was filtered through a Teflon filter (0.22 μm) and washed with toluene at least three times. The polystyrene functionalized graphene (100 mg) was dried and redispersed in xylene (2.5 g) with 100 mg of Span 85 using a sonication bath to make the electrophoretic ink Example 18-5, Cross-linkable Carbon Materials 10 g of graphene hydroxide prepared in Example 18-3 was dispersed in 1 L of DMF with an ultrasonicator. After the dispersion solution was degassed with nitrogen, 0.5 mL of dibutyltin dilaurate was added, and 300 g of toluene diisocyanate pre-dissolved in 200 mL of DMF was added dropwise at 70° C. After 4 hours of stirring, the reaction mixture was cooled to 50° C., and then 300 g of hydroxyethyl acrylate was added dropwise, and the mixture was stirred for additional 12 hours. Finally, the acrylate functionalized graphene was obtained by vacuum filtration and washing with methylene chloride. To make a cross-linkable carbon formulation, 10 g of the acrylate functionalized graphene was dispersed in 10 mL of a 1:1 mixture of ethanol and xylene, along with 500 mg of Darocur 1173 and 500 mg of benzoyl peroxide. The resulting formulation was mixed with a mechanical stirrer Example 18-6, Electrophoretic Display Cell 1

An ITO coated PET was coated with the cross-linkable carbon formulation prepared as described in Example 18-5 using a doctor blade with a 50 μm gap. After the solvent was removed, the resulting film was cured with a UVA light at 100 mW/cm$^2$ for 5 mins, which was following by 90° C. heat treatment for 10 mins. A separate ITO coated glass was coated with titanium dioxide/polyacrylate composite materials. Electrophoretic Ink 1 was added between the ITO glasses and then sealed using an epoxy sealant. Applying ±1 V to the display cell showed a contrasting image as shown FIG. 18-12

Example 18-7, Electrophoretic Display Cell 2

Example 18-6 was repeated using Electrophoretic Ink 2 as demonstrated in FIG. 18-13

Example 18-8, Electrophoretic Display Cell 3

Example 18-6 was repeated using Electrophoretic Ink 2 as demonstrated in FIG. 18-14, to form a text image.

This application is related to U.S. Provisional Patent Application No. 62/866,464 entitled "Electrophoretic Display" filed on Jun. 25, 2019; U.S. patent application Ser. No. 16/706,542 filed on Dec. 6, 2019 entitled "Resonant Gas Sensor"; U.S. Provisional Patent Application No. 62/815,927, filed on Mar. 8, 2019 entitled "Resonant Gas Sensor"; U.S. patent application Ser. No. 16/239,423 filed Jan. 3, 2019 entitled "Resonant Gas Sensor"; U.S. Provisional Patent Application No. 62/613,716, filed Jan. 4, 2018 entitled "Volatiles Sensor"; U.S. patent application Ser. No. 16/282,895, filed Feb. 22, 2019, entitled "Antenna with Frequency-Selective Elements"; U.S. patent application Ser. No. 15/944,482 filed Apr. 3, 2018, entitled "Antenna with Frequency-Selective Elements"; U.S. Provisional Patent Application No. 62/508,295 filed May 18, 2017 entitled "Carbon-Based Antenna"; U.S. Provisional Patent Application No. 62/482,806 filed Apr. 7, 2017 entitled "Dynamic Energy Harvesting Power Architecture"; U.S. Provisional Patent Application No. 62/481,821 filed Apr. 5, 2017 entitled "POWER MANAGEMENT IN ENERGY HARVESTING"; all of which are hereby incorporated by reference their respective entireties for all purposes.

The described implementations can be implemented in any environment to detect the presence of a plurality of different analytes within or near any device, battery pack, package, container, structure, or system that may be susceptible to analytes. Moreover, implementations of the subject matter disclosed herein can be used to detect the presence of any harmful or dangerous chemical, gas, or vapor. As such, the disclosed implementations are not to be limited by the examples provided herein, but rather encompass all implementations contemplated by the attached claims. Additionally, well-known elements of the disclosure will not be described in detail or will be omitted so as not to obscure the relevant details of the disclosure.

Batteries typically include a plurality of electrochemical cells that can be used to power a wide variety of devices including, for example, mobile phones, laptops, and electric vehicles (EVs), factories, and buildings. When batteries are exposed to harsh environmental conditions or become damaged, toxic chemicals and vapors within the electrochemical cells may leak from the battery's casing and pose serious health and safety risks. When released from a battery, these toxic chemicals and vapors can cause respiratory problems, allergic reactions, and may even explode. The chemicals typically used in the cells of Lithium-ion batteries may be particularly dangerous due to their high reactivities and susceptibility to explosion when inadvertently released from the battery casing. As such, there is a need to quickly and accurately determine whether a particular battery or battery pack is leaking such toxic chemicals or vapors. Moreover, when the presence of one or more analytes (or other toxic chemicals or vapors) is detected, it may be desirable to determine the concentration of such analytes. It may also be desirable to predict battery failure and/or to determine the operational integrity of such batteries.

Various aspects of the subject matter disclosed herein relate to detecting a presence of one or more analytes in an environment. In accordance with various implementations of the subject matter disclosed herein, a sensing device may include a plurality of carbon-based sensors configured to the presence of a variety of different analytes. In some implementations, at least some of the carbon-based sensors may include different types of three-dimensional (3D) graphene-based sensing materials configured to react with different analytes or different groups of analytes. In some aspects, the sensing materials of different sensors may be functionalized with different materials, for example, to increase the sensitivity of each sensor to one or more corresponding analytes.

In some implementations, changes in the impedances of the sensors may be used to determine a presence of one or more analytes in a vicinity of the sensing device. In other implementations, changes in current flow through the sensors may be used to determine the presence of the one or more analytes in the vicinity of the sensing device. In some other implementations, frequency responses of the sensors may be used to determine the presence of the one or more analytes in the vicinity of the sensing device. In some aspects, the frequency responses of the sensors may be compared with one or more reference frequency responses corresponding to the one or more analytes to identify which analytes are present in the environment. In this way, the sensor systems disclosed herein can accurately detect the presence of a variety of different analytes in a given environment.

In one implementation, a first sensor may be configured to detect the presence of a relatively large number of different analytes, and one or more second sensors may be configured to confirm the presence of one or more analytes detected by the first sensor. Specifically, the first sensor may be configured to react with each analyte of a first group of analytes, and the one or more second sensors may be configured to react with corresponding second groups of analytes that are unique subsets of the first group of analytes. In some instances, the first sensor may be exposed to the surrounding environment for a relatively short period of time to provide an initial coarse indication of whether the analytes of the first group of analytes are present, and each of the second sensors may be exposed to the surrounding environment for a relatively long period of time to provide a fine indication of whether any of the analytes of the corresponding second group of analytes are present. For example, while the first sensor may be able to detect a greater number of analytes than any of the second sensors, configuring each of the second sensors to detect only one or two different analytes may increase the sensitivity of the second sensors to their respective "target" analytes, thereby increasing the accuracy with which the sensing device is able to detect the presence of various analytes. As such, when indications provided by the second sensors are used to confirm indications provided by the first sensor, the number of false positive indications decreases, which in turn increases overall accuracy of the sensing device.

Particular implementations of the subject matter described in this disclosure can be implemented to realize one or more of the following potential advantages. In some implementations, the sensing devices disclosed herein can not only detect the presence of a variety of analytes and other harmful chemicals and gases, but can also reduce the occurrence of false positives. Specifically, by using a first sensor to quickly detect a presence of one or more analytes of a group of analytes and using one or more second sensors to confirm the presence of analytes detected by the first sensor, aspects of the present disclosure can reduce the number of false positives indicated by the sensing device. This is in contrast to conventional analyte sensors that may not only be insensitive to differences between different analytes of a group of analytes and/or that do not employ a multi-tiered analyte detection system.

FIG. 19-1 shows an example sensing device 19-100 configured to detect analytes, according to some implementations. The sensing device 19-100 may include an array 19-110 of carbon-based sensors 19-120 disposed on a substrate 19-130. In some aspects, each of the carbon-based sensors 19-120 may include a carbon-based sensing material 19-125 disposed between a corresponding pair of electrodes 19-121-122, for example, as depicted in FIG. 19-1. In other aspects, the carbon-based sensors 19-120 may be coupled to only one electrode. The carbon-based sensors 19-120, as well as their respective carbon-based sensing materials 19-125, may be formed from any suitable materials that react to, or that can be configured to react to, a variety of different analytes. Reactions between the carbon-based sensors 19-120 and various analytes may be used to detect a presence of a particular analyte or a particular group of analytes. For example, the reactions may cause changes in current flow through one or more carbon-based sensors 19-120, may cause changes in the impedances or reactance of one or more carbon-based sensors 19-120, may produce unique or different frequency responses in one or more carbon-based sensors 19-120, or any combination thereof.

In the example of FIG. 19-1, a plurality of different analytes 19-151-19-155 are in the presence of the sensing device 19-100. Although only five analytes 19-151-19-155 are shown in FIG. 19-1, the sensing device 19-100 can detect a greater number of different analytes. In some aspects, the analytes 19-151-19-155 can include any vapor phase and/or fluidic composition including one or more volatile organic compounds (VOCs) such as (but not limited to) carbon dioxide (CO2), carbon monoxide (CO), nitrogen dioxide (NO2), one or more hydrocarbons including methane ($CH_4$), ethylene ($C_2H_4$), ethane ($C_2H_6$), or propane ($C_3H_8$), one or more acids including hydrochloric acid (HCl) or hydrofluoric acid (HF), one or more fluorinated hydrocarbons including phosphorus oxyfluoride, hydrogen cyanide (HCN), one or more aromatics including benzene ($C_6H_6$), toluene ($C_7H_8$), ethanol ($C_2H_5OH$), hydrogen, or one or more reduced sulfur compounds including thiols having a form of R—SH.

In some implementations, the carbon-based sensors 19-120 may include carbon particulates or 3D graphene structures that react with (or that can be configured to react with) analytes associated with batteries, for example, to determine whether a particular battery is leaking analytes that may be harmful or dangerous. In other implementations, the carbon-based sensors 19-120 may include carbon particulates or 3D graphene structures that react with (or that can be configured to react with) a group of analytes deemed to be harmful or dangerous, either individually or in combination with each other. For example, the carbon-based sensors 19-120 may be configured to produce detectable reactions when exposed to acetone and hydrogen peroxide to detect a presence of acetone peroxide (which is highly explosive). For another example, one or more of the carbon-based sensors 19-120 may be configured to detect a presence of triacetone triperoxide (TATP) or tri-cyclic acetone peroxide (TCAP), which are trimers for acetone peroxide.

In some implementations, each of the sensors 19-120 may be configured to react with a unique group of analytes. In some aspects, the sensors 19-120 may be functionalized with different materials configured to detect different analytes or different groups of analytes. In one implementation, a first sensor of the sensor array 19-110 may be functionalized with a first material configured to detect a presence of a first group of analytes, and one or more second sensors of the sensor array 19-110 may be functionalized with second materials configured to detect a presence of one or more corresponding second groups of analytes, where the second materials are different than each other and are different than the first material, and the second groups of analytes are unique subsets of the first group of analytes. For example, the first sensor may be configured to detect each of the five analytes 19-151-19-155, while each of the second sensors may be configured to detect only one of the five analytes 19-151-19-155. The first sensor may sense the environment for a relatively short period of time to provide a coarse detection of any of the analytes 19-151-19-155, and each of the second sensors may sense the environment for a relatively long period of time to confirm the presence of a respective one of the five analytes 19-151-19-155. In this way, the one or more second sensors 19-120 may be used to verify the detection of various analytes by the first sensor 19-120, thereby reducing or even eliminating false positives.

In other implementations, the sensors 19-120 may be configured to react with overlapping groups of analytes. In some other implementations, the sensors 19-120 may be configured to react with the same or similar groups of analytes.

The substrate 19-130 may be any suitable material. In some instances, the substrate may be paper or a flexible polymer. In other instances, the substrate 19-130 may be a rigid or semi-rigid material such as, for example, a printed circuit board.

FIG. 19-2 is an illustration 19-200 depicting the sensing device 19-100 of FIG. 19-1 coupled to a receptor 19-180, according to some implementations. The receptor 19-180 can be any suitable device, component, or mechanism capable or collecting, guiding, or steering analytes 19-151-19-155 present in a surrounding environment towards the sensing device 19-100. As shown, the receptor 19-180 includes an inlet 19-182 and a plurality of outlets 19-184. The inlet 19-182 may be configured to receive or attract the analytes 19-151-19-155 into the receptor 19-180, and the outlets 19-184 may be configured to steer the analytes 19-151-19-155 towards one or more exposed surfaces of the sensing device 19-100. In some implementations, each of the outlets 19-184 of the receptor 19-180 may be aligned with a corresponding sensor 19-120, for example, so that analytes 19-151-19-155 entering the receptor 19-180 can be released and exposed to each of the sensors 19-120 of the array 19-110. In this way, the receptor 19-180 may concentrate the analytes 19-151-19-155 on or near corresponding sensing materials 19-125 of the array 19-110, thereby increasing the likelihood of detection by the sensing device 19-100. For example, in instances for which the sensing device 19-100 is printed on a surface of a shipping package, a portion of the shipping package (e.g., a foldable flap) may be used as the receptor 19-180.

FIG. 19-3 is an illustration 19-300 depicting the sensing device 19-100 of FIG. 19-1 configured to detect a presence of analytes within or near a battery pack 19-310, according to some implementations. The battery pack 19-310 is shown to include a plurality of battery cells 19-320 arranged as a planar array on a substrate 19-312. One or more sensing devices 19-100 may be positioned near or coupled to a corresponding number of the battery cells 19-320 of the battery pack 19-310. In some implementations, a subset of the battery cells 19-320 may be associated with the sensing devices 19-100 such that the number of sensing devices 19-100 is less than the number of battery cells 19-320, for example, as depicted in the example of FIG. 19-3. In other implementations, each of the battery cells 19-320 may be associated with or coupled to a corresponding sensing device 19-100. In some instances, the sensors 19-120 of a respective sensing device 19-100 may be stacked on top of one another (such as in a vertical arrangement). In other instances, the sensors 19-120 of the respective sensing device 19-100 may be disposed next to one another (such as in a planar arrangement).

The sensing devices 19-100 may be configured to detect a presence of analytes 19-340 leaked from one or more of the battery cells 19-320 of the battery pack 19-310 in a manner similar to that described above with reference to FIG. 19-1. Specifically, each of the sensors 19-120 may be coupled between a corresponding pair of electrodes 19-121-19-122 and may include a plurality of 3D graphene-based sensing materials 19-125 configured to detect a presence of certain analytes (such as the analytes 19-151-19-155 of FIG. 19-1). In some implementations, the sensing materials 19-125 within different sensors 19-120 may be configured to detect the presence of different analytes or different groups of analytes. For example, in some instances, the sensing materials 19-125 of a first sensor 19-1201 may be functionalized with a first material configured to detect a presence of each analyte of a first group of analytes, and the sensing materials 19-125 of a second sensor 19-1202 may be functionalized with a second material configured to detect a presence of each analyte of a second group of analytes, where the second group of analytes is a subset of the first group of analytes. In other implementations, the sensing materials 19-125 within different sensors 19-120 may be configured to detect the presence of the same analytes or the same group of analytes.

In various implementations, each of the sensors 19-120 within a respective sensing device 19-100 may be configured to provide an output signal in response to detecting the presence of one or more analytes. In some implementations, the output signal may be a current generated in response to an alternating current provided to the respective sensor 19-120. In some instances, a difference between the alternating current and the output signal may be indicative of the presence or absence of the one or more analytes of the first group of analytes. In other implementations, the output signal may indicate a change in impedance of the corresponding sensor 19-120 caused by exposure to the one or more analytes. In some instances, a relatively small impedance change of the sensor 19-120 may indicate an absence of the one or more analytes, and a relatively large impedance change of the sensor 19-120 may indicate a presence of the one or more analytes.

In some other implementations, one or more of the sensing devices 19-100 may include an antenna (not shown for simplicity) configured to receive an electromagnetic signal from an external device, and the output signals may be frequency responses of the sensing materials 19-125 to the electromagnetic signal. For example, the frequency response of the sensing materials 19-125 of the first sensor 19-1201 may be indicative of the presence or absence of the first group of analytes, and the frequency response of the sensing materials 19-125 of the second sensor 19-1202 may be indicative of the presence or absence of the second group of analytes. In some aspects, the frequency responses may be based on resonant impedance spectroscopy (RIS) sensing.

In various implementations, the output signals generated by each sensing device 19-100 may indicate an operating mode of a corresponding battery cell 19-320 of the battery pack 19-310. In some implementations, the output signals may indicate a normal mode for the corresponding battery cell 19-320 based on an absence of analytes, may indicate a maintenance mode for the corresponding battery cell 19-320 based on the presence of analytes not exceeding a threshold level, or may indicate an emergency mode for the corresponding battery cell 19-320 based on the presence of analytes exceeding the threshold level. The output signals may also indicate a concentration level of each analyte detected by the sensing device 19-100.

FIG. 19-4 is an illustration 19-400 depicting the sensing device 19-100 of FIG. 19-1 configured to detect analytes in a shipping package 19-410, according to some implementations. The shipping package 19-410 is shown to include a surface 19-412 defining a volume within which one or more items (not shown for simplicity) can be contained. The defined volume of the shipping package 19-410 also includes a plurality of analytes 19-414 analytes 19-414 which can be, for example, one or more of the analytes 19-151-19-155 of FIG. 19-1. As shown, the sensing device 19-100 may be a label 19-430 that is printed onto the surface 19-412 of the shipping package 19-410. In various implementations, the label 19-430 may include a substrate 19-432, a plurality of carbon-based sensors 19-434 printed on the substrate, and one or more electrodes 19-436 printed on the substrate. The sensors 19-434, which may be examples of the carbon-based sensors 19-120 of FIG. 19-1, may be collectively configured to detect a presence of the analytes 19-414 within the shipping package 19-410.

In some implementations, each of the sensors 19-434 may be configured to react with a unique group of analytes in response to an electromagnetic signal 19-442 received from an external device 19-440 device 19-440. For example, a first sensor 19-4341 may be configured to detect the presence of a first group of analytes, and a second sensor 19-4342 may be configured to detect the presence of a second group of analytes that is a first subset of the first group of analytes. In one implementation, a third sensor 19-4343 may be configured to detect the presence of a third group of analytes that is a second subset of the first group of analytes. As discussed, the first sensor 19-4341 may be functionalized with a first material configured to react with the first group of analytes, the second sensor 19-4342 may be functionalized with a second material configured to react with the second group of analytes, and the third sensor 19-4343 may be functionalized with a third material configured to react with the third group of analytes. In this way, the second sensor 19-4342 may be used to confirm detection of the first subset of analytes by the first sensor 19-4341, and the third sensor 19-4343 may be used to confirm detection of the second subset of analytes by the first sensor 19-4341. In other implementations, one or more groups of sensors 19-434 may be configured to react with overlapping groups of analytes in response to the electromagnetic signal 19-442.

The electrodes 19-436, which may be examples of the electrodes 19-121-122 of FIG. 19-1, may be coupled to the sensors 19-434. In some implementations, each sensor 19-434 may be coupled between a corresponding pair of electrodes 19-436. The first electrode 19-436 of each electrode pair may be configured to receive the electromagnetic signal 19-442, and the second electrode 19-436 of each electrode pair may be configured to provide an output signal indicating whether the corresponding sensor 19-434 detected the presence of analytes.

In some implementations, each output signal may indicate a frequency response of a corresponding sensor 19-434 to the electromagnetic signal 19-442. For example, the frequency response of the first sensor 19-4341 may indicate the presence (or absence) of the first group of analytes within the shipping package 19-410, the frequency response of the second sensor 19-4342 may confirm the presence (or absence) of the second group of analytes, and the frequency response of the third sensor 19-4343 may confirm the presence (or absence) of the third group of analytes. In some instances, the first sensor 19-4341 may be exposed to the electromagnetic signal 19-442 for a relatively short period of time to provide a coarse indication of whether the analytes of the first group of analytes are present, and the second and third sensors 19-4342 and 19-4343 may be exposed to the electromagnetic signal 19-442 for a relatively long period of time to confirm indications of the presence of the second and third respective groups of analytes by the first sensor 19-4341. In this way, the sensors 19-4341-19-4343 can collectively reduce the number of false positives indicated by the sensing device 19-100.

In at least some implementations, an antenna (not shown for simplicity) may be printed on the substrate 19-432 and configured to drive an alternating current through the sensors 19-434 in response to the electromagnetic signal 19-442. Because the sensors 19-434 may be functionalized with different materials that can have different electrical and/or chemical characteristics, the resulting sensor output currents may indicate the presence (or absence) of different analytes. For example, in some instances, each output signal may indicate an impedance or reactance of a corresponding sensor 19-434 to the alternating current. The impedance or reactance of each sensor 19-434 can be measured and compared with a reference impedance or reactance to determine whether one or more analytes associated with the sensor 19-434 are present in the shipping package 19-410. In some instances, the reference impedances or reactance may be determined by driving the alternating current through the sensors 19-434 in the absence of all analytes, and measuring the impedances or reactance of the output signals from the sensors 19-434.

In some aspects, the sensors 19-434 may be juxtaposed in a planar arrangement on the substrate 19-432. In other instances, the sensors 19-434 may be stacked on top of one another in a vertical arrangement. In some implementations, the sensors 19-434 may form a permittivity gradient.

As discussed, the analyte sensing devices disclosed herein can be integrated into a product or package, such as on a cardboard box, or food package. The analyte sensing devices disclosed herein can be placed adjacent to a product or package and can detect analytes on or within the product or package. For example, the analyte sensing device can be integrated into or placed adjacent to a scale that is used to weigh shipping containers, and the analyte sensing device can be used to detect analytes on or within any shipping package being weighed by the scale. As another example, the analyte sensing device can be integrated into or placed adjacent to a component of a vehicle that is used to transport shipping containers, such as within a mail truck, and the analyte sensing device can be used to detect analytes on or within any shipping package being transported by the vehicle. As still further examples, the analyte sensing device can be integrated into a conveyor belt or mounted onto a portion of a mechanical conveyance device. Additionally, or alternatively, the analyte sensing device can be integrated into handling equipment, such as a robot arm, or handling apparel, such as gloves, etc., and the analyte sensing device can be used to detect analytes on or within any shipping package being conveyed or handled.

In one implementation, a fan or a suction device, such as a vacuum pump, may be used to direct environmental gasses (which may include one or more analytes) towards the analyte sensing device and/or into an enclosure containing the analyte sensing device. For example, the analyte sensing device can be placed into an enclosure, and a fan or vacuum pump can draw the surrounding environmental gasses into the enclosure such that any analytes present in the environmental gasses are exposed to the analyte sensing device. In another example, the analyte sensing device may be placed adjacent to a set of objects, such as shipping packages, mousepads, or other products, and can monitor for the presence of one or more analytes.

FIG. 19-5 is an illustration 19-500 depicting example reactions between one or more analytes and the sensor 19-120 of FIG. 19-1, according to some implementations. As discussed, the sensor 19-120 may include 3D graphene-based sensing materials 19-125 disposed on the substrate 19-130, and the sensing materials 19-125 may be functionalized with a material 19-126 configured to detect the presence of analytes 19-151-19-152. In some implementations, the sensing materials 19-125 may include a plurality of different graphene allotropes having one or more microporous pathways or mesoporous pathways. Although not shown for simplicity, a polymer may bind the plurality of different graphene allotropes to one another. In some instances, the polymer may include humectants configured reduce the susceptibility of the carbon-based sensors to humidity.

As shown, analytes 19-151-19-152 may take a variety of paths to penetrate and react with the sensing material 19-125. Specifically, inset 19-510 depicts the analytes 19-151-19-152 being adsorbed by the functionalized material 19-126 and/or various exposed surfaces of the sensing material 19-125. Inset 19-520 depicts a carbon particulate 19-522 from which the sensing material 19-125 may be formed. In some instances, a reactive chemistry additive (such as a salt dissolved in a carrier solvent) may be deposited on and within exposed surfaces, pores and/or pathways of the particulate carbon 19-522. In some instances, the reactive chemistry additives may be incorporated into the particulate carbon 19-522 to increase the sensitivity of the sensor 19-120 to one or more specific analytes.

FIG. 19-6 is a block diagram of an analyte detection system 19-600, according to some implementations. The analyte detection system 19-600 is shown to include an input circuit 19-610, a sensor array 19-620, a measurement circuit 19-630, and a controller 19-640. The input circuit 19-610 is coupled to the controller 19-640 and the sensor array 19-620, and may provide an interface through which currents, voltages, and electromagnetic signals can be applied to the sensor array 19-620. The sensor array 19-620, which may be one example of the sensor array 19-110 of FIG. 19-1, is shown to include eight carbon-based sensors 19-120$_1$-19-120$_8$ coupled between respective pairs of electrodes 19-121$_1$ and 19-122$_1$ through 19-121$_8$ and 19-122$_8$. In some instances, each of the first electrodes 19-121$_1$-19, 121$_8$ may be coupled to a corresponding terminal of the input circuit 19-610, and each of the second electrodes 19-122$_1$-19-122$_8$ may be coupled to a corresponding terminal of the measurement circuit 19-630. In other instances, each terminal of the input circuit 19-610 may be coupled to a corresponding group of the sensors 19-120$_1$-19-120$_8$.

The controller 19-640 may generate an excitation signal or field from which current levels, voltage levels, impedances, and/or frequency responses of the carbon-based sensors 19-120$_1$-19-120$_n$ can be measured or determined by the measurement circuit 19-630. For example, in some implementations, the controller 19-640 may be a current source configured to drive either a direct current or an alternating current through each of the sensors 19-120$_1$-19-120$_8$. In other implementations, the controller 19-640 may be a voltage source that can apply various voltages across the sensors 19-120$_1$-19-120$_8$ via corresponding pairs of electrodes 19-121 and 19-122. In some instances, the controller 19-640 can adjust the sensitivity of a respective sensor 19-120 to a particular analyte by changing the voltage applied across the respective sensor 19-120. For example, the controller 19-640 can increase the sensitivity of the respective sensor 19-120 by decreasing the applied voltage, and can decrease the sensitivity of the respective sensor 19-120 by increasing the applied voltage. In some other implementations, an antenna (not shown for simplicity) coupled to the sensor array 19-620 can receive one or more electromagnetic signals from an external device. In some aspects, the first electrodes 19-121$_1$-19-121$_8$ may be configured to receive the electromagnetic signals.

As discussed, the sensors 19-120$_1$-19-120$_8$ may include respective sensing materials 19-125$_1$-19-125$_8$ that can be functionalized with different materials configured to react with and/or detect different analytes or different groups of analytes. In some implementations, the sensors 19-120$_1$-19-120$_8$ may include cobalt in particulate form, and the sensing materials 19-125$_1$-19-125$_8$ may include carbon nano-onions (CNOs). Specifically, active sites on exposed surfaces of the CNOs may, in some aspects, be functionalized (such as through surface modification) with solid-phase cobalt ($Co_{(s)}$) (such as Co particles) and/or cobalt oxide ($Co_2O_3$), which reacts with available carbon on exposed surfaces of the CNOs. For example, the chemical reactions associated with using cobalt oxide to detect the presence of hydrogen peroxide ($H_2O_2$) may be expressed as:

$$2Co\frac{3+}{2+}Pc + H_2O_2 \rightarrow 2Co\frac{2+}{+}Pc + 2H^+ + O_2 \quad \text{(Eq. 19-1)}$$

$$2Co\frac{2+}{+}Pc \rightarrow 2Co\frac{3+}{2+}Pc + 2e^- \quad \text{(Eq. 19-2)}$$

$$H_2O_2 \rightarrow 2H^+ + O_2 + 2e^- \text{(overall reaction)} \quad \text{(Eq. 19-3)}$$

In addition, or the alternative, cobalt-based functionalization may be used to detect TATP according to the following chemical reaction:

$$TATP + H^+ \rightarrow 3(CH_3)_2CO + 3H_2O_2 \quad \text{(Eq. 19-4)}$$

In other implementations, the presence of TATP may be detected based on the following steps or operations:

- adsorption of TATP (50 ppb) onto exposed carbon surfaces (300-700 $m^2/g$), which are acidic in nature by adding acid (such as HCl at an approximate 0.1 m concentration level). Example acid treatment levels include 10 mg carbon (C) corresponding to 100 mg HCl at 0.1 m diluted in a suitable carrier solvent. Over time, the adsorbed HCl evaporates and protonates hydroxyl and/or carboxylic groups on exposed carbon surfaces to leave such surfaces in a relatively acidic state;
- hydrolysis of TATP into acetone and peroxide;
- performance of peroxide oxidation shown by Eq. 19-(1)-19-(3) above; and
- the generation of free electrons and associated observable changes in one or more electrical or chemical characteristics of the sensing device.

In some implementations, Cobalt decorated CNOs may provide the most selective and sensitive response to triacetone triperoxide (TATP) relative to other types of 3D graphene-based sensing materials. Applicant notes that since hydrogen peroxide has a chemical structure somewhat similar to triacetone triperoxide (TATP) or tri-cyclic acetone peroxide (TCAP), sensing devices configured to detect a presence of hydrogen peroxide can also be used to detect a presence of TATP.

The exact chemical reactivity and/or interactions between an analyte and exposed carbon surfaces of the materials 19-125$_1$-19-125$_8$ may depend on the type of analyte and the structure or organization of the corresponding materials 19-125$_1$-19-125$_8$. For example, certain analytes, such as hydrogen peroxide ($H_2O_2$) and TATP, may be detected by one or more oxidation-reduction ("redox") type chemical reactions with metals decorated onto exposed carbon surface of the sensing materials 19-125$_1$-19-125$_8$. In some implementations, some of the sensing materials 19-125$_1$-19-125$_8$ may be prepared or created to include free amines, which may react with electronic deficient nitroaromatic analytes, such as TNT and DNT.

The measurement circuit 19-630 may measure the output signals provided by the sensors 19-120$_1$-19-120$_8$ to determine whether certain analytes are present in the surrounding environment. For example, when the sensor array 19-120 is pinged with an electromagnetic signal (e.g., received from an external device such as the device 19-440 of FIG. 19-4), the measurement circuit can measure the frequency responses of the sensors 19-120$_1$-19-120$_8$, and compare the measured frequency responses with one or more reference frequency responses. If the measured frequency response of a sensor 19-120 matches a particular reference frequency response, then the measurement circuit 19-630 may indicate a presence of analytes associated with the particular reference frequency response. Conversely, if the measured frequency response of the sensor 19-120 does not match any of the reference frequency responses, then the measurement circuit 19-630 may indicate an absence of analytes associated with the particular reference frequency response.

For another example, application of an alternating current to the sensor array 19-120 may cause one or more electrical and/or chemical characteristics of the sensors 19-120$_1$-19-120$_8$ to change (e.g., to increase or decrease). The measurement circuit 19-630 can detect the resultant changes in the electrical and/or chemical characteristics of the sensors 19-120$_1$-19-120$_8$, and can determine whether certain analytes are present based on the changes. In some implementations, the measurement circuit 19-630 can measure the output currents of sensors 19-120$_1$-19-120$_8$ caused by the alternating current, and can compare the measured output currents with one or more reference currents to determine whether certain analytes are present. Specifically, if the measured output current of a sensor 19-120 matches a particular reference current, then the measurement circuit 19-630 may indicate the presence of analytes associated with the particular reference current. Conversely, if the measured output current of the sensor 19-120 does not match any of the reference currents, then the measurement circuit 19-630 may indicate an absence of analytes associated with the particular reference current.

In other implementations, the measurement circuit 19-630 can measure the impedances or reactance of the sensors 19-120$_1$-19-120$_8$ to the alternating current, and can compare the measured impedances or reactance with one or more reference impedances or reactance to determine whether certain analytes are present. Specifically, if the measured impedance or reactance of a sensor 19-120 matches a reference impedances or reactance, then the measurement circuit 19-630 may indicate the presence of analytes associated with the reference impedances or reactance. Conversely, if the measured impedance or reactance of the sensor 19-120 does not match any of the reference impedances or reactance, then the measurement circuit 19-630 may indicate an absence of analytes associated with the reference impedances or reactance.

FIG. 19-7A shows another sensor array 19-700A, according to some implementations. As shown, the sensor array 19-700A includes a plurality of sensors 19-701-19-704 disposed in a planar arrangement, with each of the sensors 19-701-19-704 including a different carbon-based sensing material. In some aspects, the sensors 19-701-19-704 may be examples of the sensors 19-120 of FIGS. 19-1-19-3 and FIGS. 19-5-19-6. In other aspects, the sensors 19-701-19-704 may be examples of the sensors 19-434 of FIG. 19-4. Although the example 19-700A of FIG. 19-7A shows four sensors 19-701-19-704 arranged in a 2-row by 2-column array, in other implementations, the other numbers of sensors can be disposed in other suitable arrangements.

The sensors 19-701-19-704 may include routing channels between individual deposits of the carbon-based sensing materials. These routing channels may provide routes through which electrons can flow through the sensors 19-701-19-704. The resulting currents through the sensors 19-701-19-704 can be measured through ohmic contact with the respective electrode pairs E1-E4. For example, a measurement $M_1$ of the first sensor 19-701 sensor 19-701 can be taken via electrode pair E1, a measurement $M_2$ of the second sensor 19-702 can be taken via electrode pair E2, a measurement $M_3$ of the third sensor 19-703 can be taken via electrode pair E3, and a measurement M4 of the fourth carbon-based sensor 19-704 can be taken via electrode pair E4.

In various implementations, each of the sensors 19-701-19-704 can be configured to react with and/or to detect a corresponding analyte or group of analytes. For example, the first sensor 19-701 sensor 19-701 can be configured to react with or detect a first group of analytes in a coarse-grained manner, and the second sensor 19-702 can be configured to react with or detect a subset of the first group of analytes in a fine-grained manner. In some instances, the sensors 19-701-19-704 can be printed onto a substrate using different carbon-based inks. Ohmic contact points can be used to capture the measurements $M_1$-$M_4$, either concurrently or sequentially.

FIG. 19-7B shows another sensor array 19-700B, according to some implementations. The sensor array 19-700B includes a plurality of carbon-based sensors 19-701-19-704 stacked on top of one another in a vertical or stacked arrangement. In some aspects, the sensors 19-701-19-704 may be examples of the sensors 19-120 of FIGS. 19-1-19-3 and FIGS. 19-5-19-6. In other aspects, the sensors 19-701-19-704 may be examples of the sensors 19-434 of FIG. 19-4. The sensors 19-701-19-704 (and their respective sensing materials) can be sequentially deposited upon one another to form the stacked array. In some instances, separators (not shown for simplicity) can be provided between the sensors 19-701-19-704. As discussed, the sensors 19-701-19-704 may be functionalized with different materials and/or may include different types of carbon-based sensing materials that can be printed in successive layers onto a substrate or label.

As the demand for low-cost analyte sensors continues to increase, it is increasingly important to reduce or even eliminate the need for electronic components in analyte sensors. For example, the high cost of electronic components typically found in conventional analyte sensors render their widespread deployment in shipping containers, packages, and envelopes impractical. As such, some implementations of the subject matter disclosed herein may provide a cost-effective solution to the long-standing problem of monitoring large numbers of shipping containers, packages, and envelopes for the presence of harmful chemicals and gases such as, for example, the various analytes described herein.

FIG. 19-7C is an illustration 19-700C depicting an ink-jet or bubble-jet print head 19-720 printing various sensing devices disclosed herein onto the surface of a shipping container, package, or envelope, according to some implementations. Specifically, the illustration 19-700C depicts a process by which multiple layers of different carbon-based sensing materials 19-711-19-714 can be printed onto a substrate 19-710. As shown, the print head 19-720 can print a first layer 19-711 of carbon-based sensing materials onto the substrate 19-710 using a first carbon-based ink 19-721, can print a second layer 19-712 of carbon-based sensing materials onto the substrate 19-710 using a second carbon-based ink 19-722, can print a third layer 19-713 of carbon-based sensing materials onto the substrate 19-710 using a third carbon-based ink 19-723, and can print a fourth layer 19-714 of carbon-based sensing materials onto the substrate 19-710 using a fourth carbon-based ink 19-724. In some instances, the carbon-based inks 19-721-19-724 may be different from one another, for example, such that the resulting sensing material layers 19-711-19-714 are configured to react with and/or detect different analytes or different group of analytes. The print head 19-720 can also print electrodes E1-E4 for the different sensing material layers 19-711-19-714, respectively, using an ohmic-based ink 19-725. Ohmic contacts can be printed onto the substrate 19-710 and/or portions of the sensing material layers 19-711-19-714 using multiple passes of the multi-jet print head 19-720. In some implementations, the sensing device may include vias through which the resulting electrodes E1-E4 can be accessed. In other implementations, other suitable mechanisms can be used to provide ohmic contacts for the electrodes E1-E4.

FIG. 19-7D is an illustration 19-700D depicting the print head 19-720 printing various sensing devices disclosed herein onto the surface of a shipping container, package, or envelope, according to other implementations. Specifically, the illustration 19-700D depicts a process by which multiple layers of different carbon-based sensing materials 19-711-19-714 can be printed onto a substrate 19-710 in a pyramid arrangement. The illustration 19-700D also depicts ohmic contacts 19-705 printed on the sensing material layers 19-711-19-714 using an ohmic-based ink 19-725. In some aspects, the different sizes and different exposed surface areas of the sensing material layers 19-711-19-714 may cause the respective sensors to have different electrical and/or chemical characteristics, which in turn may configured the respective sensors to react with and/or detect different types of analytes.

Further details pertaining to various carbon-based sensing materials, tunings, and calibration techniques that can be used to form carbon-based sensors disclosed herein are summarized below in Table 19-1.

material layers 19-711-19-714 may resonate at a different frequency. In some aspects, the different permittivity of the sensing material layers 19-711-19-714 may collectively a permittivity gradient 19-725. The permittivity gradient 19-725 may correspond to a stair shaped gradient 19-761, a linearly shaped gradient 19-762, or a curvilinearly shaped gradient 19-763.

FIG. 19-8 shows a flow chart 19-800 depicting an example operation for fabricating at least some of the sensing devices disclosed herein, according to some implementations. In various implementations, the permittivity of a carbon-based sensing material can be altered to cause a particular resonance signature in the carbon-based sensing material when exposed to certain analytes. In some cases, different portions of the carbon-based sensing material may be configured to have different permittivity values specifically selected to cause particular resonance frequencies and/or or resonance signatures. In particular, it is sometimes desired that a first portion of the carbon-containing material with a first permittivity that is tuned to resonate with a particular resonance signature when the first portion of the carbon-containing material has imbibed a first analyte of interest, whereas a second portion of the carbon-containing material has a second permittivity that is tuned to resonate with a particular resonance signature when the second portion of the carbon-containing material has imbibed a second analyte of interest.

Formation of different portions of the carbon-containing material having different permittivity values can be accomplished using a combination of masking and UV treatments.

TABLE 19-1

| Components | Tuning | Sensitivity | Calibration |
|---|---|---|---|
| Different carbon types and/or different carbon decorations | Select carbon functionalization materials to detect selected analytes | Surface area of carbon-based sensor | Response of the selected carbon functionalization materials to the selected analytes |
| Physical dimensions of the sensing material | Select size and/or aspect ratio of exposed portion of sensor | Surface area of carbon-based sensor | Sensitivity is based on physical dimensions and characteristics of carbon-based sensor |
| Adjacency or proximity to other carbon-based sensing materials | Select distance between sensors to reduce overlapping response signals | Select distance between sensors to reduce overlapping response signals | Calibrate based on test sample over a range conditions |
| Different permittivity of the different materials | Tune permittivity based on sensor material/functionalization | Select distance between sensors to reduce overlapping response signals | Calibrate based on test sample over a range conditions |

As discussed, different materials may resonate at different frequencies, and many materials may resonate at different frequencies depending on whether one or more certain analytes are present. In some implementations, the permittivity of carbon-based sensing materials described herein can be modified by exposing the materials to ultraviolet (UV) radiation.

FIG. 19-7E is an illustration 19-700E depicting UV radiation emitted towards the sensor 19-701. As shown, a UV beam source 19-753 may be used to shower the sensor 19-701 with UV radiation. The power and wavelength of the UV radiation can be controlled by a power control unit 19-751 and a wavelength control unit 19-752, respectively. In some implementations, adjusting the power level and/or wavelength of UV radiation can change the permittivity of each of the sensing material layers 19-711-19-714. That is, after bombarded with the UV radiation, each of the sensing At block 19-802, a carbon-containing material is deposited onto a substrate or electrode 19-811. At block 19-804, a UV-opaque mask is deposited or printed on top the carbon-containing material. At block 19-806, the carbon-containing material is activated, for example, via bombardment by UV photons. This results in a first portion 19-8121 of the carbon-containing material having a first permittivity, and a second portion 19-8122 of the carbon-containing material having a second permittivity different than the first permittivity. At block 19-808, the mask can be washed away, ablated, or otherwise removed. Two or more of the resulting analyte-sensing devices can be used as a multi-element, multi-analyte sensor and/or as a high-sensitivity analyte sensor. In addition, or in the alternative, the resulting analyte-sensing devices can be exposed to an additional bombardment of UV photons at block 19-810, for example, to further alter portions of the carbon-containing material previously beneath the UV-opaque mask.

Some example alternative implementations are summarized below in Table 19-2:

TABLE 19-2

| Manufacturing Process Aspect(s) | Result(s) |
|---|---|
| Add a hardener or binder to the carbon-containing materials | UV treatment causes curing and hardening to a controllable degree (such as to be more rigids or more flexible) |
| Use the UV photon to ablate some of the carbon-containing material | Form patterns in the carbon-containing material that absorb an analyte into the carbon-containing material and/or that increase coupling between the carbon-containing material and the electrode. |
| Deposit a slurry of carbon-containing materials over a sheet of conductive, semi-conductive, or non-conductive material. | Low cost, high-volume manufacture of analyte-sensing devices. |
| Add metallic and/or semiconducting and/or dielectric, and/or polymeric materials to the carbon-containing materials (such as to the slurry) to form an open-pore matrix. | Facilitates permeation of certain analytes into the matrix and/or tunes the matrix to be sensitive to particular analytes. |
| Add metallic and/or semiconducting and/or dielectric, and/or polymeric materials to the carbon-containing materials (such as to the slurry) to form an open-pore matrix. | Tunes the matrix to be sensitive to particular analytes and/or facilitates permeation of certain analytes into the matrix. |
| Maintain low temperatures during processing. | Avoid loss of conductivity that may occur at higher temperatures (such as when polymers unwantedly coat metallics). |

FIG. 19-9 shows another sensor array 19-900, according to some implementations. The sensor array 19-900 includes a plurality of layers 19-911-19-914 of individually-functionalized carbon-containing materials. As shown, the layers 19-911-19-914 are successively disposed to form a stack of layers, with the first layer 19-911 disposed on the substrate 19-910. Each layer is formed of a corresponding individually-functionalized carbon-containing matrix (such as carbon matrix1, carbon matrix2, carbon matrix3, carbon matrix4), wherein each individually-functionalized carbon-containing matrix includes a respective additive A-D). The combinations of carbon-containing matrices and additive may be selected based on the particular combination's sensitivity to a particular analyte of interest.

In forming the analyte sensor array, the different layers can be deposited using any known technique. Furthermore, each of the different layers can be configured to be of a particular thickness. Strictly as one example, and as shown, a first deposited layer can have a first thickness 19-924 in a first range (such as 10 nm-100 nm, whereas another deposited layer can have a thickness in a different range (such as 500 nm-1,000 nm), and so on. The particular thickness of a particular layer can be selected based upon any combination of:

- characteristics of the additive for that particular layer, and/or
- characteristics of the analyte of interest, and/or
- innate binary-tertiary interactions by and between the constituents of the layer.

In some implementations, the open pore structure of carbon-based sensing materials disclosed herein may allow certain analytes to more easily penetrate the materials and/or to more easily interact with carbon matrices within the materials. As such, these open pores may increase the sensitivity of sensors disclosed herein to analytes than conventional analyte detection systems.

FIG. 19-10A shows an example sensor configuration 19-1000A, according to some implementations. The sensor configuration 19-1000A includes mappings between sensors of an analyte detection system and various analytes, according to some implementations. For example, the 3D graphene-based sensing materials of the carbon-based sensors 19-120 of FIG. 19-1 may be or include the carbon recipes shown in the sensor configuration 19-1000A. That is, in a configuration in which the sensor array 120 includes 8 carbon-based sensors 19-120, each sensor may have a corresponding carbon recipe as shown by the example sensor configuration 19-1000A. For example, a first sensor may be cobalt oxide ($Co_2O_3$) decorated CNO and produce a percentage change in current (% ΔI) over initial current ($I_0$) and/or percentage increase in measured impedance of 9.26244%, and so on. In this way, the carbon recipes of the sensor configuration 19-1000A may be used to configure the carbon-based sensors to detect and identify different analytes (such as TATP, DNT, $H_2S$, and so on), even at relatively low concentration levels, based on their respective chemical fingerprints. As such, the sensing devices disclosed herein may be able to detect relatively low concentrations of analytes and/or other chemical threat agents, even in the presence of common interferents.

FIG. 19-10B shows another example sensor configuration 19-1000B, according to some implementations. The sensor configuration 19-1000B may be similar to the sensor configuration 19-1000A of FIG. 19-10A, for example, such that:

Sensor No. 1: Carbon #29, corresponding to carbon nano-onion (CNO) oxides produced in a thermal reactor; cobalt(II) acetate ($CH_6CoO_4$), the cobalt salt of acetic acid (often found as tetrahydrate $Co(CH_3CO2)_2{\cdot}4\ H_2O$, abbreviated $Co(OAc)_2{\cdot}4\ H_2O$, is flowed into the thermal reactor at a ratio of approximately 59.60 wt % corresponding to 40.40 wt % carbon (referring to carbon in CNO form), resulting in the functionalization of active sites on the CNO oxides with cobalt, showing cobalt-decorated CNOs at 15,000× and 100,000× levels, respectively; suitable gas mixtures used to produce Carbon #29 and/or the cobalt-decorated CNOs may include the following steps:

- Ar purge 0.75 standard cubic feet per minute (scfm) for 30 min;
- Ar purge changed to 0.25 scfm for run;
- temperature increase: 25° C. to 300° C. 20 mins; and
- temperature increase: 300°-500° C. 15 mins.

Sensor No. 2: corresponding to TG JM (thermal graphene jet milled; thermal reactor carbon unfunctionalized) as shown in FIG. 19-7A.

Sensor No. 3: Carbon #19, corresponding to "DXR" (as characterized by FIGS. 19-5A and/or 19-5B) type or configuration carbons produced in a microwave reactor (such as a reactor coupled to a microwave source such that microwave energy propagates through the reactor exciting carbon-containing gases and/or plasmas inside the reactor); silver acetate ($CH_3CO_2Ag$), a white, crystalline solid particulate substance suspended in carrier gas to create silver acetate vapor, is flowed into the microwave reactor at a ratio of approximately 58.18 wt % corresponding to 41.82 wt % carbon (referring to carbon in DXR form), resulting in the functionalization of active sites on the DXR configuration carbons with silver as substantially shown in FIG. 19-7D (in undecorated form) and/or in FIG. 19-7G (showing actual decoration with cobalt instead of silver); suitable gas mixtures used to produce Carbon #19 and/or the silver-decorated DXR carbons substantially shown in FIGS. 19-7D and 19-7G may include the following steps:

flow of carrier gas over DXR carbon structures at a volume ratio of 6.7% $H_2$ per 93.3% Ar for approximately 1 minute and 8 seconds Sensor No. 4: CNO (carbon nano-onion; thermal reactor carbon unfunctionalized) as shown in FIG. 19-7B.

Sensor No. 5: Carbon #16, corresponding to "DXR" (as characterized by FIGS. 19-5A and/or 19-5B) type or configuration carbons produced in a microwave reactor; iron(II) acetate, a white solid particulate substance suspended in carrier gas to create iron acetate vapor, is flowed into the microwave reactor at a ratio of approximately 65.17 wt % corresponding to 34.83 wt % carbon (referring to carbon in DXR form), resulting in the functionalization of active sites on the DXR configuration carbons with silver as substantially shown in FIG. 19-7D (in undecorated form) and/or in FIG. 19-7G (showing actual decoration with cobalt instead of iron); suitable gas mixtures used to produce Carbon #16 and/or the iron-decorated DXR carbons substantially shown in FIGS. 19-7D and 19-7G may include the following steps:

flow of carrier gas over DXR carbon structures at a volume ratio of 6.7% $H_2$ per 93.3% Ar for approximately 1 minute and 13 seconds.

Sensor No. 6: Carbon #1, corresponding to "Anvel" (as characterized by FIG. 19-7C) type or configuration carbons produced in a microwave reactor; platinum(II) bis(acetylacetonate), a coordination compound with the formula $Pt(O_2C_5H_7)_2$, abbreviated $Pt_2$, is flowed as a particulate dispersed in carrier gas to create platinum(II) bis(acetylacetonate) vapor, is flowed into the microwave reactor at a ratio of approximately 76.62 wt % corresponding to 23.38 wt % carbon (referring to carbon in Anvel form), resulting in the functionalization of active sites on the Anvel configuration carbons with platinum as substantially shown in FIG. 19-7C (in undecorated form); suitable gas mixtures used to produce Carbon #1 and/or the undecorated Anvel carbons substantially shown in FIG. 19-7C may include the following steps:

flow of carrier gas over Anvel carbon structures at a volume ratio of 6.7% $H_2$ per 93.3% Ar for approximately 15 minutes Sensor No. 7: Carbon #6, corresponding to "Anvel" (as characterized by FIG. 19-7C) type or configuration carbons produced in a microwave reactor; palladium(II) acetate, a chemical compound of palladium described by the formula $[Pd(O_2CCH_3)_2]n$, abbreviated $[Pd(OAc)_2]n$, is flowed as a particulate dispersed in carrier gas to create palladium(II) acetate vapor, is flowed into the microwave reactor at a ratio of approximately 65.17 wt % corresponding to 34.83 wt % carbon (referring to carbon in Anvel form), resulting in the functionalization of active sites on the Anvel configuration carbons with platinum as substantially shown in FIG. 19-7C (in undecorated form); suitable gas mixtures used to produce Carbon #6 and/or the palladium-decorated Anvel carbons substantially shown in FIG. 19-7C may include the following steps:

flow of carrier gas over Anvel carbon structures at a volume ratio of 6.7% $H_2$ per 93.3% Ar for approximately 15 minutes.

Sensor No. 8: 1,3-diaminonaphthalene complexed to TG-JM, such as that shown in FIG. 19-7A, to produce an organically modified carbon.

FIGS. 19-11A-19-11G show illustrations of various structured carbon materials that can be used in the sensing devices disclosed herein, according to some implementations. For example, FIG. 19-11A shows a micrograph 19-1100A of thermogravimetric (TG) carbons, according to various implementations. FIG. 19-11B shows a micrograph 19-1100B of undecorated CNOs, according to various implementations. FIG. 19-11C shows a micrograph 19-1100C of Anvel carbons, according to various implementations. FIG. 19-11D shows a micrograph 19-1100D of DXR carbons, according to various implementations. FIG. 19-11E shows a micrograph 19-1100E of cobalt decorated CNOs at a magnification level of 15,000×, according to various implementations. FIG. 19-11F shows a micrograph 19-1100F of cobalt decorated CNOs at a magnification level of 100,000×, according to various implementations. FIG. 19-11G shows a micrograph 19-1100G of a cobalt decorated DXR carbons, according to various implementations.

In contrast to a conventional 2D graphene material, the 3D graphene sensing materials disclosed by the present implementations may be designed to have a convoluted 3D structure to prevent graphene restacking, avoiding several drawbacks of using 2D graphene as a sensing material. This process also increases the areal density of the materials, yielding higher analyte adsorption sites per unit area, thereby improving chemical sensitivity, as made possible by a corresponding library of carbon allotropes used to customize the sensor arrays disclosed herein to chemically fingerprint leaked analytes for multiple applications.

The structured carbon materials shown in FIGS. 19-11A-19-11G may be produced using flow-through type microwave plasma reactors configured to create pristine 3D graphene particles continuously from a hydrocarbon gas at near atmospheric pressures. Operationally, as the hydrocarbon flows through a relatively hot zone of a plasma reactor, free carbon radicals may be formed that flow further down the length of the reactor into the growth zone where 3D carbon particulates (based on multiple 2D graphenes joined together) are formed and collected as fine powders. The density and composition of the free-radical carbon-inclusive gaseous species may be tuned by gas chemistry and microwave (MW) power levels. By controlling the reactor process parameters, these reactors may produce carbons with a wide, yet tunable, range of morphologies, crystalline order, and sizes (and distributions). For example, possible sizes and distributions may range from flakes (few 100 nm to μm wide and few nm thin) to spherical particles (10s of nm in diameter) to graphene clusters (10s of μm). The 3D nature of the materials prevents agglomeration effectively allowing for the materials to be disseminated as un-agglomerated particles. As a result, highly responsive and selective sensing materials can be produced. Graphene, an atomically thin two dimensional (2D) material, has many advantageous properties for sensing, including outstanding chemical and mechanical strength, high carrier mobility, high electrical conductivity, high surface area, and gate-tunable carrier density.

To improve the chemical selectivity, the 3D graphenes of the presently disclosed graphenes may be functionalized with various reactive materials in such a manner that the binding of target molecules and the carbon may be optimized. This functionalization step along with the ability to measure the complex impedance of the exposed sensor may be critical for efficient and selective detection of analytes. For example, different metal nanoparticles or metal oxide nanoparticles may be decorated on the surface of 3D graphenes to selectively detect hydrogen peroxide (a TATP degradation product) as peroxides are known to react with different metals. Further, nanoparticle decorated graphene structures may act synergistically to offer desirable and advantageous properties for sensing applications.

FIGS. 19-12A-19-12F show example frequency responses of resonance impedance sensors to various analytes, according to some implementations. Specifically, FIG. 19-12A shows an example frequency response 19-1200A of sensors 19-120 to alongside a baseline or reference frequency response. Specifically, FIG. 19-12A shows an example frequency response 19-1200A of sensors 19-120 to acetone alongside a baseline or reference frequency response. FIG. 19-12B shows an example frequency response 19-1200B of sensors 19-120 to acetonitrile alongside a baseline or reference frequency response. FIG. 19-12C shows an example frequency response 19-1200C of sensors 19-120 to Ethanol alongside a baseline or reference frequency response. FIG. 19-12D shows an example frequency response 19-1200A of sensors 19-120 to isopropanol alongside a baseline or reference frequency response. FIG. 19-12E shows an example frequency response 19-1200E of sensors 19-120 to water alongside a baseline or reference frequency response. FIG. 19-12F shows an example frequency response 19-1200F of sensors 19-120 to xylenes alongside a baseline or reference frequency response.

FIG. 19-13A is a graph 19-1300A depicting the real (Z') impedance component of example frequency responses of sensors 19-120 to Acetone, Ethanol (EtOH), water, and hydrogen peroxide ($H_2O_2$) alongside a baseline or reference frequency response, according to some implementations. FIG. 19-13B is a graph 19-1300B depicting the imaginary (Z") impedance component of example frequency responses of sensors 19-120 to Acetone, Ethanol (EtOH), water, and hydrogen peroxide ($H_2O_2$) alongside a baseline or reference frequency response, according to some implementations.

FIG. 19-14A shows an example frequency response of sensors 19-120 to hydrogen peroxide alongside a baseline or reference frequency response, according to some implementations. FIG. 19-14B shows example frequency responses of sensors 19-120 to acetone and water, according to some implementations. FIG. 19-14C shows example frequency responses to ethanol and ammonia, according to some implementations.

This patent application is related to U.S. patent application Ser. No. 16/887,293 entitled "RESONANT GAS SENSOR" filed on May 29, 2020; U.S. Provisional Patent Application No. 62/815,927 entitled "RESONANT GAS SENSOR" filed on Mar. 8, 2019; U.S. patent application Ser. No. 16/706,542 entitled "RESONANT GAS SENSOR" filed on Dec. 6, 2019; U.S. patent application Ser. No. 16/239,423 entitled "RESONANT GAS SENSOR" filed on Jan. 3, 2019; U.S. Provisional Patent Application No. 62/613,716 entitled "VOLATILES SENSOR" filed on Jan. 4, 2018; U.S. Provisional Patent Application No. 62/979,095 entitled "MULTIVARIATE IMPEDANCE SPECTROSCOPY SENSING" filed on Feb. 20, 2020; and U.S. Provisional Patent Application No. 63/088,541 entitled "MULTIVARIATE CHEMICALLY-FUNCTIONALIZED CARBON-BASED RESONANT IMPEDANCE SPECTROSCOPY SENSOR ARRAYS" filed on Oct. 7, 2020, all of which are assigned to the assignee hereof. The disclosures of all prior Applications are considered part of and are incorporated by reference in this Patent Application in their respective entireties.

Various implementations of the subject matter disclosed herein relate generally to deploying durable sensors made from carbonaceous microstructures.

The carbonaceous materials can be tuned during synthesis to achieve specific expected radio frequency (RF) signal shift (referring to frequency shift) and signal attenuation (referring to the diminishment of signal magnitude) behavior relative to RF signals emitted. Equipment capable of emitting the RF signals may include, for example, a transceiver that is used to interrogate the then-current resonance of a sensor. The presently disclosed implementations do not require moving parts. Target RF resonance frequency values of disclosed ingredient carbonaceous materials may be tuned within a reaction chamber or a reactor to demonstrate interaction to yield target performance characteristics. The characteristics may be for any number of applications Resonators formed of unique carbonaceous materials demonstrate frequency shifting and/or signal attenuation at specified radio frequencies (RF), e.g., 0.01 GHz to 100 GHz, which may be tuned pursuant to desired applications. Regarding tunability, the carbonaceous materials may be innately grown (e.g., self-nucleated) in a reactor from a carbon-containing gaseous species without requiring a seed particle to generate ornate 3D structures.

Environmental conditions surrounding the disclosed materials and systems may affect the resonance, frequency shifting, and/or signal attenuation behavior of the resonators.

Presently disclosed resonators may be tuned to detect even minute or trace amounts of toxins and/or biologic material and/or radiation Such changes can be detected by "pinging" (e.g., e.g., emitting, and later observation and analysis of RF signals) for then-current status of a sensor, then processing the unique set of detected properties (e.g., the "signature"). Various mechanisms for calibrating an observed signal signature and processing a return signature are discussed. Structural members (e.g., rigid members, semi-rigid members, flexible members, spongy members, etc.) of a mobile platform, or an in-motion platform can incorporate tuned carbon having a unique tuned carbonaceous microstructure, which may be nanometer-sized, micro-scale sized, or meso-scale particle, including structures with feature sizes up to many millimeter (mm).

As found through the detailed description, illustrative information presented is intended to set forth various architectures (including those optional) and uses. It should be strongly noted that the information is set forth for illustrative purposes (to provide as thorough a description as possible) and should not be construed as limiting in any manner. Any of the following features may be optionally incorporated with or without the exclusion of other features described.

FIG. 20-1 is a schematic diagram a vehicle condition detection system 100 e.g., intended to be equipped onto a vehicle such as an automobile and/or truck. The vehicle condition detection system 20-100 may include sensors, such as tuned RF resonance components 20-108 (e.g., split-ring resonators, such as that shown in FIG. 20-8). Each of the as tuned RF resonance components 20-108 may be formed from multiple carbon-based microstructural materials, aggregates, agglomerations, and/or the like such as those disclosed by Stowell, et al., in U.S. patent application Ser. No. 16/785,020 entitled "3D Self-Assembled Multi-Modal Carbon-Based Particle" filed on Feb. 7, 2020 (referred to collectively as "carbonaceous materials"), the disclosure of which is incorporated by reference for all purposes. The tuned RF resonance components 20-108 can be incorporated into any one or more of belt sensors 20-104, hose sensors 20-105, tire sensors 20-106, and transceiver antennas 20-102 on a vehicle, such as a conventional driver-driven automobile or a fully-autonomous transport pod or vehicle capable of operating to move vehicle occupants without a human driver.

The tuned RF resonance components 20-108 can be configured to electronically and/or wirelessly communicate, such as by measurement of signal frequency shift or attenuation, with any one or more of a transceiver 20-114, a vehicle central processing unit 20-116, a vehicle sensor data receiving unit 20-118, a vehicle actuators control unit 20-120, and actuators 20-122 including doors, windows, locks (collectively 20-124), engine controls 20-126, navigation/heads-up displays 20-128, suspension control 20-129, and an airfoil trim 20-130. The tuned RF resonance components 20-108 can cause a shift in observed frequencies of emitted RF signals (referred to as a "frequency-shift", implying any change in frequency) via emitted RF signals 20-110 and/or returned RF signals 20-112 signals 20-112 with the transceiver 20-114. Reference to the returned RF signals 20-112 signals 20-112 corresponding to emitted RF signals 20-110 may refer to the electronic detection of frequency shift or attenuation of the emitted RF signals 20-110 relative to one or more of the tuned RF resonance components 20-108 integrated into any one or more of the belt sensors 20-104, the hose sensors 20-105, the tire sensors 20-106, the transceiver antennas 20-102 on a vehicle, and/or the like (e.g., rather than an actual physical reflection or return of a signal from a sensor). The emitted RF signals 20-110 and the returned RF signals 20-112 signals 20-112 can be in communication with (and therefore also assessed by) any one or more of the vehicle central processing unit 20-116, the vehicle sensor data receiving unit 20-118, the vehicle actuators control unit 20-120, and/or the actuators 20-122. The vehicle condition detection system 20-100 can be implemented using any suitable combination of software and hardware.

Any one or more of the depicted various sensors of the vehicle condition detection system 20-100 can be formed of carbon-based microstructures tuned to achieve a specific RF resonance behavior upon being "pinged" (referring to being hit or otherwise contacted by) emitted RF signals. The vehicle condition detection system 20-100 (or any aspect thereof) can be configured to be implemented in any conceivable vehicle use application, area, or environment, such as during inclement weather conditions including sleet, hail, snow, ice, frost, mud, sand, debris, uneven terrain, water and/or the like.

The tuned RF resonance components 20-108 can be disposed around and/or on the vehicle (such as within the cabin, engine compartment, or the trunk, or on the body of the vehicle). As shown in FIG. 20-1, the tuned RF resonance components can include belt sensors 20-104, hose sensors 20-105, tire sensors 20-106, and transceiver antennas 20-102, any one or more of which can be implemented in modern vehicles during their production, or (alternatively) retro-fitted to pre-existing vehicles, regardless of their age and/or condition. The tuned RF resonance components 20-108 can be formed, in part, using readily available materials such as fiberglass (such as, for airfoils) or rubber (such as, for tires) or glass (such as, for windshields). These conventional materials can be combined with carbon-based materials, growths, agglomerates, aggregates, sheets, particles and/or the like, such as those self-nucleated in-flight in a reaction chamber or reactor from a carbon-containing gaseous species and formulated to: (1) improve the mechanical (such as tensile, compressive, shear, strain, deformation and/or the like) strength of a composite material in which they are incorporated; and/or, (2) to resonate at a particular frequency or set of frequencies (within the range of 10 GHz to 100 GHz). Variables that dominate RF resonance properties and behavior of a material can be controlled independently from the variables responsible for control of material strength.

Radio Frequency (RF) based stimulation (such as that emitted by the transceiver 20-114 or emitted by a resonator) can be used to emit RF signals to the tuned RF resonance components 20-108, the actuators 20-122 (and/or the like, such as sensors implemented in or on the tuned RF resonance components 20-108) to detect their respective resonance frequency or frequencies, as well as frequency shifts and patterns observed in the attenuation of emitted signals (which may be affected by internal or external conditions). For example, if a tuned RF resonance component (such as the tire sensors 20-106) has been specially prepared (referred to as being "tuned") to resonate at a frequency of approximately 3 GHz, then the tire sensors 20-106 can emit sympathetic resonance or sympathetic vibrations (referring to a harmonic phenomenon wherein a formerly passive string or vibratory body responds to external vibrations to which it has a harmonic likeness) when stimulated by a 3 GHZ RF signal.

These sympathetic vibrations can occur at the stimulated frequency as well in overtones or sidelobes deriving from the fundamental 3 GHz tone. If a tuned resonance component (of the tuned RF resonance components 20-108) has been tuned to resonate at 2 GHz, then when the tuned resonance component is stimulated by a 2 GHz RF signal, that tuned resonance component will emit sympathetic vibrations as so described. These sympathetic vibrations will occur at the stimulated frequency as well as in overtones or sidelobes (in engineering, referring to local maxima of the far field radiation pattern of an antenna or other radiation source, that are not the main lobe) deriving from the fundamental 2 GHz tone. Many additional tuned resonance components can be situated proximally to an RF emitter. An RF emitter might be controlled to first emit a 2 GHz ping, followed by a 3 GHz ping, followed by a 4 GHz ping, and so on. This succession of pings at different and increasing frequencies may be referred to as a "chirp".

Adjacent tire plies (such as those in contact with each other) within a tire body, such as that generally shown by FIGS. 20-5-20-7, can have varying concentration levels or configurations of carbon-based microstructures to define sensors incorporated within that (referring to the respective) tire body ply and/or tread layer to resonate at varying distinct frequencies that are not harmonic with one-another. That is, non-harmonic plies can ensure a distinct and easily recognizable detection of a particular tire body ply and/or tread layer (or other surface or material) relative to others with minimal risk of confusion due to signal interference caused by (or otherwise associated with) harmonics.

The transceiver 20-114 (and/or a resonator, not shown in FIG. 20-1) can be configured to transmit the emitted RF signals 20-110 to any one or more of the tuned RF resonance components 20-108 to digitally recognize frequency shift and/or attenuation of the returned RF signals 20-112 signals 20-112 from any one or more of the tuned RF resonance components 20-108. Such "returned" signals 20-112 can be processed into digital information that can be electronically communicated to a vehicle central processing unit 20-116, that interacts with a vehicle sensor data receiving unit 20-118 and/or a vehicle actuators control unit 20-120, which send further vehicle performance related signals based on sensor data received. The returned signals 20-112 can at least partially control the actuators 20-122. That is, the vehicle actuators control unit 20-120 can control the actuators 20-122 to operate any one or more of the doors, windows, locks 20-124, the engine controls 20-126, the navigation/heads-up displays 20-128, the suspension control 20-129, and/or the airfoil trim 20-130 according to feedback received from the vehicle sensor data receiving unit 20-118 regarding vehicle component wear or degradation as indicated by the tuned RF components in communication with the transceiver 20-114.

Detection of road debris and inclement weather conditions upon monitoring behavior (such as frequency shift and/or attenuation) of the returned RF signals 20-111 can, for example, result in the actuators 20-122 triggering a corresponding change in the suspension control 20-129. Such changes can, for example, include softening suspension settings to accommodate driving over the road debris, while later tightening suspension settings to accommodate enhanced vehicle responsiveness as may be necessary to travel during heavy rain (and thus low traction) conditions. The variations of such control by the vehicle actuators control unit 20-120 are many, where any conceivable condition exterior to the vehicle can be detected by the transceiver (as demonstrated by frequency shifting and/or attenuation of the emitted RF signals 20-110 and/or the returned RF signals 20-112 signals 20-112).

Any of the tuned RF resonance components 20-108 forming the described sensors can be tuned to resonate when stimulated at particular frequencies, where a defined shift in frequency or frequencies (as caused by the carbon-based microstructures) can form one or more signal signatures indicative of the material, or condition of the material, into which the sensor is incorporated.

Time variance or deviation (TDEV) (referring to the time stability of phase x versus observation interval r of the measured clock source; the time deviation thus forms a standard deviation type of measurement to indicate the time instability of the signal source) of frequency shifts in the returned RF signals 20-112 signals 20-112 (such as that shown in a signal signature) can correspond to time variant changes in the environment of the sensor and/or time variant changes in the sensor itself. Accordingly, signal processing systems (such as any one or more of the vehicle central processing unit 20-116, the vehicle sensor data receiving unit 20-118, and/or the vehicle actuators control unit 20-120, etc.) can be configured to analyze signals (such as the emitted RF signals 20-110 and returned RF signals 20-112 signals 20-112) associated with the sensors according to TDEV principles. Results of such analysis (such as a signature analysis) can be delivered to the vehicle central processing unit 20-116, which (in turn) can communicate commands to the vehicle actuators control unit 20-120 for appropriate responsive action. In some configurations such responsive action by the actuators 20-122 can involve at least some human driver input, while in other configurations the vehicle condition detection system 20-100 can function entirely in a self-contained manner allowing for a so-equipped vehicle to address component performance issues as they arise in an entirely driverless setting. In addition, the vehicle central processing unit 20-116 may electronically communicate with one or more upstream components 20-113 (e.g., computational equipment associated with racing applications housed in stationary areas) and/or a racing mission control unit 20-119 responsible for intake and/or processing of all data associated with the tuned RF resonance components 20-108.

FIG. 20-2 depicts a signal processing system 20-200 that analyzes emitted and/or returned RF signals that are frequency-shifted and/or attenuated by sensors formed of carbon-containing tuned RF resonance materials, in accordance with one embodiment. As an option, the signal processing system 20-200 may be implemented in the context of any one or more of the embodiments set forth in any previous and/or subsequent figure(s) and/or description thereof. Of course, however, the signal processing system 20-200 may be implemented in the context of any desired environment. Further, the aforementioned definitions may equally apply to the description below.

As shown, FIG. 20-2 shows a block diagram of a signal processing system 20-200, which can include surface sensors 20-260 and embedded sensors 20-270, any one or more of which may electronically communicate with the other concerning environmental changes 20-250 for a so-equipped vehicle (referring to a vehicle equipped with the surface sensors 20-260 and the embedded sensors 20-270). The signal processing system 20-200 may also include a transceiver 20-214, a signature analysis module 20-254, and a vehicle central processing unit 20-216, any one or more of which may be in electronic communication with the other.

In some implementations, the embedded sensors 20-270 (which can be embedded within materials such as tire plies) can employ and/or be powered by self-powered telemetry including tribological energy generators (not shown in FIG. 20-2) also incorporated within the material enclosed the respective sensor. Accordingly, the tribological energy generators can generate usable electric current and/or power by harvesting static charge buildup between, for example, a rotating tire or wheel and the pavement it contacts, to power a resonant circuit (to be described in further detail herein), which can then resonate to emit a RF signal at a known frequency. As a result, an externally-mounted transceiver unit (such as that mounted within each wheel well of a vehicle) can emit RF signals which are further propagated by the resonant circuits that are tribologically-powered and embedded in the plies of a tire body in this configuration. Frequency shifts and/or attenuation of the magnitude of the emitted signals are likewise received and analyzed, for example, by a signature analysis module 20-254 and/or a vehicle central processing unit 20-216.

Self-powered telemetry (referring to collection of measurements or other data at remote or inaccessible points and their automatic transmission to receiving equipment for monitoring) can be incorporated in vehicle tires. Self-powering telemetry, as referred to herein, includes exploiting tribological charge generation inside a tire, storage of that charge, and later discharge of the stored charge to or through a resonant circuit, to make use of the "ringing" (referring to oscillation of the resonant circuit responsible for further emission of RF signals) that occurs during discharge of the resonant circuit (referring to an electric circuit consisting of an inductor, represented by the letter L, and a capacitor, represented by the letter C, connected together, used to generate RF signals at a particular frequency or frequencies).

Ping stimulus can be provided, generally, in one of two possible configurations of the presently disclosed vehicle component wear detection systems, including reliance on signals or 'pings' generated by a stimulus source, such as a conventional transceiver, located outside the tire (or other vehicle component intended for monitoring regarding wear from ongoing use) such as being incorporated within each wheel well of a so-equipped vehicle; or usage of an intra-tire (referring to also being embedded in the tire plies, similar to the sensors having carbon-based microstructures) tribological energy generation devices that harvest energy resultant from otherwise wasted frictional energy between the rotating wheel and/or tire and the ground or pavement in contact therewith. Tribology, as commonly understood and as referred to herein, implies the study of the science and engineering of interacting surfaces in relative motion. Such tribological energy generation devices can provide electrical power to intra-tire resonance devices which in turn self-emit tire property telemetry.

Either of the above-discussed two 'ping' stimulus generators or providers can have complex resonance frequencies (CRf) components ranging from approximately 10 to 99 GHz (due, for example, resonance frequency of small dimensions of structures like graphene platelets) as well as lower frequency resonance in kHz range due to the relatively much larger dimensions of the discussed intra-tire resonance. Generally, CRf can be equated to a function of elastomer component innate resonance frequency, carbon component innate resonance frequency, ratio/ensemble of the constituent components, and the geometry of the intra-tire resonance device.

The signal processing system 20-200 functions to analyze a signal signature (defined by digitally observing frequency shifting and/or attenuation of any one or more of the emitted RF signals 20-210 and/or returned RF signals 20-212) once sensors formed of carbon-based microstructures have been stimulated. As a result of stimulation with a chirp signal sensor that resonate at one of the chirp/ping frequencies "respond" by resonating at or near its corresponding tuned frequency, shifting the emitted frequency, and/or attenuating the amplitude of the emitted signal. When an environmental change (such as that resulting in the wear of a tire body ply and/or tread layer) occurs while the chirp/ping is emitted, "returned" signals can monitored for variations in modulation-either higher or lower than the tuned frequency. Accordingly, the transceiver 20-214 can be configured to receive returned RF signals 20-212 that are representative of the surfaces that they are pinged on or against, etc.

Of course, it is to be again appreciated that although the context of FIGS. 20-1-20-18 relate predominately to automobile application of split ring resonators, such teachings may also apply equally to other scenarios and industries detailed herein (including concrete, materials science, aerospace, drone and aerial vehicles, mining materials, oil industry components, etc.). Thus, the teachings herein with respect to automobiles (and tires in particular) may be applied in the context of these other industries, some of which are described in detailed hereinbelow.

The foregoing chirp/ping signals can be emitted (such as by non-audible RF signal, pulse, vibration and/or the like transmission) by the transceiver 20-214. Also, the "return" signals can be received by the transceiver 20-214. As shown, chirp signals can occur in a repeating sequence of chirps (such as, the emitted RF signals 20-210). For example, a chirp signal sequence might be formed of a pattern comprising a 1 GHz ping, followed by a 2 GHz ping, followed by a 3 GHz ping, and so on. The entire chirp signal sequence can be repeated in its entirety continuously. There can be brief periods between each ping such that the returned signals from the resonant materials (returned RF signals 20-212) can be received immediately after the end of a ping. Alternatively, or in addition, signals corresponding to ping stimulus and signals of the observed "response" can occur concurrently and/or along the same general pathway or route. The signature analysis module can employ digital signal processing techniques to distinguish signals of the observed "response" from the ping signals. In situations where the returned response comprises energy across many different frequencies (such as, overtones, sidelobes, etc.), a notch filter can be used to filter the stimulus. Returned signals that are received by the transceiver can be sent to the signature analysis module 20-254, which in turn can send processed signals to vehicle central processing unit 20-216. The foregoing discussion of FIG. 20-2 includes discussion of sensors formed of carbon-containing tuned resonance materials and can also refer to sensing laminates as well.

Disclosed sensors may be incorporated into tire layers, e.g., including layers of resin can be layered interstitially between additional layers of carbon fiber within tire plies. Each layer of carbon-containing resin can be formulated differently to resonate at a different expected or desired tuned frequency. The physical phenomenon of material resonation can be described with respect to a corresponding molecular composition. For example, a layer having a first defined structure, such as a first molecular structure will resonate at a first frequency, whereas a layer having a second, different molecular structure can resonate at a second, different frequency.

Material having a particular molecular structure and contained in a layer will resonate at a first tuned frequency when that layer is in a low energy state and will resonate at a second different frequency when the material in the layer is in an induced higher-energy state. For example, material in a layer that exhibits a particular molecular structure can be tuned to resonate at a 3 GHz when the layer is in a natural, undeformed, low energy state. In contrast, that same layer can resonate at 2.95 GHz when the layer is at least partially deformed from its natural, undeformed, low energy state. As a result, this phenomenon can be adjusted to accommodate the needs for detecting, with a high degree of fidelity and accuracy, even the most minute aberration to, for example, a tire surface contacting against a road surface such as pavement and experiencing enhanced wear at a certain localized region of contact. Race cars racing on demanding race circuits (referring to highly technical, windy tracks featuring tight turns and rapid elevational changes) can benefit from such localized tire wear or degradation information to make informed tire-replacement decisions, even in time-sensitive race-day conditions.

The frequency-shifting phenomenon referred to above (such as transitioning from resonating at a frequency of 3 GHz to 2.95 GHz) may be shown and discussed with reference to FIGS. 20-24B1-20-24B2, which will be discussed hereinbelow.

Carbon-containing materials (such as those including carbon-based microstructures) tuned to demonstrate a specific resonance frequency upon being pinged by a RF signal can be tuned to exhibit a particular resonance profile by tailoring specific compounds that make up the materials to have particular electrical impedances. Different electrical impedances in turn correspond to different frequency response profiles.

Impedance describes how difficult it is for an alternating (AC) current to flow through an element. In the frequency domain, impedance is a complex number having a real component and an imaginary component due to the structures behaving as inductors. The imaginary component is an inductive reactance (the opposition of a circuit element to the flow of current due to that element's inductance or capacitance; larger reactance leads to smaller currents for the same voltage applied) component XL, which is based on the frequency f and the inductance L of a particular structure:

$$X_L = 2\pi f L \qquad \text{(Eq. 20-1)}$$

As the received frequency increases, the reactance also increases such that at a certain frequency threshold the measured intensity (amplitude) of the emitted signal can attenuate. Inductance L is affected by the electrical impedance Z of a material, where Z is related to the material properties of permeability u and permittivity & by the relationship:

$$Z = \sqrt{\frac{\mu' + j\mu''}{\varepsilon' + j\varepsilon''}} = \sqrt{\frac{\mu_0}{\varepsilon_0}}, \qquad \text{(Eq. 20-2)}$$

Thus, tuning of material properties changes the electrical impedance Z, which affects the inductance L and consequently affects the reactance $X_L$.

Carbon-containing structures such as those disclosed by Anzelmo, et al., in U.S. Pat. No. 10,428,197 entitled "Carbon and Elastomer Integration" issued on Oct. 1, 2019, incorporated herein by reference in its entirety with different inductances can demonstrate different frequency responses (when used to create sensors for the aforementioned systems). That is, a carbon-containing structure with a high inductance L (being based on electrical impedance Z) will reach a certain reactance at a lower frequency than another carbon-containing structure with a lower inductance.

The material properties of permeability, permittivity and conductivity can also be considered when formulating a compound to be tuned to a particular electrical impedance. Still further, it is observed that a first carbon-containing structure will resonate at a first frequency, whereas second carbon-containing structure will resonate at a second frequency when that structure is under tension-inducing conditions, such as when the structure is slightly deformed (such as, thereby slightly changing the physical characteristics of the structure).

Example carbon-containing structures (e.g., as shown in FIGS. 20-18A-20-18Y) that may resonate at a first frequency, which can be correlated to an equivalent electrical circuit comprising a capacitor $C_1$ and an inductor $L_1$. The frequency $f_1$ is given by the equation:

$$f_1 = \frac{1}{2\pi\sqrt{L_1 C_1}} \qquad \text{(Eq. 20-3)}$$

Deformation of the carbon-containing structure may, in turn, change the inductance and/or capacitance of the structure. The changes can be correlated to an equivalent electrical circuit comprising a capacitor $C_2$ and an inductor $L_2$. The frequency $f_2$ is given by the equation:

$$f_2 = \frac{1}{2\pi\sqrt{L_2 C_2}} \qquad \text{(Eq. 20-4)}$$

FIG. 20-3 illustrates a signature classification system 20-300, in accordance with one embodiment. As an option, the signature classification system 20-300 may be implemented in the context of any one or more of the embodiments set forth in any previous and/or subsequent figure(s) and/or description thereof. Of course, however, the signature classification system 20-300 may be implemented in the context of any desired environment. Further, the aforementioned definitions may equally apply to the description below.

The signature classification system 20-300 processes signals received from sensors formed of carbon-containing tuned resonance materials. The signature classification system 20-300 can be implemented in any physical environment or weather condition. FIG. 20-3 relates to incorporating tuned resonance sensing materials into automotive components for classifying signals (such as, signatures) detected by, classified and/or received from sensors installed in vehicles. A ping signal of a selected ping frequency is transmitted at operation 20-302. The ping signal generation mechanism and the ping transmission mechanism can be performed by any known techniques. For example, a transmitter module can generate a selected frequency of 3 GHZ, and radiate that signal using an antenna or multiple antennae. The design and location of the tuned antenna (such as mounted on and/or within any one or more of the wheel wells or a vehicle) can correspond to any tuned antenna geometry, material and/or location such that the strength of the ping is sufficient to induce (RF) resonance in proximate sensors. Several tuned antennae are disposed upon or within structural members that are in proximity to corresponding sensors. As such, when a proximal surface sensor is stimulated by a ping, it may resonate back with a signature. That signature can be received (at operation 20-304) and stored in a dataset comprising received signatures 20-310. A sequence of transmission of a ping, followed by reception of a signature, can be repeated in a loop.

The ping frequency can be changed (operation 20-308) in iterative passes through the loop. Accordingly, as operation 20-304 is performed in the loop, operation 20-304 can store signatures 20-312, including a first signature 20-3121, a second signature 20-3122, up to an Nth signature 20-312N. The number of iterations can be controlled by decision 20-306. When the "No" branch of decision 20-306 is taken (such as, when there are no further additional pings to transmit), then the received signatures can be provided (at operation 20-314) to a digital signal processing module (such as, an instance of signature analysis module 20-254 shown in FIG. 20-2). The digital signal processing module classifies the signatures (operation 20-316) against a set of calibration points 20-318. The calibrations points can be configured to correspond to particular ping frequencies. For example, calibration points 20-318 can include a first calibration point 20-3201 that can correspond to a first ping and first returned signature near 3 GHZ, a second calibration point 20-3202 that can correspond to a second ping and second returned signature near 2 GHz, and so on for any integer value "N" calibration points (up to a Nth calibration point 20-320N).

At operation 20-320, classified signals are sent to a vehicle central processing unit (such as, the vehicle central processing unit 20-116 of FIG. 20-1). The classified signals can be relayed by the vehicle central processing unit 20-116 to an upstream repository that hosts a computerized database configured to host and/or run machine learning algorithms. Accordingly, a vast amount of stimulus related to signals, classified signals, and signal responses can be captured for subsequent data aggregation and processing. The database can be computationally prepared, referring to as being "trained", provided a given set of sensed measurements that can be correlated to conditions or diagnoses related to vehicular performance, such as tire degradation due to repeated use. Should, during the operation of the vehicle, the measured deflection (such as, air pressure) of a particular portion of an airfoil component differ from the measured deflection (such as, air pressure) of a different portion of the airfoil component, a potential diagnosis may be that one tire is underinflated and therefore causing vehicle ride height to be non-uniform, resulting in airflow over, on, and/or around the vehicle to demonstrate proportionate non-uniformities, as detected by deflection on the airfoil component. Other potential conditions or diagnoses can be determined by the machine learning system as well. The conditions and/or diagnoses and/or supporting data can be returned to the vehicle to complete a feedback loop. Instrumentation in the vehicle provides visualizations that can be acted upon (such as, by a driver or by an engineer).

FIG. 20-4 depicts a series of tire condition parameters that are sensed from changes in RF resonance of various layers of carbon-containing tuned RF resonance materials, in accordance with one embodiment.

FIG. 20-4 depicts a series of tire condition parameters 20-400 that are sensed from changes in RF resonance of various layers of carbon-containing tuned RF resonance materials, in accordance with one embodiment. As an option, the tire condition parameters 20-400 may be implemented in the context of any one or more of the embodiments set forth in any previous and/or subsequent figure(s) and/or description thereof. Of course, however, the tire condition parameters 20-400 may be implemented in the context of any desired environment. Further, the aforementioned definitions may equally apply to the description below.

As shown, FIG. 20-4 illustrates various physical characteristics or aspects (tire condition parameters 20-400) pertaining to incorporating tuned resonance sensing materials into automotive components (such as tires). Here, the figure is presented with respect to addressing deployment of survivable sensors in tires, including non-pneumatic tires as well as pneumatic tires. The construction of the tires may correspond to radial tires, bias ply tires, tubeless tires, solid tires, run-flat tires, etc. Tires may be used in any sorts of vehicles and/or equipment and/or accessories pertaining to vehicles. Such vehicles may include aircraft, all-terrain vehicles, automobiles, construction equipment, dump trucks, earthmovers, farm equipment, forklifts, golf carts, harvesters, lift trucks, mopeds, motorcycles, off-road vehicles, racing vehicles, riding lawn mowers, tractors, trailers, trucks, wheelchairs, etc. The tires may, in addition or alternative to that presented, be used in non-motorized vehicles, equipment and accessories such as bicycles, tricycles, unicycles, lawnmowers, wheelchairs, carts, etc.

The parameters shown in FIG. 20-4 are as an example, and other variants may exist or otherwise be prepared to target specific desirable performance characteristics of many conceivable end-use scenarios, including truck tires designed to offer increased longevity (at the potential expense of road adhesion), or soft racing tires designed to provide maximum road adhesion (at the potential expense of lifespan).

Various carbon structures may be used in different formulations with other non-carbon materials integrated into tires, which then undergo mechanical analysis to determine their respective characteristics of the tires. Some of these characteristics can be determined empirically by direct testing, while other characteristics are determined based on measurements and data extrapolation. For example, rolling uniformity can be determined by sensing changes in force when the tire is subjected to rolling over a uniform surface such as a roller, whereas tread life is based on an abrasion test over a short period, the results of which short term test are extrapolated to yield a predicted tread life value.

More tire characteristics can be measured, but some of these measurement techniques can be physically destructive to the tire, and thus measured at a desired point in the life of the tire. In contrast, using survivable sensors embedded in tires allows for such otherwise destructive measurements to be made throughout the entire lifetime of the tire. For example, detection of response signals based on RF signals pinged against sensors embedded in tires can be used for such sensing. Moreover, each body ply and/or tread layer of a tire can, as discussed herein, include durable (also referred to as "survivable") sensors that are tuned to resonate at a particular frequency.

Ply used in a tire can be formulated to combine carbon-containing structures with other materials to achieve a particular material composition that exhibits desired performance (such as handling and longevity) characteristics. The natural resonance frequency (or frequencies) of the particular material composition can be subjected to spectral analysis to develop a spectral profile for the particular material composition. This spectral profile can be used as a calibration baseline for that material. When the body ply and/or tread layer of the tire undergoes deformation, the spectral profile changes, which spectral profile changes can be used as additional calibration points (such as the calibration points 20-318). Many such calibration points can be generated by testing, and such calibration points can in turn be used to gauge deformation.

Analysis of the spectral response results in quantitative measurements of many tire parameters. The tire parameters that can be determined from signature analysis, for example, can include tread life 20-422, handling at a first temperature 20-428, handling at a second temperature 20-426, rolling economy at a first temperature 20-430, rolling economy at a second temperature 20-432, rolling uniformity 20-436, and braking uniformity 20-438.

Responses, such as those spectrally represented based on return ping signals received from sensors embedded in materials in tire ply, can be representative of the deformation observed. That is, a certain type of tire deformation will correspond with a certain type of specific response, such that a mapping between responses or response types can be done to degradation types. Moreover, time-variant changes in the spectral response of a tire as it undergoes in-situ deformation can be used to determine many ambient conditions. In tires that are constructed using multiple ply, each body ply and/or tread layer can be formulated to exhibit a particular tuned frequency or range of frequencies. For example, FIG. 20-5 (shown hereinbelow) shows a schematic diagram for constructing a tire from multiple ply, each of which has as different a particular tuned frequency or range of frequencies.

FIG. 20-5 depicts a schematic diagram 20-500 of an apparatus used for tuning multiple plies of a tire by selecting carbon-containing tuned RF resonance materials from separate and independent reactors for incorporation into the body of a single tire assembly, in accordance with one embodiment. As an option, the schematic diagram 20-500 may be implemented in the context of any one or more of the embodiments set forth in any previous and/or subsequent figure(s) and/or description thereof. Of course, however, the schematic diagram 20-500 may be implemented in the context of any desired environment. Further, the aforementioned definitions may equally apply to the description below.

The schematic diagram 20-500 may be used for fine-adjustment, or tuning, of multiple body plies and/or tread layers of a tire by selecting carbon-containing tuned resonance materials for incorporation into a tire assembly or structure, which can be implemented in any environment. FIG. 20-5 illustrates how to mix different carbons into tire composite formulations that are in turn assembled into a multi-ply tire. The resulting multi-ply tire exhibits the various resonance-sensitive and frequency-shifting characteristics.

Multiple reactors (such as, reactor 20-5521, reactor 20-5522, reactor 20-5523, and reactor 20-5524) each produce (or otherwise transport or provide) a particular carbon additive/filler to the network that is tuned to yield a particular defined spectral profile. The carbon additives (such as, first tuned carbons 20-554, second tuned carbons 20-556, third tuned carbons 20-558, and fourth tuned carbons 20-560) can mixed with other (carbon-based or non-carbon based) compositions 20-550. Any known techniques can be used to mix, heat, pre-process, post-process or otherwise combine the particular carbon additives with the other compositions. Mixers (such as, mixer 20-5621, mixer 20-5622, mixer 20-5623, and mixer 20-5624) are presented to show how different tuned carbons can be introduced into various components of a tire. Other techniques for tire assembly may involve other construction techniques and/or other components that comprise the tire. Any known techniques for multi-ply tires can be used. Moreover, the spectral profile of a particular body ply and/or tread layer (such as a group of body plies and/or tread layers 20-568, including a body ply and/or tread layer 20-5681, a body ply and/or tread layer 20-8682, a body ply and/or tread layer 20-5683, and a body ply and/or tread layer 20-5684) can be determined based on the characterization of a particular body ply and/or tread layer formulation. For example, based on a stimulus and response characterization, a first body ply and/or tread layer formulation (such as, body ply and/or tread layer formulation 20-5641) might exhibit a first spectral profile, whereas a second body ply and/or tread layer formulation (such as, body ply and/or tread layer formulation 20-5642) might exhibit a second spectral profile.

The resulting different formulations (such as, body ply and/or tread layer formulation 20-5641, body ply and/or tread layer formulation 20-5642, body ply and/or tread layer formulation 20-5643, and body ply and/or tread layer formulation 20-5644), each of which body ply and/or tread layer exhibits a corresponding spectra profile, are used in the different body ply and/or tread layer that are formed into a tire assembly 20-566.

FIG. 20-6 depicts sets of example condition signatures 20-600 that may be emitted from new tires formed of layers of carbon-containing tuned RF resonance materials, in accordance with one embodiment. As an option, the example condition signatures 20-600 may be implemented in the context of any one or more of the embodiments set forth in any previous and/or subsequent figure(s) and/or description thereof. Of course, however, the example condition signatures 20-600 may be implemented in the context of any desired environment. Further, the aforementioned definitions may equally apply to the description below.

FIG. 20-6 shows a second set of example condition signatures 20-600 that are emitted from tires formed of layers of carbon-containing tuned resonance materials. The example condition signatures 20-600 or any aspect thereof may be emitted in any environment. FIG. 20-6 illustrates multiple body ply and/or tread layer (such as, body ply and/or tread layer #1, body ply and/or tread layer #2, and body ply and/or tread layer #3) of a new tire. The term "ply", as used in this example and elsewhere with reference to any one or more of the presented implementations, can refer to a ply or layer within a body of the tire, or—alternatively-a layer of the tire tread protruding radially outward away from the body of the tire intended for contact with hard pavement, or the earth for off-road tires). In one embodiment, the first body ply and/or tread layer may be formulated (referring to being created with a specific formula) with tuned carbons such that the first body ply and/or tread layer resonates at 1.0 GHz when stimulated with a 1.0 GHz ping stimulus (such as, the first ping 20-602). Similarly, the second body ply and/or tread layer is formulated with tuned carbons such that the second body ply and/or tread layer resonates at 2.0 GHz when stimulated with a 2.0 GHz ping stimulus (such as, the second ping 20-604). Further, the third body ply and/or tread layer is formulated with tuned carbons such that the third body ply and/or tread layer resonates at 3.0 GHz when stimulated with a 3.0 GHz ping stimulus (such as, the third ping 20-606). As shown by first response 20-608, second response 20-610, and third response 20-614, all three-body ply and/or tread layer are responsive at their respective tuned frequencies.

A transceiver antenna can be positioned in and/or on the wheel well of the corresponding tire (and/or in any location near the split ring resonator). Systems handling any such generated response signals can be configured to distinguish from other potential responses arising from the other surfaces, such as the remaining non-target tires of the vehicle, for example. For example, even though the right front tire mounted on the right front wheel of the vehicle might respond to a ping that is emitted from a transceiver antenna located in the left front wheel well of the vehicle, the response signal from the right front tire will be significantly attenuated (and recognized as such) as compared to the response signals from the left front tire of the vehicle. In various embodiments, the positioning of the transceiver antenna could be within inches of the split ring resonator, or could be 5-10 meters (or even farther) as needed. Such positioning may be a function of the power of the emitter receiver.

When the transceiver antenna is located in the wheel well of a corresponding tire, the response from the corresponding tire will be attenuated with respect to the ping stimulus. For example, the response from the corresponding tire can be attenuated with respect to the ping stimulus by 9 decibels (−9 dB) or more or can be attenuated with respect to the ping stimulus by 18 decibels (−18 dB) or more or can be attenuated with respect to the ping stimulus by 36 decibels (−36 dB) or more or can be attenuated with respect to the ping stimulus by 72 decibels (−72 dB) or more. In some cases, a ping signal generator is designed to be combined with a transceiver antenna located in the wheel well so as to cause the ping response of a corresponding tire to be attenuated by not more than 75 dB (−75 dB).

FIG. 20-7 depicts sets of example condition signatures 20-700 that may be emitted from new tires formed of layers of carbon-containing tuned RF resonance materials, in accordance with one embodiment. As an option, the example condition signatures 20-700 may be implemented in the context of any one or more of the embodiments set forth in any previous and/or subsequent figure(s) and/or description thereof. Of course, however, the example condition signatures 20-700 may be implemented in the context of any desired environment. Further, the aforementioned definitions may equally apply to the description below.

As shown, the third set of example condition signatures 20-700 are emitted from tires after wear-down of some of the carbon-containing tuned resonance materials. As an option, one or more variations of example condition signatures 20-700 or any aspect thereof may be implemented in the context of the architecture and functionality of the implementations described herein. The example condition signatures 20-700 or any aspect thereof may be emitted in any environment.

In this example, the tire has undergone wear. More specifically, the outermost body ply and/or tread layer has been worn away completely. As such, a ping stimulus at 1.0 GHz would not result in a response from the outermost ply. This is shown in the chart as a first response attenuation 20-702. As the tire continues to undergo tread wear, ping responses from the next body ply and/or tread layer and ping responses from the next successive body ply and/or tread layer and so on will be attenuated, which attenuation can be used to measure total tread wear of the tire. As an alternative, the same tuned carbons can be used in all plies. The tread wear of the tire as well as other indications can be determined based on the returned signal signatures from the tire.

FIG. 20-8 depicts a top-down schematic view 20-800 of an example split-ring resonator (split ring resonator) configuration including two concentric split ring resonators, in accordance with one embodiment. As an option, the top-down schematic view 20-800 may be implemented in the context of any one or more of the embodiments set forth in any previous and/or subsequent figure(s) and/or description thereof. Of course, however, the top-down schematic view 20-800 may be implemented in the context of any desired environment. Further, the aforementioned definitions may equally apply to the description below.

As shown, FIG. 20-8 is a top view of two layers, where each layer hosts a split ring resonator (split ring resonator), e.g., forming an example split-ring resonator (split ring resonator) configuration including two concentric split ring resonators. As used herein, split ring resonators (split ring resonators) consist of a pair of concentric rings, disposed on a dielectric substrate, where each ring has slits (e.g., due to a printed pattern). When an array of split ring resonators is excited by means of a time varying magnetic field, the structure behaves as an effective medium with negative effective permeability in a narrow band around the split ring resonator resonance point. Many geometries are possible, e.g., such that dimensions and/or spacings between each split ring resonator including dimensions "a." "r", and/or "c" are selected to achieve particular corresponding spectral response. For example, "a" may be approximately 1 mm, "r" may be 2 mm, and "c" may be approximately 0.6 mm. These dimensions may correspond to producing a desired and/or expected spectral response, e.g., resulting in a relatively wider and/or broader signal response rather than a narrow and/or notched response, facilitating improved spectral analysis leading to improved cost-efficiency in using spectral analysis tools (such as a spectrum analyzer). In addition, or the alternative, any of the dimensions may be further adjusted to achieve particular desired end-result objectives, e.g., applications in racing circuits compared to off-road applications, etc. In one embodiment, a particular geometry may involve gaps between concentric rings. Such gaps may produce a capacitance which in combination with the inductance inherent in the pair of concentric rings introduces a change in the resonance of the ensemble.

A printable, sheet-oriented, cylinder-type, split ring resonator design can be built out of any electrically-conducting materials, including metals, electrically-conducting non-metals, dielectric materials, semiconducting materials, etc. In addition to tuning based on the selection and/or treatment of electrically-conducting materials, split ring resonators can be tuned by varying the geometry such that the effective permittivity accordingly tuned. Effective permittivity as a function of the geometry of a split ring resonator is given in Eq. 20-5.

$$\mu_{eff} = 1 - \frac{\frac{\pi r^2}{a^2}}{1 + \frac{2l\sigma_1 i}{\omega r \mu_0} - \frac{3lc_0^2}{\pi\omega^2 r^3 \ln\left(\frac{2c}{d}\right)}} \quad \text{(Eq. 20-5)}$$

where α is the spacing of the cylinders, ω is the angular frequency, μ0 is the permeability of free space, r is the radius, d is the spacing of the concentric conducting sheets, l is a stacking length, c is the thickness of a ring, and σ is the resistance of unit length of the sheets measured around the circumference.

In some situations, the value of a (e.g., the spacing of the cylinders of a cylindrical split ring resonator) can be made relatively small such that the concentric rings absorb EM radiation within a relatively narrow frequency range. In other situations, the value of a can be made relatively large such that the concentric rings each absorb EM radiation at frequencies that are separated by a wide range. In some situations, differently-sized split ring resonators can be disposed on different surfaces of the tire. In some situations, the differently-sized split ring resonators that are disposed on different surfaces of the tire can be used to take measurements of tire conditions (e.g., temperature, aging, wear, etc.).

In some embodiments, the materials that form the split ring resonator are composite materials. Each split ring resonator can be configured to any particular desired tuned response to EM stimulation. At least inasmuch as split ring resonators are designed to mimic the resonance response of atoms (though on a much larger scale, and at lower frequencies), the larger scale of split ring resonators as compared with atoms allows for more control over the resonance response. Moreover, split ring resonators are much more responsive than ferromagnetic materials found in nature. The pronounced magnetic response of split ring resonators carries with it a significant advantage over heavier, naturally occurring materials.

FIG. 20-9 depicts a schematic diagram 20-900 showing a complete tire diagnostics system and apparatus for tire wear sensing through impedance-based spectroscopy, in accordance with one embodiment. As an option, the schematic diagram 20-900 may be implemented in the context of any one or more of the embodiments set forth in any previous and/or subsequent figure(s) and/or description thereof. Of course, however, the schematic diagram 20-900 may be implemented in the context of any desired environment. Further, the aforementioned definitions may equally apply to the description below.

As shown, the schematic diagram 20-900 of a tire, such as a pneumatic rubber tire filled with air or nitrogen gas ($N_2$), can include traditional tire components including a body 20-920, an inner liner 20-912, a bead filler region 20-922, a bead 20-916, one or more belt plies 20-904 belt plies 20-904, 20-906, 20-908, and 20-910, tread 20-902, and impedance-based spectroscopy wear sensing printed electronics 20-918 (alternatively sensors including carbon-based microstructures for signal frequency shift and attenuation monitoring by a resonator embedded within any one or more of the belt plies 20-904-20-910).

As shown here, a wireless strain sensor can be placed on surfaces or on the sides of the inner liner (or be embedded within) to monitor the tire condition for automobile safety, (such as to detect damaged tires). Tire deformation or strain monitoring can (indirectly) provide information representative of a degree of friction between the tires and contacting road surfaces, which can then be used for the optimization of automobile tire control systems. The tire information can be wirelessly transmitted to a receiver positioned in the wheel well (and/or any location near the split ring resonator) based on a resonant sensor platform. It is to be appreciated that the receiver could be potentially located anywhere that is not opaque to radio frequency (wireless) signaling.

FIG. 20-10 depicts a schematic diagram 20-1000 relating to tire information transferred via telemetry into a navigation system, as well as equipment for manufacturing printed carbon-based materials, in accordance with one embodiment. As an option, the schematic diagram 20-1000 may be implemented in the context of any one or more of the embodiments set forth in any previous and/or subsequent figure(s) and/or description thereof. Of course, however, the schematic diagram 20-1000 may be implemented in the context of any desired environment. Further, the aforementioned definitions may equally apply to the description below.

As shown, the schematic diagram 20-1000 show a system for providing tire wear-related information transferred via telemetry into a navigation system and equipment for manufacturing printed carbon-based materials. The schematic diagram 20-1000 can function with any one or more of the presently disclosed systems, methods, and materials, such as the sensors including carbon-based microstructures such that a redundant description of the same is omitted. Impedance spectroscopy, also referred to as Electrochemical Impedance Spectroscopy (EIS), refers to a method of impedimetric transduction involving the application of a sinusoidal electrochemical perturbation (potential or current) over a wide range of frequencies when measuring a sample, such as a sensor including carbon-based microstructures incorporated within one or more tire belt plies of a tire 20-1002. Printed carbon-based resonators 20-1004 can be incorporated within one or more tire components such as the tire belt plies, with each of the printed carbon-based resonators 20-1004 having the general oval configuration shown, or some other shape or configuration tailored to achieve specific desirable resonance properties suitable for efficient and accurate vehicle component wear detection through monitoring of frequency shift and/or attenuation (such as a first response attenuation indicative of the wear of a tire body ply and/or tread layer having a natural resonance frequency of approximately 1.0 GHz).

An assembly of rollers 20-1010 capable of forming the printed carbon-based resonators 20-1004 includes a repository 20-1012 (such as a vat) of carbon-based microstructures and/or microstructural material (such as graphene), an anilox roller 20-1014 (referring to a hard cylinder, usually constructed of a steel or aluminum core which is coated by an industrial ceramic whose surface contains millions of very fine dimples, known as cells), a plate cylinder 20-1016, and an impression cylinder 20-1018. In operation, graphene extracted from the repository 20-1012 can be rolled, pressed, stretched, or otherwise fabricated by the rollers of the assembly of rollers 20-1010 into the printed carbon-based resonators 20-1004. No registration (referring to alignment) of the printed carbon-based resonators 20-1004 may be needed for functioning of the schematic diagram 20-1000.

As such, any combination of the aforementioned features can be used to manufacture a tire that has a resonator (referring to actual or "equivalent" tank), LC and/or resonant circuit, where carbon-containing microstructures themselves can resonate in response to emitted RF signals from a transceiver, and/or from energy supplied by an advanced energy source, such that other sensors, disposed into or onto any one or more components such as the tread, a ply or plies, an inner liner, etc. of the tire can demonstrate frequency-shifting or signal attenuation properties or behavior. The described resonator is not necessarily required to be embodied as an actual electrical and/or integrated circuit (IC). The described resonator can be realized simply as tuned carbon-containing microstructures, to thus avoid common deterioration concerns that may arise when implementing traditional discrete circuitry in decomposable materials, such as tire tread layers. Such resonators can resonate in response to an externally-supplied 'ping' (such as that supplied by a transceiver located in the wheel well of vehicle), or the resonator can respond to being charged by a co-located (referring to within the same tire tread layer, but possibly at a different location within that tire tread layer), self-powered, self-pinging capability facilitated by any variations or any number of power or charge generators (such as thermoelectric generators, piezoelectric energy generators, triboelectric energy generators, etc.).

At any time when the tire is rolling or otherwise undergoing deformation, any of the described resonators (and other resonators and/or resonant circuits) can be configured to emit and/or further emit oscillating RF signals (or other forms of electromagnetic radiation, depending on the overall configuration). As a vehicle tire experiences wear resultant from usage (such as on or off-road driving), tire tread layers in contact with pavement or ground (earth) may experience deformation, either instantaneously or over time (such as that observed from being "squished", referring to at least partial flattening of sections of the exposed vehicle tire tread layers during rotation or rolling, and/or from lateral motion as experienced during turning, etc.), therefore resultant signal frequency-shift and/or attenuation behavior may change pursuant to such "squishing" as associated signals can oscillate over one or more known amplitude ranges. In addition, or in the alternative, as the tire undergoes deformation, observed signals can oscillate within a known frequency range corresponding to a particular resonator, allowing for precise and accurate identification of the type of deterioration occurring while it is occurring, rather than requiring the driver, passengers, and/or other vehicle occupants to exit the vehicle, while it is stationary, to observe tire tread conditions. Such a frequency-shifting oscillation may be observable as a frequency shift back and forth between two or more frequencies within the known frequency range.

A wireless-capable strain sensor (such as a geometric measure of deformation representing the relative displacement between particles in a material body that may be caused by external constraints or loads) positioned on sides of the inner liner can monitor tire condition for automobile safety (such by detecting damaged tires). Additionally, tire deformation or strain monitoring can indirectly provide information related to the degree of friction between tires and road surface, which can then be used for the optimization of automobile tire control systems. Such tire information can be wirelessly transmitted to a receiver (and/or transceiver) positioned in the wheel hub based on a resonant sensor (such as an impedance spectroscopy, IS, sensor) platform.

FIG. 20-11 depicts a schematic diagram 20-1100 relating to tire information transferred via telemetry into a navigation system, as well as equipment for manufacturing printed carbon-based materials, in accordance with one embodiment. As an option, the schematic diagram 20-1100 may be implemented in the context of any one or more of the embodiments set forth in any previous and/or subsequent figure(s) and/or description thereof. Of course, however, the schematic diagram 20-1100 may be implemented in the context of any desired environment. Further, the aforementioned definitions may equally apply to the description below.

In one embodiment, the schematic diagram 20-1100 may relate to a resonant serial number-based digital encoding system for determining wear of vehicle tires through ply-print encoding. The resonant serial number-based digital encoding system may be incorporated and/or function with any of the presently disclosed systems, methods, and sensors. The resonant serial number-based digital encoding system offers digital encoding of tires through ply-print encoding and thus offers cradle-to-the-grave (referring to a full lifespan) of tracking of tires (and related performance metrics) and a usage profile without requiring traditional electronic devices susceptible to routine wear-and-tear in the tires.

Resonant serial number digital encoding of tire through tire tread layer printing may facilitate, in some implementations, cradle-to-grave tire tracking of tires and usage without necessarily requiring the presence of electronics within the tires. For example, along with tire wear sensing accomplished through impedance spectroscopy, additional resonators may be digitally encoded onto, for example, one or more printed patterns for serial numbers used for telemetry tracking. As a result, so-equipped vehicles can track tread wear, miles driven (e.g., in total), and tire age without requiring radio-frequency identification (RFID) technology.

Along with tire wear sensing thru Impedance Spectroscopy (IS) and/or Electrochemical Impedance Spectroscopy (EIS), additional resonators can be digitally encoded onto a printed pattern to provide a recognizable serial number for telemetry-based tire performance tracking. By being printed onto the body ply and/or tread layer incrementally, tires incorporating the discussed printed carbon-based resonators can be innately serialized.

FIG. 20-12 depicts a schematic diagram 20-1200 for resonant serial number-based digital encoding of vehicle tires through tire tread layer and/or tire body ply-print encoding, in accordance with one embodiment. As an option, the schematic diagram 20-1200 may be implemented in the context of any one or more of the embodiments set forth in any previous and/or subsequent figure(s) and/or description thereof. Of course, however, the schematic diagram 20-1200 may be implemented in the context of any desired environment. Further, the aforementioned definitions may equally apply to the description below.

As shown, the serial number "6E" is shown encoded in a specially-prepared array of printed carbon resonators configured to resonate according to the 'ping' stimulus-response diagram 20-1212 allowing for convenient and reliable identification of that particular body ply and/or tread layer of the so-equipped vehicle tire.

FIG. 20-13 illustrates resonance mechanisms 20-1300 that contribute to the ensemble phenomenon arising from different proximally-present resonator types, in accordance with one embodiment. As an option, the resonance mechanisms 20-1300 may be implemented in the context of any one or more of the embodiments set forth in any previous and/or subsequent figure(s) and/or description thereof. Of course, however, the resonance mechanisms 20-1300 may be implemented in the context of any desired environment. Further, the aforementioned definitions may equally apply to the description below.

In one embodiment, the resonance mechanisms 20-1300 may be used to illustrate use of split ring resonators (split ring resonators) as resonance devices that contribute to the ensemble phenomenon arising from different proximally-present resonator types. The figure shows the inner surface 12-1301 of a tire, where the inner surface has two split ring resonators (e.g., split ring resonator 20-1303A and split ring resonator 20-1303B), each of which split ring resonator forms a circuit configuration 20-1305 that can be tuned to attenuate a signal at a particular frequency and/or to attenuate within a particular range of frequencies. In this embodiment, circuit configuration 20-1305 is shown as a geometric pattern that corresponds to a substantially-circular split ring resonator; however, alternative circuit configurations can have different geometric patterns (e.g., cylinders, ellipses, rectangles, ovals, squares, etc.), and as such, any conceivable geometric configuration is possible. Variations of the geometric configurations can be selected based on the impact on resonation capabilities of the geometric pattern. In particular, and as shown, the geometric pattern can comprise self-assembled carbon-based particles having various agglomeration patterns (e.g., agglomeration pattern 20-1306, agglomeration pattern 20-1308, and agglomeration pattern 20-1310), any one or more of which can constitute a concentrated region 20-1304 that can impact the resonation performance of materials within which carbon-based microstructures are incorporated. An agglomeration pattern and/or a series of agglomeration patterns may also impact the resonation performance of materials within which carbon-based microstructures are incorporated.

In various configurations, the carbon-based microstructures may be formed, at least in part, by graphene. In this context, graphene may refer to an allotrope of carbon in the form of a single layer of atoms in a two-dimensional hexagonal lattice in which one atom forms each vertex. Co-location and/or juxtaposition of multiple of such hexagonal lattices into more complex structures introduces further resonance effects. For example, juxtaposition 20-1302 of two sheets or platelets of graphene may resonate between themselves at a frequency that is dependent on the length, width, spacing, thickness, shape of the spacing, and/or other physical characteristics of the sheets or platelets and/or their relative juxtaposition to each other.

Table 20-1 depicts one possible chord of attenuations arising from the ensemble effect. As shown in the table, each of the structures has a different resonant frequency domain that corresponds to its scale designation.

TABLE 20-1

| Ensemble effect examples | | |
|---|---|---|
| **Structure** | **Scale Designation** | **Resonant Frequency Domain** |
| Printed Pattern (e.g., split ring resonator geometry) | Macro-scale | Lower GHz |
| Agglomeration pattern | Meso-scale | Higher GHz |
| Juxtaposition of graphene sheets or platelets | Micro-scale | Very high GHz |
| Molecule | Nano-scale | THz |

Any number of different split ring resonators can be printed onto a surface of a tire. Moreover, any number of different sizes of split ring resonators can be printed onto any of the surfaces of a tire. The choice of materials and/or the size and/or other structural or dimensional characteristics of a particular split ring resonator can be used to control the resonation frequency of that particular resonator split ring. A series of differently-sized split ring resonators can be printed such that the pattern corresponds to a digitally encoded value. Stimulating the series of differently-sized split ring resonators with via electromagnetic signal communication, for example, sweeping through a range from 8 GHz to 9 GHz or similar, and measuring the attenuation response through a range of the return may lead to a recognizable encoded serial number. Many different encoding schemes are possible, and as such, the non-limiting example of Table 20-2 is merely for illustration.

TABLE 20-2

| Example encoding scheme | Size (outer diameter) | | | | | | | |
|---|---|---|---|---|---|---|---|---|
| | 1 mm | 2 mm | 2.5 mm | 3 mm | 4 mm | 5 mm | 6 mm | 7 mm |
| Bit Assignment | 8 | 7 | 6 | 5 | 4 | 3 | 2 | 1 |
| Calibrated Attenuation Point (GHz) | 8.890 | 8.690 | 8.655 | 8.570 | 8.470 | 8.380 | 8.350 | 8.275 |
| Encoded 6E split ring resonator pattern | | Present | Present | | Present | Present | Present | |
| Encoded 6E bit pattern | 0 | 1 | 1 | 0 | 1 | 1 | 1 | 0 |
| Encoded 4E split ring resonator pattern | | Present | | | Present | Present | Present | |
| Encoded 4E bit pattern | 0 | 1 | 0 | 0 | 1 | 1 | 1 | 0 |
| Encoded E1 split ring resonator pattern | Present | Present | Present | | | | | Present |
| Encoded E1 bit pattern | 1 | 1 | 1 | 0 | 0 | 0 | 0 | 1 |

FIG. 20-14 is an example temperature sensor 20-1400 including one or more of the presently disclosed split ring resonators, in accordance with one embodiment. As an option, the example temperature sensor 20-1400 may be implemented in the context of any one or more of the embodiments set forth in any previous and/or subsequent figure(s) and/or description thereof. Of course, however, the example temperature sensor 20-1400 may be implemented in the context of any desired environment. Further, the aforementioned definitions may equally apply to the description below.

In one implementation, the example temperature sensor 20-1400 may include a section 20-1402 of a tire body (e.g., as shown in FIG. 20-9) with multiple tire plies. The example temperature sensor 20-1400 may detect a temperature 20-1408 of a tire ply, e.g., in which the example temperature sensor 20-1400 is incorporated. In one implementation, the tire sensor may include a ceramic material 20-1404 (e.g., organized as a matrix), and one or more split ring resonators 20-1406, such as shown in FIG. 20-8 and elsewhere in the present disclosure). Each of the one or more split ring resonators 20-1406 may have a natural resonance frequency (e.g., as shown in FIG. 20-16) that may shift in response to one or more of a change in an elastomeric property or a change in the temperature of the respective tire. An electrically-conductive layer 20-1410 may be dielectrically separated from a respective split ring resonator of the one or more split ring resonators 20-1406. In some implementations, the example temperature sensor 20-1400 may be produced and shipped without being incorporated in a tire, such that later incorporation within a tire and/or tire ply is possible.

In addition, or in an alternative embodiment, the example temperature sensor 20-1400 may be incorporated into a system (not shown in FIG. 20-14) configured to detect tire strain (e.g., as shown in FIG. 20-16) in a vehicle. The system may include an antennae (e.g., as discussed in the present disclosure relating to emission and/or propagation of electromagnetic signals) disposed on one or more of the vehicle or a vehicle component. The antennae may be configured to output an electromagnetic ping. The system may also include a tire having a body (e.g., as shown in FIG. 20-9) formed of one or more tire plies. Any one or more of the tire plies may include split-ring resonators (split ring resonators), e.g., as discussed in the present disclosure. In one implementation, each split ring resonator may have a natural resonance frequency configured to proportionately shift (e.g., as shown in FIG. 20-16) in response to a change in an elastomeric property of a respective one or more tire plies, e.g., reversible deformation, stress, and/or strain.

In some implementations, the described system may function to detect changes in physical properties of materials outside of configurations relating to tires and/or vehicles, e.g., automobiles and trucks. For example, the system may detect changes in surface temperature of an airplane wing and/or other type of airfoil, e.g., associated with spacecraft and/or the like. Also, the system may permit for instances where the one or more split ring resonators 20-1406 may be removably adhered onto patients in a hospital setting, such that body temperature readings of the respective patient may be obtained without the usage of conventional thermal sensors (e.g., relying on radiative heat transfer technology, etc.). In any of these examples, as well as others, such a system may detect a physical property associated with a surface.

In one implementation, the system may include a single antennae configured to output an electromagnetic ping and one or more flexible substrates. Each of the flexible substrates may include a first side including a plurality of split-ring resonators (split ring resonators) (e.g., such as the one or more split ring resonators 20-1406) disposed on the flexible substrate. Each split ring resonator may have a natural resonance frequency that may proportionately shift (e.g., as shown in FIG. 20-16) in response to a change in an elastomeric property of a respective one or more tire plies. The elastomeric property may include one or more of a reversible deformation, stress, strain, or temperature. In this way, the system may generate an absorption profile (e.g., referring to unique changes in absorption phenomena of the electromagnetic ping output by the antennae). The system may include a second side positioned opposite to the first side. The second side may attach to the surface. The single antenna may analyze data associated with the absorption profile and output a topography of the physical property.

FIG. 20-15 is a graph 20-1500 of measured resonant signature signal intensity (in decibels, dB) relative to height (in millimeters, mm) of tire tread layer loss, in accordance with one embodiment. As an option, the graph 20-1500 may be implemented in the context of any one or more of the embodiments set forth in any previous and/or subsequent figure(s) and/or description thereof. Of course, however, the graph 20-1500 may be implemented in the context of any desired environment. Further, the aforementioned definitions may equally apply to the description below.

As shown here, carbon-containing microstructures and/or microstructural materials can be incorporated into sensors or, in some configurations, entire layers of one or more tire treads at a given concentration level, or multiple dissimilar concentration levels (in each of the one or more tire tread layers) to achieve the unique deterioration profile shown. That is, the measure resonance signature (referring to the identifying "signature" of a particular tire tread layer in question) can be 'pinged', as so described herein, by one or more RF signals to demonstrate the attenuation of that emitted signal as shown.

A new tire tread layer can be configured to indicate a signal intensity (measured in decibels, dB) of approximately 0. That intensity can change proportionate to the extent of deterioration of that tire tread layer. For instance, a 2 mm height loss of a tire tread layer, presumedly the tire tread layer in contact with pavement, can correspond with the measure resonant signature signal intensity profile shown. A 'ping' signal at 6.7 GHz can be measured at an intensity level of about 9 dB, etc., and so on and so forth.

Accordingly, unique concentration levels, chemistries, dispersions, distributions and/or the like of the carbon-containing microstructures can be embedded (or, in some cases, placed on one or more surfaces of) tire tread layers to achieve a unique and readily identifiable measured resonant signature signal intensity as shown. A user of such a system can therefore immediately be notified to the exact extent and location of tire tread wear as it occurs during driving, rather than being restricted to observe the tires while the vehicle is in a stationary condition, a process that can be both time-consuming and cumbersome.

FIG. 20-16 is a graph 20-1600 of measured resonant signature signal intensity (in decibels, dB) relative to the natural resonance frequency of split ring resonators showing resonance response shift proportionate to tire ply deformation, in accordance with one embodiment. As an option, the graph 20-1600 may be implemented in the context of any one or more of the embodiments set forth in any previous and/or subsequent figure(s) and/or description thereof. Of course, however, the graph 20-1600 may be implemented in the context of any desired environment. Further, the aforementioned definitions may equally apply to the description below.

In one embodiment, the graph 20-1600 shows measured resonant signature signal intensity (in decibels, dB) against the natural resonance frequency of split-ring resonator(s) (split ring resonators) incorporated into tire treads and/or tire plies (e.g., as discussed in the present disclosure), in accordance with one embodiment. As shown here, carbon-containing and/or carbonaceous microstructures and/or microstructural materials can be incorporated into sensors or, in some configurations, entire layers of one or more tire treads at a given concentration level, or multiple dissimilar concentration levels (in each of the one or more tire tread layers) to achieve the unique deterioration profile shown. That is, the measure resonance signature (referring to the identifying "signature" of a particular tire tread layer in question) can be 'pinged', as so described herein, by one or more RF signals to demonstrate the shift of that emitted signal as shown, e.g., representative and/or proportionate to an extent of reversible tire deformation, e.g., stress and/or strain (as may be encountered in drifting scenarios). In this way, split ring resonator "response" signal behavior can be modeled as a function of tire deformation, e.g., strain (associated with drifting), allowing for a complete picture of tire condition and performance. Real-world scenarios resulting in lateral tire stiction loss may include drifting and/or hydroplaning, e.g., implying phenomena that occurs when a layer of water builds between the wheels of the vehicle and the road surface, leading to a loss of traction that prevents the vehicle from responding to control inputs. If hydroplaning occurs to all contact wheels simultaneously, the vehicle becomes, in effect, an uncontrolled sled. Usage of the presently disclosed split ring resonators and/or resonators in combination with antennae and/or signal processing equipment may effectively eliminate the need to rely on conventional hydroplaning detection techniques, e.g., through usage of a vibration detection unit coupled with surfaces of a tire which may deteriorate and become compromised through extended usage. In addition, FIG. 20-16 shows spectral response (in signal decibels) associated with lateral tire movement encountered during striction loss while drifting. In real-world scenarios, such as temporary stiction loss may be audibly heard through a high-pitched "screech," as opposed to other sounds heard during rapid forward rotation only. This type of periodic stiction loss (prior to the drifting vehicle regaining stiction and/or traction) may be exhibited (not shown in FIG. 20-16) as a periodic and/or cyclical shift in the natural resonance frequency of corresponding split ring resonators. Further yet, with respect to FIG. 20-16, "screech" type circumstances may be visually depicted by minor periodic and/or cyclical shifts in frequency of the various troughs and/or peaks of the curves.

As can be seen, the real-time multi-modality resonator supports methods for measuring stiction using resonant materials-containing sensors for elastomer property change detection. In one setting, one or more resonant materials-containing sensors for elastomer property change detection are disposed in a location proximal to a transducer. A stimulation signal may be emitted so as to excite the one or more resonant materials-containing sensors for elastomer property change detection. The emissions comprise electromagnetic energy that spans a known frequency range. A calibration signal is captured under a known stiction condition. After receiving return signals that comprise, at least in part, frequencies that are responsive to the stimulation signal, various signal processing techniques are applied to the return signal. For example, various signal processing techniques are applied to the return signal to compare with respect to the stimulation signal. Wherever frequencies and/or amplitude of the return signal differs from the calibration signal, a corresponding interfacial indirect permittivity (e.g., at the interface between a tire and the driving surface) is calculated. Absolute and/or relative values of the interfacial indirect permittivity are correlated to a stictional value (e.g., using a calibration table). Changes in the stictional value over time are in turn correlated to road and/or tire conditions.

The static and/or dynamic values that make up the aforementioned calibration signal and/or calibration table can be based at least in part on analysis of the stimulation signal, and/or analysis of an environment proximal to the transducer. Moreover, the aforementioned calibration signal and/or calibration table can encompass permittivity calibration signals, permeability calibration signals, temperature calibration signals, vibration calibration signals, doping calibration signals, etc. In one implementation, calibration procedures may be performed under known and/or controlled environmental conditions, e.g., dry pavement and in clear weather, to generate baseline data at various forward-facing angular velocities (such that the test vehicle is only moving directly forward with no lateral skidding and/or sliding movement). This baseline data then serves as one or more calibration curves from which deformation values may be subsequently compared and/or calculated. In this way, clear performance changes may be observed relative to the initial unstretched (baseline) calibration curve, e.g., as shown in FIG. 20-16.

Whenever and wherever the return signal differs from the calibration signal further analysis of the return signal with respect to the stimulation signal can serve to identify which of the frequencies of the return signal are different than the calibration signal. The differences can be observed/measured as an attenuation of a frequency or frequencies with respect to the calibration signal. Additionally, or alternatively, the differences can be observed/measured as a frequency shift (as shown in FIG. 20-16 relative to data corresponding stretched at 0.5%, etc.) of peaks with respect to peaks of the calibration signal.

FIG. 20-17 is a graph 20-1700 of signal intensity relative to chirp signal frequency for split ring resonators that may resonate corresponding to an encoded serial number, in accordance with one embodiment. As an option, the graph 20-1700 may be implemented in the context of any one or more of the embodiments set forth in any previous and/or subsequent figure(s) and/or description thereof. Of course, however, the graph 20-1700 may be implemented in the context of any desired environment. Further, the aforementioned definitions may equally apply to the description below.

In one embodiment, the graph 20-1700 shows use of split ring resonant structures that are configured to resonate in a manner that corresponds to an encoded serial number. Such a pattern of split ring resonant structures can be printed on tires or other elastomers. As shown, the encoded serial number "E1" is shown by the presence of split ring resonators of four different sizes. The graph 20-1700 shows EM stimulus in a range of about 8 GHz to about 9 GHz, whereas the response is shown as attenuation in a range from about −8 dB to about −18 dB. Stimulating the series of different sized split ring resonators with via electromagnetic signal communication across the range and measuring the S-parameters of the return across the range, leads to convenient and reliable identification of that particular printed pattern. It follows then that, if a unique pattern is printed onto each one of a run of tires, and if the pattern is associated with an encoded serial number, then a determination of the specific tire can be made based on the pattern's response to the EM interrogation.

More specifically, if a unique pattern is printed onto each one of a run of tires, and if the pattern is associated with an encoded serial number, then a determination of the specific tire can be made based on measured S-parameters (e.g., S-parameter ratios that correspond to attenuation) in response to EM interrogation over an EM stimulus in a range corresponding to the encoding scheme. In the example of FIG. 20-17, the attenuations fall in a range from about −8 dB to about −18 dB however, in other measurements the attenuations fall in a range of about −1 dB to about −9 dB. In other measurements the attenuations fall in a range of about −10 dB to about −19 dB. In other measurements the attenuations fall in a range of about −20 dB to about −35 dB. In empirical experimentation, the attenuations are substantially independent of the number of differently-configured resonators that are proximally collocated on a tire surface. More particularly, in some experimentation, the attenuations may be particularly pronounced when the resonators are proximally collocated on a tire surface that may be on the tread-side of a steel belt (e.g., in a steel belted radial tire).

The foregoing encoding and printing techniques can be used in tires and other elastomer-containing components. In some cases, printing the resonators is carried out at relatively high temperatures and/or with chemical agents (e.g., catalysts) such that chemical bonds are formed between the carbon atoms of the resonators and the elastomers. The chemical bonds that are formed between the carbon atoms of the resonators and the elastomers contribute to ensemble effect, and as such, calibration curves may be taken to account for the type and extent of the aforementioned chemical bonds.

The elastomer may contain any one or more types of rubber. Isoprene, for example, is a common rubber formulation. Isoprene has its own single C—C bonds and double bonds between the other molecular elements in the ligands. Additional double carbon bonds formed by the high-temperature printing of the split ring resonators has the effect of increased conductivity, which effect can be exploited to form larger, lower frequency resonators. Additionally, or alternatively, agglomerations can be tuned into specific sizes, which would give rise to overtones that contribute to the ensemble effect, which in turn results in very high sensitivity given EM interrogation in a tuned range. In some cases, the response of the materials to EM interrogation is sufficiently discernable such that the age or other aspect of the elastomer's health can be determined (e.g., by comparison to one or more calibration curves).

More specifically, as elastomers age, the molecular spacing changes and coupling and/or percolation of energy decreases correspondingly, thus shifting the response frequencies as the conductive localities become more and more isolated with respect to adjacent localities. In some cases, attenuation and/or return signal strength will change at specific frequencies. Such changes can be determined over time, and the changes can be used to construct calibration curves.

The design of tires supports many possible locations for printing of the split ring resonators. As examples, split ring resonators can be located on any inner surface of a tire, including but not limited to the cap ply, and/or on or near the steel belts (e.g., on the tread side of a steel belt), and/or on or near a radial ply, and/or on the sidewall, and/or on the bead chafers, and/or on the beads, etc.

Use of the split ring resonator techniques are not limited to only tires. The techniques can be applied to any elastomer-containing components such belts and hoses. Moreover, the use of the split ring resonator techniques is not limited to only vehicles. That is, since consumables exist in organic powertrain and/or drive train components in a wide range of motive devices (e.g., in industrial mechanical systems), the split ring resonator techniques can be applied to such consumables as well. Some aspects of wear phenomena are a consequence of friction, heat, heat cycling and corrosion, any of which can result in and/or accelerate changes in the molecular structure of the materials. Changes in the molecular structure of the materials is detectable under EM interrogation. More specifically, by calculating a frequency shift, a particular sample's response (e.g., an aged sample's response) under a particular EM interrogation regime with respect to a calibration curve, the age or health of the material can be assessed based on the magnitude of the frequency shift.

FIGS. 20-18A through 20-18Y depict carbonaceous materials used as a formative material to produce any of the presently disclosed resonators (e.g., split ring resonators), in accordance with one embodiment. As an option, FIGS. 20-18A through 20-18Y may be implemented in the context of any one or more of the embodiments set forth in any previous and/or subsequent figure(s) and/or description thereof. Of course, however, FIGS. 20-18A through 20-18Y may be implemented in the context of any desired environment. Further, the aforementioned definitions may equally apply to the description below.

As shown, FIG. 20-18A through FIG. 20-18Y depict carbon-based materials, growths, agglomerates, aggregates, sheets, particles and/or the like, such as those self-nucleated in-flight in a reaction chamber or reactor from a carbon-containing gaseous species such as methane ($CH_4$), as disclosed by Stowell, et al., in U.S. patent application Ser. No. 16/785,020 entitled "3D Self-Assembled Multi-Modal Carbon-Based Particle" filed on Feb. 7, 2020, the contents of which are hereby incorporated by reference for all purposes.

The shown carbon-based nanoparticles and aggregates can be characterized by a high degree of "uniformity" (such as a high mass fraction of desired carbon allotropes), a high degree of "order" (such as a low concentration of defects), and/or a high degree of "purity" (such as a low concentration of elemental impurities), in contrast to the lower uniformity, less ordered, and lower purity particles achievable with conventional systems and methods.

The nanoparticles produced using the methods described herein can contain multi-walled spherical fullerenes (MWSFs) or connected MWSFs and have a high uniformity (such as, a ratio of graphene to MWSF from 20% to 80%), a high degree of order (such as, a Raman signature with an Ip/IG ratio from 0.95 to 1.05), and a high degree of purity (such as, the ratio of carbon to other elements (other than hydrogen) is greater than 99.9%). The nanoparticles produced using the methods described herein contain MWSFs or connected MWSFs, and the MWSFs do not contain a core composed of impurity elements other than carbon. The particles produced using the methods described herein can be aggregates containing the nanoparticles described above with large diameters (such as greater than 10 μm).

Conventional methods have been used to produce particles containing multi-walled spherical fullerenes with a high degree of order but can lead to end products with a variety of shortcomings. For example, high temperature synthesis techniques lead to particles with a mixture of many carbon allotropes and therefore low uniformity (such as less than 20% fullerenes relative to other carbon allotropes) and/or small particle sizes (such as less than 1 μm, or less than 100 nm in some cases). Methods using catalysts can lead to products that include the catalyst elements and therefore have relatively lower purity (referring to less than 95% carbon to other elements) as well. These undesirable properties also often lead to undesirable electrical properties of the resulting carbon particles (such as, electrical conductivity of less than 1,000 S/m).

The carbon nanoparticles and aggregates described herein can be characterized by Raman spectroscopy that is indicative of the high degree of order and uniformity of structure. The uniform ordered and/or pure carbon nanoparticles and aggregates described herein can be produced using relatively high speed, low cost improved thermal reactors and methods, as described below.

The term "graphene", as both commonly understood and as referred to herein, implies an allotrope of carbon in the form of a two-dimensional, atomic-scale, hexagonal lattice in which one atom forms each vertex. The carbon atoms in graphene are $sp^2$-bonded. Additionally, graphene has a Raman spectrum with two main peaks: a G-mode at approximately 1580 $cm^{-1}$ and a D-mode at approximately 1350 $cm^{-1}$ (when using a 532 nm excitation laser).

The term "fullerene", as both commonly understood and as referred to herein, implies a molecule of carbon in the form of a hollow sphere, ellipsoid, tube, or other shapes. Spherical fullerenes can also be referred to as Buckminsterfullerenes, or buckyballs. Cylindrical fullerenes can also be referred to as carbon nanotubes. Fullerenes are similar in structure to graphite, which is composed of stacked graphene sheets of linked hexagonal rings. Fullerenes may also contain pentagonal (or sometimes heptagonal) rings.

The term "multi-walled fullerene", as both commonly understood and as referred to herein, implies fullerenes with multiple concentric layers. For example, multi-walled nanotubes (MWNTs) contain multiple rolled layers (concentric tubes) of graphene. Multi-walled spherical fullerenes (MWSFs) contain multiple concentric spheres of fullerenes.

The term "nanoparticle", as both commonly understood and as referred to herein, implies a particle that measures from 1 nm to 989 nm. The nanoparticle can include one or more structural characteristics (such as, crystal structure, defect concentration, etc.), and one or more types of atoms. The nanoparticle can be any shape, including but not limited to spherical shapes, spheroidal shapes, dumbbell shapes, cylindrical shapes, elongated cylindrical type shapes, rect-angular and/or prism shapes, disk shapes, wire shapes, irregular shapes, dense shapes (such as, with few voids), porous shapes (such as, with many voids), etc.

The term "aggregate", as both commonly understood and as referred to herein, implies a plurality of nanoparticles that are connected together by Van der Waals forces, by covalent bonds, by ionic bonds, by metallic bonds, or by other physical or chemical interactions. Aggregates can vary in size considerably, but in general are larger than about 500 nm.

A carbon nanoparticle can include two (2) or more connected multi-walled spherical fullerenes (MWSFs) and layers of graphene coating the connected MWSFs and can be formed to be independent of a core composed of impurity elements other than carbon. A carbon nanoparticle, as described herein, can include two (2) or more connected multi-walled spherical fullerenes (MWSFs) and layers of graphene coating the connected MWSFs. In such a configu-ration, where the MWSFs do not contain a void (referring to a space with no carbon atoms greater than approximately 0.5 nm or greater than approximately 1 nm) at the center. The connected MWSFs can be formed of concentric, well-ordered spheres of $sp^2$-hybridized carbon atoms (which is in favorable contrast to conventional spheres of haphazardly-ordered, non-uniform, amorphous carbon particles, which can otherwise fail to achieve any one or more of the unexpected and favorable properties disclosed herein).

The nanoparticles containing the connected MWSFs have an average diameter in a range from 5 to 500 nm, or from 5 to 250 nm, or from 5 to 100 nm, or from 5 to 50 nm, or from 10 to 500 nm, or from 10 to 250 nm, or from 10 to 100 nm, or from 10 to 50 nm, or from 40 to 500 nm, or from 40 to 250 nm, or from 40 to 100 nm, or from 50 to 500 nm, or from 50 to 250 nm, or from 50 to 100 nm.

The carbon nanoparticles described herein form aggre-gates, wherein many nanoparticles aggregate together to form a larger unit. A carbon aggregate can a plurality of carbon nanoparticles. A diameter across the carbon aggre-gate can be a range from 10 to 500 μm, or from 50 to 500 μm, or from 100 to 500 μm, or from 250 to 500 μm, or from 10 to 250 μm, or from 10 to 100 μm, or from 10 to 50 μm. The aggregate can be formed from a plurality of carbon nanoparticles, as defined above. Aggregates can contain connected MWSFs, such as those with a high uniformity metric (such as a ratio of graphene to MWSF from 20% to 80%), a high degree of order (such as a Raman signature with an Ip/IG ratio from 0.95 to 1.05), and a high degree of purity (such as greater than 99.9% carbon).

Aggregates of carbon nanoparticles, referring primarily to those with diameters in the ranges described above, espe-cially particles greater than 10 μm, are generally easier to collect than particles or aggregates of particles that are smaller than 500 nm. The ease of collection reduces the cost of manufacturing equipment used in the production of the carbon nanoparticles and increases the yield of the carbon nanoparticles. Particles greater than 10 μm in size also pose fewer safety concerns compared to the risks of handling smaller nanoparticles, such as, potential health and safety risks due to inhalation of the smaller nanoparticles. The lower health and safety risks, thus, further reduce the manufacturing cost.

A carbon nanoparticle, in reference to that disclosed herein, can have a ratio of graphene to MWSFs from 10% to 90%, or from 10% to 80%, or from 10% to 60%, or from 10% to 40%, or from 10% to 20%, or from 20% to 40%, or from 20% to 90%, or from 40% to 90%, or from 60% to 90%, or from 80% to 90%. A carbon aggregate has a ratio of graphene to MWSFs is from 10% to 90%, or from 10% to 80%, or from 10% to 60%, or from 10% to 40%, or from 10% to 20%, or from 20% to 40%, or from 20% to 90%, or from 40% to 90%, or from 60% to 90%, or from 80% to 90%. A carbon nanoparticle has a ratio of graphene to connected MWSFs from 10% to 90%, or from 10% to 80%, or from 10% to 60%, or from 10% to 40%, or from 10% to 20%, or from 20% to 40%, or from 20% to 90%, or from 40% to 90%, or from 60% to 90%, or from 80% to 90%. A carbon aggregate has a ratio of graphene to connected MWSFs is from 10% to 90%, or from 10% to 80%, or from 10% to 60%, or from 10% to 40%, or from 10% to 20%, or from 20% to 40%, or from 20% to 90%, or from 40% to 90%, or from 60% to 90%, or from 80% to 90%.

Raman spectroscopy can be used to characterize carbon allotropes to distinguish their molecular structures. For example, graphene can be characterized using Raman spec-troscopy to determine information such as order/disorder, edge and grain boundaries, thickness, number of layers, doping, strain, and thermal conductivity. MWSFs have also been characterized using Raman spectroscopy to determine the degree of order of the MWSFs.

Raman spectroscopy is used to characterize the structure of MWSFs or connected MWSFs used in reference to that incorporated within the various tire-related plies of tires as discussed herein. The main peaks in the Raman spectra are the G-mode and the D-mode. The G-mode is attributed to the vibration of carbon atoms in $sp^2$-hybridized carbon net-works, and the D-mode is related to the breathing of hexagonal carbon rings with defects. In some circumstances, defects may be present, yet may not be detectable in the Raman spectra. For example, if the presented crystalline structure is orthogonal with respect to the basal plane, the D-peak will show an increase. Alternatively, if presented with a perfectly planar surface that is parallel with respect to the basal plane, the D-peak will be zero.

When using 532 nm incident light, the Raman G-mode is typically at 1582 $cm^{-1}$ for planar graphite, however, can be downshifted for MWSFs or connected MWSFs (such as, down to 1565 $cm^{-1}$ or down to 1580 $cm^{-1}$). The D-mode is observed at approximately 1350 $cm^{-1}$ in the Raman spectra of MWSFs or connected MWSFs. The ratio of the intensities of the D-mode peak to G-mode peak (such as, the ID/IG) is related to the degree of order of the MWSFs, where a lower ID/IG indicates a higher degree of order. An ID/IG near or below 1 indicates a relatively high degree of order, and an ID/IG greater than 1.1 indicates a lower degree of order.

A carbon nanoparticle or a carbon aggregate containing MWSFs or connected MWSFs, as described herein, can have and/or demonstrate a Raman spectrum with a first Raman peak at about 1350 $cm^{-1}$ and a second Raman peak at about 1580 $cm^{-1}$ when using 532 nm incident light. The ratio of an intensity of the first Raman peak to an intensity of the second Raman peak (such as, the ID/IG) for the nanoparticles or the aggregates described herein can be in a range from 0.95 to 1.05, or from 0.9 to 1.1, or from 0.8 to 1.2, or from 0.9 to 1.2, or from 0.8 to 1.1, or from 0.5 to 1.5, or less than 1.5, or less than 1.2, or less than 1.1, or less than 1, or less than 0.95, or less than 0.9, or less than 0.8.

A carbon aggregate containing MWSFs or connected MWSFs, as defined above, has a high purity. The carbon aggregate containing MWSFs or connected MWSFs has a ratio of carbon to metals of greater than 99.99%, or greater than 99.95%, or greater than 99.9%, or greater than 99.8%, or greater than 99.5%, or greater than 99%. The carbon aggregate has a ratio of carbon to other elements of greater than 99.99%, or greater than 99.95%, or greater than 99.9%, or greater than 99.5%, or greater than 99%, or greater than 90%, or greater than 80%, or greater than 70%, or greater than 60%. The carbon aggregate has a ratio of carbon to other elements (except for hydrogen) of greater than 99.99%, or greater than 99.95%, or greater than 99.9%, or greater than 99.8%, or greater than 99.5%, or greater than 99%, or greater than 90%, or greater than 80%, or greater than 70%, or greater than 60%.

A carbon aggregate containing MWSFs or connected MWSFs, as defined above, has a high specific surface area. The carbon aggregate has a Brunauer, Emmett and Teller (BET) specific surface area from 10 to 200 $m^2$/g, or from 10 to 100 $m^2$/g, or from 10 to 50 $m^2$/g, or from 50 to 200 $m^2$/g, or from 50 to 100 $m^2$/g, or from 10 to 1000 $m^2$/g.

A carbon aggregate containing MWSFs or connected MWSFs, as defined above, has a high electrical conductivity. A carbon aggregate containing MWSFs or connected MWSFs, as defined above, is compressed into a pellet and the pellet has an electrical conductivity greater than 500 S/m, or greater than 1,000 S/m, or greater than 2,000 S/m, or greater than 3,000 S/m, or greater than 4,000 S/m, or greater than 5,000 S/m, or greater than 10,000 S/m, or greater than 20,000 S/m, or greater than 30,000 S/m, or greater than 40,000 S/m, or greater than 50,000 S/m, or greater than 60,000 S/m, or greater than 70,000 S/m, or from 500 S/m to 100,000 S/m, or from 500 S/m to 1,000 S/m, or from 500 S/m to 10,000 S/m, or from 500 S/m to 20,000 S/m, or from 500 S/m to 100,000 S/m, or from 1000 S/m to 10,000 S/m, or from 1,000 S/m to 20,000 S/m, or from 10,000 to 100,000 S/m, or from 10,000 S/m to 80,000 S/m, or from 500 S/m to 10,000 S/m. In some cases, the density of the pellet is approximately 1 $g/cm^3$, or approximately 1.2 $g/cm^3$, or approximately 1.5 $g/cm^3$, or approximately 2 $g/cm^3$, or approximately 2.2 $g/cm^3$, or approximately 2.5 $g/cm^3$, or approximately 3 $g/cm^3$. Additionally, tests have been performed in which compressed pellets of the carbon aggregate materials have been formed with compressions of 2,000 psi and 12,000 psi and with annealing temperatures of 800° C. and 1,000° C. The higher compression and/or the higher annealing temperatures generally result in pellets with a higher degree of electrical conductivity, including in the range of 12,410.0 S/m to 13,173.3 S/m.

The carbon nanoparticles and aggregates described herein can be produced using thermal reactors and methods. Further details pertaining to thermal reactors and/or methods of use can be found in U.S. Pat. No. 9,862,602, issued Jan. 9, 2018, entitled "CRACKING OF A PROCESS GAS", which is hereby incorporated by reference in its entirety for all purposes. Additionally, carbon-containing and/or hydrocarbon precursors (referring to at least methane, ethane, propane, butane, and natural gas) can be used with the thermal reactors to produce the carbon nanoparticles and the carbon aggregates described herein.

The carbon nanoparticles and aggregates described herein are produced using the thermal reactors with gas flow rates from 1 slm to 10 slm, or from 0.1 slm to 20 slm, or from 1 slm to 5 slm, or from 5 slm to 10 slm, or greater than 1 slm, or greater than 5 slm. The carbon nanoparticles and aggregates described herein are produced using the thermal reactors with gas resonance times from 0.1 seconds (s) to 30 s, or from 0.1 s to 10 s, or from 1 s to 10 s, or from 1 s to 5 s, from 5 s to 10 s, or greater than 0.1 seconds, or greater than 1 s, or greater than 5 s, or less than 30 s.

The carbon nanoparticles and aggregates described herein can be produced using the thermal reactors with production rates from 10 g/hr to 200 g/hr, or from 30 g/hr to 200 g/hr, or from 30 g/hr to 100 g/hr, or from 30 g/hr to 60 g/hr, or from 10 g/hr to 100 g/hr, or greater than 10 g/hr, or greater than 30 g/hr, or greater than 100 g/hr.

Thermal reactors (or other cracking apparatuses) and thermal reactor methods (or other cracking methods) can be used for refining, pyrolizing, dissociating or cracking feedstock process gases into its constituents to produce the carbon nanoparticles and the carbon aggregates described herein, as well as other solid and/or gaseous products (such as, hydrogen gas and/or lower order hydrocarbon gases). The feedstock process gases generally include, for example, hydrogen gas ($H^2$), carbon dioxide ($CO^2$), $C^1$ to $C^{10}$ hydrocarbons, aromatic hydrocarbons, and/or other hydrocarbon gases such as natural gas, methane, ethane, propane, butane, isobutane, saturated/unsaturated hydrocarbon gases, ethene, propene, etc., and mixtures thereof. The carbon nanoparticles and the carbon aggregates can include, for example, multi-walled spherical fullerenes (MWSFs), connected MWSFs, carbon nanospheres, graphene, graphite, highly ordered pyrolytic graphite, single-walled nanotubes, multi-walled nanotubes, other solid carbon products, and/or the carbon nanoparticles and the carbon aggregates described herein.

Methods for producing the carbon nanoparticles and the carbon aggregates described herein can include thermal cracking methods that use, for example, an elongated longitudinal heating element optionally enclosed within an elongated casing, housing, or body of a thermal cracking apparatus. The body can include, for example, one or more tubes or other appropriate enclosures made of stainless steel, titanium, graphite, quartz, or the like. The body of the thermal cracking apparatus is generally cylindrical in shape with a central elongate longitudinal axis arranged vertically and a feedstock process gas inlet at or near a top of the body. The feedstock process gas can flow longitudinally down through the body or a portion thereof. In the vertical configuration, both gas flow and gravity assist in the removal of the solid products from the body of the thermal cracking apparatus.

The heating element can include any one or more of a heating lamp, one or more resistive wires or filaments, metal filaments, metallic strips, or rods, and/or other appropriate thermal radical generators or elements that can be heated to a specific temperature (such a, a molecular cracking temperature) sufficient to thermally crack molecules of the feedstock process gas. The heating element can be disposed, located, or arranged to extend centrally within the body of the thermal cracking apparatus along the central longitudinal axis thereof. In configurations having only one heating element can include it placed at or concentric with the central longitudinal axis; alternatively, for configurations having multiple heating elements can include them spaced or offset generally symmetrically or concentrically at locations near and around and parallel to the central longitudinal axis.

Thermal cracking to produce the carbon nanoparticles and aggregates described herein can be achieved by flowing the feedstock process gas over, or in contact with, or within the vicinity of, the heating element within a longitudinal elongated reaction zone generated by heat from the heating element and defined by and contained inside the body of the thermal cracking apparatus to heat the feedstock process gas to or at a specific molecular cracking temperature.

The reaction zone can be considered to be the region surrounding the heating element and close enough to the heating element for the feedstock process gas to receive sufficient heat to thermally crack the molecules thereof. The reaction zone is thus generally axially aligned or concentric with the central longitudinal axis of the body. The thermal cracking is performed under a specific pressure. The feedstock process gas is circulated around or across the outside surface of a container of the reaction zone or a heating chamber to cool the container or chamber and preheat the feedstock process gas before flowing the feedstock process gas into the reaction zone.

The carbon nanoparticles and aggregates described herein and/or hydrogen gas are produced without the use of catalysts. Accordingly, the process can be entirely catalyst free.

Disclosed methods and systems can advantageously be rapidly scaled up or scaled down for different production levels as may be desired, such as being scalable to provide a standalone hydrogen and/or carbon nanoparticle producing station, a hydrocarbon source, or a fuel cell station, to provide higher capacity systems, such as, for a refinery and/or the like.

A thermal cracking apparatus for cracking a feedstock process gas to produce the carbon nanoparticles and aggregates described herein include a body, a feedstock process gas inlet, and an elongated heating element. The body has an inner volume with a longitudinal axis. The inner volume has a reaction zone concentric with the longitudinal axis. A feedstock process gas can be flowed into the inner volume through the feedstock process gas inlet during thermal cracking operations. The elongated heating element can be disposed within the inner volume along the longitudinal axis and is surrounded by the reaction zone. During the thermal cracking operations, the elongated heating element is heated by electrical power to a molecular cracking temperature to generate the reaction zone, the feedstock process gas is heated by heat from the elongated heating element, and the heat thermally cracks molecules of the feedstock process gas that are within the reaction zone into constituents of the molecules.

A method for cracking a feedstock process gas to produce the carbon nanoparticles and aggregates described herein can include at least any one or more of the following: (1) providing a thermal cracking apparatus having an inner volume that has a longitudinal axis and an elongated heating element disposed within the inner volume along the longitudinal axis: (2) heating the elongated heating element by electrical power to a molecular cracking temperature to generate a longitudinal elongated reaction zone within the inner volume: (3) flowing a feedstock process gas into the inner volume and through the longitudinal elongated reaction zone (such as, wherein the feedstock process gas is heated by heat from the elongated heating element); and (4) thermally cracking molecules of the feedstock process gas within the longitudinal elongated reaction zone into constituents thereof (such as, hydrogen gas and one or more solid products) as the feedstock process gas flows through the longitudinal elongated reaction zone.

The feedstock process gas used to produce the carbon nanoparticles and aggregates described herein can include a hydrocarbon gas. The results of cracking can, in turn, further include hydrogen in gaseous form (such as, $H_2$) and various forms of the carbon nanoparticles and aggregates described herein. The carbon nanoparticles and aggregates include two or more MWSFs and layers of graphene coating the MWSFs, and/or connected MWSFs and layers of graphene coating the connected MWSFs. The feedstock process gas is preheated (such as, to 100° C. to 500° C.) by flowing the feedstock process gas through a gas preheating region between a heating chamber and a shell of the thermal cracking apparatus before flowing the feedstock process gas into the inner volume. A gas having nanoparticles therein is flowed into the inner volume and through the longitudinal elongated reaction zone to mix with the feedstock process gas, to form a coating of a solid product (such as, layers of graphene) around the nanoparticles.

The carbon nanoparticles and aggregates containing multi-walled spherical fullerenes (MWSFs) or connected MWSFs described herein can be produced and collected without requiring the completion of any post-processing treatments or operations. Alternatively, some post-processing can be performed on one or more of the presently disclosed MWSFs. Some examples of post-processing involved in making and using resonant materials include mechanical processing such as ball milling, grinding, attrition milling, micro fluidizing, and other techniques to reduce the particle size without damaging the MWSFs. Some further examples of post-processing include exfoliation processes (referring to the complete separation of layers of carbon-containing material, such as the creation or extraction of layers of graphene from graphite, etc.) including sheer mixing, chemical etching, oxidizing (such as the Hummer method), thermal annealing, doping by adding elements during annealing (such as sulfur and/or nitrogen), steaming, filtering, and lyophilization, among others. Some examples of post-processing include sintering processes such as spark plasma sintering (SPS), direct current sintering, microwave sintering, and ultraviolet (UV) sintering, which can be conducted at high pressure and temperature in an inert gas. Multiple post-processing methods can be used together or in a series. The post-processing produces functionalized carbon nanoparticles or aggregates containing multi-walled spherical fullerenes (MWSFs) or connected MWSFs.

Materials can be mixed together in different combinations, quantities and/or ratios. Different carbon nanoparticles and aggregates containing MWSFs or connected MWSFs described herein can be mixed together prior to one or more post-processing operations, if any at all. For example, different carbon nanoparticles and aggregates containing MWSFs or connected MWSFs with different properties (such as, different sizes, different compositions, different purities, from different processing runs, etc.) can be mixed together. The carbon nanoparticles and aggregates containing MWSFs or connected MWSFs described herein can be mixed with graphene to change the ratio of the connected MWSFs to graphene in the mixture. Different carbon nanoparticles and aggregates containing MWSFs or connected MWSFs described herein can be mixed together after post-processing. Different carbon nanoparticles and aggregates containing MWSFs or connected MWSFs with different properties and/or different post-processing methods (such as, different sizes, different compositions, different functionality, different surface properties, different surface areas) can be mixed together in any quantity, ratio and/or combination.

The carbon nanoparticles and aggregates described herein are produced and collected, and subsequently processed by mechanical grinding, milling, and/or exfoliating. The processing (such as, by mechanical grinding, milling, exfoliating, etc.) can reduce the average size of the particles. The processing (such as, by mechanical grinding, milling, exfoliating, etc.) increases the average surface area of the particles. The processing by mechanical grinding, milling and/or exfoliation shears off some fraction of the carbon layers, producing sheets of graphite mixed with the carbon nanoparticles.

The mechanical grinding or milling is performed using a ball mill, a planetary mill, a rod mill, a shear mixer, a high-shear granulator, an autogenous mill, or other types of machining used to break solid materials into smaller pieces by grinding, crushing, or cutting. The mechanical grinding, milling and/or exfoliating is performed wet or dry. The mechanical grinding is performed by grinding for some period of time, then idling for some period of time, and repeating the grinding and idling for a number of cycles. The grinding period is from 1 minute (min) to 20 mins, or from 1 min to 10 mins, or from 3 mins to 8 mins, or approximately 3 mins, or approximately 8 mins. The idling period is from 1 min to 10 mins, or approximately 5 mins, or approximately 6 mins. The number of grinding and idling cycles is from 1 min to 100 mins, or from 5 mins to 100 mins, or from 10 mins to 100 mins, or from 5 mins to 10 mins, or from 5 mins to 20 mins. The total amount of time of grinding and idling is from 10 mins to 1,200 mins, or from 10 mins to 600 mins, or from 10 mins to 240 mins, or from 10 mins to 120 mins, or from 100 mins to 90 mins, or from 10 mins to 60 mins, or approximately 90 mins, or approximately mins minutes.

The grinding steps in the cycle are performed by rotating a mill in one direction for a first cycle (such as, clockwise), and then rotating a mill in the opposite direction (such as, counterclockwise) for the next cycle. The mechanical grinding or milling is performed using a ball mill, and the grinding steps are performed using a rotation speed from 100 to 1000 rpm, or from 100 to 500 rpm, or approximately 400 rpm. The mechanical grinding or milling is performed using a ball mill that uses a milling media with a diameter from 0.1 mm to 20 mm, or from 0.1 mm to 10 mm, or from 1 mm to 10 mm, or approximately 0.1 mm, or approximately 1 mm, or approximately 10 mm. The mechanical grinding or milling is performed using a ball mill that uses a milling media composed of metal such as steel, an oxide such as zirconium oxide (zirconia), yttria stabilized zirconium oxide, silica, alumina, magnesium oxide, or other hard materials such as silicon carbide or tungsten carbide.

The carbon nanoparticles and aggregates described herein are produced and collected, and subsequently processed using elevated temperatures such as thermal annealing or sintering. The processing using elevated temperatures is done in an inert environment such as nitrogen or argon. The processing using elevated temperatures is done at atmospheric pressure, or under vacuum, or at low pressure. The processing using elevated temperatures is done at a temperature from 500° C. to 2,500° C., or from 500° C. to 1,500° C., or from 800° C. to 1,500° C., or from 800° C. to 1,200° C., or from 800° C. to 1,000° C., or from 2,000° C. to 2,400° C., or approximately 8,00° C., or approximately 1,000° C., or approximately 1,500° C., or approximately 2,000° C., or approximately 2.400° C.

The carbon nanoparticles and aggregates described herein are produced and collected, and subsequently, in post processing operations, additional elements or compounds are added to the carbon nanoparticles, thereby incorporating the unique properties of the carbon nanoparticles and aggregates into other mixtures of materials.

Either before or after post-processing, the carbon nanoparticles and aggregates described herein are added to solids, liquids or slurries of other elements or compounds to form additional mixtures of materials incorporating the unique properties of the carbon nanoparticles and aggregates. The carbon nanoparticles and aggregates described herein are mixed with other solid particles, polymers, or other materials.

Either before or after post-processing, the carbon nanoparticles and aggregates described herein are used in various applications beyond applications pertaining to making and using resonant materials. Such applications including but not limited to transportation applications (such as, automobile and truck tires, couplings, mounts, elastomeric "o"-rings, hoses, sealants, grommets, etc.) and industrial applications (such as, rubber additives, functionalized additives for polymeric materials, additives for epoxies, etc.).

FIGS. 20-18A and 20-18B show transmission electron microscope (TEM) images of as-synthesized carbon nanoparticles. The carbon nanoparticles of FIG. 20-18A (at a first magnification) and FIG. 20-18B (at a second magnification) contain connected multi-walled spherical fullerenes (MWSFs) with graphene layers that coat the connected MWSFs. The ratio of MWSF to graphene allotropes in this example is approximately 80% due to the relatively short resonance times. The MWSFs in FIG. 20-18B are approximately 5 nm to 10 nm in diameter, and the diameter can be from 5 nm to 500 nm using the conditions described above. The average diameter across the MWSFs is in a range from 5 nm to 500 nm, or from 5 nm to 250 nm, or from 5 nm to 100 nm, or from 5 nm to 50 nm, or from 10 nm to 500 nm, or from 10 nm to 250 nm, or from 10 nm to 100 nm, or from 10 nm to 50 nm, or from 40 nm to 500 nm, or from 40 nm to 250 nm, or from 40 nm to 100 nm, or from 50 nm to 500 nm, or from 50 nm to 250 nm, or from 50 nm to 100 nm. No catalyst was used in this process, and therefore, there is no central seed containing contaminants. The aggregate particles produced in this example had a particle size of approximately 10 μm to 100 μm, or approximately 10 μm to 500 μm.

FIG. 20-18C shows the Raman spectrum of the as-synthesized aggregates in this example taken with 532 nm incident light. The ID/IG for the aggregates produced in this example is from approximately 0.99 to 1.03, indicating that the aggregates were composed of carbon allotropes with a high degree of order.

FIG. 20-18D and FIG. 20-18E show example TEM images of the carbon nanoparticles after size reduction by grinding in a ball mill. The ball milling was performed in cycles with a 3-minute (min) counter-clockwise grinding operation, followed by a 6 min idle operation, followed by a 3-min clockwise grinding operation, followed by a 6-min idle operation. The grinding operations were performed using a rotation speed of 400 rpm. The milling media was zirconia and ranged in size from 0.1 mm to 10 mm. The total size reduction processing time was from 60 mins to 120 mins. After size reduction, the aggregate particles produced in this example had a particle size of approximately 1 μm to 5 μm. The carbon nanoparticles after size reduction are connected MWSFs with layers of graphene coating the connected MWSFs.

FIG. 20-18F shows a Raman spectrum from these aggregates after size reduction taken with a 532 nm incident light. The ID/IG for the aggregate particles in this example after size reduction is approximately 1.04. Additionally, the particles after size reduction had a Brunauer, Emmett and Teller (BET) specific surface area of approximately 40 $m^2/g$ to 50 $m^2/g$.

The purity of the aggregates produced in this sample were measured using mass spectrometry and x-ray fluorescence (XRF) spectroscopy. The ratio of carbon to other elements, except for hydrogen, measured in 16 different batches was from 99.86% to 99.98%, with an average of 99.94% carbon.

In this example, carbon nanoparticles were generated using a thermal hot-wire processing system. The precursor material was methane, which was flowed from 1 slm to 5 slm. With these flow rates and the tool geometry, the resonance time of the gas in the reaction chamber was from approximately 20 second to 30 seconds, and the carbon particle production rate was from approximately 20 g/hr.

Further details pertaining to such a processing system can be found in the previously mentioned U.S. Pat. No. 9,862,602, titled "CRACKING OF A PROCESS GAS," which is hereby incorporated by reference for all purposes.

Example 1

Figures 1, 20:
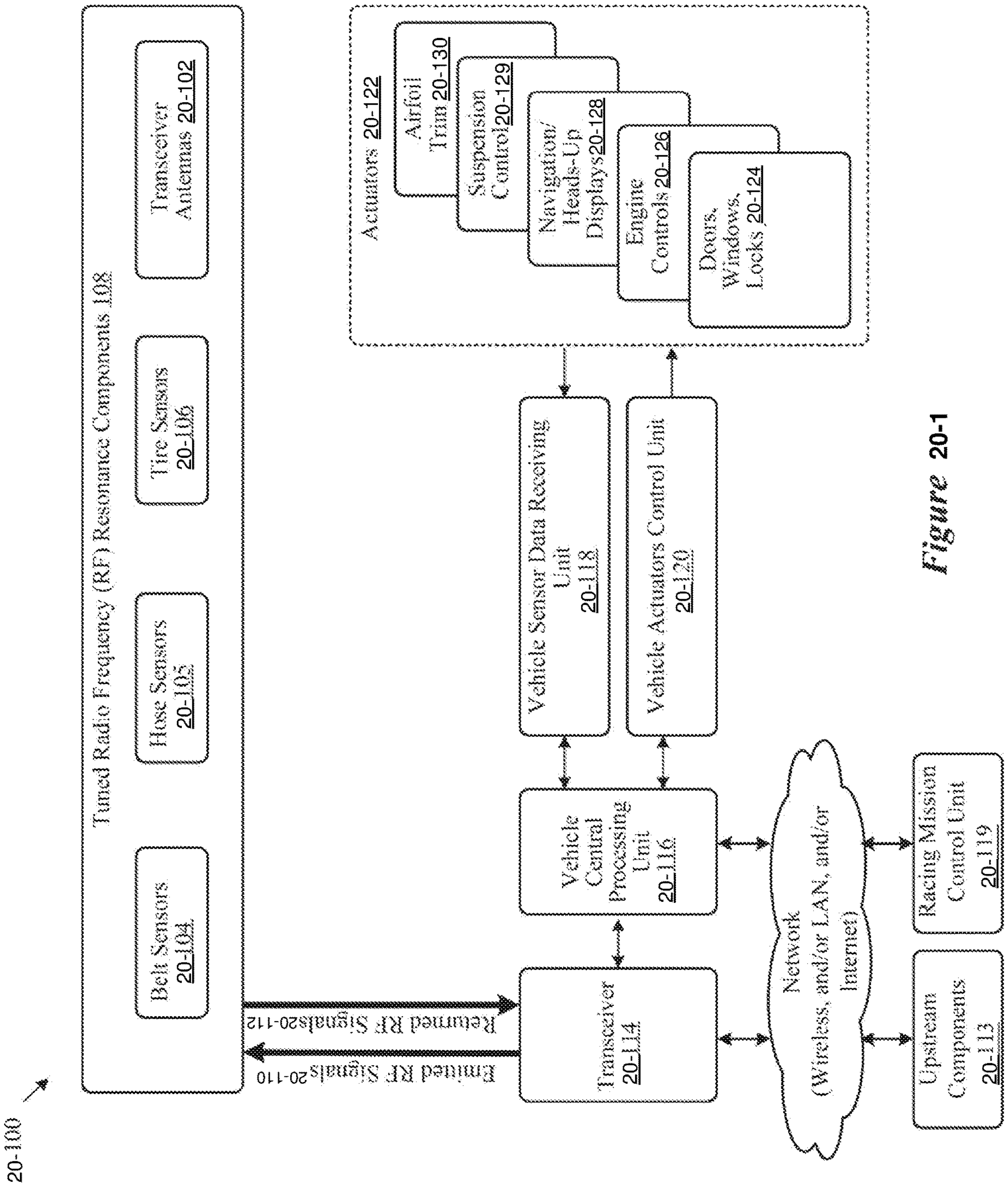
Figures 6, 20:
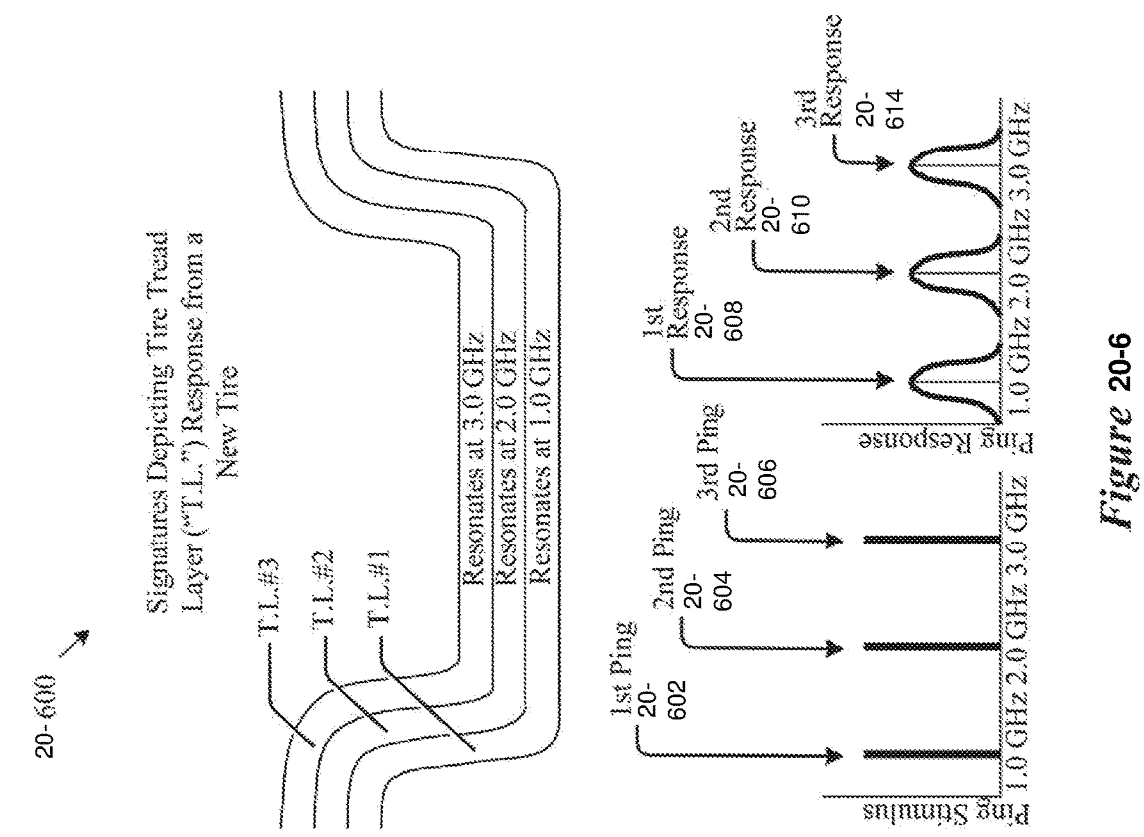
Figures 7, 20:
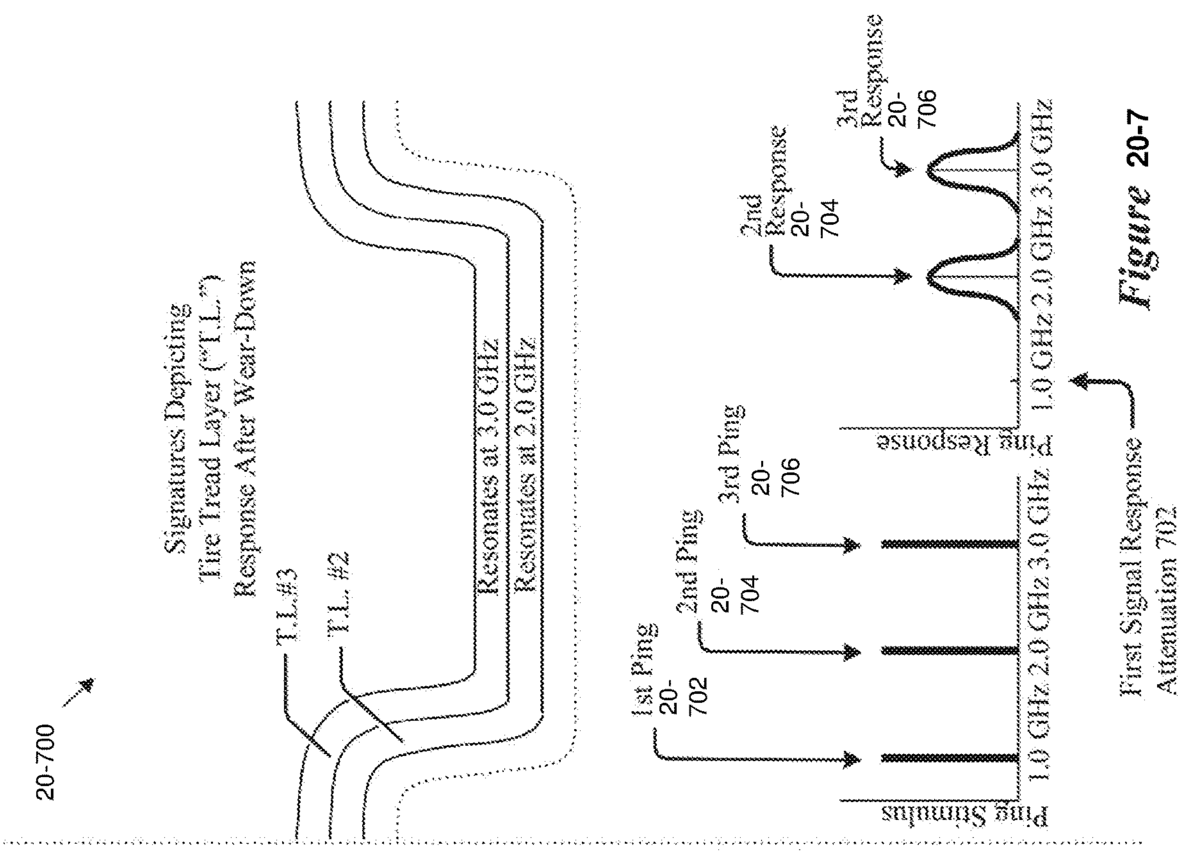
Figures 18G, 20:
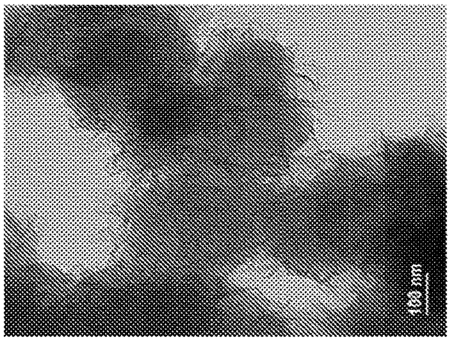
Figures 18H, 20:
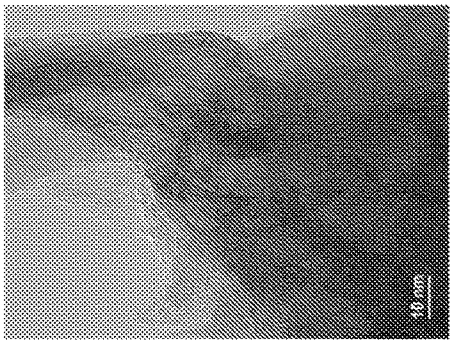
Figures 18I, 20:
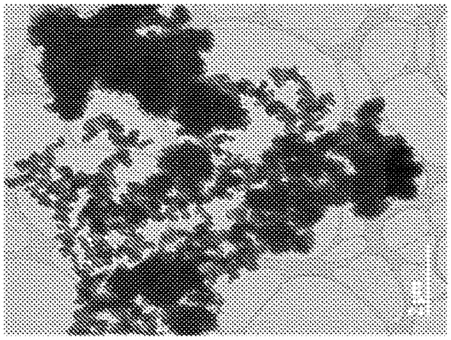
Figures 18J, 20:
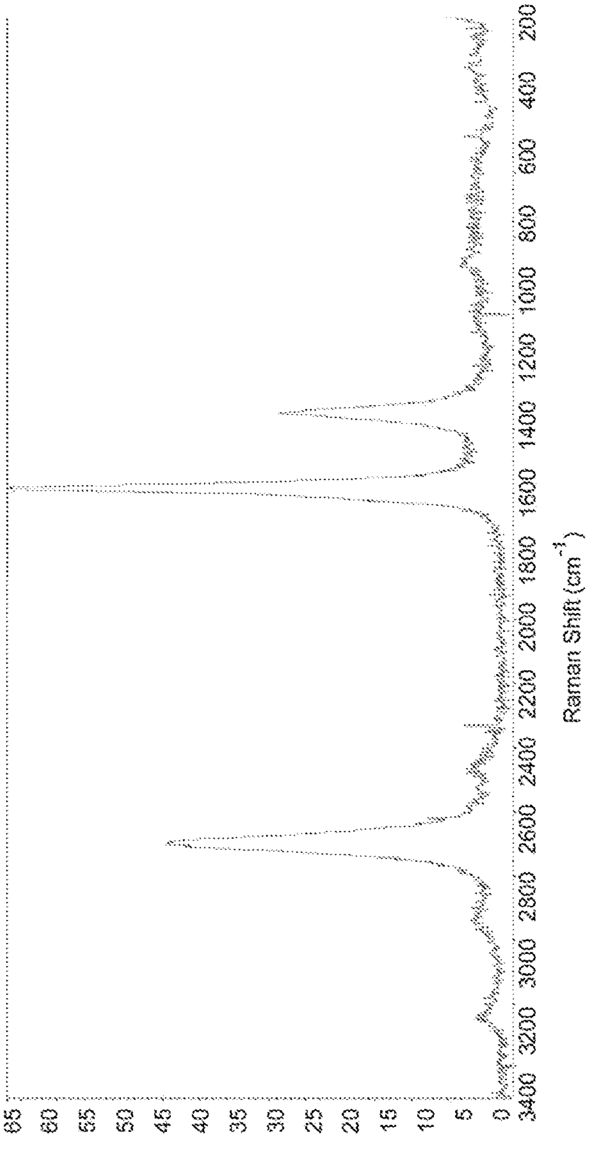

FIG. 20-18G, FIG. 20-18H, and FIG. 20-18I show TEM images of as-synthesized carbon nanoparticles of this example. The carbon nanoparticles contain connected multi-walled spherical fullerenes (MWSFs) with layers of graphene coating the connected MWSFs. The ratio of multi-walled fullerenes to graphene allotropes in this example is approximately 30% due to the relatively long resonance times allowing thicker, or more, layers of graphene to coat the MWSFs. No catalyst was used in this process, and therefore, there is no central seed containing contaminants. The as-synthesized aggregate particles produced in this example had particle sizes of approximately 10 μm to 500 μm. FIG. 20-18J shows a Raman spectrum from the aggregates of this example. The Raman signature of the as-synthesized particles in this example is indicative of the thicker graphene layers which coat the MWSFs in the as-synthesized material. Additionally, the as-synthesized particles had a Brunauer, Emmett and Teller (BET) specific surface area of approximately 90 $m^2/g$ to 100 $m^2/g$.

Example 2

FIG. 20-18K and FIG. 20-18L show TEM images of the carbon nanoparticles of this example. Specifically, the images depict the carbon nanoparticles after performance of size reduction by grinding in a ball mill. The size reduction process conditions were the same as those described as pertains to the foregoing FIGS. 20-18G-20-18J. After size reduction, the aggregate particles produced in this example had a particle size of approximately 1 μm to 5 μm. The TEM images show that the connected MWSFs that were buried in the graphene coating can be observed after size reduction. FIG. 20-18M shows a Raman spectrum from the aggregates of this example after size reduction taken with 532 nm incident light. The Ip/IG for the aggregate particles in this example after size reduction is approximately 1, indicating that the connected MWSFs that were buried in the graphene coating as-synthesized had become detectable in Raman after size reduction, and were well ordered. The particles after size reduction had a Brunauer, Emmett and Teller (BET) specific surface area of approximately 90 $m^2/g$ to 100 $m^2/g$.

Example 3

Figures 18N, 20:
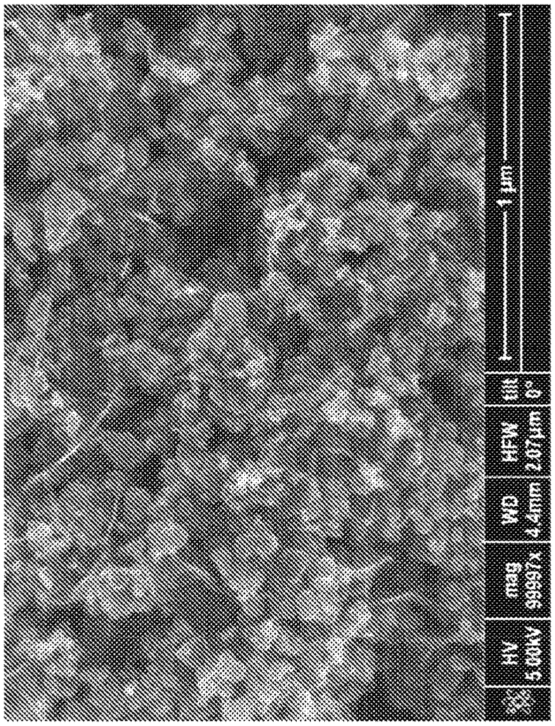
Figures 18O, 20:
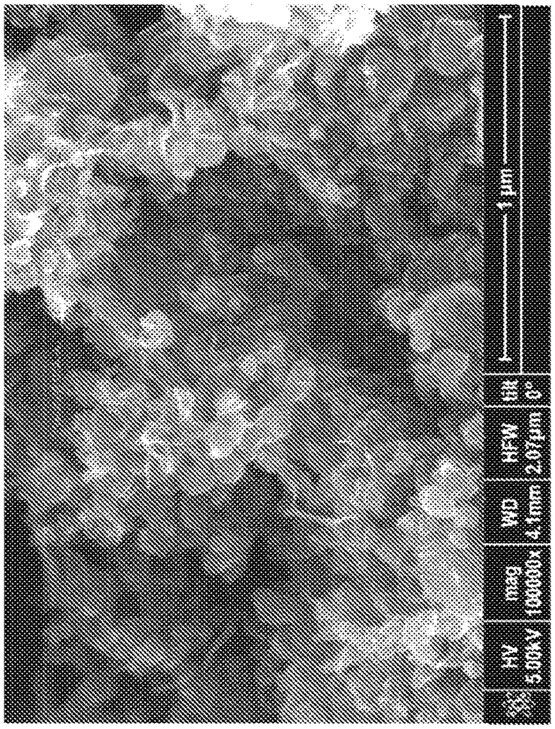

FIG. 20-18N is a scanning electron microscope (SEM) image of carbon aggregates showing the graphite and graphene allotropes at a first magnification. FIG. 20-180 is a SEM image of carbon aggregates showing the graphite and graphene allotropes at a second magnification. The layered graphene is clearly shown within the distortion (wrinkles) of the carbon. The 3D structure of the carbon allotropes is also visible.

Figures 18P, 20:
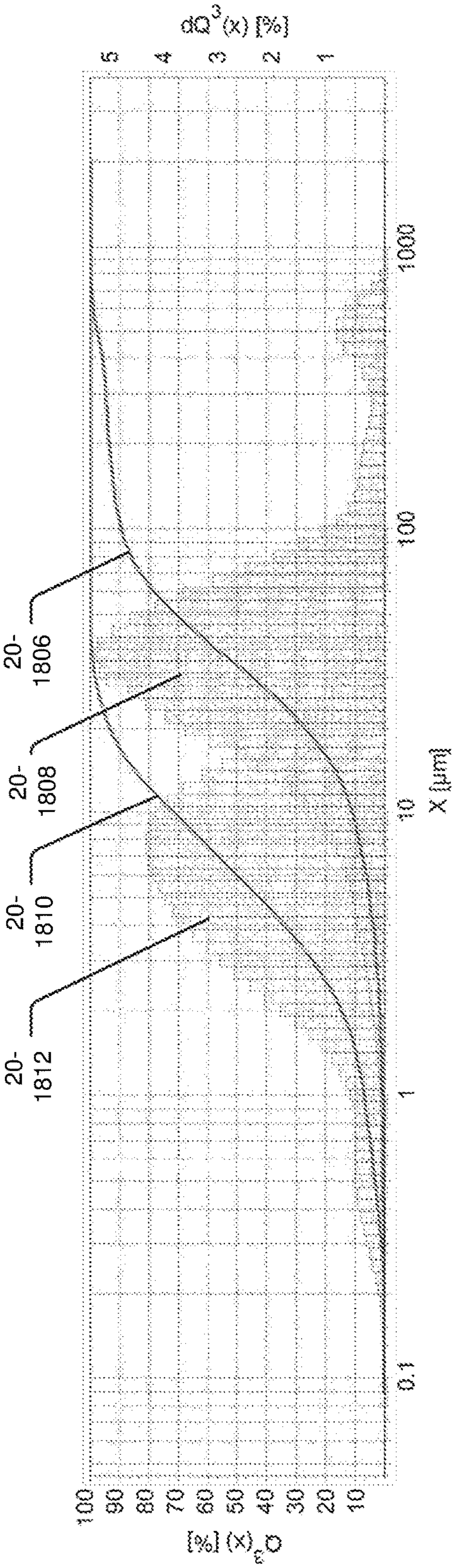
Figure 20:
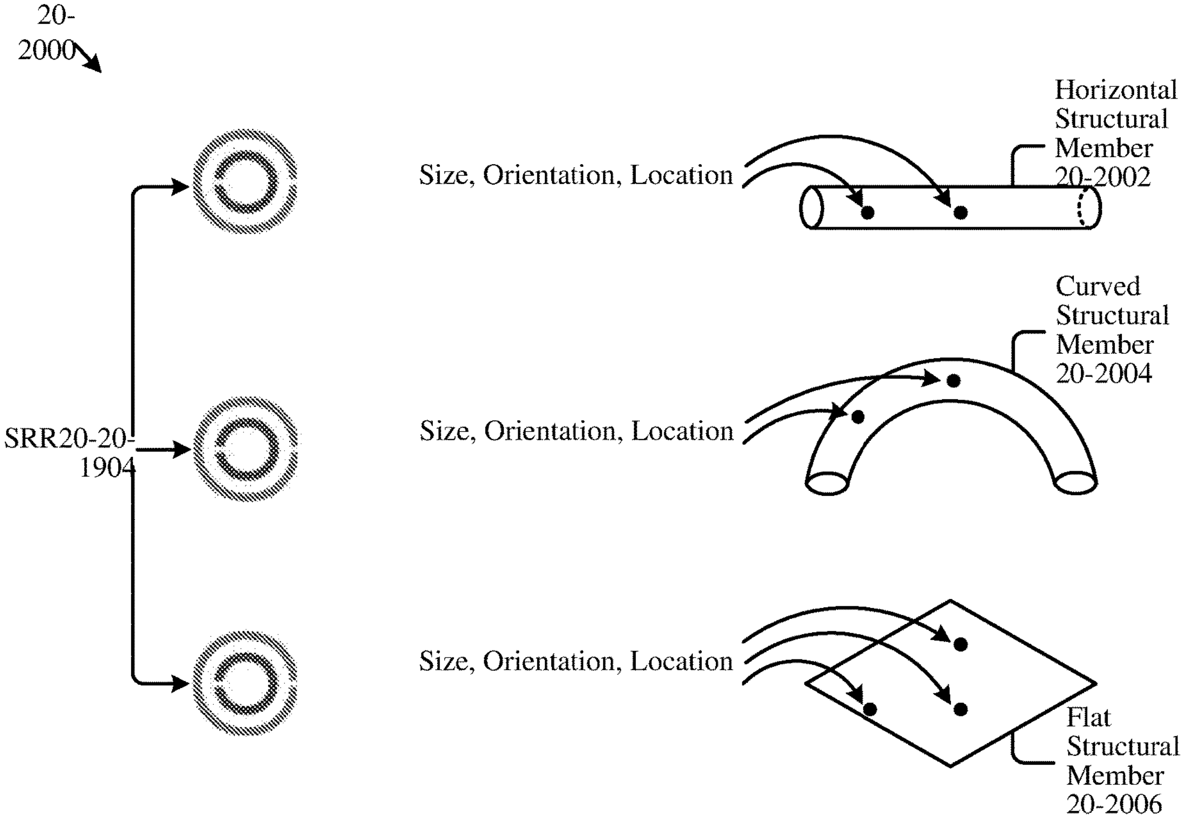
Figures 20, 21:
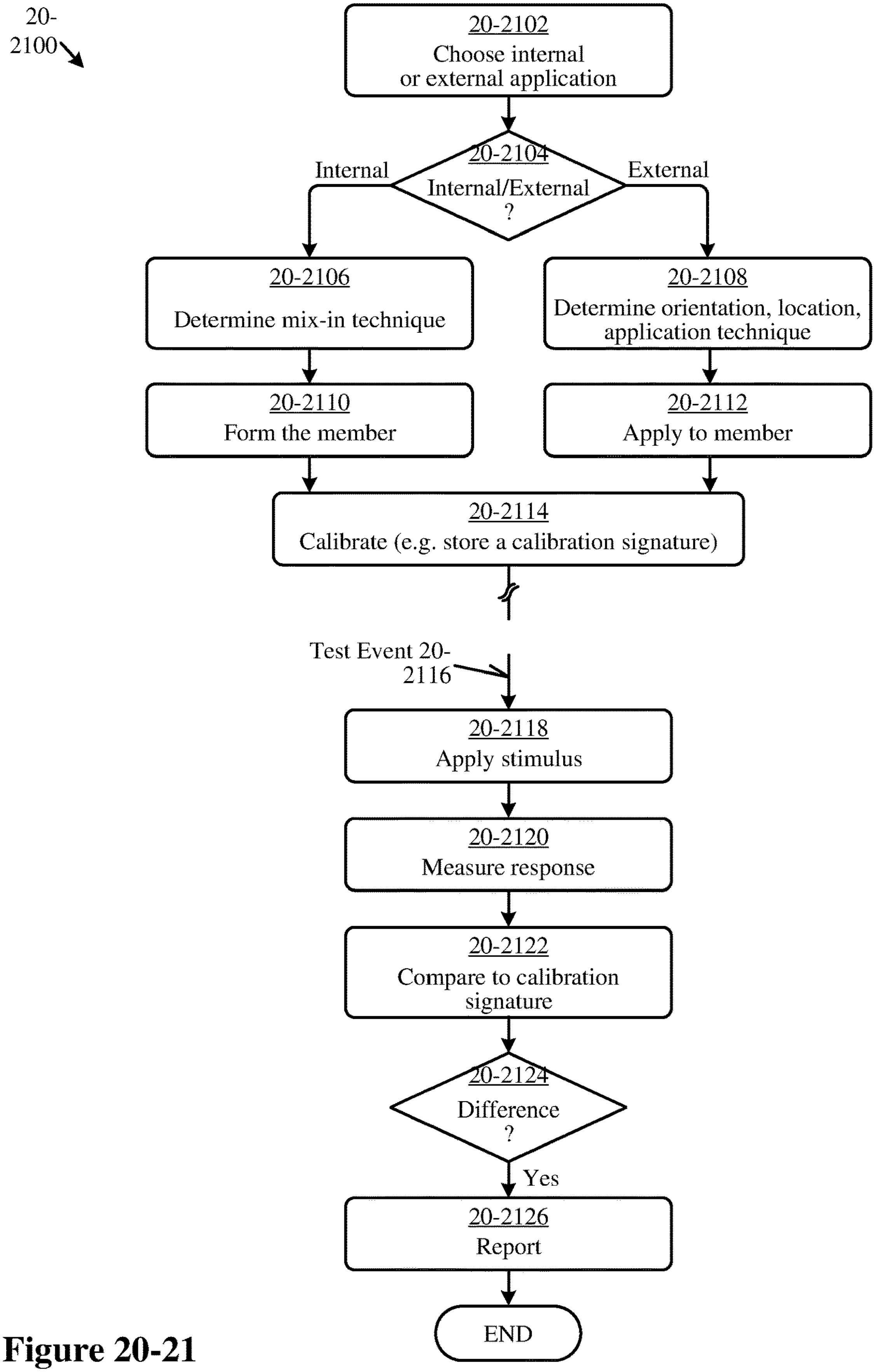
Figures 20, 21, 22, 22B:
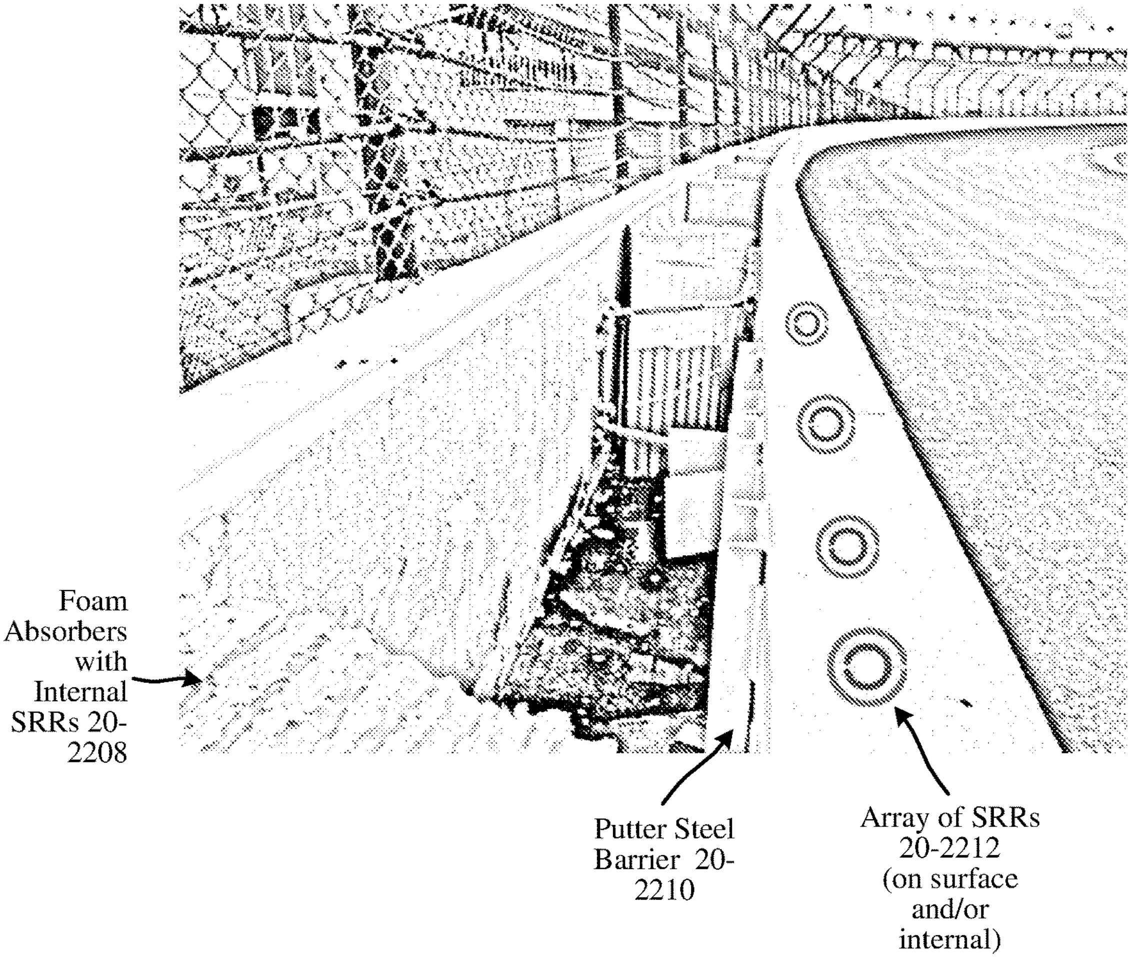
Figures 20, 21, 22, 23:
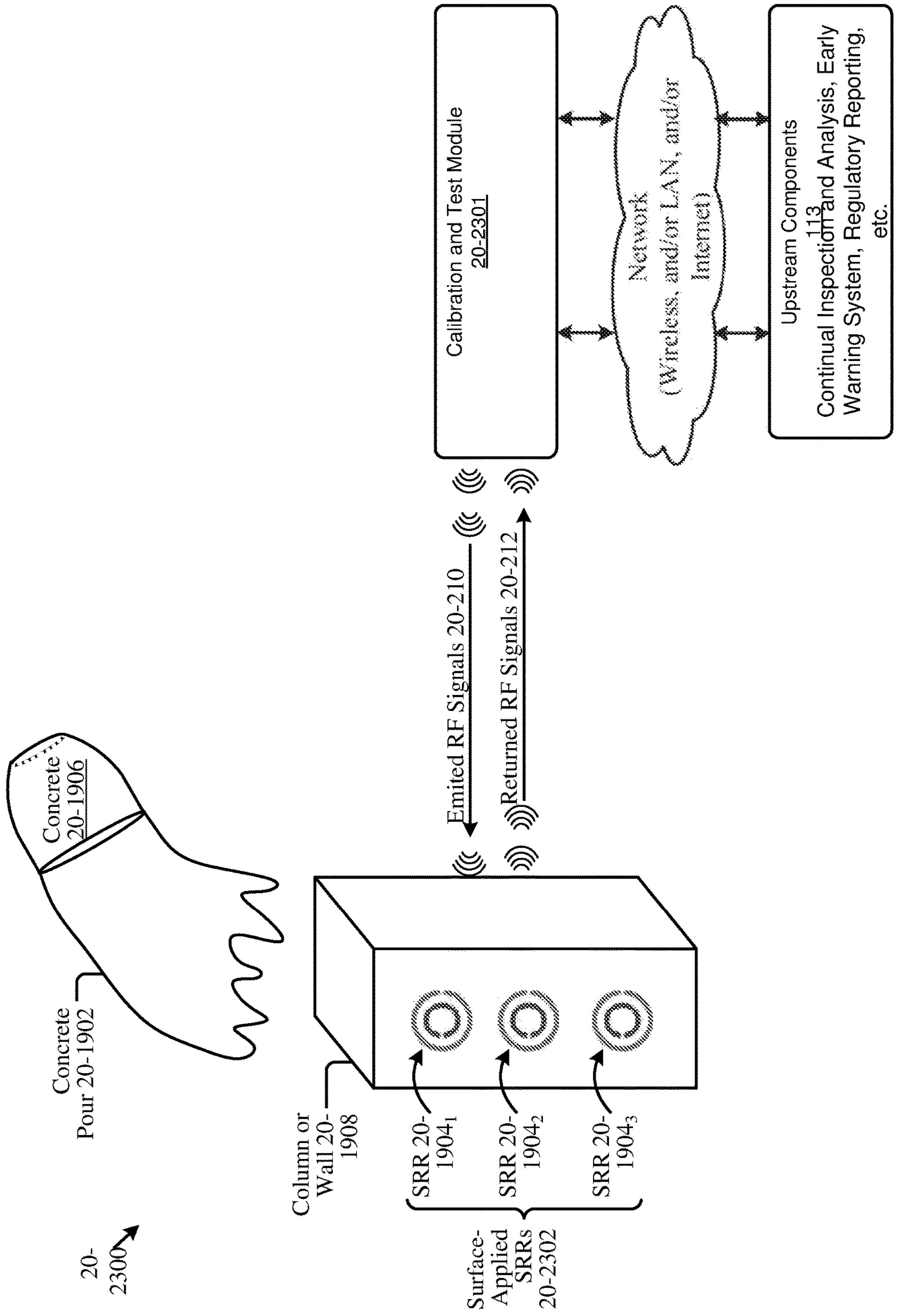
Figures 20, 21, 22, 23, 24, 24A:
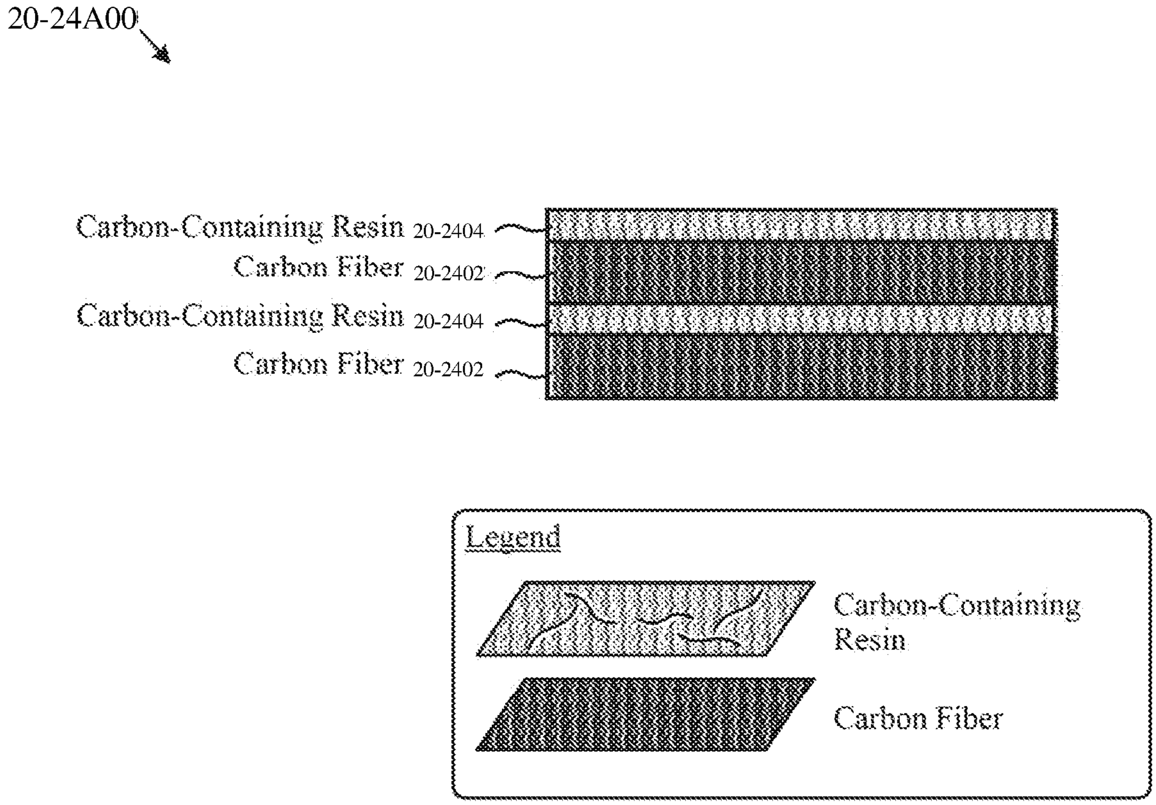
Figures 20, 21, 22, 23, 24, 24C:
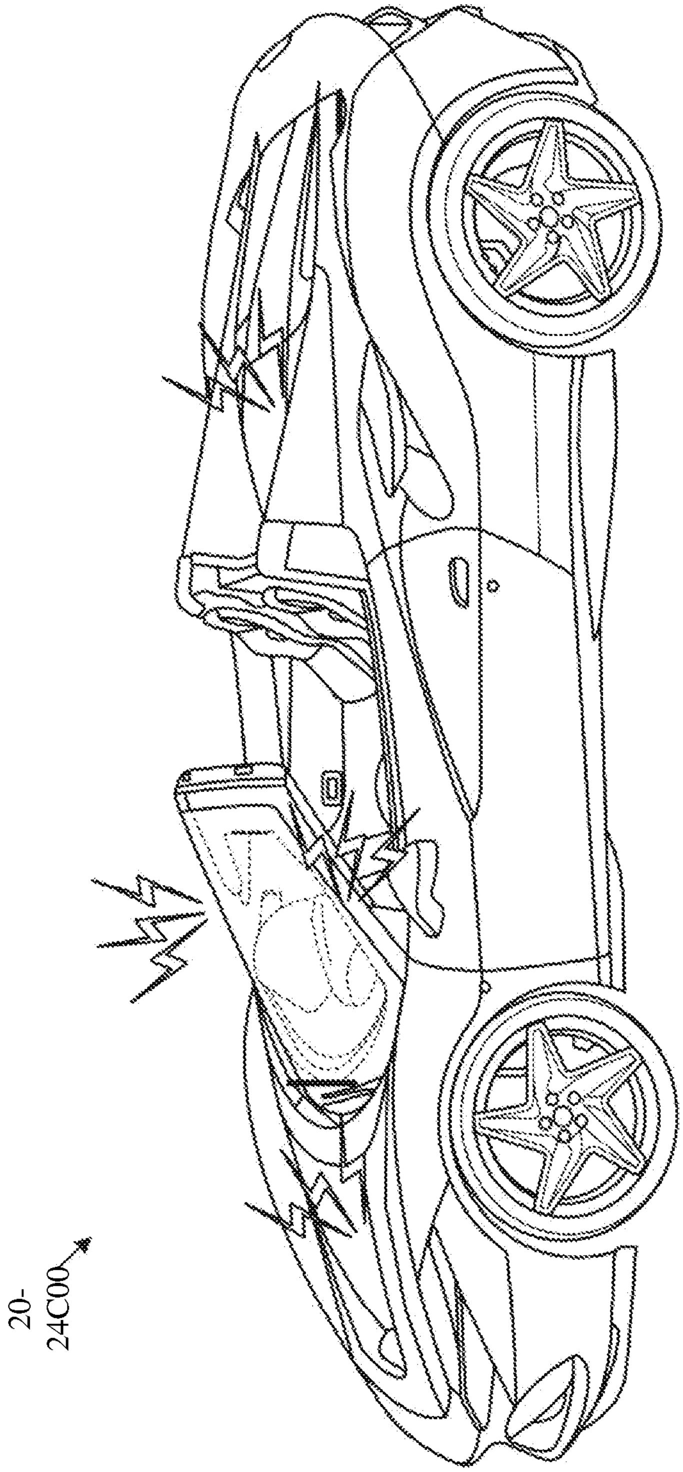
Figures 20, 21, 22, 23, 24, 25, 25A:
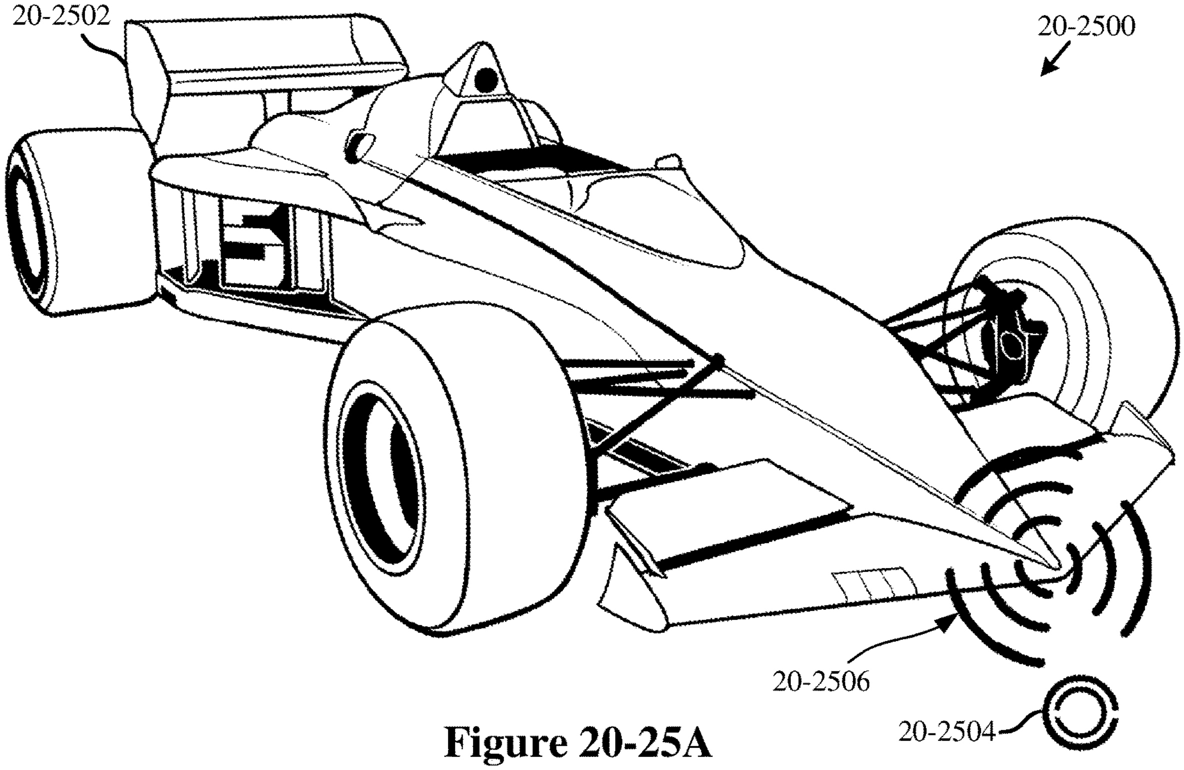
Figures 20, 21, 22, 23, 24, 25, 25B:
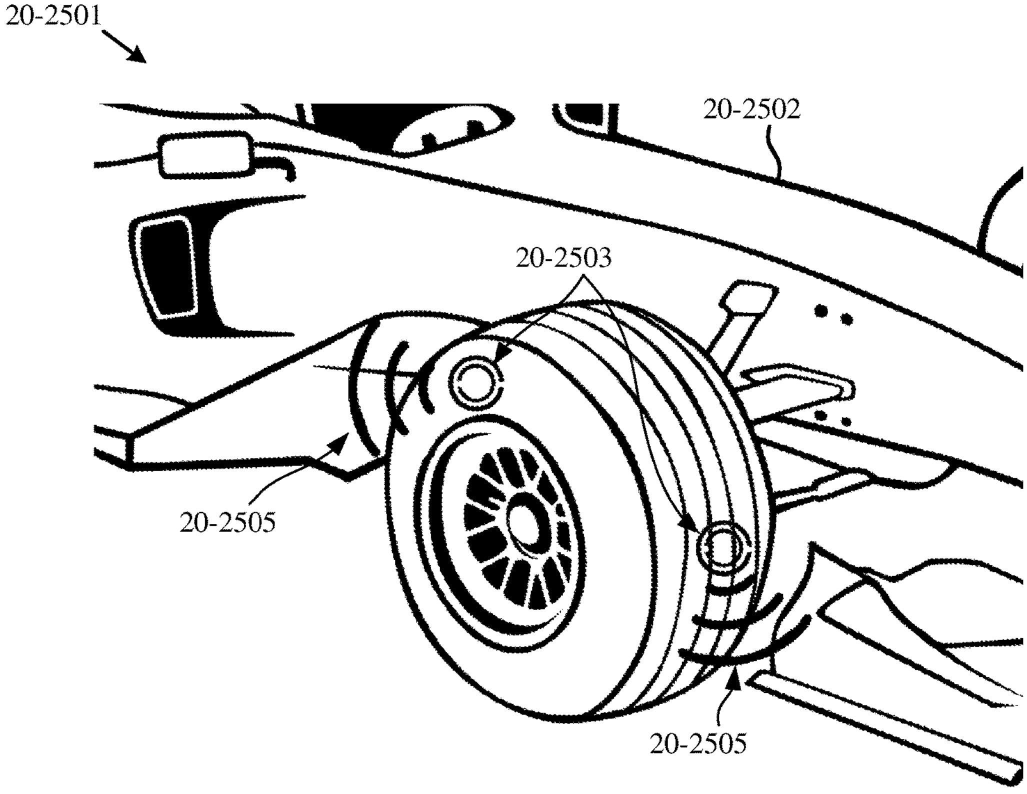
Figures 20, 21, 22, 23, 24, 25, 26:
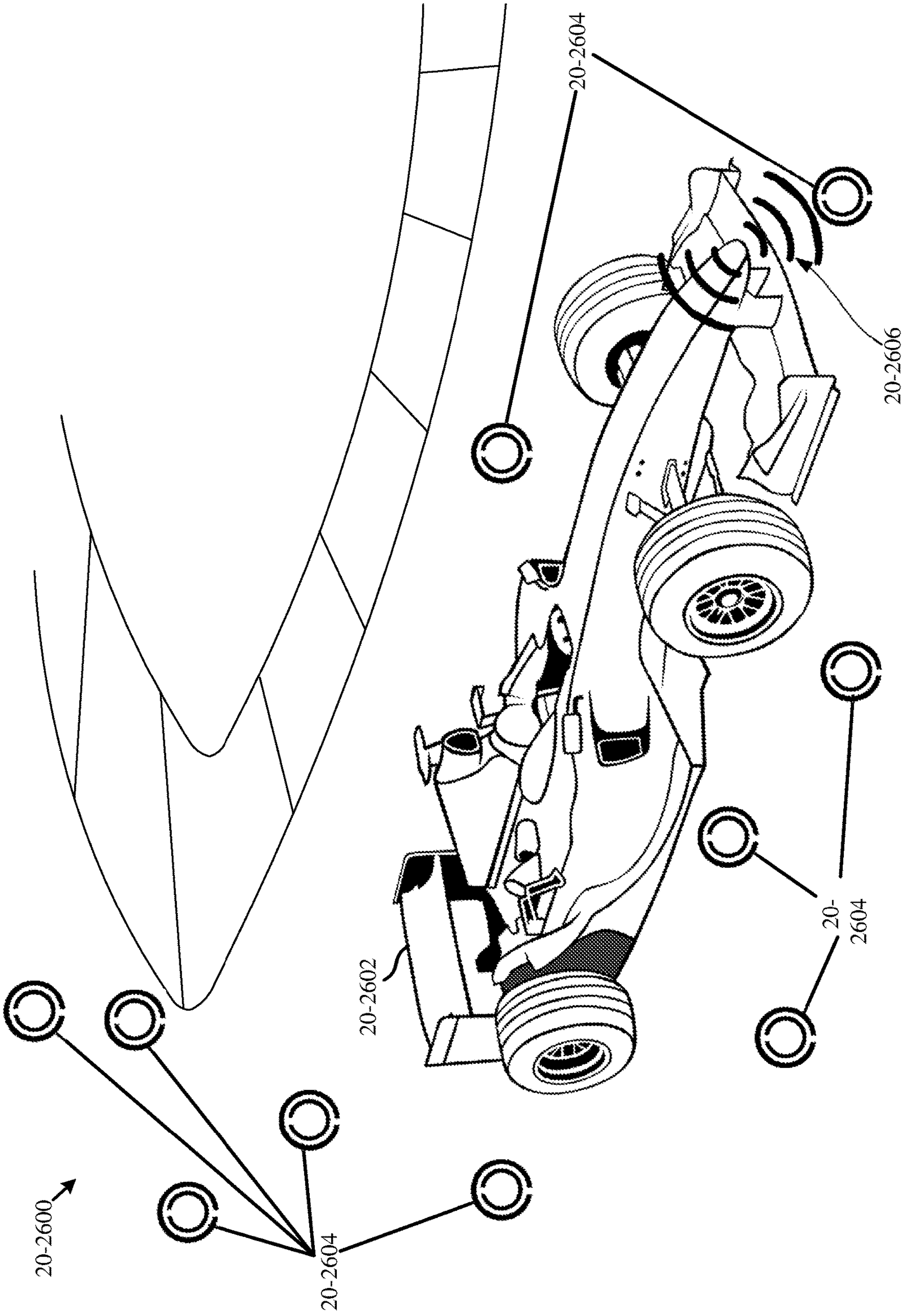
Figures 20, 21, 22, 23, 24, 25, 26, 27:
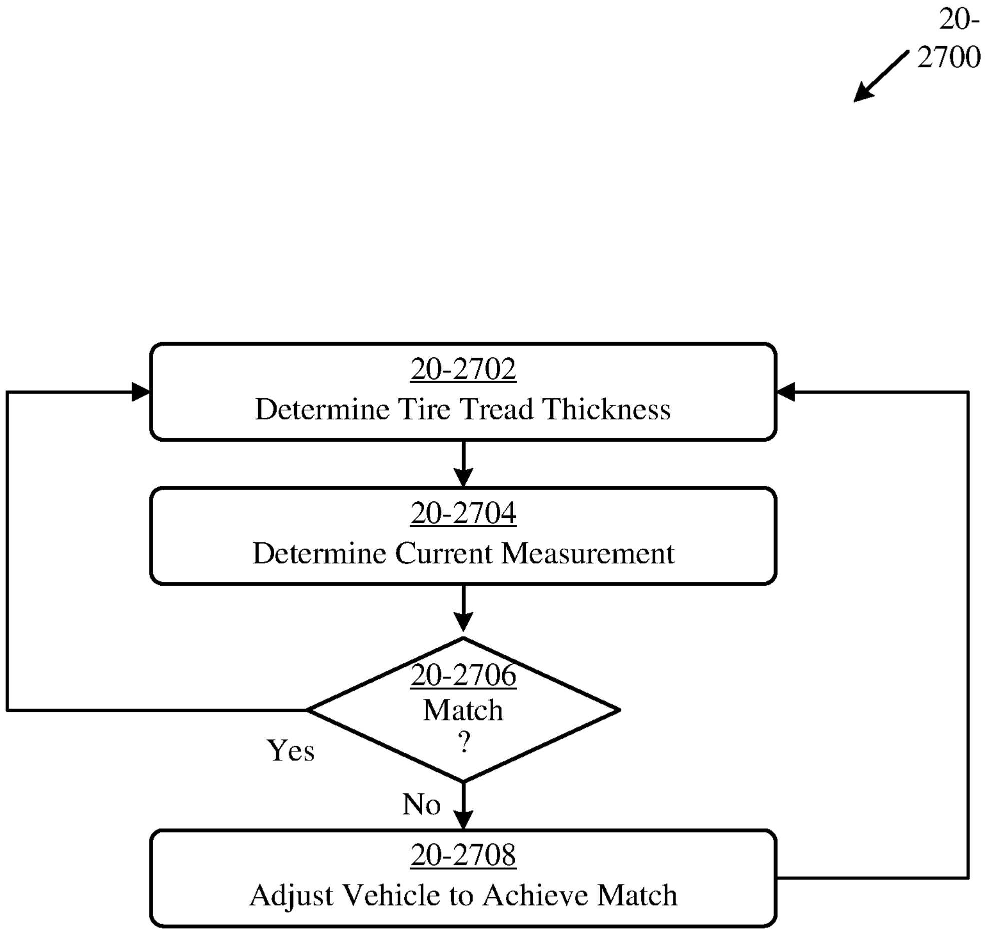
Figures 20, 21, 22, 23, 24, 25, 26, 27, 28:
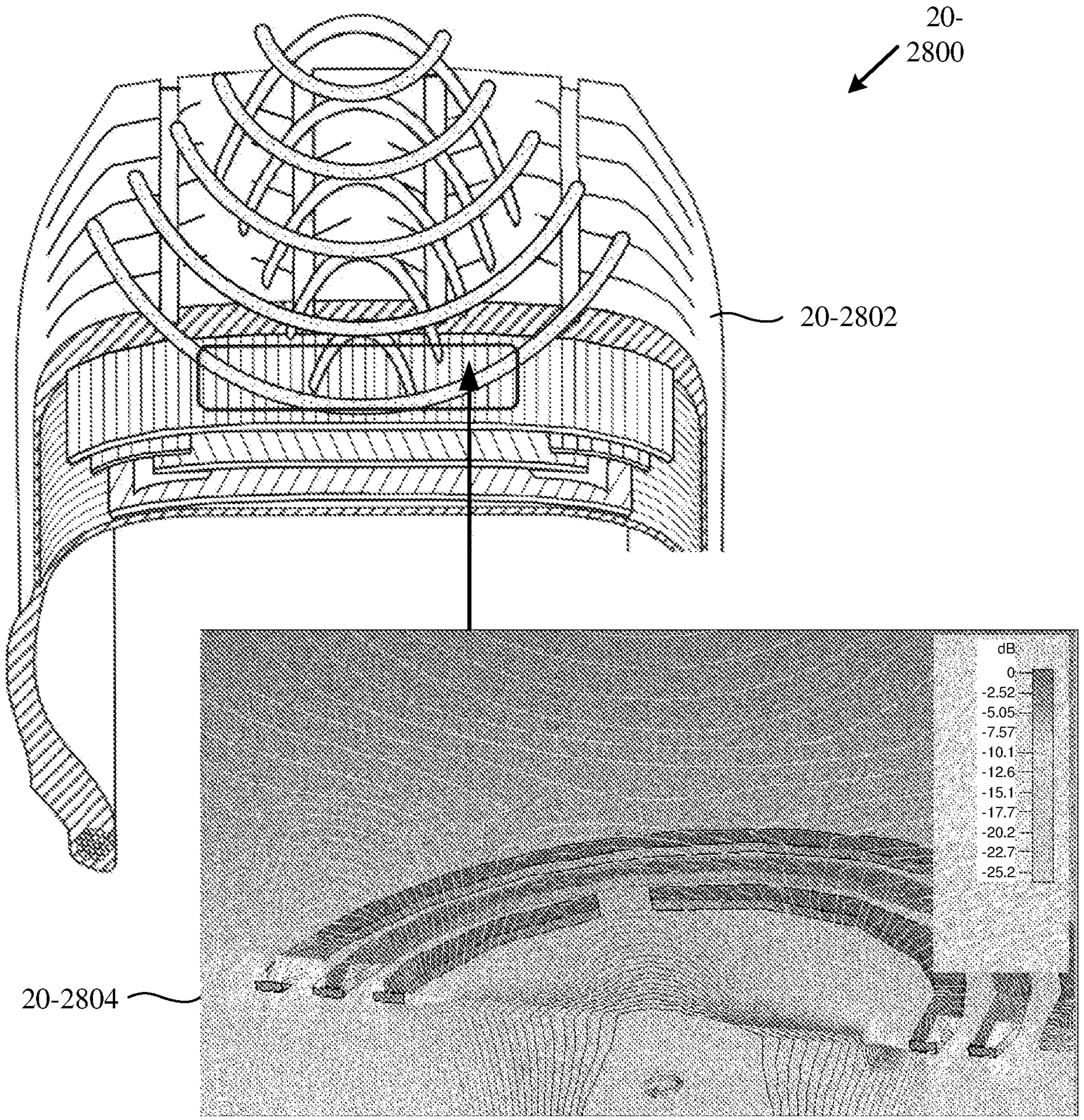
Figures 20, 21, 22, 23, 24, 25, 26, 27, 28, 29:
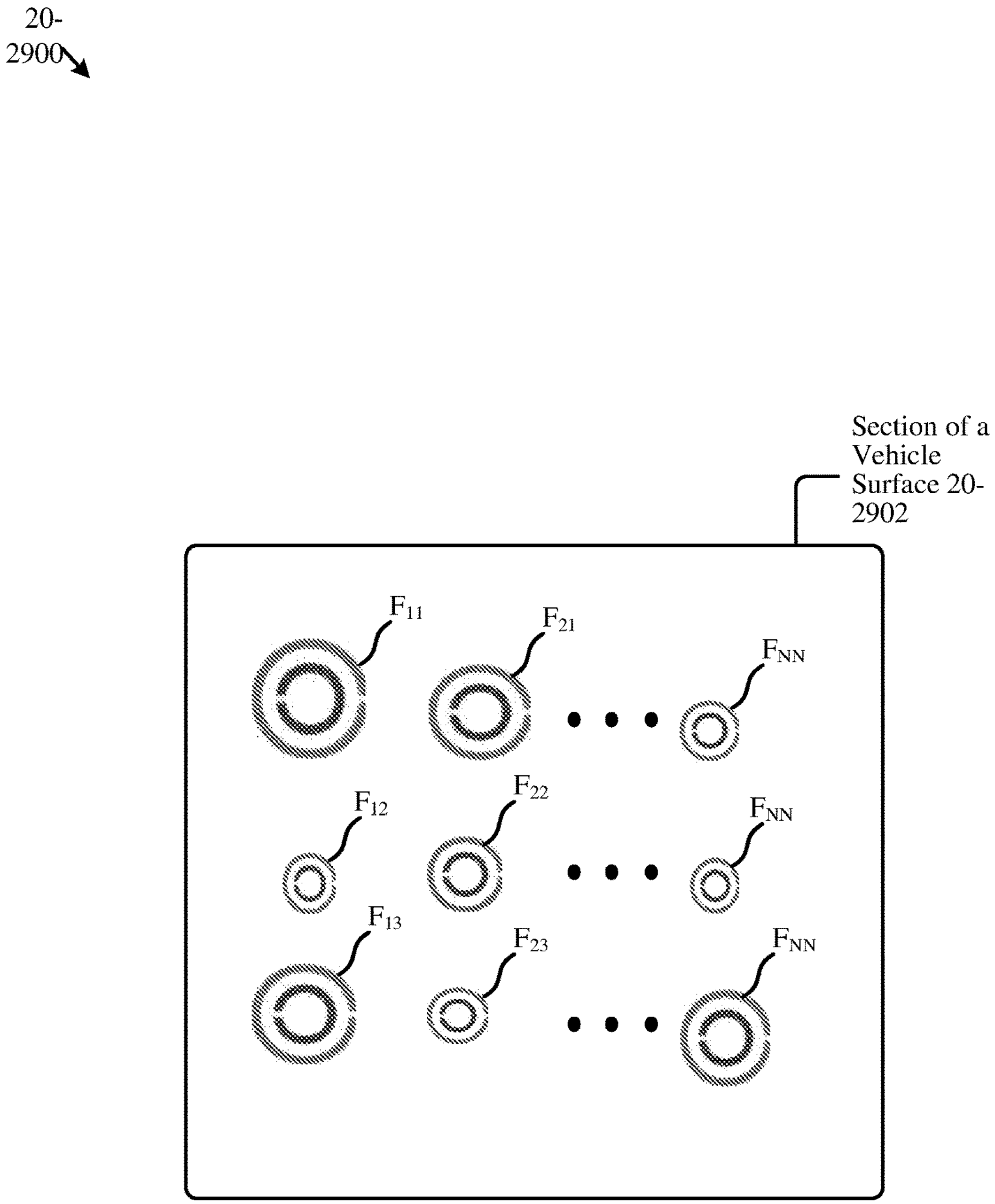
Figures 20, 21, 22, 23, 24, 25, 26, 27, 28, 29, 30:
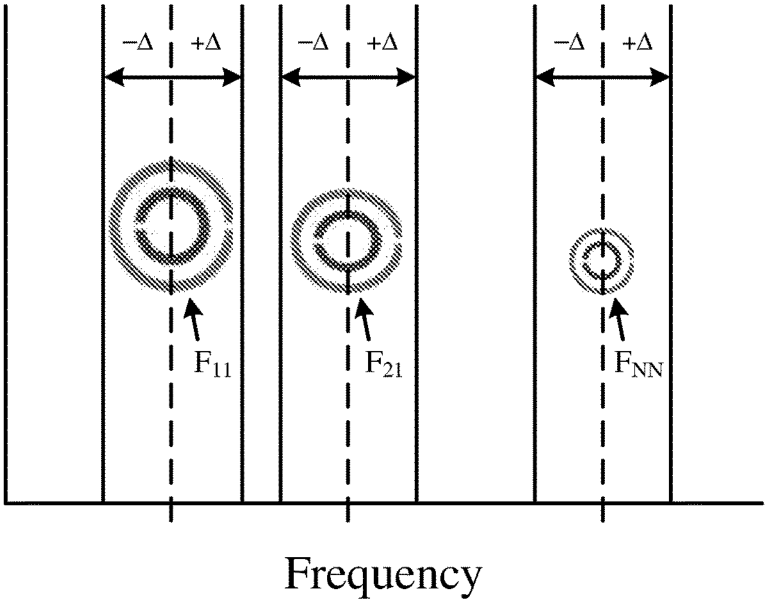
Figures 20, 21, 22, 23, 24, 25, 26, 27, 28, 29, 30, 31:
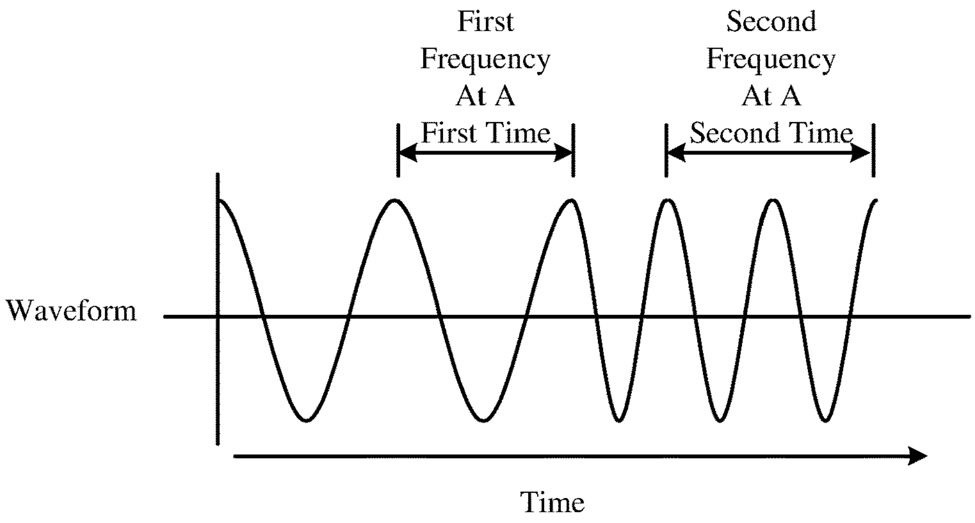
Figures 20, 21, 22, 23, 24, 25, 26, 27, 28, 29, 30, 31, 32:
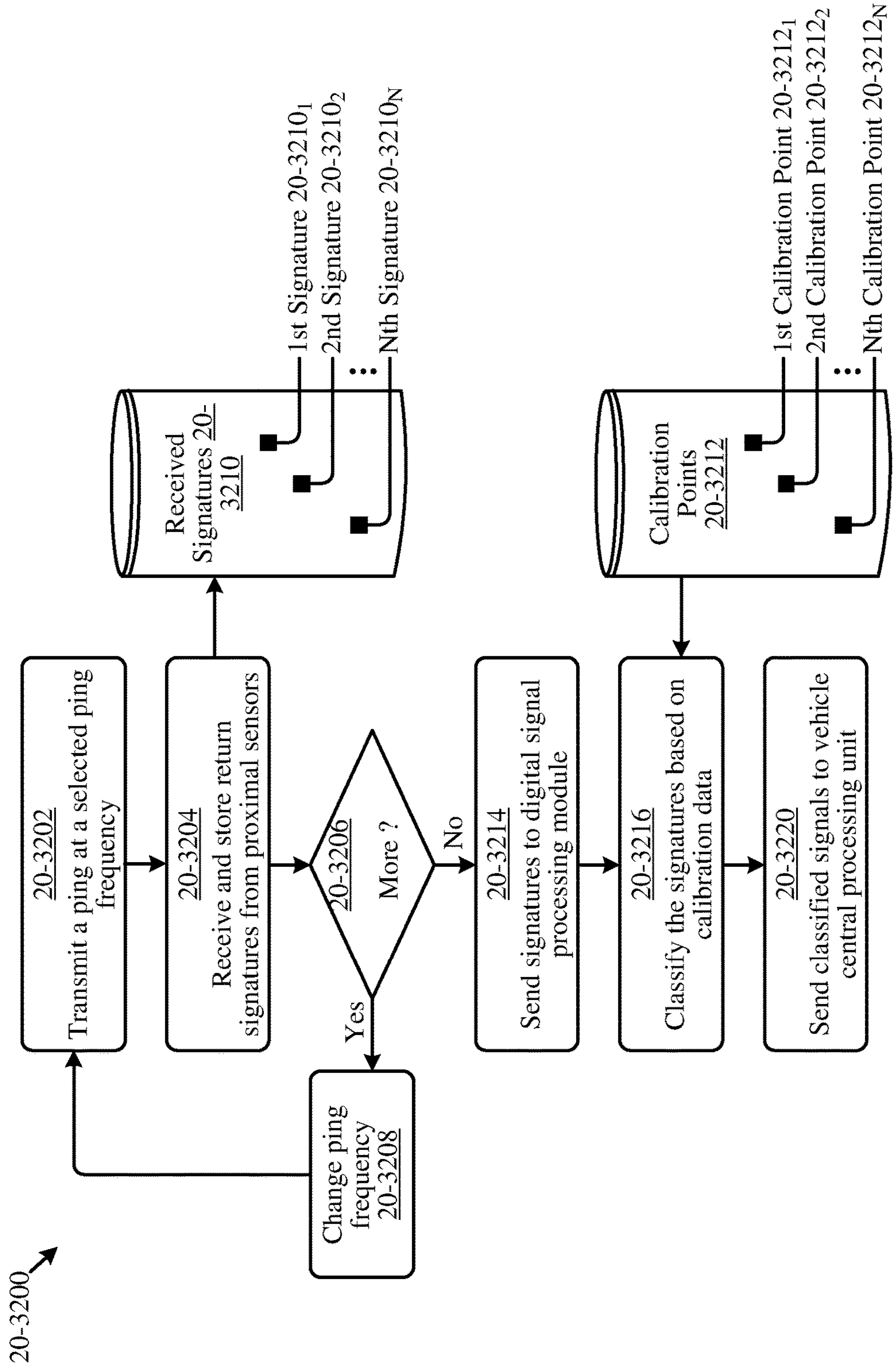
Figures 20, 21, 22, 23, 24, 25, 26, 27, 28, 29, 30, 31, 32, 33:
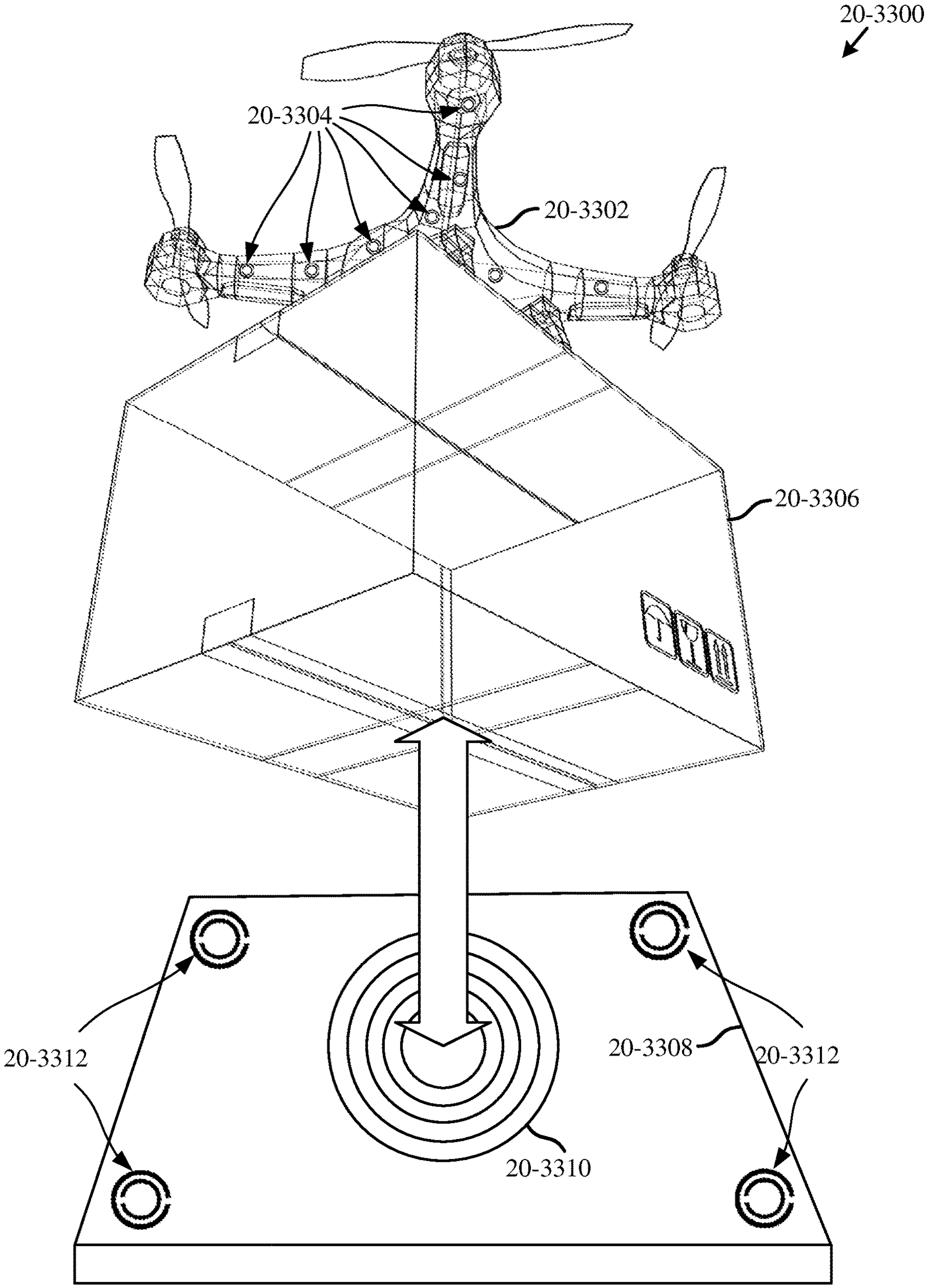
Figures 20, 21, 22, 23, 24, 25, 26, 27, 28, 29, 30, 31, 32, 33, 34:
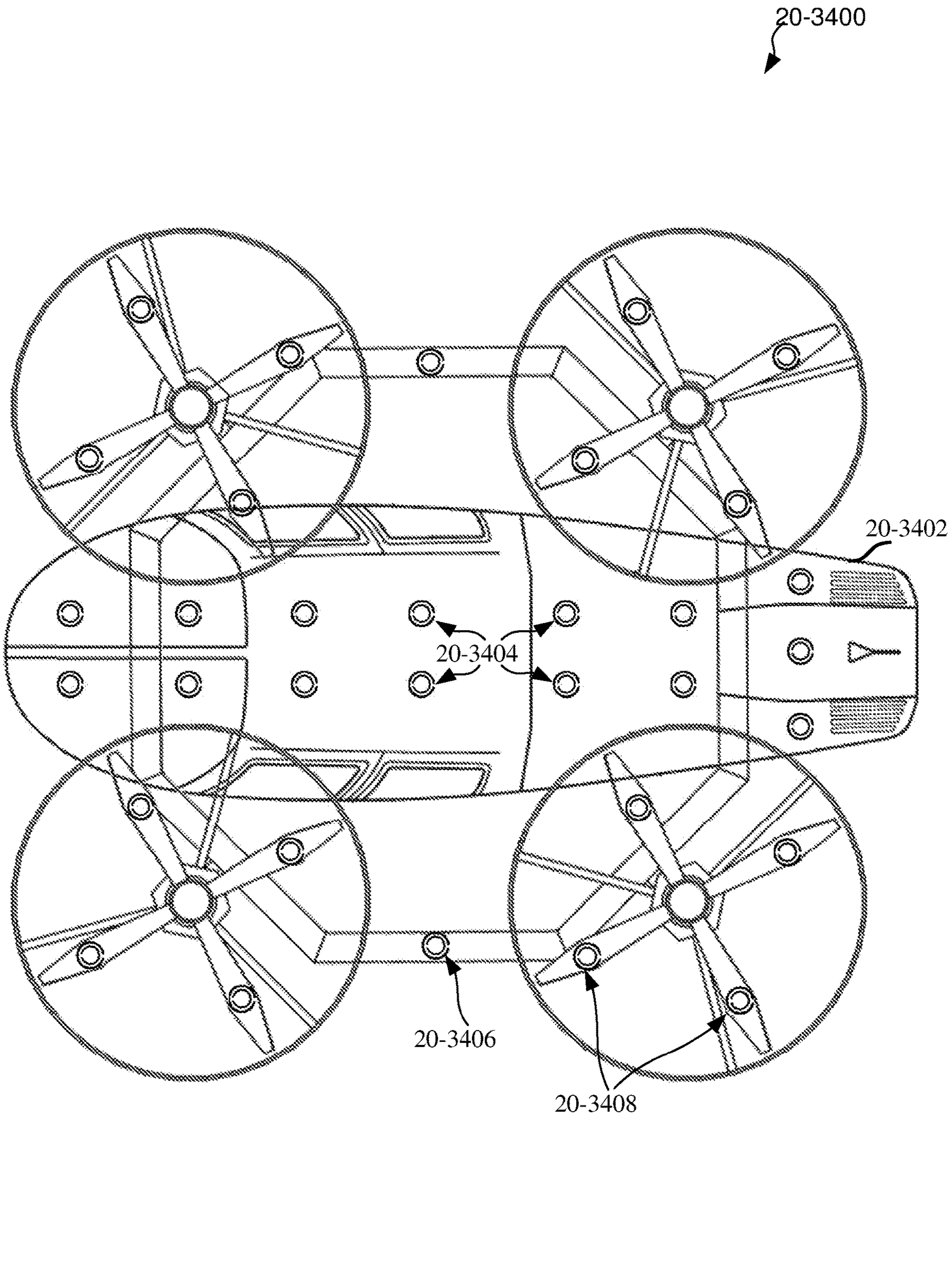
Figures 20, 21, 22, 23, 24, 25, 26, 27, 28, 29, 30, 31, 32, 33, 34, 35:
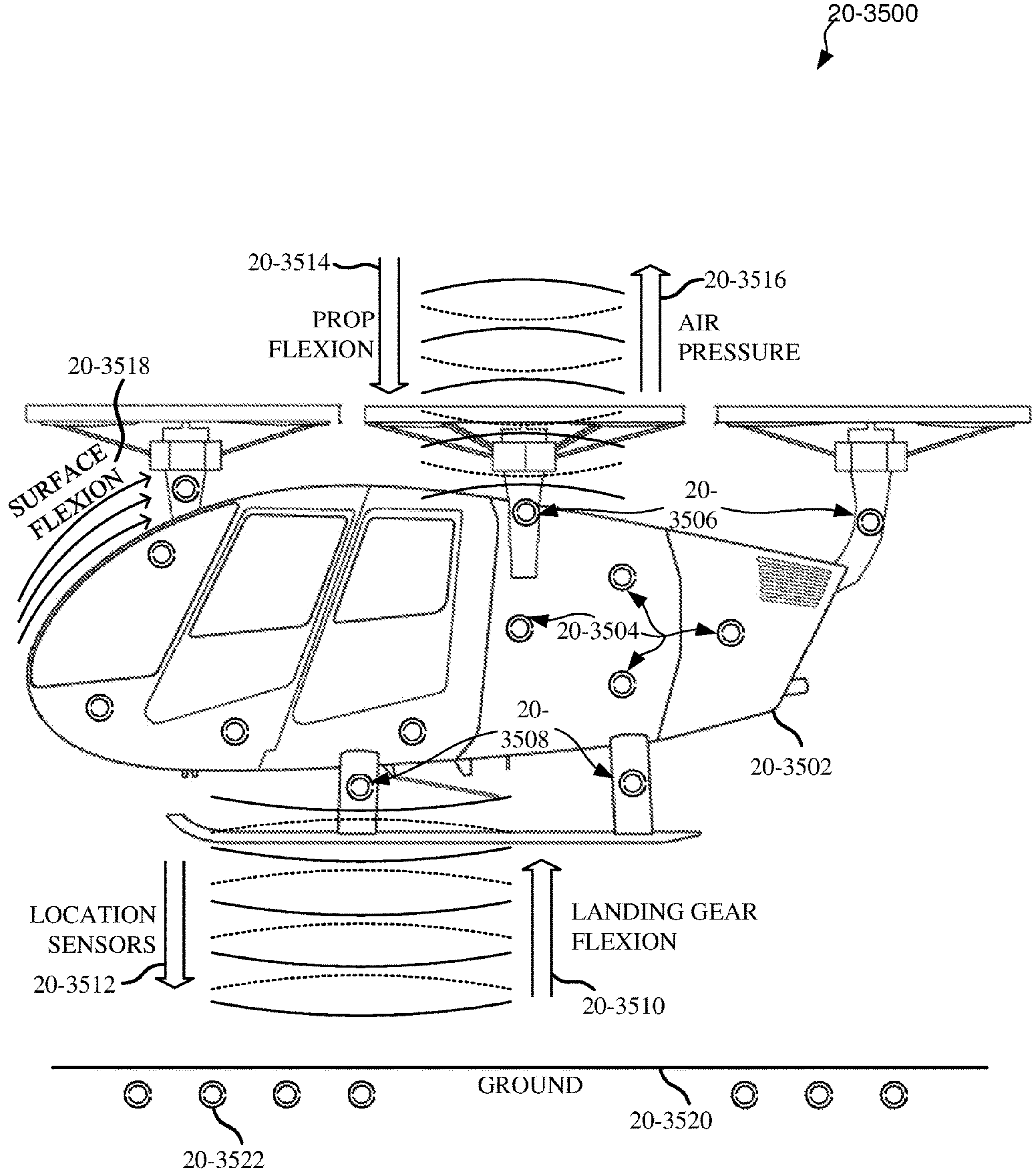
Figures 20, 21, 22, 23, 24, 25, 26, 27, 28, 29, 30, 31, 32, 33, 34, 35, 36, 36A:
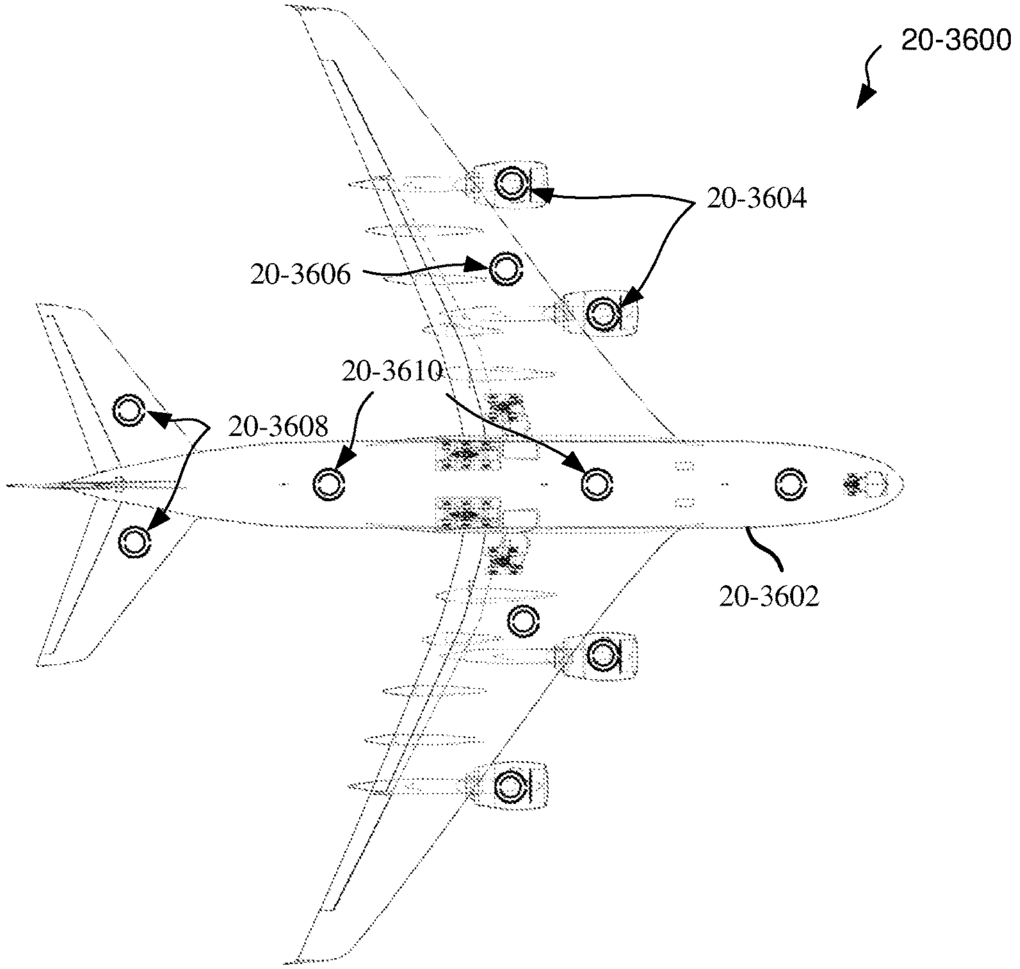
Figures 20, 21, 22, 23, 24, 25, 26, 27, 28, 29, 30, 31, 32, 33, 34, 35, 36, 36B:
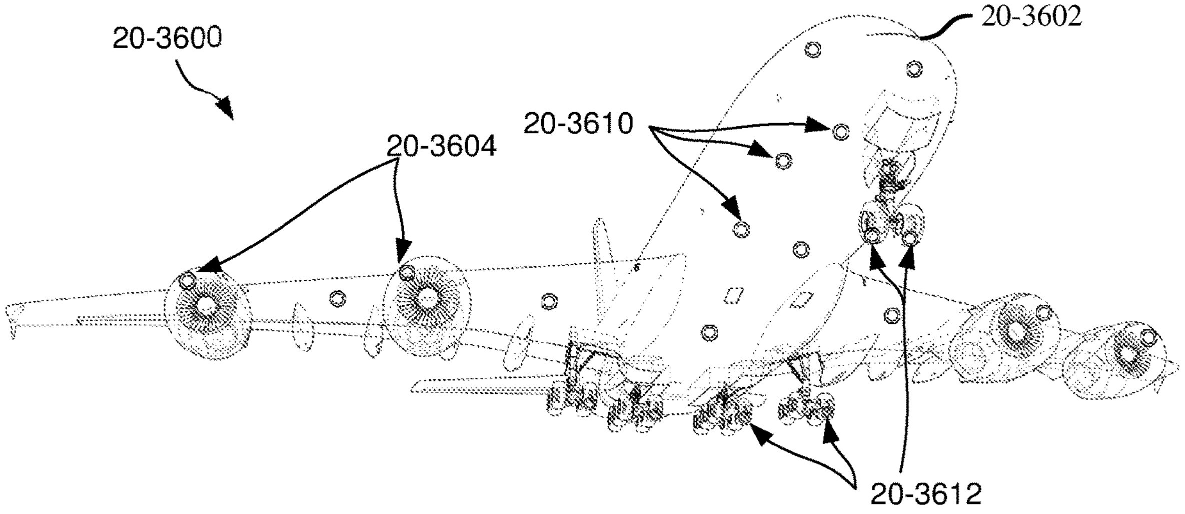
Figures 20, 21, 22, 23, 24, 25, 26, 27, 28, 29, 30, 31, 32, 33, 34, 35, 36, 37, 37A:
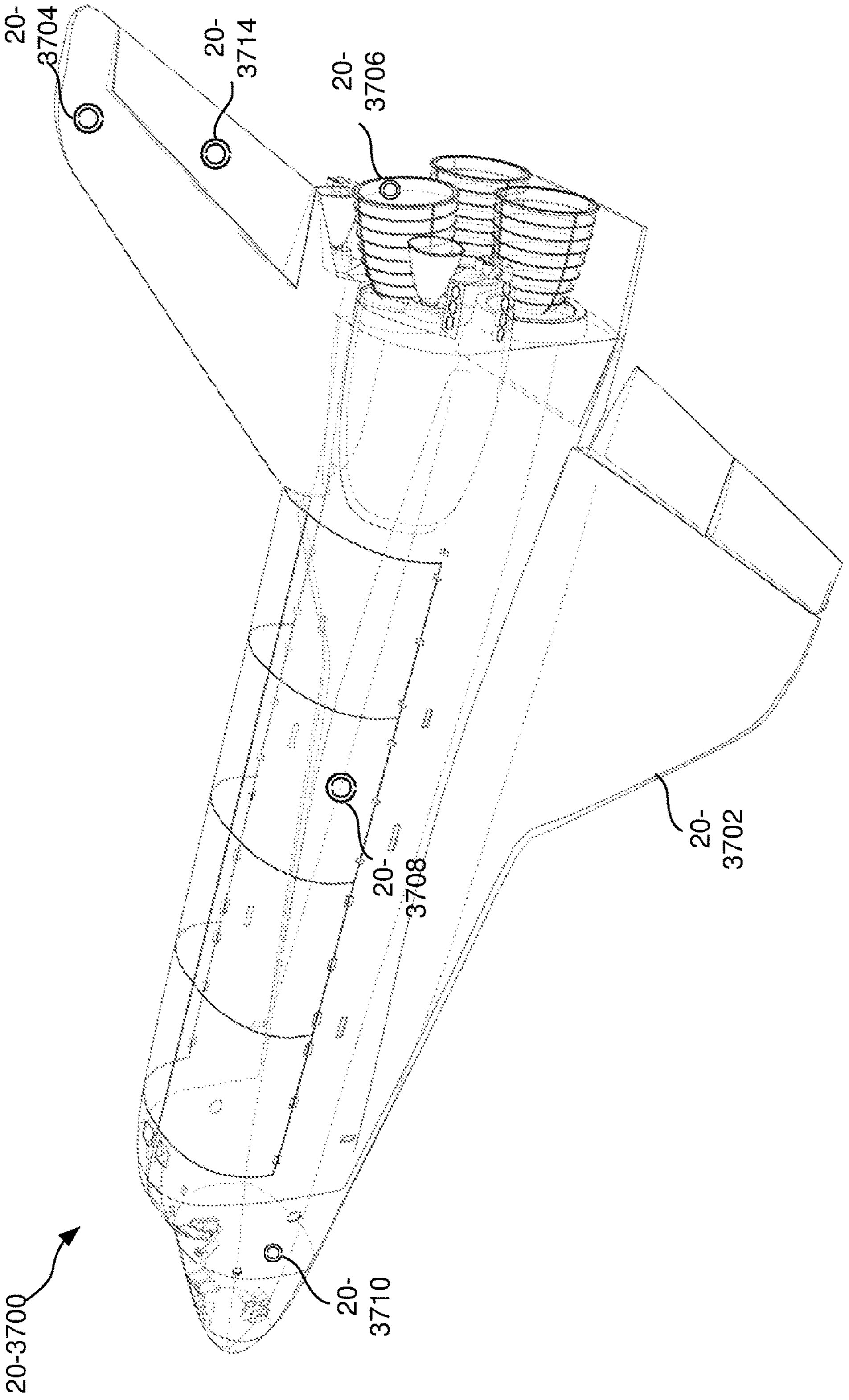
Figures 20, 21, 22, 23, 24, 25, 26, 27, 28, 29, 30, 31, 32, 33, 34, 35, 36, 37, 37B:
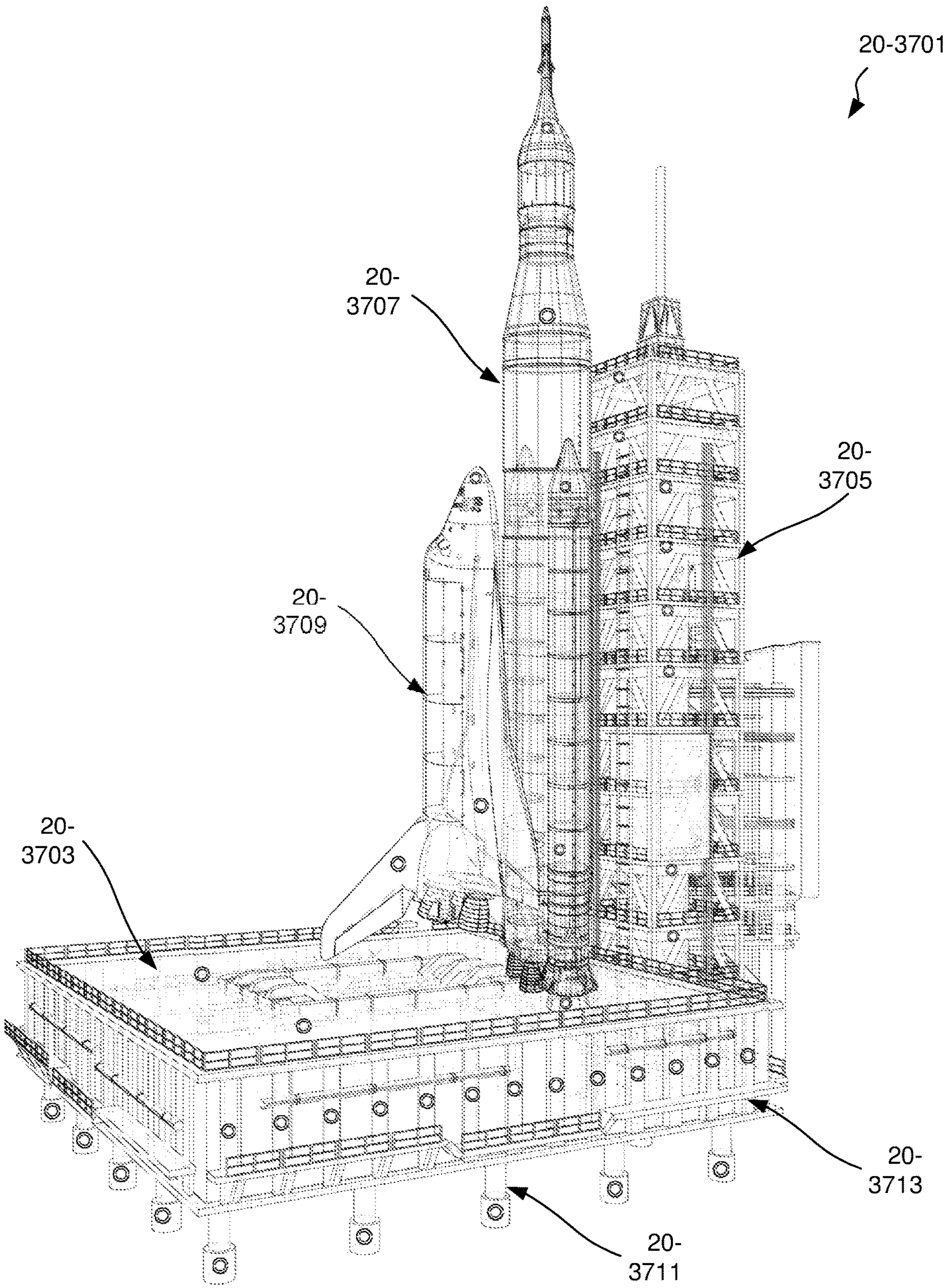
Figures 20, 21, 22, 23, 24, 25, 26, 27, 28, 29, 30, 31, 32, 33, 34, 35, 36, 37, 38, 38A:
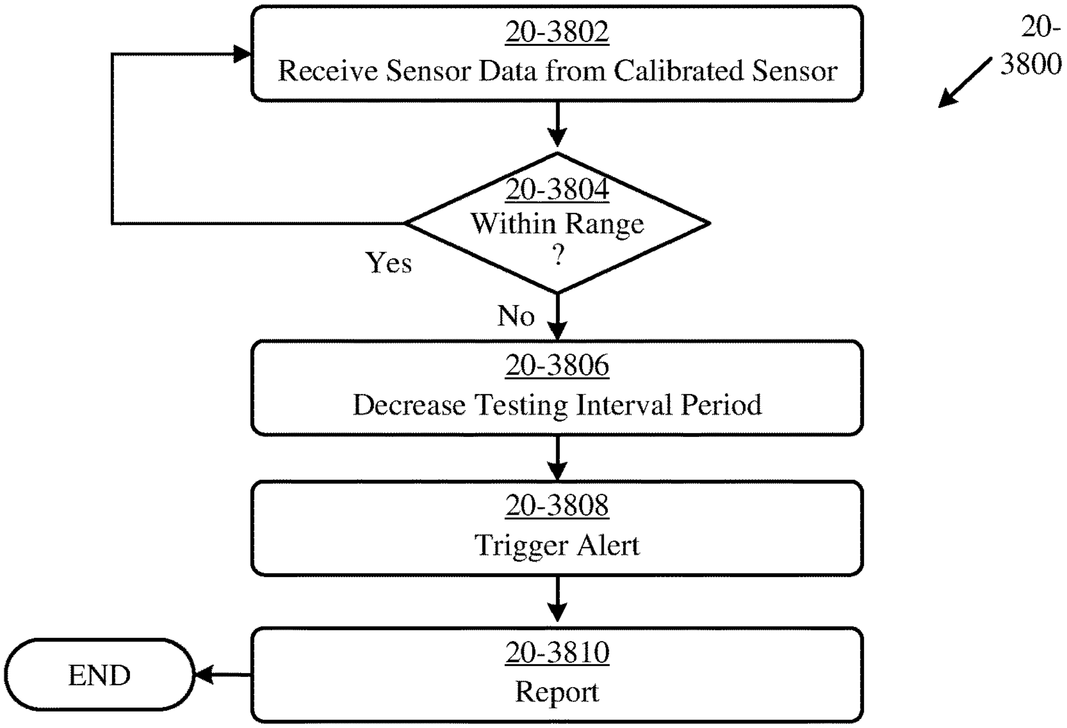
Figures 20, 21, 22, 23, 24, 25, 26, 27, 28, 29, 30, 31, 32, 33, 34, 35, 36, 37, 38, 38B:
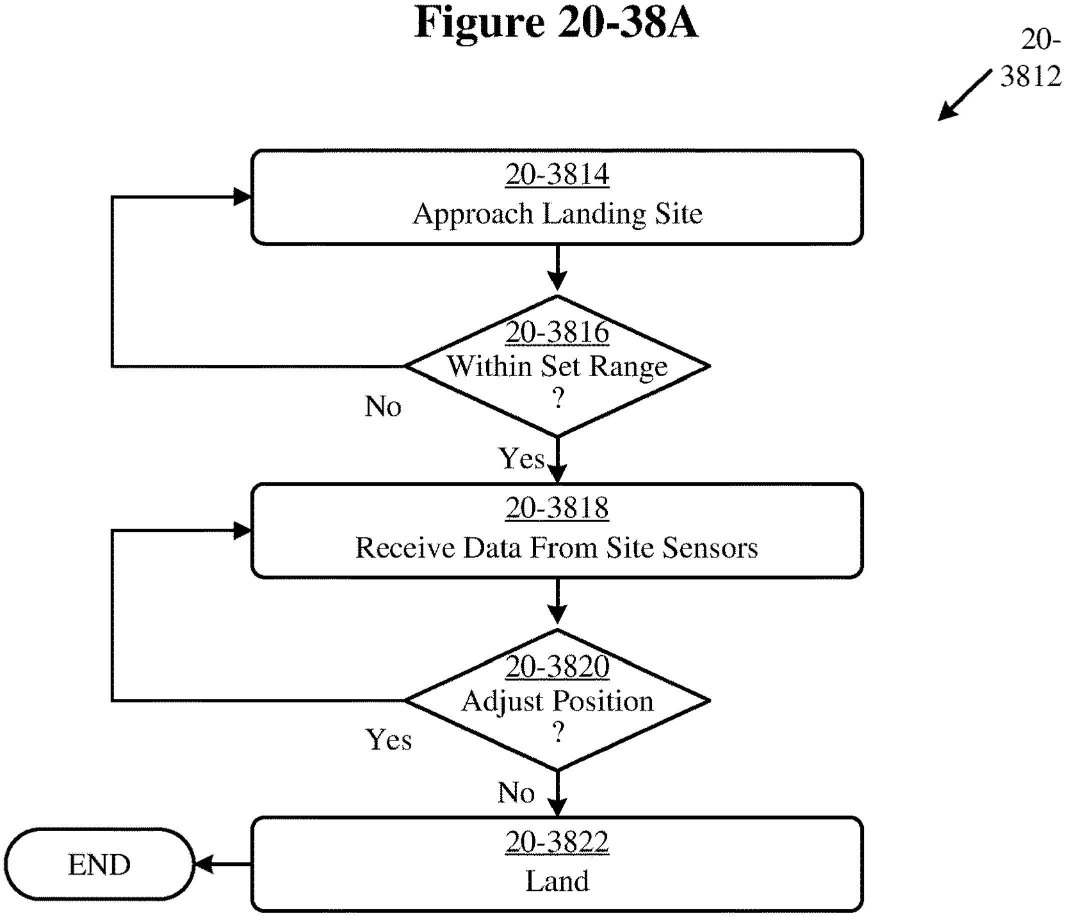
Figures 20, 21, 22, 23, 24, 25, 26, 27, 28, 29, 30, 31, 32, 33, 34, 35, 36, 37, 38, 39:
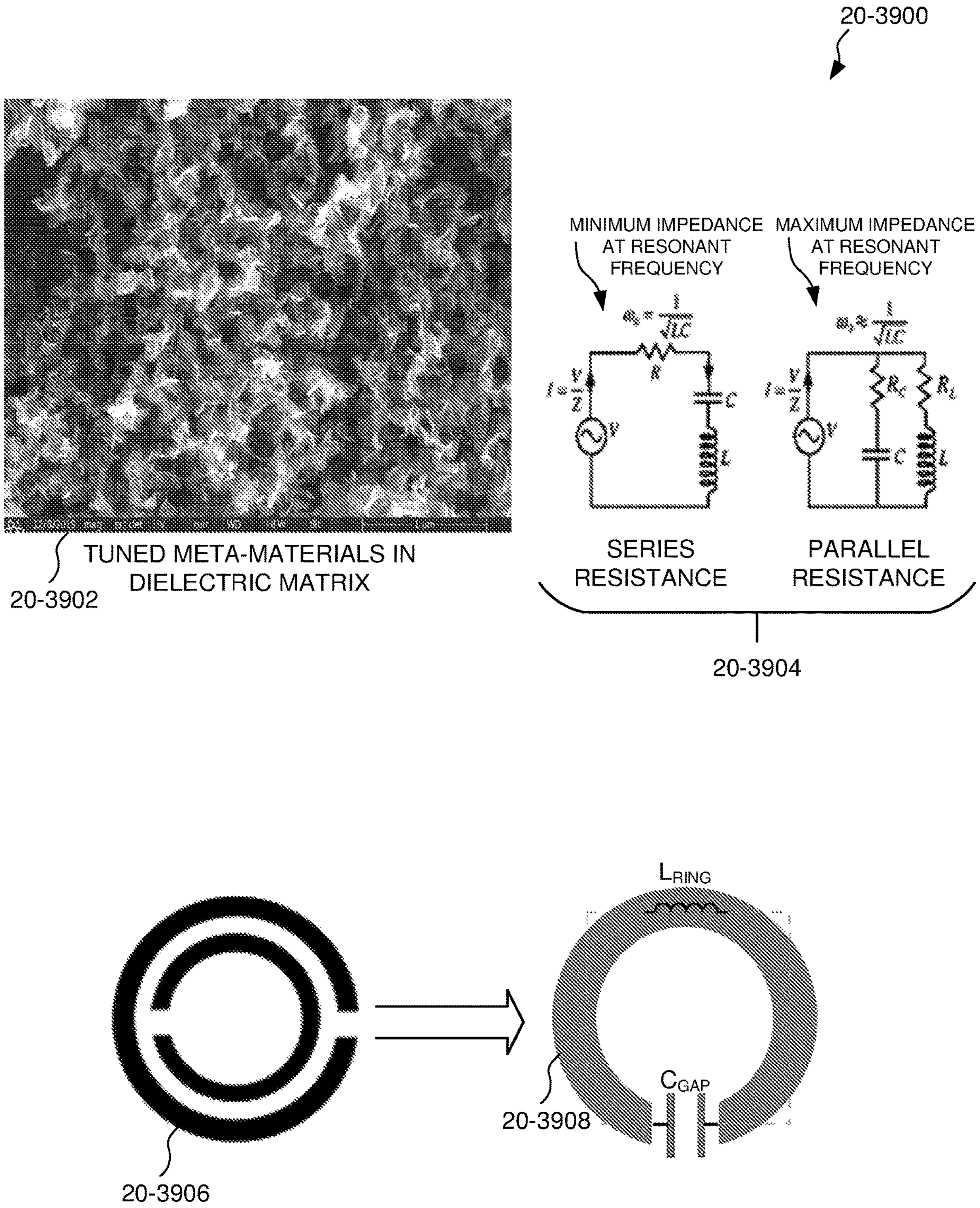
Figures 20, 21, 22, 23, 24, 25, 26, 27, 28, 29, 30, 31, 32, 33, 34, 35, 36, 37, 38, 39, 40:
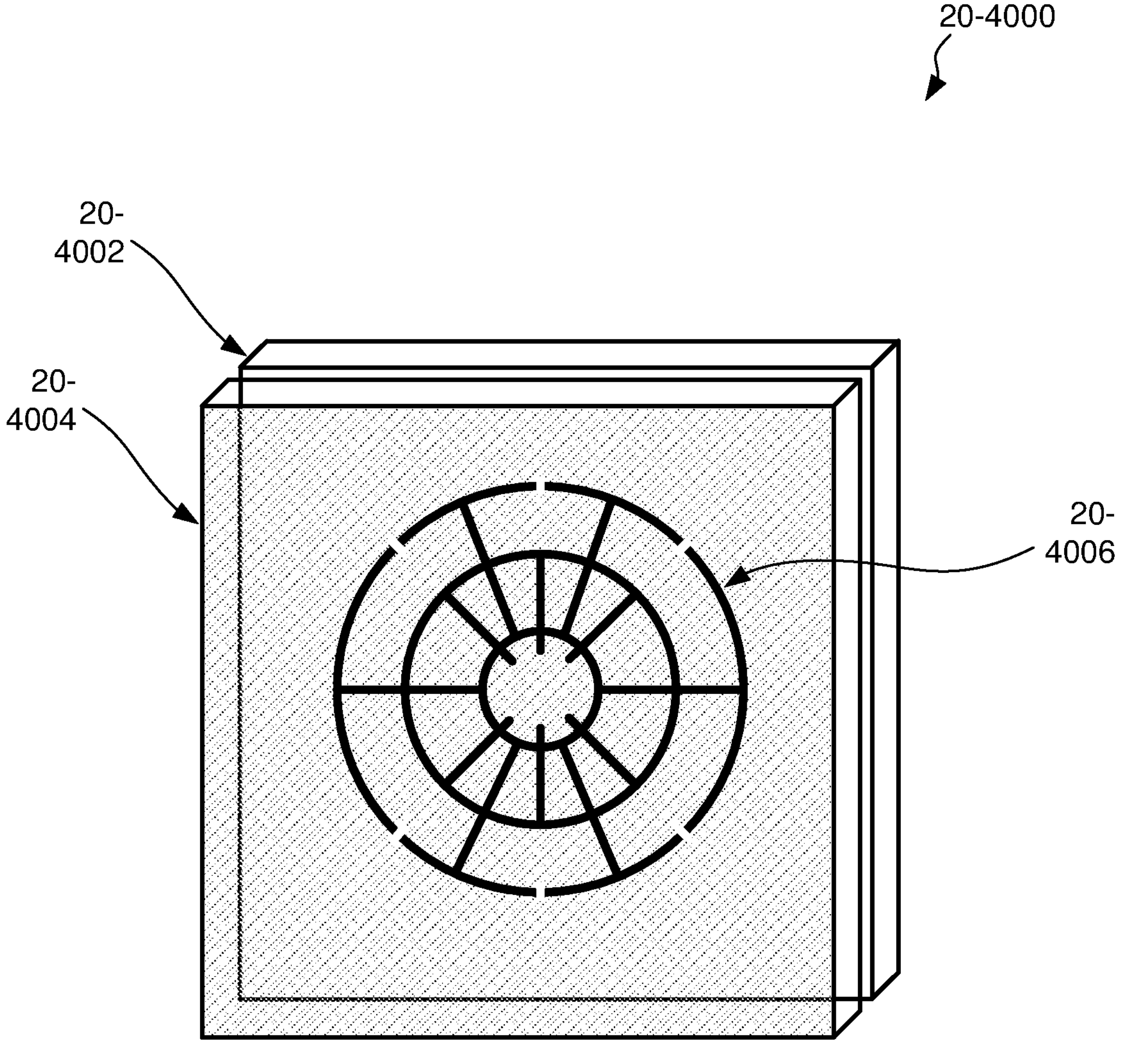
Figures 20, 21, 22, 23, 24, 25, 26, 27, 28, 29, 30, 31, 32, 33, 34, 35, 36, 37, 38, 39, 40, 41:
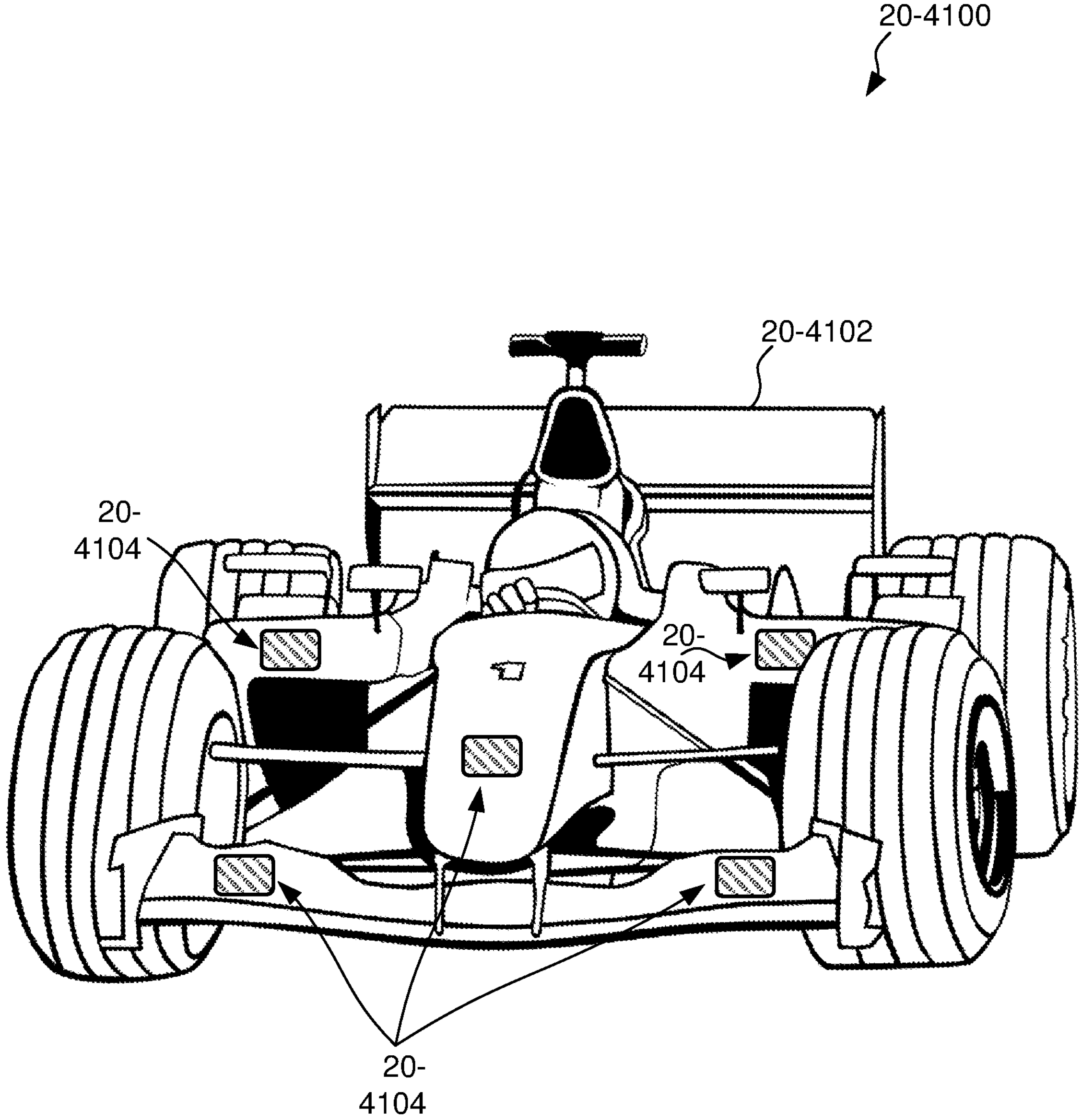
Figures 20, 21, 22, 23, 24, 25, 26, 27, 28, 29, 30, 31, 32, 33, 34, 35, 36, 37, 38, 39, 40, 41, 42:
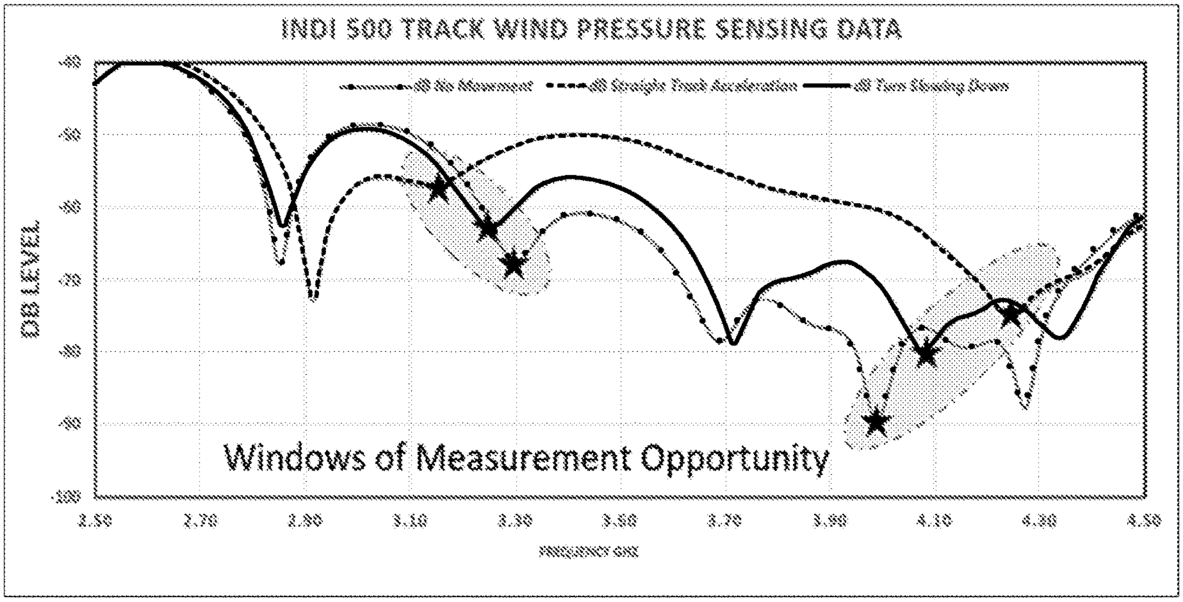
Figures 20, 21, 22, 23, 24, 25, 26, 27, 28, 29, 30, 31, 32, 33, 34, 35, 36, 37, 38, 39, 40, 41, 42, 43:
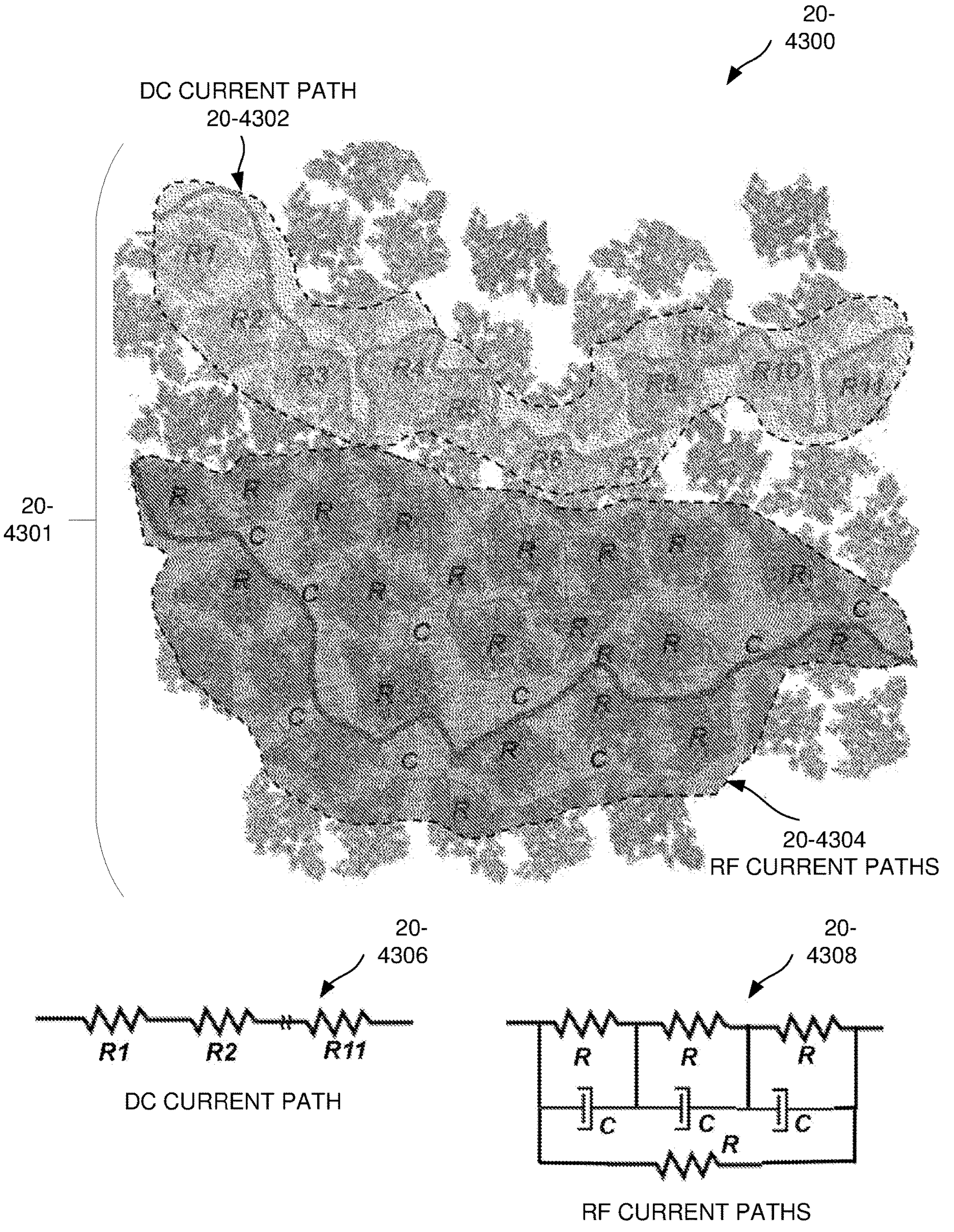
Figures 20, 21, 22, 23, 24, 25, 26, 27, 28, 29, 30, 31, 32, 33, 34, 35, 36, 37, 38, 39, 40, 41, 42, 43, 44:
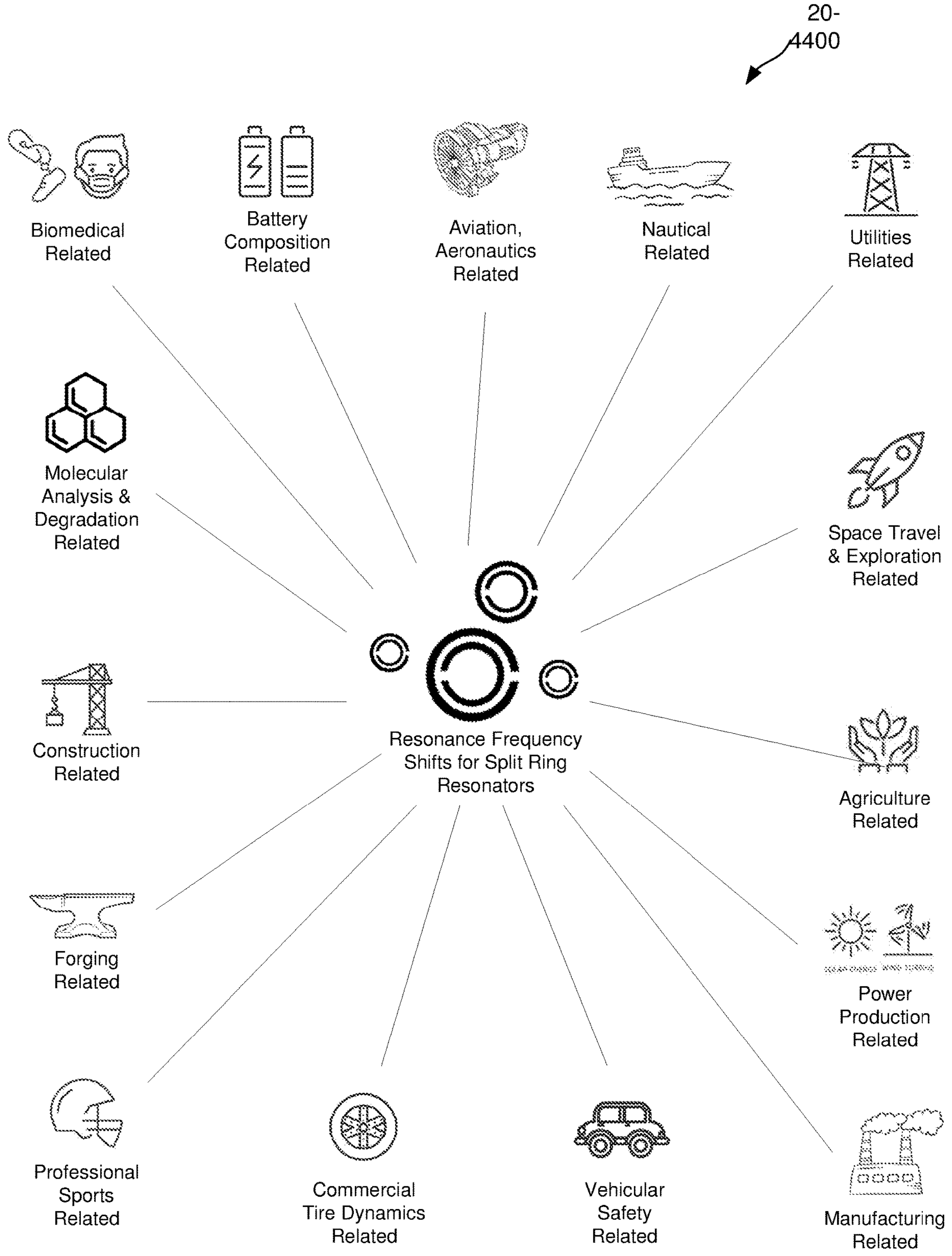
Figures 20, 21, 22, 23, 24, 25, 26, 27, 28, 29, 30, 31, 32, 33, 34, 35, 36, 37, 38, 39, 40, 41, 42, 43, 44, 45:
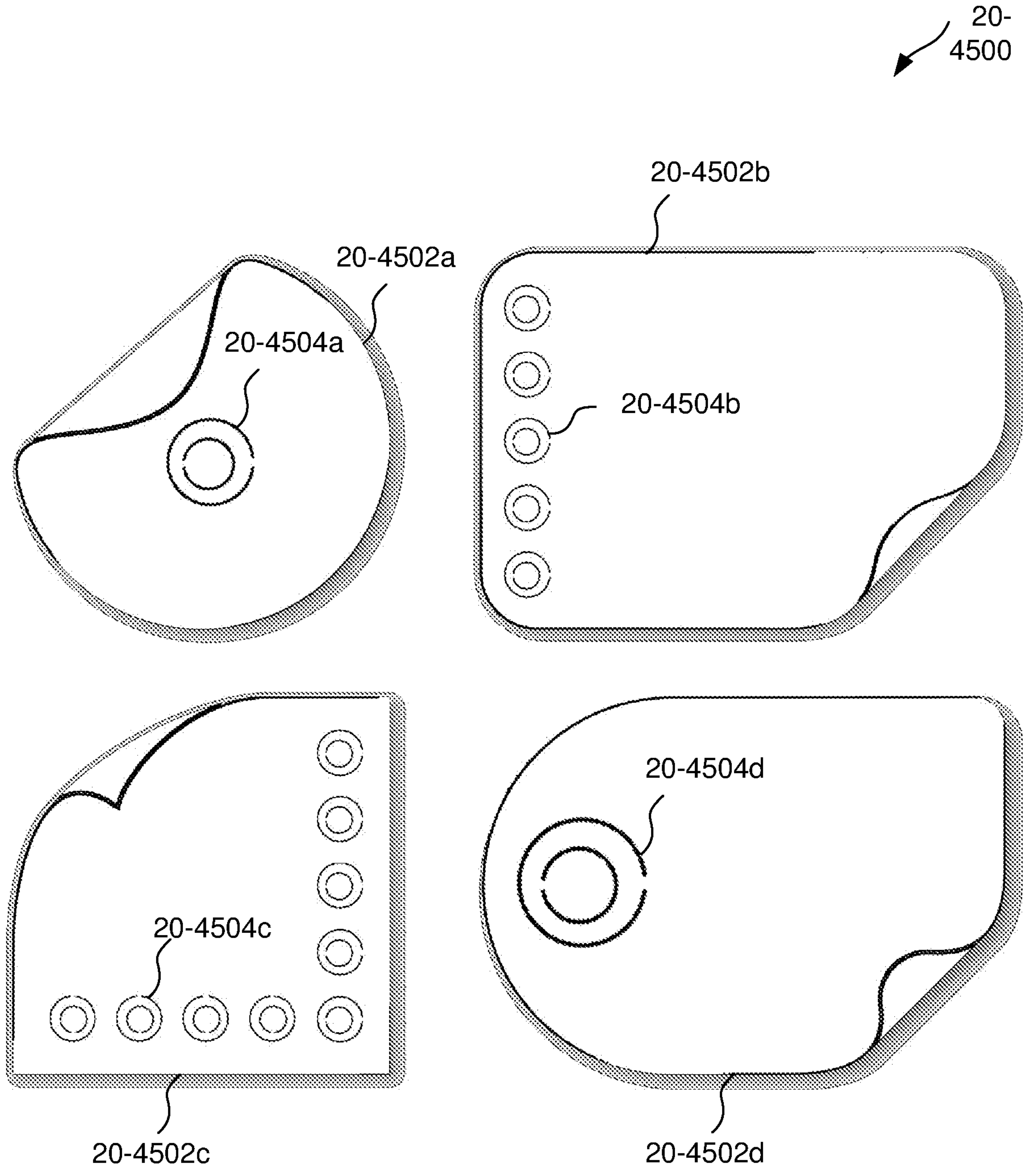
Figures 20, 21, 22, 23, 24, 25, 26, 27, 28, 29, 30, 31, 32, 33, 34, 35, 36, 37, 38, 39, 40, 41, 42, 43, 44, 45, 46:
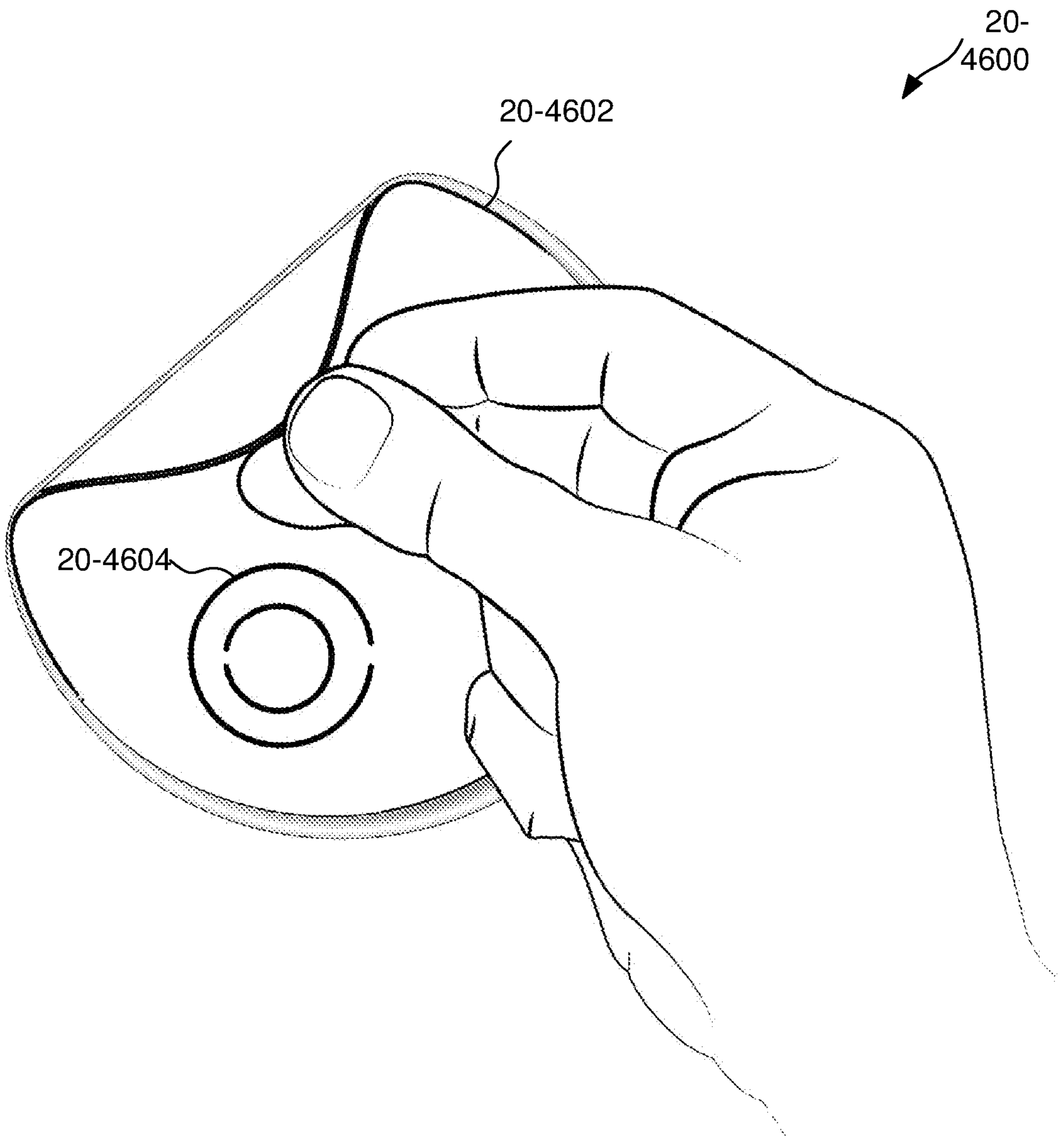
Figures 20, 21, 22, 23, 24, 25, 26, 27, 28, 29, 30, 31, 32, 33, 34, 35, 36, 37, 38, 39, 40, 41, 42, 43, 44, 45, 46, 47:
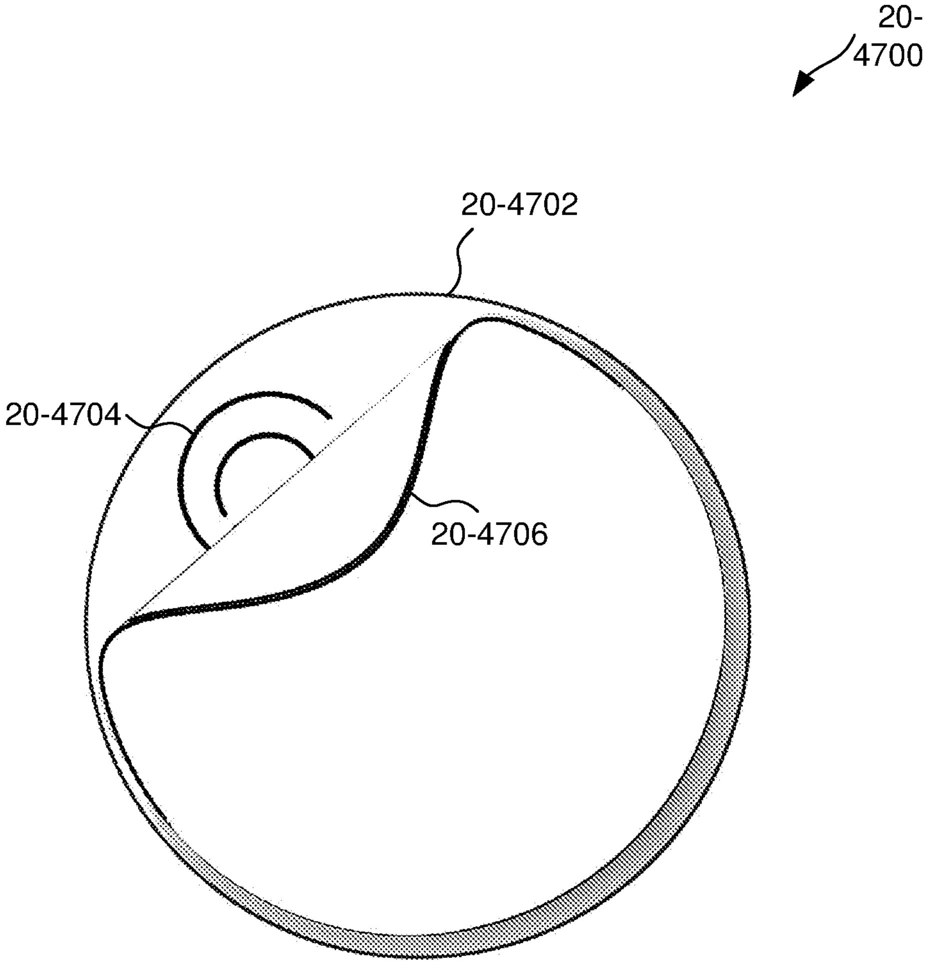
Figures 20, 21, 22, 23, 24, 25, 26, 27, 28, 29, 30, 31, 32, 33, 34, 35, 36, 37, 38, 39, 40, 41, 42, 43, 44, 45, 46, 47, 48:
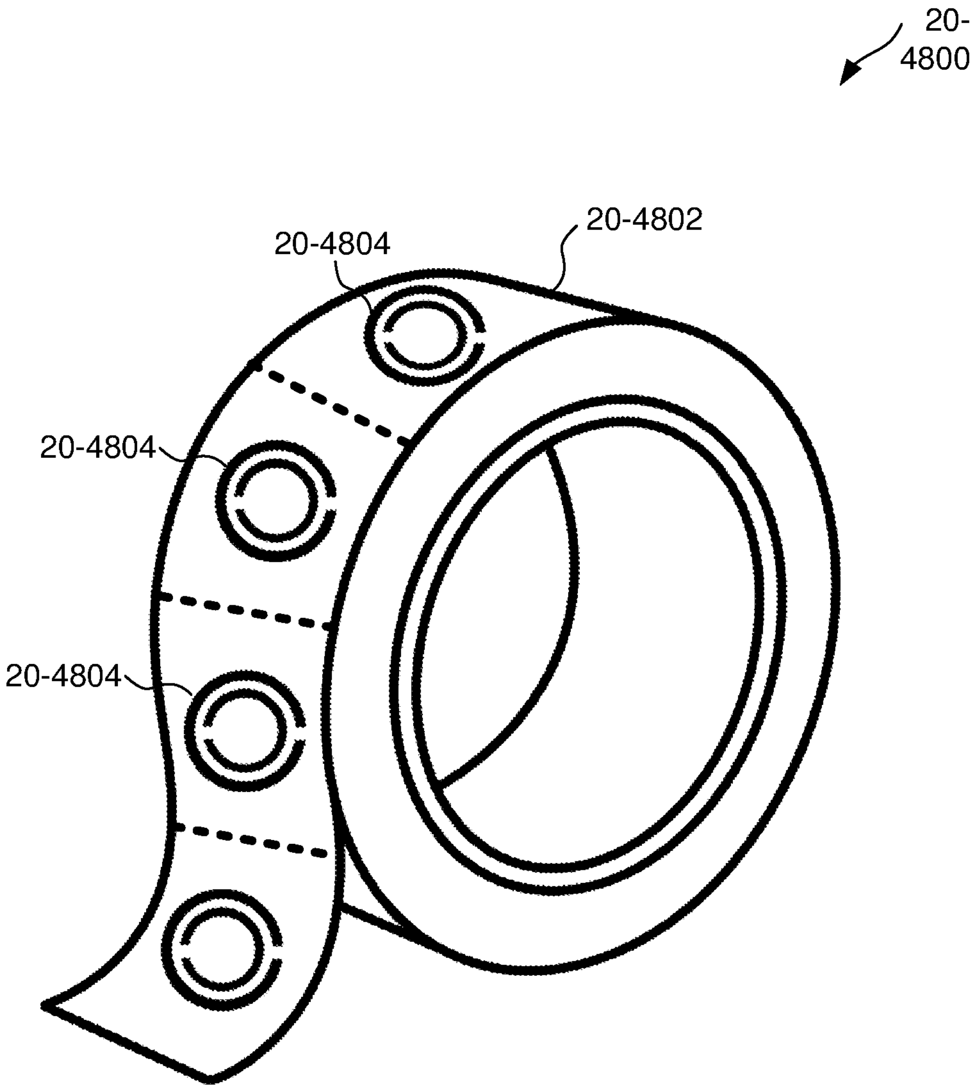
Figures 20, 21, 22, 23, 24, 25, 26, 27, 28, 29, 30, 31, 32, 33, 34, 35, 36, 37, 38, 39, 40, 41, 42, 43, 44, 45, 46, 47, 48, 49:
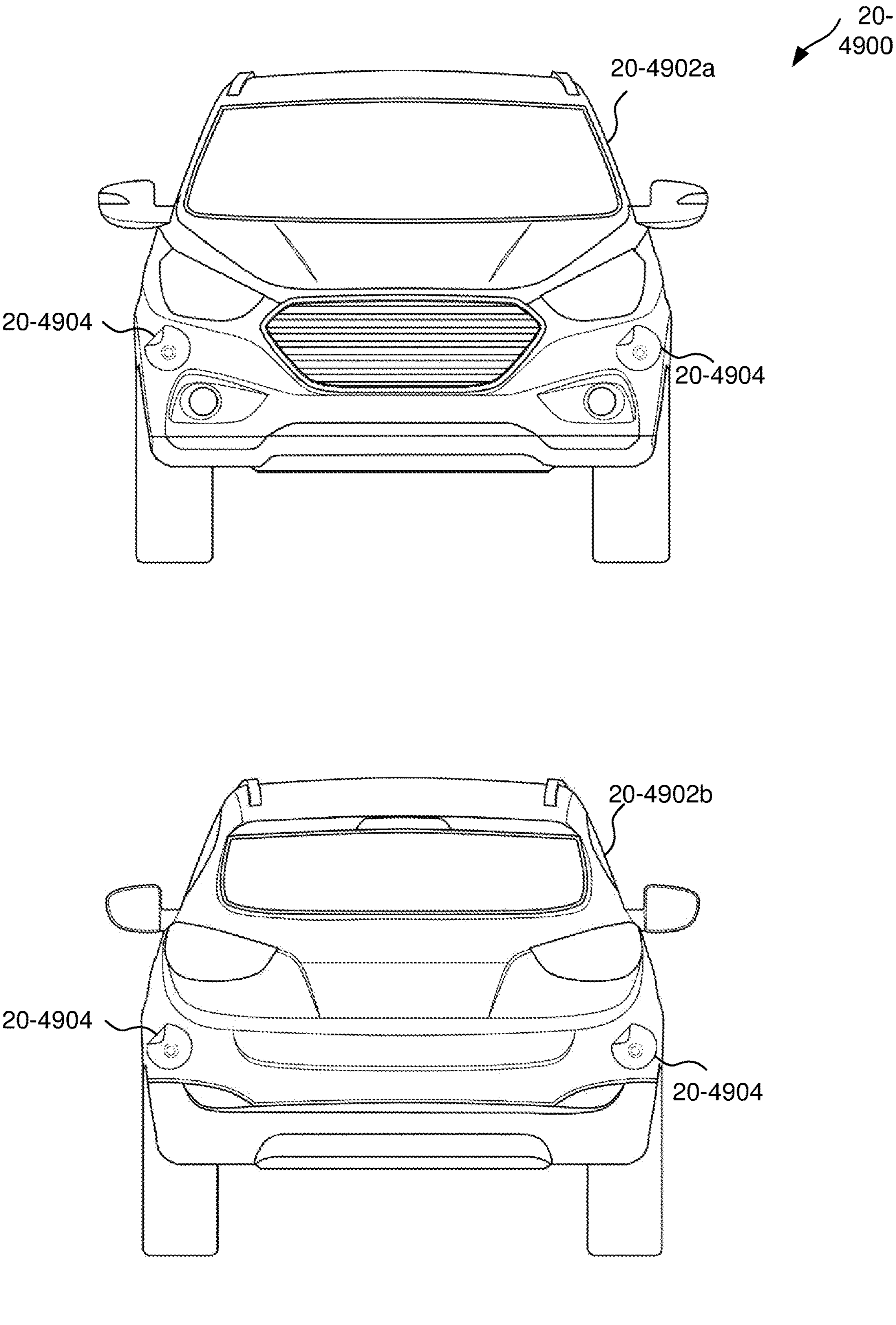
Figures 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50:
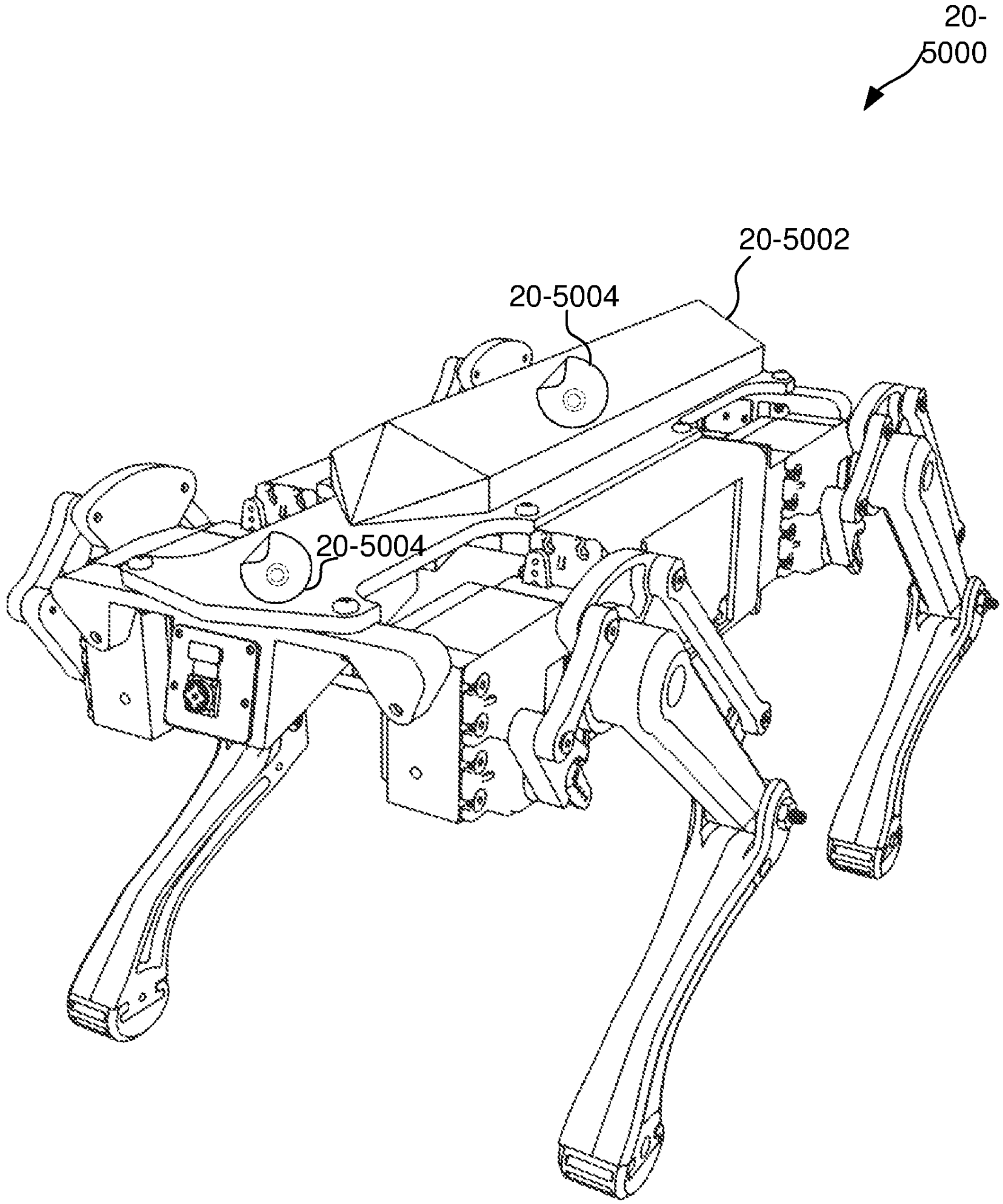
Figures 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51:
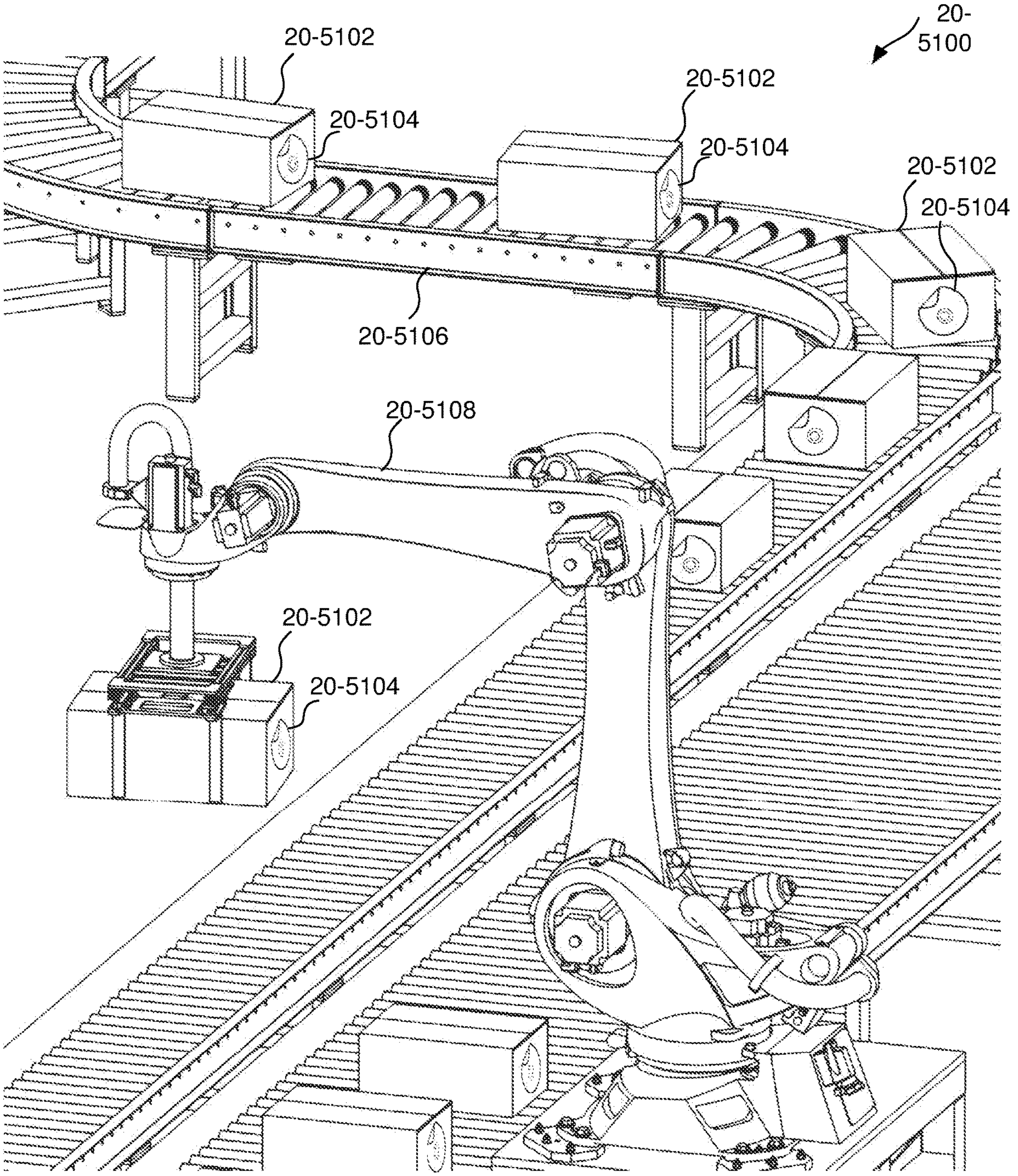
Figures 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52:
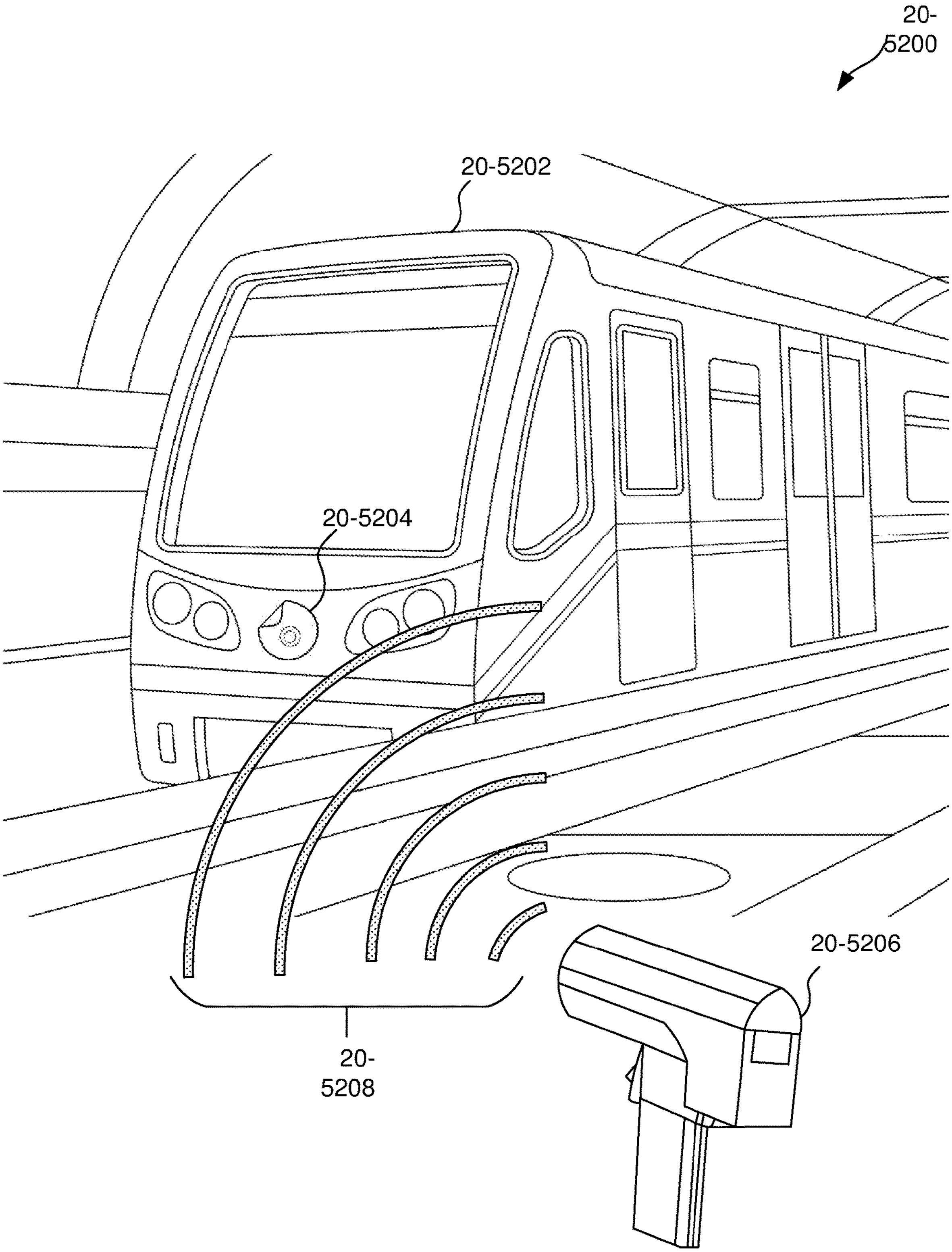
Figures 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53:
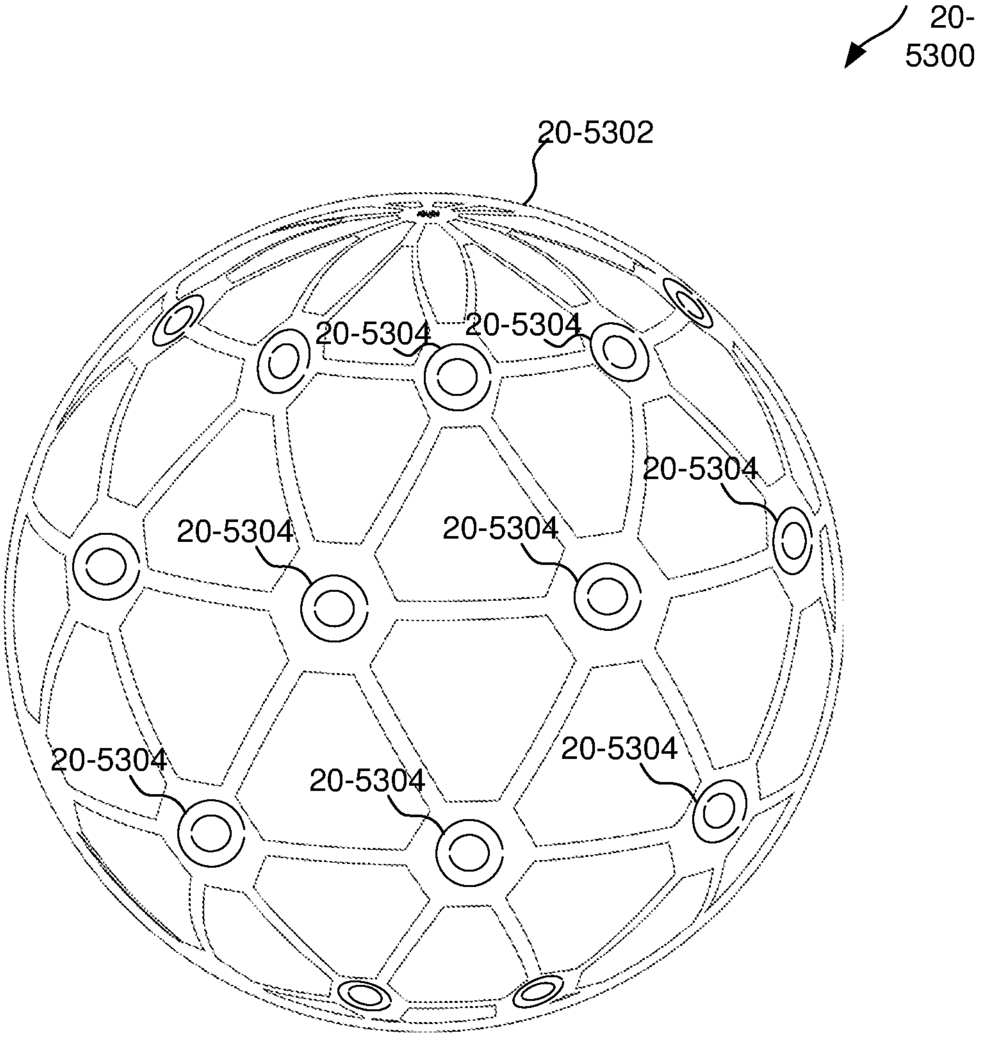
Figures 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54:
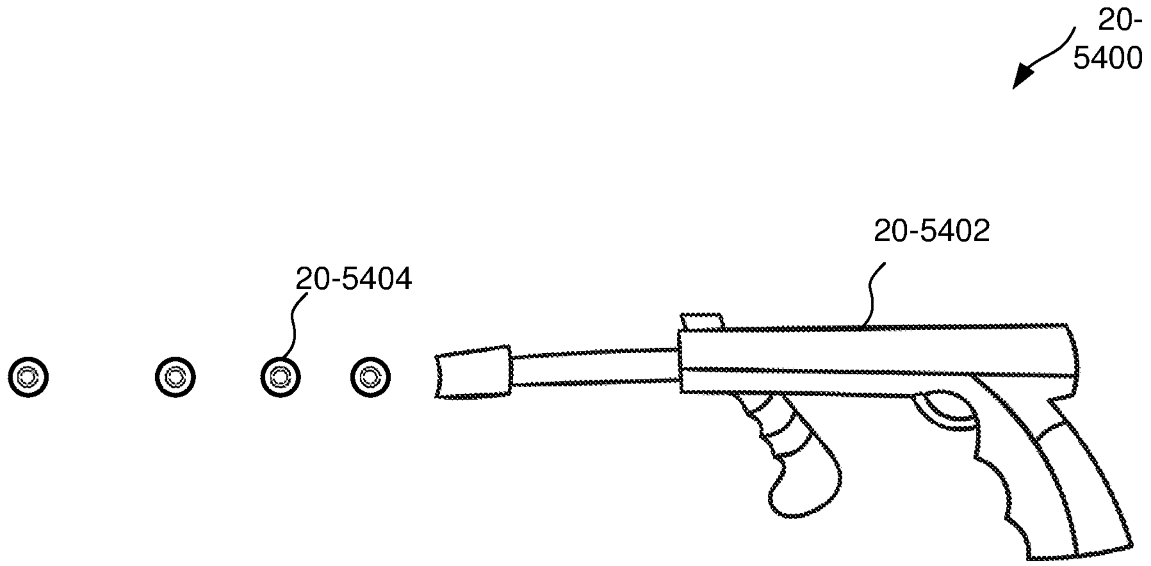
Figures 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55:
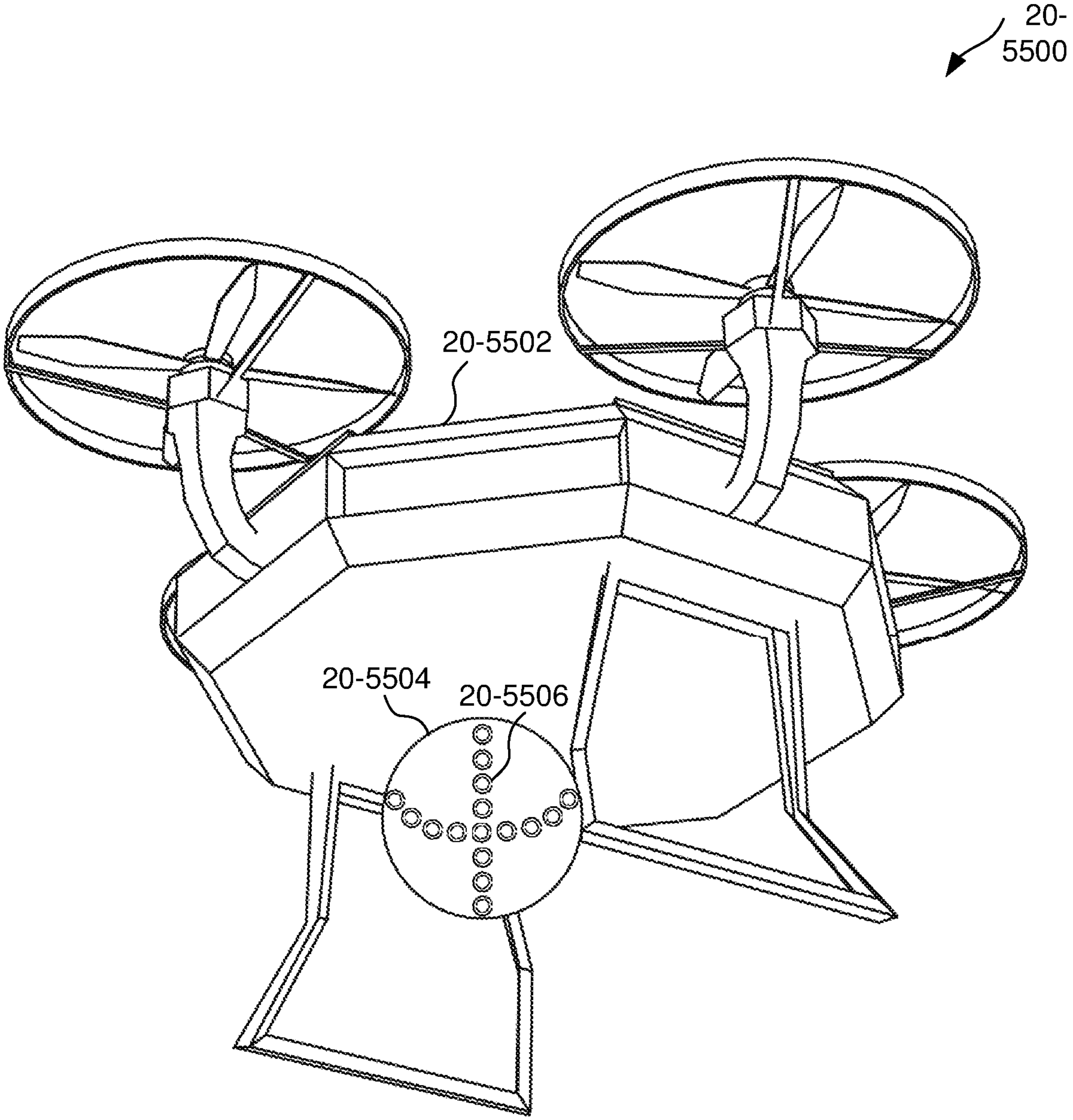
Figures 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56:
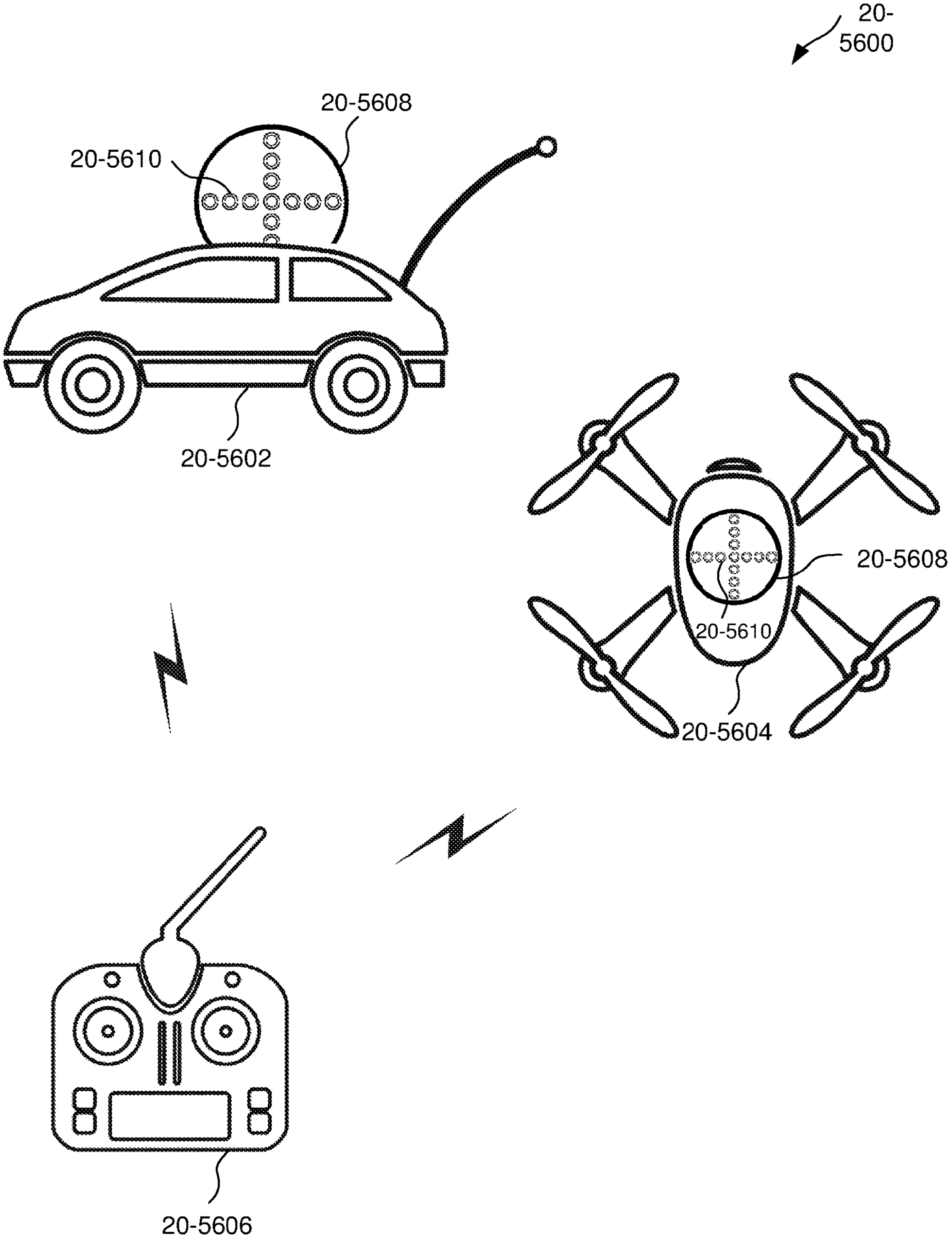

The particle size distribution of the carbon particles of FIG. 20-18N and FIG. 20-180 is shown in FIG. 20-18P. The mass basis cumulative particle size distribution 20-1806 corresponds to the left y-axis in the graph ($Q^3(x)$ [%]). The histogram of the mass particle size distribution 20-1808 corresponds to the right axis in the graph ($dQ^3(x)$[%]). The median particle size is approximately 33 μm. The 10th percentile particle size is approximately 9 μm, and the 90th percentile particle size is approximately 103 μm. The mass density of the particles is approximately 10 g/L.

Example 4

The particle size distribution of the carbon particles captured from a multiple-stage reactor is shown in FIG. 20-18Q. The mass basis cumulative particle size distribution 20-1814 corresponds to the left y-axis in the graph ($Q^3(x)$ [%]). The histogram of the mass particle size distribution 20-1816 corresponds to the right axis in the graph ($dQ^3(x)$ [%]). The median particle size captured is approximately 11 μm. The 10th percentile particle size is approximately 3.5 μm, and the 90th percentile particle size is approximately 21 μm. The graph in FIG. 20-18Q also shows the number basis cumulative particle size distribution 20-1818 corresponding to the left y-axis in the graph ($Q^0(x)$[%]). The median particle size by number basis is from approximately 0.1 μm to approximately 0.2 μm.

Returning to the discussion of FIG. 20-18P, the graph also shows a second set of example results. Specifically, in this example, the particles were size-reduced by mechanical grinding, and then the size-reduced particles were processed using a cyclone separator. The mass basis cumulative particle size distribution 20-1810 of the size-reduced carbon particles captured in this example corresponds to the left y-axis in the graph ($Q^3(x)$[%]). The histogram of the mass basis particle size distribution 20-1812 corresponds to the right axis in the graph ($dQ^3(x)$[%]). The median particle size of the size-reduced carbon particles captured in this example is approximately 6 μm. The 10th percentile particle size is from 1 μm to 2 μm, and the 90th percentile particle size is from 10 μm to 20 μm.

Further details pertaining to making and using cyclone separators can be found in U.S. patent application Ser. No. 15/725,928, filed Oct. 5, 2017, titled "MICROWAVE REACTOR SYSTEM WITH GAS-SOLIDS SEPARATION", which is hereby incorporated by reference in its entirety for all purposes.

In some cases, carbon particles and aggregates containing graphite, graphene and amorphous carbon can be generated using a microwave plasma reactor system using a precursor material that contains methane, or contains isopropyl alcohol (IPA), or contains ethanol, or contains a condensed hydrocarbon (such as, hexane). In some other examples, the carbon-containing precursors are optionally mixed with a supply gas (such as, argon). The particles produced in this example contained graphite, graphene, amorphous carbon, and no seed particles. The particles in this example had a ratio of carbon to other elements (other than hydrogen) of approximately 99.5% or greater.

In one particular example, a hydrocarbon was the input material for the microwave plasma reactor, and the separated outputs of the reactor comprised hydrogen gas and carbon particles containing graphite, graphene, and amorphous carbon. The carbon particles were separated from the hydrogen gas in a multi-stage gas-solid separation system. The solids loading of the separated outputs from the reactor was from 0.001 g/L to 2.5 g/L.

Example 5

FIG. 20-18R, FIG. 20-18S, and FIG. 20-18T are TEM images of as-synthesized carbon nanoparticles. The images show examples of graphite, graphene, and amorphous carbon allotropes. The layers of graphene and other carbon materials can be clearly seen in the images.

The particle size distribution of the carbon particles captured is shown in FIG. 20-18U. The mass basis cumulative particle size distribution 20-1820 corresponds to the left y-axis in the graph ($Q^3(x)[\%]$). The histogram of the mass particle size distribution 20-1822 corresponds to the right axis in the graph ($dQ^3(x)[\%]$). The median particle size captured in the cyclone separator in this example was approximately 14 μm. The 10th percentile particle size was approximately 5 μm, and the 90th percentile particle size was approximately 28 μm. The graph in FIG. 20-18U also shows the number basis cumulative particle size distribution 20-1824 corresponding to the left y-axis in the graph ($Q^0(x)$ [%]). The median particle size by number basis in this example was from approximately 0.1 μm to approximately 0.2 μm.

FIG. 20-18V, FIG. 20-18W, and FIGS. 20-18X, and 20-18Y are images that show three-dimensional carbon-containing structures that are grown onto other three-dimensional structures. FIG. 20-18V is a 100× magnification of three-dimensional carbon structures grown onto carbon fibers, whereas FIG. 20-18W is a 200× magnification of three-dimensional carbon structures grown onto carbon fibers. FIG. 20-18X is a 1601× magnification of three-dimensional carbon structures grown onto carbon fibers. The three-dimensional carbon growth over the fiber surface is shown. FIG. 20-18Y is a 10000× magnification of three-dimensional carbon structures grown onto carbon fibers. The image depicts growth onto the basal plane as well as onto edge planes.

More specifically, FIGS. 18V-20-18Y show example SEM images of 3D carbon materials grown onto fibers using plasma energy from a microwave plasma reactor as well as thermal energy from a thermal reactor. FIG. 20-18V shows an SEM image of intersecting fiber 20-1831 and fiber 20-1832 with 3D carbon material 20-1830 grown on the surface of the fibers. FIG. 20-18W is a higher magnification image (the scale bar is 300 μm compared to 500 μm for FIG. 20-18V) showing the 3D carbon material 20-1830 on the fiber 20-1832. FIG. 20-18X is a further magnified view (scale bar is 40 μm) showing the 3D carbon material 20-1830 on fiber surface 20-1835, where the 3D nature of the 3D carbon material 20-1830 can be clearly seen. FIG. 20-18Y shows a close-up view (scale bar is 500 nm) of the carbon alone, showing interconnection between basal planes of the fiber 20-1832 and edge planes 20-1834 of numerous sub-particles of the 3D carbon material grown on the fiber. FIGS. 20-18V-20-18Y demonstrate the ability to grow 3D carbon on a 3D fiber structure, such as 3D carbon growth grown on a 3D carbon fiber.

3D carbon growth on fibers can be achieved by introducing a plurality of fibers into the microwave plasma reactor and using plasma in the microwave reactor to etch the fibers. The etching creates nucleation sites such that when carbon particles and sub-particles are created by hydrocarbon dissociation in the reactor, growth of 3D carbon structures is initiated at these nucleation sites. The direct growth of the 3D carbon structures on the fibers, which themselves are three-dimensional in nature, provides a highly integrated, 3D structure with pores into which resin can permeate. This 3D reinforcement matrix (including the 3D carbon structures integrated with high aspect ratio reinforcing fibers) for a resin composite results in enhanced material properties, such as tensile strength and shear, compared to composites with conventional fibers that have smooth surfaces, and which smooth surfaces typically delaminate from the resin matrix.

Carbon materials, such as any one or more of the 3D carbon materials described herein, can have one or more exposed surfaces prepared for functionalization, such as that to promote adhesion and/or add elements such as oxygen, nitrogen, carbon, silicon, or hardening agents. Functionalization refers to the addition of functional groups to a compound by chemical synthesis. In materials science, functionalization can be employed to achieve desired surface properties; for instance, functional groups can also be used to covalently link functional molecules to the surfaces of chemical devices. The carbon materials can be functionalized in-situ—that is, on site within the same reactor in which the carbon materials are produced. The carbon materials can be functionalized in post-processing. For example, the surfaces of fullerenes or graphene can be functionalized with oxygen- or nitrogen-containing species which form bonds with polymers of the resin matrix, thus improving adhesion and providing strong binding to enhance the strength of composites.

Functionalizing surface treatments can be performed on any one or more of the disclosed carbon-based materials (such as, CNTs, CNO, graphene, 3D carbon materials such as 3D graphene) utilizing plasma reactors (such as, microwave plasma reactors) described herein. Such treatments can include in-situ surface treatment during creation of carbon materials that can be combined with a binder or polymer in a composite material, or surface treatment after creation of the carbon materials while the carbon materials are still within the reactor.

Some of the foregoing embodiments include resonators that include a plurality of three-dimensional (3D) aggregates formed of carbon-containing material that is embedded within a ply or plies of tire. However, some embodiments include resonators that are printed or otherwise disposed on an inner surface of a tire (e.g., on an inner liner of the tire).

FIG. 20-19A1 provides a depiction 20-19A100 of a split ring resonator, or plurality of split ring resonators, being placed in concrete before the concrete is to be poured into a given structural form, in accordance with one embodiment. As an option, the depiction 20-19A100 may be implemented in the context of any one or more of the embodiments set forth in any previous and/or subsequent figure(s) and/or description thereof. Of course, however, the depiction 20-19A100 may be implemented in the context of any desired environment. Further, the aforementioned definitions may equally apply to the description below.

As shown in FIG. 20-19A1, split ring resonators can be incorporated into the concrete pour 20-1902. A split ring resonator, or a plurality of split ring resonators 20-1904 split ring resonators 20-1904, can be mixed into the concrete 20-1906 while in a mixing vessel, or a split ring resonator, or a plurality of split ring resonators, can be mixed into the concrete while the concrete is mid-stream during the pouring process.

The split ring resonator, or a plurality of split ring resonators 20-1904 split ring resonators 20-1904, can be captured within the concrete pour 20-1902. The split ring resonators can be captured within the form in any orientation, but may likely settle near the bottom of the structural element; for instance, where any given split ring resonator can be oriented such that the normal vector from the plane of the split ring resonator is substantially vertical, or any given split ring resonator can be oriented such that the normal vector from the plane of the split ring resonator is substantially horizontal, or any given split ring resonator can be oriented such that the normal vector from the plane of the split ring resonator is on an angle between vertical and horizontal.

In certain situations, the split ring resonator will be captured within the form at a location that is relatively proximal to a form boundary. In other cases, the split ring resonator will end up within the form at a location that is relatively distal to a form boundary. This is because of the natural tendencies (e.g., fluid dynamics) of foreign object (e.g., split ring resonators) to locate randomly within a concrete pour 20-1902. Regardless of the location of the split ring resonator in the form, the techniques for pinging a split ring resonator with a signal and for receiving a return signal are operable. More specifically, since the signal to noise ratio is so wide (see the 18 dB separation as shown in FIG. 20-17), the return signal from any given split ring resonator at any particular location can be received and processed so as to facilitate comparison to a calibration signal. This technique can be applied to various structures, one such example can be seen in FIG. 20-19A1 which illustrates a vertically oriented concrete structural member.

The foregoing example pertains to a vertically-oriented concrete structural member, however the herein-disclosed techniques also apply when forming a horizontally oriented concrete structural member (or a concrete structure member at any angle).

FIG. 20-19A2 provides a depiction 20-19A200 of a split ring resonator, or plurality of split ring resonators, being placed in concrete before the concrete is to be poured into a given structural form, in accordance with one embodiment. As an option, the depiction 20-19A200 may be implemented in the context of any one or more of the embodiments set forth in any previous and/or subsequent figure(s) and/or description thereof. Of course, however, the depiction 20-19A200 may be implemented in the context of any desired environment. Further, the aforementioned definitions may equally apply to the description below.

In one embodiment, FIG. 20-19A2 shows a split ring resonator, or a plurality of split ring resonators 20-1904 split ring resonators 20-1904 that can be incorporated onto the concrete pour 20-1902 when pouring for a slab 20-1910. A split ring resonator, or a plurality of split ring resonators 20-1904 split ring resonators 20-1904 can be mixed into the concrete 20-1906 while in a mixing vessel, or a split ring resonator, or a plurality of split ring resonators 20-1904 split ring resonators 20-1904 can be mixed into the concrete 20-1906 while the concrete is mid-stream during the pouring process.

The split ring resonator, or a plurality of split ring resonators 20-1904 split ring resonators 20-1904 can be captured within the concrete pour 20-1902, and within the form at any orientation. For example, any given split ring resonator can be oriented such that the normal vector from the plane of the split ring resonator is substantially vertical, or any given split ring resonator can be oriented such that the normal vector from the plane of the split ring resonator is substantially horizontal, or any given split ring resonator can be oriented such that the normal vector from the plane of the split ring resonator is on an angle between vertical and horizontal. The split ring resonator, or a plurality of split ring resonators 20-1904 split ring resonators 20-1904 may be, in one embodiment, distributed closer to the walls of the horizontally-oriented concrete structural member 20-1914. In certain embodiments, the split ring resonator, or a plurality of split ring resonators 20-1904 split ring resonators 20-1904 may end up within the form at a location that is relatively proximal to the top surface of the horizontally-oriented concrete structural member 20-1914. In certain other embodiments, the split ring resonator, or a plurality of split ring resonators 20-1904 split ring resonators 20-1904 may relatively be proximal to bottom surface of the horizontally-oriented concrete structural member 20-1914. Still yet, the split ring resonator, or a plurality of split ring resonators 20-1904 split ring resonators 20-1904 may be oriented, integrated into, and/or affixed to rebar (or other support structure within the concrete member) such that a location of the split ring resonator, or a plurality of split ring resonators 20-1904 split ring resonators 20-1904 may be maintained during the concrete pour 20-1902 to the concrete member.

In various embodiments, FIGS. 20-19A1 and 20-19A2 depict one embodiment of a split ring resonator, or multiple split ring resonators, being placed in concrete before the concrete is to be poured into a given structural form (e.g., vertically-oriented concrete structural member, horizontally-oriented concrete structural member). Further, FIGS. 20-19A1 and 20-19A2 are presented to illustrate, in one embodiment, how a split ring resonator (e.g., of a ring-type, or of a cylinder-type), or a plurality of split ring resonators 20-1904 split ring resonators 20-1904 (e.g., of ring-types, or of cylinder-types, or of combinations thereof) can be incorporated into a concrete mixture in advance of pouring the concrete into a form. The form can be of any shape. Strictly as examples, and as shown in FIG. 20-19A1, the form can be configured to receive a pour for a vertically-oriented concrete structural member 20-1912 (e.g., the shown column or wall 20-1908). Additionally, or alternatively, and as shown in FIG. 20-19A2, the form can be configured to receive a pour for a horizontally-oriented concrete structural member 20-1914 (e.g., the shown slab 20-1910).

Regardless of the location of the split ring resonator in the form (e.g., at the top surface, at the bottom, within the concrete, etc.), the techniques for pinging a split ring resonator with a signal and for receiving a return signal may be maintained and operable. More specifically, since the signal to noise ratio is so wide (see the 18 dB separation as shown in FIG. 20-17), the return signal from any given split ring resonator at any particular location may be received and processed so as to facilitate comparison to an earlier captured calibration signal.

In one embodiment, the aforementioned calibration signal may be captured once the pour has cured. Such a calibration signal can be stored in a database, and/or any system that holds specified information. At a later time, the structural member may be interrogated with a ping signal and its then-current return signal can be compared to the corresponding calibration signal. In one embodiment, a difference between the later-captured signal and the calibration signal may be indicative of a change in compression between the time that the calibration signal was captured and the time that the interrogation is carried out.

A similar approach can be applied in the presence of a plurality of split ring resonators that are dispersed throughout the structural member. Specifically, pinging in a region of the structural member where there are many split ring resonators in substantially the same location would return a calibration signal that can also be stored in a database, or any other system that can store information. Again, at any later time, the structural member can be interrogated with a ping signal and its then-current return signal can be compared to a corresponding calibration signal. If a difference is determined between the two signals, this phenomenon can be indicative of a change in the structure and or its constituent materials. There are many possible techniques for analyzing a change in response (e.g., due to compression, or due to flexure, etc.), some of which techniques are shown and described as pertains to FIG. 20-19B1.

FIG. 20-19B1 shows a depiction 20-19B00 of columns containing the split ring resonator, or plurality of split ring resonators, and an equation for measuring the change within the structural members, in accordance with one embodiment. As an option, the depiction 20-19B00 may be implemented in the context of any one or more of the embodiments set forth in any previous and/or subsequent figure(s) and/or description thereof. Of course, however, the depiction 20-19B00 may be implemented in the context of any desired environment. Further, the aforementioned definitions may equally apply to the description below.

As shown, the depiction 20-19B00 shows cured columns containing a split ring resonator, or plurality of split ring resonators 20-1904 split ring resonators 20-1904, and various equations for measuring the change within the structural members. Additionally, a change in the compression 20-1916 of the materials surrounding the split ring resonators 20-1904 initiates a change in response 20-1922 from the split ring resonators (as shown in FIG. 20-19B2). Further, FIG. 20-19B1 shows an example equation for measuring the degree of compression within the structural members (as a function of change in compression) Eq. 20-6. Additionally, although Eq. 20-6 is shown relating to compression, and Eq. 20-7 (hereinbelow) is shown relating to change in response, it is to be appreciated that any change torsion, hygrometry (humidity), flexion, response, material property, etc. may be the basis for determining and/or measuring a change of the split ring resonator(s).

In one embodiment, one use model may support structural assessment of an infrastructure's concrete foundation (e.g., apartment complex, condominiums, homes, hotels). Additionally, a one use model may support structural assessment of a building's infrastructure in general, including monitoring of steel beams, support columns/pillars, and other aspects of structural health monitoring. Ongoing or periodic monitoring of the integrity of the material over time can indicate whether or not the material that forms the structure has been altered, for example due to aging, excessive or related stresses, and/or due to physical damage, etc. In some cases, it may be possible to prevent imminent failure of the materials so as to avoid a catastrophe. In some situations, multiple structural members can combine into one load-bearing structure, the entirety of which load-bearing structure is to be monitored over time. Calibration and periodic monitoring could be accomplished, for example, in a two-step fashion. In a first step, a technician operating a signal generator (or similar tool), tunes the signal generator to a selected frequency and emits a signal proximal to the split ring resonators in a structural member. A return signal and/or its characteristics (e.g., attenuation, single frequency resonance, multiple frequency resonance, etc.) from the split ring resonators is captured. The technician stores the return signal and/or its characteristics as a calibration point pertaining to a ping of that location and at that given point in time. The return signal and/or its characteristics is later used as a calibration signature corresponding to the point in time when the material is deemed to have a baseline state of structural integrity.

In a second step, carried out at any later time after the first step, the technician may repeat the pinging and signature capturing process to gather then-current data returned by the split ring resonators in the structural member. A comparison between the calibration signature and the then-current data may potentially be indicative of changes in the integrity of the material. In one embodiment, a change in response 20-1918 might be merely indicative of a change in compression. Certain ranges of changes of compression over time may be considered to be normal, and may occur in normal use (e.g., as the structure flexes under stresses from Earth movements such as earth tremors). In addition to the foregoing technique for measuring changes in compression, further techniques are presented hereunder as pertains to measuring changes in flexure.

FIG. 20-19B2 shows a depiction 20-19B02 of columns containing the split ring resonator, or plurality of split ring resonators, and an equation for measuring the change within the structural members, in accordance with one embodiment. As an option, the depiction 20-19B02 may be implemented in the context of any one or more of the embodiments set forth in any previous and/or subsequent figure(s) and/or description thereof. Of course, however, the depiction 20-19B02 may be implemented in the context of any desired environment. Further, the aforementioned definitions may equally apply to the description below.

In one embodiment, the depiction 20-19B02 shows a cured slab containing the split ring resonator, or plurality of split ring resonators 20-1904 split ring resonators 20-1904, and an example equation for measuring the degree of flexion within the structural members (as a function of change in flexion) Eq. 20-7. Additionally, a change in the flexion 20-1920 of the materials surrounding the split ring resonators 20-1904 causes a change in response 20-1922 from the split ring resonators resulting in a differing signal response than initially determined. This information is deemed imperative for monitoring the integrity of the material in its application.

As previously mentioned in the given case, a split ring resonator or split ring resonators 20-1904 would be implemented in the concrete foundation to allow for monitoring of material. This could be accomplished, as an example, in a two-step fashion. In a first step, a technician operating a signal generator (or similar tool), tunes the signal generator to a selected frequency, which may emit a signal proximal to the split ring resonators in a structural member. A return signal and/or its characteristics (e.g., attenuation, single frequency resonance, multiple frequency resonance, etc.) from the split ring resonators is captured. The technician stores the return signal and/or its characteristics as a calibration point pertaining to a ping of that location and at that given point in time. The return signal and/or its characteristics is later used as a calibration signature corresponding to the point in time when the material is deemed to have a baseline state of structural integrity.

When implementing the split ring resonator or split ring resonators into the member, the exact orientation and location may not be controllable during the pour, however the foregoing two-step procedure can still be used. This is because, when pinging the plurality of split ring resonators, an ensemble effect signal (the return from the multiple split ring resonators) can be used as a calibration. Again, in the second step, carried out at any later time after the first step, the technician would repeat the pinging and signature capturing process to gather then current data returned by the split ring resonators in the structural member. A comparison between the calibration signature and the then-current data may potentially be indicative of changes in the integrity of the material. On the one hand, a change in response 20-1918 might be merely indicative of a change in compression. Certain ranges of changes of compression over time may be considered to be normal, and may occur in normal use (e.g., as the structure flexes under stresses from earth movements such as earth tremors). In addition to the foregoing technique for measuring changes in compression, further techniques are presented hereunder as pertains to measuring changes in flexure.

If the structural member is already in a given use, a split ring resonator or plurality of split ring resonators 20-1904 split ring resonators 20-1904 can still be implemented on the structural member, regardless of physical characteristics (e.g., shape, size, location). Examples of such are shown and described as pertains to FIG. 20-20.

FIG. 20-20 illustrates the utilization 20-2000 of split ring resonators externally on structural members varying in shapes that already in use, in accordance with one embodiment. As an option, the utilization 20-2000 may be implemented in the context of any one or more of the embodiments set forth in any previous and/or subsequent figure(s) and/or description thereof. Of course, however, the utilization 20-2000 may be implemented in the context of any desired environment. Further, the aforementioned definitions may equally apply to the description below.

In one embodiment, FIG. 20-20 also displays examples of possible factors and equations that may be vital in determining the size, orientation, location, and application of the split ring resonator or split ring resonators on the structural member. Additionally, FIG. 20-20 illustrates the utilization of split ring resonators that are applied externally to structural members of varying shapes. FIG. 20-20 displays examples of possible factors and equations that may be vital in determining the size, orientation, location, and application of the split ring resonator or split ring resonators on the structural member.

More specifically, FIG. 20-20 depicts a horizontal member 20-2002 where the split ring resonator 20-1904 can be attached (e.g., using ultrasonic welding) and used in a given application (e.g., an axle component, a tie rod component, a push rod, rebar, etc.). In addition to the horizontal elongated members, the split ring resonator could also be attached to a curved member 20-2004 (e.g., bucket handle, suspension part, a portion of spring, rebar, etc.).

In one specific case, a split ring resonator 20-1904 or a plurality of spaced split ring resonators can be applied to rebar using any known technique, after which the rebar may be situated into a form. When the concrete or other construction composition is poured into the form, the juxtaposition of the split ring resonators on the rebar and the juxtaposition of the split ring resonators in the form remains substantially the same as when the split ring resonators were applied to the rebar and situated in the form. As such, the split ring resonators can be positioned so as to be substantially aligned into a horizontally-oriented plane (i.e., in an 'X' direction), or so as to be substantially aligned into a vertically-oriented plane (i.e., in a 'Y' direction), or so as to be substantially aligned into a depth-oriented plane (i.e., in an 'Z' direction).

Additionally, or alternatively, a split ring resonator could be attached to a flat structural member 20-2006 (e.g., the hood of a car). In this given application the split ring resonator could be used in order to measure the flex of a hood of a car dynamically, and at any given moment in time. This method has many advances as compared to the use of a wind tunnel in order to measure the flex of the hood of the car. This is because, in the wind tunnel case, the vehicle is stationary, whereas in the contemplated use model where the vehicle is actually underway, actual real time responses can be calculated. Thus, the split ring resonator or split ring resonators 20-1904 provide instant feedback during actual driving conditions.

The determined size of the split ring resonator or split ring resonators for each of the structural members may be dependent on the size of the member as well as the application. This is shown by Eq. 20-8. Specifically, different sizes of the split ring resonator or split ring resonators resonate at correspondingly different frequencies. The different sizes can be accounted for during the initial calibration test.

In certain situations (e.g., when applying a split ring resonator to a straight horizontal member, or when applying a split ring resonator to a curved member, or when applying a split ring resonator to a flat member) the optimal location (Eq. 20-10) and/or orientation (Eq. 20-9) can be determined or inferred from analysis of a finite element model (e.g., using CAD software such as SOLIDWORKS, AGROS2D, CALCILIX). More specifically, the results from the finite element analysis will yield flexure vectors, compression vectors, and expansion vectors depending upon the application and desired properties that are of interest. Based on the results from the finite element analysis, a particular structural member can be configured with the split ring resonator at a corresponding location (Eq. 20-10) and/or orientation (Eq. 20-9).

FIG. 20-21 is a flow chart 20-2100 representing the process in which the split ring resonator is implemented in the given applications, in accordance with one embodiment. As an option, the flow chart 20-2100 may be implemented in the context of any one or more of the embodiments set forth in any previous and/or subsequent figure(s) and/or description thereof. Of course, however, the flow chart 20-2100 may be implemented in the context of any desired environment. Further, the aforementioned definitions may equally apply to the description below.

As shown, the first step of the process is to determine whether the scenario admits either an internal or external disposition of the split ring resonators (step 20-2102). In the event of an internal application (step 20-2104) of the split ring resonator or split ring resonators, the mix-in technique would need to be determined (step 20-2106). In one embodiment, the split ring resonator or split ring resonators may be combined with an aggregate mixture or cement. The aggregate mixture or cement may then be poured into a structure or foundation and the split ring resonators would disperse randomly throughout the mixture ultimately forming the member (step 20-2110).

Once the foundation or structure has cured the split ring resonators can be calibrated, and an initial state or calibration signature can be gathered (step 20-2114). To achieve the calibration signature a unique signal may used to ping a response from the split ring resonators. Based upon the characteristics of the medium in which the split ring resonators are immersed, a response as a function of the medium's parameters (compression, density, frequency, etc.) may be generated. This initial reading when the structure is in some initial state may become the calibration signature and reference parameter for future comparisons. Of course, it is to be appreciated that the initial reading may be reset (and/or recalibrated) at a later point of time (such as recasting of cement, seismic upgrades, etc.).

In the event of an external application (e.g., via ultrasonic welding) the split ring resonator or split ring resonators would be integrated onto a component in a fashion that would not compromise the accuracy of the split ring resonator. The orientation, location, and application of the split ring resonator can be used to gather correct data from the split ring resonator (step 20-2108) (for example, the installment of a split ring resonator to a motor vehicle axle). The orientation of the split ring resonator to the axle can be used to achieve a normal, horizontal, or angled vector from the plane of the split ring resonator which does not compromise the signal to noise ratio and allows for operable return of calibration signature or point. The location of the split ring resonator on the axle may be placed in zones of failure and fluctuating stress for appropriate monitoring of the integrity of the axle. Sonic welding of the split ring resonators (step 20-2112) to the axle may be employed to ensure accuracy of the split ring resonators calibration signature and points. Sonic welding which allows for dissimilar materials to bind does not use solder or other materials to form a weld that could dampen or alter the response of the split ring resonators. Of course, it is to be appreciated that any type of affixing may also be used in lieu of welding.

As shown in the flowchart, both external and internal processes converge to test event (step 20-2116). During the test event a stimulus is applied (step 20-2118) and a response is measured (step 20-2120). The test event is used to gather and compare calibration points against the calibration signature (step 20-2122). After a given amount of time has elapsed and, strictly as example, a stressful event to the structure or component has taken place, or routine maintenance check, or a visual observation of the component or structure renders need for testing a test is performed. This test returns calibration points which may be similar in nature to calibration signatures taken later when the structure or component may differ in the structure's integrity. A two-step technique could be used to accomplish obtaining the necessary calibrations. In a first step (step 20-2120), a technician operating a signal generator (or similar tool), tunes the signal generator to a selected frequency, and emits a signal proximal to the split ring resonators in a structural member. A return signal and/or its characteristics (e.g., attenuation, single frequency resonance, multiple frequency resonance, etc.) from the split ring resonators is captured. The technician stores the return signal and/or its characteristics as a calibration point pertaining to a ping of that location and at that given point in time. The return signal and/or its characteristics is later used as a calibration signature corresponding to the point in time when the material is deemed to have a baseline state of structural integrity.

In a second step (step 20-2122), carried out at any later time after the first step, the technician would repeat the pinging and signature capturing process to gather then current data returned by the split ring resonators in the structural member. A comparison between the calibration signature and the then-current data may potentially be indicative of changes in the integrity of the material. On the other hand, a change in response 20-1918 might be merely indicative of a change in compression. Certain ranges of changes of compression over time may be considered to be normal, and may occur in normal use (e.g., as the structure flexes under stresses from earth movements such as earth tremors. In addition to the foregoing technique for measuring changes in compression, further techniques are presented hereunder as pertains to measuring changes in flexure. Regardless of the shape of the member the previously technique, or any related technique disclosed herein, can be used to gather the necessary information.

The calibration points are then compared against the calibration signature. If the difference of the two signals is outside of the acceptable error threshold or tolerance (the "Yes" option of decision 20-2124) then the "YES" branch of decision 20-2124 is taken and a report is made (step 20-2126). Additionally, FIGS. 20-22A1-20-22A3 illustrates other embodiments where the aforementioned is applied.

FIGS. 20-22A1 through 20-22A3 are being presented to illustrate use of split ring resonators or a plurality of split ring resonators within roadside barriers, in accordance with one embodiment. As an option, the FIGS. 20-22A1 through 20-22A3 may be implemented in the context of any one or more of the embodiments set forth in any previous and/or subsequent figure(s) and/or description thereof. Of course, however, the FIGS. 20-22A1 through 20-22A3 may be implemented in the context of any desired environment. Further, the aforementioned definitions may equally apply to the description below.

As shown, FIG. 20-22A1 depicts a roadway 20-2202 containing a concrete barrier 20-2206 and/or metal barrier 20-2204, or possibly both, that use a split ring resonator or a plurality of split ring resonators. Roadside barriers are meant to reduce the severity of potential vehicle accidents (e.g., going over a cliff, into a body of water, etc.) by absorbing the force from an oncoming car and stopping the car from continuing on its path by allowing the body of the barrier to deform in its shape. After this has been accomplished, the integrity of the material of the barrier may be altered and possibly may need to be replaced due to the deformation of the material. Even if the outside physical aspect of the barrier seems to be unaltered, there may be deformities within the material causing it to have weakened as a result of the impact, thus requiring the barrier to be replaced.

To determine when and how often the given barrier may need to be replaced, split ring resonators may be placed within the concrete barriers as shown in FIG. 20-22A2 (e.g., an example of the technique depicted in FIG. 20-19A). Once the foundation or structure has cured, the split ring resonators can be calibrated, and an initial state or calibration signature can be gathered, for example, by a two-step fashion technique. In a first step, a technician operating a signal generator (or similar tool), tunes the signal generator to a selected frequency, and emits a signal proximal to the split ring resonators in the concrete barrier. A return signal and/or its characteristics (e.g., attenuation, single frequency resonance, multiple frequency resonance, etc.) from the split ring resonators is captured. The technician stores the return signal and/or its characteristics as a calibration point pertaining to a ping of that location and at that given point in time. The return signal and/or its characteristics is later used as a calibration signature corresponding to the point in time when the material is deemed to have a baseline state of structural integrity.

The same can be applied to a metal barrier represented in FIG. 20-22A3. The split ring resonators may also be attached with an application technique (e.g., ultrasonic welding) of step 20-2112. Once attached to the metal barrier, the split ring resonators can be calibrated, and an initial state or calibration signature can be gathered using the previously two-step technique. Similarly, a racetrack barrier can also use a plurality of split ring resonators to monitor the integrity of the barrier which is depicted in FIG. 20-22B.

Of course, it is to be appreciated that split ring resonators may be embedded in other materials (other than concrete barriers of FIG. 20-22A2 and/or metal barriers of FIG. 20-22A3), including but not limited to: aviation related embodiments (e.g., wings, landing gear, plane component, etc.), nautical related embodiments (e.g., sails, masts, buoys, structural steel, etc.), utilities related embodiments (e.g., power line structure, transmission line, delivery pipelines, etc.), construction related embodiments (e.g., beams, concrete pylons, etc.), biomedical related embodiments (e.g., prosthetics, implants, orthotics, etc.), professional sports equipment related embodiments (e.g., helmets, protective pads, hand-held implements, footwear, etc.), forging or smelting related embodiments (e.g., metals, composites, alloys, etc.), power production related embodiments (e.g., solar arrays, hydroelectric dams, wind-powered turbines, natural gas housing and transport, etc.), automobile related safety and/or performance embodiments (e.g., engine performance, suspension, chassis and body integrity, etc.), manufacturing related embodiments (e.g., assembly, 3D printing, component amalgamation, testing, etc.), agriculture related embodiments (e.g., growth rates, temperature control, moisture saturation, ultraviolet light exposure, etc.), and/or space travel related embodiments (e.g., air lock performance, propellant receptacle integrity, launch effect tolerance measurements, capsule/fuselage distortion during flight, etc.). In short, use of split ring resonators for determining deformation of the material to which it is affixed or in which it is incorporated may relate to any application where it can be imbedded and/or affixed, where the substrate to which it is affixed or in which it is embedded is of a sufficient permanent state that any deformation of the substrate would be an indication of material fatigue.

With respect to one specific example, drilling rigs are often exposed to high temperature and corrosive environments for offshore application. Such conditions often cause drillpipe failures, which result predominately from metal fatigue. Having split ring resonators embedded, in one embodiment, within the drillpipe itself, would allow metal fatigue to be detected in advance of causing a drillpipe failure (and the inherent complications that arise from such failure). Consistent with the description herein, the split ring resonators embedded in the drillpipe may be initially calibrated, where an initial state or calibration signature can be gathered (consistent with the two-step fashion technique). A signal generator (or similar tool) may tune the signal generator to a selected frequency, and emit a signal next to the split ring resonators in the drillpipe. A return signal and/or its characteristics may be captured, which in turn, may be stored as a calibration signature of the material at that state in time. At a later time period (consistent with step 20-2116), a stimulus may be applied (per step 20-2118) and a response may be measured (per step 20-2120), which in turn may be compared to the calibration signature (per step 20-2122). It is to be appreciated that the stimulus may be applied at any time period rate (e.g., every minute, day, week, month, etc.) as predetermined by a user. In this manner, deformation (which may be indicated of fatigue crack, crack propagation, etc.) may be measured within the drillpipe, and detected before actually causing a drillpipe failure.

FIG. 20-22B depicts a roadside barrier 20-22B00 used in a racetrack showing structural components that constitute the roadside barrier in which a split ring resonator or split ring resonators can be placed, in accordance with one embodiment. As an option, the roadside barrier 20-22B00 may be implemented in the context of any one or more of the embodiments set forth in any previous and/or subsequent figure(s) and/or description thereof. Of course, however, the roadside barrier 20-22B00 may be implemented in the context of any desired environment. Further, the aforementioned definitions may equally apply to the description below.

In one embodiment, the roadside barrier 20-22B00 may include a steel and foam energy reduction barrier. As shown, the racetrack is to the side of the foam absorbers (with internal split ring resonators 20-2208). Steel and foam energy reduction barriers may be used in the high speed section of certain tracks and work by absorbing the kinetic energy during impact to reduce severity of accidents as well as to separate the spectating crowd from possible hazards in the case of a collision of cars and/or to prevent hazardous material from being launched into the crowd. When the barrier contacts the car or cars, the absorbed energy travels along the sides of the wall reducing the damage to the cars and preventing injury to the spectators.

Additionally, an array of split ring resonators 20-2212 can be placed either on the surface and/or internally on the putter steel barrier 20-2210 in order to obtain needed information to determine the integrity of the barrier after, for example, one or more collisions, or to determine the integrity of the barrier over a certain period of time. In exemplary cases, the array of split ring resonators 20-2212 can be placed in the front and back of the putter steel barriers, and/or embedded in foam absorbers and/or on or in any of the cement walls.

In one specific embodiment, after the array of split ring resonators 20-2212 has been disposed (e.g., placed in the foam absorbers with internal split ring resonators 20-2208 and/or externally or internally placed in the putter steel barrier 20-2210, and/or externally or internally placed in the foam absorbers, etc.), they can be calibrated by way of the two-step technique detailed herein.

In a first step, a technician operating a signal generator (or similar tool), tunes the signal generator to a selected frequency, which emits a signal proximal to the split ring resonators in the foam absorbers with internal or external split ring resonators 20-2008 and/or externally or internally in the putter steel barrier 20-2210. A return signal and/or its characteristics (e.g., attenuation, single frequency resonance, multiple frequency resonance, etc.) from the split ring resonators is captured. The technician stores the return signal and/or its characteristics as a calibration point pertaining to a ping of that location and at that given point in time. The return signal and/or its characteristics is later used as a calibration signature corresponding to the point in time when the material is deemed to have a baseline state of structural integrity.

In a second step, carried out at any later time after the first step, the technician would repeat the pinging and signature capturing process to gather the then-current data returned by the split ring resonators in the structural member. A comparison between the calibration signature and the then-current data may potentially be indicative of changes in the integrity of the material. On the other hand, a change in response 20-1918 might be merely indicative of a change in compression. Certain ranges of changes of compression over time may be considered to be normal, and may occur in normal use (e.g., as the structure flexes under stresses from earth movements such as earth tremors. In addition to the foregoing technique for measuring changes in compression, further techniques are presented hereunder as pertains to measuring changes in flexure. After analysis of the gathered data, a report can be constructed in which replacement of the barriers can be determined.

FIG. 20-23 shows a depiction 20-2300 of split ring resonators disposed on the surface of a concrete structure after the concrete has been poured into a given structural form, in accordance with one embodiment. As an option, the depiction 20-2300 may be implemented in the context of any one or more of the embodiments set forth in any previous and/or subsequent figure(s) and/or description thereof. Of course, however, the depiction 20-2300 may be implemented in the context of any desired environment. Further, the aforementioned definitions may equally apply to the description below.

As shown, the depiction 20-2300 includes split ring resonators (e.g., split ring resonator 20-19041, split ring resonator 20-19042, split ring resonator 20-19043) disposed on the surface of a concrete structure (e.g., column or wall 20-1908) after the concrete has been poured into a given structural form. Placement of such split ring resonators (e.g., the shown surface-applied split ring resonators 20-2302) can be done as a "retrofit", in some cases long after the pour has cured, and in some cases long after a building has been erected using columns and/or walls. The construction, placement of, and means of affixing surface-applied split ring resonators 20-2302 to a structure can be accomplished using any known technique. For example, such surface-applied split ring resonators 20-2302 can be printed or silk-screened onto a substrate in a roll, and that roll of substrate or portions thereof can be applied, possibly with an adhesive to a surface of a column or wall. In some cases, the substrate is lifted off, leaving the surface-applied split ring resonators 20-2302 affixed to the surfaces of the column or wall. In some cases, the surface-applied split ring resonators 20-2302 can be printed directly onto the rebar. In some cases, the surface-applied split ring resonators 20-2302 can be printed onto a substrate using a inkjet or bubble jet printer. In some cases, the surface-applied split ring resonators 20-2302 can be printed onto a substrate using offset or printing (e.g., multi-color offset printing). In some cases, the surface-applied split ring resonators 20-2302 can be printed onto a substrate using gravure printing techniques.

A calibration and test module 20-2301 can be situated proximal to any location where there are surface-applied split ring resonators 20-2302. One or more calibration signatures based on a particular combination of occurrences of emitted RF signals 20-210 and corresponding occurrences of returned RF signals 20-212 can be communicated over a network to upstream components 20-113. Strictly as examples that are pertinent to this and other embodiments, an upstream component may include, but not be limited to, modules that perform continual inspection and analysis of the structures, modules that combine to serve in the capacity of an early warning system, modules that comport with governance, and/or modules that comport with any regulatory reporting requirements.

Any of the foregoing techniques for making and using split ring resonators can be combined. For example, surface-applied split ring resonators can be retrofitted onto surfaces of a roadside barriers and/or components thereof. Additionally, for example, the upstream components might include a racetrack safety monitoring unit. Further, split ring resonators of a first geometry of split ring resonators (e.g., concentric rings) can be combined (e.g., proximally-juxtaposed) with split ring resonators of a second geometry (e.g., concentric cylinders). Strictly as yet another embodiment, a roadside barrier made of steel and/or other barrier components made of steel of another electrically-conducting material can serve as an electrically-conductive layer that is dielectrically separated (e.g., via an adhesive) from any one or more split ring resonators that are disposed onto the surface of the roadside barrier.

The foregoing discloses various ways to incorporate or otherwise embed split ring resonators into the base materials that form the intended structural member (e.g., such as in cement pours). Further, the foregoing discloses various ways to affix split ring resonators onto a surface of a structural member (e.g., such as a tie-rod of a steering mechanism in an automobile). It is additionally envisioned to use a RF "horn" to emit a particular signal and measure the response of the embedded split ring resonators, as discussed herein as well.

Some methods include disposing split ring resonators onto a (possibly printed) "ground plane" which forms an assembly that is in turn applied onto a surface of the structural member. This greatly may increase sensitivity of the split ring resonator over a broad range of EM.

The foregoing methods support static non-destructive testing merely by comparing a current response/signature to a previously-taken calibration response/signature and then classifying the differences between the two signatures. More particularly, certain differences that are apparent between the signatures can be correlated to corresponding physical property changes. In some cases, the physical property changes are indicative of aging (e.g., brittle-ization). In some cases, the physical property changes are indicative of stretching, compression, other deformation, etc.

In some cases, the physical property changes are indicative of dynamically changing property changes (e.g., vibration). Capturing a series of a dynamically-taken series of responses/signatures to a previously-taken series of calibration responses/signatures supports dynamic non-destructive testing. Difference that are apparent between the two sets signatures can be correlated to physical property changes such as cyclical deformations. In some cases, the physical property changes are indicative of aging (e.g., changes in the elastic deformation curve). In some cases, the physical property changes that occur between readings and/or the physical property changes that are measured when comparing one series of readings to another series of readings can be indicative of elastic versus plastic deformations, which are sometimes indicative of imminent failure. Strictly as one example, imminent failure of a component might be indicated when a measured elasticity curve (e.g., based on a series of readings) resembles a region of an elasticity curve that has been designated as preceding a failure event.

FIG. 20-24A depicts a sensing laminate 20-24A00 including alternating layers of carbon-containing resin and carbon fiber in contact with one-another, in accordance with one embodiment. As an option, the sensing laminate 20-24A00 may be implemented in the context of any one or more of the embodiments set forth in any previous and/or subsequent figure(s) and/or description thereof. Of course, however, the sensing laminate 20-24A00 may be implemented in the context of any desired environment. Further, the aforementioned definitions may equally apply to the description below.

As shown, the sensing laminate 20-24A00 includes a schematic side-view cutaway diagram composed of multiple layers disposed on each other, including (sequentially) a carbon-containing resin 20-2404$_2$, a carbon fiber 20-2402$_2$, a carbon-containing resin 20-2404$_1$, and a carbon fiber 20-2402$_1$. In one embodiment, the sensing laminate 20-24A00 can be representative of any sensor discussed with relation to that shown in FIGS. 20-24A-20-24C. The term "resin" (in polymer chemistry and materials science), generally, refers to a solid or highly viscous substance of plant or synthetic origin that is typically convertible into polymers (a large molecule, or macromolecule, composed of many repeated subunits). Synthetic resins may be industrially produced resins, typically viscous substances that convert into rigid polymers by the process of curing. In order to undergo curing, resins typically contain reactive end groups, such as acrylates or epoxides. The term "carbon fiber", refers to fibers about 5-10 micrometers (μm) in diameter and composed mostly of carbon atoms. Carbon fibers have several advantages including high stiffness, high tensile strength, low weight, high chemical resistance, high temperature tolerance and low thermal expansion.

Any one or more of the carbon-containing resin 20-2404$_2$, the carbon fiber 20-2402$_2$, the carbon-containing resin 20-2404$_1$, and the carbon fiber 20-2402$_1$ can be tuned to demonstrate or exhibit one or more specific resonance frequencies upon being pinged by RF signals by incorporating specific concentration levels of the any one or more of the aforementioned carbon-containing microstructures. The sensing laminate can include any configuration, orientation, order, or layering of any one or more of the carbon-containing resin 20-2404$_2$, the carbon fiber 20-2402$_2$, the carbon-containing resin 20-2404$_1$, and the carbon fiber 20-2402$_1$ and/or fewer or additional layers comprising similar or dissimilar materials. Additional layers of resin can be layered interstitially between additional layers of carbon fiber.

Each layer of carbon-containing resin can be formulated differently to resonate at a different expected or desired tuned frequency. The physical phenomenon of material resonation can be described with respect to a corresponding molecular composition. For example, a layer having a first defined structure, such as a first molecular structure will resonate at a first frequency, whereas a layer having a second, different molecular structure can resonate at a second, different frequency.

Material having a particular molecular structure and contained in a layer will resonate at a first tuned frequency when that layer is in a low energy state, and will resonate at a second different frequency when the material in the layer is in an induced higher-energy state. For example, material in a layer that exhibits a particular molecular structure can be tuned to resonate at a 3 GHz when the layer is in a natural, undeformed, low energy state. In contrast, that same layer can resonate at 2.95 GHz when the layer is at least partially deformed from its natural, undeformed, low energy state. As a result, this phenomenon can be adjusted to accommodate the needs for detecting, with a high degree of fidelity and accuracy, even the most minute aberration to, for example, a tire surface contacting against a road surface such as pavement and experiencing enhanced wear at a certain localized region of contact. Race cars racing on demanding race circuits (referring to highly technical, windy tracks featuring tight turns and rapid elevational changes) can benefit from such localized tire wear or degradation information to make informed tire-replacement decisions, even in time-sensitive race-day conditions. As described herein, the phenomenon may be applied to any context and/or application where split ring resonators can be integrated within or affixed to a substrate.

FIGS. 20-24B1 and 20-24B2 depict a frequency-shifting phenomenon as demonstrated by a sensing laminate including carbon-containing tuned RF resonance materials, in accordance with one embodiment. As an option, the FIGS. 20-24B1 and 20-24B2 may be implemented in the context of any one or more of the embodiments set forth in any previous and/or subsequent figure(s) and/or description thereof. Of course, however, the FIGS. 20-24B1 and 20-24B2 may be implemented in the context of any desired environment. Further, the aforementioned definitions may equally apply to the description below.

Figures 16, 17, 18, 19, 20, 21, 22, 23, 24:
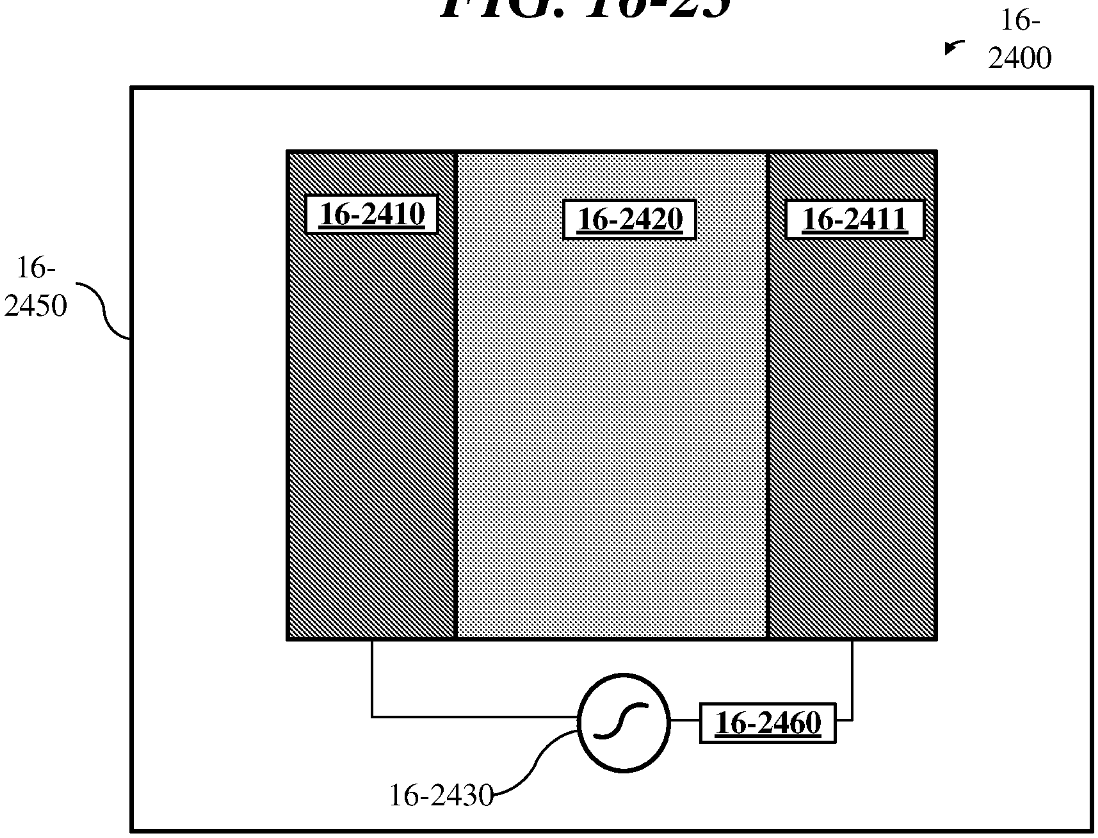
Figures 16, 17, 18, 19, 20, 21, 22, 23, 24, 25, 25A:
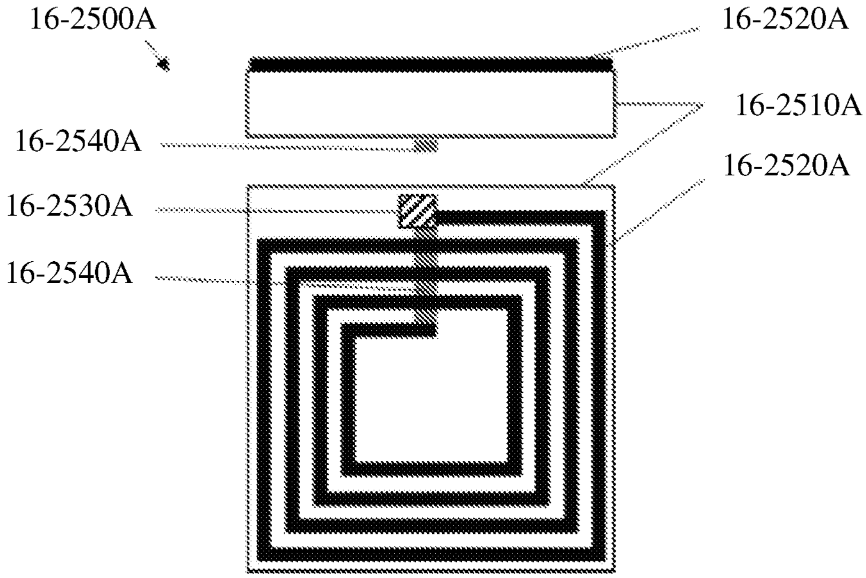
Figures 16, 17, 18, 19, 20, 21, 22, 23, 24, 25, 25B:
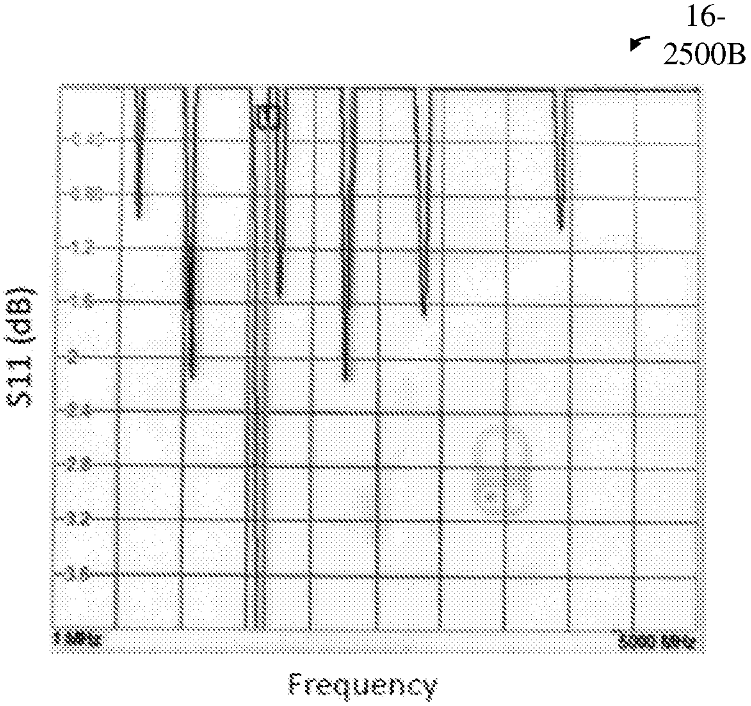
Figures 16, 17, 18, 19, 20, 21, 22, 23, 24, 25, 25C:
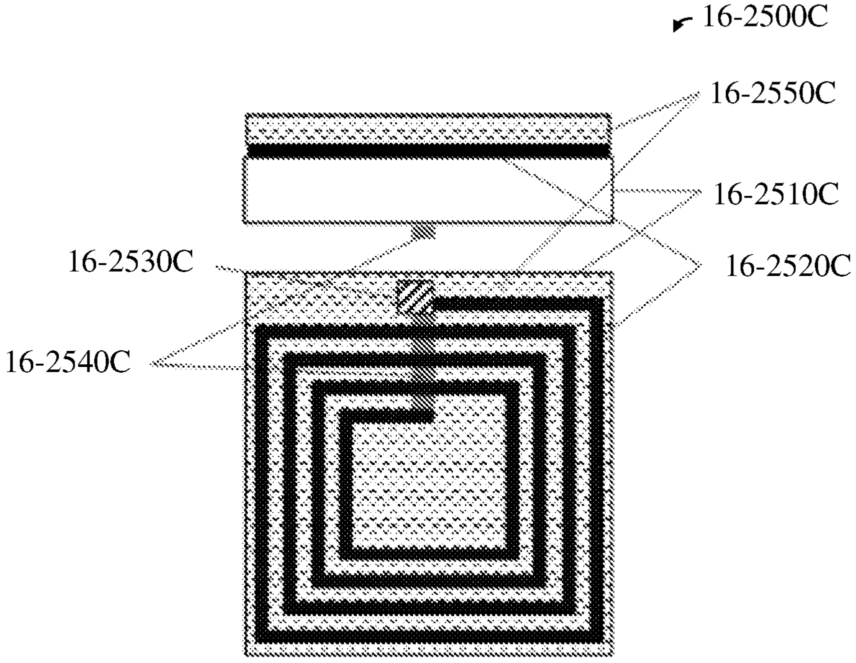
Figures 16, 17, 18, 19, 20, 21, 22, 23, 24, 25, 25D:
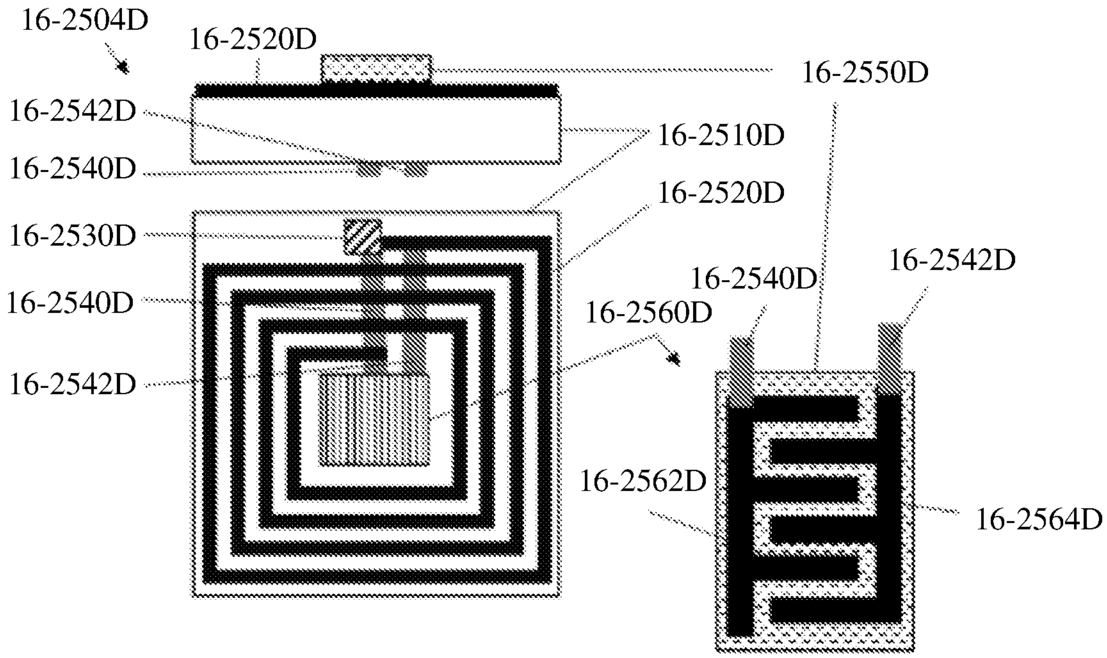
Figures 16, 17, 18, 19, 20, 21, 22, 23, 24, 25, 25E:
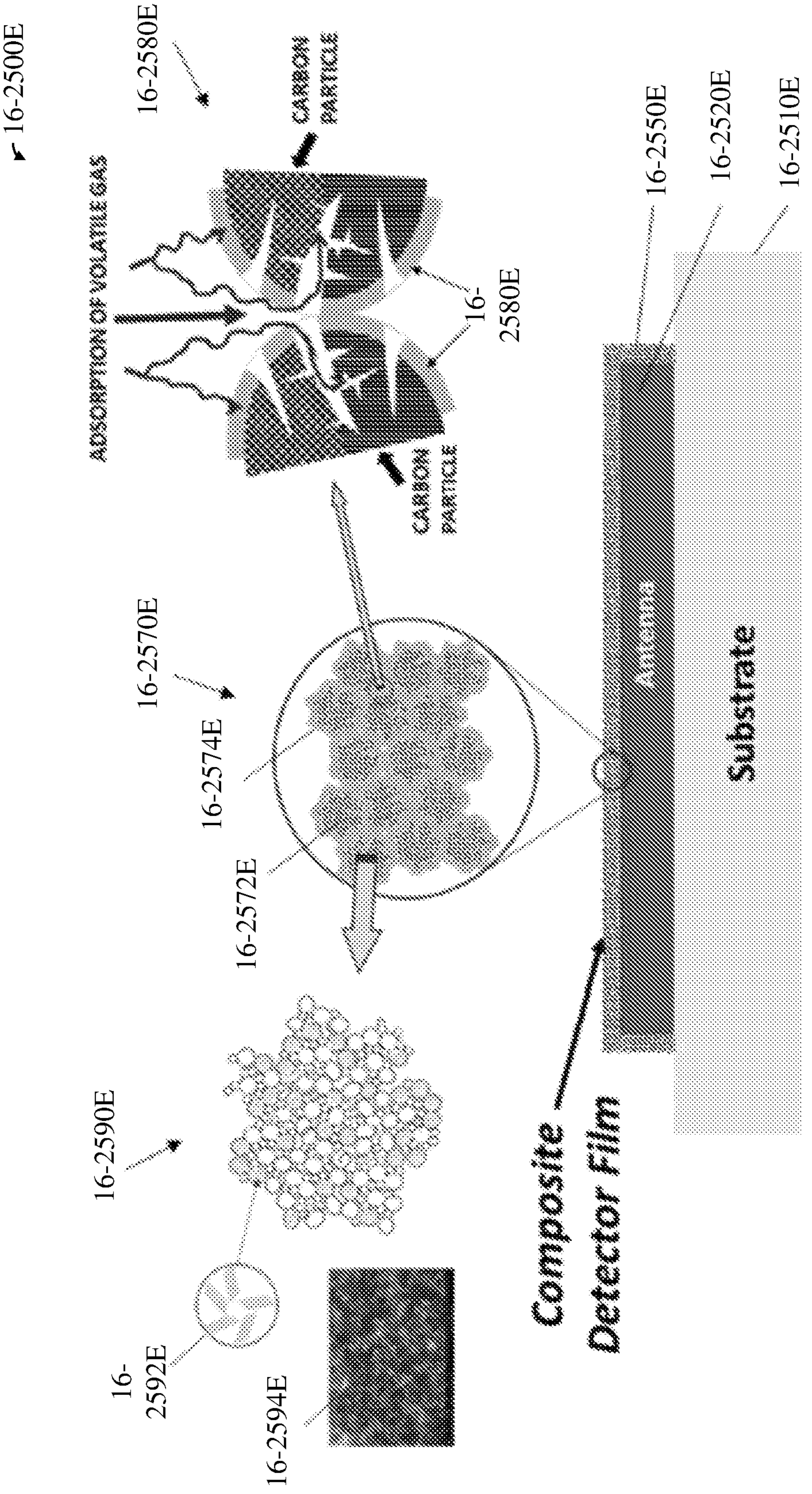
Figures 16, 17, 18, 19, 20, 21, 22, 23, 24, 25, 25F:
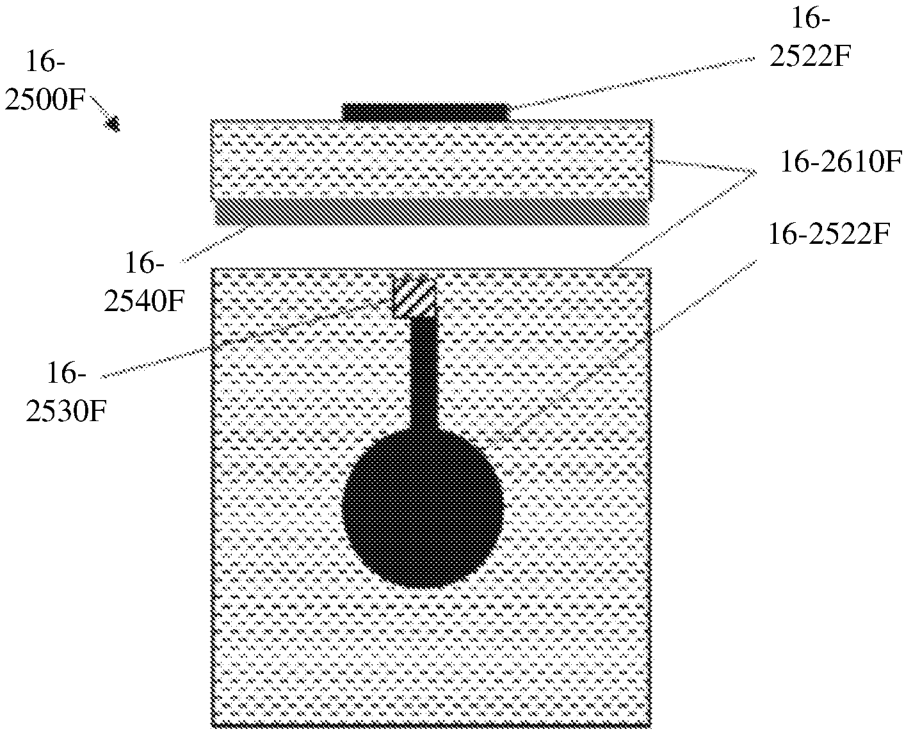
Figures 16, 17, 18, 19, 20, 21, 22, 23, 24, 25, 26, 26A:
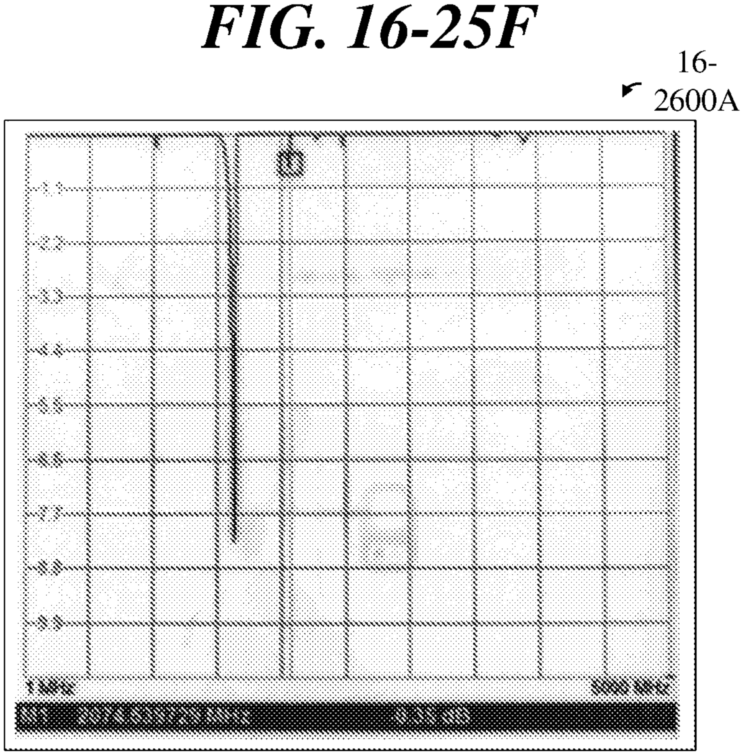
Figures 16, 17, 18, 19, 20, 21, 22, 23, 24, 25, 26, 26B:
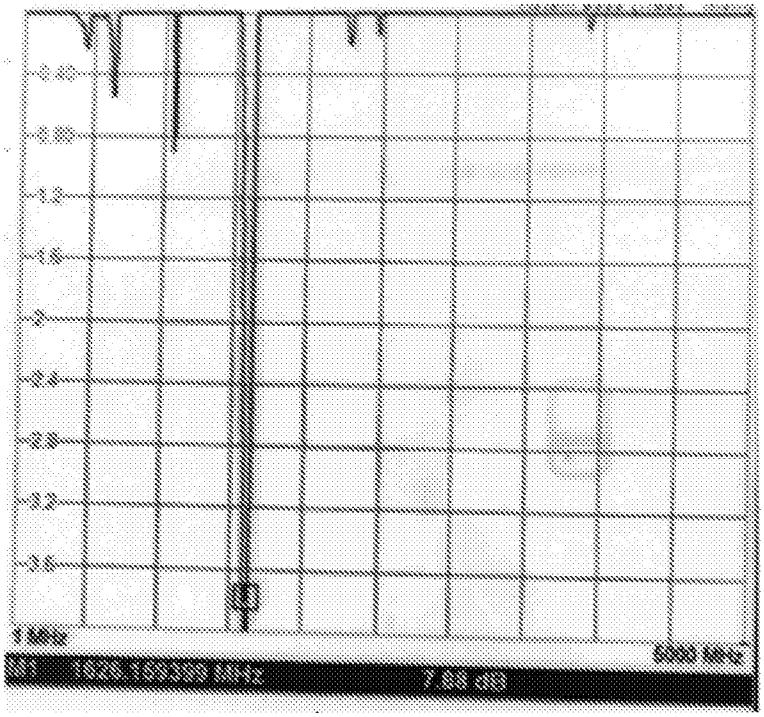
Figures 16, 17, 18, 19, 20, 21, 22, 23, 24, 25, 26, 26C:
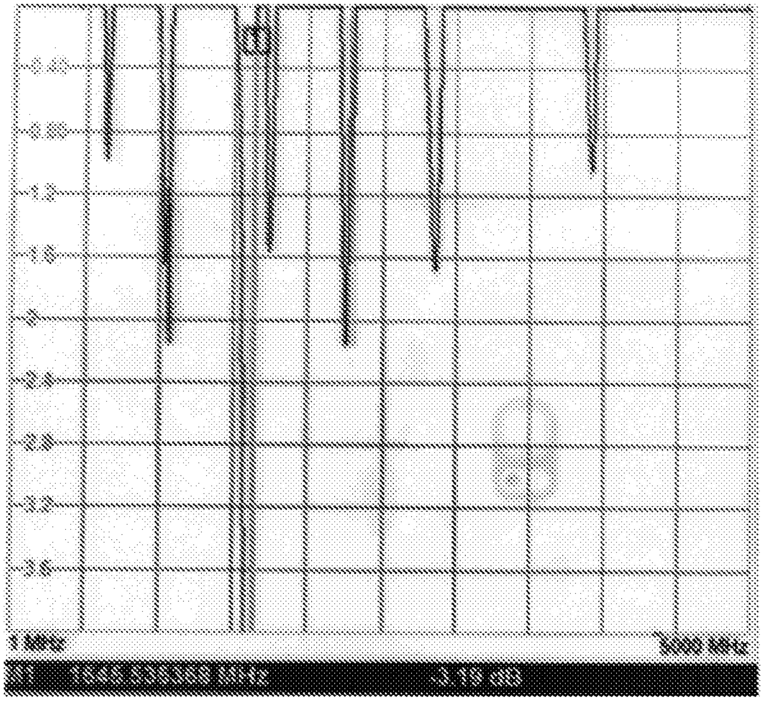
Figures 16, 17, 18, 19, 20, 21, 22, 23, 24, 25, 26, 27:
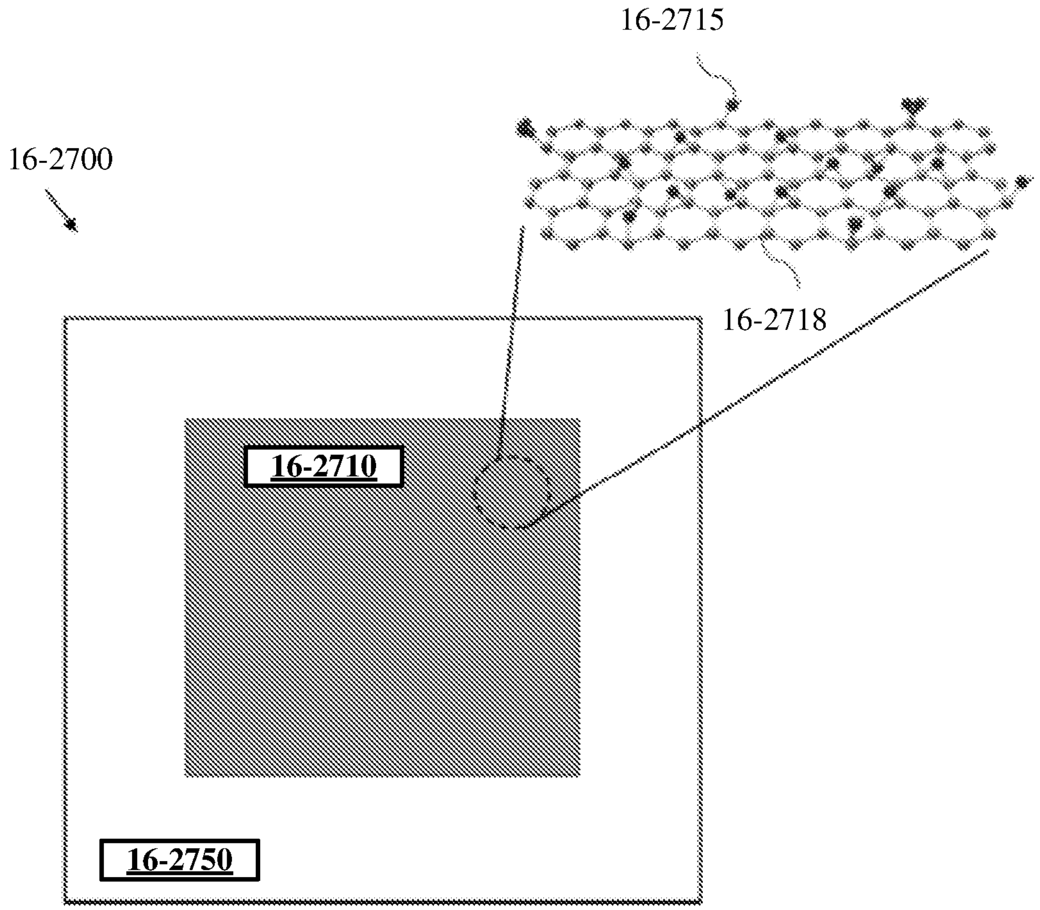
Figures 16, 17, 18, 19, 20, 21, 22, 23, 24, 25, 26, 27, 28:
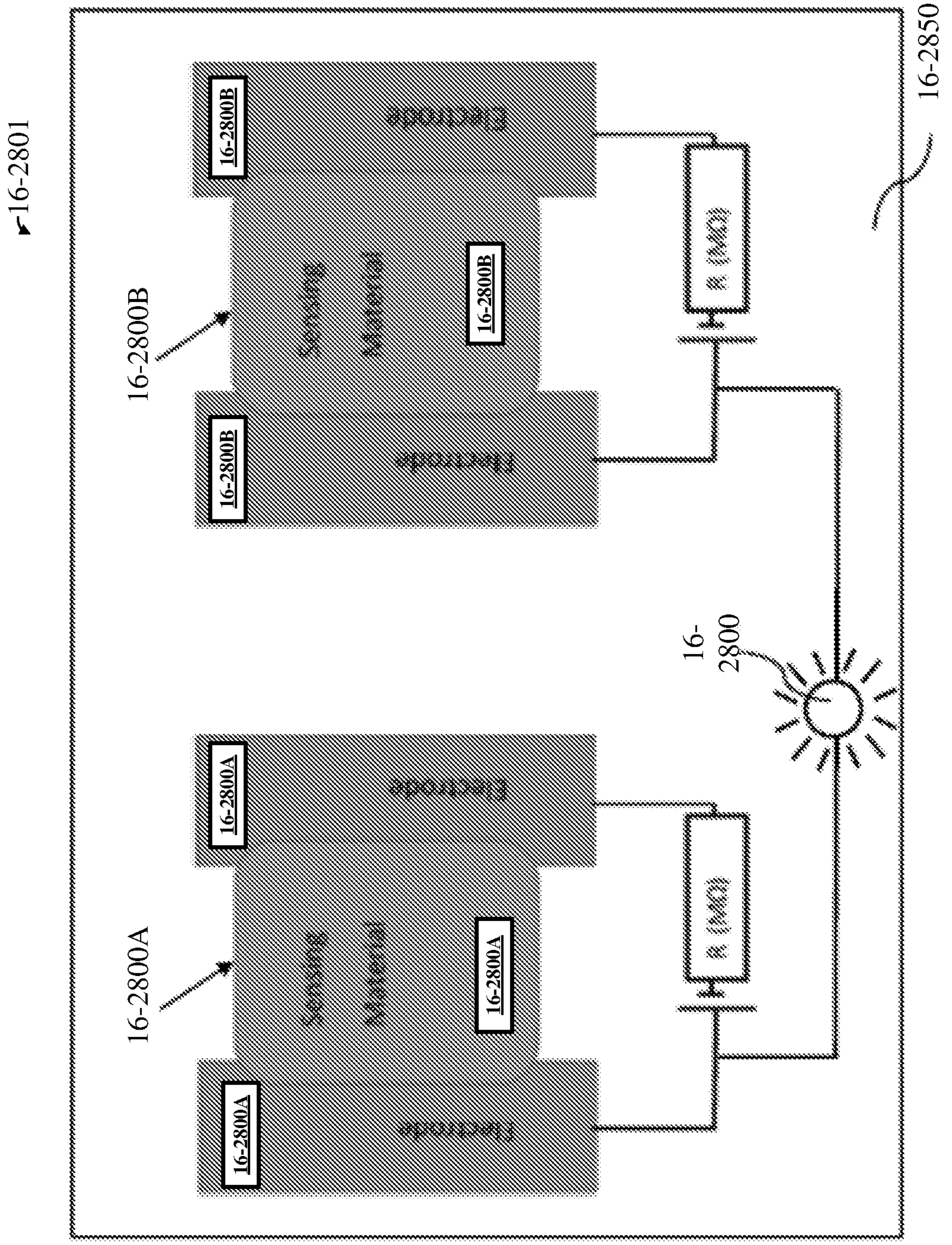

The frequency-shifting phenomenon referred to above (with respect to FIG. 20-24A, such as transitioning from resonating at a frequency of 3 GHz to 2.95 GHz) is shown and discussed with reference to FIGS. 20-24B1-20-24B2. FIG. 20-24B2 depicts a frequency-shifting phenomenon as exhibited in a sensing laminate that includes carbon-containing tuned resonance materials.

As generally understood, atoms emit electromagnetic radiation at a natural frequency for a given element. That is, an atom of a particular element has a natural frequency that corresponds to characteristics of the atom. For example, when a Cesium atom is stimulated, a valence electron jumps from a lower energy state (such as, a ground state) to a higher energy state (such as, an excited energy state). When the electron returns to its lower energy state, it emits electromagnetic radiation in the form of a photon. For Cesium, the photon emitted is in the microwave frequency range; at 9.192631770 THz. Structures that are larger than atoms, such as molecules formed of multiple atoms also resonate (such as by emitting electromagnetic radiation) at predictable frequencies. For example, liquid water in bulk resonates at 109.6 THz. Water that is in tension (such as, at the surface of bulk, in various states of surface tension) resonates at 112.6 THz. Carbon atoms and carbon structures also exhibit natural frequencies that are dependent on the structure. For example, the natural resonant frequency of a carbon nanotube (CNT) is dependent on the tube diameter and length of the CNT. Growing a CNT under controlled conditions to control the tube diameter and length leads to controlling the structure's natural resonant frequency. According, synthesizing or otherwise "growing" CNTs is one way to tune to a desired resonant frequency.

Other structures formed of carbon can be formed under controlled conditions. Such structures include but are not limited to carbon nano-onions (CNOs), carbon lattices, graphene, carbon-containing aggregates or agglomerates, graphene-based, other carbon containing materials, engineered nanoscale structures, etc. and/or combinations thereof, any one or of which being incorporated into sensors of vehicle components according to the presently disclosed implementations. Such structures can be formed to resonate at a particular tuned frequency and/or such structures can be modified in post-processing to obtain a desired characteristic or property. For example, a desired property such as a high reinforcement value can be brought about by selection and ratios of combinations of materials and/or by the addition of other materials. Moreover, co-location of multiples of such structures introduces further resonance effects. For example, two sheets of graphene may resonate between themselves at a frequency that is dependent on the length, width, spacing, shape of the spacing and/or other physical characteristics of the sheets and/or their juxtaposition to each other.

As is known in the art, materials have specific, measurable characteristics. This is true for naturally occurring materials as well as for engineered carbon allotropes. Such engineered carbon allotropes can be tuned to exhibit physical characteristics. For example, carbon allotropes can be engineered to exhibit physical characteristics corresponding to: (a) a particular configuration of constituent primary particles; (b) formation of aggregates; and (c) formation of agglomerates. Each of these physical characteristics influence the particular resonant frequencies of materials formed using corresponding particular carbon allotropes.

In addition to tuning a particular carbon-based structure for a particular physical configuration that corresponds to a particular resonant frequency, carbon-containing compounds can be tuned to a particular resonant frequency (or set of resonant frequencies). A set of resonant frequencies is termed a resonance profile.

FIG. 20-24B1 depicts a first carbon-containing structure that resonates at a first frequency, which can be correlated to an equivalent electrical circuit comprising a capacitor $C_1$ and an inductor $L_1$ (note that the context of Eq. 20-3, provided below, can also be found hereinabove with respect to FIG. 20-2, and/or the carbon-containing structures of FIGS. 20-18A-20-18Y, in particular). The frequency $f_1$ is given by the equation:

$$f_1 = \frac{1}{2\pi\sqrt{L_1 C_1}} \quad \text{(Eq. 20-3)}$$

FIG. 20-24B2 depicts a slight deformation of the same first carbon-containing structure of FIG. 20-24B1. The deformation causes a change to the physical structure, which in turn, changes the inductance and/or capacitance of the structure. The changes can be correlated to an equivalent electrical circuit comprising a capacitor $C_2$ and an inductor $L_2$. The frequency $f_2$ may given by the equation:

$$f_2 = \frac{1}{2\pi\sqrt{L_2 C_2}} \quad \text{(Eq. 20-4)}$$

FIG. 20-24B3 is a graph 24B300 depicting idealized changes in RF resonance as a function of deflection, in accordance with one embodiment. As an option, the graph 24B300 may be implemented in the context of any one or more of the embodiments set forth in any previous and/or subsequent figure(s) and/or description thereof. Of course, however, the graph 24B300 may be implemented in the context of any desired environment. Further, the aforementioned definitions may equally apply to the description below.

As shown, the graph 24B300 depicts idealized changes in measured resonance as a function of deflection. As an option, one or more variations of graph 24B300 or any aspect thereof may be implemented in the context of the implementations described herein. The graph 24B300 (or any aspect thereof) may be implemented in any environment.

The implementation shown in FIG. 20-24B3 is merely one example. The shown graph depicts one aspect of deformation, specifically deflection. As a member or surface undergoes deformation by deflection (such as curving), the deformation can change the demonstrated resonance frequency of the member upon being pinged by a signal, such as an RF signal. The shape of the curve can depend on characteristics of the member, such as on characteristics of the laminate that forms the member or surface. The curve can be steep at small variations, whereas the curve flattens as the deflection reaches a maximum. Moreover, the shape of the curve depends in part on the number of layers of the laminate, the geometry of the carbon structures, how the carbon is bonded into the laminate, etc.

FIG. 20-24B4 is a graph 24B400 depicting changes in RF resonance for 4-layer and 5-layer laminates, in accordance with one embodiment. As an option, the graph 24B400 may be implemented in the context of any one or more of the embodiments set forth in any previous and/or subsequent figure(s) and/or description thereof. Of course, however, the graph 24B400 may be implemented in the context of any desired environment. Further, the aforementioned definitions may equally apply to the description below.

As shown, the graph 20-24B400 depicts changes in resonance for 4-layer laminates 20-292 and for 5-layer laminates 20-294. As an option, one or more variations of graph 20-24B400 or any aspect thereof can be implemented in the materials and systems described herein. Materials such as the described laminates can be deployed into many applications. One particular application may be for surface sensors, which can be deployed into, on, or over many locations throughout a vehicle. An example of such deployments may be shown and described as pertains to FIG. 20-24C.

FIG. 20-24C depicts surface sensor deployments in areas of a vehicle 20-24C00, in accordance with one embodiment. As an option, the vehicle 20-24C00 may be implemented in the context of any one or more of the embodiments set forth in any previous and/or subsequent figure(s) and/or description thereof. Of course, however, the vehicle 20-24C00 may be implemented in the context of any desired environment. Further, the aforementioned definitions may equally apply to the description below.

As shown, the vehicle 20-24C00 shows example surface sensor deployments in selected locations of a vehicle. Such example surface sensor deployments, or any aspect thereof, may be implemented in or on a vehicle exposed to any possible exterior environmental condition, such as snow, sleet, hail, etc.

Tuned resonance sensing carbon-containing materials can be incorporated into or with automotive features, surfaces, and/or components in the context of durable sensors in various exterior surfaces of vehicles. As shown, the vehicle is equipped with surface sensors on the front faring (such as, hood) of the vehicle, on support members of the vehicle, and on the roof of the vehicle. Each of the foregoing locations of the vehicle can be subjected to stresses and accompanying deformations during operation of the vehicle. As examples, the surface sensors on the front faring will undergo air pressure changes when the vehicle is in operation (such as, during forward motion). Under the forces of the air pressure, the material that composes the surface can deform slightly and, in accordance with the phenomenon described as pertains to FIG. 20-24B1 and FIG. 20-24B2, demonstrate a change in resonant frequency of the material proportionate to the degree of change or deformation of the material. Such a change can be detected using the 'ping" and observation techniques described earlier.

Observed emitted signals can collectively define a signature for a particular material or surface and can be further classified. Specific characteristics of the signal can be isolated for comparison and measurement to determine calibration points that correspond to the specific isolated characteristics. Accordingly, aspects of the environment surrounding a vehicle can be accurately and reliably determined.

For example, if the deformation of the surface sensor results in a frequency shift from 3 GHz to 2.95 GHZ, the difference can be mapped to a calibration curve, which in turn can yield a value for air pressure. A vehicle component such as a panel, roof, hood, trunk, or airfoil component can provide a relatively large surface area. In such cases, transceiver antennas can be distributed on the observable side of the component. Several transceiver antennas can be distributed into an array, where each element of the array corresponds to a section of the large surface area. Each transceiver antenna can be installed on or within the wheel wells of the surface sensor deployments 24C00 as shown and be independently stimulated by pings/chirps. In some cases, each element of the array can be stimulated sequentially, whereas, in other cases, each element of the array is stimulated concurrently. Aerodynamics of the vehicle can be measured over large surface areas by signal processing employed to distinguish signature returns from proximal array elements.

Signature returns from a particular array element can be analyzed with respect to other environmental conditions and/or other sensed data. For example, deflection of a particular portion of an airfoil component might be compared with deflection of a different portion of the airfoil component, which in turn might be analyzed with respect to then-current temperatures, and/or then-current tire pressure, and/or any other sensed aspects of the vehicle or its environment. As heretofore described, a resonator circuit (such as is shown in 20-24B1 and 20-24B2) can be implemented by situating a resonator in a surface panel of the vehicle (as is shown in 20-24C). Configurations of other embodiments are specifically tuned to be able to locate resonators (e.g., Split ring resonators) across the vehicle's surface. An array, or matrix of surface sensors varying in size, can be deployed into or on over many locations throughout a vehicle in order for the vehicle's conditions to be analyzed in present time. One such deployment may be found, for example, in FIG. 20-29, described hereinbelow.

FIG. 20-25A provides a depiction 20-2500 of interaction between a vehicle and split ring resonators disposed in roadway asphalt and/or on the surface of a road, in accordance with one embodiment. As an option, the depiction 20-2500 may be implemented in the context of any one or more of the embodiments set forth in any previous and/or subsequent figure(s) and/or description thereof. Of course, however, the depiction 20-2500 may be implemented in the context of any desired environment. Further, the aforementioned definitions may equally apply to the description below.

As shown, the depiction 20-2500 may include a vehicle 20-2502, split ring resonators 20-2504 located in and/or on a road surface, and road surface to vehicle interaction 20-2506. In one embodiment, the depiction 20-2500 may be used to determine tire stiction (and/or rolling friction). For example, maintaining static contact with the road enables control of the vehicle (whereas losing static contract with the road can lead to lost of control of the vehicle). The split ring resonators 20-2504 may be used to measure tire (and/or interfacial) stiction (as a function of tire tread thickness). The process for determining tire stiction is explained in greater detail below with reference to FIG. 20-27.

FIG. 20-25B provides a depiction of how split ring resonators disposed within or on a tire can be used to measure tire stiction, in accordance with one embodiment. As an option, the depiction 20-2500 may be implemented in the context of any one or more of the embodiments set forth in any previous and/or subsequent figure(s) and/or description thereof. Of course, however, the depiction 20-2500 may be implemented in the context of any desired environment. Further, the aforementioned definitions may equally apply to the description below.

As shown, the depiction 20-2501 may include the vehicle 20-2502, split ring resonators 20-2503 located in and/or on a tire, and tire interaction 20-2505. In one embodiment, the depiction 20-2501 may be used to determine tire stiction (and/or rolling friction). For example, the split ring resonators 20-2503 located in and/or on a tire may be used to measure tire (and/or interfacial) stiction (as a function of tire tread thickness).

In various embodiments, the split ring resonators 20-2504 located in and/or on a road surface, and the split ring resonators 20-2503 located in and/or on a tire may be used to measure a tire's actual stiction to the surface of the road, as well as measure a tire's actual thickness on the surface of the road. Such measurements may occur in real-time, even while the vehicle 20-2502 is being operated. In this manner, tire stiction may be measured continuously (or near continuously) with high accuracy, given the fact that the split ring resonators 20-2504 and 2503 do not rely on electronics (which are more prone to failure and other mechanical issues).

As an example, with the car racing industry, while the vehicle 20-2502 is being driven, split ring resonators (located in and/or on the car, such as the tire, and/or in and/or on the road) may provide real-time data to drivers and pit crews of real-time permittivity relating to tire stiction. Such real-time data may allow for immediate feedback to how the tire is responding and interacting with the surface of the road, which in turn, may allow the driver and pit crew to adjust and fine-tune the vehicle (e.g., tire tread type, power to tires, wind shield, wing, spoiler, etc.) to allow for greater tire stiction (to maximize control and performance of the vehicle, at a minimum). Of course, any other fine-tuning of the vehicle may be performed to ensure tire stiction.

In one embodiment, the split ring resonators 20-2504 and 2503 may be low-cost sensor due to the fact that it does not rely on electronics for function. As such, the split ring resonators 20-2504 and 20-2503 may not only improve real-time data gathering (at higher accuracy), but at a lower cost than current alternatives.

FIG. 20-26 depicts placement 20-2600 of split ring resonators disposed in roadway asphalt and/or on the surface of a road, in accordance with one embodiment. As an option, the placement 20-2600 may be implemented in the context of any one or more of the embodiments set forth in any previous and/or subsequent figure(s) and/or description thereof. Of course, however, the placement 20-2600 may be implemented in the context of any desired environment. Further, the aforementioned definitions may equally apply to the description below.

As shown, the placement 20-2600 includes a vehicle 20-2602, split ring resonators 20-2604, and vehicle interaction 20-2606. The location of the split ring resonators 20-2604 (as shown within FIG. 20-26) is arbitrary. The key take-away of the location of such split ring resonators 20-2604 is that they may be placed anywhere in or on the surface of the road. In one embodiment, FIG. 20-26 may apply to a race car track, which may necessitate a greater number of split ring resonators 20-2604 (for increased data gathering and performance fine-tuning). In contrast, in other applications, such as on a normal highway or thoroughfare, the location of split ring resonators 20-2604 may be spaced at a greater amount (as fine tuning of performance may not be needed).

As discussed herein, the split ring resonators 20-2604 may be used to collect data in relation to tire stiction. Such data may be used, in turn, to modify parameters associated with the car. Additionally, such data may be used for safety (of the vehicle and/or of the road). For example, if the split ring resonators 20-2604 determined that real-time stiction levels have reduced (indicating a loss of traction), traffic advisories may immediately alert other drivers of hazardous road conditions (and likewise decrease the speed limit in and/or around the area where loss of traction was detected). In this manner, the split ring resonators 20-2604 may be used for traffic management and/or safety.

Further, split ring resonators, such as those located in and/or a tire (such as the split ring resonators 20-2503) may be used as an alternative to conventional anti-lock braking systems (which typically rely on wheel speed sensors and vehicle speed sensors to determine if the tire has stopped turning). The split ring resonators 20-2503 may provide more accurate data with less latency (between time of detecting to time of reporting out to a control module, such as millisecond). Further, once again, because the split ring resonators 20-2503 do not rely on electronics to function (contrary to conventional sensor systems), they would be less prone to error and failure.

In another embodiment, the split ring resonators 20-2604 may be used to determine driver capability and/or track driver performance. For example, if an overenthusiastic driver accelerates rapidly, or an aggressive driver brakes forcefully, such data may be used to create a driver profile (of driver performance). For drivers that are training (and need objective data feedback), such data may be used to assist the driver in training (to learn to drive in a more pleasant manner). Further, such data may be tied to an auto-insurance carrier, where preferential rates may be associated with less aggressive driving historical tendencies.

In this manner, the split ring resonators 20-2604 may be used in a variety of scenarios and ways such that measuring tire stiction may be used not only to better control the vehicle (ensure traction between the vehicle and the surface of the road), but based on such data gathered, may be used for safety, driver training, insurance carrier rates, etc.

FIG. 20-27 is a flow chart 20-2700 representing the process to determine tire stiction, in accordance with one embodiment. As an option, the flow chart 20-2700 may be implemented in the context of any one or more of the embodiments set forth in any previous and/or subsequent figure(s) and/or description thereof. Of course, however, the flow chart 20-2700 may be implemented in the context of any desired environment. Further, the aforementioned definitions may equally apply to the description below.

As shown, the flow chart 20-2700 begins with determining tire tread thickness (step 20-2702). Next, a current measurement is determined (step 20-2704). For example, a current measurement may include a deformation of a split-ring resonator at the point that the tire meets the road. Such deformation may be measured (in the form of a frequency shift), and the ensemble effect (things associated with and/or effected by the action causing the deformation) may track a permittivity of the surroundings, including but not limited to water, tar, blacktop (asphalt), concrete, etc. If the current measurement is a match with a baseline measurement (per decision 20-2706), then the method returns back to step 20-2702 to determine tire tread thickness, and step 20-204 to determine refractive index. When the refractive index is not a match (per decision 20-2706), then the method 20-2700 proceeds to step 20-2708 and the vehicle is adjusted to achieve a match.

In one embodiment, the refractive index may relate to measuring reflectivity (which may use the refractive index) for each tire layer and determining the permittivity of each tire layer. When the tire stiction is high, the tread thickness (and hence the reflectivity and permittivity) will increase proportionally. If tire stiction has been lost (i.e., traction has been lost), a mismatch (i.e., a non proportional reflectivity and permittivity) will exist with respect to the tire tread thickness. In this manner, tire tread thickness can be used to determine tire stiction as a function of refractive index (and hence reflectivity), and permittivity.

Additionally, a refractive index mismatch in compounded materials (particularly in tires, asphalt, plastics, rubber, metal alloy, etc.) may be used to detect variations of scattering parameters (or S-parameters, elements of a scattering matrix, etc.) for stiction levels. Such scattering parameters may relate to stimulating (via wireless signals) one or more split ring resonators located in or on a tire (or a vehicle, a vehicle component, a surface of a road, etc.). Such one or more split ring resonators may be used to obtain an immediate read of tire tread thickness (which in turn may be used to determine tire stiction, as described hereinabove).

Further, use of the split ring resonators (as a basis to determine tire stiction) provides a very economical small form factor solution that does not rely on electronics to function. Such factors, therefore, in combination with high accuracy with low latency, make split ring resonators a viable solution for a plethora of applications.

FIG. 20-28 shows a correlation 20-2800 between measured frequencies and tread thickness, in accordance with one embodiment. As an option, the correlation 20-2800 may be implemented in the context of any one or more of the embodiments set forth in any previous and/or subsequent figure(s) and/or description thereof. Of course, however, the correlation 20-2800 may be implemented in the context of any desired environment. Further, the aforementioned definitions may equally apply to the description below.

As shown, a tire 20-2802 includes multiple one or more tire belt plies (in a manner consistent with the tire 20-1002). The carbon-based microstructures incorporated within the tire 20-2802 may includes split ring resonators. Such split ring resonators may have a natural resonance (such as approximately 1.0 GHz), and in response to external conditions (such as driving the tire), the tire 20-2802 may deform and/or otherwise be altered. The deformation and/or alteration within the tire 20-2802 may be measured (in terms of a response attenuation) as a frequency response of the split ring resonators.

The frequency response is shown in model 20-2804. In one embodiment, the model 20-2804 may correlate with impedance spectroscopy energy to and from a tire. Such energy (measured in terms of frequency) may be used to determine tire stiction. For example, tire thickness of the tire 20-2802 may alter, such as between a natural state and an in-use driving state. During in-use driving state, the tire 20-2802 may have stiction (and traction) with the surface of a road. Such a state (of having tire stiction) may be corelated with a matching frequency model (shown, in one example, in the model 20-2804). However, when tire stiction is lost (i.e., a lost of tire traction occurs), the corresponding model 20-2804 may no longer match. For example, when stiction is lost, then permittivity may decrease rapidly. A calibration of how stiction works under different conditions may allow comparison of then-current readings (and changes in readings) to be compared to the calibration curves.

In this manner, impedance spectroscopy may be used to measure frequencies samples of split ring resonators found in or on a tire. It is to be appreciated that although the correlation 20-2800 is shown with respect to one embodiment of a tire, other applications (such as in relation to car components, car skin, road surface conditions, metal fatigue conditions, construction material, etc.) are envisioned in a similar manner.

As such, split ring resonators may be disposed in and/or on a material (including internal components such as wiring or external components such as road asphalt) and can be used to provide information pertaining to the material in and/or on which it is located.

FIG. 20-29 shows a section 20-2900 of a vehicle surface where an array of individually configured split ring resonators are disposed, in accordance with one embodiment. As an option, the section 20-2900 may be implemented in the context of any one or more of the embodiments set forth in any previous and/or subsequent figure(s) and/or description thereof. Of course, however, the section 20-2900 may be implemented in the context of any desired environment. Further, the aforementioned definitions may equally apply to the description below.

As shown, the section of a vehicle surface 20-2902 may be subjected to stresses and accompanying deformations during operation of the vehicle, and split ring resonators (split ring resonators) (shown in FIG. 20-29 as $F_{11}$, $F_{12}$, $F_{13}$, $F_{21}$, $F_{22}$, $F_{23}$, up and to $F_{NN}$) can be used to detect possible changes within the material under such environmental stresses and deformations. The split ring resonators may be printed or applied onto the spongy material of the vehicle (e.g., vinyl wrap of vehicle), and/or the combination of the resonators and spongy material may be placed all over a vehicle or section of a vehicle surface of interest.

For example, the split ring resonators on the front bumper may undergo air pressure changes when the vehicle is in operation (such as, during forward motion, thus creating a downward force on this section of the vehicle). Under the forces of the air pressure, the material that composes the surface can deform slightly and, in accordance with the phenomenon described as pertains to FIG. 20-24B1 and FIG. 20-24B2, demonstrate a change in resonant frequency of the material proportionate to the degree of change or deformation of the material. While all the split ring resonators will be resonating simultaneously, a difference in one of the split ring resonators or multiple of split ring resonators can be determined due to a change in the pitch that can be detected by a stimulus/response comparator, such as may be implement in whole or in part by a horn/receiver or similar device.

An array or matrix of split ring resonators over the vehicle surface 20-2902 and the constituents are configured in such a way that the frequency responses of any of the constituent members of the array do not collide with the neighboring split ring resonators. One such configuration is shown and described as pertains to FIG. 20-30.

FIG. 20-30 depicts a configuration 20-3000 of the split ring resonators in a frequency bin, in accordance with one embodiment. As an option, the configuration 20-3000 may be implemented in the context of any one or more of the embodiments set forth in any previous and/or subsequent figure(s) and/or description thereof. Of course, however, the configuration 20-3000 may be implemented in the context of any desired environment. Further, the aforementioned definitions may equally apply to the description below.

As shown, the split ring resonators (shown as $F_1$, $F_{21}$, up and to FAN) may each reside in frequency bins. As the surface containing the split ring resonators undergoes deformation by deflection, the positive deflection or negative deflection can change physical characteristics of the split ring resonator, thereby changing the inherent center frequency of the member. The variation in the frequency response of a member is represented in FIG. 20-30 by the D symbols. This change in the resonant frequency, even at its maximum, may not collide with the neighboring split ring resonators, as shown. Measuring the cyclic deflection over time facilitates detection of cyclical stress (e.g., buffeting) as it occurs on the vehicle surface. One such example for detecting time-based deflection variations is shown and described as pertains to FIG. 20-31.

FIG. 20-31 shows a chart 20-3100 of detection of time-based variation of deflection, as indicated by time-based variation of the resonant frequency, in accordance with one embodiment. As an option, the chart 20-3100 may be implemented in the context of any one or more of the embodiments set forth in any previous and/or subsequent figure(s) and/or description thereof. Of course, however, the chart 20-3100 may be implemented in the context of any desired environment. Further, the aforementioned definitions may equally apply to the description below.

As shown, the chart 20-3100 shows detection of time-based variations of deflection through ongoing measurement of cyclic deflection of the split ring resonators, which may allow for performing analysis of pressures over a given control surface of the vehicle. For example, the foregoing techniques of disposing an array of split ring resonators across a control surface vehicle, in combination with the technique of analyzing the combined return from individual split ring resonators of that control surface, may allow identification of regions of the surface that are experiencing cyclical stresses (e.g., buffeting). In some cases, the physical property changes are indicative of relatively high frequency, dynamically changing property variations (e.g., vibration). Capturing a series of a dynamically-taken series of responses/signatures, and comparing such to a previously-taken series of calibration responses/signatures may facilitate dynamic non-destructive testing. Differences that are apparent between the two sets signatures may be correlated to physical property changes, such as cyclical deformations (e.g., buffeting).

FIG. 20-32 depicts a signature classification system 20-3200 that processes signals received from sensors formed of carbon-containing tuned resonance materials, in accordance with one embodiment. As an option, the signature classification system 20-3200 may be implemented in the context of any one or more of the embodiments set forth in any previous and/or subsequent figure(s) and/or description thereof. Of course, however, the signature classification system 20-3200 may be implemented in the context of any desired environment. Further, the aforementioned definitions may equally apply to the description below.

In one embodiment, the signature classification system 20-3200 can be implemented in any physical environment. More specifically, the signature classification system 20-3200 depicts one example of how to classify signals (such as, signatures). As shown, a ping signal of a selected ping frequency is transmitted at operation 20-3202. The ping signal generation mechanism and the ping transmission mechanism can be performed by any known techniques. For example, a transmitter module can generate a selected frequency of 3 GHZ, and radiate that signal using a horn or multiple horns and multiple receiving antennae. The designs and locations of the tuned antennae can correspond to any tuned antenna geometry, material and/or location such that the strength of the ping is sufficient to induce (RF) resonance in proximate sensors. In some embodiments, several tuned antennae are disposed upon or within structural members that are in proximity to corresponding sensors (such as mounted on and/or within any one or more of the wheel wells or a vehicle). As such, when a proximal surface sensor is stimulated by a ping, it may resonate back with a signature. At operation 20-3204, that signature can be received and stored in a dataset comprising received signatures 20-3210. A sequence of transmission of a ping, followed by reception of a signature, can be repeated in a loop so as to capture a set of calibration signals, which in turn may be stored as calibration points 20-3212.

The ping frequency can be changed (at operation 20-3208) in iterative passes through decision 20-3206. Accordingly, as operation 20-3202 is performed in the loop (via decision 20-3206), operation 20-3204 can receive and then store the signatures 20-3210 (including a first signature 20-32101, a second signature 20-32102, up to an Nth signature 20-3210N). The number of iterations may be controlled by decision 20-3206. When the "No" branch of decision 20-3206 is taken (such as, when there are no further additional pings to transmit in the iteration loop), then the received signatures can be provided (operation 20-3214) to a digital signal processing module. The digital signal processing module classifies the signatures (operation 20-3216) against a set of calibration points 20-3212. The calibrations points can be configured to correspond to particular ping frequencies. For example, calibration points 20-3212 can include a first calibration point 20-3212; that can correspond to a first ping and first returned signature near 3 GHZ, a second calibration point 20-32122 that can correspond to a second ping and second returned signature near 2 GHz, and so on for any integer value "N" calibration points.

At operation 20-3220, classified signals are sent to a vehicle central processing unit. The classified signals can be relayed by the vehicle central processing unit (such as vehicle central processing unit 20-116) to an upstream repository (such as upstream components 20-113) that hosts a computerized database configured to host and/or run machine learning algorithms. Accordingly, a vast amount of stimulus related to signals, classified signals, and signal responses can be captured for subsequent data aggregation and processing. A database of the machine learning subsystem (e.g., a training model) can be formed or "trained" by providing a set of sensed measurements which in turn are correlated to conditions related to vehicular performance. Once the database has been computationally prepared, or "trained", then during the operation of the vehicle, the measured deflection (such as, air pressure) of a particular portion of an airfoil component can be compared to the calibration points, and the comparison yields a delta in frequency that corresponds to a variation in deflection which in turn corresponds to a particular air pressure. Other potential conditions or diagnoses can be determined by the machine learning system. The conditions and/or diagnoses and/or supporting data can be made available to instrumentation in the vehicle to complete a feedback loop. In some cases, instrumentation in the vehicle provides visualizations that can be acted upon (such as, by a driver or by an engineer).

FIG. 20-33 shows a depiction 20-3300 of split ring resonators disposed in and/or on a drone, and/or a drone platform, in accordance with one embodiment. As an option, the depiction 20-3300 may be implemented in the context of any one or more of the embodiments set forth in any previous and/or subsequent figure(s) and/or description thereof. Of course, however, the depiction 20-3300 may be implemented in the context of any desired environment. Further, the aforementioned definitions may equally apply to the description below.

As shown, a drone 20-3302 may include one or more split ring resonators 20-3304. In one embodiment, the drone 20-3302 may be used to transport a package 20-3306. Of course, it is to be appreciated that the drone 20-3302 may be configured for transport of other items (such as a camera, weather sensing instruments, animals, medical supplies, food, goods, cargo, payloads, etc.). Additionally, in other embodiments, the drone 20-3302 may be configured for military or tactical purposes (including configured as an unmanned combat aerial vehicle). Further, as described hereinbelow, the drone 20-3302 may be configured as a passenger drone, an unmanned aerial vehicle (UAV), and/or an autonomous aerial vehicle (AAV). In one embodiment, the drone 20-3302 may be capable of vertical take-off and landing (VTOL) and/or electric vertical take-off and landing (eVTOL).

Additionally, a drone landing pad 20-3308 is provided, which may include one or more split ring resonators 20-3312. A target location 20-3310 to align the drone 20-3302 and the drone landing pad 20-3308 is also provided.

In various embodiments, the one or more split ring resonators 20-3304 may be used to facilitate real-time sensing of a physical state of the drone 20-3302 and/or environmental conditions external to the drone 20-3302. Such real-time sensing may occur millisecond-by-millisecond, and may be used to detect structural changes within the drone 20-3302 before it becomes a problem, and/or to alter a course of the drone 20-3302 to reach an intended destination (such as the target location 20-3310). For example, in one embodiment, should a propeller on the drone 20-3304 suffer material fatigue (and be prone to break), a split ring resonator located on the propeller may determine a structural change (in terms of a change of frequency). Additionally, any element of the drone 20-3302 may be monitored such that any structural change can be detected before the negative effects of the change are observed.

In another embodiment, the drone 20-3302 may initiate a takeoff or landing on the drone landing pad 20-3308 landing pad 20-3308. Real-time sensing of the state of the drone 20-3302 (by the one or more split ring resonators 20-3304) may protect both the drone 20-3302 and/or the drone landing pad 20-3308 landing pad 20-3308. In this manner, the one or more split ring resonators 20-3304 may detect changes before and/or after takeoff. It is to be noted that the one or more split ring resonators 20-3312 on the drone landing pad 20-3308 may additionally be used to sense both a state of the landing pad 20-3308 and/or a position of the drone 20-3302 (regardless of whether the drone 20-3302 has the one or more split ring resonators 20-3304). Further, when landing, the one or more split ring resonators 20-3304 on the drone 20-3302 or the one or more split ring resonators 20-3312 on the drone landing pad 20-3308 may be used to determine, in real-time, a pinpoint location of the drone 20-3302 as it approaches the drone landing pad 20-3308 landing pad 20-3308. In this manner, the one or more split ring resonators 20-3304 and/or 20-3312 may be used for precision landing capabilities.

The one or more split resonators 20-3312 of the drone landing pad 20-3308 may additionally be used to determine a state of the drone landing pad 20-3308 such that material fatigue and/or component failure can be detected before visually manifested.

In another scenario, after landing, a state of the drone 20-3302 may be assess by receiving health related data from the one or more split ring resonators 20-3304. For example, the drone 20-3302 may pass through a drone health system which may broadcast a wireless signal. Each of the one or more split ring resonators 20-3304 may provide a frequency response that may correspond with structure health (in terms of material fatigue and component failure) of the drone 20-3302. In this manner, the split ring resonators 20-3304 may be used to detect a state of health of the drone 20-3302 before, during, and after takeoff and/or landing. The state of the health may be used to alert and/or be communicated to a human/user and/or an autonomous system.

In this manner, an autonomous system of heath checking for a fleet of drone may be achieved. When a drone arrives at a landing location, it may be inspected and assessed. If a split ring resonator indicates a structural issue with the drone, it may be further inspected (e.g., manual inspection, etc.) and/or repaired. If no issues are found with the drone, it may receive a "good health" designation and be ready to be sent out again. In this manner, continual management of the drones may be achieved with respect to health integrity of the fleet, which in turn, may satisfy legal and social constraints on use of drones (particularly within consumer air space).

FIG. 20-34 shows a depiction 20-3400 of split ring resonators disposed in and/or on an aerial vehicle, in accordance with one embodiment. As an option, the depiction 20-3400 may be implemented in the context of any one or more of the embodiments set forth in any previous and/or subsequent figure(s) and/or description thereof. Of course, however, the depiction 20-3400 may be implemented in the context of any desired environment. Further, the aforementioned definitions may equally apply to the description below.

As shown, an unmanned aerial vehicle (UAV) 20-3402 may include split ring resonators located on the aerial vehicle body 20-3404, structural components 20-3406, and/or propeller components 20-3408. Of course, it is to be appreciated that split ring resonators may be located in and/or on any and/or all components of the drone 20-3404.

In various embodiments, the split ring resonators (such as those located on the aerial vehicle body 20-3404, structural components 20-3406, and/or propeller components 20-3408) may be used to obtain real-time (with millisecond time granularity) measurements associated with the unmanned aerial vehicle 20-3402, including but not be limited to vibration, strain, dimensional and/or material property changes, pressure, and temperature.

For example, with respect to vibration, the split ring resonators may read vibrational frequency (from Hz level to 100s of kHz level). Additionally, in one embodiment, accelerometers and other noncontact displacement sensors may be used to measure low through high frequency vibration (e.g., from very low frequencies in the low hertz range such as in large bridge-like structures to higher vibrations such as are found in supersonic applications-up to 100s of kilohertz). With respect to strain, the split ring resonators may detect component flexion/torsion, as well as structural fatigue/failure. With respect to dimensional and/or material property changes, the split ring resonators may determine whether elastomer components (such as those found, for example, in tires, belts, hoses, etc.) need to be replaced (due to wear and aging). Further, dimensional and/or material property changes may be used to determine a distance to ground for landing (as described hereinabove FIG. 20-33). With respect to pressure, the split ring resonators may be used to detect air pressure, differential air pressure, and/or cyclical changes in air pressure. Additionally, with respect to temperature, the split ring resonators may detect surface and component internal temperatures.

As such, split ring resonators found in or on components through the unmanned aerial vehicle 20-3402 may be used to detect parametric measurements associated with a state of health of the unmanned aerial vehicle 20-3402. Further, more than one measurement may be simultaneously received. For example, in response to a wireless ping, each of the split ring resonators may provide a frequency response. Such frequency response may be calibrated, in one instance, to a measurement of pressure, whereas another frequency response may be calibrated, in another instance, to material property changes. As such, responses from all of the split ring resonators may be received, which in turn, may provide a simultaneous result of all sensor parameters associated with the unmanned aerial vehicle 20-3402.

FIG. 20-35 shows a depiction 20-3500 of split ring resonators disposed in and/or on an aerial vehicle, as well as landing location sensors, in accordance with one embodiment. As an option, the depiction 20-3500 may be implemented in the context of any one or more of the embodiments set forth in any previous and/or subsequent figure(s) and/or description thereof. Of course, however, the depiction 20-3500 may be implemented in the context of any desired environment. Further, the aforementioned definitions may equally apply to the description below.

As shown, an unmanned aerial vehicle 20-3502 may be capable of vertical take-off and/or landing (VTOL and/or e VTOL). It is to be appreciated that, in other embodiments, the unmanned aerial vehicle 20-3502 may be configured for other takeoff capabilities (e.g., conventional takeoff and landing, short takeoff and landing, etc.).

One or more split resonators may be found on the unmanned aerial vehicle 20-3502 including being located on the aerial vehicle body 20-3504, structural components 20-3506, and/or landing gear 20-3508. Of course, consistent with FIG. 20-34, the one or more split resonators may be located anywhere (and in any degree of quantity) on the unmanned aerial vehicle 20-3502, and may be used to provide sensor related information.

As an example, the split ring resonators located on the unmanned aerial vehicle 20-3502 may be distributed throughout the surface. Additionally, lightweight antennas may additionally be distributed throughout the unmanned aerial vehicle 20-3502. In one embodiment, the split ring resonators and antennas may be redundant (especially for mission-critical components, for safety constraints, etc.). Such split ring resonators may provide real-time simultaneous sensing (in milliseconds). Further, condition signatures may be associated with simultaneous feedback responses from the split ring resonators. For example, a condition signature may be associated with a component failure, an external condition (weather, flying pattern, etc.), etc. Further, the split ring resonators may be arranged to allow for triangulation positioning to assist with pinpoint landings (consistent with as described herein with respect to FIG. 20-33).

To that end, the split ring resonators may include location sensors 20-3512, may be used to calculate landing gear flexion 20-3510, surface flexion 20-3518, propeller flexion 20-3514, and/or air pressure 20-3516. As emphasized elsewhere, the split ring resonators may be used in any capacity in relation to takeoff, flight, landing, management, etc. of the unmanned aerial vehicle 20-3502, including but not limited to torsion, tire wear, air speed, air pressure, flexion of vehicle component, etc.

In one embodiment, the location sensors 20-3512 may operate to pinpoint a location for precise landing. Further, split ring resonators 20-3522 located in and/or on the surface of the ground 20-3520 may additionally be used to assist with achieving a precise landing.

FIGS. 20-36A and 20-36B show two depictions 20-3600 of split ring resonators disposed in and/or on aircraft, in accordance with one embodiment. As an option, the two depictions 20-3600 may be implemented in the context of any one or more of the embodiments set forth in any previous and/or subsequent figure(s) and/or description thereof. Of course, however, the two depictions 20-3600 may be implemented in the context of any desired environment. Further, the aforementioned definitions may equally apply to the description below.

As shown, an aircraft 20-3602 includes one or more split ring resonators that are located in and/or on various locations of the aircraft 20-3602, including, but not limited to an engine 20-3604 (jet, propeller, etc.), a wing 20-3606, a horizontal stabilizer 20-3608, a fuselage 20-3610, and/or tires 20-3612. It is to be appreciated that any number of split ring resonators may be found on the aircraft 20-3602, and a purpose of the split ring resonator may differ. For example, split ring resonators located at the front of the aircraft 20-3602 may be used to gather external weather conditions (air pressure, temperature, wind speed, etc.), split ring resonators located on tires may be used to determine tread life and state, and/or split ring resonators located in the engine may be used to ensure safety and lack of material fatigue. In some embodiments, a condition signature may be created and correlated with known conditions (weather patterns, signs of material fatigue, etc.). Additionally, a frequency from a split ring resonator may be used for more than one condition signature simultaneously. For example, a split-ring resonator may be used for determining tread thickness, and may also be used for stiction measurements, hydroplaning detection, etc.

It is to be appreciated that although a commercial aircraft is shown in the two depictions 20-3600, any aircraft (commercial, military, personal, etc.) may be applicable. Additionally, use of split ring resonators in aircraft may provide continuous millisecond-by-millisecond changes before take-off, continuously during flight, and during landing. Such changes may include structural parameter changes (e.g., fatigue thresholds, impending component failure, etc.), which in turn, may cause alerts to systems and personnel. For example, triggering an alert may cause an aircraft to avoid aircraft, or to land safely before an impending failure event occurs.

FIG. 20-37A shows a depiction 20-3700 of split ring resonators disposed in and/or on a rocket, in accordance with one embodiment. As an option, the depiction 20-3700 may be implemented in the context of any one or more of the embodiments set forth in any previous and/or subsequent figure(s) and/or description thereof. Of course, however, the depiction 20-3700 may be implemented in the context of any desired environment. Further, the aforementioned definitions may equally apply to the description below.

As shown, a spaceship 20-3702 may include one or more split ring resonators located through the spaceship 20-3702, including, but not limited to, the wing 20-3704, the elevon 20-3714, the engine 20-3708, the flight deck 20-3710, and/or the cargo bay 20-3708. It is to be appreciated that any number of split ring resonators may be found on the spaceship 20-3702.

Use of split ring resonators in spaceships may provide continuous millisecond-by-millisecond changes before take-off, continuously during flight, and during reentry. Such changes may include structural parameter changes (e.g., fatigue thresholds, impending component failure, etc.), which in turn, may cause alerts to systems and personnel. Further, spaceships (often termed orbiters) are often attached to a rocket booster. Generally, a structural failure to any component on either of the spaceship or the rocket booster would often result in complete failure for both the spaceship and the rocket booster. Use of split ring resonators, however, would ensure that any structural parameter change (to either the spaceship or the rocket booster) could be detected before impacting either the spaceship or the rocket booster. In some embodiments, a structural parameter change may cause the spaceship and the rocket booster to disengage to preserve the one or the other (based on the structural parameter change identified).

FIG. 20-37B shows a depiction 20-3701 of split ring resonators disposed in and/or on a rocket, and/or a landing platform, in accordance with one embodiment. As an option, the depiction 20-3701 may be implemented in the context of any one or more of the embodiments set forth in any previous and/or subsequent figure(s) and/or description thereof. Of course, however, the depiction 20-3701 may be implemented in the context of any desired environment. Further, the aforementioned definitions may equally apply to the description below.

As shown, a spaceship 20-3709 may be attached to a rocket booster 20-3707. Split ring resonators may be located and found on each of the spaceship 20-3709 and the rocket booster 20-3707. Further a launch pad for the spaceship 20-3709 and the rocket booster 20-3707 is shown, including a launcher platform 20-3703, a flame pit 20-3711, platform trusses 20-3713, and/or a launcher service structure 20-3705. Split ring resonators may be located and found throughout each component of the launch pad of the depiction 20-3701. In this manner, split ring resonators located in and/or on parts of the launch pad may be used to detect structural parameter changes (e.g., fatigue thresholds, impending component failure, etc.), which in turn, may cause alerts to systems and personnel. For example, a structural fail (in any of the components) may cause a launch to be aborted. Additionally, after the launch has commenced (but before liftoff), a structural fail may additional cause a launch to be aborted. Thus, any structural fail (at any point) may be the basis for a launch to be aborted, and/or for corrective action to be implemented.

In this manner, early warning systems may be based on split ring resonators found through the launch pad, the spaceship, and/or the rocket booster, and/or any component related thereto, and real-time data may be obtained to ensure safe remediation of any detected change.

Further, for any type of airborne vehicle, split ring resonators may be used as low-cost resonant sensors for safety. For example, split ring resonators may be used to detect excess vibration on components, detect and monitor micro-cracks in materials, monitor local temperatures of nonmetallic component surfaces (in providing instantaneous values as well as historical/cyclical changes), monitor local temperatures within nonmetallic components (in providing instantaneous values as well as historical/cyclical changes), provide pinpoint position accuracy (for precise landings, as an example), and/or may be installed into materials, onto surfaces and/or below surfaces (such as painted surfaces).

FIG. 20-38A is a flow chart 20-3800 relating to reporting feedback from split ring resonators, in accordance with one embodiment. As an option, the flow chart 20-3800 may be implemented in the context of any one or more of the embodiments set forth in any previous and/or subsequent figure(s) and/or description thereof. Of course, however, the flow chart 20-3800 may be implemented in the context of any desired environment. Further, the aforementioned definitions may equally apply to the description below.

The flow chart 20-3800 relates to one embodiment where sensor data is received from one or more split ring resonators, and one or more actions are taken in response.

As shown, the flow chart 20-3800 begins with receiving sensor data from a calibrated sensor (step 20-3802). The calibrated sensor may include one or more split ring resonators, calibrated based on a natural resonance. It is determined (decision 20-3804) whether the sensor data is within a predetermined range. For example, the sensor data may be correlated with a condition signature (where known deviations are correlated with known failures and/or conditions). If the sensor data is within range (or within an allowed condition signature), the method returns to continuously receiving sensor data (per step 20-3802). Of course, the interval for receiving sensor data may be predetermined and/or adjusted as needed.

If the sensor data is not within range, then the flow chart 20-3800 advances to decreasing testing interval period (step 20-3806). In one embodiment, step 20-3806 may be optional. For example, the testing interval period may already be near continuous (per step 20-3802), in which case there may not be a need to decrease the testing interval period. In response (or simultaneous with) to step 20-3806, an alert may be triggered (step 20-3808), and a report may be generated (step 20-3810).

In some embodiments, an alert and/or a report in relation to the not-in-range sensor data may be used to inform and/or alert a human (e.g., operator, supervisor, etc.), saved to a repository (e.g., storage, etc.), inform and/or alert an organization (e.g., Environmental Protection Agency, Department of Motor Vehicles, etc.), etc. It is envisioned that such not-in-range sensor data may also be used to trigger automated actions (e.g., AI integrated systems, etc.), cause automated setting alteration(s) on the vehicle (or an apparatus in which the split ring resonators are located), and/or take any other automated action (without intervention of a human).

FIG. 20-38B is a flow chart 20-3812 relating to landing an aerial vehicle and/or drone using split ring resonators, in accordance with one embodiment. As an option, the flow chart 20-3812 may be implemented in the context of any one or more of the embodiments set forth in any previous and/or subsequent figure(s) and/or description thereof. Of course, however, the flow chart 20-3812 may be implemented in the context of any desired environment. Further, the aforementioned definitions may equally apply to the description below.

The flow chart 20-3812 relates to one embodiment where sensor data is received from one or more split ring resonators (located on site) to assist with pinpoint landing capabilities. It is to be appreciated that as similar flow could be created for use of split ring resonators located on an aerial vehicle (rather than relying on site-based sensors).

As shown, the flow chart 20-3812 starts with an aerial vehicle approaching a landing site (step 20-3814). It is determined whether the aerial vehicle is within a set range (such as a predetermined distance from the landing pad) (decision 20-3816). In one embodiment, determining whether an aerial vehicle is within a set range (per decision 20-3816) may rely, at least in part, on split ring resonators located on the aerial vehicle.

Once the aerial vehicle is within a set range, data may be received from site sensors (step 20-3818). Data from such site sensors may be sent to the aerial vehicle such that position adjustments may be affected (decision 20-3820). When the position does not need further alteration, the aerial vehicle may be landed (step 20-3822). Of course, it is to be appreciated that decision 20-3820 may occur continuously as the aerial vehicle approaches the landing pad, such that real-time adjustments to the position of the aerial vehicle may be made.

In one embodiment, the site sensors (per step 20-3818) may be used to triangulate the exact position of the aerial vehicle. As can be appreciated, the flow chart 20-3812 provides just one example of how split ring resonators may be used and assist in landing an aerial vehicle.

FIG. 20-39 shows a depiction 20-3900 of meta-materials in a dielectric matrix, and circuitry relating thereto, in accordance with one embodiment. As an option, the depiction 20-3900 may be implemented in the context of any one or more of the embodiments set forth in any previous and/or subsequent figure(s) and/or description thereof. Of course, however, the depiction 20-3900 may be implemented in the context of any desired environment. Further, the aforementioned definitions may equally apply to the description below.

Within the context of the present description, meta-materials may include any material engineered to have a physical property that is not found in naturally occurring materials.

As shown, in SEM image 20-3902, meta-materials may be tuned in a dielectric matrix. For example, meta-materials may be selected for frequency selective properties, including where the meta-materials are innately tuned and constructed in application. Additionally, the meta-materials may provide frequency selective conductivity without being direct current conductive. Further, such meta-materials may conduct and maintain a connection without touching (unlike standard conductive ink/flakes/coating which must touch in order conduct and maintain a connection).

The arrangement of meta-materials tuned in a dielectric matrix (per SEM image 20-3902) may be shown via lumped circuits 20-3904, where a series resistance with minimum impedance at resonant frequency, or a parallel resistance with maximum impedance at resonant frequency may be achieved. It is to be appreciated that the arrangement of meta-materials may be arranged in either a series resistance and/or a parallel resistance.

In various embodiments, the meta-materials in a dielectric matrix may be arranged in a split ring resonator 20-3906 which may be represented in a circuitry type configuration 20-3908. Such configuration 20-3908 may include an inductor associated with the ring, and a capacitor associated with the gap of the split ring resonator. Such configuration should be construed in a manner consistent with FIGS. 20-24B1 and 20-24B2 discussed hereinabove.

Use of meta-materials as frequency selective materials may allow for continued flexing (of the material) without degradation in conductance. Additionally, frequency tuning may allow for increased signal to noise ratio for better detection and resolution. Further, other parameters (temperature, stress strain, etc.) may be directly measured through the stretching, deforming, and/or temperature readings of the dielectric matrix.

In this manner, meta-materials may be used in and/or on a split ring resonator, which in turn, may provide frequency selective conductivity without being DC conductive. Further, high frequency conductivity of meta-materials may allow for use in split ring resonators.

FIG. 20-40 shows a depiction 20-4000 of a split ring resonator embedded within an open or closed cell material, in accordance with one embodiment. As an option, the depiction 20-4000 may be implemented in the context of any one or more of the embodiments set forth in any previous and/or subsequent figure(s) and/or description thereof. Of course, however, the depiction 20-4000 may be implemented in the context of any desired environment. Further, the aforementioned definitions may equally apply to the description below.

As shown, a split ring resonator 20-4006 may be embedded between a first layer 20-4002 and a second layer 20-4004. In various embodiments, the material of the first layer and/or the second layer may include open or closed cell (selected or coated) material. Such material may have a specific permittivity that is a mix of the material and of air in the pores within the material itself, such that when the air flow compresses the foam drives out the air and the aggregate permittivity becomes that of the material (the open or closed cell foam). As a result of the fact that the material's permittivity is much higher than the air, the compression of the material would result in a downshift of frequency.

To describe it from an alternative perspective, embedding the split ring resonator 20-4006 in a foam-based material allows for a greater resonance frequency (compared to if the split ring resonator responded by itself). This greater resonance frequency is due, at least in part, to the foam-based material deforming, and when the deformation occurs, there is a direct and great correlation with a change of permittivity of the foam-based material.

Additionally, in another embodiment, a split ring resonator may be printed onto the top of the open or closed cell material foam, with a ground plane on the back with foam material in-between the top and ground plane levels. The distance between the front sensor to the ground plane (with the foam in-between) may cause a frequency shift (like a capacitor). In this manner, the foam material may function as a pressure sensor and the presence of the foam may serve to shift the resonant frequency up or down. For example, if the foam element(s) is deformed or deflected (push in or pulled out), the foam elements can be measured as a change of the split ring resonators.

As such, as detailed herein, a split ring resonator may provide a response to a wireless ping/chirp/query. Additionally, using a foam-based material to encase the split ring resonator may amplify the split ring resonator's response. Again, the deformation of the foam-based material is greater than, for example, a semi-rigid material, which in turn, translates to a greater permittivity difference (comparing again a foam-based material to a semi-rigid material). Within the context of FIG. 20-24B4, a foam-based material may have a similar type response (with the y-axis coordinate measuring permittivity rather than frequency). Additionally, in one embodiment, such permittivity may be unipolar or bi-polar. For example, in some cases (e.g., in turbulent situations), a positive pressure as well as negative pressure may exist on the surface. Within the context of the present description, a semi-rigid material refers to a stiff material that is capable of flexing. A foam-based material refers to a cellular spongy material. Comparing a semi-rigid material to a foam-based material, the foam-based material is capable of greater compression and deformation (given its spongy form). As such, using foam-based material in combination with split ring resonators (as detailed herein) may allow for greater amplification of the response (which in turn may correlate with instrumentation that can operate at lower frequency and power levels).

The combination, therefore, of a split ring resonator with an accompanying material and/or substrate (e.g., semi-rigid material, foam-based material, concrete, rubber, polymers, etc.) may have an ensemble effect. Within the context of the present description, an ensemble effect refers to the frequency response of a split ring resonator in combination with an accompanying material and/or substrate.

FIG. 20-41 shows a depiction 20-4100 of pressure sensors using open or closed cell material, in accordance with one embodiment. As an option, the depiction 20-4100 may be implemented in the context of any one or more of the embodiments set forth in any previous and/or subsequent figure(s) and/or description thereof. Of course, however, the depiction 20-4100 may be implemented in the context of any desired environment. Further, the aforementioned definitions may equally apply to the description below.

In function, a wave pulse may propagate from an antenna (located on the vehicle 20-4104 and/or a surrounding object/location), which in turn may impinge on an object (such as the unoptimized sensors 20-1404) that has real and imaginary physical materials components that either reflect or absorb the energy. This, in turn, may produce a form of analog telemetry via wireless communication (where transmission of temperature, pressure, and/or other measurements may occur by reflection or absorption of the wave pulse), which in turn, may provide a remote low-cost parameter sensing of the physical world.

Real-world testing of the vehicle 20-4102 with sensing data is shown in FIG. 20-42.

FIG. 20-42 shows a depiction 20-4200 of wind pressure sensing data using open or closed cell material, in accordance with one embodiment. As an option, the depiction 20-4200 may be implemented in the context of any one or more of the embodiments set forth in any previous and/or subsequent figure(s) and/or description thereof. Of course, however, the depiction 20-4200 may be implemented in the context of any desired environment. Further, the aforementioned definitions may equally apply to the description below.

As shown, the depiction 20-4200 is of wind pressure sensing data based on a vehicle (such as the vehicle 20-4102). The wind pressure sensor may be constructed in a manner consistent with FIG. 20-40. Additionally, it is to be appreciate that FIG. 20-42 displays a single use case scenario (for wind pressure). Similar sensing data may be obtained for other metrics (temperature, pressure, speed, etc.).

The depiction 20-4200 shows three case scenarios: (1) frequency based on no movement of the vehicle; (2) frequency based on straight track acceleration of the vehicle; and (3) frequency based on the vehicle slowing down on a turn. As can be observed, each of the case scenarios produces a separate and distinct frequency measurement. Such frequency measurement may be correlated with a condition signature, as described hereinabove. Additionally, the stars found on each of the lines are indicative of maxima/minima data points.

FIG. 20-43 shows a depiction 20-4300 of a path and circuitry relating to frequency selective conductivity, in accordance with one embodiment. As an option, the depiction 20-4300 may be implemented in the context of any one or more of the embodiments set forth in any previous and/or subsequent figure(s) and/or description thereof. Of course, however, the depiction 20-4300 may be implemented in the context of any desired environment. Further, the aforementioned definitions may equally apply to the description below.

As shown, the depiction 20-4300 includes an image 20-4301 of current materials 20-4302 and meta-materials 20-4304. As can be observed, current materials require a DC current based on a direct connection which allows current to flow. Such current materials may be represented by circuit 20-4306. In contrast to such conventional systems, use of meta-materials 20-4304 may allow conductivity to be achieved through resistive and reactive pathways. Such pathways may be based on a non-direct connection (where each pathway and/or node does not need to be touching) in order to be conductive. Circuit 20-4308 represents use of the meta-materials to establish conductivity.

FIG. 20-44 shows a depiction 20-4400 of many industries in which the use of split ring resonators may be applicable, in accordance with one embodiment. As an option, the depiction 20-4400 may be implemented in the context of any one or more of the embodiments set forth in any previous and/or subsequent figure(s) and/or description thereof. Of course, however, the depiction 20-4400 may be implemented in the context of any desired environment. Further, the aforementioned definitions may equally apply to the description below.

As shown, the depiction 20-4400 includes a variety of exemplary world-wide industry applications where resonance frequency shifts associated with split ring resonator(s) may offer early detection capabilities with regard to literally hundreds of potential scenarios, thus providing the ability to remediate and adjust where potential issues may be discovered. Data associated with resonance frequency shifts of split ring resonator(s) may apply to nearly every industry and market, including but not limited to: utilities, space travel and exploration, agriculture, power production, manufacturing, vehicular safety, commercial tire dynamics, professional sports, forging, construction, molecular analysis and degradation, biomedical, battery composition, aviation and/or aeronautics, nautical, consumer packaged goods, bridges and roadways, etc. Some of such industries (and applicability of split ring resonators) have been detailed herein.

For purposes of being as precise as possible, as well as showing potential applicability of use of split ring resonators (and resonance frequency shifts relating thereto) to many other industries, additional material is provided hereinbelow.

As discussed earlier, split ring resonators may be embedded in or printed on other materials (other than concrete barriers of FIG. 20-22A2 and/or metal barriers of FIG. 20-22A3) encompassing a wide range of applications within equally wide range of global industries. In this manner, measuring resonance frequency shifts may occur in nearly any application where split ring resonators can be embedded or printed (on a surface, within a material, etc.). Further, split ring resonators may be used not only to determine a shift in resonance frequency (which may be associated with a signature indicative of a physical condition), but may also be used to control an aspect in response to receipt of such input. For example, a temperature sensor may have split ring resonators embedded therein such that when a predetermined temperature is reached, an external unit (air conditioner, heater, air vent, etc.) may be activated until the ambient temperature reaches the predetermined temperature. In some instances, taking an action may be dependent on a processor which may interpret the data from the resonance frequency shift of the split ring resonator, and in response, initiate an action (e.g., a command to take action to modify an environmental condition, etc.). In other embodiments, taking an action may occur without use of an external processor. For example, an item may be transported which must be kept within a predetermined temperature. In order to determine a test the integrity of the temperature while the item is transported, a temperature sensor embedded with split ring resonators may be affixed to the item, and if the temperature exceeds a predetermined threshold, deformation of the sensor may cause a physical manifestation (change in color, deformed indicator, etc.). As such, an environmental change or manifestation may be directly associated with a state of the split ring resonator.

In one embodiment, aviation related applications may include detection of material stress, temperature or vibration levels approaching or exceeding known tolerances as the aircraft experiences subsonic, transonic, supersonic, and hypersonic speeds. Employing split ring resonators within and over the surface of the wings, including aileron(s), elevator(s), and rudder(s), may detect air pressure both above and below the wing surface, temperature increases and decreases, surface area distortions, and even potential material fractures or failures, thus providing opportunity to alert both the pilot and ground personnel to potential danger to the aircraft and provide adequate time to respond and correct airspeed, lift, flight posture, payload disbursal, and so forth before any catastrophic event may occur. Additionally, applicable embodiments may include fixed wing constructions conjoined with aero-foil blades within and upon which split ring resonators are used to measure air pressure above and beneath the aero-foil surface to determine optimal extension or retraction of said aero-foil, thus providing opportunity to adjust flight parameters and maximize aircraft performance. In another embodiment for aviation, employing split ring resonators within and over the surface of the wings, including aileron(s), elevator(s), and rudder(s), may detect at what point the harmonics or geometry of the wing surface begin to deform and turn smooth air into turbulent.

In yet another embodiment, aviation related applications may include aircraft jet engine turbo fan and propeller engine fault tolerance measurements and the potential dangers of exceeding those tolerances. For example, split ring resonators may be employed in virtually every engine part, including housings and cowlings, to provide temperature shift, vibration frequency increases and decreases, material flex or distortion, air intake, fuel intake, combustion, manifold pressure, oil pressure, compression, and/or exhaust measurements. By way of example, split ring resonators on the surface area of an engine's propeller may detect and provide indication of ordinary measurements like speed of angular rotation, axial and/or centrifugal airflow, and torque, and more potentials threat-analytical measurements like undue stress or flex experienced by propeller and fan blades, microscopic stress fractures developing in the same, excessive temperature, engine lubricant viscosity breakdown rate and degree, and so forth, thus alerting pilots to potentially immediate need of corrective action to prevent imminent or eventual engine failure and enabling maintenance personnel to determine possibly appropriate remediation measures to undertake in maintenance cycles.

In still another embodiment, aviation related applications may include both fixed and separable (modular) fuselage integrity measurement parameters and changes thereto from inside and outside forces during flight and on the ground. Split ring resonators may be used within and on the surface of the fuselage to detect varying levels of distortion from internal and external air pressure, temperature shifts, vibration frequency increases and decreases experienced during take-off (or launch), increases and decreases in altitude, and/or increases and decreases in airspeed, and provide early warnings of possible structural failures in the metals and/or composites associated therewith before a catastrophic event may occur.

In one embodiment, biomedical related applications may include detecting slight alterations and/or undue wear in components in a patient's prosthetic limb(s). Through the use of split ring resonators, small (even microscopic)

changes in the composition and/or shape of a prosthesis component may be detected and addressed very early, perhaps even before any pain or discomfort manifests itself to the patient. For example, a fixed-bearing or mobile-bearing knee prosthesis used in knee replacement surgery may develop slight misalignment or contortion as a result of stress from weight-bearing and/or other environmental effects resulting in possible pain or discomfort experienced by the recipient. More specifically, employing split ring resonators in conjunction with the contact surfaces of a femoral and/or tibial component of a prosthetic knee may reveal slight differentiations in pressure and/or stress points as well as possible degradation of the polyethylene articulating surfaces associated therewith, thus alerting medical staff to a potential need for adjustment, maintenance, and/or outright retrofit to maximize comfort and stability for the patient.

In another embodiment, biomedical related applications may include detecting possible shifts in the position, flow, and/or range of motion with regard to any one of dozens or hundreds of medical implants in a post-operative setting. In one example, one or more split ring resonators may be utilized to ensure that an artificial heart valve implant does not move or shift position during operation and/or does not seize up and possibly restrict the free flow of non-oxygenated or oxygenated blood to or from the heart itself, thus risking significant injury or fatal consequences for the patient. If placed on or within both the valve implant and the arterial wall adjacent thereto, split ring resonators may alert the patient and/or medical personnel to minor or major aberrations requiring adjustment or refitting to restore proper heart valve function, possibly even before the patient experiences any overt symptoms at all.

In yet another embodiment, biomedical related applications may include detecting the effectiveness or need to adjust orthotics designed to improve, restrict, attenuate and/or brace or bolster patents' range of motion and comfort. The use of split ring resonators with regard to the application of orthotics may assist in helping correct or counterbalance loss or impairment of a patients' otherwise normal gait affected by significant neurological dysfunction and/or injury or trauma. In one such example, split ring resonators installed within and upon carbon fiber and/or other composite ankle and/or foot orthosis, with a counterpart knee orthosis featuring an extension swing assist mechanism, may detect stress, pressure, and/or range of motion outside of acceptable parameter values, thus indicating that further adjustment is required to achieve the desired level of foot drop correction, knee support, improved balance, enhanced proprioception, and improved gait biomechanics for the patient.

In still another embodiment, personal protective equipment (PPE) related applications may include improving effectiveness of said PPEs to detect certain compounds and/or viral strains within moisture droplets that come into contact with the material of, for example, a face mask. By way of specific example, because split ring resonators based on carbonaceous growth can be tuned serve a specific detection-related purpose, such split ring resonators may be infused within the fibrous materials of an N-95-type face mask (or any type of face mask) with a variety of differently-tuned split ring resonators capable of detecting specific types of molecular compounds and/or viral stains, thus enabling the wearer, and (particularly) medical personnel, to quickly determine whether a risk of contagion and/or imminent illness might be an immediate threat and engage appropriate quarantine, treatment, or remedial protocols to minimize negative effects.

For example, in one embodiment, the face mask may be used to detect a specific strain (such as COVID), and when the specific strain is detected, the face mask (or a specific portion of it) may visibly change a color, at least in part. Such may be indicative that the user of the mask has contracted the specific strain. Additionally, other virus sensors may be installed in any location (e.g., bus entryway, metro car, subway entrance, etc.) such that based on ambient air passing by, if the specific strain is detected, it may change colors, indicative that an individual has passed by that sensor who has the specific strain.

Further applicability of use of split ring resonators for detecting biomaterials may be found in U.S. patent application Ser. No. 17/382,661, entitled "METHOD OF MANUFACTURING A GRAPHENE-BASED BIOLOGICAL FIELD-EFFECT TRANSISTOR," filed Jul. 22, 2021, the contents of which is herein incorporated by reference for all purposes.

Within the context of airport security, such sensors could be embedded within typical metal detection systems such that when an individual is being scanned, the air being expelled from the individual may be analyzed to determine the presence of the specific strain. In one context, a low-cost fabric-based sensor could be hung within the metal detector such that when an individual passes by the air may be automatically analyzed, and a color change may occur on the low-cost fabric if the specific strain is detected. Such detection may occur even without requiring electronic configuration or parts. Alternatively, the sensor may be electronically attached to a processor such that when the air is analyzed, if the specific strain is detected, a response (e.g., alarm, notification, etc.) may occur.

In one embodiment, utilities related applications may include detecting slowly and/or suddenly developing faults in high-power line conductor structures and/or housing/insulating sleeves. As an example, split ring resonators may detect stress flexing or fractures in protective power line insulation and/or housing sleeves that could possibly become a contributing factor in allowing sparks or other direct effects to potentially impact or ignite wildfires due to a relative proximity of dry vegetation (e.g., grasses, trees, leaves, etc.) to power line structures. More specifically, the use of split ring resonators installed within and around one or more layers of housings and/or sleeves installed radially around the master conductor cable may detect the development of small (even microscopic) faults over time that, if left unchecked, might leave the master conductor wire(s) dangerously exposed to natural elements.

In another embodiment, utilities related applications may include measuring liquid and/or gas flow through one or more forms of delivery apparatus (pipelines) and measure any changes in the shape, temperature, structural integrity, and stress (due to internal and/or external pressures) possibly affecting performance of said delivery system. In particular, split ring resonators may be employed to help maintain optimal operational pressure levels in delivery pipelines by detecting and alerting operation and maintenance personnel to changes in the composition of the delivery mechanisms' physical structure (cylindrical and otherwise) and possibly detect even microscopic faults in structure material that, if diagnosed and handled at an early state, will not mature and manifest into catastrophic loss or damage to the pipeline delivery system as a whole. By way of a different example, split ring resonators may detect over-pressurized delivery segments, thus allowing operation and maintenance personnel the opportunity to make upstream and/or downstream adjustments to keep such pressure within standard operational thresholds and alleviate undue stress leading to additional maintenance, repair, and/or even replacement.

In one embodiment, construction related applications may include the use of split ring resonators to detect stress, unforeseen or uncalculated load-bearing, and/or other environmentally-based effects on performance, including but not limited to ambient temperature changes, moisture indices and/or saturation, and relative physical size of the raw materials employed to provide requisite support, load balancing, and stability. By way of example, split ring resonators positioned along the long axis of a support beam and/or joist in the rafters of a rooftop construction may reveal unforeseen flexing of said beams or joists, thus alerting the builder and/or occupant to potentially hazardous conditions of flex stemming from the method of construction relative to weigh borne by said construction. In addition, where structural materials other than natural wood are employed (including but not limited to composite steel, plywood, or oriented strand board, etc.) split ring resonators embedded within the structure of the load-bearing material itself may detect small imperfections or faults developing over time that could eventually lead to failure of the support structure should fault severity rise above a predetermined threshold.

In another embodiment, construction related applications may include detecting changes in the composition and structure of extremely high-level load-bearing steel-reinforced or purely concrete support pylons for pedestrian as well as vehicular bridges, elevated railways, parking structures, multi-level housing and commercial structures, etc. More specifically, split ring resonators integrated as part of the composite material of a reinforced concrete pylon structure, as well as surface-installed split ring resonators capable of detecting changes in composition, may be employed to detect the initial development of small defects, and/or presence of existing slight defects following casting, that could possibly require further external support and/or other remediation measures necessary to preserve the integrity of the structure and continue providing adequate load-bearing according to the design thereof.

In still another embodiment, construction related applications may include ensuring adherence to fire-prevention and other safety measures required by governmental standards and regulations. In such a capacity, split ring resonators may help detect the unlikely occurrence of, for example, unforeseen and unnoticeable alterations in constructed "firewalls" and/or other fire-resistant assembly systems comprising metal frames and lightweight structural cementitious (SCP) panels. Specifically, split ring resonators may detect small "gaps" developing in the installation of the firewalls or SCPs and alert builders and/or maintenance personnel to those protective measures having fallen out of compliance with the aforementioned governmental regulations where otherwise casual visual affirmation measures may not detect said non-compliance.

In one embodiment, nautical related applications may include detecting any changes in the structural integrity and/or wind pressure applied to the sailcloth of an unfurled sail as the draft of the sail opens up under wind loading. Employing split ring resonators on the surface of, and/or in between multiple cloth layers comprising, a sail may provide critical real-time information to the sailing crew of a potential problem with the integrity of the sail when in use. In one specific example, split ring resonators may be able to detect material distortions or faults within and upon a spinnaker sail composition under the stresses associated with wind loading during casual and/or competitive sailing, thus enabling the crew to more quickly affect necessary adjustments to the spinnaker sail posture with regard to its tethering to the mast, spar, and/or stay.

In another embodiment, nautical related applications may include detecting changes in solid and/or tubular mast compression when a main sail (or main sheet) experiences varying degrees of wind loading during normal operation. By way of example, the use of split ring resonators affixed to the surface of a bendable/flexible mast may assist the sailing crew in determining whether the optimal level of wind load applied to the main sail is being achieved and/or whether an adjustment therefore is required. Additionally, the use of split ring resonators affixed to a rigid mast construction may detect degrees of undue/unplanned flexing of the mast during operation, possibly indicating an excess of wind loading force upon the main sail that the crew may diagnose and make appropriate adjustments to return to optimal performance. Further, the use of split ring resonators employed both within and attached to the exterior of sold and/or tubular masts may aid the crew in detecting early signs of stress faults developing in the mast's material construction, thus enabling the crew to more accurately determine a window for more comprehensive testing, maintenance, and even outright replacement where fatigue has passed beyond a predetermined "safe" threshold.

In yet another embodiment, nautical related applications may include detecting changes and/or aberrations in the construction of vessel components (particularly the hull) due to outside forces like temperature (both in and out of the water), small and large strains possibly affecting metal, composite, and/or alloy material construction performance when both anchored as well as under propulsion. By way of one example, the use of split ring resonators may detect changes or distortions of the pontoons of a catamaran, for instance, when sailing over calm and/or challenging waters. Specifically, where multi-hull designed watercraft are generally employed due to superior ability to travel at higher speeds and remain relatively more stable than their monohull counterparts, part of that comparison equation between the two may involve hull surface areas in contact with the water during operation. Employing split ring resonators on the surface of the hull(s) of such a watercraft may detect temporary changes, aberrations, and/or distortions in the shape of the hull(s) due to changes in water temperature, impact of wake, material flex during in operation, etc. that might lead to increased drag potentially translating to a lower achievable speed than when optimal hull surface shape is maintained. With that information, watercraft crews may have the ability to possibly adjust one or more environmental parameters in an effort to return to optimal performance. In one embodiment, such environmental parameters (e.g., angle of sail, length of cord, etc.) may occur automatically (based on an actuator attached to a process to process the data from the split ring resonator(s)).

In one embodiment, forging related applications may include detecting minor aberrations in the consistency/density of forged metals, composites, and/or alloys. The arena of forging metals, composites, and/or alloys may span two major stages of implement production: applying high levels of heat and casting of ingot blanks, and the actual shaping and creation of the end-result implement derived from the forged materials. The first example may involve using split ring resonators to help detect very small (even microscopic) deformities and/or aberrations in the raw metal, composite, and/or alloy that could potentially affect the quality, strength, and reliability of the finished product exemplified by the second example. The second example, the end product of the forging process, may benefit from split ring resonators both within the metal, composite, and/or alloy raw material as well as affixed to the exterior of the finished product because the resonators may help detect surface shape, density, and/or consistency variations outside of acceptable established parameters. By way of a specific example, employing split ring resonators in the forging of the shaft and/or head of a golf club (an "iron," for example) may alert the manufacturer and designer to a slightly inaccurate club head angle or possibly weaker—than-expected coupling between the golf club shaft and head when assembled, or the split ring resonators may detect a club head shape that is slightly inconsistent with the strict design guidelines, thus requiring a reforging or other material adjustment to bring the club back into compliance with manufacturing standards.

In one embodiment, power production related applications may include establishing and maintaining consistency and optimal performance of individual solar cells within a large solar panel array. For example, split ring resonators may be integrated into the actual material of individual solar cells when fabricated which can detect when the material of the cell may be degrading or performing outside of established norms during regular operation/collection and retention periods. Additionally, split ring resonators may be employed adjacent to the array of solar cells (between the cells and the encapsulant, for example) to detect whether the solar array as a whole is experiencing compromised performance, or merely one or more individual cells.

In another embodiment, power production related applications may include detection of environmental conditions related to the structure and operation of a hydroelectric dam and/or the power plant(s) associated therewith. Using split ring resonators within the construction of a dam may provide the ability to detect changes in the composition of dam construction materials (including, but not limited to, components such as antiseepage armored concrete, concrete stake, first sealing metallic plate, metal connecting plate, second sealing metallic plate, and second antiseepage armored concrete) and enable builders, operations personnel, and maintenance personnel to analyze real-time data about the current state of the dam's structure, perhaps providing early warnings of potential faults that, left unaddressed, may mature into full-fledged catastrophic breaches in the dam's primary function. Specifically, constructing the dam with split ring resonators installed within the raw cement pours that constitute the dam's primary structure may enable sensors installed in and around the dam to provide early warning of slight changes, distortions, and or deformities in the anti-seepage armored concrete structure (s), thus enabling the operation and maintenance personnel an opportunity to remediate or mitigate any potential issues before any real problems surface.

In yet another embodiment, power production related applications may include constantly monitoring and assessing the viability and condition of horizontal-axis wind turbine stands, blades, and/or energy generators. The use of split ring resonators may detect changes in fan blade durability, wear, and posture, shape, strength, and durability of vertical stands, and/or standard operation of the turbine itself. By way of specific example, placement of split ring resonators on both the blades of a horizontal-axis wind turbine apparatus, as well as the hub to which those blades are attached, may provide early indications that an individual blade's (which may consist, in one embodiment, of aluminum-fiberglass hybrid construction) connection to the hub is weakening over time, thus requiring possible maintenance and even replacement, barring appropriate remedial measures. Early detection of these types of possible faults saves time and money in that "an ounce of prevention may be worth a pound of cure," and maximized operation time may be directly related to sustained, or even increased electric energy production.

In still another embodiment, power production related applications may include detecting and tracking changes in natural gas storage and transport conduits. As one of the costliest, (in terms of time, capital expenditure, potential energy loss, and additional maintenance cycles) issues with natural gas storage and transfer, leakage along any of the wide range of physical systems involved in delivering natural gas energy sources is a problem that may be minimized or alleviated altogether with the use of split ring resonators deployed throughout the system. By way of example, split ring resonators applied to the physical delivery conduit(s) that transport natural gas from point A to point B can detect potential leaks early by providing indications to operations and maintenance personnel that potential faults, distortions, and/or aberrations are forming within the material of the transport conduit(s) directly and/or any joints or junctions where a piece of transport conduit may be physically attached to one or more additional components. Additionally, being able to detect leakage of a predetermined gas (e.g., methane, etc.) may have green applicability in that environmentally harmful gases may be detected and stopped before causing significant damage.

In one embodiment, manufacturing related applications may include displaying information about component amalgamation and/or final assembly status (conforming or nonconfirming) of a given product at the end of the build and assembly process. Employing split ring resonators in precise locations on individual parts brought together to form a complete machine or other product can detect if and where possible inaccuracies and/or misalignment may be present in the final assembly. For example, if three parts A, B, and C of an end product are to be assembled according to known strict tolerance guidelines with regard to spacing and/or alignment, split ring resonators positioned so as to detect the presence (or absence) of other precisely placed split ring resonators—for the purpose of affirming whether the two pieces A and B (or B and C, or A and C, as the case may be) are correctly connected to one another without undue variance in specified gaps or alignment—may detect where an assembly fault may be present based on proximity measurements between the split ring resonators falling outside of acceptable tolerances.

In another embodiment, manufacturing related applications may include detecting any potential faults or errors within an apparatus by way of post-production testing. The use of split ring resonators affixed to crucial locations of a newly-manufactures supersonic-capable jet engine afterburner assembly may provide critical information to the engineers and maintenance personnel regarding the accuracy of said assembly when performing its function in otherwise real-world conditions. Specifically, affixing split ring resonators to the longitudinally-movable shroud and variable area exit nozzle comprising the afterburner "thrust-shaping" mechanism can provide vital information regarding that assemblies post-production performance by relaying whether said shroud and nozzle functions are performing within established optimal tolerances, thus ensuring proper functionality prior to ultimately introducing said afterburner assembly to the supersonic jet fighter on which the assembly will perform its intended function.

In one embodiment, agriculture related applications may include detecting and tracking growth rates among a sample of agricultural products to determine whether those specimens are growing at rates within established guidelines (e.g., not growing too slowly, but also not growing too fast). Because it would be difficult, and perhaps unreasonable, to place split ring resonators within the actual fiber of plant specimens, themselves, split ring resonators employed on key external points of the non-edible portion(s) of such agricultural specimens may detect growth rates when pinged at the correct intervals over the span of a typical growth cycle of said plant specimen. In addition, split ring resonators employed may be used to simply detect and report on surface temperature readings over the course of a set polling period by reporting the surface temperature back to the polling mechanism each time a ping is conducted thereon, thus allowing the growers and botanists information relevant to the temperature of given agricultural specimens over the course of a growth cycle period. Further, split ring resonators may be employed to also provide key information about moisture saturation of agricultural specimens to which the split ring resonators are affixed. That is, whenever the polling and recording mechanism seeks a response form the one or more split ring resonators affixed to a given group of agricultural specimens, personnel monitoring the growth process may be able to discover whether, and by how much, the moisture saturation of one or more agricultural specimens demonstrates a measurement outside (either too little or too much) of acceptable parameters and possibly learn something about the effects of said moisture aberrations. Further still, split ring resonators may be able to detect whether, and by how much, agricultural specimens may be exposed to inadequate, inadequate, or excessive ultraviolet light during a growth cycle. When affixed to key external points of the non-edible portion(s) of such agricultural specimens, split ring resonators affixed to plants both within and out from under shaded areas may closely track each specimen's exposure to direct, indirect, or obscured light sources by way of readings returned during regular polling by polling and recording mechanisms.

In one embodiment, space travel related applications may include determining whether spacecraft modules are fitting together and as designed and remain safe for astronauts as well as other sensitive beings and/or inanimate payload on the ship. By way of one specific example, split ring resonators may be employed in conjunction with two spacecraft vehicles and/or spacecraft modules which are at some point connected or conjoined while operating in a zero-gravity setting. The split ring resonators may detect whether the conjoining processes (where controllers are designed to articulate the coupling system in order for the active half of the coupling system to successfully capture the target component, align the two, and establish an otherwise static/rigid connection) are completed accurately and safely by alerting astronauts and/or other monitoring personnel to potentially hazardous conditions based on proximity, air pressure, temperature reading tolerances are or are not within acceptable guidelines.

In another embodiment, space travel related applications may include constant solid rocket propellant integrity monitoring and reporting for all launch stages (before, during, and after) of a space vehicle. For example, solid rocket propellant (SRB) composites must remain crack/defect-free, as propellant composites which contain cracks present a risk of explosive failure of the vehicle. If not properly monitored for potential faults/cracks/defects, solid propellant systems may be inadvertently ignited by multiple possible causes including mechanical shock and static electricity. The possibility of employing split ring resonators in both the actual composite fuel mix, as well as upon the surface of the solid fuel element, can provide a detection medium for astronauts and ground crew to receive early warning of possible faults in an SRB fuel source before launch of the vehicle and subsequent potentially devastating failure.

In another embodiment, space travel related applications may include detecting and tracking the effects of external forces on the framing, body, and components of a rocket-propelled vessel during launch. Extreme heat, vibration, air pressure increases and decreases, and/or torque introduced by lift-off are just a few of the outside forces that may have potentially negative impact on the launch vehicle during actual launch. Such forces may lead to changes and/or distortions in the surface shape of the launch vehicle which could impose potentially dangerous results if not detected early and mitigated effectively. Thus, employing split ring resonators over the surface and within the components of a launch vehicle may help provide real-time data about changes in conditions and/or other unexpected circumstances to the astronauts and ground personnel who can then affect minor ad hoc adjustments in telemetry, etc. to keep the launch process progressing according to design parameters.

In one embodiment, professional sports equipment related applications may include monitoring and tracking raw data from a professional athlete's protective (and non-protective) equipment during competition. One high-profile example involves the use of a football helmet in professional football contests (as well as other sports requiring helmet use) and the necessity for that helmet to provide adequate protection to the wearer against concussion (or worse) brought on when the wearer's head experiences both linear acceleration and rotational acceleration due to a variety of impact types over the course of a contest. By way of a specific example, split ring resonators may be installed in the crown energy attenuation assembly (or "padding") formed from absorbent foam, air, gel, or a combination thereof and integrated into the construction of a player's helmet. In fact, split ring resonators may be a part of the actual material composition (of the absorbent foam, for example) in the helmet and used to detect extreme compression within one or more specific pressure points within the helmet during impact. Thus, athletic training staff on the sideline of a contest in progress may conceivably receive real-time "alerts" that one or more absorbent foam inserts within a particular player's helmet have just received a potentially excessive (dangerous) impact without the player, themselves, even needing to alert said personnel to the potential issue as all.

In one embodiment, an adhesive (as described hereinbelow in FIGS. 45-56) may include a resonant sensor. Such adhesive may be deployed on a person (e.g., a soldier's helmet, nurses' RAD dosimiter, etc.) and/or on an object (e.g., a car, a drone, a clothing, a helmet, etc.). Additionally, information provided by resonant sensors in the adhesive may retrieved dynamically (while the sensor responds to the environment) or in a static manner (post-event) to the exposure. Such adhesive with embedded resonant sensor may be disposable and respond faster than existing sensor systems.

In one embodiment, professional sports equipment related applications may include monitoring the integrity of other perhaps lesser safety-oriented equipment required for success in a particular player's given competition. By way of specific example, professional hockey players may be prevented from playing (in the course of normal competition) without a suitable hockey stick used to manipulate the puck around the ice during competition. If and when a stick breaks, that player may be required to immediately discard the broken implement (which nearly always culminates in the player dropping the remnants of the broken stick in question wherever they happen to be on the ice at that moment), thus rendering the player essentially ineffective for any time he/she is on the ice during competition. Using split ring resonators both within the construct and on the outside of graphite hockey sticks (and attached to the exterior of a natural wood hockey stick) would enable bench personnel to learn whether the integrity of a hockey stick in use may be approaching a breaking point before that stick actually breaks, thus allowing the player to switch to a brand new stick before any such failure. In addition, another hockey-oriented application may involve snap-on-snap-off replaceable skate blades. If a replaceable skate blade were to unexpectedly release and/or become detached from its housing during competition, the results could be fatal. The use of split ring resonators on the two conjoining elements that constitute a replaceable skate blade connection may detect whether a separation is imminent based on a change of proximity of the two split ring resonators, thus allowing the player and/or bench staff to affect a necessary adjustment and/or reconnection in order to prevent such a separation during competition.

In one embodiment, lubricant (and other vital fluids including but not limited to fuel, coolants, and other process fluids) viscosity and/or molecular degradation related applications may include detecting, at a molecular level, when a vital fluid (such as motor oil) begins to break down within an engine during operation. By way of one specific example, microscopic split ring resonators infused within the actual composition of the liquid may detect molecular degradation of the fluid over the course of regular engine operation by, for example, detecting increased levels of foreign matter within the liquid (e.g., carbon deposits from the many thousands of ignition chamber combustion events, etc.), thus enabling an outside monitoring component the ability to display a report or initiate an alarm to alert operations and maintenance personnel when a potential threshold level of foreign particulates have become "part of" the lubricant pool within the engine requiring flushing and refreshing of lubricant to prolong the life of the machine in question. It should be noted that similar split ring resonator use may be applicable to the known other aforementioned engine-operation liquids including fuel, coolant, and process fluids like hydraulic fluid, etc.

In one embodiment, rechargeable battery composition, charging, and recharging related applications may include detecting when and how severe changing conditions within the membrane components (cathodes, anodes, separators, etc.) of a rechargeable battery may be in real time. For example, electrodes attached to the external casing of a rechargeable battery may receive detection information from split ring resonators integrated throughout the cathode (and/or anode) of a lithium battery during the initial charging, discharge, and recharging phases of battery operation. Detection of anomalies or inconsistencies in the material make-up of the cathode (and/or anode) membranes by the split ring resonators may, thus, alert operations personnel to a potential problem with a single cell, or even a block of lithium cells, in a larger battery housing which could potentially affect overall performance.

Additionally, in some embodiments, pinging the split ring resonators may occur by an external source (such as a ping to a split ring resonator located on a surface of a vehicle). In other instances, pinging the split ring resonators may be prevented by a surrounding impediment (such as when the split ring resonators are embedded in a liquid, or within a steel structure such as an engine, etc.). In those instances, data may be collected where the split ring resonators are located. For example, if split ring resonators are within a liquid traveling through an apparatus, such split ring resonators may be pinged during the course of travel by a microprocessor (located also within the liquid) and data may be recorded during the course of travel. In this manner, when the liquid exits the apparatus, data collected during the course of travel may be provided. Further, such data may be correlated with signatures and conditions associated with the apparatus in which it was traveling. For example, if split ring resonators are embedded within a lubricant, such lubricant may be sent through an engine, and after exiting, data associated with the split ring resonators as it traveled through the engine may have a timestamp associated with each ping such that a particular location of the split ring resonator may be correlated with the timestamp. In this manner, an aberration detected internally may be ascertained after the lubricant has exited the apparatus. Additionally, in another embodiment, data obtained from pinging the split ring resonators may be received internally (within the system in which the split ring resonators are embedded) and communicated via a hard wired connection to an external antenna which, in turn, may communicate the data to an external data collecting source.

With respect to fleet management, split ring resonators may be used in a variety of contexts. For example, maintaining a fleet (e.g., drone, vehicles, trucks, planes, etc.) in good working condition may be based on individual readings of split ring resonators in each item. Knowing when an item needs to be taken from use and serviced is often based on 1) predetermined time or travel thresholds; or 2) device failure (indicative that it needs to be repaired). Having split ring resonators embedded within such fleet item would allow for precise management of a fleet such that an item is serviced whenever a sensor on the item detects a change in state 3) with respect to fleet management, individual vehicle or part wear and failure data can be communicated into the fleet's and part manufacture's warehouse and factory order system (CRM) to better synchronize just in time parts in advance of a scheduled service to improve more accurate forecasting of needed parts at the manufacturing site or warehouse site. Additionally, mass management (service warehouse, real estate houses, commercial properties, etc.) can be time and cost intensive to maintain. Split ring resonators can be tuned for specific sensitivities (such as detecting when a layer of dust is found on a floor). Such an applicability could apply even to research facilities (which operate in no dust zones).

In various embodiments, operation of the split ring resonators may be used for triangulation (or location positioning). Additionally, a response from a split ring resonator may, in turn, cause a response in a second split ring resonator, which may, in turn, generate another response in a third split ring resonator, and so on and so forth. In this manner, a response from a single split ring resonator may be sequenced through other split ring resonators as needed. In another embodiment, operation of the split ring resonators may be used for triangulation (or location positioning) in areas where GPS data is nonexistent, compromised or insufficiently accurate for precise navigation and location.

In another embodiment, the mattress industry may use split ring resonators to modify the contours of a mattress to match a preference of a user. For example, a user may want to decrease pressure at a certain point of the mattress (to alleviate back pain, etc.). As a user lies on the mattress, the split ring resonators (which may be embedded within the mattress, within a foam material, etc.) may indicate pressure points across the entire mattress. A processor associated with the mattress may be used to interpret such data and modify the contours of the mattress (including by mechanical manipulation, expansion/retraction of foam in the amount of compression, etc.) to achieve the desired outcome (a specific pressure at the specific point indicated). Additionally, a doctor may provide a specific set of mattress pressure points (to alleviate a condition) which may be inputted into the mattress such that when a user lies on the mattress, the mattress may be configured in real time to meet the prescribed pressure points. Further, as a user changes position in bed (from side to back sleeping, etc.), the mattress may continually adjust the contours of the bed to meet the predetermined pressure points, regardless of the position taken by the user.

Still yet, in one embodiment, the split ring resonators could be used to detect a growth on an object. For example, the split ring resonators may be embedded into fiber and composite fiber such that if black mold grew, for example, on the surface of wall (such as an inside wall that is not outwardly facing), the black mold may be detected on the surface of the wall. Additionally, the split ring resonators may be used to detect a leak (such as a water leak in a basement of a house). Thus, within the context of house maintenance and safety, split ring resonators may be used to detect the state of the house.

Further, split ring resonators may be used to detect integrity of medication (such as medication spoilage). Additionally, it may be used in a sensor to detect a physical condition (presence of gangrene, blood sugar levels for diabetes, etc.).

Further applicability of use of resonant frequency shifts of split ring resonators may apply within the context of U.S. patent application Ser. No. 17/884,735, entitled "BATTERY SAFETY SYSTEM FOR DETECTING ANALYTES," filed Aug. 10, 2022, and U.S. patent application Ser. No. 17/182,006, entitled "ANALYTE SENSING DEVICE," filed Feb. 22, 2021, the contents of all of which are herein incorporated by reference for all purposes.

Further, split ring resonators may be used to detect can be placed on individual containers of consumer packaged goods, e.g., laundry detergent, milk, etc. or consumer RX containers to determine the amount of product remaining in the container and then relay that information into a patient's medical management system or automatic re-ordering system.

Still further embodiments include deployment of resonant sensors into motive platforms for detection of hazardous analytes, bio-hazards, and/or presence of hazardous levels of nuclear radiation.

FIG. 20-45 shows a depiction 20-4500 of one or more split ring resonators embedded in an adhesive sticker, in accordance with one embodiment. As an option, the depiction 20-4500 may be implemented in the context of any one or more of the embodiments set forth in any previous and/or subsequent figure(s) and/or description thereof. Of course, however, the depiction 20-4500 may be implemented in the context of any desired environment. Further, the aforementioned definitions may equally apply to the description below.

As shown, depiction 20-4500 shows four (4) possible embodiments where one or more split ring resonators are embedded in an adhesive. Adhesive 20-4502*a* shows a single split ring resonator 20-4504*a*. Adhesive 20-4502*b* shows an array of split ring resonators 20-4504*b*. Adhesive 20-4502*c* shows multiple arrays of split ring resonators 20-4502*c*. Adhesive 20-4502*d* shows a single split ring resonator 20-4504*d*.

In various embodiments, the depiction 20-4500 shows a variety of possible configurations of embedding split ring resonators onto an adhesive. In the context of the present disclosure, an adhesive may include any porous flexible matrix. In various embodiments, the adhesive may also include a non porous flexible matrix. For example, a non-porous flexible matrix may include a solid substrate, a material that melts at a preconfigured temperature, a material that changes (at a molecular level) to an exposure to the environment. In various embodiments, a material may be selected that responds to the environment (causes a change in permittivity). As an example, a material may dissolve from exposure to acetone, which in turn, may cause a change in permittivity (which can be detected and then reported).

The split ring resonators may be embedded in the adhesive and configured to be sensitive to chemicals. For examples, a sensitivity of the split ring resonators may be configured by constructing the split ring resonators from chemically reactive materials in the adhesive. In an embodiment, the split ring resonators may be constructed (as disclosed otherwise herein) and surrounded by the chemically reactive materials (such that a reaction to the chemically reactive materials may change the permittivity of the split ring resonator). As the chemically reactive materials come in contact with their surroundings, the chemically reactive materials may respond (and/or otherwise react). Such response may correlate with a change in permittivity of the chemically reactive materials. Thus, the change of permittivity may be measured in the chemically reactive materials, and may cause a change in the permittivity of the associated split ring resonator.

It is to be understood that the split-ring resonators may be configured by constructing the split-ring resonators using carbon and the chemically reactive material. Additionally, in another embodiment, the split-ring resonators may be configured in a manner such that the split ring resonators are surrounded by the chemically reactive material. Of course, the split-ring resonators may be configured using both configurations (constructing the split ring resonators using carbon and chemically reactive material, and then surrounding/sandwiching the split ring resonators with the chemically reactive material.

The chemically reactive materials may be exposed to chemistries of volatiles (in the surrounding environment). This, in turn, may again, cause a change in permittivity of the split ring resonators embedded in the adhesive. The split ring resonators may additionally store detected concentration levels of the volatiles.

It is to be appreciated that the chemically reactive material may be optimized depending on a particular application. For example, the chemically reactive materials may be configured for biological threat detection, volatiles, environmental, industrial applications.

For example, the chemically reactive materials may include protein-based detection (material that includes antigens or antibodies), metabolites (material that includes organic acids), microbial growth pattern, biomarkers (protein, nucleic acids, other molecules, etc.), and/or any material which changes in response to environmental conditions (such as temperature, humidity, permittivity, etc.). The chemically reactive material may be selected to specifically detect presence of specific pathogens, toxins, volatiles, chemical configuration, etc.

As such, the chemically reactive materials (in other words, a reagent) may be selected to react with a specific target chemical. In particular, the chemically reactive materials may be configured to have a high degree of specificity for a target chemical.

Additionally, the adhesive selected may be porous to allow the chemically reactive materials to react to chemicals in the surrounding environment. It is to be appreciated, however, that the adhesive selected may depend on the application (solid support versus porous properties, or the specific target chemical to be detected) and the properties of the chemically reactive materials.

In various embodiments, the chemically reactive materials may react to the environment through a chemical reaction (including color change, gas release, electrical conductivity). The reaction, in turn, may be detected via a change of permittivity, which, in turn, may be stored in the split ring resonator. In the context of the present disclosure, a split ring resonator may store a state of a material in that when the material is exposed to another chemical, the split ring resonator may physically alter (expand or contract). Thus, the split ring resonator may be interrogated at a later time period (after the chemically reactive materials have been exposed) and the split ring resonator may reflect the state of the chemically reactive materials at a time period in which it was exposed to a target chemical. In one embodiment, the chemically reactive material may be an ink-based substance that is applied to the adhesive.

In one embodiment, when a split ring resonator has stored a state of the chemically reactive materials, that, in turn, may cause another split ring resonator to become active to record a second state of the chemically reactive materials, and so on and so forth. Thus, an array of split ring resonators may, in fact, collectively store multiple states of the chemically reactive material. As an example, at time point 1 minute, a first split ring resonator may store a state of the chemically reactive material, at time point 2 minutes, a second split ring resonator may store a state of the chemically reactive material, etc. An array may be configured therefore to meet the needs of the application. In some instances, a sensor may be needed simply to detect the maximum levels of a toxin within a set space. As such, a single split ring resonator may be used to store the maximum concentration levels detected by the chemically reactive materials. In another application, it may be desired to know where a gas leak is located along a pipeline. A sensor with an array of split ring resonators may be deployed such that at preconfigured time intervals (corresponding to position points along the pipeline) a sampling of the concentration may be obtained. As such, the split ring resonators may store a state of the chemically reactive materials depending on the needs and application for sensing target chemicals.

Additionally, an array of split ring resonators may be configured such that when chemically reactive material of a first split ring resonator is triggered, the chemically reactive material may create a daughter product (e.g., ammonia). Such daughter product (presence of ammonia) may then trigger a second split ring resonator in the array, and so on and so forth. Additionally, in another example, the chemically reactive material may include explosive material which may decompose into a daughter product (e.g., esther). Such daughter product may also be used to reduce or eliminate false positives detected by the split ring resonator.

In various embodiments, an adhesive may include at least one meso-scale or micro-scale resonator embedded within a material that comprises at least a portion of the adhesive, wherein the at least one meso-scale or micro-scale resonator is formed from a composite material. Additionally, the at least one meso-scale or micro-scale resonator may include a plurality of first carbon particles configured to uniquely resonate in response to an electromagnetic ping based at least in part on a concentration level of the first carbon particles within the at least one meso-scale or micro-scale resonator.

In one embodiment, the at least one meso-scale or micro-scale resonator may include at least one split-ring resonator (SRR). The resonance may be an electromagnetic return signal that indicates a state of the at least one meso-scale or micro-scale resonator. Additionally, the state of the at least one meso-scale or micro-scale resonator may indicate at least one of, exposure to an analyte, exposure to a bio-material, or exposure to radioactivity. The state of the at least one meso-scale or micro-scale resonator may be correlated to indicate a maximum value of at least one of, exposure to an analyte, exposure to a bio-material, or exposure to radioactivity. Additionally, the state may include an absorption, or an adsorption into the material. The adhesive may be configured to resonate at a first frequency in response to the electromagnetic ping when the material is in a first state, and may be configured to resonate at a second frequency in response to the electromagnetic ping when the material is in a second state. The adhesive may be configured to indicate an extent of adsorption into the material by generating a first electromagnetic return signal in response to the electromagnetic ping, and may be configured to indicate a lack of adsorption into the material by generating a second electromagnetic return signal in response to the electromagnetic ping.

In one embodiment, a first set of the one or more SRRs may include a plurality of first carbon particles configured to uniquely resonate in response to the electromagnetic ping based at least in part on a sensed concentration level of a first analyte. A second set of the one or more SRRS may include a plurality of second carbon particles configured to uniquely resonate in response to the electromagnetic ping based at least in part on a concentration level of a second analyte. Additionally, each of the first carbon particles and second carbon particles may be chemically bonded with the material. The first carbon particles may include first aggregates forming a first porous structure. The second carbon particles may include second aggregates forming a second porous structure.

In one embodiment, at least three instances of the adhesive may be used to triangulate a position of the adhesive. The adhesive may be configured to be applied to one of: a vertical take-off and landing (VTOL) aircraft, an electric vertical take-off and landing (eVTOL) aircraft, a drone, a passenger drone, a commercial aircraft, a military aircraft, a vehicle, a robot, a body, a box, personal electronic device, a toolbox, a home appliance, or a rocket. Additionally, the composite material may include a 3D monolithic carbonaceous growth.

In one embodiment, a tuned resonant frequency of the 3D monolithic carbonaceous growth may be based at least in part on one or more physical characteristics of the material. A resonant frequency of the 3D monolithic carbonaceous growth may be based at least in part on either or both of a permittivity and a permeability of the material. Additionally, the electromagnetic return signal may have a first frequency, and a second electromagnetic return signal may have a second frequency different than the first frequency.

In one embodiment, the apparatus may include a protective layer over the material. The at least one meso-scale or micro-scale resonator may include an array of two or more split ring resonators. Additionally, each split ring resonator of the array may be configured to detect at least one of a particular predetermined analyte, a biological agent, a radioactive isotope, or a particular predetermined volatile substance.

FIG. 20-46 shows a depiction 20-4600 of one or more split ring resonators embedded in an adhesive sticker, in accordance with one embodiment. As an option, the depiction 20-4600 may be implemented in the context of any one or more of the embodiments set forth in any previous and/or subsequent figure(s) and/or description thereof. Of course, however, the depiction 20-4600 may be implemented in the context of any desired environment. Further, the aforementioned definitions may equally apply to the description below.

In particular, the depiction 20-4600 shows that an adhesive 20-4602 may include at least one split ring resonator 20-4604. The adhesive 20-4602 may be configured to be a stick and peel adhesive (sticker). In various embodiments, the stick and peel adhesive may be disposable, low-cost, and easily placed as needed depending on the application. For example, the stick and peel adhesive may be placed on a robot, drone, automobile, spacecraft, airplane, housing wall, and/or any location where the chemically reactive materials may react with the surrounding environment. Such locations may include stationary and/or moving objects.

FIG. 20-47 shows a depiction 20-4700 of one or more split ring resonators embedded in an adhesive sticker with protective film, in accordance with one embodiment. As an option, the depiction 20-4700 may be implemented in the context of any one or more of the embodiments set forth in any previous and/or subsequent figure(s) and/or description thereof. Of course, however, the depiction 20-4700 may be implemented in the context of any desired environment. Further, the aforementioned definitions may equally apply to the description below.

As shown, the depiction 20-4700 includes an adhesive 20-4702, at least one split ring resonator 20-4704, and an adhesive cover 20-4706. In one embodiment, the adhesive cover 20-4706 may function as a protective film to the chemically reactive material of the adhesive 20-4702 and the at least one split ring resonator 20-4704. Additionally, after the adhesive cover 20-4706 is removed, that may activate the chemically reactive material of the adhesive 20-4702 and the at least one split ring resonator 20-4704 (such that the at least one split ring resonator may then store a state of the chemically reactive material of the adhesive 20-4702).

It is to be appreciated that the adhesive 20-4702 and the adhesive cover 20-4706 may be configured to optimize shelf life, active life parameters, sensitivity parameters, etc. as needed depending on the particular application.

FIG. 20-48 shows a depiction 20-4800 of one or more split ring resonators embedded in an adhesive sticker roll, in accordance with one embodiment. As an option, the depiction 20-4800 may be implemented in the context of any one or more of the embodiments set forth in any previous and/or subsequent figure(s) and/or description thereof. Of course, however, the depiction 20-4800 may be implemented in the context of any desired environment. Further, the aforementioned definitions may equally apply to the description below.

As shown, the depiction 20-4800 shows split ring resonators 20-4804 embedded within a material of a sticker roll 20-4802. The sticker roll 20-4802 shows one configuration for deployment of split ring resonators within an adhesive. Although a single split ring resonator is shown in each segment of the sticker roll 20-4802, it is to be appreciated that any number of split ring resonators may be embedded in each segment.

Additionally, other deployment scenarios of adhesives embedding split ring resonators may likewise be feasible. For example, chemically reactive material including split ring resonators may be included in adhesive putty, hook-and-loop fasteners (such as Velcro), magnetic tape, adhesive tabs/dots, cable ties, adhesive backed magnets, command strips/hooks, stick tack, glue dots, etc. In this manner, deployment may include a variety of configurations and scenarios.

As a further example, the split ring resonators may be used for environmental health risk detection, and embedded in smart skins for remote detection of airborne toxins, radioactive materials, etc. Such smart skins may be applied to a variety of surfaces (exterior of vehicles, aircraft, structures, human body, etc.). Additionally, the smart skins may be used to detect changes in environmental conditions (chemical composition, pressure, humidity, etc.), damage detection (cracks, impact damage), aerodynamic optimization (drag detection), active camouflage (to assist with blending into the environment), biomechanical systems (robotic systems, exoskeletons), biomedical applications (monitoring vital signs, delivering medication), environmental sensing (pollution levels, etc.). Further, as additional examples, the adhesive containing the embedded split ring resonators may include one or more of affixing adhesives on a surface (backpack), interrogating the surface-affixed adhesives during movement, interrogating the surface-affixed adhesives after a sojourn, incorporating interrogation electronics into a space-borne, airborne, or terrestrial vehicle, etc.

FIG. 20-49 shows a depiction 20-4900 of one or more split ring resonators embedded in an adhesive sticker for automobile use, in accordance with one embodiment. As an option, the depiction 20-4900 may be implemented in the context of any one or more of the embodiments set forth in any previous and/or subsequent figure(s) and/or description thereof. Of course, however, the depiction 20-4900 may be implemented in the context of any desired environment. Further, the aforementioned definitions may equally apply to the description below.

As shown, the depiction 20-4900 includes a first view **20-4902*a* of a vehicle and a second view 20-4902*b* of the vehicle, and adhesives 20-4904** with embedded split ring resonators.

Within the context of automobile use, the adhesive may be used to sense parameters (water concentration, hazardous material, smoke levels, airborne particulates, etc.). The sensing may occur while the automobile is in motion (via the usage of onboard electronics) and/or when the automobile is stationary (via the usage of onboard electronics and/or external interrogation systems, etc.). In this manner, exposing the chemically reactive material of the adhesive may affect the permittivity of the split ring resonators embedded in the adhesive, which in turn may store detected concentration levels of volatiles. It is to be appreciated that although an automobile application is shown in the depiction 20-4900, the same teaching may apply to any moving or stationary object.

FIG. 20-50 shows a depiction 20-5000 of one or more split ring resonators embedded in an adhesive sticker for robot use, in accordance with one embodiment. As an option, the depiction 20-5000 may be implemented in the context of any one or more of the embodiments set forth in any previous and/or subsequent figure(s) and/or description thereof. Of course, however, the depiction 20-5000 may be implemented in the context of any desired environment. Further, the aforementioned definitions may equally apply to the description below.

As shown, the depiction 20-5000 includes a robot 20-5002 and adhesives 20-5004 with embedded split ring resonators. In various embodiments, the robot 20-5002 may be used to detect any type of threats (such as biological agents or hazards, pathogens, toxins, biohazards, etc.). In one embodiment, the robot 20-5002 may play a crucial role in situations where the presence of biological threats poses significant risks to human health and safety. It is to be appreciated that the robot 20-5002 may include any type of robot system, including unmanned ground vehicles (UGVs), unmanned aerial vehicles (UAVs), autonomous underwater vehicles (AUVs), swarm robots, etc.

Additionally, the robot 20-5002, similar to the automobile of the depiction 20-4900, may sense the surroundings while it is in motion (via the usage of onboard electronics) and/or when it is stationary (via the usage of onboard electronics and/or external interrogation systems, etc.). Additionally, other onboard systems of the robot 20-5002 (such as cameras, imaging systems, remedial systems, etc.) may allow for immediate response (including decontamination systems to neutralize or remove threats) to detected threats by the adhesives 20-5004. As such, the robot 20-5002 may be used in a variety of scenarios to safeguard public health and safety, and provide early detection and rapid response capabilities (which in turn may assist with minimizing human exposure to dangerous agents, and facilitating more effective containment and mitigation efforts).

FIG. 20-51 shows a depiction 20-5100 of one or more split ring resonators embedded in an adhesive sticker for assembly-line use, in accordance with one embodiment. As an option, the depiction 20-5100 may be implemented in the context of any one or more of the embodiments set forth in any previous and/or subsequent figure(s) and/or description thereof. Of course, however, the depiction 20-5100 may be implemented in the context of any desired environment. Further, the aforementioned definitions may equally apply to the description below.

As shown, the depiction 20-5100 shows an assembly-line processing where boxes 20-5102 with one or more adhesives 20-5104 embedded with one or more split ring resonator may travel via a conveyer belt system 20-5106 and be automatically sorted via robot 20-5108. In one embodiment, the one or more adhesives 20-5104 may be used for security of internal or external use. For example, the one or more adhesives 20-5104 may be used to determine the state of external surroundings (safe environment, non-toxin air, temperature below predetermined threshold, proximity to another box, etc.). In this manner, the state of surroundings around each box may be monitored. Additionally, the one or more adhesive 20-5104 may be used to determine a state of the goods within a box. For example, should a temperature within the box change beyond a predetermined value, the one or more adhesive 20-5104 may be used to sense the change. Of course, it is to be appreciated that the one or more adhesives 20-5104 embedded with one or more split ring resonator may be configured in any manner depending on the application needed (management of boxes, integrity of surroundings, integrity of contents of box, identification of goods, sorting of boxes, tracking information, weight sensors, dimensional sensing, etc.).

In one embodiment, the one or more adhesives 20-5104 may be used to sort one or more of the boxes 20-5102 prior to reaching the robot 20-5108. For example, the conveyer belt system 20-5106 may include omni-directional rollers or wheels such that based on sensed information via the one or more adhesives 20-5104, one or more of the boxes 20-5102 may be automatically redirected or rotated as they move along the conveyer. In another embodiment, the robot 20-5108 may be used to accommodate changes in routing (from one conveyer to another, etc.), removal of boxes 20-5102 which are sensed (via the one or more adhesives 20-5104) to include hazardous material (or which need to be screened more fully), palletizing/depalletizing the boxes 20-5102 to prepare pallets for shipping (or further processing or storage), fulfillment of order (selection of customer order that is ready for pick up), sorting (to identify, sort, divert as needed based on destination, size, shape, etc.), interrogation of the one of more adhesives 20-5104 (interrogate the one or more split ring resonators to obtain sensed data), maintain quality control (detect defects or damage in products or packages before they are shipped), maintain security (identify potential security breaches), apply labels (apply labels or tape as needed to prepare for shipping), etc. In this manner, the depiction 20-5100 may encompass a variety of scenarios or situations where integration of the one or more adhesives 20-5104 on the boxes 20-5102 in combination with the conveyer belt system 20-5106 and the robot 20-5108 may be used to streamline operations, improve accuracy, increase security, and handle increasing volumes of goods more efficiently.

It is to be appreciated that the depiction 20-5100 is one of many possible scenarios where the one or more adhesives 20-5104 with embedded one or more split ring resonators can be applied to an object for sensing purposes. As such, the depiction 20-5100 (as well as any of the other embodiments disclosed herein) should not be limiting in any manner to how the one or more adhesives 20-5104 may be applied and/or used.

FIG. 20-52 shows a depiction 20-5200 of one or more split ring resonators embedded in an adhesive sticker for an object in motion use with sensing componentry, in accordance with one embodiment. As an option, the depiction 20-5200 may be implemented in the context of any one or more of the embodiments set forth in any previous and/or subsequent figure(s) and/or description thereof. Of course, however, the depiction 20-5200 may be implemented in the context of any desired environment. Further, the aforementioned definitions may equally apply to the description below.

As shown, the depiction 20-5200 includes a train 20-5202 to which one or more adhesive 20-5204 with one or more embedded split ring resonator has been applied. Additionally, an interrogator 20-5206 with sensing wave 20-5208 may be used to interrogate the one or more adhesive 20-5204.

In one embodiment, the train 20-5202 may represent any moving object (of any type) to which the one or more adhesive 20-5204 has been applied. Additionally, the interrogator 20-5206 may represent any type of interrogation technique to retrieve stored data on the one or more adhesive 20-5204.

In various configurations, the interrogator 20-5206 may transmit a sensing wave 20-5208 which may reach the one or more adhesive 20-5204. In response, the one or more adhesive 20-5204 may cause a reflected wave (not shown) back to the interrogator 20-5206. In this manner the interrogator 20-5206 may function, in one embodiment, as both the sender of a wave signal and the receiver of a reflected wave signal. Sensing the one or more split ring resonator in the one or more adhesive 20-5204 may occur while the object is in motion (during exposure), or may occur while the object is stationary (after exposure). If the sensing occurs while in motion, the one or more adhesive 20-5204 may be interrogated by onboard electronics of the object itself (or by another object in motion). If the sensing occurs while stationary, then any onboard or external interrogator 20-5206 may be used to retrieve stored data from the one or more adhesive 20-5204.

In particular, the one or more adhesive 20-5204 with one or more embedded split ring resonator may be exposed to chemistries of airborne toxins, volatiles, biological agents, industrial pollutants, etc. Exposure may, in turn, affect the permittivity of the one or more split ring resonators embedded in the one or more adhesive 20-5204. The change in permittivity of the one or more split ring resonators may store detected concentration levels (of the target compound/agent to detect). It is to be appreciated that the one or more split ring resonators may be configured for a particular application (detection of radioactive material, detection of toxins, detection of biohazards, detection of habitable compounds, etc.), for a general-use application, etc. Additionally, an array of split ring resonators may be embedded within the one or more adhesive 20-5204 such that a single adhesive may be equipped to detect a variety of specific target compounds, a variety of general-use scenarios, etc. Again, the one or more split ring resonators embedded in the one or more adhesive 20-5204 may be configured as needed depending on the application. Thus, any number of adhesives and/or split ring resonators may be attached to an object.

As a further example, a single adhesive may be configured for radioactive testing and include an array of split ring resonators, where each split ring resonator may be configured for a specific radioactive isotope (for identification), gamma-ray spectrometer (to analyze the energy spectrum of gamma radiation), measuring/detecting ionizing radiation (including measure electrical charge created by ionizing radiation), etc. Another single adhesive may be configured for chemical toxins and include an array of split ring resonators, where each split ring resonator may be configured for detection of specific chemical toxins, measure of concentration of chemical toxins, measure of pH sensors (for acidity/alkalinity, ion concentrations, biochemical sensors for biomolecular sensing, tec), measure of electrical signal (for volatile organic compounds in particular) or electrical resistance, etc. In this manner, each adhesive may be configured for a specific purpose or application (comprising an array of split ring resonators).

It is to be appreciated further that split ring resonators embedded within an adhesive may have wide reaching applicability, including environmental monitoring (air quality, etc.), industrial process control (chemical manufacturing, oil, gas, etc.), healthcare (medical diagnostics, disease detection, body monitoring, etc.), safety and security (explosive detection, fire detection, biohazard detection, radioactive detection, etc.), consumer electronics (smartphones, wearable devices, etc.), agricultural (plant/farm monitoring, etc.), logistics (transportation, vehicle tracking, traffic management, goods management, integrity, etc.), automotive industry (motor vehicles, etc.), aviation industry (aircraft vehicles, etc.), unmanned aerial vehicles/systems (UAVs/UAS, drones, autonomous aircraft, etc.), energy and utilities (power plants, electrical grids, etc.), defense and security (radar systems, night vision devices, etc.), construction (site safety, quality control), telecommunications (signal strength, equipment performance, etc.), etc.

In one embodiment, the interrogator 20-5206 may include resonant sensing componentry with any components capable of sending and receiving a signal. For example, a PC tablet may be connected to vector network analyzer (VNA). The VNA may be configured to operate any specific frequency range (including, e.g., 6.3 GHZ). Additionally, the VNA may be configured in S11 mode such that it may measure and analyze the reflection characteristics of a device or component (such as a split ring resonator embedded in an adhesive). Further, the VNA may be connected to an antenna (via a coaxial or SMA cable).

FIG. 20-53 shows a deployable sensor 20-5300 including one or more split ring resonators, in accordance with one embodiment. As an option, the deployable sensor 20-5300 may be implemented in the context of any one or more of the embodiments set forth in any previous and/or subsequent figure(s) and/or description thereof. Of course, however, the deployable sensor 20-5300 may be implemented in the context of any desired environment. Further, the aforementioned definitions may equally apply to the description below.

As shown, the deployable sensor 20-5300 includes a housing 20-5302 and one or more sensors 20-5304. The deployable sensor 20-5300 may be hand-thrown, launched and/or be included in an unmanned deployable sensor. The housing 20-5302 may be configured as a permeable skin or holes on an outer surface of the housing. Additionally, the one or more sensors 20-5304 may be located within the housing 20-5302 and be configured to respond to one of environmental gas, flammable gas, hazardous gas, illegal gas, bio gas, vapors, aerosols, etc.

In one embodiment, the deployable sensor 20-5300 may be used to assess and detect such conditions for pre-entry, pre-incident, post-incident and/or post-entry into a confined space. For example, although firefighters seek to make informed decisions before entering a burning building, they often do not get a full picture of the situation until they are in the midst of the fire itself. A deployable sensor could provide input on potential hazards (chemicals, gas lines, electrical hazards, toxic gases), conditions (heat map, ventilation currents, etc.), a change in conditions (deteriorating conditions, increasing heat, structural weakening, etc.), etc. Such information could assist firefighters before entering a burning building, while they are in the burning building, as well as gathering information on the building even after they have had to exit (assess remaining hot spots, etc.).

As another example, police may be called to a situation to investigate, but often are unaware of what the situation fully is until they are in the midst of it. A deployable sensor could provide input on drug-related toxins (narcotic exposure, harmful synthetic substances, solvents, acids, etc.), chemical emergencies (hazmat incidents, industrial accidents, toxic chemicals/gases, etc.), environmental emergencies (contaminated air), chemical agents (such as tear gas or smoke) which may be released during tactical operations, biological toxins (pathogens, toxins, etc.), drug overdoses (opioids, etc.), unknown or suspicious substances (packages, powders, etc.), etc.). Often, in order to keep safe, police departments often instruct officers to wait for specialized hazmat teams to respond in situations involving potentially unknown or hazardous substances. Additionally, if officers suspect or encounter hazardous materials or toxins, they are trained to secure the area, establish perimeters to keep the public safe, and call the appropriate specialized response team. However, such training usually requires time-time to deploy a specialized team, time to get to the potential site, time to assess and react, etc. A deployable sensor could be sent into an area to assess the surroundings and determine the identification and concentration of any potentially hazardous gases, vapors, aerosols, and/or radiation.

In this manner, a deployable sensor may assist with minimizing life-threatening injuries, and reducing costs to governmental (city, state and/or federal) organizations and public and/or private companies in the form of monetary penalties and insurance liabilities.

In one embodiment, the deployable sensor 20-5300 may include a hand deployed sensor. Such deployable sensor 20-5300 could be thrown or launched (in some manner) into the target destination. After being deployed, the deployable sensor 20-5300 may then be interrogated to determine the state of the surroundings. Consistent with the disclosure herein, the deployable sensor 20-5300 may be interrogated by on-board electronics (within the housing 20-5302), and/or external electronics.

In one embodiment, the deployable sensor 20-5300 may include a ball (to be thrown), a kickball (to be kicked), a frisbee or flying disc, a balloon ball (to hover in air), a glow-in-the dark ball, lightweight/small balls, etc. As such, the deployable sensor 20-5300 may be in any form and/or size as long as it can be deployed and/or sent into an environment.

In another embodiment, the deployable sensor 20-5300 may be equipped with additional features (lights, microphone, speaker, etc.) which may be used in conjunction with the one or more sensors 20-5304. Additionally, the one or more sensors 20-5304 may include split ring resonators configured to the particular needed application (to detect a specific toxin, etc.). Consistent with the disclosure herein, an array of split ring resonators may be included on the deployable sensor 20-5300 such that it may be able to detect an array of possible toxins and/or compounds.

It is to be appreciated that the deployable sensor 20-5300 may be applied to a variety of scenarios and situations. For example, the deployable sensor 20-5300 may be quickly and easily deployed or set up in a specific location or environment to collect data or monitor conditions (via the one or more sensors 20-5304 including the split ring resonators). Additionally, it may be configured to be portable, versatile, and have a rapid deployment capability, thereby making them useful in various applications. The deployable sensor 20-5300 can be used in fields such as environmental monitoring, disaster response, military operations, research, etc. Additionally, the deployable sensor 20-5300 may be used for weather monitoring (such as in harsh environments or hard-to-get locations, etc.), air quality (pollution levels, etc.), disaster response (presence of hazardous materials, gas leaks, etc.), and used in a variety of environments including confined spaces (crawl spaces, manholes, below-grade vaults, elevator shafts, tunnels, etc.), livestock/agriculture industry (animal stalls, etc.), mining industry (mines, shafts, etc.), fire fighters (burning structures, etc.), marine industry (coast guard, recreation, boats, etc.), government agencies (Drug Enforcement Administration, Federal Bureau of Investigation, police departments, etc.), etc. In particular, the deployable sensor 20-5300 may be used where there is limited/restricted space for entering/existing.

Further, the deployable sensor 20-5300 may be configured to detect any compounds or gases, consistent with the disclosure herein. For example, the deployable sensor 20-5300 may be configured to detect $O_2$, TVOCs, CO, CO2, $H_2S$, $NH_3$, $CH_4$, $H_2$, $SO_x$, $NO_x$, and/or any other vapors/gases.

In various embodiments, an apparatus may include a housing with one of a permeable skin or holes on an outer surface of the housing, and at least one sensor embedded within the housing, wherein the at least one sensor is configured to respond to a gas or volatile substance.

In one embodiment, the at least one sensor may include at least one split ring resonator (SRR). The at least one SRR may be formed from a composite material. The composite material may include a 3D monolithic carbonaceous growth. Additionally, a resonant frequency of 3D monolithic carbonaceous growth may be based at least in part on either or both of a permittivity and a permeability of the composite material.

In one embodiment, the apparatus may be configured to be hand thrown or launched. Additionally, the housing may be capable of withstanding a force of impact. Further, the apparatus may be deployed in a confined space. The at least one sensor may be configured to detect a particular and predetermined compound. The gas or volatile substance may include one of environmental gas, flammable gas, hazardous gas, illegal gas, bio gas, vapors, radiation, or aerosols.

In one embodiment, the apparatus may be configured to be launched by a launcher, and/or may be configured to be deployed using a remote controlled vehicle or aerial vehicle, or using an autonomous unmanned vehicle or aerial vehicle.

In one embodiment, the at least one SRR includes a plurality of first carbon particles may be configured to uniquely resonate in response to an electromagnetic ping based at least in part on a concentration level of the first carbon particles within the at least one sensor. Additionally, a first set of the at least one SRR may include a plurality of first carbon particles configured to uniquely resonate in response to the electromagnetic ping based at least in part on a sensed concentration level of a first analyte. Further, a second set of the at least one SRR may include a plurality of second carbon particles configured to uniquely resonate in response to the electromagnetic ping based at least in part on a concentration level of a second analyte. Each of the first carbon particles and second carbon particles may be chemically bonded with the housing. The first carbon particles may include first aggregates forming a first porous structure. Still yet, the second carbon particles may include second aggregates forming a second porous structure.

In one embodiment, a tuned resonant frequency of the 3D monolithic carbonaceous growth may be based at least in part on one or more physical characteristics of the housing. A resonant frequency of the 3D monolithic carbonaceous growth may be based at least in part on either or both of a permittivity and a permeability of the housing. The at least one sensor may include an array of split ring resonators, wherein each split ring resonator of the array is configured to detect at least one of a particular predetermined analyte, a biological agent, a radioactive isotope, or a particular predetermined volatile substance. Additionally, the apparatus may be configured to provide environmental conditions in a confined space prior to entry by a responder.

FIG. 20-54 shows a deployable sensor 20-5400 including one or more split ring resonators, in accordance with one embodiment. As an option, the deployable sensor 20-5400 may be implemented in the context of any one or more of the embodiments set forth in any previous and/or subsequent figure(s) and/or description thereof. Of course, however, the deployable sensor 20-5400 may be implemented in the context of any desired environment. Further, the aforementioned definitions may equally apply to the description below.

As shown, the deployable sensor 20-5400 includes a launcher 20-5402 and a launch deployed sensor 20-5404 sensor 20-5404. The function of the deployable sensor 20-5400 may operate in a manner analogous to the deployable sensor 20-5300, with the primary difference being that the deployable sensor 20-5300 may be hand deployed/launched, and the deployable sensor 20-5400 is launch deployed.

It is to be appreciated that a launch deployed sensor 20-5404 sensor 20-5404 may include any object (equipped for example with an adhesive with embedded split ring resonators) or sensor capable of being launched. For example, the launch deployed sensor 20-5404 sensor 20-5404 may include a satellite (to deploy solar panels, antennas, etc.), military operations (to deploy unmanned aerial vehicles, missiles, reconnaissance equipment, etc.), scientific research (to deploy scientific instruments, oceanographic systems, etc.), commercial applications (to deploy submersible equipment, pipeline inspection, etc.), aerospace engineering (to deploy parachutes, recovery equipment, etc.), etc. In short, the launch deployed sensor 20-5404 sensor 20-5404 could include any type of object or system which can be deployed or launched from a launcher, launch platform, or vehicle. For purposes of simplicity, therefore, a representative launcher (in the form a launcher 20-5402 used to launch a projectile, or a launch deployed sensor 20-5404 sensor 20-5404) is shown. It is to be appreciated, however, that any system capable of launching could potentially be used to deploy the sensor 20-5404.

FIG. 20-55 shows a deployable sensor 20-5500 including one or more split ring resonators on a deployable vehicle, in accordance with one embodiment. As an option, the deployable sensor 20-5500 may be implemented in the context of any one or more of the embodiments set forth in any previous and/or subsequent figure(s) and/or description thereof. Of course, however, the deployable sensor 20-5500 may be implemented in the context of any desired environment. Further, the aforementioned definitions may equally apply to the description below.

As shown, the deployable sensor 20-5500 includes a drone 20-5502, and sensing assembly including a housing 20-5504, and one or more sensors 20-5506. In one embodiment, the drone 20-5502 is representative of unmanned deployed systems. It is to be appreciated that the drone 20-5502 may function autonomously (to complete the assigned task), or may be remotely controlled by an operator.

In one embodiment, the sensing assembly may be deployed by the drone 20-5502 such that the drone 20-5502 may transport the sensing assembly to an intended destination and release the sensing assembly from a predetermined altitude. The drone 20-5502 may be used to then interrogate the sensing assembly to determine surrounding conditions. In this manner, the drone 20-5502 may be used to deploy a sensing assembly and then retrieve data based on the sensed conditions from the one or more sensors 20-5506. In one embodiment, the drone 20-5502 may be used to retrieve in some manner the sensing assembly (magnetic mount, cable fetch, etc.). In other embodiments, the sensing assembly may be left where it was deployed by the drone 20-5502. In another embodiment, the sensing assembly may be transported by the drone 20-5502 and remain connected to the drone 20-5502 (via a cable, via a mount etc.) such that the sensing assembly can still be semi attached to the drone 20-5502 and retrieve data on the conditions. In another embodiment, the drone 20-5502 could be configured such that an adhesive may be placed on its housing such that the drone 20-5502 could function as the sensing device, consistent with the disclosure herein. In any case, the drone 20-5502 may be used to deploy a sensing assembly for purposes of gathering data on conditions. Again, although the drone 20-5502 is represented in the deployable sensor 20-5500 it is to be appreciated that any object capable of carrying the sensing assembly may be used.

FIG. 20-56 shows a depiction 20-5600 of deployable sensors including one or more split ring resonators on remotely controlled vehicles, in accordance with one embodiment. As an option, the depiction 20-5600 may be implemented in the context of any one or more of the embodiments set forth in any previous and/or subsequent figure(s) and/or description thereof. Of course, however, the depiction 20-5600 may be implemented in the context of any desired environment. Further, the aforementioned definitions may equally apply to the description below.

As shown, the depiction 20-5600 includes a remote configured vehicle 20-5602, a remote configured aerial vehicle 20-5604, a remote control 20-5606, a sensing housing 20-5608, and one or more sensors 20-5610. The description relating to the deployable sensor 20-5500 may, in particular, apply to the depiction 20-5600. A difference between the depiction 20-5600 and the deployable sensor 20-5500 may include having a remote control 20-5606 controlling the objects (including the remote configured vehicle 20-5602 and/or the remote configured aerial vehicle 20-5604).

In various configurations, the remote control 20-5606 includes any system that establishes and maintains a connection between a ground control station and the vehicle (including the remote configured vehicle 20-5602 and/or the remote configured aerial vehicle 20-5604). Such connection may allow for control of the vehicle, receive telemetry data, monitor its status, and/or control deployment of the sensing assembly including the sensing housing 20-5608 and the one or more sensors 20-5610. Consistent with the description herein, the one or more sensors 20-5610 may be configured to include an array of split ring resonators. Additionally, the vehicle (including the remote configured vehicle 20-5602 and/or the remote configured aerial vehicle 20-5604) may be configured such that an adhesive containing one or more split ring resonators may be affixed to the system (such that it becomes the sensing assembly and can be remote controlled to the intended destination).

Further, in one embodiment, a large number of split-ring resonators (found in adhesives attached to deployable projectile/object, found in the material of the projectile/object, etc.) may be deployed and dropped into a hazardous area. Such deployment may scatter the entire area with the sensors such that a blast radius of the hazardous zone may be accurately determined. Such a deployment, for example, would allow emergency crews to assess the extent of the damage and harm without having to physically enter a hazardous zone.

This Patent Application is related to: U.S. Provisional Patent Application No. 63/408,372, entitled "RESONANT SENSORS FOR ENVIRONMENTAL HEALTH RISK DETECTION" filed Sep. 20, 2022; U.S. Provisional Patent Application No. 63/463,495, entitled "HAND-THROWN, LAUNCHED AND/OR UNMANNED DEPLOYABLE SENSOR" filed May 2, 2023; U.S. patent application Ser. No. 17/940,256, entitled "SENSORS INCORPORATED INTO AIRBORNE VEHICLE COMPONENTS TO DETECT PHYSICAL CHARACTERISTIC CHANGES"

filed Sep. 8, 2022; U.S. Provisional Patent Application No. 63/242,270, entitled "SENSORS INCORPORATED INTO SEMI-RIGID STRUCTURAL MEMBERS TO DETECT PHYSICAL CHARACTERISTIC CHANGES" filed Sep. 9, 2021: U.S. Provisional Patent Application No. 63/247,680, entitled "SENSORS INCORPORATED INTO SEMI-RIGID STRUCTURAL MEMBERS TO DETECT PHYSICAL CHARACTERISTIC CHANGES" and filed Sep. 23, 2021: U.S. Provisional Patent Application No. 63/276,274, entitled "SENSORS INCORPORATED IN VEHICLE COMPONENTS TO DETECT PHYSICAL CHARACTERISTIC CHANGES, and filed Nov. 5, 2021: U.S. Provisional Patent Application No. 63/281,846, entitled "SENSORS INCORPORATED INTO AIRBORNE VEHICLE COMPONENTS TO DETECT PHYSICAL CHARACTERISTIC CHANGES" and filed Nov. 22, 2021: U.S. patent application Ser. No. 17/227,249, entitled "TUNED RADIO FREQUENCY (RF) RESONANT MATERIALS AND MATERIAL CONFIGURATIONS FOR SENSING IN A VEHICLE" and filed on Apr. 9, 2021: U.S. Provisional Patent Application No. 63/008,262, entitled "RESONANCE SENSING IN TIRES" and filed on Apr. 10, 2020: U.S. Provisional Patent Application No. 63/036,796, entitled "RESONANCE SENSING IN ELASTOMER-CONTAINING PRODUCTS" and filed on Jun. 9, 2020; U.S. patent application Ser. No. 16/829,355, entitled "TIRES CONTAINING RESONATING CARBON-BASED MICROSTRUCTURES" and filed on Mar. 25, 2020: U.S. Provisional Patent Application No. 62/985,550, entitled "RESONANT SERIAL NUMBER IN VEHICLE TIRES" and filed on Mar. 5, 2020: U.S. Provisional Patent Application No. 62/979,215, entitled "WASTE ENERGY HARVESTING AND POWERING IN VEHICLES" and filed on Feb. 20, 2020: U.S. Provisional Patent Application No. 62/824,440, entitled "TUNING RESONANT MATERIALS FOR VEHICLE SENSING" and filed on Mar. 27, 2019; U.S. patent application Ser. No. 17/340,493, entitled "SENSORS INCORPORATED INTO ELASTOMERIC MATERIALS TO DETECT ENVIRONMENTALLY-CAUSED PHYSICAL CHARACTERISTIC CHANGES" and filed on Jun. 7, 2021; U.S. Provisional Patent Application No. 63/036,118, entitled "CARBON-CONTAINING STICTION SENSORS" and filed on Jun. 8, 2020: U.S. Provisional Patent Application No. 63/094,223, entitled "SENSORS FOR ELASTOMER PROPERTY CHANGE DETECTION" and filed on Oct. 20, 2020; U.S. Provisional Patent Application No. 63/036,796, entitled "RESONANCE SENSING IN ELASTOMER-CONTAINING PRODUCTS" and filed on Jun. 9, 2020: U.S. patent application Ser. No. 16/829,355, entitled "TIRES CONTAINING RESONATING CARBON-BASED MICROSTRUCTURES" and filed on Mar. 25, 2020; and U.S. Provisional Patent Application No. 62/824,440, entitled "TUNING RESONANT MATERIALS FOR VEHICLE SENSING" and filed on Mar. 27, 2019, all of which are assigned to the assignee hereof: the disclosures of all prior Applications are considered part of and are incorporated by reference in this Patent Application.

Aspects of the present disclosure solve problems associated with how to inexpensively deploy state sensors. Some embodiments are directed to approaches for printing sensing devices that can emit not only identification information, but also product state information.

Various methods for identification of a product in its packaging have been in use since the dawn of eCommerce. However, mere identification of the existence of a product at a particular location and time fails to address a consumer's need for ongoing automatic status checks on products that are in or near the consumer's residence, car, boat, etc. Unfortunately, neither conventional radio frequency identifiers (RFIDs) nor conventional near-field labels are able to provide this information. As such, there is a need for new types of sensing devices that can emit not only product identification information, but also product state information in a manner that can be read by a mobile reader or stationary scanner.

Various methods for identification of a product in its packaging have been in use for as long as there have been products delivered in packages. In the earliest days of bar codes, a "mark and space" symbol was printed onto the packaging. Then, through use of a symbol reader (e.g., a barcode reader/scanner), a particular product could be identified.

Printing of such symbols on packaging is very inexpensive, and symbol readers are inexpensive enough to be deployed with, and integrated into, for example, a cash register. When such a symbol reader and corresponding cash register are further interfaced with a central computer system, purchase of a unit of a uniquely identified product can be tallied. Inventory accounting, ordering, product replenishment, and other functions of ongoing commerce can be facilitated, in some cases without human intervention.

In some cases, however, it is not possible and/or not convenient to print such bar codes onto product packaging and/or, in some cases it is not possible or convenient to deploy a reader. In such cases, a radio frequency identifier (RFID) can be affixed to or embedded in the product or its packaging. When the product—with its affixed or embedded RFID—is in proximity to an RFID reader, the presence can be tallied. A given RFID can be manufactured so as to emit a unique identifier when stimulated by a "ping". The unique identifier can have any number of bits, and as such the unique identifier can be associated with a particular product. As such, product replenishment and other functions of commerce can be facilitated.

Unfortunately, merely identifying the product, or merely identifying a particular existence and location of the identified product, has limitations. For example, while the sensing of a product at a cash register or at an egress can be valuable information (e.g., to detect the purchase of a unit of a product, or to detect movement of a unit of a product), it is sometimes valuable to sense more information (e.g., the state) about the particular unit of the product.

Some attempts have been made to sense characteristics of contents by printing a sensing device on the product packaging and "pinging" the sensing device to gather information about the contents. However, such sensing devices have been limited to measuring only environmental variables such as humidity, temperature, etc. Thus, the need to sense more information (e.g., the state) about the particular unit of the product remains unfulfilled.

For example, it might be useful to know how full a container is. It may also be useful to know if a container is leaking, or if the contents are decaying, rotting or for other reasons exuding gasses, etc. This situation is further complicated by the need to regularly update the state information about a plurality of units of different products. For example, in a household situation, it might be desired to regularly update the state information (e.g., quantity, potency, staleness, etc.) of any or all products that are encountered as a consumer traverses his or her domicile (or car, or boat, etc.).

Neither conventional RFIDs nor conventional near-field labels are able to provide the needed information. What is needed are systems that facilitate collection from new types of sensing devices that can emit not only identification information, but also product-specific state information.

FIG. 21-1 depicts an environment 21-100 in which electromagnetic state sensing devices disclosed herein can be deployed and configured to emit not only identification information, but also product state information. Specifically, the figure is being presented with respect to its contribution to addressing the problem of how to inexpensively deploy state sensors. More specifically, FIG. 21-1 depicts an environment whereby quantitative values can be sensed by an electromagnetic state sensing device (EMSSD) and relayed to a computing site for data processing. "Electromagnetic" as used herein refers to signals that propagate at relatively low frequencies (e.g., 125 kHz) or at higher radio frequencies (13.6 MHz), or higher.

As shown, sensors 21-100 (e.g., sensor 21-101$_1$, sensor 21-101$_2$, and sensor 21-101$_3$) are stimulated with a ping. The stimulated sensors 21-100 emit a resonant signature that characterizes one or more aspects of the product that is within its corresponding container. Several different container types and several different container aspects are depicted.

A ping can be raised, for instance, by a smartphone (or other type of mobile device). Specifically, an application ("app", i.e., a software application, computer program, computer-readable medium) on a mobile device (e.g., a smartphone) can control an electromagnetic emitter device driver (e.g., a near-field communication (NFC) device driver) which in turn can cause the electromagnetic emitter device to raise a ping. As such, the frequency, duration, and shape of a ping can be controlled. Upon excitation by a ping, a nearby sensor resonates and emits a signature that encodes information pertaining to aspects of the product inside its container. The information pertaining to aspects of the product inside its container are reformatted and relayed upstream for further processing. In some embodiments, and as shown, the information that is reformatted and relayed upstream can be routed for communication over the internet or intranet 21-108 for additional sensor data processing.

Many different types or configurations of EMSSDs can be applied to product packaging. As shown, a type1 EMSSD 21-101$_1$ can be applied to a type1 container, a type2 EMSSD 21-101$_2$ can be applied to a type2 container, and a type3 EMSSD 21-101$_3$ can be applied to a type3 container. Such containers can be a vessel (e.g., a type1 container such as a jug or bottle made of plastic or glass) to hold liquids (e.g., detergents, alcohol, fuel, milk, etc.).

Alternatively, containers can be a carton (e.g., a type2 container such as cardboard or paperboard box, which may or may not be coated with a plastic material) to hold any contents. Further, a container can be a specialized container (e.g., a type3 container such as a pill bottle, hinged box, dropper bottle) that is designed to contain some particular product, such as medicine. Any of the foregoing containers might be presented in any setting.

Strictly as one example, the foregoing containers of different types might be found in a household setting. Accordingly, a consumer might walk through his or her domicile and, during the course of walking, the mobile device will emit one or more electromagnetic pings and capture electromagnetic returns. Any one or more user devices 21-117 that can be controlled to emit electromagnetic radiation can emits pings and capture returned signals.

As depicted, a user device 21-117 can be a type1 mobile device 21-131 (e.g., an iOS phone), or a user device 21-117 can be a type2 mobile device 21-132 (e.g., an Android phone), or a user device 21-117 can be a stationary instance of an interrogator device 21-133 (e.g., a stationary RFID reader), such as might be located in a pantry or a medicine chest. Any of such user devices or variants can be configured with executable code (e.g., an app) that controls, either directly or indirectly, an electromagnetic emission device such as the shown NFC devices (user devices 21-117). Any number of user devices can be in general proximity of any EMSSD, and each user device emits pings and captures responses. If the pings and responses happen to occur at the same time and within close proximity to each other, each app (e.g., app 21-137$_1$, app 21-137$_2$, and app 21-137$_3$) can recognize the collision and retry the pings, thus implementing a collision detection, multiple access protocol.

In the present disclosure, pings can be tuned to various frequencies for various purposes based on the type of product identified by the system, without need for human interaction. In the example shown, a first ping 21-1021 is emitted at a first frequency that corresponds to a first RFID frequency. A first portion of the EMSSD 21-101$_1$ responds to the first ping with a first return 21-103$_1$ (i.e., an electromagnetic signal such as "PID1") which encodes a value (e.g., a string of 1s and/or 0s) that corresponds to the product and/or container type. Given that encoded value, the app 21-137$_1$ can determine (e.g., tune, tailor, customize) characteristics of a second ping 21-102$_2$. The second return 21-103$_2$ is responsive to the second ping 21-102$_2$. The second return 21-103$_2$ encodes information about the contents of the shown container type1. The second return 21-103$_2$ from the EMSSD may be called a "signature." In some embodiments, the second return 21-103$_2$ is captured by the app and decoded on the mobile device. In other embodiments, the second return 21-103$_2$ is captured by the app, packaged into network communication packets, and forwarded to cell tower 21-114, which in turn relays the network communication packets to a data processing facility (e.g., sensor data processing module 21-110) via the internet. The data processing facility in turn applies rule sets 21-121 to determine a further action (replenishment, discard, repair, etc.).

The devices and systems shown in environment 21-100 operate together to form an autonomous monitoring system, such as a fulfillment system. As shown the sensor data processing module 21-110 communicates over autonomous fulfillment path 21-129$_1$ to a delivery service, which in turn traverses autonomous fulfillment path 21-129$_2$ to deliver replenished product to the user.

As indicated above, an EMSSD can be configured to correspond to a particular product and/or container type. FIG. 21-1 depicts a carton, shown as container type2, into which the carton product can be situated. Strictly as one example, the container type2 might hold perishables (e.g., fruits, vegetables, etc.). A corresponding EMSSD can be configured to sense any or all of, for instance, (1) a level or volume of product inside the container, (2) a concentration of gasses that accompany perishable foods or food spoilage, (3) a temperature. In operation, a ping 21-102$_3$ at an RFID frequency causes a portion of EMSSD 21-101$_2$ to respond with return 21-1033 that encodes a product ID (e.g., "PID2"). The product ID is used as an index for the rule sets 21-121 to isolate at least one rule 21-122, the application of which rule results in tuning data being delivered to the app in the form of a downstream message 21-126$_1$. For example, based on the product identified from the first ping, the selected rule may customize the signal frequency range and/or number of pings for the type of sensor on the product, to be used when subsequent pings are sent to gather information about the contents in the product packaging.

Some topologies of environment 21-100 include an intranet 21-108. In some of such topologies a downstream message 21-1261 passes through a hub 21-106 before being routed to the app. In such cases, the occurrence of detection of the product corresponding to the product ID is logged in log 21-127, which log is used for various purposes, some of which are discussed infra.

As discussed, the downstream message 21-126$_1$ may contain tuning data. The tuning data may include information used by the app to send one or more further pings (e.g., ping 21-102$_4$). The further pings may be tuned to particular frequencies determined based at least in part on the characteristics of the EMSSD. More specifically, the product ID can be used as a key to retrieve one or more rules, which in turn can inform the app about specific ping frequencies as well as the timing of pings. Strictly as one example, rules can be processed by the app so as to interrogate an EMSSD in accordance with any of various pings, including simple to complex combinations of pings over any time period and in various timed sequences. As such, the return 21-103$_4$ may include several signatures in response to the various pings, any of which signatures can be sent as messages (e.g., upstream message 21-125$_1$, upstream message 21-125$_2$) (e.g., over the internet) to the sensor data processing module 21-110 for analysis. The analysis may result in determination of any or all of, for instance, (1) a level or volume of product inside the container, (2) a concentration of analytes that accompany perishable foods or food spoilage (e.g., ethylene, ammonia, other gasses), (3) a temperature, and/or other information about the state of contents in the container. The determinations can be sent to the hub 21-106 as formatted content in downstream message 21-126$_2$.

In some topologies, the downstream message 21-126$_1$ passes through a hub 21-106 before being routed to the app. A hub can be implemented by a voice activated command 21-105 (e.g., a voice assistant). The voice assistant can intercept the downstream message 21-126$_1$ and process it, possibly by emitting a notification 21-107, which notification may be in the form of natural language such as "It's time to order more kale—shall I place an order for you?" Or "It got too warm in here today—you should move the kale to a cooler location." Or "The kale is going bad—you should compost it now." In some topologies the notification 21-107 can take other forms such as, but not limited to, text or email messages. The notification message may include information such as a quantity indication, an expiration date, a refill date, a refill count, a lot number, a chemical composition, and/or a concentration indication. In some topologies, a log can be maintained of at least some of the information regarding contents in the product packaging. For example, the log may include an entry corresponding to at least a portion of the information about the contents. The log can be maintained by a network access point, where the network access point may be activated by receiving a voice activated command.

In some settings, and using all or portions of the foregoing communication and data analysis techniques, an interrogator device 21-133 emits ping 21-102$_5$, receives return 21-103$_5$ (e.g., product ID "PID3") and then emits a further ping 21-102$_6$, which further ping is tuned specifically for the characteristics of container type3 and/or the characteristics of the product that is contained in container type3. The emission of the further ping 21-102$_6$, results in emission of return 21-103$_6$.

As mentioned hereinabove, an app on a mobile device (e.g., a smartphone) can control an electromagnetic emitter device driver (e.g., an NFC device driver) which in turn can cause the electromagnetic emitter device to raise a ping. A processing flow in one illustrative deployment scenario is presented in FIG. 21-2.

FIG. 21-2 presents a flow chart depicting a processing flow 21-200 by which electromagnetic state sensing devices can be deployed. As an option, one or more variations of processing flow 21-200 or any aspect thereof may be implemented in the context of the architecture and functionality of the embodiments described herein. The processing flow 21-200 or any aspect thereof may be implemented in any environment.

In the depicted deployment scenario, an app is developed by application and driver software engineers and stored at a web-accessible location (step 21-202). The web-accessible location 21-254 can be any location where a downloadable instance of an app 21-252 can be stored. A download can be requested by any requesting device 21-256 that is connected to the internet. Moreover, the requesting device can be a mobile device of any type, or can be a stationary device of any type such as a desktop computer or a hub or a digital assistant. In this scenario, the requesting device 21-256 is depicted as a smartphone but may also be, for example, a smartwatch, a tablet or a laptop computer.

At any moment in time the requesting device can issue a request (e.g., via an internet call to a uniform resource identifier (URI)), which request causes the app to be downloaded onto the device and configured for ongoing operation (step 21-204). The configuration can be specific to characteristics of the target device (i.e., requesting device) and/or any supervisory software (e.g., operating system) that is hosted on the target device.

At some moment in time after the download and configuration, the app enters a processing loop (step 21-206). The iterations through the loop 21-220 can be performed on any schedule, possibly a schedule that implements various power-saving techniques. In some cases, the order of the operations performed in the loop can change based on conditions that are present at the moment. Although the app operations 21-205 depict a particular flow of the operations, in some situations alternative ordering is possible and, in some cases, some of the operations are not performed in a given iteration of the loop.

As shown, the loop 21-220 includes operations to emit a first ping signal when in proximity of an EMSSD (step 21-208) so as to stimulate at least the identification portion 21-261 of the EMSSD. Based on an identification code (e.g., a product ID) derived from an identification signal (step 21-210), the app may apply all or portions of applicable rules (step 21-212). The identification code (e.g., a product ID) can be used as an index into the rule sets 21-121 to identify EMSSD rules 21-209 and fulfillment rules 21-211.

Application of certain of the EMSSD rules 21-209 result in tuning data being delivered to the app. Application of certain of the fulfillment rules 21-211 result in actions associated with the product contents, such as reading a liquid level or providing measurements of different analytes, or reading a quantity of contents within its container. The app in turn will transmit a second ping signal (step 21-214) so as to stimulate at least the state portion 21-262 of the EMSSD. The app receives returned state signals that are returned in response to the second ping signal based on the state of the product at the time of the second ping (step 21-216). Those returned state signals are decoded to determine state information. For example, the printed electromagnetic state sensing device may emit a first variation of the second electromagnetic radiation signal (e.g., a first resonant frequency) when contents within the product packaging are in a first state, and emit a second variation of the second electromagnetic radiation signal (e.g., a second resonant frequency) when contents within the product packaging are in a second state. In some cases, the returned state signals are analyzed by the requesting device (e.g., by the app) while in other cases, such as shown, the requesting device offloads the requesting device by sending the returned state signals to an upstream network device (step 21-218).

In this particular embodiment, the upstream device is an instance of hub 21-106, however the upstream device can be any device connected to an intranet or connected to the internet.

The foregoing processing relies at least in part on response characteristics of the EMSSD. In particular, the app relies on the aspect that an EMSSD includes identification portion 21-261 and at least one state portion 21-262. Various techniques for forming an EMSSD are shown and discussed with reference to FIG. 21-3A.

FIG. 21-3A is a schematic of an electromagnetic state sensing device 21-300A. As an option, one or more variations of electromagnetic state sensing device 21-300A or any aspect thereof may be implemented in the context of the architecture and functionality of the embodiments described herein. The electromagnetic state sensing device 21-300A or any aspect thereof may be implemented in any environment.

The EMSSD 21-300A is configured as an elongated sensor. That is, the EMSSD 21-300A has a plurality of portions that span over a length (e.g., longitudinally in a particular direction, such as vertically) where contents within a product are located. As shown, a first resonance portion 21-301 of the EMSSD 21-300A is configured to provide functions of an RFID. Specifically, when pinged at a predetermined frequency, the first resonance portion 21-301 energizes and emits a string of bits, at least a portion of which can be concatenated to form a unique identification code. The EMSSD 21-300A also includes a second resonance portion 21-302, a third resonance portion 21-303, and a Nth resonance portion 21-399, where the second through Nth resonance portions may be used to convey information about the product (i.e., state of the contents in the product packaging). There may be many resonance portions juxtaposed (e.g., in a linear array, as shown) in proximity to the Nth resonance portion 21-399. That is, the resonance portions of the EMSSD 21-300A are arranged along a path and may or may not be adjacent to each other.

In some implementations, the EMSSD 21-300A may be printed on a surface of the container using an ink printing process in which each of the plurality of resonance portions can be printed onto a corresponding portion of the container surface, using the ink, and configured to have a different resonance frequency than the other resonance portions. In some aspects, the resonance frequency of a respective resonance portion of the EMSSD 21-300A may be determined by a material property and/or geometry of the printed ink corresponding to the respective resonance portion. In some aspects, the resonance portions of the EMSSD 21-300A may be substantially the same size and shape, and may be printed onto the container surface using different carbon-containing inks. In other aspects, the resonance portions of the EMSSD 21-300A may be printed onto the container surface using the same carbon-containing inks, and the resonance portions may have different sizes and/or geometries than one another. In one implementation, the identification portion 21-261 of the EMSSD 21-300A may be tuned to resonate at a different frequency or frequencies than any state portion.

The various portions or components of the EMSSD 21-300A can be printed in various geometries using carbon-containing inks. In some aspects, the geometry (e.g., linear/curved/spiral patterns, line widths, shape factors) and carbon-containing inks (e.g., compositions of various allotropes) may be determined by the manufacturer or designer of the EMSSD based on sensing criteria specific to the EMSSD 21-300A. In some cases, the sensing criteria includes an environmental indication such as “Is ethylene present?” or “Is this portion of the EMSSD deformed from presence of liquid?”, etc. In some cases, a sensing criterion and the respective resonance corresponds to an environmental indication such as “What is the permittivity at this location?” As such, a series of resonant portions of an EMSSD can be printed on a container, where the series of resonant portions are tuned to respond to the particular container and contents to be detected, and/or may be tuned based on the particular location of that resonant portion on the container. For example, a change in the amount of liquid contents in a container will cause a change in permittivity sensed by the EMSSD.

Accordingly, the EMSSD can be designed to be sensitive to the permittivity of the particular resonant portion in a then-current environment. Techniques to accomplish and/or tune sensitivity to the permittivity or permeability of the particular resonant portion in a then-current environment include choosing a particular carbon ink, or combinations of carbon inks, and tailoring geometries (e.g., layout and/or dimensions) of electrode lines. Strictly as one example, a container that holds liquid will exhibit a first permittivity when the container is full, whereas the same container will exhibit a second permittivity when the container is, for instance, nearly empty.

This phenomenon can be used when determining the level of liquid in a container. In fact, this phenomenon can be observed when using only a single resonance portion (e.g., as an analog signal to a particular degree of accuracy), or when using a series of resonance portions such as in an elongated linear array of resonance portions (e.g., which are configured into a series of digital bits to any desired degree of accuracy). In the case of a single resonance portion, the frequency variance over environmental changes comprises the analog signal, whereas in the case of multiple resonance portions, the return from each resonant portion is analyzed against a threshold to determine an “on” or “off” value. The “on” or “off” values of multiple resonance portions can be combined to form a string of digital bits.

Although the foregoing example is specific to liquid in a container, deployment of the EMSSDs as disclosed herein can be used to detect any change in the environment in proximity of the container. As examples of change in the environment, EMSSDs can detect anything that presents any one or more of a galvanostatic change, and/or a piezo-static change, and/or a potentio-static change. Any such change or changes in the proximal environment causes a change or changes in the resonant response or responses of one or more portions of the EMSSD. For example, a piezo-static change may result from deformation of the product contents (e.g., expansion due to temperature or quantity of contents present), which can cause strain on the resonant portions of the EMSSD and consequently change the resonant frequency emitted. Different types of product contents have different densities, and as such different products can cause different degrees of strain on the resonant portions. As such, each product and each container may have a unique EMSSD, which is calibrated for that specific product and container combination.

Techniques for sensing the level of liquid in a container are shown and described in the deployment scenarios of FIG. 21-3B1 and FIG. 21-3B2.

FIG. 21-3B1 illustrates a deployment scenario 21-300B1 in which a first state of liquid contents is measured. As an option, one or more variations of deployment scenario 21-300B1 or any aspect thereof may be implemented in the context of the architecture and functionality of the embodiments described herein. The deployment scenario 21-300B1 or any aspect thereof may be implemented in any environment.

In this deployment scenario, the EMSSD is printed on the side (e.g., outer surface) of a liquid container. In other deployments, the EMSSD is printed on the inside of a container. In other deployments, the EMSSD is printed on top of a label that is affixed to a container.

When the liquid fills the container to near capacity (as shown), resonant portion 21-303 through resonant portion 21-399 overlay areas where there is liquid in the container, whereas resonant portion 21-302 is in a position where there is no liquid in the container. The permittivity and/or permeability of the environment around the resonant portions at those two locations are different, based at least on the level of the liquid inside the container.

Accordingly, given that other parameters are the same across the length of the EMSSD, the resonant frequency emitted by resonant portion 21-302 is different from resonant portion 21-399. The aforementioned parameters include materials and environmental characteristics such as the densities of the contents or its packaging, the dielectric constants of the contents or its packaging, the permeability of a label that is affixed to packaging, the shape of the container, variations of thickness of the container, etc.

Given the several ping returns from the several resonance portions of the EMSSD, the differences in the several ping returns correspond to a liquid level. More specifically, several pings at different frequencies are emitted by the user device. These different frequencies trigger responses in the form of ping returns from different resonant portions of the EMSSD. The signals that comprise these ping returns are then analyzed to identify the amplitudes of center frequencies.

A nearly empty liquid level is shown and described in the deployment scenario of FIG. 21-3B2. In some situations, the presence or absence of liquid dominates the resonance of a particular resonant portion. However, the presence or absence of liquid at one end of the EMSSD might cause a variation in the resonant frequency of a different resonant portion that is disposed at the opposite end of the EMSSD. This effect, as well as other effects that are brought about by the geometry of the container, can be measured during calibration procedures.

Further details regarding printed sensors and resonant components are described in U.S. Pat. No. 10,218,073, entitled "Antenna with Frequency-Selective Elements," which is assigned to the assignee of the present application and is incorporated herein by reference.

FIG. 21-3B2, FIG. 21-3B3 and FIG. 21-3B4 illustrate deployment scenarios 21-300B2, 21-300B3 and 21-300B4, respectively, in which a second state of liquid contents is measured and optionally displayed on the container. As an option, one or more variations of deployment scenarios 21-300B2, 21-300B3 or 21-300B4 or any aspect thereof may be implemented in the context of the architecture and functionality of the embodiments described herein. The deployment scenarios 21-300B2, 21-300B3 or 21-300B4 or any aspect thereof may be implemented in any environment.

When the liquid in the container is almost empty (as shown in FIG. 21-3B2), resonant portion 21-302 through resonant portion 21-398 are in a position where there is no liquid in the container, whereas resonant portion 21-399 is in a position where there is liquid in the container. The permittivity and/or permeability of the environment at those two locations are different, based at least on the level of the product. Accordingly, given that other parameters are the same across the length of the EMSSD, the resonant frequency emitted by resonant portion 21-302 is different from resonant portion 21-399. Given the several ping returns from the several resonance portions of the EMSSD, the differences in the several ping returns correspond to a liquid level. The accuracy (e.g., full, ½ full to ±¼ full, ¼ full to ±⅛ full, etc.) can be configured into the EMSSD, such as by the number, length and/or spacing of resonant portions.

In some embodiments, the state of the contents may be displayed on the container, such as with a printed visual state indication pattern on a state display 21-3990 as shown in FIG. 21-3B3. The state display may be printed using, for example, carbon-containing inks. In this figure, the state display 21-3990 display 21-3990 reads "FULL", indicating that the level of liquid in the container is full. The state display 21-3990 display 21-3990 may be printed directly on the outer surface of the container or may be printed on a substrate (e.g., a label) and affixed to the container.

Although the state display 21-3990 display 21-3990 is located at the bottom end of the EMSSD in this figure, the state display 21-3990 display 21-3990 may be located elsewhere in the container, such as at the upper end of the EMSSD, or at a separate location from the EMSSD. The state display 21-3990 display 21-3990 may be used to indicate various types of states of the product contents, such as quantities, freshness, or a suggested action (e.g., "time to reorder"), where the indication may utilize text and/or graphics (e.g., icons).

FIG. 21-3B4 shows a cross-sectional view of a printed state display 21-3990 display 21-3990 according to some deployment scenarios. State display 21-3990 display 21-3990 is an electrophoretic visual display device using a carbon matrix 21-3991 (i.e., an electrophoretic display matrix), in accordance with some embodiments. Display 21-3990 includes a substrate 21-3992, a first electrode layer 21-3993 on the substrate 21-3992, a layer of the carbon matrix 21-3991 on the substrate 21-3992, an electrophoretic ink 21-3994 within carbon matrix 21-3991, and a second electrode layer 21-3995 on the carbon matrix 21-3991. When the electrode layers 21-3993 and 21-3995 are energized, ink 21-3994 moves toward or away from layer 21-3995 to form images (e.g., patterns, graphics, text) to be viewed from layer 21-3995, as indicated by the icon of an eye. The carbon matrix 21-3991 is made of carbon particles 21-3996 linked by polymers, forming a porous network. Substrate 21-3992 may be a flexible material such as a polymer film or paper material (e.g., cardboard, paper, polymer-coated paper, and polymer films).

The thickness of the carbon matrix 21-3991 layer can be made thinner than conventional electrophoretic display materials (i.e., shorter distance between electrode layers 21-3993 and 21-3995) because of the conductive nature of the carbon matrix 21-3991, which enables electrode connections within the matrix itself. For example, the thickness of carbon matrix 21-3991 may be 10 Cm to 40 m or 10 Em to 100 m. The electrical conductivity of the carbon matrix 21-3991 may be greater than 20,000 S/m or greater than 5,000 S/m or greater than 500 S/m or greater than 50 S/m. Having a thinner immobile phase (carbon matrix 21-3991)

beneficially requires less energy to move the ink 21-3994, making the display 21-3990 low-power and therefore more amenable to being powered solely by energy harvesting methods. For example, the state display 21-3990 display 21-3990 may be powered by an energy harvesting antenna 21-3997, which may harvest energy from electromagnetic signals emitted by the user device.

Carbon matrix 21-3991 is a porous conductive layer with pores within or between carbon particles 21-3996 that enable ink 21-3994 to move through the carbon matrix 21-3991. Ink that moves toward second electrode layer 21-3995 creates a visible image, while ink that moves away from layer 21-3995 creates blank spaces in the image that is viewed. In some embodiments, the ink 21-3994 may be a white electrophoretic ink to contrast the dark color of carbon matrix 21-3991.

Carbon matrix 21-3991 is made of carbon particles 21-3996 that are held together by a binder, such as a polymer (e.g., cellulose, cellulose acetate butyrate, styrene butadiene, polyurethane, polyether-urethane) or cross-linkable resins (e.g., acrylates, epoxies, vinyls) that form polymerizable covalent bonds. The binder links the carbon particles 21-3996 together but does not encompass all of the space between the carbon particles such that pores (i.e., spaces, voids) are present within the carbon matrix 21-3991. The carbon particles 21-3996 are electrically conductive and may include allotropes such as graphene, carbon nano-onions (CNOs), carbon nanotubes (CNTs), or any combination of these. Some or all of the carbon particles 21-3996 may be aggregates of sub-particles of these allotropes. In some embodiments, a majority of the carbon matrix 21-3991 may be graphene, such as greater than 50%, or greater than 80%, or greater than 90% of the carbon particles in the carbon matrix 21-3991 being graphene. In some embodiments, the state display 21-3990 display 21-3990 is an electrophoretic display matrix comprising a plurality of carbon particles cross-linked with each other by a polymer, where the matrix has a porosity comprising at least one of: i) an inter-particle porosity having an average distance of up to 10 m between the carbon particles, or ii) an intra-particle porosity having an average pore size of greater than 200 nm. Further details of printed visual displays may be found in U.S. Provisional Patent Application No. 62/866,464, filed on Jun. 25, 2019 and entitled "Electrophoretic Display"; which is owned by the assignee of the present disclosure and is incorporated by reference in its entirety.

A technique to determine a dynamic range of sensitivity based on a number of independent sensor portions of an EMSSD is given in FIG. 21-3C.

FIG. 21-3C is a selection chart 21-300C for determining a dynamic range of an electromagnetic state sensing device. As an option, one or more variations of selection chart 21-300C or any aspect thereof may be implemented in the context of the architecture and functionality of the embodiments described herein. The selection chart 21-300C or any aspect thereof may be implemented in any environment.

As shown, the more sensor portions that are used in an elongated EMSSD, the more accurate the readings can be. In the figure, the dynamic range of 3 dB corresponds to a ratio of 2 (one bit corresponding to one sensor portion), 6 dB corresponds to a ratio of 4 (two bits corresponding to two sensor portions), and 9 dB corresponds to a ratio of 8 (three bits corresponding to three sensor portions). As examples, if there is only one independent sensor, the reading can be either {empty or full} with a large plus or minus error, whereas if there are three sensor portions (e.g., three portions arranged with equal spacing in the direction of how the product contents will be depleted), the combination of readings from each of the three sensors can indicate {full, ⅞, ¾, ⅝, ½, ⅜, ¼, ⅛, or empty} with a plus or minus error of approximately 1⁄16th. That is, the various indications will result from conditions in the environment that correspond to whether the product contents fully cover, or partially cover, or do not cover the various resonant portions.

The heretofore-described embodiments rely at least in part on readings from EMSSD portions, where each portion in a different environment responds to a ping with a different respective return signature. The different respective return signatures can be measured within various environments, and the readings of the return signatures can bemused as calibration points as shown in FIG. 21-4A1 and FIG. 21-4A2.

FIG. 21-4A1 and FIG. 21-4A2 are equivalent circuit models 21-400A1 and 21-400A2, respectively, of an electromagnetic state sensing device in a first environment (e.g., carton nearly full of powder) and a second environment (e.g., carton almost empty). As an option, one or more variations of the equivalent circuit models or any aspect thereof may be implemented in the context of the architecture and functionality of the embodiments described herein. The equivalent circuit models or any aspect thereof may be implemented in any environment.

In exemplary embodiments, each carbon-containing material (i.e., ink) used in each portion of an EMSSD is formulated differently so as to resonate at different tuned frequencies. The physical phenomenon of material resonation can be described with respect to a corresponding molecular and/or morphological composition. Specifically, a material having a first molecular structure will resonate at a first frequency when in a particular environment, whereas a material having a second, different molecular structure will resonate at a second, different frequency in the same particular environment. Similarly, a material having a first molecular structure will resonate at a first frequency or frequencies when in a particular environment, whereas the same material having the same molecular structure will resonate at a second, different frequency or frequencies when in a different environment. In many cases, the aforementioned resonant frequencies form a signature that is unique to the composition when situated in a particular environment. For example, a first carbon-containing ink may be formulated primarily with graphene. A second carbon-containing ink may be similar to the first ink but differ in molecular structure from the first carbon-containing ink, such as having a different composition (e.g., having multi-walled spherical fullerenes or other allotrope added) or structure (e.g., graphene made of fewer or more layers than in the first ink).

This phenomenon is controllable using the herein described techniques. More particularly, (1) the material can be tuned to resonate innately at a selected frequency, and (2) the response of the material in different environments can be measured and used in calibration.

As shown in FIGS. 21-4A1 and 21-4A2, and as discussed hereunder, the difference between a first ping return measurement from a first resonant portion in first environment compared to a second ping return measurement from the same resonant portion in a second environment corresponds to the difference in a resonant frequency. Furthermore, other parameters being equal, the difference between a first environment and a second environment can correspond to a product sensing state (e.g., product is present or product is not present). The difference in a resonant frequency between product sensing states (e.g., state=product present or state=product not present) can be measured in situ. In some cases, the difference in a resonant frequency between product sensing states can be calculated. Regardless of if the difference in a resonant frequency between product sensing states is empirically measured (e.g., for calibration) or if the difference in a resonant frequency between product sensing states is calculated, the phenomenon arises due to atomic structure or molecular structure of materials in the sensor, and/or due to environmental conditions present at the time of measurement. The following paragraphs explain this phenomenon, step by step.

As is known in the art, atoms emit electromagnetic radiation at a natural frequency for the particular element. That is, an atom of a particular element has a natural frequency that corresponds to the characteristics of the makeup of the atom. For example, when a Cesium atom is stimulated, a valence electron jumps from a lower energy state (e.g., a ground state) to a higher energy state (e.g., an excited energy state). When the electron returns to its lower energy state, it emits electromagnetic radiation in the form of a photon. For Cesium, the photon emitted is in the microwave frequency range of 9.192631770 THz.

Structures that are larger than atoms, such as molecules formed of multiple atoms, also resonate (i.e., emit electromagnetic radiation) at predictable frequencies. For example, liquid water in bulk resonates at 109.6 THz. Water that is in tension (e.g., at the surface of bulk, in various states of surface tension) resonates at or near 112.6 THz.

Carbon atoms and carbon structures also exhibit natural frequencies that are dependent on the structure. For example, the natural resonant frequency of a carbon nanotube (CNT) is dependent on the tube diameter and length of the CNT. Growing a CNT under controlled conditions (e.g., to control the tube diameter and length) leads to controlling the structure's natural resonant frequency. Accordingly, growing CNTs is one way to tune to a desired resonant frequency.

Other structures formed of carbon can be created under controlled conditions. Such structures include but are not limited to carbon nano-onions (CNOs), carbon lattices, graphene, graphene-based, other carbon containing materials, engineered nanoscale structures, etc. and/or combinations thereof. Such structures can be formed so as to resonate at a particular tuned frequency and/or such structures can be modified in post-processing so as to obtain a desired characteristic or property. For example, a desired property such as a high reinforcement value when mixed with a polymer can be brought about by the selection of, and ratios of particular combinations of, materials and/or by the addition of other materials.

Moreover, co-location of multiples of such structures introduces further resonance effects. For example, two sheets of graphene may resonate between themselves at a frequency that is dependent on the length, width, spacing, shape of the spacing, and/or other physical characteristics of the sheets and/or their juxtaposition to each other.

The aforementioned materials have specific, measurable characteristics. This is true for naturally occurring materials as well as for engineered carbon allotropes. Such engineered carbon allotropes can be tuned to exhibit physical characteristics. For example, carbon allotropes can be engineered to exhibit physical characteristics corresponding to (a) a particular configuration of constituent primary particles. (b) formation of aggregates, and (c) formation of agglomerates. Each of these physical characteristics influence the particular resonant frequencies of materials formed using corresponding particular carbon allotropes.

In addition to tuning a particular carbon-based structure for a particular physical configuration that corresponds to a particular resonant frequency, carbon-containing compounds can be tuned to a particular resonant frequency or set of resonant frequencies. A set of resonant frequencies is termed a 'resonance profile'. One possible technique for tuning a particular carbon-based structure to emit set of resonant frequencies is disclosed as follows.

Forming Frequency-Tuned Materials

Carbon-containing resonance materials can be tuned to exhibit a particular resonance profile by tailoring the specific compounds that make up the materials to have particular electrical impedances. Different electrical impedances in turn correspond to different frequency response profiles.

Impedance describes how difficult it is for an alternating current to flowthrough an element. In the frequency domain, impedance is a complex number having a real component and an imaginary component due to the structures behaving as inductors. The imaginary component is an inductive reactance component XL, which is based on the frequency f and the inductance L of a particular structure in Eq. 21-1:

$$XL=2\pi fL \qquad \text{(Eq. 21-1)}$$

As the received frequency increases, the reactance also increases such that, at a certain frequency threshold, the resonant response will attenuate. Inductance L is affected by the electrical impedance Z of a material, where Z is related to the material properties of permeability □ and permittivity □ by the relationship in Eq. 21-2:

$$Z = \sqrt{\frac{\mu' + j\mu''}{\varepsilon' + j\varepsilon''}} = \sqrt{\frac{\mu_0}{\varepsilon_0}}$$

Thus, tuning of material properties changes the electrical impedance Z, which affects the inductance L and consequently affects the reactance $X_L$.

The present embodiments observe that carbon-containing structures with different inductances will have different frequency responses. That is, a carbon-containing structure with a high inductance L (being based on electrical impedance Z) will reach a certain reactance at a lower frequency than another carbon-containing structure with a lower inductance.

Further, the present embodiments utilize material properties of permeability, permittivity and conductivity when formulating a carbon-containing compound to be tuned in accordance with requirements of a particular product state sensor.

It is observed that a first carbon-containing structure will resonate at a first frequency, whereas that same structure will resonate at a second frequency when that structure is in a different environment (e.g., when the carbon-containing structures are in physical contact with structures of the environment).

As shown, the resonant frequency can be correlated to an equivalent electrical circuit comprising a capacitor $C_1$ and an inductor $L_1$. The frequency $f_1$ is given by Eq. 21-3:

$$f_1 = \frac{1}{2\pi\sqrt{L_1 C_1}}$$

If the environment is changed slightly, such as when liquid in a container is no longer contacting the sensor or is no longer being adjacent to the wall of the container on which the sensor is attached, then the environmental change in turn changes the inductance and/or capacitance of the structure as a whole. The changes can be correlated to an equivalent electrical circuit comprising a capacitor $C_2$ and an inductor $L_2$. The frequency f2 is given by Eq. 21-4:

$$f_2 = \frac{1}{2\pi\sqrt{L_2 C_2}}$$

Since the quantity $f_1$-$f_2$ is used when comparing two readings, or when comparing a reading to a calibration point, the magnitude of the quantity $f_1$-$f_2$ determines the sensitivity. Accordingly, the geometry of the printed portions of an EMSSD (e.g., the length of electrical conduit lines, the width of electrical conduit lines, curvature, etc.) and the choice of carbons used in the carbon-containing inks are often dominant factors when determining sensitivity of an EMSSD. Even though the resonant frequency of a portion of an EMSSD can be calculated (e.g., using the foregoing equations) many deployment scenarios rely on empirical data capture techniques to form calibration points. In many cases, the more calibration points that are taken, the more accurate are the measurements. In various calibration scenarios, many sets of calibration points are taken and saved for each variation of a container and/or intended contents.

FIG. 21-4B depicts an empirical data capture technique 21-400B as used for calibrating electromagnetic state sensing devices in different environments. As an option, one or more variations of empirical data capture technique 21-400B or any aspect thereof may be implemented in the context of the architecture and functionality of the embodiments described herein. The empirical data capture technique 21-400B or any aspect thereof may be implemented in any environment.

Practical uses of this empirical data capture technique result in capture of the actual measurements of each particular portion of a multi-portion EMSSD. In an example use scenario, a three-column table such as is depicted in FIG. 21-4B is constructed by taking a series of empirical measurements. Specifically, for each independent portion of an EMSSD, its response to stimulus is measured under two different environmental conditions. The empirical response of a particularly-tuned independent portion of an EMSSD is measured in a first environment (denoted $R_{ENV1}$) and recorded. Next, the empirical response of a particularly-tuned independent portion of an EMSSD is measured in a second environment (denoted $R_{ENV2}$) and recorded. Strictly as examples, the first environment might be when a container is full or almost full and the second environment might be when a container is empty or almost empty.

As can be seen $R_{ENV1}$ is a function of two dominant variables: (1) the permeability of the material that forms the independent portion of the EMSSD, and (2) the permittivity of the local environment. Such in situ measurements are taken for the first environment and for the second environment for each independent portion.

When an EMSSD is composed of a large number of independent portions (e.g., portion ID #2 21-302, portion ID #3 21-303, portion ID #99 21-399, etc.), a very accurate assessment of the contents can be made. The depiction of FIG. 21-4B includes empirical measurement scenarios 21-460, namely a stateFul scenario 21-461 a $\text{state}_{NearEmpty}$ scenario 21-462, and a stateHalf scenario 21-463. In this example, environment 1 corresponds to a set of conditions when the container is full, whereas environment 2 corresponds to a set of conditions when the container is empty. Thus, in a situation where the container is completely full, each independent portion of an EMSSD resonates with a response corresponding to $R_{ENV1}$. For comparison, in a situation where the container is near empty, each independent portion of an EMSSD resonates with a response corresponding to $R_{ENV2}$, except the 'bottom' portion (portion ID #99), which resonates with a response corresponding to $R_{ENV1}$ due to some contents remaining near the bottom portion #99.

In the situation where (1) there are just four independent portions of an EMSSD distributed in a vertical stacking across the container (e.g., extending from an upper to a lower portion of a container to detect a quantity of the contents in the container), and (2) the 'top two' portions resonate with a response corresponding to $R_{ENV1}$, and (3) the 'bottom two' portions resonate with a response corresponding to $R_{ENV2}$, it can be deemed that the container is at half capacity.

Some embodiments may include tuning the different carbon-containing inks to resonate at different center frequencies that are widely separated in the frequency domain. In this way, the ping frequencies that are used to stimulate particular independent portions might also be widely separated. Multiple independent portions of an EMSSD can be stimulated successively using a 'chirp' technique, where successive pings at different frequencies are separated across time slices such that the response signature from a given independent portion of an EMSSD is at a much higher amplitude than any harmonic responses from other portions of the EMSSD. One possible signature capture technique is shown and described as pertains to FIG. 21-5A.

FIG. 21-5A depicts a signature capture technique 21-500A as used for electromagnetic state sensing. As an option, one or more variations of signature capture technique 21-500A or any aspect thereof may be implemented in the context of the architecture and functionality of the embodiments described herein. The signature capture technique 21-500A or any aspect thereof may be implemented in any environment.

FIG. 21-5A is being presented with respect to a technique for capturing and analyzing a returned signal signature after independent portions of an EMSSD formed of carbon-containing tuned resonance materials have been stimulated by chirp signals. Specifically, the figure depicts measurements 21-550 that are taken from EMSSDs on a nearby container. As a result of stimulation of the EMSSDs with a chirp signal sequence, the EMSSDs respond (e.g., via resonance emissions). A return response (e.g., return signals $\mathbf{21\text{-}512}_1$, return signals $\mathbf{21\text{-}512}_2$) is captured from each EMSSD. More specifically, when a first EMSSD $\mathbf{21\text{-}504}_1$ on the container is stimulated by a ping (e.g., a ping from a chirp sequence of chirp signals $\mathbf{21\text{-}510}_1$), return signals $\mathbf{21\text{-}512}_1$ are received and processed. Similarly, when a second EMSSD $\mathbf{21\text{-}504}_2$ on the container is stimulated by a ping (e.g., a ping from a chirp sequence of chirp signals $\mathbf{21\text{-}510}_2$), return signals $\mathbf{21\text{-}512}_2$ are received and processed.

As shown, a particular container might include multiple EMSSDs, each with its respective identification portion and state portion, as well as a separate RFID. As an example, a container might be in the form of a dispenser (e.g., an inhaler) for dispensing a medicament (e.g., for asthma treatment), and the dispenser might have its own RFID, separate from any EMSSD. The RFID might have been applied to the dispenser at the time of manufacture of the dispenser, such as for product identification or inventory purposes. The EMSSDs might have been applied, possibly using an adhesive label, by a compounder or pharmacy at the time of fulfilling a prescription for the medicament, such as to track quantity and dosing information for a specific patient. For various reasons, the identification portion of the EMSSDs might be configured to operate at different frequencies. As an example, the identification portion of a first EMSSD might operate at 125 kHz, whereas the identification portion of a second EMSSD might operate at 13.6 MHz, and so on.

The foregoing chirp/ping signals can be sent by transceiver 21-514. Also, the return signals can be received by the same (or different) transceiver 21-514. As shown, the chirp signals can occur in a repeating sequence of chirps (e.g., chirp signals $\mathbf{21\text{-}510}_1$, chirp signals $\mathbf{21\text{-}510}_2$). For example, a chirp signal sequence might be managed by a ping control unit 21-516 that repeats a pattern comprising a 1 GHz ping, followed by a 2 GHz ping, followed by a 3 GHz ping, and so on. The entire chirp sequence can be repeated in its entirety continuously. In some cases, there can be brief periods between each ping such that the returned signals from the resonant materials (return signals $\mathbf{21\text{-}512}_1$, return signals $\mathbf{21\text{-}512}_2$) can be analyzed (e.g., in a signature analysis module 21-554) immediately after the end of a ping. In other cases, the signals corresponding to the ping stimulus and the signals of the returned response are concurrent. The transceiver 21-514, ping control unit 21-516 and signature analysis module can 21-554 may all be within a user device and software application on the user device (e.g., mobile or stationary device), or may be distributed on multiple devices such as the user device and a server that is in communication with the user device. Using digital signal processing techniques, the signals of the returned response can be distinguished from the ping signals. For example, in situations where the returned response comprises energy across many different frequencies (e.g., overtones, sidelobes, etc.), a notch filter can be used to filter out the frequency of the stimulus.

In cases where a single container hosts two or more EMSSDs, each individual EMSSD may be tuned to emit different resonant responses under different environmental conditions. For example, some EMSSDs are tuned to respond to changes in the contents of the container, whereas other EMSSDs are tuned to respond to the presence of particulates or gasses the environment.

For detecting the presence of gasses, an EMSSD is configured to comprise a sensing material (e.g., a redox mediator) that is sensitive to an analyte such that when the EMSSD is exposed to the analyte, the capacitance one or more of the constituent elements of the EMSSD changes. As such, a return response in the presence of an analyte is different than when in the absence of the analyte. More specifically, it can happen that the permittivity and/or permeability of the sensing material changes upon exposure to the analyte, which in turn changes capacitance of one or more constituent elements of the EMSSD (e.g., a capacitive element), which in turn indicates the presence of the analyte.

Further details regarding general approaches to sensing an analyte are described in U.S. Pat. No. 10,502,705 entitled "RESONANT GAS SENSOR," which is hereby incorporated by reference in its entirety.

FIG. 21-5B depicts a signature analysis technique 21-500B as used for electromagnetic state sensing. As an option, one or more variations of signature analysis technique 21-500B or any aspect thereof may be implemented in the context of the architecture and functionality of the embodiments described herein. The signature analysis technique 21-500B or any aspect thereof may be implemented in any environment.

FIG. 21-5B illustrates aspects pertaining to sensing devices that can emit not only identification information, but also product state information. In many situations, including the situation shown and described in FIG. 21-5B, product state information is determined based on measurements that are compared to predetermined points.

As shown, the flow of the system commences at step 21-570. A ping signal of a selected ping frequency is transmitted by ping control unit 21-516. The ping signal generation mechanism and the ping signal transmission mechanism can use any known techniques.

Strictly as one example, a transmitter module can generate a selected frequency (e.g., 3 GHz) and radiate that signal using an antenna or multiple antennae. The design and location of the tuned antenna can correspond to any tuned antenna geometry and/or material and/or location such that the strength of the ping is sufficient to energize a nearby EMSSD and/or to induce resonance in nearby EMSSDs. In some embodiments, several tuned antennae are disposed upon or within structural members that are in proximity to corresponding EMSSD. As such, when an EMSSD is stimulated by a ping, it resonates back with a signature. That signature can be received (step 21-574) and stored in a dataset comprising received signatures 21-576. A sequence of transmission of a ping, followed by reception of a signature, can be repeated in a loop.

For example, and as shown, the ping frequency is changed (step 21-572) in the course of iterative passes (i.e., see "Yes" branch of decision 21-580). As step 21-574 is performed and received signatures 21-576 are processed, a first signature 21-5781, a second signature 21-5782, an Nth signature 21-578$x$, etc. are stored. The number of iterations can be controlled by decision 21-580. When the "No" branch of decision 21-580 is taken (e.g., when there are no further additional pings to transmit), then the received signatures can be provided to a digital signal processing module (step 21-582) in the signature analysis module 21-554. The digital signal processing module classifies the signatures (step 21-584) against a set of calibration points 21-586. The calibrations points might correspond to particular ping frequencies and/or the calibrations points might correspond to particular signatures that had been measured within an in-situ environment. For example, a first calibration point 21-5881 might characterize a first returned signature that would be classified as being indicative of a 'full' state of the medicament in the dispenser, a second calibration point 21-5882 might characterize a second return signature that would be classified as being indicative of a 'half full' state of the medicament in the dispenser, and so on for N calibration points.

At step 21-590, classified signals are sent to an upstream network device. In some embodiments, the classified signals are relayed by a network hub that in turn transmits the classified signals to an upstream repository that hosts a machine learning database. Such a machine learning database can be trained such that a given set of sensed measurements can be correlated to particular product state conditions.

FIG. 21-6 depicts a virtual assistant 21-600 as used as a hub 21-106 in a replenishment system. As an option, one or more variations of virtual assistant 21-600 or any aspect thereof may be implemented in the context of the architecture and functionality of the embodiments described herein.

The virtual assistant 21-600 or any aspect thereof may be implemented in any environment.

Referring again to FIG. 21-1, a hub 21-106 can be any device that implements networking communications. In some cases, a hub includes a capability for natural language communication with a human user. In the example shown, the hub 21-106 is implemented by a virtual assistant. A virtual assistant can be any device such as are exemplified by devices known as "AMAZON ECHO®", "GOOGLE HOME®", "NEST HUB™", etc. As used herein, a virtual assistant is any device that is (1) network connected, and (2) is capable of carrying out natural language communication with a human user using a voice input transducer (e.g., a microphone) and a voice output transducer (e.g., speakers).

When used within an environment such as depicted in FIG. 21-1, a virtual assistant can facilitate replenishment based on EMSSD readings combined with results of a natural language conversation. In one scenario, an EMSSD reading indicates that a perishable product has reached its expiration date. The digital assistant might speak a voice interaction of "The kale is going bad—do you want to re-order now?" In such a scenario, the user might answer with an audible "Yes", which would cause the virtual assistant to transmit one or more upstream messages 21-125 (e.g., possibly including user credentials), which upstream messages might include a replenishment order 21-620. Operational elements (e.g., servers) that are upstream from the digital assistant might then transmit downstream messages 21-126, which downstream messages might include a replenishment status 21-622.

In some cases, such as when used within an environment such as depicted in FIG. 21-1, a virtual assistant can facilitate processing of signals emitted by EMSSDs. In particular, a virtual assistant can carry out communications with type1 mobile device 21-131 and/or a type2 mobile device 21-132 and/or an interrogator device 21-133. Such communications can be carried out using the NFC unit 21-602 (FIG. 21-6) of the virtual assistant, or the Bluetooth low energy (BLE) unit 21-604 of the virtual assistant, or the Wi-Fi unit 21-606 of the virtual assistant.

Furthermore, any of a variety of protocols can be implemented such that any operations needed for product identification, and/or for product state sensing, and/or for application of rules can be carried out in any combination by a mobile device, and/or an interrogator device, and/or a virtual assistant, and/or any other network-connected device.

The following figures pertain to techniques for forming and executing rules serve to present a logical flow of operations. As hereinabove indicated, processing that corresponds to application of any rule or portion thereof and/or processing that corresponds to performance of any individual operation can be carried out at any operational element.

FIG. 21-7A presents a rule codification technique 21-700A as used in a replenishment system based on electromagnetic state sensing devices. As an option, one or more variations of rule codification technique 21-700A or any aspect thereof may be implemented in the context of the architecture and functionality of the embodiments described herein. The rule codification technique 21-700A or any aspect thereof may be implemented in any environment.

As can be readily understood based on the foregoing, since there are many products that might be situated in a given setting (e.g., in a domicile, or car, or boat, etc.) and inasmuch as the foregoing EMSSDs may be applied to many different types of products that have many different types of states, and many different states within a particular state type, it follows that determination of the state or states of a particular product can be facilitated by specific processing based on the product identification. For example, if, as a result of a ping to the identification portion of an EMSSD, the product can be identified as a 64-ounce bottle of detergent of a particular brand, then the particular configuration of the remaining portions of the EMSSD can be known by a lookup in a database. For example, data returned from a lookup in a database might indicate that the EMSSD configuration for that product and its particular container (i.e., the 64-ounce bottle of detergent) comprises eight different resonance portions that are responsive to eight different stimulation frequencies.

Furthermore, data returned from a lookup in a database might indicate that the EMSSD configuration for that product and its particular container (i.e., the 64-ounce bottle of detergent) comprises 32 different calibration points. As such, once the product has been identified, a great deal of information about the EMSSD configuration can be known. Moreover, once the product has been identified, further steps to perform for the purpose of product state can be identified. The flow as depicted in FIG. 21-7A implements a rule codification technique such that any rule can be delivered to any device for execution.

As shown, the flow is initiated by event 21-701, which event might arise from an app on a user device such as a smartphone. The user device responds to the event by emitting a ping frequency (step 21-702). The particular frequency of the ping can be initially known from a ping frequency table 21-720, which table is implemented as a data structure accessible to the user device. As a result of the outgoing ping or pings, at least one identification signal 21-703 identification signal 21-703 is emitted from an RFID or an identification portion of an EMSSD. The identification signal 21-703 is received (step 21-704), which identification signal is converted into a binary representation (step 21-706) using any known signal processing techniques. This binary representation is used to look up one or more rules (step 21-708) from one or more rule sets 21-121. The one or more rules can be stored using any storage device at any location and can be retrieved by using any known methods for inter-device communication. In many cases, the one or more rules comprise information pertaining to (1) the corresponding EMSSD type, (2) the location of calibration points, (3) thresholds, and (4) additional ping instructions.

Each rule can be codified by looking up data corresponding to operands of a rule (step 21-710) and by looking up operations to apply to the operands of the rule (step 21-712).

Strictly as one example, a rule might indicate to "Retry if error >T". Step 21-710 can look up "T" to determine a numeric value of, for example, 50%. Step 21-712 can look up details pertaining to the operation of "Retry", which might include, for example, a time duration to wait before a retry. In some cases, numeric values for operands are determined on the particular platform where the rule is to be executed.

When the rules have been processed through step 21-710 and step 21-712, the flow emits platform-independent rule representations 21-715, which are then transmitted to a device (e.g., hub or smartphone) for execution.

FIG. 21-7B presents a rule execution technique 21-700B as used in a replenishment system based on electromagnetic state sensing devices. As an option, one or more variations of rule execution technique 21-700B or any aspect thereof may be implemented in the context of the architecture and functionality of the embodiments described herein. The rule execution technique 21-700B or any aspect thereof may be implemented in any environment.

As shown, the rule execution technique 21-700B is initiated when the device (e.g., hub or smartphone) receives the platform-independent rule representations (step 21-752). Each individual one of the platform-independent rule representations are decoded (step 21-754) to determine a corresponding entry point on the device. Also, each of the platform-independent rule representations are decoded to identify operands (step 21-756). A formatting table 21-757 might be employed to convert a particular platform-independent operand representation into a platform-specific operand representation. Then, for each entry point, the operands are formatted to correspond to the computer hardware and software architecture of the platform (step 21-758) and the platform-independent rule is executed on the device (step 21-760). In some cases, an operand might not be decoded into a numeric representation, but rather the operand is decoded into a further entry point or subroutine. As an example, the operand "sweep" as depicted in formatting table 21-757 might refer to a subroutine that covers many ranges in a frequency sweeping operation.

FIG. 21-8 depicts an example protocol 21-800 as used in a replenishment system based on electromagnetic state sensing devices. As an option, one or more variations of protocol 21-800 or any aspect thereof may be implemented in the context of the architecture and functionality of the embodiments described herein. The protocol 21-800 or any aspect thereof may be implemented in any environment.

The shown protocol involved four devices: (1) a proximal EMSSD 21-801. (2) a user device 21-802, (3) a network hub 21-803, and (4) an upstream processing unit 21-804. As shown, the protocol is initiated by a user device. Specifically, user device 21-802 emits a first ping (emission 21-806). The energy from the first ping causes a proximal EMSSD 21-801 to emit a signal (emission 21-807), which signal includes a portion that is interpreted as an identification signal (emission 21-808). The identification signal is decoded into a product ID (operation 21-810), which identification signal is sent to the network hub (message 21-812).

The network hub 21-803 performs a first local processing (operation 21-814) to process all or part of emission 21-807, then sends all or part of emission 21-807 to upstream processing unit 21-804 (payload message 21-816). The upstream processing unit 21-804 (i.e., upstream computing device, which may include, for example, an interrogator device having an RFID reader) accesses EMSSD rules from rules set 21-121 and performs first upstream processing 21-818. The EMSSD rules are encoded as platform-independent rules and sent to the network hub (message 21-820), which then relays all or part of the platform-independent rules (message 21-822) to the user device.

At this point in the protocol, the user device has sufficient information about the characteristics of the proximal EMSSD (e.g., resulting from processing of message by determining second through Nth ping signal characteristics 21-824) such that the state portion of the EMSSD can be interrogated by pinging any one or more resonant portions of the proximal EMSSD. In this protocol, only one second ping (emission 21-826) is shown, however in most cases there are many resonant portions of the proximal EMSSD, any or all of which portions are interrogated (e.g., in a succession) by the user device.

Responsive to the second ping, the resonant portion of the proximal EMSSD resonates (emission 21-828) in a manner that emits a state signal (emission 21-830). The state signal is processed at the user device by applying one or more rules (operation 21-832). In this embodiment, all or portions of the state signal and/or any derivatives from processing of the state signal are sent to the network hub (message 21-834), which performs second local processing (operation 21-836). The second local processing includes forming a payload for messages that are sent to the upstream processing unit (message 21-838). The upstream processing unit in turn performs second upstream processing 21-842.

At this point in the protocol, at least the upstream processing unit has information about the particular state of a particular unit of a particular product. As such, the upstream processing unit can avail itself of additional rules that pertain to fulfillment. For example, a fulfillment rule might carry the semantics of "Ask the user if another unit of this product should be ordered now." Such additional rules are relayed (message 21-844) to the network hub for further processing. In some cases, and as shown, the network hub will relay all or part of the additional rules (message 21-846) to the user device.

Such additional rules at the user device might include forming and presenting a confirmation question in a user interface of the user device. In some cases, there are several additional rules that are applied (operation 21-847) at the user device. A user response, for example "Yes—order now." might be sent to the network hub (message 21-848) for further processing and/or for relaying the response or portion thereof to the upstream processing unit (message 21-850). The upstream processing unit may then complete steps (operation 21-852) to accomplish the user-confirmed fulfillment request.

As a result of product state determination using an EMSSD, the user was notified of an underlying need for replenishment. The user's desire for replenishment was confirmed, after which replenishment was initiated. In some cases, a fulfillment rule authorized initiation of fulfillment even in the absence of an explicit user confirmation. Additional Practical Application Examples FIG. 21-9 depicts a system 21-900 as an arrangement of computing modules that are interconnected so as to operate cooperatively to implement certain of the herein-disclosed embodiments. This and other embodiments present particular arrangements of elements that, individually or as combined, serve to form improved technological processes that address how to inexpensively deploy state sensors. The partitioning of system 21-900 is merely illustrative and other partitions are possible. As an option, the system 21-900 may be implemented in the context of the architecture and functionality of the embodiments described herein. Of course, however, the system 21-900 or any operation therein may be carried out in any desired environment.

The system 21-900 comprises at least one processor and at least one memory, the memory serving to store program instructions corresponding to the operations of the system. As shown, an operation can be implemented in whole or in part using program instructions accessible by a module. The modules are connected to a communication path 21-905, and any operation can communicate with any other operations over communication path 21-905. The modules of the system can, individually or in combination, perform method operations within system 21-900. Any operations performed within system 21-900 may be performed in any order unless as may be specified in the claims.

The shown embodiment implements a portion of a computer system, presented as system 21-900, and includes one or more processors that can execute one or more sets of instructions, machine-readable code, software programs, and the like. In various implementations, execution of the instructions, machine-readable code, and/or software programs may cause the system 21-900 to perform one or more operations. In some implementations, the one or more operations may include responding to a request from a user device to download an app, for example, by receiving the request from the user device and providing access to the app in response to the request, where the application is configured to cause the user device to perform a sequence of steps (module 21-920). The one or more operations may include transmitting, from the user device, a first electromagnetic radiation ping (module 21-930). The one or more operations may include receiving, from an electromagnetic state sensing device (EMSSD) that is affixed to the product packaging, a first electromagnetic radiation return signal. In some aspects, the first electromagnetic radiation return signal is transduced by the electromagnetic state sensing device in response to the first electromagnetic radiation ping.

In some implementations, transducing the first electromagnetic radiation return signal may produce an electromagnetic radiation signal that encodes at least first information comprising a product identification code (module 21-940). The method may also include applying a rule that is selected based at least in part on the product identification code (module 21-950), and transmitting a second electromagnetic radiation ping in response to application of the rule, such as where the second electromagnetic radiation ping is tuned based on the rule (module 21-960). The method may also include receiving, from the electromagnetic state sensing device, a second electromagnetic radiation return signal that encodes second information pertaining to the contents within the product packaging (module 21-970), and sending, from the user device, at least a portion of the second information to an upstream computing device (module 21-980). In some aspects, the user device may be, for example, a smartphone, and may optionally include a stationary RFID reader.

In some embodiments, the electromagnetic state sensing device is a printed electromagnetic state sensing device, which may include a first carbon-containing ink and optionally a second carbon-containing ink. The printed electromagnetic state sensing device may emit a first variation of the second electromagnetic radiation signal (i.e., a first return signal) when contents within the product packaging are at a first state, and the printed electromagnetic state sensing device may emit a second variation of the second electromagnetic radiation signal (i.e., a second return signal) when contents within the product packaging are at a second state. In some embodiments, the printed electromagnetic state sensing device may be printed longitudinally on the product packaging.

In some embodiments, the electromagnetic radiation return signal has energy distributed across a plurality of frequencies and is emitted by the user device, wherein the user device is a mobile device. The electromagnetic radiation return signals may be emitted by an electromagnetic emission device of a mobile device or by an electromagnetic emission device of a stationary device. Strictly as one example, the electromagnetic emission device may be a near field communication device.

In some embodiments, the application is further configured to place a replenishment order in response to the second information pertaining to the contents within the product packaging. In some embodiments, the application is further configured to send a notification message in response to the second information pertaining to the contents within the product packaging. The notification message may include at least one of a quantity indication, an expiration date, a refill date, a refill count, a lot number, a chemical composition, and a concentration indication.

In some embodiments, the application is further configured to maintain a log of at least some of the second information pertaining to the contents within the product packaging. The log may be maintained by a network access point, where the network access point may receive a voice activated command. The log may include an entry corresponding to at least a portion of the second information.

In some embodiments, the application is further configured to receive, from a second electromagnetic state sensing device (EMSSD) that is affixed to product packaging, an electromagnetic radiation relay signal, wherein the electromagnetic radiation relay signal is transduced by the second electromagnetic state sensing device.

Variations of the foregoing may include more or fewer of the shown modules. Certain variations may perform more or fewer (or different) steps and/or certain variations may use data elements in more, or in fewer, or in different operations.

Still further, some embodiments include variations in the operations performed, and some embodiments include variations of aspects of the data elements used in the operations.

FIG. 21-10A through FIG. 21-10Y depict structured carbons, various carbon nanoparticles, and various carbon-containing aggregates, and various three-dimensional carbon-containing structures that are grown over other materials, according to some embodiments of the present disclosure.

Some embodiments of EMSSDs use carbon nanoparticles and aggregates in certain configurations. In some embodiments, the carbon nanoparticles and aggregates are characterized by a high "uniformity" (i.e., high mass fraction of desired carbon allotropes), a high degree of "order" (i.e., low concentration of defects), and/or a high degree of "purity" (i.e., low concentration of elemental impurities), in contrast to the lower uniformity, less ordered, and lower purity particles achievable with conventional systems and methods. This results in a high degree of tunability of the resonating portions of EMSSDs.

In some embodiments, the nanoparticles produced using the methods described herein contain multi-walled spherical fullerenes (MWSFs) or connected MWSFs and have a high uniformity (e.g., a ratio of graphene to MWSF from 20% to 80%), a high degree of order (e.g., a Raman signature with an ID/IG ratio from 0.95 to 1.05), and a high degree of purity (e.g., the ratio of carbon to other elements (other than hydrogen) is greater than 99.9%). In some embodiments, the nanoparticles produced using the methods described herein contain MWSFs or connected MWSFs, and the MWSFs do not contain a core composed of impurity elements other than carbon. In some cases, the particles produced using the methods described herein are aggregates containing the nanoparticles described above with large diameters (e.g., greater than 10 μm across).

Conventional methods have been used to produce particles containing multi-walled spherical fullerenes with a high degree of order, but the conventional methods lead to carbon products with a variety of shortcomings. For example, high temperature synthesis techniques lead to particles with a mixture of many carbon allotropes and therefore low uniformity (e.g., less than 20% fullerenes to other carbon allotropes) and/or small particle sizes (e.g., less than 1 μm, or less than 100 nm in some cases). Methods using catalysts lead to products including the catalyst elements and therefore have low purity (e.g., less than 95% carbon to other elements) as well. These undesirable properties also often lead to undesirable electrical properties of the resulting carbon particles (e.g., electrical conductivity of less than 1000 S/m).

In some embodiments, the carbon nanoparticles and aggregates described herein are characterized by Raman spectroscopy that is indicative of the high degree of order and uniformity of structure. In some embodiments, the uniform, ordered and/or pure carbon nanoparticles and aggregates described herein are produced using relatively high speed, low cost improved thermal reactors and methods, as described below. Additional advantages and/or improvements will also become apparent from the following disclosure.

In the present disclosure, the term "graphene" refers to an allotrope of carbon in the form of a two-dimensional, atomic-scale, hexagonal lattice in which one atom forms each vertex. The carbon atoms in graphene are $sp^2$-bonded. Additionally, graphene has a Raman spectrum with two main peaks: a G-mode at approximately 1580 $cm^{-1}$ and a D-mode at approximately 1350 $cm^{-1}$ (when using a 532 nm excitation laser).

In the present disclosure, the term "fullerene" refers to a molecule of carbon in the form of a hollow sphere, ellipsoid, tube, or other shapes. Spherical fullerenes can also be referred to as Buckminsterfullerenes, or buckyballs. Cylindrical fullerenes can also be referred to as carbon nanotubes. Fullerenes are similar in structure to graphite, which is composed of stacked graphene sheets of linked hexagonal rings. Fullerenes may also contain pentagonal (or sometimes heptagonal) rings.

In the present disclosure, the term "multi-walled fullerene" refers to fullerenes with multiple concentric layers. For example, multi-walled nanotubes (MWNTs) contain multiple rolled layers (concentric tubes) of graphene. Multi-walled spherical fullerenes (MWSFs) contain multiple concentric spheres of fullerenes.

In the present disclosure, the term "nanoparticle" refers to a particle that measures from 1 nm to 989 nm. The nanoparticle can include one or more structural characteristics (e.g., crystal structure, defect concentration, etc.), and one or more types of atoms. The nanoparticle can be any shape, including but not limited to spherical shapes, spheroidal shapes, dumbbell shapes, cylindrical shapes, elongated cylindrical type shapes, rectangular prism shapes, disk shapes, wire shapes, irregular shapes, dense shapes (i.e., with few voids), porous shapes (i.e., with many voids), etc.

In the present disclosure, the term "aggregate" refers to a plurality of nanoparticles that are connected together by Van der Waals forces, by covalent bonds, by ionic bonds, by metallic bonds, or by other physical or chemical interactions. Aggregates can vary in size considerably, but in general are larger than about 500 nm.

In some embodiments, a carbon nanoparticle, as described herein, includes two or more connected multi-walled spherical fullerenes (MWSFs) and layers of graphene coating the connected MWSFs. In some embodiments, a carbon nanoparticle, as described herein, includes two or more connected multi-walled spherical fullerenes (MWSFs) and layers of graphene coating the connected MWSFs where the MWSFs do not contain a core composed of impurity elements other than carbon. In some embodiments, a carbon nanoparticle, as described herein, includes two or more connected multi-walled spherical fullerenes (MWSFs) and layers of graphene coating the connected MWSFs where the MWSFs do not contain a void (i.e., a space with no carbon atoms greater than approximately 0.5 nm, or greater than approximately 1 nm) at the center. In some embodiments, the connected MWSFs are formed of concentric, well-ordered spheres of $sp^2$-hybridized carbon atoms, as contrasted with spheres of poorly-ordered, non-uniform, amorphous carbon particles.

In some embodiments, the nanoparticles containing the connected MWSFs have an average diameter in a range from 5 to 500 nm, or from 5 to 250 nm, or from 5 to 100 nm, or from 5 to 50 nm, or from 10 to 500 nm, or from 10 to 250 nm, or from 10 to 100 nm, or from 10 to 50 nm, or from 40 to 500 nm, or from 40 to 250 nm, or from 40 to 100 nm, or from 50 to 500 nm, or from 50 to 250 nm, or from 50 to 100 nm.

In some embodiments, the carbon nanoparticles described herein form aggregates, wherein many nanoparticles aggregate together to form a larger unit. In some embodiments, a carbon aggregate includes a plurality of carbon nanoparticles. A diameter across the carbon aggregate is in a range from 10 to 500 μm, or from 50 to 500 μm, or from 100 to 500 μm, or from 250 to 500 μm, or from 10 to 250 μm, or from 10 to 100 μm, or from 10 to 50 μm. In some embodiments, the aggregate is formed from a plurality of carbon nanoparticles, as defined above. In some embodiments, aggregates contain connected MWSFs. In some embodiments, the aggregates contain connected MWSFs with a high uniformity metric (e.g., a ratio of graphene to MWSF from 20% to 80%), a high degree of order (e.g., a Raman signature with an ID/IG ratio from 0.95 to 1.05), and a high degree of purity (e.g., greater than 99.9% carbon).

One benefit of producing aggregates of carbon nanoparticles, particularly with diameters in the ranges described above, is that aggregates of particles greater than 10 μm are easier to collect than particles or aggregates of particles that are smaller than 500 nm. The ease of collection reduces the cost of manufacturing equipment used in the production of the carbon nanoparticles and increases the yield of the carbon nanoparticles. Additionally, particles greater than 10 μm in size pose fewer safety concerns compared to the risks of handling smaller nanoparticles, e.g., potential health and safety risks due to inhalation of the smaller nanoparticles. The lower health and safety risks, thus, further reduce the manufacturing cost.

In some embodiments, a carbon nanoparticle has a ratio of graphene to MWSFs from 10% to 90%, or from 10% to 80%, or from 10% to 60%, or from 10% to 40%, or from 10% to 20%, or from 20% to 40%, or from 20% to 90%, or from 40% to 90%, or from 60% to 90%, or from 80% to 90%. In some embodiments, a carbon aggregate has a ratio of graphene to MWSFs is from 10% to 90%, or from 10% to 80%, or from 10% to 60%, or from 10% to 40%, or from 10% to 20%, or from 20% to 40%, or from 20% to 90%, or from 40% to 90%, or from 60% to 90%, or from 80% to 90%. In some embodiments, a carbon nanoparticle has a ratio of graphene to connected MWSFs from 10% to 90%, or from 10% to 80%, or from 10% to 60%, or from 10% to 40%, or from 10% to 20%, or from 20% to 40%, or from 20% to 90%, or from 40% to 90%, or from 60% to 90%, or from 80% to 90%. In some embodiments, a carbon aggregate has a ratio of graphene to connected MWSFs is from 10% to 90%, or from 10% to 80%, or from 10% to 60%, or from 10% to 40%, or from 10% to 20%, or from 20% to 40%, or from 20% to 90%, or from 40% to 90%, or from 60% to 90%, or from 80% to 90%.

In some embodiments, Raman spectroscopy is used to characterize carbon allotropes to distinguish their molecular structures. For example, graphene can be characterized using Raman spectroscopy to determine information such as order/disorder, edge and grain boundaries, thickness, number of layers, doping, strain, and thermal conductivity. MWSFs have also been characterized using Raman spectroscopy to determine the degree of order of the MWSFs.

In some embodiments, Raman spectroscopy is used to characterize the structure of MWSFs or connected MWSFs. The main peaks in the Raman spectra are the G-mode and the D-mode. The G-mode is attributed to the vibration of carbon atoms in $sp^2$-hybridized carbon networks, and the D-mode is related to the breathing of hexagonal carbon rings with defects. In some cases, defects may be present, yet may not be detectable in the Raman spectra. For example, if the presented crystalline structure is orthogonal with respect to the basal plane, the D-peak will show an increase. On the other hand, if presented with a perfectly planar surface that is parallel with respect to the basal plane, the D-peak will be zero.

When using 532 nm incident light, the Raman G-mode is typically at 1582 $cm^{-1}$ for planar graphite can be downshifted for MWSFs or connected MWSFs (e.g., down to 1565 $cm^{-1}$ or down to 1580 $cm^{-1}$). The D-mode is observed at approximately 1350 $cm^{-1}$ in the Raman spectra of MWSFs or connected MWSFs. The ratio of the intensities of the D-mode peak to G-mode peak (i.e., the ID/IG) is related to the degree of order of the MWSFs, where a lower ID/IG indicates a higher degree of order. An ID/IG near or below 1 indicates a relatively high degree of order, and an ID/IG greater than 1.1 indicates a lower degree of order.

In some embodiments, a carbon nanoparticle or a carbon aggregate containing MWSFs or connected MWSFs may have a Raman spectrum with a first Raman peak at about 1350 $cm^{-1}$ and a second Raman peak at about 1580 cm-1 when using 532 nm incident light. In some embodiments, the ratio of an intensity of the first Raman peak to an intensity of the second Raman peak (i.e., the ID/IG) for the nanoparticles or the aggregates described herein is in a range from 0.95 to 1.05, or from 0.9 to 1.1, or from 0.8 to 1.2, or from 0.9 to 1.2, or from 0.8 to 1.1, or from 0.5 to 1.5, or less than 1.5, or less than 1.2, or less than 1.1, or less than 1, or less than 0.95, or less than 0.9, or less than 0.8.

In some embodiments, a carbon aggregate containing MWSFs or connected MWSFs, as defined above, has a high purity. In some embodiments, the carbon aggregate containing MWSFs or connected MWSFs has a ratio of carbon to metals of greater than 99.99%, or greater than 99.95%, or greater than 99.9%, or greater than 99.8%, or greater than 99.5%, or greater than 99%. In some embodiments, the carbon aggregate has a ratio of carbon to other elements of greater than 99.99%, or greater than 99.95%, or greater than 99.9%, or greater than 99.5%, or greater than 99%, or greater than 90%, or greater than 80%, or greater than 70%, or greater than 60%. In some embodiments, the carbon aggregate has a ratio of carbon to other elements (except for hydrogen) of greater than 99.99%, or greater than 99.95%, or greater than 99.9%, or greater than 99.8%, or greater than 99.5%, or greater than 99%, or greater than 90%, or greater than 80%, or greater than 70%, or greater than 60%.

In some embodiments, a carbon aggregate containing MWSFs or connected MWSFs, as defined above, has a high specific surface area. In some embodiments, the carbon aggregate has a Brunauer, Emmett and Teller (BET) specific surface area from 10 to 200 $m^2/g$, or from 10 to 100 $m^2/g$, or from 10 to 50 $m^2/g$, or from 50 to 200 $m^2/g$, or from 50 to 100 $m^2/g$, or from 10 to 1000 $m^2/g$.

In some embodiments, a carbon aggregate containing MWSFs or connected MWSFs, as defined above, has a high electrical conductivity. In some embodiments, a carbon aggregate containing MWSFs or connected MWSFs, as defined above, is compressed into a pellet and the pellet has an electrical conductivity greater than 500 S/m, or greater than 1000 S/m, or greater than 2000 S/m, or greater than 3000 S/m, or greater than 4000 S/m, or greater than 5000 S/m, or greater than 10000 S/m, or greater than 20000 S/m, or greater than 30000 S/m, or greater than 40000 S/m, or greater than 50000 S/m, or greater than 60000 S/m, or greater than 70000 S/m, or from 500 S/m to 100000 S/m, or from 500 S/m to 1000 S/m, or from 500 S/m to 10000 S/m, or from 500 S/m to 20000 S/m, or from 500 S/m to 100000 S/m, or from 1000 S/m to 10000 S/m, or from 1000 S/m to 20000 S/m, or from 10000 to 100000 S/m, or from 10000 S/m to 80000 S/m, or from 500 S/m to 10000 S/m. In some cases, the density of the pellet is approximately 1 $g/cm^3$, or approximately 1.2 $g/cm^3$, or approximately 1.5 $g/cm^3$, or approximately 2 $g/cm^3$, or approximately 2.2 $g/cm^3$, or approximately 2.5 $g/cm^3$, or approximately 3 $g/cm^3$. Additionally, tests have been performed in which compressed pellets of the carbon aggregate materials have been formed with compressions of 2000 psi and 12000 psi and with annealing temperatures of 800° C. and 1000° C. The higher compression and/or the higher annealing temperatures generally result in pellets with a higher degree of electrical conductivity, including in the range of 12410.0 S/m to 13173.3 S/m.

High Purity Carbon Allotropes Produced Using Thermal Systems

In some embodiments, the carbon nanoparticles and aggregates described herein are produced using thermal reactors and methods, such as any appropriate thermal reactor and/or method. Further details pertaining to thermal reactors and/or methods of use can be found in U.S. Pat. No. 9,862,602, issued Jan. 9, 2018, titled "CRACKING OF A PROCESS GAS", which is hereby incorporated by reference in its entirety Additionally, precursors (e.g., including methane, ethane, propane, butane, and natural gas) can be used with the thermal reactors to produce the carbon nanoparticles and the carbon aggregates described herein.

In some embodiments, the carbon nanoparticles and aggregates described herein are produced using the thermal reactors with gas flow rates from 1 standard liter per minute (slm) to 10 slm, or from 0.1 slm to 20 slm, or from 1 slm to 5 slm, or from 5 slm to 10 slm, or greater than 1 slm, or greater than 5 slm. In some embodiments, the carbon nanoparticles and aggregates described herein are produced using the thermal reactors with gas resonance times from 0.1 seconds to 30 seconds, or from 0.1 seconds to 10 seconds, or from 1 seconds to 10 seconds, or from 1 seconds to 5 seconds, from 5 seconds to 10 seconds, or greater than 0.1 seconds, or greater than 1 seconds, or greater than 5 seconds, or less than 30 seconds.

In some embodiments, the carbon nanoparticles and aggregates described herein are produced using the thermal reactors with production rates from 10 g/hr to 200 g/hr, or from 30 g/hr to 200 g/hr, or from 30 g/hr to 100 g/hr, or from 30 g/hr to 60 g/hr, or from 10 g/hr to 100 g/hr, or greater than 10 g/hr, or greater than 30 g/hr, or greater than 100 g/hr.

In some embodiments, thermal reactors or other cracking apparatuses and thermal reactor methods or other cracking methods can be used for refining, pyrolyzing, dissociating or cracking feedstock process gases into its constituents to produce the carbon nanoparticles and the carbon aggregates described herein, as well as other solid and/or gaseous products (e.g., hydrogen gas and/or lower order hydrocarbon gases). The feedstock process gases generally include, for example, hydrogen gas ($H^2$), carbon dioxide ($CO^2$), $C^1$ to $C^{10}$ hydrocarbons, aromatic hydrocarbons, and/or other hydrocarbon gases such as natural gas, methane, ethane, propane, butane, isobutane, saturated/unsaturated hydrocarbon gases, ethene, propene, etc., and mixtures thereof. The carbon nanoparticles and the carbon aggregates can include, for example, multi-walled spherical fullerenes (MWSFs), connected MWSFs, carbon nanospheres, graphene, graphite, highly ordered pyrolytic graphite, single-walled nanotubes, multi-walled nanotubes, other solid carbon products, and/or the carbon nanoparticles and the carbon aggregates described herein.

Some embodiments for producing the carbon nanoparticles and the carbon aggregates described herein include thermal cracking methods that use, for example, an elongated longitudinal heating element optionally enclosed within an elongated casing, housing or body of a thermal cracking apparatus. The body generally includes, for example, one or more tubes or other appropriate enclosures made of stainless steel, titanium, graphite, quartz, or the like. In some embodiments, the body of the thermal cracking apparatus is generally cylindrical in shape with a central elongate longitudinal axis arranged vertically and a feedstock process gas inlet at or near the top of the body. The feedstock process gas flows longitudinally down through the body or a portion thereof. In the vertical configuration, both gas flow and gravity assist in the removal of the solid products from the body of the thermal cracking apparatus.

The heating element generally includes, for example, a heating lamp, one or more resistive wires or filaments (or twisted wires), metal filaments, metallic strips or rods, and/or other appropriate thermal radical generators or elements that can be heated to a specific temperature (i.e., a molecular cracking temperature) sufficient to thermally crack molecules of the feedstock process gas. The heating element is generally disposed, located or arranged to extend centrally within the body of the thermal cracking apparatus along the central longitudinal axis thereof. For example, if there is only one heating element, then it is placed at or concentric with the central longitudinal axis, and if there is a plurality of the heating elements, then they are spaced or offset generally symmetrically or concentrically at locations near and around and parallel to the central longitudinal axis.

Thermal cracking to produce the carbon nanoparticles and aggregates described herein is generally achieved by passing the feedstock process gas over, or in contact with, or within the vicinity of, the heating element within a longitudinal elongated reaction zone generated by heat from the heating element and defined by and contained inside the body of the thermal cracking apparatus to heat the feedstock process gas to or at a specific molecular cracking temperature.

The reaction zone is considered to be the region surrounding the heating element and close enough to the heating element for the feedstock process gas to receive sufficient heat to thermally crack the molecules thereof. The reaction zone is thus generally axially aligned or concentric with the central longitudinal axis of the body. In some embodiments, the thermal cracking is performed under a specific pressure. In some embodiments, the feedstock process gas is circulated around or across the outside surface of a container of the reaction zone or a heating chamber in order to cool the container or chamber and preheat the feedstock process gas before flowing the feedstock process gas into the reaction zone.

In some embodiments, the carbon nanoparticles and aggregates described herein and/or hydrogen gas are produced without the use of catalysts. In other words, the process is catalyst free.

Some embodiments to produce the carbon nanoparticles and aggregates described herein using thermal cracking apparatuses and methods to provide a standalone system that can advantageously be rapidly scaled up or scaled down for different production levels as desired. For example, some embodiments are scalable to provide a standalone hydrogen and/or carbon nanoparticle producing station, a hydrocarbon source, or a fuel cell station. Some embodiments can be scaled up to provide higher capacity systems, e.g., for a refinery or the like.

In some embodiments, a thermal cracking apparatus for cracking a feedstock process gas to produce the carbon nanoparticles and aggregates described herein include a body, a feedstock process gas inlet, and an elongated heating element. The body has an inner volume with a longitudinal axis. The inner volume has a reaction zone concentric with the longitudinal axis. A feedstock process gas is flowed into the inner volume through the feedstock process gas inlet during thermal cracking operations. The elongated heating element is disposed within the inner volume along the longitudinal axis and is surrounded by the reaction zone. During the thermal cracking operations, the elongated heating element is heated by electrical power to a molecular cracking temperature to generate the reaction zone, the feedstock process gas is heated by heat from the elongated heating element, and the heat thermally cracks molecules of the feedstock process gas that are within the reaction zone into constituents of the molecules.

In some embodiments, a method for cracking a feedstock process gas to produce the carbon nanoparticles and aggregates described herein includes (1) providing a thermal cracking apparatus having an inner volume that has a longitudinal axis and an elongated heating element disposed within the inner volume along the longitudinal axis; (2) heating the elongated heating element by electrical power to a molecular cracking temperature to generate a longitudinal elongated reaction zone within the inner volume: (3) flowing a feedstock process gas into the inner volume and through the longitudinal elongated reaction zone (e.g., wherein the feedstock process gas is heated by heat from the elongated heating element); and (4) thermally cracking molecules of the feedstock process gas within the longitudinal elongated reaction zone into constituents thereof (e.g., hydrogen gas and one or more solid products) as the feedstock process gas flows through the longitudinal elongated reaction zone.

In some embodiments, the feedstock process gas to produce the carbon nanoparticles and aggregates described herein includes a hydrocarbon gas. The results of cracking include hydrogen (e.g., $H^2$) and various forms of the carbon nanoparticles and aggregates described herein. In some embodiments, the carbon nanoparticles and aggregates include two or more MWSFs and layers of graphene coating the MWSFs, and/or connected MWSFs and layers of graphene coating the connected MWSFs. In some embodiments, the feedstock process gas is preheated (e.g., to 100° C. to 500° C.) by flowing the feedstock process gas through a gas preheating region between a heating chamber and a shell of the thermal cracking apparatus before flowing the feedstock process gas into the inner volume. In some embodiments, a gas having nanoparticles therein is flowed into the inner volume and through the longitudinal elongated reaction zone to mix with the feedstock process gas, and a coating of a solid product (e.g., layers of graphene) is formed around the nanoparticles.

Post-Processing High Purity Structured Carbons

In some embodiments, the carbon nanoparticles and aggregates containing multi-walled spherical fullerenes (MWSFs) or connected MWSFs described herein are produced and collected, and no post-processing is done. In other embodiments, the carbon nanoparticles and aggregates containing multi-walled spherical fullerenes (MWSFs) or connected MWSFs described herein are produced and collected, and some post-processing is done. Some examples of post-processing involved in electromagnetic state sensing devices include mechanical processing such as ball milling, grinding, attrition milling, micro fluidizing, and other techniques to reduce the particle size without damaging the MWSFs.

Some further examples of post-processing include exfoliation processes such as sheer mixing, chemical etching, oxidizing (e.g., Hummer method), thermal annealing, doping by adding elements during annealing (e.g., sulfur, nitrogen), steaming, filtering, and lyophilizing, among others. Some examples of post-processing include sintering processes such as spark plasma sintering (SPS), direct current sintering, microwave sintering, and ultraviolet (UV) sintering, which can be conducted at high pressure and temperature in an inert gas. In some embodiments, multiple post-processing methods can be used together or in a series. In some embodiments, the post-processing produces functionalized carbon nanoparticles or aggregates containing multi-walled spherical fullerenes (MWSFs) or connected MWSFs.

In some embodiments, the materials are mixed together in different combinations. In some embodiments, different carbon nanoparticles and aggregates containing MWSFs or connected MWSFs described herein are mixed together before post-processing. For example, different carbon nanoparticles and aggregates containing MWSFs or connected MWSFs with different properties (e.g., different sizes, different compositions, different purities, from different processing runs, etc.) can be mixed together. In some embodiments, the carbon nanoparticles and aggregates containing MWSFs or connected MWSFs described herein can be mixed with graphene to change the ratio of the connected MWSFs to graphene in the mixture. In some embodiments, different carbon nanoparticles and aggregates containing MWSFs or connected MWSFs described herein can be mixed together after post-processing. For example, different carbon nanoparticles and aggregates containing MWSFs or connected MWSFs with different properties and/or different post-processing methods (e.g., different sizes, different compositions, different functionality, different surface properties, different surface areas) can be mixed together.

In some embodiments, the carbon nanoparticles and aggregates described herein are produced and collected, and subsequently processed by mechanical grinding, milling, and/or exfoliating. In some embodiments, the processing (e.g., by mechanical grinding, milling, exfoliating, etc.) reduces the average size of the particles. In some embodiments, the processing (e.g., by mechanical grinding, milling, exfoliating, etc.) increases the average surface area of the particles. In some embodiments, the processing by mechanical grinding, milling and/or exfoliation shears off some fraction of the carbon layers, producing sheets of graphite mixed with the carbon nanoparticles.

In some embodiments, the mechanical grinding or milling is performed using a ball mill, a planetary mill, a rod mill, a shear mixer, a high-shear granulator, an autogenous mill, or other types of machining used to break solid materials into smaller pieces by grinding, crushing or cutting. In some embodiments, the mechanical grinding, milling and/or exfoliating is performed wet or dry. In some embodiments, the mechanical grinding is performed by grinding for some period of time, then idling for some period of time, and repeating the grinding and idling for a number of cycles. In some embodiments, the grinding period is from 1 minute to 20 minutes, or from 1 minute to 10 minutes, or from 3 minutes to 8 minutes, or approximately 3 minutes, or approximately 8 minutes. In some embodiments, the idling period is from 1 minute to 10 minutes, or approximately 5 minutes, or approximately 6 minutes. In some embodiments, the number of grinding and idling cycles is from 1 minute to 100 minutes, or from 5 minutes to 100 minutes, or from 10 minutes to 100 minutes, or from 5 minutes to 10 minutes, or from 5 minutes to 20 minutes. In some embodiments, the total amount of time of grinding and idling is from 10 minutes to 1200 minutes, or from 10 minutes to 600 minutes, or from 10 minutes to 240 minutes, or from 10 minutes to 120 minutes, or from 100 minutes to 90 minutes, or from 10 minutes to 60 minutes, or approximately 90 minutes, or approximately 120 minutes.

In some embodiments, the grinding steps in the cycle are performed by rotating a mill in one direction for a first cycle (e.g., clockwise), and then rotating a mill in the opposite direction (e.g., counterclockwise) for the next cycle. In some embodiments, the mechanical grinding or milling is performed using a ball mill, and the grinding steps are performed using a rotation speed from 100 to 1000 rpm, or from 100 to 500 rpm, or approximately 400 rpm. In some embodiments, the mechanical grinding or milling is performed using a ball mill that uses a milling media with a diameter from 0.1 mm to 20 mm, or from 0.1 mm to 10 mm, or from 1 mm to 10 mm, or approximately 0.1 mm, or approximately 1 mm, or approximately 10 mm. In some embodiments, the mechanical grinding or milling is performed using a ball mill that uses a milling media composed of metal such as steel, an oxide such as zirconium oxide (zirconia), yttria stabilized zirconium oxide, silica, alumina, magnesium oxide, or other hard materials such as silicon carbide or tungsten carbide.

In some embodiments, the carbon nanoparticles and aggregates described herein are produced and collected, and subsequently processed using elevated temperatures such as thermal annealing or sintering. In some embodiments, the processing using elevated temperatures is done in an inert environment such as nitrogen or argon. In some embodiments, the processing using elevated temperatures is done at atmospheric pressure, or under vacuum, or at low pressure. In some embodiments, the processing using elevated temperatures is done at a temperature from 500° C. to 2500° C., or from 500° C. to 1500° C., or from 800° C. to 1500° C., or from 800° C. to 1200° C., or from 800° C. to 1000° C., or from 2000° C. to 2400° C., or approximately 800° C., or approximately 1000° C., or approximately 1500° C., or approximately 2000° C., or approximately 2400° C.

In some embodiments, the carbon nanoparticles and aggregates described herein are produced and collected, and subsequently, in post processing steps, additional elements or compounds are added to the carbon nanoparticles, thereby incorporating the unique properties of the carbon nanoparticles and aggregates into other mixtures of materials.

In some embodiments, either before or after post-processing, the carbon nanoparticles and aggregates described herein are added to solids, liquids or slurries of other elements or compounds to form additional mixtures of materials incorporating the unique properties of the carbon nanoparticles and aggregates. In some embodiments, the carbon nanoparticles and aggregates described herein are mixed with other solid particles, polymers or other materials.

In some embodiments, either before or after post-processing, the carbon nanoparticles and aggregates described herein are used in various applications beyond applications pertaining to electromagnetic state sensing devices. Such applications including but not limited to transportation applications (e.g., automobile and truck tires, couplings, mounts, elastomeric O-rings, hoses, sealants, grommets, etc.) and industrial applications (e.g., rubber additives, functionalized additives for polymeric materials, additives for epoxies, etc.).

FIGS. 21-10A and 21-10B show transmission electron microscope (TEM) images of as-synthesized carbon nanoparticles. The carbon nanoparticles of FIG. 21-10A (at a first magnification) and FIG. 21-10B (at a second magnification) contain connected multi-walled spherical fullerenes 21-1002 (MWSFs) with graphene layers 21-1004 that coat the connected MWSFs. The ratio of MWSF to graphene allotropes in this example is approximately 80% due to the relatively short resonance times. The MWSFs in FIG. 21-10A are approximately 5 nm to 10 nm in diameter, and the diameter can be from 5 nm to 500 nm using the conditions described above. In some embodiments, the average diameter across the MWSFs is in a range from 5 nm to 500 nm, or from 5 nm to 250 nm, or from 5 nm to 100 nm, or from 5 nm to 50 nm, or from 10 nm to 500 nm, or from 10 nm to 250 nm, or from 10 nm to 100 nm, or from 10 nm to 50 nm, or from 40 nm to 500 nm, or from 40 nm to 250 nm, or from 40 nm to 100 nm, or from 50 nm to 500 nm, or from 50 nm to 250 nm, or from 50 nm to 100 nm. No catalyst was used in this process, and therefore, there is no central seed containing contaminants. The aggregate particles produced in this example had a particle size of approximately 10 μm to 100 μm, or approximately 10 μm to 500 μm.

FIG. 21-10C shows the Raman spectrum of the as-synthesized aggregates in this example taken with 532 nm incident light. The ID/IG for the aggregates produced in this example is from approximately 0.99 to 1.03, indicating that the aggregates were composed of carbon allotropes with a high degree of order.

FIG. 21-10D and FIG. 21-10E show example TEM images of the carbon nanoparticles after size reduction by grinding in a ball mill. The ball milling was performed in cycles with a 3 minute counter-clockwise grinding step, followed by a 6 minute idle step, followed by a 3 minute clockwise grinding step, followed by a 6 minute idle step. The grinding steps were performed using a rotation speed of 400 rpm. The milling media was zirconia and ranged in size from 0.1 mm to 10 mm. The total size reduction processing time was from 60 minutes to 120 minutes. After size reduction, the aggregate particles produced in this example had a particle size of approximately 1 μm to 5 μm. The carbon nanoparticles after size reduction are connected MWSFs with layers of graphene coating the connected MWSFs.

FIG. 21-10F shows a Raman spectrum from these aggregates after size reduction taken with a 532 nm incident light. The ID/IG for the aggregate particles in this example after size reduction is approximately 1.04. Additionally, the particles after size reduction had a Brunauer, Emmett and Teller (BET) specific surface area of approximately 40 $m^2/g$ to 50 $m^2/g$.

The purity of the aggregates produced in this sample were measured using mass spectrometry and x-ray fluorescence (XRF) spectroscopy. The ratio of carbon to other elements, except for hydrogen, measured in 16 different batches was from 99.86% to 99.98%, with an average of 99.94% carbon.

In this example, carbon nanoparticles were generated using a thermal hot-wire processing system. The precursor material was methane, which was flowed from 1 slm to 5 slm. With these flow rates and the tool geometry, the resonance time of the gas in the reaction chamber was from approximately 20 second to 30 seconds, and the carbon particle production rate was from approximately 20 g/hr.

Further details pertaining to such a processing system can be found in the previously mentioned U.S. Pat. No. 9,862,602, titled "CRACKING OF A PROCESS GAS."

FIG. 21-10G, FIG. 21-10H and FIG. 21-101 show TEM images of as-synthesized carbon nanoparticles of this example. The carbon nanoparticles contain connected multi-walled spherical fullerenes (MWSFs) with layers of graphene coating the connected MWSFs. The ratio of multi-walled fullerenes to graphene allotropes in this example is approximately 30% due to the relatively long resonance times allowing thicker, or more, layers of graphene to coat the MWSFs. No catalyst was used in this process, and therefore, there is no central seed containing contaminants. The as-synthesized aggregate particles produced in this example had particle sizes of approximately 10 μm to 500 μm. FIG. 21-10J shows a Raman spectrum from the aggregates of this example. The Raman signature of the as-synthesized particles in this example is indicative of the thicker graphene layers which coat the MWSFs in the as-synthesized material. Additionally, the as-synthesized particles had a Brunauer, Emmett and Teller (BET) specific surface area of approximately 90 $m^2/g$ to 100 $m^2/g$.

FIG. 21-10K and FIG. 21-10L show TEM images of the carbon nanoparticles of this example. Specifically, the images depict the carbon nanoparticles after performance of size reduction by grinding in a ball mill. The size reduction process conditions were the same as those described as pertains to the foregoing FIG. 21-10G through FIG. 21-10J. After size reduction, the aggregate particles produced in this example had a particle size of approximately 1 μm to 5 μm. The TEM images show that the connected MWSFs that were buried in the graphene coating can be observed after size reduction. FIG. 21-10M shows a Raman spectrum from the aggregates of this example after size reduction taken with 532 nm incident light. The ID/IG for the aggregate particles in this example after size reduction is approximately 1, indicating that the connected MWSFs that were buried in the graphene coating as-synthesized had become detectable in Raman after size reduction, and were well ordered. The particles after size reduction had a Brunauer, Emmett and Teller (BET) specific surface area of approximately 90 $m^2/g$ to 100 $m^2/g$.

FIG. 21-10N is a scanning electron microscope (SEM) image of carbon aggregates showing the graphite and graphene allotropes at a first magnification. FIG. 21-100 is a SEM image of carbon aggregates showing the graphite and graphene allotropes at a second magnification. The layered graphene is clearly shown within the distortion (wrinkles) of the carbon. The 3D structure of the carbon allotropes is also visible.

The particle size distribution of the carbon particles of FIG. 21-10N and FIG. 21-100 is shown in FIG. 21-10P. The mass basis cumulative particle size distribution 21-1006 corresponds to the left y-axis in the graph ($Q^3(x)$ [%]). The histogram of the mass particle size distribution 21-1008 corresponds to the right axis in the graph ($dQ^3(x)$[%]). The median particle size is approximately 33 μm. The 10th percentile particle size is approximately 9 μm, and the 90th percentile particle size is approximately 103 μm. The mass density of the particles is approximately 10 g/L.

The particle size distribution of the carbon particles captured from a multiple-stage reactor is shown in FIG. 21-10Q. The mass basis cumulative particle size distribution 21-1014 corresponds to the left y-axis in the graph ($Q^3(x)$[%]). The histogram of the mass particle size distribution 21-1016 corresponds to the right axis in the graph ($dQ^3(x)$[%]). The median particle size captured is approximately 11 μm. The 10th percentile particle size is approximately 3.5 μm, and the 90th percentile particle size is approximately 21 μm. The graph in FIG. 21-10Q also shows the number basis cumulative particle size distribution 21-1018 corresponding to the left y-axis in the graph ($Q^0(x)$[%]). The median particle size by number basis is from approximately 0.1 μm to approximately 0.2 μm. The mass density of the particles collected is approximately 22 g/L.

Returning to the discussion of FIG. 21-10P, the graph also shows a second set of example results. Specifically, in this example, the particles were size-reduced by mechanical grinding, and then the size-reduced particles were processed using a cyclone separator. The mass basis cumulative particle size distribution 21-1010 of the size-reduced carbon particles captured in this example corresponds to the left y-axis in the graph ($Q^3(x)$[%]). The histogram of the mass basis particle size distribution 21-1012 corresponds to the right axis in the graph ($dQ^3(x)$[%]). The median particle size of the size-reduced carbon particles captured in this example is approximately 6 μm. The 10th percentile particle size is from 1 μm to 2 μm, and the 90th percentile particle size is from 10 μm to 20 μm.

Further details pertaining to making and using cyclone separators can be found in U.S. Pat. No. 10,308,512 entitled "MICROWAVE REACTOR SYSTEM WITH GAS-SOLIDS SEPARATION," which is hereby incorporated by reference in its entirety.

High Purity Carbon Allotropes Produced Using Microwave

In some cases, carbon particles and aggregates containing graphite, graphene and amorphous carbon can be generated using a microwave plasma reactor system using a precursor material that contains methane, or contains isopropyl alcohol (IPA), or contains ethanol, or contains a condensed hydrocarbon (e.g., hexane). In some other examples, the carbon-containing precursors are optionally mixed with a supply gas (e.g., argon). The particles produced in this example contained graphite, graphene, amorphous carbon and no seed particles. The particles in this example had a ratio of carbon to other elements (other than hydrogen) of approximately 99.5% or greater.

In one particular example, a hydrocarbon was the input material for the microwave plasma reactor, and the separated outputs of the reactor comprised hydrogen gas and carbon particles containing graphite, graphene and amorphous carbon. The carbon particles were separated from the hydrogen gas in a multi-stage gas-solid separation system. The solids loading of the separated outputs from the reactor was from 0.001 g/L to 2.5 g/L.

FIG. 21-10R, FIG. 21-10S, and FIG. 21-10T are TEM images of as-synthesized carbon nanoparticles. The images show examples of graphite, graphene and amorphous carbon allotropes. The layers of graphene and other carbon materials can be clearly seen in the images.

The particle size distribution of the carbon particles captured is shown in FIG. 21-10U. The mass basis cumulative particle size distribution 21-1020 corresponds to the left y-axis in the graph ($Q^3(x)$[%]). The histogram of the mass particle size distribution $21\text{-}102_2$ corresponds to the right axis in the graph ($dQ^3(x)$[%]). The median particle size captured in the cyclone separator in this example was approximately 14 μm. The 10th percentile particle size was approximately 5 μm, and the 90th percentile particle size was approximately 28 μm. The graph in FIG. 21-10U also shows the number basis cumulative particle size distribution 21-1024 corresponding to the left y-axis in the graph ($Q^0(x)$[%]). The median particle size by number basis in this example was from approximately 0.1 μm to approximately 0.2 μm.

FIG. 21-10V, FIG. 21-10W, and FIG. 21-10X, and FIG. 21-10Y are images that show three-dimensional carbon-containing structures that are grown onto other three-dimensional structures. FIG. 21-10V is a 100× magnification of three-dimensional carbon structures grown onto carbon fibers, whereas FIG. 21-10W is a 200× magnification of three-dimensional carbon structures grown onto carbon fibers. FIG. 21-21-10X is a 1601× magnification of three-dimensional carbon structures grown onto carbon fibers. The three-dimensional carbon growth over the fiber surface is shown. FIG. 21-10Y is a 10000× magnification of three-dimensional carbon structures grown onto carbon fibers. The image depicts growth onto the basal plane as well as onto edge planes.

More specifically, FIG. 21-10V thru FIG. 21-10Y show example SEM images of 3D carbon materials grown onto fibers using plasma energy from a microwave plasma reactor as well as thermal energy from a thermal reactor. FIG. 21-10V shows an SEM image of intersecting fibers 21-1031 and 21-1032 with 3D carbon material 21-1030 grown on the surface of the fibers. FIG. 21-10W is a higher magnification image (the scale bar is 300 μm compared to 500 m for FIG. 21-10V) showing 3D carbon growth 21-1030 on the fiber 21-1032.

FIG. 21-10X is a further magnified view (scale bar is 40 μm) showing 3D carbon growth 21-1030 on fiber surface 21-1035, where the 3D nature of the carbon growth 21-1030 can be clearly seen. FIG. 21-10Y shows a close-up view (scale bar is 500 nm) of the carbon alone, showing interconnection between basal planes 21-1036 and edge planes 21-1034 of numerous sub-particles of the 3D carbon material grown on the fiber. FIG. 21-10V through FIG. 21-10Y demonstrate the ability to grow 3D carbon on a 3D fiber structure according to some embodiments, such as 3D carbon growth grown on a 3D carbon fiber.

In some embodiments, 3D carbon growth on fibers can be achieved by introducing a plurality of fibers into the microwave plasma reactor and using plasma in the microwave reactor to etch the fibers. The etching creates nucleation sites such that when carbon particles and sub-particles are created by hydrocarbon disassociation in the reactor, growth of 3D carbon structures is initiated at these nucleation sites. The direct growth of the 3D carbon structures on the fibers, which themselves are three-dimensional in nature, provides a highly integrated, 3D structure with pores into which resin can permeate. This 3D reinforcement matrix (including the 3D carbon structures integrated with high aspect ratio reinforcing fibers) for a resin composite results in enhanced material properties, such as tensile strength and shear, compared to composites with conventional fibers that have smooth surfaces and which smooth surfaces typically delaminate from the resin matrix.

In some embodiments, carbon materials, such as 3D carbon materials described herein, can be functionalized to promote adhesion and/or add elements such as oxygen, nitrogen, carbon, silicon, or hardening agents. In some embodiments, the carbon materials can be functionalized in situ—that is, within the same reactor in which the carbon materials are produced. In some embodiments, the carbon materials can be functionalized in post-processing. For example, the surfaces of fullerenes or graphene can be functionalized with oxygen- or nitrogen-containing species which form bonds with polymers of the resin matrix, thus improving adhesion and providing strong binding to enhance the strength of composites.

Embodiments include functionalizing surface treatments for carbon (e.g., CNTs, CNO, graphene, 3D carbon materials such as 3D graphene) utilizing plasma reactors (e.g., microwave plasma reactors) described herein. Various embodiments can include in situ surface treatment during creation of carbon materials that can be combined with a binder or polymer in a composite material. Various embodiments can include surface treatment after creation of the carbon materials while the carbon materials are still within the reactor.

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure.

The specification and drawings are to be regarded in an illustrative sense rather than in a restrictive sense.

This Patent Application relates to U.S. patent application Ser. No. 18/073,055 entitled "ELECTROMAGNETIC STATE SENSING DEVICES" and filed on Dec. 1, 2022; U.S. patent application Ser. No. 17/693,649 entitled "ELECTROMAGNETIC STATE SENSING DEVICES" and filed on Mar. 14, 2022, now U.S. Pat. No. 11,537,806 B2; U.S. patent application Ser. No. 17/153,146 entitled "ELECTROMAGNETIC STATE SENSING DEVICES" and filed on Jan. 20, 2021, now U.S. Pat. No. 11,288,466 B2; U.S. patent application Ser. No. 16/530,173 entitled "ELECTROMAGNETIC STATE SENSING DEVICES" and filed on Aug. 2, 2019, now U.S. Pat. No. 10,943,076 B2; U.S. Provisional Patent Application No. 62/716,741 entitled "PRODUCT SENSING" and filed on Aug. 9, 2018, all of which are assigned to the assignee hereof. The disclosures of all prior Applications are considered part of and are incorporated by reference in this Patent Application.

FIG. 22-1 depicts a medical device 22-100 in an embodiment that uses the heretofore-described printed batteries. The center of the figure includes a battery that substantially conforms to the geometries described herein. More particularly, in addition to the cathode and anode of the battery, the embodiment includes a charging means (e.g., wireless charging unit 22-102), several environmental sensing means (e.g., sensor S1 22-1004, sensor 22-108) non-volatile binary bit storage means (e.g., NV bits 22-106), spectroscopy means (e.g., quantum dot spectroscopy unit 22-110), motion sensing means (e.g., accelerometer 22-112), proximity sensing means (e.g., proximity sensor 22-114), and power control means (e.g., power control unit 22-116). Additionally, the shown embodiment includes medicament containment and release means (e.g., medicament delivery unit 22-130 and dispensing control unit 22-121), a multiple access communication bus means (e.g., CSMA bus ring 22-140), and any number of electromagnetic wave reception means and any number of electromagnetic transmission means (e.g., first antenna 22-120 and second antenna 22-122).

In exemplary embodiments, the wireless charging unit 22-102 is relatively larger than other units and/or is distally-located from the other units. As such the wireless charging unit can be sized and arranged so as to provide a voltage potential to power control unit 22-116. The voltage potential can be generated based on fluctuations of electromagnetic radiation that are incident on the area consumed by the structure of the wireless charging unit 22-102. In some cases, the fluctuations of electromagnetic radiation are converted into mechanical energy before being converted into an electrical energy in the form of a voltage potential. Electrical coupling between the wireless charging unit 22-102 and the power control unit 22-116 can comprise conductive traces formed in whole or in part by conductive ink that is carbon based. Strictly as an example, a first means for electrical coupling between the wireless charging unit 22-102 and the power control unit 22-116 may comprise a portion of a positive power rail and a portion of a negative power rail. As another example, a second means for electrical coupling between the wireless charging unit 22-102 and the power control unit 22-116 may comprise two or more of the foregoing conductive traces that are in addition to the positive power rail and the negative power rail.

The power control unit 22-116 includes circuitry for several purposes: (1) by using the first means for electrical coupling between the wireless charging unit 22-102 and the power control unit 22-116, electrical potential provided by the battery can be controlled and distributed to other operational units, and (2) by using the second means for electrical coupling between the wireless charging unit 22-102 and the power control unit 22-116, the battery can be charged.

With respect to ongoing charging of the battery, many charging means for charging a storage device are contemplated for use in various medical applications. Table 22-11 presents examples pertaining to low-frequency electromagnetic radiation:

TABLE 22-2

| Example Locations of Sending Devices for Charging Means<br>Location of Sending Devices |
|---|
| Embedded in a blanket or sheet or mattress or pillow |
| Embedded in a strip within an electric blanket or electric sheet or electric mattress or electric pillow |
| Embedded in apparel (e.g., jacket or belt) having an external battery |
| Embedded in powered furniture (e.g., electric chair, electric sofa, electric couch, electric table etc.) |
| Embedded in electronic devices (e.g., computer monitors, cellphones, etc.) |

With respect to ongoing charging of the battery, many charging means for charging a storage device are contemplated for use in various medical applications. Table 22-2 presents examples pertaining to charging using visible light:

TABLE 22-2

| Example Locations of Sending Devices for Charging Means<br>Location of Sending Devices |
|---|
| In a helmet |
| In light-emitting undergarment or belt |
| In a light-emitting blanket or pillow |
| In a light emitting portion of a piece of furniture |
| In a finger thimble |

The light generated by any of the foregoing sending devices results in energetic photons that impinge on subcutaneous energy harvesting surfaces, and thereby generate electrical energy. The resulting electrical energy is in turn used to charge the battery.

With respect to ongoing charging of the battery, many still further charging means for charging a storage device are contemplated for use in various medical applications. For example, power can be transferred from a subcutaneous bio fuel cell to the energy storage device(s). For example, a piezoelectric orthotic can be placed in a shoe or boot, and when the patient is ambulatory, patient-provided mechanical energy is converted to other forms of energy, which energy in turn is used in conjunction with the foregoing charging means.

With respect to ongoing charging of the battery, many still further charging means for charging a storage device are contemplated for use in various medical applications. For example, charging means may include structural members that subgaleal (e.g., a subgaleal flexible antenna, one or more subgaleal electrodes, etc.).

Further details regarding methods and apparatus for making and using devices that provide the foregoing charging means can be found in commonly-owned U.S. Patent Application Publication No. 2016/0028374 A1, titled "APPARATUS AND METHOD FOR TUNING A RESONANCE FREQUENCY" which is hereby incorporated by reference in its entirety.

As shown, any or all of the operational units can connect to a carrier sense multiple access (CSMA) bus. As such, any or all of the operational units can communicate to any or all of the other operational units by signaling (e.g., placing a potential in the CSMA bus). The other operational units can detect the foregoing signal by sensing a change in potential. Carrier sense multiple access (CSMA) can be implemented by adherence to a pre-defined "mark" and "space" protocol that defines a bit value and parity. When the foregoing mark and space protocol is observed, and when the bit and its corresponding parity value are both received, the bit is deemed valid and a next bit is sensed. When the mark and space protocol is violated, and/or when the bit and its corresponding parity value received do not match, the receivers ignore the attempted transmission and wait for a next mark and space transmission attempt. A transmitting unit can detect its own signaling. For example, when a transmitting unit is attempting to transmit a space, and the value on the CSMA bus is a mark, then the transmitter deems that there are multiple transmitters attempting to signal simultaneously, and the transmitters each back-off for a random amount of time before retrying.

Continuing with discussion of the embodiment of FIG. 8, the medical device 22-100 may comprise various sensing means. Strictly as one example, a sensor S1 22-101 can be included in the medical device. The sensor S1 can be an environmental sensor that responds to environmental conditions or measurements such as temperature, pressure, flexion, presence of particular gasses, presence of particular chemicals, presence of particular biological compound or material, etc. Results of the sensing can be coded into a message that is transmitted over the multiple access bus. Other operational units can receive the message and take further action. For example, the sensor S1 can detect the presence and levels of particular biological compounds that are associated with, for example, low blood sugar. The event of detection (e.g., based on a threshold) and/or any specific measurements can be sent over the CSMA bus and received as a message by the dispensing control unit 22-121. The dispensing control unit can in turn send a dedicated dispense signal 22-144 to the medicament delivery unit 22-130. The medicament delivery unit in turn dispenses a medicament in the form of insulin.

The foregoing is merely one example of a sense/dispense scenario. Other sense/action scenarios are possible to implement using any one or more sensors or combinations of sensors. In some situations, the medical device 22-100 is configured with a second or Nth sensor (e.g., sensor S2 22-108). Such a second sensor might be configured to sense in different ranges, and/or to sense with greater precision. In some cases, a plurality of sensors work in conjunction with spectroscopy means. In particular, and as shown, a first sensor S1 might take a first observation and communicate that observation to the quantum dot spectroscopy unit 22-110, which in turn might combine that observation with spectroscopy results. If the spectroscopy results include presence of a compound that is in (for example) a concentration above a particular threshold, then the quantum dot spectroscopy unit 22-110 can send a message to a first antenna over the CSMA bus.

As can be understood by those of skill in the art, plasmonic effects can be use in sensors. Such plasmonic effects can be observed and used for various purposes including for sensing presence of compounds on the skin (e.g., using a patch in a topical application) or compounds found in the body (e.g., using a subcutaneous device).

Further details regarding how to make and use sensors in accordance with any of the foregoing can be found in U.S. Patent Application No. 62/613,716, titled VOLATILES SENSOR, which is hereby incorporated by reference in its entirety.

In a transmission mode, the antenna can generate fluctuations in local electromagnetic radiation, which in turn can be received by a nearby receiver. In example embodiments, the medical device (including all or portions of the embodiment of FIG. 22-1) is subcutaneous (i.e., within the body of a patient, under the skin of a patient, etc.) and the receiver is outside of the body of the patient.

Various mechanisms for Rx/Tx communication from within the body cavity of a patient to an external Rx/Tx transceiver is facilitated at least in part by use of a voltage-tunable phase shifter. More specifically, phase shift keying can be implemented using variations of the foregoing voltage-tunable phase shifter. Further details pertaining to making and using non-toxic voltage-tunable phase shifter components are disclosed in commonly-owned patent application publication No. EP2649668, titled "A VOLTAGE TUNABLE PHASE SHIFTER AND ASSOCIATED METHODS" which is hereby incorporated by reference in its entirety. Moreover, various mechanisms for Rx/Tx communication from within the body cavity of a patient to an external Rx/Tx transceiver is facilitated at least in part by use of antennas having frequency selective elements.

Details for making and using carbon-based antennas with frequency selective elements are disclosed in U.S. Patent Application Publication No. 20180294570, titled "ANTENNA WITH FREQUENCY SELECTIVE ELEMENTS", which is hereby incorporated by reference in its entirety.

The external Rx/Tx transceiver can communicate to additional processing elements using any known electronic signaling communication techniques and equipment (e.g., ethernet, USB, visible light telemetry, etc.). The additional processing elements may in turn be in communication with still other processing elements such as servers, routers, data storage systems, etc. In some cases, such an external Rx/Tx transceiver is used primarily for communication of parameter values that arise from within the body of the patient. In other situations, the Rx/Tx transceiver is used primarily for communication of parameter values to be at least temporarily stored within the body cavity of the patient. Strictly as one example means for storing parameter values (e.g., bits) within the body cavity of the patient, the bits of the values can be stored in memristor bits.

Further details regarding making and using memristor bits can be found in commonly-owned U.S. Pat. No. 9,978,940, titled “MEMRISTOR AND METHOD OF PRODUCTION THEREOF”, which is hereby incorporated by reference in its entirety.

Still continuing with the discussion of the medical device 22-100 of FIG. 22-1, some embodiments of medical device 22-100 include a proximity sensor 22-114. The proximity sensor can operate autonomously to sense proximity to nearby objects (e.g., prosthetics) and/or the proximity sensor can operate in conjunction with an accelerometer 22-112. Strictly as an example, the proximity sensor might be configured to sense movement of a leg prosthetic, and thereby be able to characterize the improvement or degradation of a patient’s gait. Such a proximity sensor might be further configured to communicate with accelerometer 22-112 so as to communicate time-wide correlated data that combines proximity observations with motion of the patient. As such the correlated data can be used to diagnose physical problems and/or used to recommend particular physical therapies.

Some of the foregoing embodiments rely at least in part on parameters that are available to any operational units. The medical device 22-100 includes means for storing and retrieving values. Specifically, and as shown, non-volatile bits (e.g., NV bits 22-106) can store parameter values that be stored for retrieval by any operational unit connected to the CSMA bus. The NV bits 22-106 can receive a message over the CSMA bus, decode the message to determine an access address, and respond to the message with another message that includes the value sensed at the access address. The access address might be correlated to a length as well. For example, an access address might be given as an offset and a length. A parameter value can be stored beginning at the offset address (e.g., bit number 0). Given the offset and the length, a sequence of bit values can be formed into a message and the message communicated over the CSMA bus. Such parameter values can comprise patient identification, patient preferences, security numbers such as an electronic identification number (EIN), tuning parameters (e.g., such as are used in audiology applications), thresholds (e.g., such as are used in spectroscopy applications), date, timing and dosage parameters (e.g., such as are used in medicament dispensing applications, etc.

FIG. 22-2 depicts one example of a component that is in communication with a CSMA bus ring. As shown, the example component includes an area for a sensor (e.g., sensor area 22-202), an area for signaling (e.g., signaling circuitry 22-204), and an area for power control (e.g., local power control circuitry 22-206). The sensor area can be relatively larger or smaller than is depicted in the figure, and/or the sensor area can be juxtaposed to closer to or farther away from the local power control circuitry.

In some embodiments, the local power control circuitry includes internal or external capacitors that support entry into and exit from a low-power mode. More specifically, the local power control circuitry might support a low duty cycle of user, where the component is powered on only periodically (e.g., once per hour) to make observations and optionally send/receive one or more message over the CSMA bus. After to making observations the component might then enter into a low-power sleep mode. In some embodiments, the local power control circuitry 22-206 comprises a timer that facilitates entry into and/or exit from a low power mode.

Charging Power Generation

The printed battery or batteries that are present in the foregoing medical devices can be recharged on a continuous basis so as to emulate a “perpetual energy source” that provides electrical power to the medical device. In some embodiments, the patient’s own kinetic energy is converted into a fluctuating electrical current, which in turn is converted into a fluctuating electric field, which in turn us used for wireless charging of the medical device. Some charging embodiments are worn by the patient. For example, a device for converting the patient’s own kinetic energy into a fluctuating electric current might be worn as an orthotic in a shoe or the patient’s own kinetic energy into a fluctuating electric current might be harvested from motion of a prosthetic. As such, the energy generated can be delivered as a fluctuating electric current to any location on the body of the patient, and thereafter, after being delivered to the proximity of the subcutaneous medical device, the generated energy can be converted into a form for wireless charging of the medical device.

Reference has been made to embodiments of the disclosed invention. Each example has been provided by way of explanation of the present technology, not as a limitation of the present technology. In fact, while the specification has been described in detail with respect to specific embodiments of the invention, it will be appreciated that those skilled in the art, upon attaining an understanding of the foregoing, may readily conceive of alterations to, variations of, and equivalents to these embodiments. For instance, features illustrated or described as part of one embodiment may be used with another embodiment to yield a still further embodiment. Thus, it is intended that the present subject matter covers all such modifications and variations within the scope of the appended claims and their equivalents. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only, and is not intended to limit the invention.

The use of the terms “a” and “an” and “the” and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., “such as”) provided herein, is intended merely to better illustrate the subject matter and does not pose a limitation on the scope of the subject matter unless otherwise claimed. The use of the term “based on” and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A system, comprising:

a non-transitory memory storing instructions; and one or more processors in communication with the non-transitory memory, wherein the one or more processors execute the instructions to cause the system to:

receive at least one first parameter associated with at least one sensor, wherein the at least one sensor includes a three-dimensional (3D) graphene layer, wherein the 3D graphene layer is biofunctionalized with a molecular recognition element configured to alter one or more electrical properties of the 3D graphene layer in response to exposure of the molecular recognition element to an analyte;

associate the at least one first parameter with a pre-identified first digital signature in a signature database;

train a machine learning system based on the at least one first parameter and the pre-identified digital signature;

receive at least one second parameter from the at least one sensor;

determine that the at least one second parameter is independent of a digital signature in the signature database;

identify, using the machine learning system, a second digital signature for the at least one second parameter; and save, using the machine learning system, the second digital signature in the signature database.

2. The system of claim 1, wherein the training of the machine learning system is unsupervised.

3. The system of claim 1, wherein the one or more processors execute the instructions to cause the system to operate in a reactive stance in response to detection of a new digital signature.

4. The system of claim 1, wherein the one or more processors execute the instructions to cause the system to operate in a proactive stance such that the machine learning system generates new digital signatures not found in the signature database.

5. The system of claim 1, wherein the one or more processors execute the instructions to cause the system to determine an accuracy score of the second digital signature, wherein the accuracy includes a confidence based on comparing the second digital signature to known signatures in the signature database.

6. The system of claim 1, wherein each signature in the signature database includes specific patterns or characteristics of sensor data.

7. The system of claim 1, wherein a signature in the signature database is flagged as a threat.

8. The system of claim 1, wherein the at least one sensor includes an array of sensors.

9. The system of claim 1, wherein the receipt of the at least one first parameter is received from the at least one sensor.

10. The system of claim 1, wherein the receipt of the at least one first parameter is received from another sensor or control node associated with the at least one sensor.

11. The system of claim 1, wherein the machine learning system is part of a sensor as a service platform.

12. The system of claim 1, wherein the machine learning system operates in the cloud and is physically separate from the at least one sensor.

13. The system of claim 1, wherein the machine learning system is configured to further monitor the at least one sensor, including reporting of anomalies based on sensor data from the at least one sensor, or facilitate issue resolution for the at least one sensor.

14. The system of claim 1, wherein the at least one sensor is formed from a three-dimensional (3D) monolithic carbonaceous growth.

15. The system of claim 14, wherein a resonant frequency of the 3D monolithic carbonaceous growth is based at least in part on either or both of a permittivity and a permeability of a material associated with the at least one sensor.

16. The system of claim 1, wherein the at least one sensor is a split-ring resonator (SRR) on or embedded in a material, wherein the SRR includes a resonance portion, wherein the resonance portion is configured to resonate at a first frequency in response to an electromagnetic ping when a state of the material exceeds a threshold, and is configured to resonate at a second frequency in response to the electromagnetic ping when the state of the material is beneath the threshold.

17. The system of claim 1, wherein the at least one sensor is integrated within a label configured to be removably printed onto a surface of a package or container, and the label comprises one or more carbon-based inks.

18. The system of claim 1, wherein the at least one sensor is carbon-based and is functionalized with a material configured to react with each analyte of a first group of analytes.

19. The system of claim 1, wherein the molecular recognition element is a biological material configured to selectively bind with the analyte.

20. The system of claim 1, wherein the at least one sensor is a three-dimensional (3D) carbon-based structure configured to guide a migration of electrically charged electrophoretic ink particles dispersed throughout the 3D carbon-based structure, the electrically charged electrophoretic ink particles responsive to application of a voltage to the 3D carbon-based structure.

* * * * *